US008965216B2

(12) United States Patent
Oshima et al.

(10) Patent No.: US 8,965,216 B2
(45) Date of Patent: Feb. 24, 2015

(54) INFORMATION COMMUNICATION METHOD

(71) Applicant: Panasonic Corporation, Osaka (JP)

(72) Inventors: Mitsuaki Oshima, Kyoto (JP); Hideki Aoyama, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/227,010

(22) Filed: Mar. 27, 2014

(65) Prior Publication Data

US 2014/0212146 A1 Jul. 31, 2014

Related U.S. Application Data

(63) Continuation of application No. 14/087,630, filed on Nov. 22, 2013, which is a continuation-in-part of application No. 13/902,215, filed on May 24, 2013, and a continuation-in-part of application No. (Continued)

(30) Foreign Application Priority Data

Dec. 27, 2012 (JP) ................................ 2012-286339
Mar. 28, 2013 (JP) ................................ 2013-070740
Apr. 10, 2013 (JP) ................................ 2013-082546
May 24, 2013 (JP) ..................... PCT/JP2013/003318
May 24, 2013 (JP) ..................... PCT/JP2013/003319
Jul. 30, 2013 (JP) ................................ 2013-158359
Aug. 30, 2013 (JP) ................................ 2013-180729
Oct. 7, 2013 (JP) ................................ 2013-210623

(51) Int. Cl.
*H04B 10/00* (2013.01)
*H04B 10/116* (2013.01)
(Continued)

(52) U.S. Cl.
CPC .......... *H04B 10/116* (2013.01); *H04B 10/1143* (2013.01); *H04N 5/2353* (2013.01); *H04W 4/001* (2013.01); *H04B 10/516* (2013.01); *H04N 5/3532* (2013.01)
USPC .......................................... 398/131; 398/118

(58) Field of Classification Search
CPC ........................... H04B 10/114; H04B 10/116
USPC ................................ 398/118, 122, 129, 131
See application file for complete search history.

(56) References Cited

U.S. PATENT DOCUMENTS 5,734,328 A 3/1998 Shinbori
5,765,176 A 6/1998 Bloomberg (Continued)

FOREIGN PATENT DOCUMENTS

AU 2007253450 11/2007
JP 07-200428 8/1995

(Continued)

OTHER PUBLICATIONS

Office Action, mailed on May 22, 2014, for the corresponding U.S. Appl. No. 14/087,645.

(Continued)

*Primary Examiner* — Daniel Dobson
(74) *Attorney, Agent, or Firm* — Greenblum & Bernstein, P.L.C.

(57) ABSTRACT

An information communication method is provided that transmits a signal using a change in luminance. The information communication method includes determining a pattern of the change in luminance by modulating the signal to be transmitted, and transmitting the signal by a display, which is a light emitter, changing in luminance according to the determined pattern. The method also includes detecting, by a sensor, a person within a viewing angle of the display or a person near the viewing angle. Further, in the transmitting of the signal, the signal is transmitted by changing in luminance by a larger change amount in the case where the person near the viewing angle is detected than in the case where the person within the viewing angle is detected.

4 Claims, 470 Drawing Sheets

Related U.S. Application Data

13/902,436, filed on May 24, 2013, now Pat. No. 8,823,852.

(60) Provisional application No. 61/887,541, filed on Oct. 7, 2013, provisional application No. 61/872,028, filed on Aug. 30, 2013, provisional application No. 61/859,902, filed on Jul. 30, 2013, provisional application No. 61/810,291, filed on Apr. 10, 2013, provisional application No. 61/805,978, filed on Mar. 28, 2013, provisional application No. 61/746,315, filed on Dec. 27, 2012.

(51) Int. Cl.

| | |
|---|---|
| ***H04B 10/114*** | (2013.01) |
| ***H04N 5/235*** | (2006.01) |
| ***H04W 4/00*** | (2009.01) |
| ***H04B 10/516*** | (2013.01) |
| ***H04N 5/353*** | (2011.01) |
| *H04B 10/12* | (2006.01) |

(56) References Cited

U.S. PATENT DOCUMENTS

| | | | | |
|---|---|---|---|---|
| 6,933,956 | B2 | 8/2005 | Sato et al. | |
| 7,308,194 | B2 | 12/2007 | Iizuka et al. | |
| 7,415,212 | B2 | 8/2008 | Matsushita et al. | |
| 7,502,053 | B2 | 3/2009 | Kagawa et al. | |
| 7,570,246 | B2 | 8/2009 | Maniam et al. | |
| 7,715,723 | B2 | 5/2010 | Kagawa et al. | |
| RE42,848 | E | 10/2011 | Sato et al. | |
| 8,093,988 | B2 | 1/2012 | Takene et al. | |
| 8,331,724 | B2 | 12/2012 | Rhoads | |
| RE44,004 | E | 2/2013 | Sato et al. | |
| 8,451,264 | B2 | 5/2013 | Yamaguchi et al. | |
| 8,493,485 | B2 | 7/2013 | Hirose | |
| 8,550,366 | B2 | 10/2013 | Myodo et al. | |
| 8,571,217 | B2 | 10/2013 | Ishii et al. | |
| 8,634,725 | B2 | 1/2014 | Jang et al. | |
| 8,648,911 | B2 | 2/2014 | Okumura | |
| 8,720,779 | B2 | 5/2014 | Asami | |
| 8,749,470 | B2 | 6/2014 | Furihata et al. | |
| 2002/0167701 | A1 | 11/2002 | Hirata | |
| 2003/0026422 | A1 | 2/2003 | Gerheim et al. | |
| 2003/0058262 | A1 | 3/2003 | Sato et al. | |
| 2003/0076338 | A1 | 4/2003 | Hashimoto | |
| 2003/0171096 | A1 | 9/2003 | Ilan et al. | |
| 2004/0101309 | A1 | 5/2004 | Beyette, Jr. et al. | |
| 2004/0125053 | A1 | 7/2004 | Fujisawa | |
| 2004/0161246 | A1 | 8/2004 | Matsushita et al. | |
| 2005/0190274 | A1 | 9/2005 | Yoshikawa et al. | |
| 2006/0056855 | A1 | 3/2006 | Nakagawa et al. | |
| 2006/0171360 | A1 | 8/2006 | Kim et al. | |
| 2006/0239675 | A1 | 10/2006 | Iizuka et al. | |
| 2006/0242908 | A1 | 11/2006 | McKinney | |
| 2007/0024571 | A1 | 2/2007 | Maniam et al. | |
| 2007/0070060 | A1 | 3/2007 | Kagawa et al. | |
| 2008/0018751 | A1 | 1/2008 | Kushida | |
| 2008/0023546 | A1 | 1/2008 | Myodo et al. | |
| 2008/0044188 | A1 | 2/2008 | Kagawa et al. | |
| 2008/0055041 | A1 | 3/2008 | Takene et al. | |
| 2008/0180547 | A1 | 7/2008 | Hirose | |
| 2008/0205848 | A1 | 8/2008 | Kobayashi | |
| 2008/0290988 | A1 | 11/2008 | Crawford | |
| 2008/0297615 | A1 | 12/2008 | Kagawa et al. | |
| 2009/0066689 | A1 | 3/2009 | Yamaguchi et al. | |
| 2009/0129781 | A1 | 5/2009 | Irie et al. | |
| 2009/0135271 | A1 | 5/2009 | Kurane | |
| 2010/0034540 | A1 | 2/2010 | Togashi | |
| 2010/0107189 | A1 | 4/2010 | Steelberg et al. | |
| 2010/0116888 | A1 | 5/2010 | Asami | |
| 2010/0208163 | A1* | 8/2010 | Fuchikami et al. | 349/62 |
| 2010/0315395 | A1 | 12/2010 | Kang et al. | |
| 2011/0007160 | A1 | 1/2011 | Okumura | |
| 2011/0025730 | A1 | 2/2011 | Ajichi | |
| 2011/0063510 | A1 | 3/2011 | Lee et al. | |
| 2011/0064416 | A1 | 3/2011 | Rajagopal et al. | |
| 2011/0227827 | A1 | 9/2011 | Solomon et al. | |
| 2011/0229147 | A1 | 9/2011 | Yokoi | |
| 2011/0243325 | A1 | 10/2011 | Ishii et al. | |
| 2011/0299857 | A1 | 12/2011 | Rekimoto | |
| 2012/0002136 | A1* | 1/2012 | Nagata et al. | 349/62 |
| 2012/0054311 | A1* | 3/2012 | Mizuno et al. | 709/218 |
| 2012/0133815 | A1 | 5/2012 | Nakanishi et al. | |
| 2012/0224743 | A1 | 9/2012 | Rodriguez et al. | |
| 2012/0281987 | A1 | 11/2012 | Schenk et al. | |
| 2013/0141555 | A1 | 6/2013 | Ganick et al. | |
| 2013/0170695 | A1 | 7/2013 | Anan et al. | |
| 2013/0201369 | A1 | 8/2013 | Hirose | |
| 2013/0271631 | A1 | 10/2013 | Tatsuzawa et al. | |
| 2013/0272717 | A1* | 10/2013 | Deguchi et al. | 398/154 |
| 2013/0329440 | A1 | 12/2013 | Tsutsumi et al. | |
| 2013/0330088 | A1 | 12/2013 | Oshima et al. | |
| 2013/0335592 | A1 | 12/2013 | Yamada et al. | |
| 2013/0337787 | A1 | 12/2013 | Yamada et al. | |
| 2014/0037296 | A1 | 2/2014 | Yamada et al. | |
| 2014/0184883 | A1 | 7/2014 | Shimamoto | |
| 2014/0184914 | A1 | 7/2014 | Oshima et al. | |
| 2014/0185860 | A1 | 7/2014 | Oshima et al. | |
| 2014/0186026 | A1 | 7/2014 | Oshima et al. | |
| 2014/0186047 | A1 | 7/2014 | Oshima et al. | |
| 2014/0186048 | A1 | 7/2014 | Oshima et al. | |
| 2014/0186049 | A1 | 7/2014 | Oshima et al. | |
| 2014/0186050 | A1 | 7/2014 | Oshima et al. | |
| 2014/0186052 | A1 | 7/2014 | Oshima et al. | |
| 2014/0186055 | A1 | 7/2014 | Oshima et al. | |
| 2014/0192185 | A1 | 7/2014 | Oshima et al. | |
| 2014/0192226 | A1 | 7/2014 | Oshima et al. | |
| 2014/0204129 | A1 | 7/2014 | Oshima et al. | |
| 2014/0205136 | A1 | 7/2014 | Oshima et al. | |
| 2014/0207517 | A1 | 7/2014 | Oshima et al. | |
| 2014/0212145 | A1 | 7/2014 | Oshima et al. | |
| 2014/0232896 | A1 | 8/2014 | Oshima et al. | |
| 2014/0232903 | A1 | 8/2014 | Oshima et al. | |
| 2014/0286644 | A1 | 9/2014 | Oshima et al. | |
| 2014/0290138 | A1 | 10/2014 | Oshima et al. | |
| 2014/0294397 | A1 | 10/2014 | Oshima et al. | |
| 2014/0294398 | A1 | 10/2014 | Oshima et al. | |
| 2014/0307155 | A1 | 10/2014 | Oshima et al. | |
| 2014/0307156 | A1 | 10/2014 | Oshima et al. | |
| 2014/0307157 | A1 | 10/2014 | Oshima et al. | |

FOREIGN PATENT DOCUMENTS

| | | |
|---|---|---|
| JP | 2002-144984 | 5/2002 |
| JP | 2002-290335 | 10/2002 |
| JP | 2003-179556 | 6/2003 |
| JP | 2003-281482 | 10/2003 |
| JP | 2004-072365 | 3/2004 |
| JP | 2004-306902 | 11/2004 |
| JP | 2005-160119 | 6/2005 |
| JP | 2006-020294 | 1/2006 |
| JP | 2006-092486 | 4/2006 |
| JP | 2006-121466 | 5/2006 |
| JP | 2006-227204 | 8/2006 |
| JP | 2006-319545 | 11/2006 |
| JP | 2006-340138 | 12/2006 |
| JP | 2007-019936 | 1/2007 |
| JP | 2007-036833 | 2/2007 |
| JP | 2007-043706 | 2/2007 |
| JP | 2007-049584 | 2/2007 |
| JP | 2007-060093 | 3/2007 |
| JP | 2007-082098 | 3/2007 |
| JP | 2007-096548 | 4/2007 |
| JP | 2007-124404 | 5/2007 |
| JP | 2007-189341 | 7/2007 |
| JP | 2007-201681 | 8/2007 |
| JP | 2007-221570 | 8/2007 |
| JP | 2007-228512 | 9/2007 |
| JP | 2007-248861 | 9/2007 |
| JP | 2007-295442 | 11/2007 |
| JP | 2007-312383 | 11/2007 |
| JP | 2008-015402 | 1/2008 |

(56) References Cited

FOREIGN PATENT DOCUMENTS

| | | |
|---|---|---|
| JP | 2008-033625 | 2/2008 |
| JP | 2008-057129 | 3/2008 |
| JP | 2008-124922 | 5/2008 |
| JP | 2008-187615 | 8/2008 |
| JP | 2008-252466 | 10/2008 |
| JP | 2008-252570 | 10/2008 |
| JP | 2008-282253 | 11/2008 |
| JP | 2008-292397 | 12/2008 |
| JP | 2009-88704 | 4/2009 |
| JP | 2009-130771 | 6/2009 |
| JP | 2009-206620 | 9/2009 |
| JP | 2009-212768 | 9/2009 |
| JP | 2009-232083 | 10/2009 |
| JP | 2009-538071 | 10/2009 |
| JP | 2010-117871 | 5/2010 |
| JP | 2010-152285 | 7/2010 |
| JP | 2010-226172 | 10/2010 |
| JP | 2010-232912 | 10/2010 |
| JP | 2010-258645 | 11/2010 |
| JP | 2010-268264 | 11/2010 |
| JP | 2010-278573 | 12/2010 |
| JP | 2010-287820 | 12/2010 |
| JP | 2011-29871 | 2/2011 |
| JP | 2011-250231 | 12/2011 |
| JP | 2011-254317 | 12/2011 |
| JP | 2012-010269 | 1/2012 |
| JP | 2012-043193 | 3/2012 |
| JP | 2012-95214 | 5/2012 |
| JP | 2012-169189 | 9/2012 |
| JP | 2012-205168 | 10/2012 |
| JP | 2012-244549 | 12/2012 |
| JP | 2013-042221 | 2/2013 |
| JP | 2013-197849 | 9/2013 |
| JP | 2013-223043 | 10/2013 |
| JP | 2013-223047 | 10/2013 |
| JP | 2013-235505 | 11/2013 |
| JP | 5393917 | 1/2014 |
| JP | 5395293 | 1/2014 |
| JP | 5405695 | 2/2014 |
| WO | 94/26063 | 11/1994 |
| WO | 96/36163 | 11/1996 |
| WO | 03/036829 | 5/2003 |
| WO | 2005/001593 | 1/2005 |
| WO | 2006/013755 | 2/2006 |
| WO | 2007/004530 | 1/2007 |
| WO | 2007/032276 | 3/2007 |
| WO | 2007/135014 | 11/2007 |
| WO | 2008/133303 | 11/2008 |
| WO | 2009/113415 | 9/2009 |
| WO | 2009/144853 | 12/2009 |
| WO | 2010/071193 | 6/2010 |
| WO | 2011/034346 | 3/2011 |
| WO | 2011/086517 | 7/2011 |
| WO | 2011/155130 | 12/2011 |
| WO | 2012/026039 | 3/2012 |
| WO | 2012/120853 | 9/2012 |
| WO | 2013/171954 | 11/2013 |

OTHER PUBLICATIONS

Office Action, mailed on Jul. 3, 2014, for the corresponding U.S. Appl. No. 14/141,833.

Office Action, mailed on Apr. 14, 2014, in related U.S. Appl. No. 13/911,530.

Office Action, mailed on Apr. 16, 2014, in related U.S. Appl. No. 13/902,393.

Office Action, mailed on Aug. 4, 2014, in related U.S. Appl. No. 14/210,688.

Office Action, mailed on Feb. 4, 2014, in related U.S. Appl. No. 13/911,530.

Office Action, mailed on Jul. 2, 2014, in related U.S. Appl. No. 14/087,619.

Office Action, mailed on Jul. 2, 2014, in related U.S. Appl. No. 14/261,572.

Office Action, mailed on Jul. 29, 2014, in related U.S. Appl. No. 14/087,639.

Office Action, mailed on Aug. 5, 2014, in related U.S. Appl. No. 13/902,393.

Office Action, mailed on Aug. 5, 2014, in related U.S. Appl. No. 13/911,530.

Office Action, mailed on Aug. 8, 2014, in related U.S. Appl. No. 14/315,509.

International Search Report, mailed Feb. 10, 2014, in International Application No. PCT/JP2013/006859.

Takao Nakamura et al., "Fast Watermark Detection Scheme from Analog Image for Camera-Equipped Cellular Phone", IEICE Transactions, D-II, vol. J87-D-II, No. 12, pp. 2145-2155, Dec. 2004 (with English language translation).

Dai Yamanaka et al., "An Investigation for the Adoption of Subcarrier Modulation to Wireless Visible Light Communication using Imaging Sensor", The Institute of Electronics, Information and Communication Engineers IEICE Technical Report, Jan. 4, 2007, vol. 106, No. 450, pp. 25-30 (with English language translation).

Written Opinion of the International Searching Authority, mailed Feb. 4, 2014, in International Application No. PCT/JP2013/006894 (English language translation).

International Search Report, mailed Feb. 10, 2014, in International Application No. PCT/JP2013/006869.

International Search Report, mailed Feb. 10, 2014, in International Application No. PCT/JP2013/006870.

Written Opinion of the International Searching Authority, mailed Feb. 10, 2014, in International Application No. PCT/JP2013/006870 (English language translation).

International Search Report, mailed Mar. 11, 2014, in International Application No. PCT/JP2013/007709.

Written Opinion of the International Searching Authority, mailed Mar. 11, 2014, in International Application No. PCT/JP2013/007709 (English language translation).

International Search Report, mailed Feb. 10, 2014, in International Application No. PCT/JP2013/007708.

International Search Report, mailed Feb. 10, 2014, in International Application No. PCT/JP2013/007684.

International Search Report, mailed Mar. 11, 2014, in International Application No. PCT/JP2013/007675.

Written Opinion of the International Searching Authority, mailed Mar. 11, 2014, in International Application No. PCT/JP2013/007675 (English language translation).

International Search Report, mailed Feb. 4, 2014, in International Application No. PCT/JP2013/006894.

Written Opinion of the International Searching Authority, mailed Feb. 18, 2014, in International Application No. PCT/JP2013/006871 (English language translation).

Written Opinion of the International Searching Authority, mailed Feb. 4, 2014, in International Application No. PCT/JP2013/006858 (English language translation).

Written Opinion of the International Searching Authority, mailed Feb. 10, 2014, in International Application No. PCT/JP2013/006860 (English language translation).

Written Opinion of the International Searching Authority, mailed Feb. 4, 2014, in International Application No. PCT/JP2013/006861 (English language translation).

Written Opinion of the International Searching Authority, mailed Feb. 10, 2014, in International Application No. PCT/JP2013/006869 (English language translation).

International Search Report, mailed Feb. 4, 2014, in International Application No. PCT/JP2013/006857.

Written Opinion of the International Search Authority, mailed Feb. 4, 2014, in International Application No. PCT/JP2013/006857 (English language translation).

Office Action, mailed Aug. 25, 2014, in related U.S. Appl. No. 13/902,215.

Office Action, mailed Sep. 18, 2014, in related U.S. Appl. No. 14/142,372.

Office Action, mailed Oct. 1, 2014, in related U.S. Appl. No. 14/302,913.

Office Action, mailed Oct. 14, 2014, in related U.S. Appl. No. 14/087,707.

(56) References Cited

OTHER PUBLICATIONS

Gao et al., "Understanding 2D-BarCode Technology and Applications in M-Commerce-Design and Implementation of a 2D Barcode Processing Solution", IEEE Computer Society 31st Annual International Computer Software and Applications Conference (COMPSAC 2007), Aug. 2007.
U.S. Appl. No. 14/315,509, filed Jun. 26, 2014.
U.S. Appl. No. 14/315,867, filed Jun. 26, 2014.
U.S. Appl. No. 14/315,792, filed Jun. 26, 2014.
U.S. Appl. No. 14/315,732, filed Jun. 26, 2014.
U.S. Appl. No. 14/302,966, filed Jun. 12, 2014.
U.S. Appl. No. 14/302,913, filed Jun. 12, 2014.
U.S. Appl. No. 14/142,413, filed Dec. 27, 2013.
U.S. Appl. No. 14/142,372, filed Dec. 27, 2013.
International Search Report, mailed Feb. 4, 2014, in International Application No. PCT/JP2013/006858.
International Search Report, mailed Feb. 4, 2014, in International Application No. PCT/JP2013/006863.
International Search Report, mailed Feb. 10, 2014, in International Application No. PCT/JP2013/006860.
International Search Report, mailed Feb. 18, 2014, in International Application No. PCT/JP2013/006871.
International Search Report, mailed Feb. 25, 2014, in International Application No. PCT/JP2013/006895.
Written Opinion of the International Search Authority, mailed Feb. 25, 2014, in International Application No. PCT/JP2013/006895 (English Language Translation).
Office Action, mailed Jan. 29, 2014, in corresponding U.S. Appl. No. 13/902,393.
Office Action, mailed on Jun. 20, 2014, for the corresponding U.S. Appl. No. 14/087,635.
Written Opinion of the International Searching Authority, mailed Jun. 18, 2013, for International Application No. PCT/JP2013/003319 (including English language translation).
Office Action, mailed Nov. 8, 2013, in corresponding U.S. Appl. No. 13/902,436.
International Search Report, mailed Jun. 18, 2013, for International Application No. PCT/JP2013/003318.
International Search Report, mailed Feb. 4, 2014, for International Application No. PCT/JP2013/006861.
International Search Report, mailed Jun. 18, 2013, for International Application No. PCT/JP2013/003319.

* cited by examiner

When $t_{HT}$ = 20 microseconds

| Transmission signal | Modulated signal |
|---|---|
| 0 | 01 |
| 1 | 10 |

| Transmission signal | Modulated signal |
|---|---|
| 00 (0) | 0111 |
| 01 (1) | 1011 |
| 10 (2) | 1101 |
| 11 (3) | 1110 |

| Transmission signal | Modulated signal |
|---|---|
| 000 (0) | 01111111 |
| 001 (1) | 10111111 |
| 010 (2) | 11011111 |
| 011 (3) | 11101111 |
| 100 (4) | 11110111 |
| 101 (5) | 11111011 |
| 110 (6) | 11111101 |
| 111 (7) | 11111110 |

| Transmission signal | Modulated signal |
|---|---|
| 00 (0) | 1000 |
| 01 (1) | 0100 |
| 10 (2) | 0010 |
| 11 (3) | 0001 |

| Transmission information | Priority |
|---|---|
| Information 1 | 3 (High) |
| Information 2 | 2 (Normal) |
| Information 3 | 1 (Low) |

Example of reception device

Example of transmission device

In the case of 1bit per symbol

| | NFC | Initial setting | Color |
|---|---|---|---|
| State 1 | Not written | Not written | Red |
| State 2 | Written | Written | Blue |

| Recording date and time | Coordinates (x, y, z) | Dirt level | Cleaning level |
|---|---|---|---|
| 2012/5/21T 13:00:01.000 | 1,0,0 | Dust 8, Hair 4 | Dust 2, Hair 3 |
| 2012/5/21T 13:00:02.000 | 1,3,0 | Dust 7, Hair 6 Tick 2 | Dust 3, Hair 6 |
| • • • | | | |

(Processing a) Analyze user voice characteristics

Prepare sound recognition processing (Processing b) Collect sound by sound collecting device in vicinity Select what to cook, and set detailed operation in microwave (Processing g) Collect sound by sound collecting device in vicinity and recognize notification sound of microwave (Processing j) Track user position

FIG. 162

Database

Microwave table 4040a

| Model ID of microwave | Data for identifying sound which can be output by microwave (speaker characteristics and modulation method, for instance) | Notification sound data for mobile phone model A (sound easily recognized by A) | Notification sound data for mobile phone model B (sound easily recognized by B) | ... | Notification sound data for typical mobile phone (sound easily recognized on average) |
|---|---|---|---|---|---|
| | | | | | |
| | | | | | |

Mobile phone table 4040a

| Mobile phone ID | Mobile phone model ID | User ID | Mobile phone position data |
|---|---|---|---|
| | | | |
| | | | |

Mobile phone model table 4040c

| Mobile phone model ID | Sound-collecting characteristics |
|---|---|
| | |
| | |

User voice characteristic table 4040d

| User ID | User voice acoustic feature |
|---|---|
| | |
| | |

User keyword voice table 4040e

| User ID | Voice waveform data obtained when user says keyword |
|---|---|
| | |
| | |

User owned device position table 4040f

| User ID | Owned device ID | Owned device position data |
|---|---|---|
| | | |
| | | |

User owned device sound data table 4040g

| User ID | Owned device ID | Sound data output by owned device |
|---|---|---|
| | | |
| | | |

User position table 4040h

| User ID | User position data |
|---|---|
| | |
| | |

FIG. 240
| | |
|---|---|
| (a) 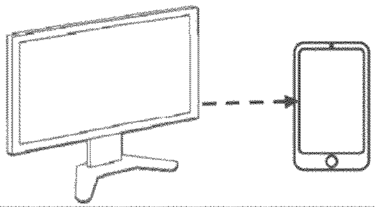 | Directly transmit and receive necessary information |
| (b) 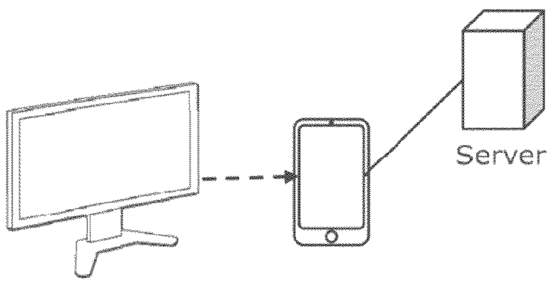  | Transmit and receive displayed channel, and inquire of server for necessary information |
| (c) 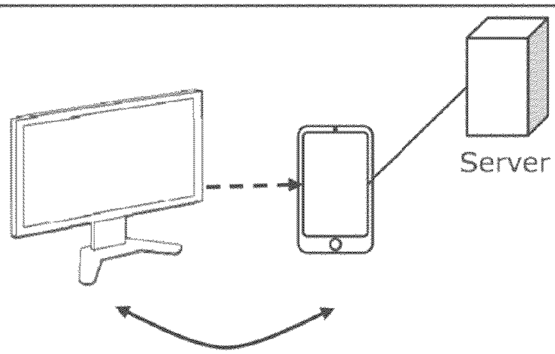  | Transmit and receive ID of TV or information necessary for wireless connection, inquire of TV or recorder for displayed channel, and obtain necessary information from server |

Example of metameric spectral distribution combination

| Transmission signal | Modulated signal |
|---|---|
| 00 (0) | 01111 |
| 01 (1) | 10111 |
| 10 (2) | 11011 |
| 11 (3) | 11101 |
| Header | 11110 |

| Transmission signal | Modulation frequency |
|---|---|
| 00 (0) | 500Hz |
| 01 (1) | 1000Hz |
| 10 (2) | 2000Hz |
| 11 (3) | 5000Hz |

FIG. 325
7309a
7309b
7309c
7309d
Time
Time
Time
Brightness
Brightness
Brightness

Notify by sound upon discovery of transmitter and upon signal reception

Change sound type, reproduction time, and number of reproductions according to number of transmitters or type of received or display information In the case where signal control is only partially possible and receivable range needs to be widened, edge part is controlled Provide uniform light emitting portion in part of sign to facilitate reception Arrange uniform light emitting portion so that uniform light emitting portion is present in large size in whichever direction image is captured

| Signal | Rise position | Brightness 75 % | Brightness 50 % | Brightness 25 % |
|---|---|---|---|---|
| 00 | Slots 1 → 2 | | | |
| 01 | Slots 2 → 3 | | | |
| 10 | Slots 3 → 4 | | | |
| 11 | None | | | |

FIG. 405
| Signal | Rise position | Brightness | | |
| --- | --- | --- | --- | --- |
| | | 75 % (Basic) | 99 % | 1 % |
| 00 | Position of 25% | 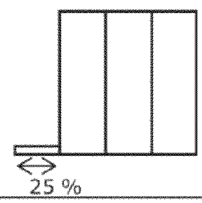  | 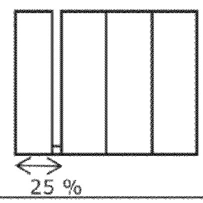  | 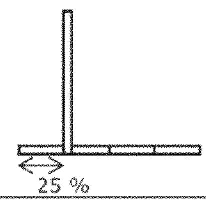  |
| 01 | Position of 50% | 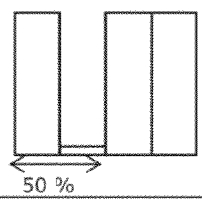  | 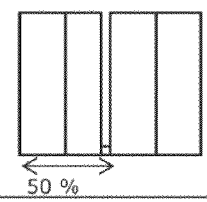  | 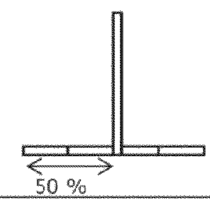  |
| 10 | Position of 75% | 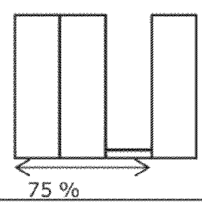  | 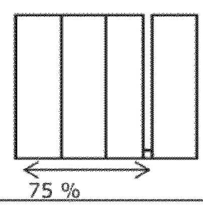  | 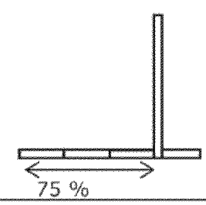  |
| 11 | None | 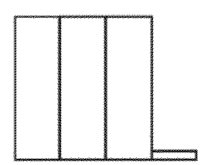 | 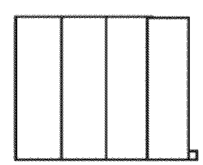 | 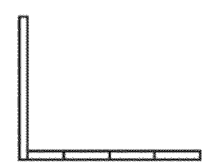 |

FIG. 406
| Signal | Rise position | Brightness | | |
|---|---|---|---|---|
| | | 75 % | 99 % | 1 % |
| 00 | Position of 25% | 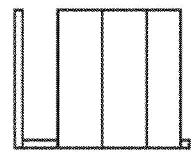 | 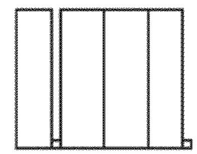 | 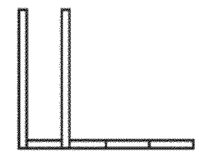 |
| 01 | Position of 50% | 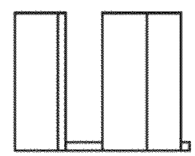 | 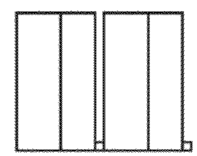 | 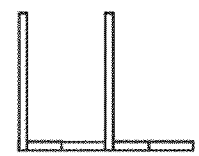 |
| 10 | Position of 75% | 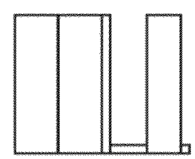 | 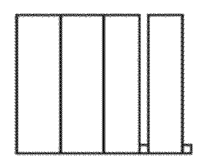 | 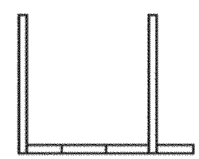 |
| 11 | None | 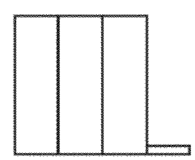 | 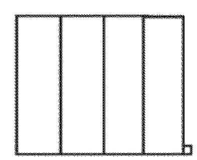 | 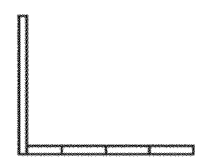 |

FIG. 434

| | | | |
|---|---|---|---|
| Membership number | Store ID | Time | Position information |
| User preference information | | User biological information | |
| User search history | | User behavior history | |

FIG. 437

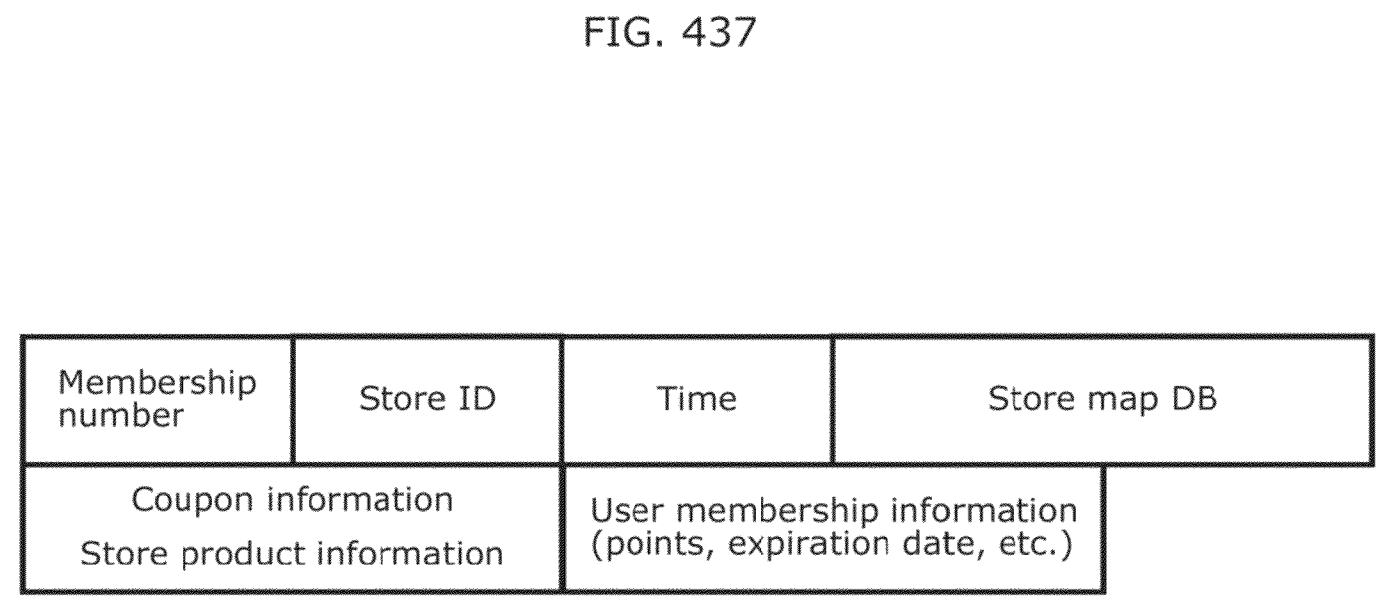

| Membership number | Store ID | Time | Store map DB |
|---|---|---|---|
| Coupon information<br>Store product information | | User membership information (points, expiration date, etc.) | |

INFORMATION COMMUNICATION METHOD

CROSS-REFERENCE RELATED TO APPLICATIONS

This is a continuation application of U.S. application Ser. No. 14/087,630 filed Nov. 22, 2013, which claims the benefit of U.S. Provisional Patent Application No. 61/746,315 filed on Dec. 27, 2012, Japanese Patent Application No. 2012-286339 filed on Dec. 27, 2012, U.S. Provisional Patent Application No. 61/805,978 filed on Mar. 28, 2013, Japanese Patent Application No. 2013-070740 filed on Mar. 28, 2013, U.S. Provisional Patent Application No. 61/810,291 filed on Apr. 10, 2013, and Japanese Patent Application No. 2013-082546 filed on Apr. 10, 2013, is a continuation-in-part of U.S. Non-Provisional patent application Ser. No. 13/902,215 filed on May 24, 2013, is a continuation-in-part of U.S. Non-Provisional patent application Ser. No. 13/902,436 filed on May 24, 2013, and claims the benefit of International Patent Application No. PCT/JP2013/003318 filed on May 24, 2013, International Patent Application No. PCT/JP2013/003319 filed on May 24, 2013, U.S. Provisional Patent Application No. 61/859,902 filed on Jul. 30, 2013, Japanese Patent Application No. 2013-158359 filed on Jul. 30, 2013, U.S. Provisional Patent Application No. 61/872,028 filed on Aug. 30, 2013, Japanese Patent Application No. 2013-180729 filed on Aug. 30, 2013, U.S. Provisional Patent Application No. 61/887,541 filed on Oct. 7, 2013, and Japanese Patent Application No. 2013-210623 filed on Oct. 7, 2013. The entire disclosures of the above-identified applications, including the specifications, drawings and claims are incorporated herein by reference in their entirety.

FIELD

The present disclosure relates to a method of communication between a mobile terminal such as a smartphone, a tablet terminal, or a mobile phone and a home electric appliance such as an air conditioner, a lighting device, or a rice cooker.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by Internet protocol (IP) connection using Ethernet® or wireless local area network (LAN). However, there are home electric appliances whose computational performance is insufficient to have a communication function, and home electric appliances which do not have a communication function due to a matter of cost.

In order to solve such a problem, Patent Literature (PTL) 1 discloses a technique of efficiently establishing communication between devices among limited optical spatial transmission devices which transmit information to free space using light, by performing communication using plural single color light sources of illumination light.

CITATION LIST

Patent Literature

[PTL 1] Japanese Unexamined Patent Application Publication No. 2002-290335

SUMMARY

Technical Problem

However, the conventional method is limited to a case in which a device to which the method is applied has three color light sources such as an illuminator. The present disclosure solves this problem, and provides an information communication method that enables communication between various devices including a device with low computational performance.

Solution to Problem

An information communication method according to an aspect of the present disclosure is an information communication method of obtaining information from a subject, the information communication method including: transmitting position information indicating a position of an image sensor used to capture the subject; receiving an ID list that is associated with the position indicated by the position information and includes a plurality of sets of identification information; setting an exposure time of the image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining the information by demodulating data specified by a pattern of the bright line included in the obtained bright line image; and searching the ID list for identification information that includes the obtained information.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

An information communication method disclosed herein enables communication between various devices including a device with low computational performance.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 is a diagram illustrating an example of a signal modulation scheme in Embodiment 1.

FIG. 8 is a diagram illustrating an example of a signal modulation scheme in Embodiment 1.

FIG. 9 is a diagram illustrating an example of a signal modulation scheme in Embodiment 1.

FIG. 10 is a diagram illustrating an example of a signal modulation scheme in Embodiment 1.

FIG. 109C is a diagram illustrating an example of operation in Embodiment 4.

FIG. 110 is a diagram illustrating an example of operation in Embodiment 4.

FIG. 111 is a diagram illustrating an example of operation in Embodiment 4.

FIG. 112 is a diagram illustrating an example of operation in Embodiment 4.

FIG. 113 is a diagram illustrating an example of operation in Embodiment 4.

FIG. 114 is a diagram illustrating an example of operation in Embodiment 4.

FIG. 115 is a diagram illustrating an example of operation in Embodiment 4.

FIG. 116 is a diagram illustrating an example of operation in Embodiment 4.

FIG. 117 is a diagram illustrating an example of operation in Embodiment 4.

FIG. 118 is a timing diagram of a transmission signal in an information communication device in Embodiment 5.

FIG. 119 is a diagram illustrating relations between a transmission signal and a reception signal in Embodiment 5.

FIG. 120 is a diagram illustrating relations between a transmission signal and a reception signal in Embodiment 5.

Figure 121:
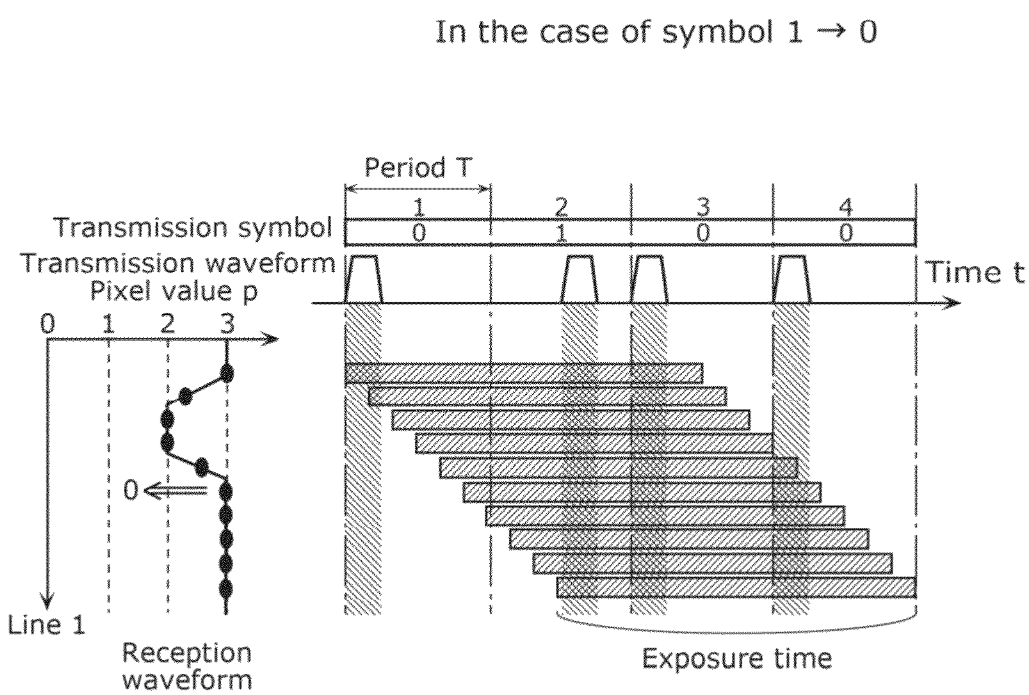

FIG. 121 is a diagram illustrating relations between a transmission signal and a reception signal in Embodiment 5.

Figure 122:
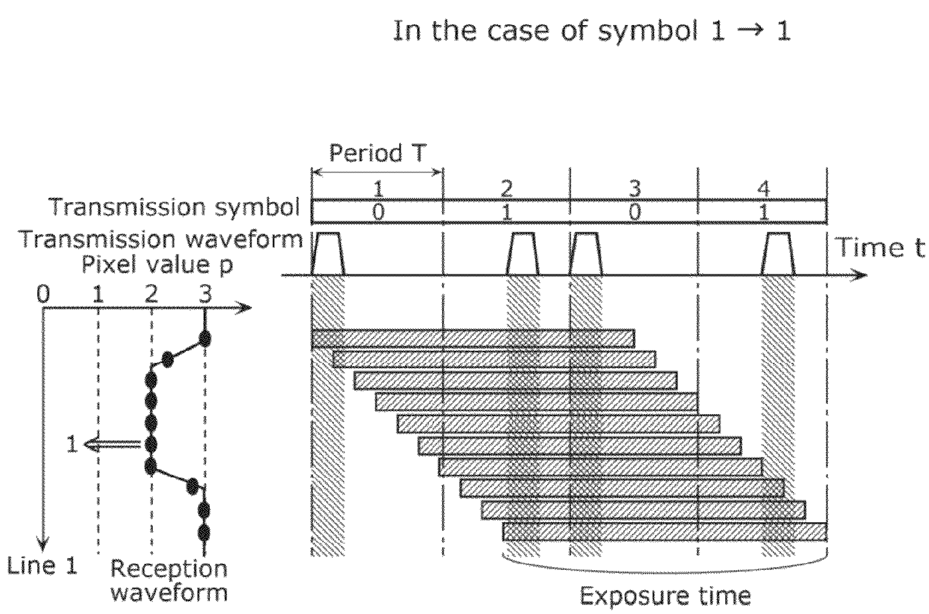

FIG. 122 is a diagram illustrating relations between a transmission signal and a reception signal in Embodiment 5.

Figure 123:
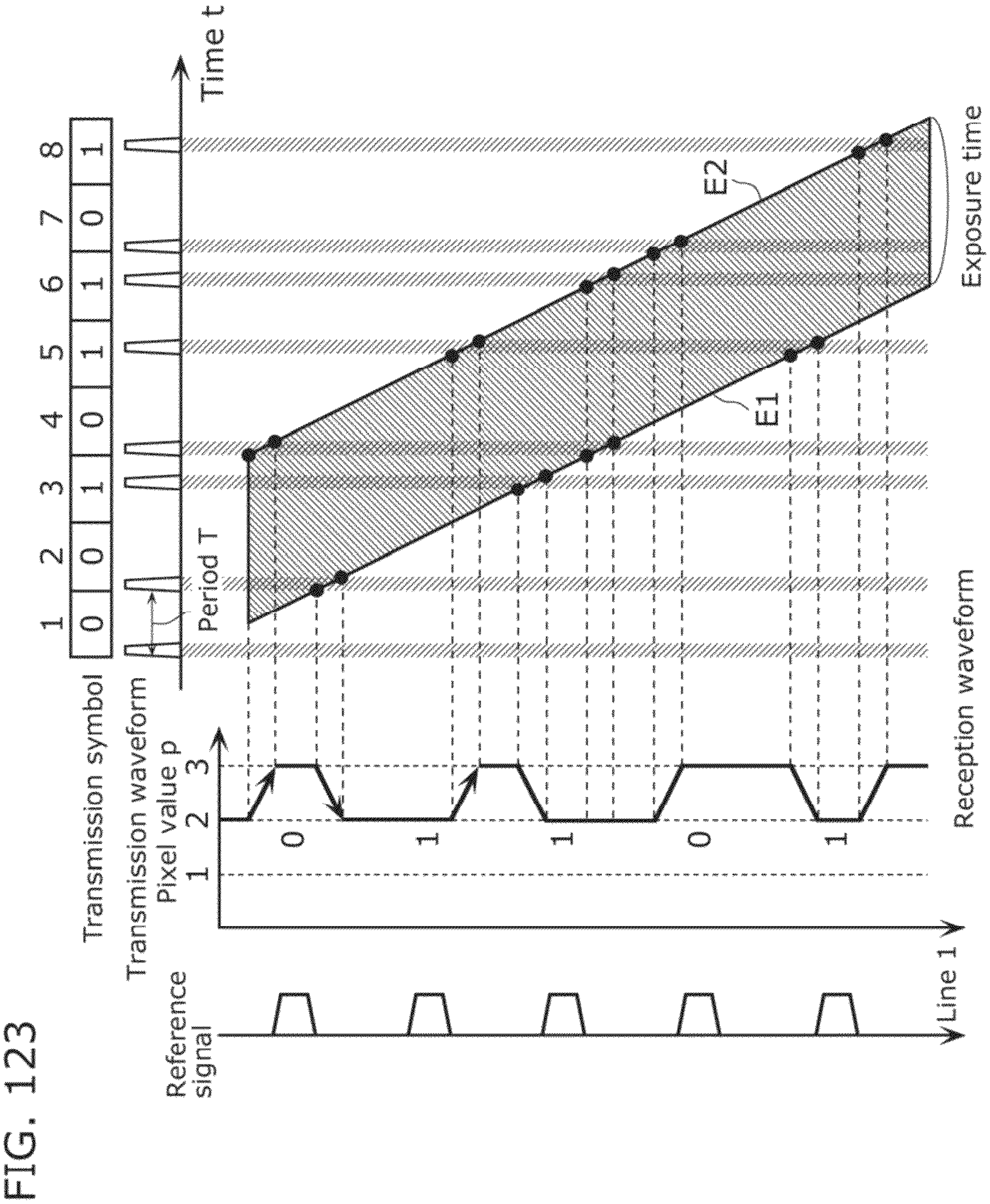

FIG. 123 is a diagram illustrating relations between a transmission signal and a reception signal in Embodiment 5.

Figure 124:
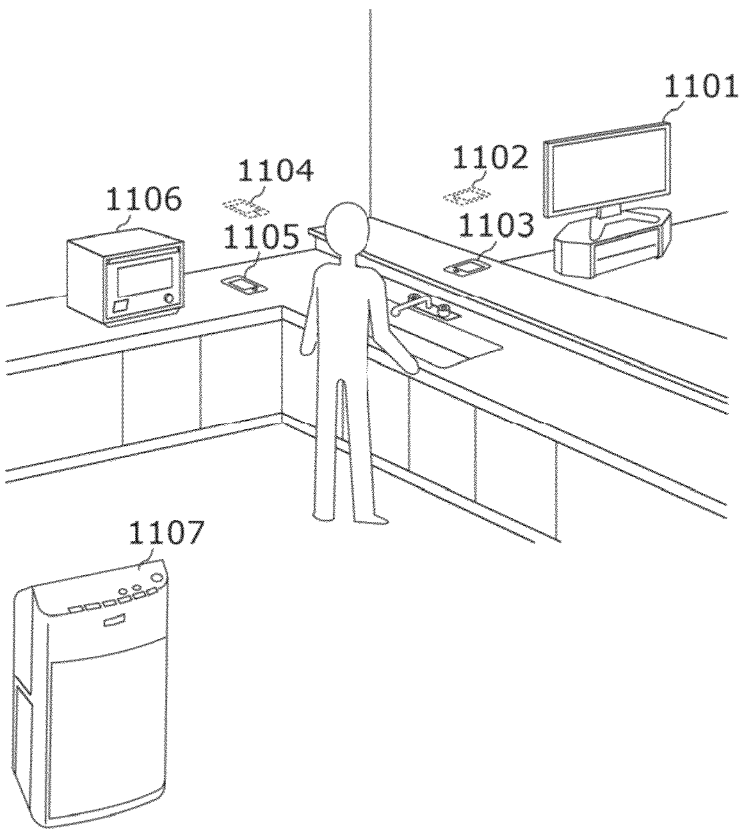

FIG. 124 is a diagram illustrating an example of an environment in a house in Embodiment 6.

Figure 125:
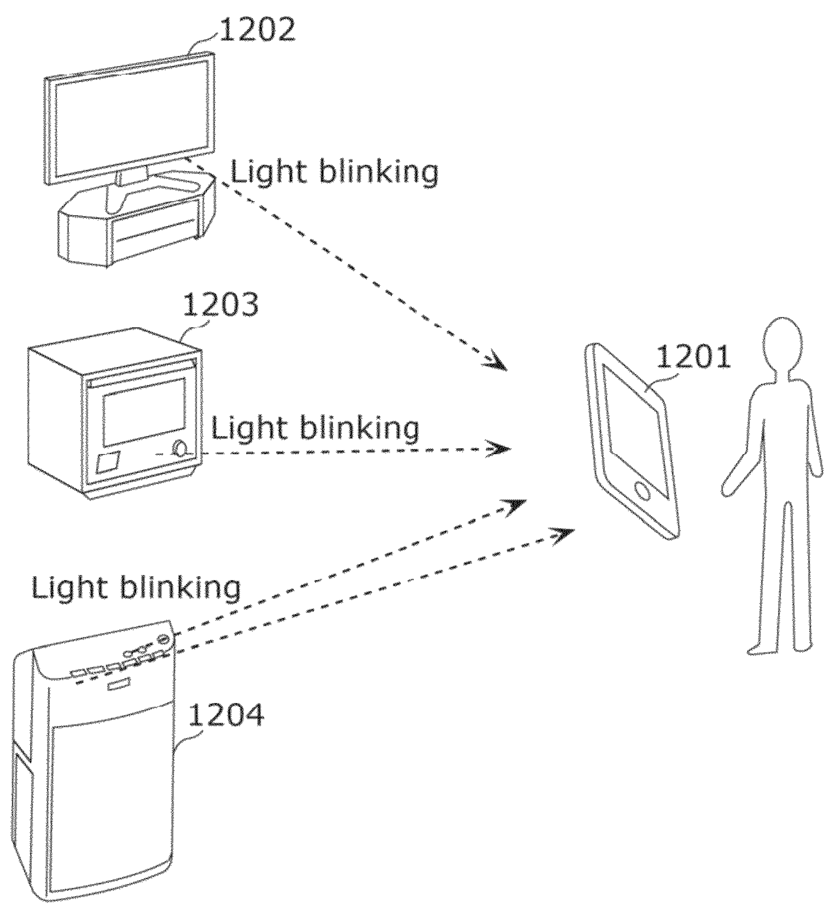

FIG. 125 is a diagram illustrating an example of communication between a smartphone and home electric appliances according to Embodiment 6.

Figure 126:
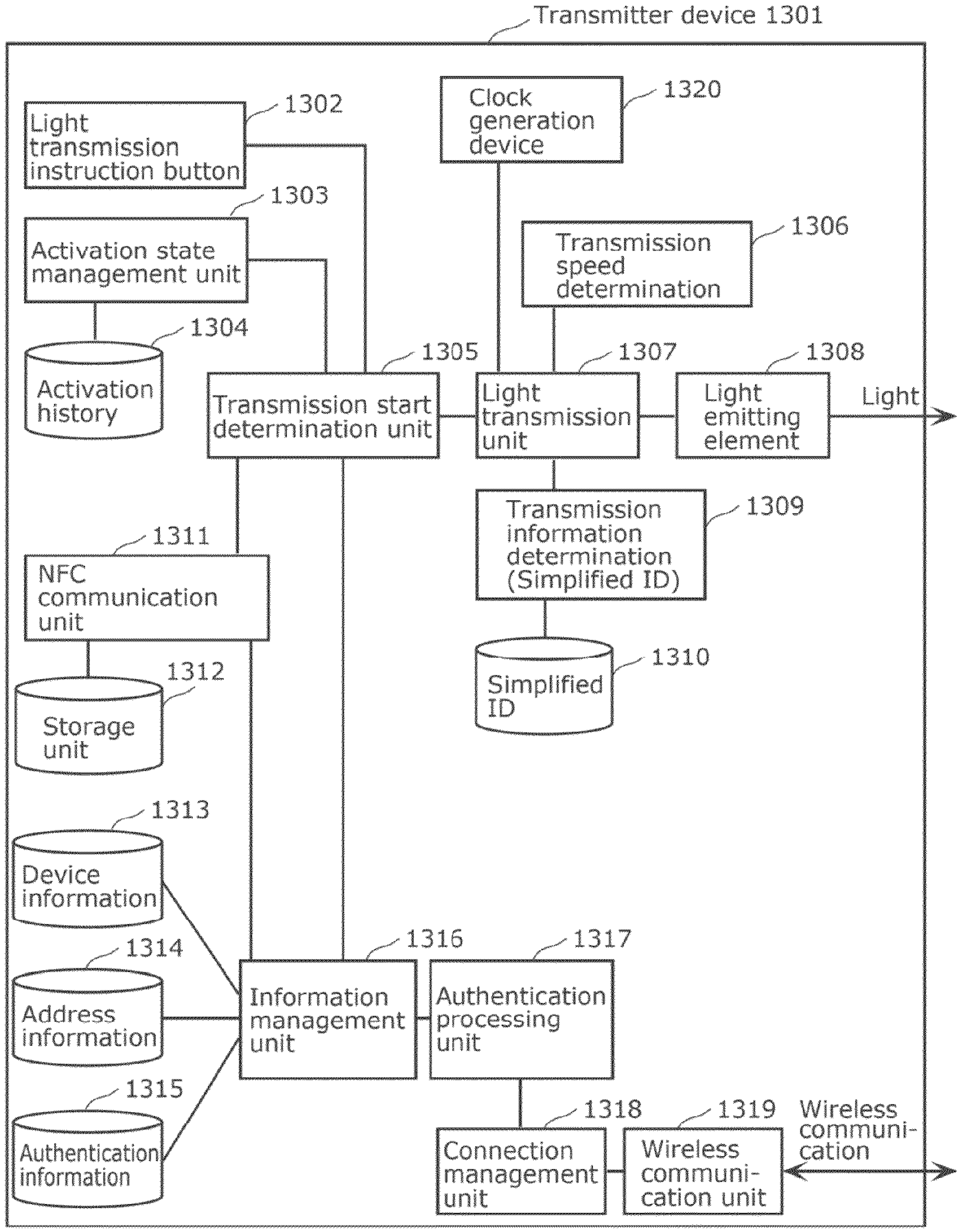

FIG. 126 is a diagram illustrating an example of a configuration of a transmitter device according to Embodiment 6.

Figure 127:
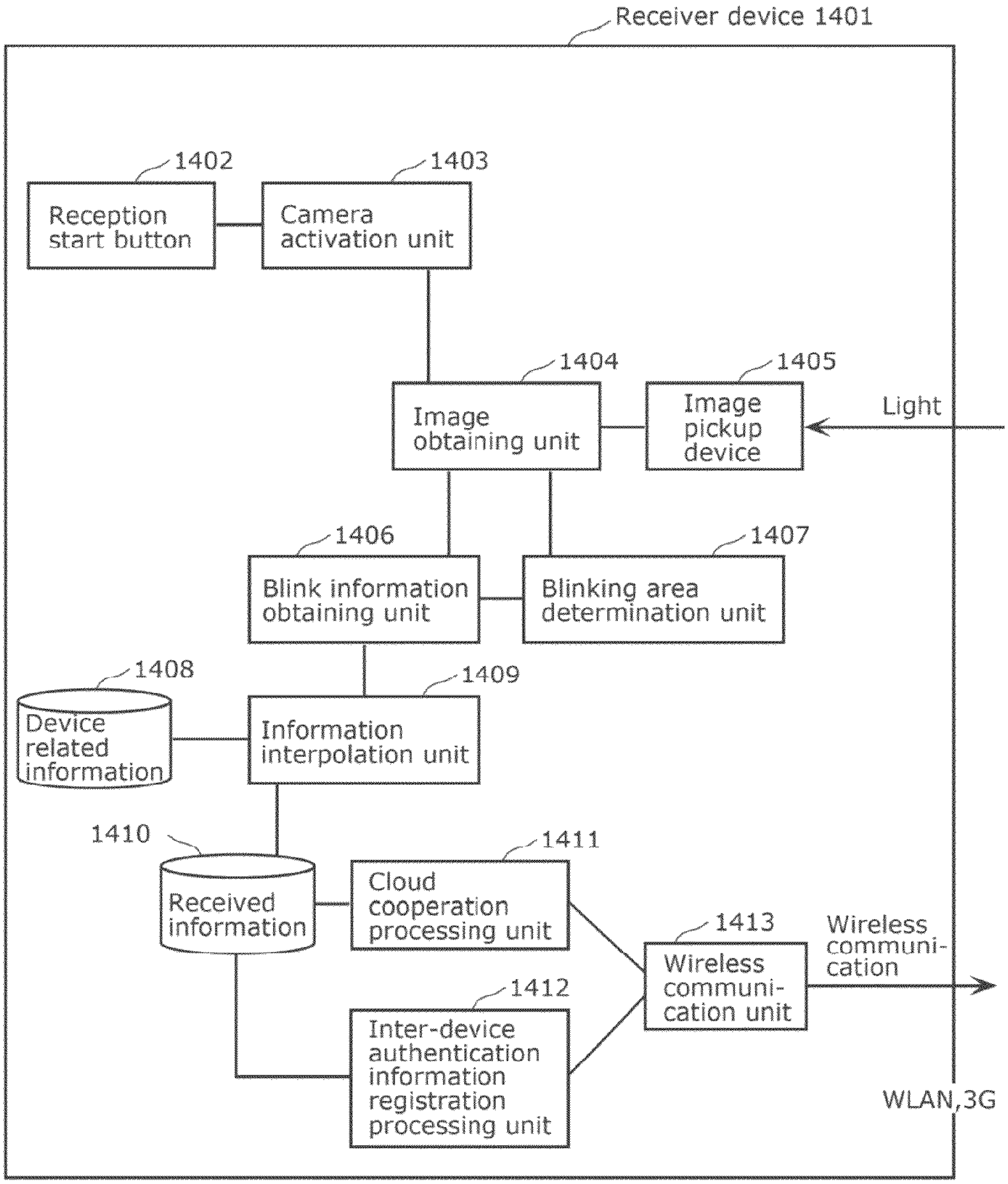

FIG. 127 is a diagram illustrating an example of a configuration of a receiver device according to Embodiment 6.

Figure 128:
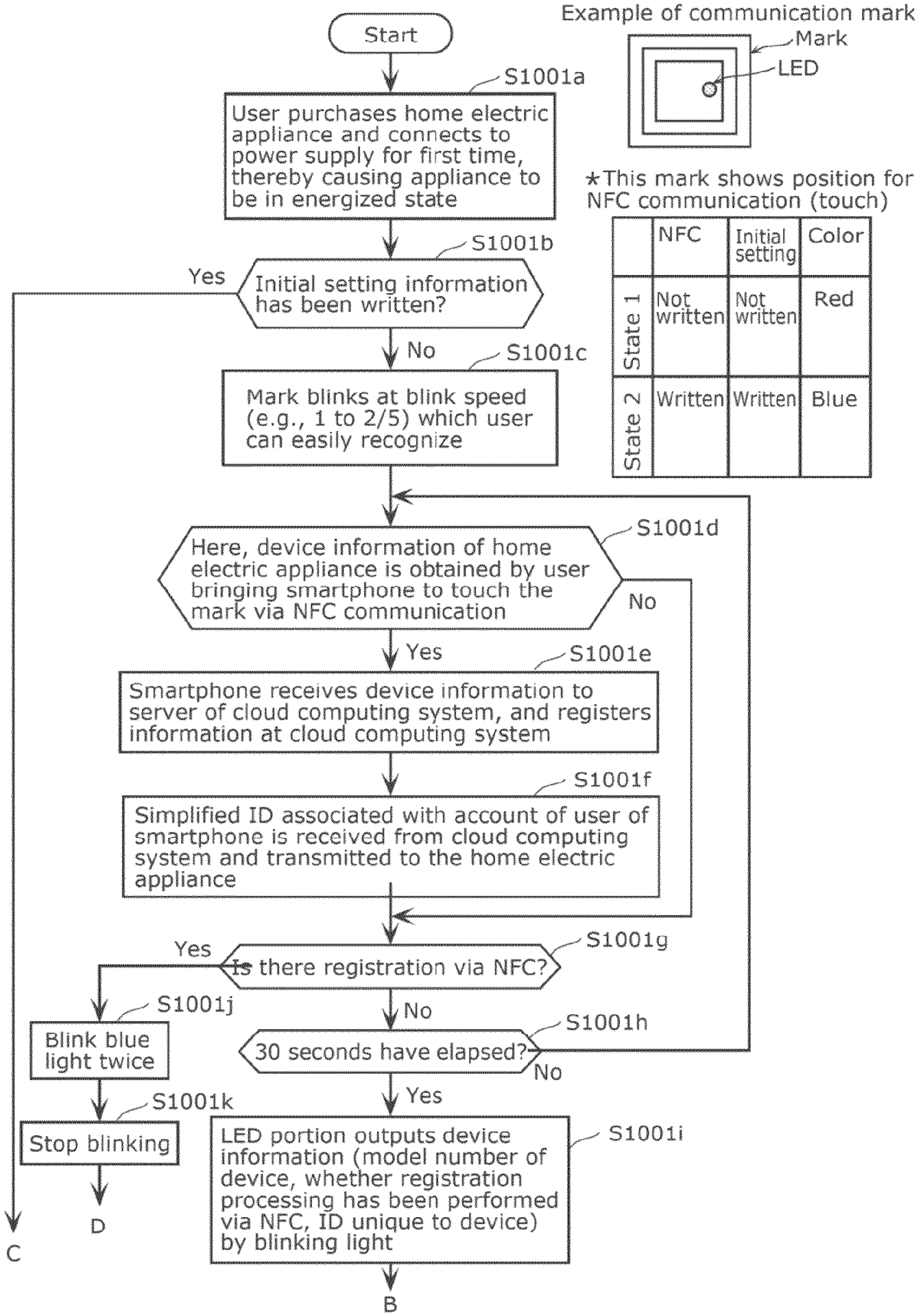

FIG. 128 is a diagram illustrating a flow of processing of transmitting information to the receiver device by blinking an LED of the transmitter device according to Embodiment 6.

Figure 129:
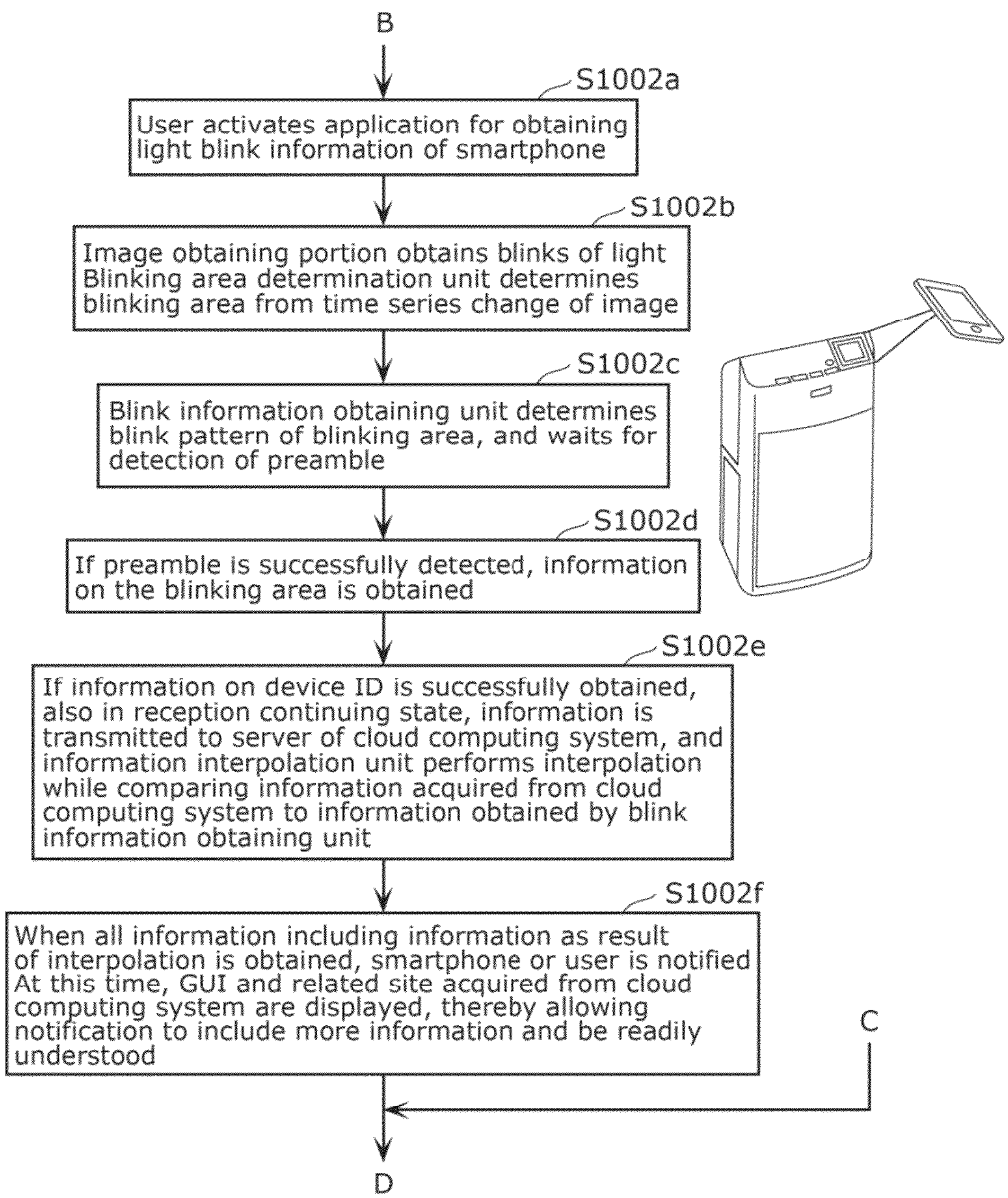

FIG. 129 is a diagram illustrating a flow of processing of transmitting information to the receiver device by blinking an LED of the transmitter device according to Embodiment 6.

Figure 130:
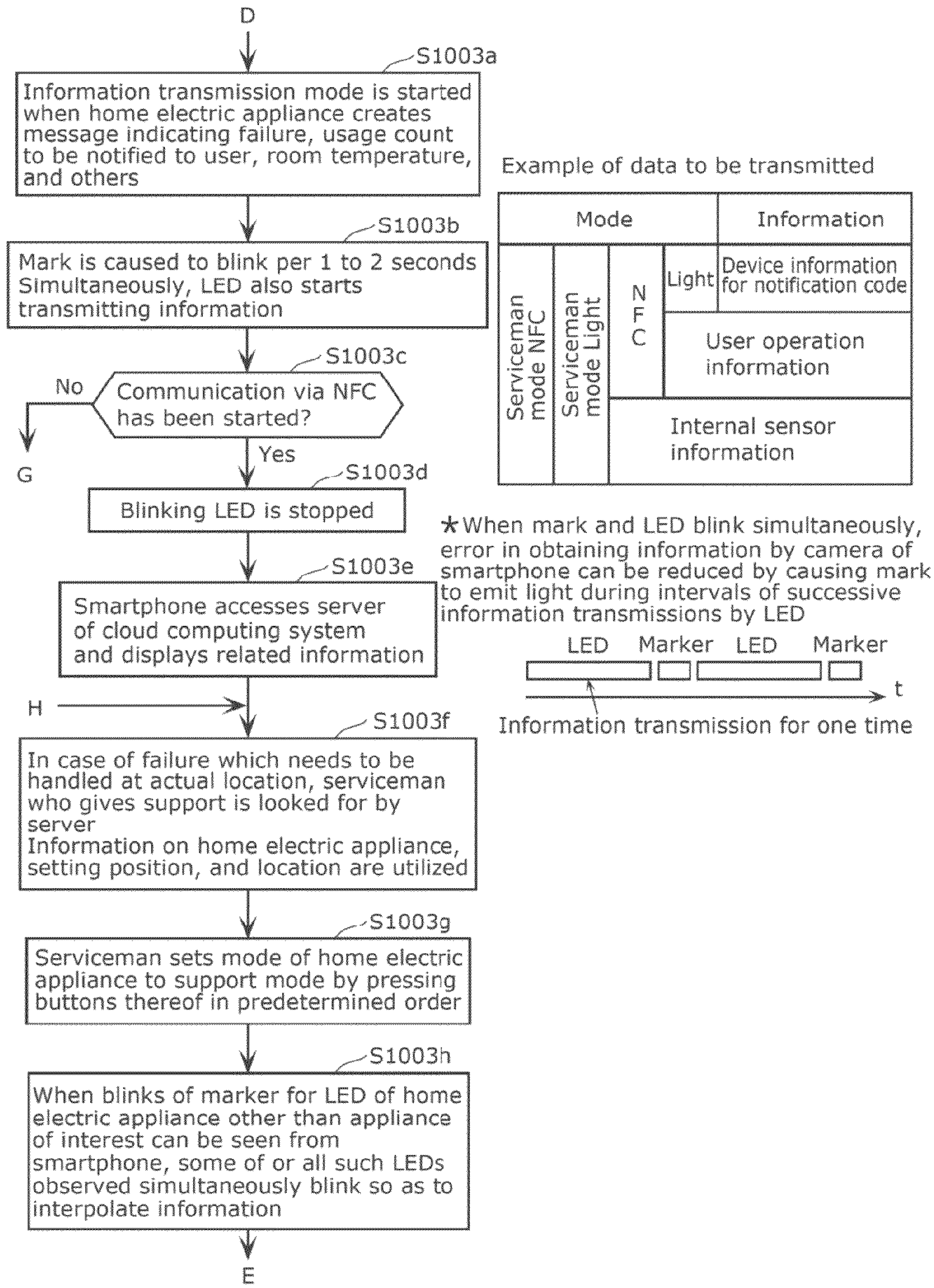

FIG. 130 is a diagram illustrating a flow of processing of transmitting information to the receiver device by blinking an LED of the transmitter device according to Embodiment 6.

Figure 131:
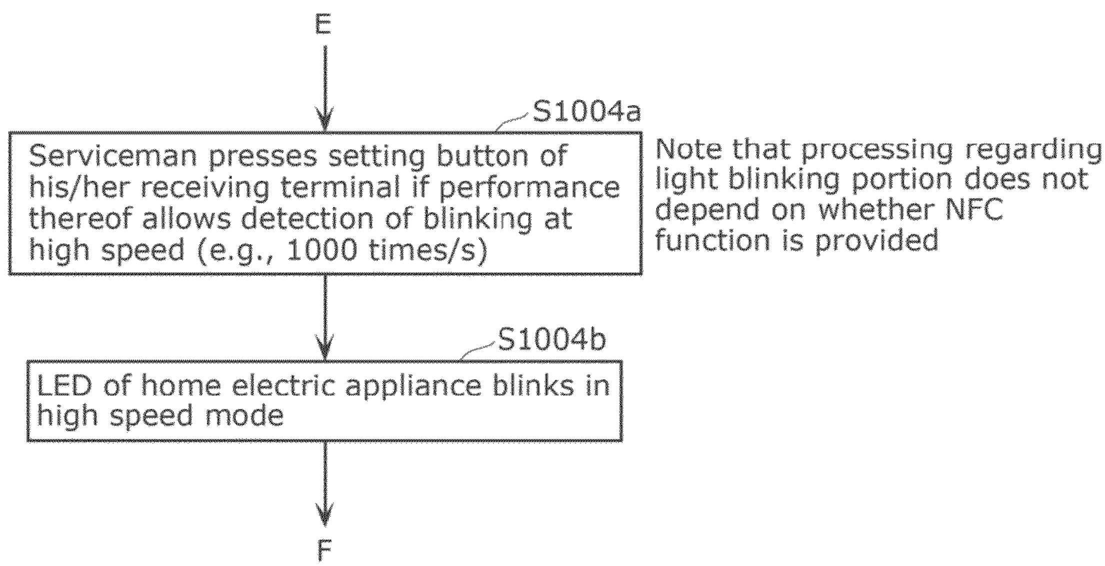

FIG. 131 is a diagram illustrating a flow of processing of transmitting information to the receiver device by blinking an LED of the transmitter device according to Embodiment 6.

Figure 132:
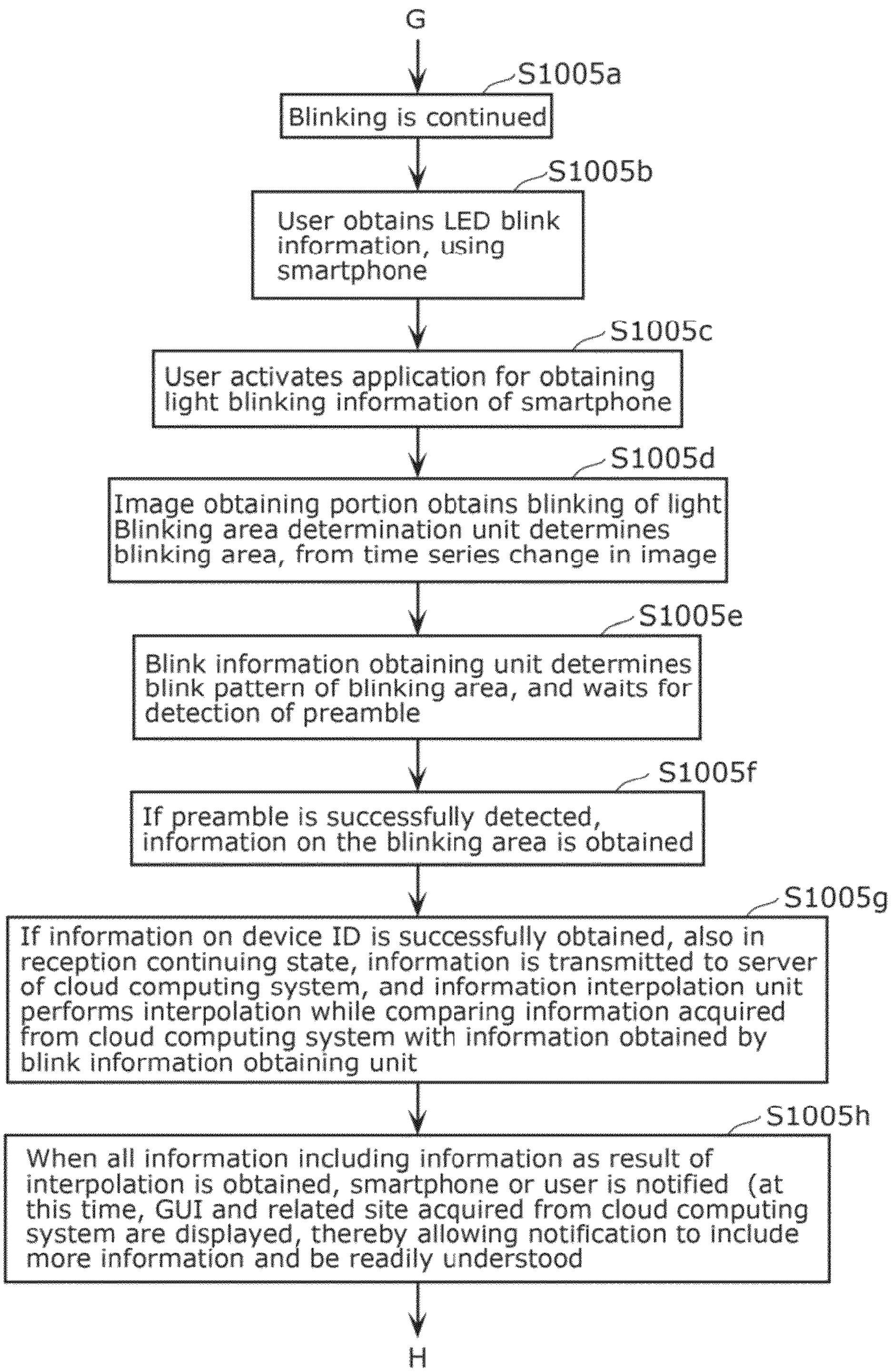

FIG. 132 is a diagram illustrating a flow of processing of transmitting information to the receiver device by blinking an LED of the transmitter device according to Embodiment 6.

Figure 133:
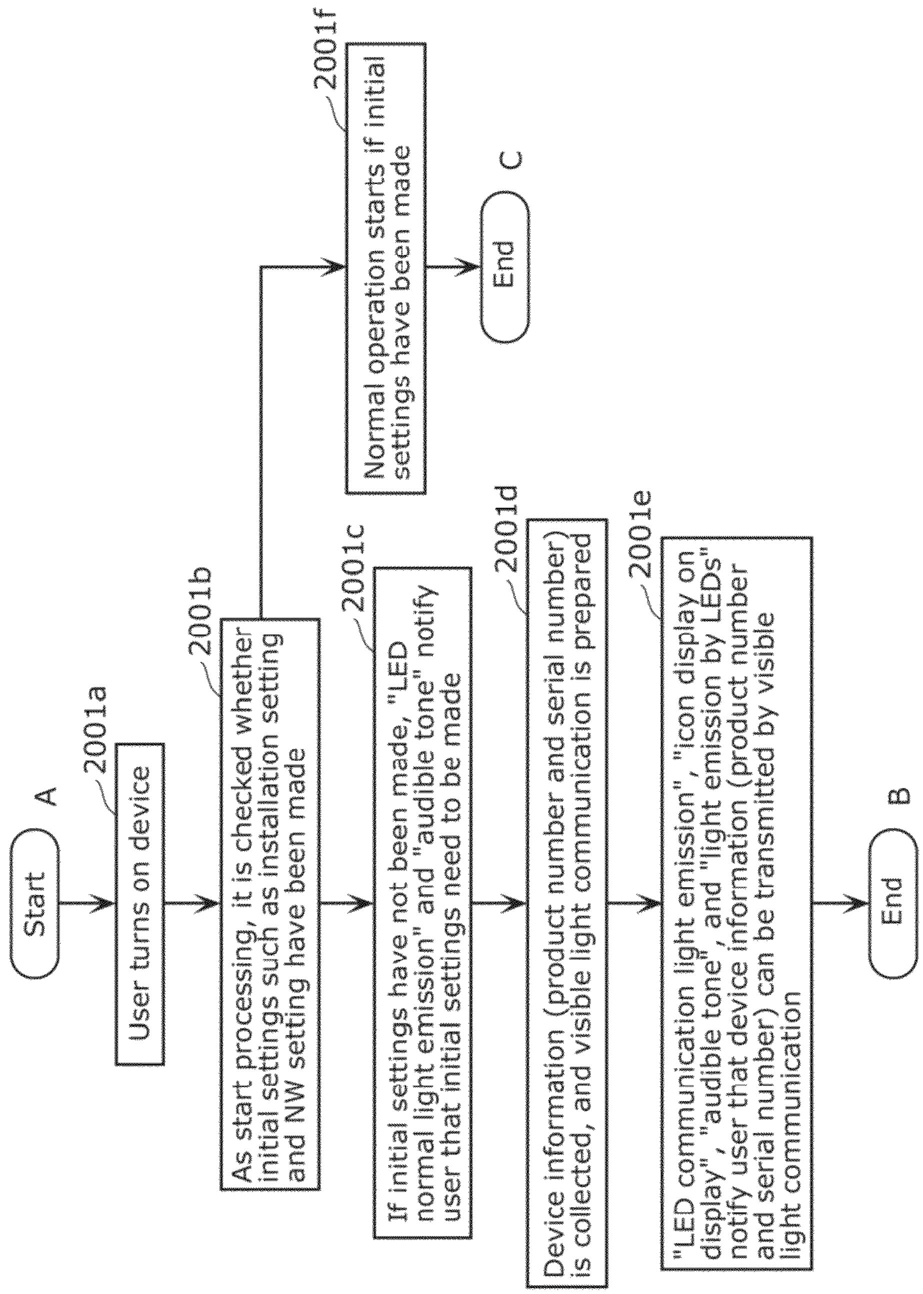

FIG. 133 is a diagram for describing a procedure of performing communication between a user and a device using visible light according to Embodiment 7.

Figure 134:
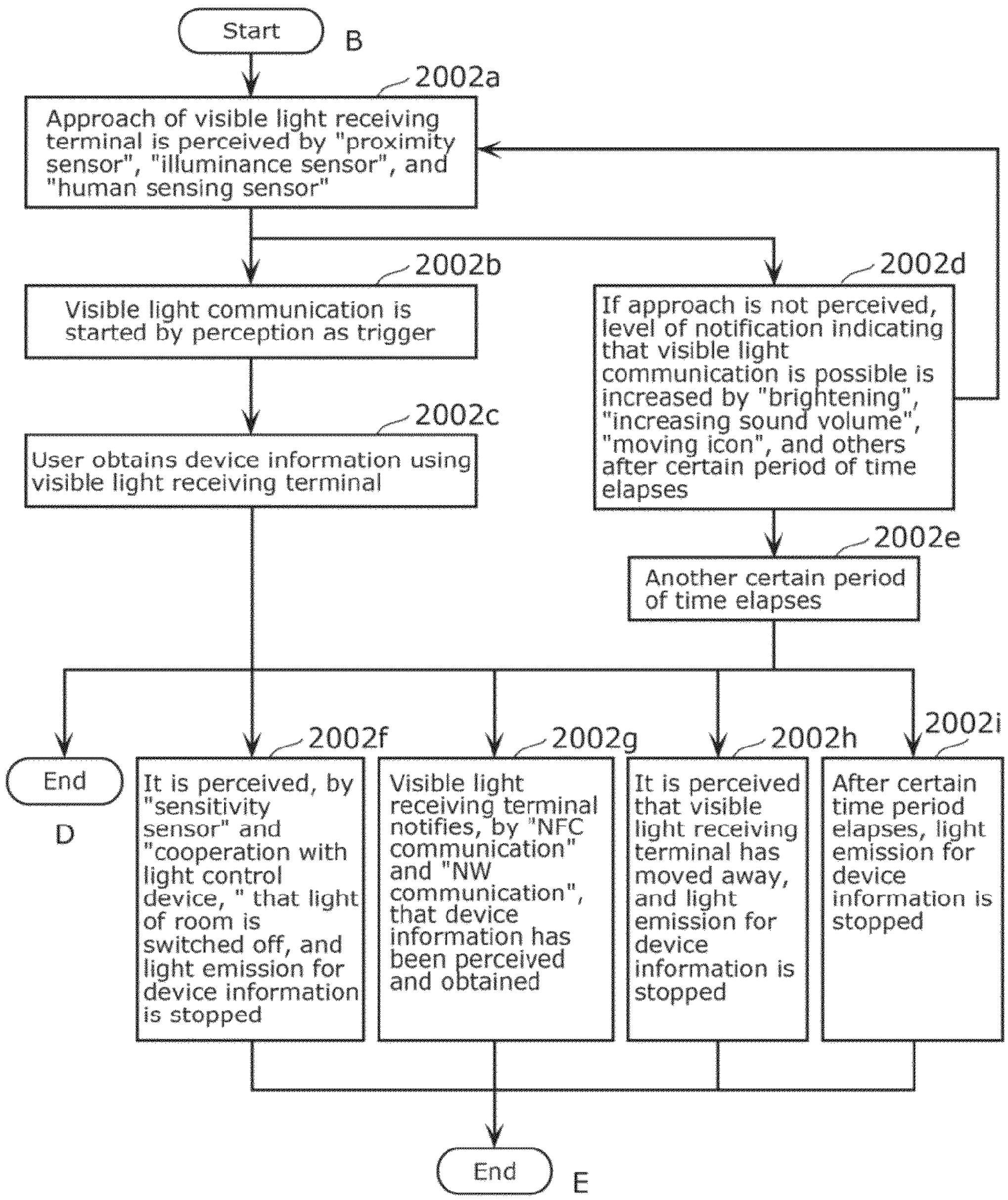

FIG. 134 is a diagram for describing a procedure of performing communication between the user and the device using visible light according to Embodiment 7.

Figure 135:
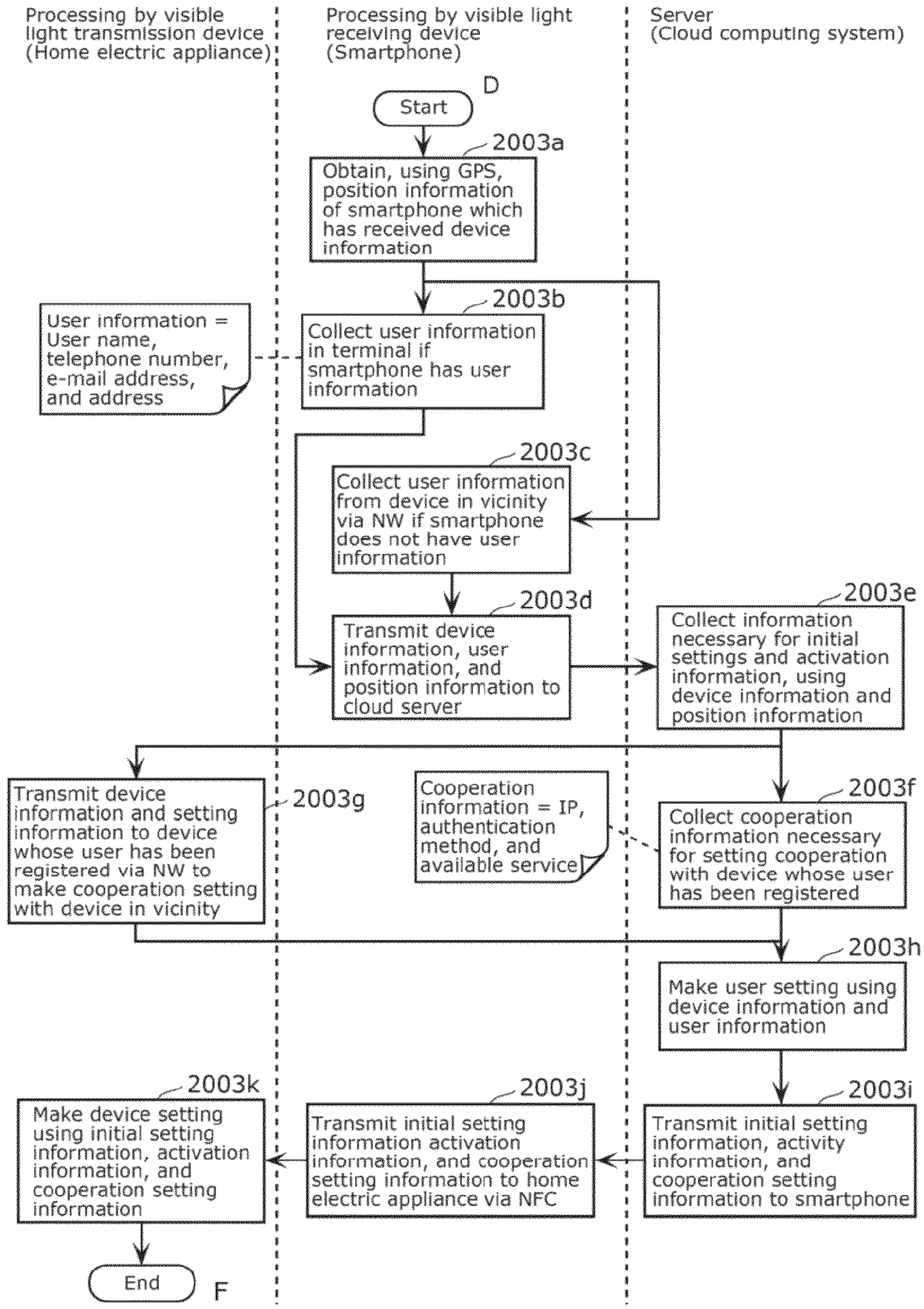

FIG. 135 is a diagram for describing a procedure from when a user purchases a device until when the user makes initial settings of the device according to Embodiment 7.

Figure 136:
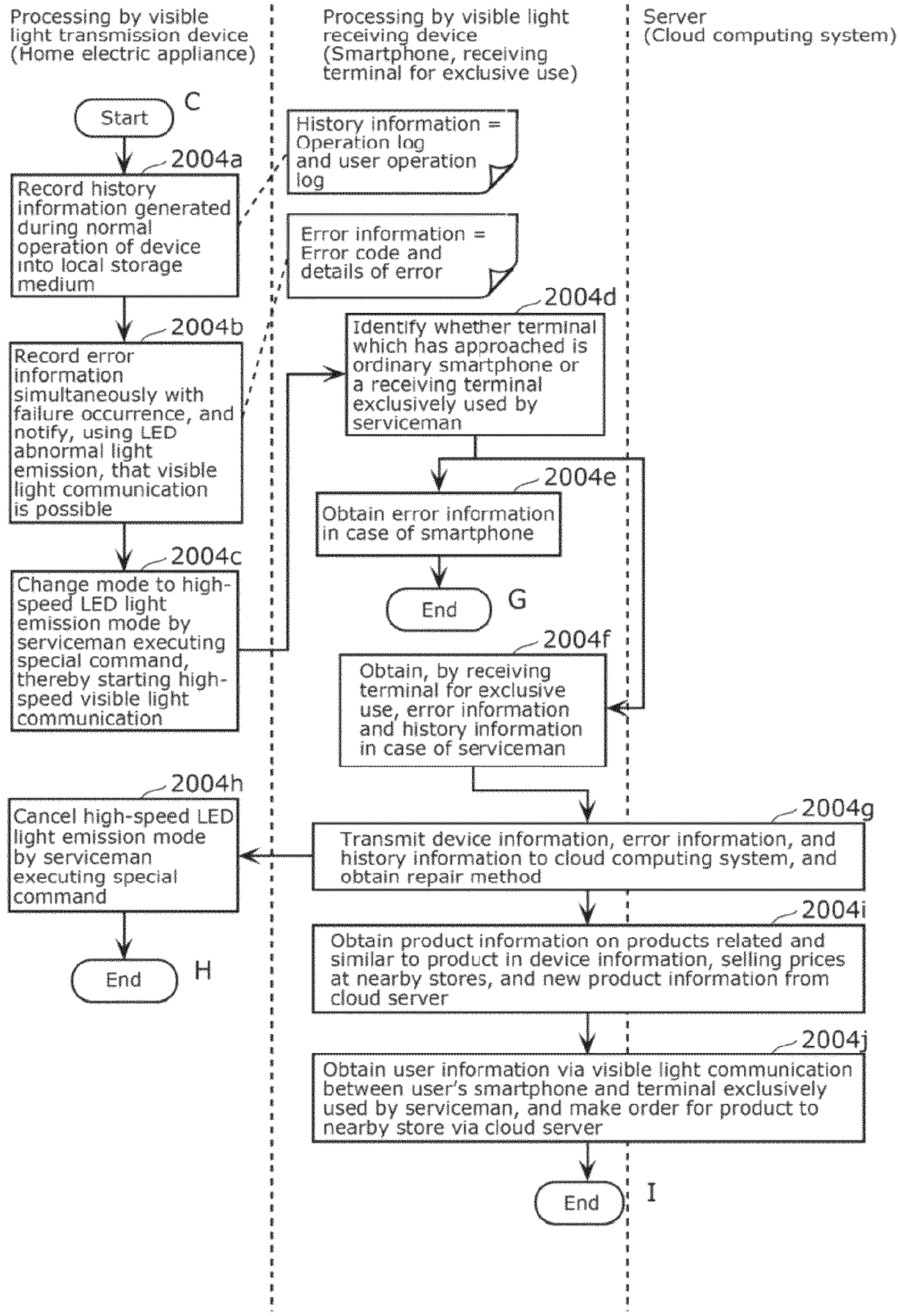

FIG. 136 is a diagram for describing service exclusively performed by a serviceman when a device fails according to Embodiment 7.

Figure 137:
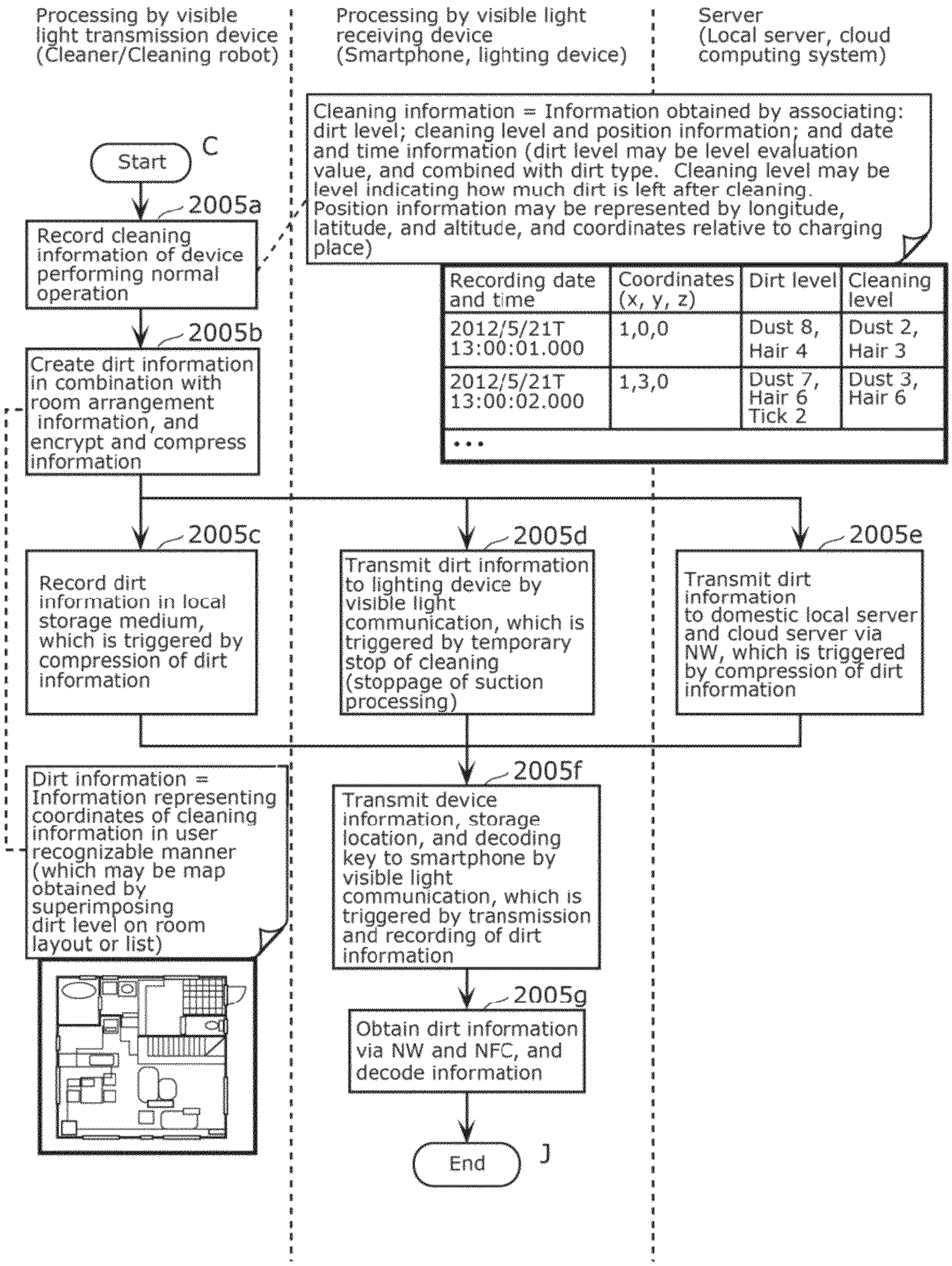

FIG. 137 is a diagram for describing service for checking a cleaning state using a cleaner and visible light communication according to Embodiment 7.

Figure 138:
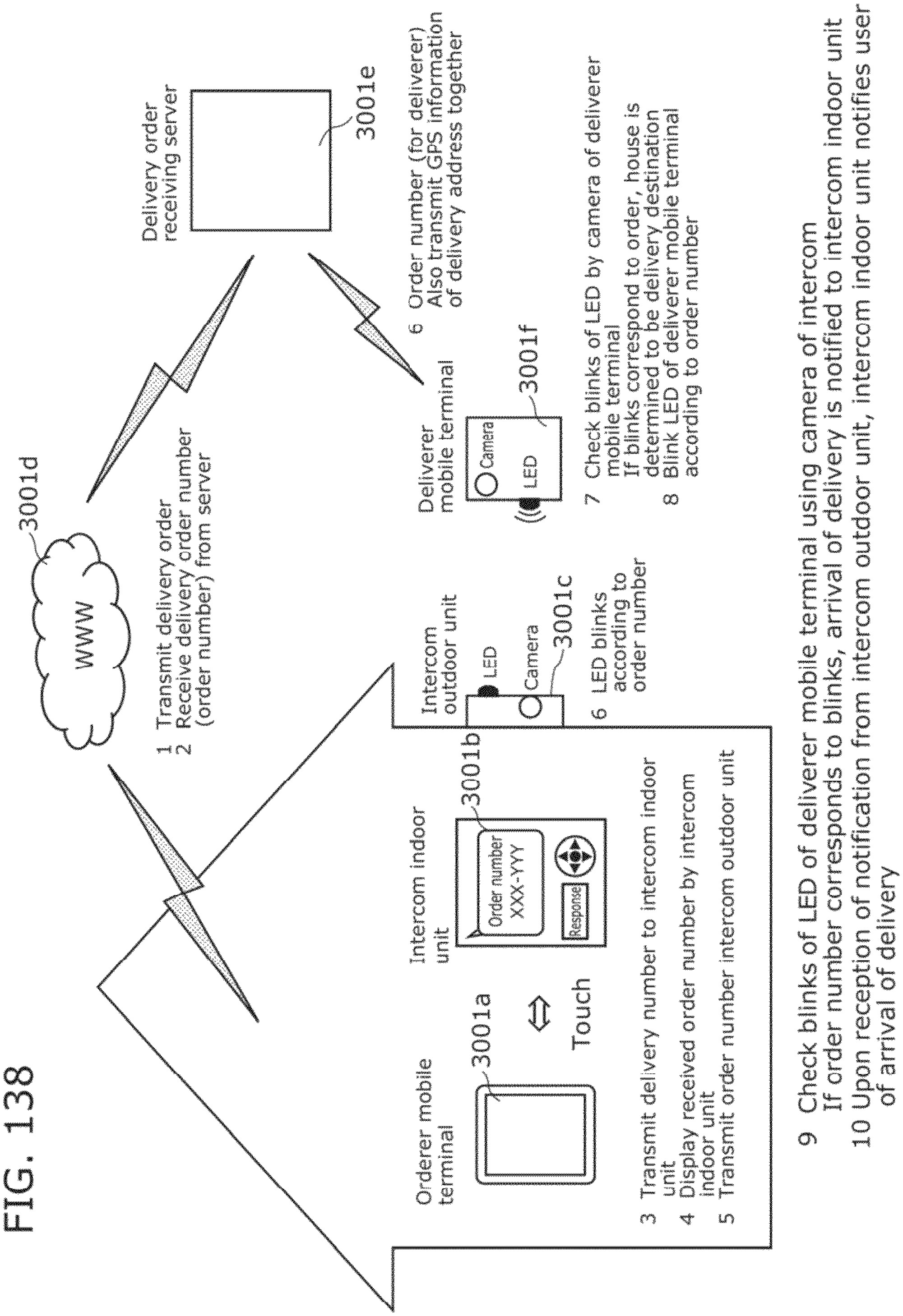

FIG. 138 is a schematic diagram of home delivery service support using optical communication according to Embodiment 8.

Figure 139:
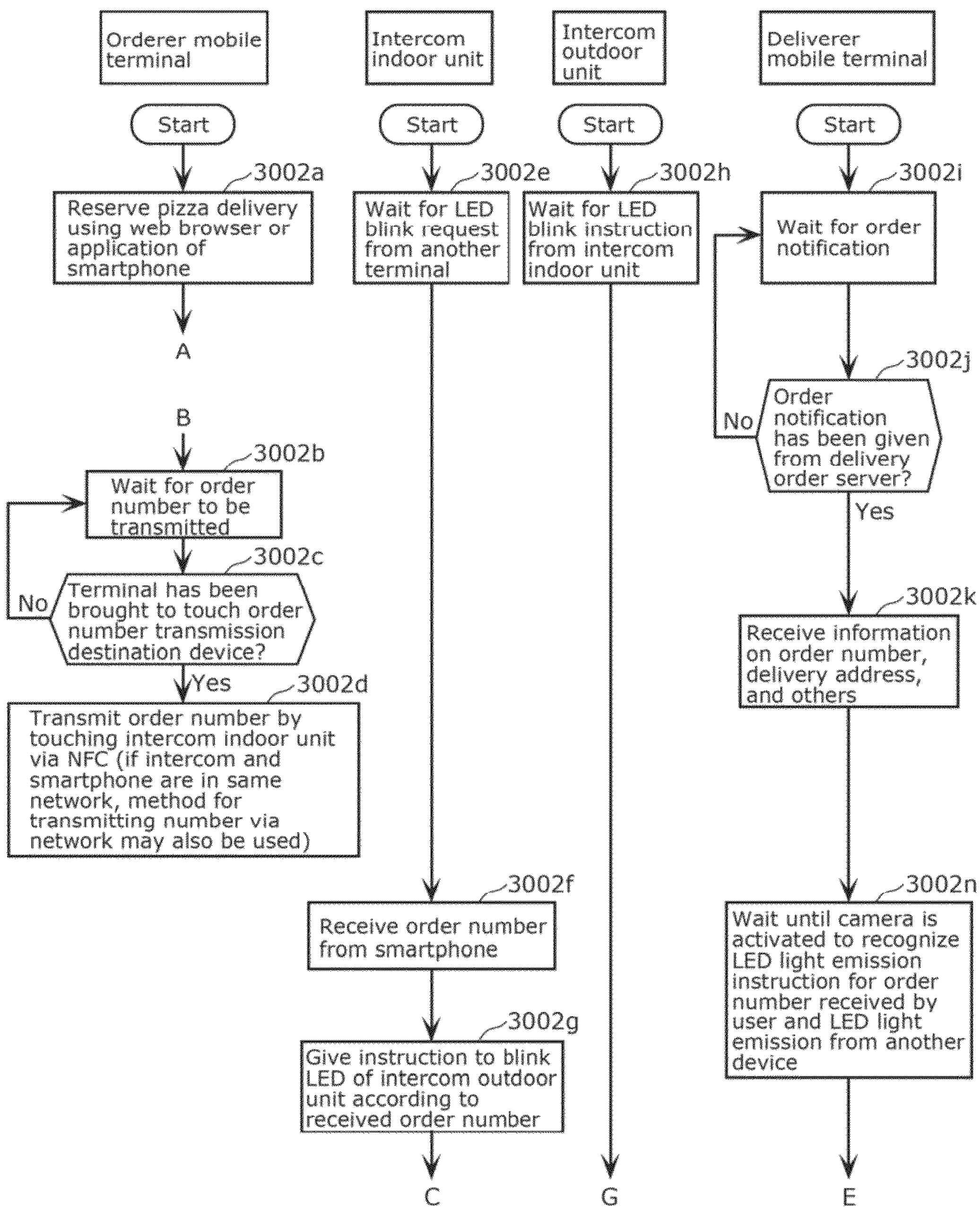

FIG. 139 is a flowchart for describing home delivery service support using optical communication according to Embodiment 8.

Figure 140:
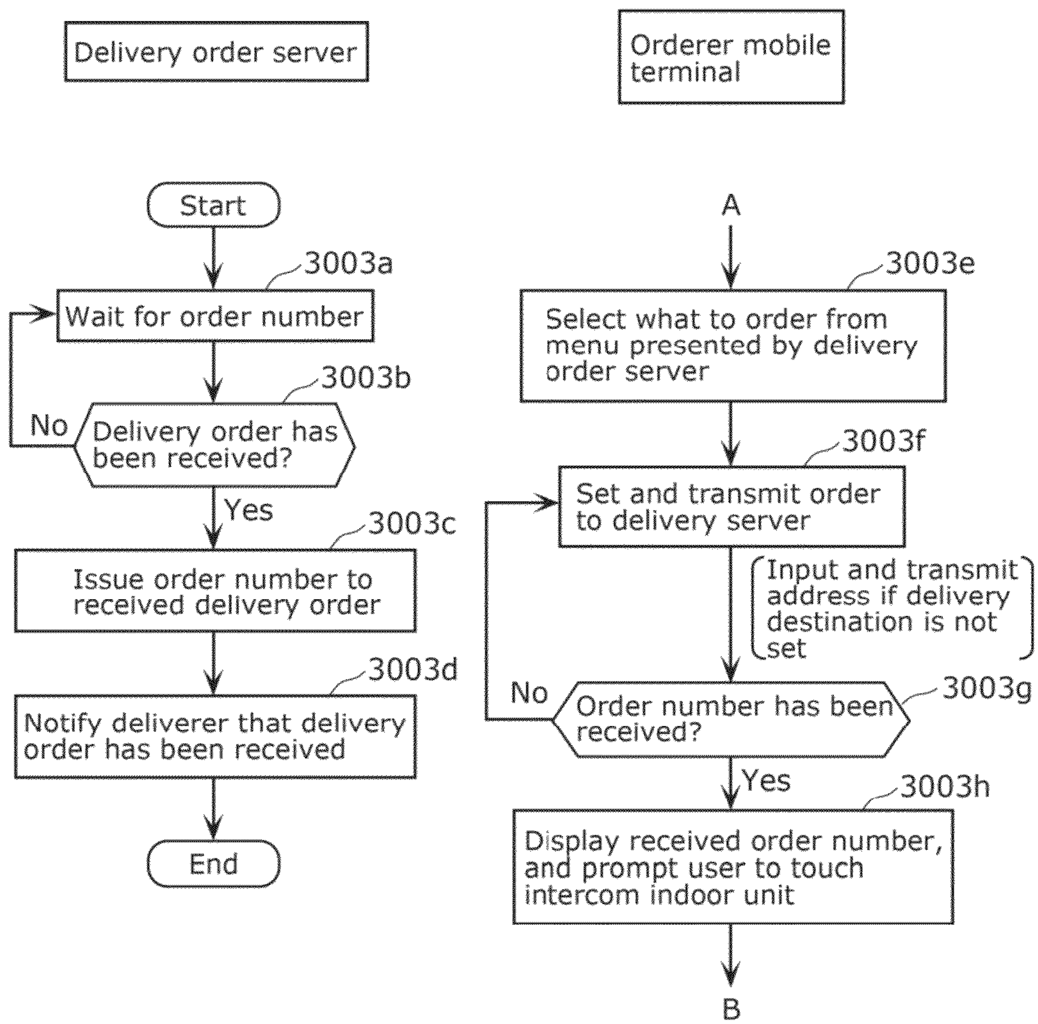

FIG. 140 is a flowchart for describing home delivery service support using optical communication according to Embodiment 8.

Figure 141:
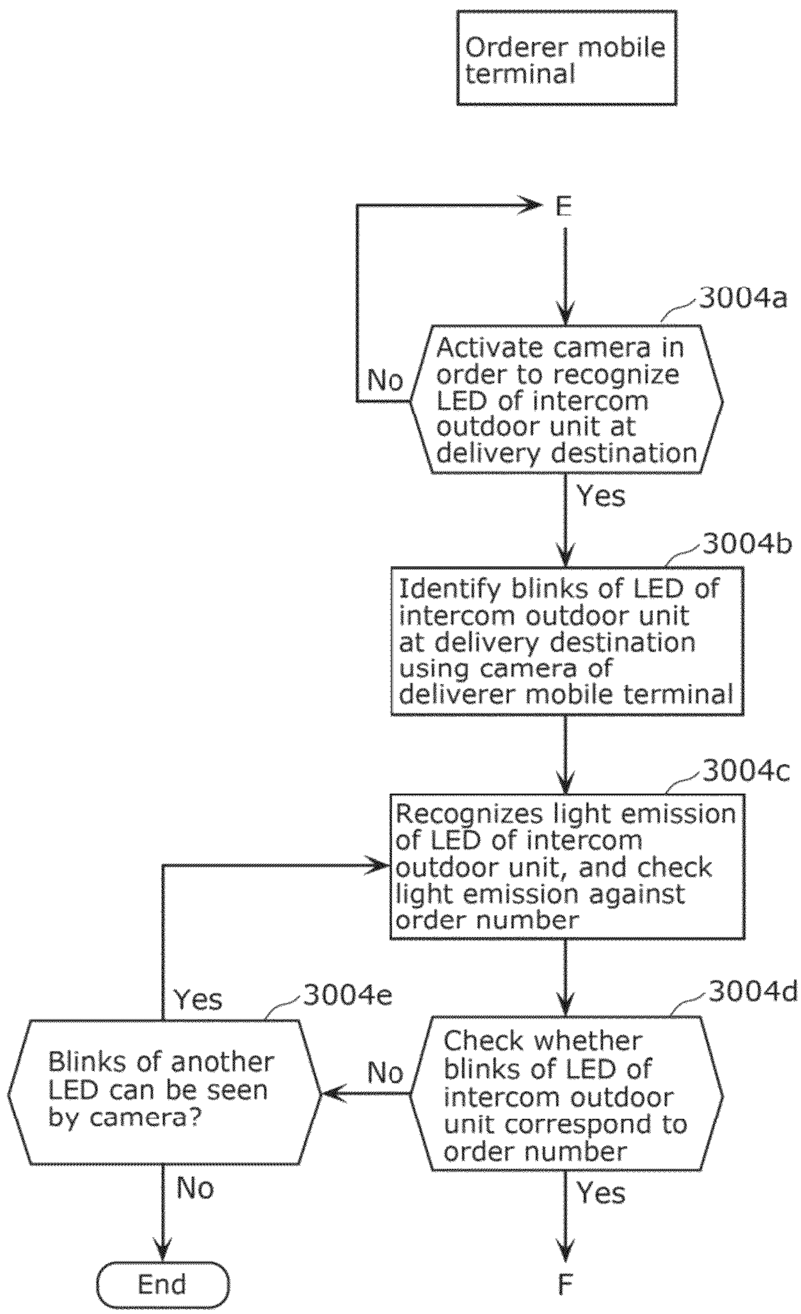

FIG. 141 is a flowchart for describing home delivery service support using optical communication according to Embodiment 8.

Figure 142:
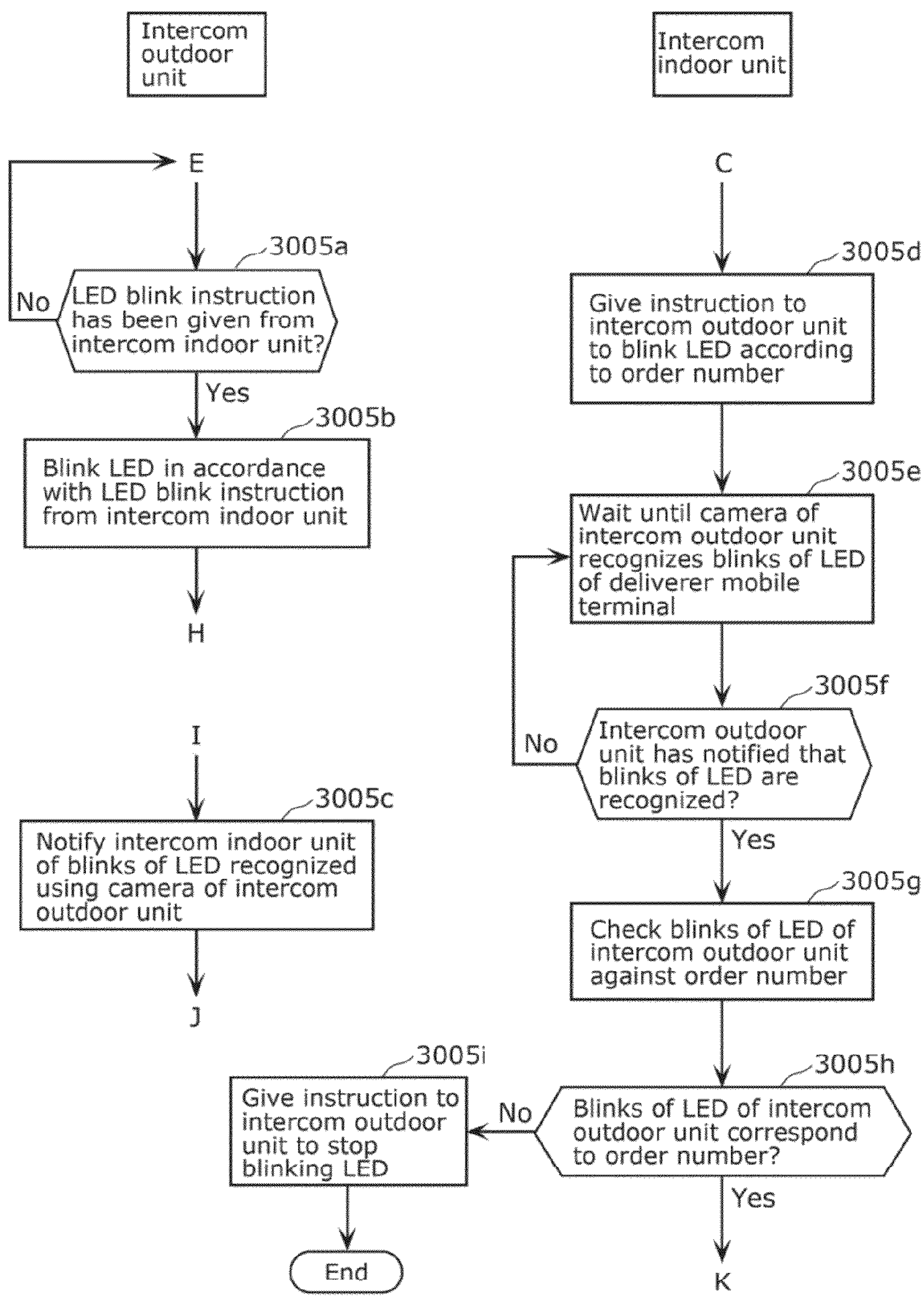

FIG. 142 is a flowchart for describing home delivery service support using optical communication according to Embodiment 8.

Figure 143:
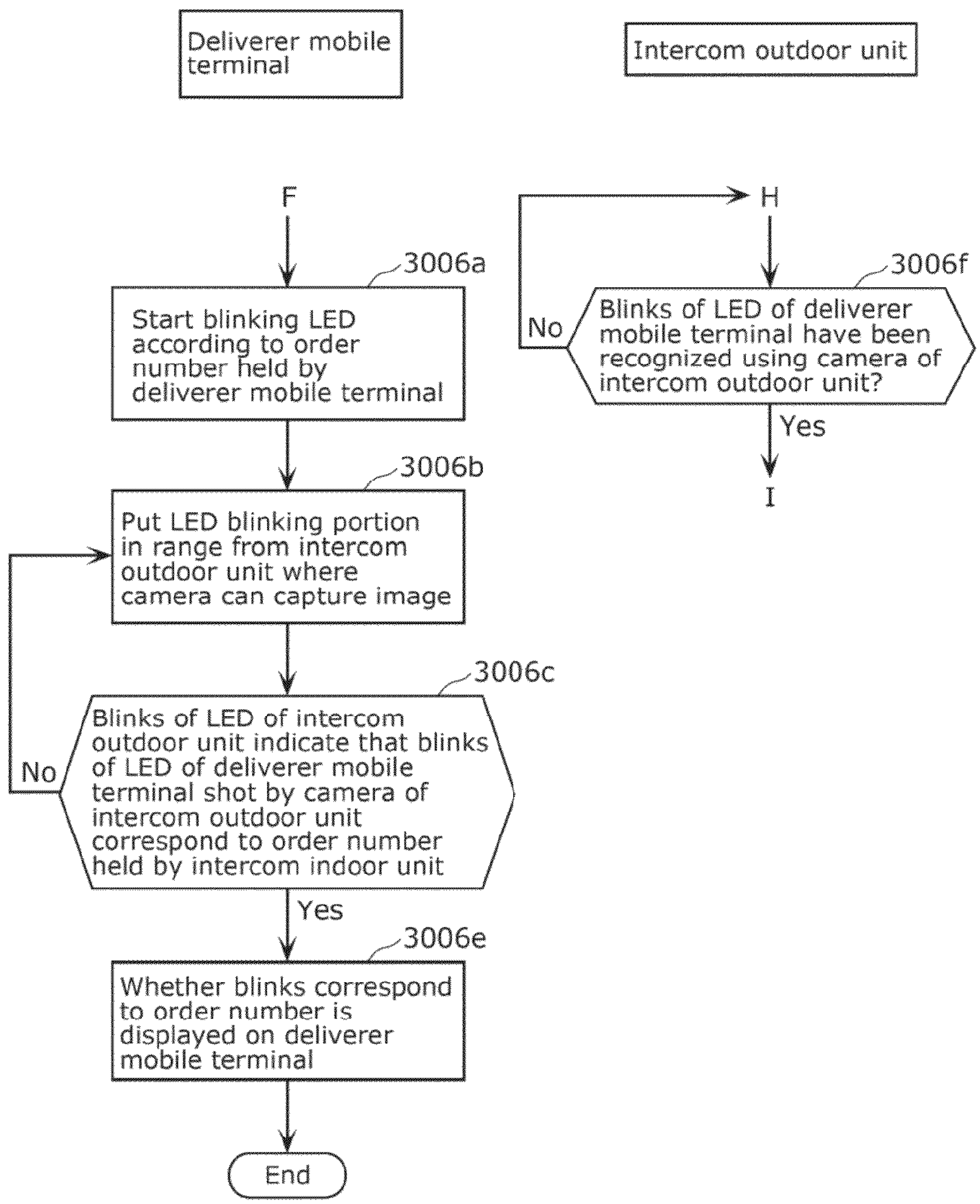

FIG. 143 is a flowchart for describing home delivery service support using optical communication according to Embodiment 8.

Figure 144:
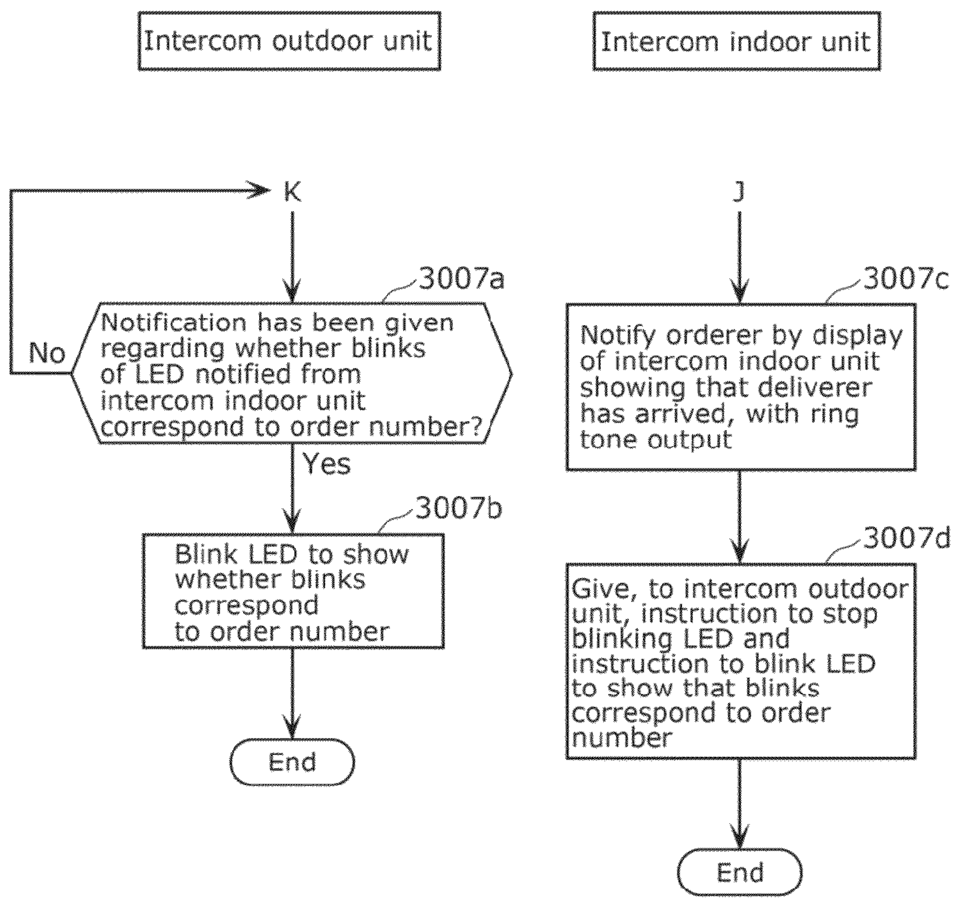

FIG. 144 is a flowchart for describing home delivery service support using optical communication according to Embodiment 8.

Figure 145:
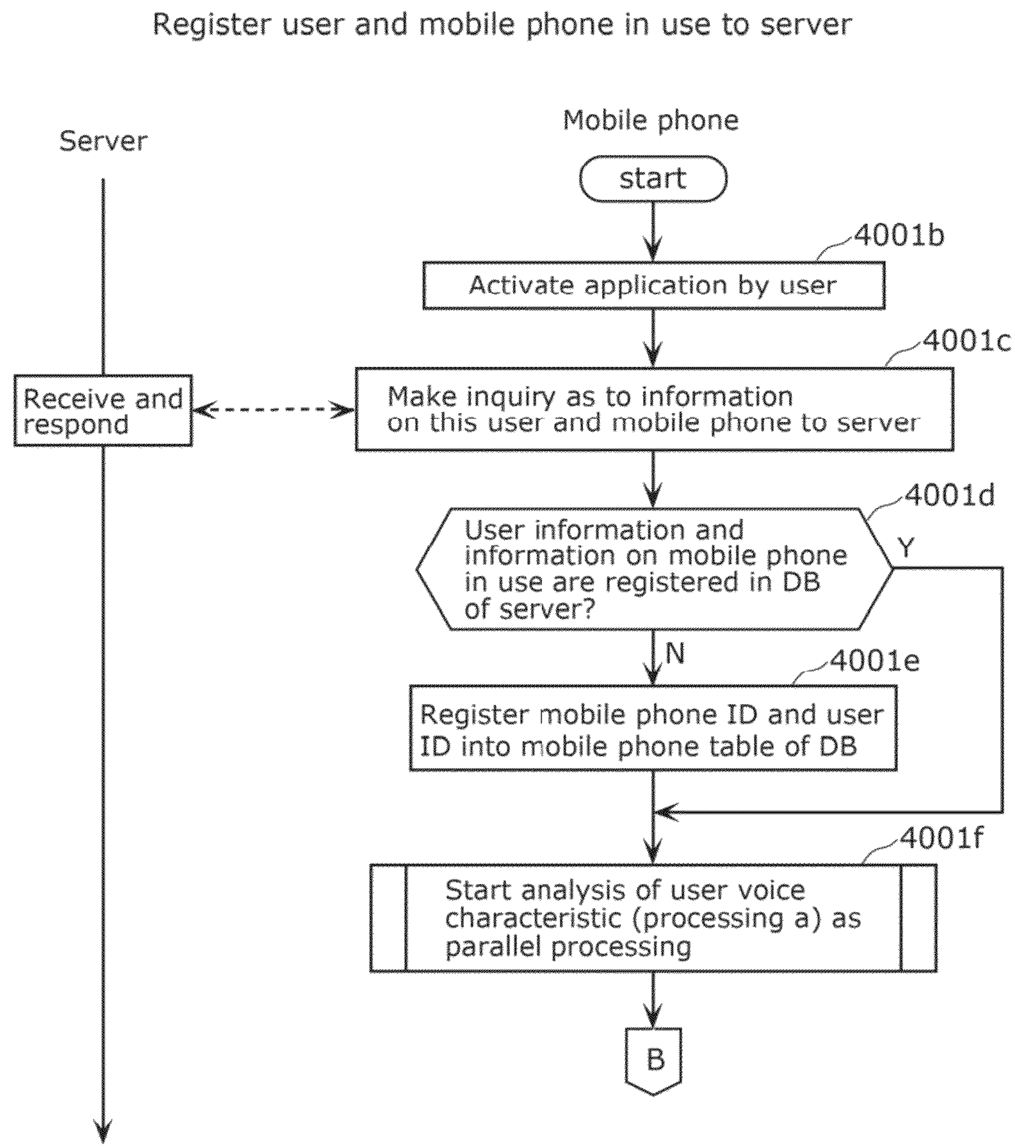

FIG. 145 is a diagram for describing processing of registering a user and a mobile phone in use to a server according to Embodiment 9.

Figure 146:
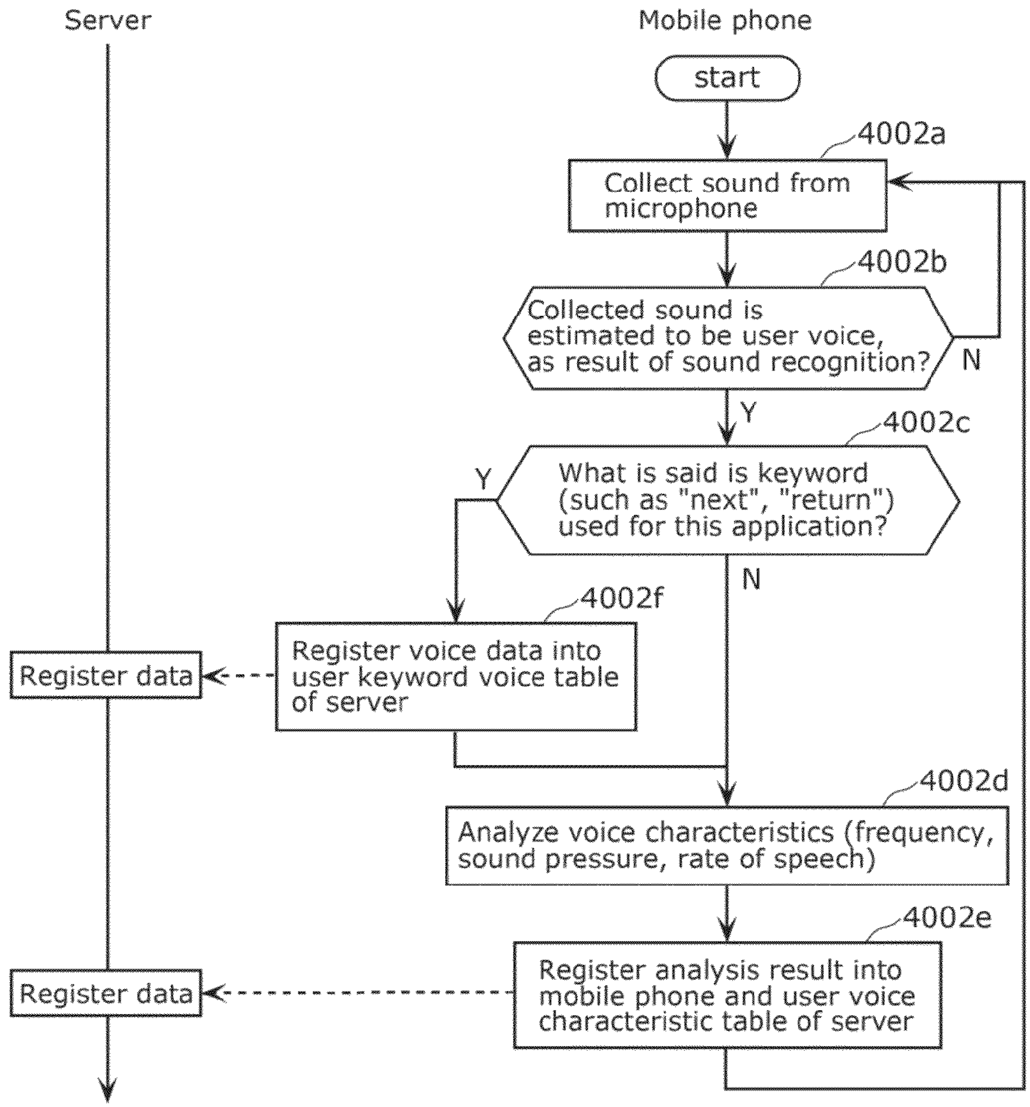

FIG. 146 is a diagram for describing processing of analyzing user voice characteristics according to Embodiment 9.

Figure 147:
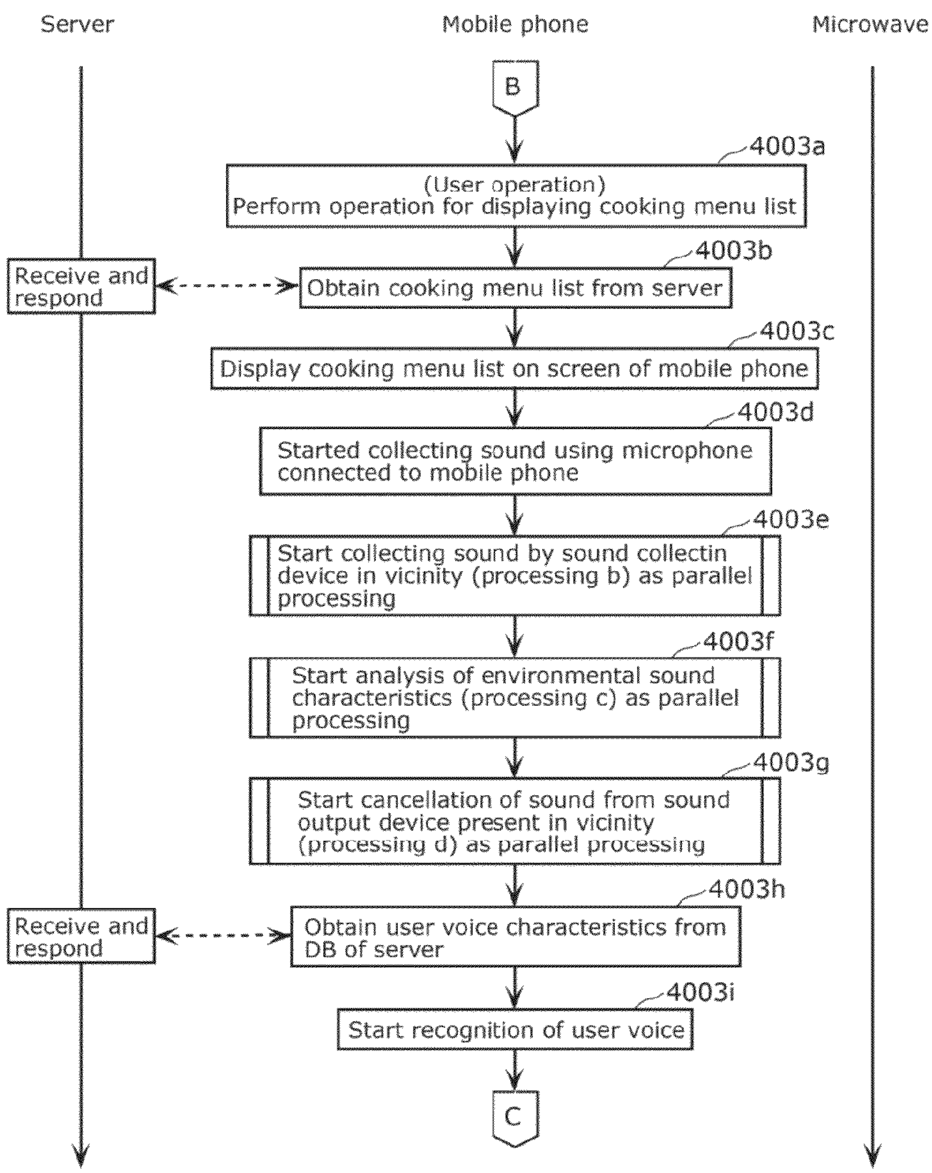

FIG. 147 is a diagram for describing processing of preparing sound recognition processing according to Embodiment 9.

Figure 148:
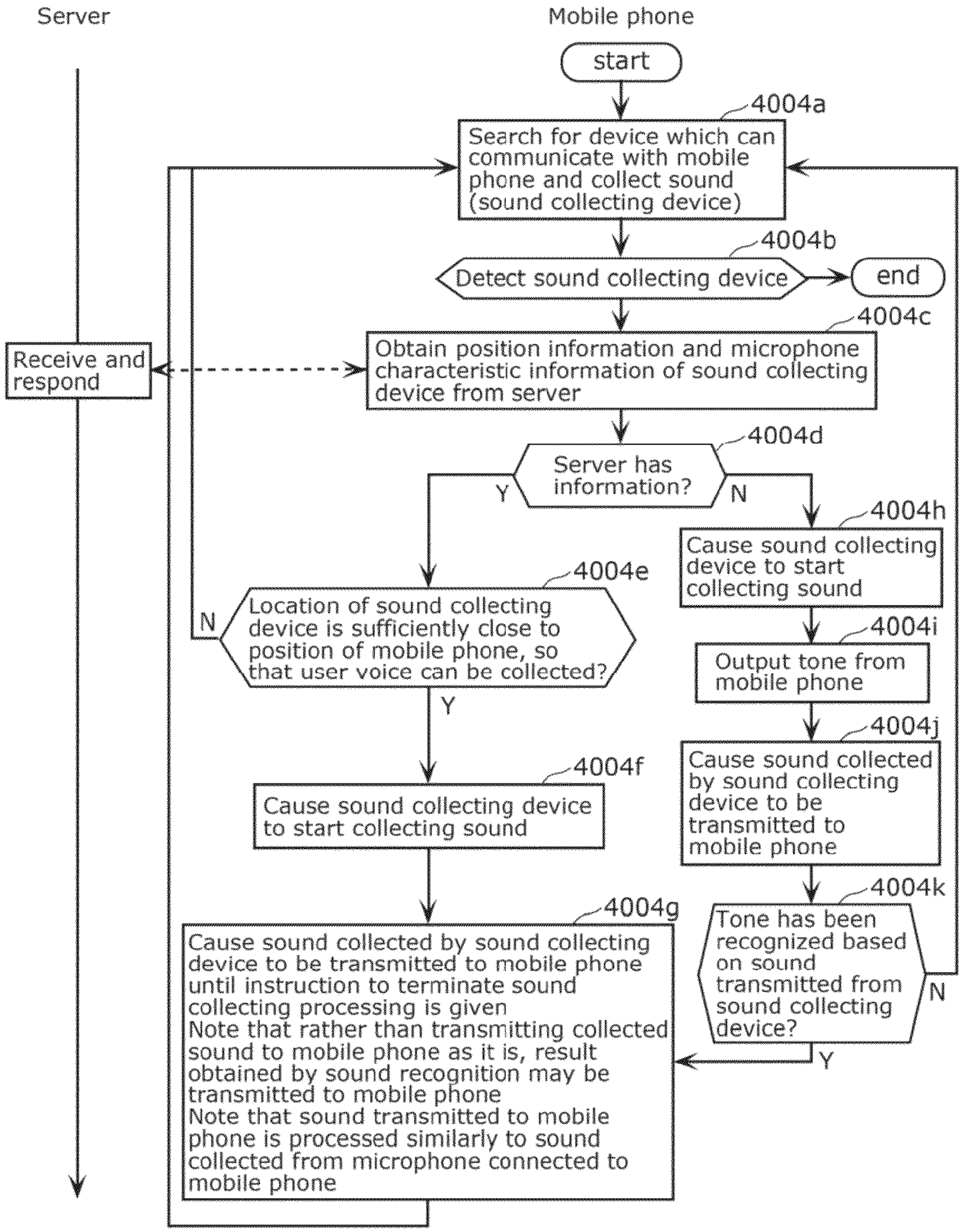

FIG. 148 is a diagram for describing processing of collecting sound by a sound collecting device in the vicinity according to Embodiment 9.

Figure 149:
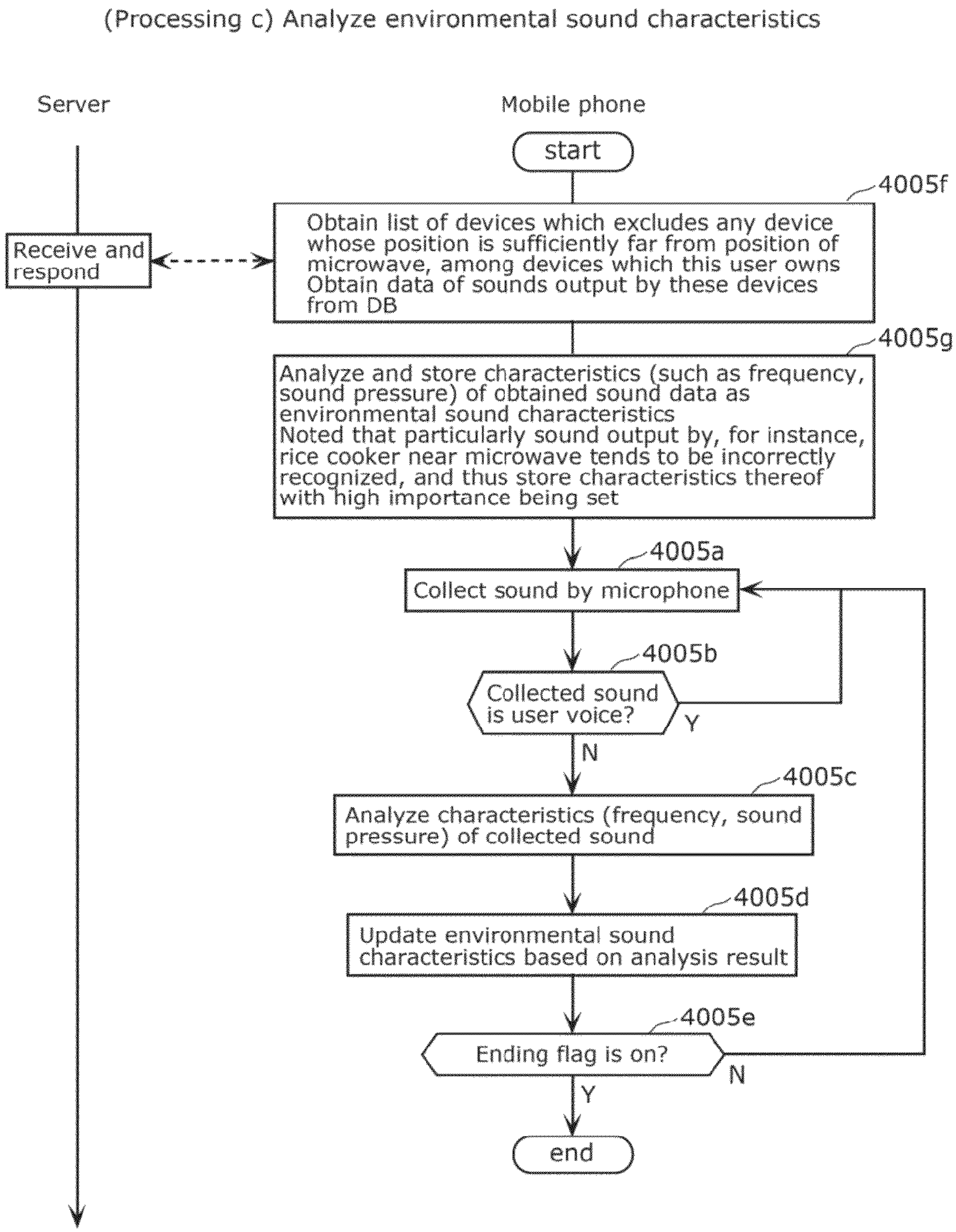

FIG. 149 is a diagram for describing processing of analyzing environmental sound characteristics according to Embodiment 9.

Figure 150:
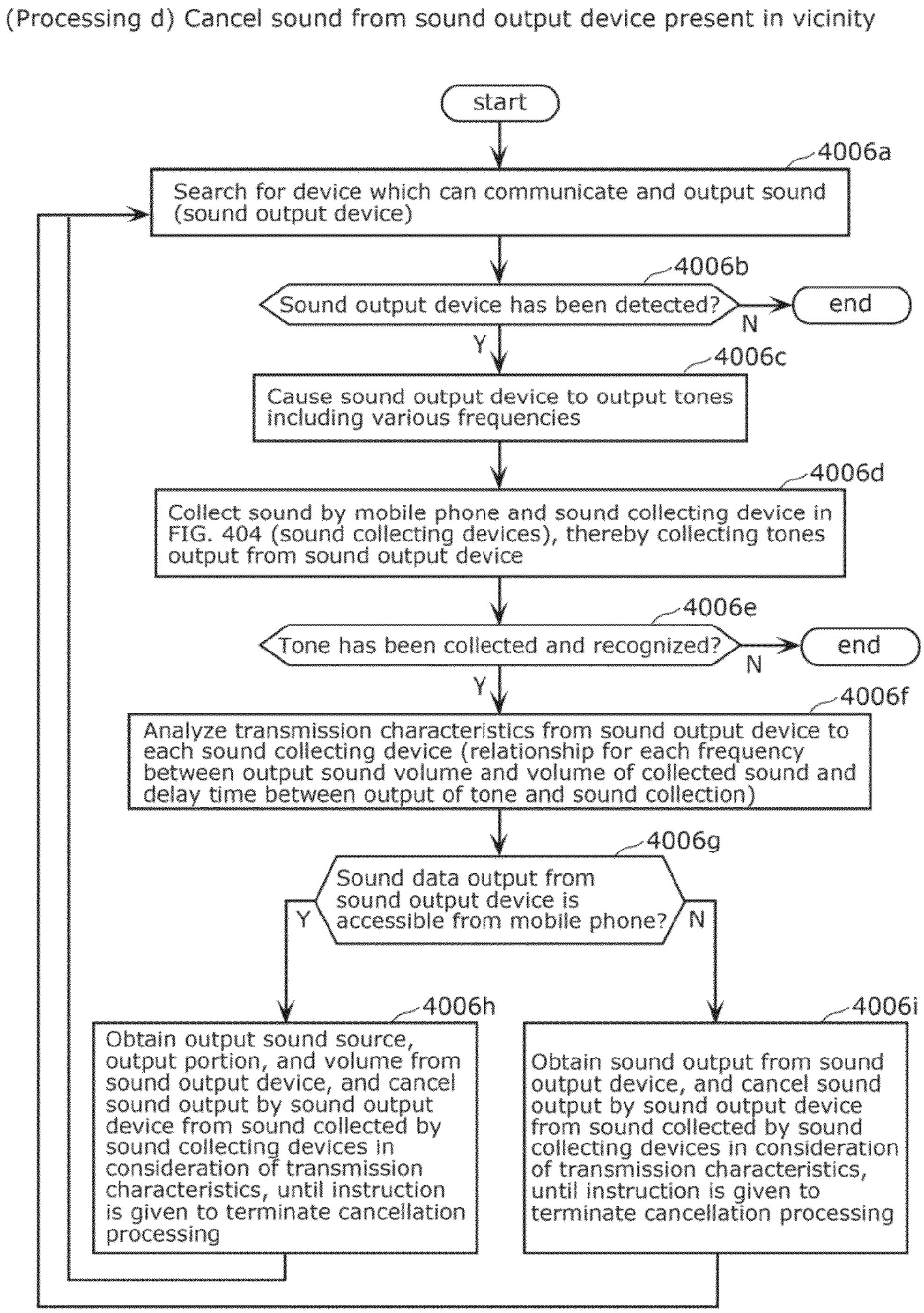

FIG. 150 is a diagram for describing processing of canceling sound from a sound output device which is present in the vicinity according to Embodiment 9.

Figure 151:
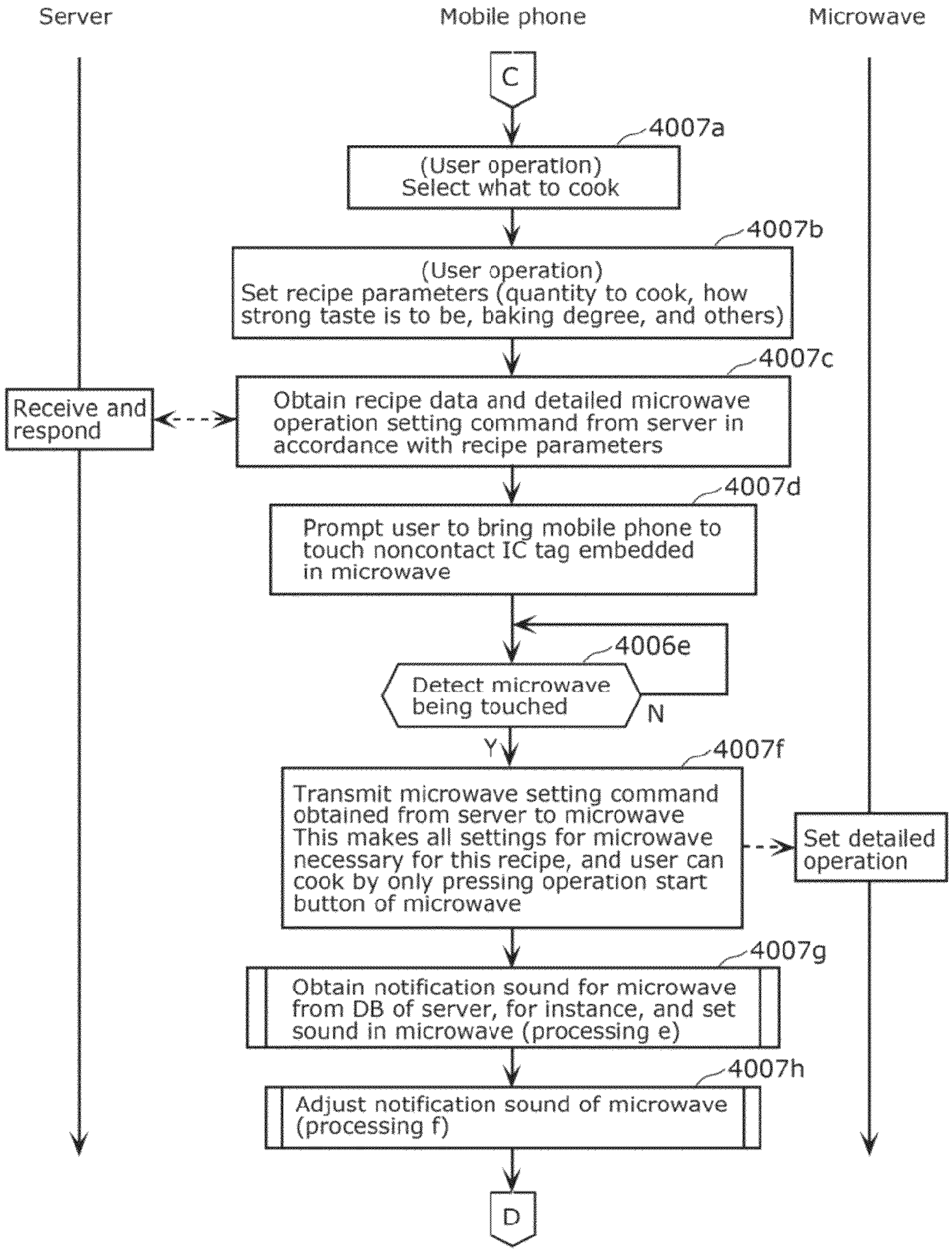

FIG. 151 is a diagram for describing processing of selecting what to cook and setting detailed operation of a microwave according to Embodiment 9.

Figure 152:
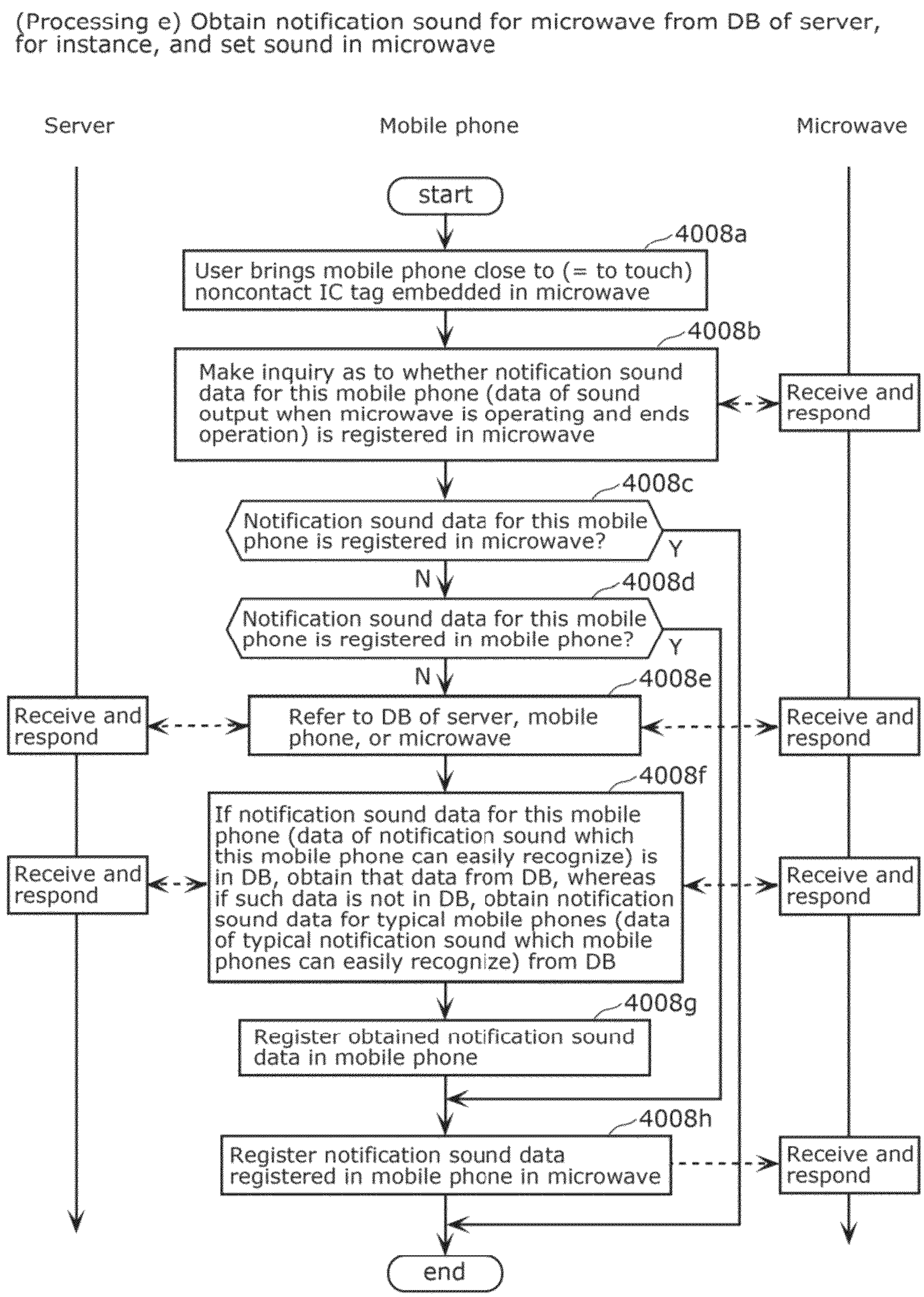

FIG. 152 is a diagram for describing processing of obtaining notification sound for the microwave from a DB of a server, for instance, and setting the sound in the microwave according to Embodiment 9.

Figure 153:
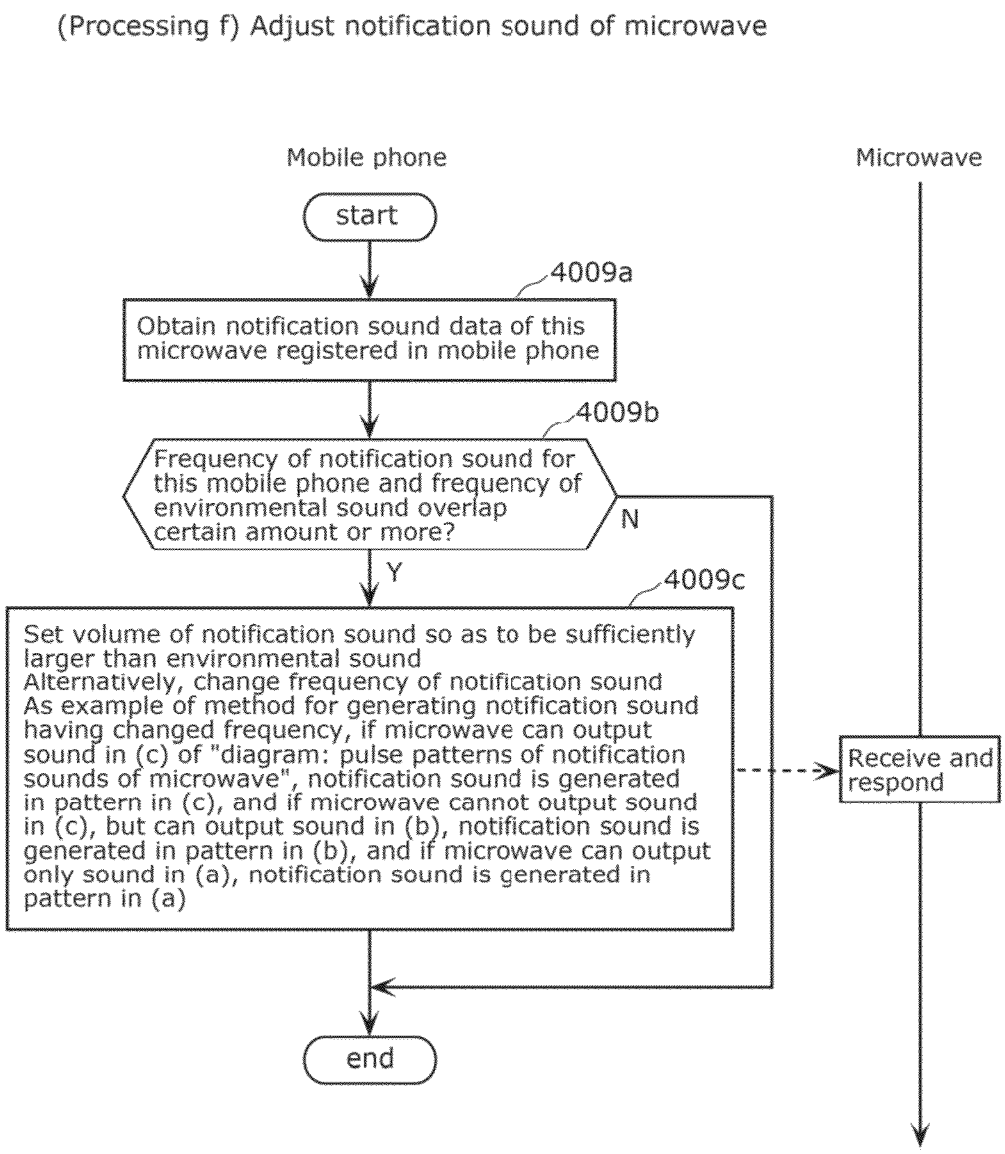

FIG. 153 is a diagram for describing processing of adjusting notification sound of the microwave according to Embodiment 9.

Figure 154:
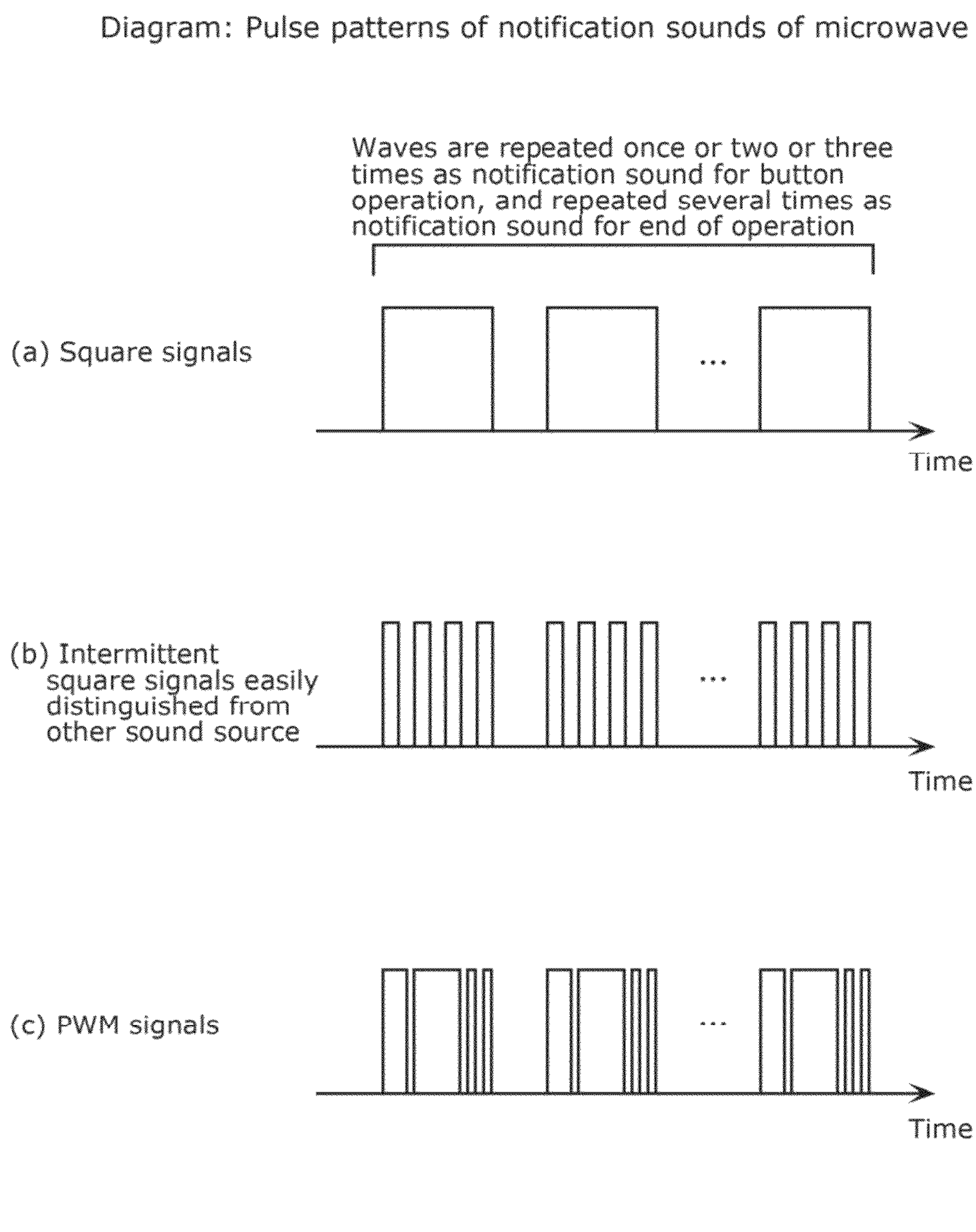

FIG. 154 is a diagram illustrating examples of waveforms of notification sounds set in the microwave according to Embodiment 9.

Figure 155:
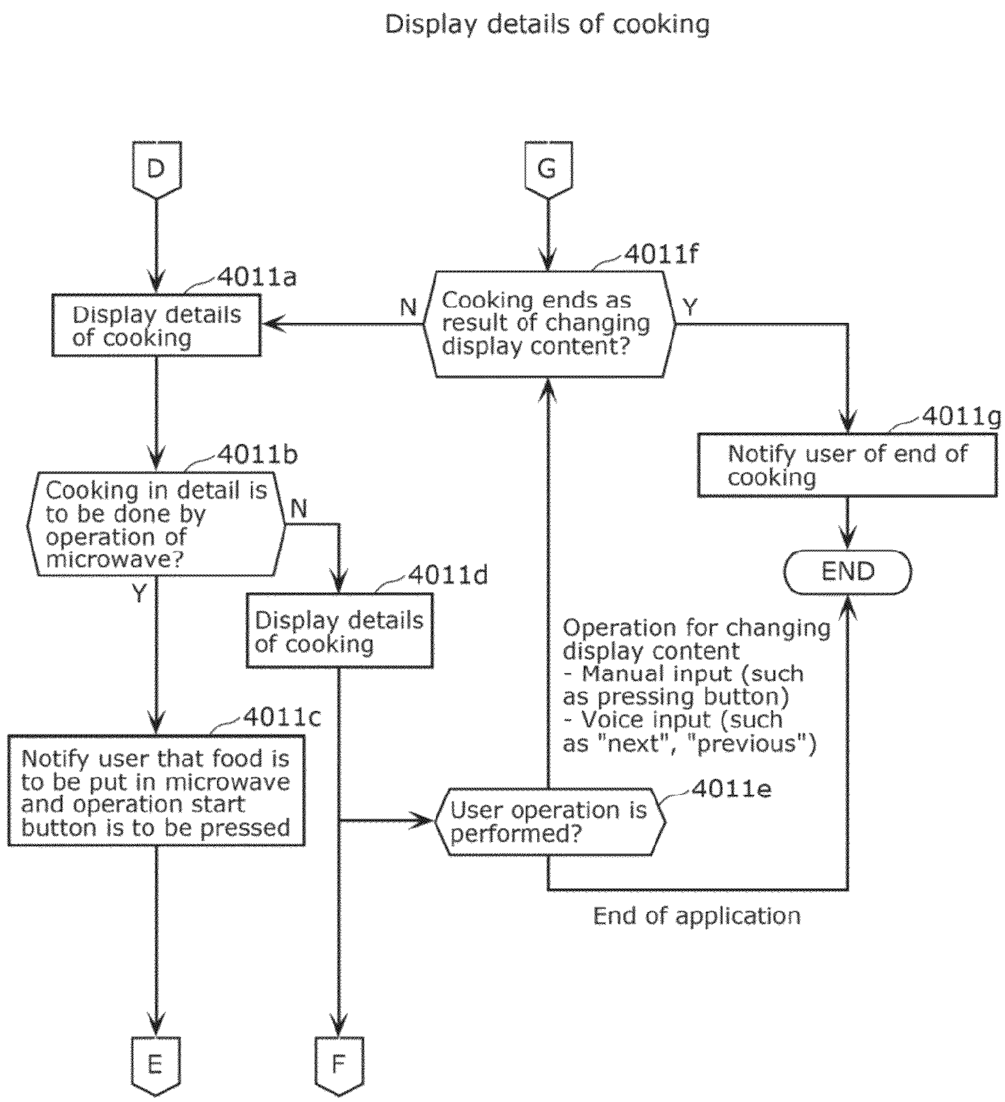

FIG. 155 is a diagram for describing processing of displaying details of cooking according to Embodiment 9.

Figure 156:
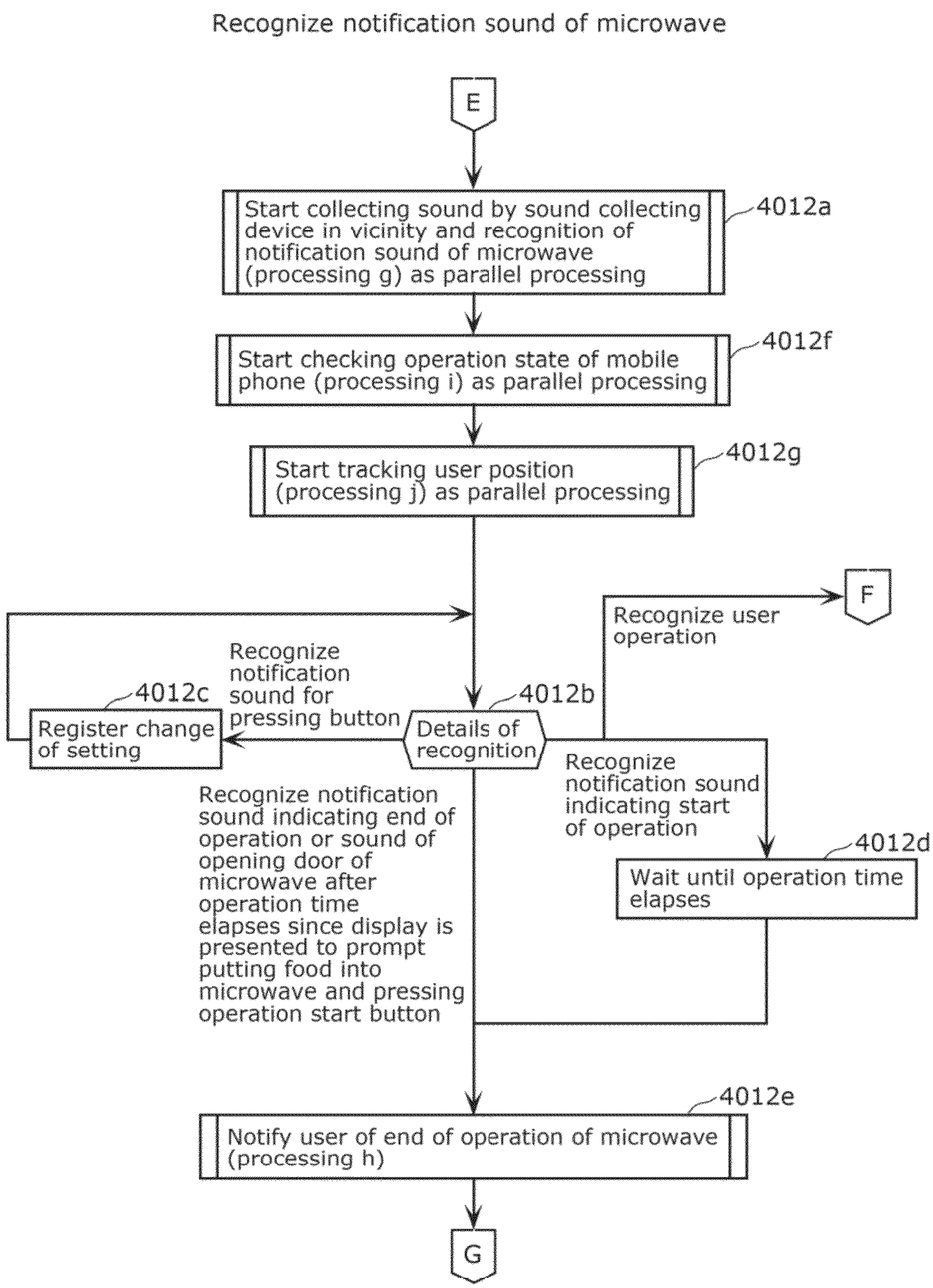

FIG. 156 is a diagram for describing processing of recognizing notification sound of the microwave according to Embodiment 9.

Figure 157:
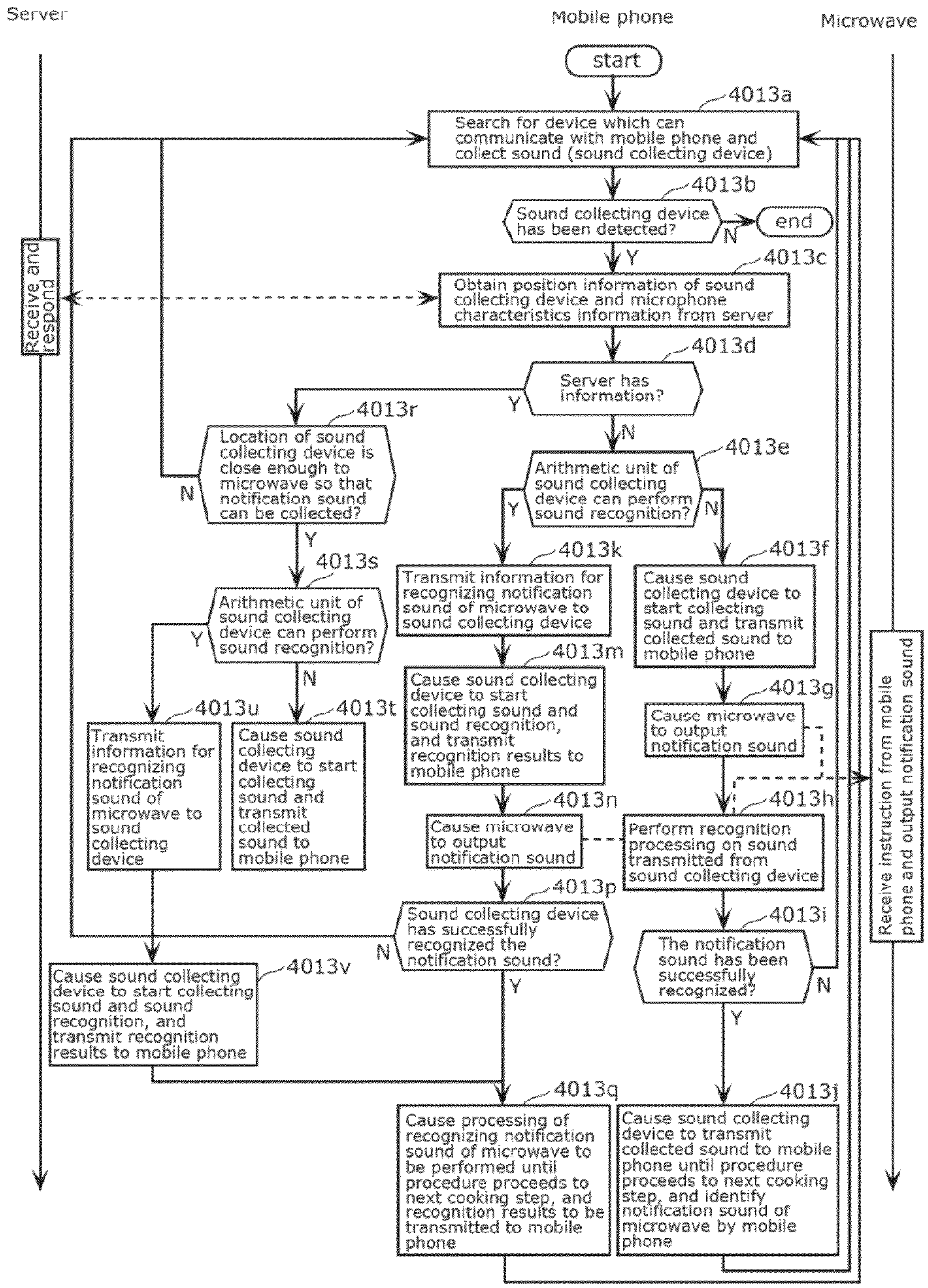

FIG. 157 is a diagram for describing processing of collecting sound by a sound collecting device in the vicinity and recognizing notification sound of the microwave according to Embodiment 9.

Figure 158:
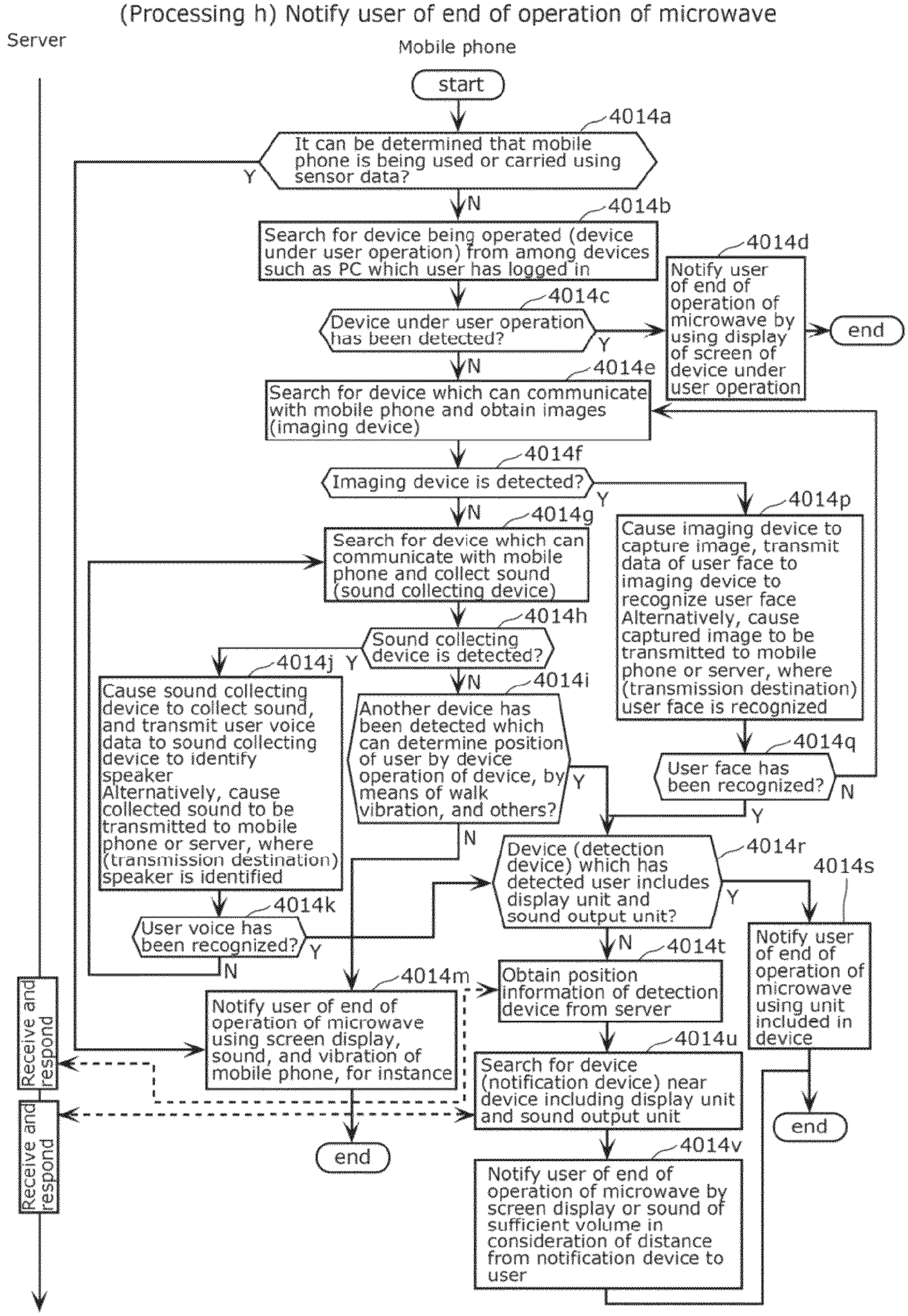

FIG. 158 is a diagram for describing processing of notifying a user of the end of operation of the microwave according to Embodiment 9.

Figure 159:
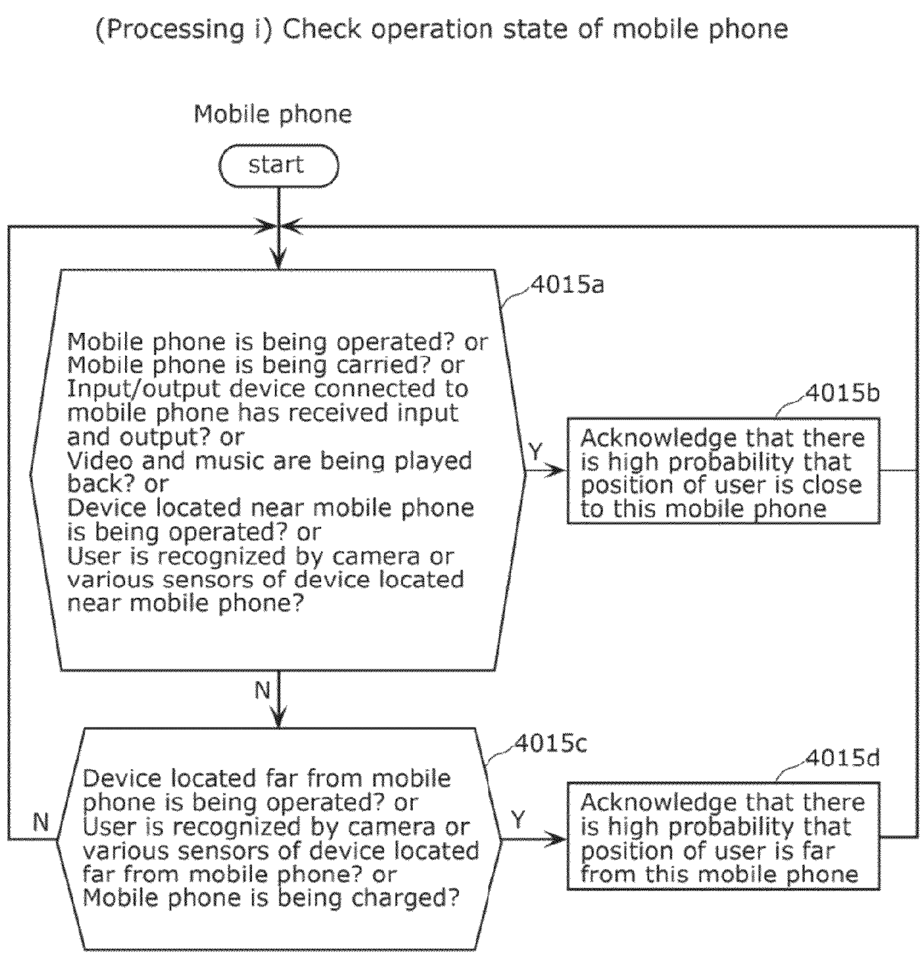

FIG. 159 is a diagram for describing processing of checking an operation state of a mobile phone according to Embodiment 9.

Figure 160:
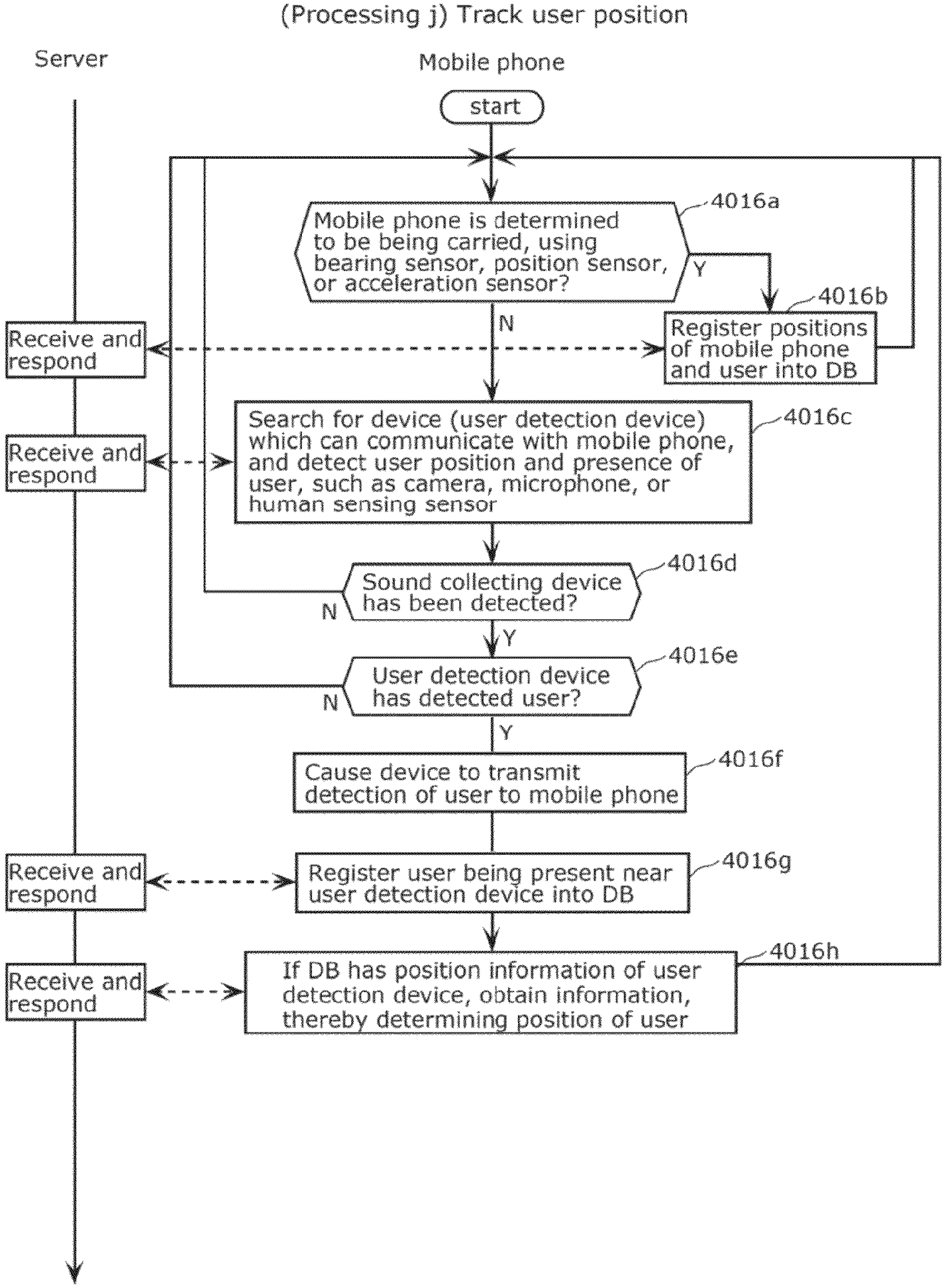

FIG. 160 is a diagram for describing processing of tracking a user position according to Embodiment 9.

Figure 161:
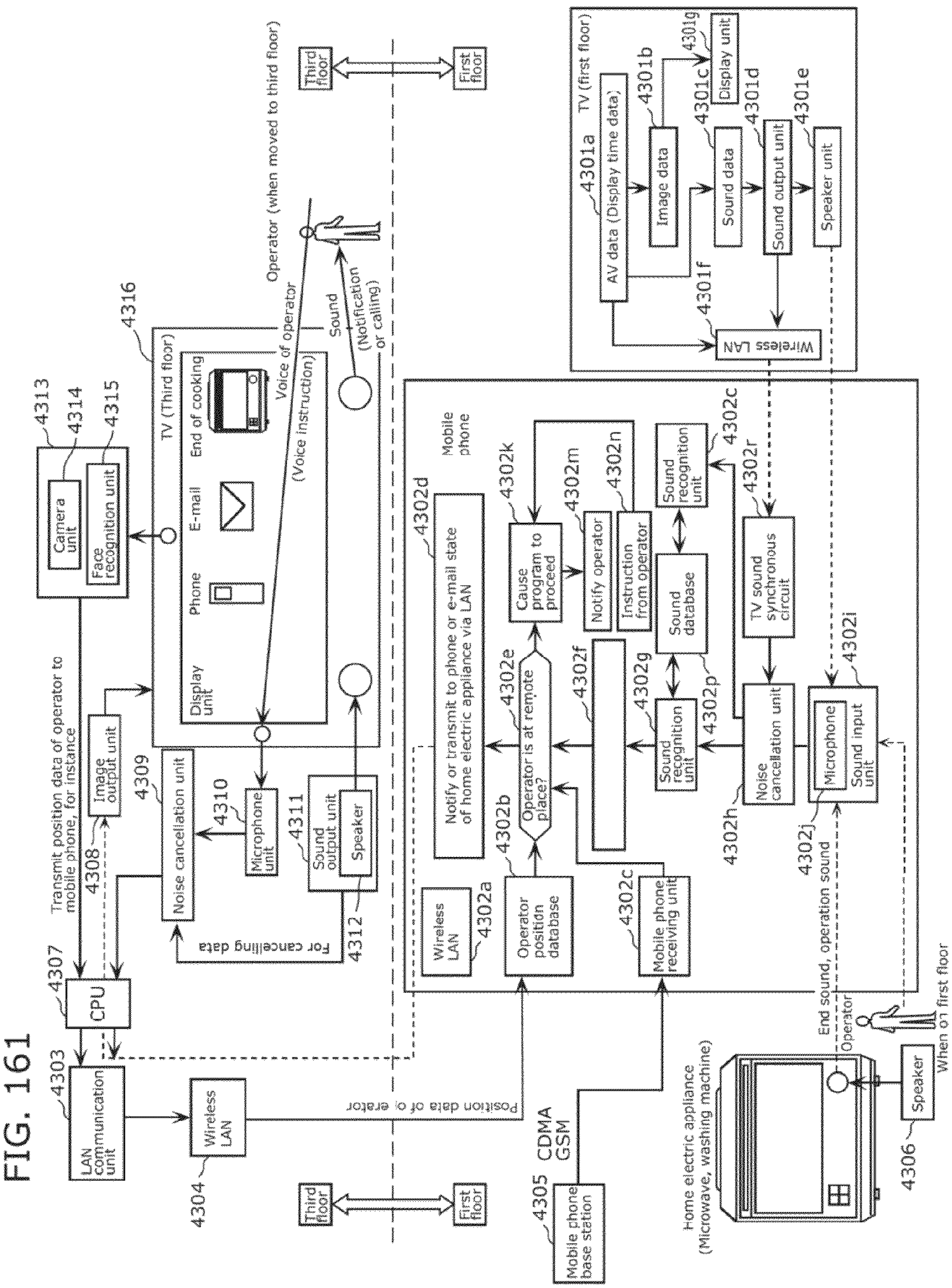

FIG. 161 is a diagram illustrating that while canceling sound from a sound output device, notification sound of a home electric appliance is recognized, an electronic device which can communicate is caused to recognize a current position of a user (operator), and based on the recognition result of the user position, a device located near the user position is caused to give a notification to the user.

FIG. 162 is a diagram illustrating content of a database held in the server, the mobile phone, or the microwave according to Embodiment 9.

Figure 163:
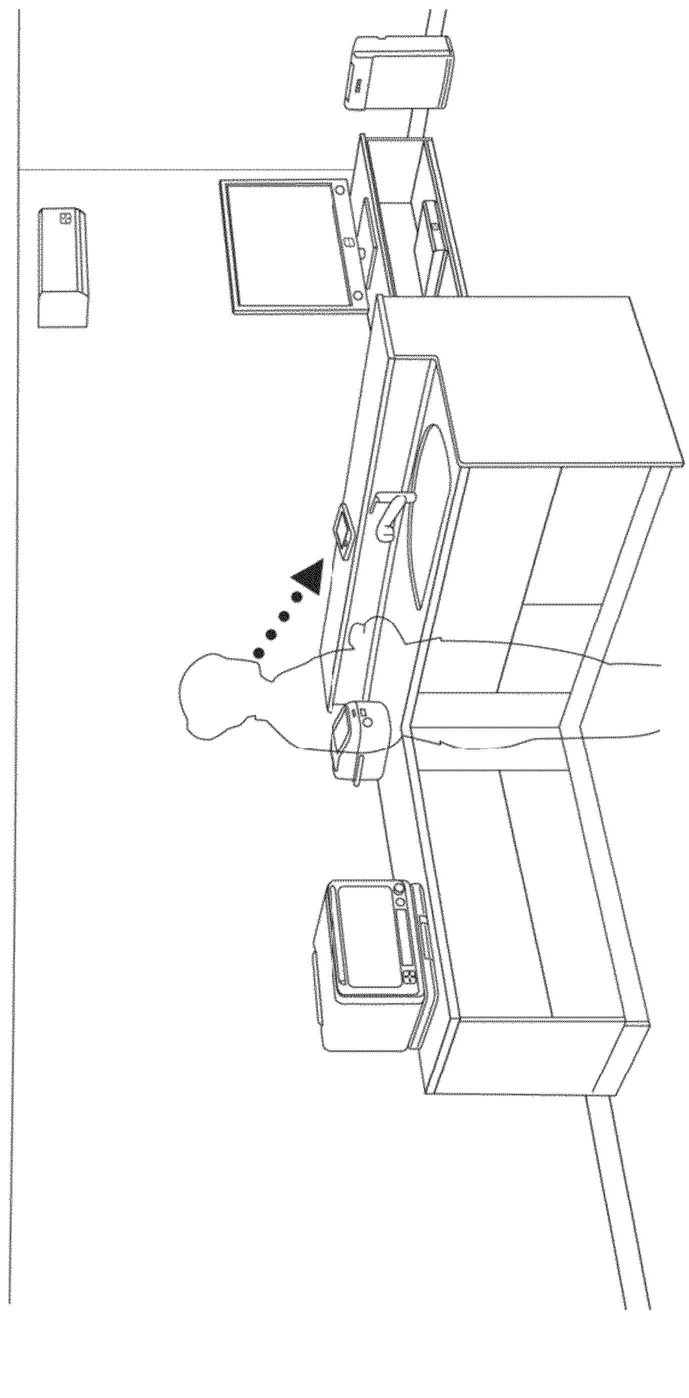

FIG. 163 is a diagram illustrating that a user cooks based on cooking processes displayed on a mobile phone, and further operates the display content of the mobile phone by saying “next”, “return”, and others, according to Embodiment 9.

Figure 164:
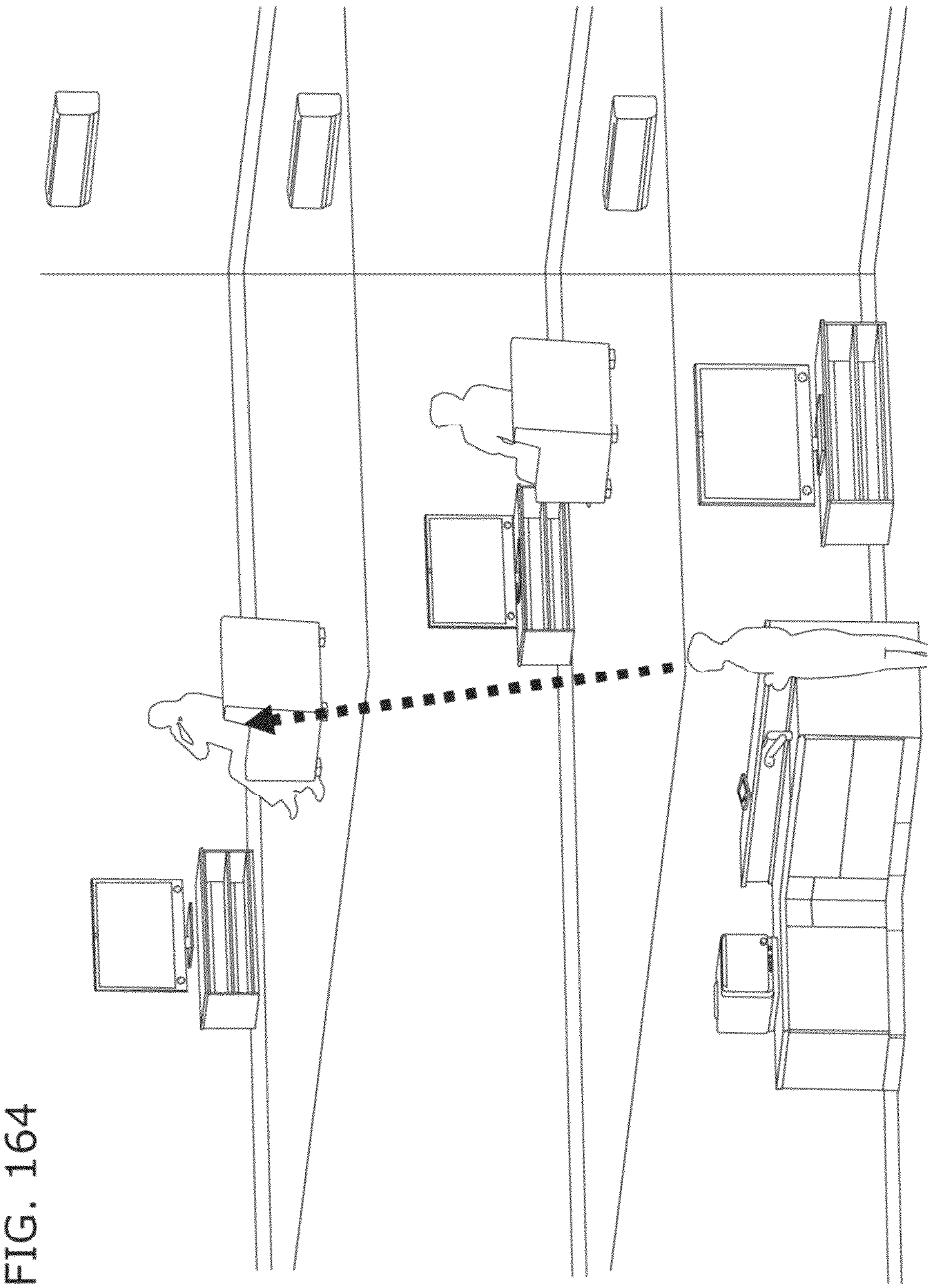

FIG. 164 is a diagram illustrating that the user has moved to another place while he/she is waiting until the operation of the microwave ends after starting the operation or while he/she is stewing food according to Embodiment 9.

Figure 165:
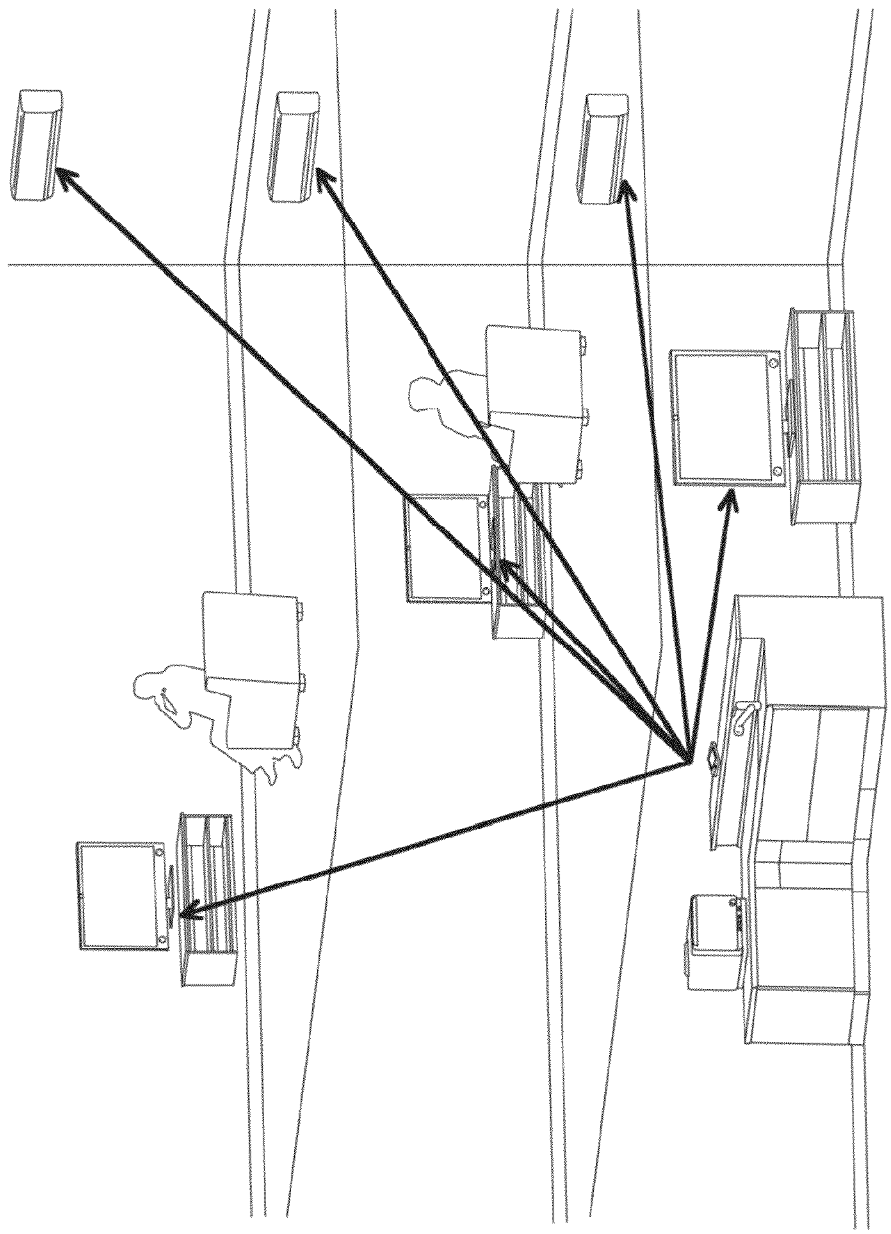

FIG. 165 is a diagram illustrating that a mobile phone transmits an instruction to detect a user to a device which is connected to the mobile phone via a network, and can recognize a position of the user and the presence of the user, such as a camera, a microphone, or a human sensing sensor.

Figure 166:
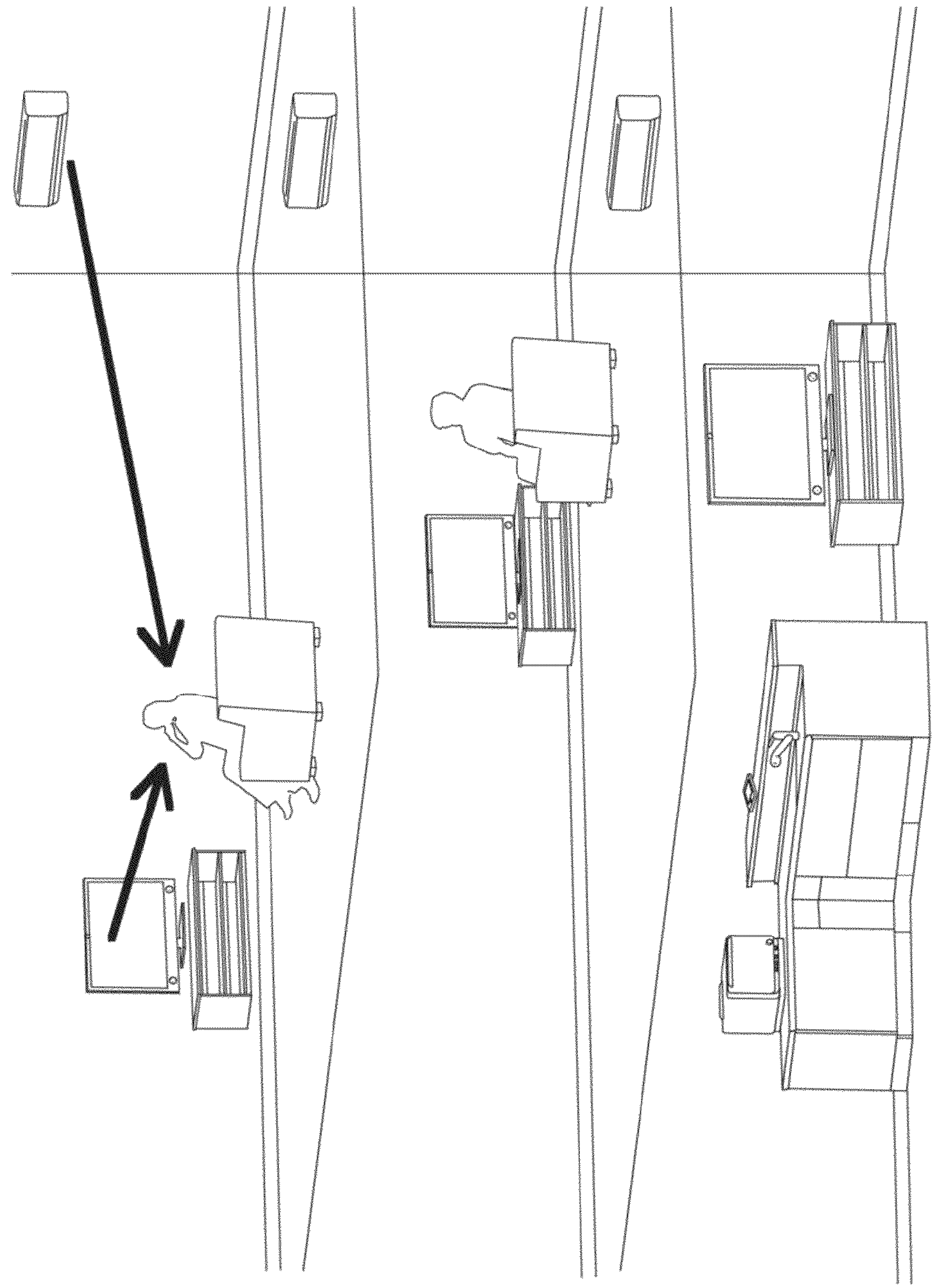

FIG. 166 is a diagram illustrating that a user face is recognized using a camera included in a television, and further the movement and presence of the user are recognized using a human sensing sensor of an air-conditioner, as an example of user detection according to Embodiment 9.

Figure 167:
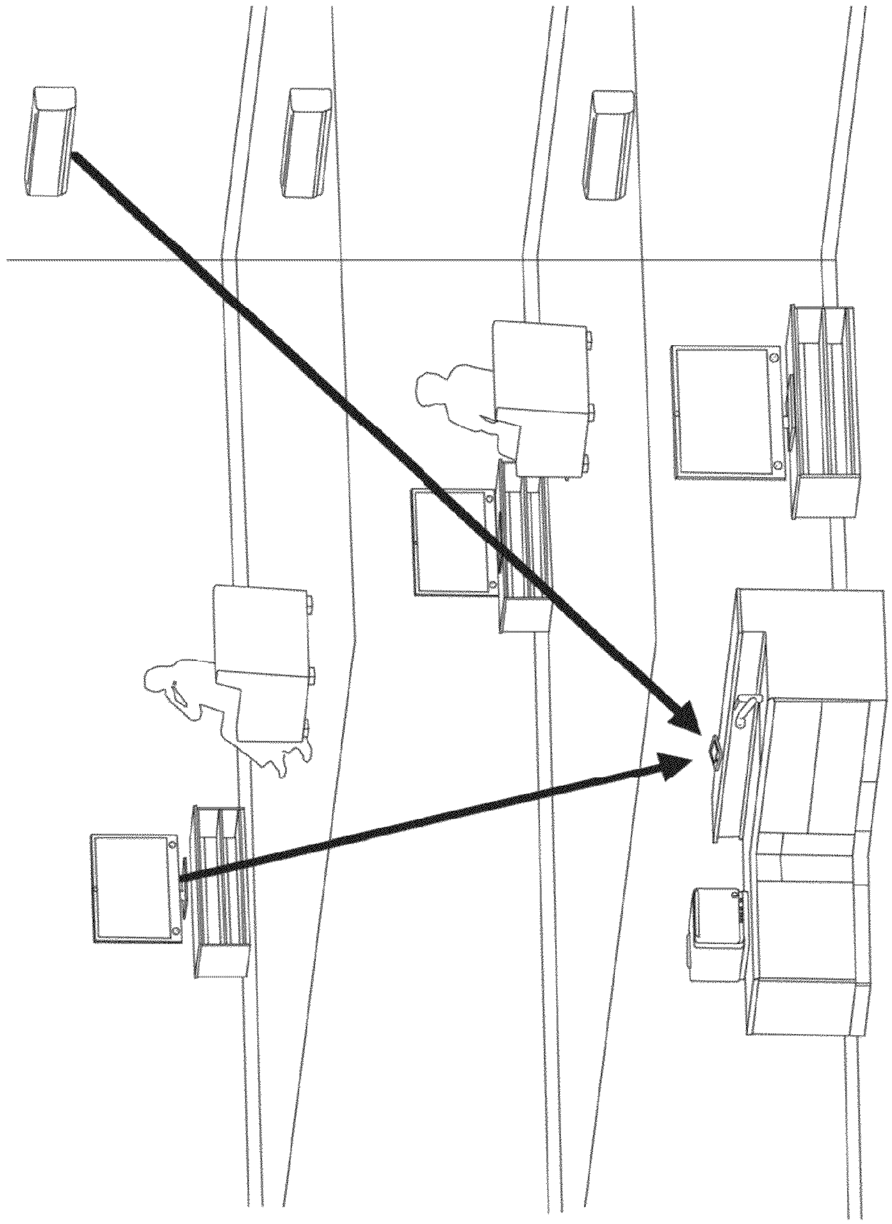

FIG. 167 is a diagram illustrating that devices which have detected the user transmit to the mobile phone the detection of the user and a relative position of the user to the devices which have detected the user.

Figure 168:
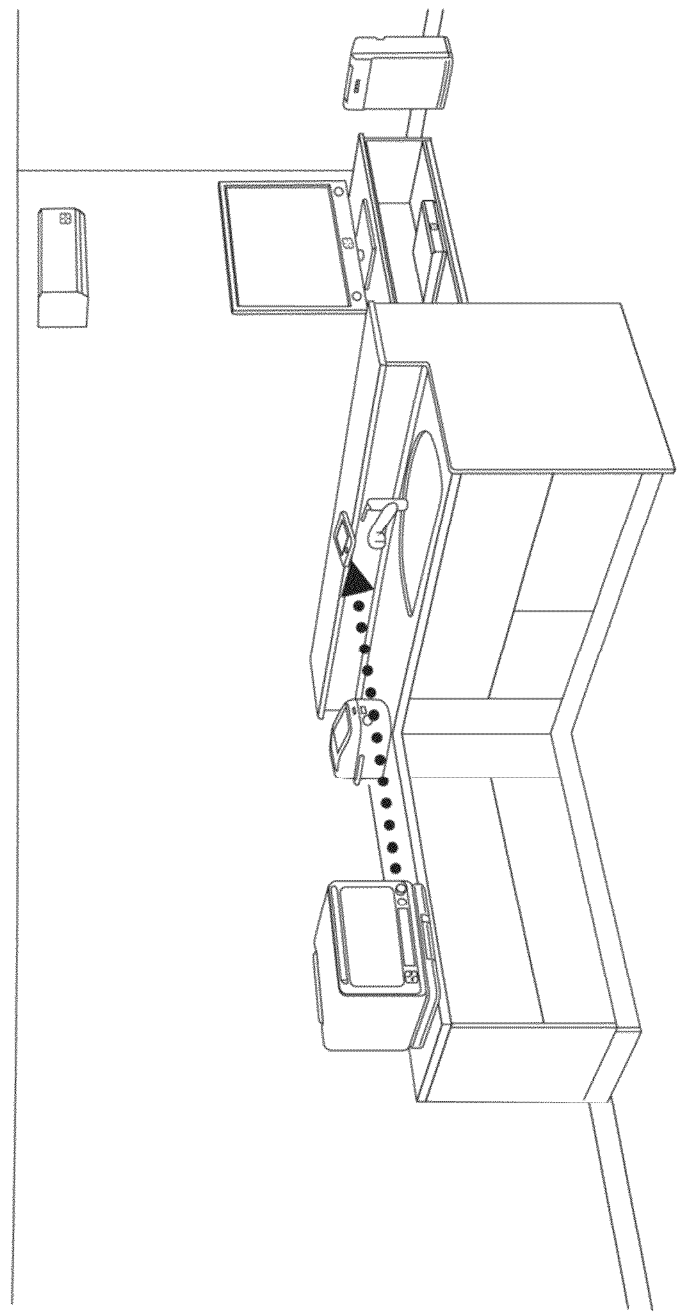

FIG. 168 is a diagram illustrating that the mobile phone recognizes microwave operation end sound according to Embodiment 9

Figure 169:
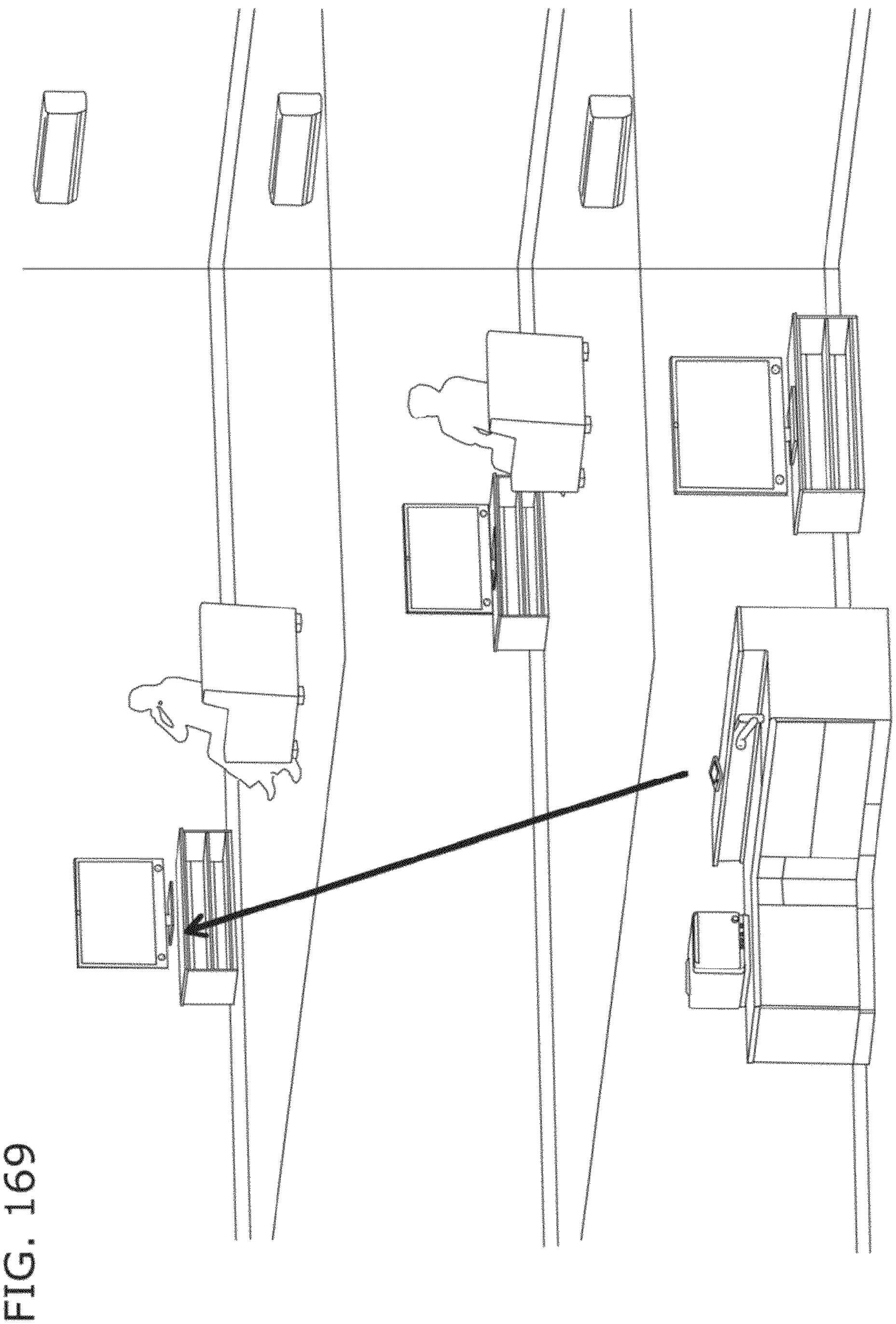

FIG. 169 is a diagram illustrating that the mobile phone which has recognized the end of the operation of the microwave transmits an instruction to, among the devices which have detected the user, a device having a screen-display function and a sound output function to notify the user of the end of the microwave operation.

Figure 170:
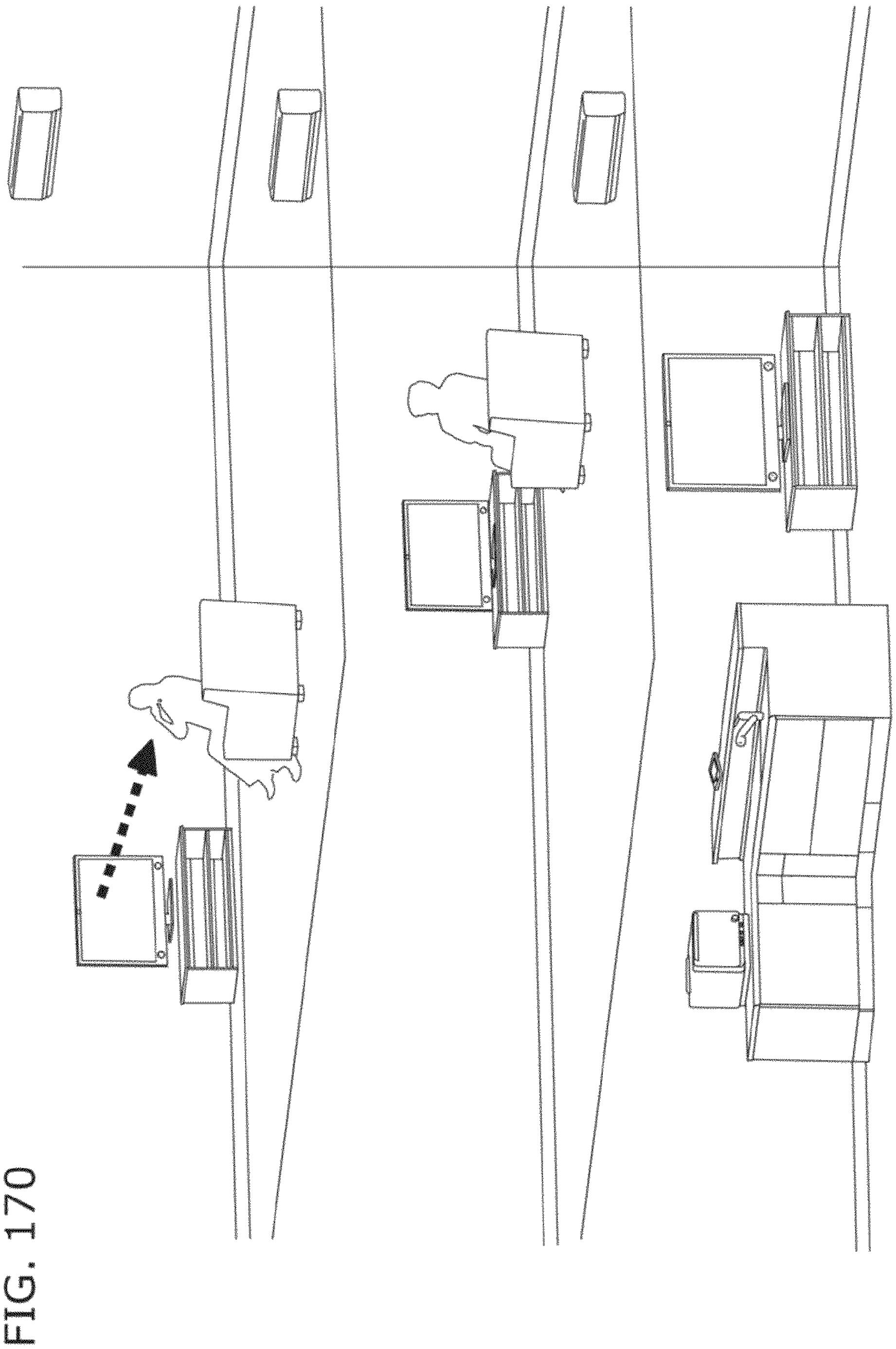

FIG. 170 is a diagram illustrating that the device which has received an instruction notifies the user of the details of the notification.

Figure 171:
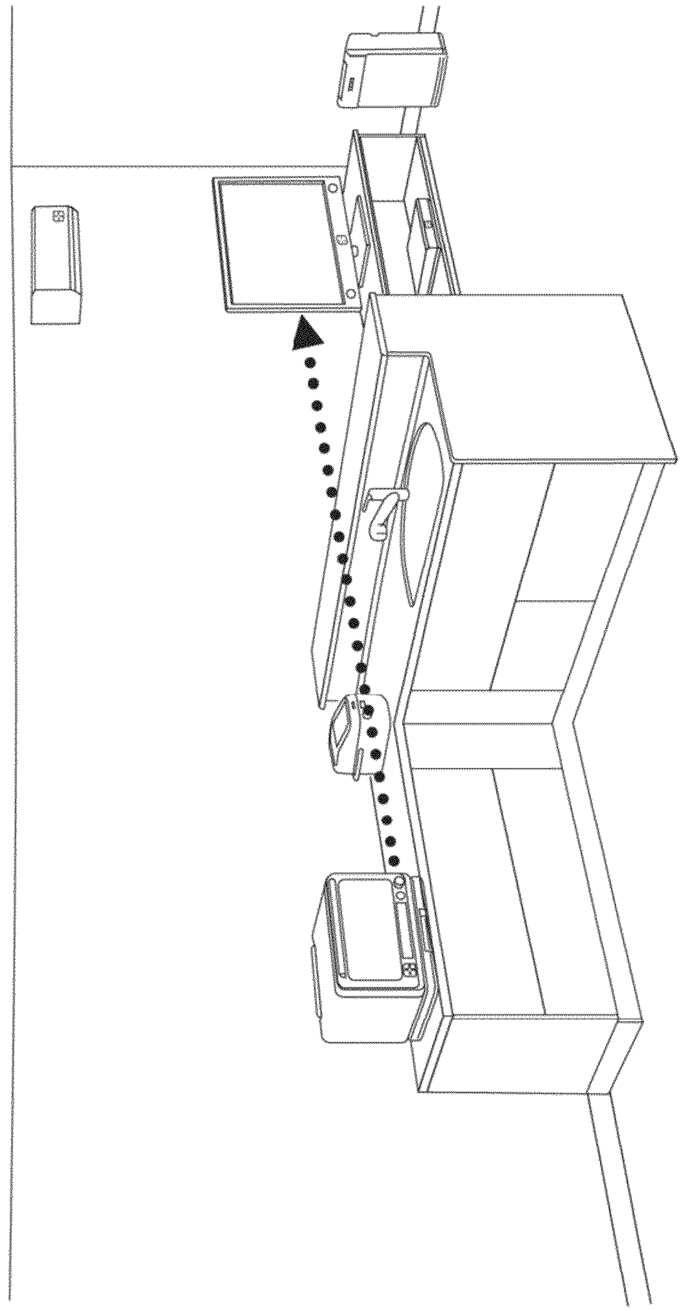

FIG. 171 is a diagram illustrating that a device which is present near the microwave, is connected to the mobile phone via a network, and includes a microphone recognizes the microwave operation end sound.

Figure 172:
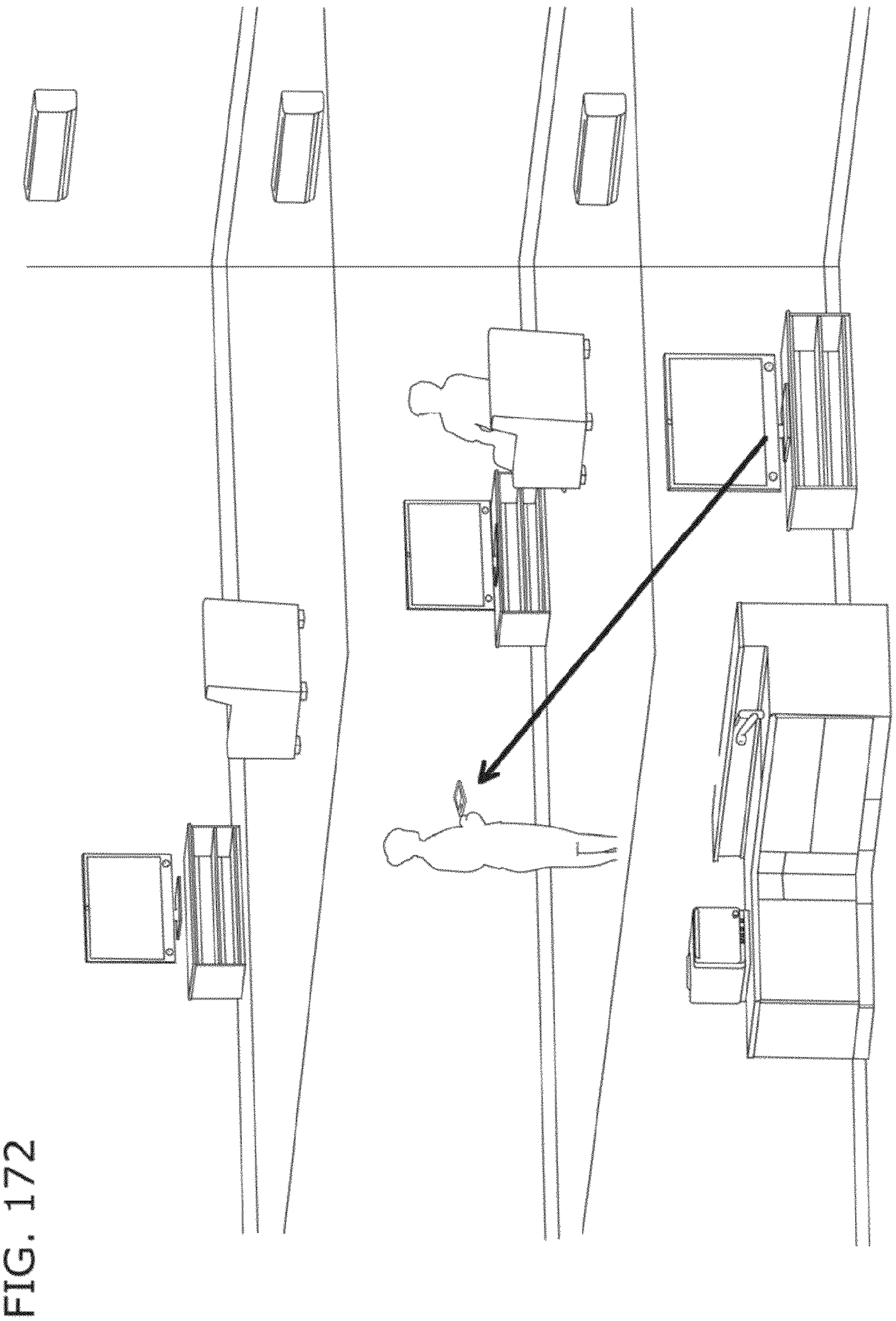

FIG. 172 is a diagram illustrating that the device which has recognized the end of operation of the microwave notifies the mobile phone thereof.

Figure 173:
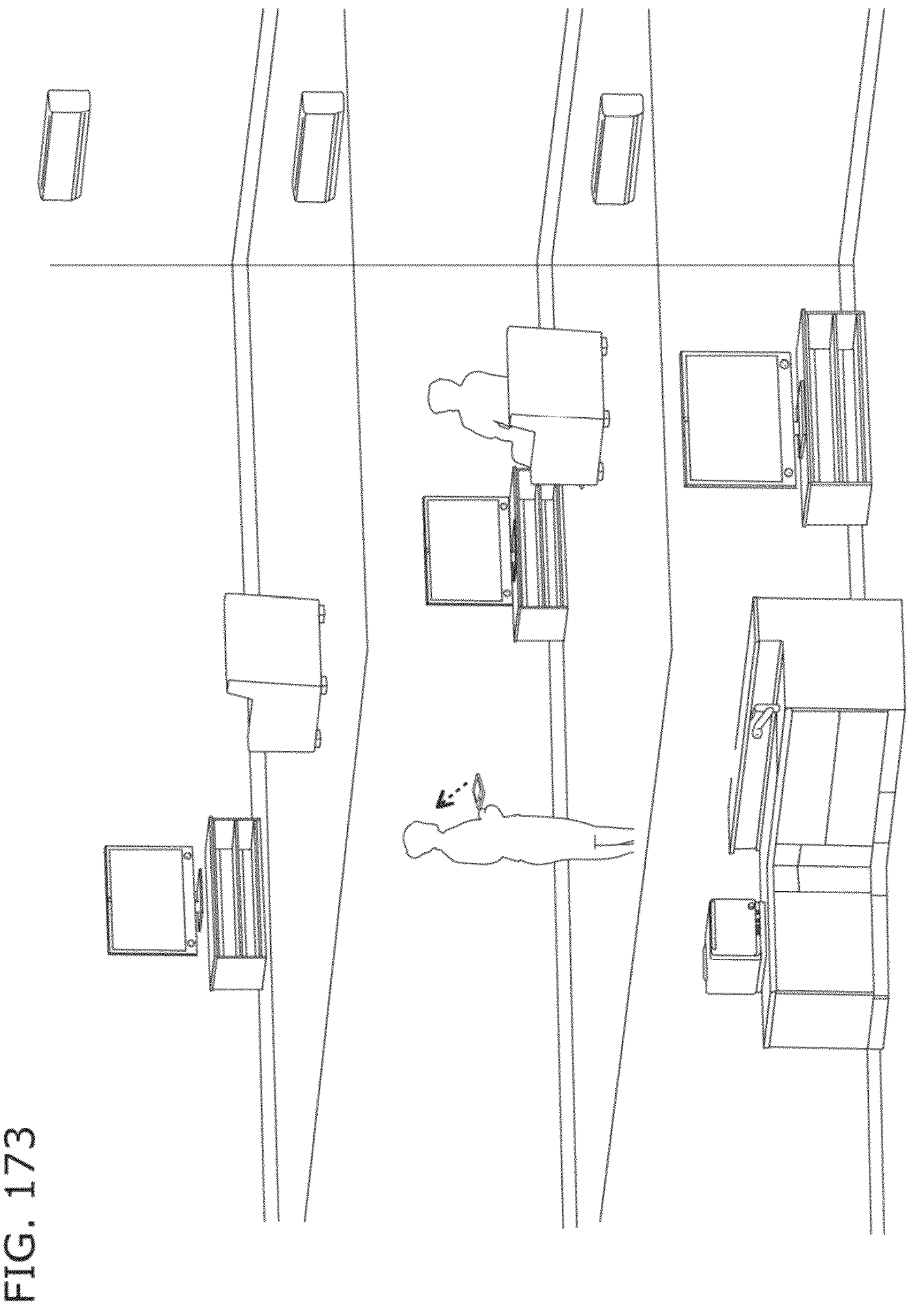

FIG. 173 is a diagram illustrating that if the mobile phone is near the user when the mobile phone receives the notification indicating the end of the operation of the microwave, the user is notified of the end of the operation of the microwave, using screen display, sound output, and the like by the mobile phone.

Figure 174:
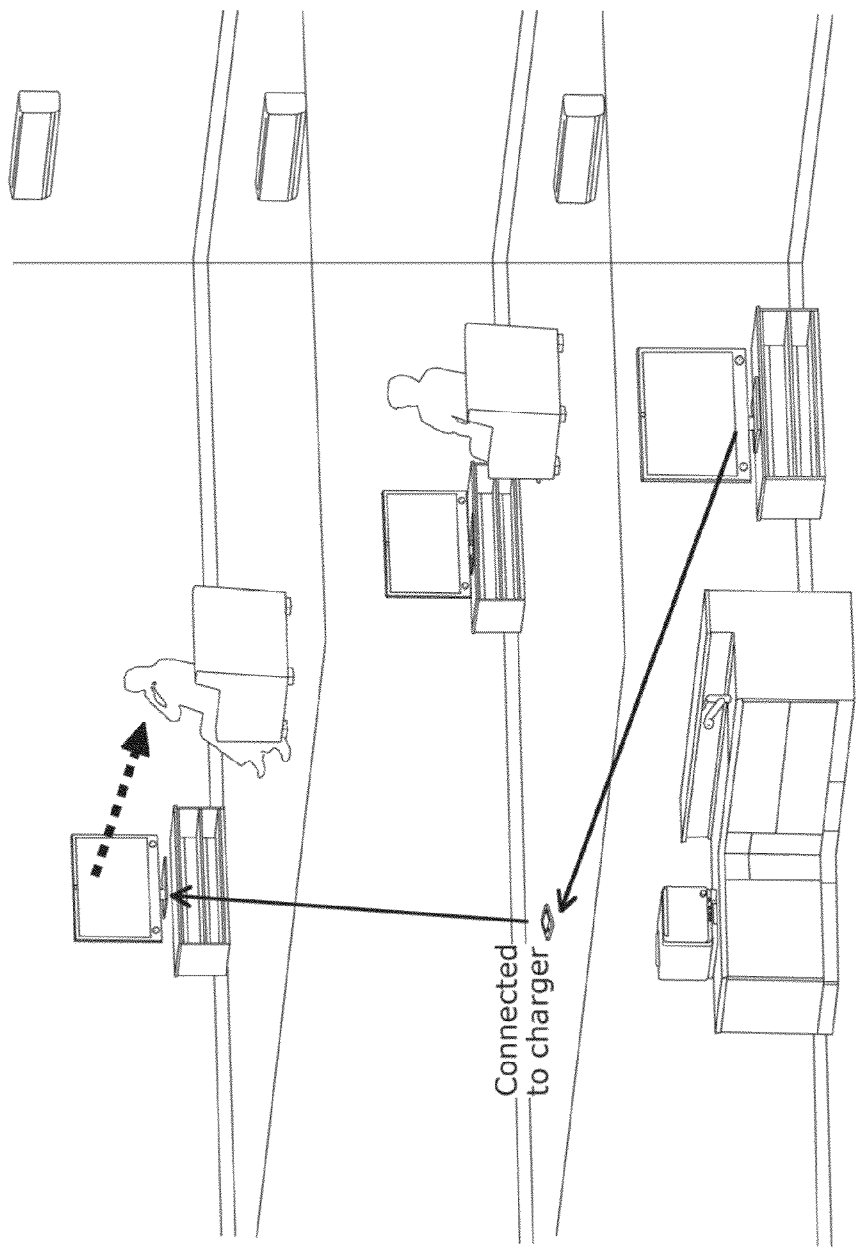

FIG. 174 is a diagram illustrating that the user is notified of the end of the operation of the microwave.

Figure 175:
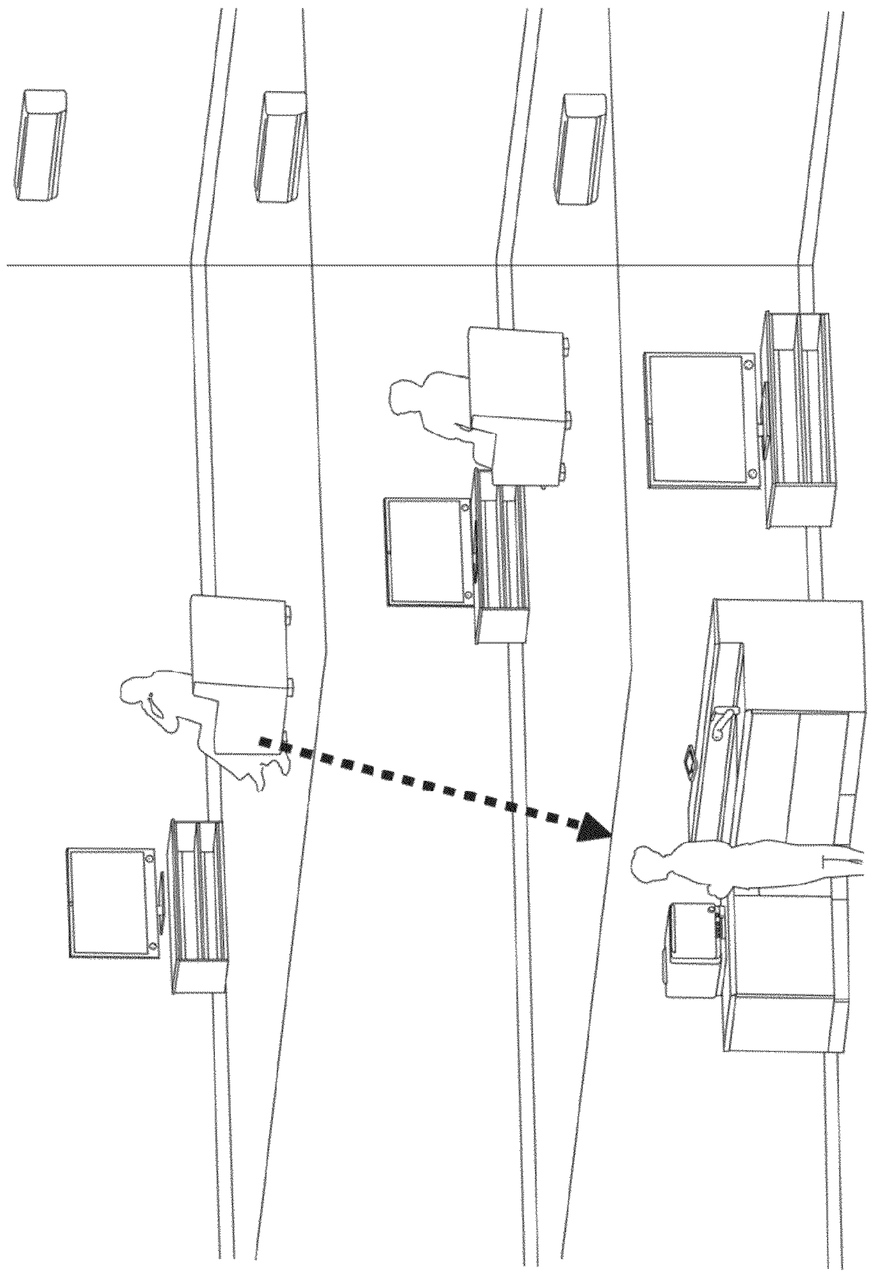

FIG. 175 is a diagram illustrating that the user who has received the notification indicating the end of the operation of the microwave moves to a kitchen.

Figure 176:
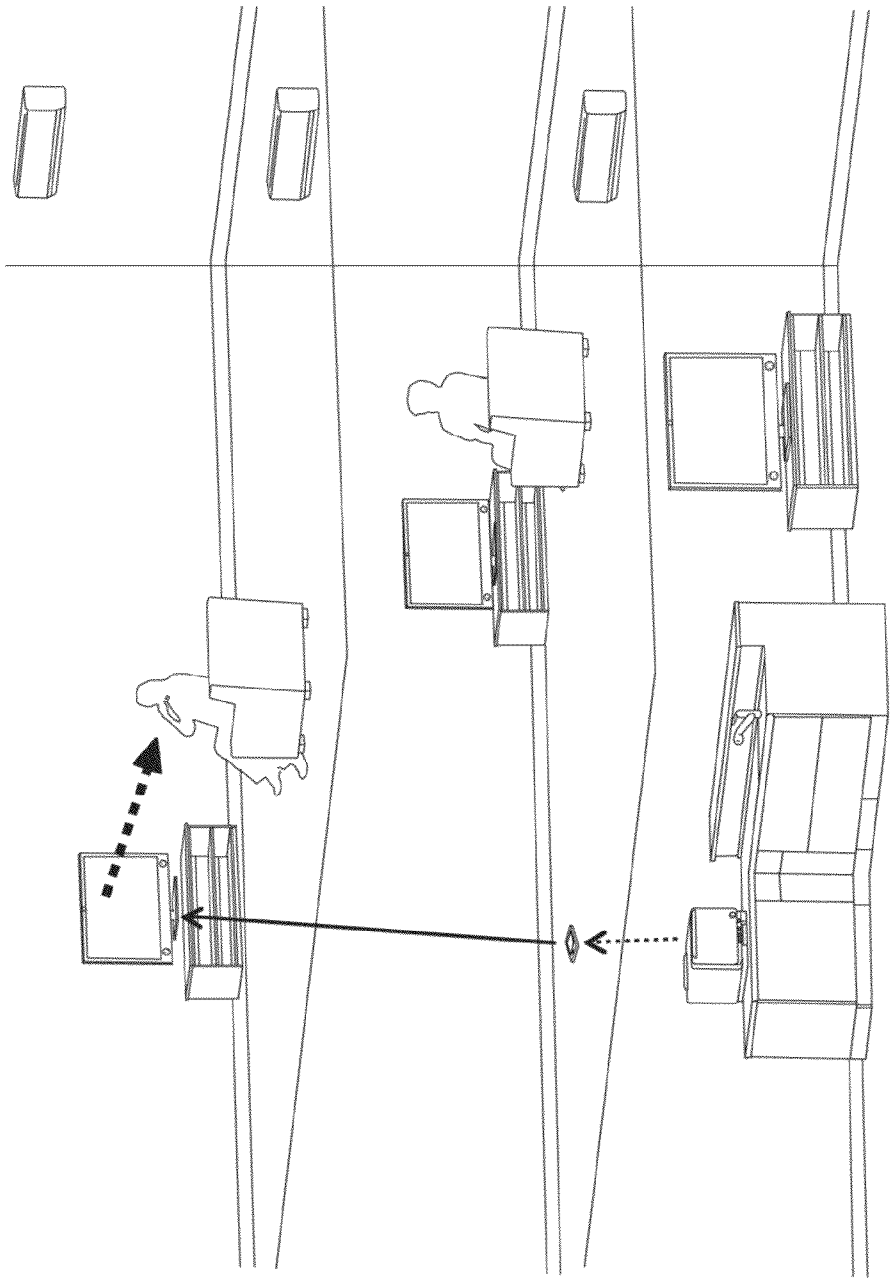

FIG. 176 is a diagram illustrating that the microwave transmits information such as the end of operation to the mobile phone by wireless communication, the mobile phone gives a notification instruction to the television which the user is watching, and the user is notified by a screen display and sound of the television.

Figure 177:
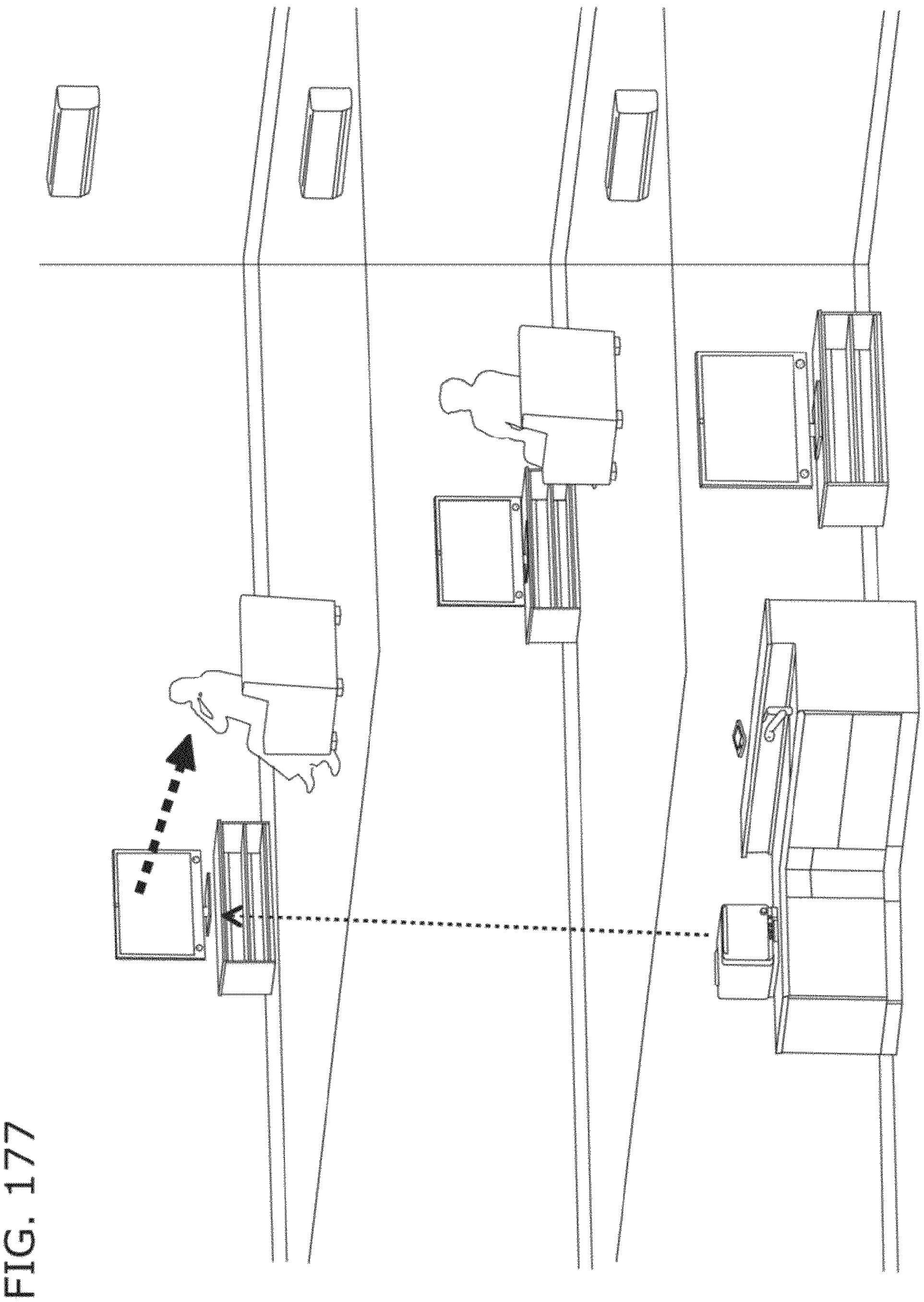

FIG. 177 is a diagram illustrating that the microwave transmits information such as the end of operation to the television which the user is watching by wireless communication, and the user is notified thereof using the screen display and sound of the television.

Figure 178:
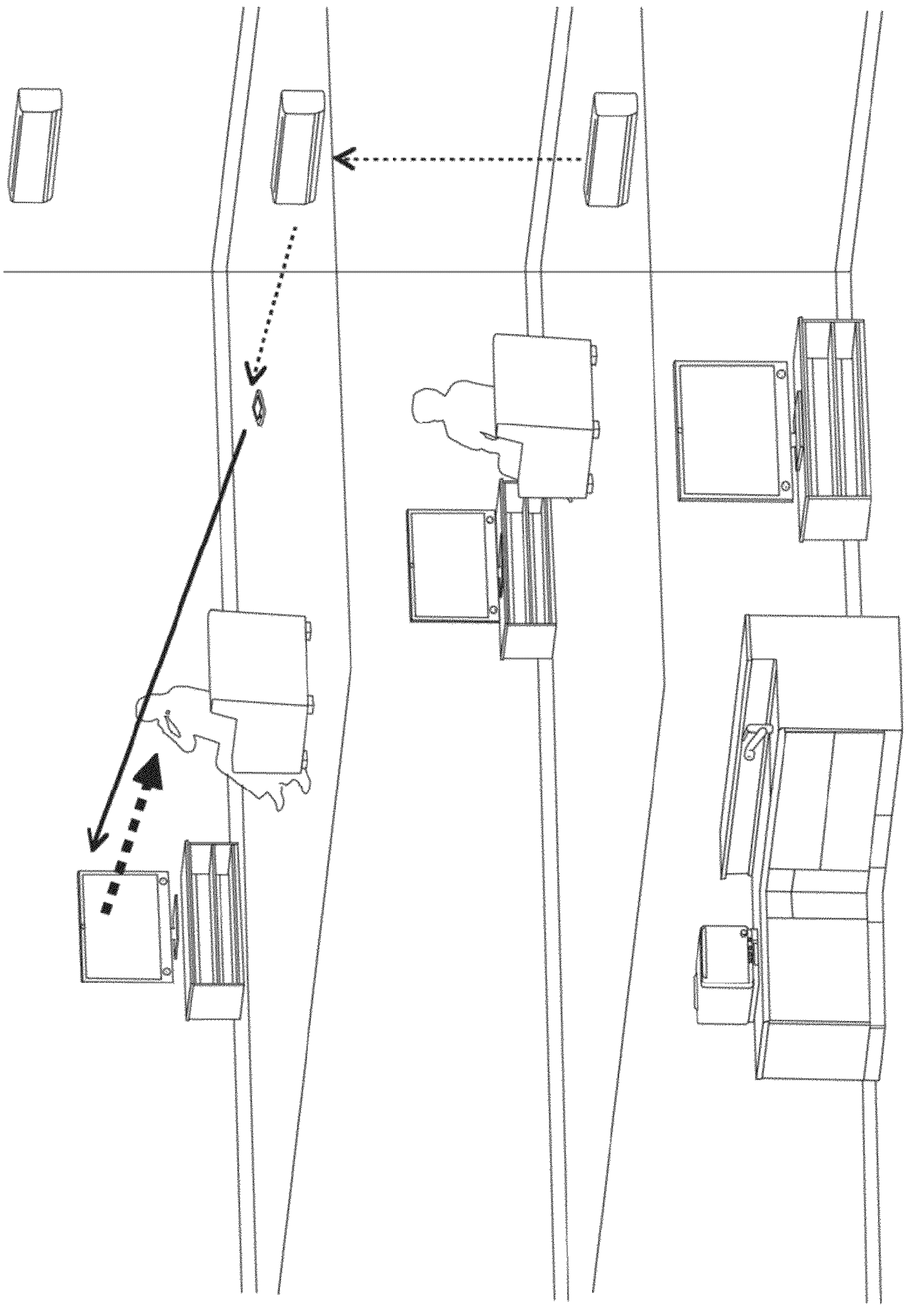

FIG. 178 is a diagram illustrating that the user is notified by the screen display and sound of the television.

Figure 179:
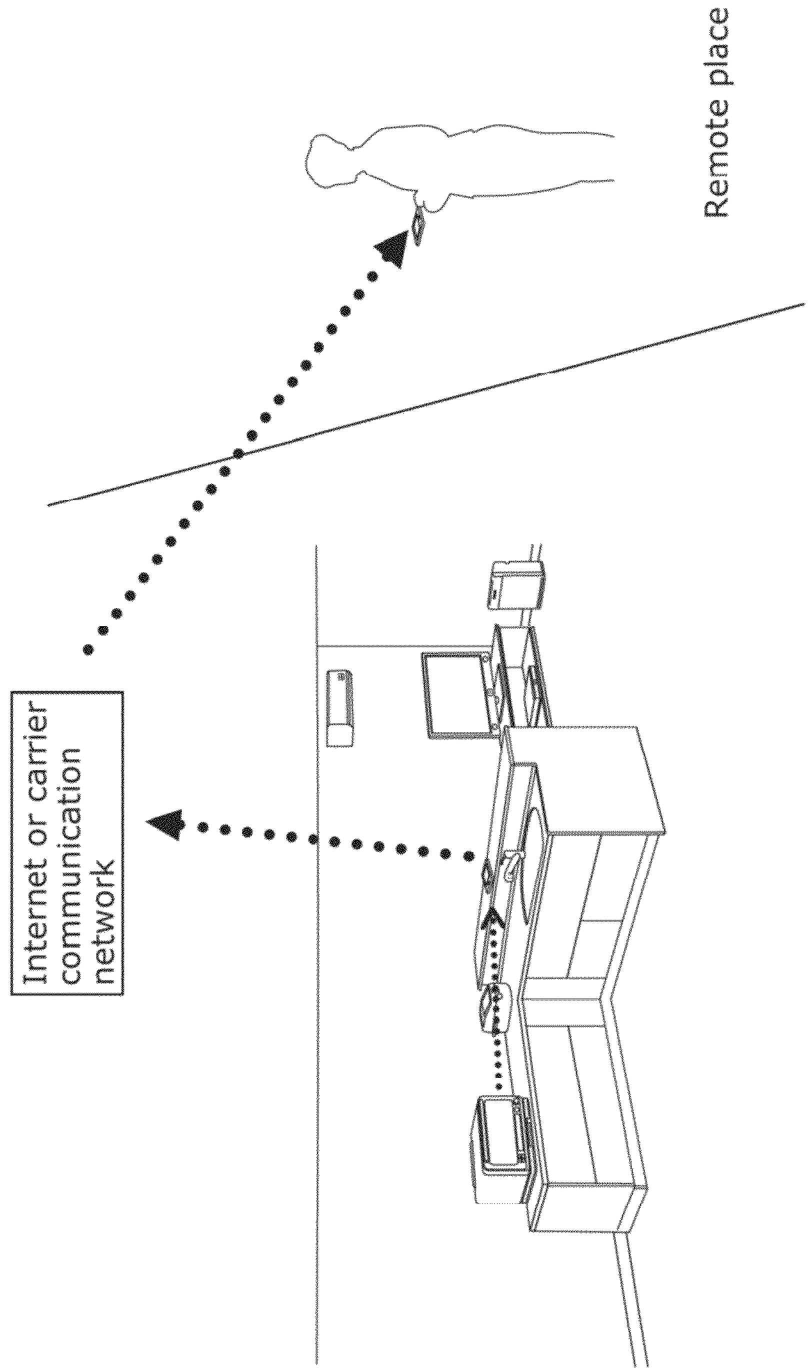

FIG. 179 is a diagram illustrating that a user who is at a remote place is notified of information.

Figure 180:
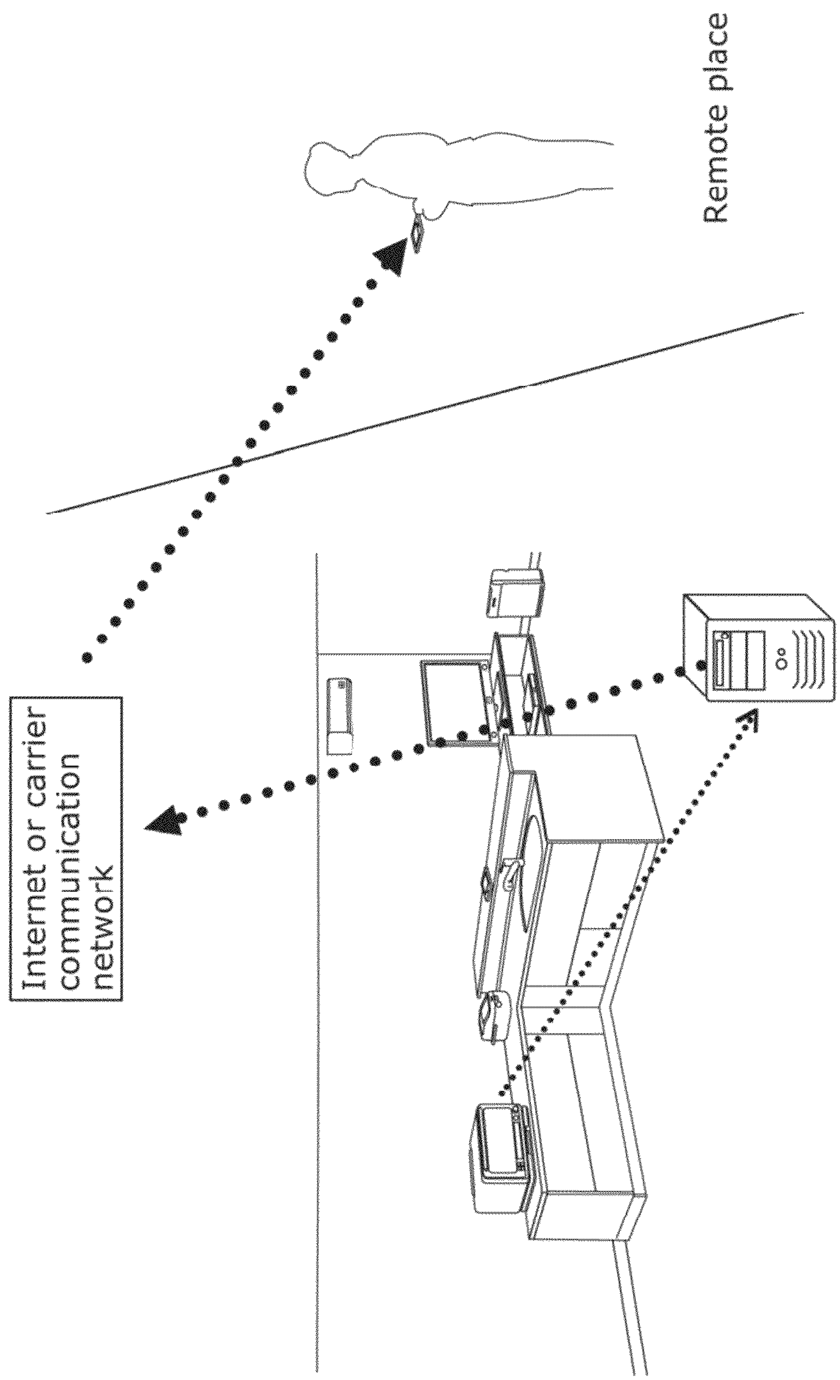

FIG. 180 is a diagram illustrating that if the microwave cannot directly communicate with the mobile phone serving as a hub, the microwave transmits information to the mobile phone via a personal computer, for instance.

Figure 181:
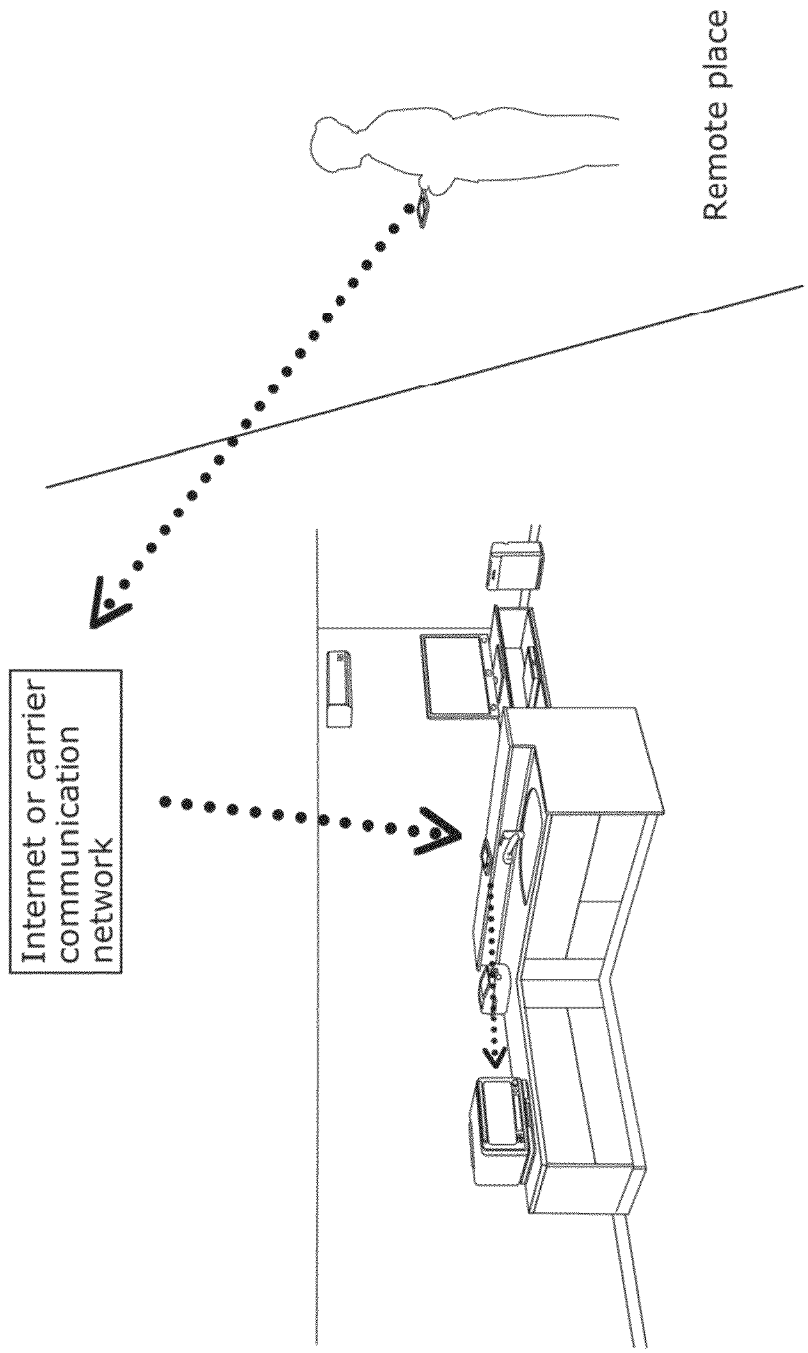

FIG. 181 is a diagram illustrating that the mobile phone which has received communication in FIG. 180 transmits information such as an operation instruction to the microwave, following the information-and-communication path in an opposite direction.

Figure 182:
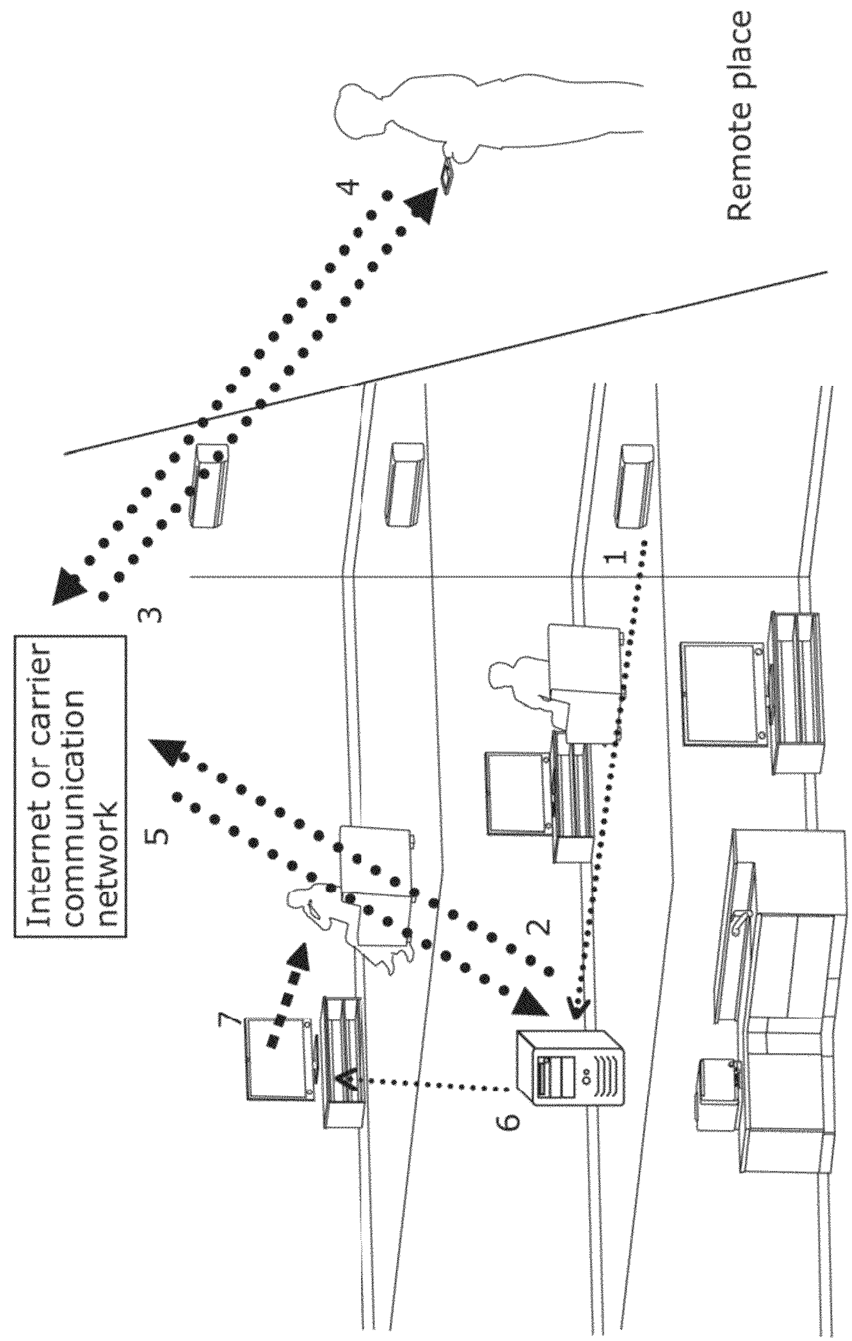

FIG. 182 is a diagram illustrating that in the case where the air-conditioner which is an information source device cannot directly communicate with the mobile phone serving as a hub, the air-conditioner notifies the user of information.

Figure 183:
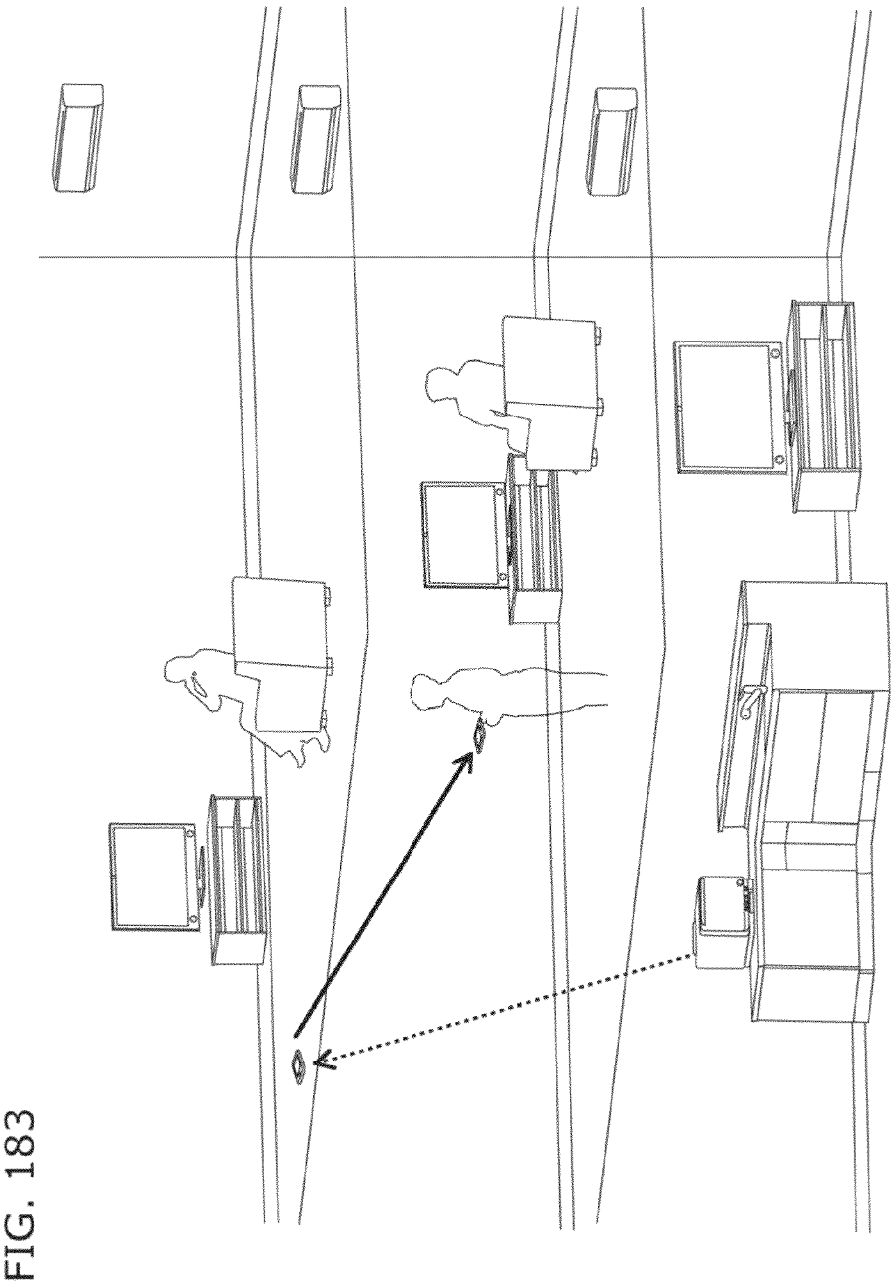

FIG. 183 is a diagram for describing a system utilizing a communication device which uses a 700 to 900 MHz radio wave.

Figure 184:
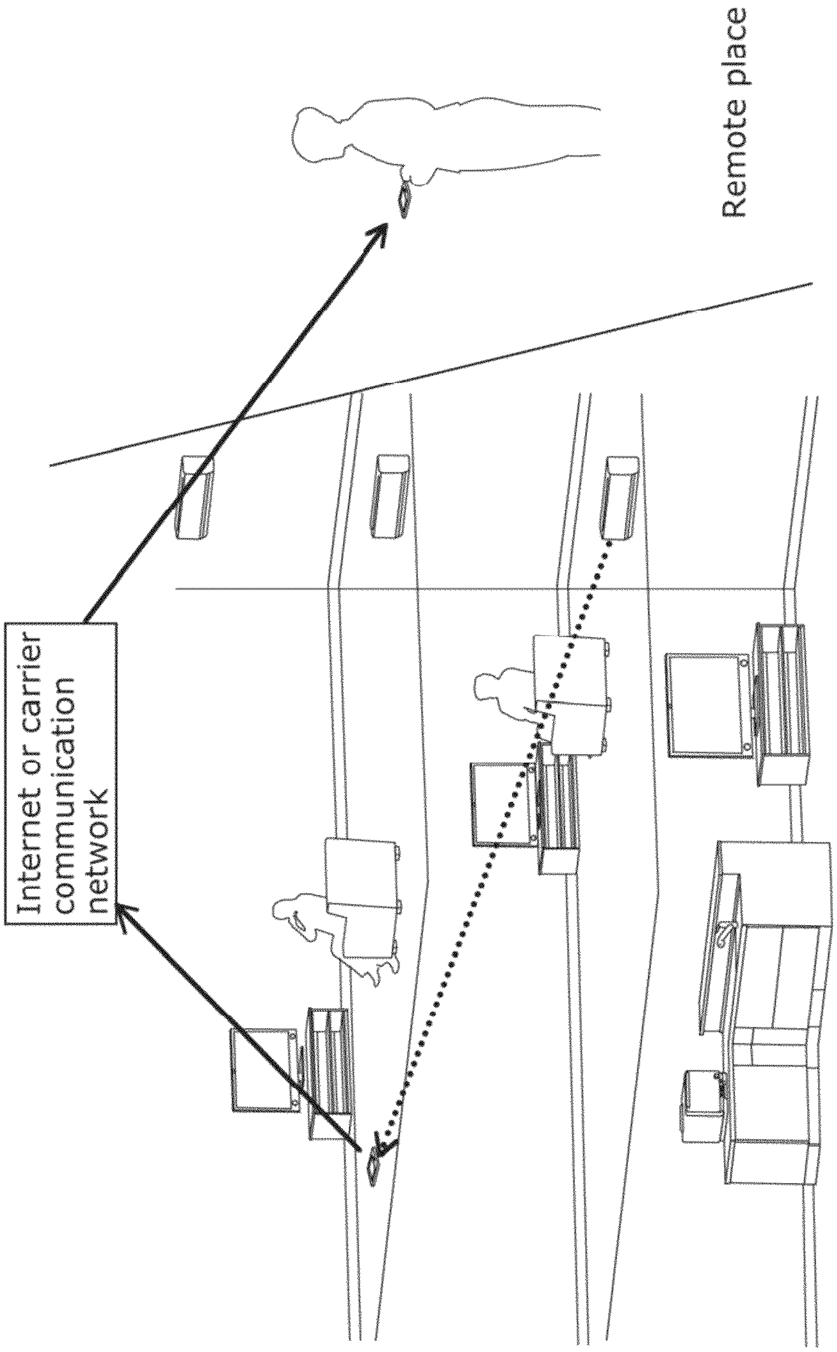

FIG. 184 is a diagram illustrating that a mobile phone at a remote place notifies a user of information.

Figure 185:
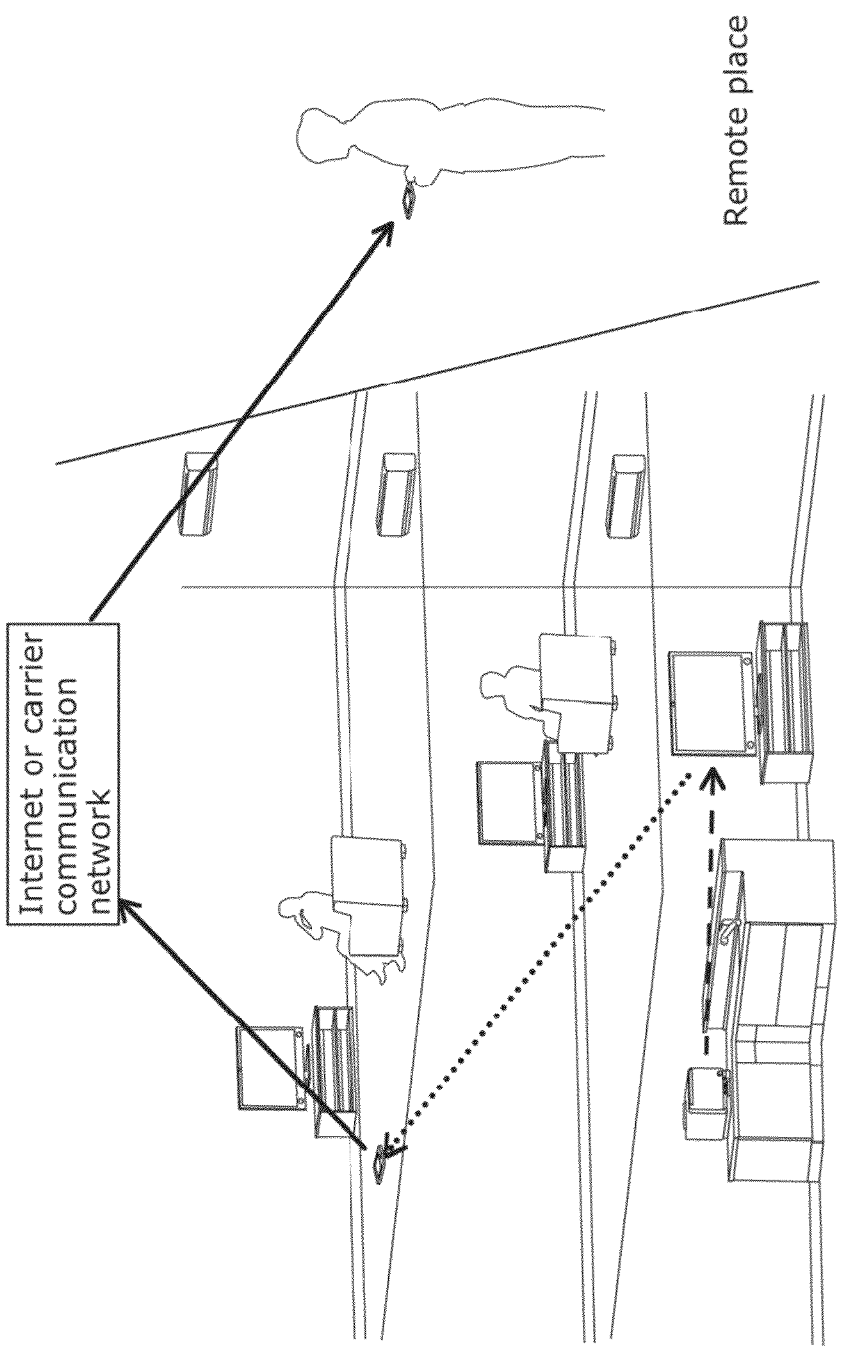

FIG. 185 is a diagram illustrating that the mobile phone at a remote place notifies the user of information.

Figure 186:
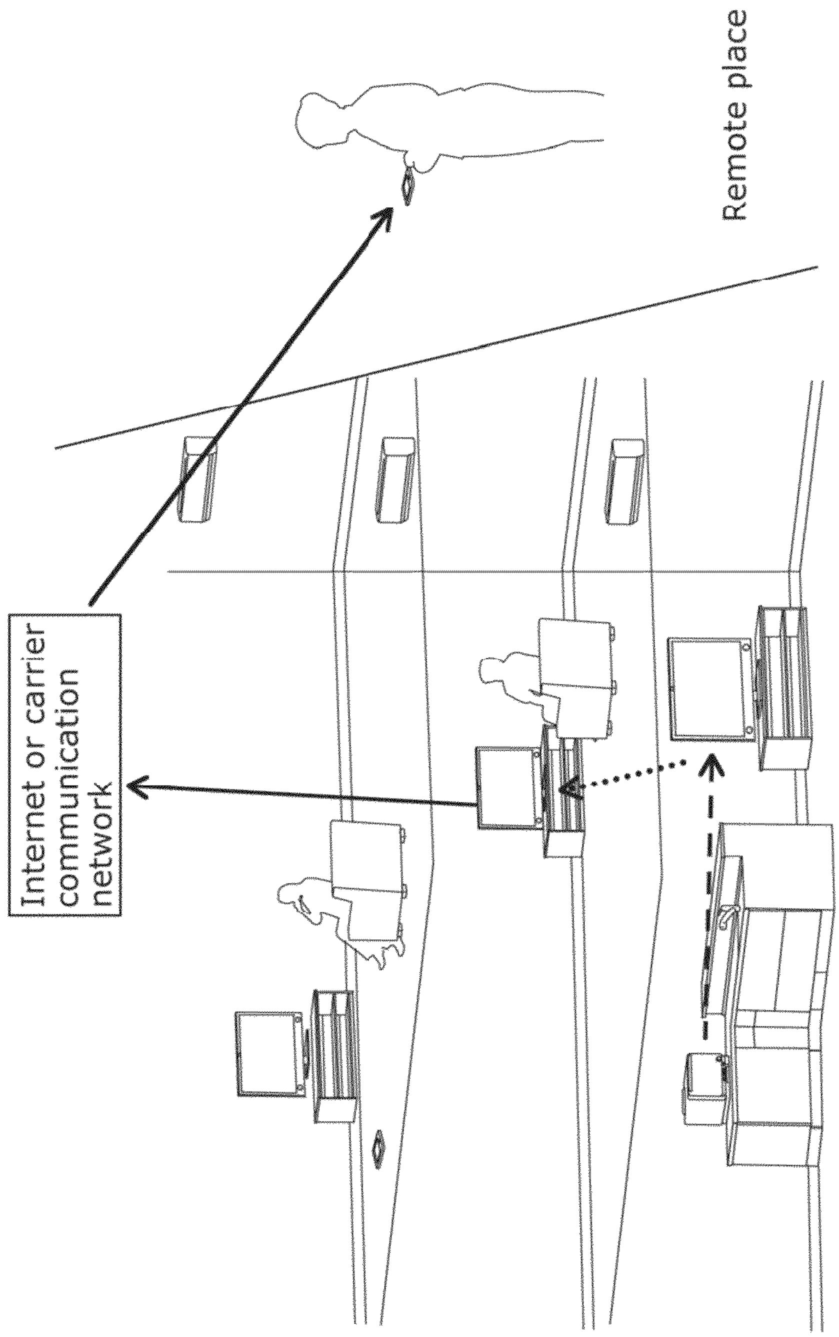

FIG. 186 is a diagram illustrating that in a similar case to that of FIG. 185, a television on the second floor serves as a relay device instead of a device which relays communication between a notification recognition device and an information notification device.

Figure 187:
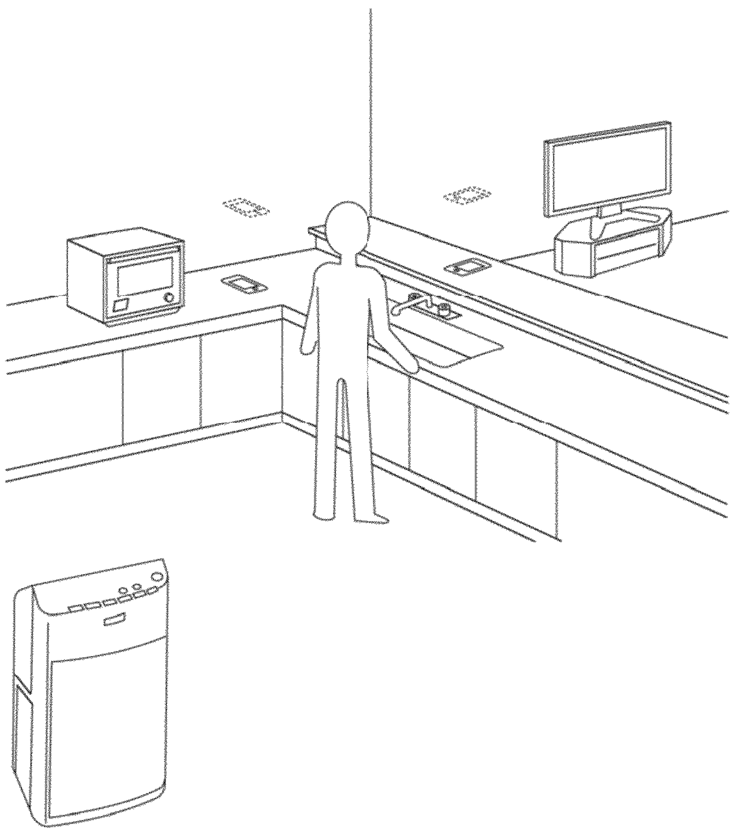

FIG. 187 is a diagram illustrating an example of an environment in a house in Embodiment 10.

Figure 188:
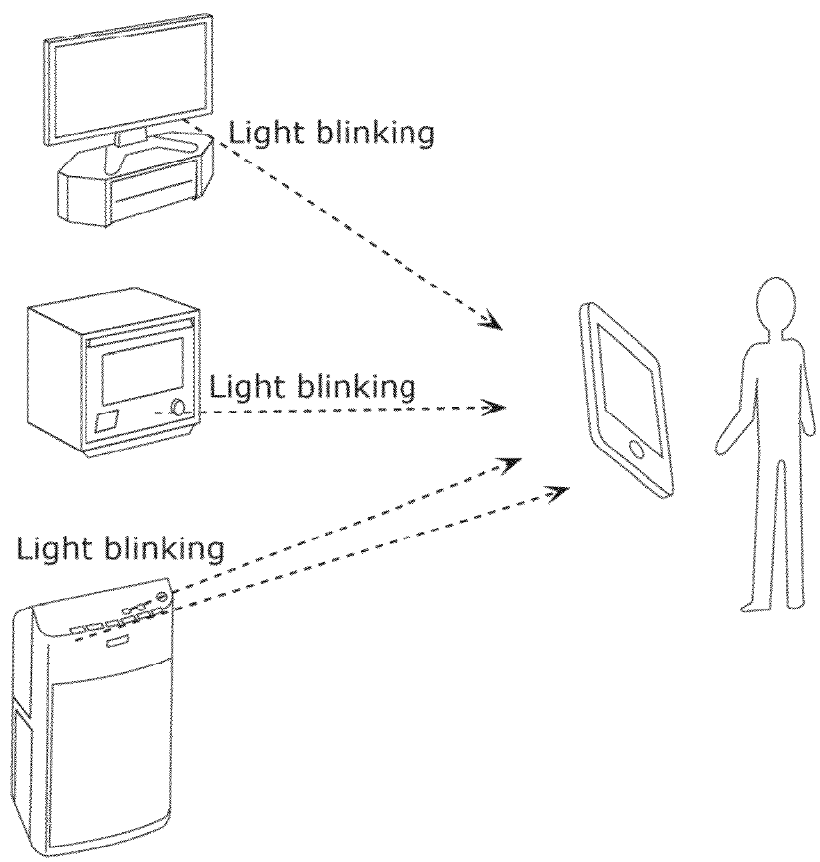

FIG. 188 is a diagram illustrating an example of communication between a smartphone and home electric appliances according to Embodiment 10.

Figure 189:
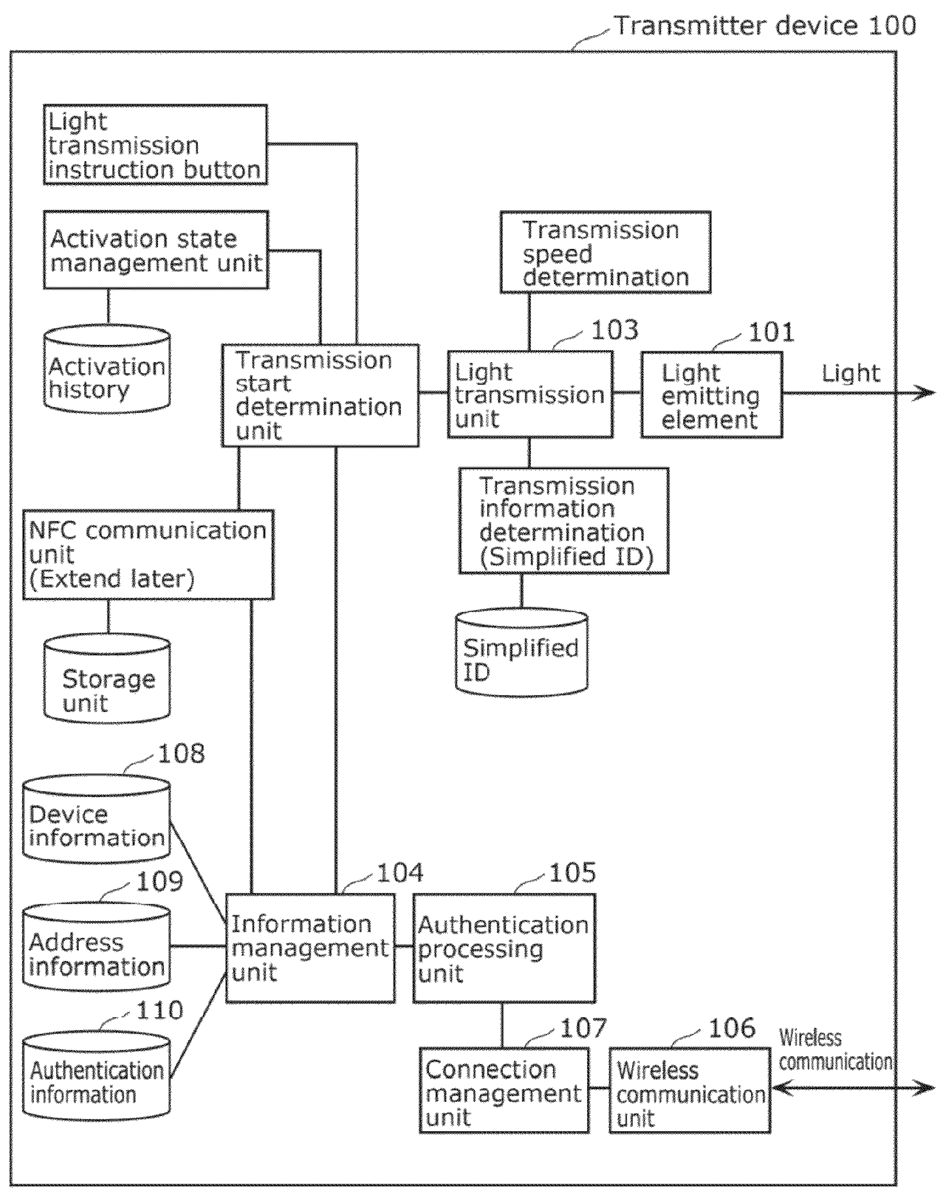

FIG. 189 is a diagram illustrating a configuration of a transmitter device according to Embodiment 10.

Figure 190:
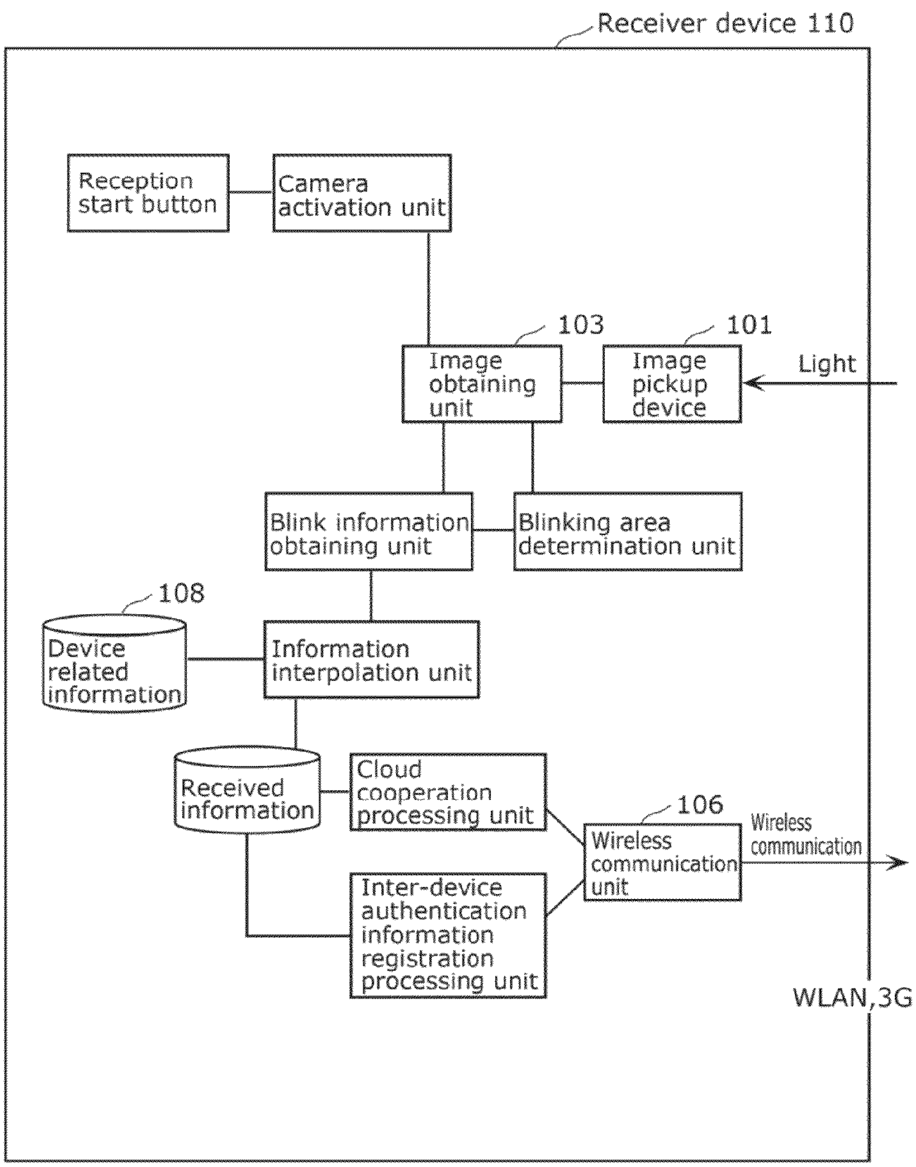

FIG. 190 is a diagram illustrating a configuration of a receiver device according to Embodiment 10.

Figure 191:
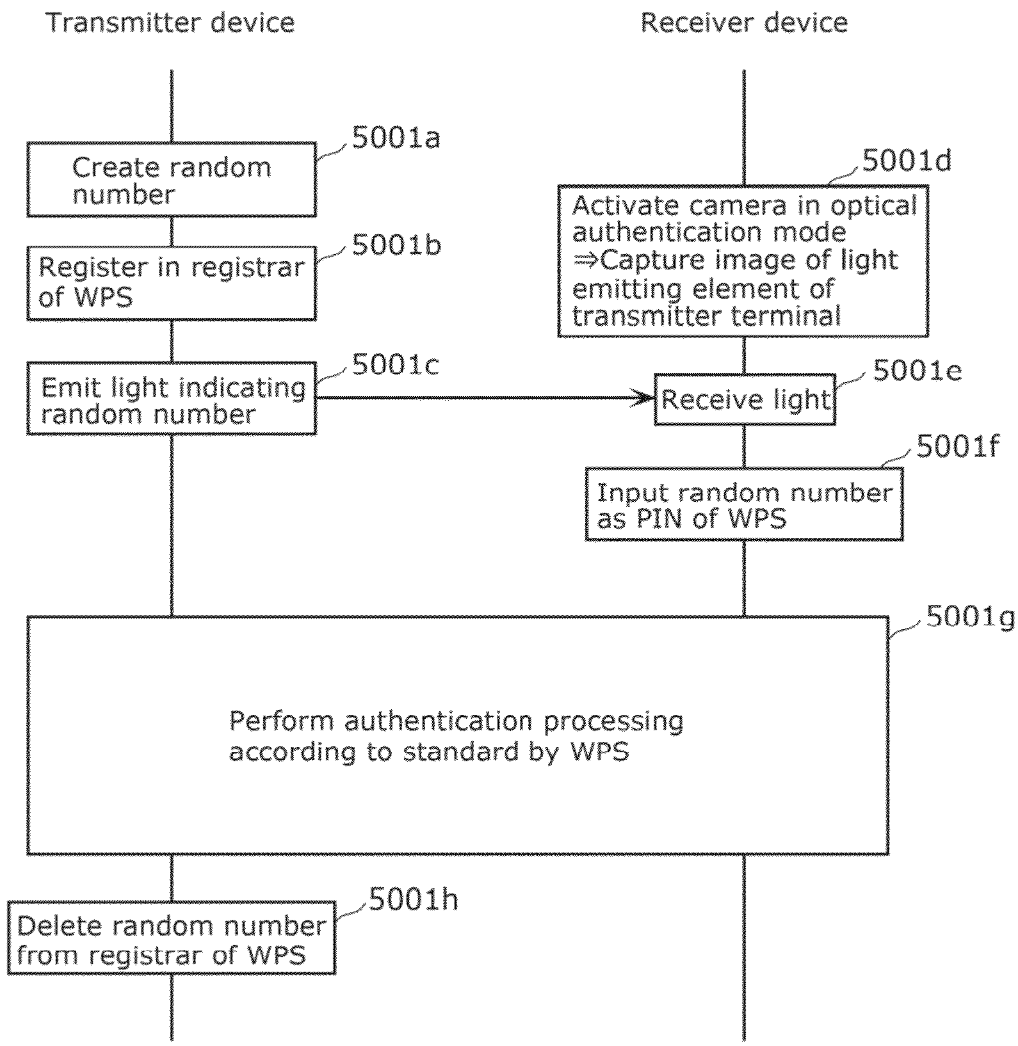

FIG. 191 is a sequence diagram for when a transmitter terminal (TV) performs wireless LAN authentication with a receiver terminal (tablet terminal), using optical communication in FIG. 187.

Figure 192:
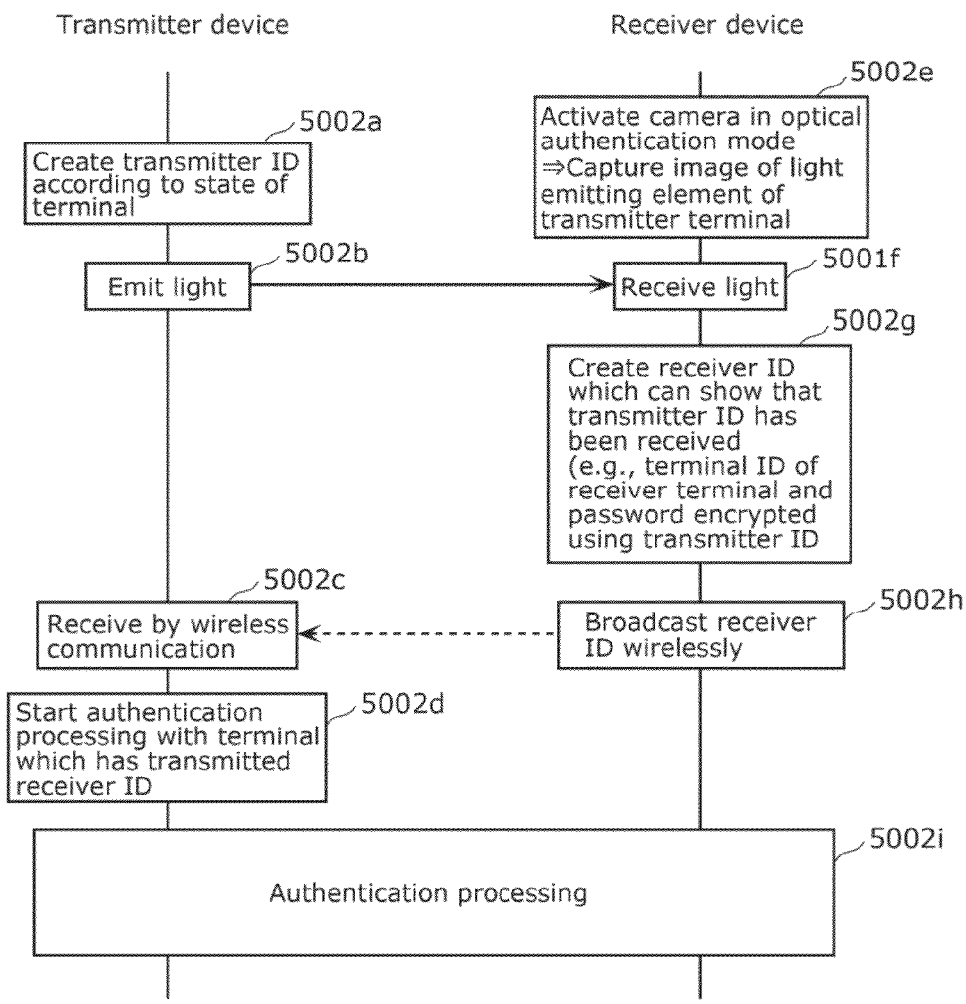

FIG. 192 is a sequence diagram for when authentication is performed using an application according to Embodiment 10.

Figure 193:
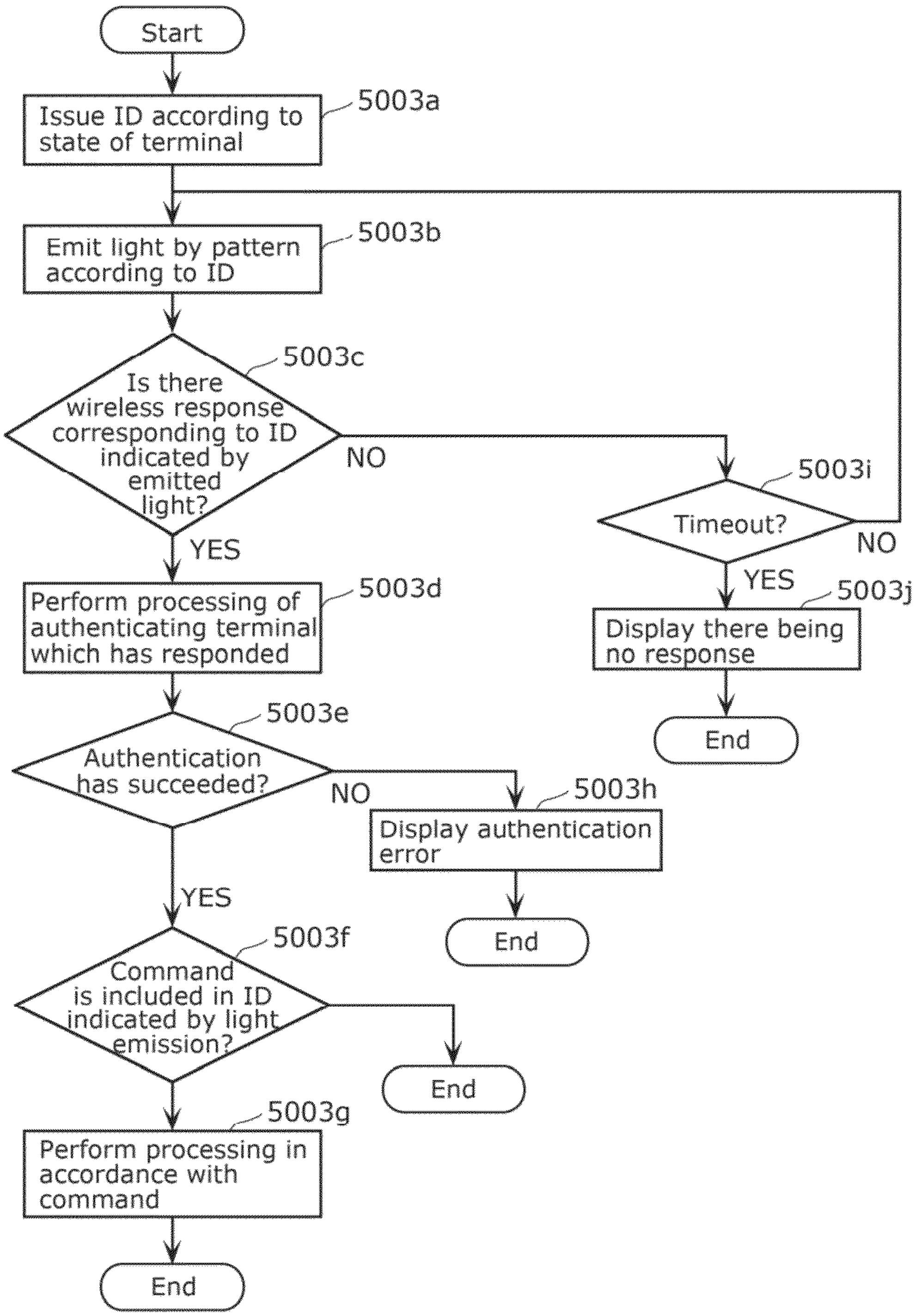

FIG. 193 is a flowchart illustrating operation of the transmitter terminal according to Embodiment 10.

Figure 194:
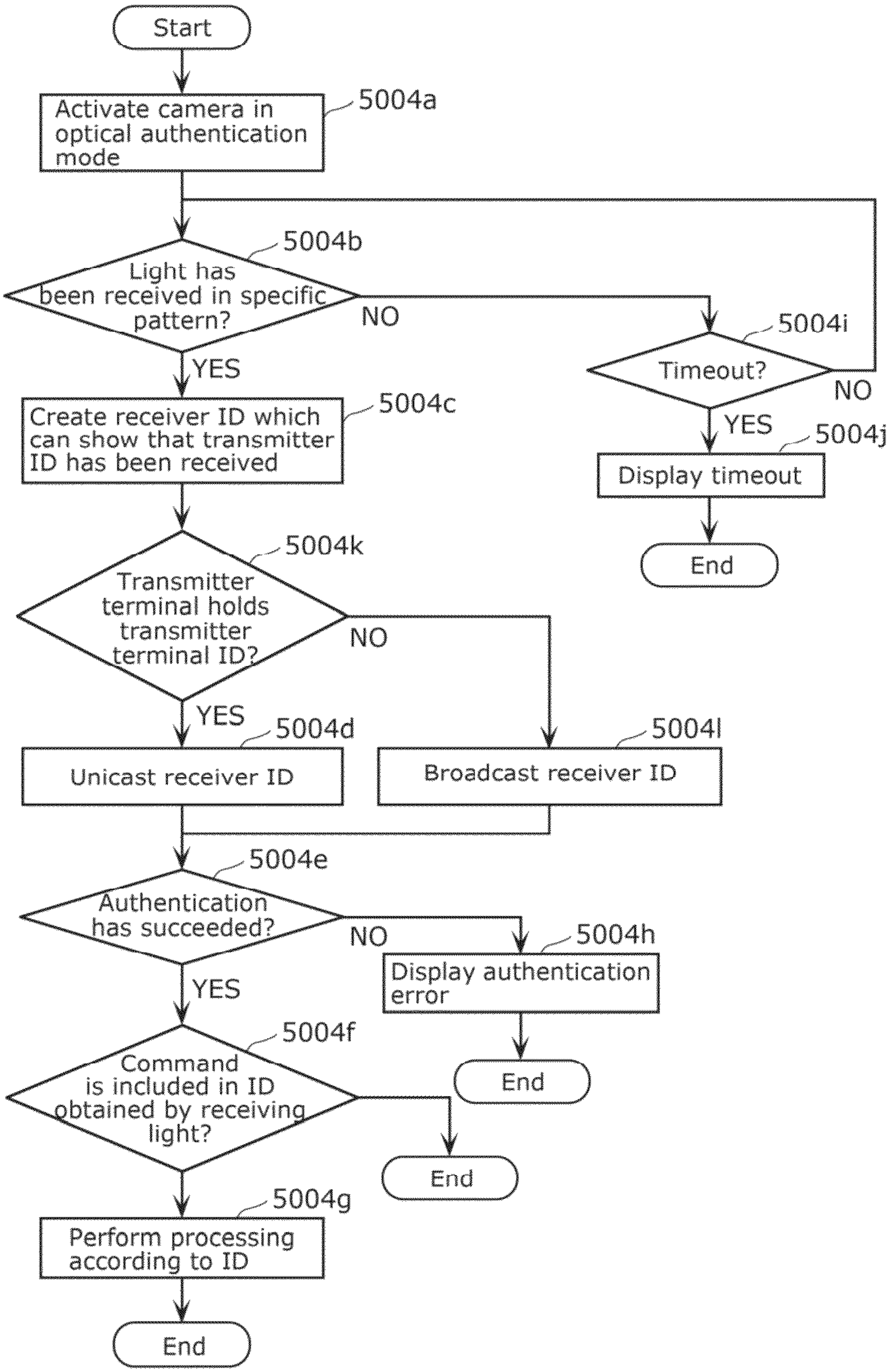

FIG. 194 is a flowchart illustrating operation of the receiver terminal according to Embodiment 10.

Figure 195:
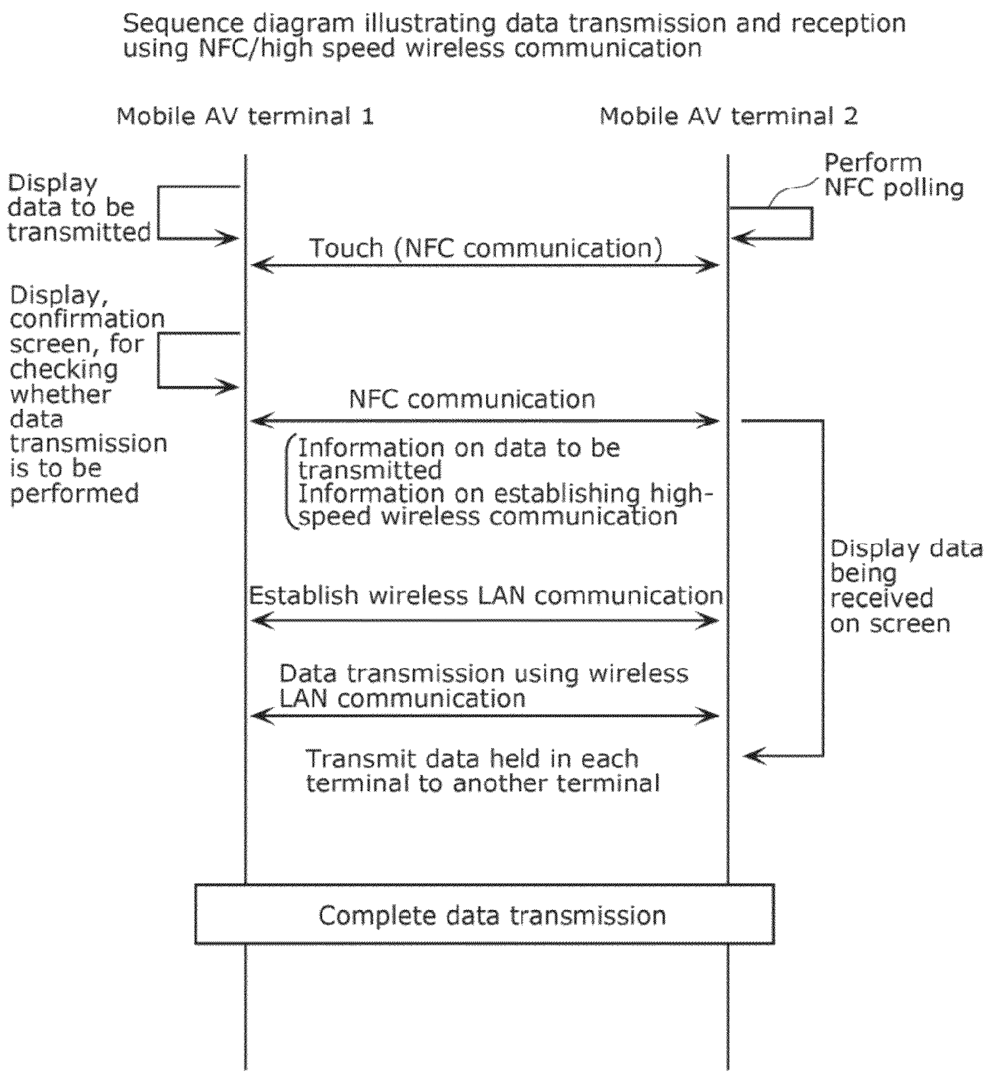

FIG. 195 is a sequence diagram in which a mobile AV terminal 1 transmits data to a mobile AV terminal 2 according to Embodiment 11.

Figure 196:
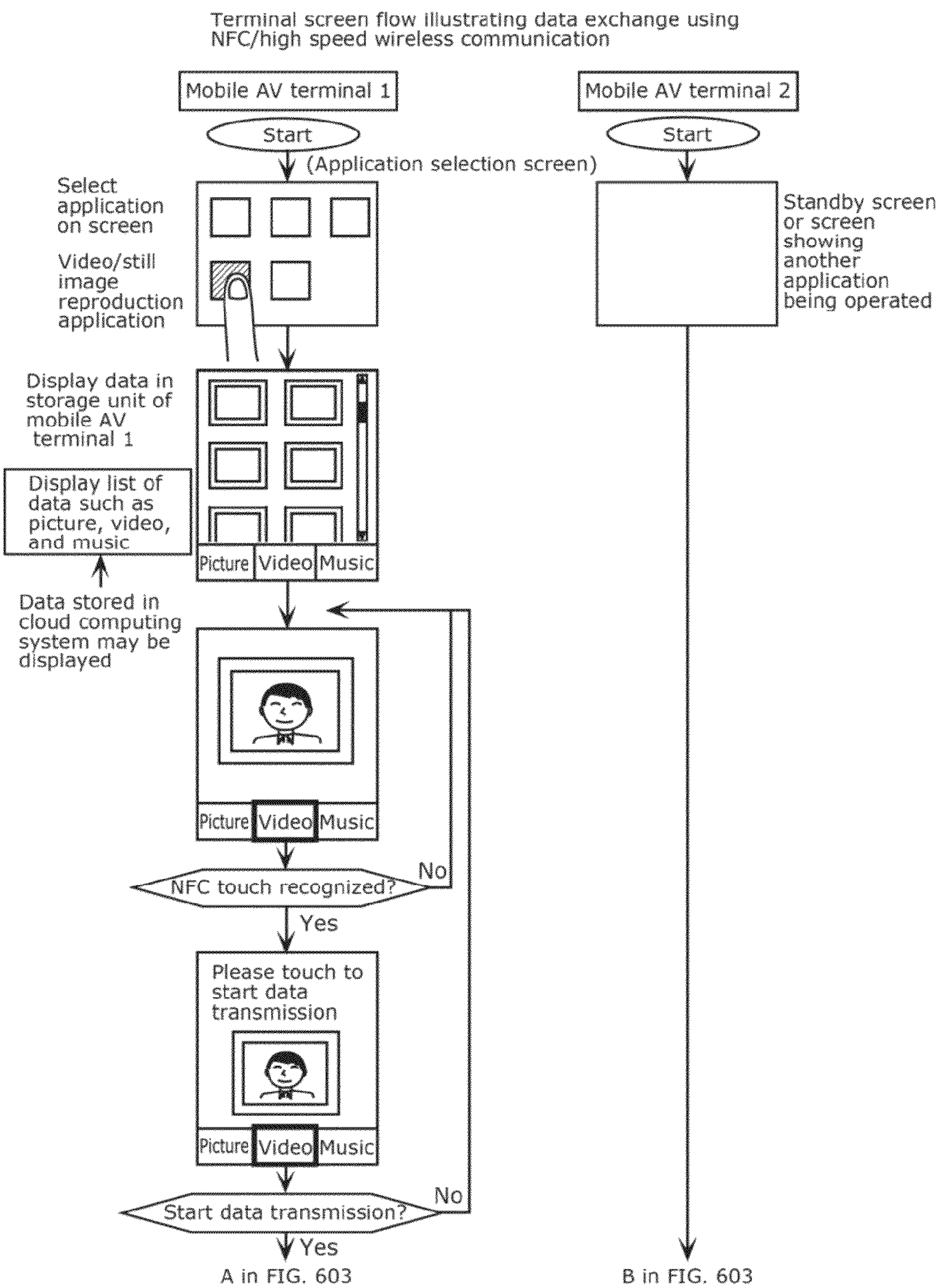

FIG. 196 is a diagram illustrating a screen changed when the mobile AV terminal 1 transmits data to the mobile AV terminal 2 according to Embodiment 11.

Figure 197:
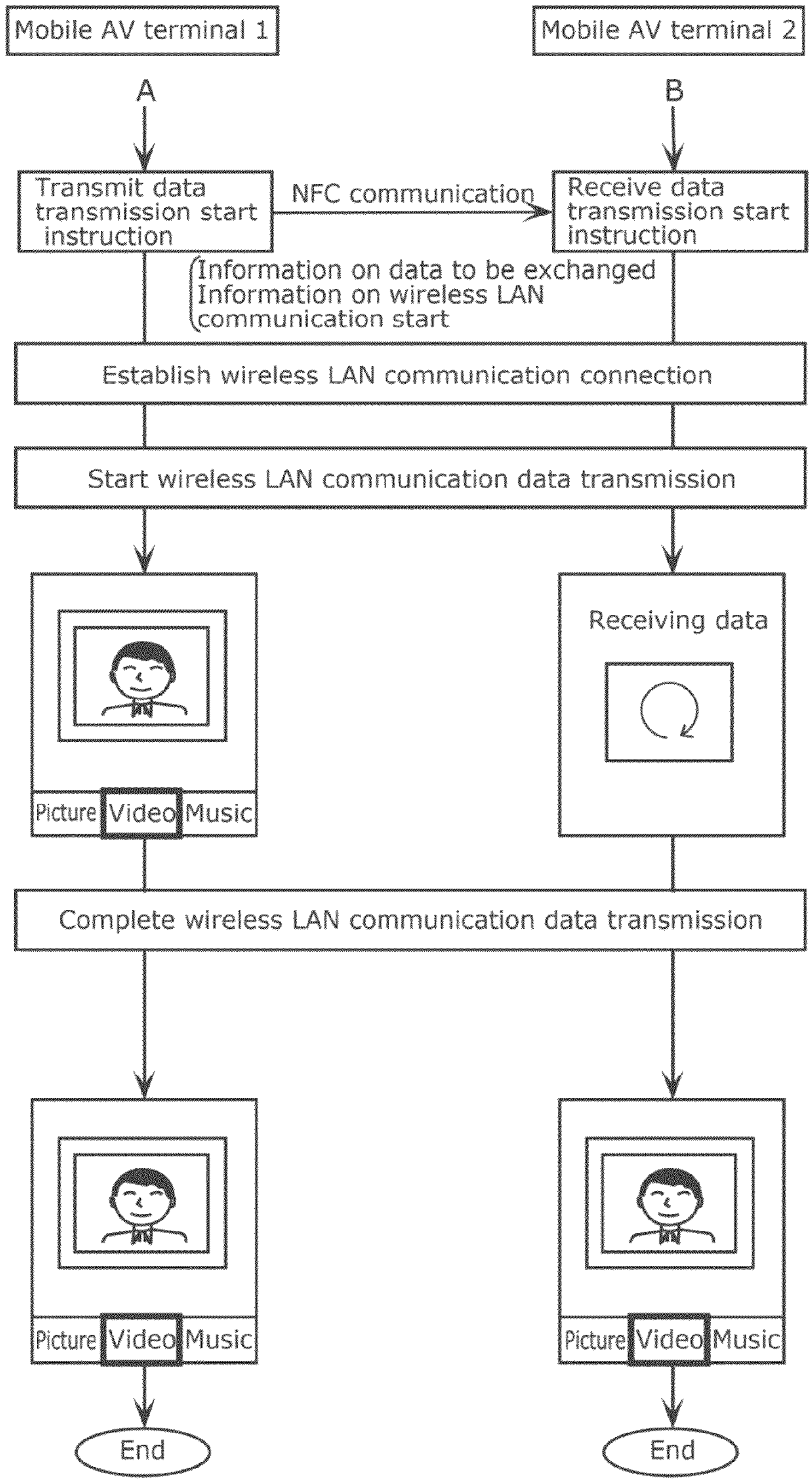

FIG. 197 is a diagram illustrating a screen changed when the mobile AV terminal 1 transmits data to the mobile AV terminal 2 according to Embodiment 11.

Figure 198:
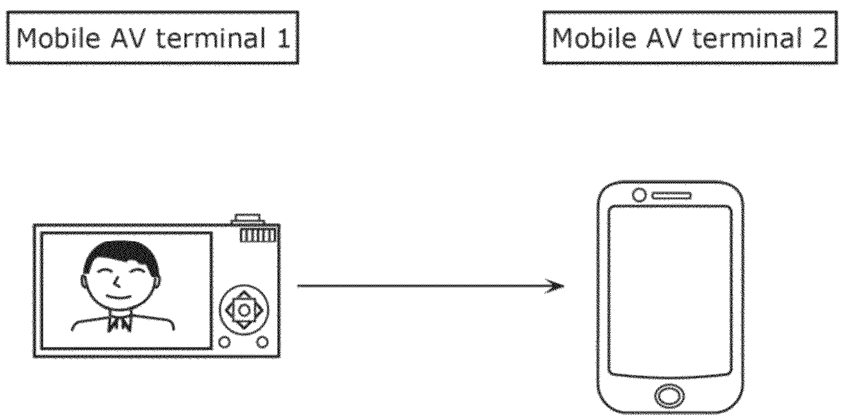

FIG. 198 is a system outline diagram for when the mobile AV terminal 1 is a digital camera according to Embodiment 11.

Figure 199:
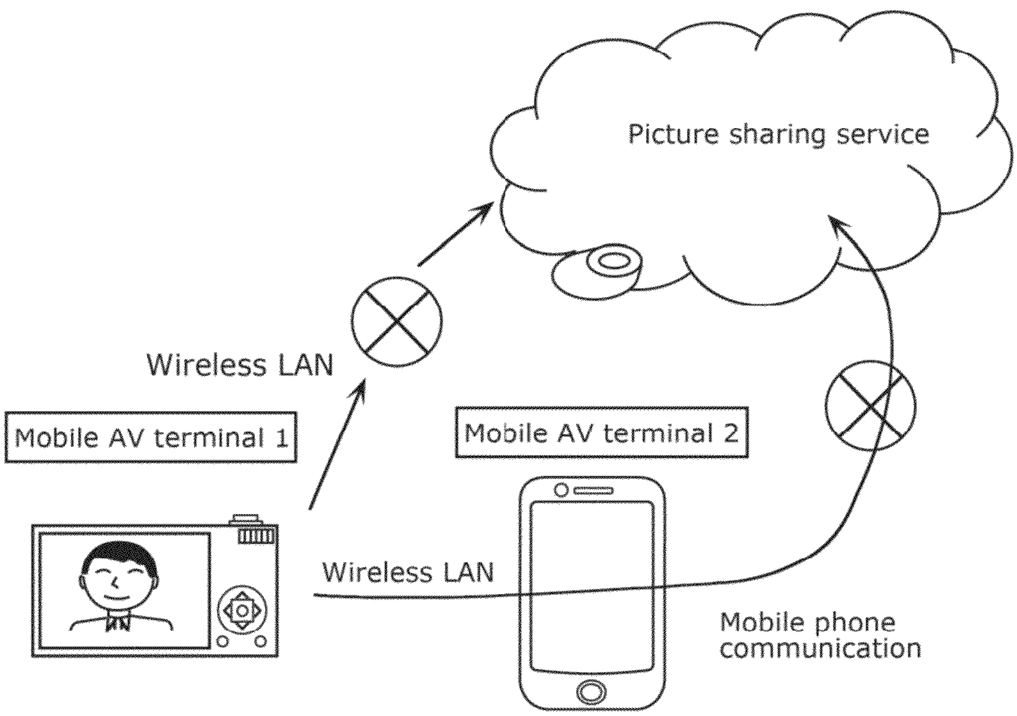

FIG. 199 is a system outline diagram for when the mobile AV terminal 1 is a digital camera according to Embodiment 11.

Figure 200:
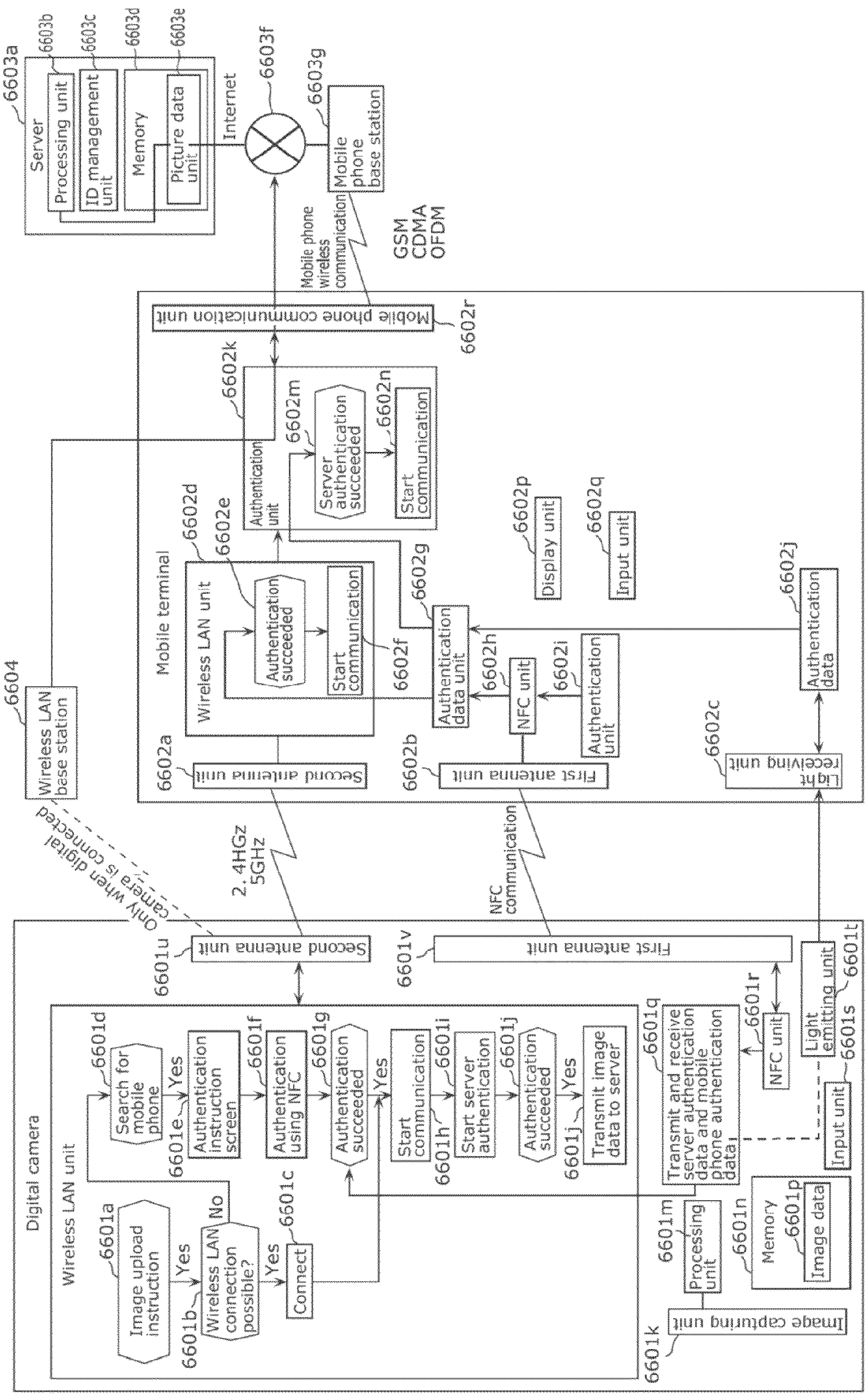

FIG. 200 is a system outline diagram for when the mobile AV terminal 1 is a digital camera according to Embodiment 11.

Figure 201:
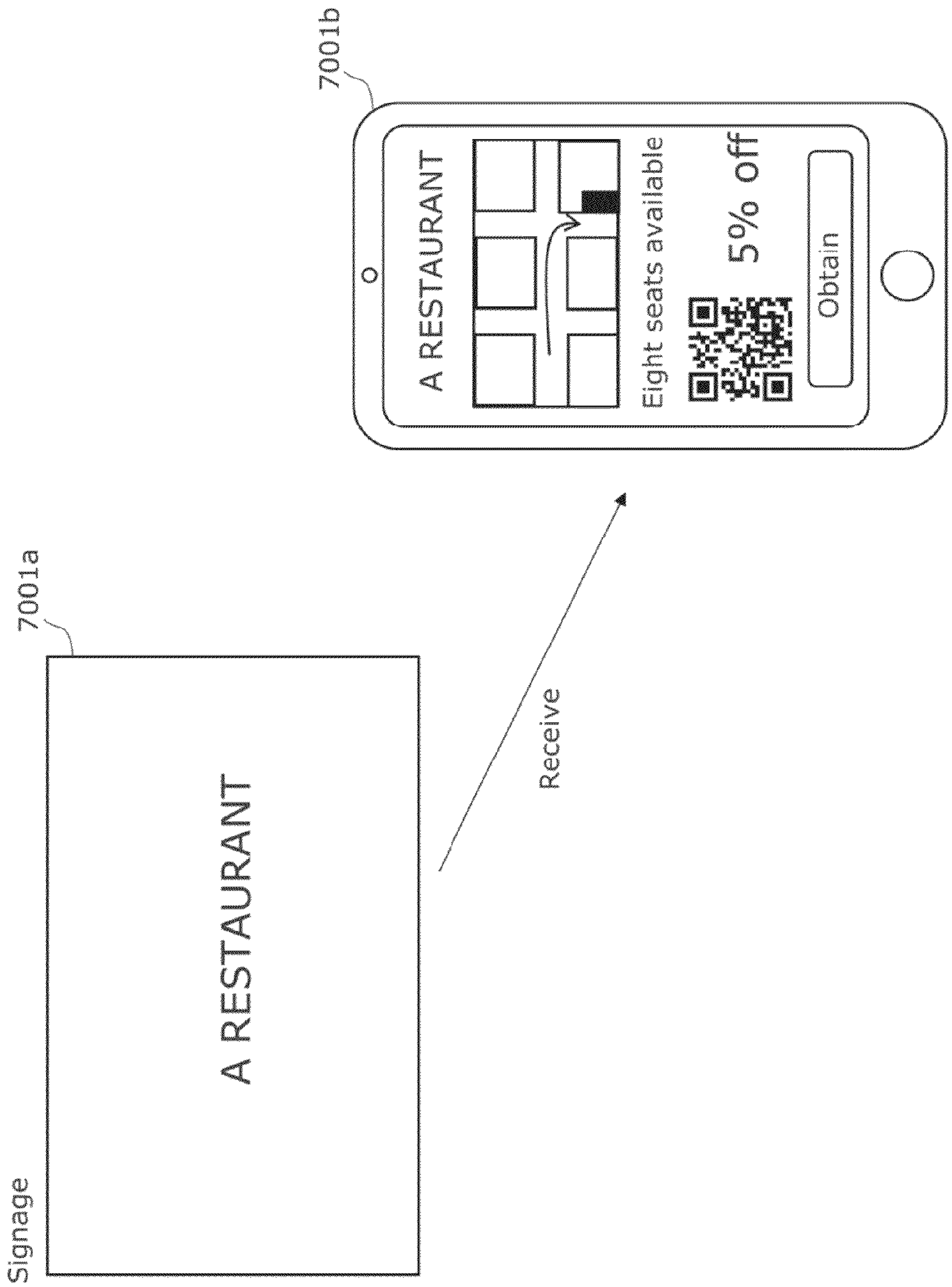

FIG. 201 is a diagram illustrating an example of application of a receiver and a transmitter in Embodiment 12.

Figure 202:
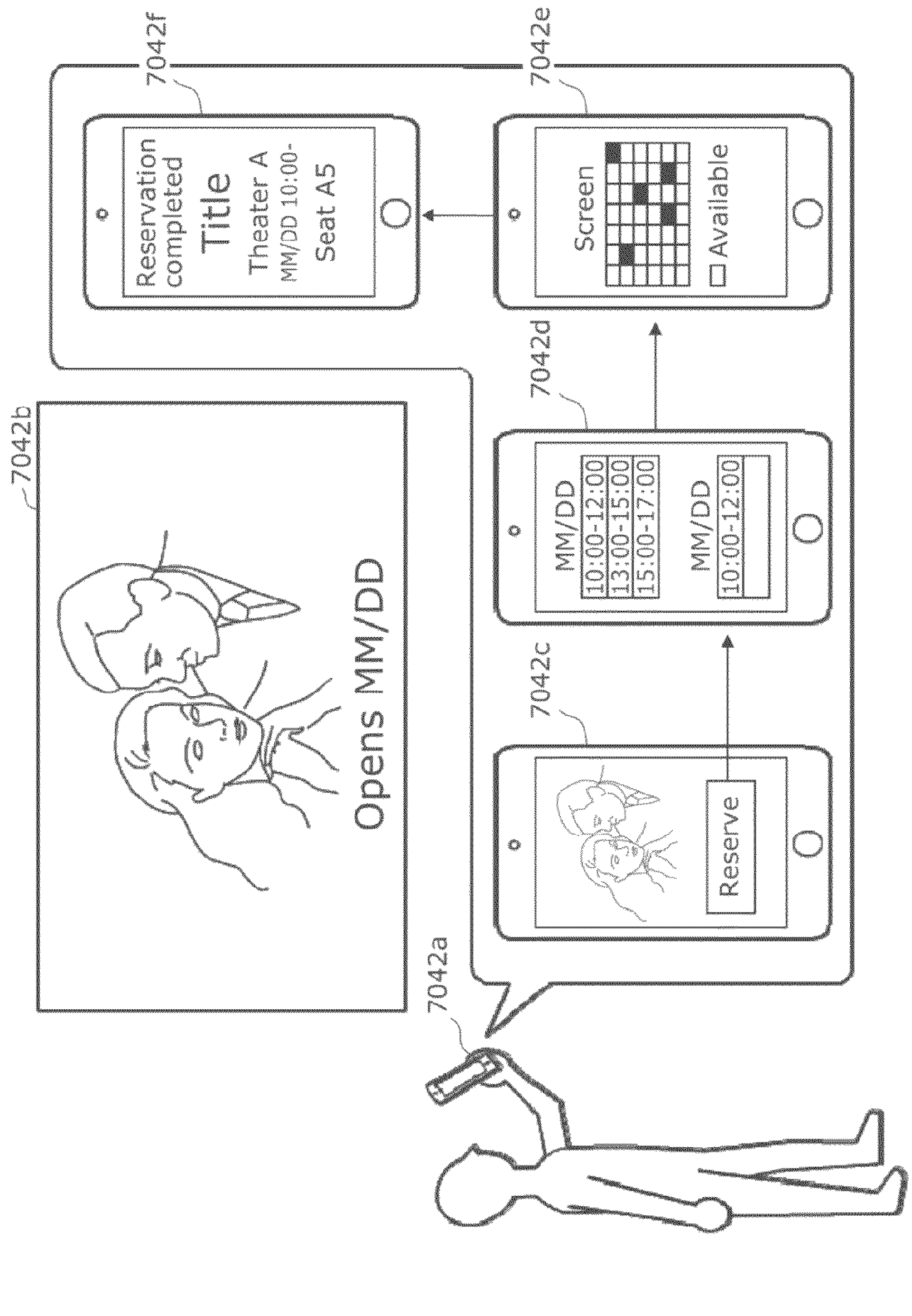

FIG. 202 is a diagram illustrating an example of application of a receiver and a transmitter in Embodiment 12.

Figure 203:
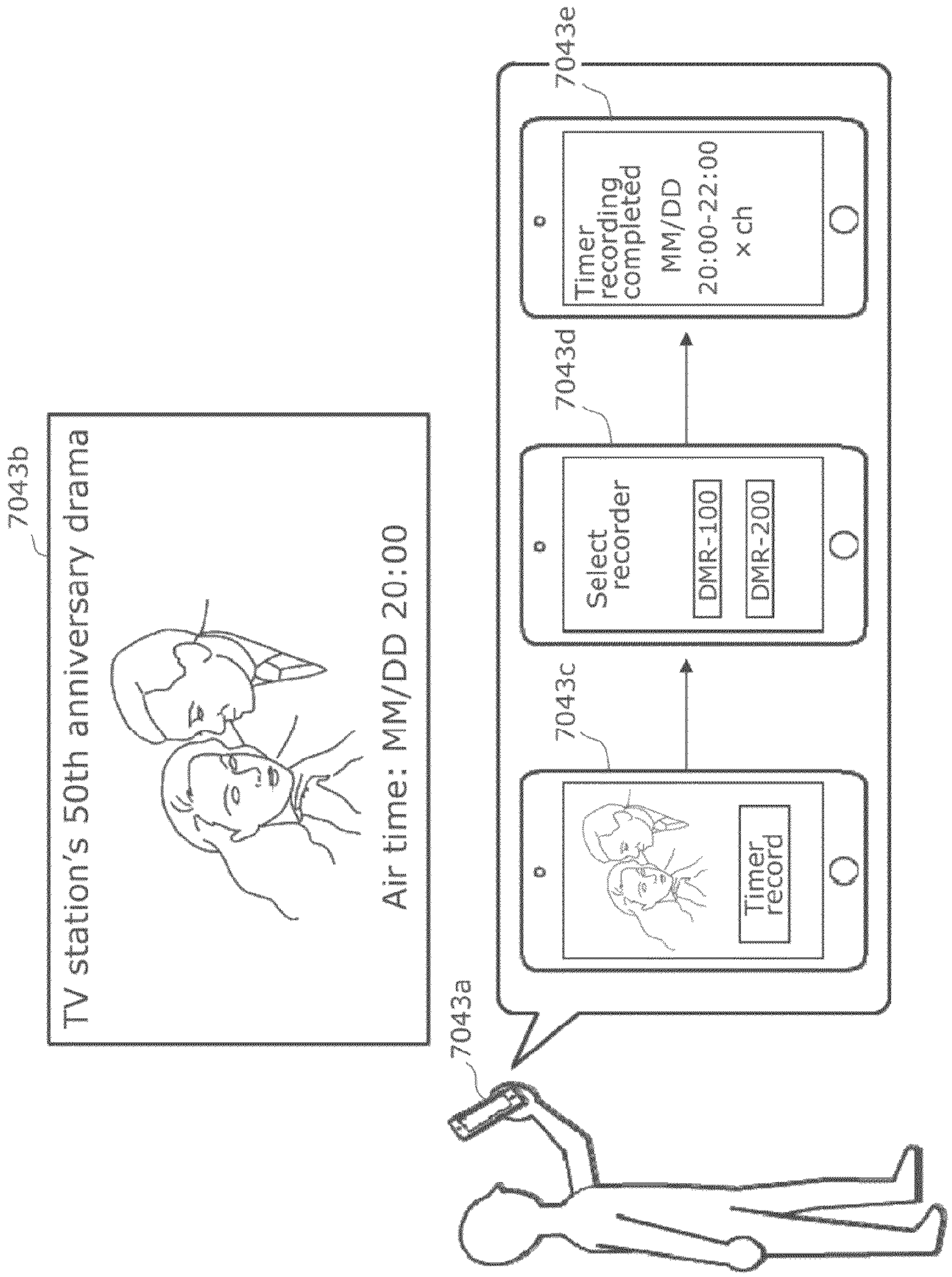

FIG. 203 is a diagram illustrating an example of application of a receiver and a transmitter in Embodiment 12.

Figure 204:
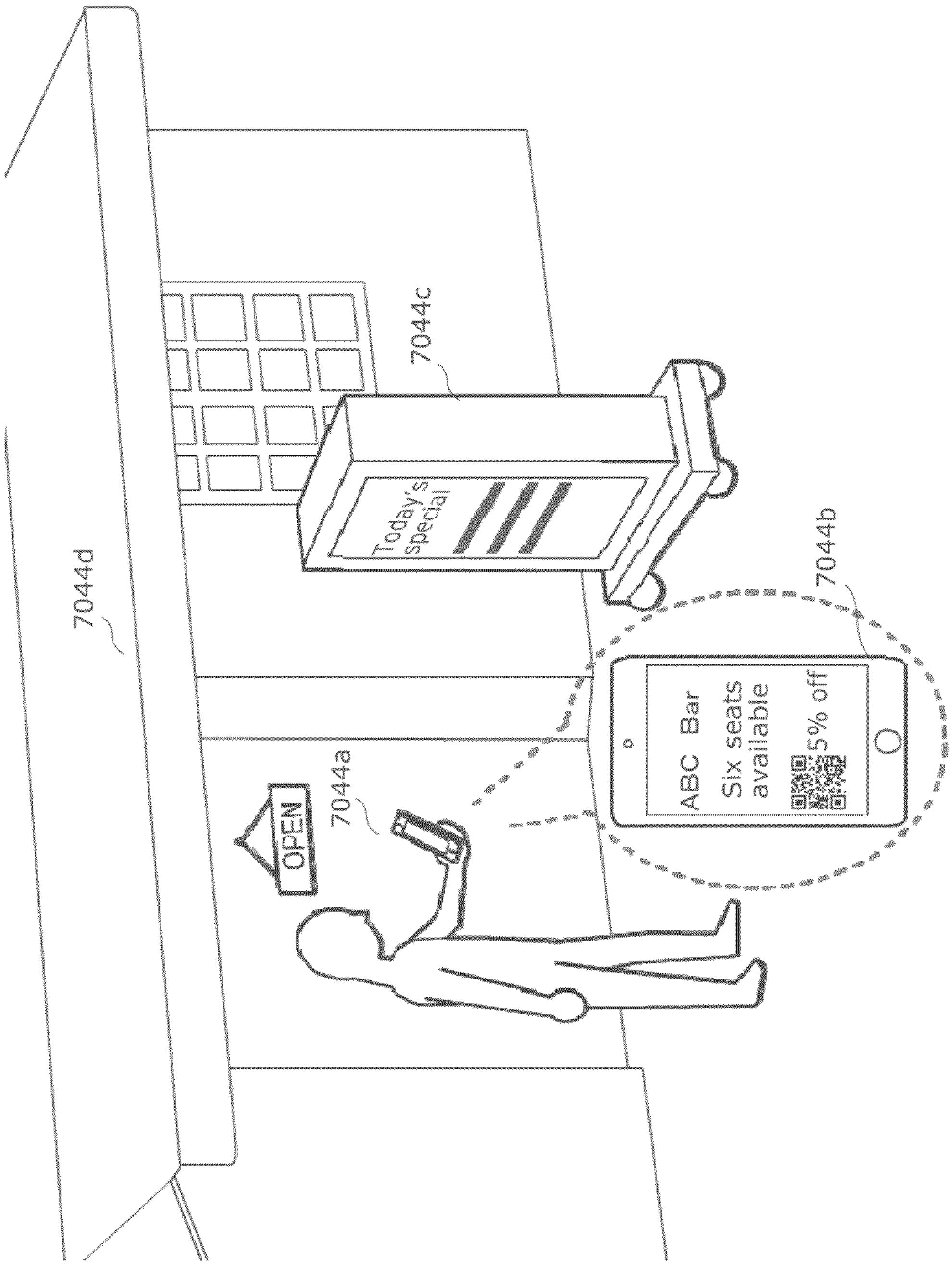

FIG. 204 is a diagram illustrating an example of application of a receiver and a transmitter in Embodiment 12.

Figure 205:
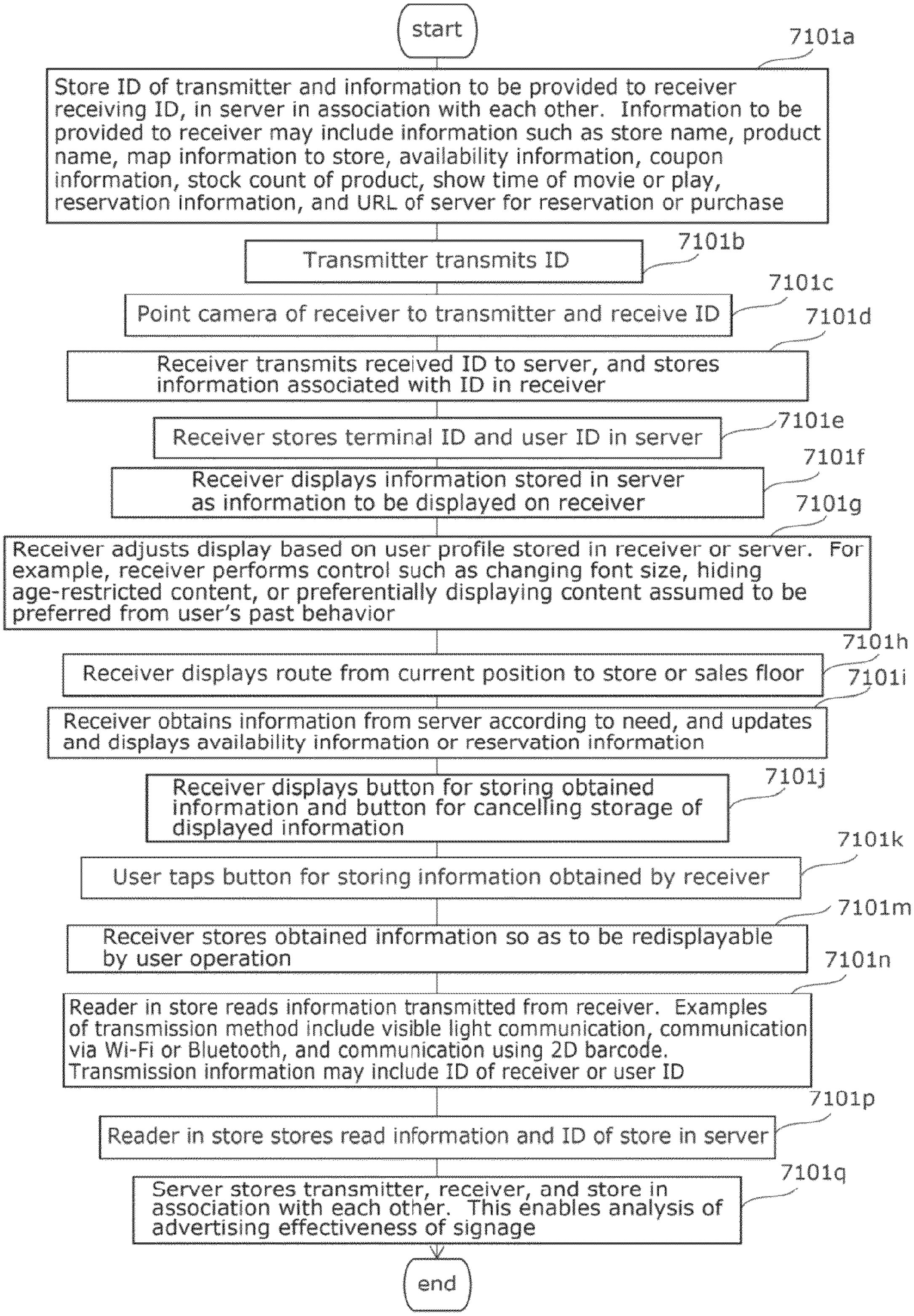

FIG. 205 is a flowchart illustrating an example of processing operation of a receiver and a transmitter in Embodiment 12.

Figure 206:
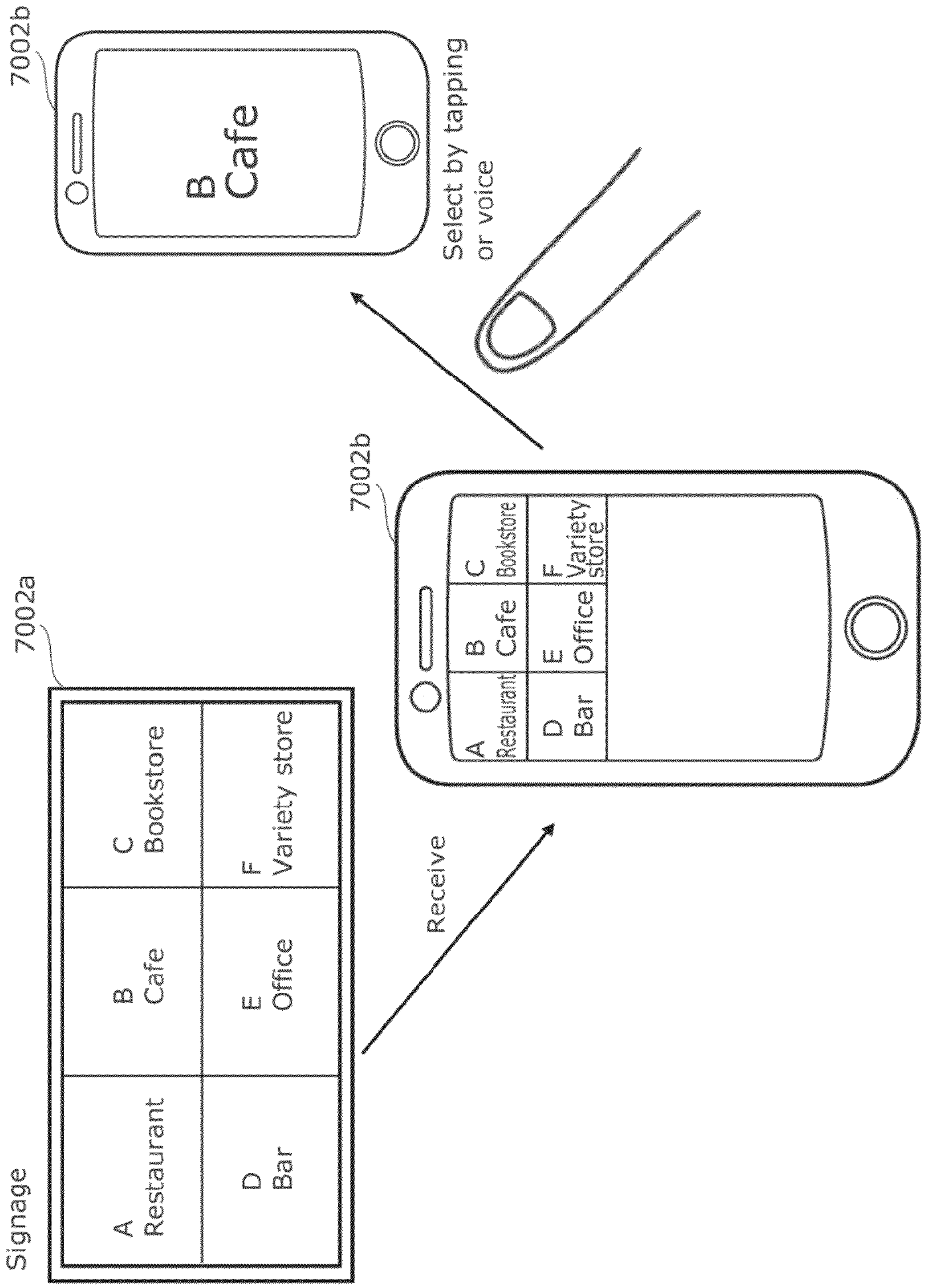

FIG. 206 is a diagram illustrating an example of application of a receiver and a transmitter in Embodiment 12.

Figure 207:
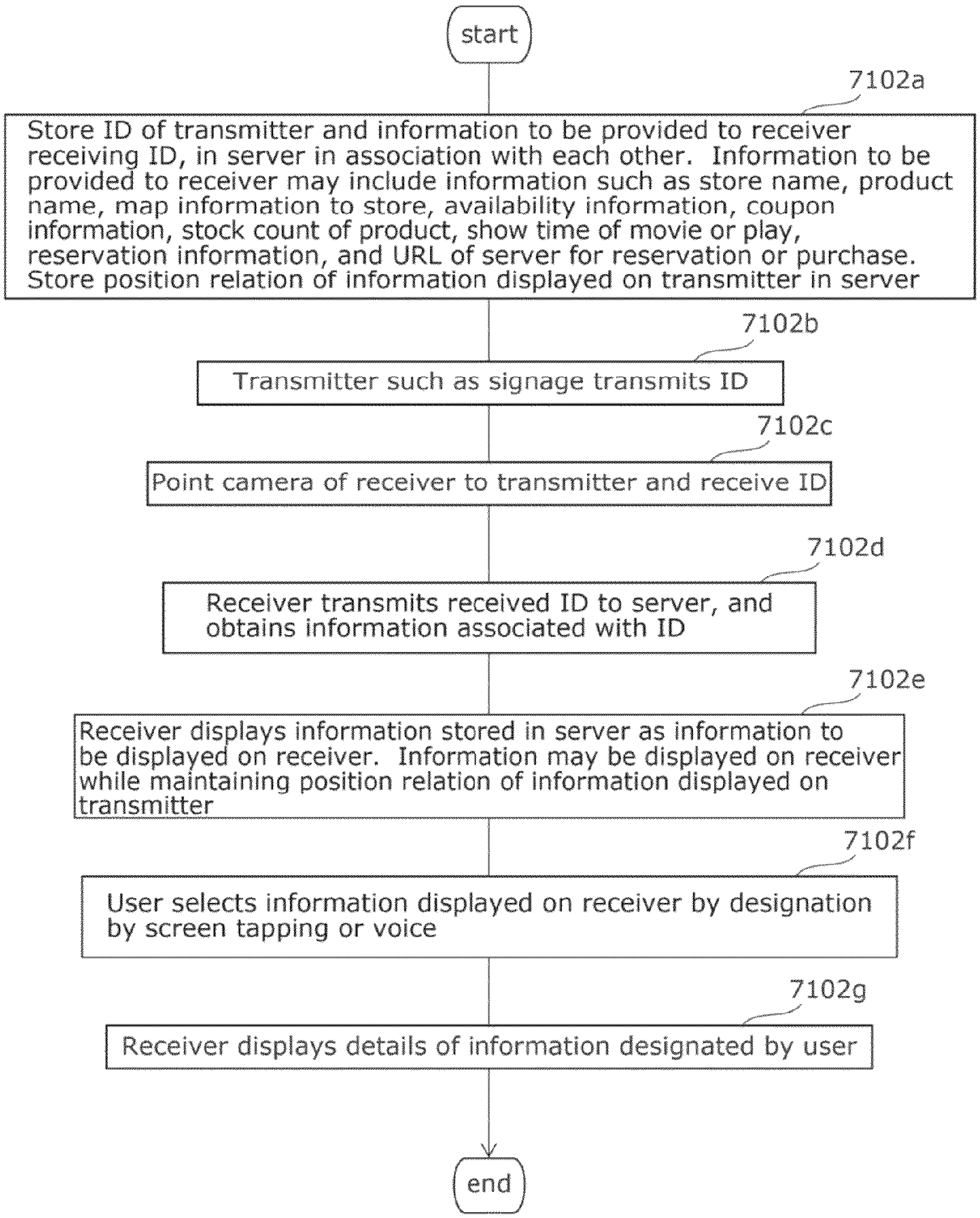

FIG. 207 is a flowchart illustrating an example of processing operation of a receiver and a transmitter in Embodiment 12.

Figure 208:
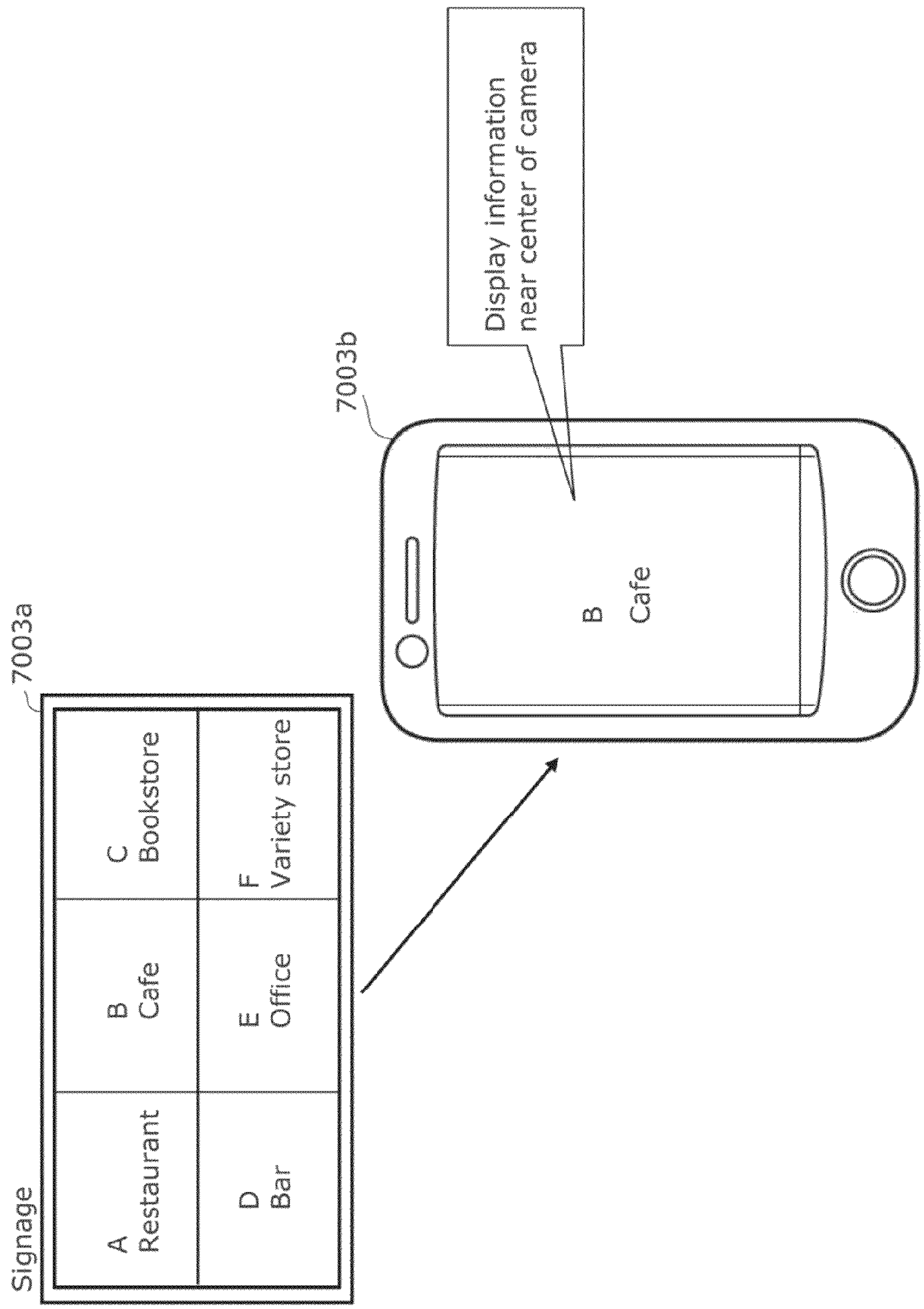

FIG. 208 is a diagram illustrating an example of application of a receiver and a transmitter in Embodiment 12.

Figure 209:
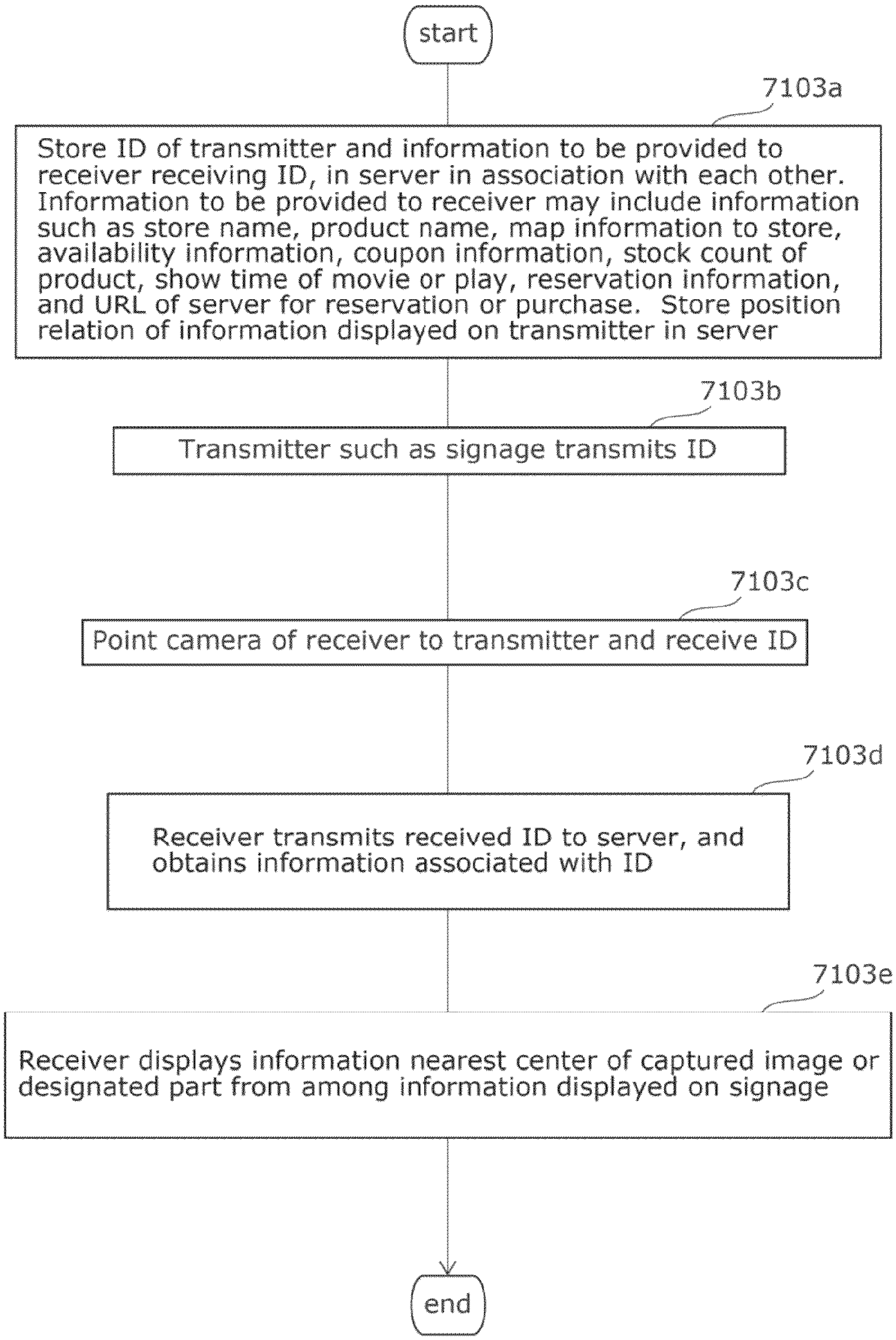

FIG. 209 is a flowchart illustrating an example of processing operation of a receiver and a transmitter in Embodiment 12.

Figure 210:
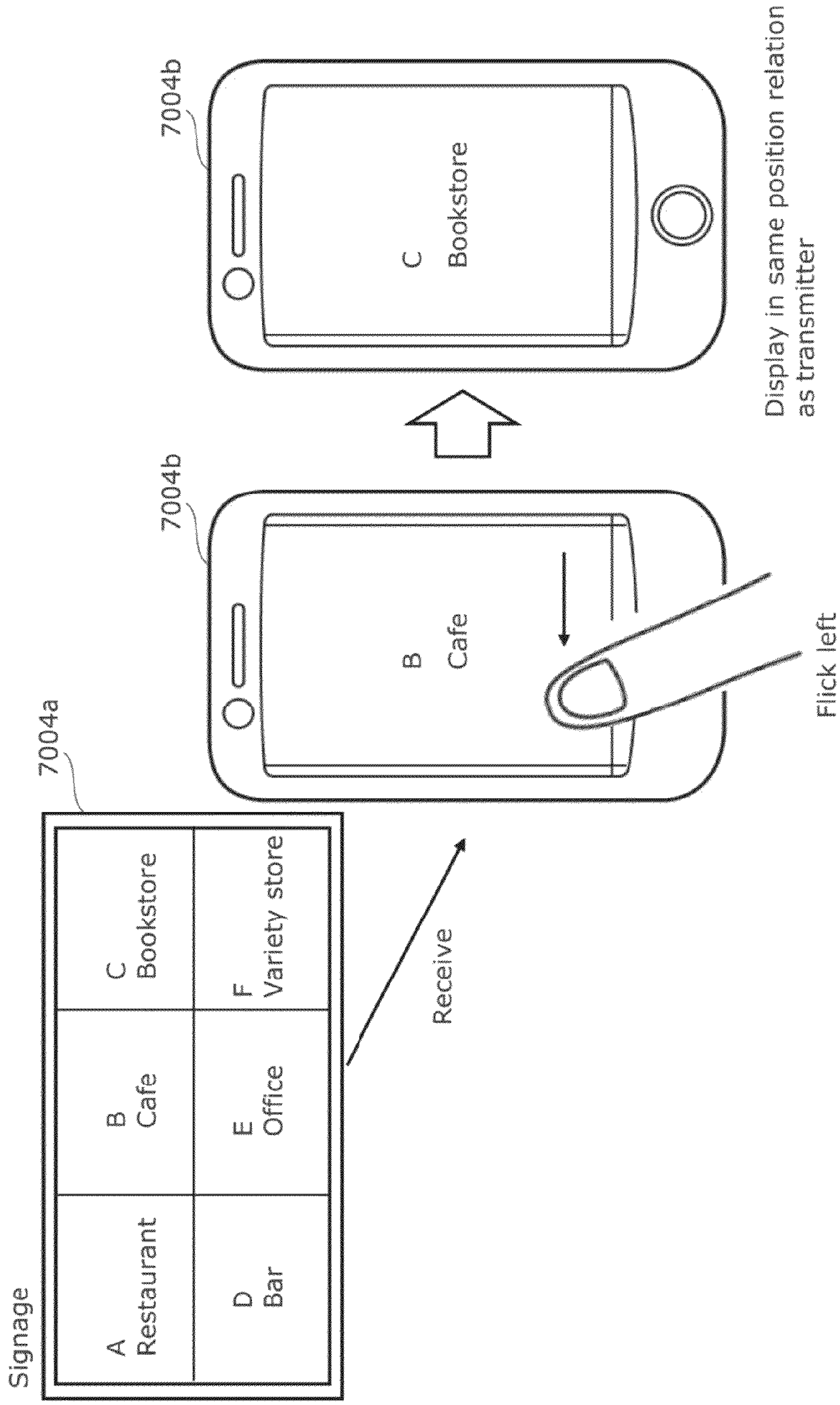

FIG. 210 is a diagram illustrating an example of application of a receiver and a transmitter in Embodiment 12.

Figure 211:
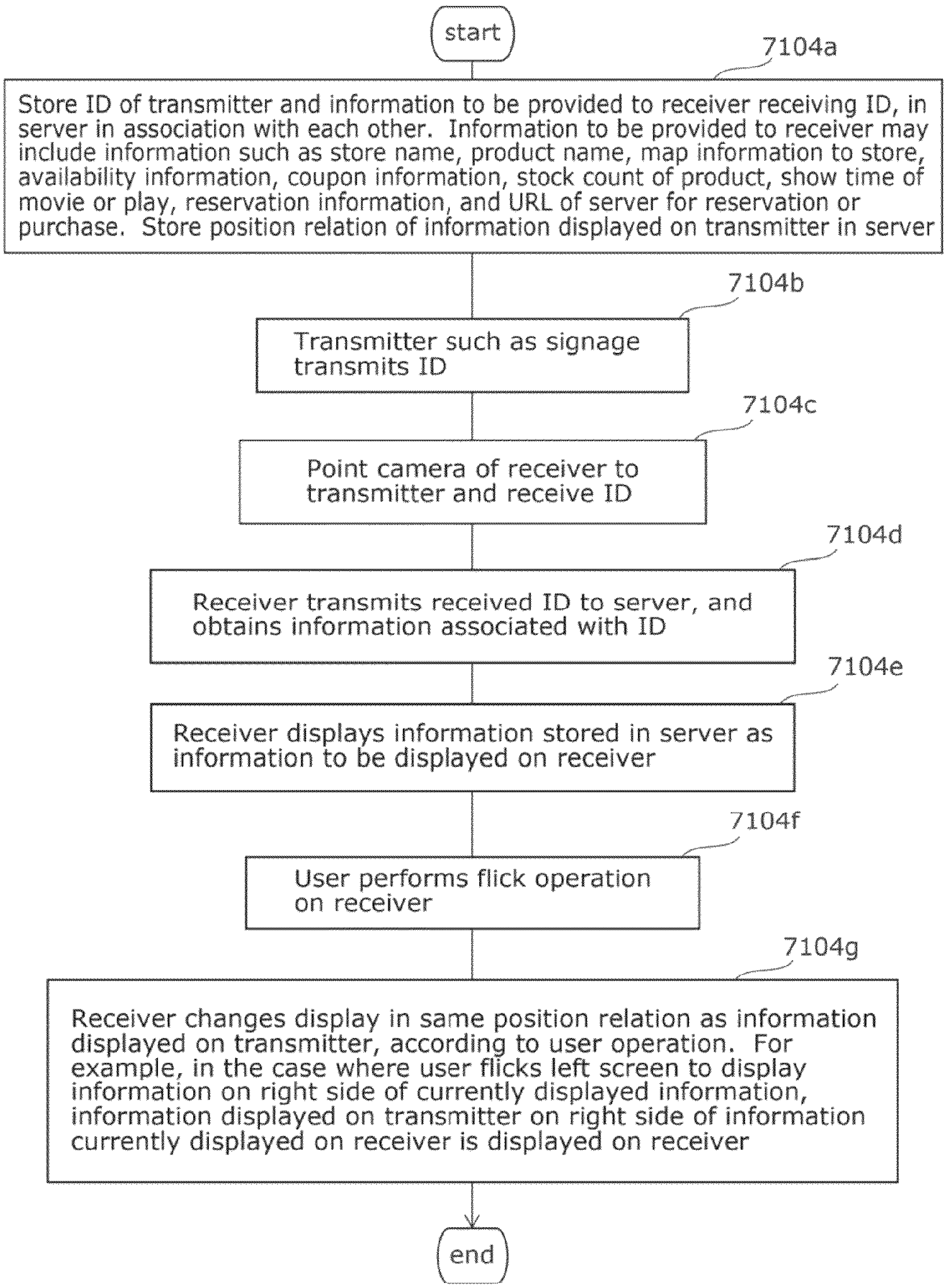

FIG. 211 is a flowchart illustrating an example of processing operation of a receiver and a transmitter in Embodiment 12.

Figure 212:
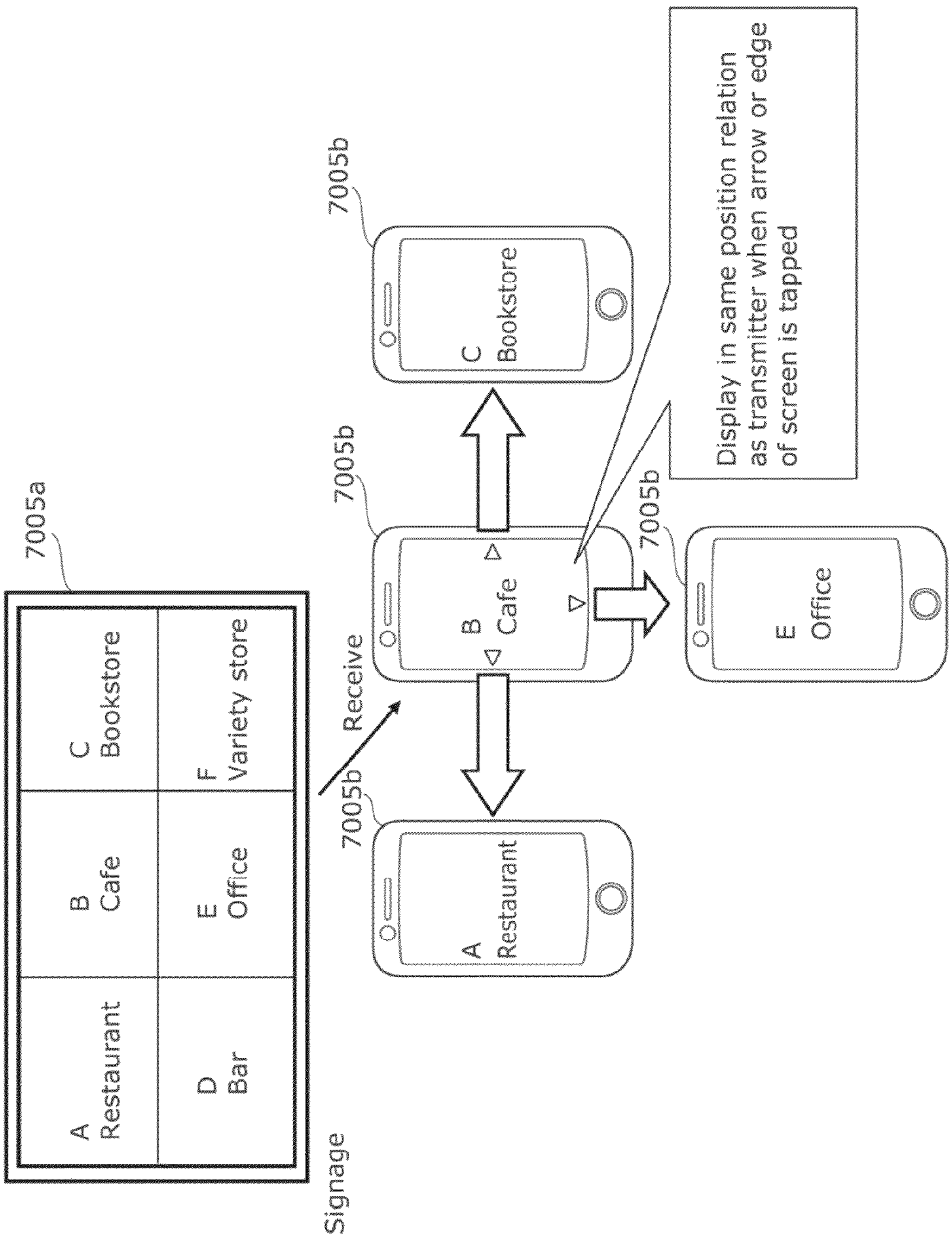

FIG. 212 is a diagram illustrating an example of application of a receiver and a transmitter in Embodiment 12.

Figure 213:
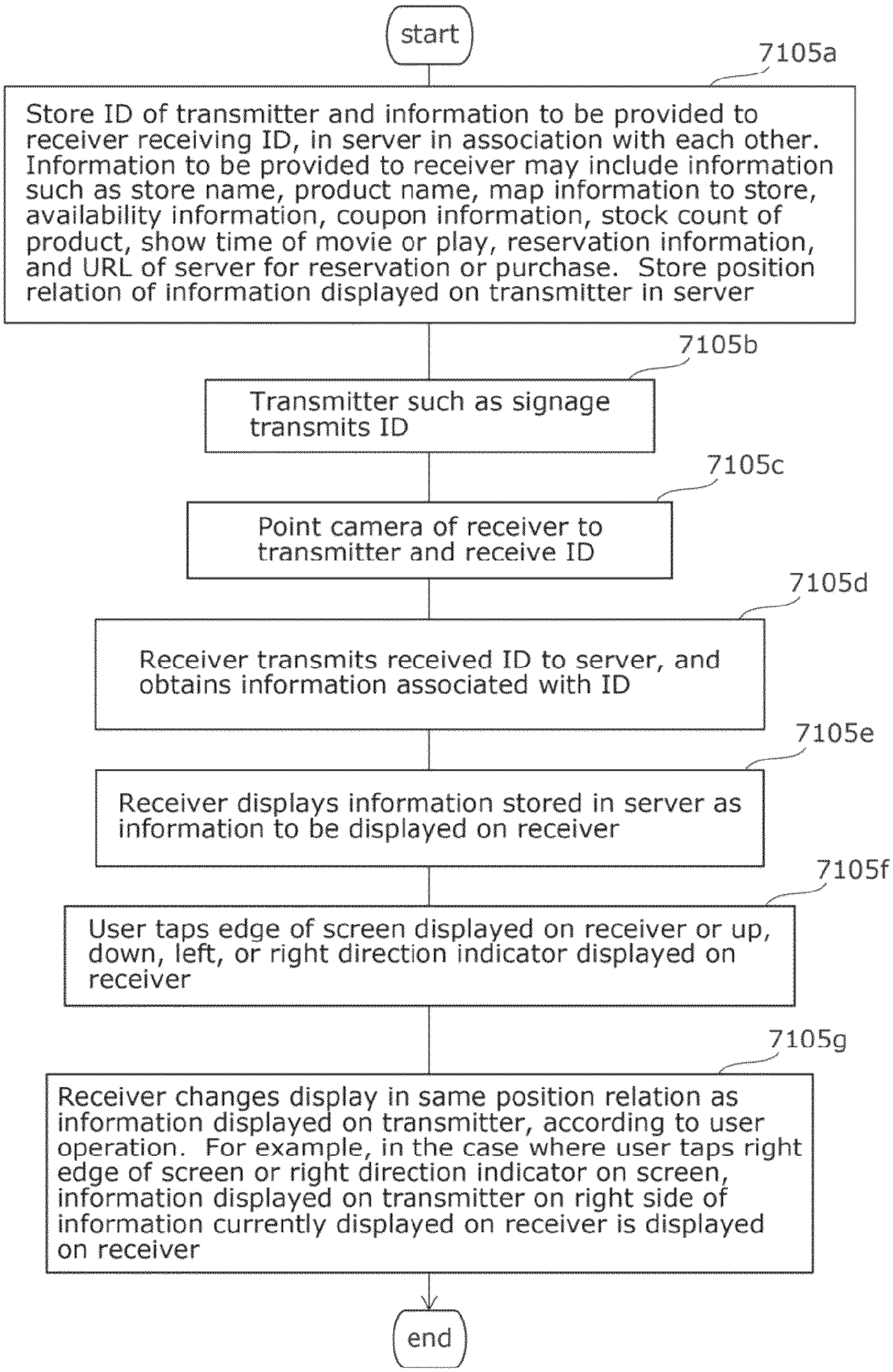

FIG. 213 is a flowchart illustrating an example of processing operation of a receiver and a transmitter in Embodiment 12.

Figure 214:
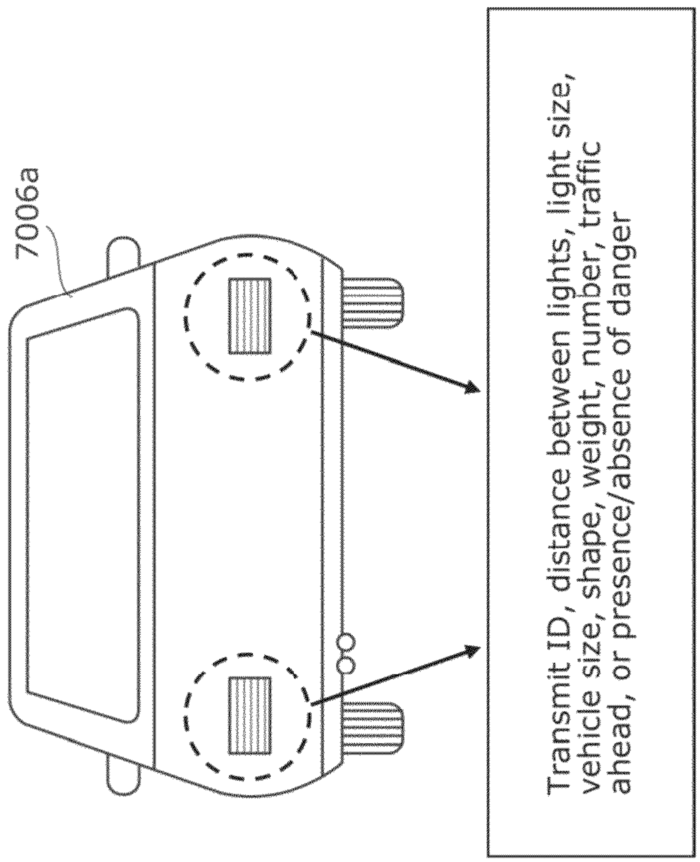

FIG. 214 is a diagram illustrating an example of application of a receiver and a transmitter in Embodiment 12.

Figure 215:
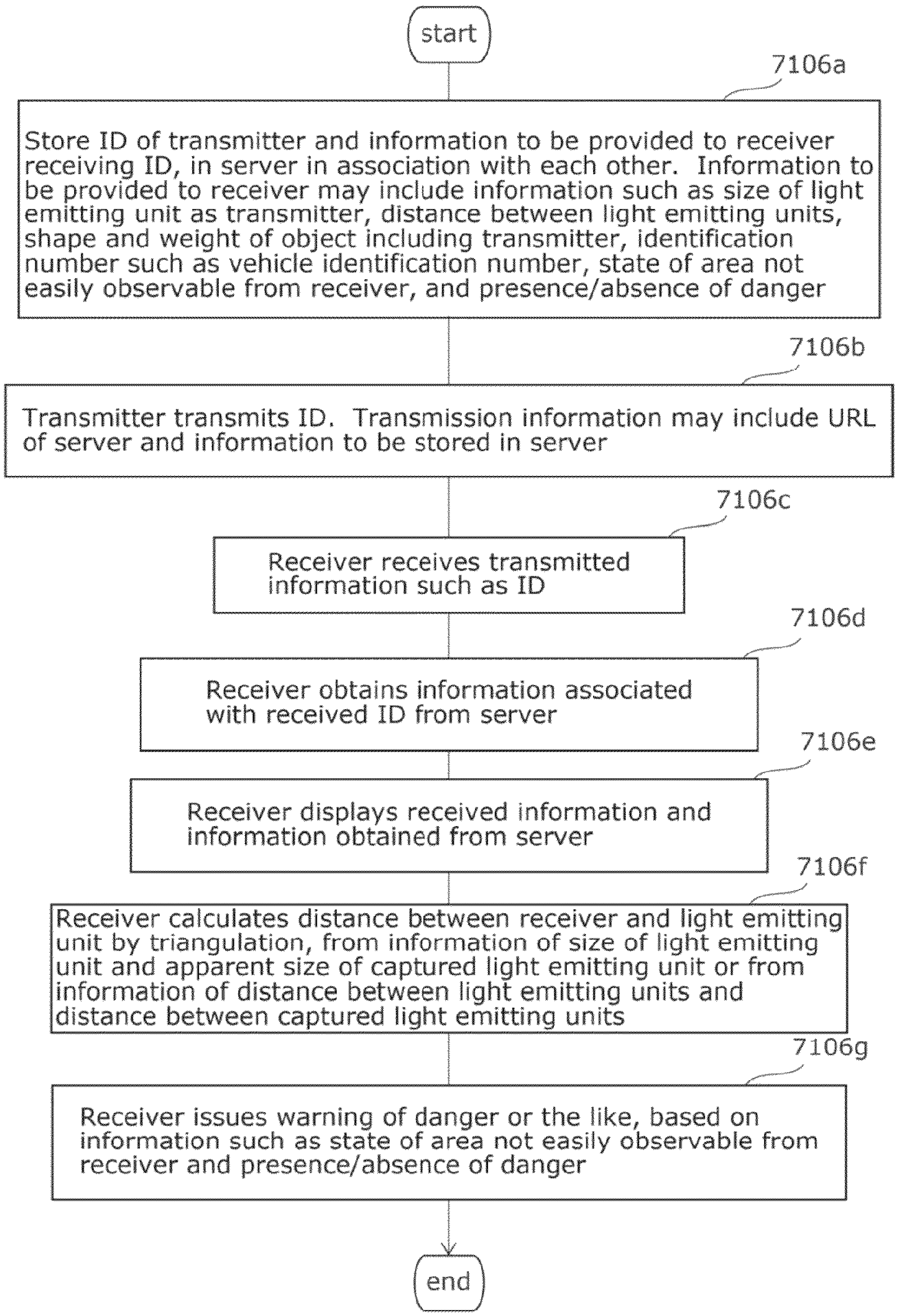

FIG. 215 is a flowchart illustrating an example of processing operation of a receiver and a transmitter in Embodiment 12.

Figure 216:
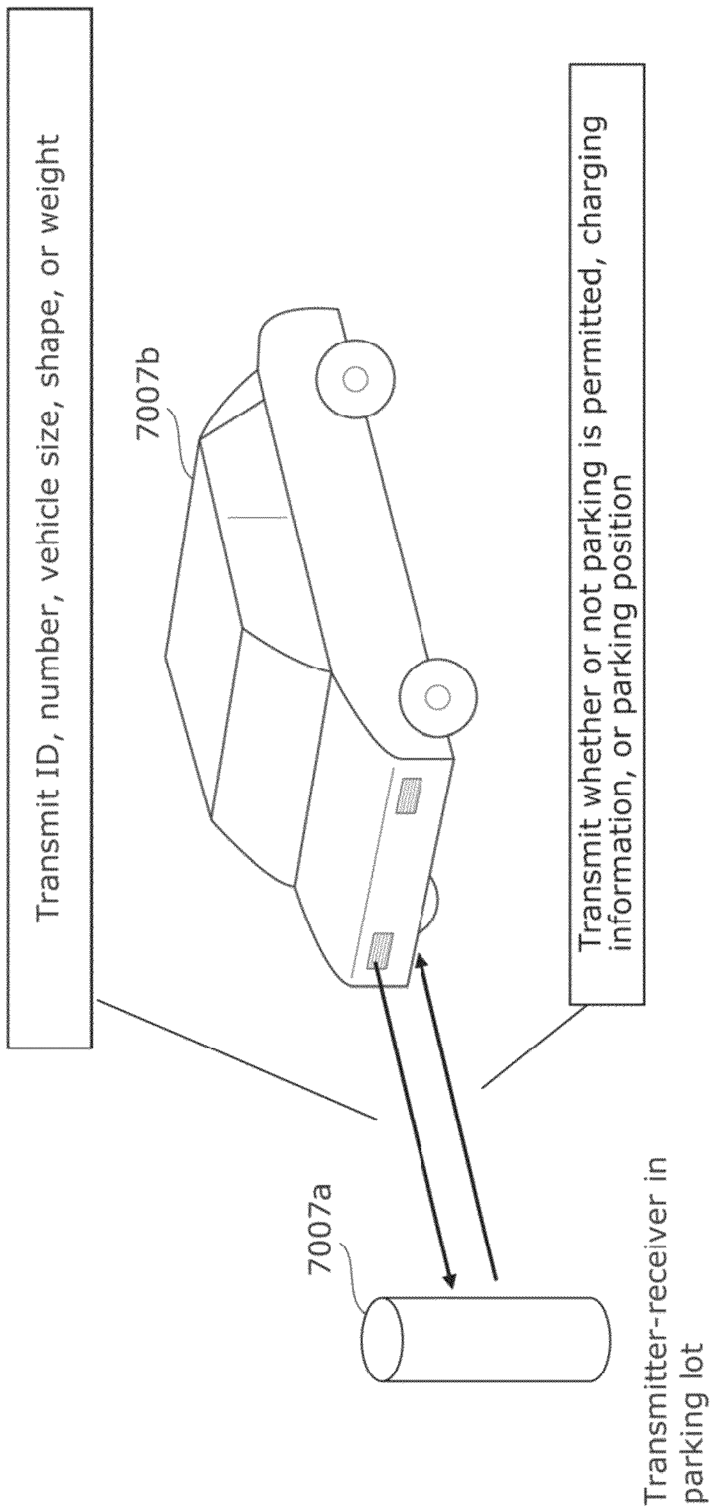

FIG. 216 is a diagram illustrating an example of application of a receiver and a transmitter in Embodiment 12.

Figure 217:
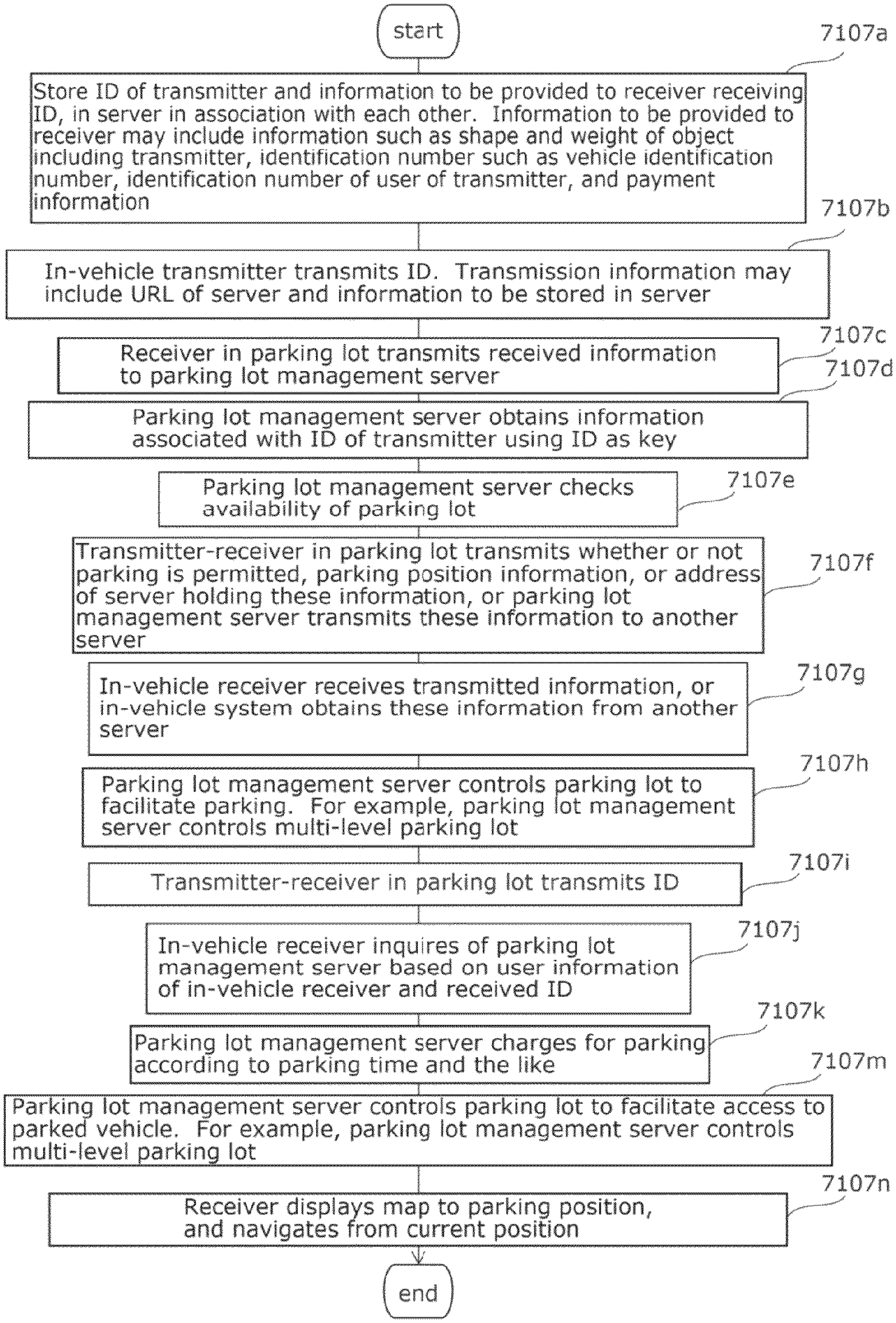

FIG. 217 is a flowchart illustrating an example of processing operation of a receiver and a transmitter in Embodiment 12.

Figure 218:
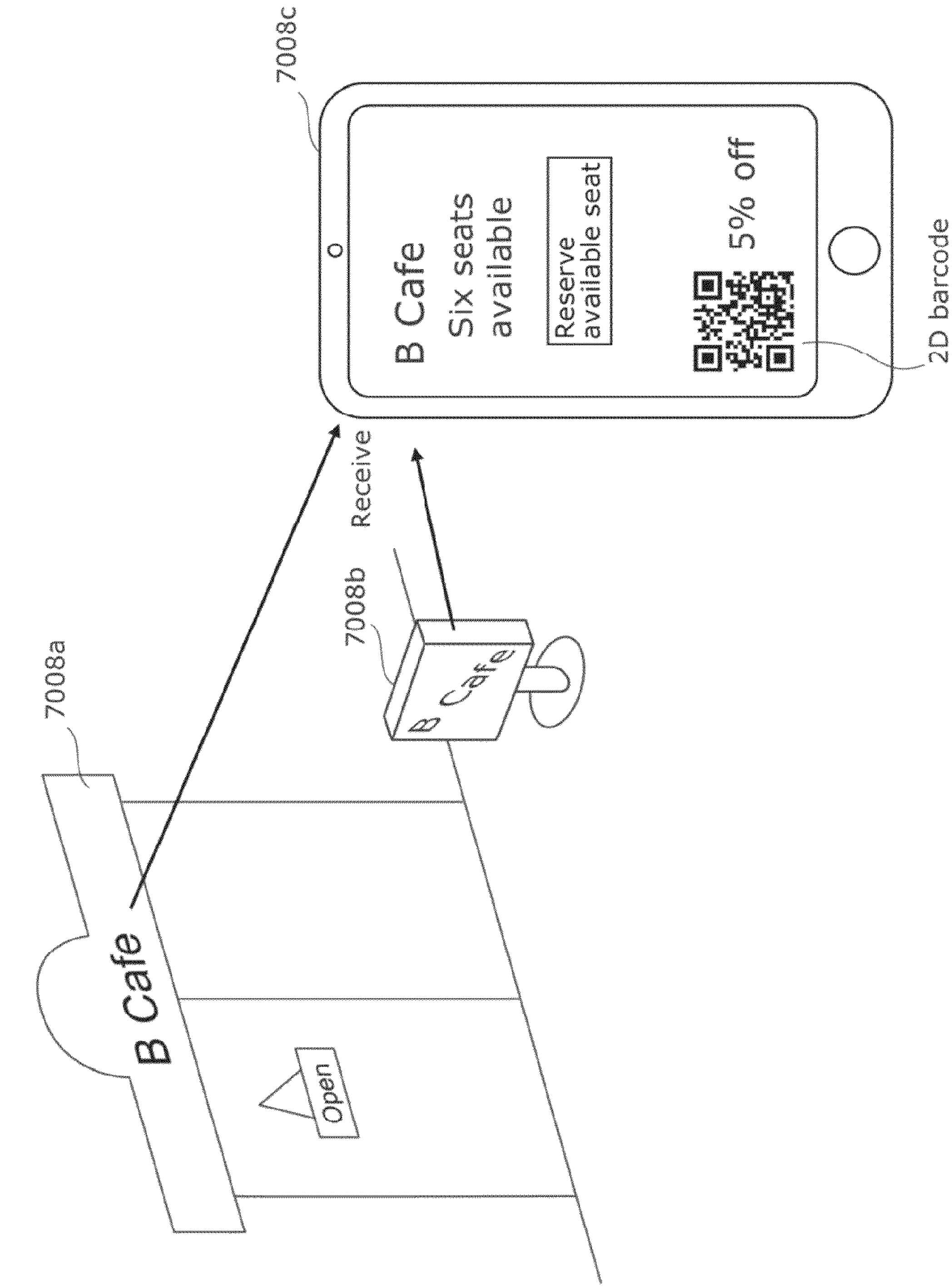

FIG. 218 is a diagram illustrating an example of application of a receiver and a transmitter in Embodiment 12.

Figure 219:
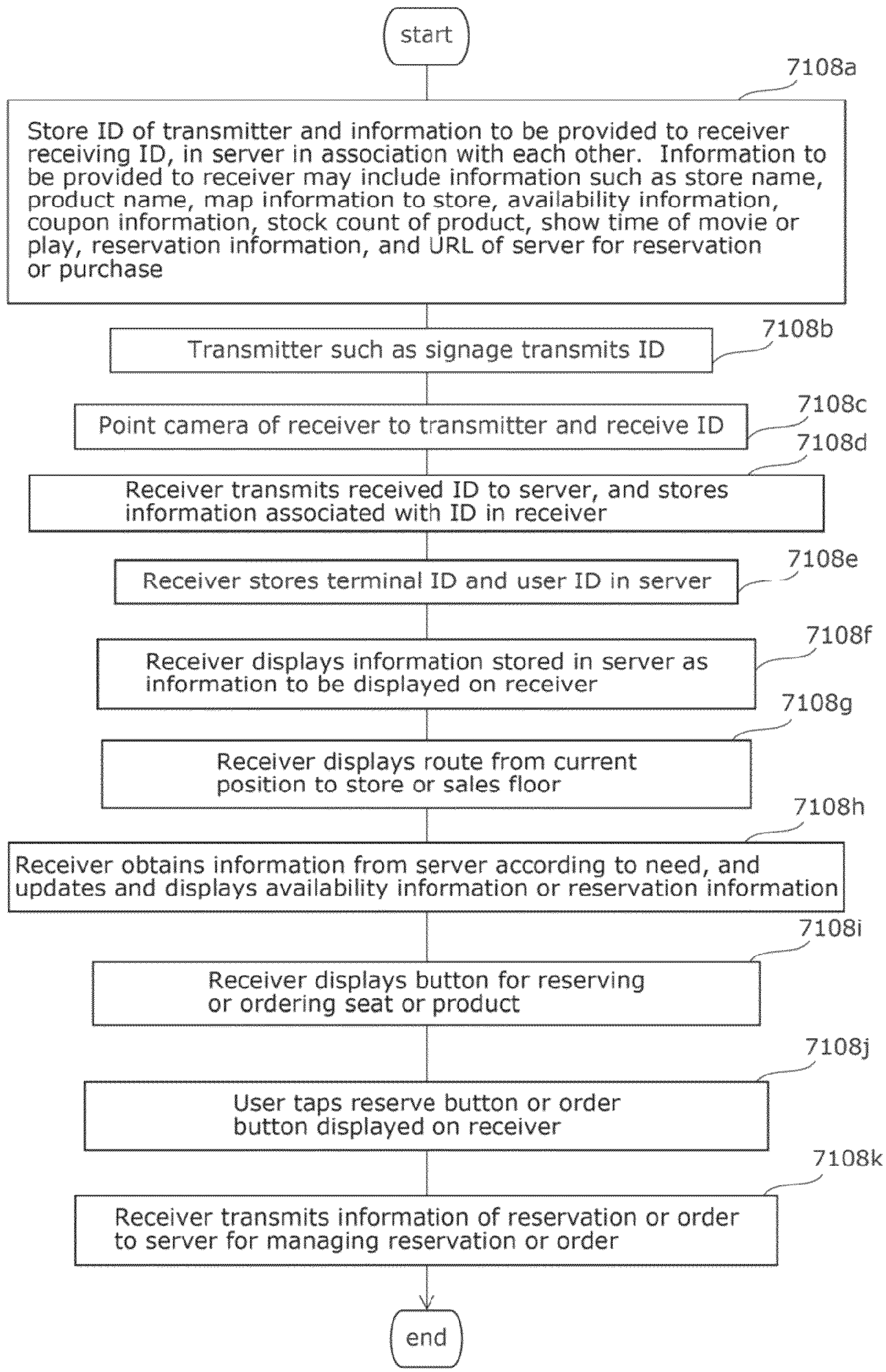

FIG. 219 is a flowchart illustrating an example of processing operation of a receiver and a transmitter in Embodiment 12.

Figure 220:
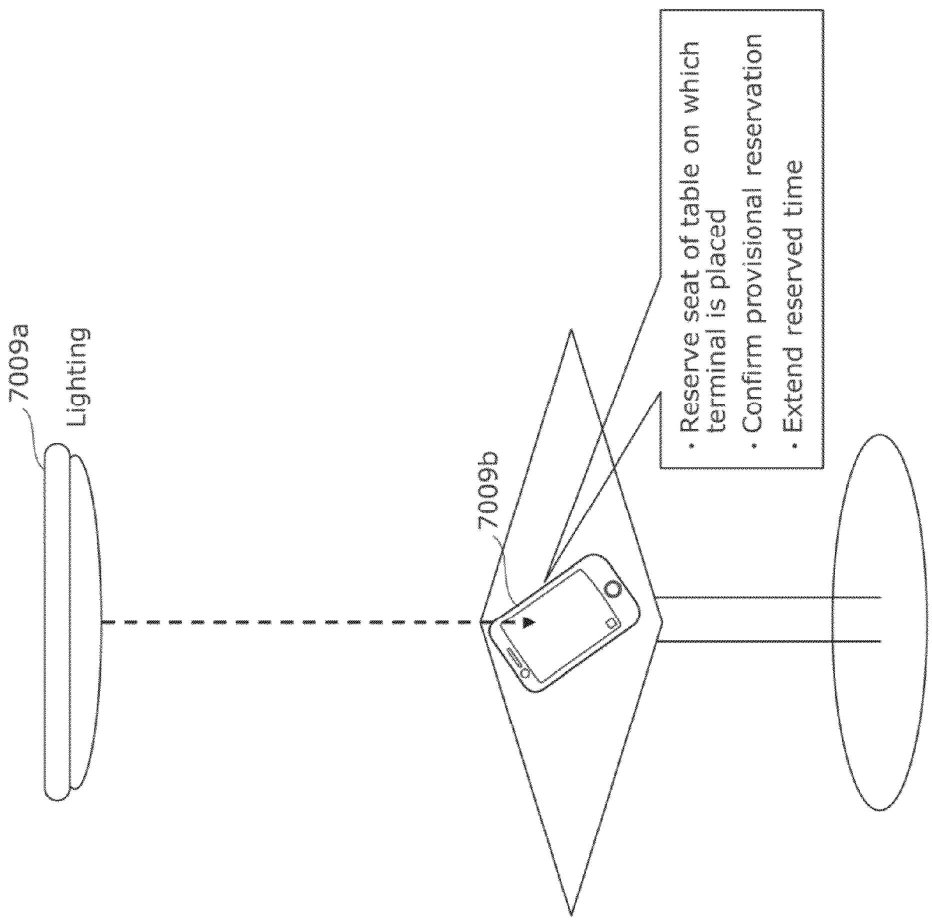

FIG. 220 is a diagram illustrating an example of application of a receiver and a transmitter in Embodiment 12.

Figure 221:
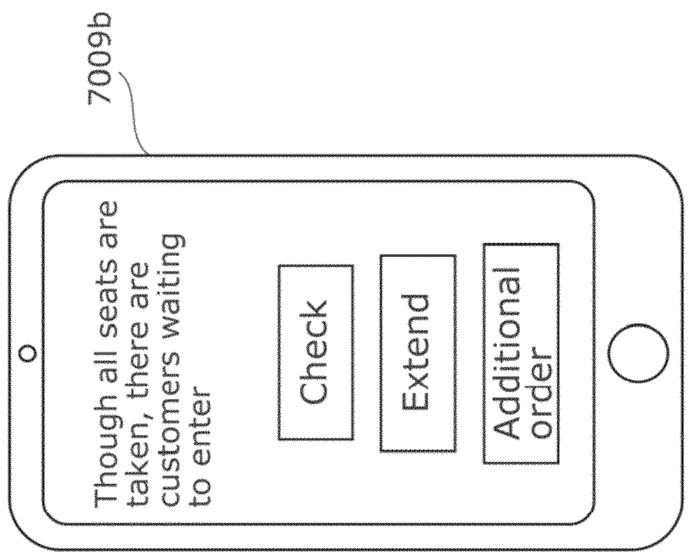

FIG. 221 is a diagram illustrating an example of application of a receiver and a transmitter in Embodiment 12.

Figure 222:
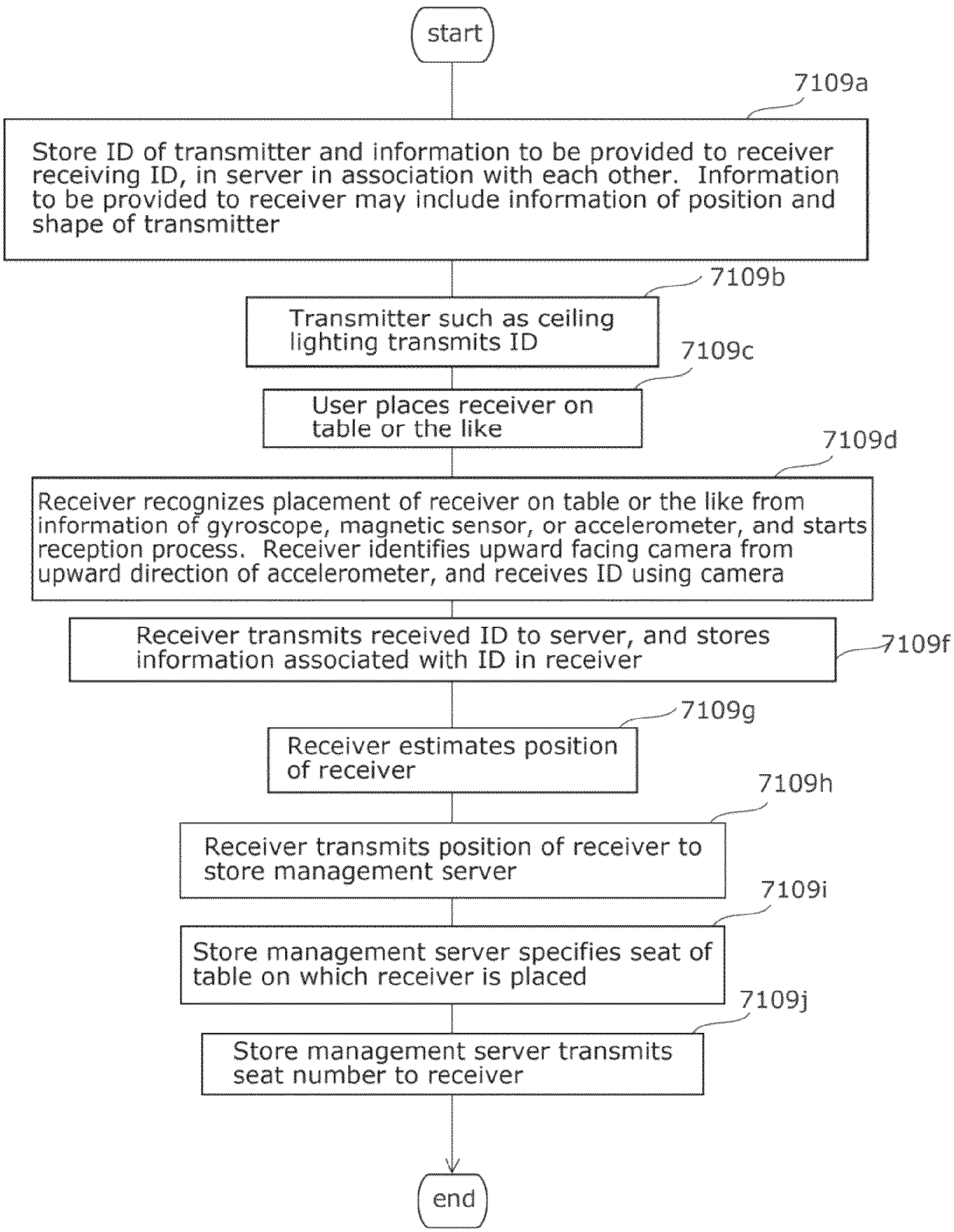

FIG. 222 is a flowchart illustrating an example of processing operation of a receiver and a transmitter in Embodiment 12.

Figure 223:
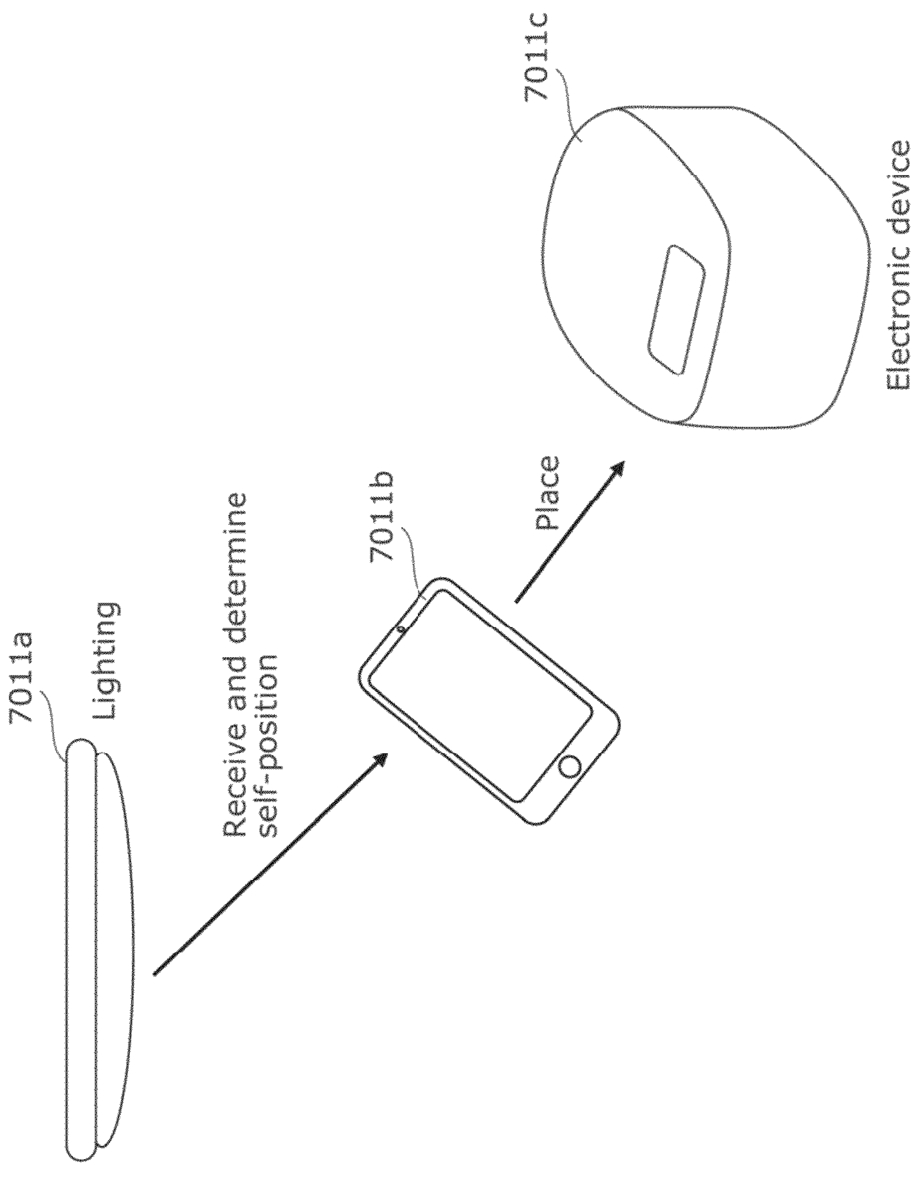

FIG. 223 is a diagram illustrating an example of application of a receiver and a transmitter in Embodiment 12.

Figure 224:
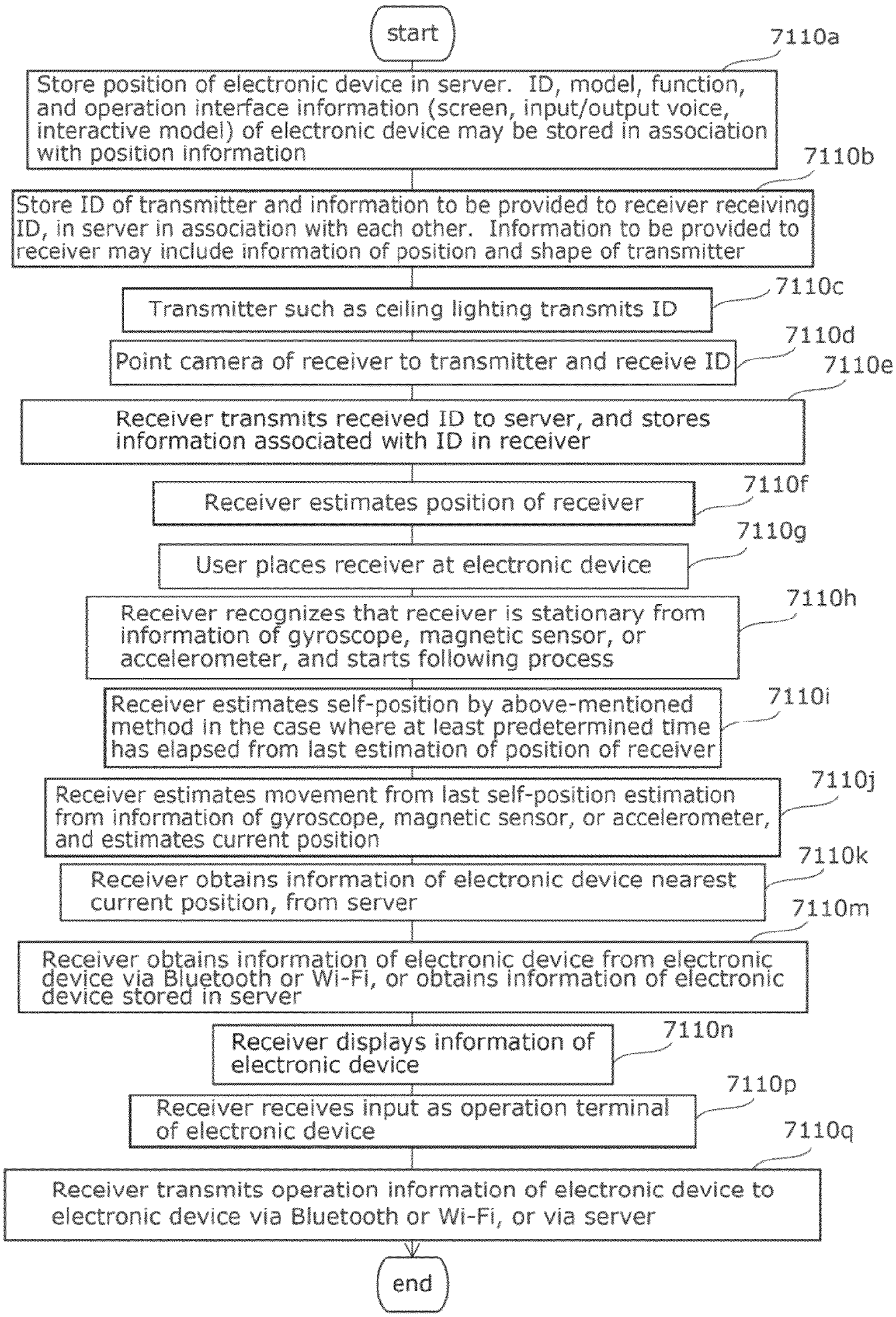

FIG. 224 is a flowchart illustrating an example of processing operation of a receiver and a transmitter in Embodiment 12.

Figure 225:
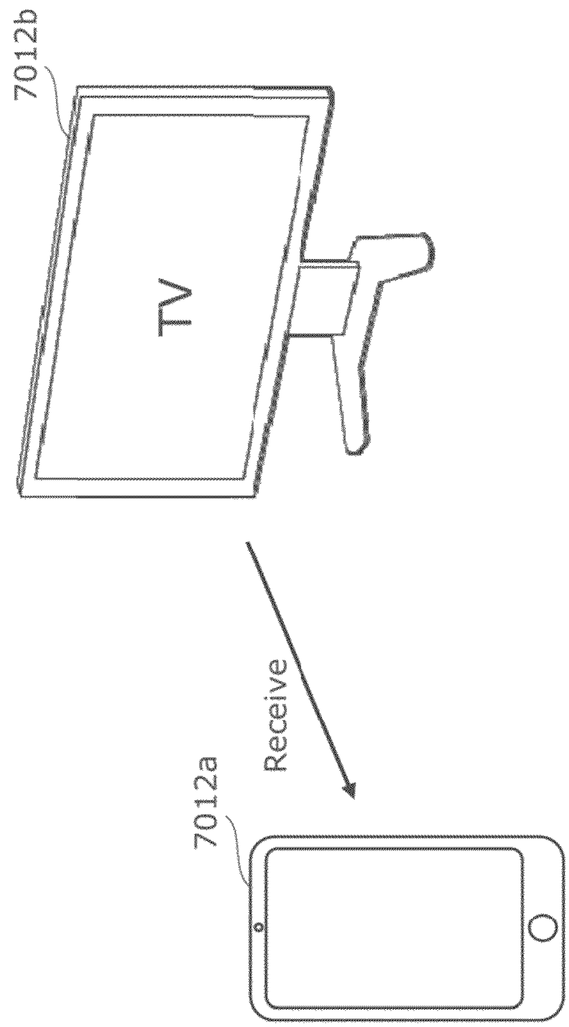

FIG. 225 is a diagram illustrating an example of application of a receiver and a transmitter in Embodiment 12.

Figure 226:
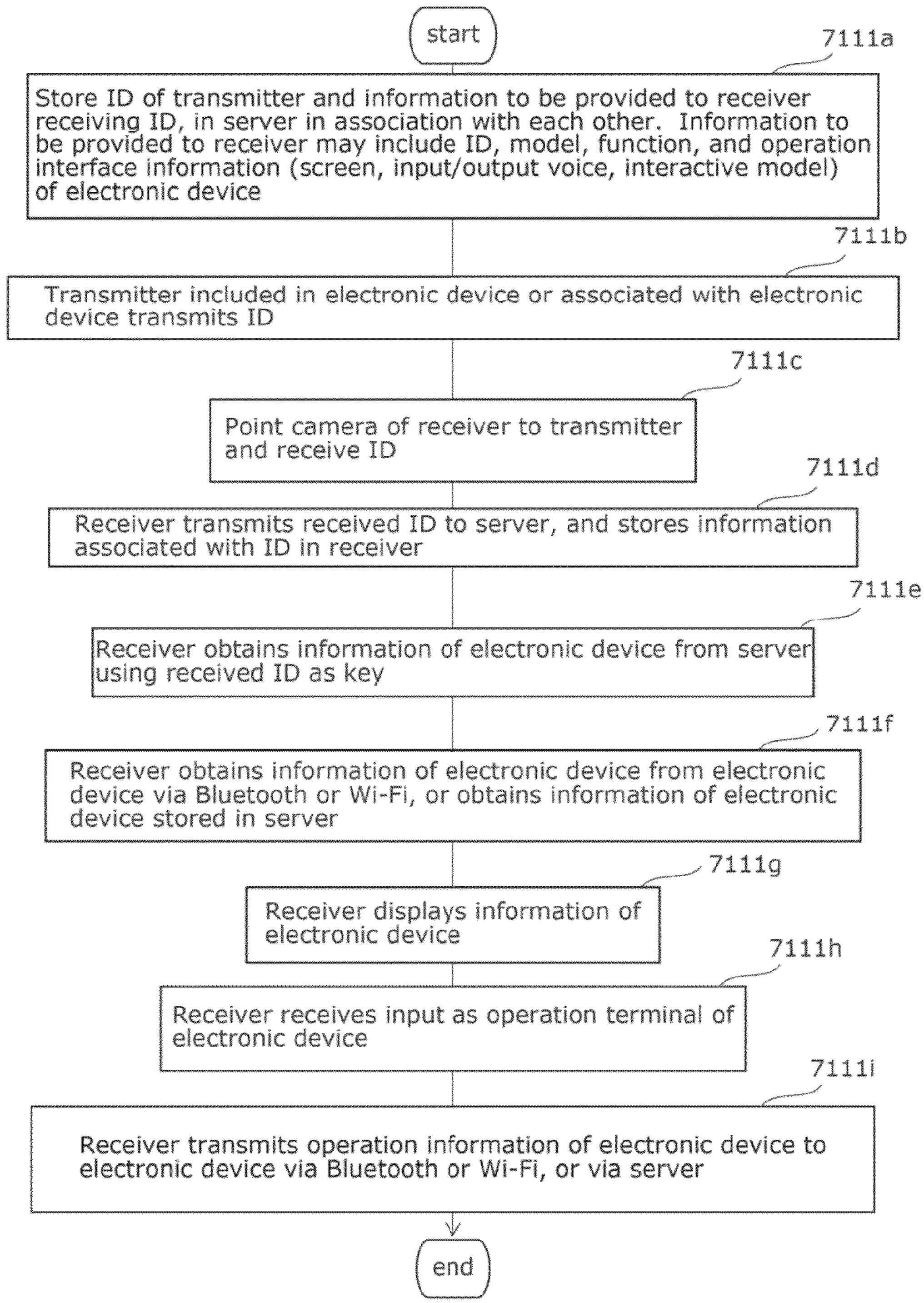

FIG. 226 is a flowchart illustrating an example of processing operation of a receiver and a transmitter in Embodiment 12.

Figure 227:
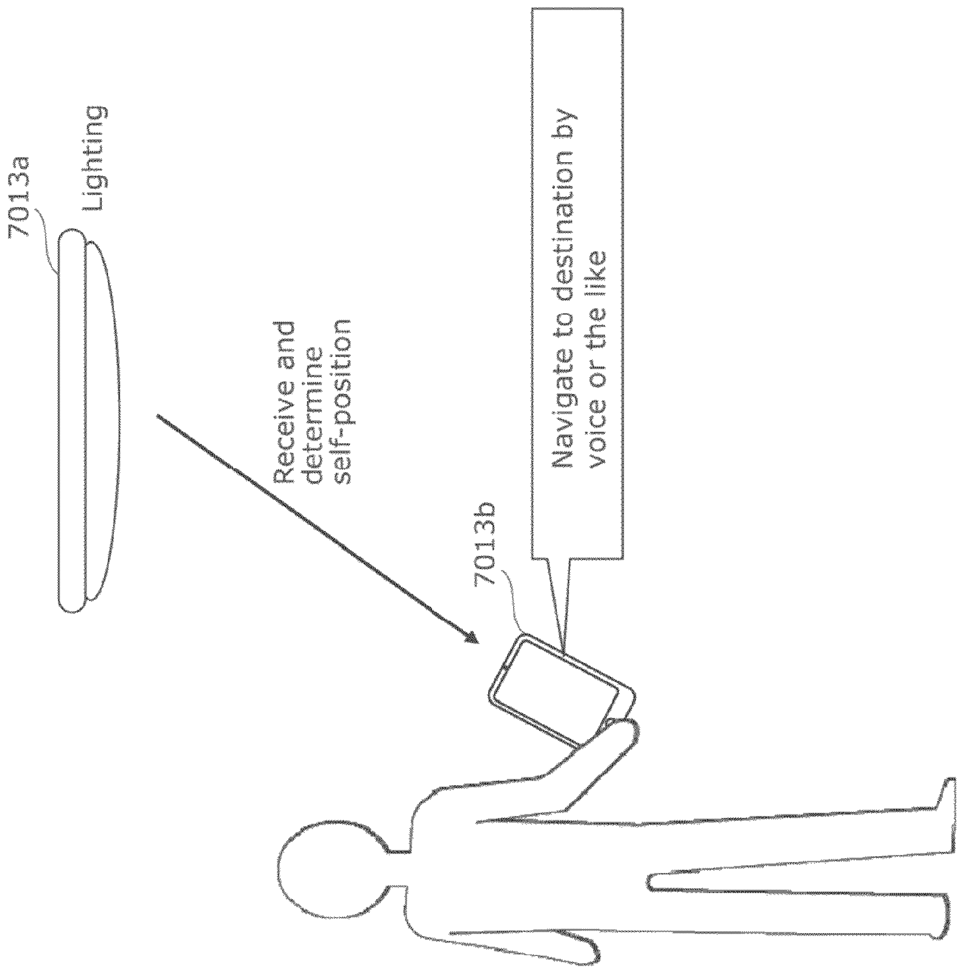

FIG. 227 is a diagram illustrating an example of application of a receiver and a transmitter in Embodiment 12.

Figure 228:
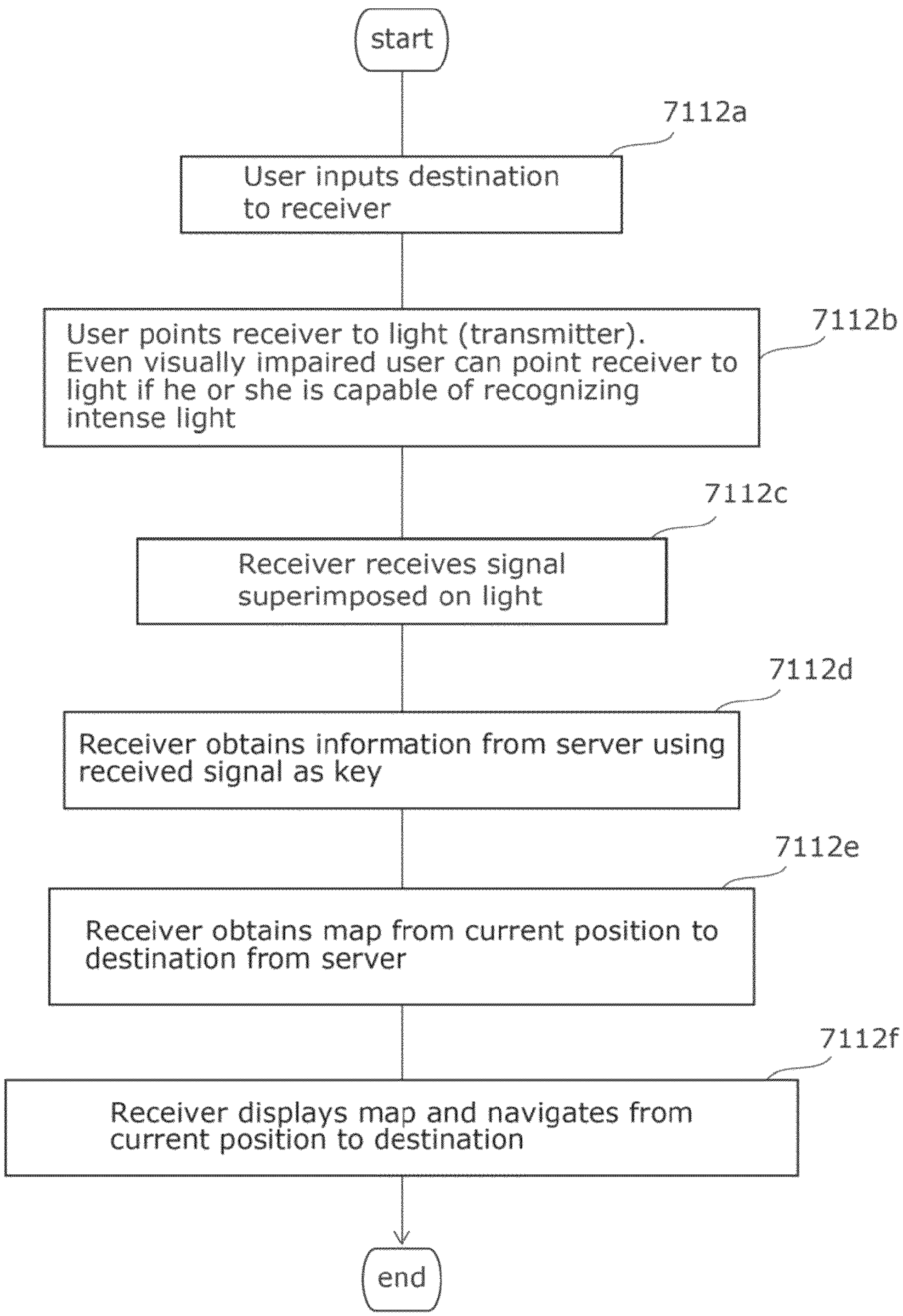

FIG. 228 is a flowchart illustrating an example of processing operation of a receiver and a transmitter in Embodiment 12.

Figure 229:
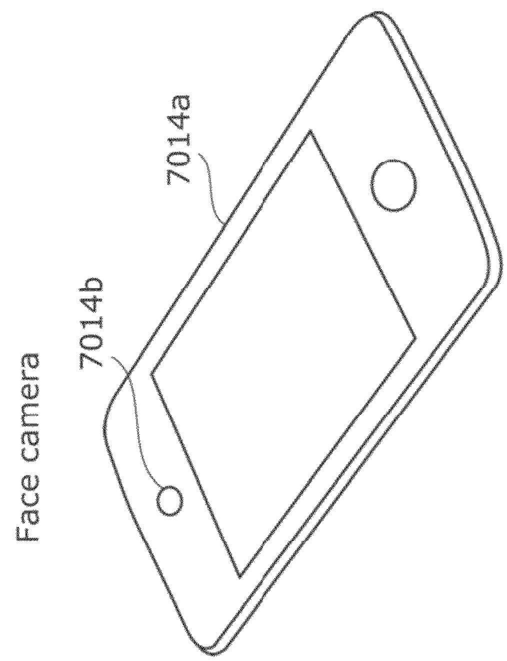

FIG. 229 is a diagram illustrating a state of a receiver in Embodiment 12.

Figure 230:
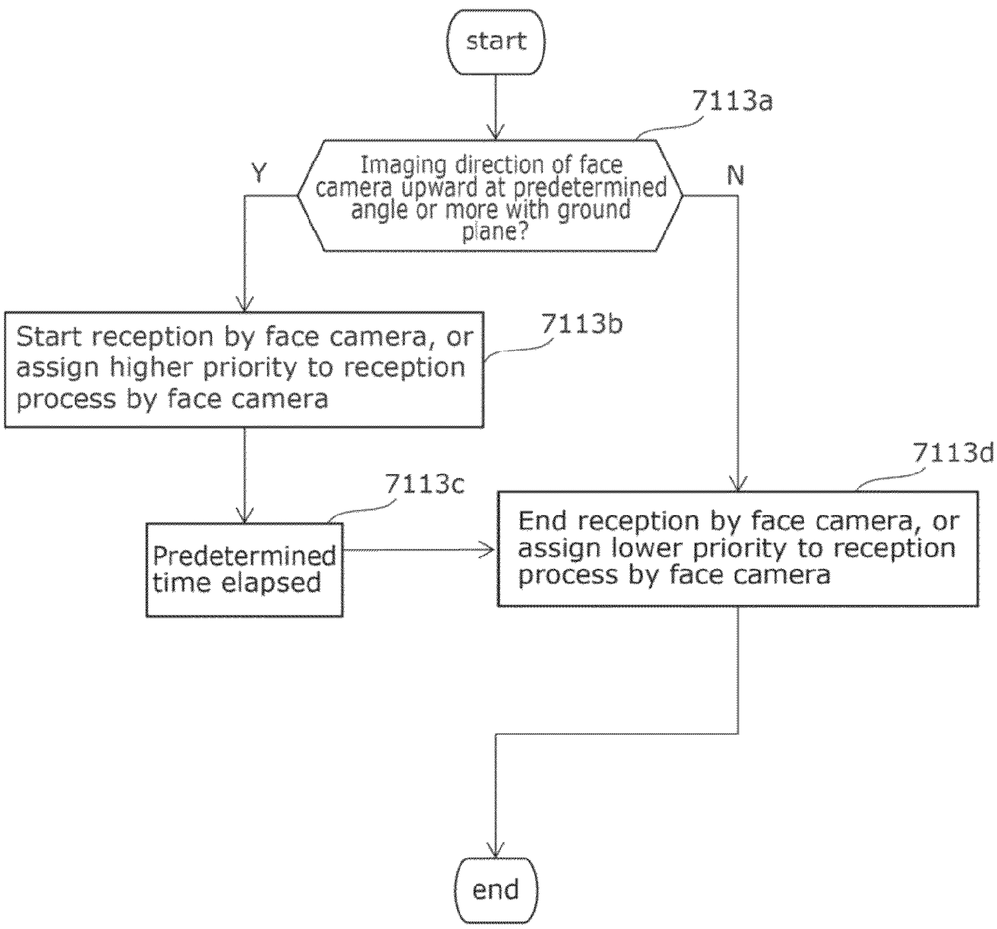

FIG. 230 is a flowchart illustrating an example of processing operation of a receiver in Embodiment 12.

Figure 231:
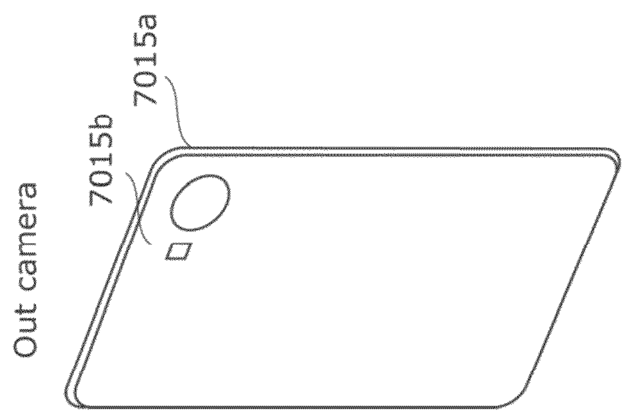

FIG. 231 is a diagram illustrating a state of a receiver in Embodiment 12.

Figure 232:
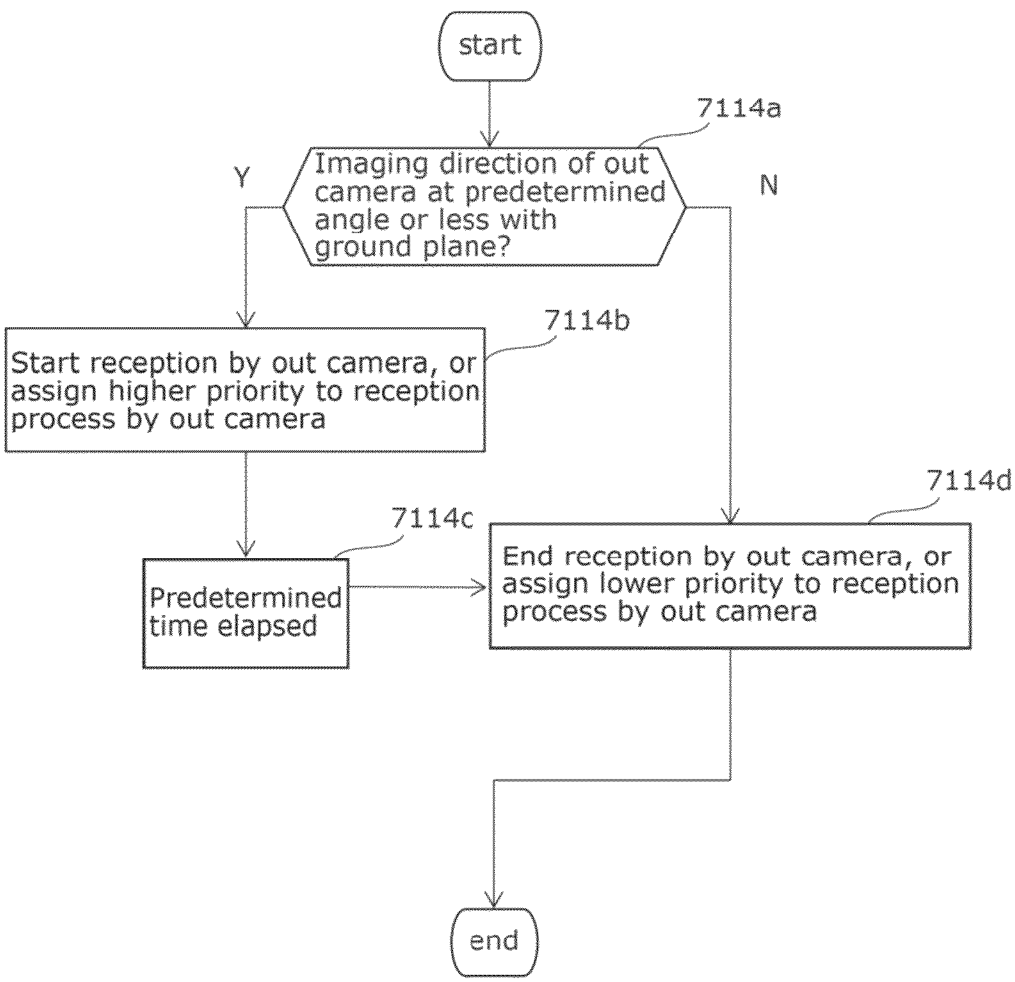

FIG. 232 is a flowchart illustrating an example of processing operation of a receiver in Embodiment 12.

Figure 233:
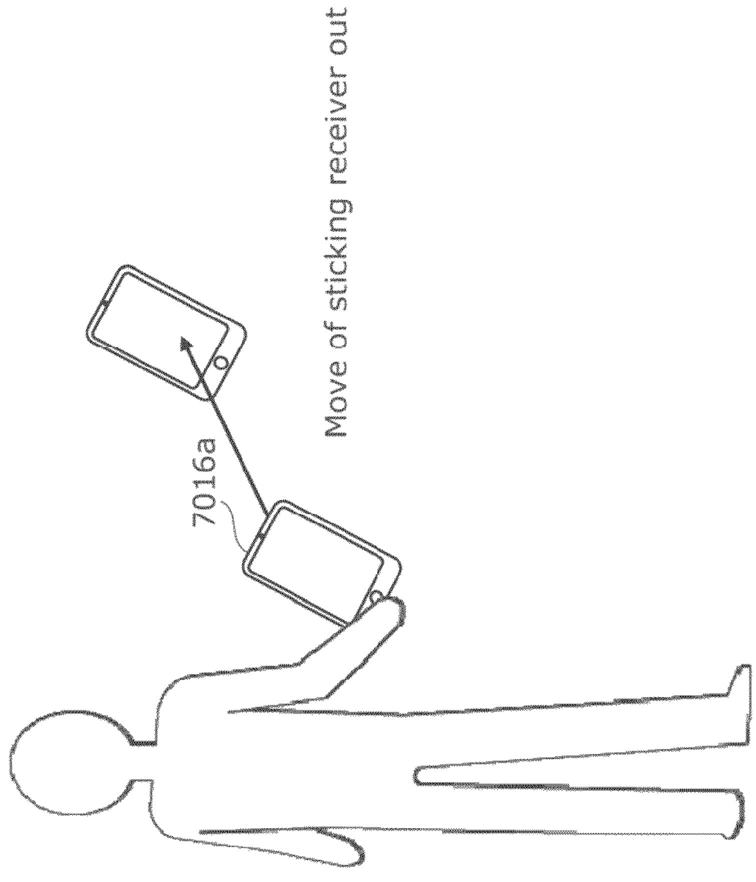

FIG. 233 is a diagram illustrating a state of a receiver in Embodiment 12.

Figure 234:
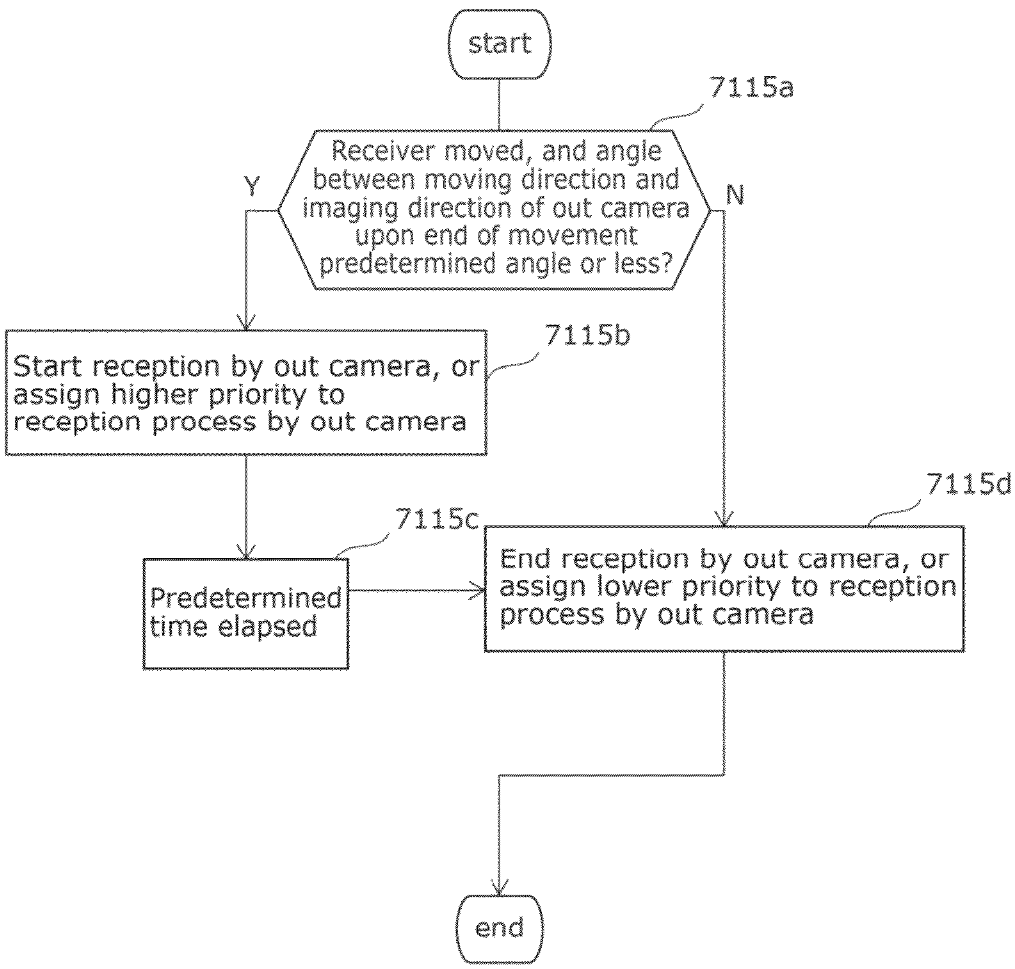

FIG. 234 is a flowchart illustrating an example of processing operation of a receiver in Embodiment 12.

Figure 235:
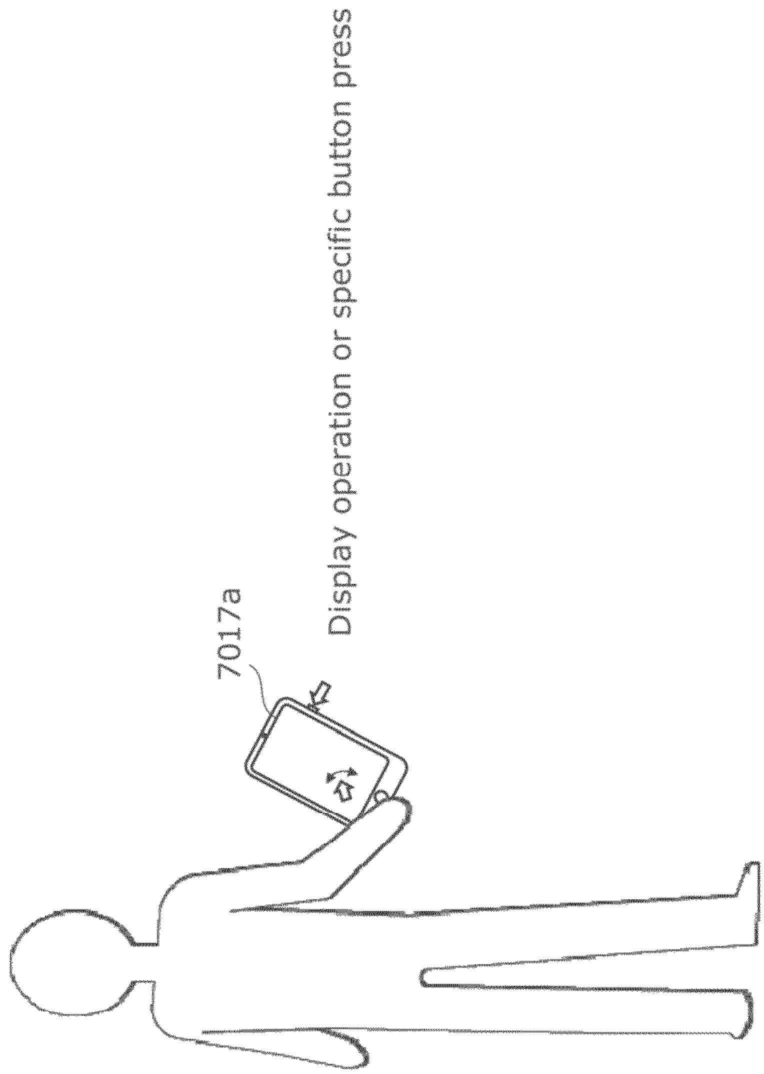

FIG. 235 is a diagram illustrating a state of a receiver in Embodiment 12.

Figure 236:
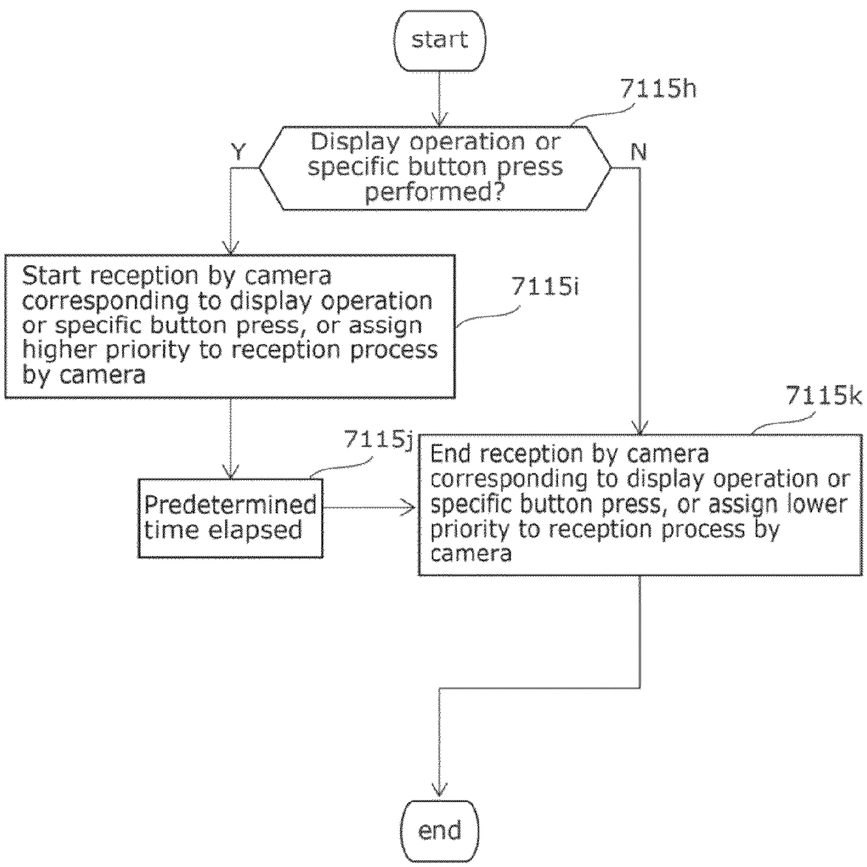

FIG. 236 is a flowchart illustrating an example of processing operation of a receiver in Embodiment 12.

Figure 237:
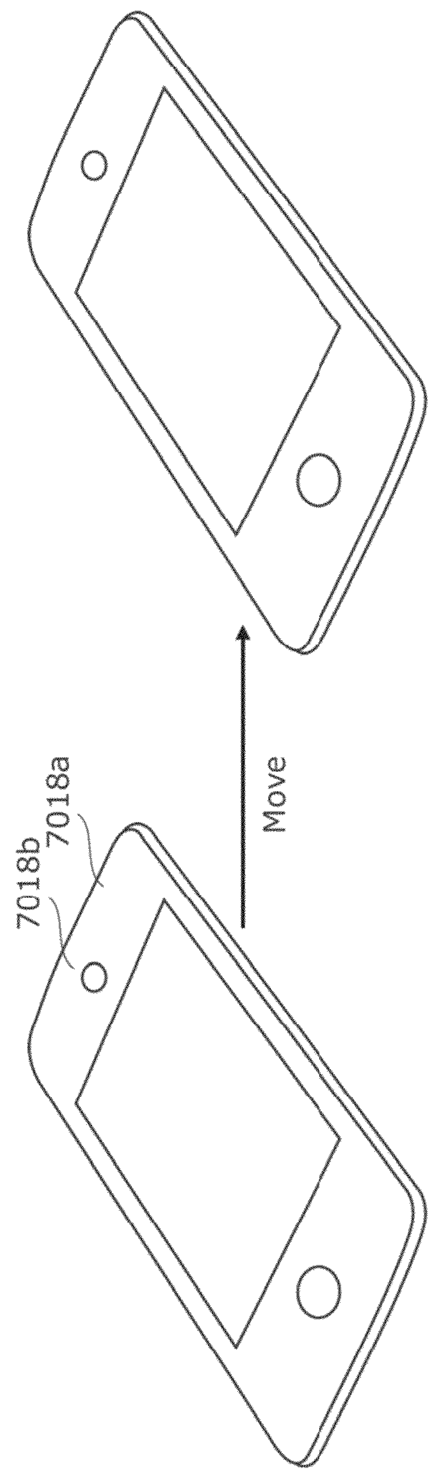

FIG. 237 is a diagram illustrating a state of a receiver in Embodiment 12.

Figure 238:
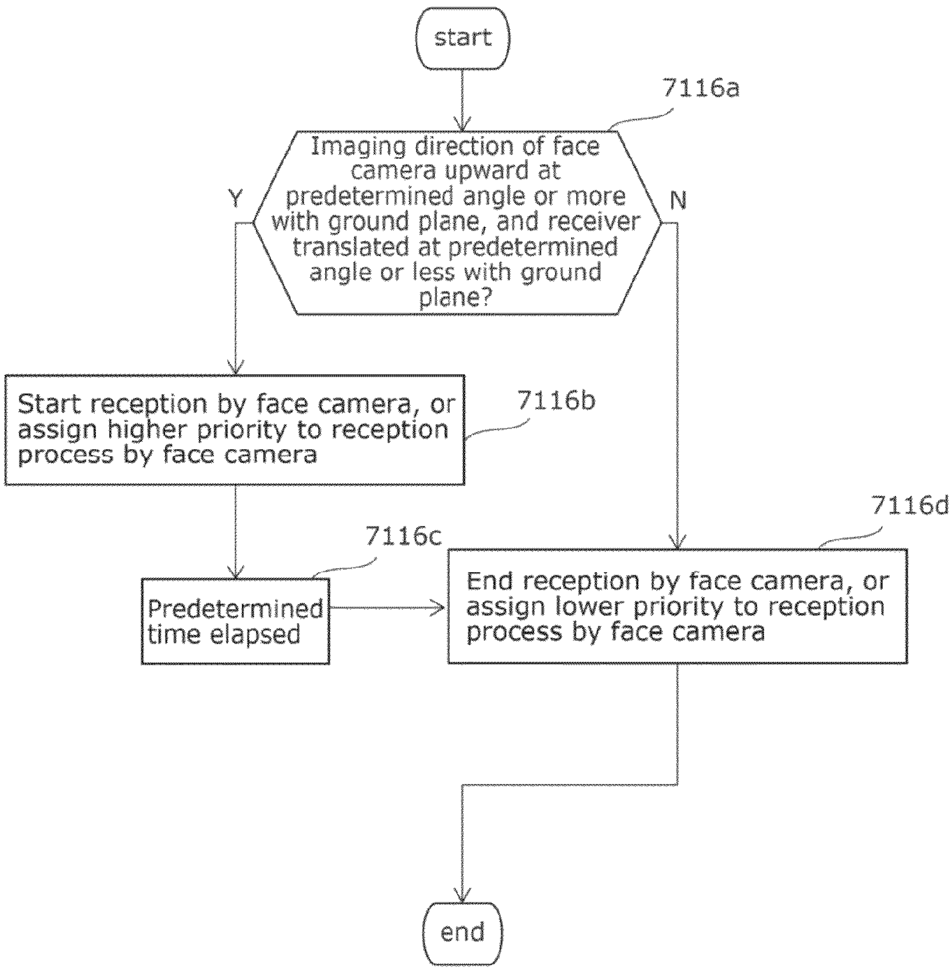

FIG. 238 is a flowchart illustrating an example of processing operation of a receiver in Embodiment 12.

Figure 239:
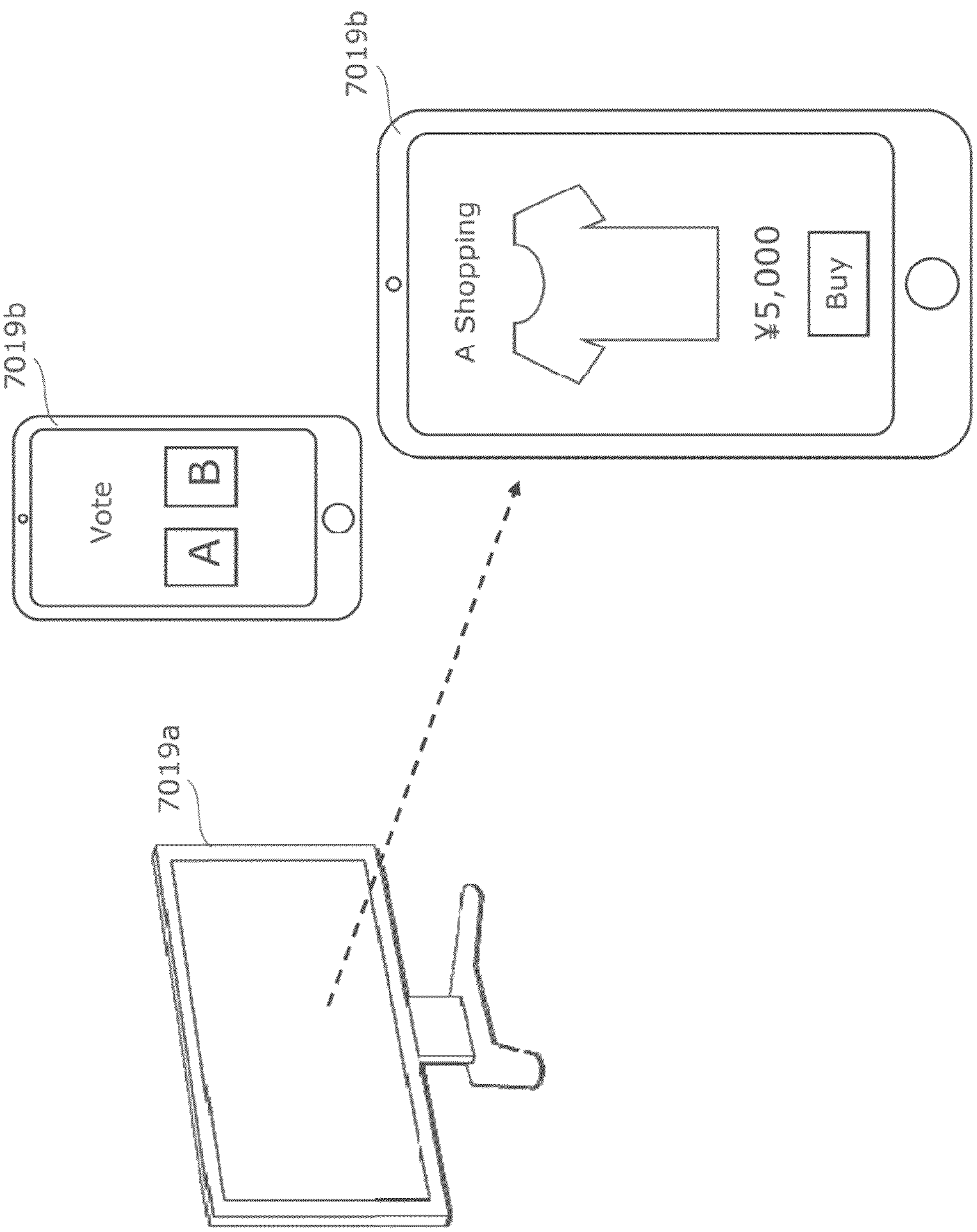

FIG. 239 is a diagram illustrating an example of application of a receiver and a transmitter in Embodiment 12.

FIG. 240 is a diagram illustrating an example of application of a receiver and a transmitter in Embodiment 12.

Figure 241:
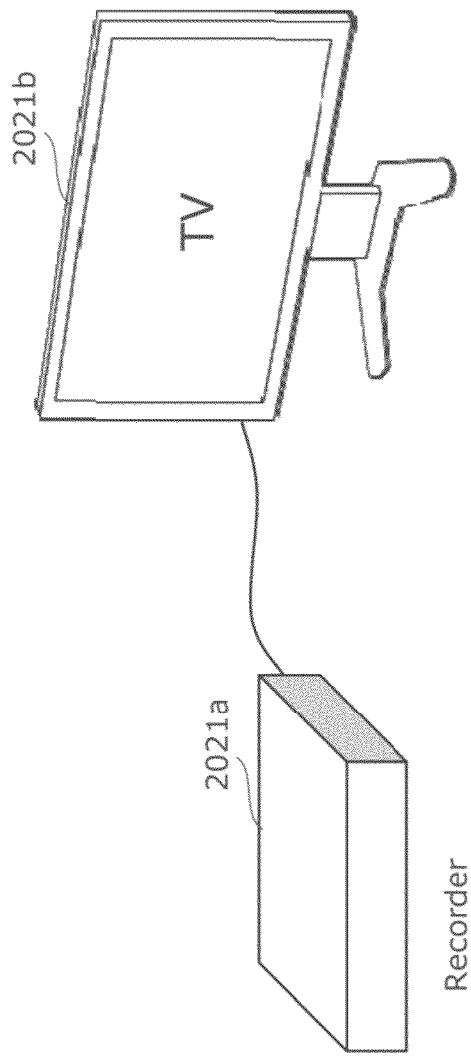

FIG. 241 is a diagram illustrating an example of application of a receiver and a transmitter in Embodiment 12.

Figure 242:
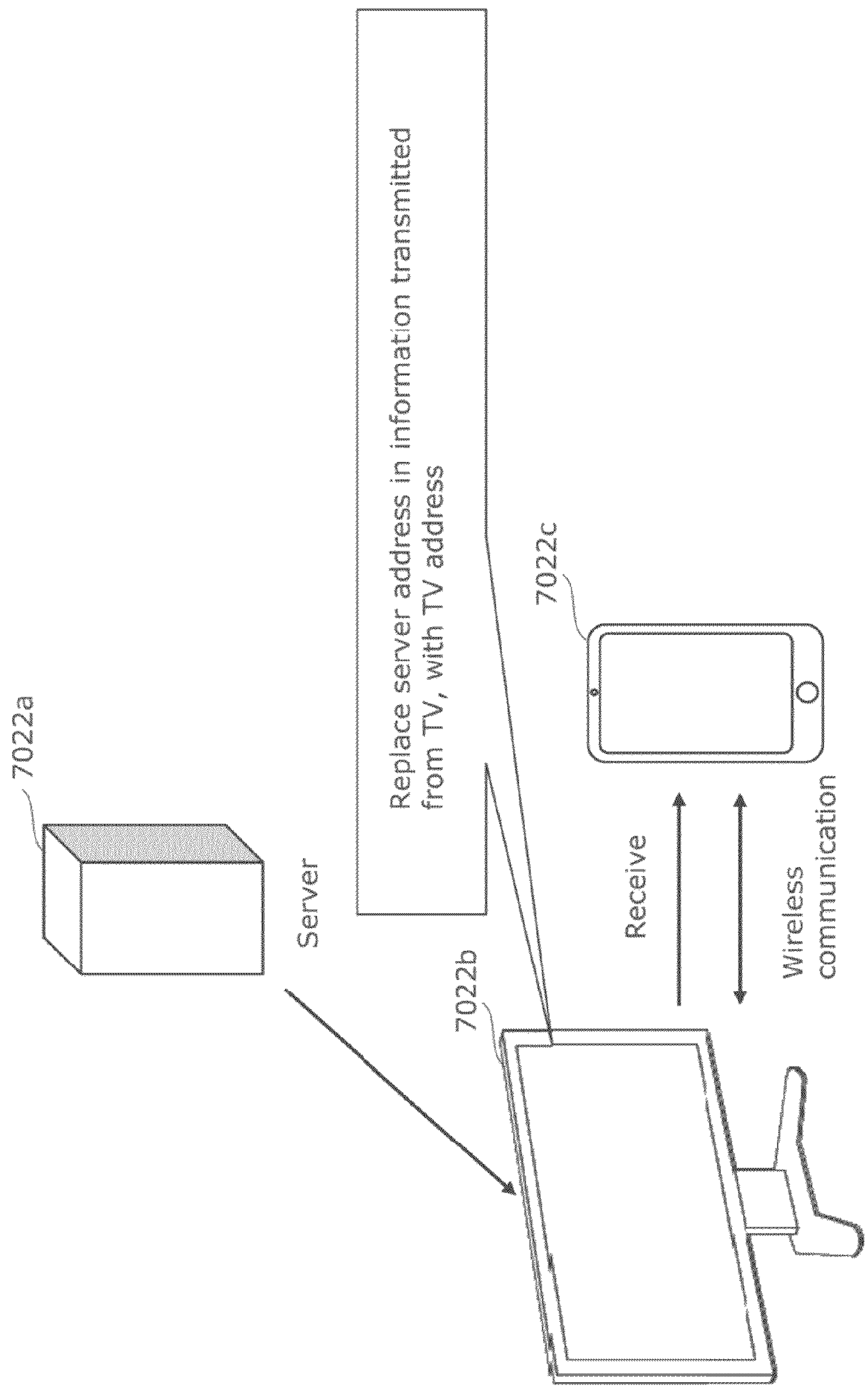

FIG. 242 is a diagram illustrating an example of application of a receiver and a transmitter in Embodiment 12.

Figure 243:
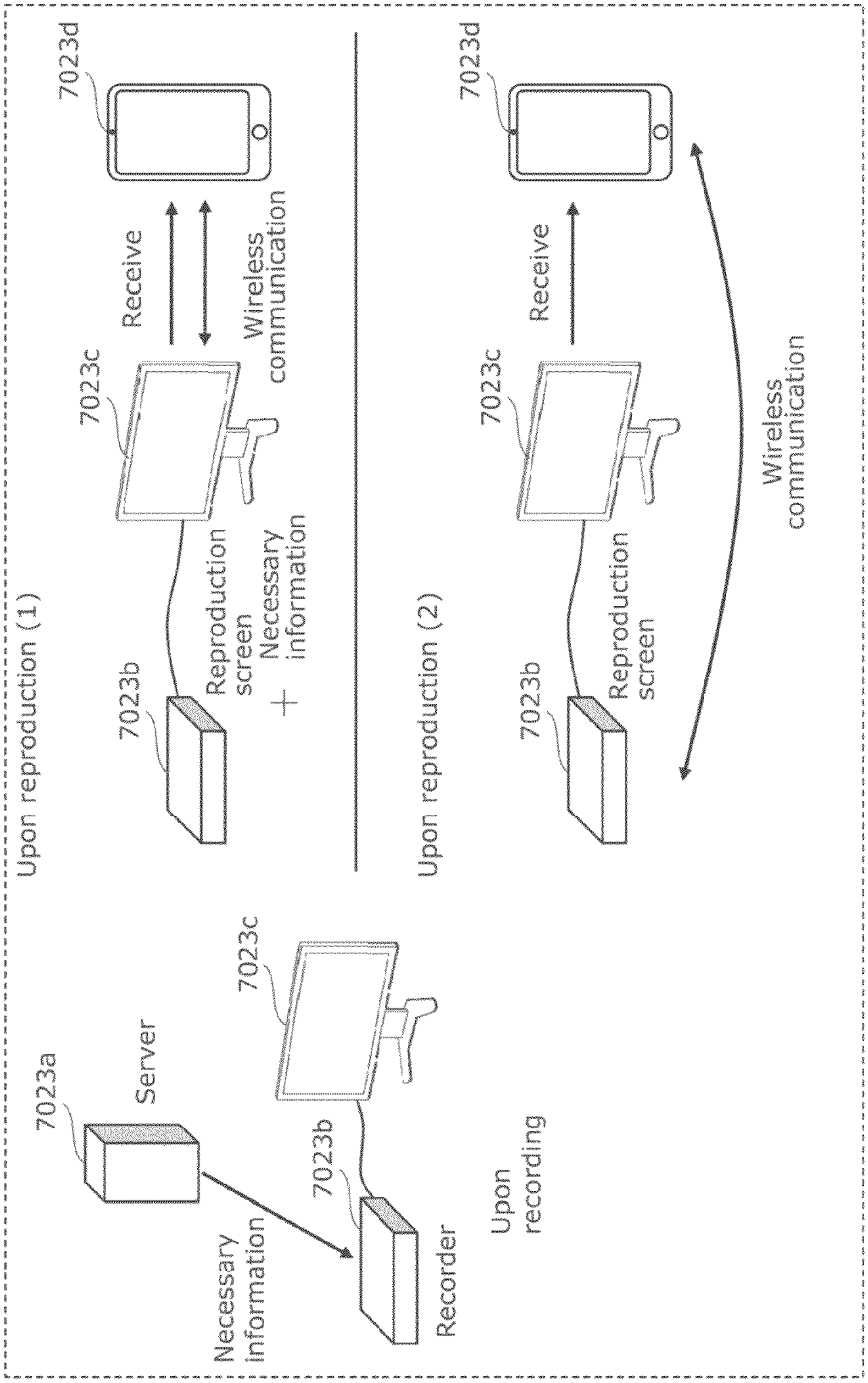

FIG. 243 is a diagram illustrating an example of application of a receiver and a transmitter in Embodiment 12.

Figure 244:
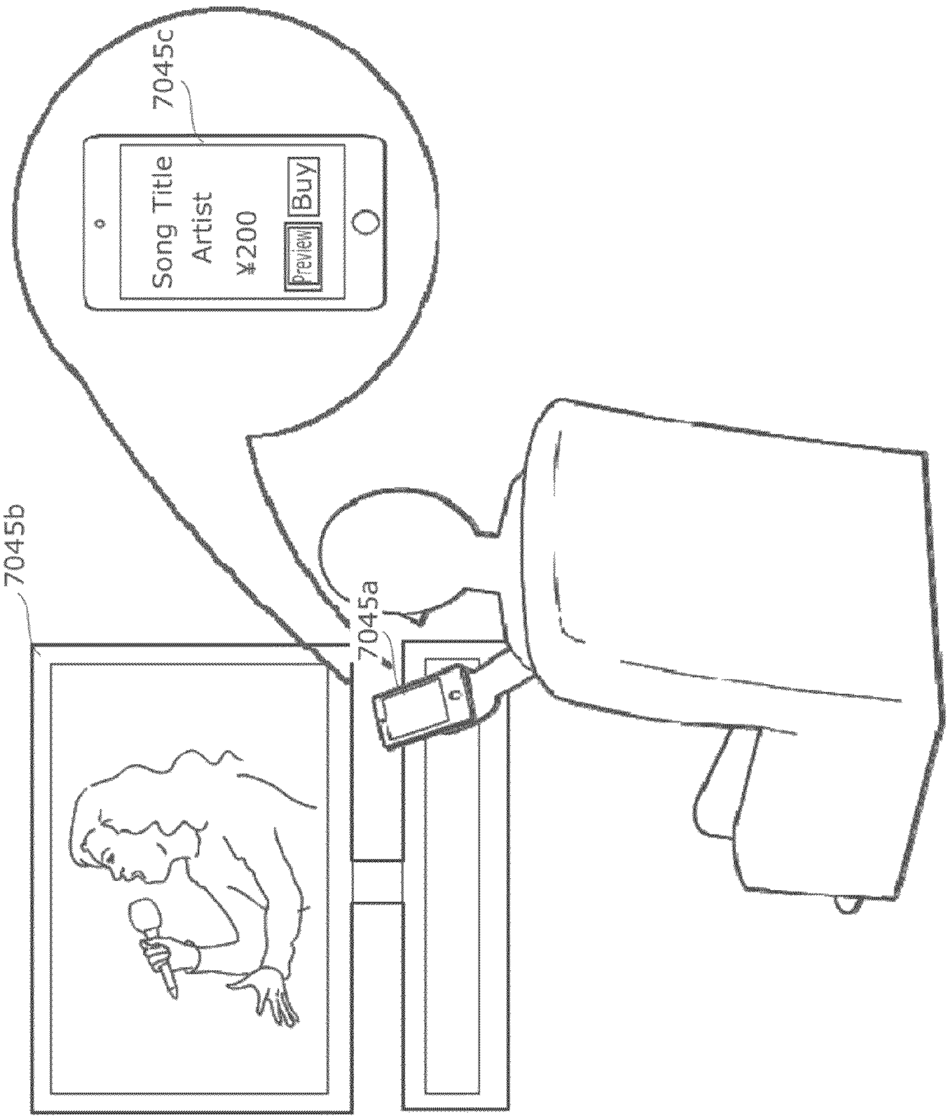

FIG. 244 is a diagram illustrating an example of application of a receiver and a transmitter in Embodiment 12.

Figure 245:
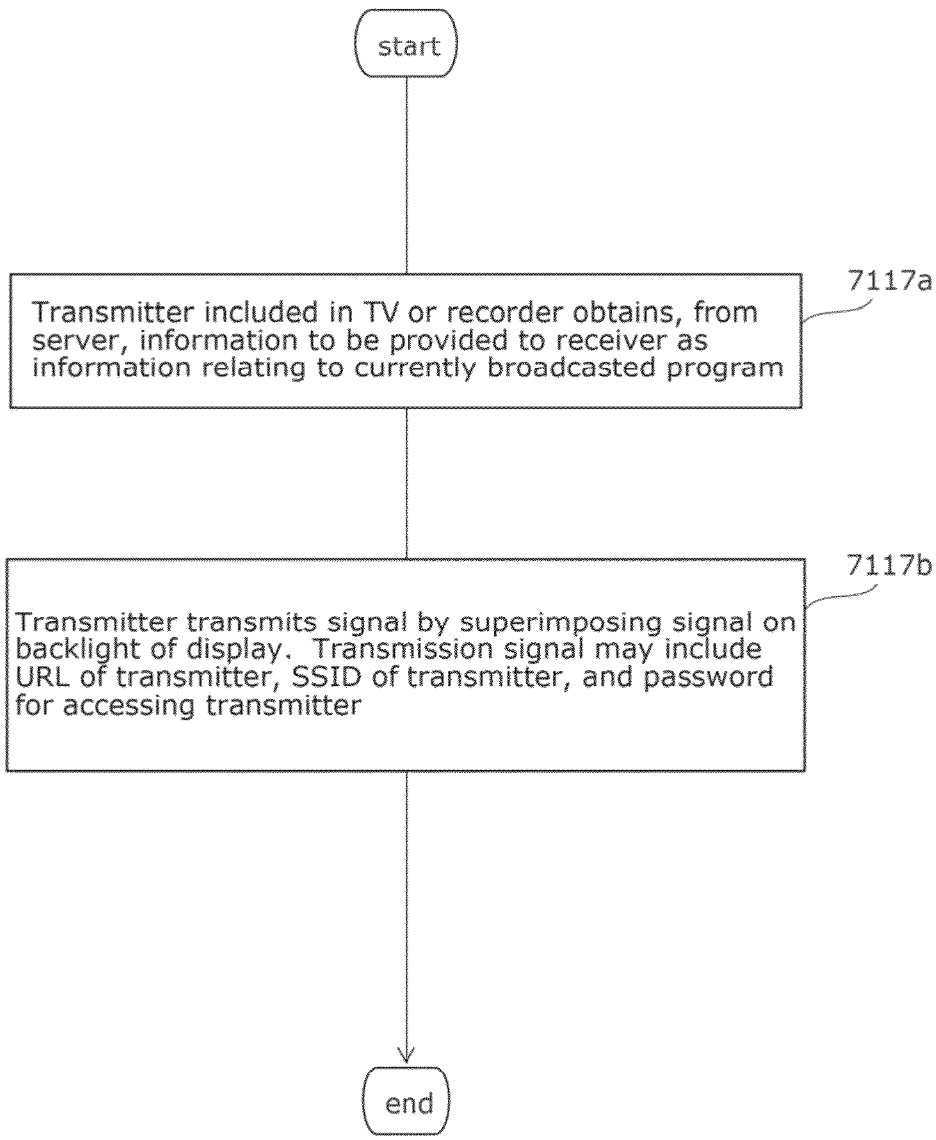

FIG. 245 is a flowchart illustrating an example of processing operation of a receiver and a transmitter in Embodiment 12.

Figure 246:
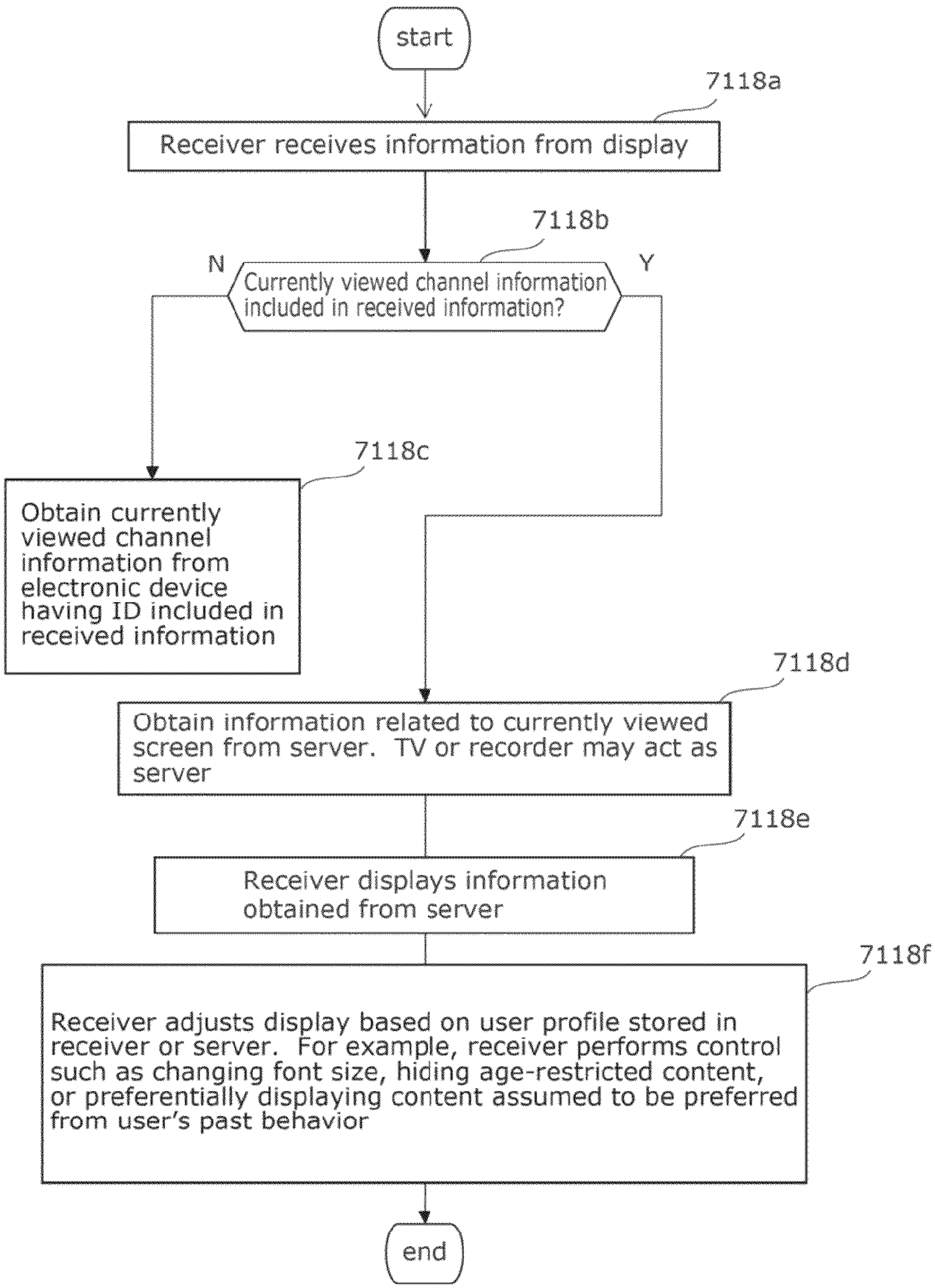

FIG. 246 is a flowchart illustrating an example of processing operation of a receiver and a transmitter in Embodiment 12.

Figure 247:
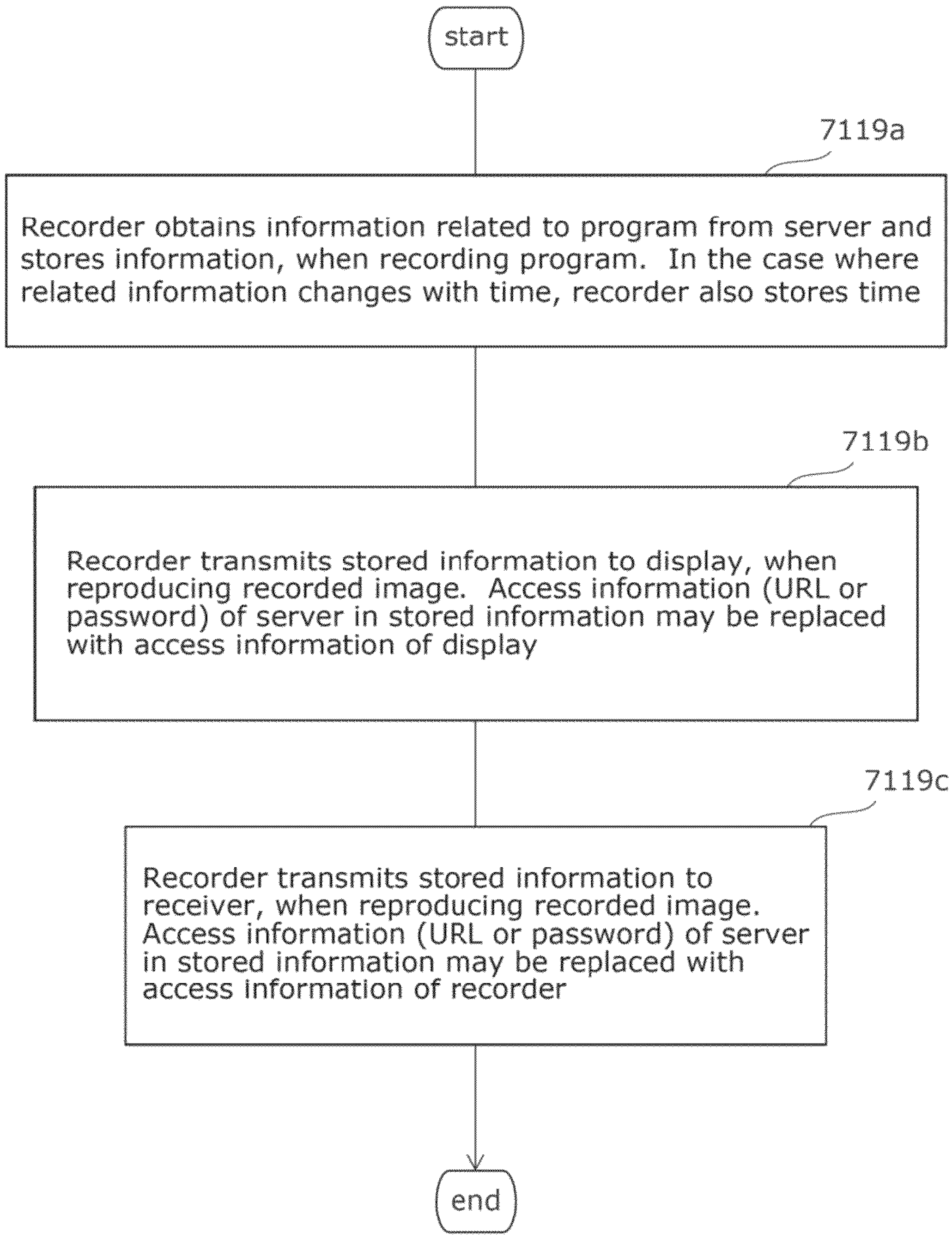

FIG. 247 is a flowchart illustrating an example of processing operation of a receiver and a transmitter in Embodiment 12.

Figure 248:
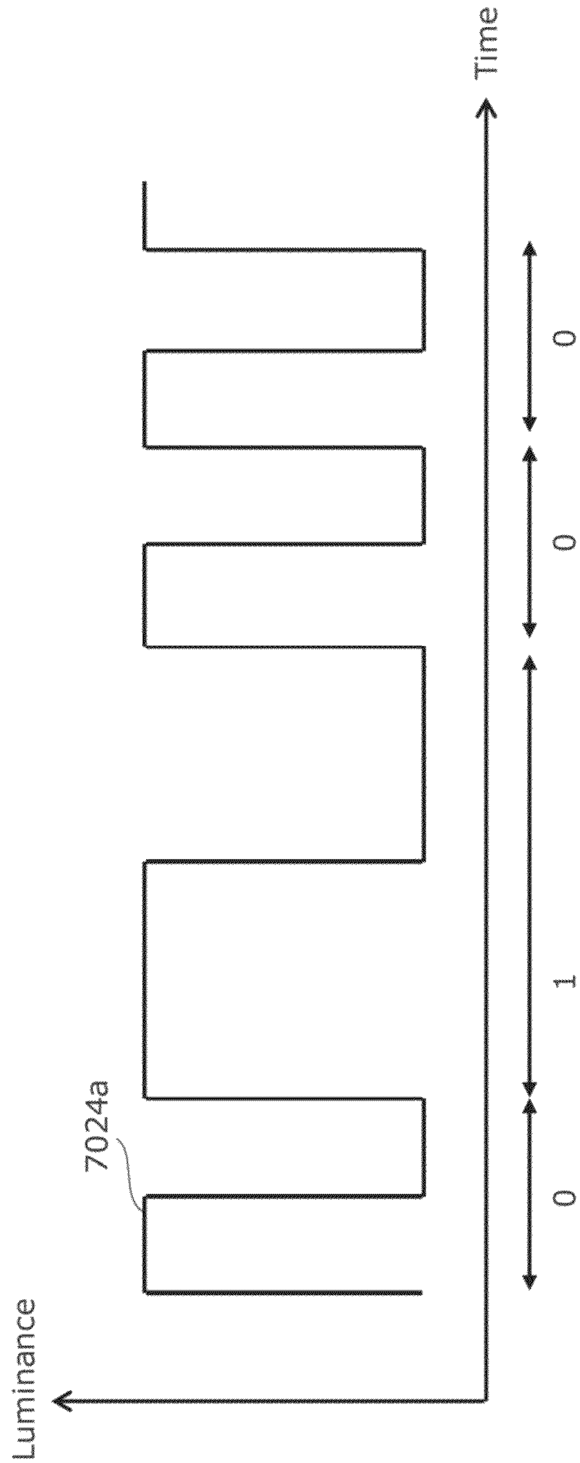

FIG. 248 is a diagram illustrating a luminance change of a transmitter in Embodiment 12.

Figure 249:
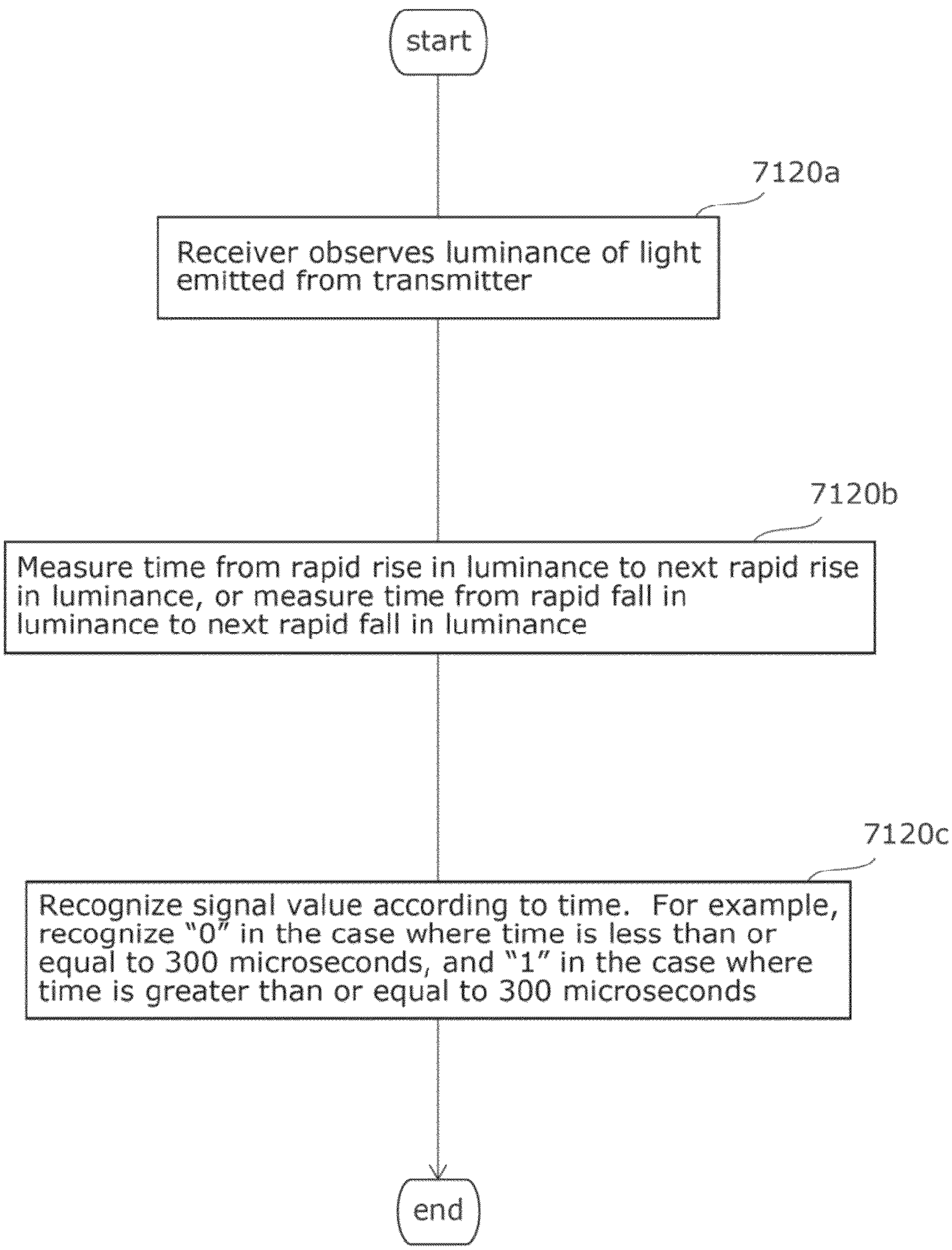

FIG. 249 is a flowchart illustrating an example of processing operation of a receiver in Embodiment 12.

Figure 250:
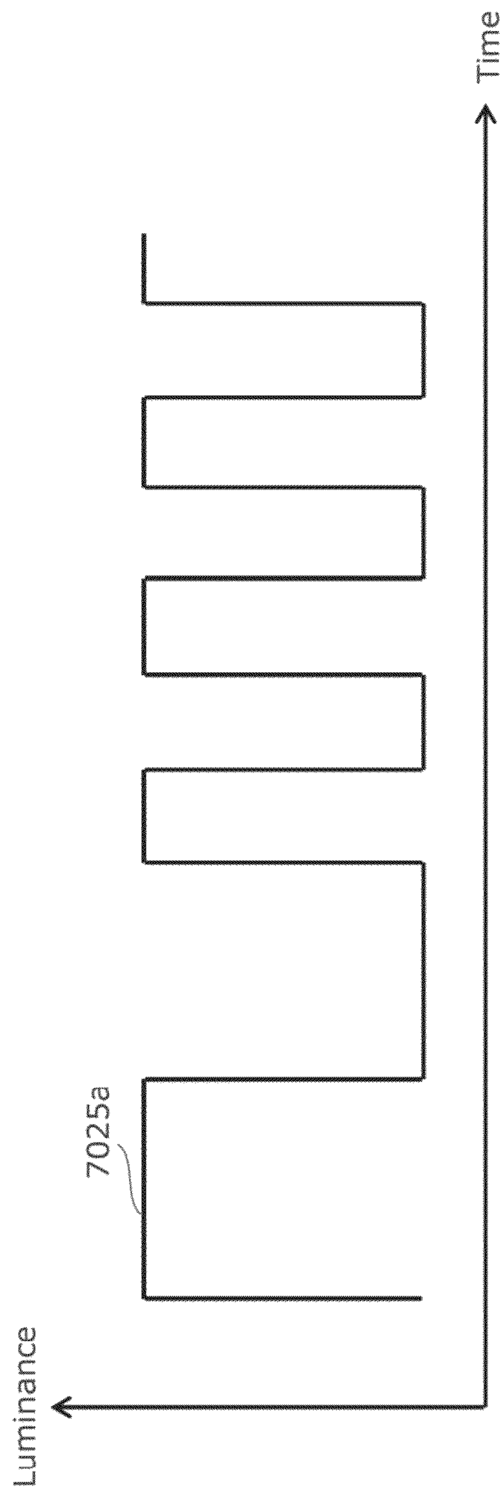

FIG. 250 is a diagram illustrating a luminance change of a transmitter in Embodiment 12.

Figure 251:
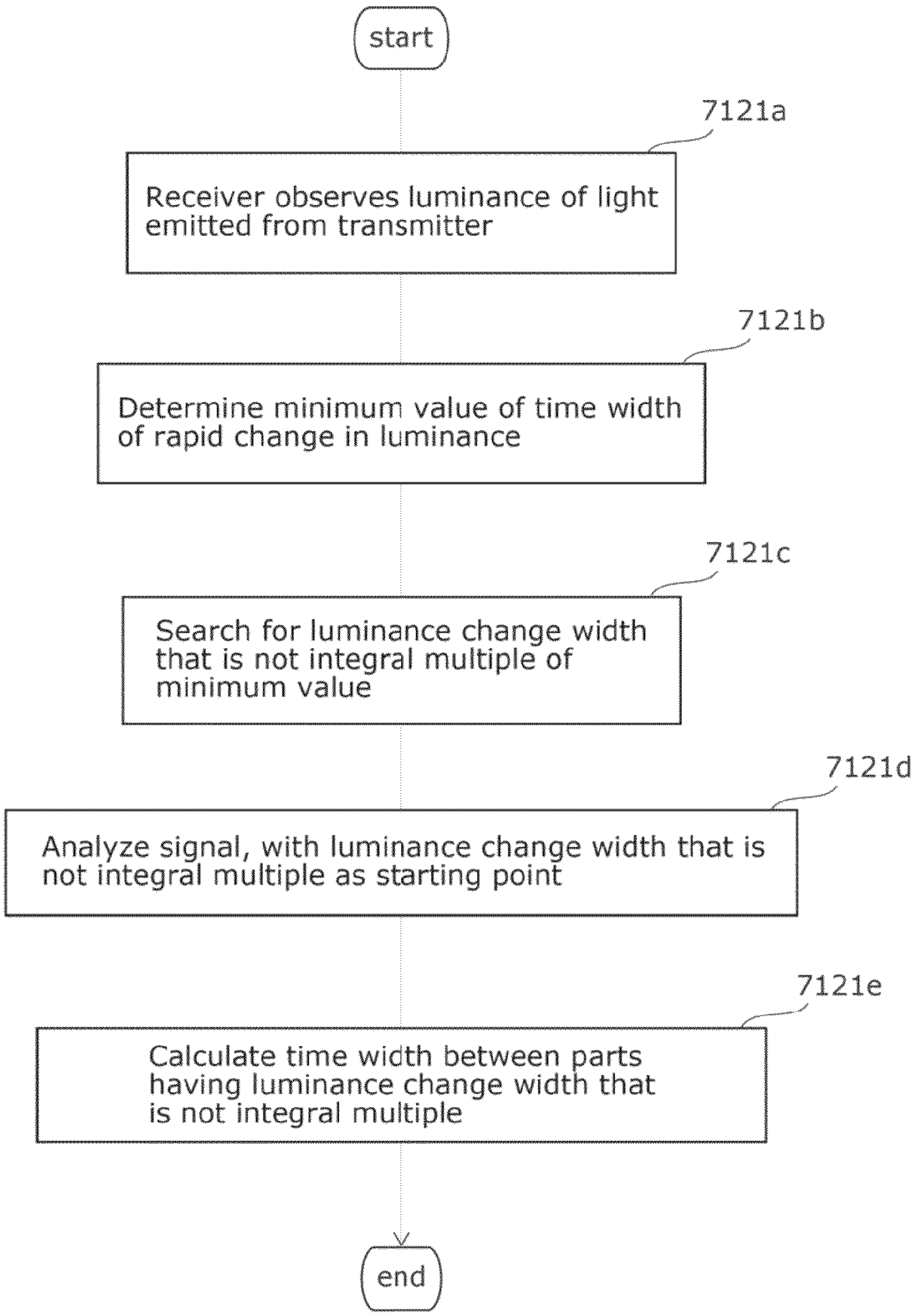

FIG. 251 is a flowchart illustrating an example of processing operation of a receiver in Embodiment 12.

Figure 252:
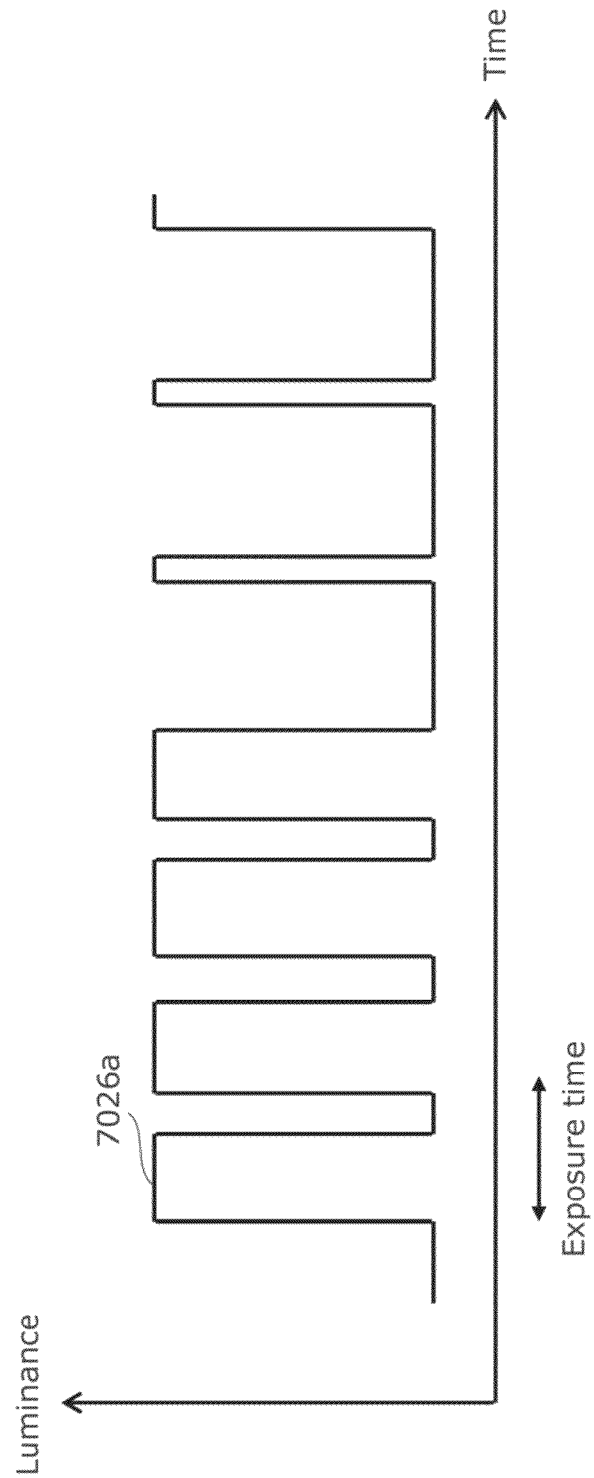

FIG. 252 is a diagram illustrating a luminance change of a transmitter in Embodiment 12.

Figure 253:
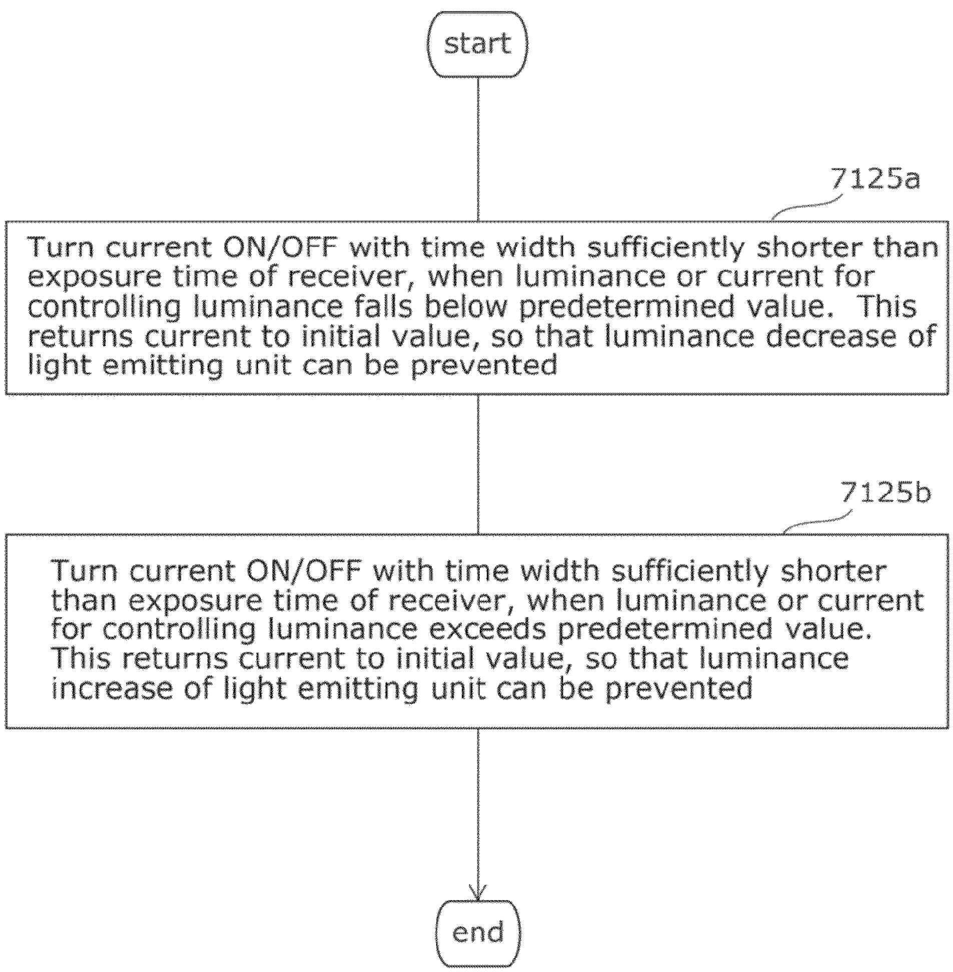

FIG. 253 is a flowchart illustrating an example of processing operation of a transmitter in Embodiment 12.

Figure 254:
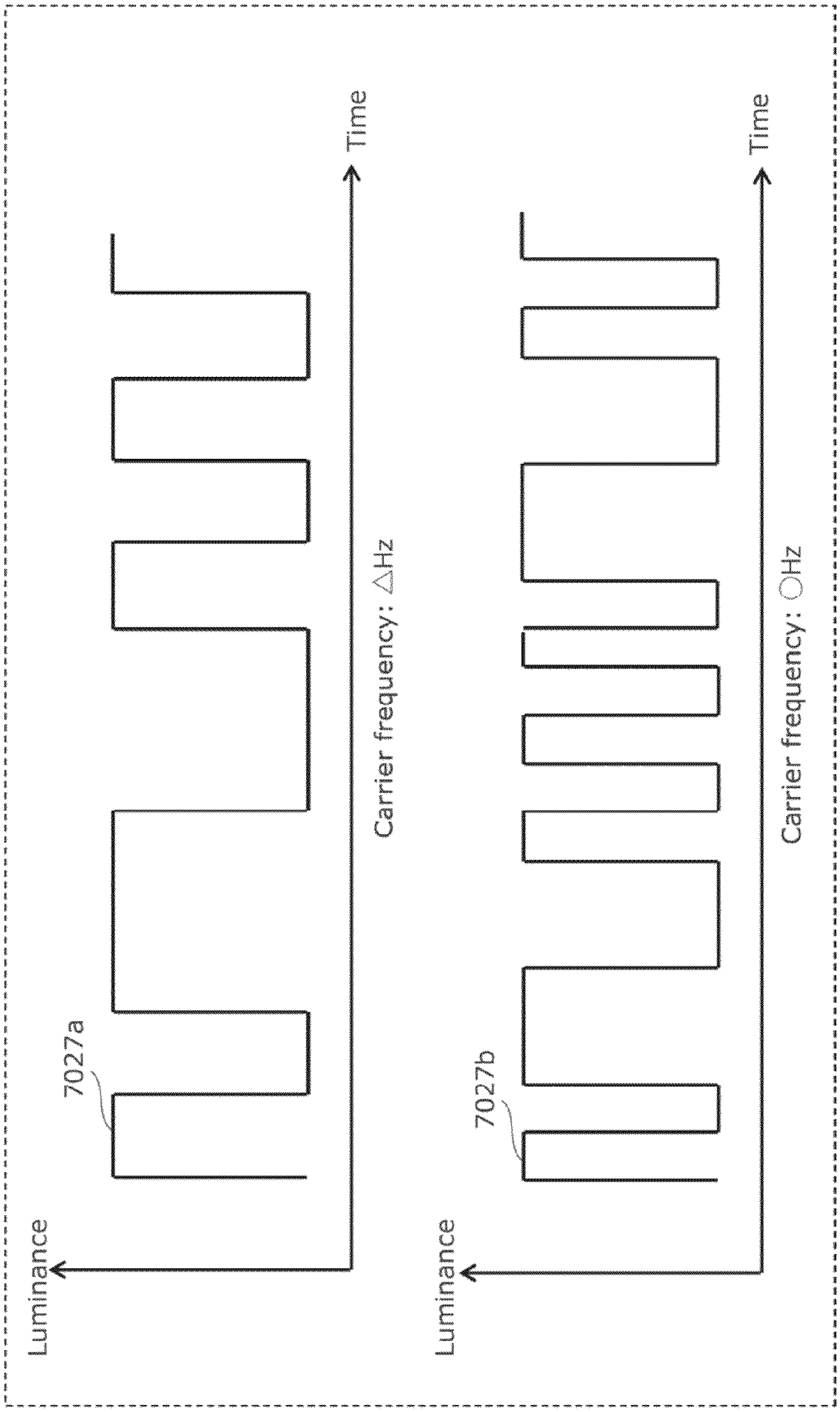

FIG. 254 is a diagram illustrating a luminance change of a transmitter in Embodiment 12.

Figure 255:
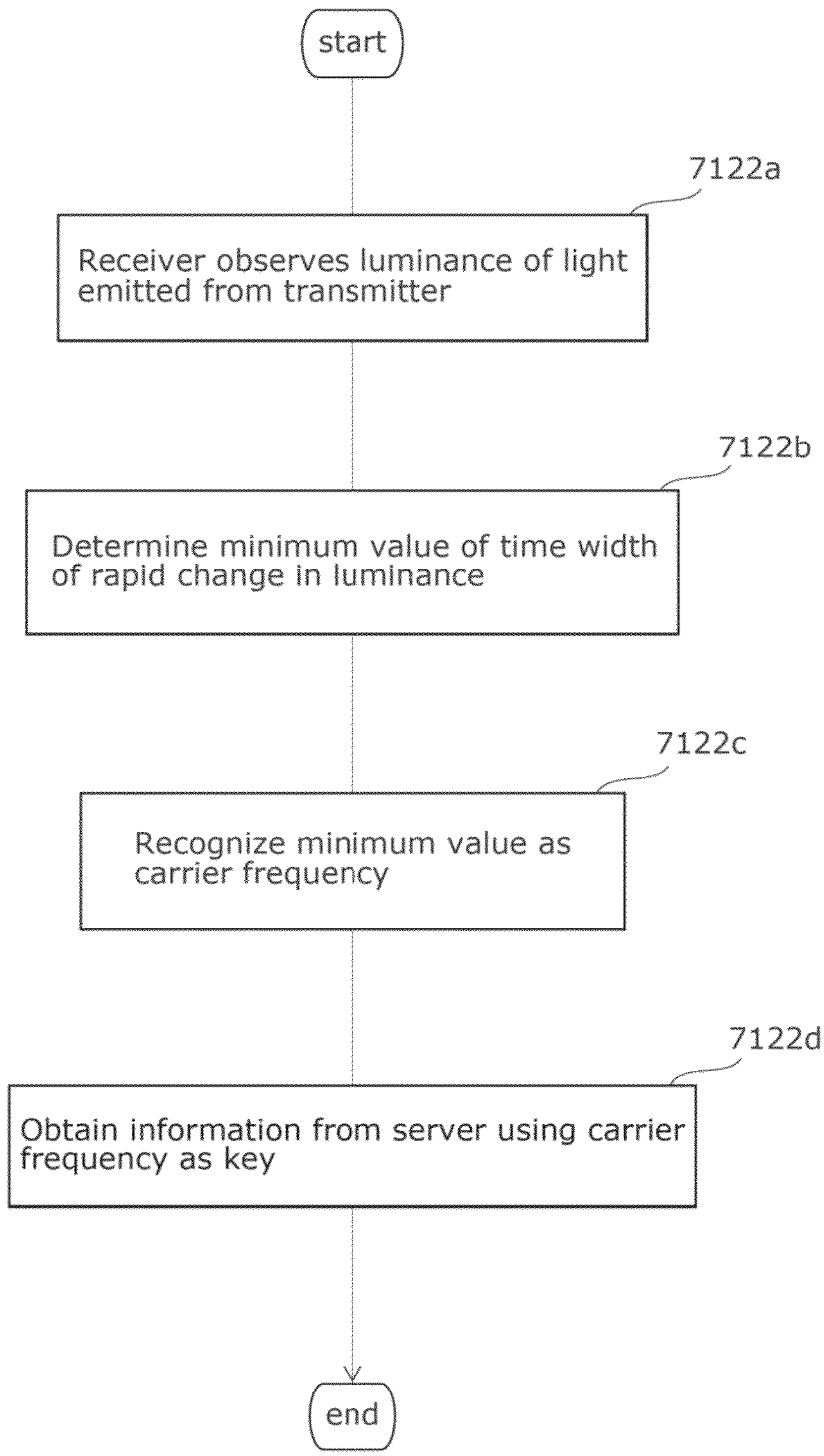

FIG. 255 is a flowchart illustrating an example of processing operation of a receiver in Embodiment 12.

Figure 256:
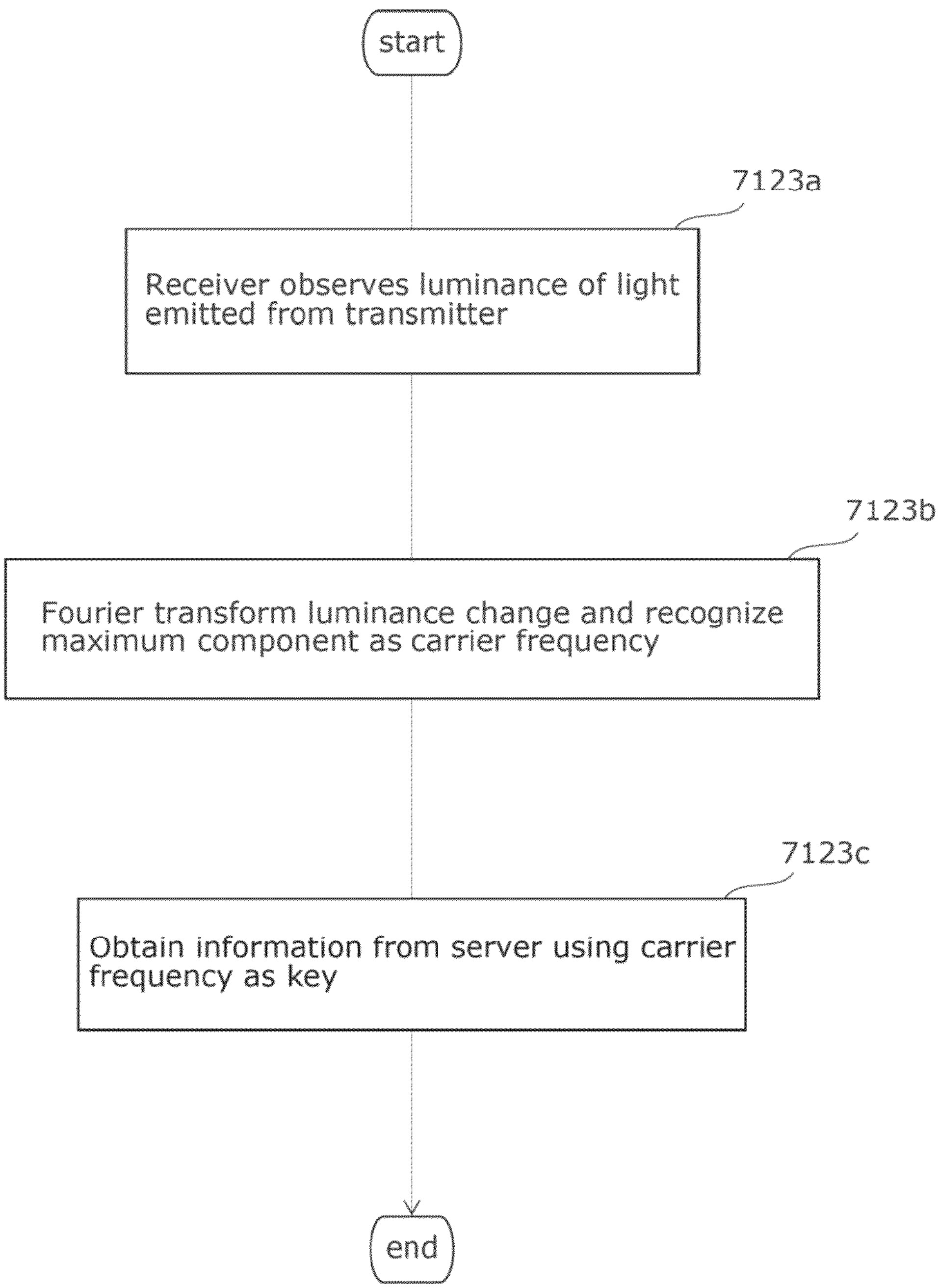

FIG. 256 is a flowchart illustrating an example of processing operation of a receiver in Embodiment 12.

Figure 257:
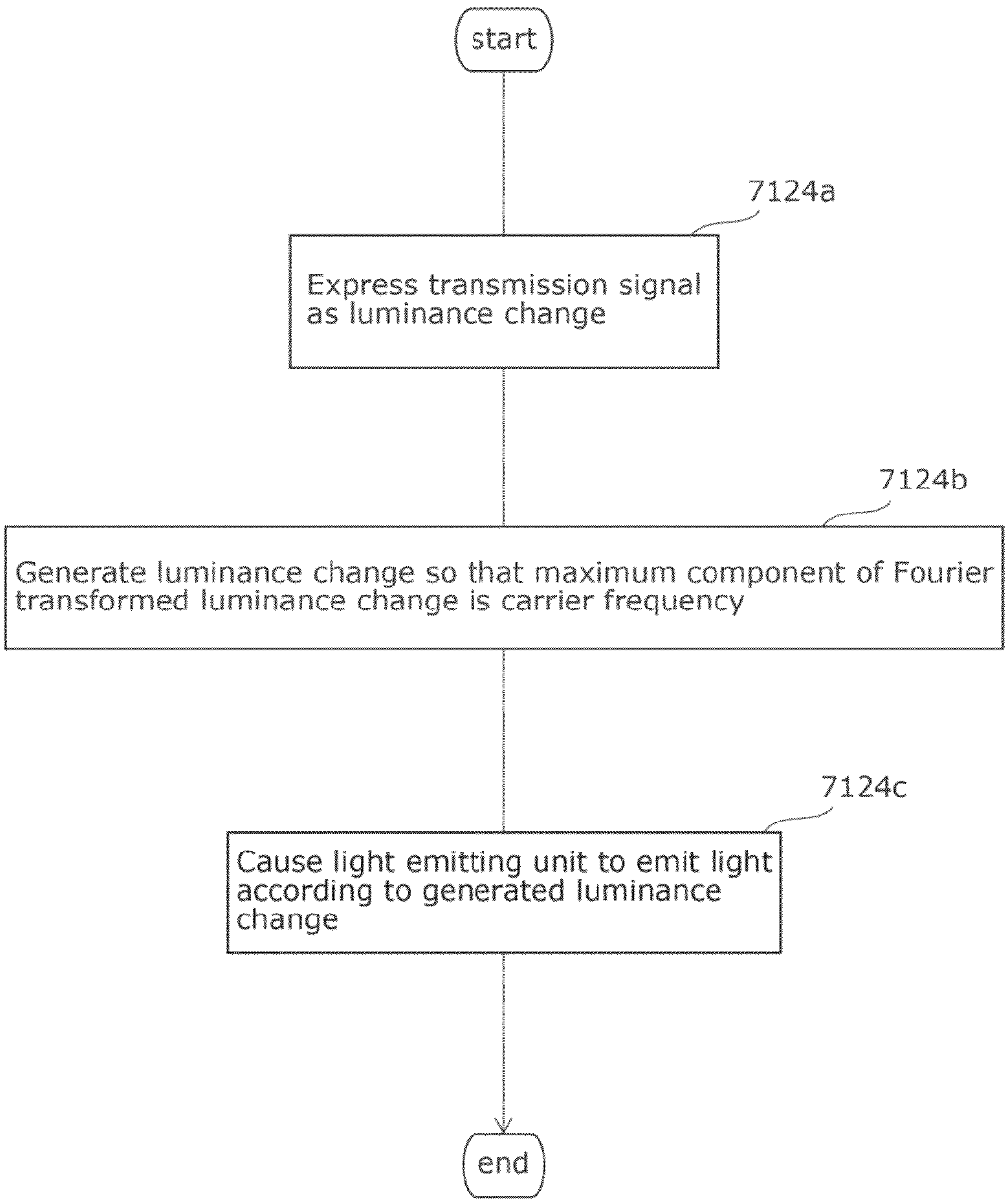

FIG. 257 is a flowchart illustrating an example of processing operation of a transmitter in Embodiment 12.

Figure 258:
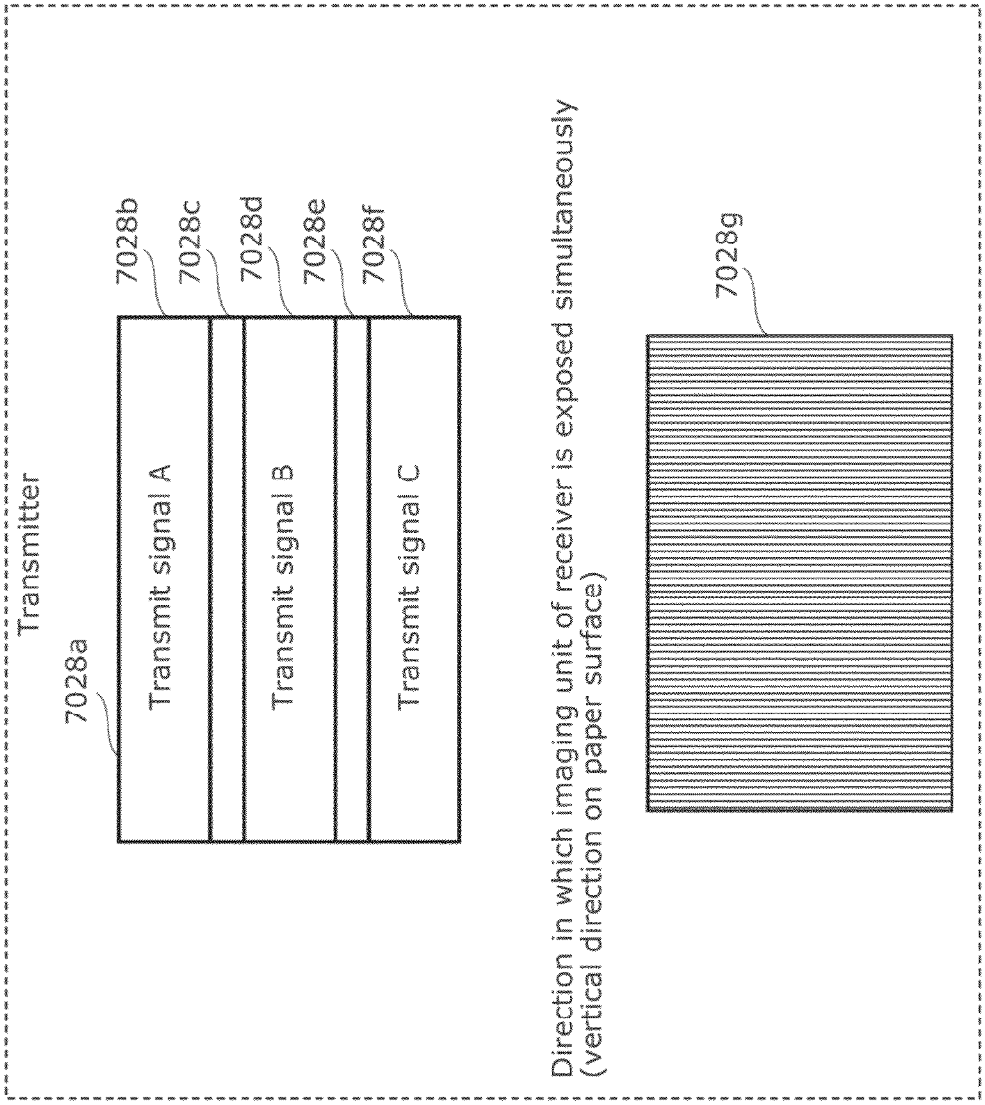

FIG. 258 is a diagram illustrating an example of a structure of a transmitter in Embodiment 12.

Figure 259:
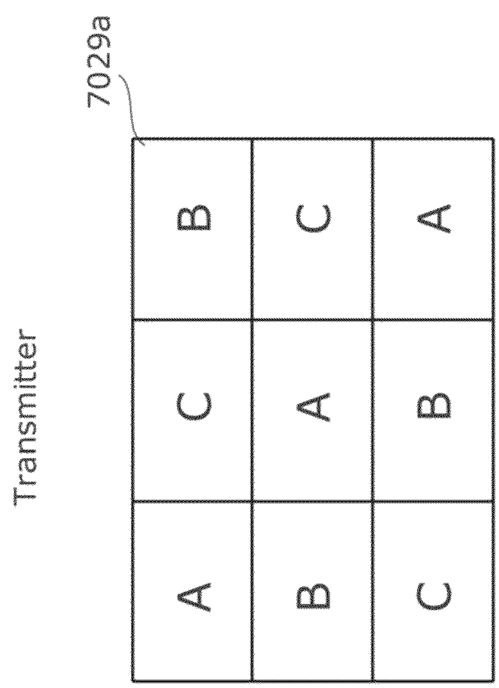

FIG. 259 is a diagram illustrating an example of a structure of a transmitter in Embodiment 12.

Figure 260:
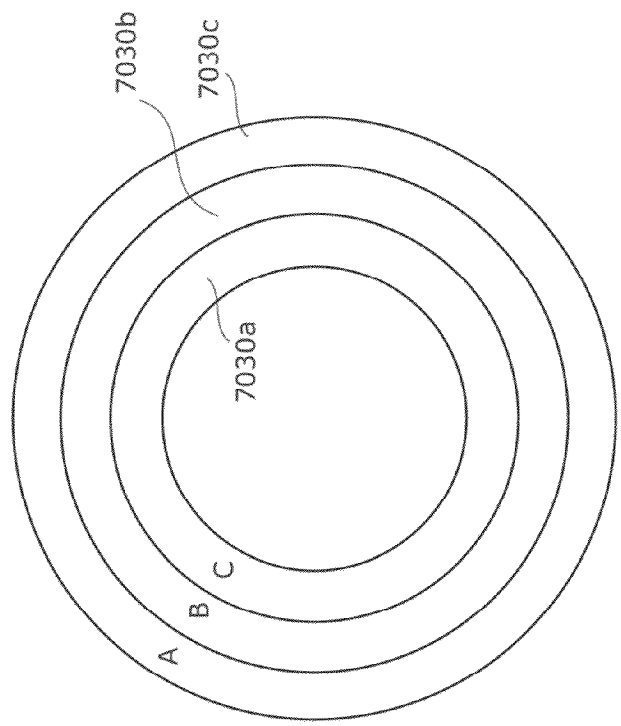

FIG. 260 is a diagram illustrating an example of a structure of a transmitter in Embodiment 12.

Figure 261:
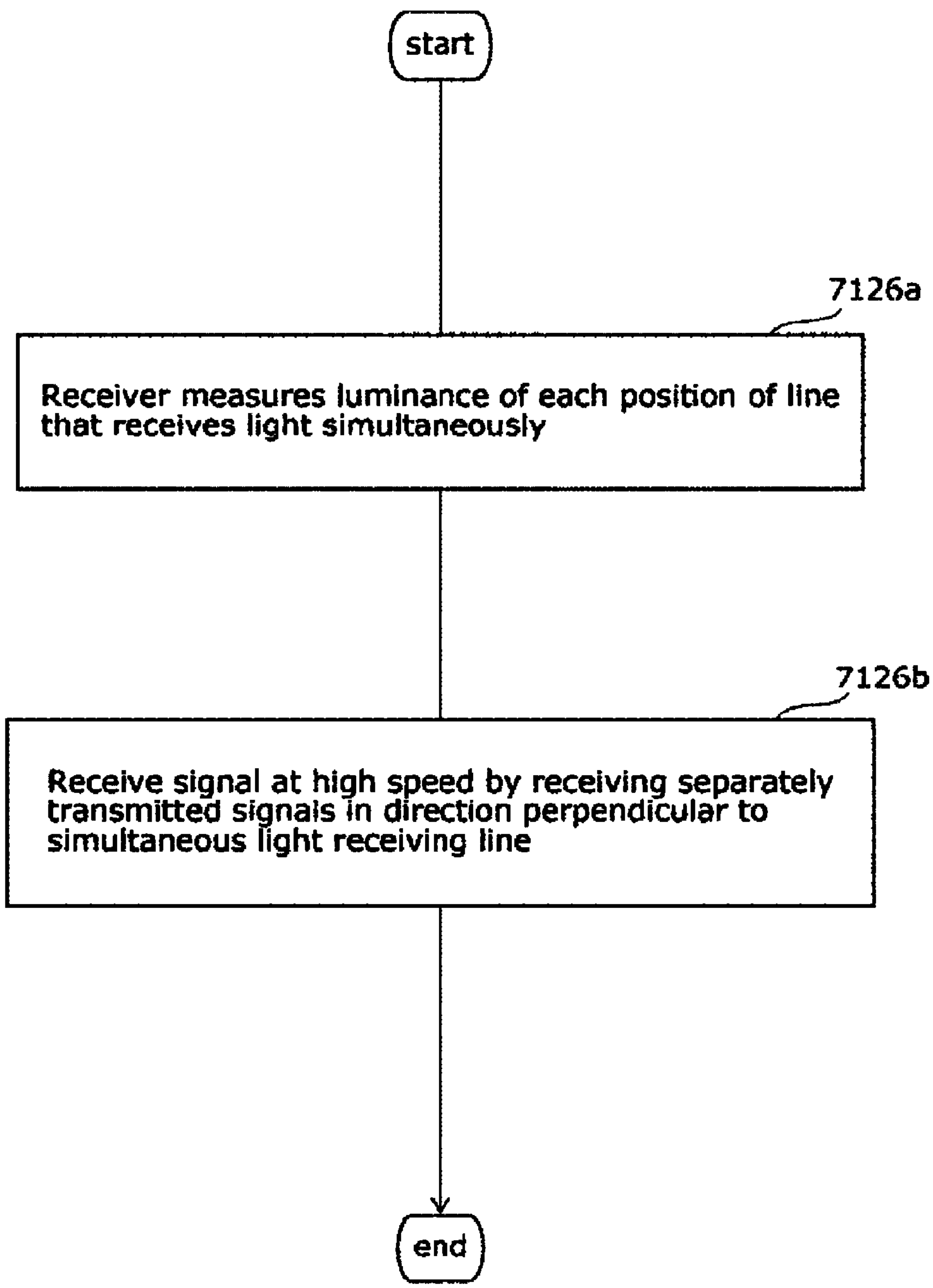

FIG. 261 is a flowchart illustrating an example of processing operation of a receiver in Embodiment 12.

Figure 262:
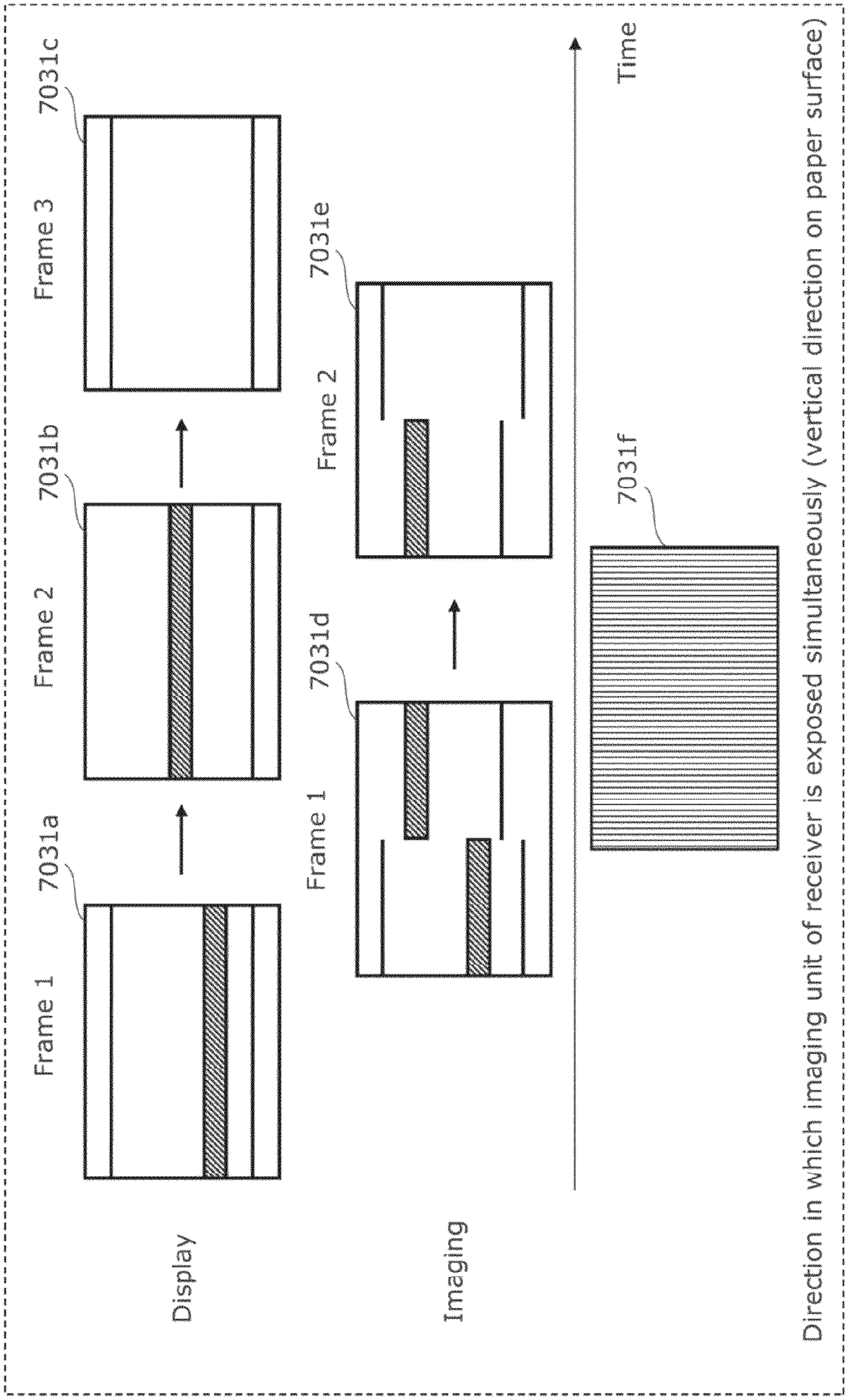

FIG. 262 is a diagram illustrating an example of display and imaging by a receiver and a transmitter in Embodiment 12.

Figure 263:
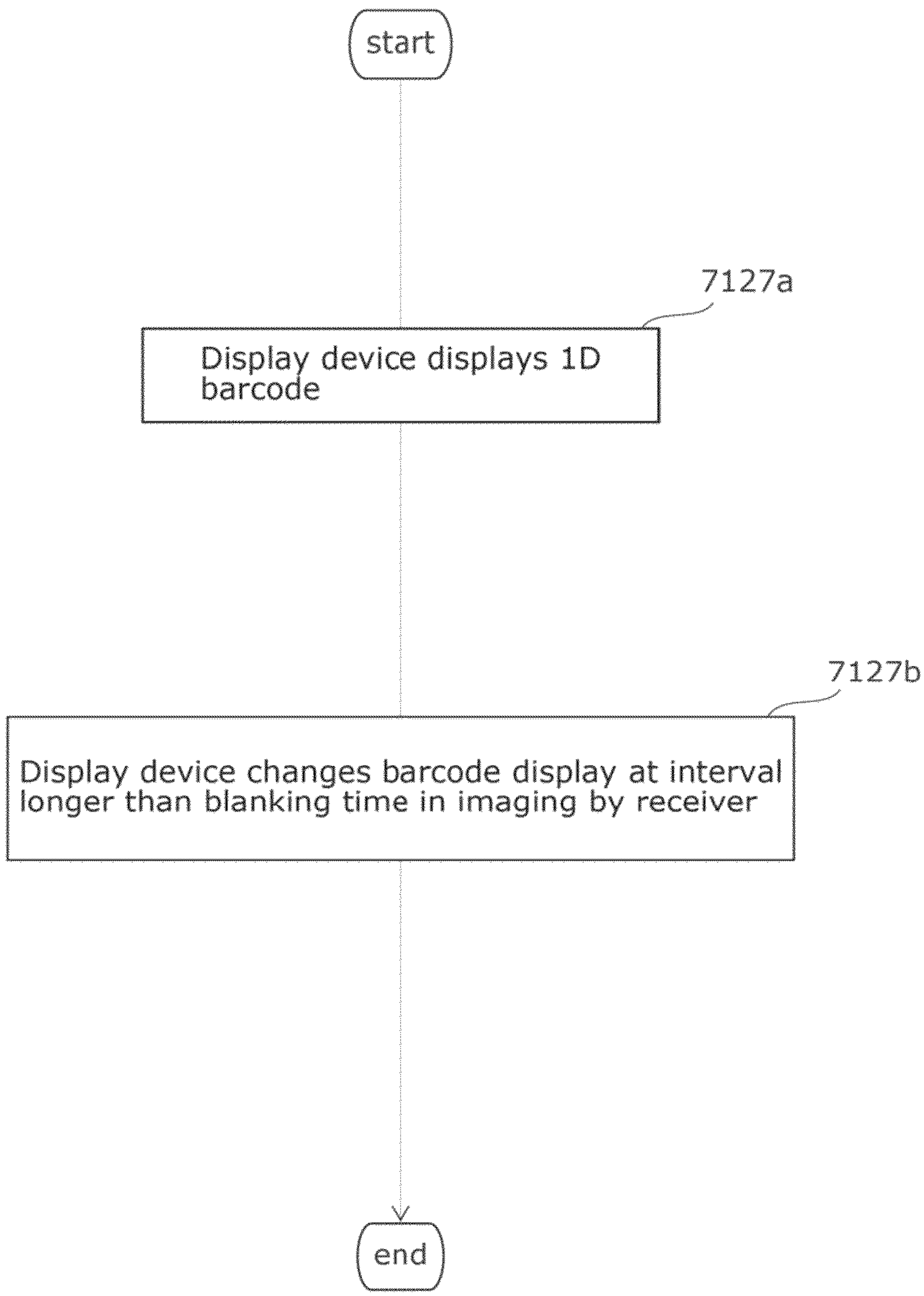

FIG. 263 is a flowchart illustrating an example of processing operation of a transmitter in Embodiment 12.

Figure 264:
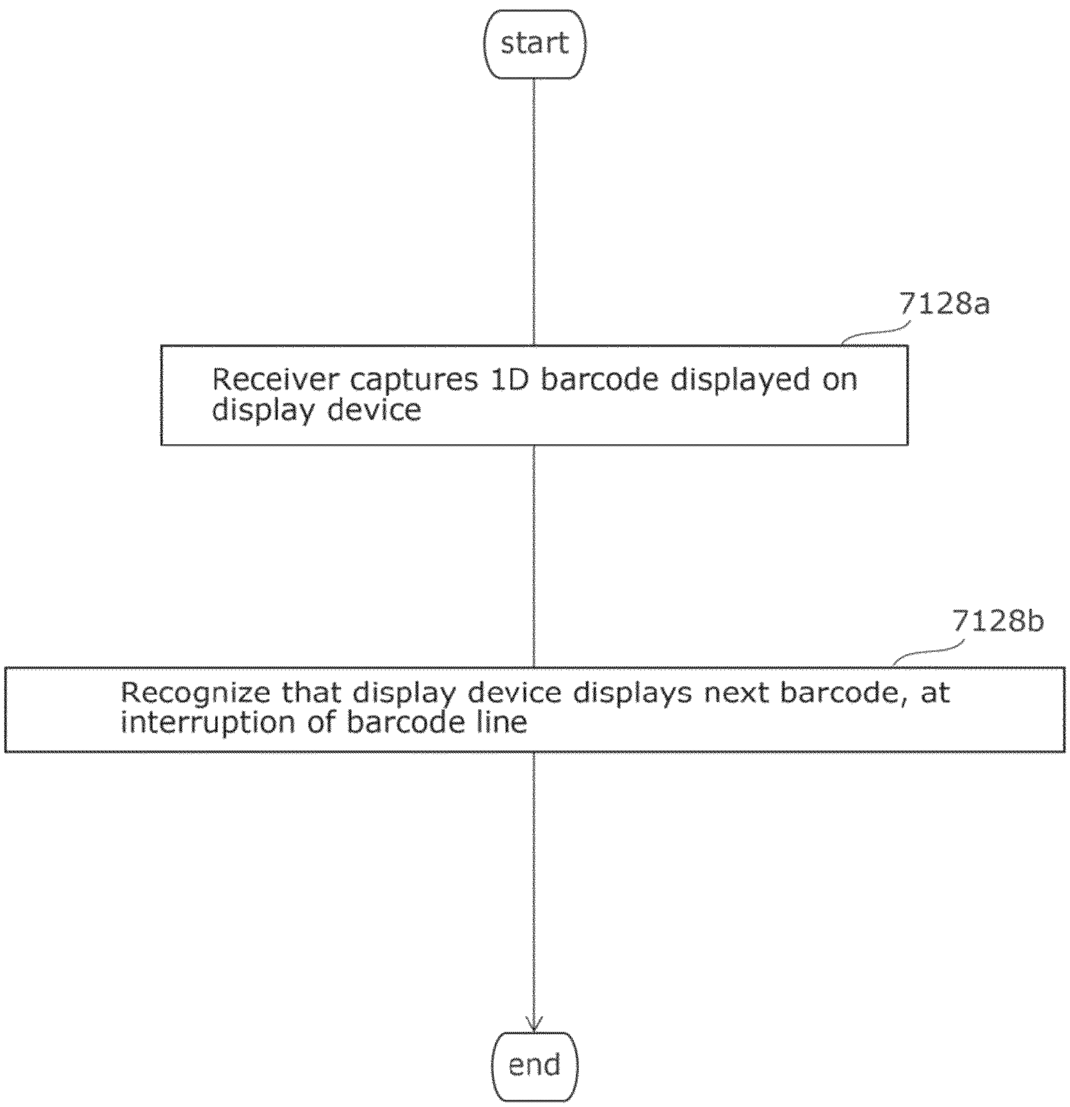

FIG. 264 is a flowchart illustrating an example of processing operation of a receiver in Embodiment 12.

Figure 265:
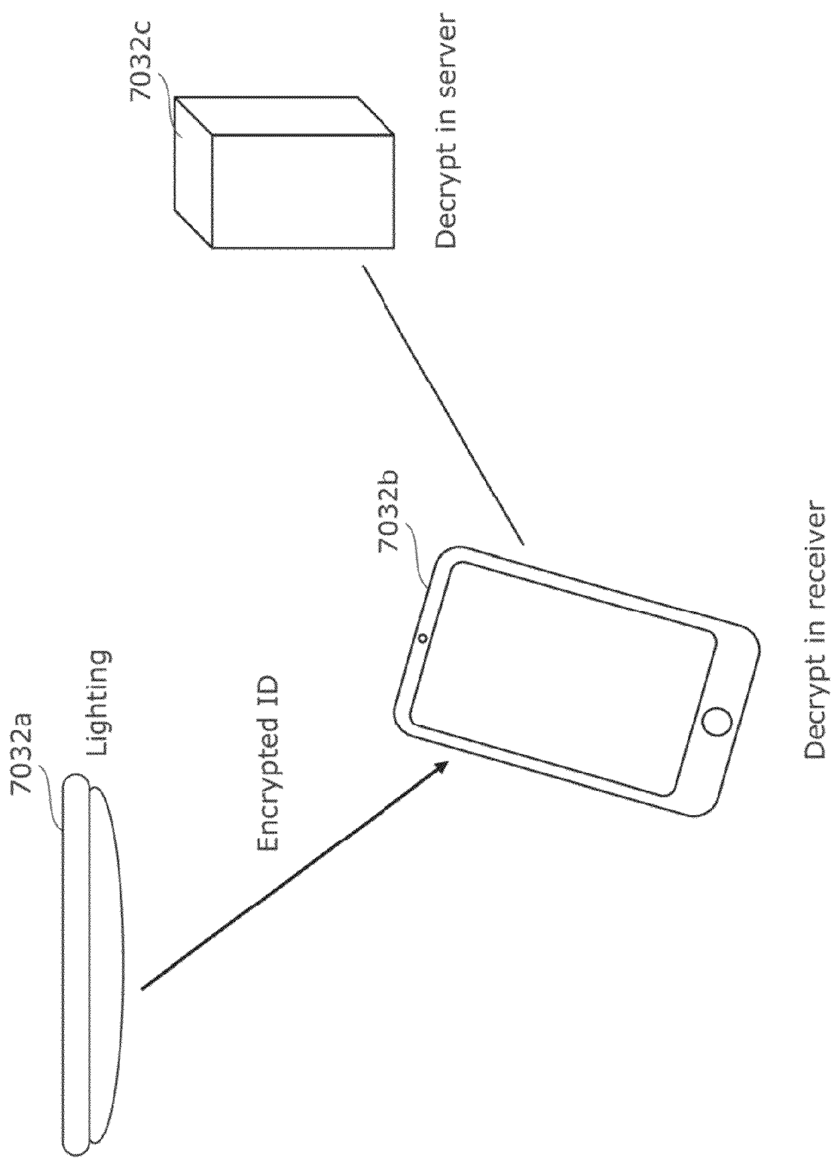

FIG. 265 is a diagram illustrating an example of application of a receiver and a transmitter in Embodiment 12.

Figure 266:
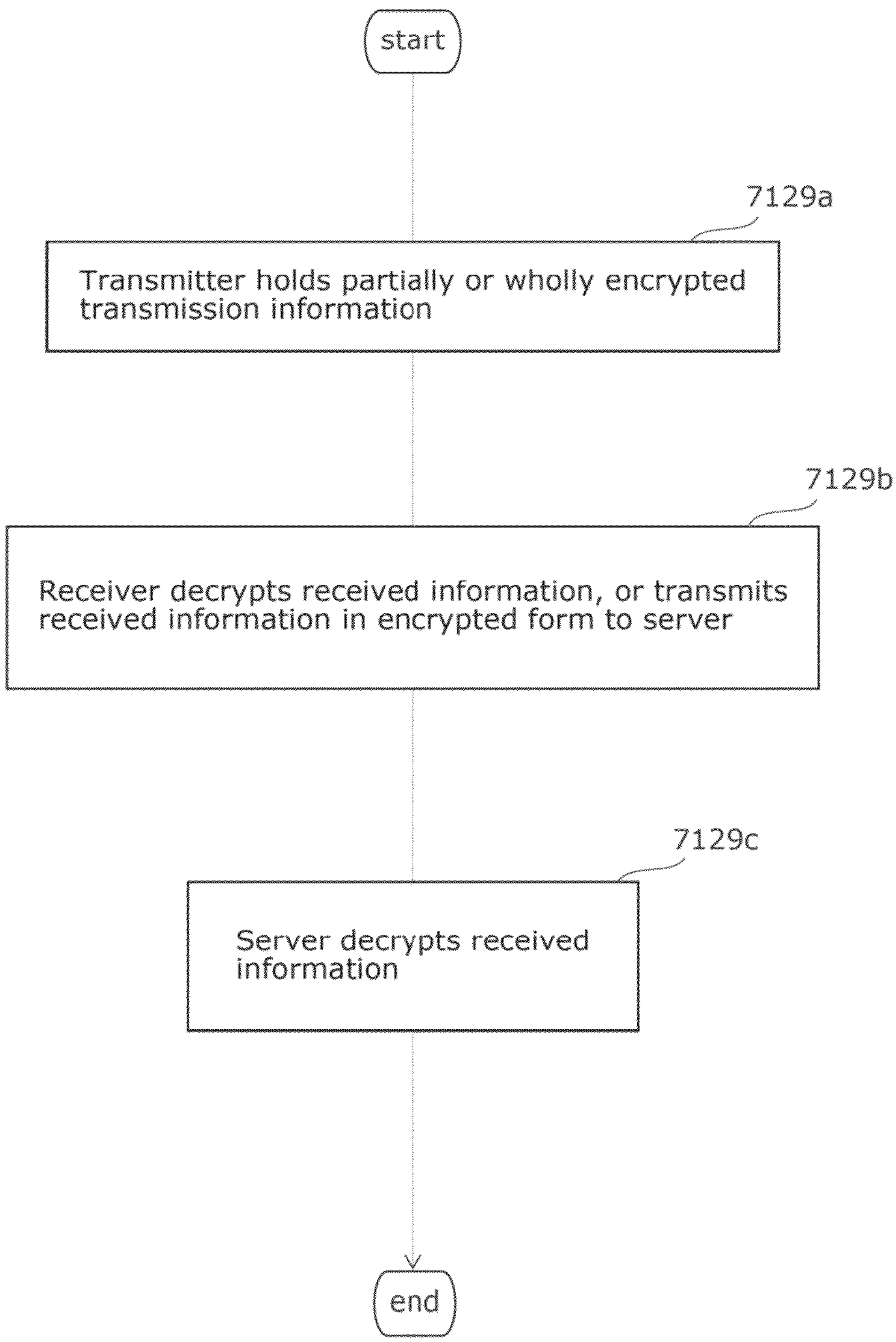

FIG. 266 is a flowchart illustrating an example of processing operation of a receiver and a transmitter in Embodiment 12.

Figure 267:
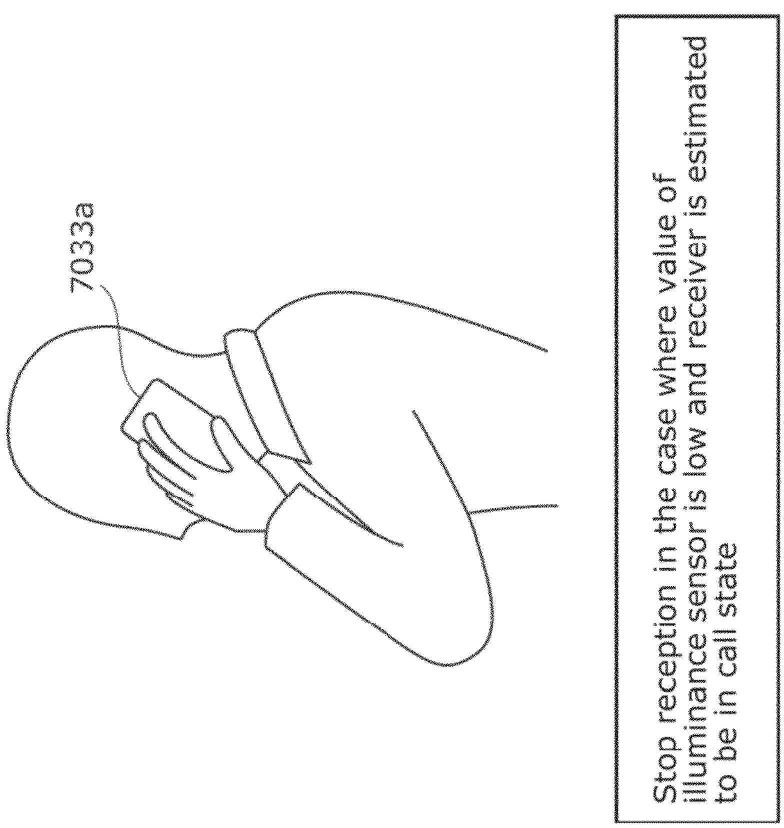

FIG. 267 is a diagram illustrating a state of a receiver in Embodiment 12.

Figure 268:
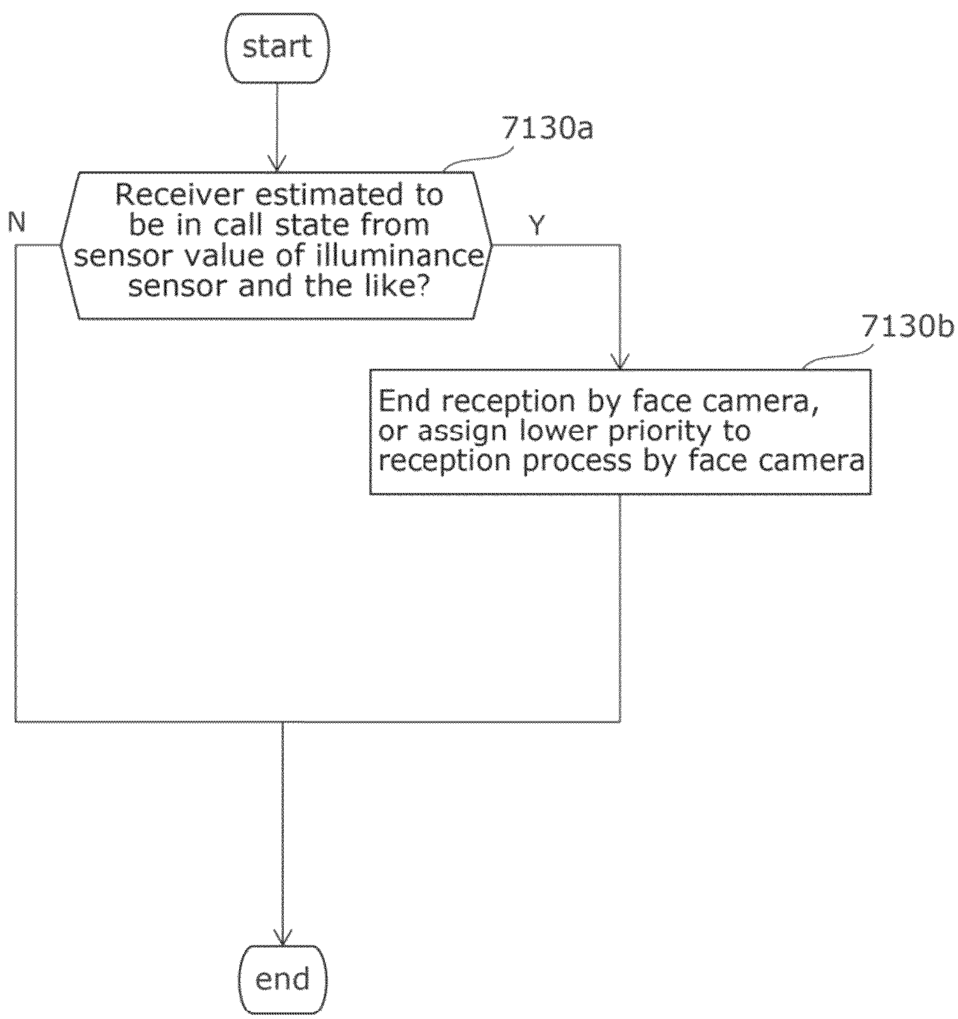

FIG. 268 is a flowchart illustrating an example of processing operation of a receiver in Embodiment 12.

Figure 269:
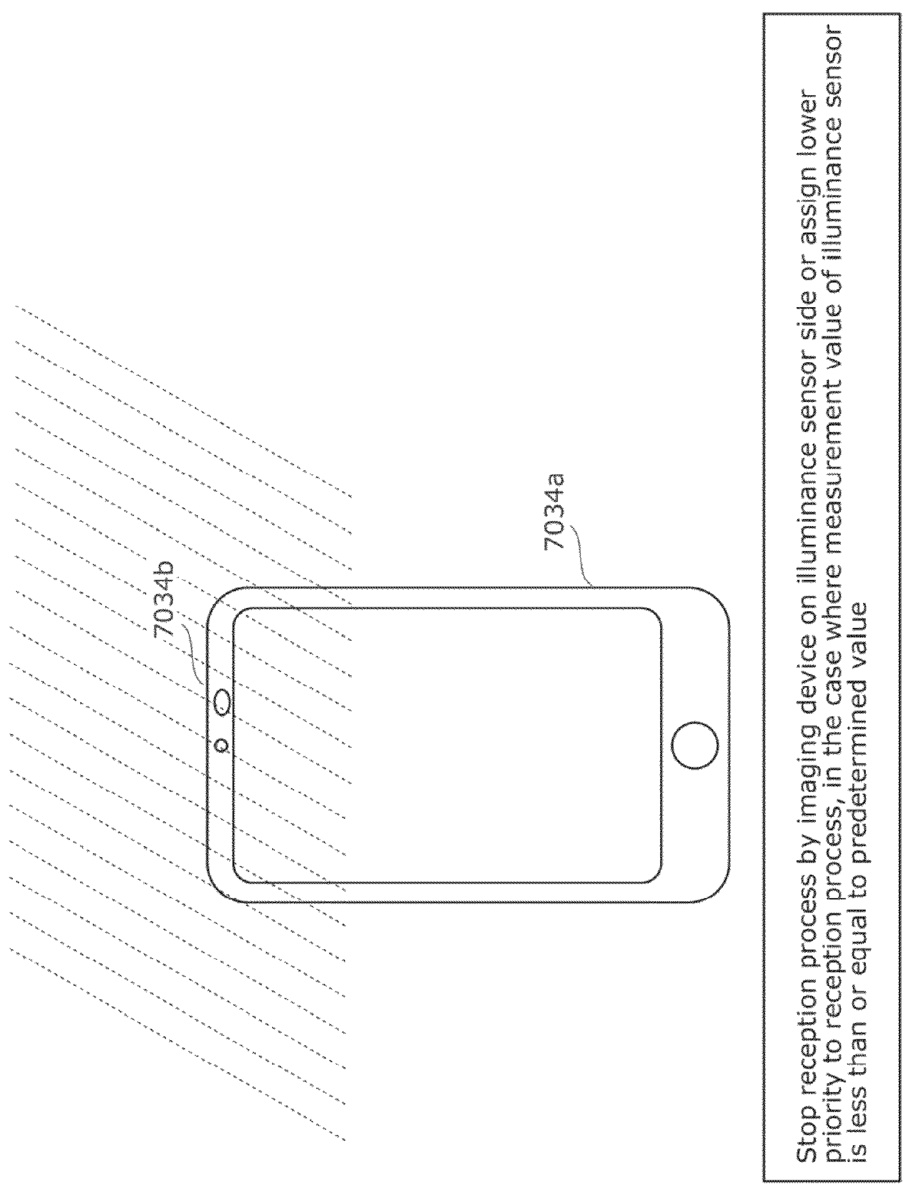

FIG. 269 is a diagram illustrating a state of a receiver in Embodiment 12.

Figure 270:
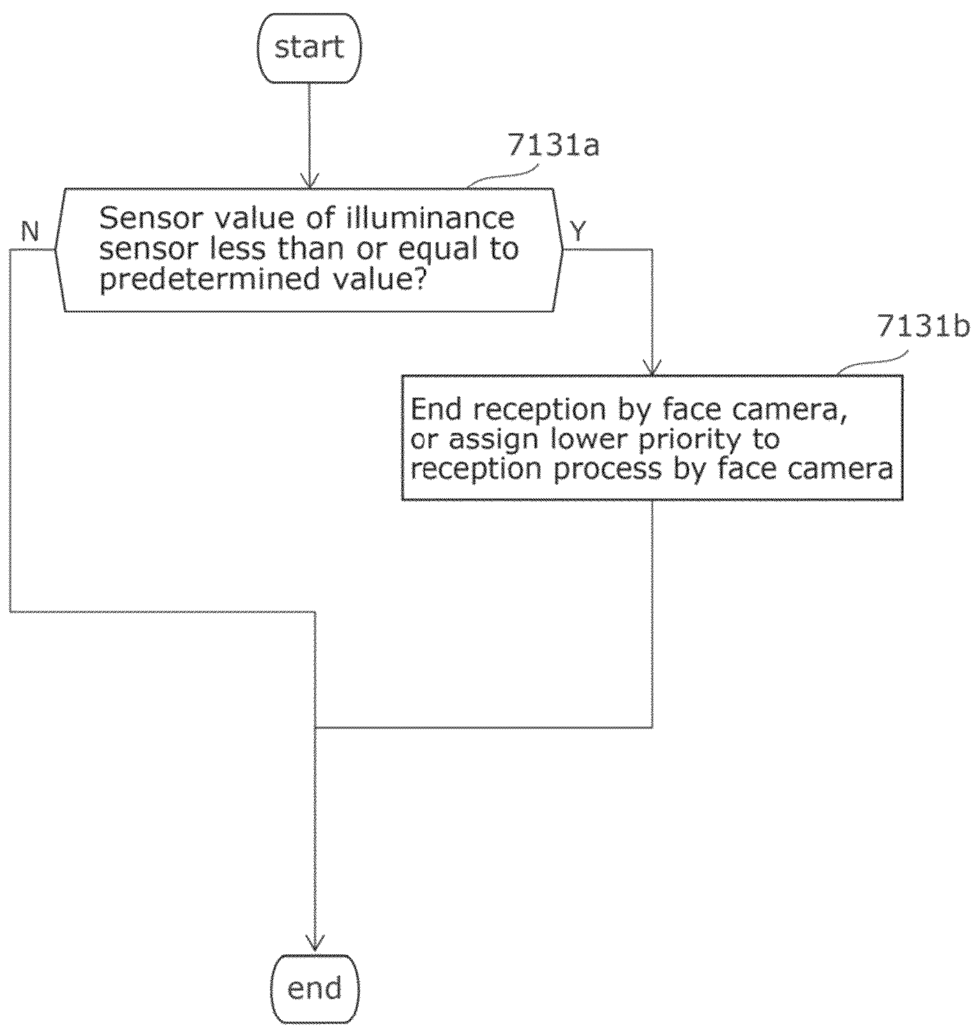

FIG. 270 is a flowchart illustrating an example of processing operation of a receiver in Embodiment 12.

Figure 271:
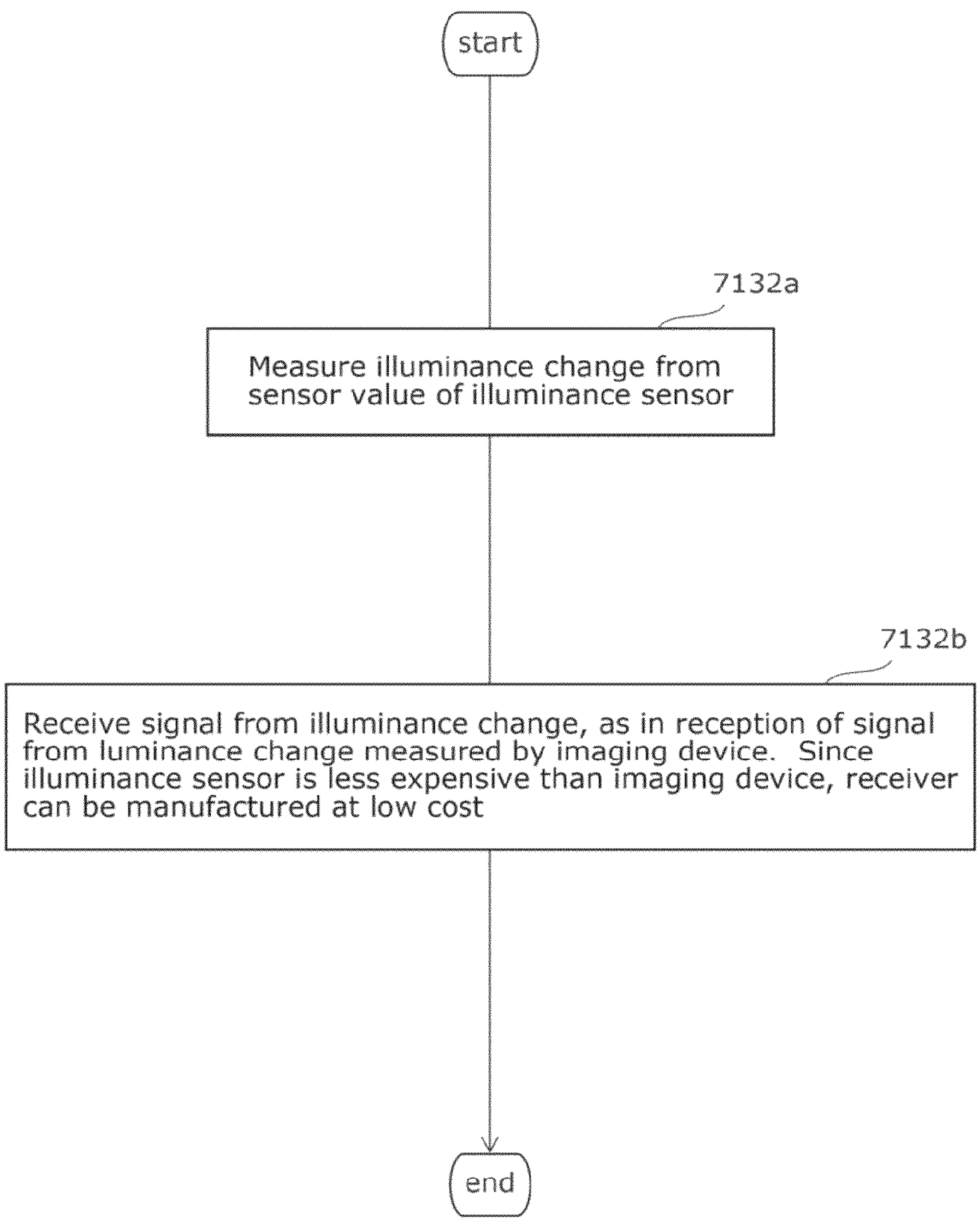

FIG. 271 is a flowchart illustrating an example of processing operation of a receiver in Embodiment 12.

Figure 272:
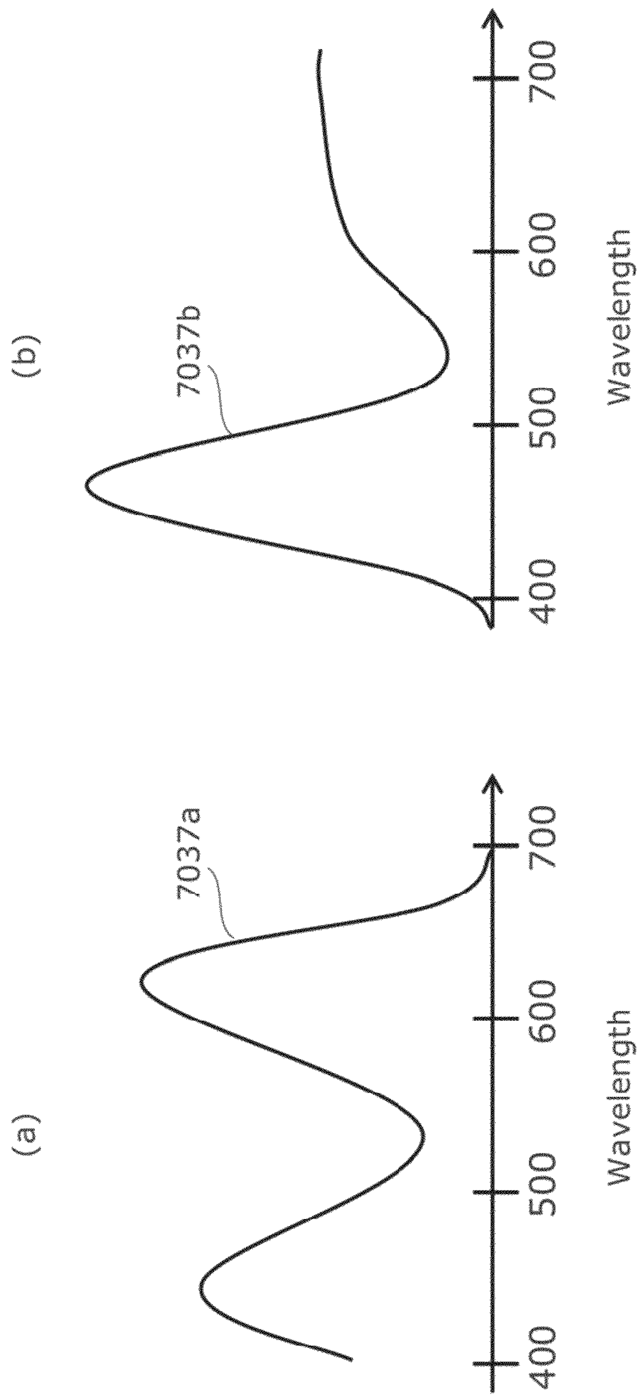

FIG. 272 is a diagram illustrating an example of a wavelength of a transmitter in Embodiment 12.

Figure 273:
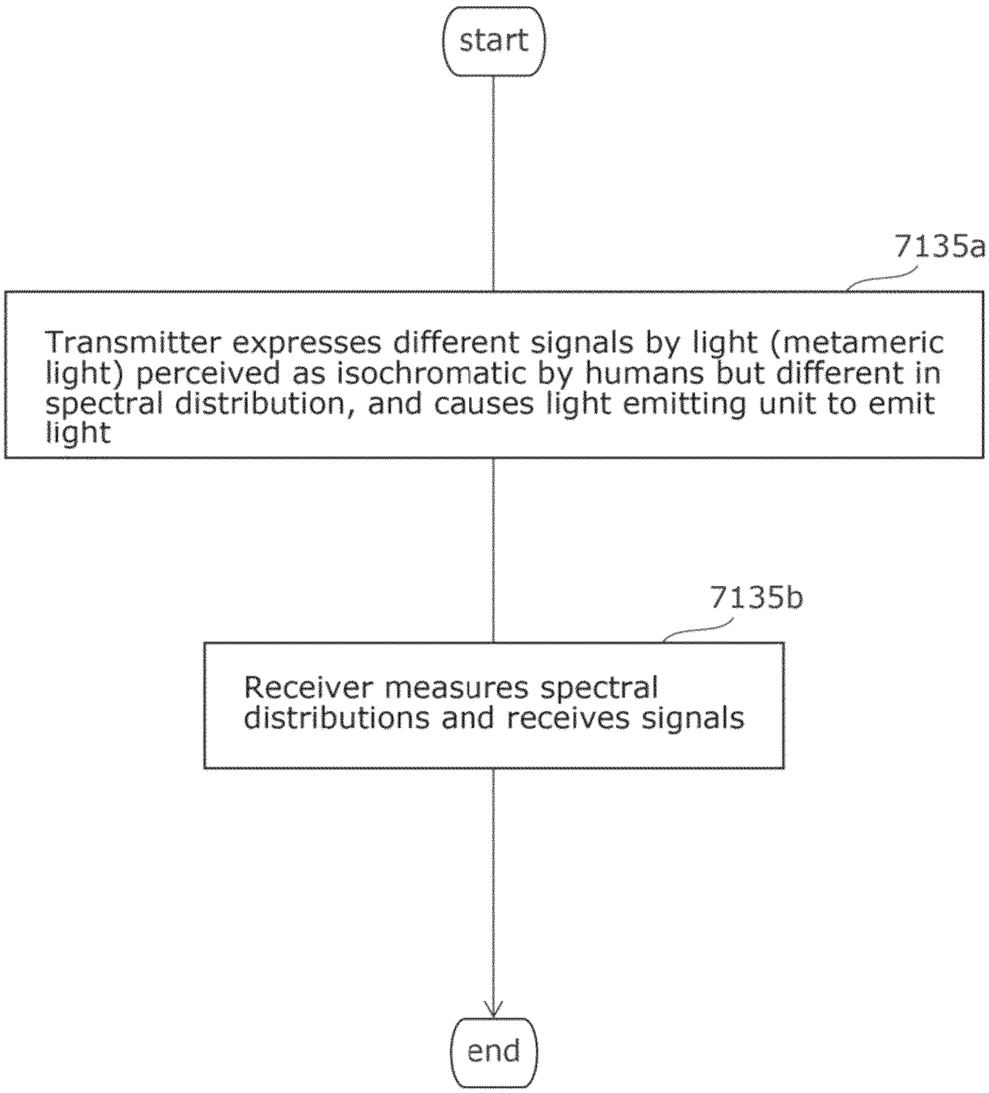

FIG. 273 is a flowchart illustrating an example of processing operation of a receiver and a transmitter in Embodiment 12.

Figure 274:
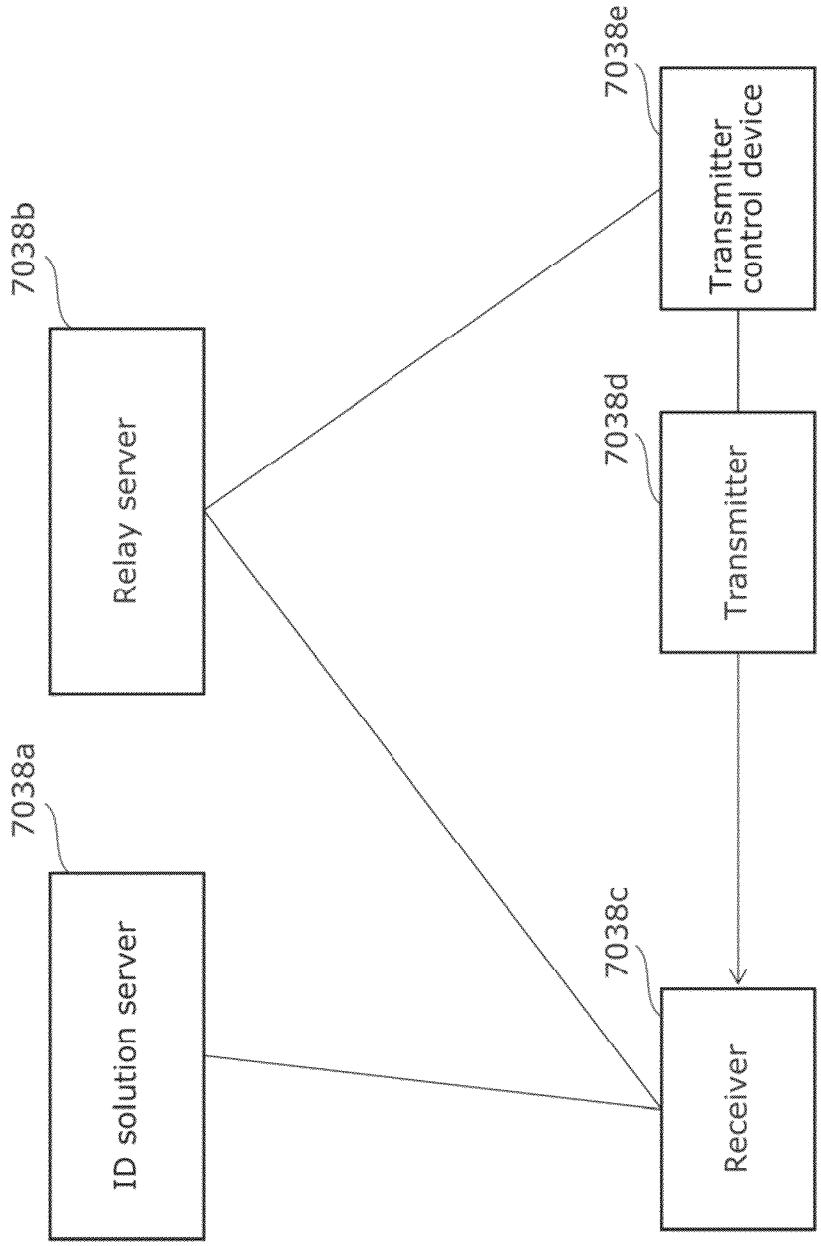

FIG. 274 is a diagram illustrating an example of a structure of a system including a receiver and a transmitter in Embodiment 12.

Figure 275:
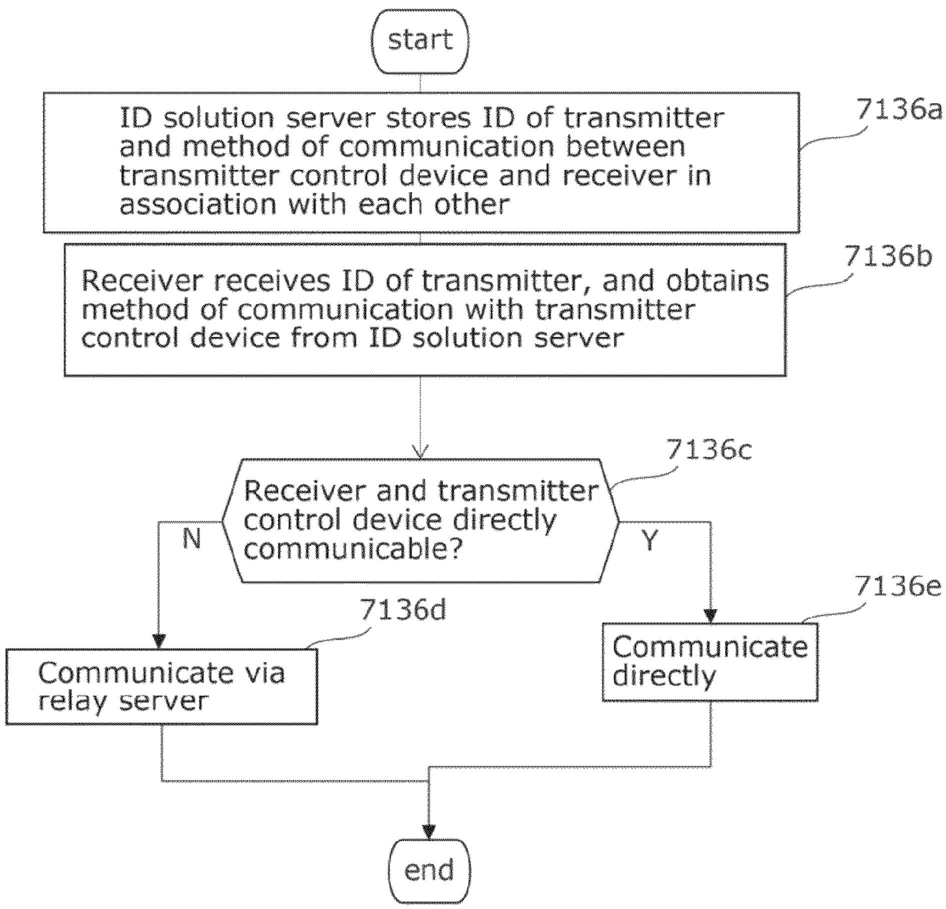

FIG. 275 is a flowchart illustrating an example of processing operation of a system in Embodiment 12.

Figure 276:
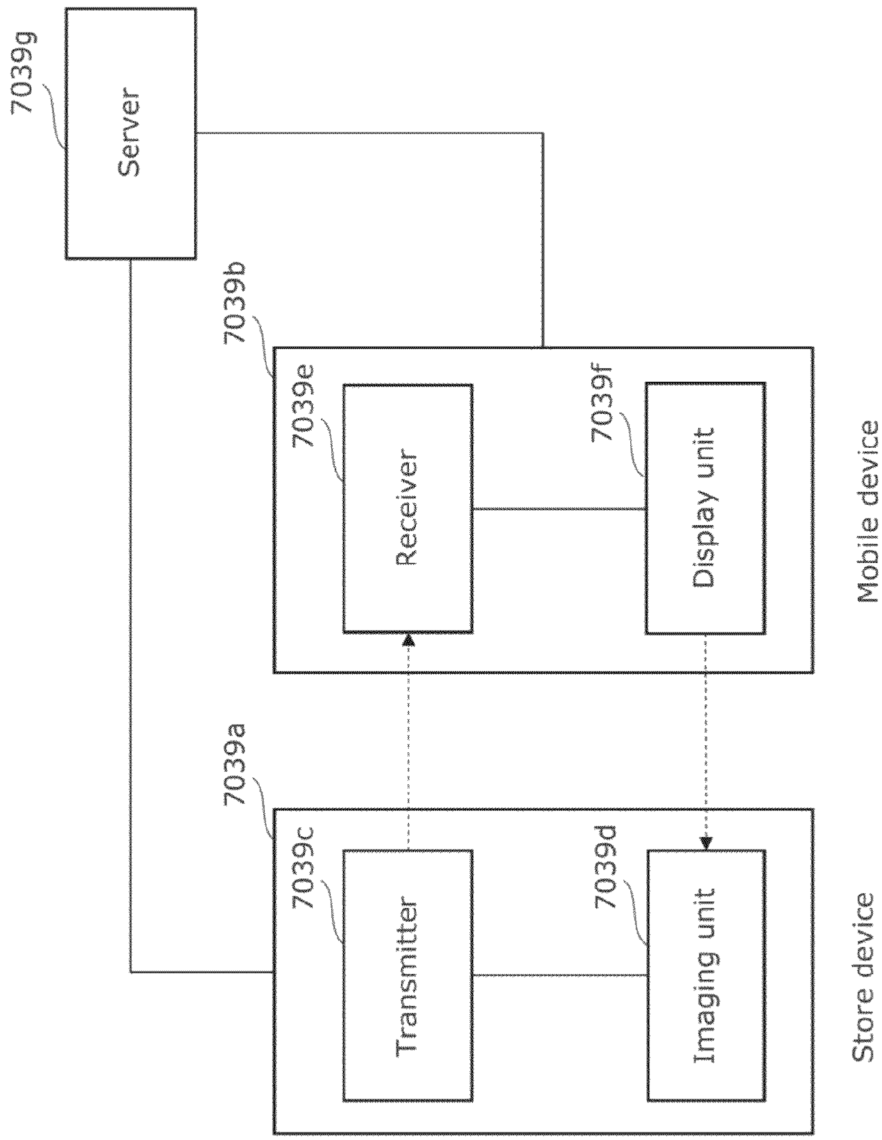

FIG. 276 is a diagram illustrating an example of a structure of a system including a receiver and a transmitter in Embodiment 12.

Figure 277:
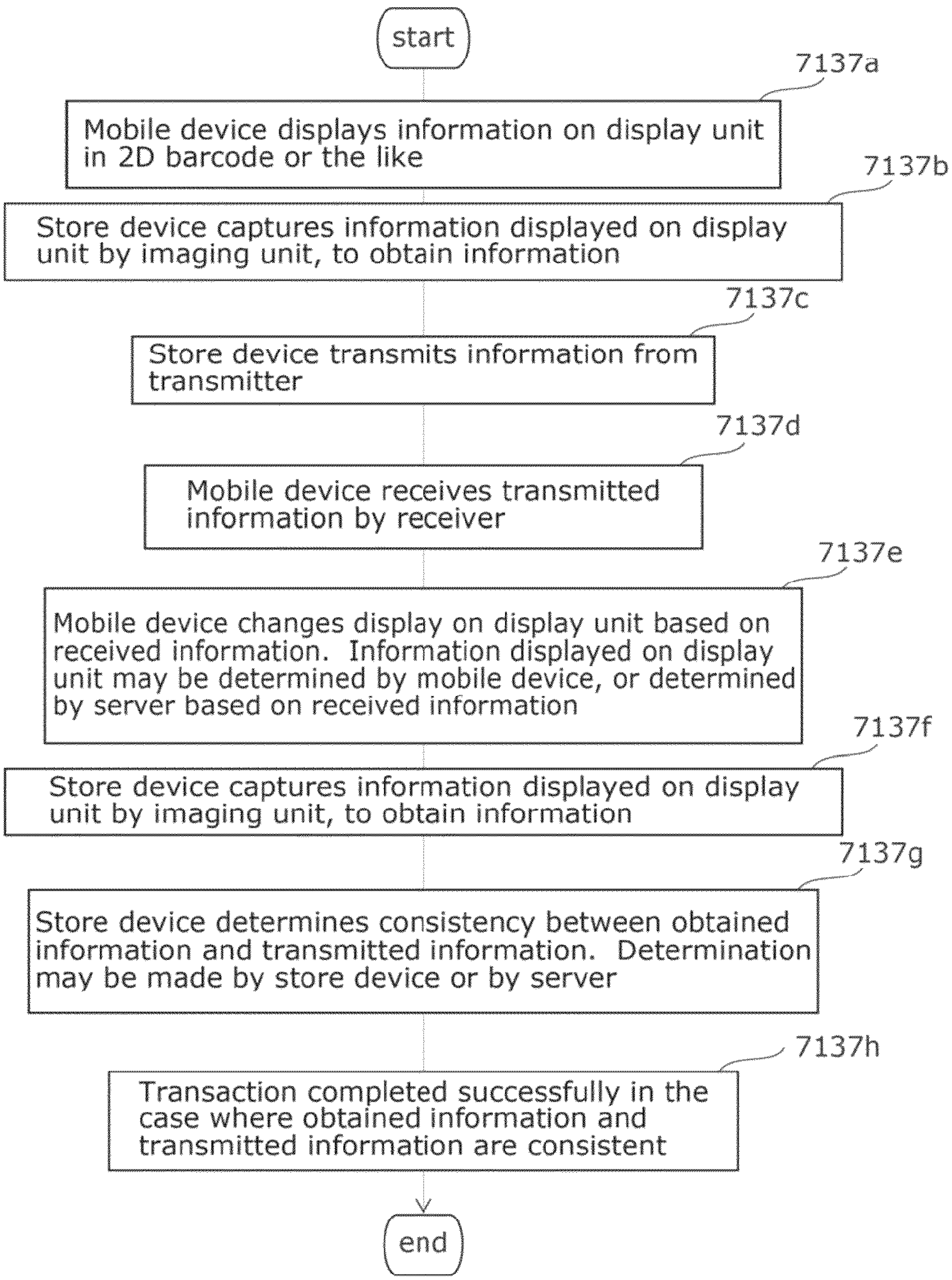

FIG. 277 is a flowchart illustrating an example of processing operation of a system in Embodiment 12.

Figure 278:
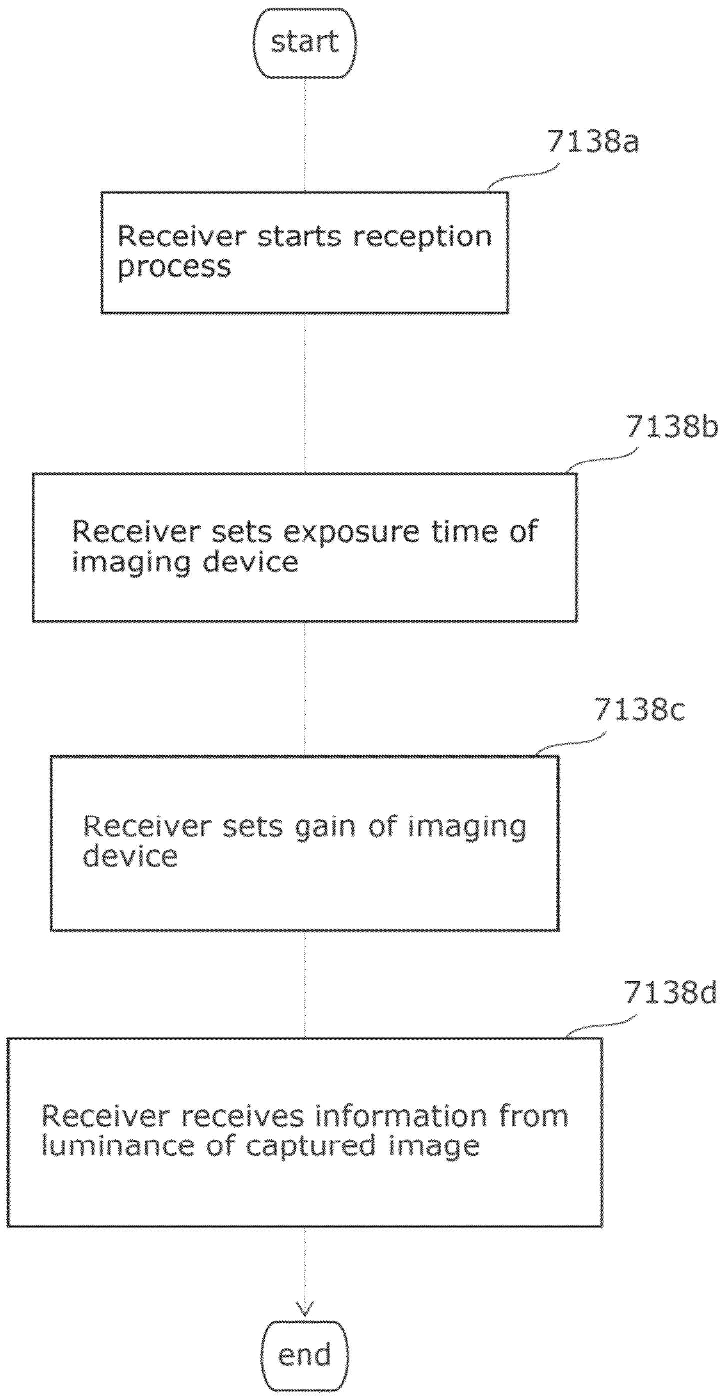

FIG. 278 is a flowchart illustrating an example of processing operation of a receiver in Embodiment 12.

Figure 279:
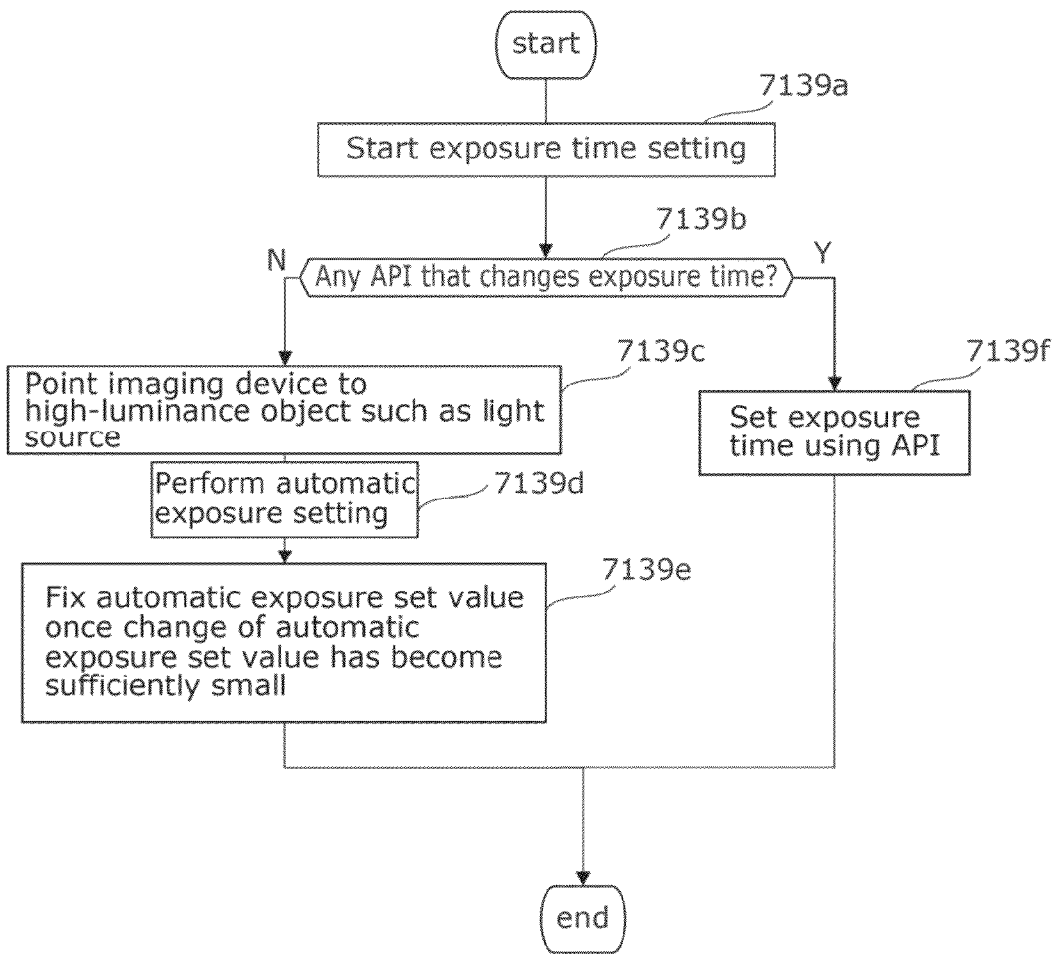

FIG. 279 is a flowchart illustrating an example of processing operation of a receiver in Embodiment 12.

Figure 280:
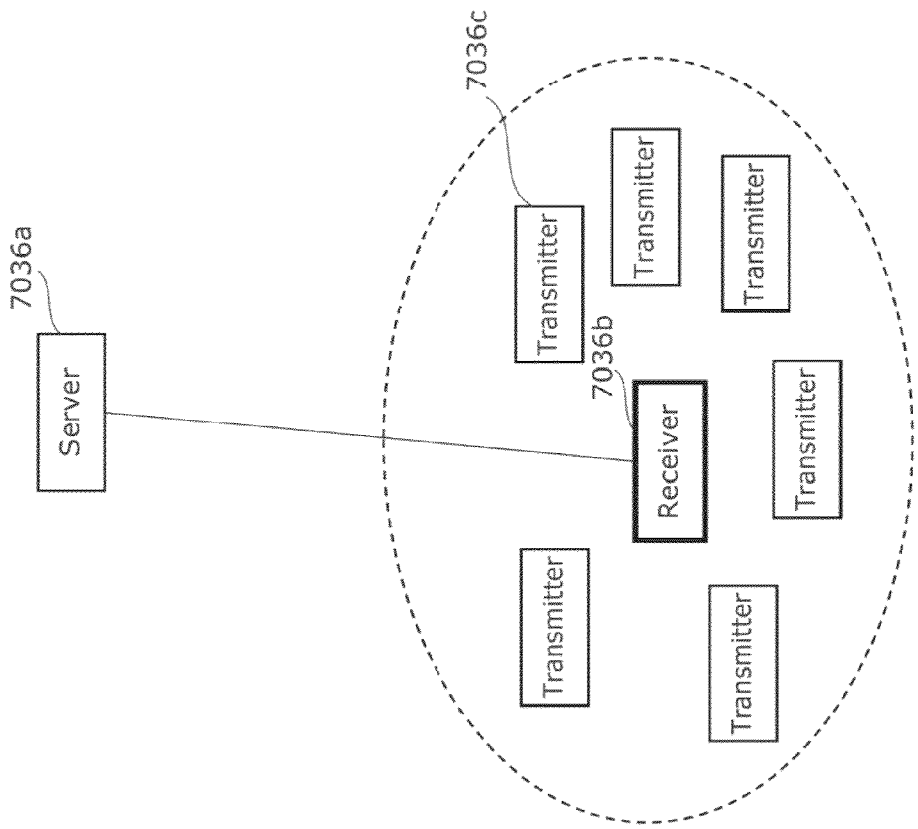

FIG. 280 is a diagram illustrating an example of a structure of a system including a receiver and a transmitter in Embodiment 12.

Figure 281:
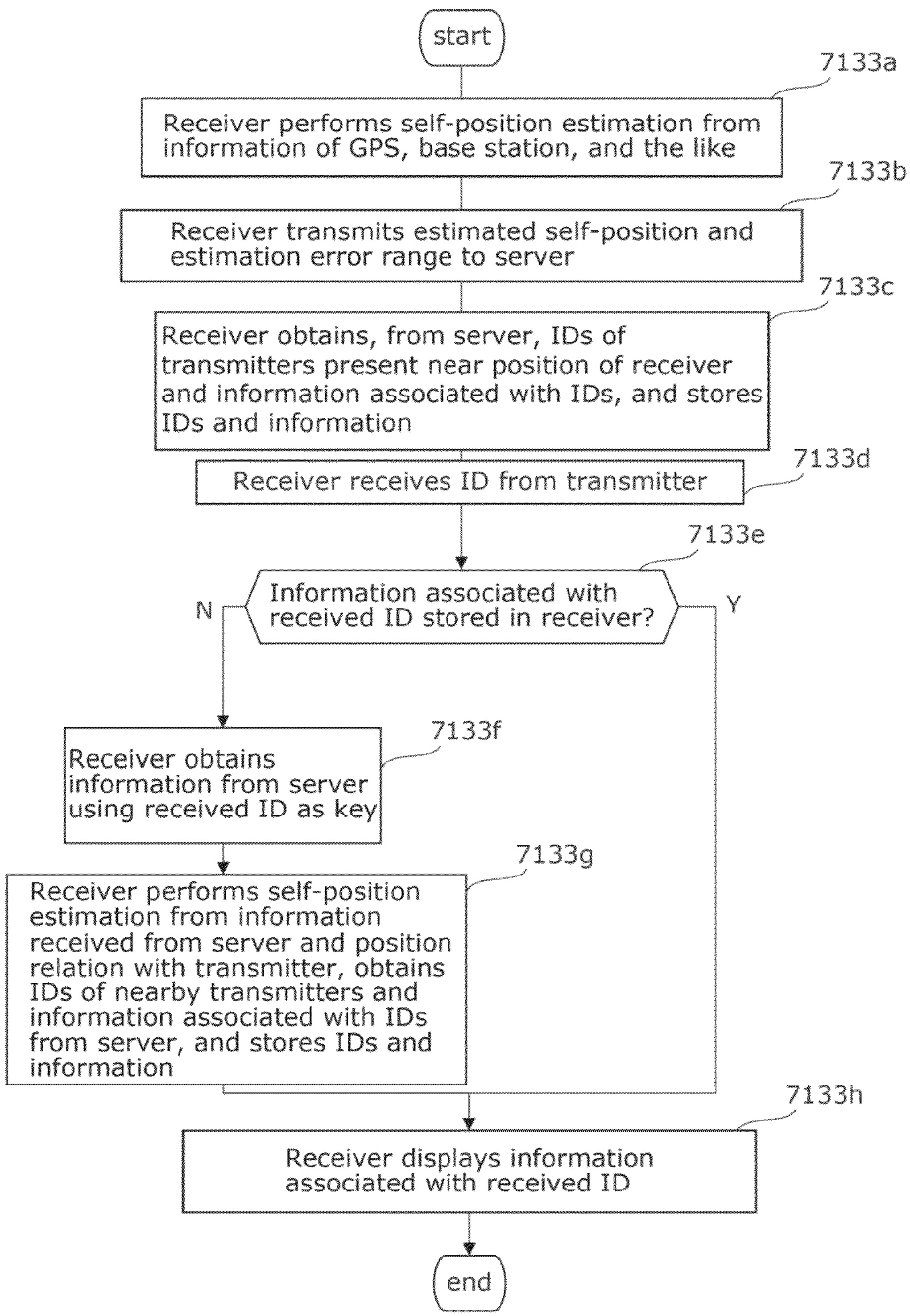

FIG. 281 is a flowchart illustrating an example of processing operation of a receiver in Embodiment 12.

Figure 282:
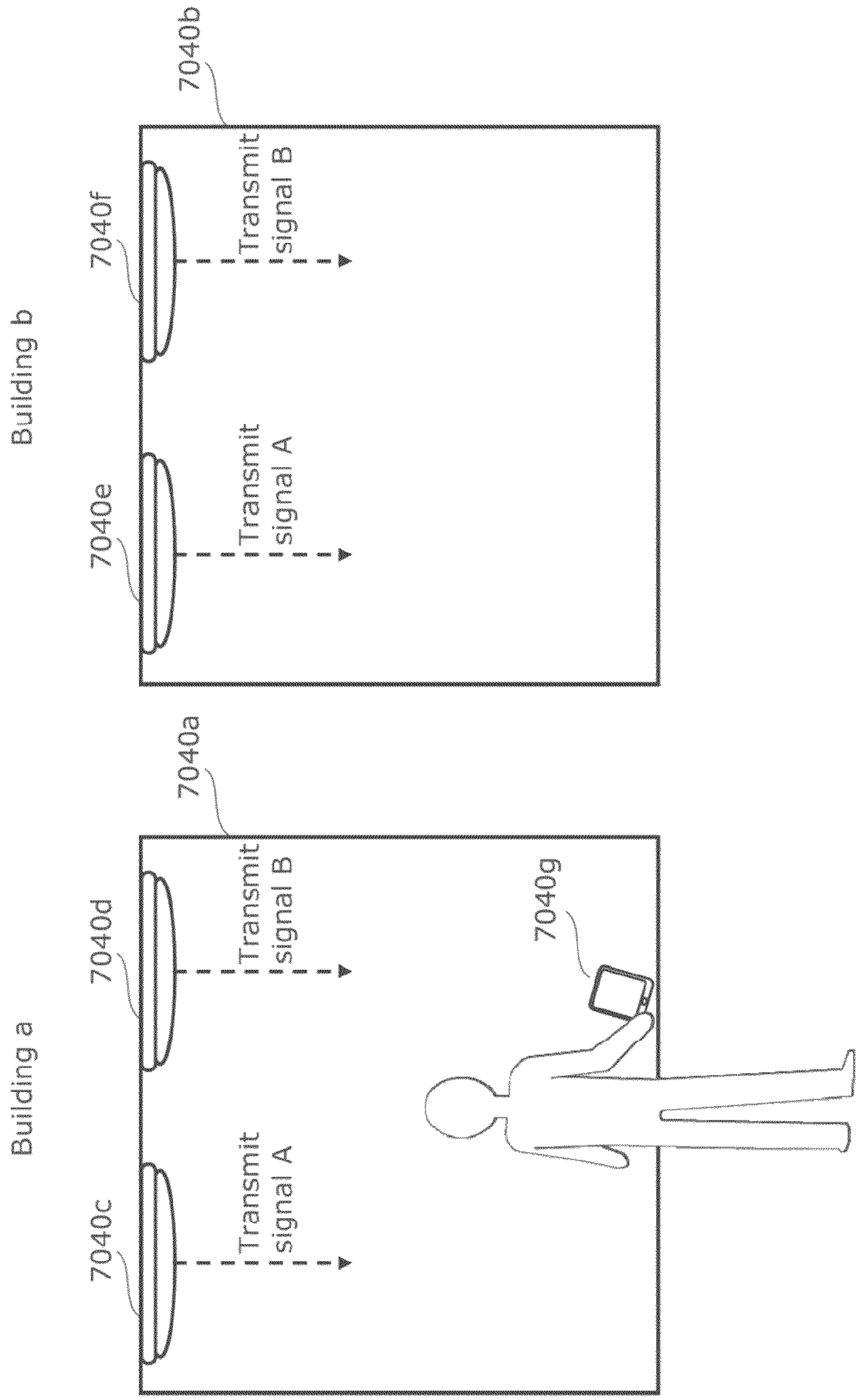

FIG. 282 is a diagram illustrating an example of application of a receiver and a transmitter in Embodiment 12.

Figure 283:
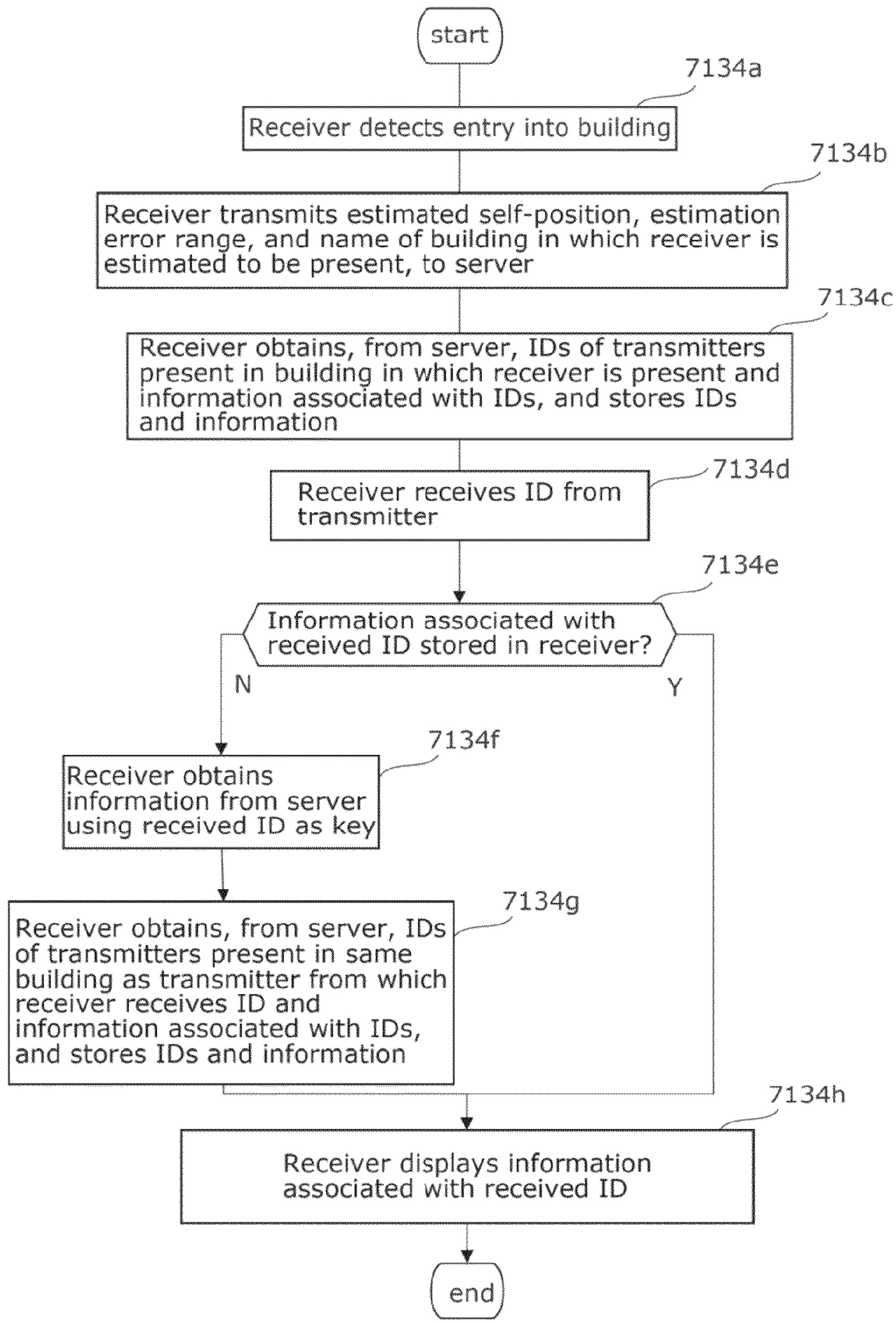

FIG. 283 is a flowchart illustrating an example of processing operation of a receiver in Embodiment 12.

Figure 284:
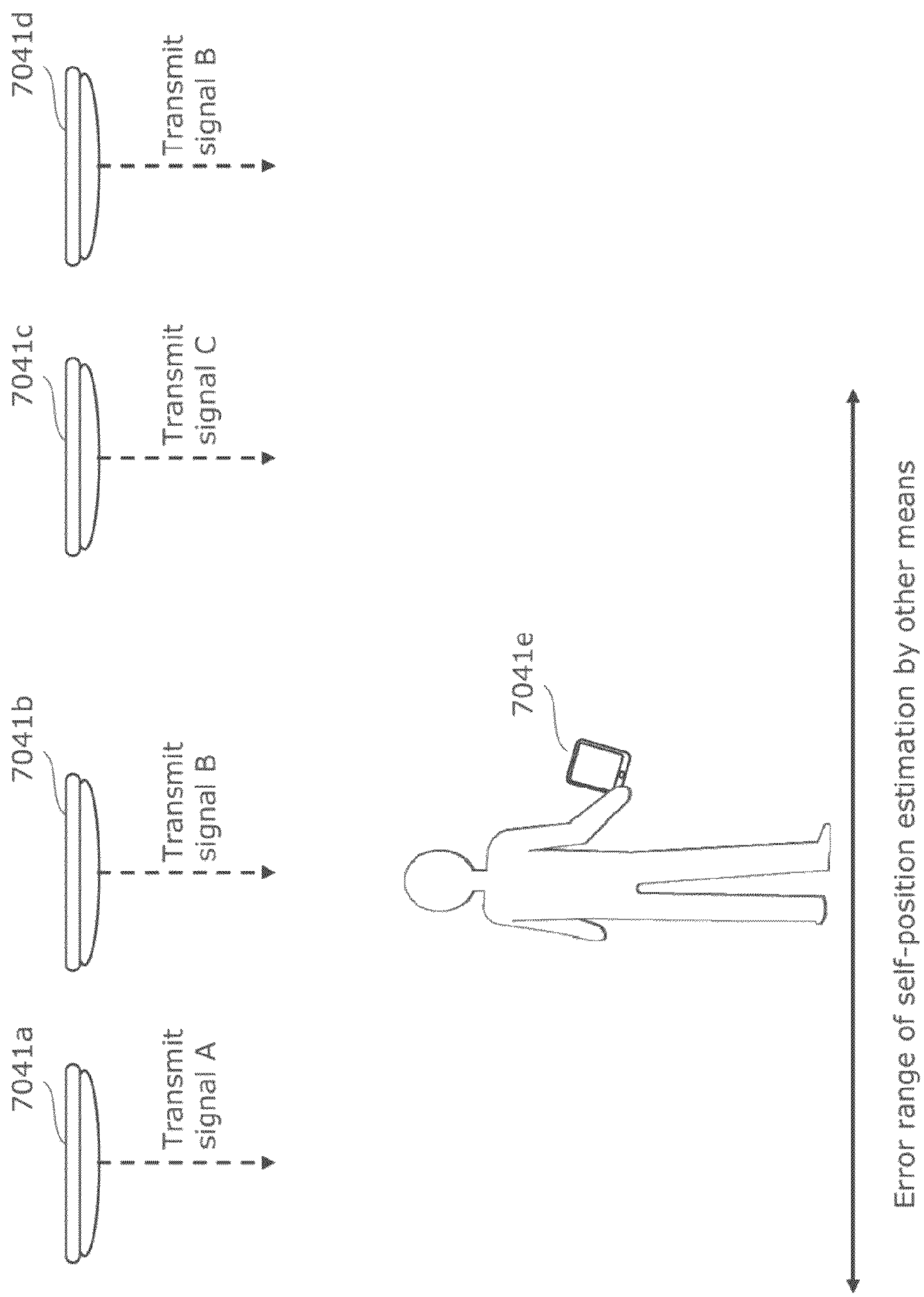

FIG. 284 is a diagram illustrating an example of a structure of a system including a receiver and a transmitter in Embodiment 12.

Figure 285:
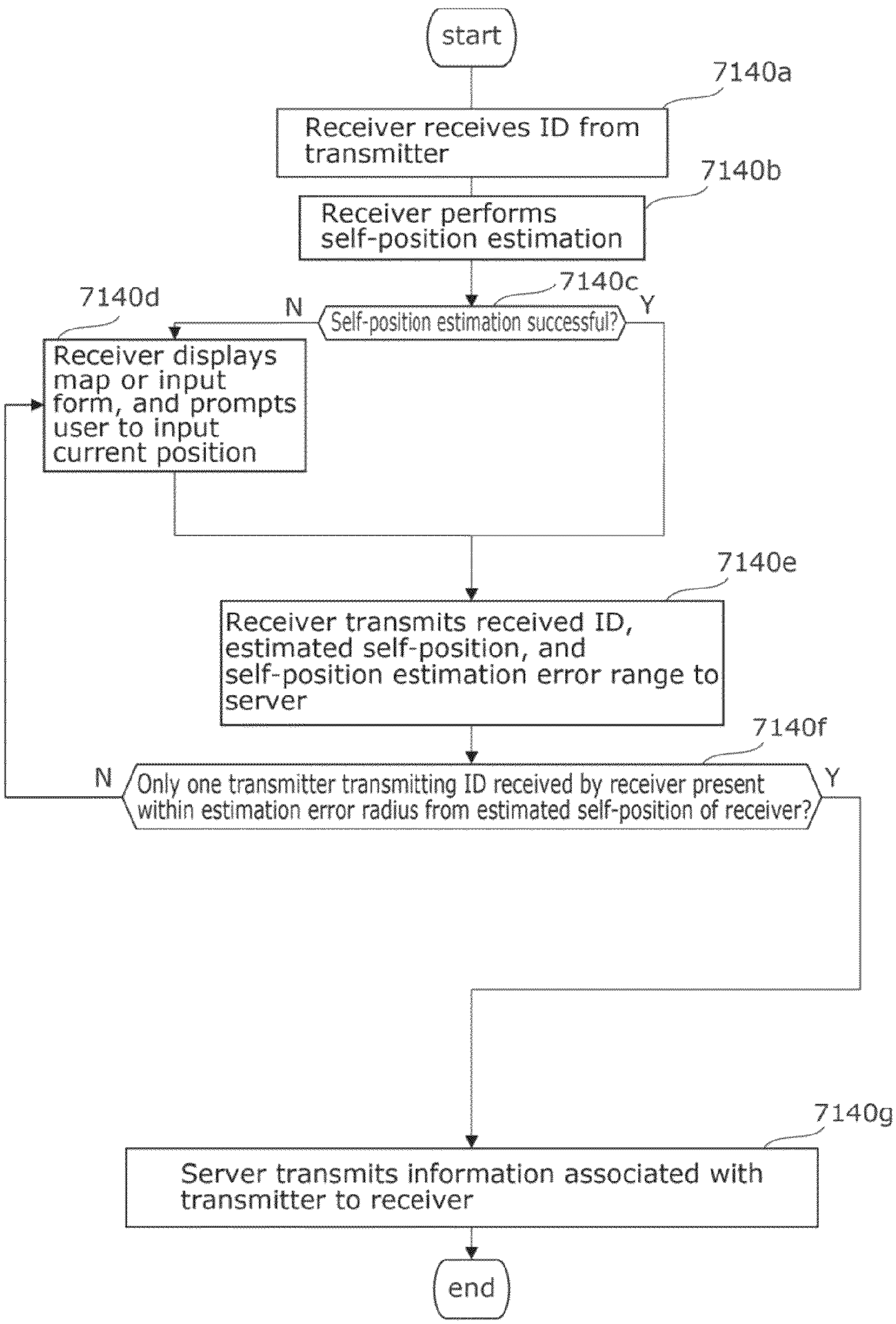

FIG. 285 is a flowchart illustrating an example of processing operation of a system in Embodiment 12.

Figure 286:
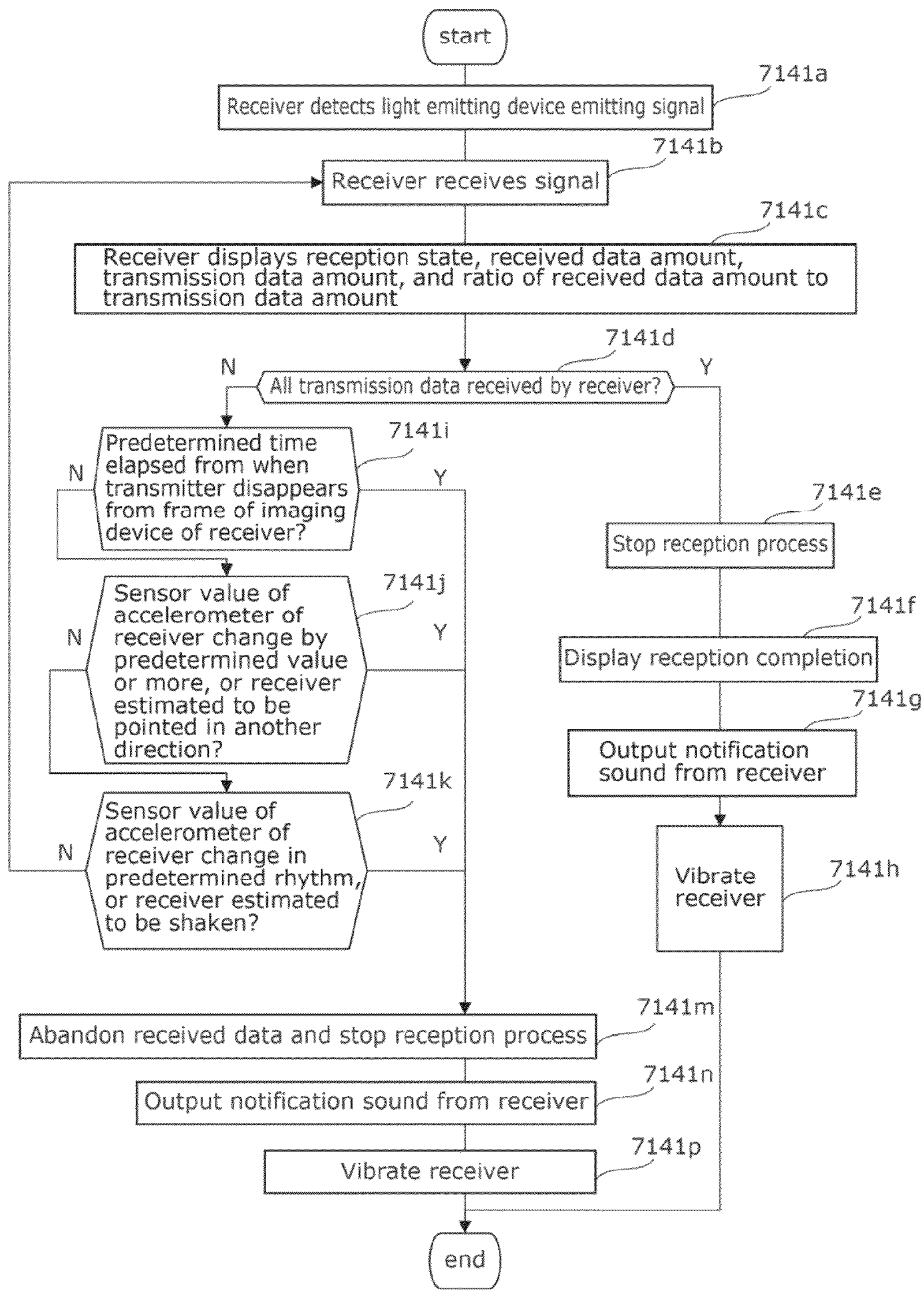

FIG. 286 is a flowchart illustrating an example of processing operation of a receiver in Embodiment 12.

Figure 287A:
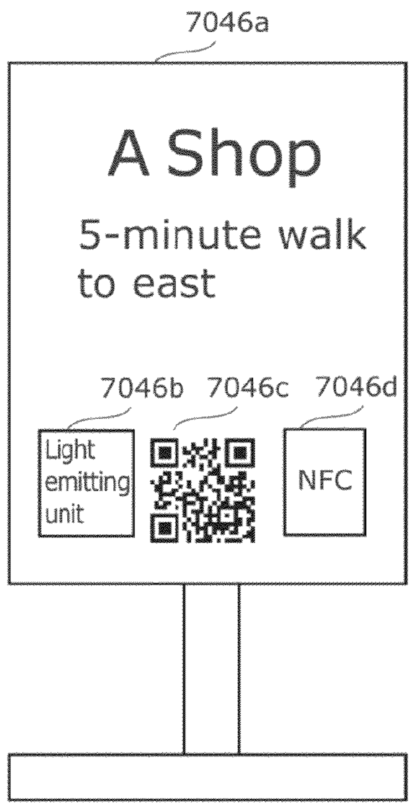

FIG. 287A is a diagram illustrating an example of a structure of a transmitter in Embodiment 12.

Figure 287B:

FIG. 287B is a diagram illustrating another example of a structure of a transmitter in Embodiment 12.

Figure 288:
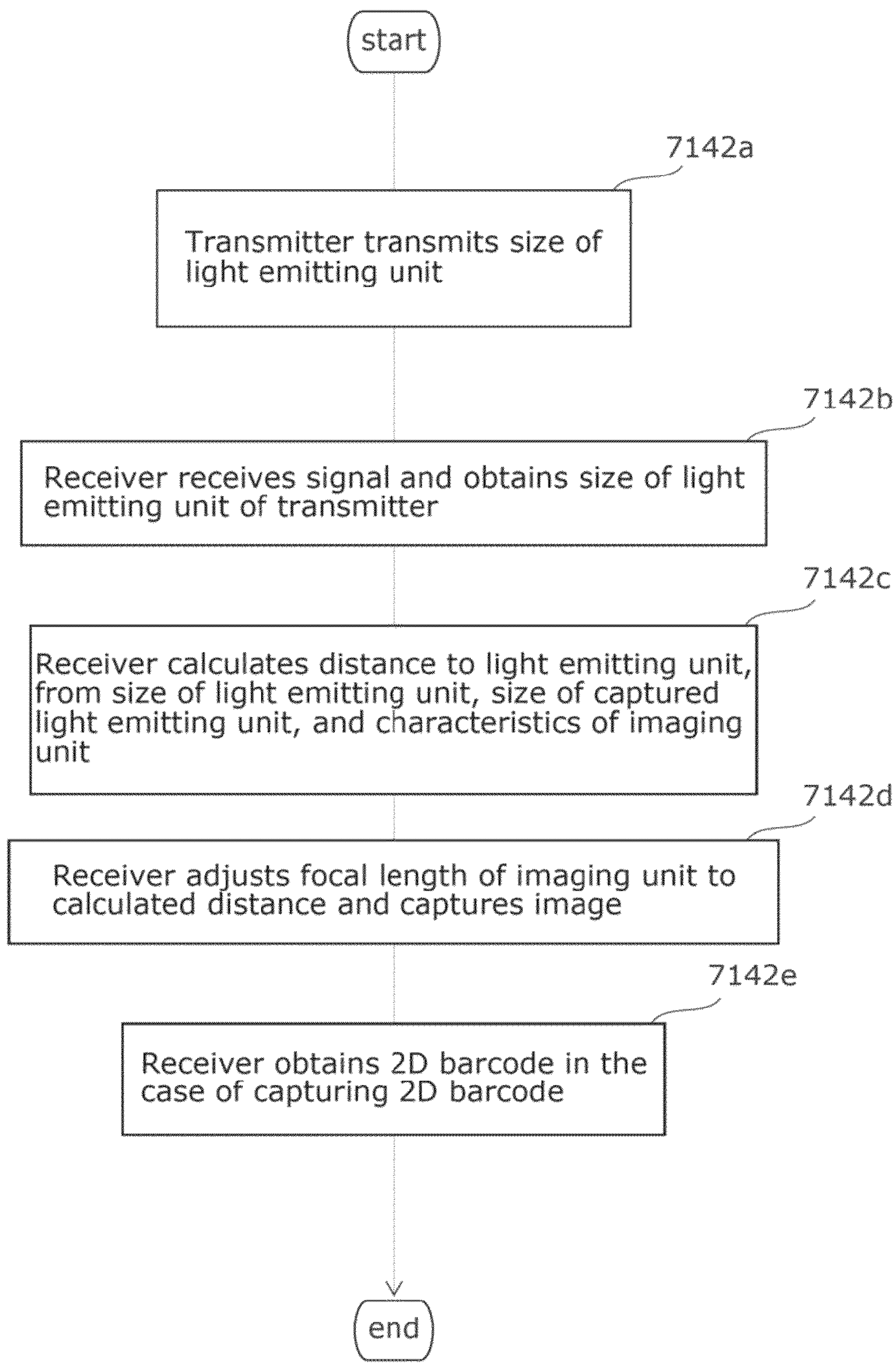

FIG. 288 is a flowchart illustrating an example of processing operation of a receiver and a transmitter in Embodiment 12.

Figure 289:
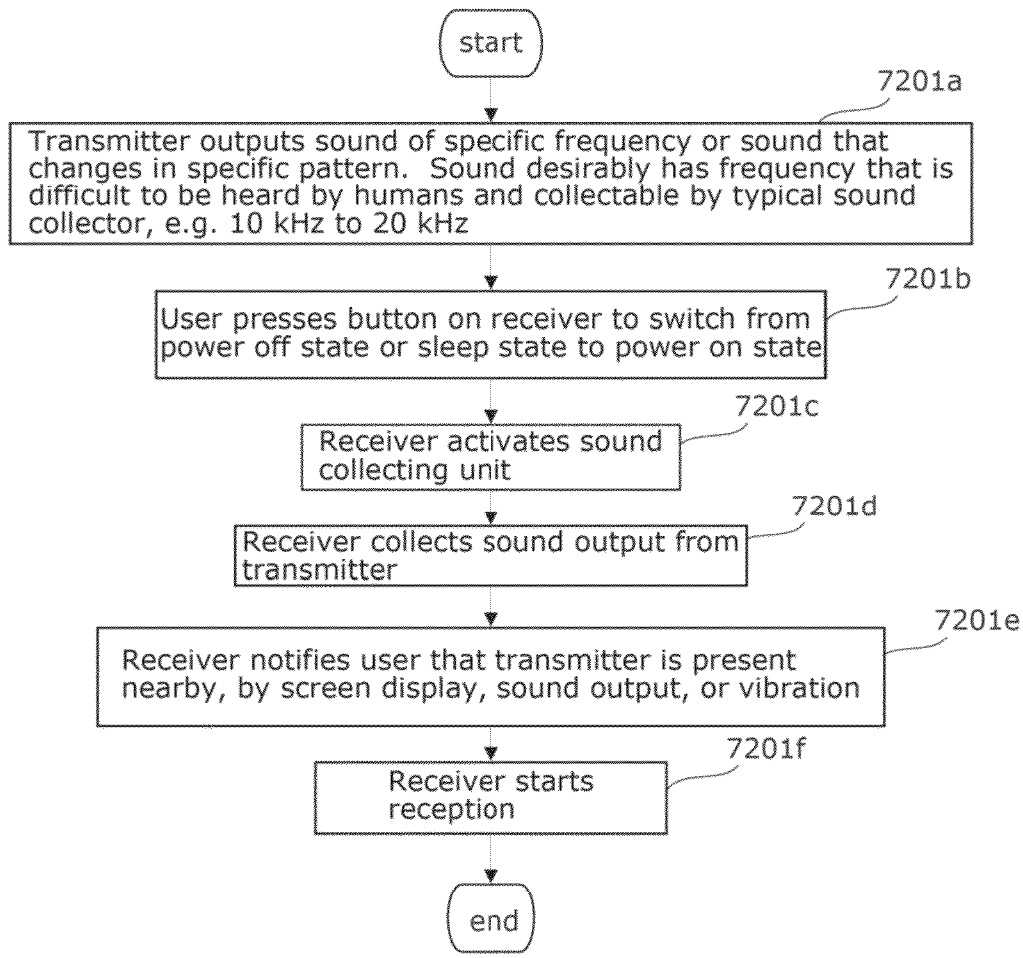

FIG. 289 is a flowchart illustrating an example of processing operation relating to a receiver and a transmitter in Embodiment 13.

Figure 290:
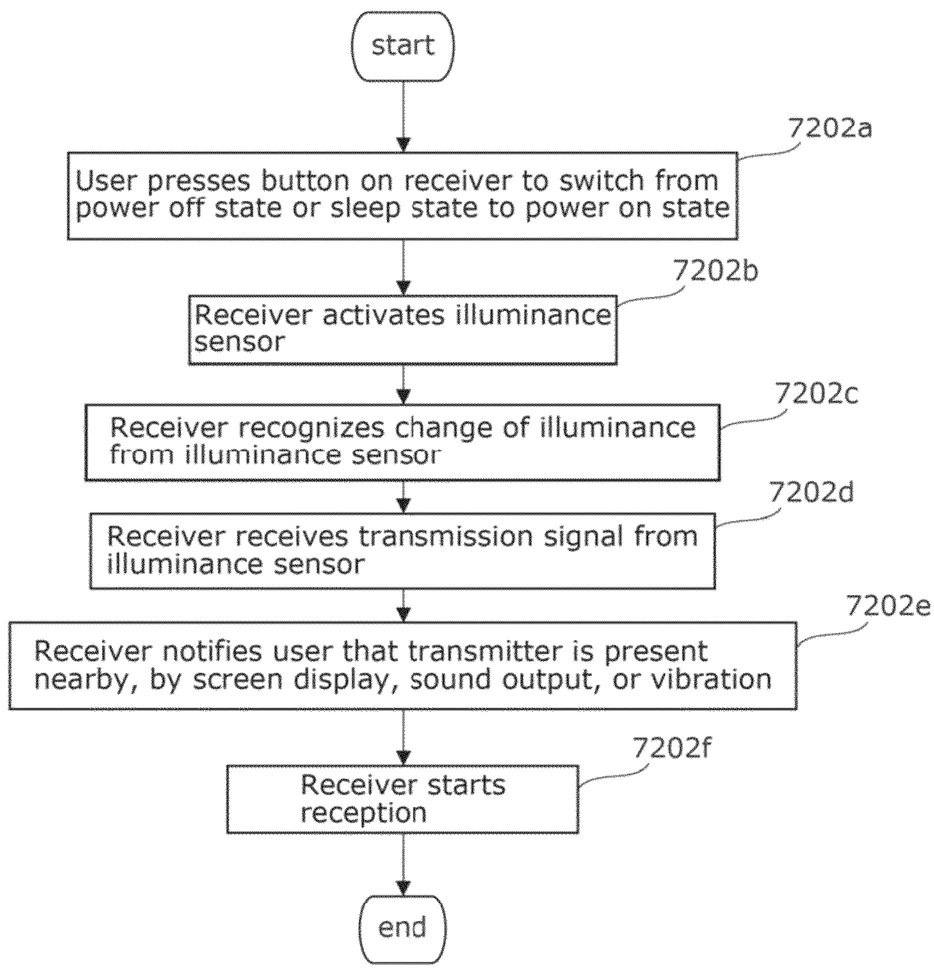

FIG. 290 is a flowchart illustrating an example of processing operation relating to a receiver and a transmitter in Embodiment 13.

Figure 291:
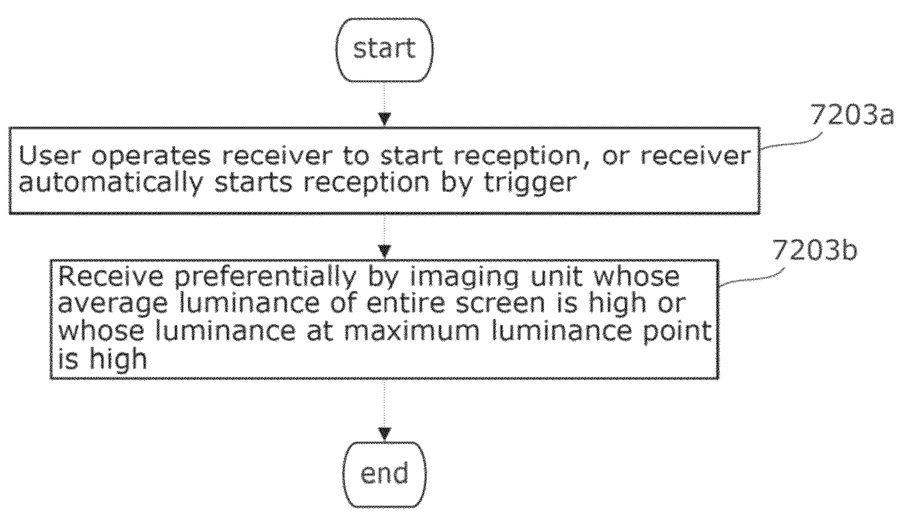

FIG. 291 is a flowchart illustrating an example of processing operation relating to a receiver and a transmitter in Embodiment 13.

Figure 292:
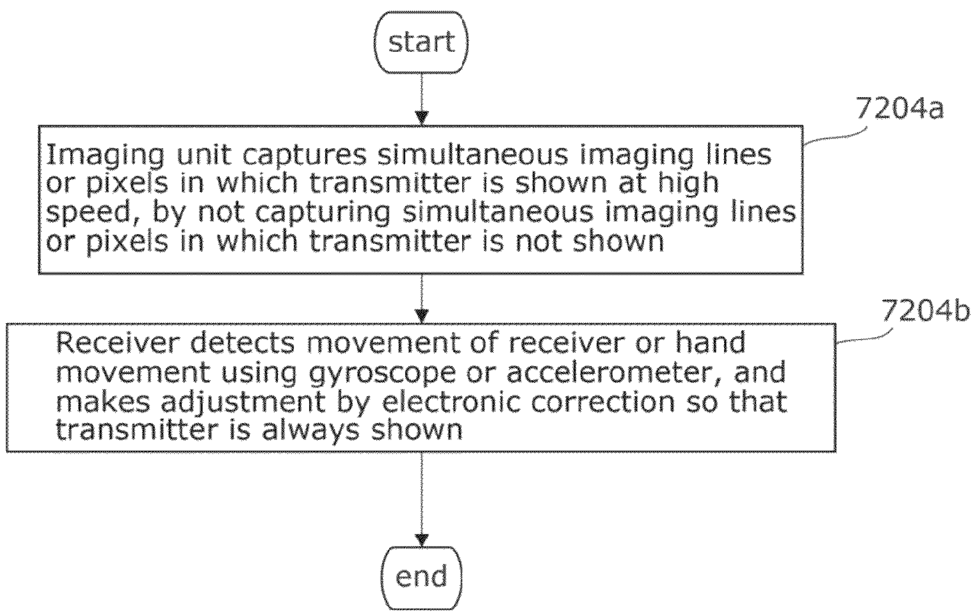

FIG. 292 is a flowchart illustrating an example of processing operation relating to a receiver and a transmitter in Embodiment 13.

Figure 293:
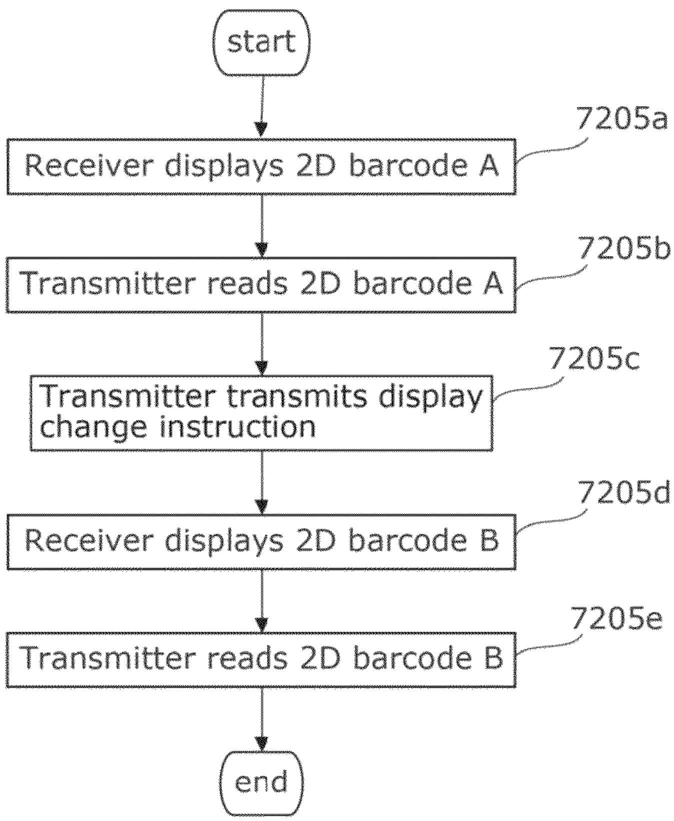

FIG. 293 is a flowchart illustrating an example of processing operation relating to a receiver and a transmitter in Embodiment 13.

Figure 294:
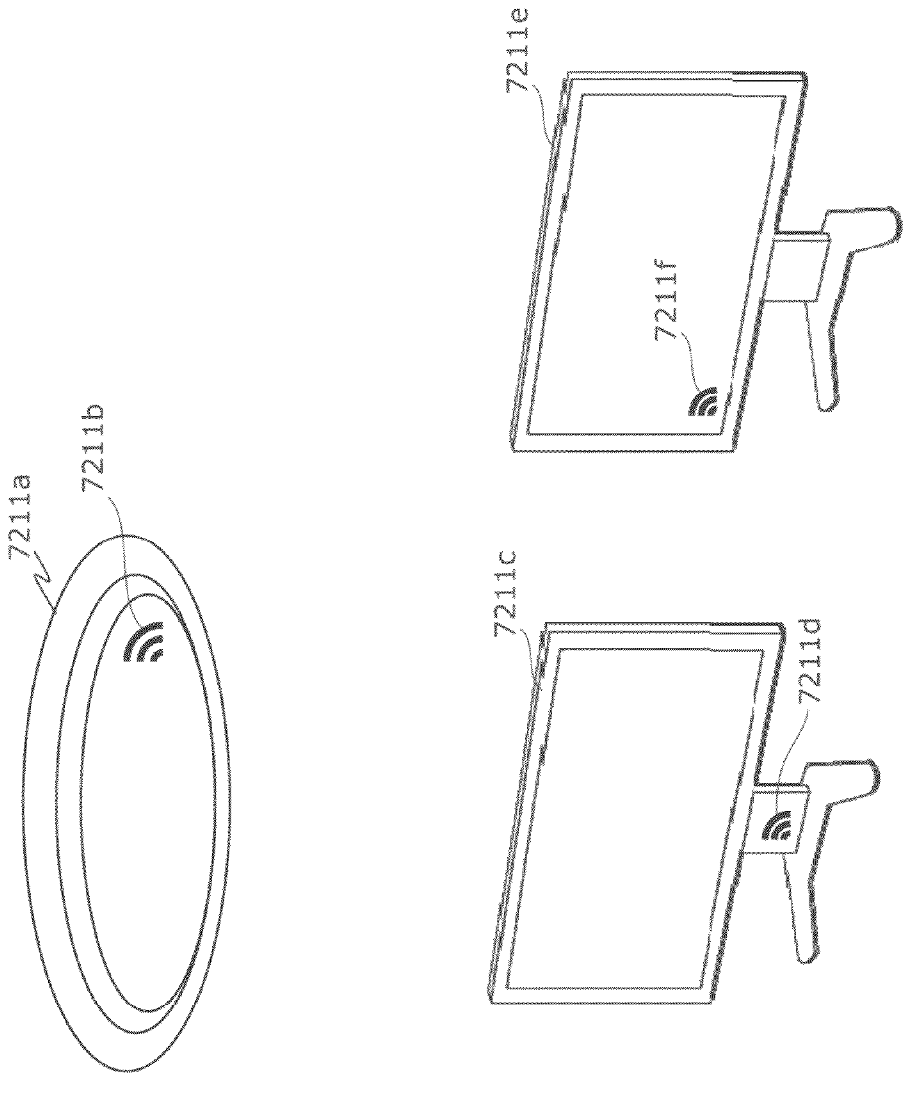

FIG. 294 is a diagram illustrating an example of application of a transmitter in Embodiment 13.

Figure 295:
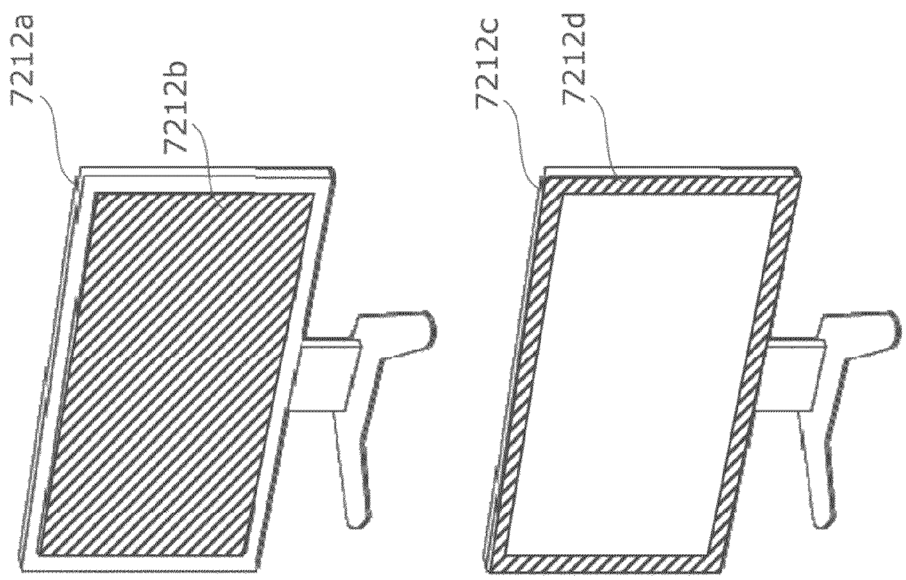

FIG. 295 is a diagram illustrating an example of application of a transmitter in Embodiment 13.

Figure 296:
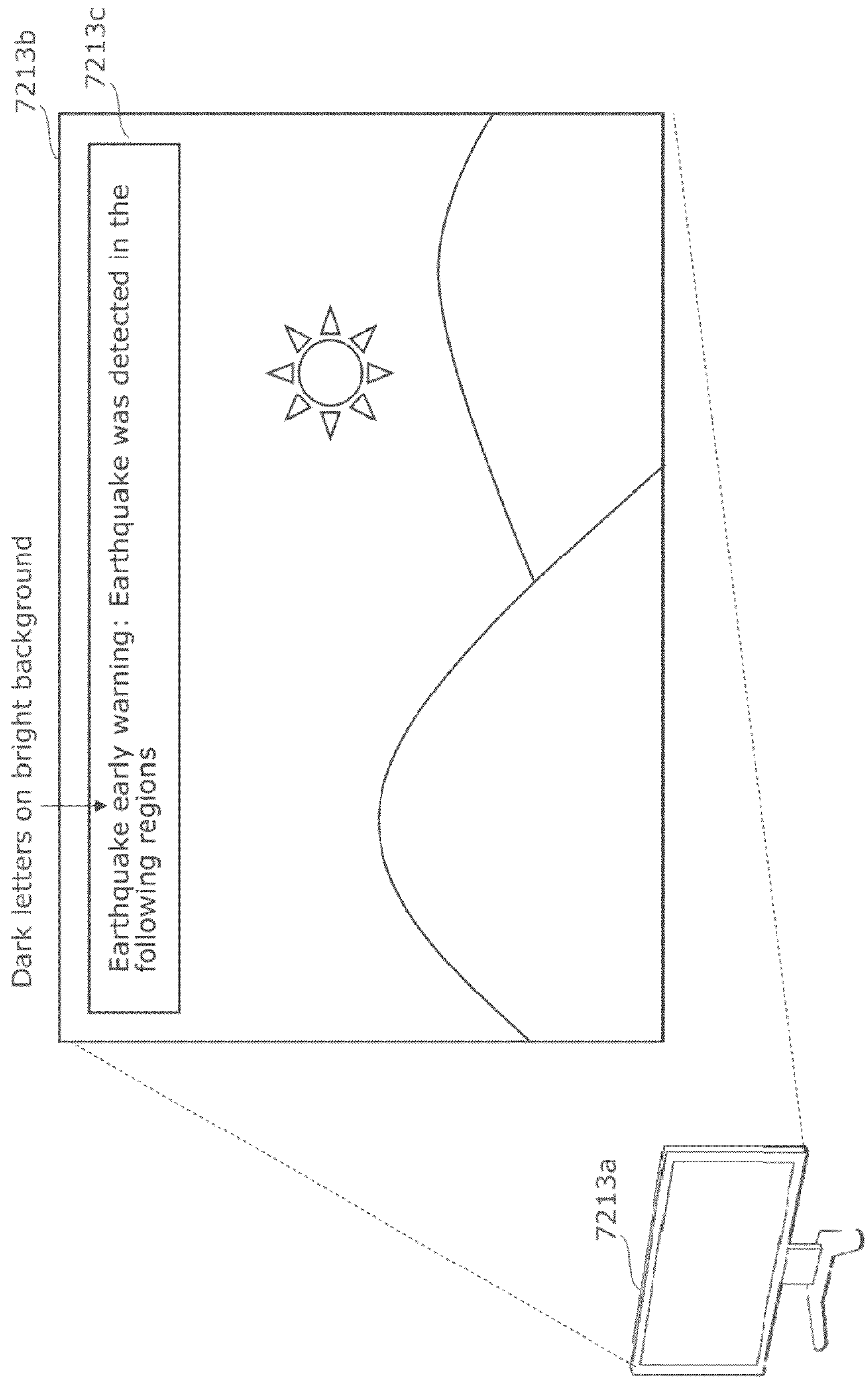

FIG. 296 is a diagram illustrating an example of application of a transmitter in Embodiment 13.

Figure 297:
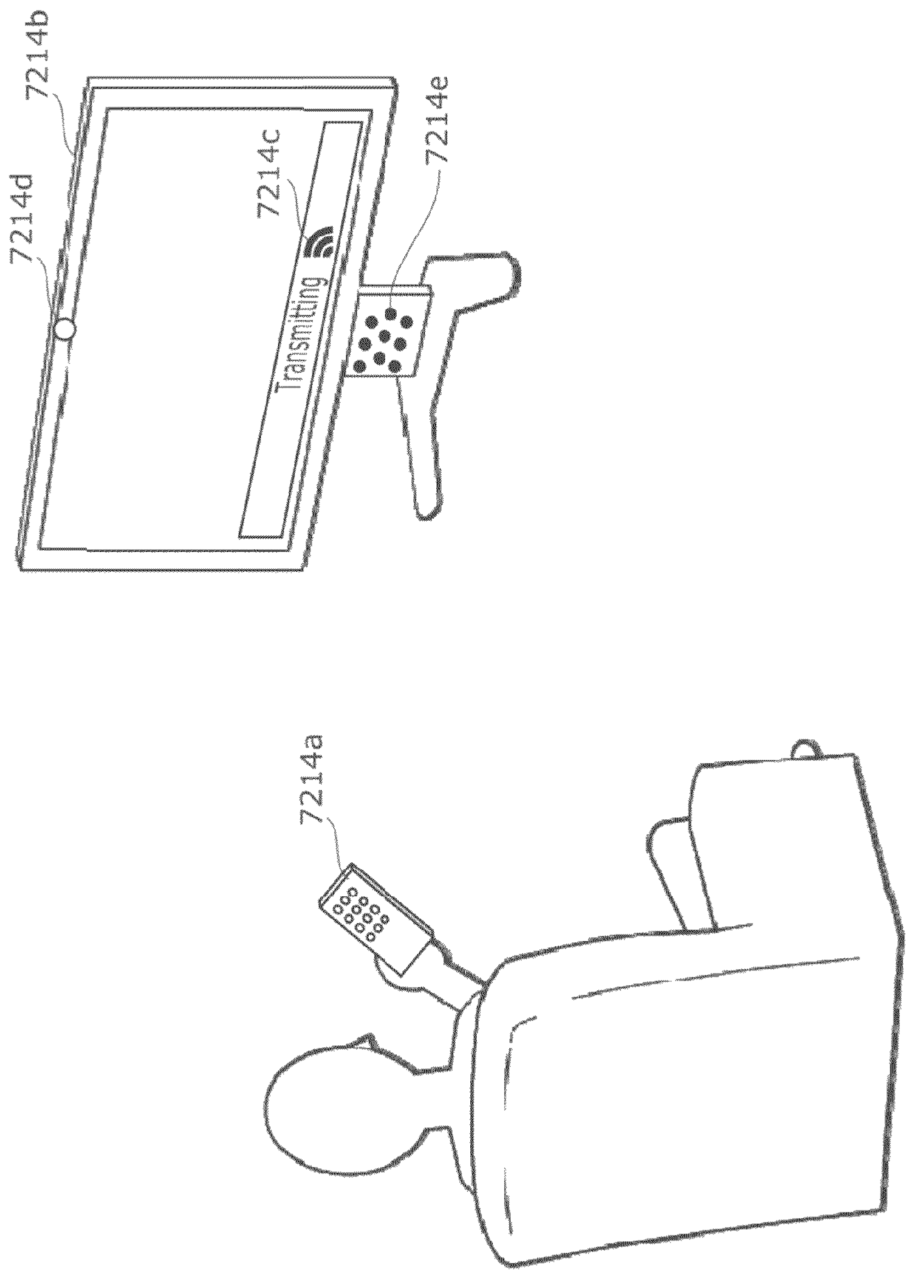

FIG. 297 is a diagram illustrating an example of application of a transmitter and a receiver in Embodiment 13.

Figure 298:
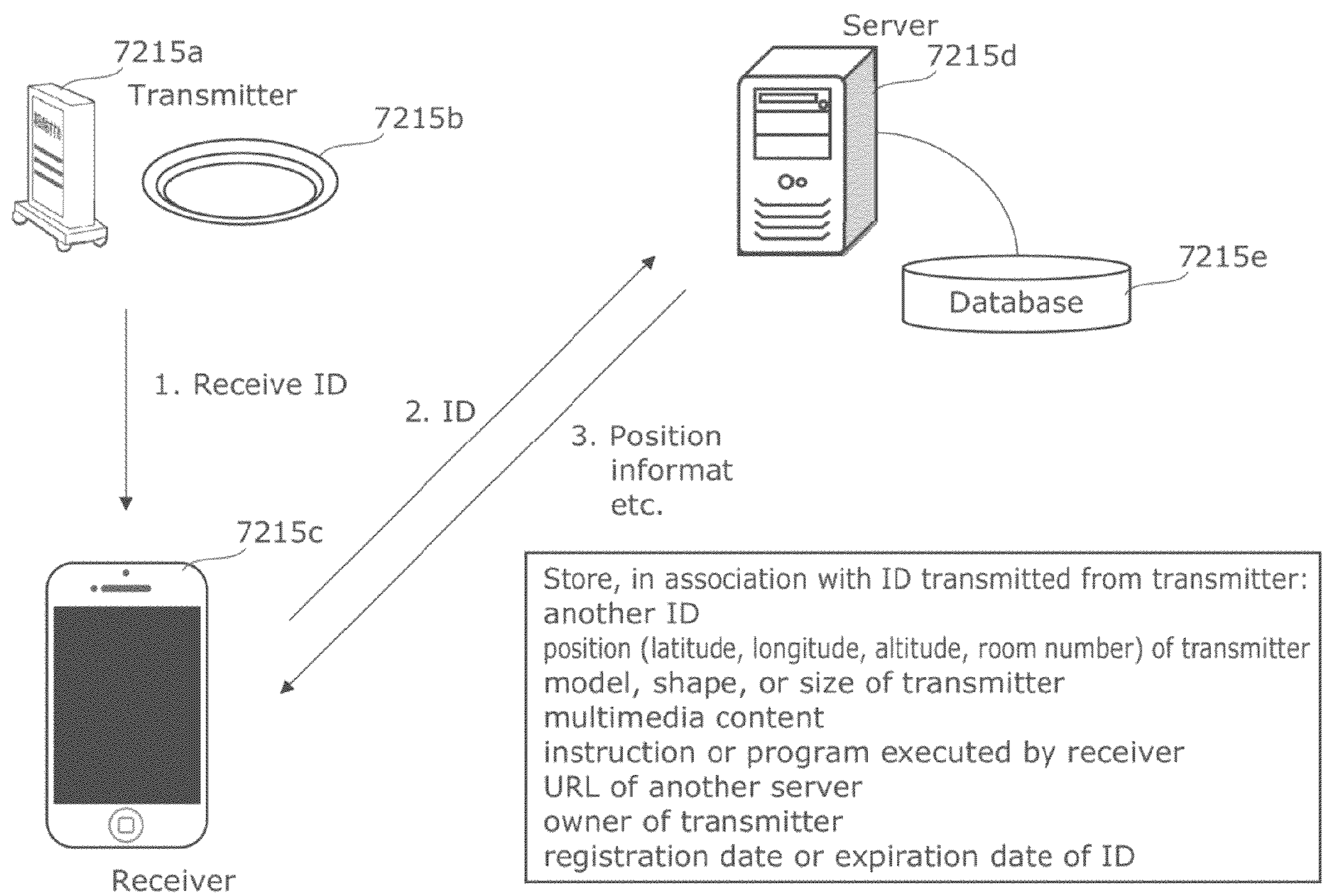

FIG. 298 is a diagram illustrating an example of application of a transmitter and a receiver in Embodiment 13.

Figure 299:
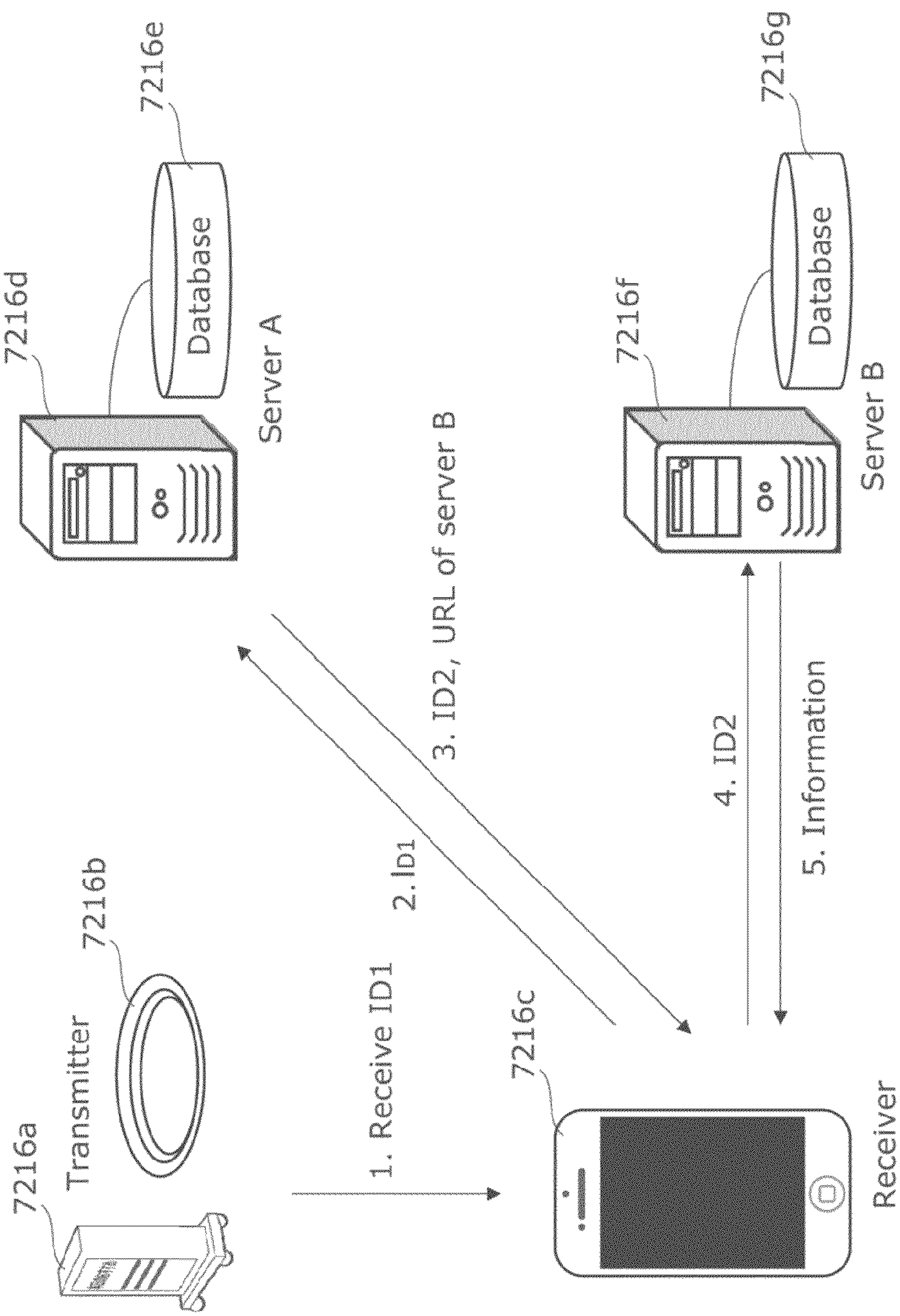

FIG. 299 is a diagram illustrating an example of application of a transmitter and a receiver in Embodiment 13.

Figure 300:
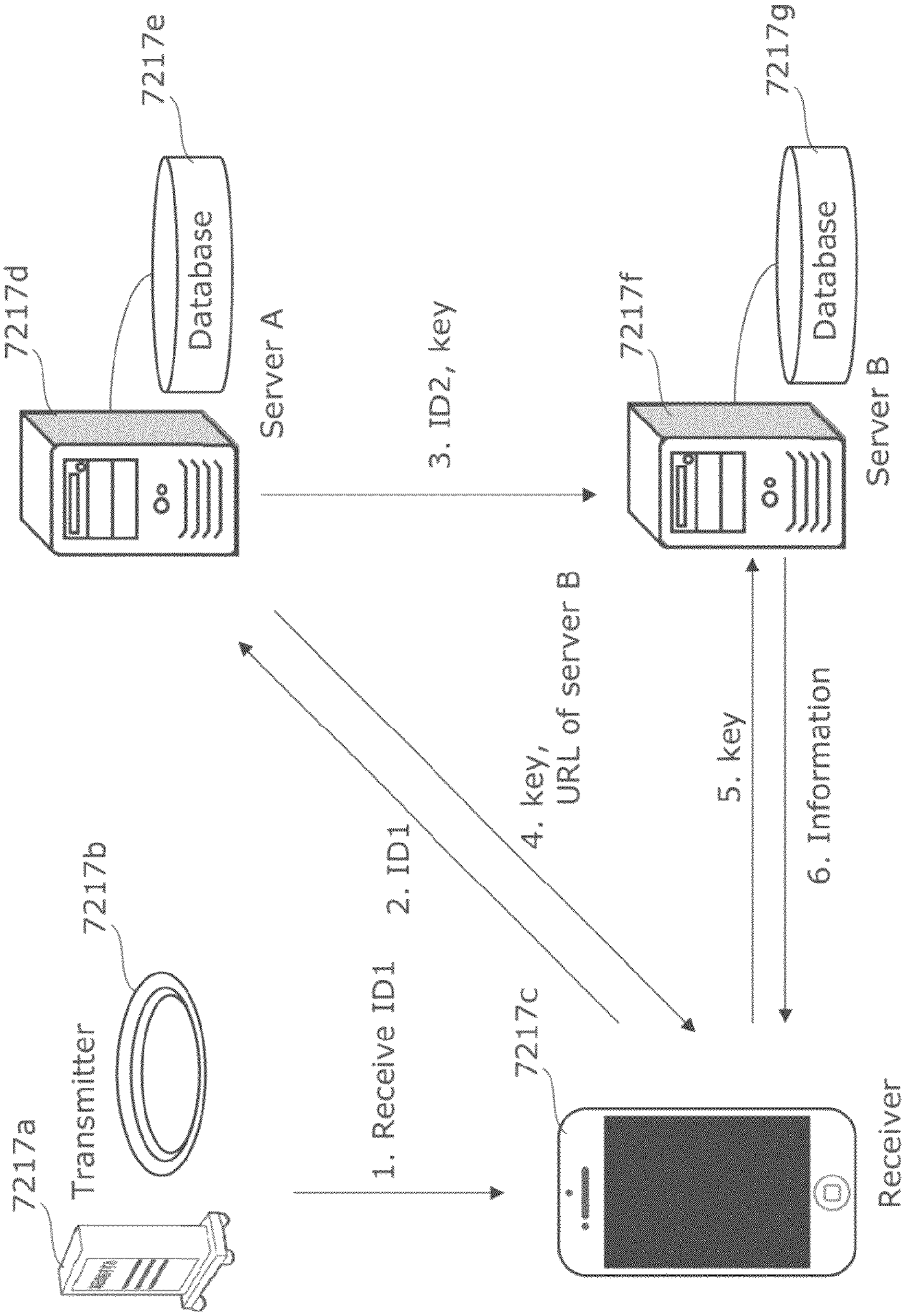

FIG. 300 is a diagram illustrating an example of application of a transmitter and a receiver in Embodiment 13.

Figure 301A:
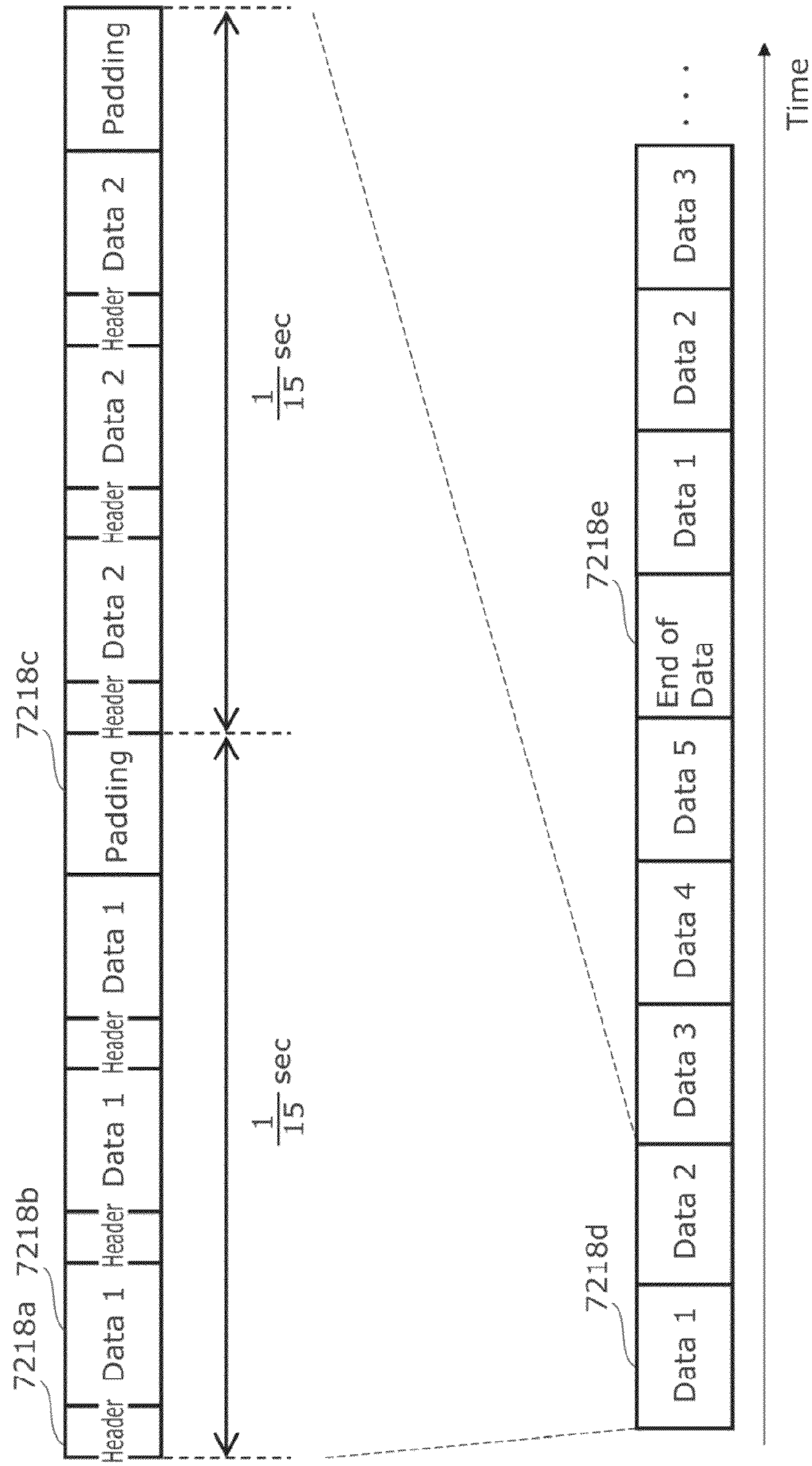

FIG. 301A is a diagram illustrating an example of a transmission signal in Embodiment 13.

Figure 301B:
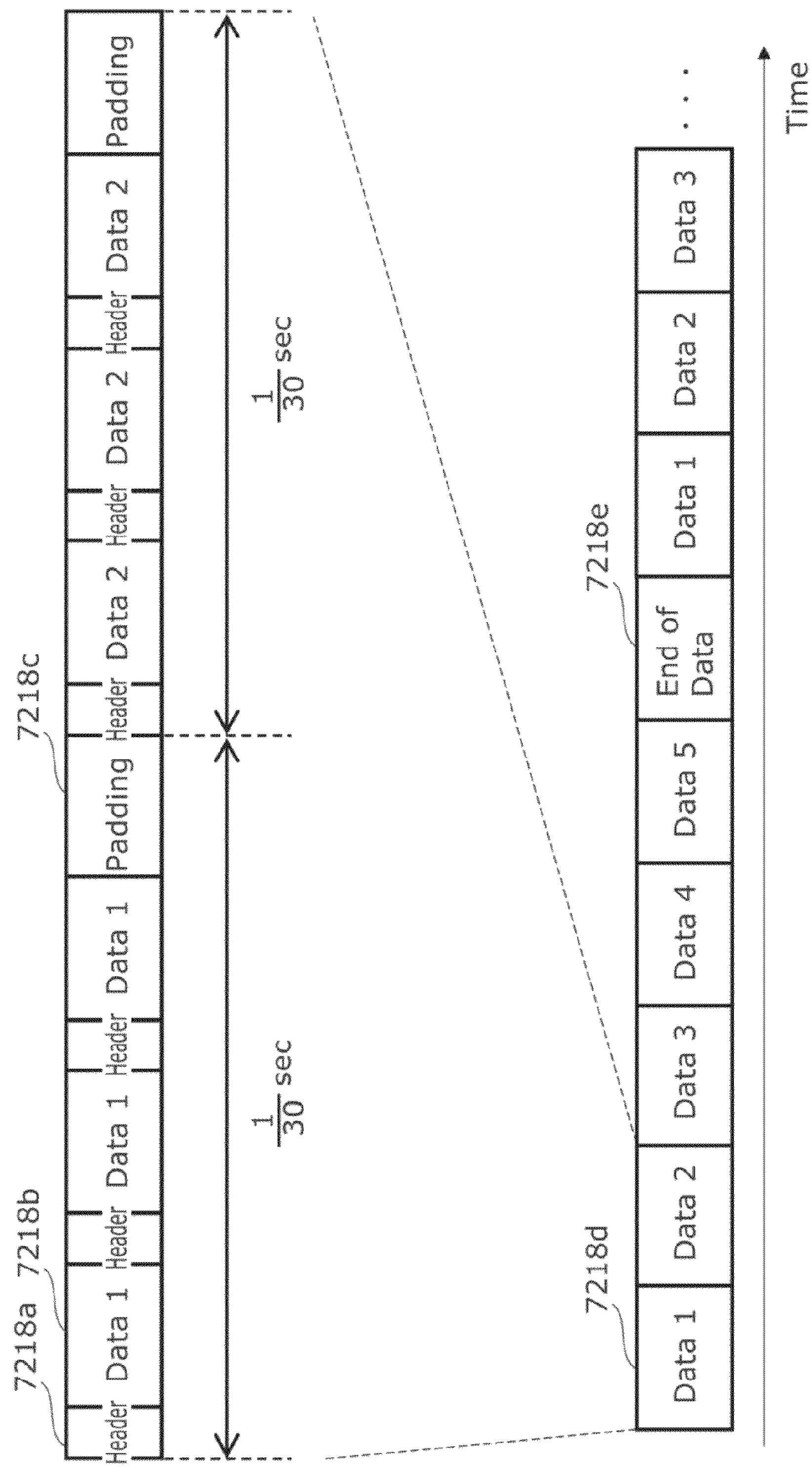

FIG. 301B is a diagram illustrating another example of a transmission signal in Embodiment 13.

FIG. 302 is a diagram illustrating an example of a transmission signal in Embodiment 13.

Figure 303A:
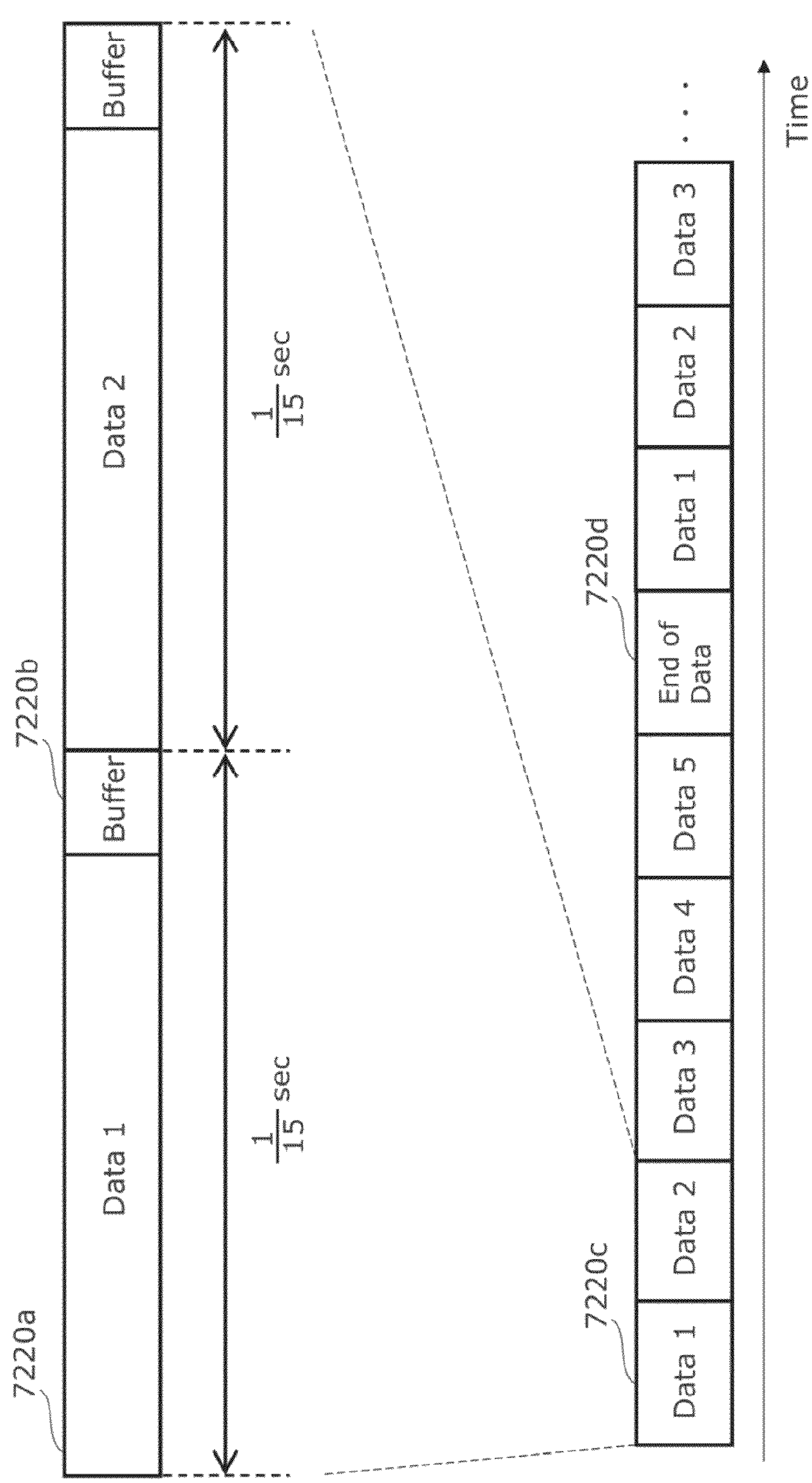

FIG. 303A is a diagram illustrating an example of a transmission signal in Embodiment 13.

Figure 303B:
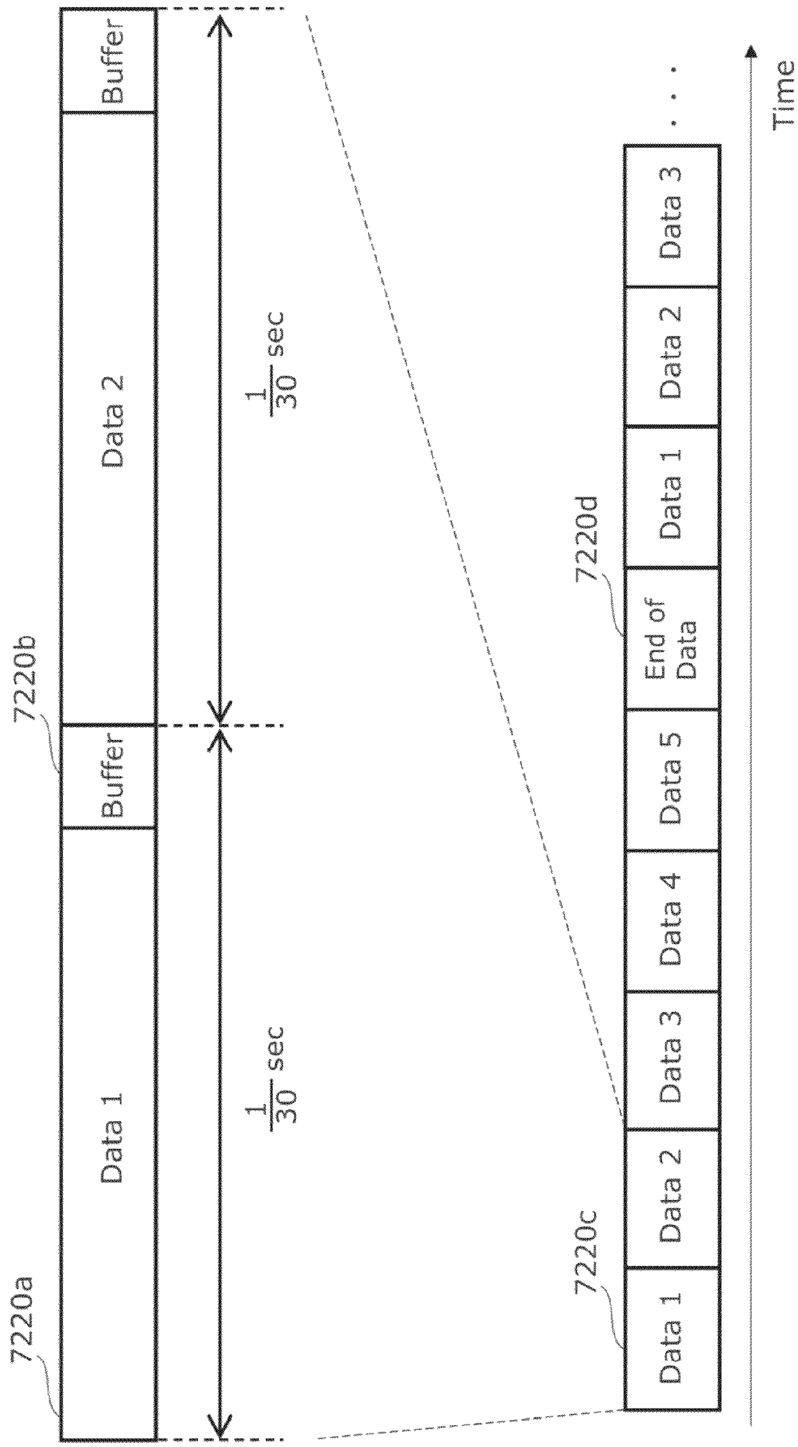

FIG. 303B is a diagram illustrating another example of a transmission signal in Embodiment 13.

FIG. 304 is a diagram illustrating an example of a transmission signal in Embodiment 13.

Figure 305A:
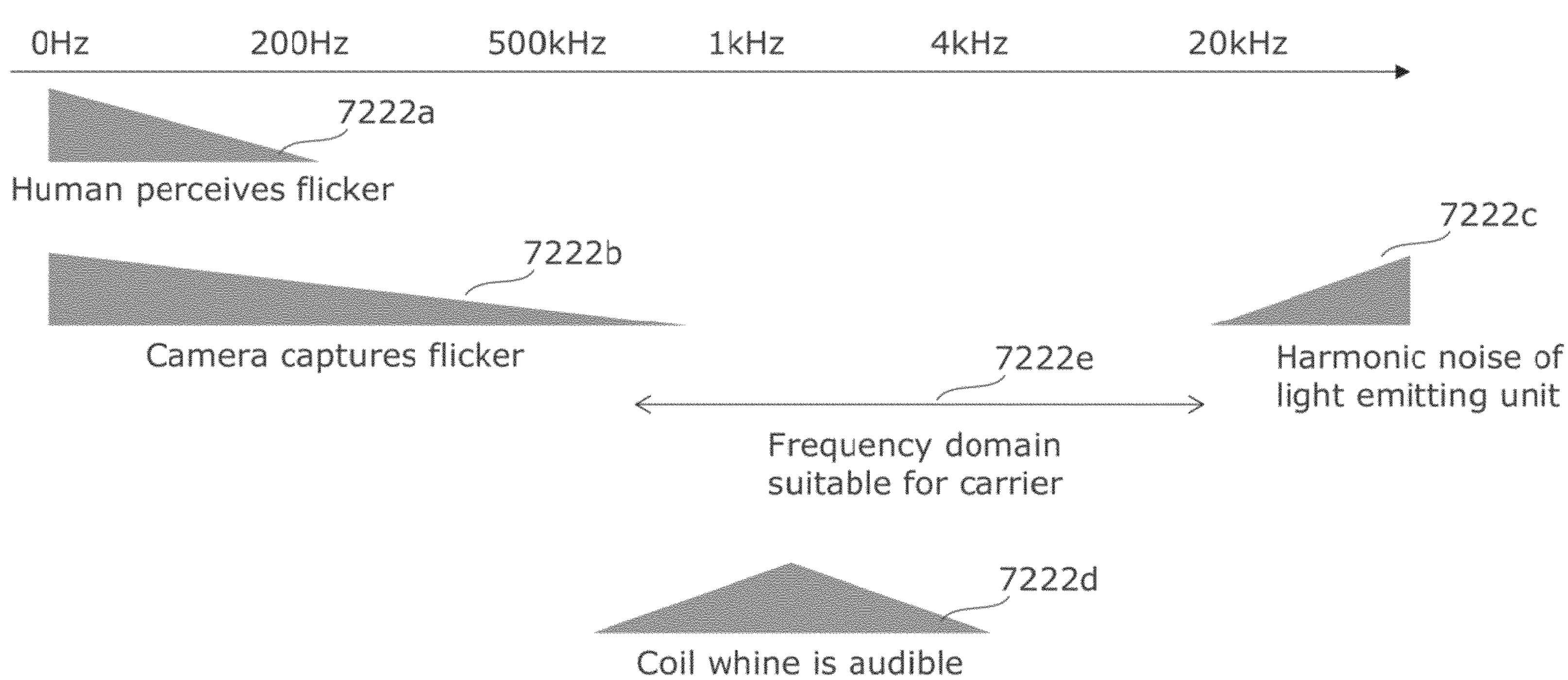

FIG. 305A is a diagram illustrating an example of a transmission signal in Embodiment 13.

Figure 305B:
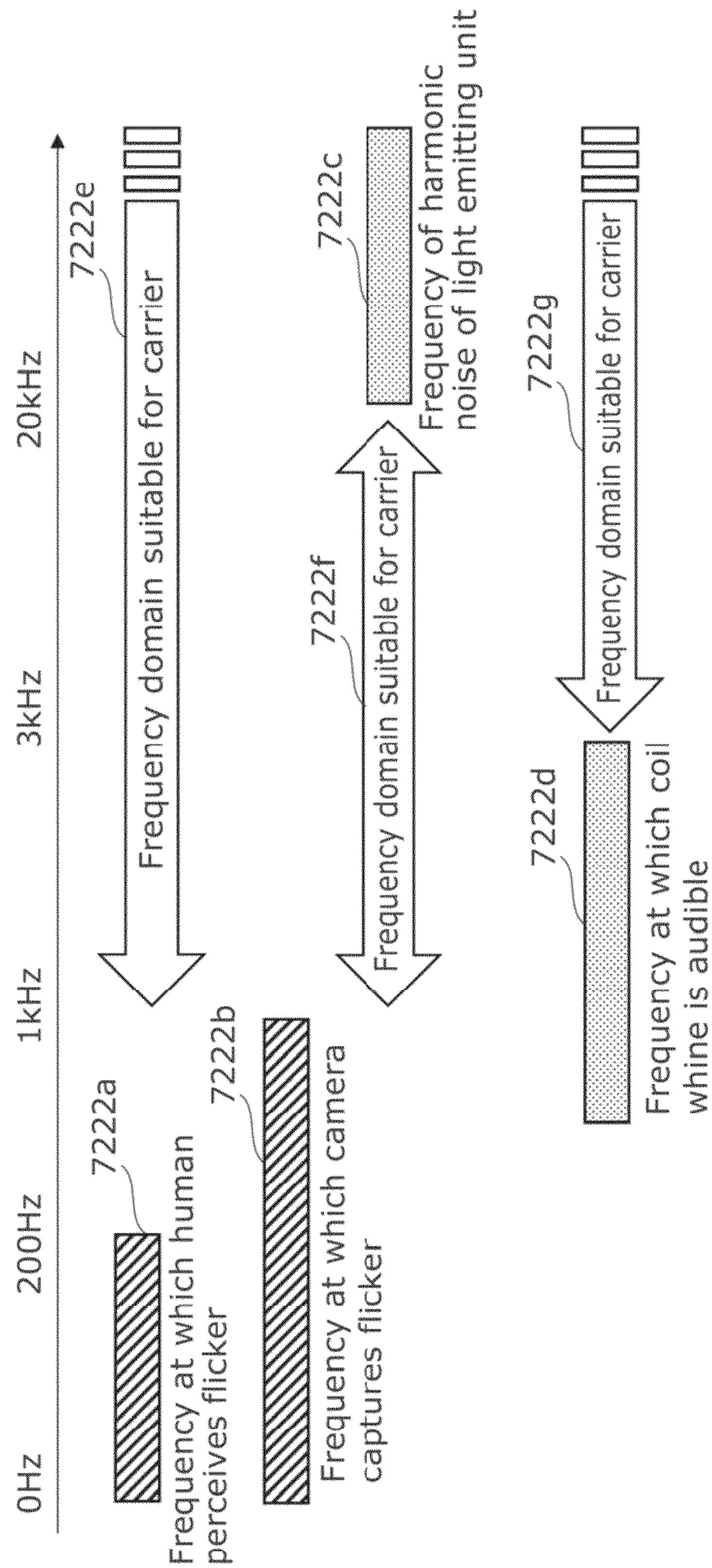

FIG. 305B is a diagram illustrating an example of a transmission signal in Embodiment 13.

Figure 306:
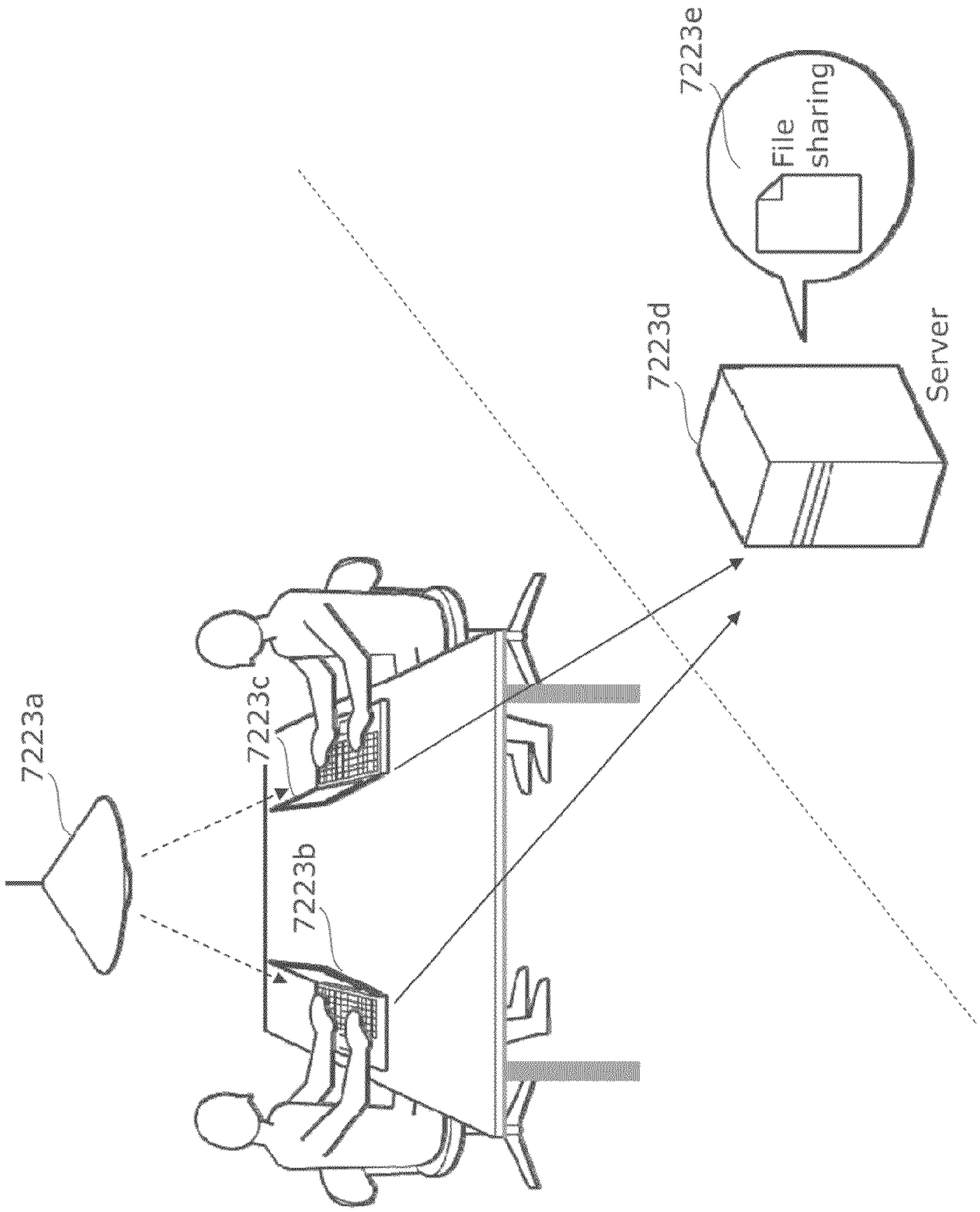

FIG. 306 is a diagram illustrating an example of application of a transmitter in Embodiment 13.

Figure 307:
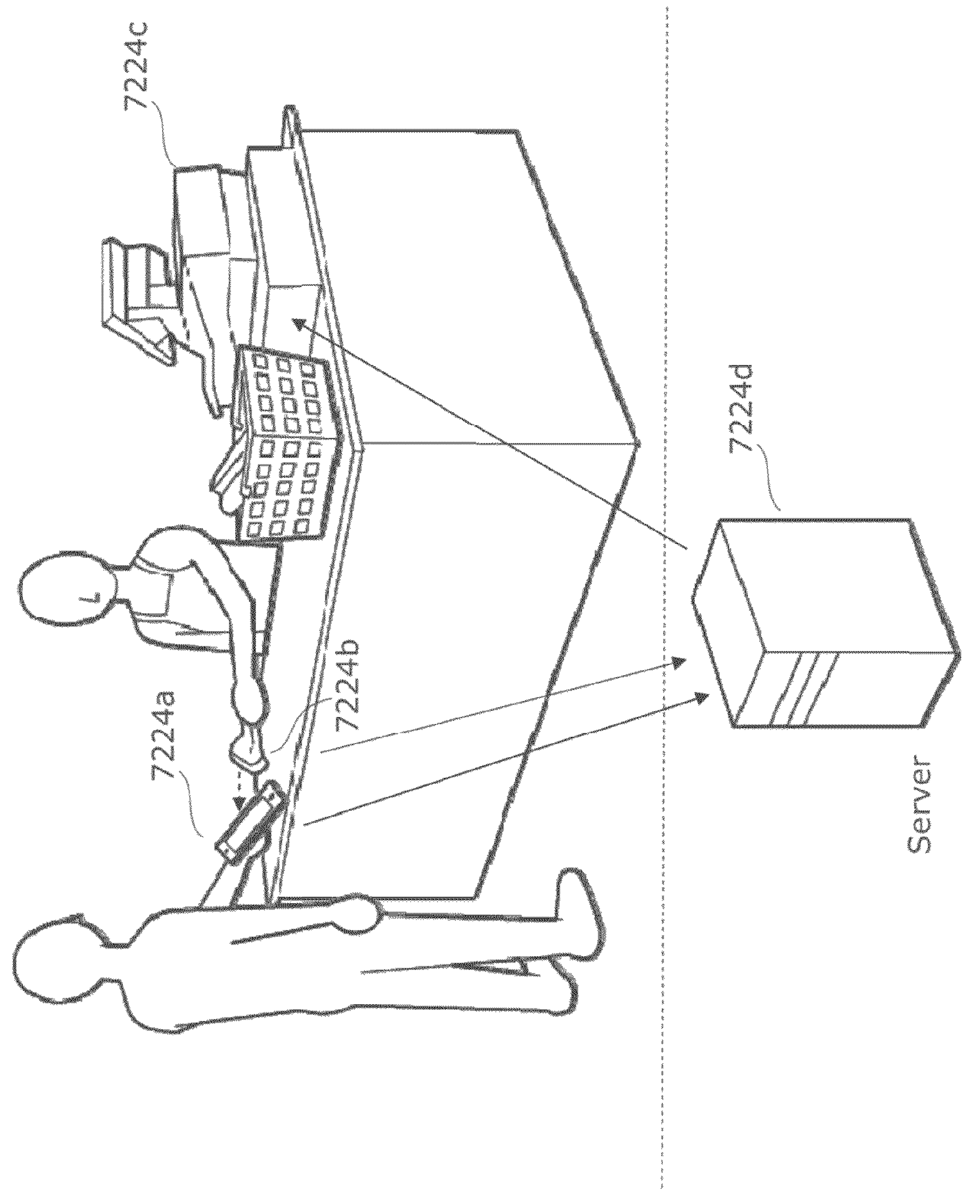

FIG. 307 is a diagram illustrating an example of application of a transmitter in Embodiment 13.

Figure 308:
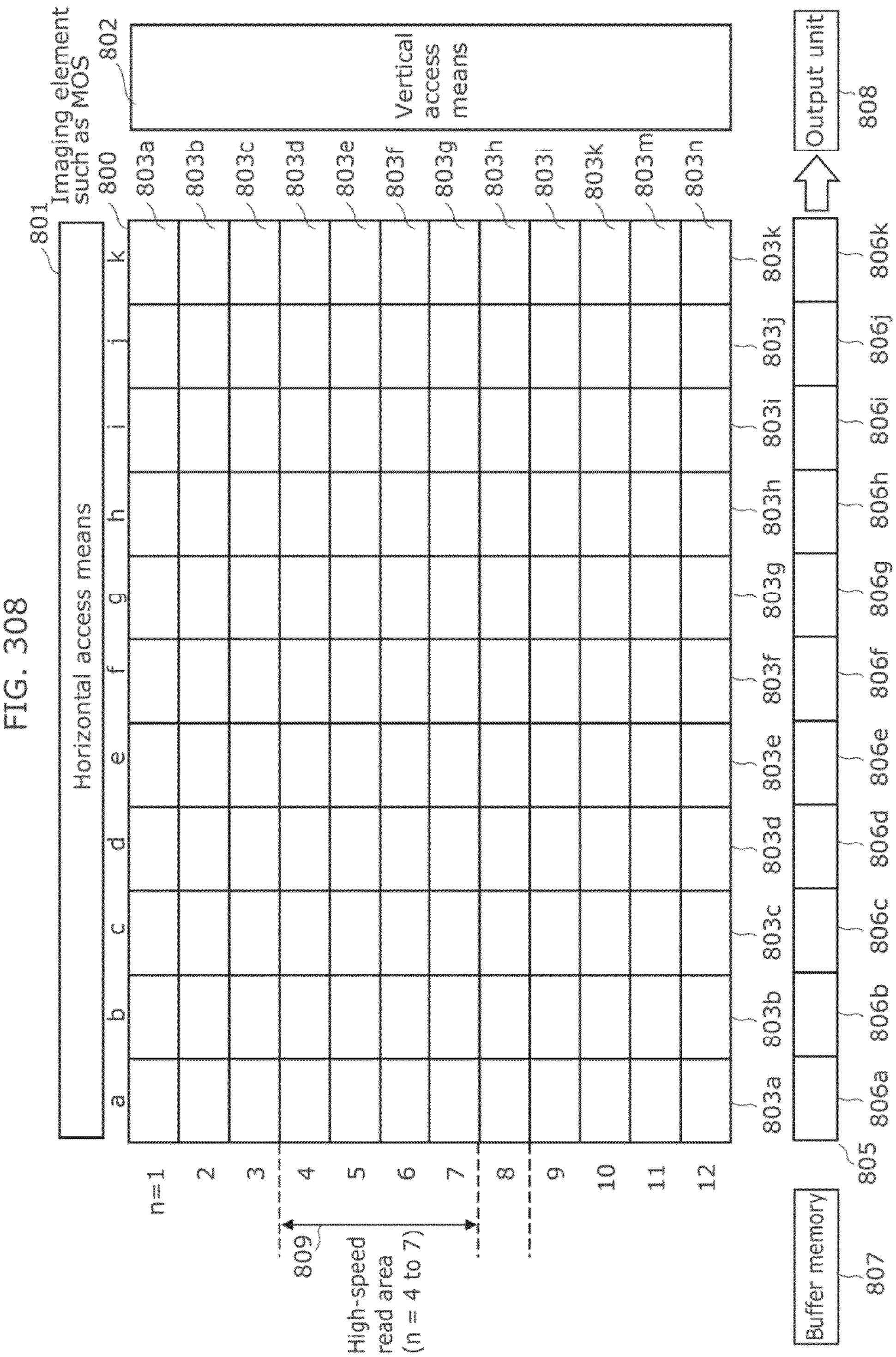

FIG. 308 is a diagram for describing an imaging element in Embodiment 13.

Figure 309:
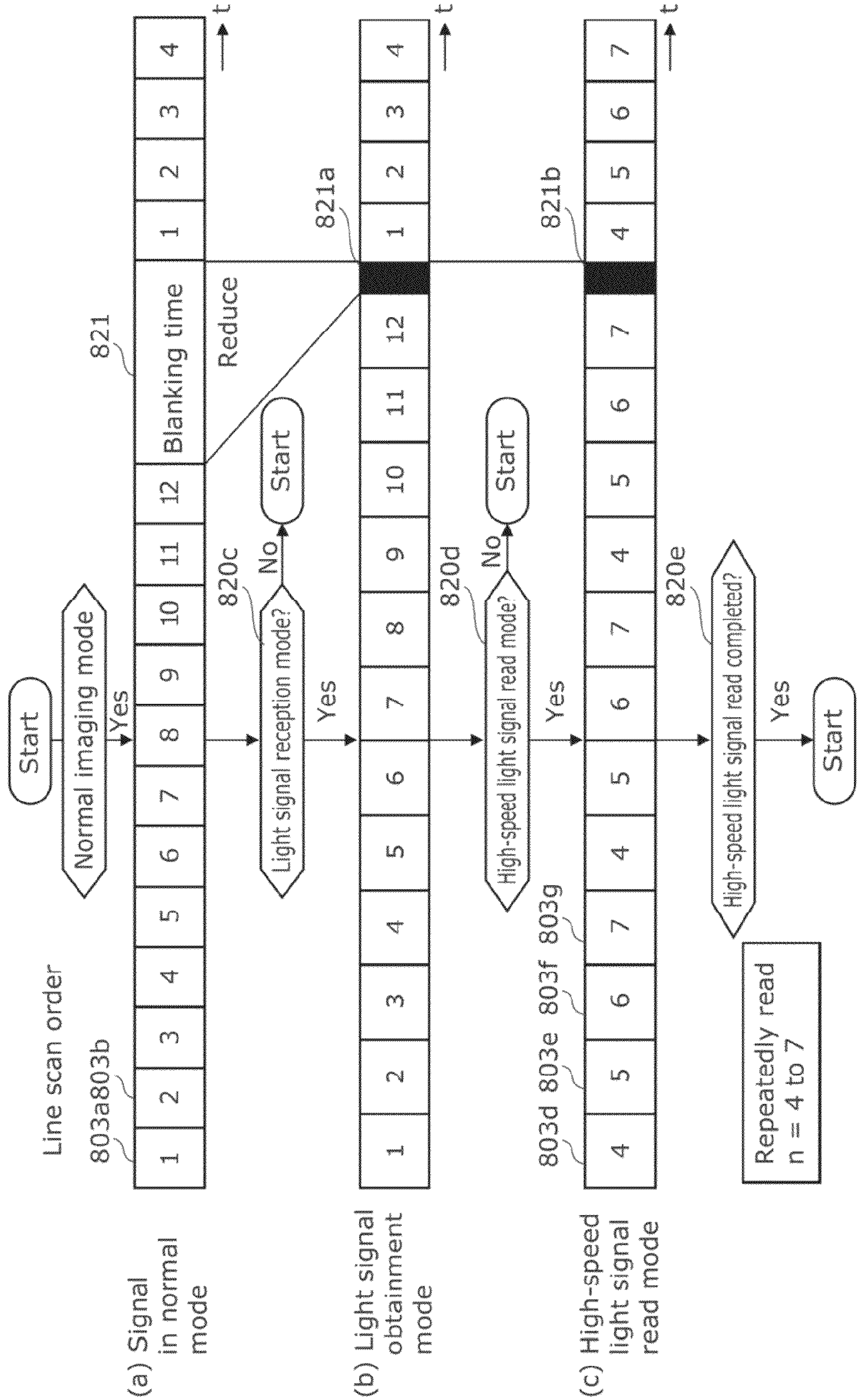

FIG. 309 is a diagram for describing an imaging element in Embodiment 13.

Figure 310:
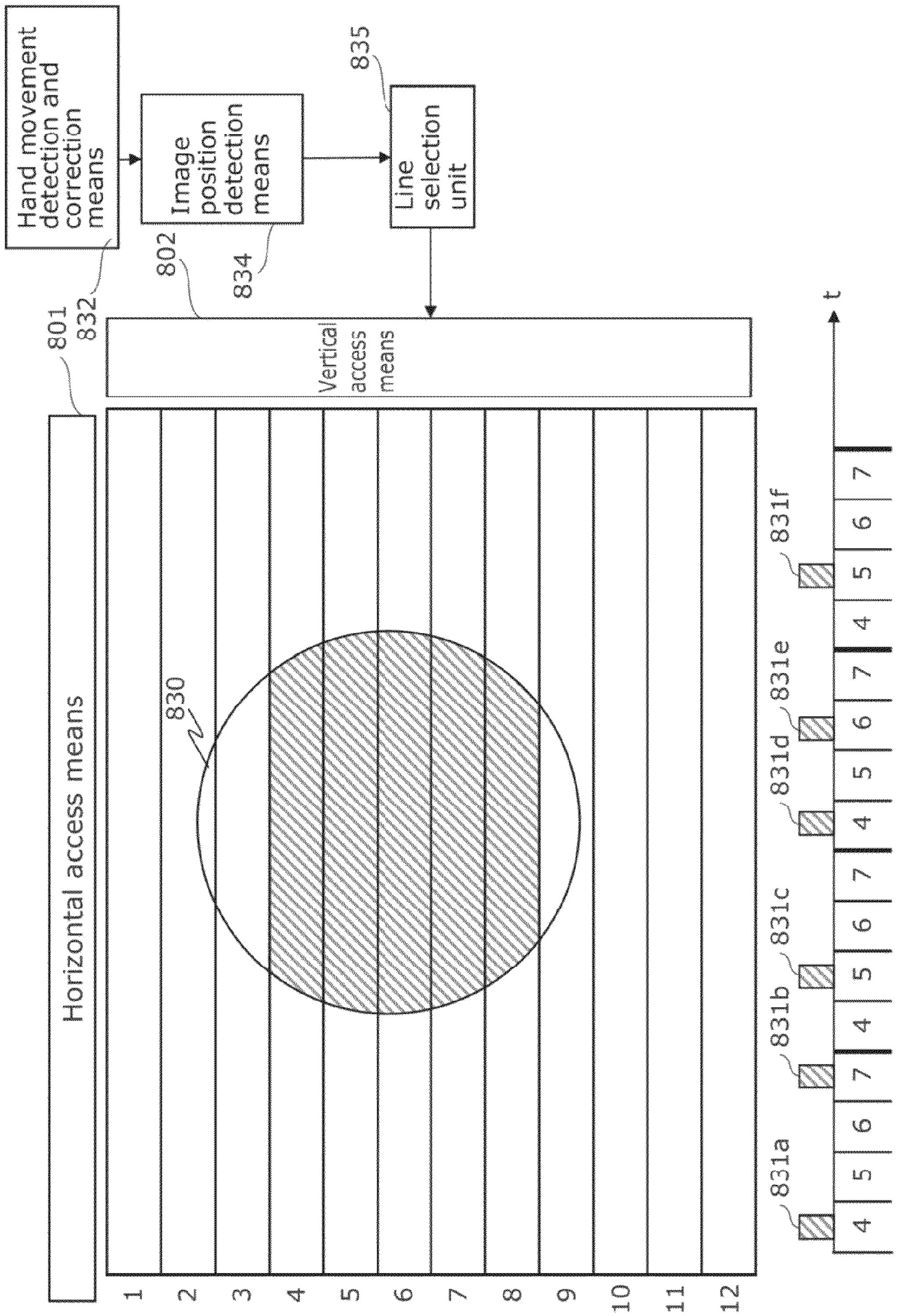

FIG. 310 is a diagram for describing an imaging element in Embodiment 13.

Figure 311A:
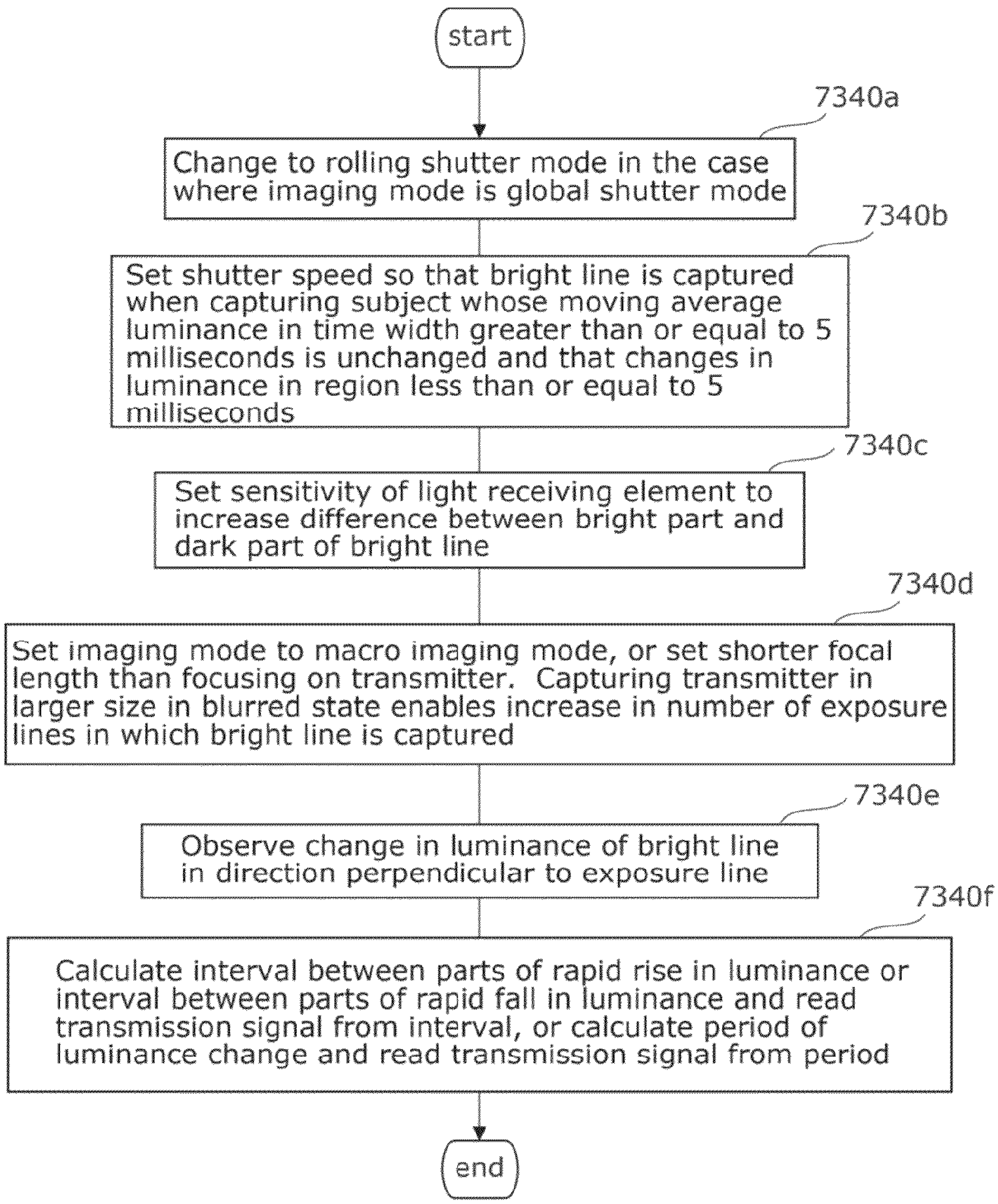

FIG. 311A is a flowchart illustrating processing operation of a reception device (imaging device) in a variation of each embodiment.

Figure 311B:
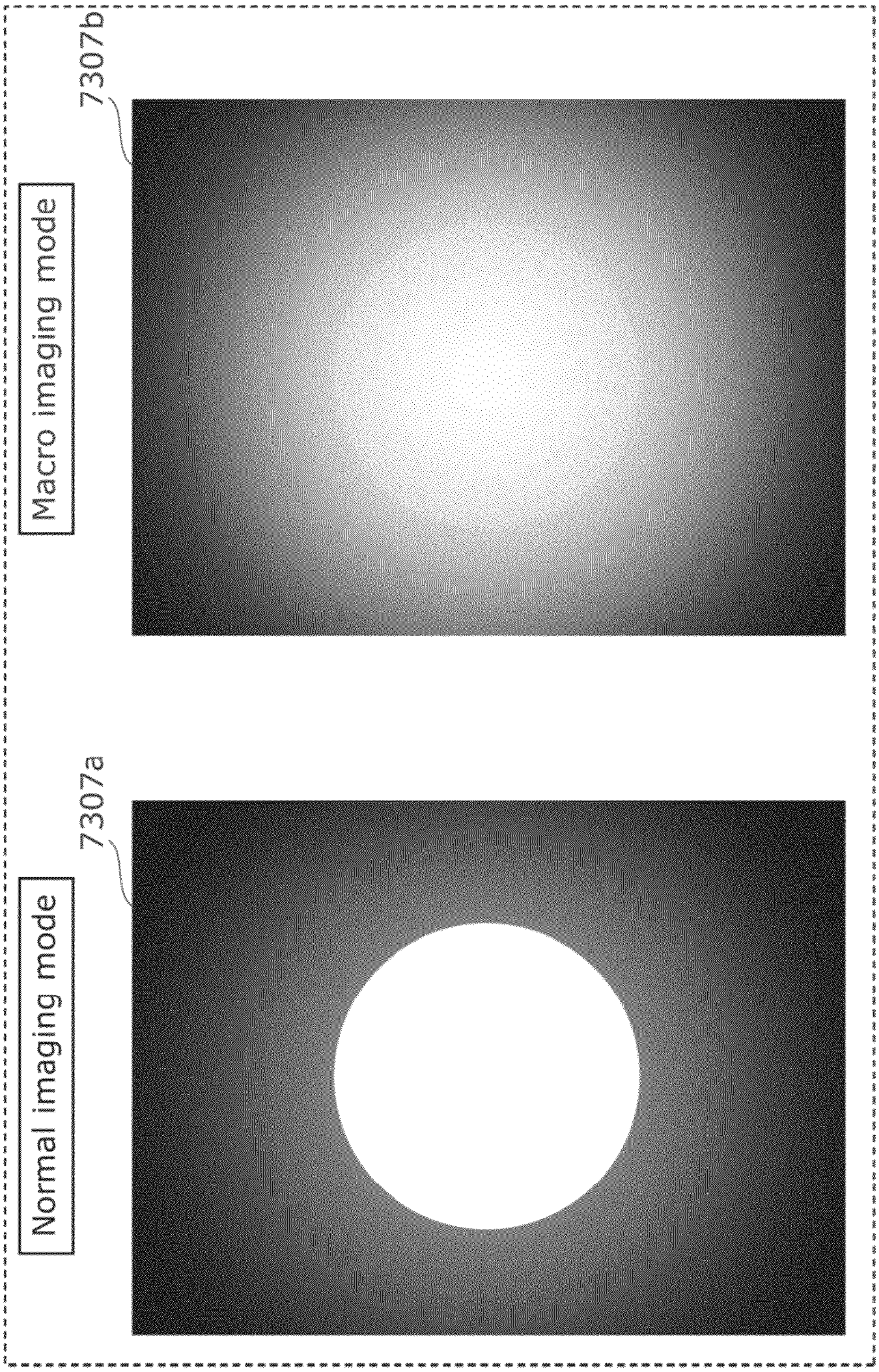

FIG. 311B is a diagram illustrating a normal imaging mode and a macro imaging mode in a variation of each embodiment in comparison.

Figure 312:
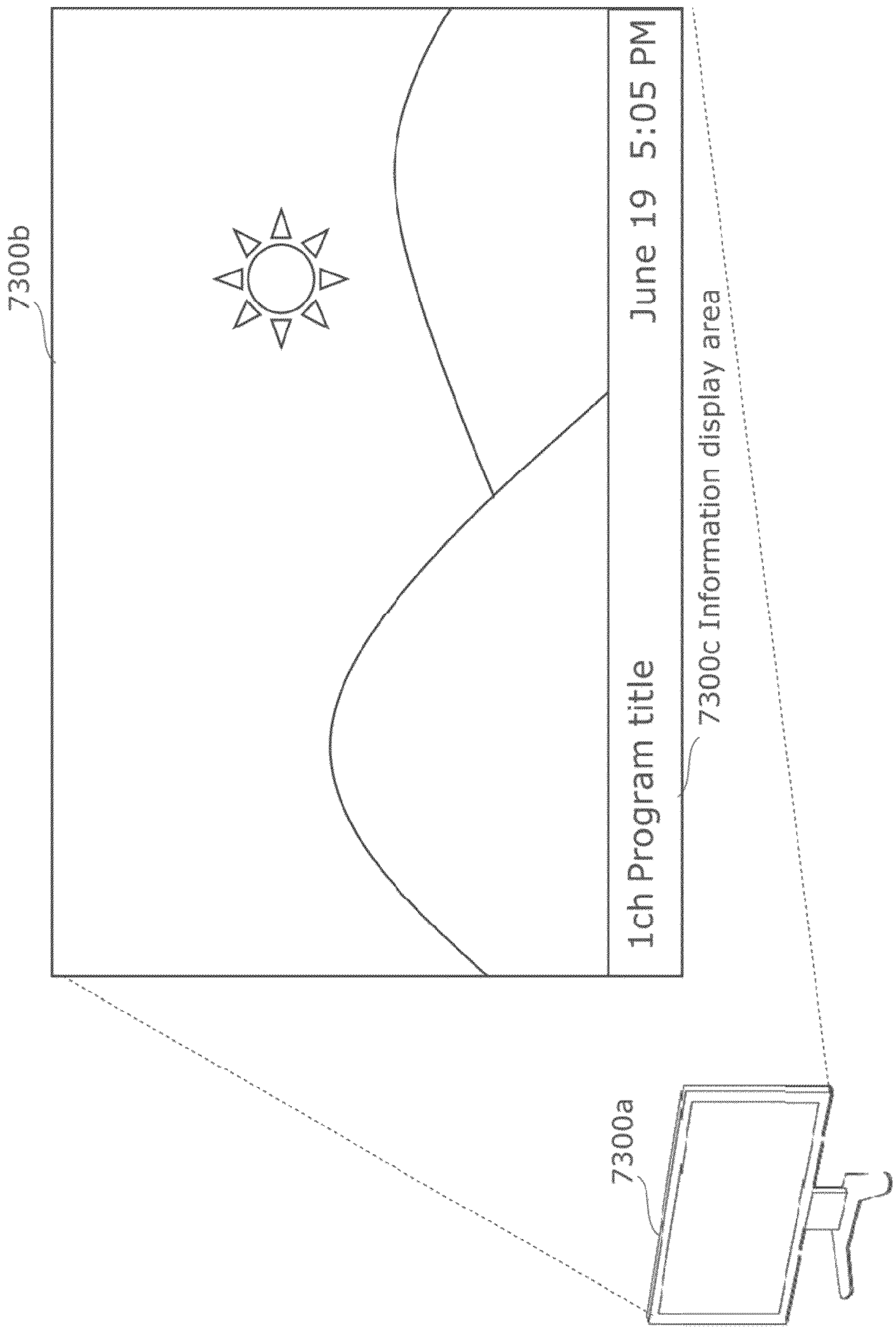

FIG. 312 is a diagram illustrating a display device for displaying video and the like in a variation of each embodiment.

Figure 313:
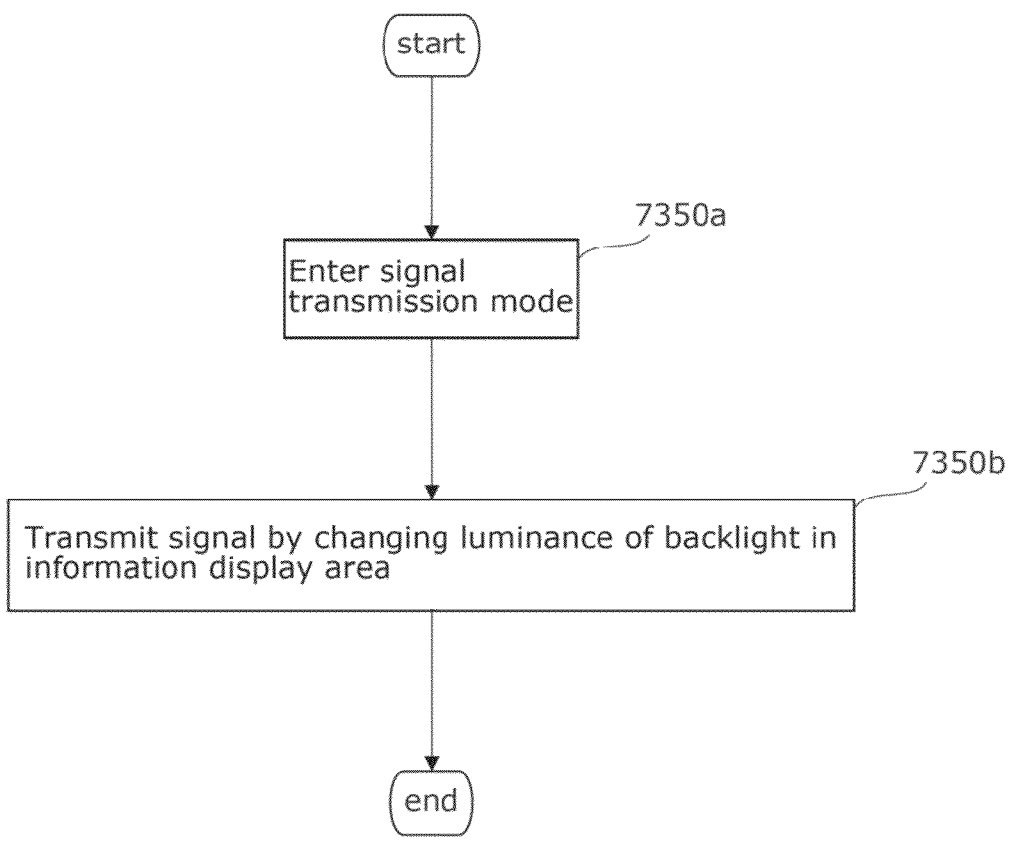

FIG. 313 is a diagram illustrating an example of processing operation of a display device in a variation of each embodiment.

Figure 314:
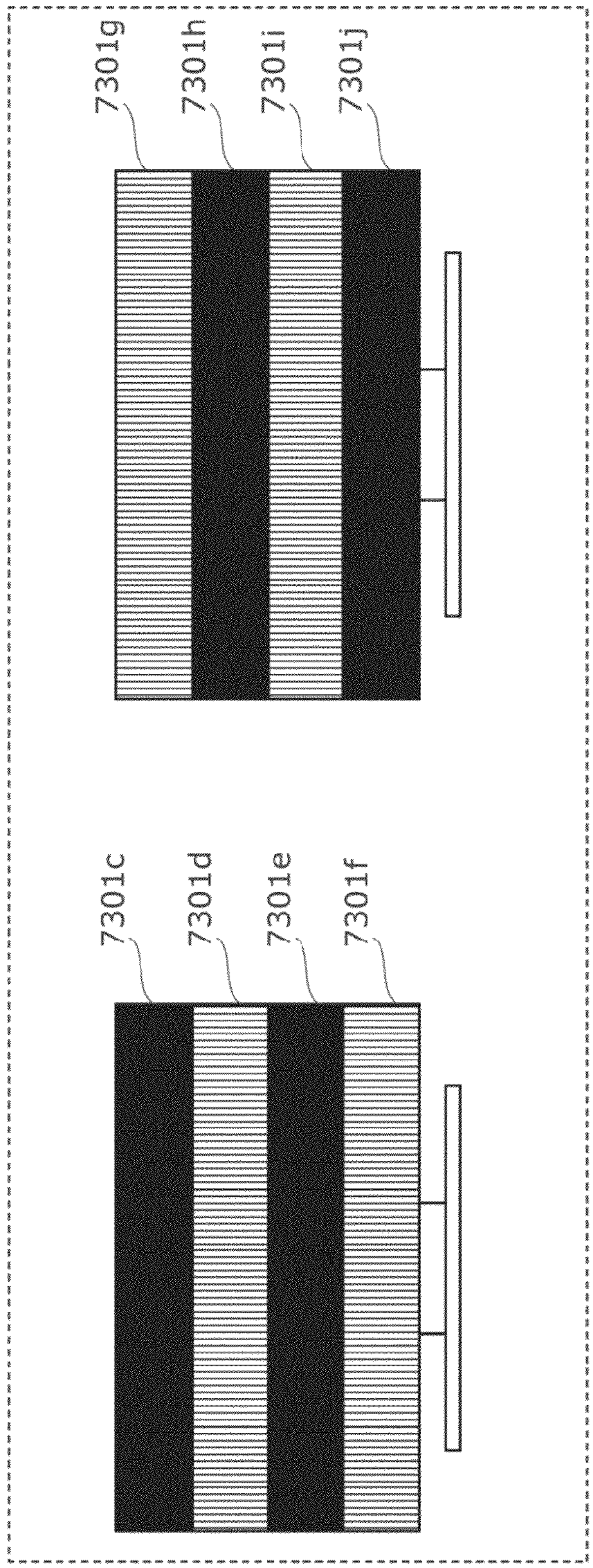

FIG. 314 is a diagram illustrating an example of a part transmitting a signal in a display device in a variation of each embodiment.

Figure 315:
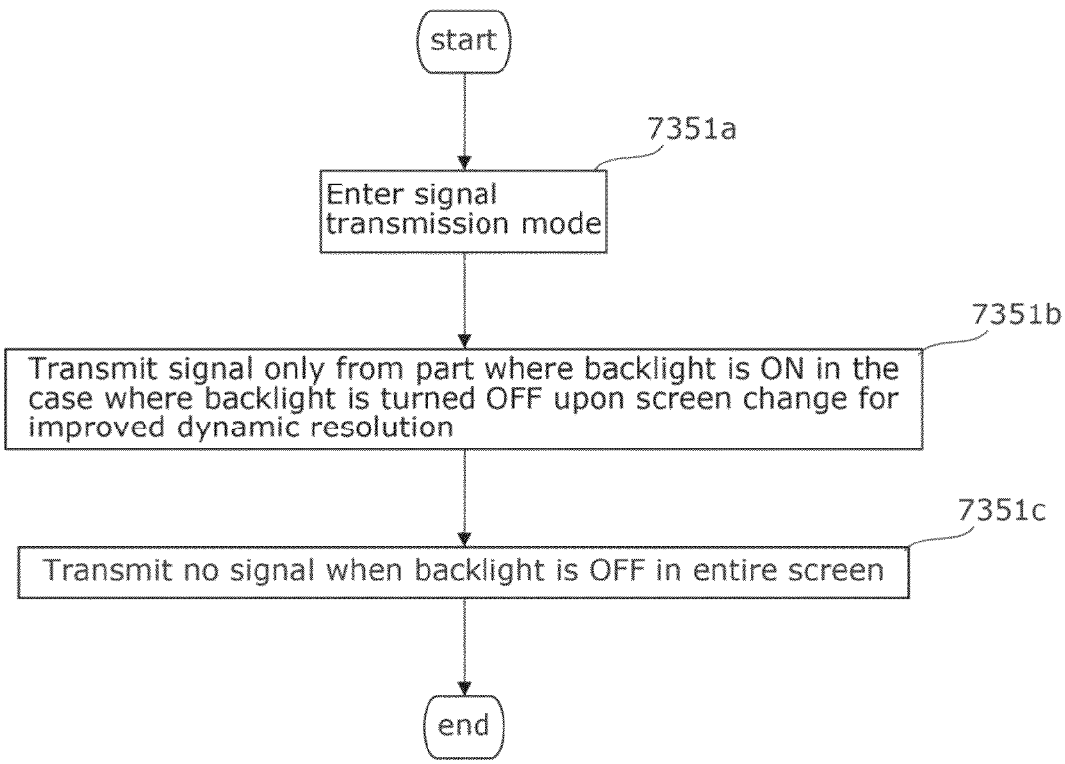

FIG. 315 is a diagram illustrating another example of processing operation of a display device in a variation of each embodiment.

Figure 316:
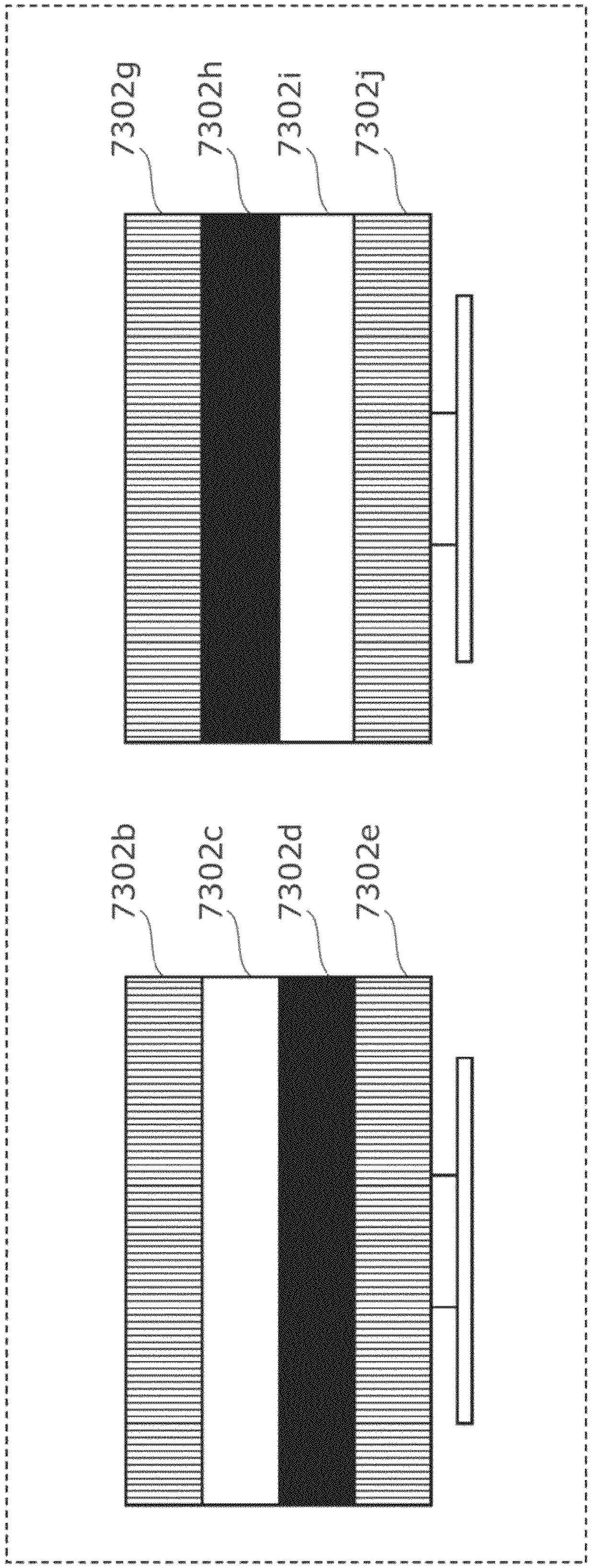

FIG. 316 is a diagram illustrating another example of a part transmitting a signal in a display device in a variation of each embodiment.

Figure 317:
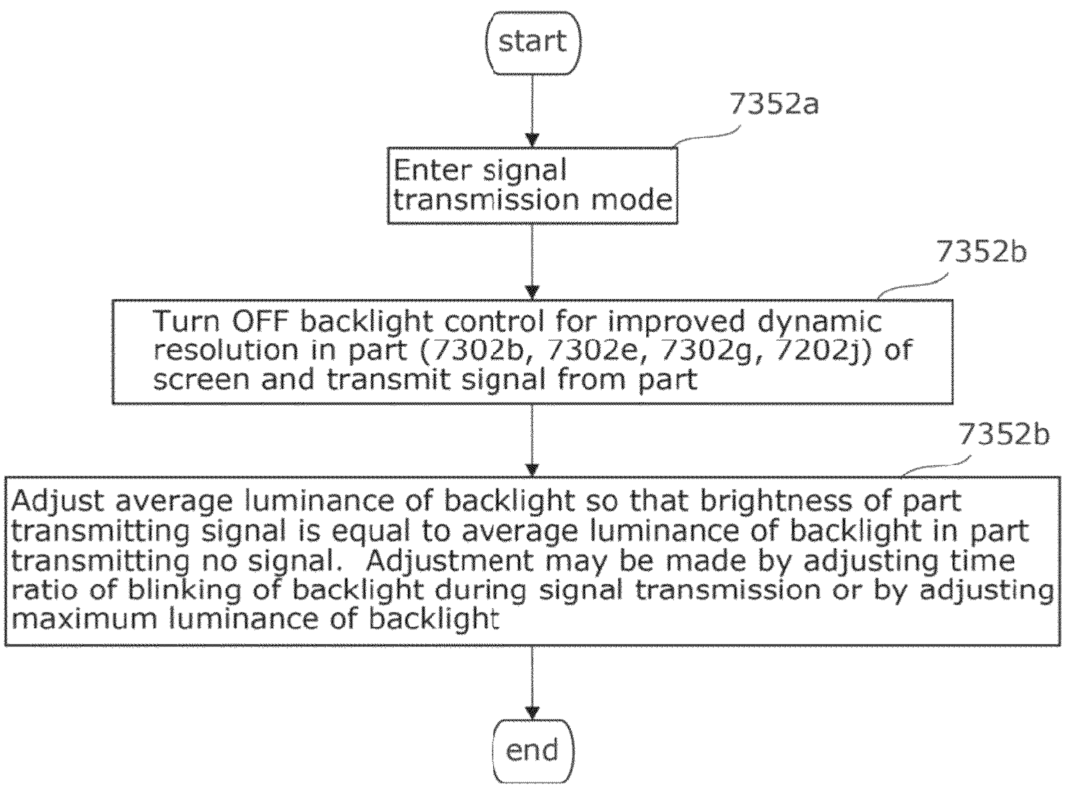

FIG. 317 is a diagram illustrating yet another example of processing operation of a display device in a variation of each embodiment.

Figure 318:
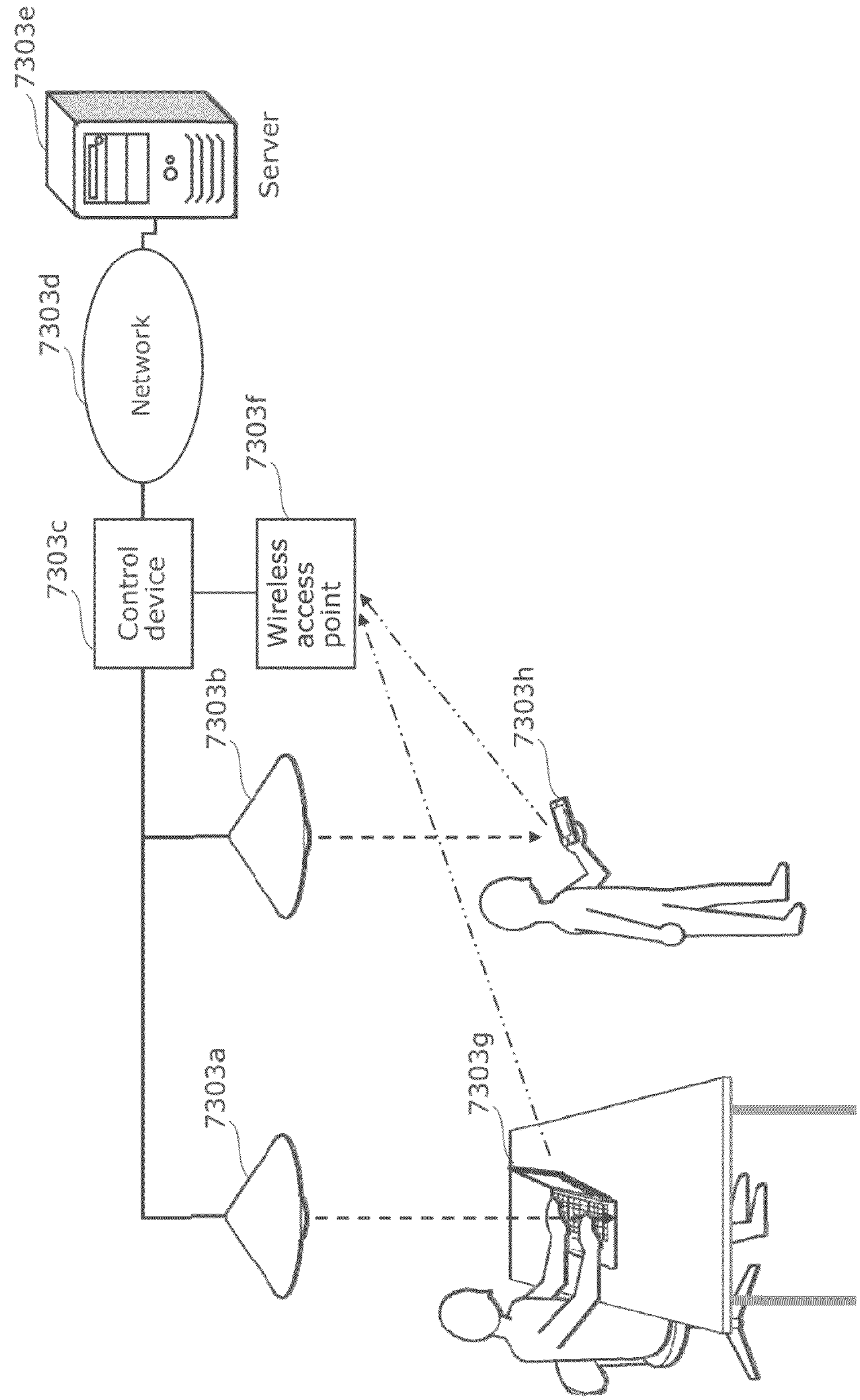

FIG. 318 is a diagram illustrating a structure of a communication system including a transmitter and a receiver in a variation of each embodiment.

Figure 319:
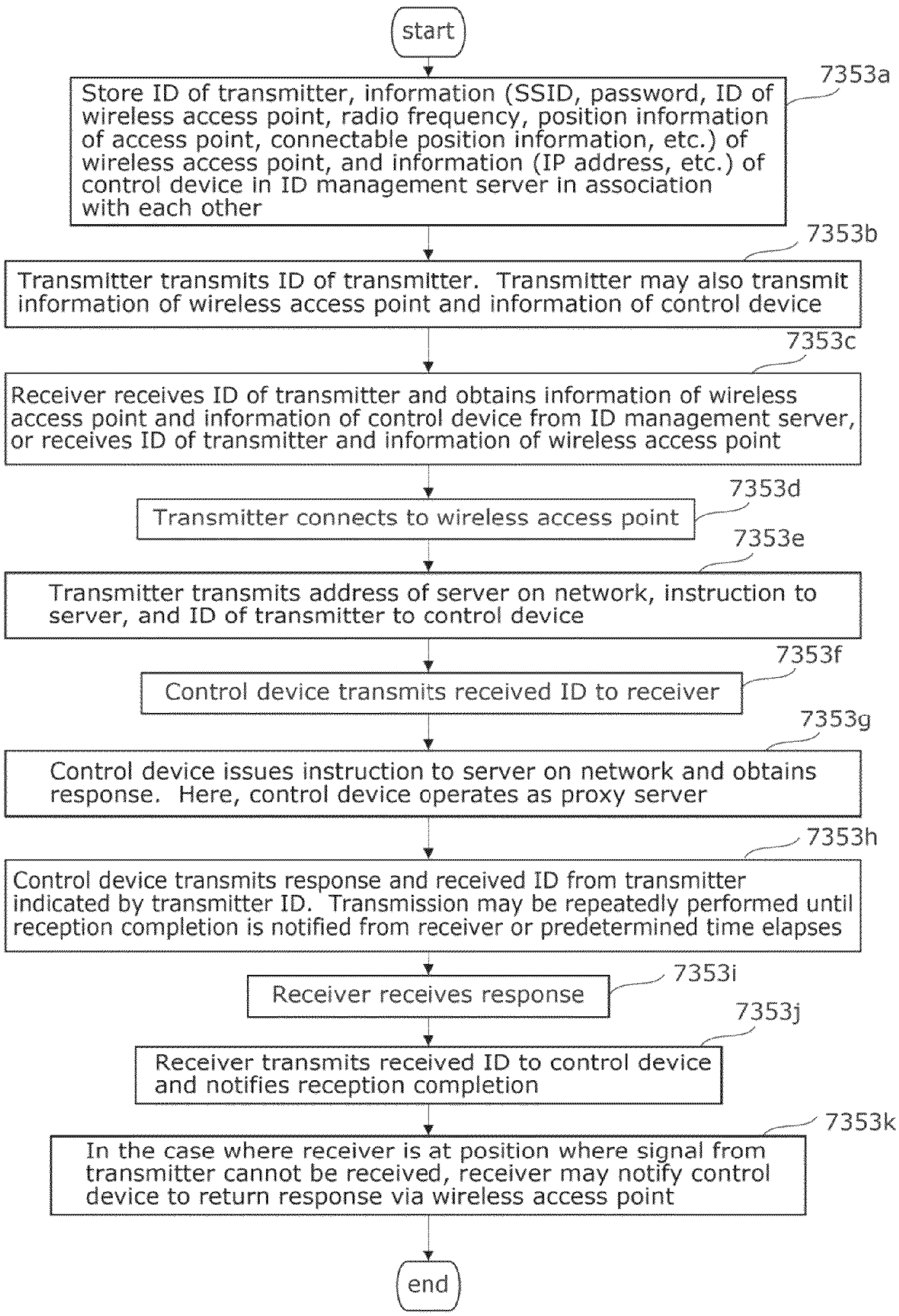

FIG. 319 is a flowchart illustrating processing operation of a communication system in a variation of each embodiment.

Figure 320:
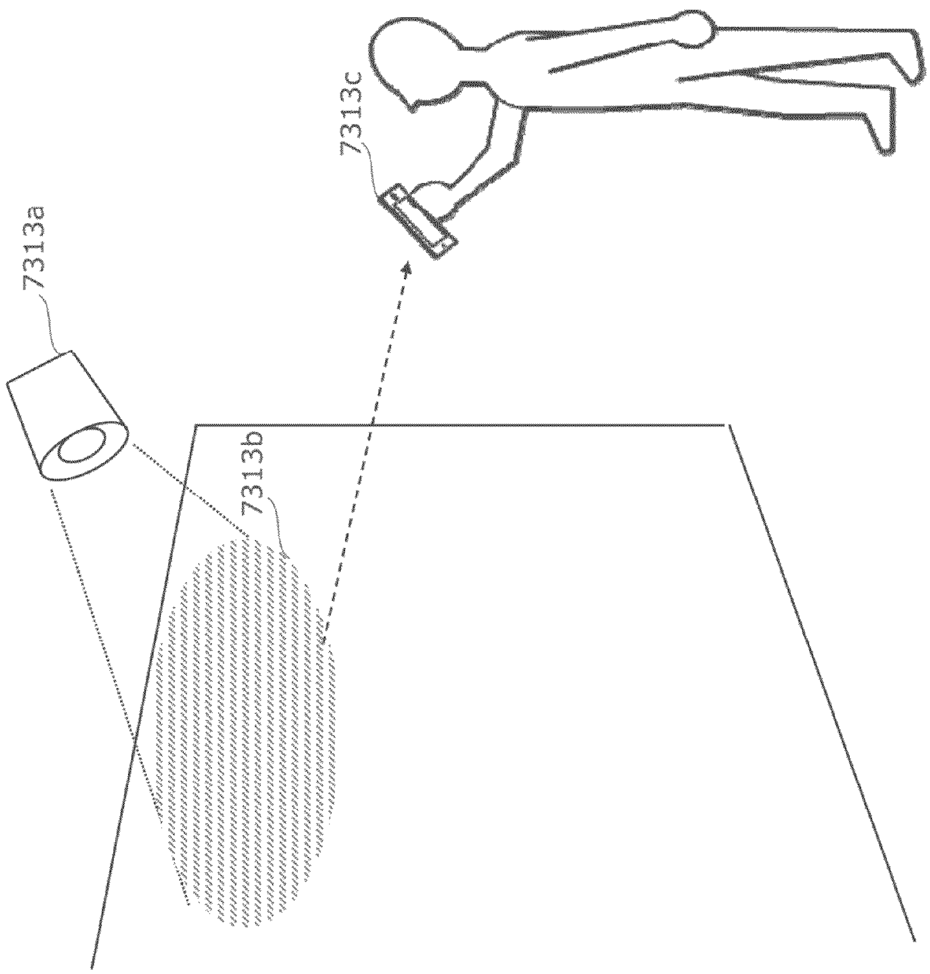

FIG. 320 is a diagram illustrating an example of signal transmission in a variation of each embodiment.

Figure 321:
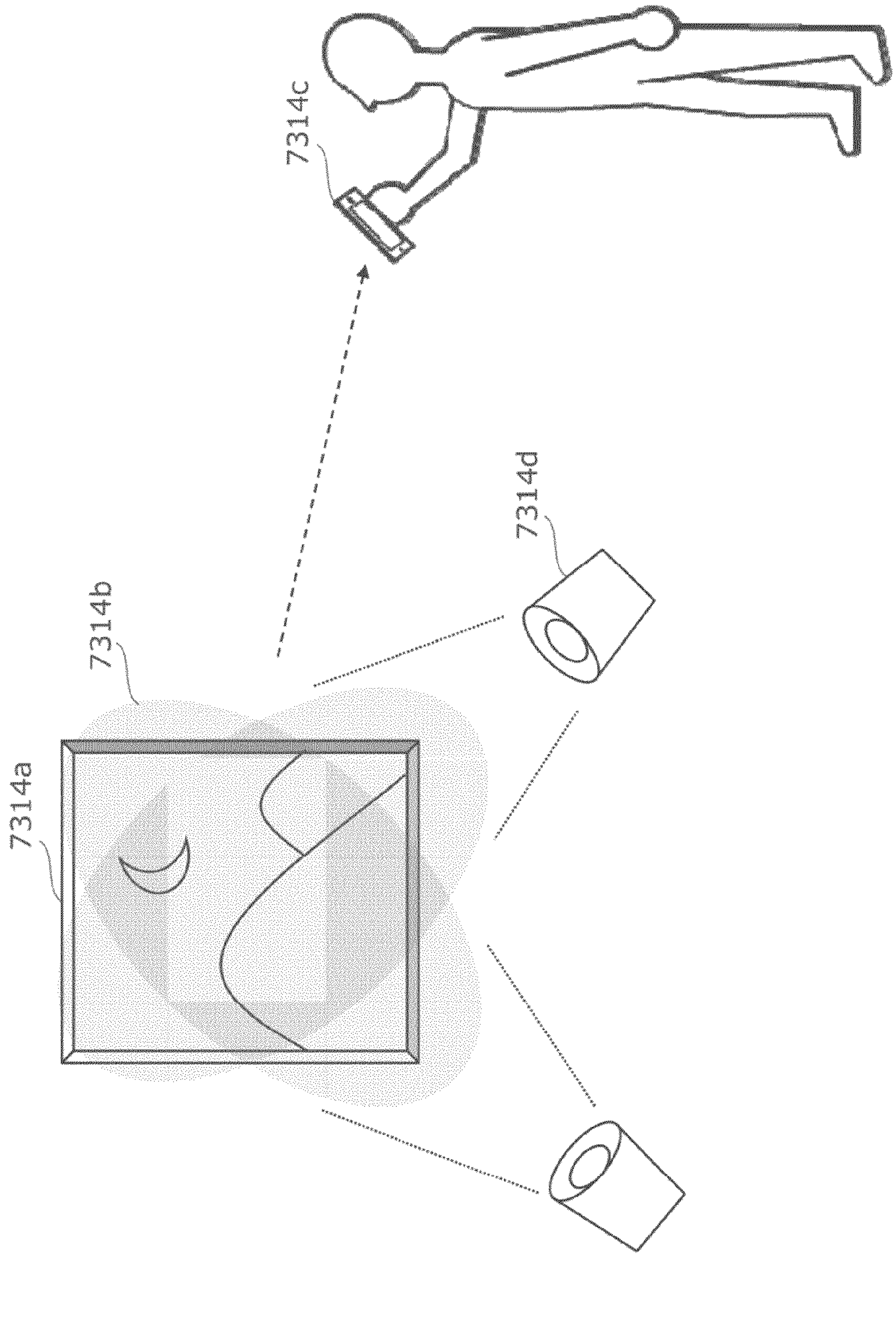

FIG. 321 is a diagram illustrating an example of signal transmission in a variation of each embodiment.

Figure 322:
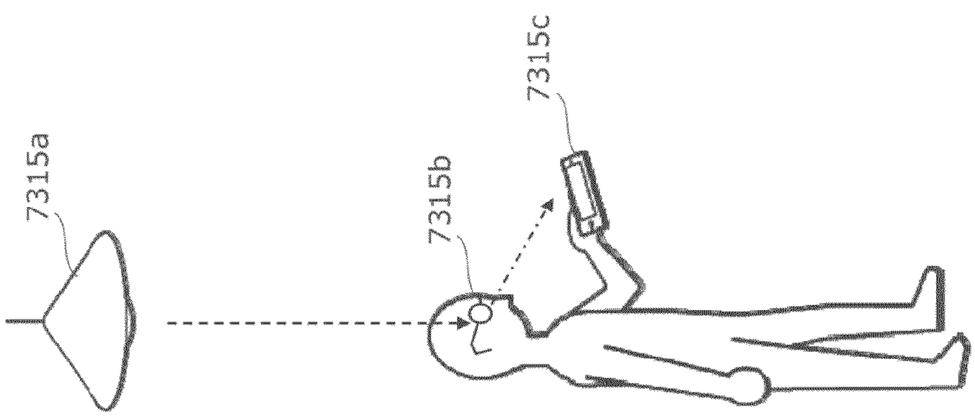

FIG. 322 is a diagram illustrating an example of signal transmission in a variation of each embodiment.

Figure 323A:
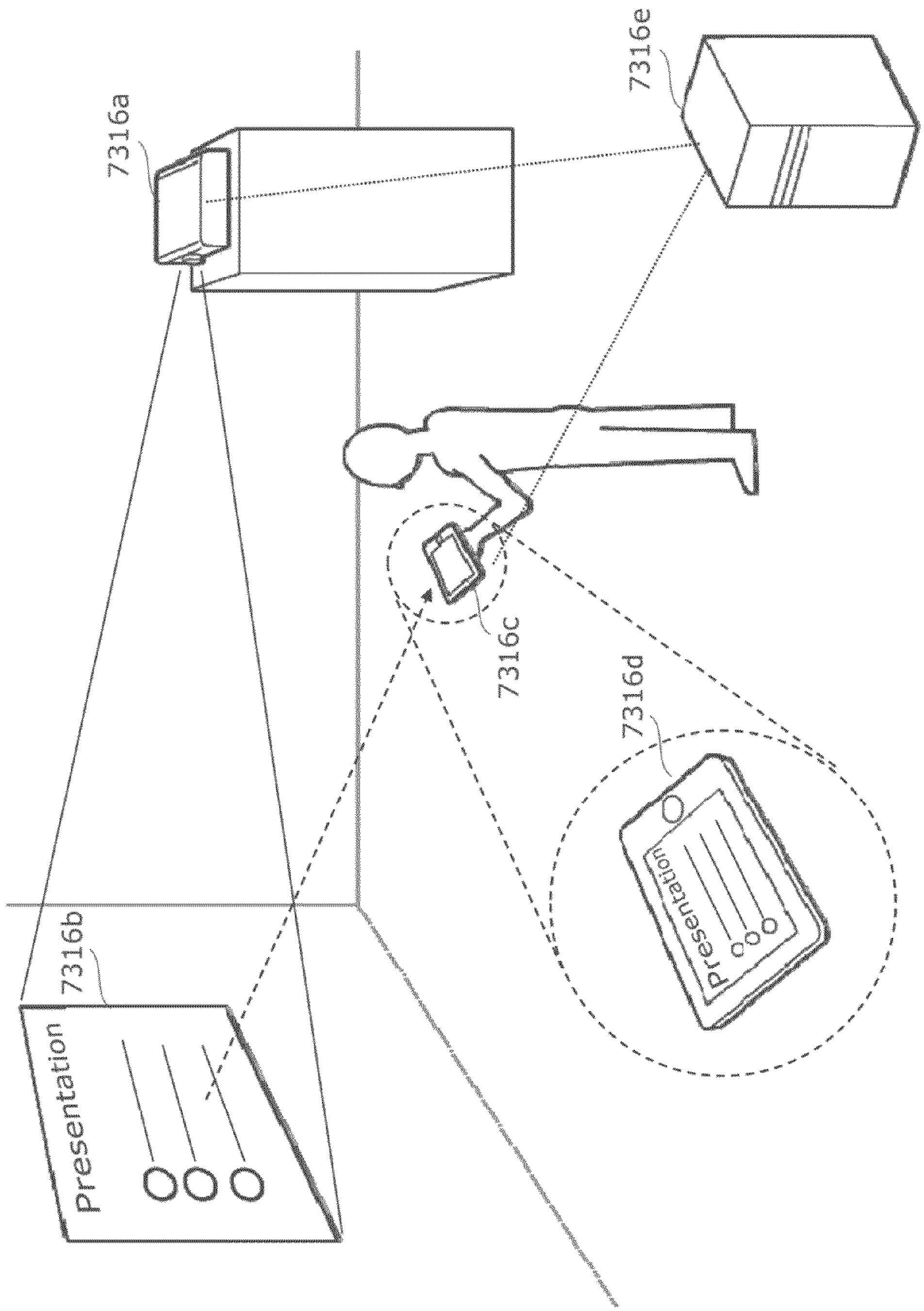

FIG. 323A is a diagram illustrating an example of signal transmission in a variation of each embodiment.

Figure 323B:
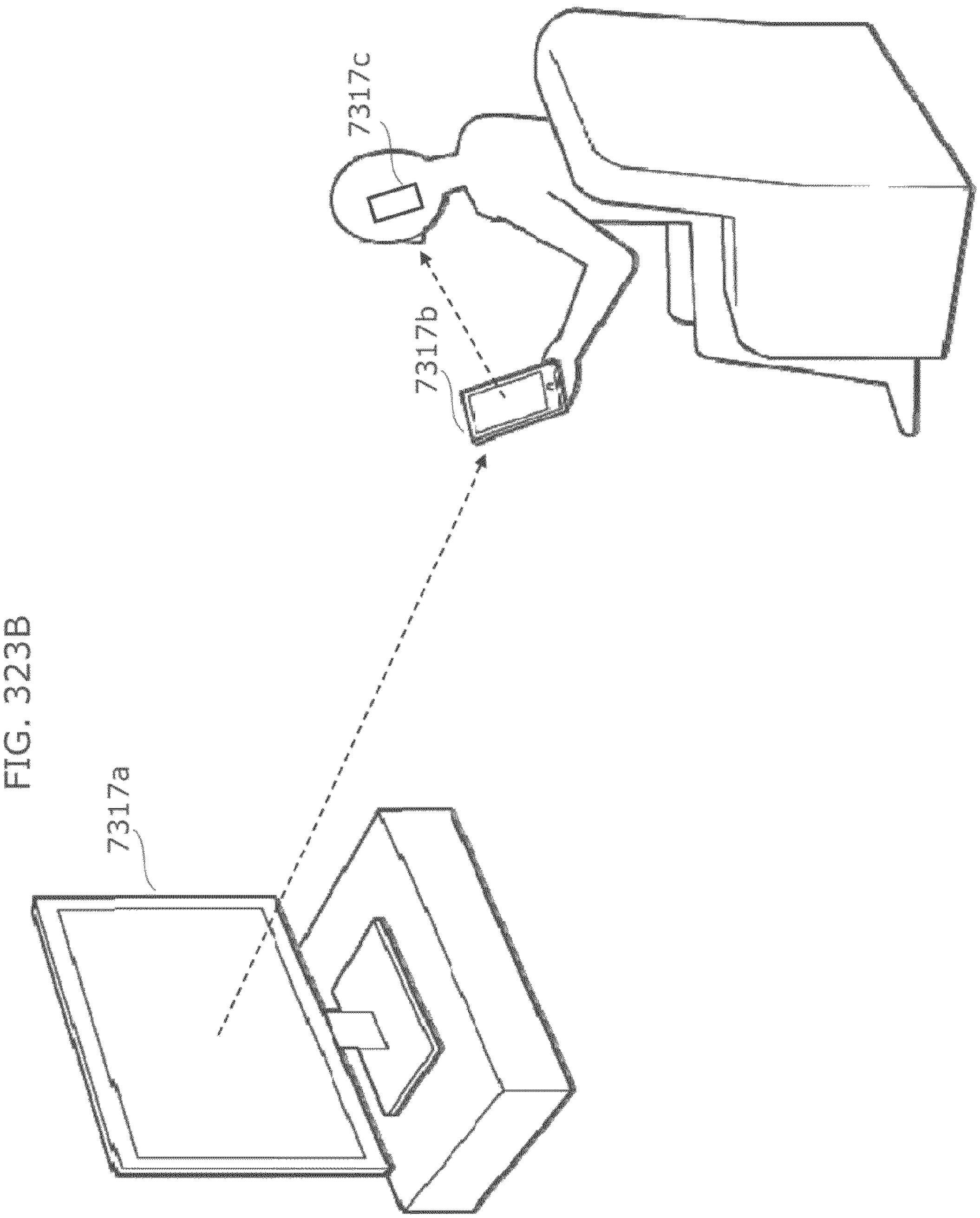

FIG. 323B is a diagram illustrating an example of signal transmission in a variation of each embodiment.

Figure 323C:
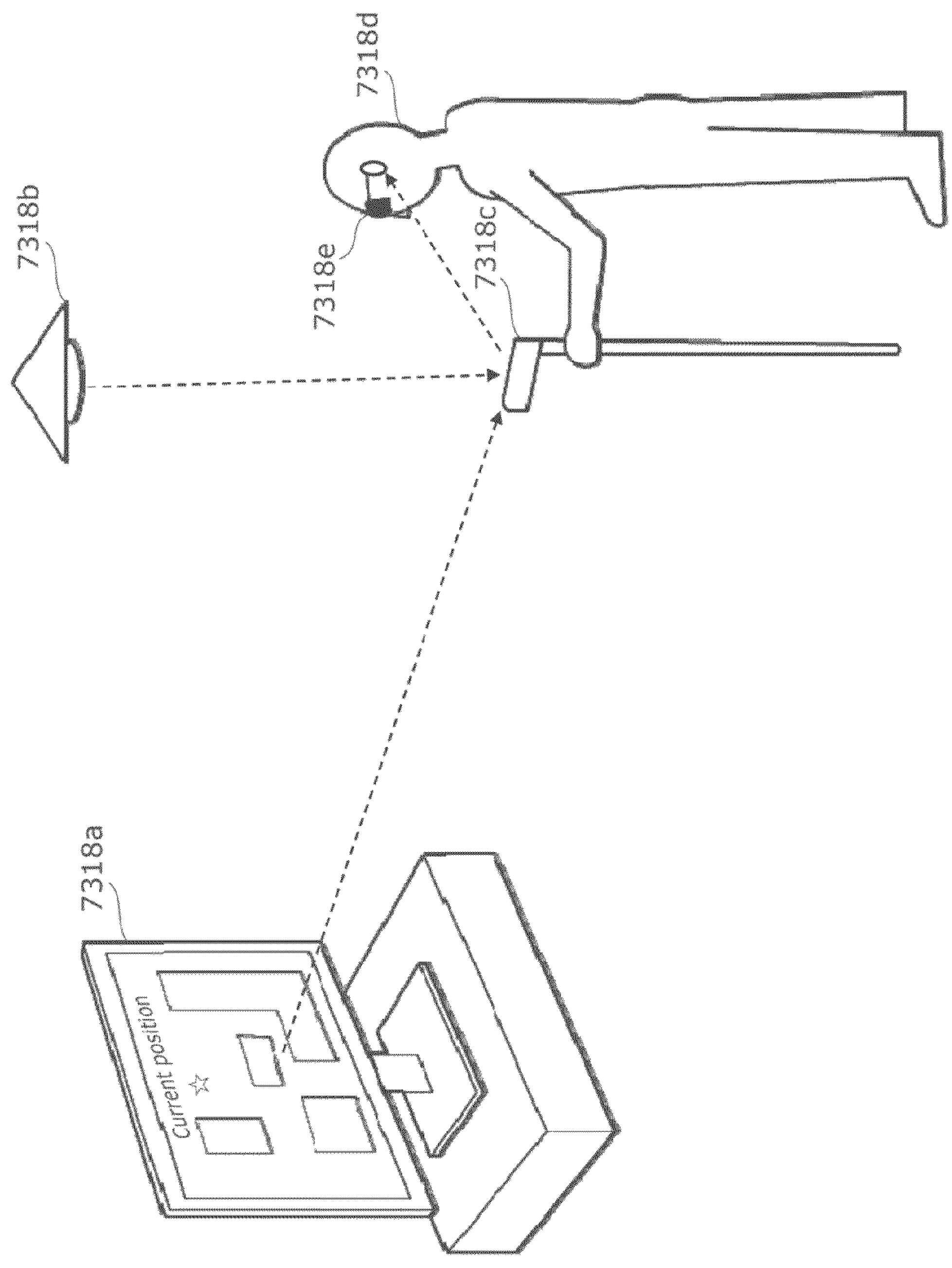

FIG. 323C is a diagram illustrating an example of signal transmission in a variation of each embodiment.

Figure 323D:
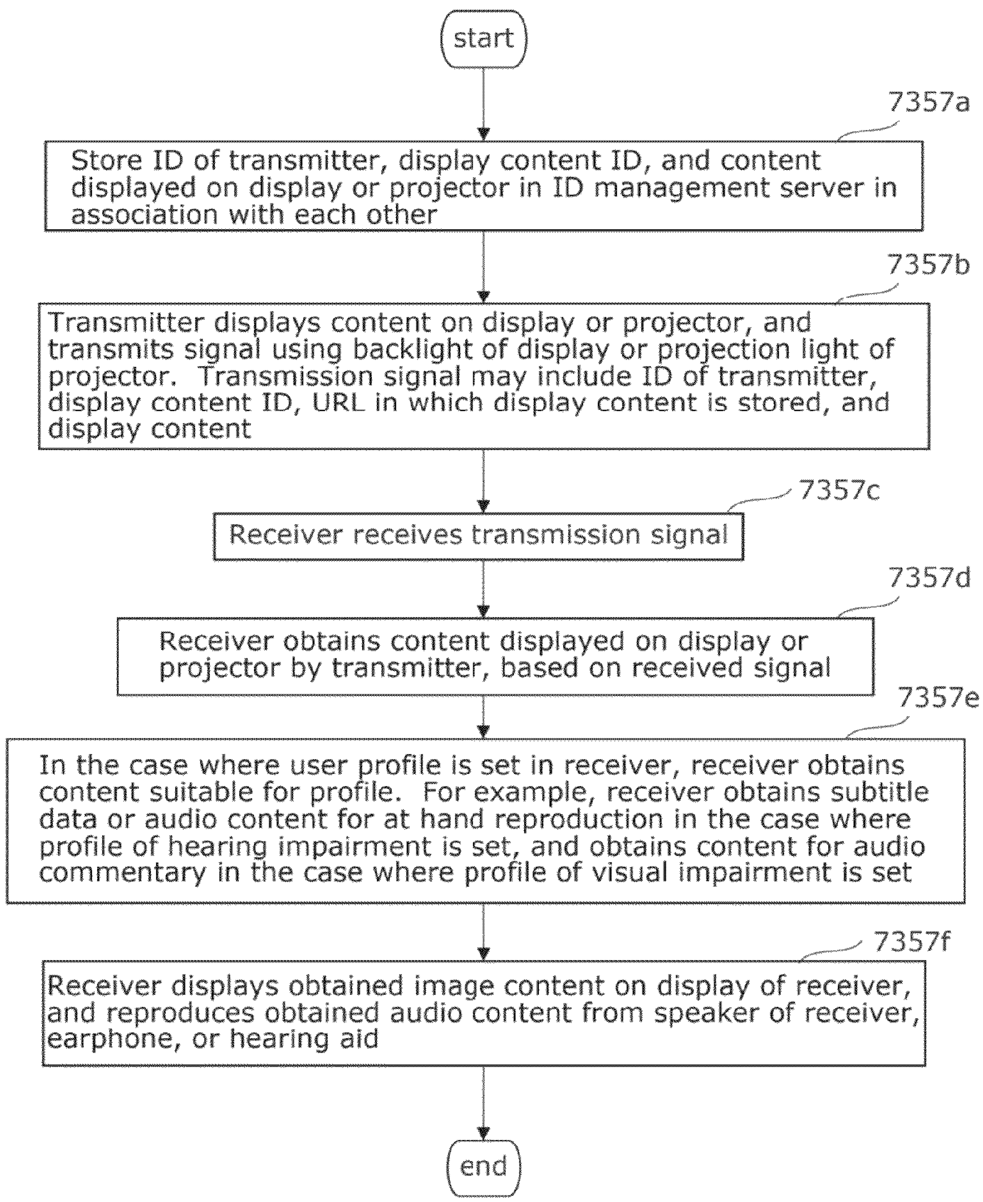

FIG. 323D is a flowchart illustrating processing operation of a communication system including a receiver and a display or a projector in a variation of each embodiment.

Figure 324:
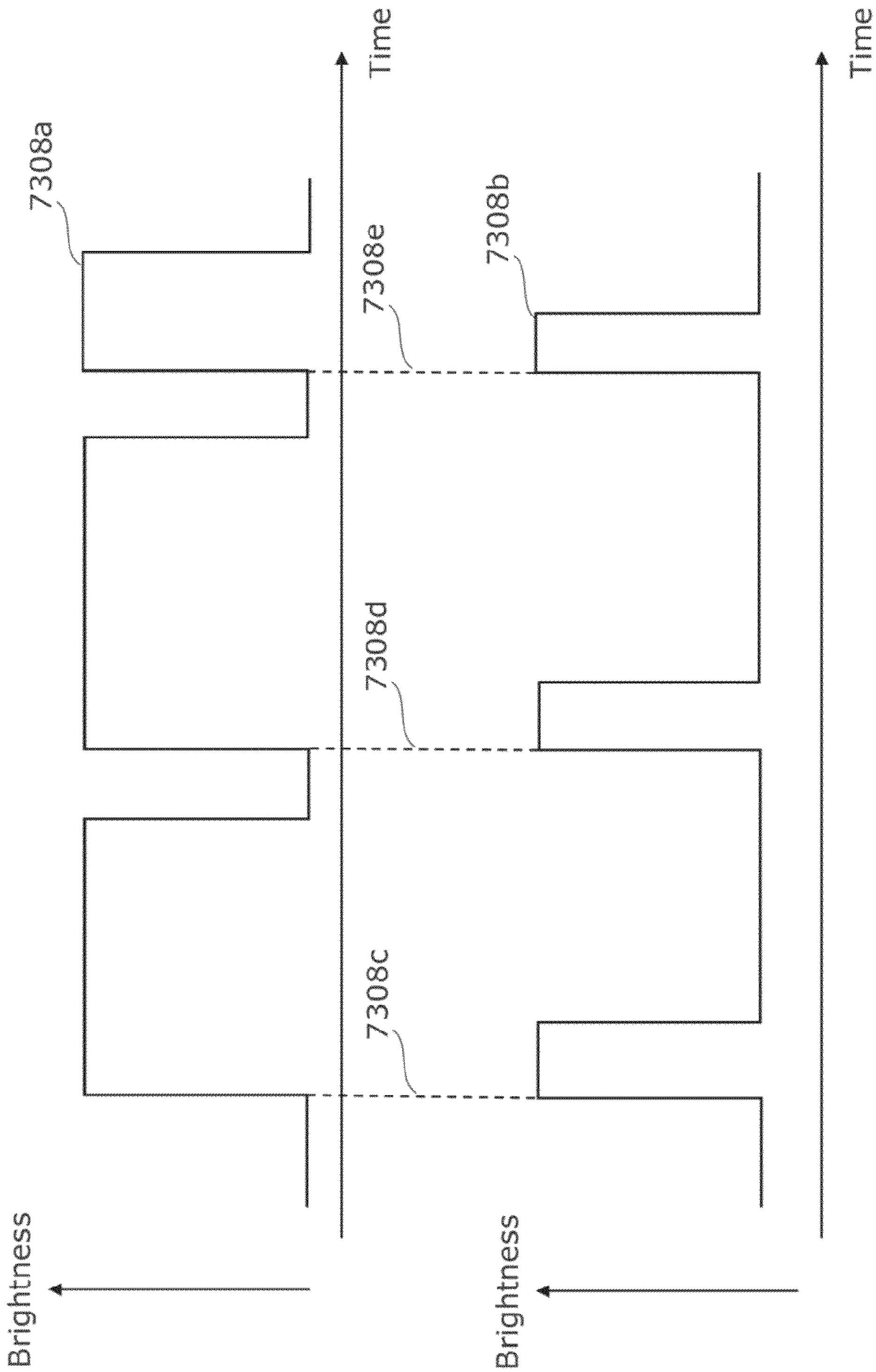

FIG. 324 is a diagram illustrating an example of a transmission signal in a variation of each embodiment.

Figure 325:

FIG. 325 is a diagram illustrating an example of a transmission signal in a variation of each embodiment.

Figure 326:
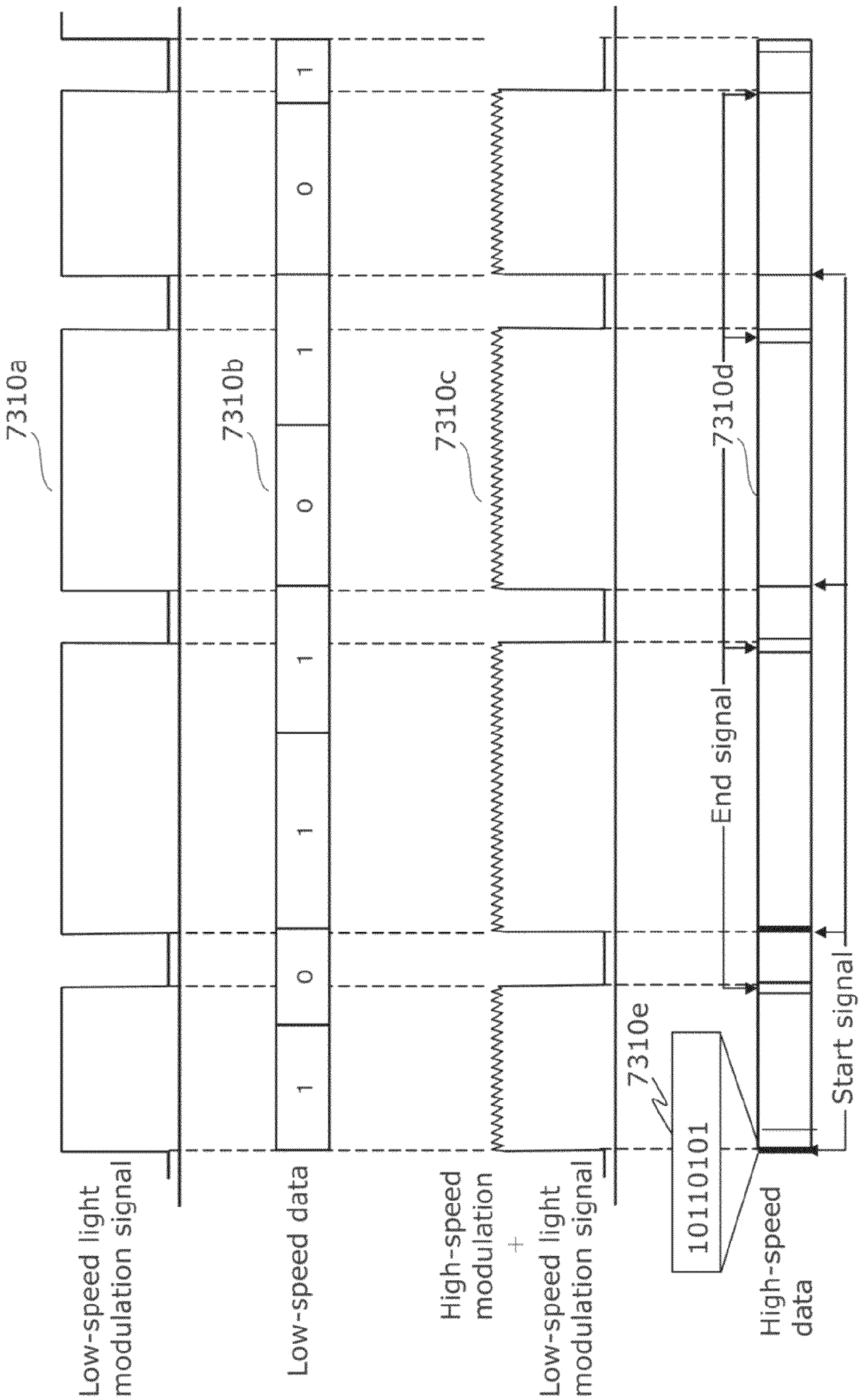

FIG. 326 is a diagram illustrating an example of a transmission signal in a variation of each embodiment.

Figure 327A:
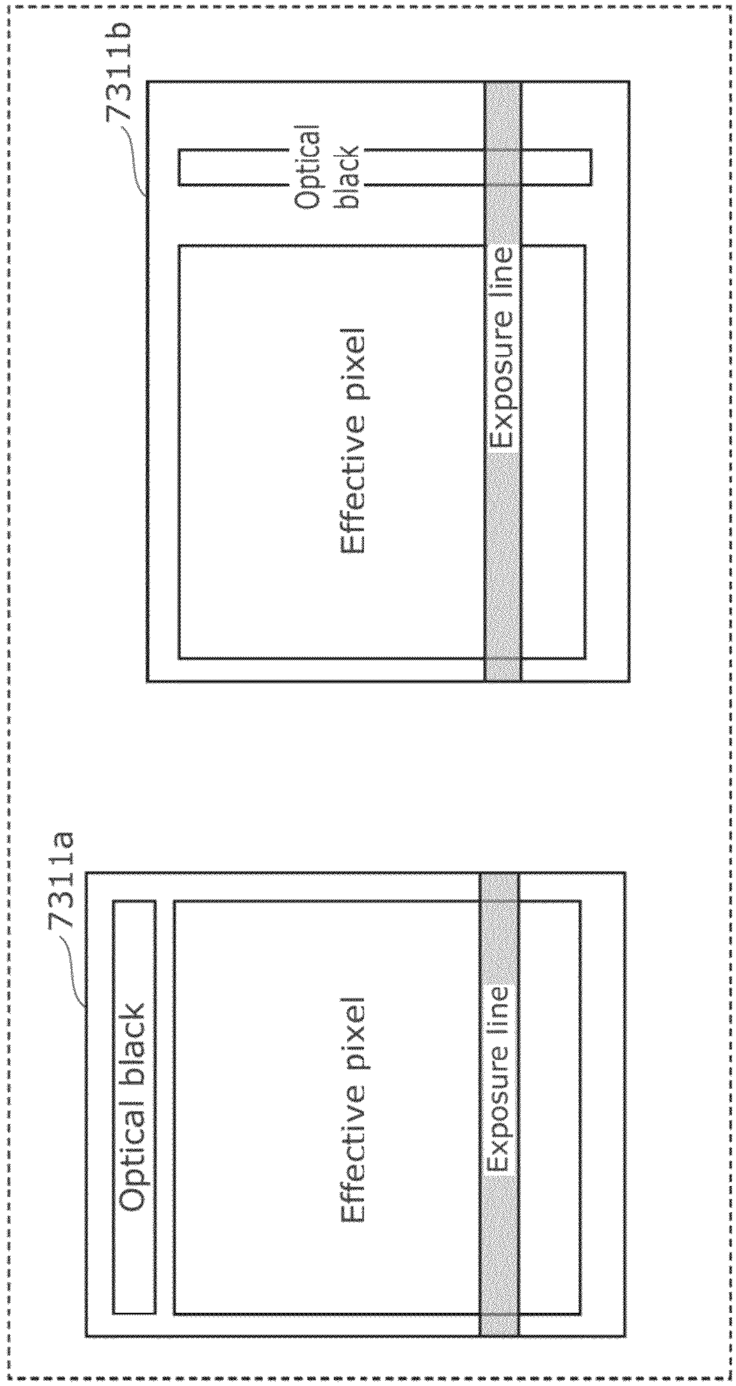

FIG. 327A is a diagram illustrating an example of an imaging element of a receiver in a variation of each embodiment.

Figure 327B:
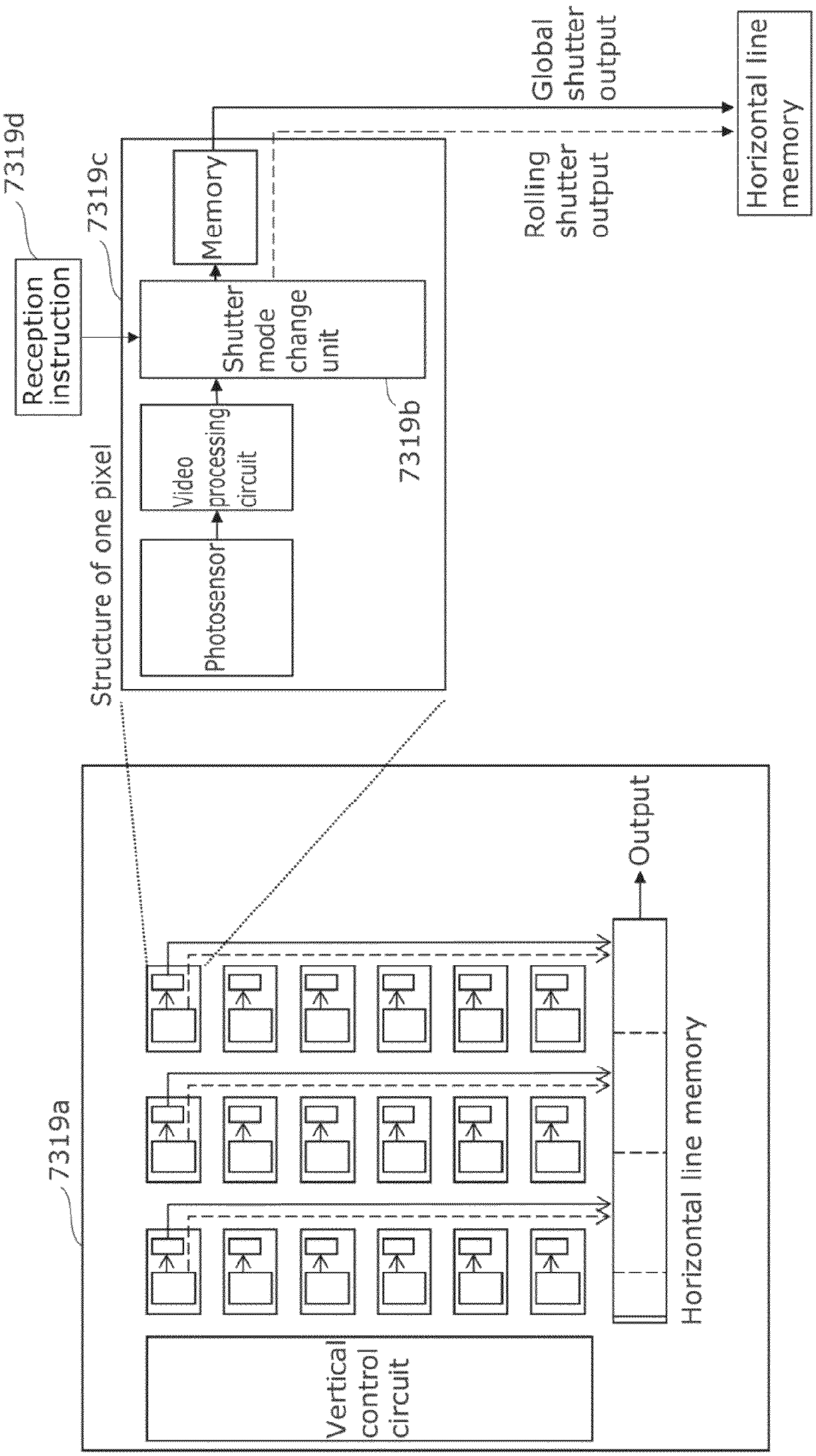

FIG. 327B is a diagram illustrating an example of a structure of an internal circuit of an imaging device of a receiver in a variation of each embodiment.

Figure 327C:
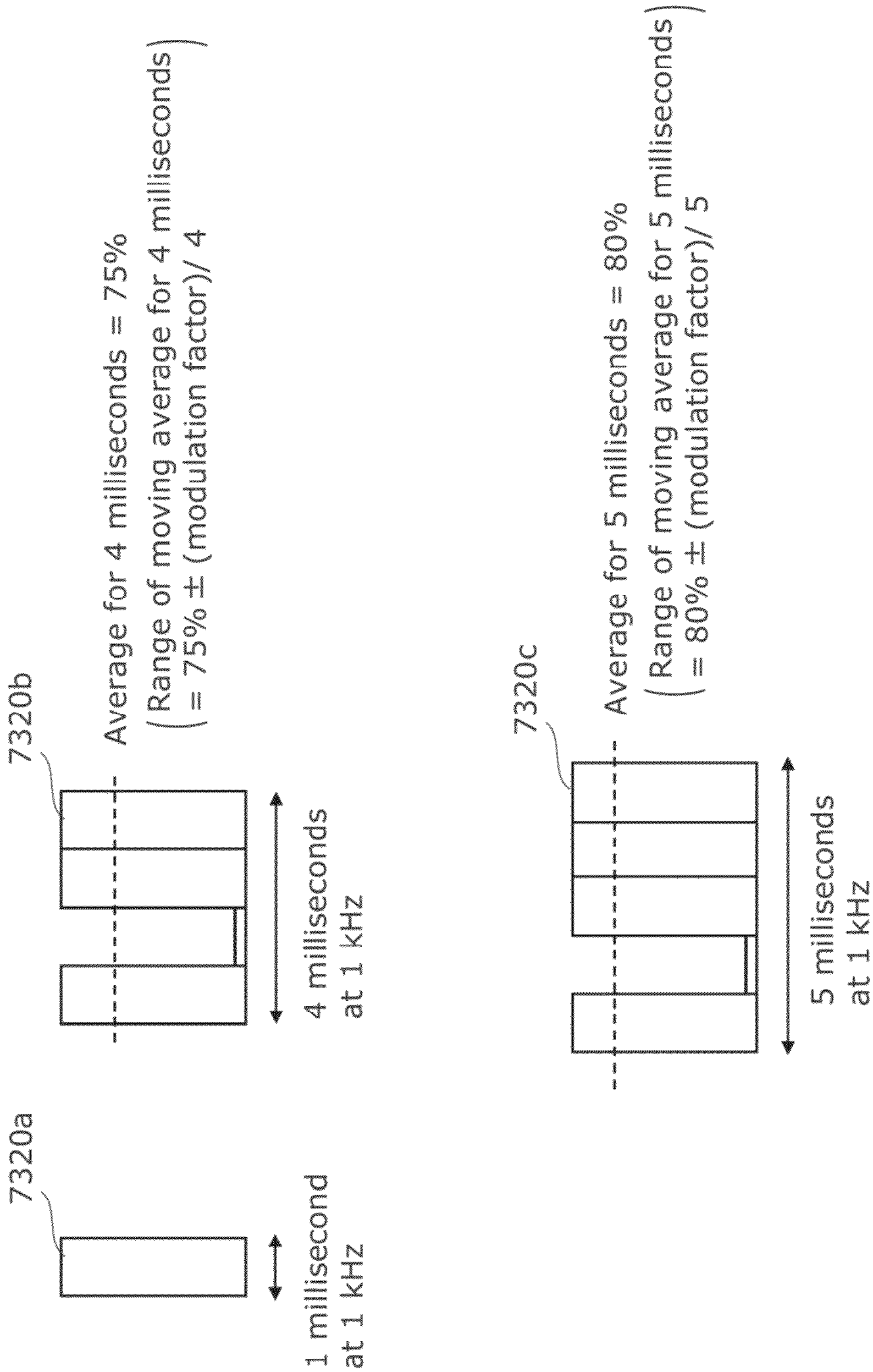

FIG. 327C is a diagram illustrating an example of a transmission signal in a variation of each embodiment.

Figure 327D:
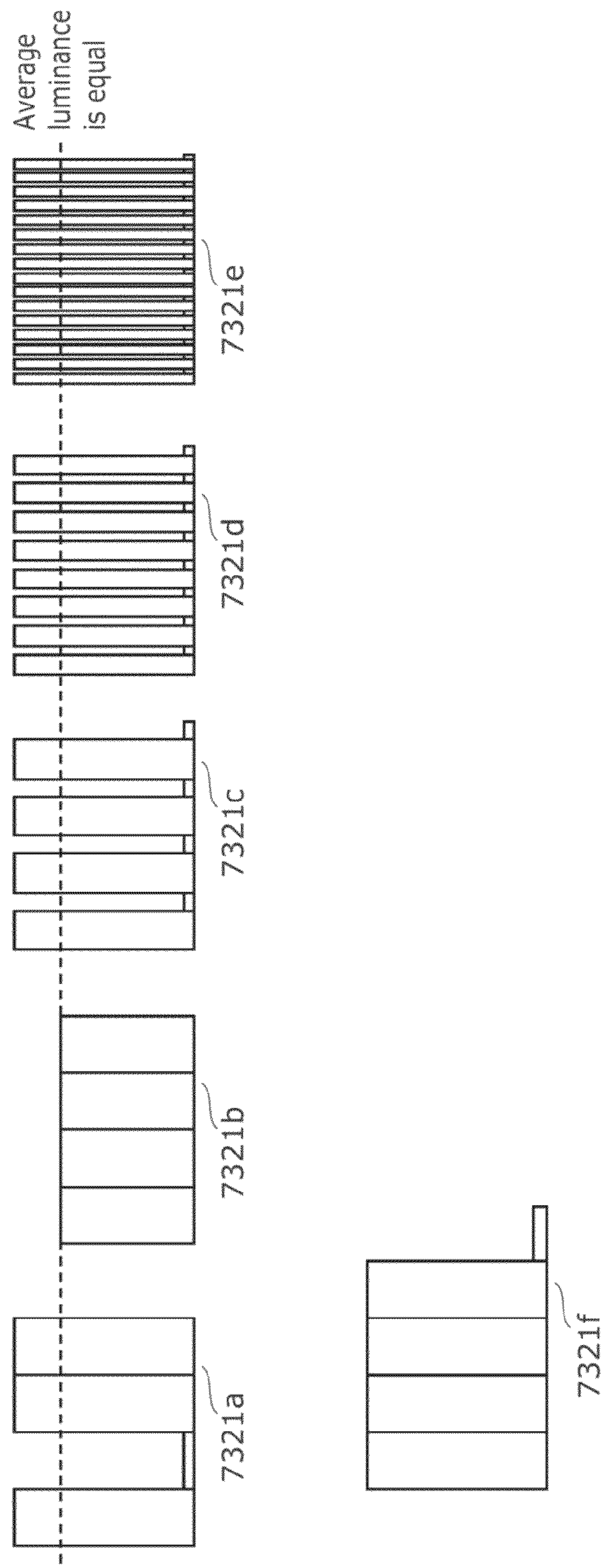

FIG. 327D is a diagram illustrating an example of a transmission signal in a variation of each embodiment.

Figure 328A:
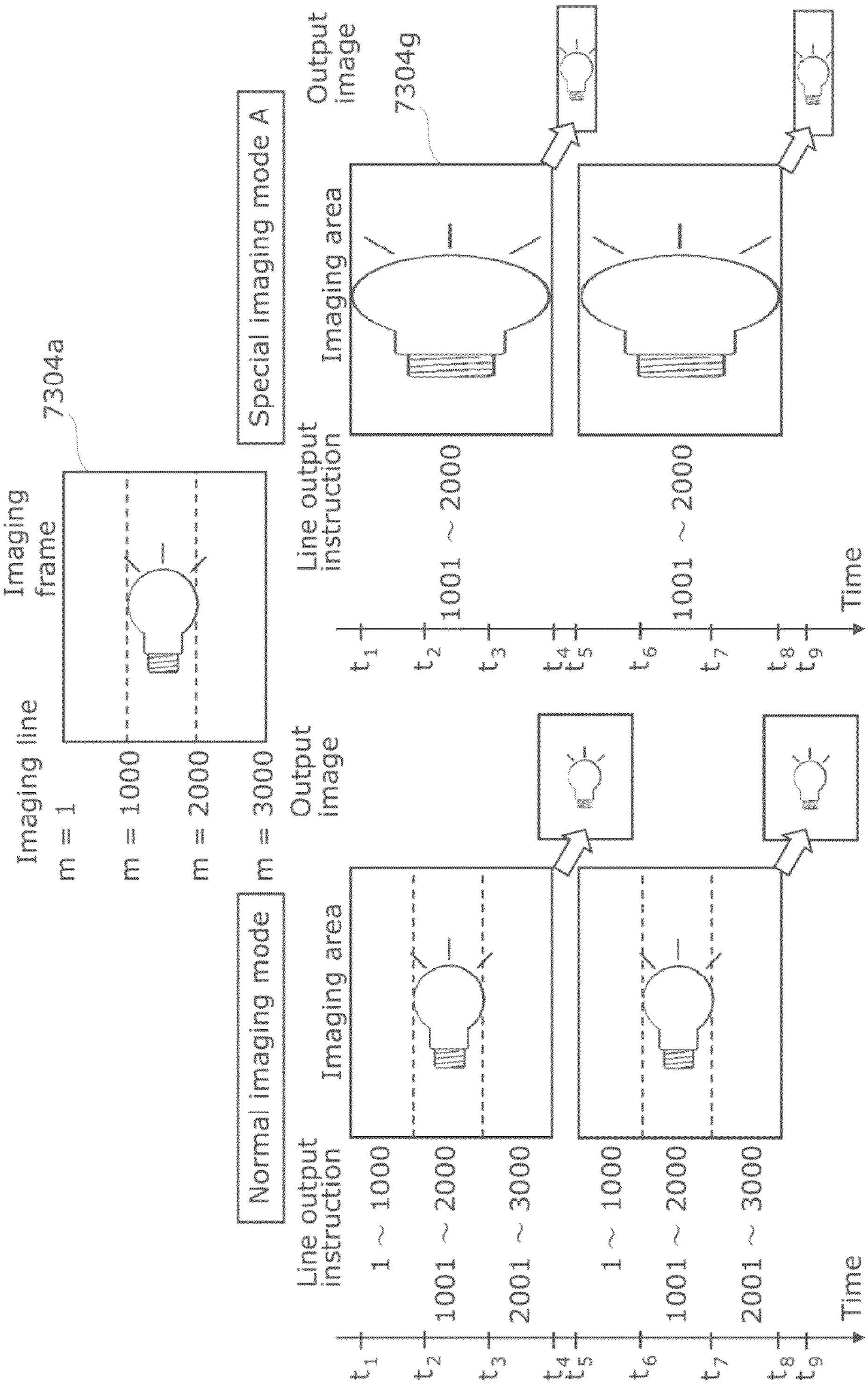

FIG. 328A is a diagram for describing an imaging mode of a receiver in a variation of each embodiment.

Figure 328B:
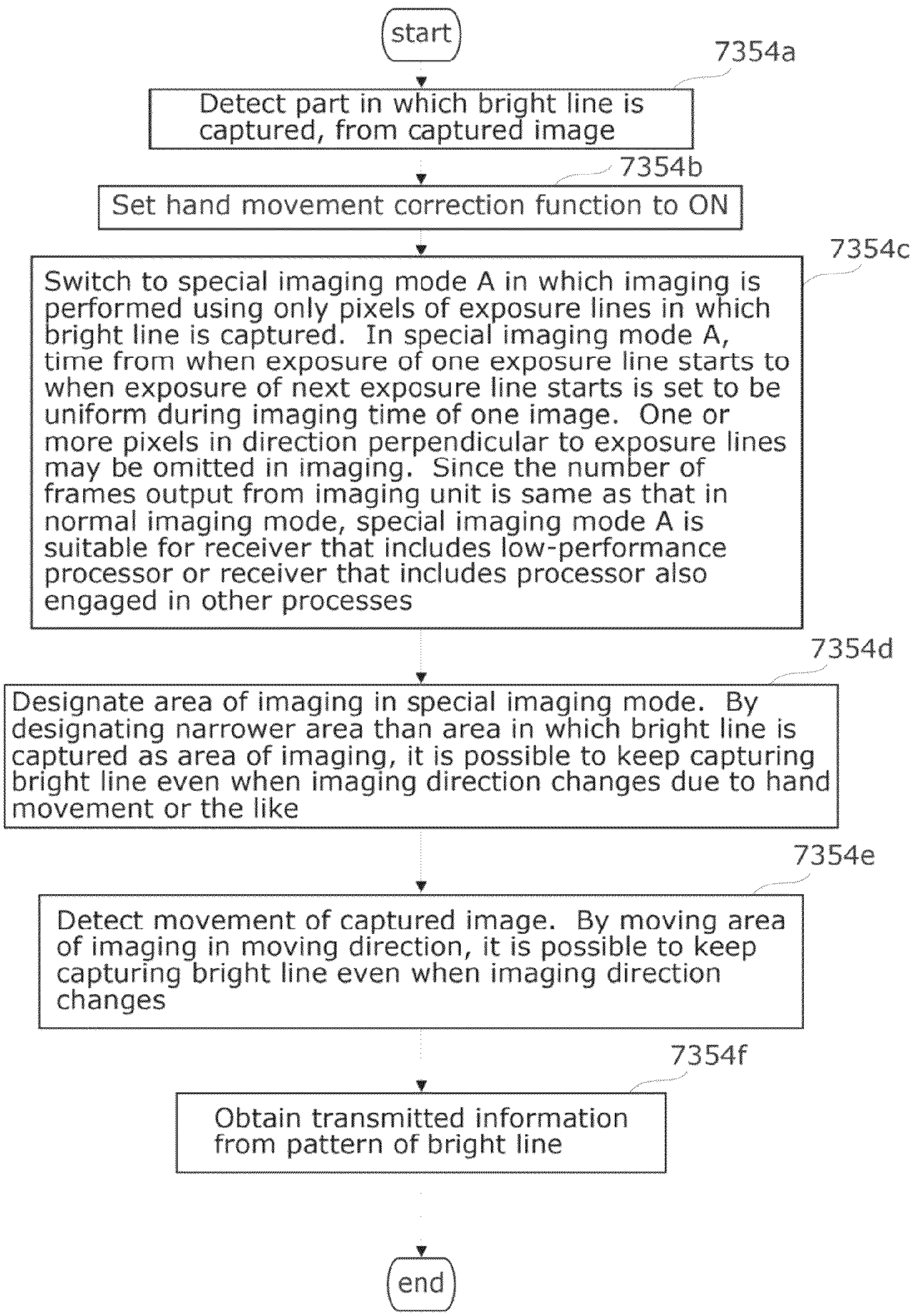

FIG. 328B is a flowchart illustrating processing operation of a receiver using a special imaging mode A in a variation of each embodiment.

Figure 329A:
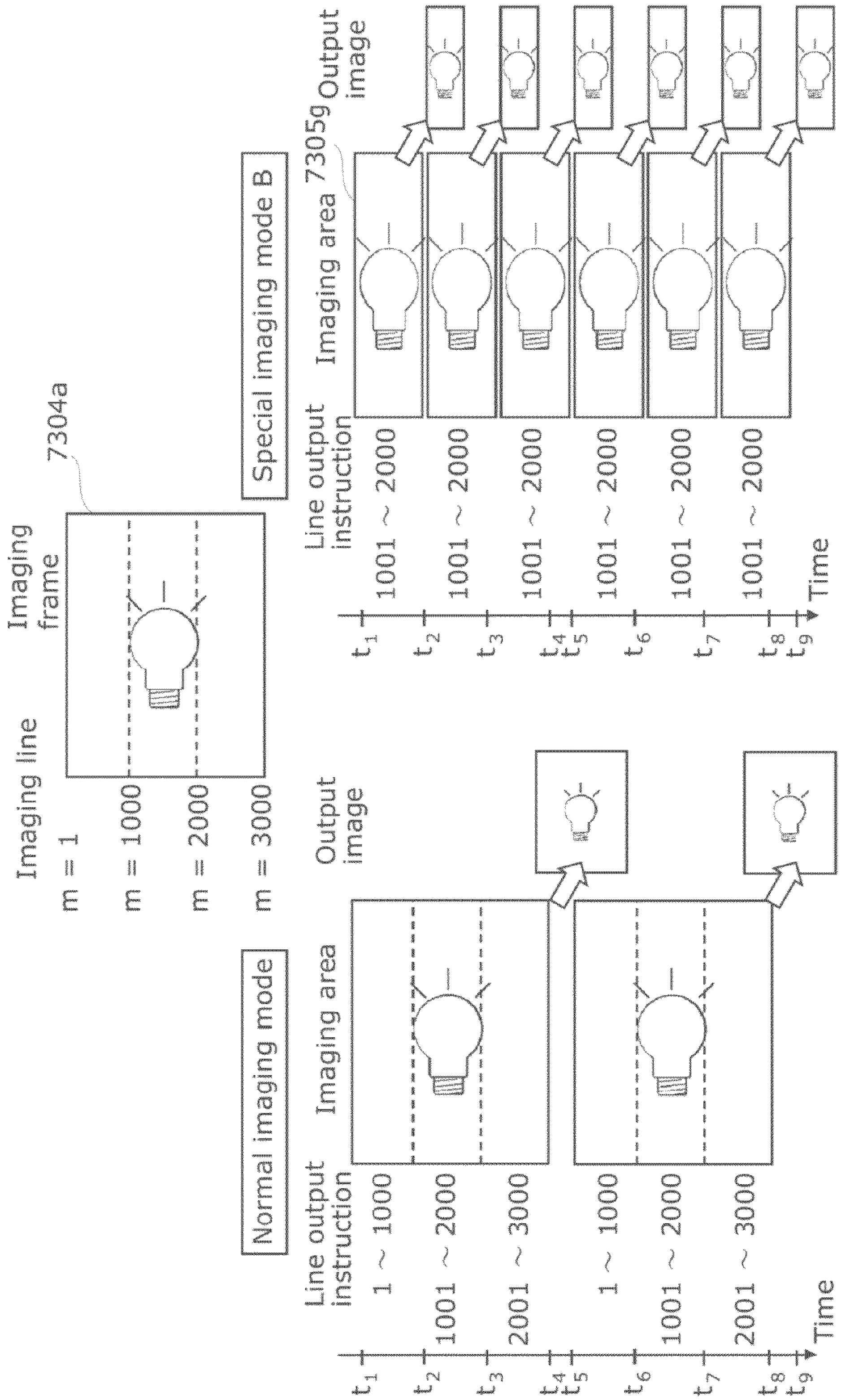

FIG. 329A is a diagram for describing another imaging mode of a receiver in a variation of each embodiment.

Figure 329B:
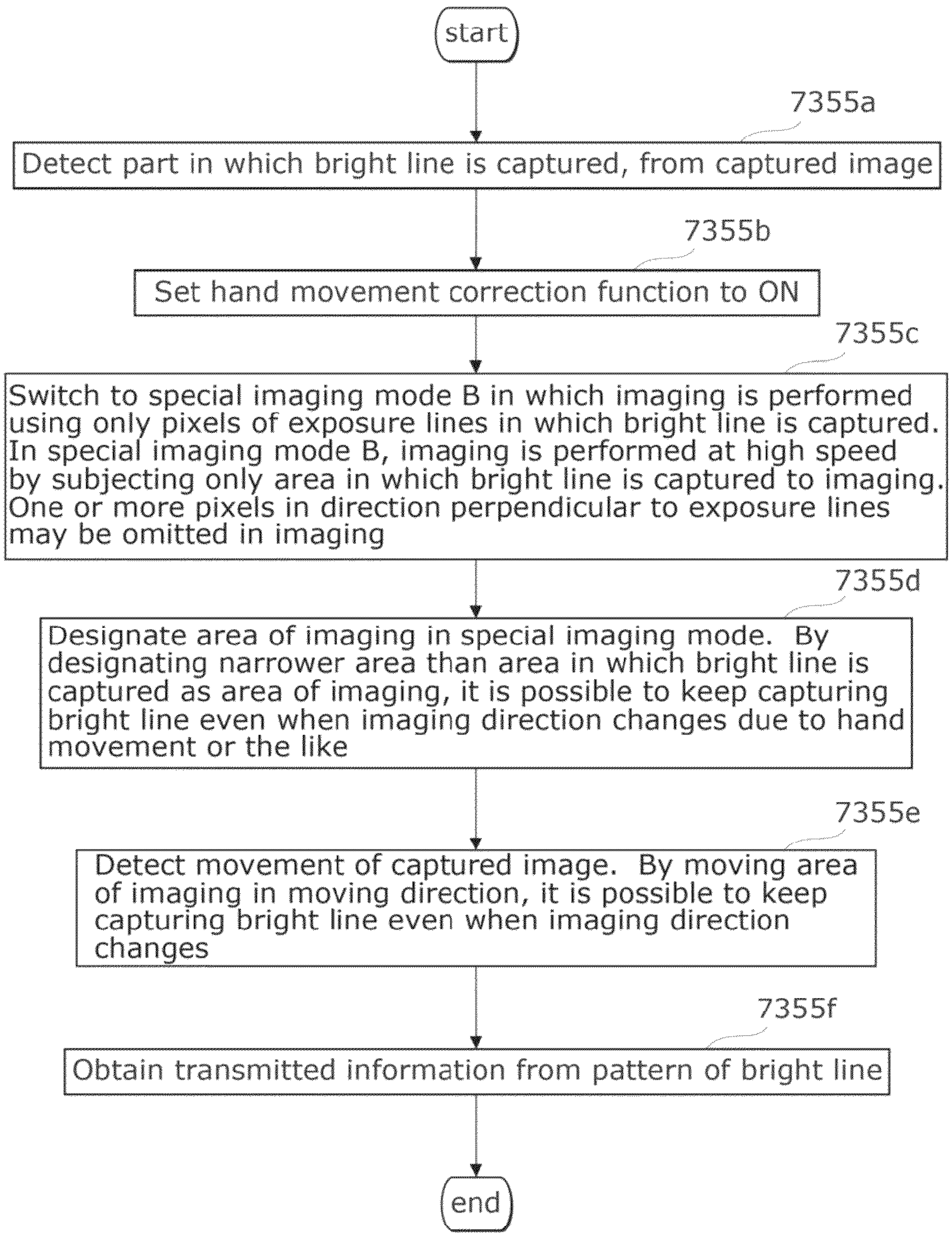

FIG. 329B is a flowchart illustrating processing operation of a receiver using a special imaging mode B in a variation of each embodiment.

Figure 330A:
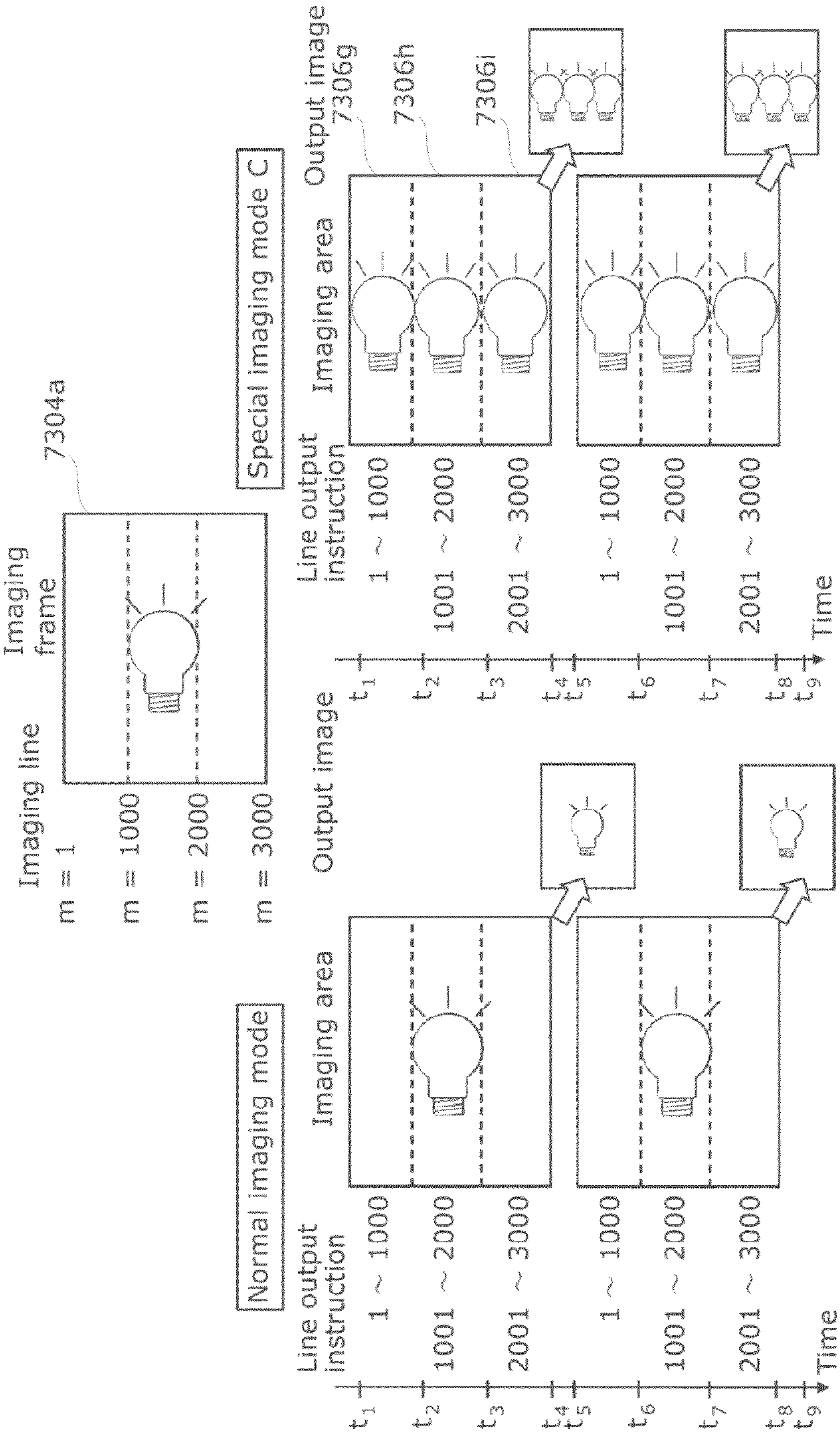

FIG. 330A is a diagram for describing yet another imaging mode of a receiver in a variation of each embodiment.

Figure 330B:
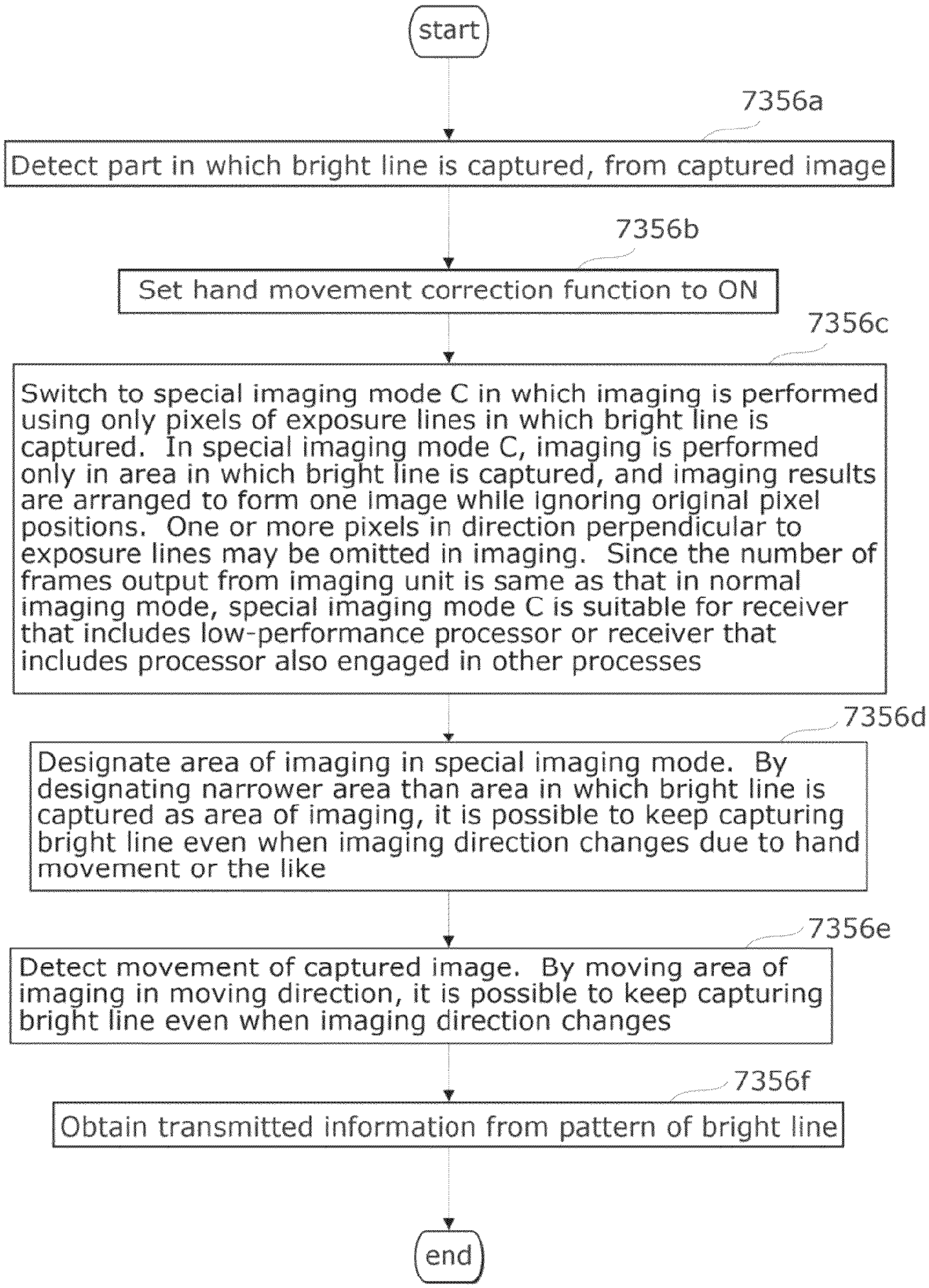

FIG. 330B is a flowchart illustrating processing operation of a receiver using a special imaging mode C in a variation of each embodiment.

Figure 331A:
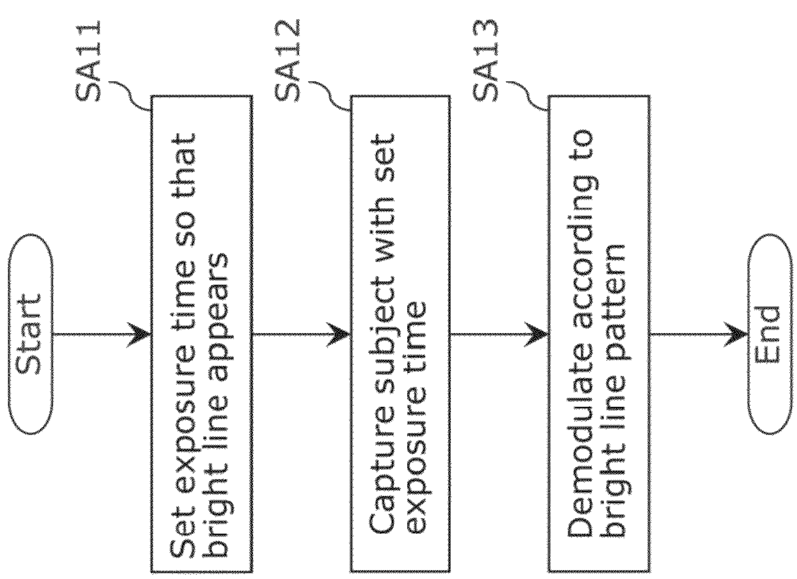

FIG. 331A is a flowchart of an information communication method according to an aspect of the present disclosure.

Figure 331B:
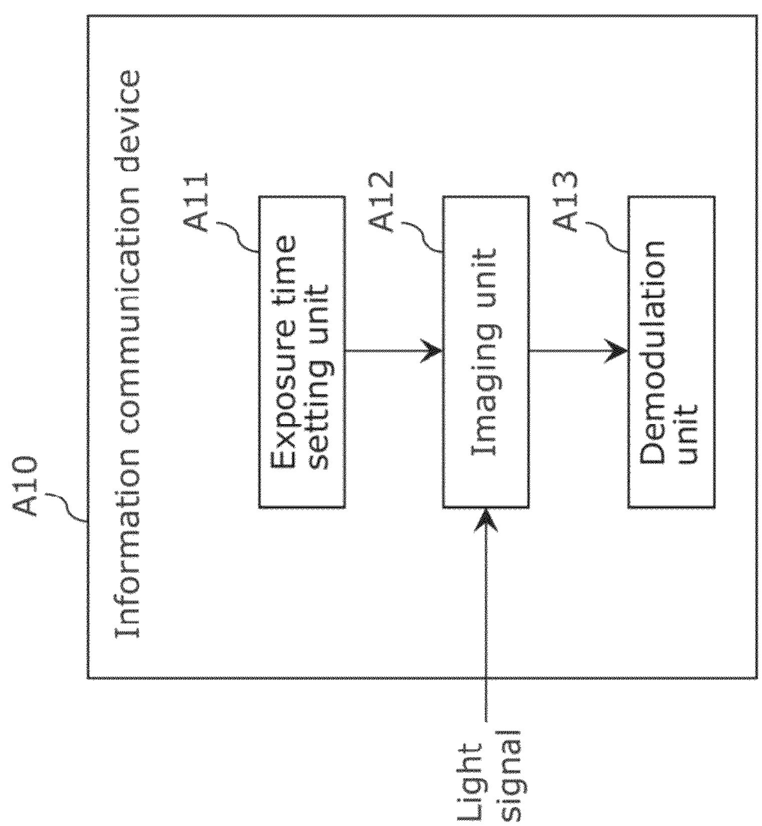

FIG. 331B is a block diagram of an information communication device according to an aspect of the present disclosure.

Figure 331C:
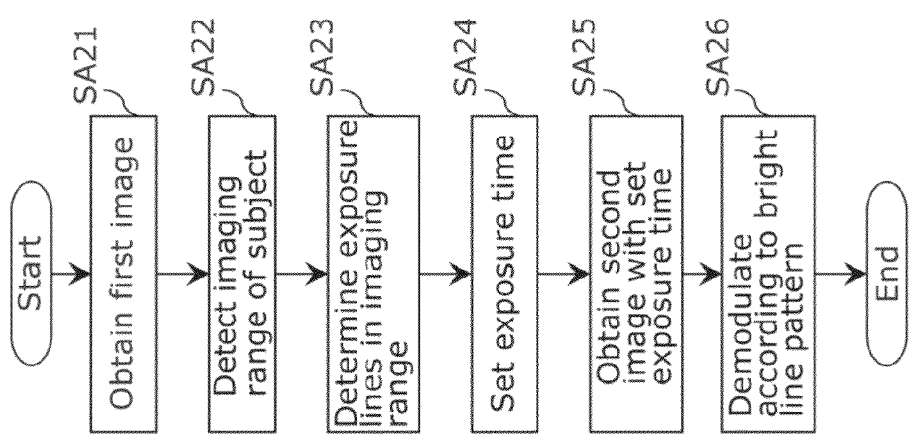

FIG. 331C is a flowchart of an information communication method according to an aspect of the present disclosure.

Figure 331D:
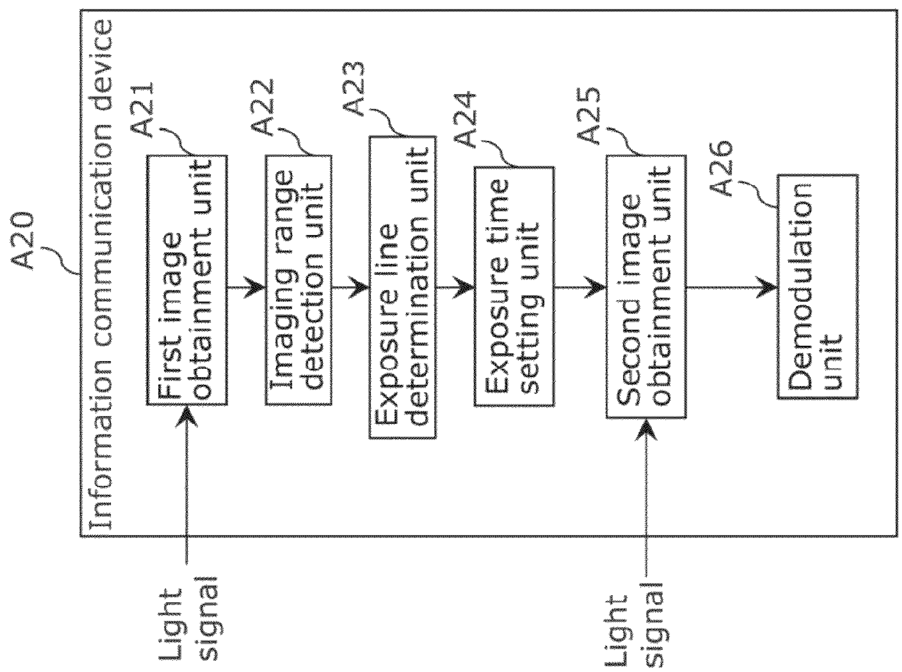

FIG. 331D is a block diagram of an information communication device according to an aspect of the present disclosure.

Figure 332:
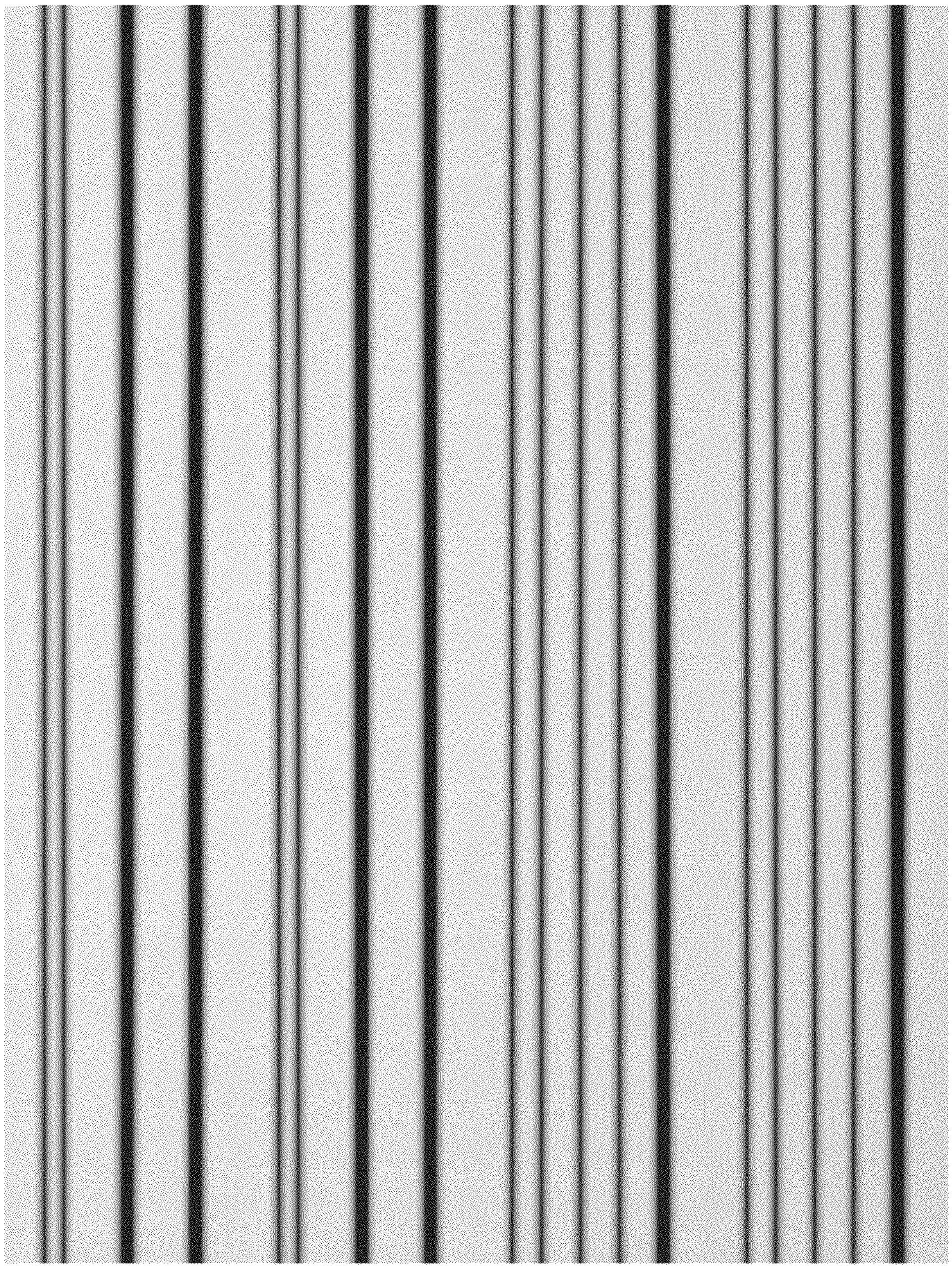

FIG. 332 is a diagram illustrating an example of an image obtained by an information communication method according to an aspect of the present disclosure.

Figure 333A:
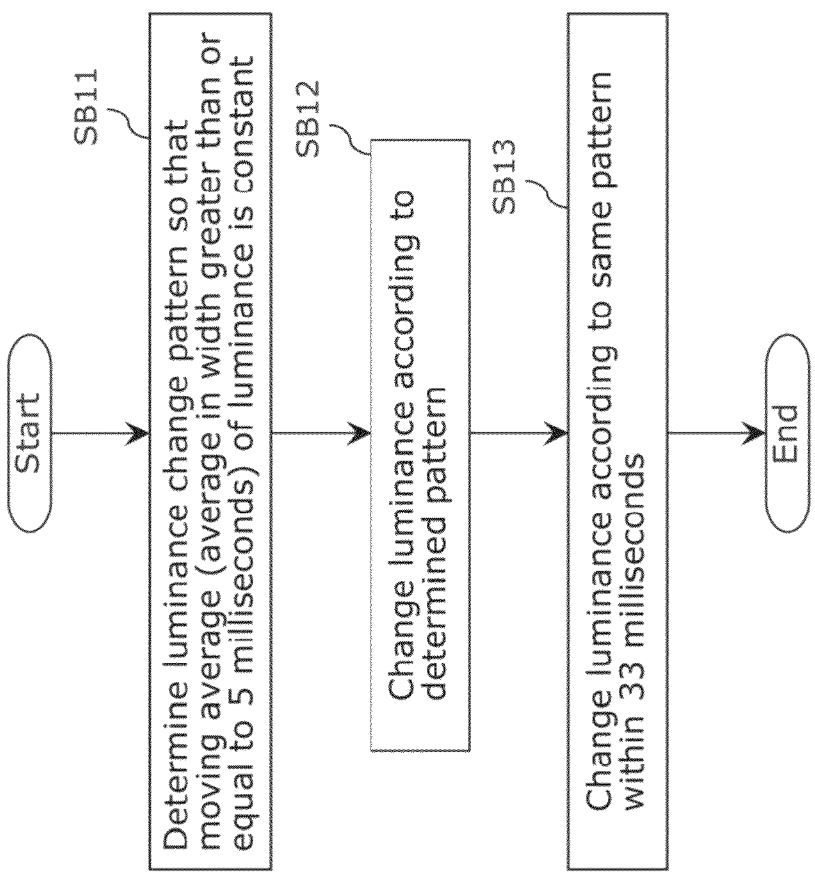

FIG. 333A is a flowchart of an information communication method according to another aspect of the present disclosure.

Figure 333B:
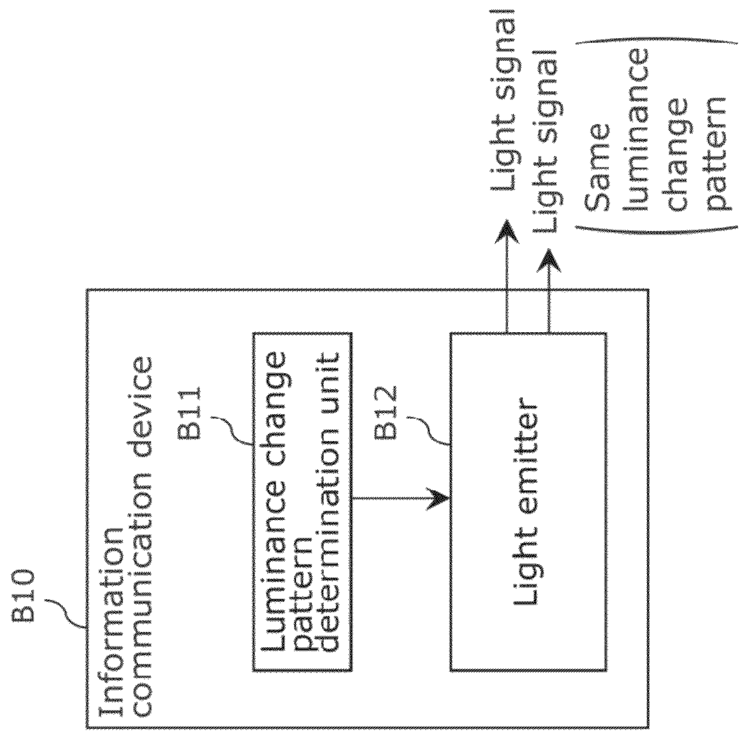

FIG. 333B is a block diagram of an information communication device according to another aspect of the present disclosure.

Figure 334A:
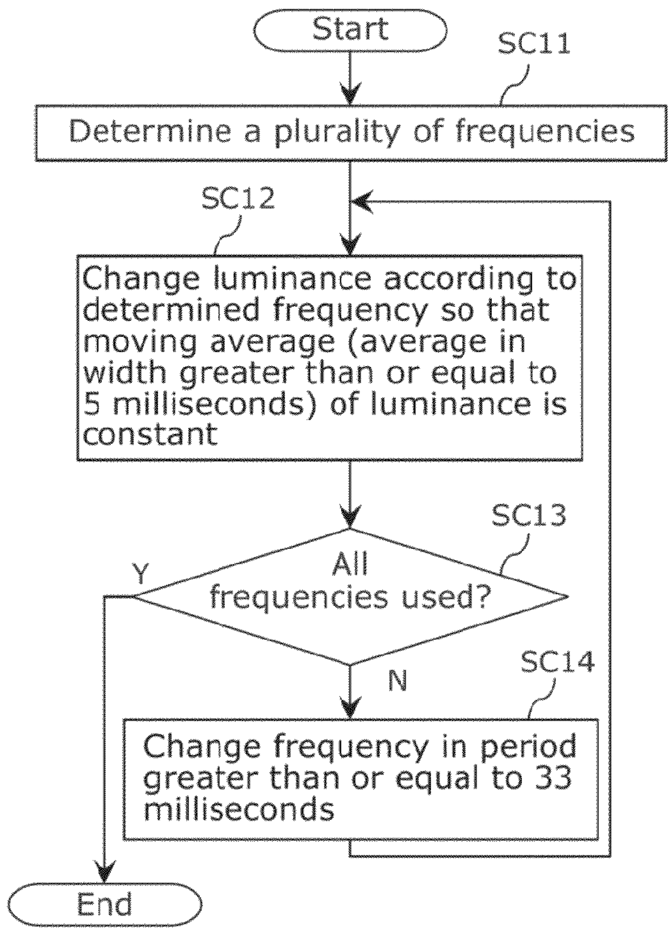

FIG. 334A is a flowchart of an information communication method according to yet another aspect of the present disclosure.

Figure 334B:
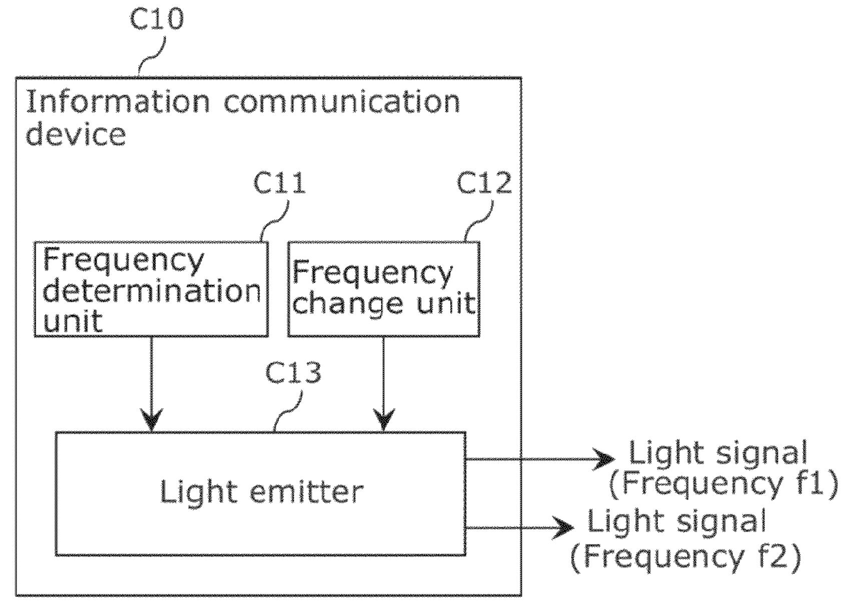

FIG. 334B is a block diagram of an information communication device according to yet another aspect of the present disclosure.

Figure 335:
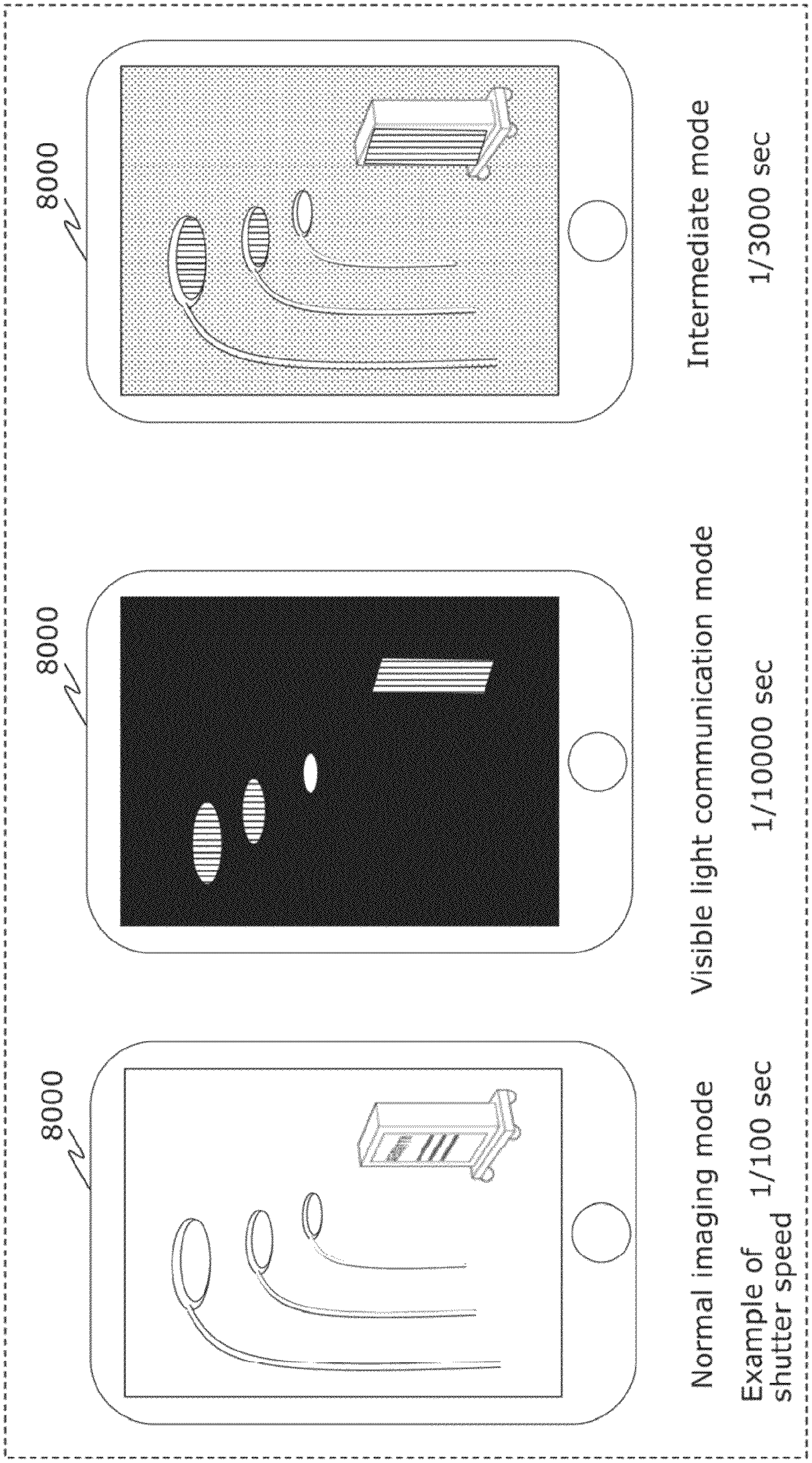

FIG. 335 is a diagram illustrating an example of each mode of a receiver in Embodiment 14.

Figure 336:
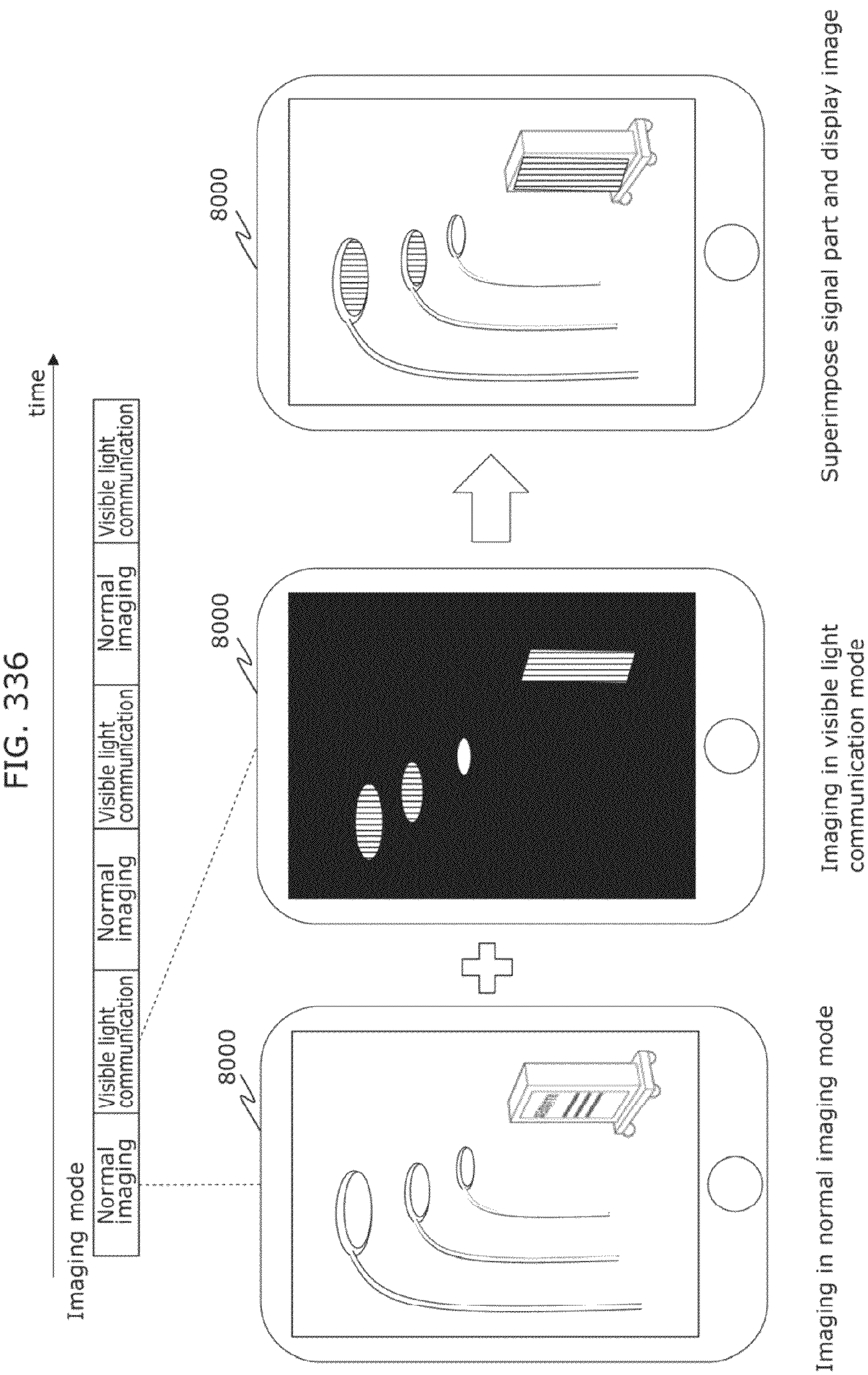

FIG. 336 is a diagram illustrating an example of imaging operation of a receiver in Embodiment 14.

Figure 337:
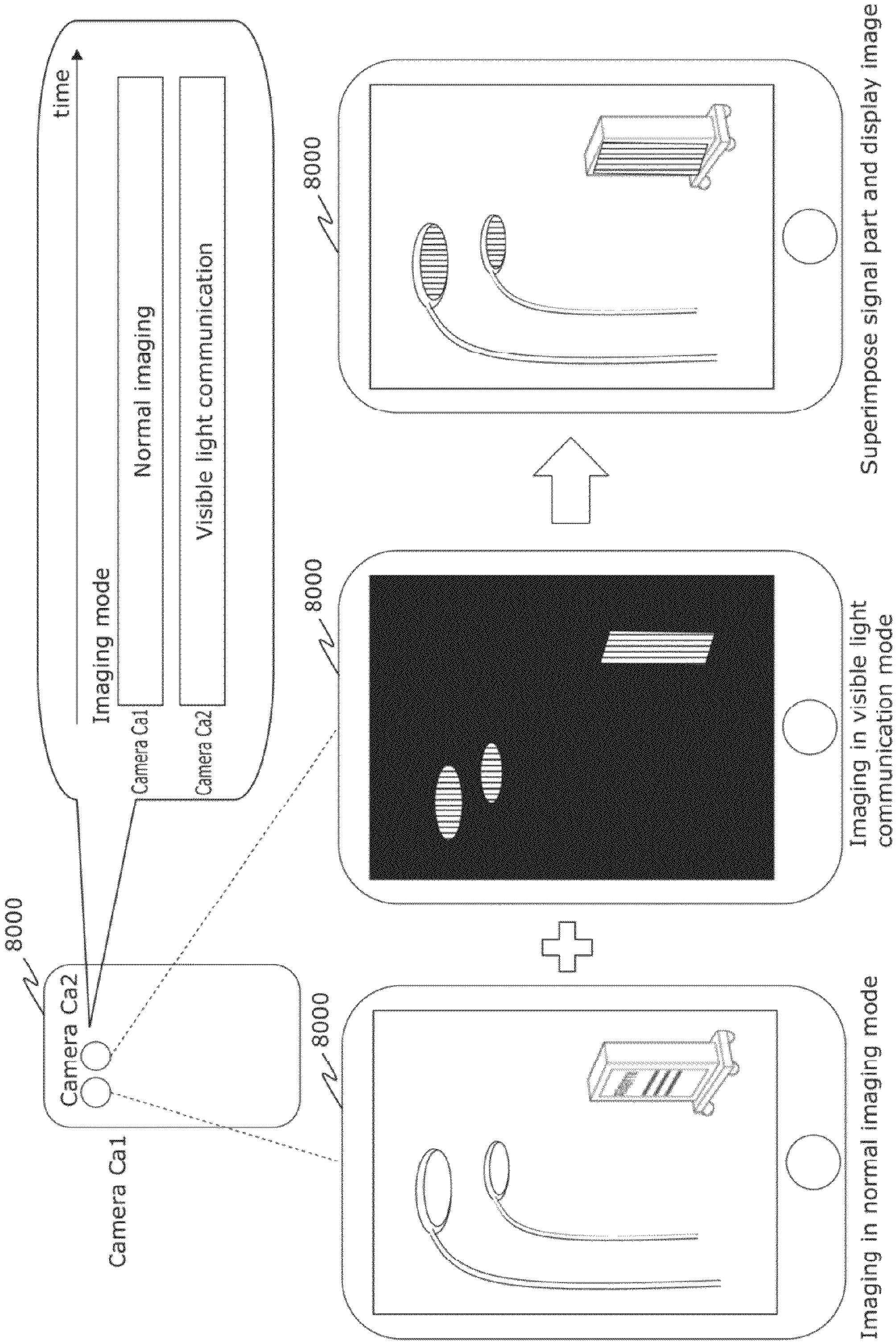

FIG. 337 is a diagram illustrating another example of imaging operation of a receiver in Embodiment 14.

Figure 338A:
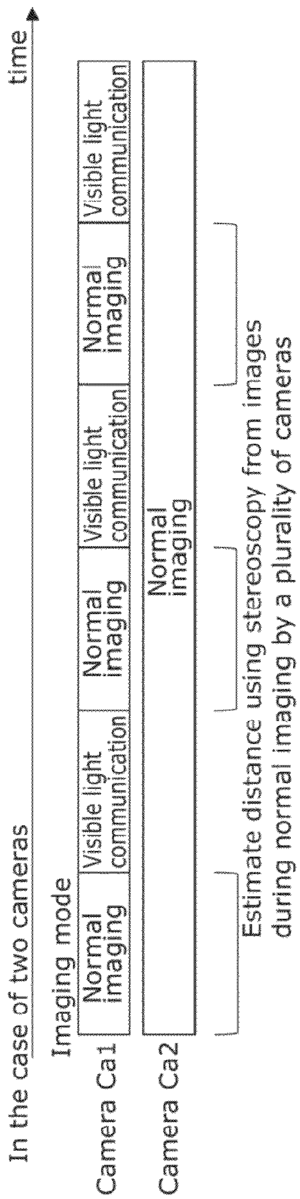

FIG. 338A is a diagram illustrating another example of imaging operation of a receiver in Embodiment 14.

Figure 338B:
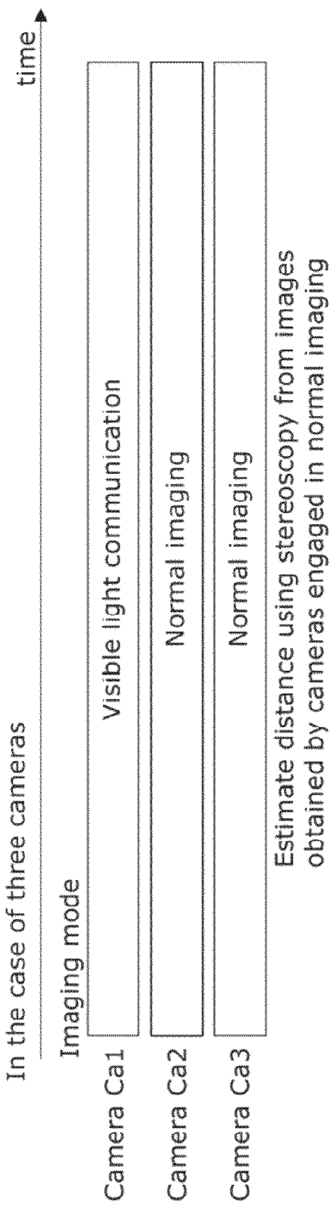

FIG. 338B is a diagram illustrating another example of imaging operation of a receiver in Embodiment 14.

Figure 338C:
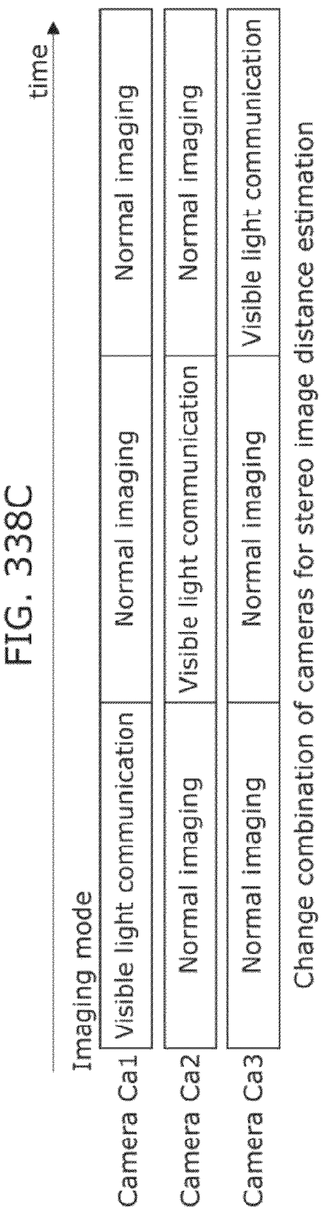

FIG. 338C is a diagram illustrating another example of imaging operation of a receiver in Embodiment 14.

Figure 339A:
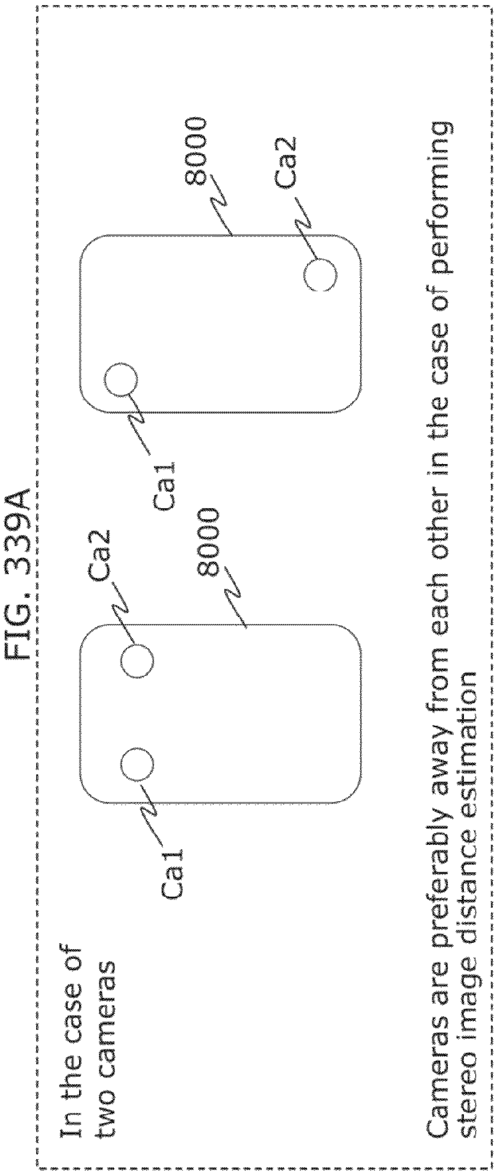

FIG. 339A is a diagram illustrating an example of camera arrangement of a receiver in Embodiment 14.

Figure 339B:
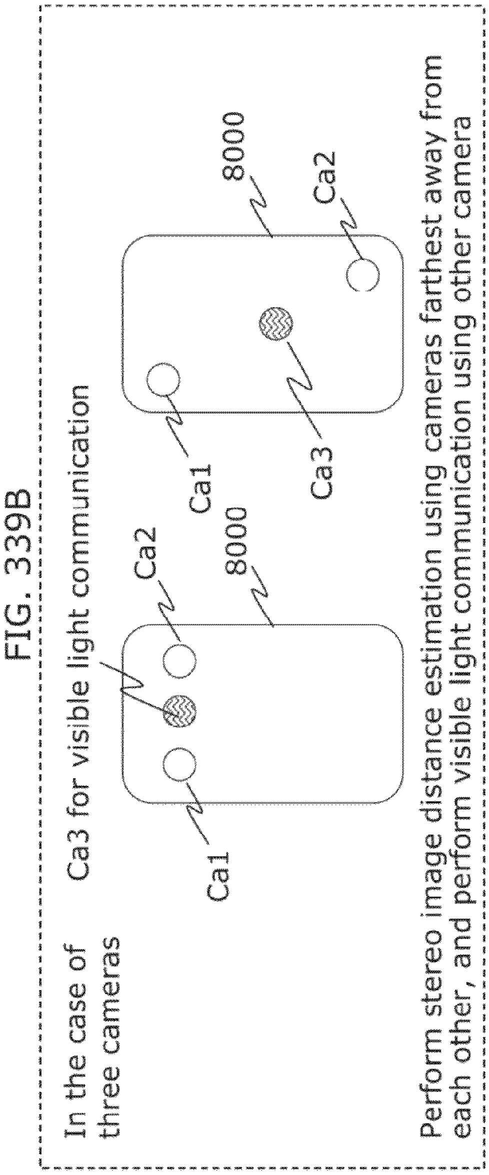

FIG. 339B is a diagram illustrating another example of camera arrangement of a receiver in Embodiment 14.

Figure 340:
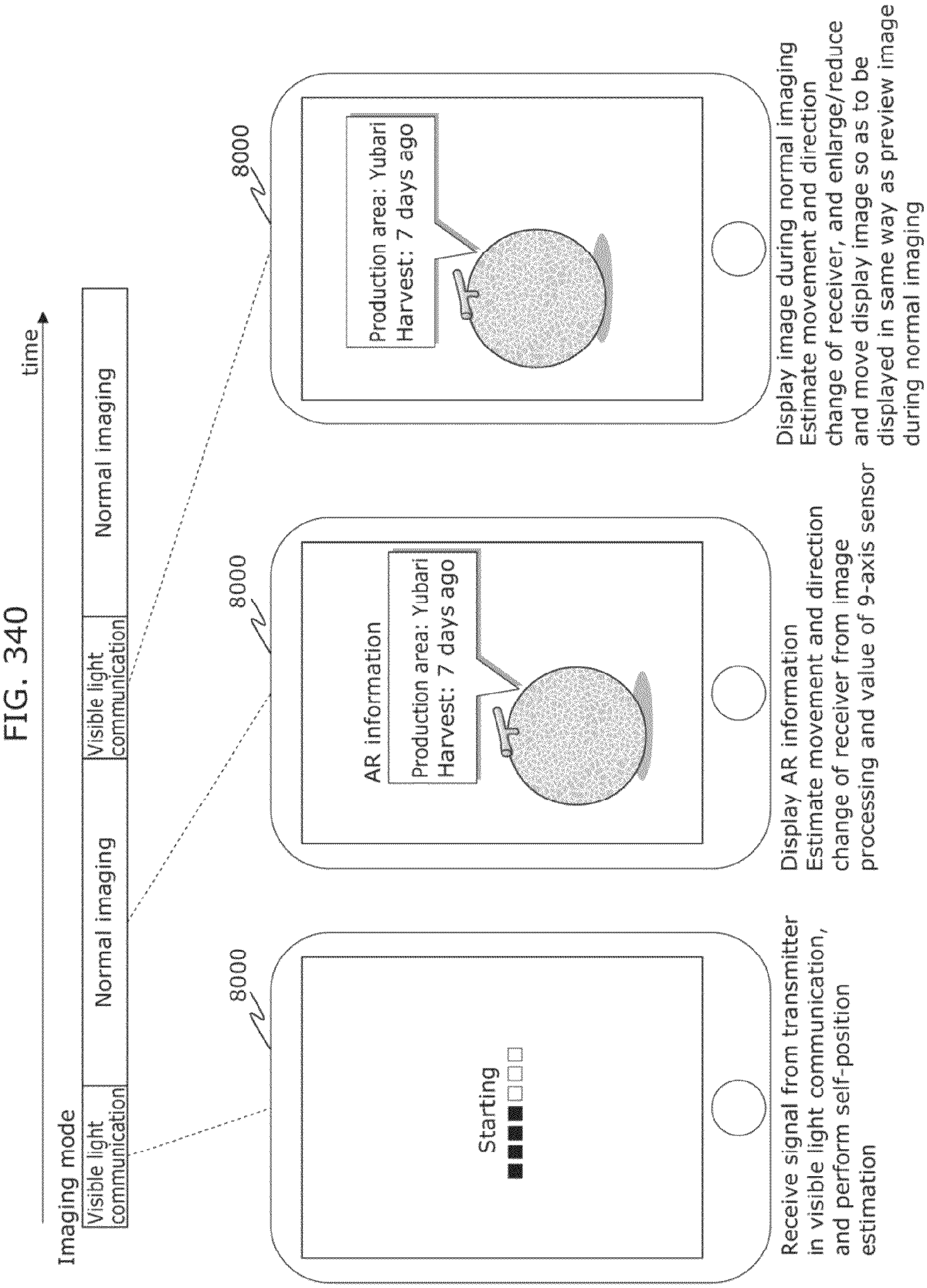

FIG. 340 is a diagram illustrating an example of display operation of a receiver in Embodiment 14.

Figure 341:
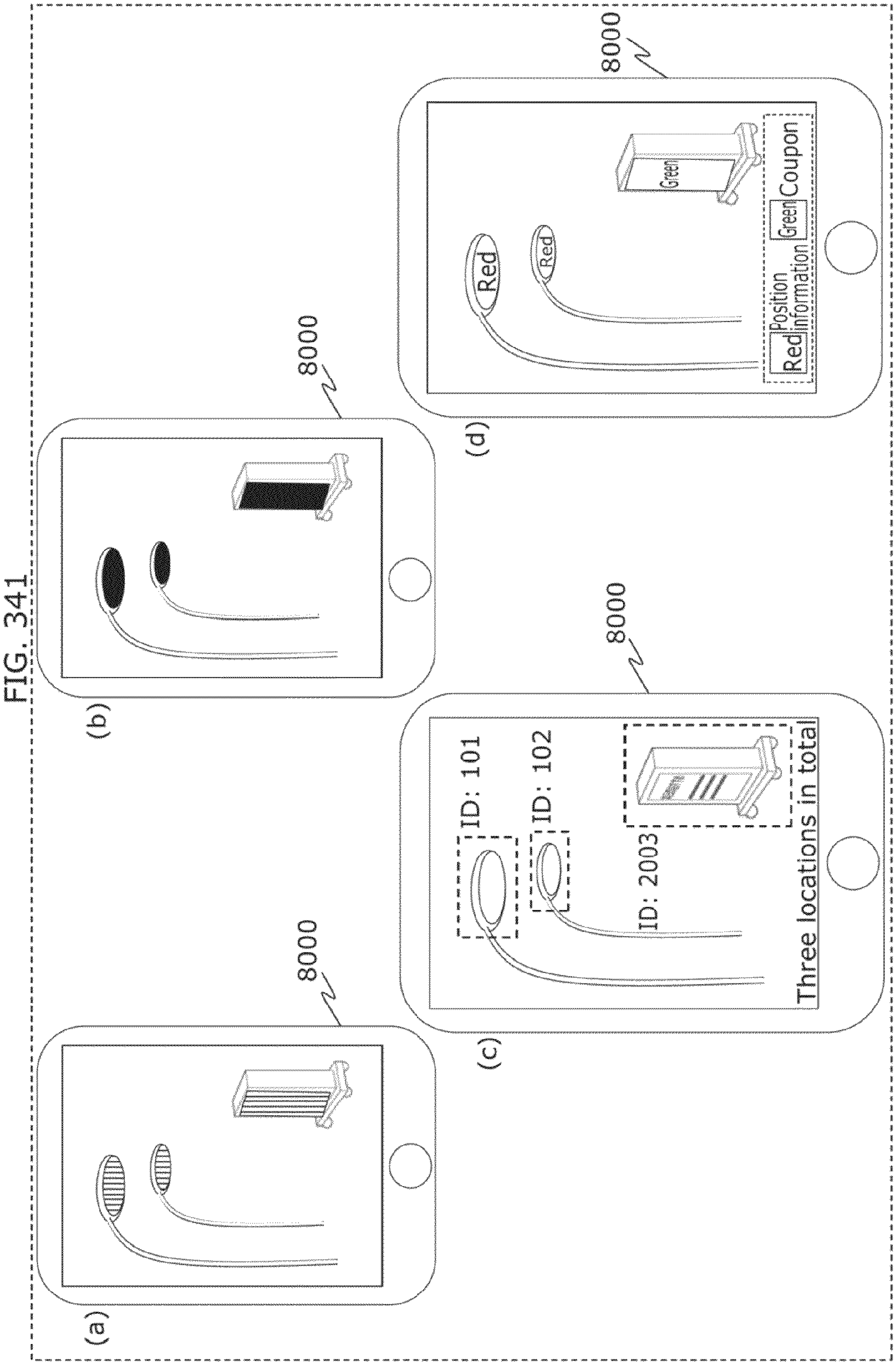

FIG. 341 is a diagram illustrating an example of display operation of a receiver in Embodiment 14.

Figure 342:
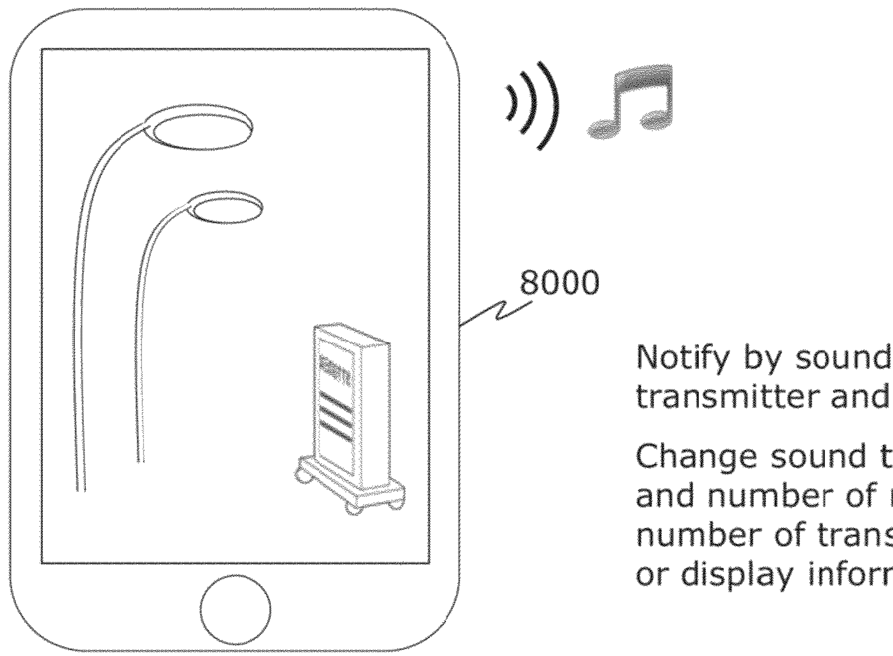

FIG. 342 is a diagram illustrating an example of operation of a receiver in Embodiment 14.

Figure 343:
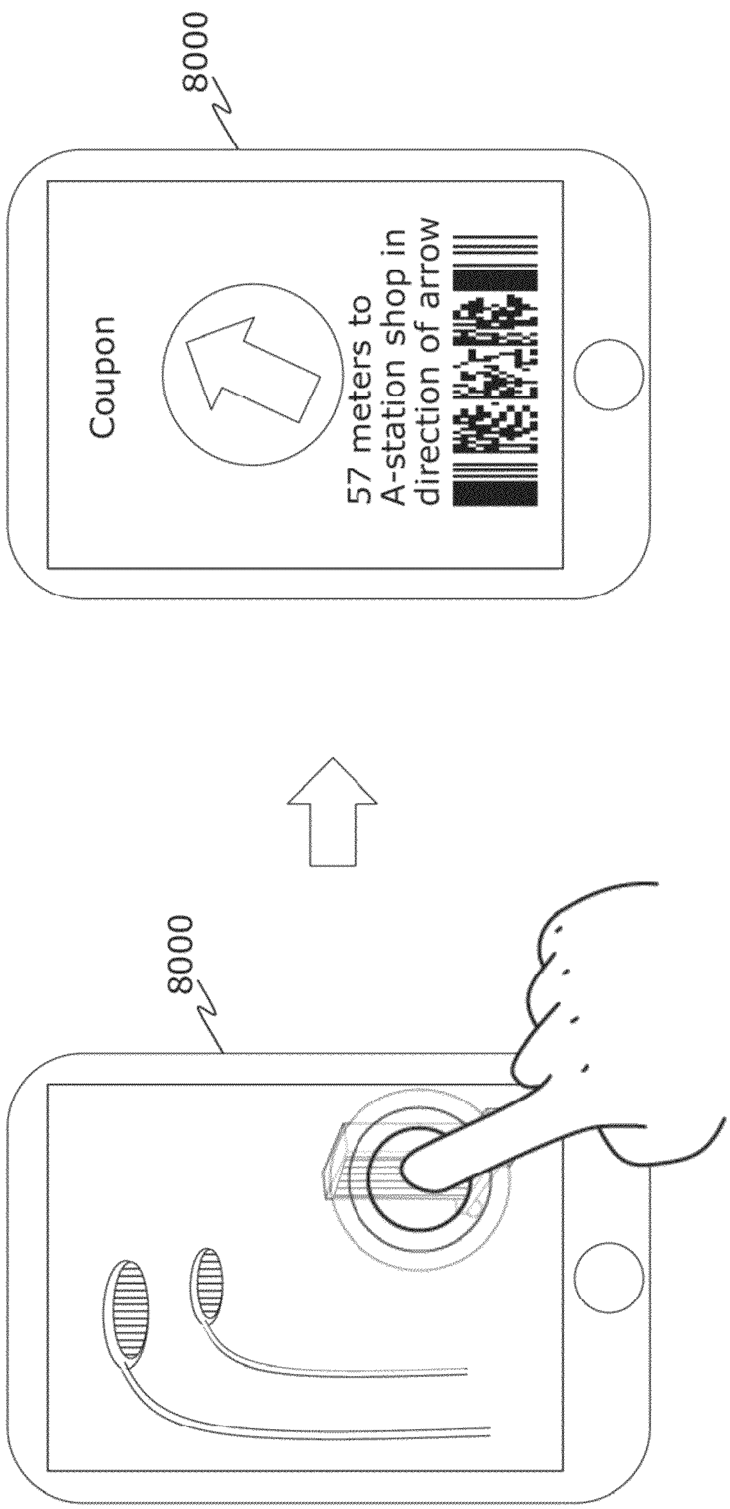

FIG. 343 is a diagram illustrating another example of operation of a receiver in Embodiment 14.

Figure 344:
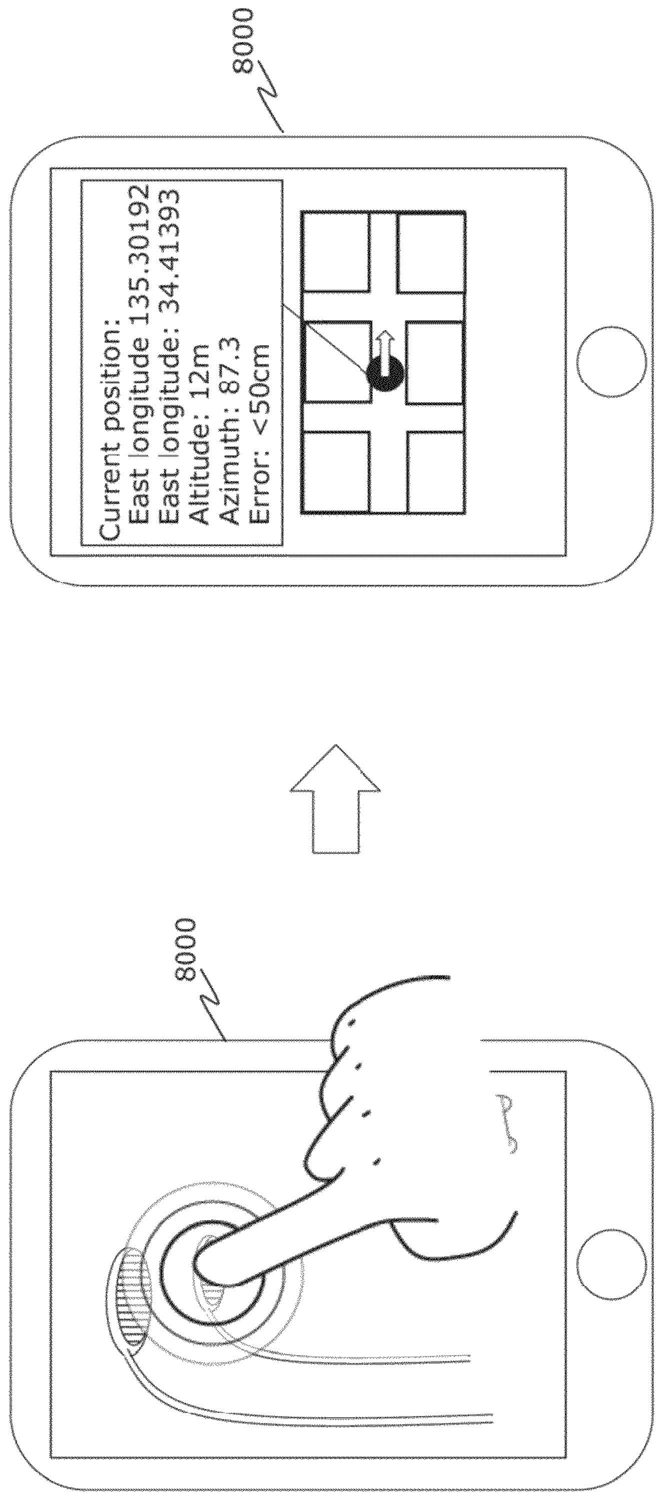

FIG. 344 is a diagram illustrating another example of operation of a receiver in Embodiment 14.

Figure 345:
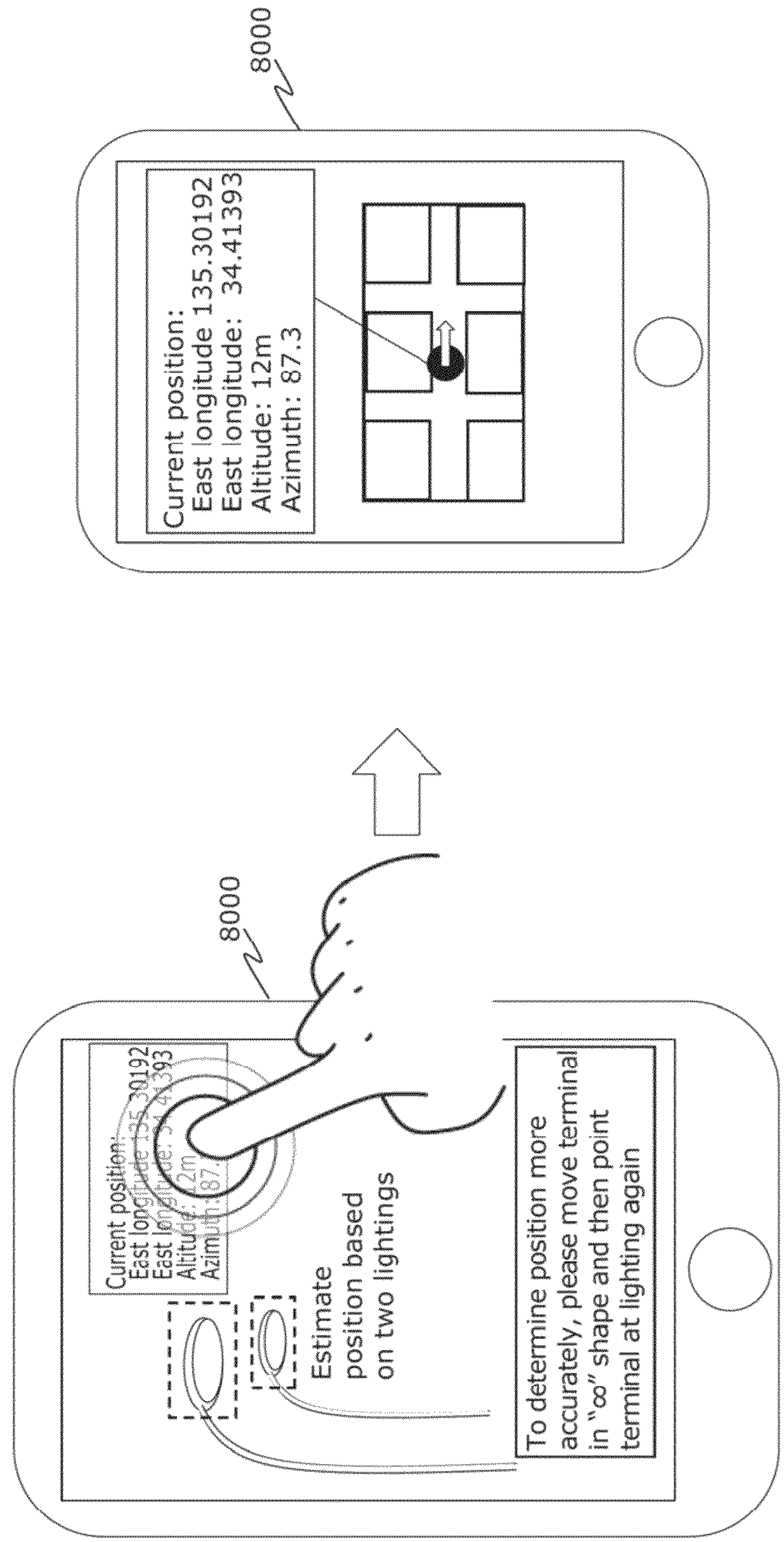

FIG. 345 is a diagram illustrating another example of operation of a receiver in Embodiment 14.

Figure 346:
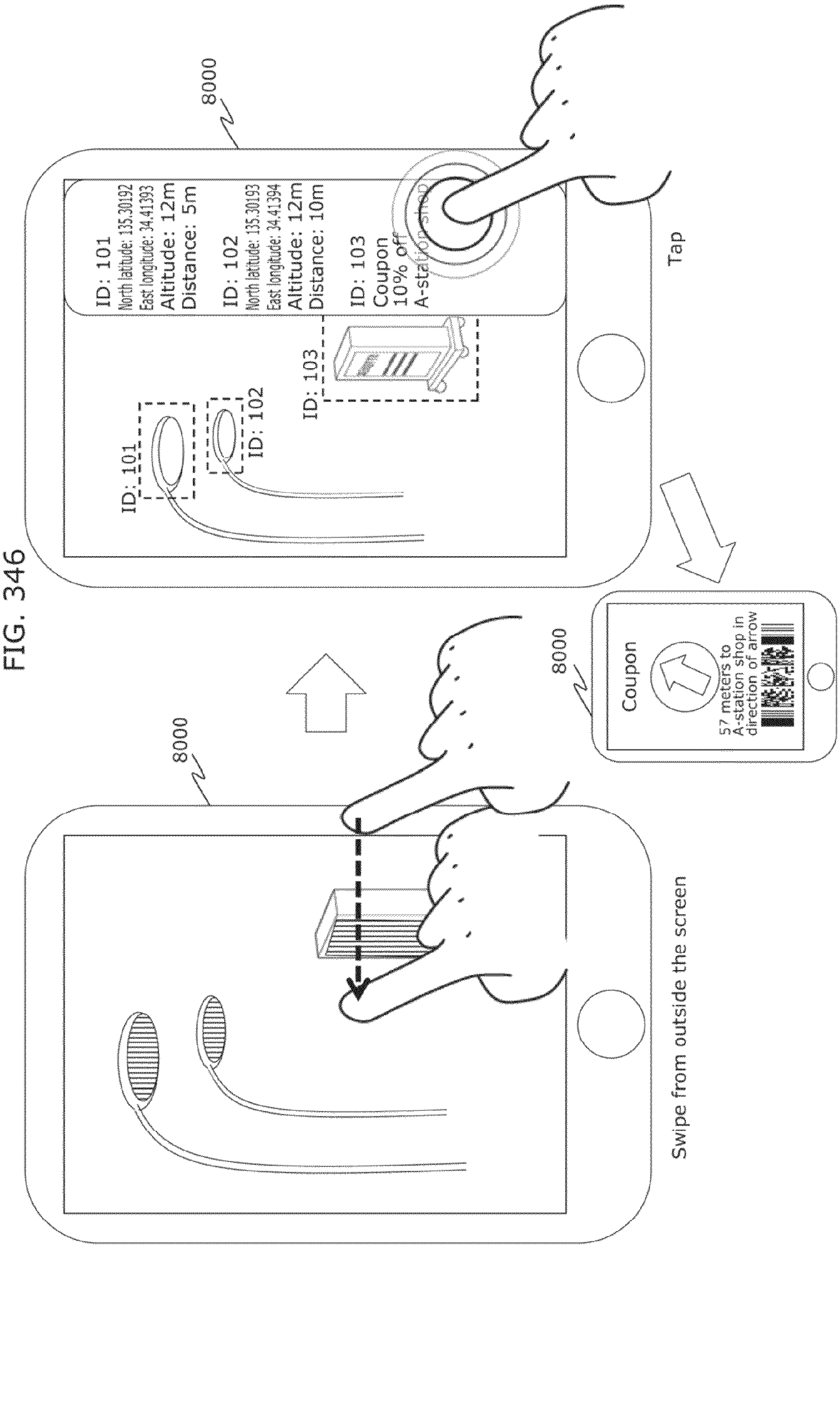

FIG. 346 is a diagram illustrating another example of operation of a receiver in Embodiment 14.

Figure 347:
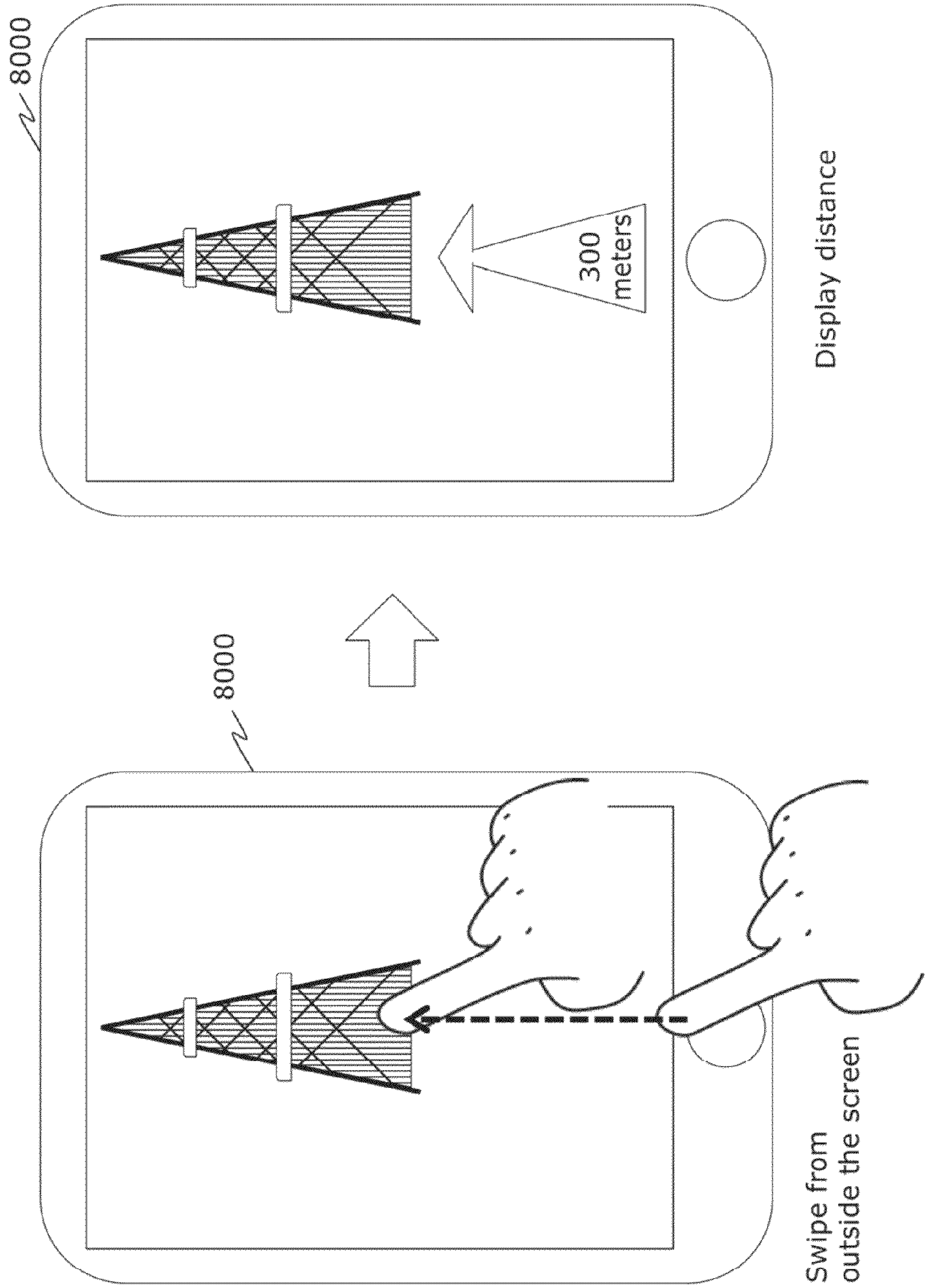

FIG. 347 is a diagram illustrating another example of operation of a receiver in Embodiment 14.

Figure 348:
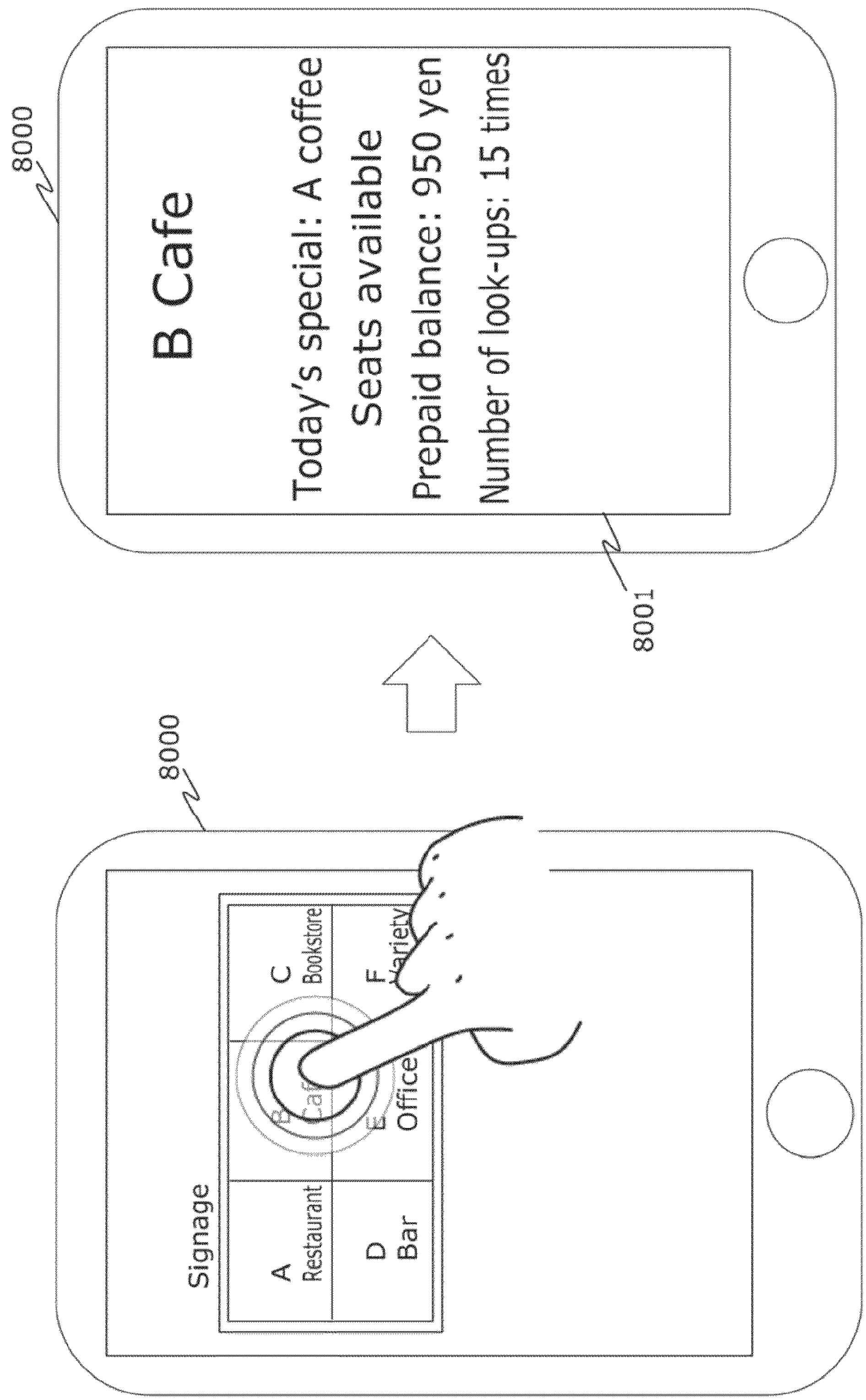

FIG. 348 is a diagram illustrating another example of operation of a receiver in Embodiment 14.

Figure 349:
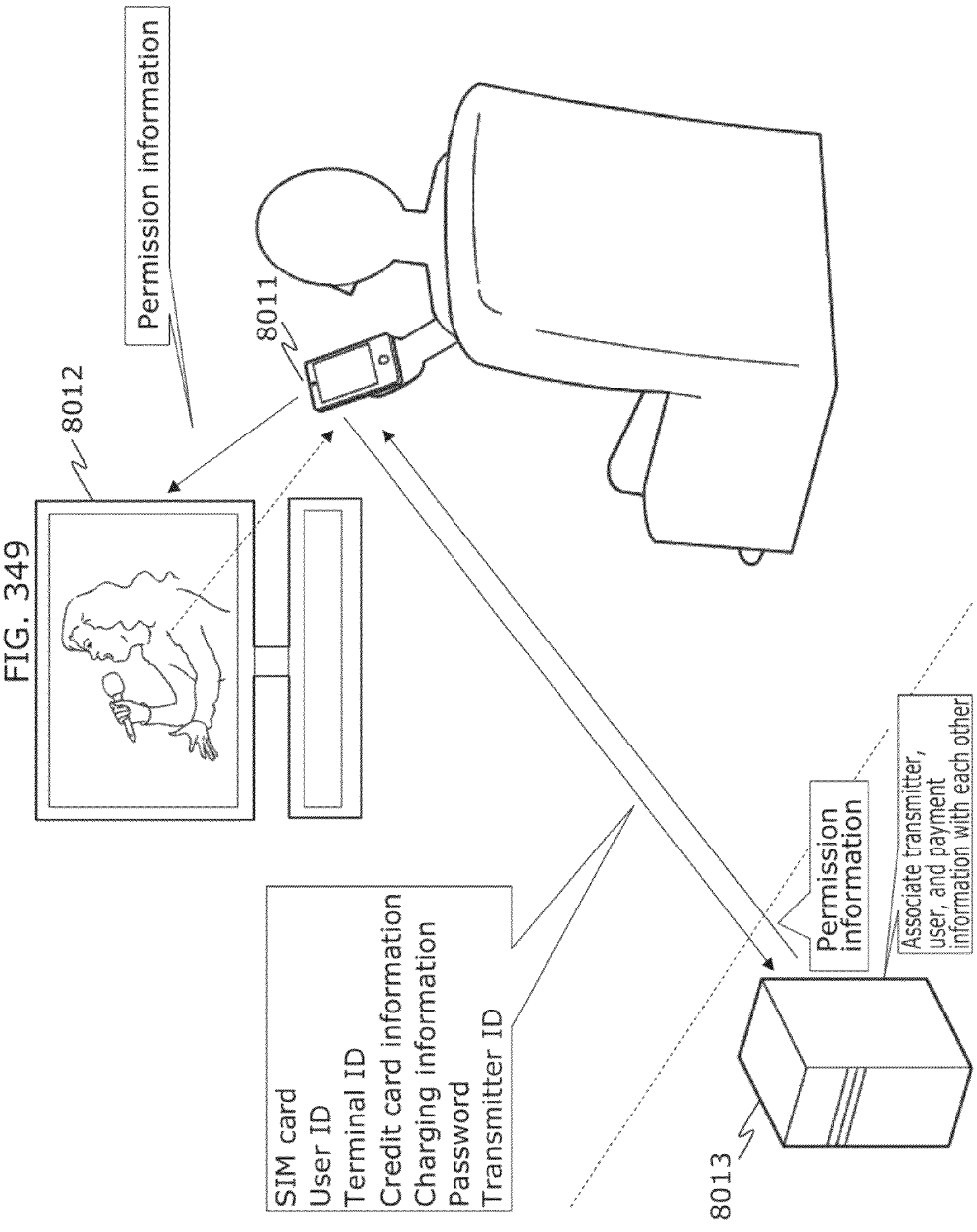

FIG. 349 is a diagram illustrating an example of operation of a receiver, a transmitter, and a server in Embodiment 14.

Figure 350:
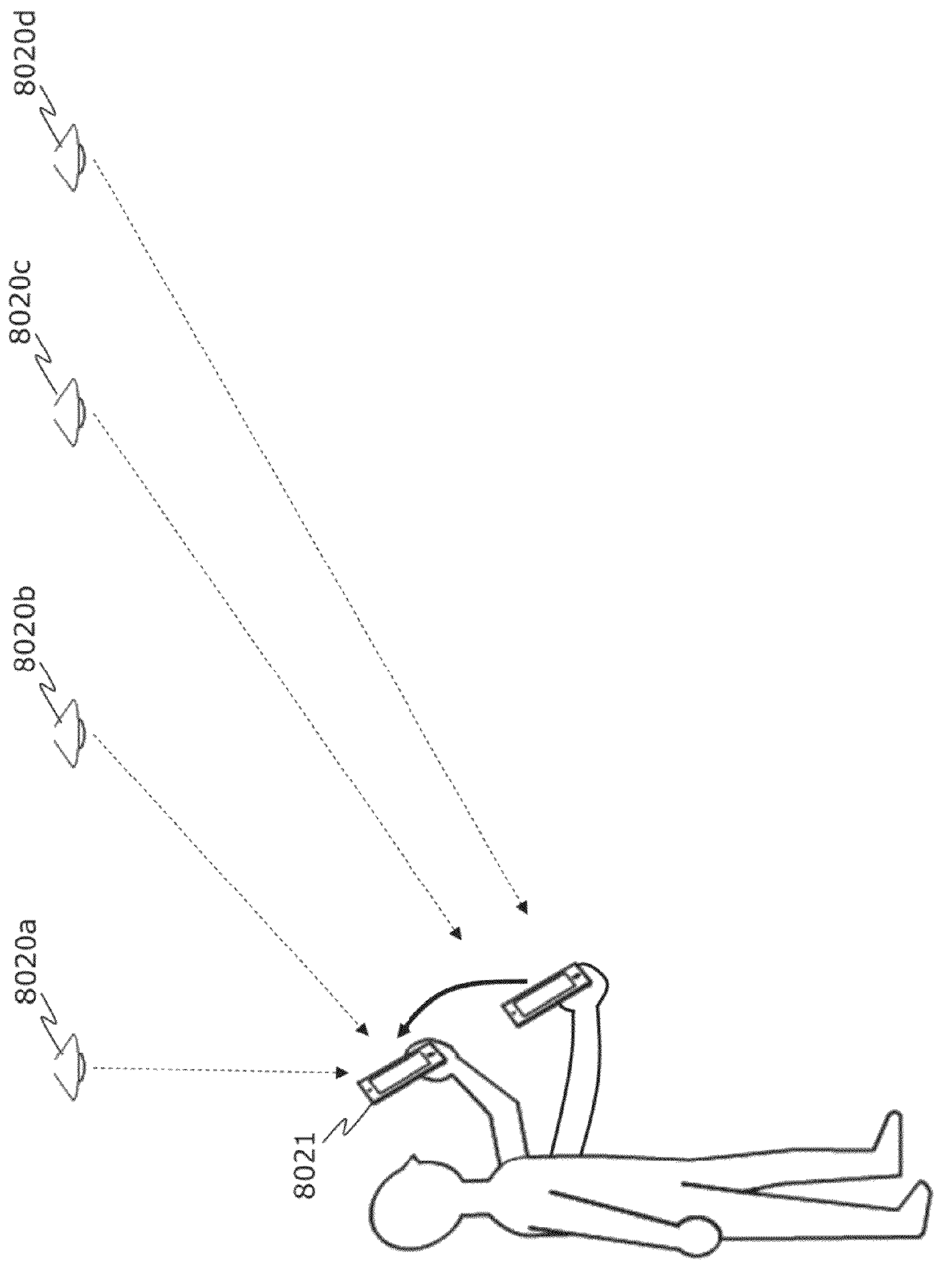

FIG. 350 is a diagram illustrating another example of operation of a receiver in Embodiment 14.

Figure 351:
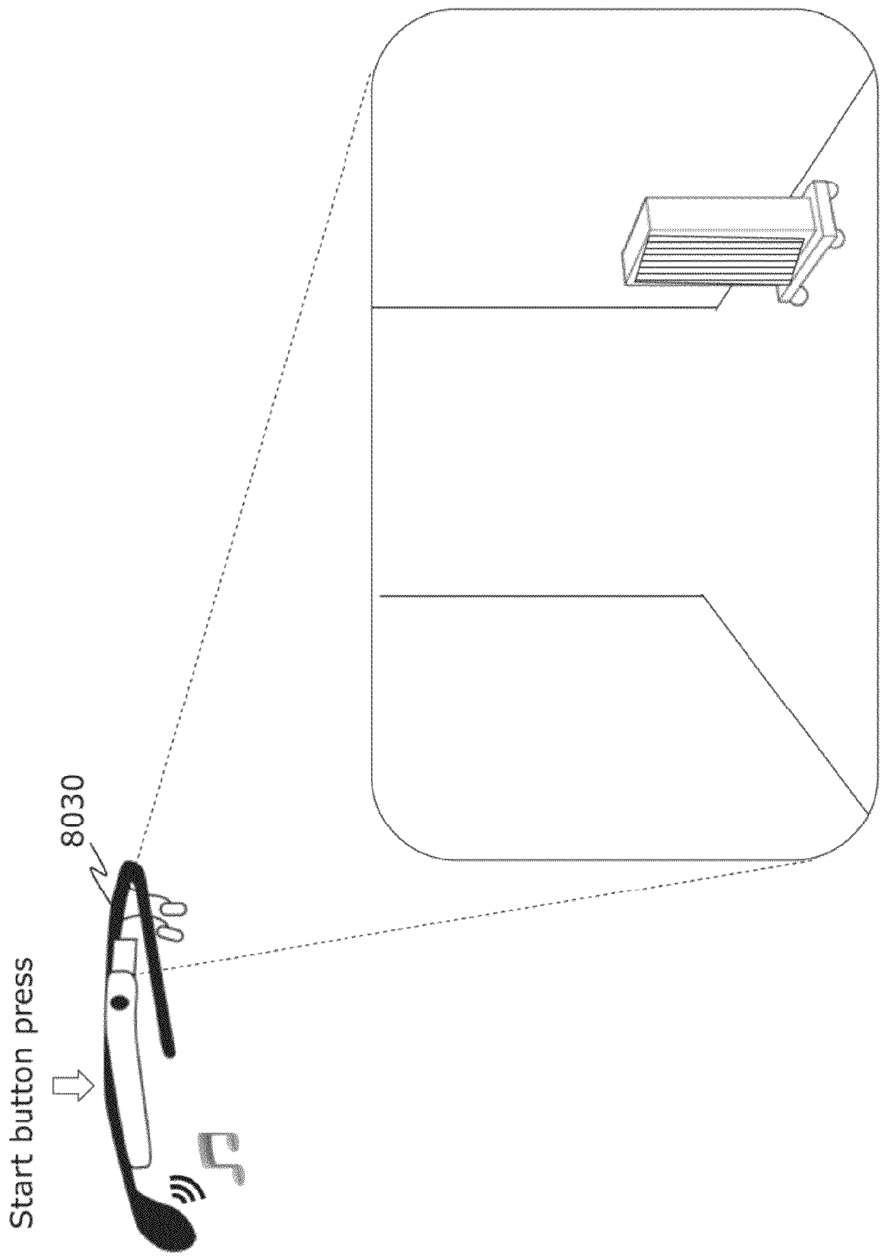

FIG. 351 is a diagram illustrating another example of operation of a receiver in Embodiment 14.

Figure 352:
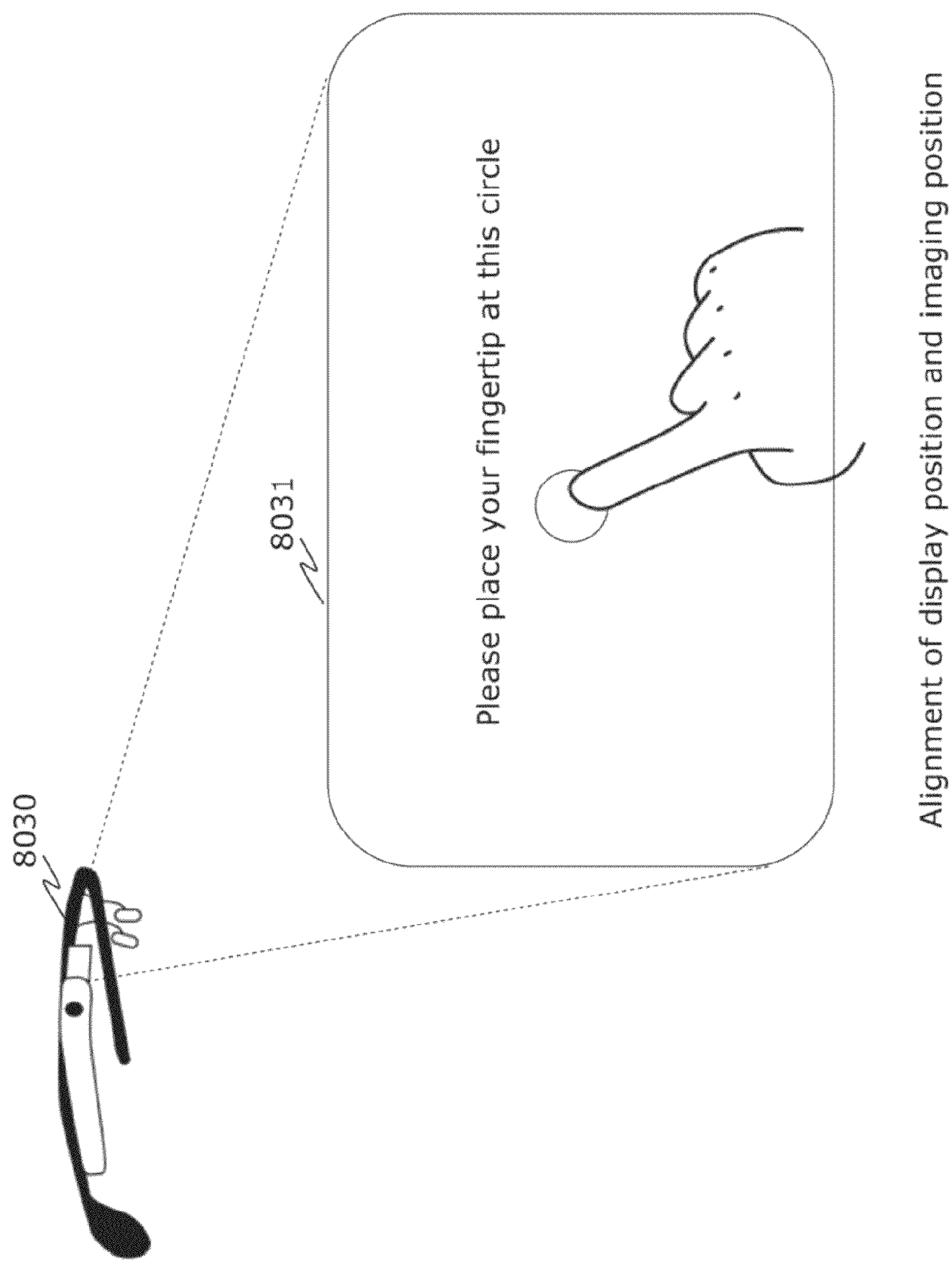

FIG. 352 is a diagram illustrating an example of initial setting of a receiver in Embodiment 14.

Figure 353:
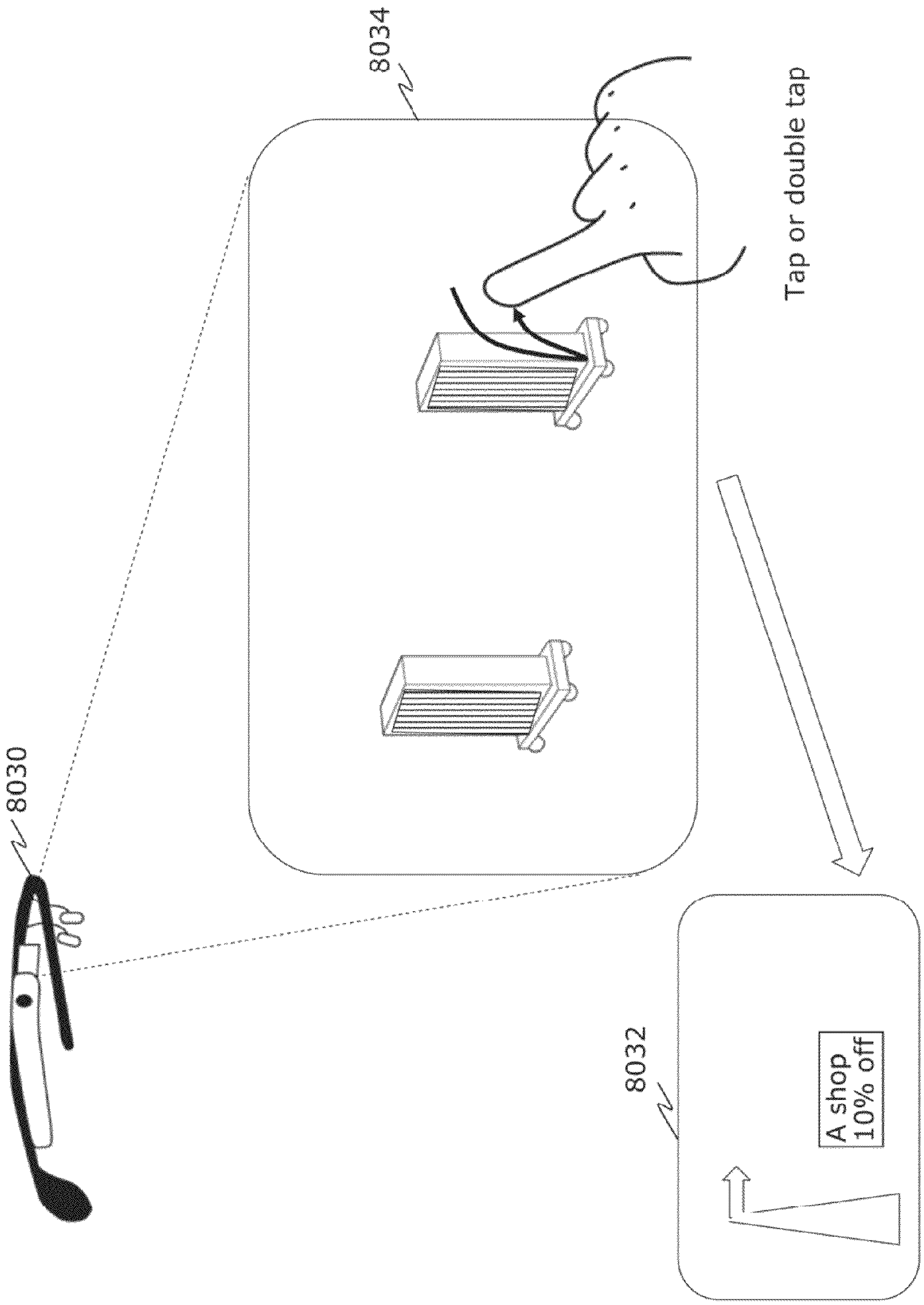

FIG. 353 is a diagram illustrating another example of operation of a receiver in Embodiment 14.

Figure 354:
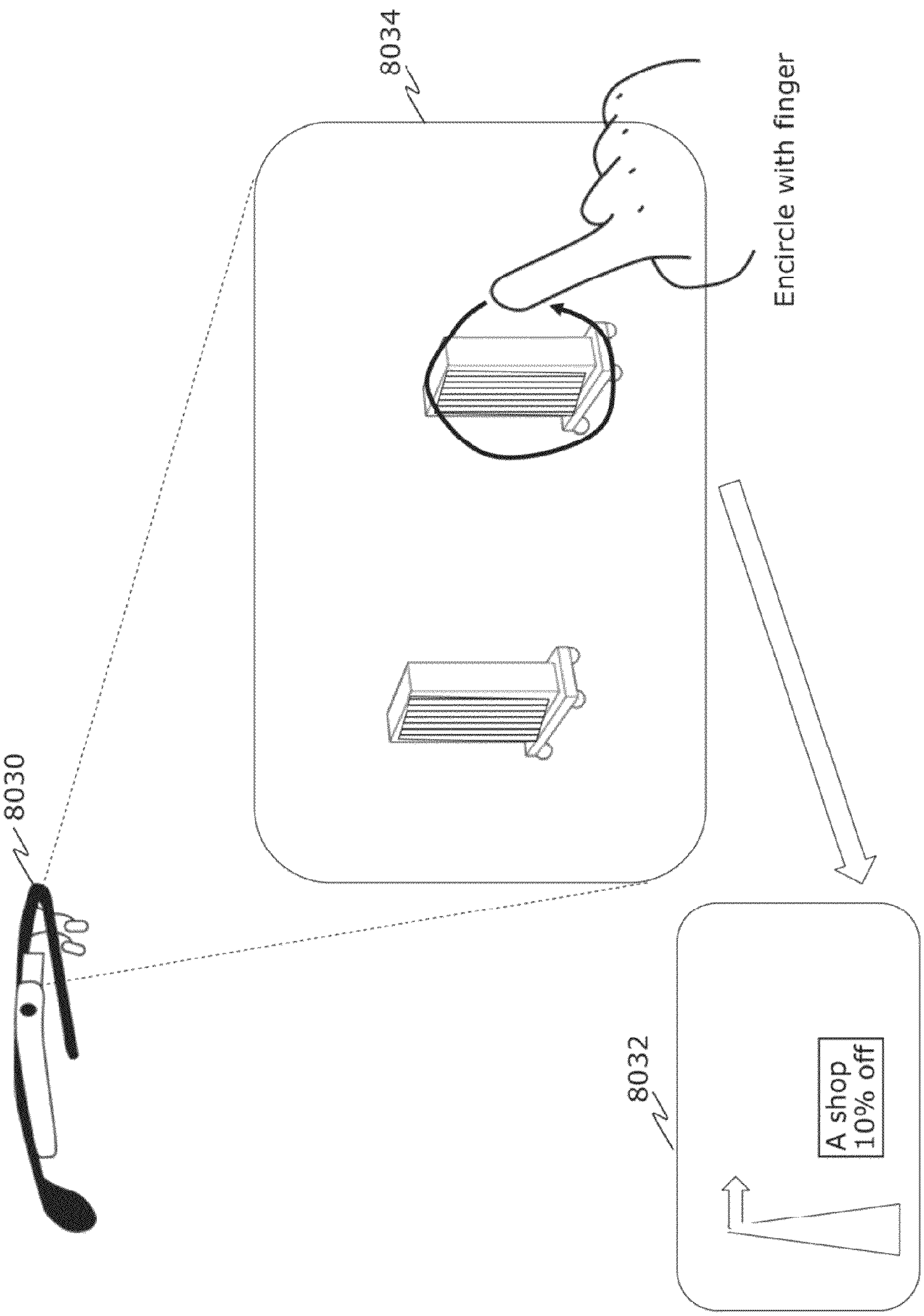

FIG. 354 is a diagram illustrating another example of operation of a receiver in Embodiment 14.

Figure 355:
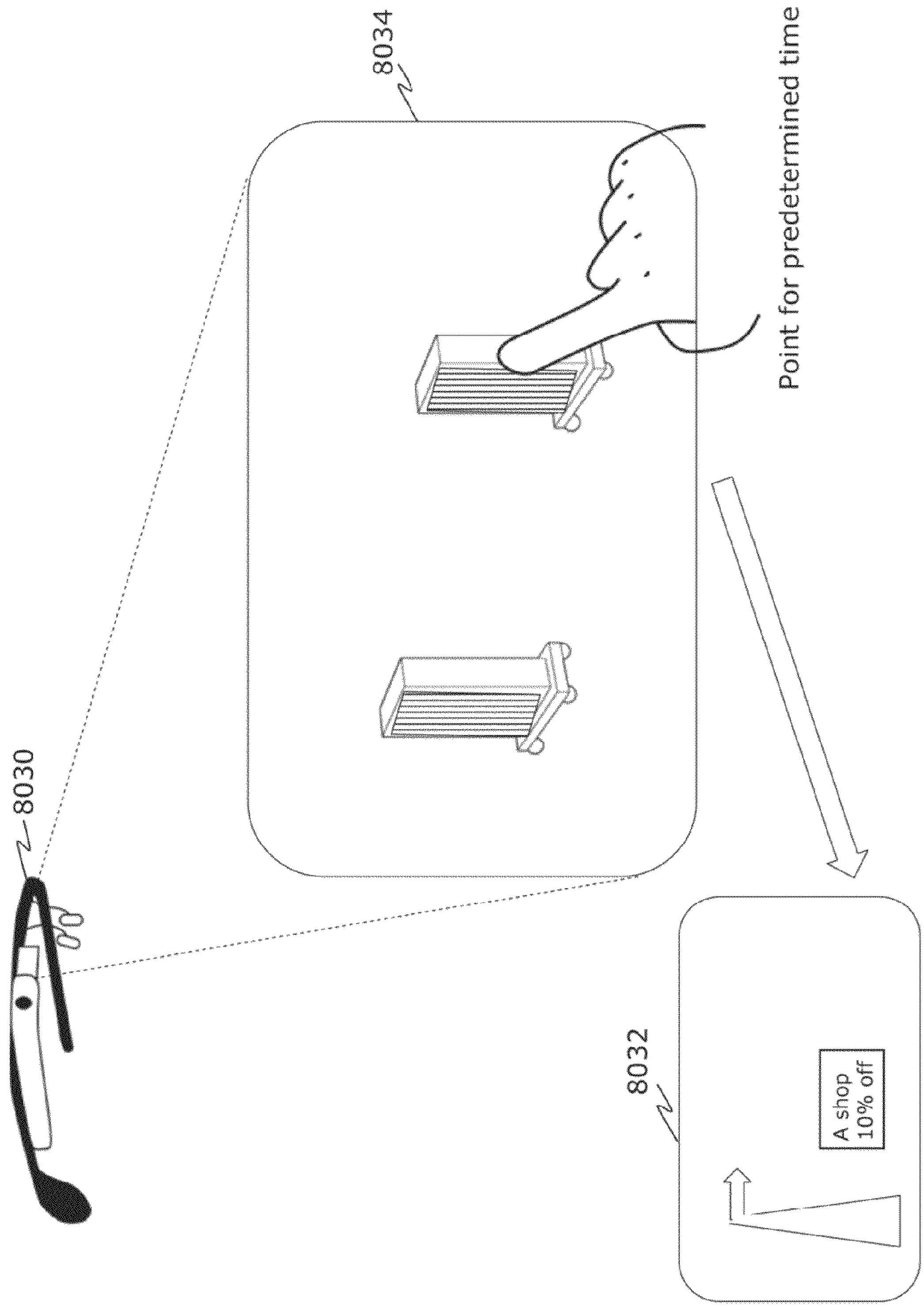

FIG. 355 is a diagram illustrating another example of operation of a receiver in Embodiment 14.

Figure 356:
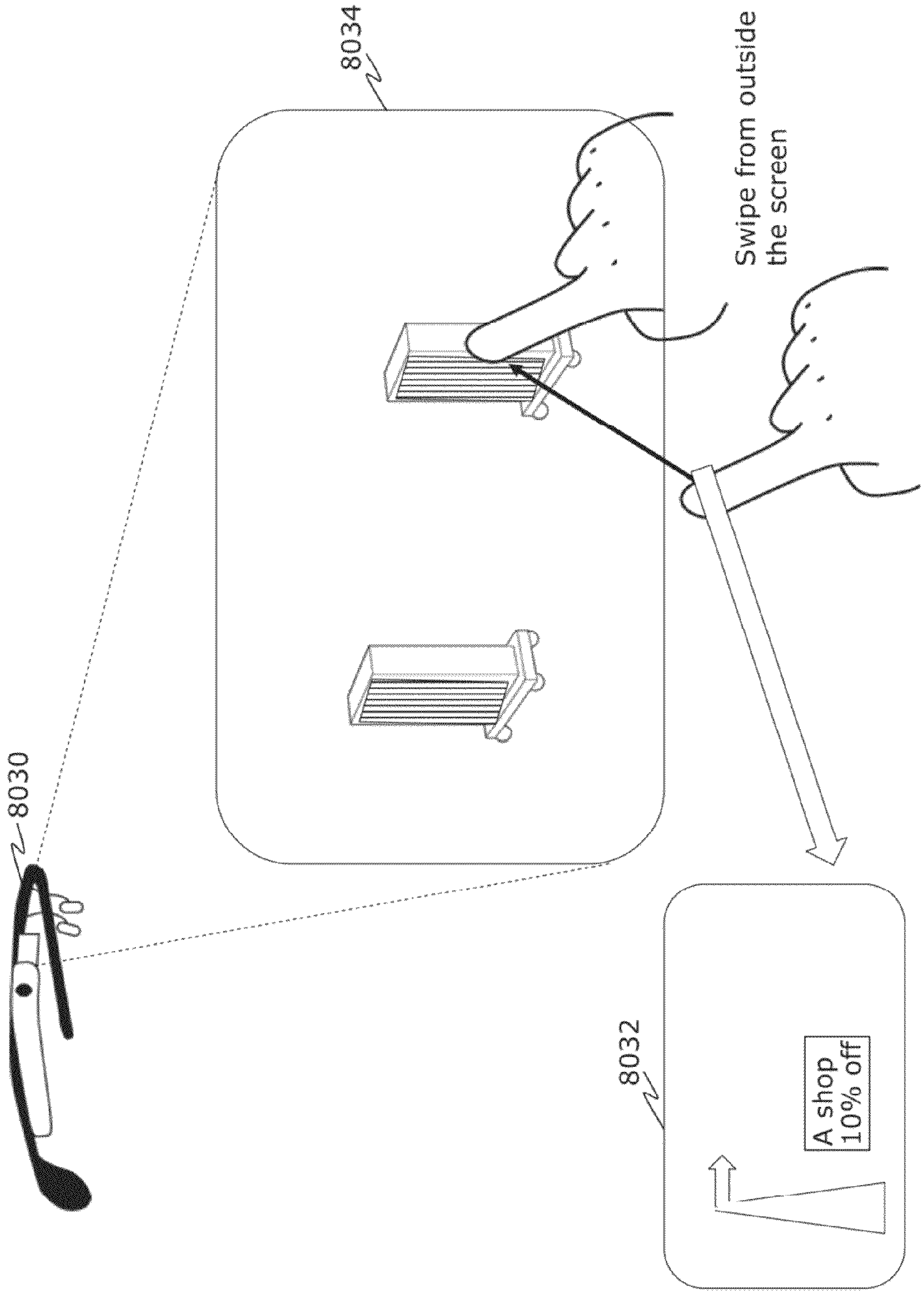

FIG. 356 is a diagram illustrating another example of operation of a receiver in Embodiment 14.

Figure 357:
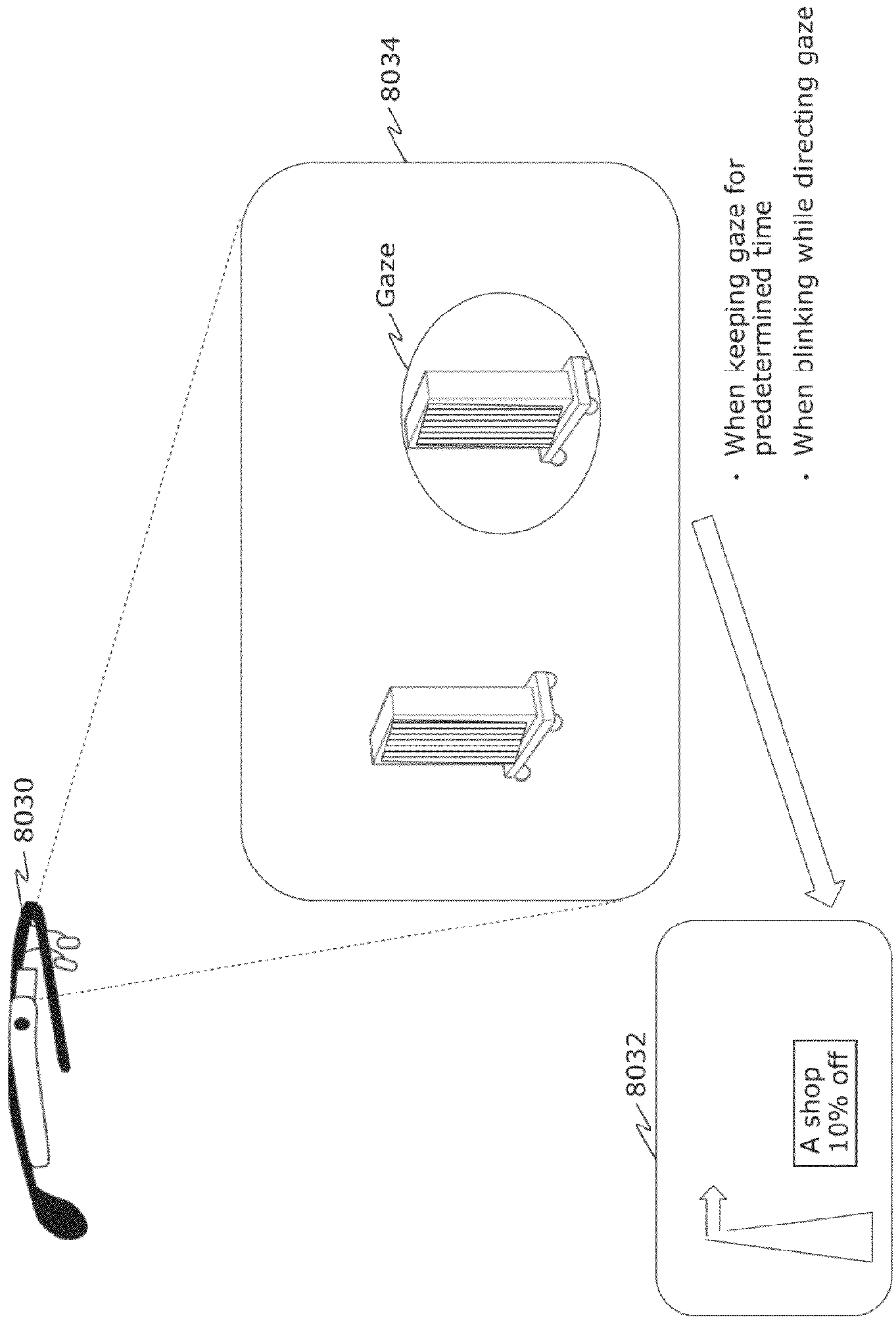

FIG. 357 is a diagram illustrating another example of operation of a receiver in Embodiment 14.

Figure 358:
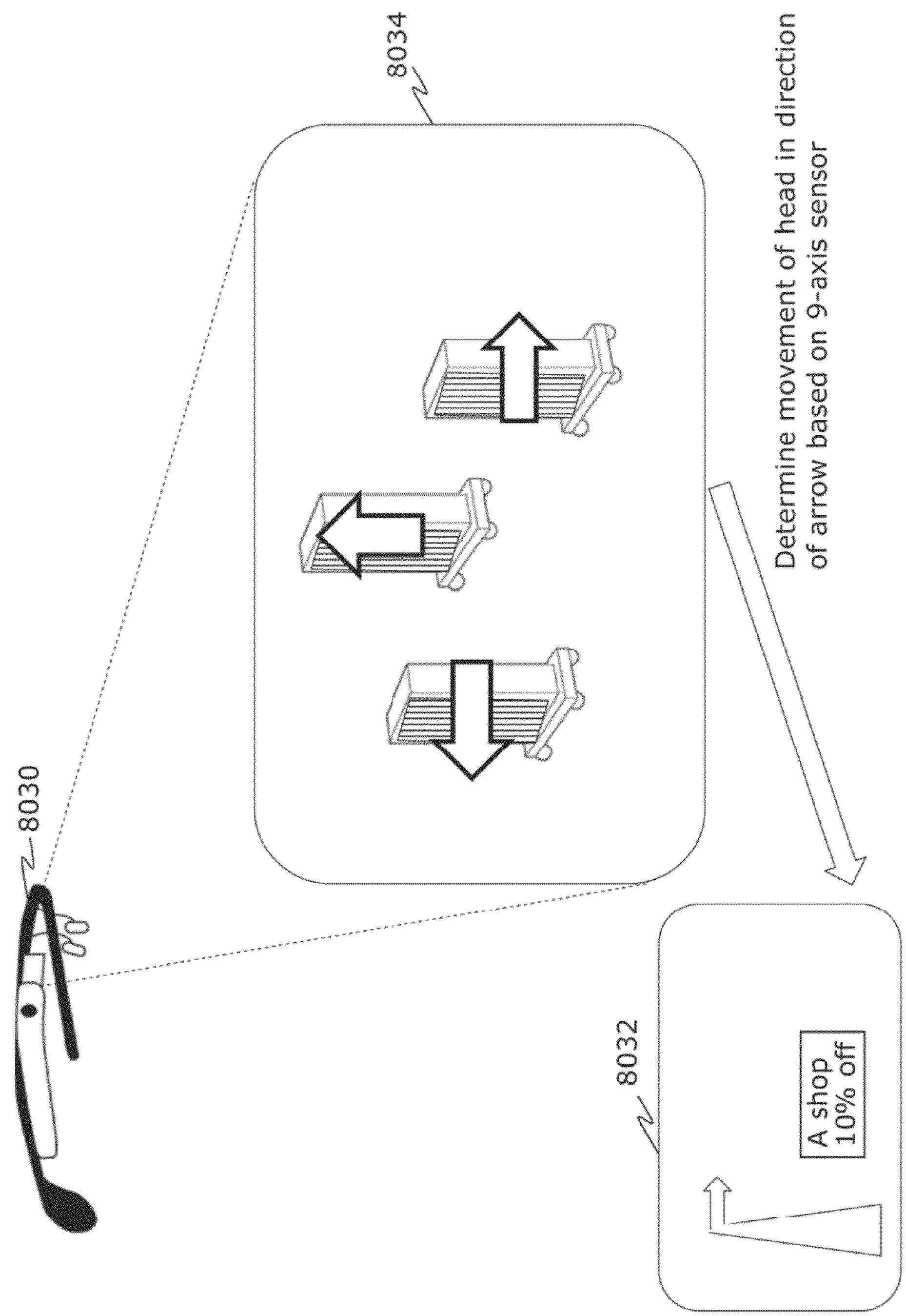

FIG. 358 is a diagram illustrating another example of operation of a receiver in Embodiment 14.

Figure 359A:
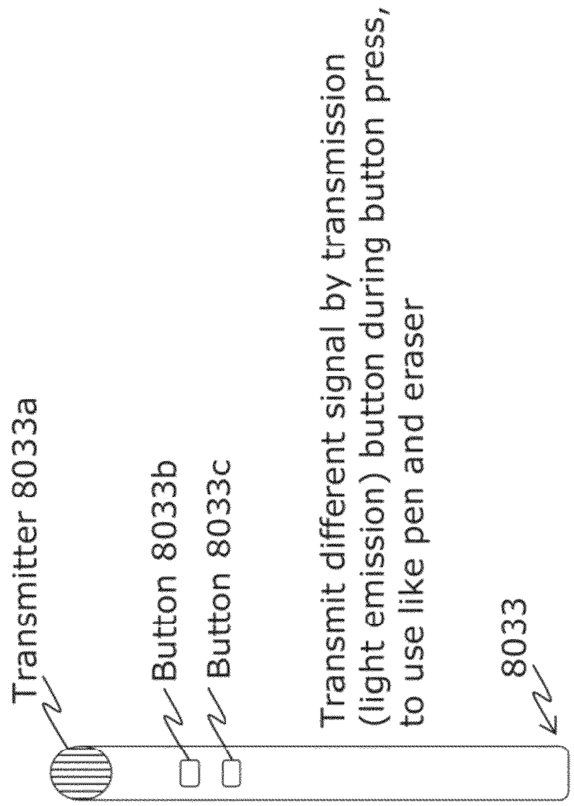

FIG. 359A is a diagram illustrating a pen used to operate a receiver in Embodiment 14.

Figure 359B:
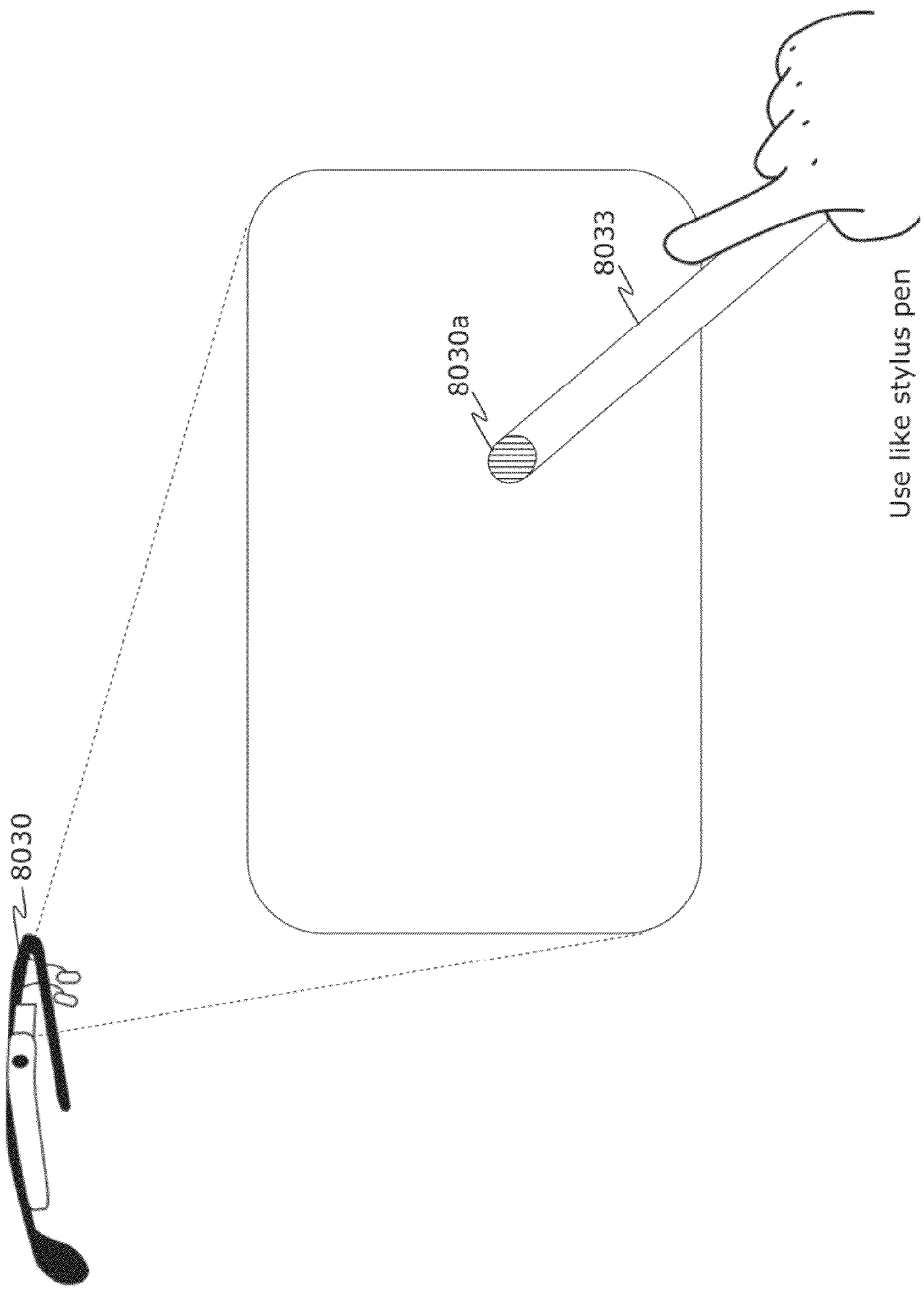

FIG. 359B is a diagram illustrating operation of a receiver using a pen in Embodiment 14.

Figure 360:
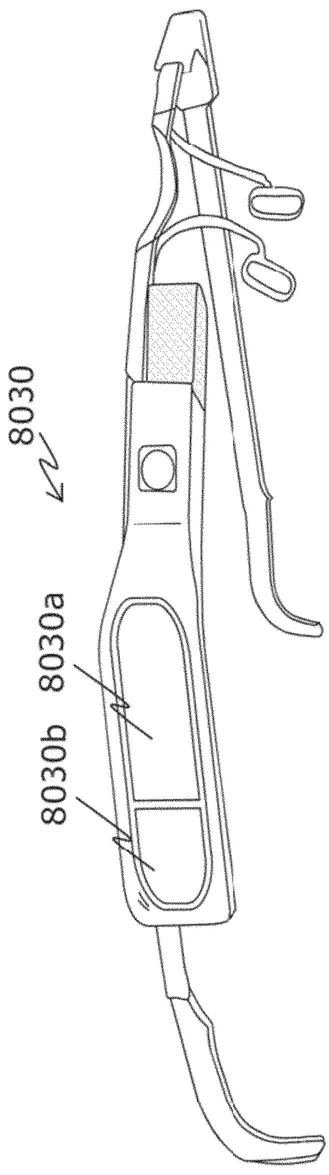

FIG. 360 is a diagram illustrating an example of appearance of a receiver in Embodiment 14.

Figure 361:
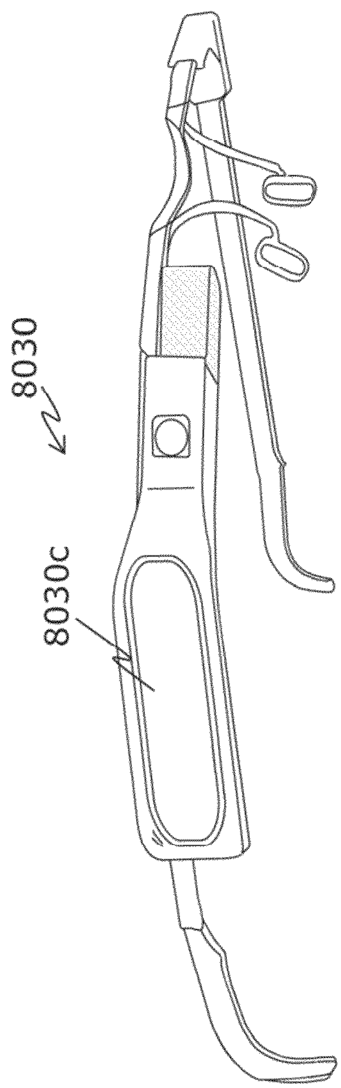

FIG. 361 is a diagram illustrating another example of appearance of a receiver in Embodiment 14.

Figure 362:
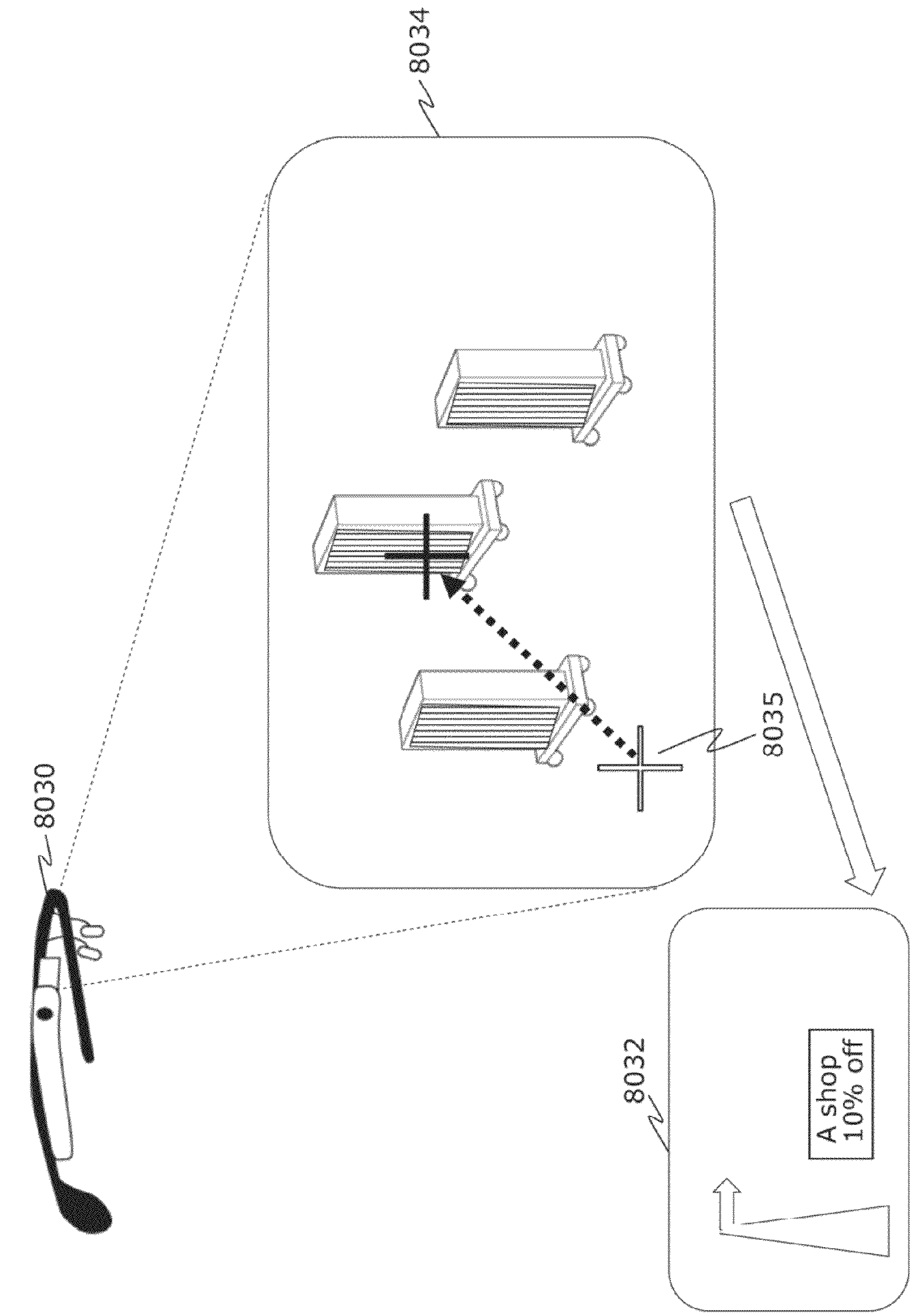

FIG. 362 is a diagram illustrating another example of operation of a receiver in Embodiment 14.

Figure 363A:
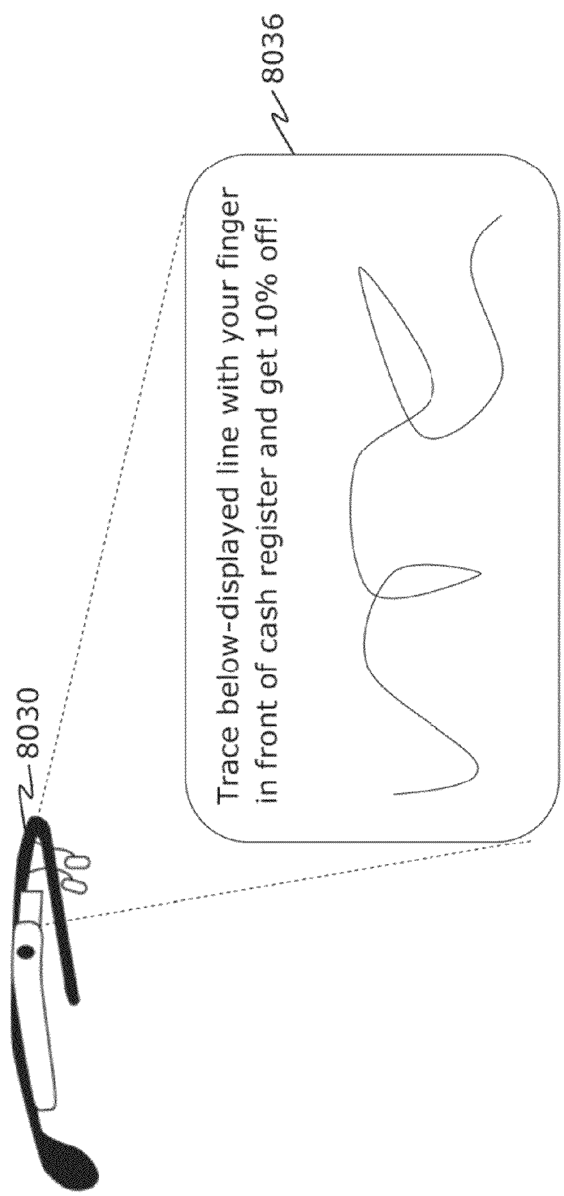

FIG. 363A is a diagram illustrating another example of operation of a receiver in Embodiment 14.

Figure 363B:
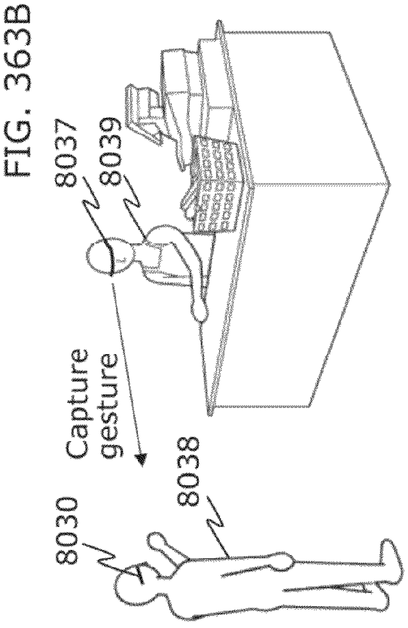

FIG. 363B is a diagram illustrating an example of application using a receiver in Embodiment 14.

Figure 364A:
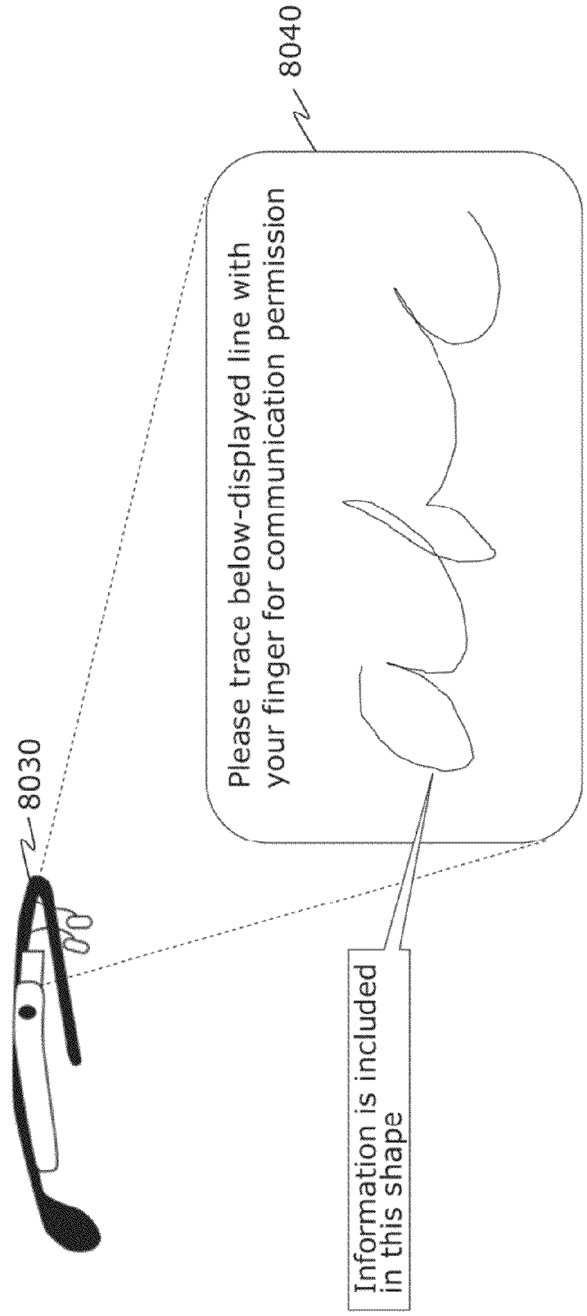

FIG. 364A is a diagram illustrating another example of operation of a receiver in Embodiment 14.

Figure 364B:
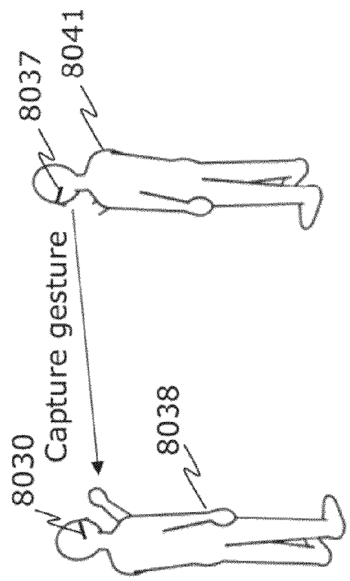

FIG. 364B is a diagram illustrating an example of application using a receiver in Embodiment 14.

Figure 365A:
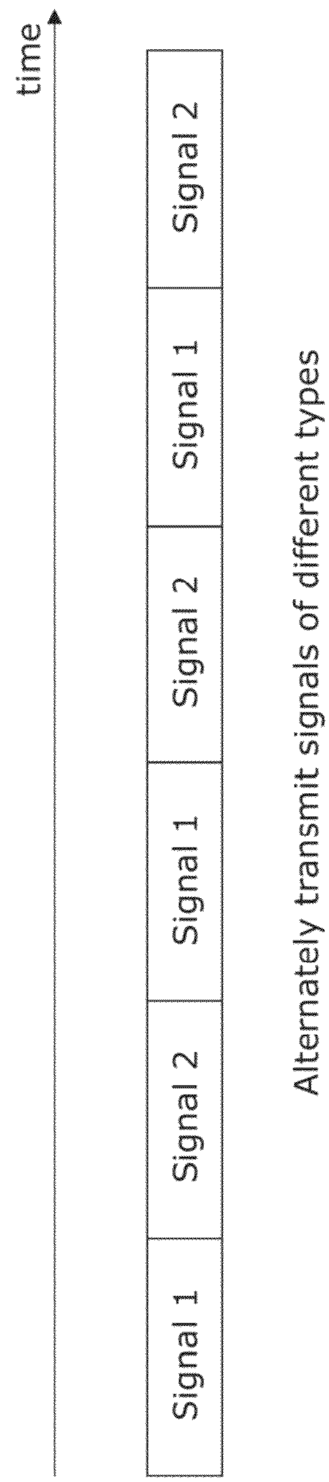

FIG. 365A is a diagram illustrating an example of operation of a transmitter in Embodiment 14.

Figure 365B:
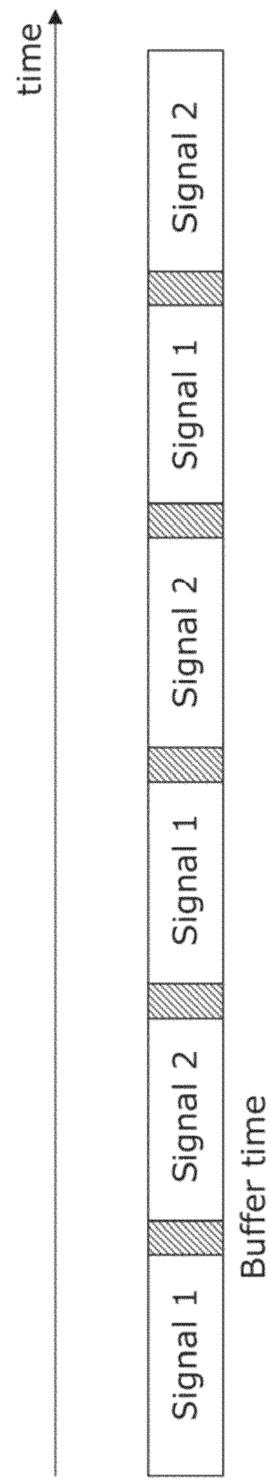

FIG. 365B is a diagram illustrating another example of operation of a transmitter in Embodiment 14.

Figure 366:
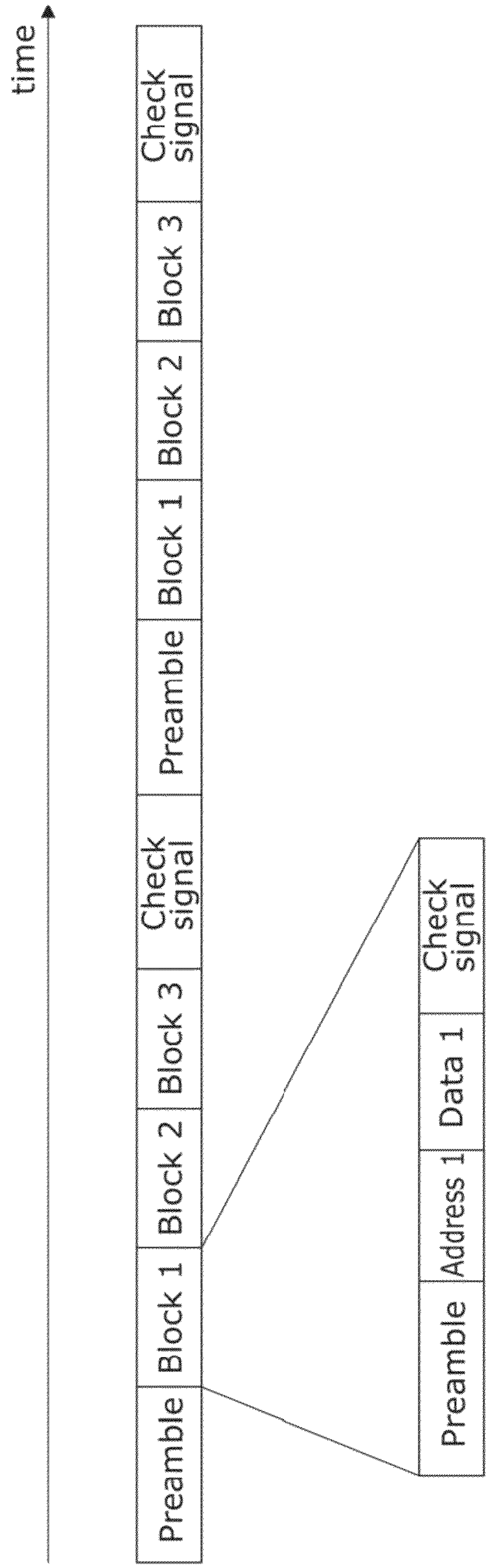

FIG. 366 is a diagram illustrating another example of operation of a transmitter in Embodiment 14.

Figure 367:
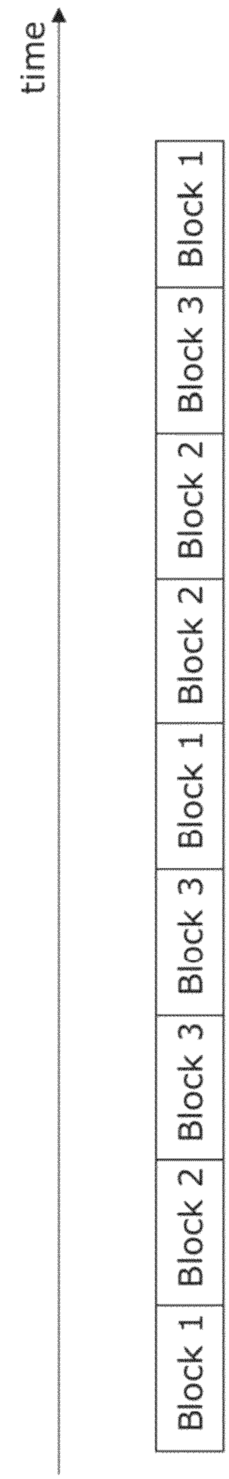

FIG. 367 is a diagram illustrating another example of operation of a transmitter in Embodiment 14.

Figure 368:
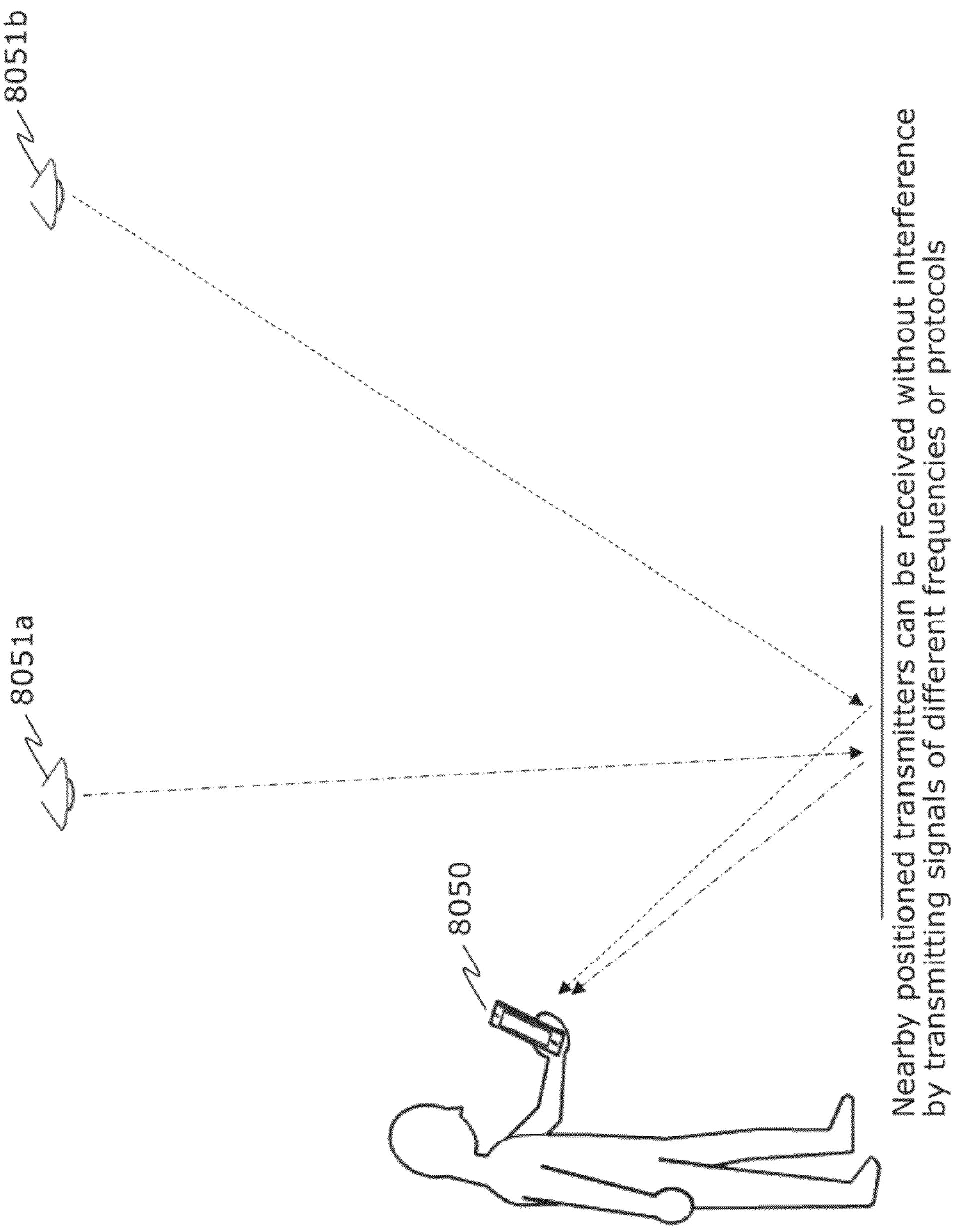

FIG. 368 is a diagram illustrating an example of communication form between a plurality of transmitters and a receiver in Embodiment 14.

Figure 369:
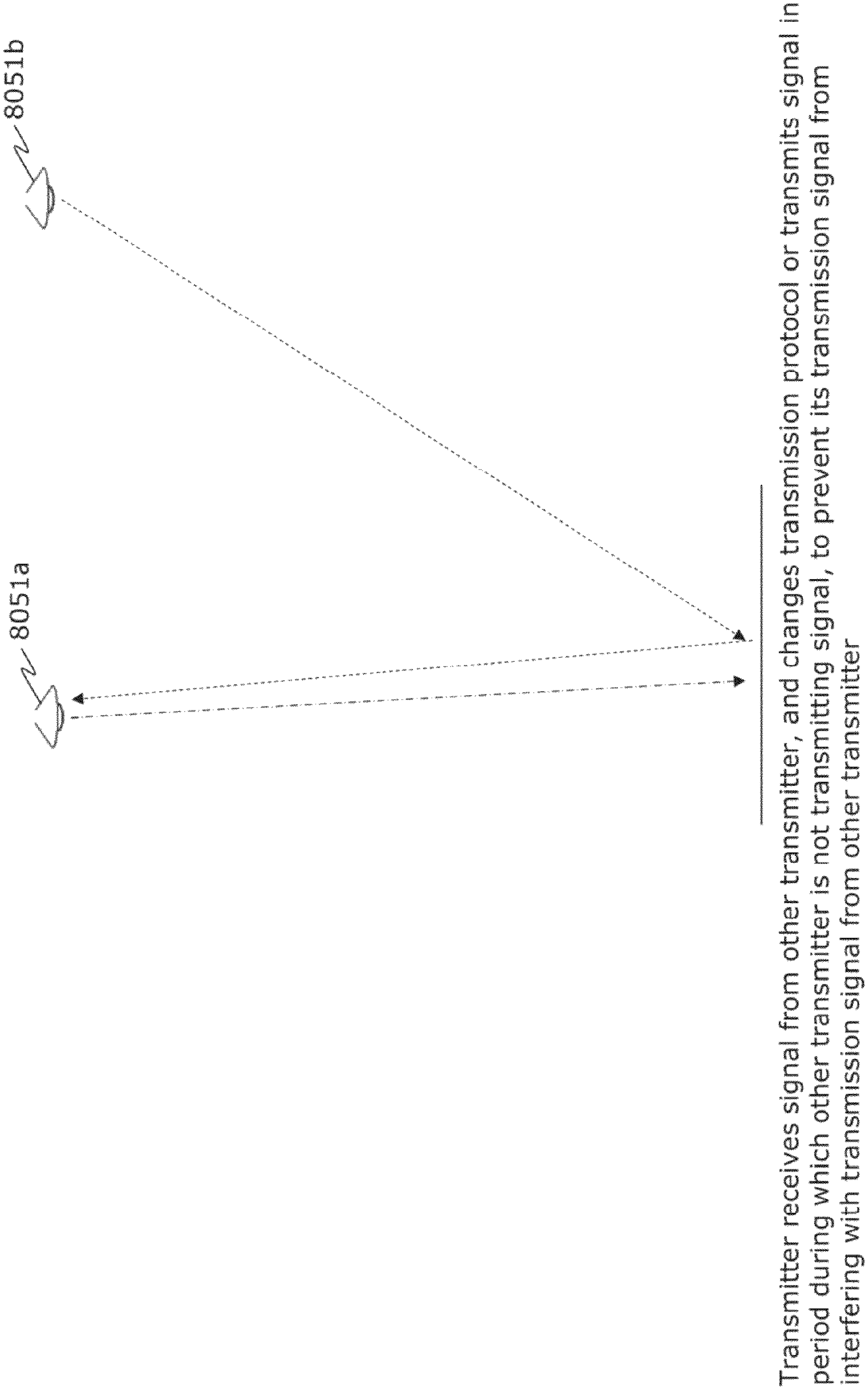

FIG. 369 is a diagram illustrating an example of operation of a plurality of transmitters in Embodiment 14.

Figure 370:
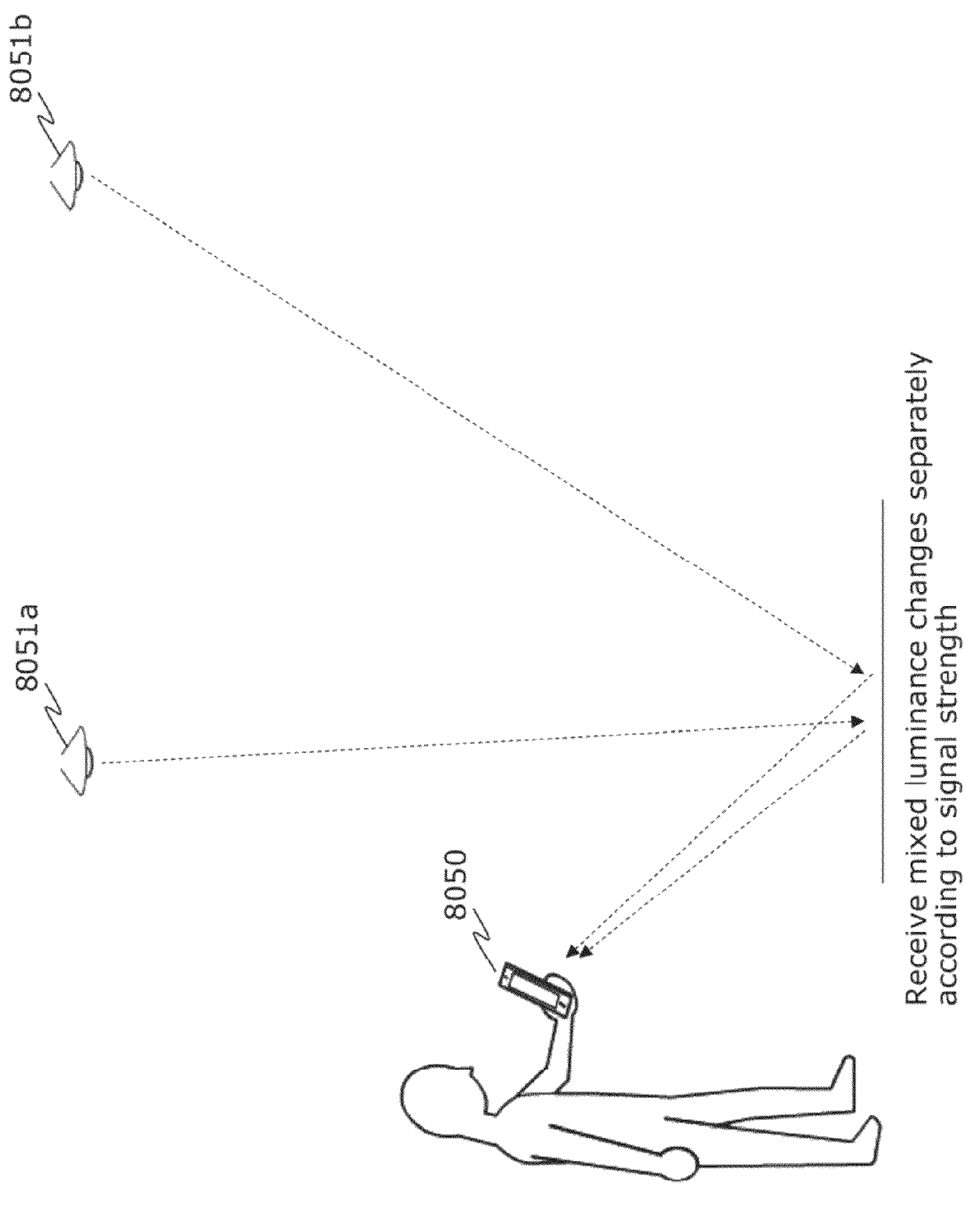

FIG. 370 is a diagram illustrating another example of communication form between a plurality of transmitters and a receiver in Embodiment 14.

Figure 371:
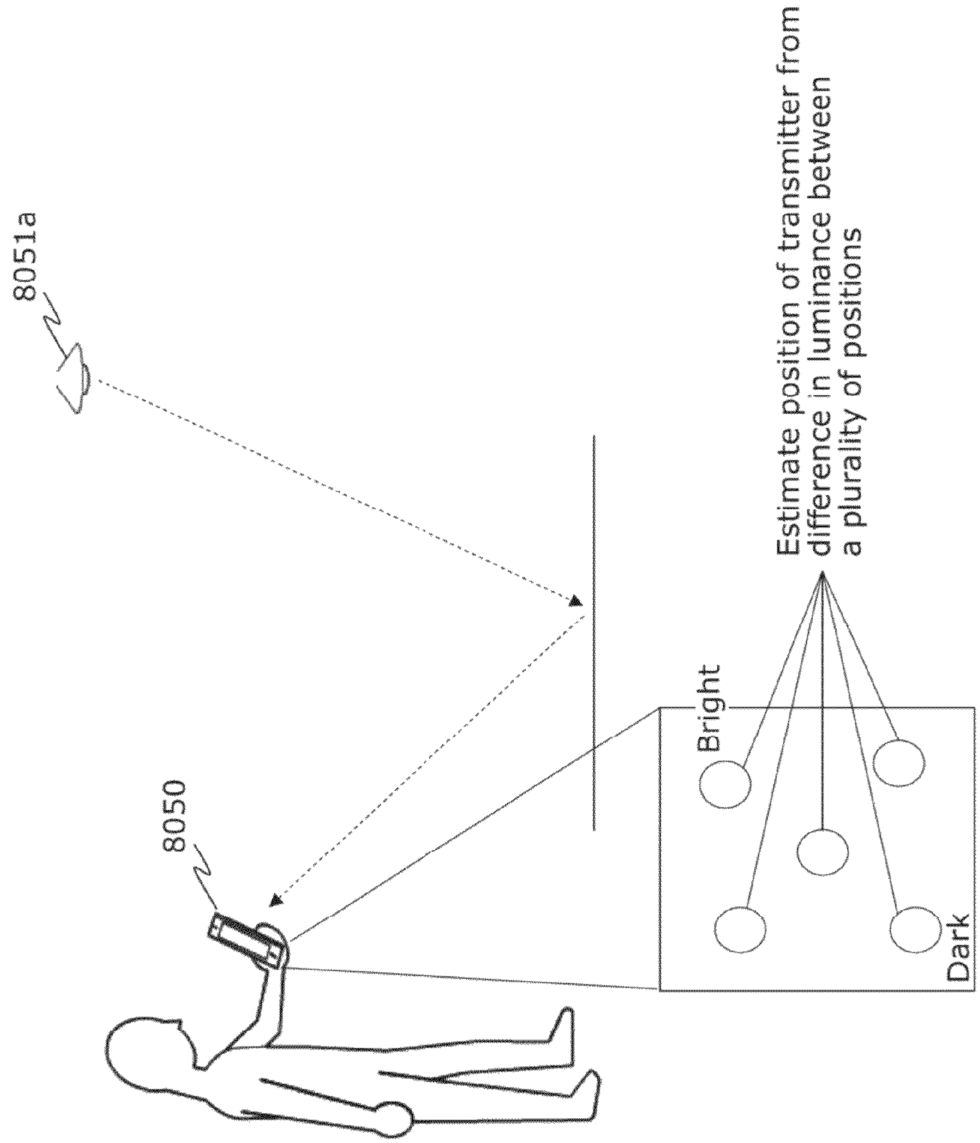

FIG. 371 is a diagram illustrating another example of operation of a receiver in Embodiment 14.

Figure 372:
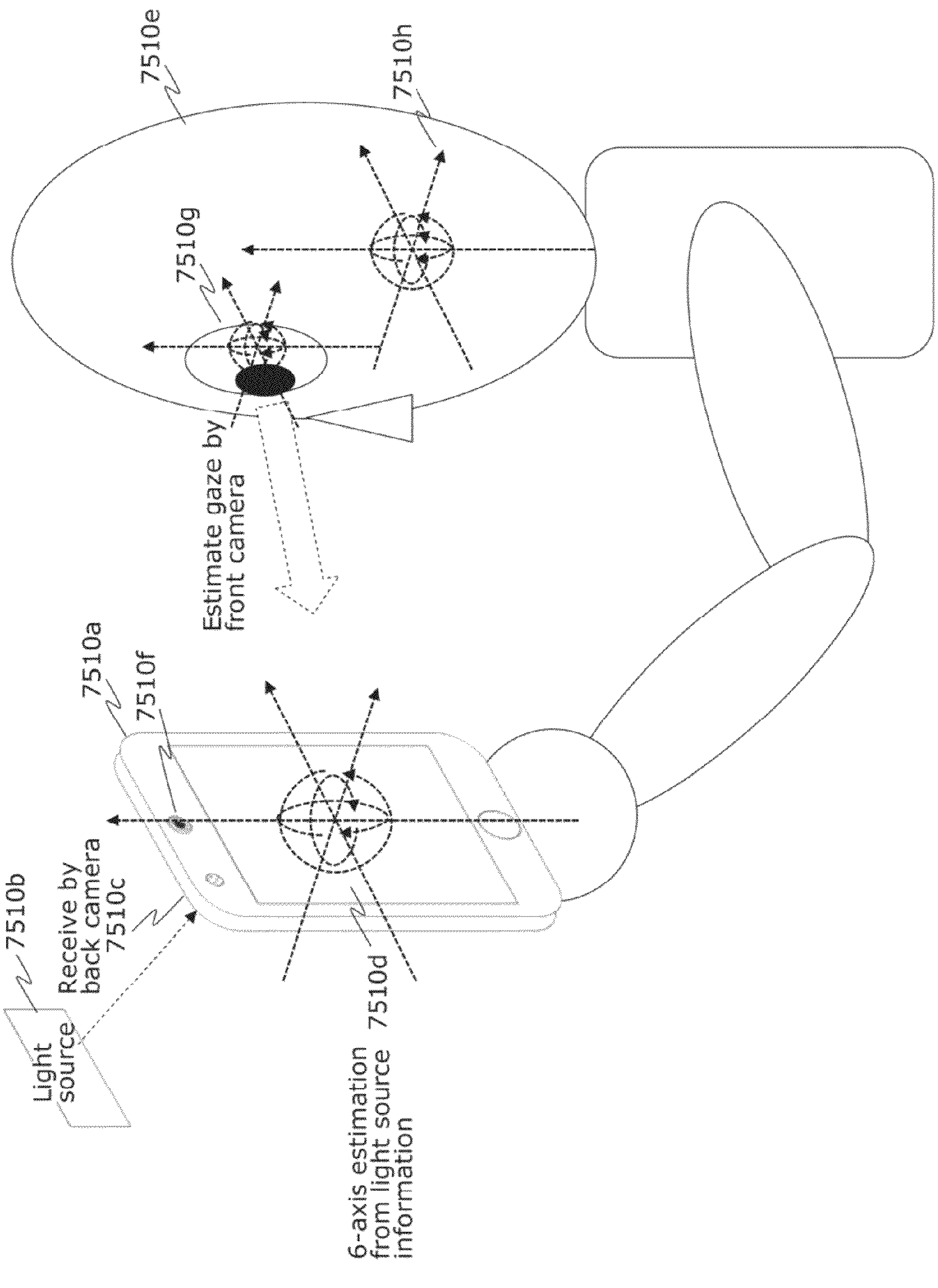

FIG. 372 is a diagram illustrating an example of application of a receiver in Embodiment 14.

Figure 373:
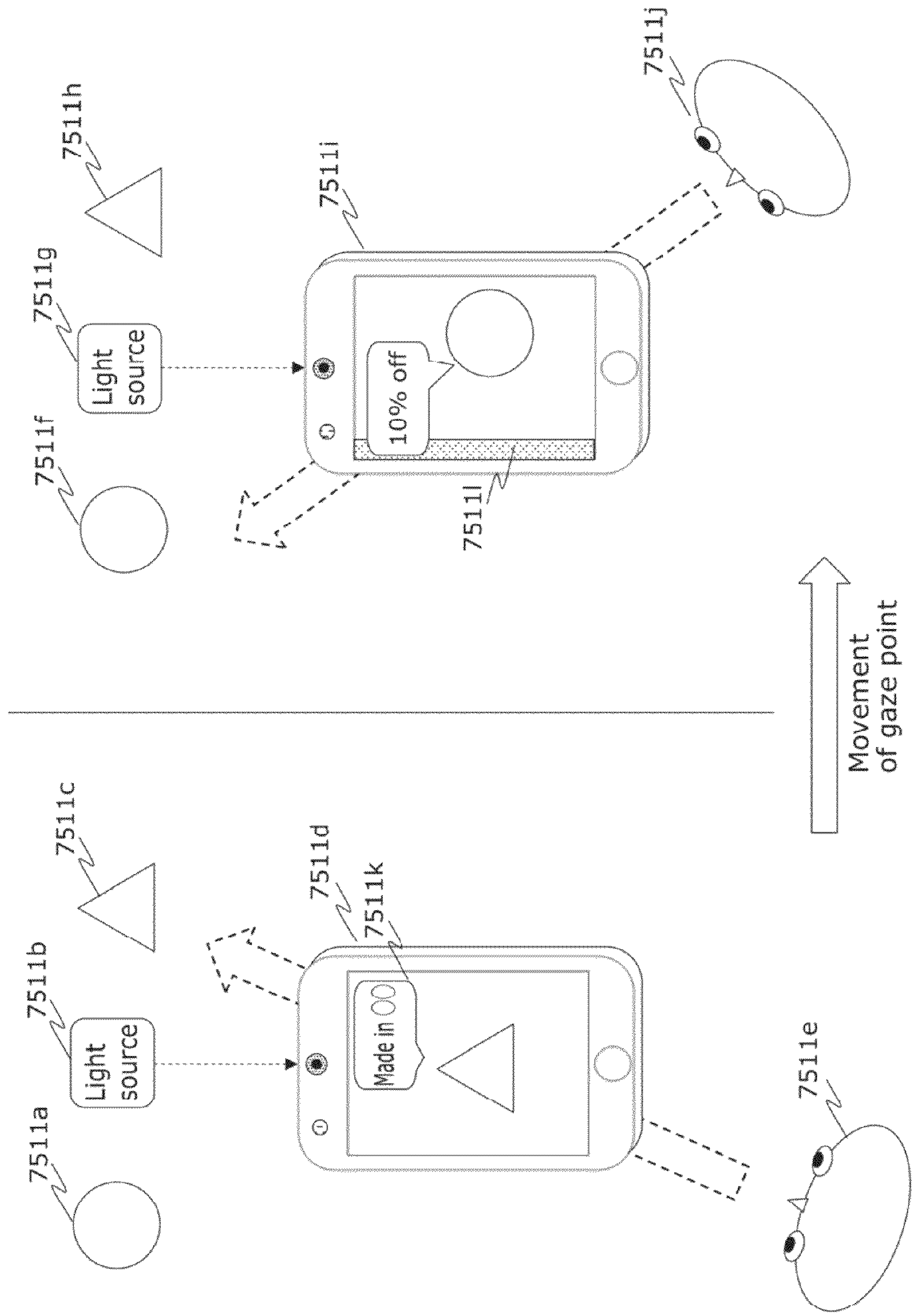

FIG. 373 is a diagram illustrating an example of application of a receiver in Embodiment 14.

Figure 374:
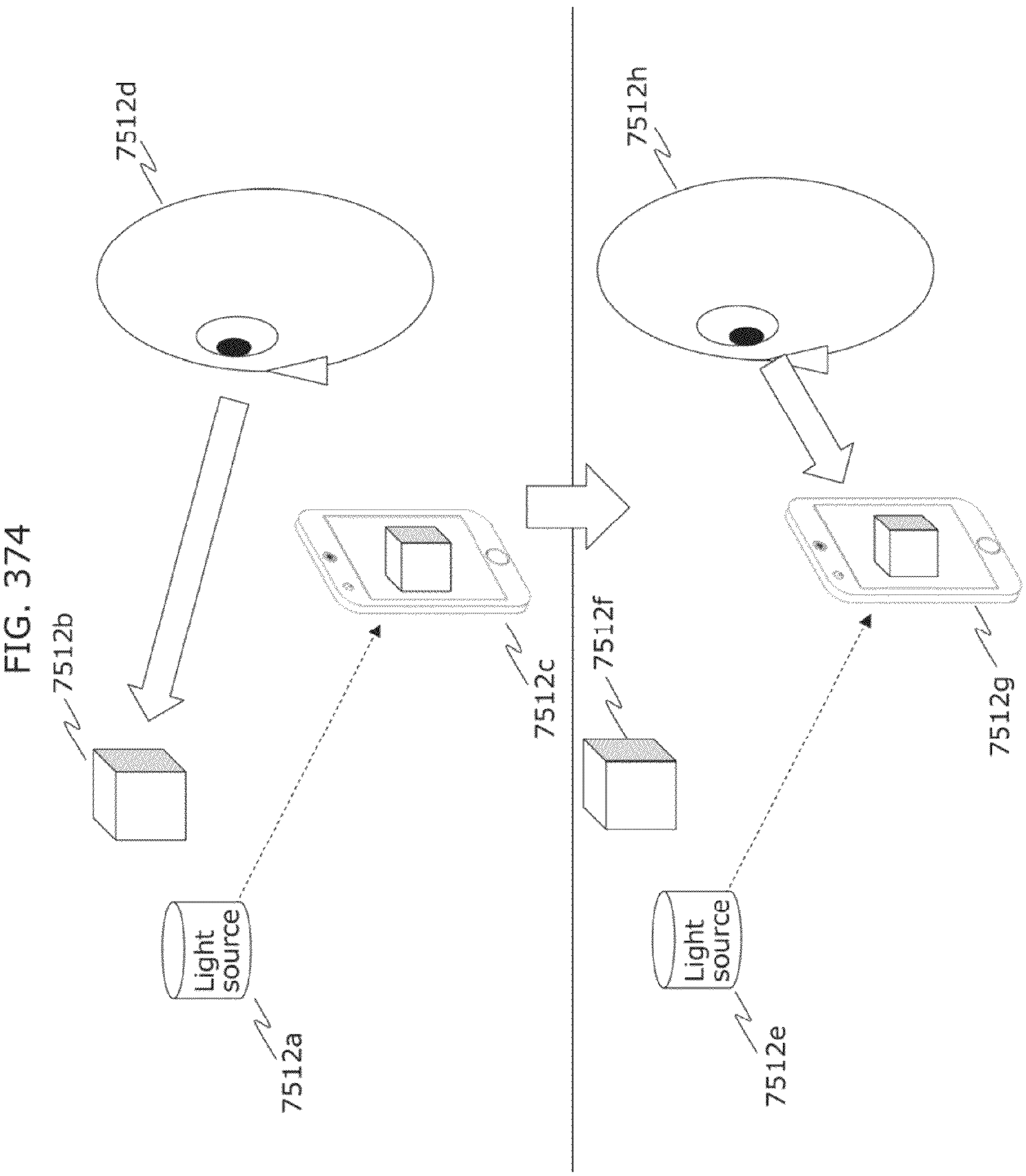

FIG. 374 is a diagram illustrating an example of application of a receiver in Embodiment 14.

Figure 375:
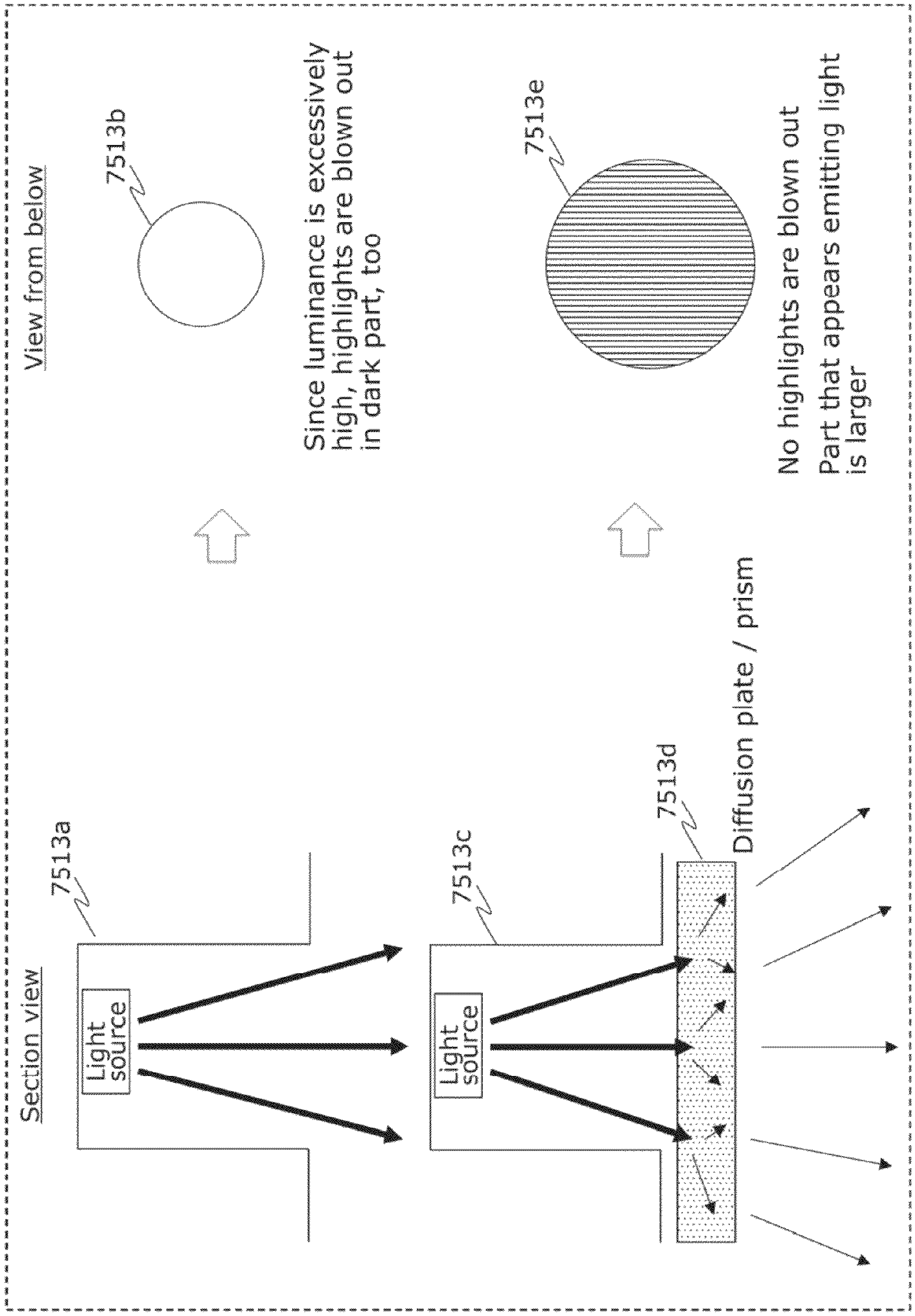

FIG. 375 is a diagram illustrating an example of application of a transmitter in Embodiment 14.

Figure 376:
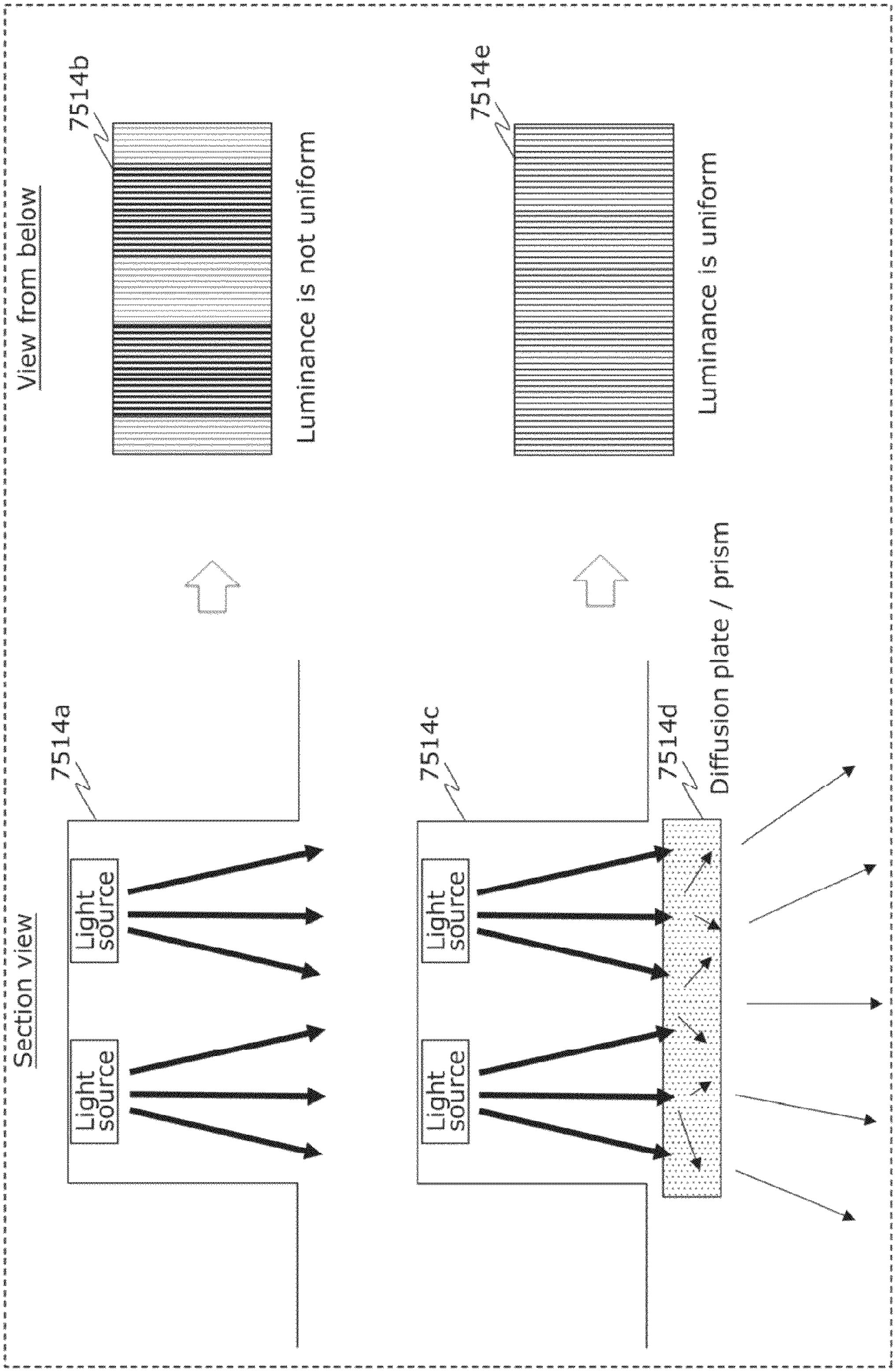

FIG. 376 is a diagram illustrating an example of application of a transmitter in Embodiment 14.

Figure 377:
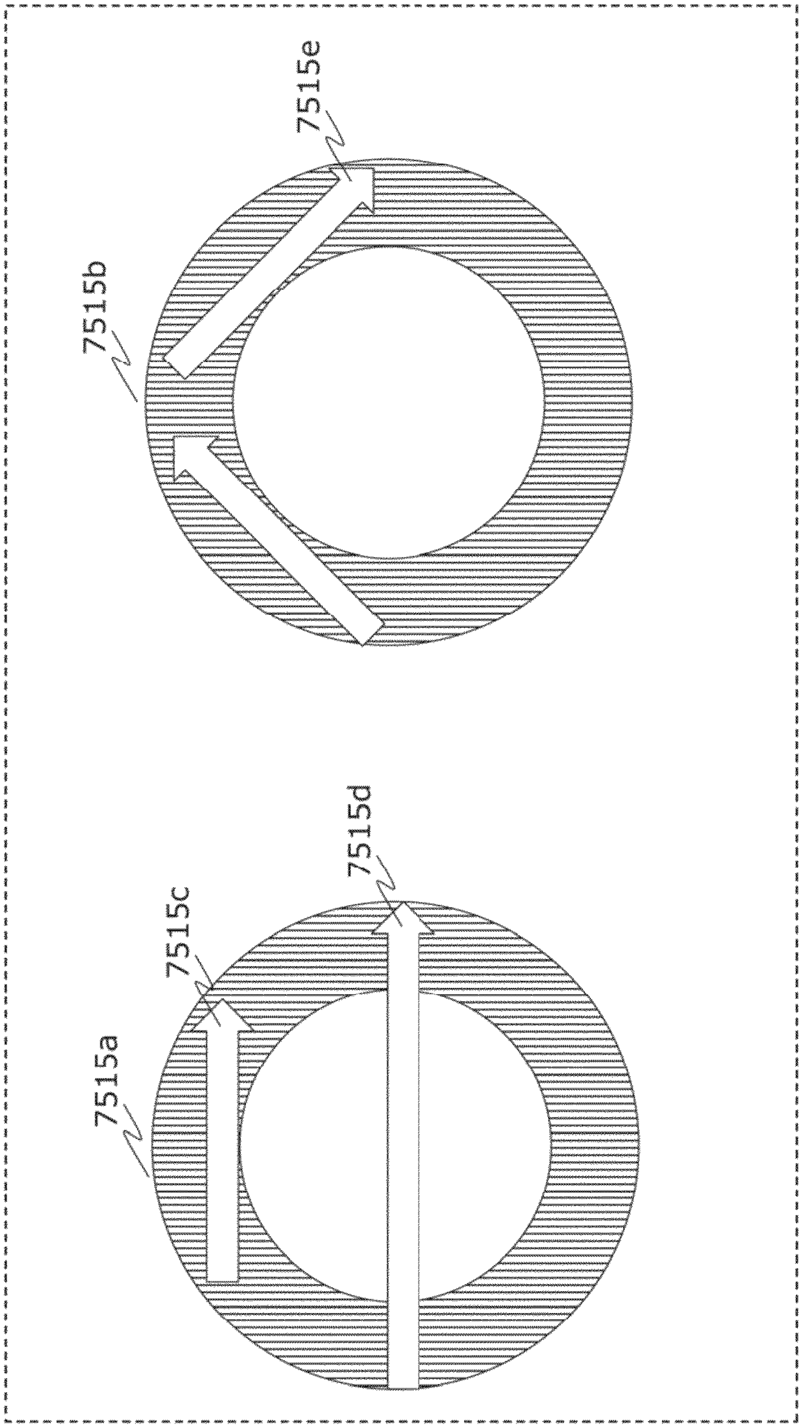

FIG. 377 is a diagram illustrating an example of application of a reception method in Embodiment 14.

Figure 378:
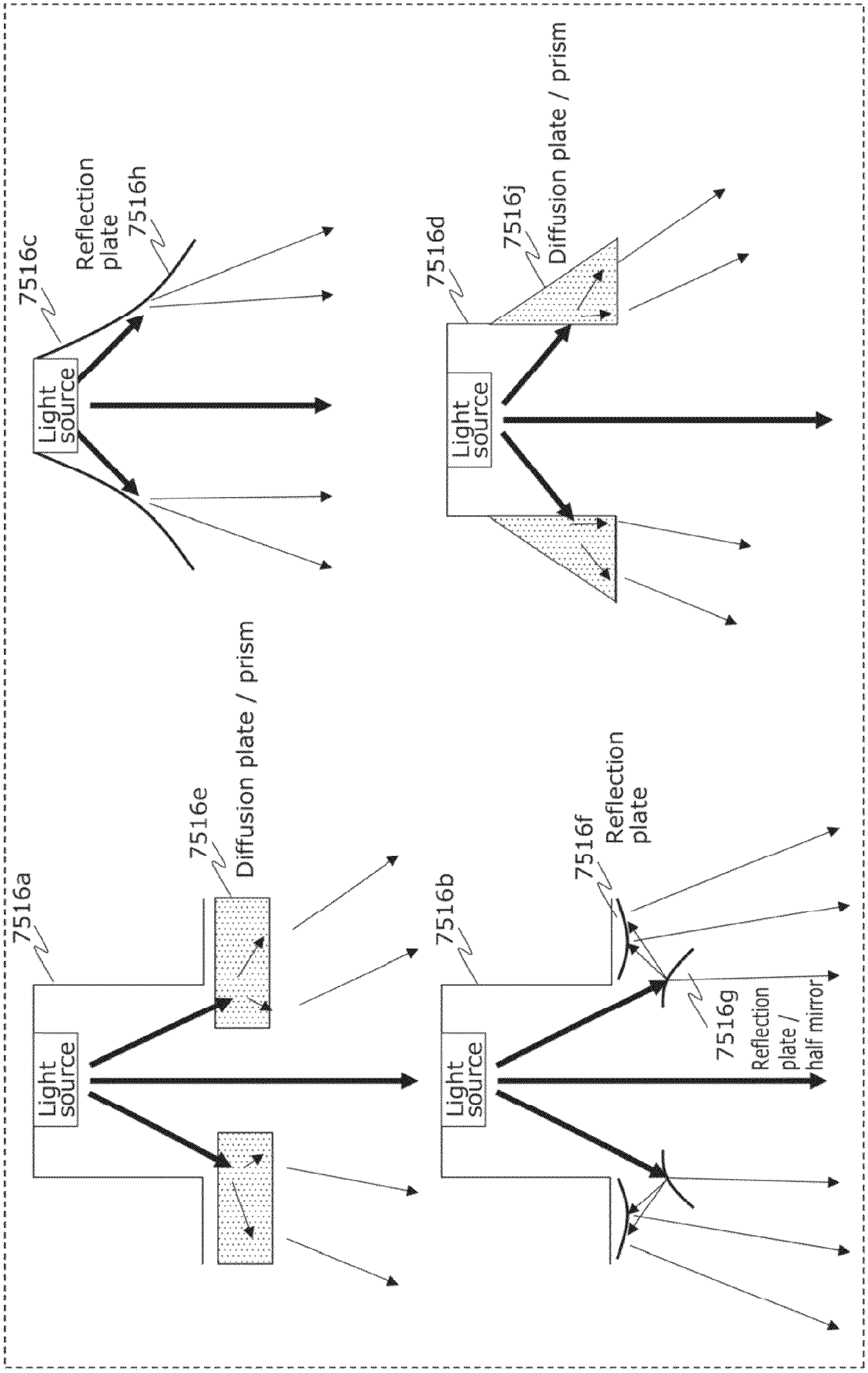

FIG. 378 is a diagram illustrating an example of application of a transmitter in Embodiment 14.

Figure 379:
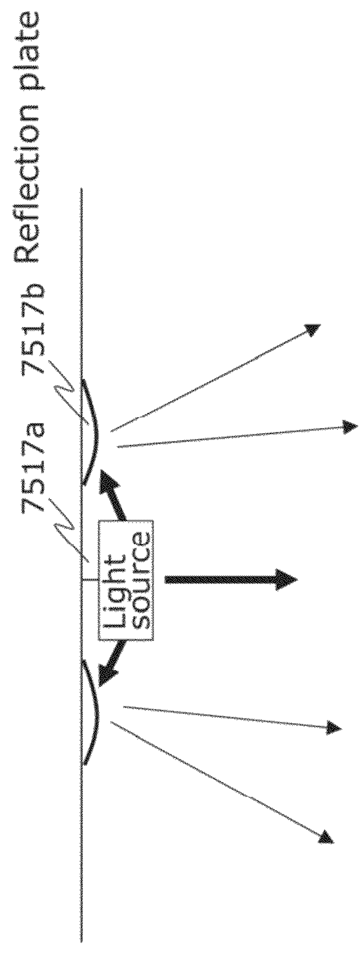

FIG. 379 is a diagram illustrating an example of application of a transmitter in Embodiment 14.

Figure 380:
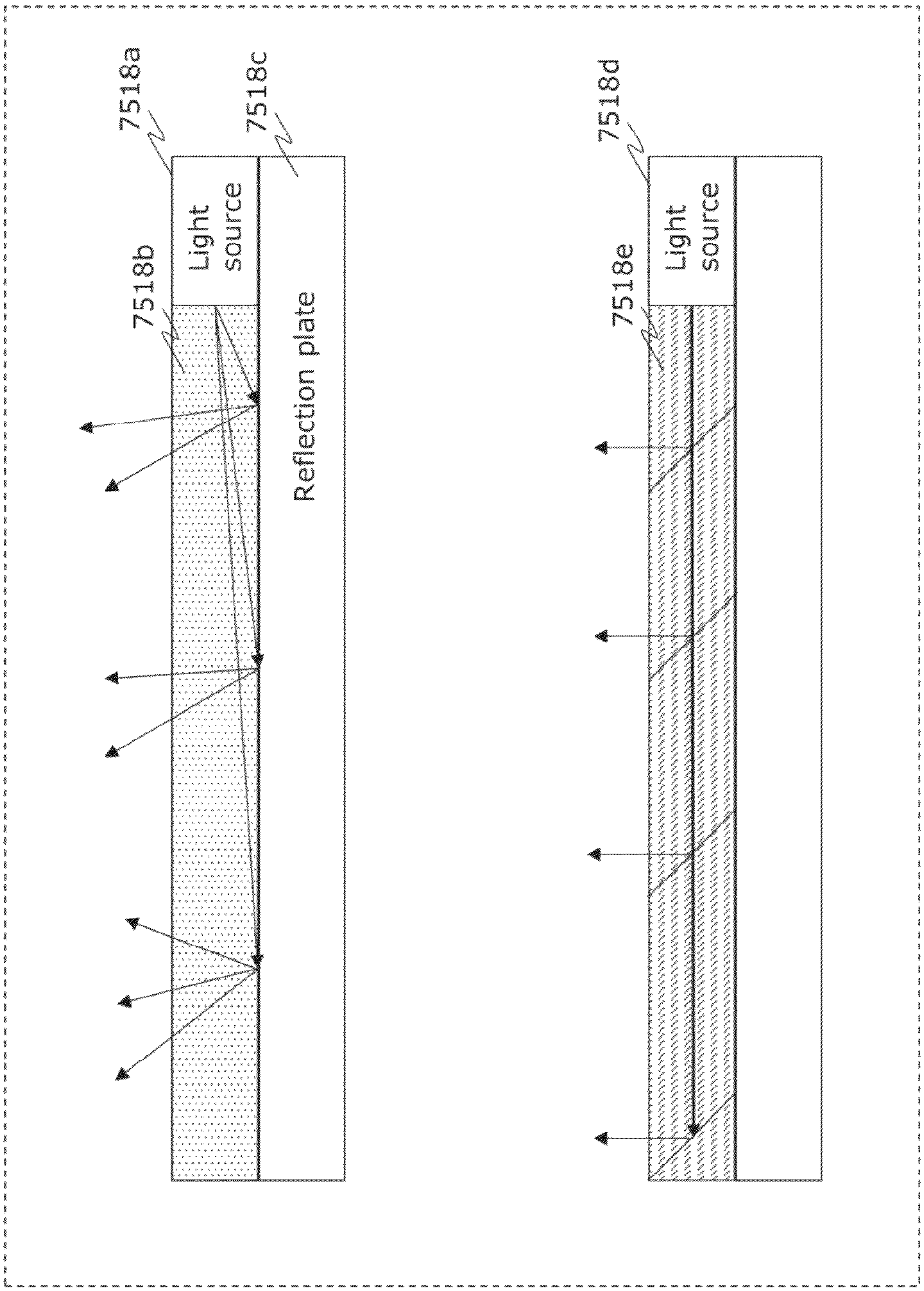

FIG. 380 is a diagram illustrating an example of application of a transmitter in Embodiment 14.

Figure 381:
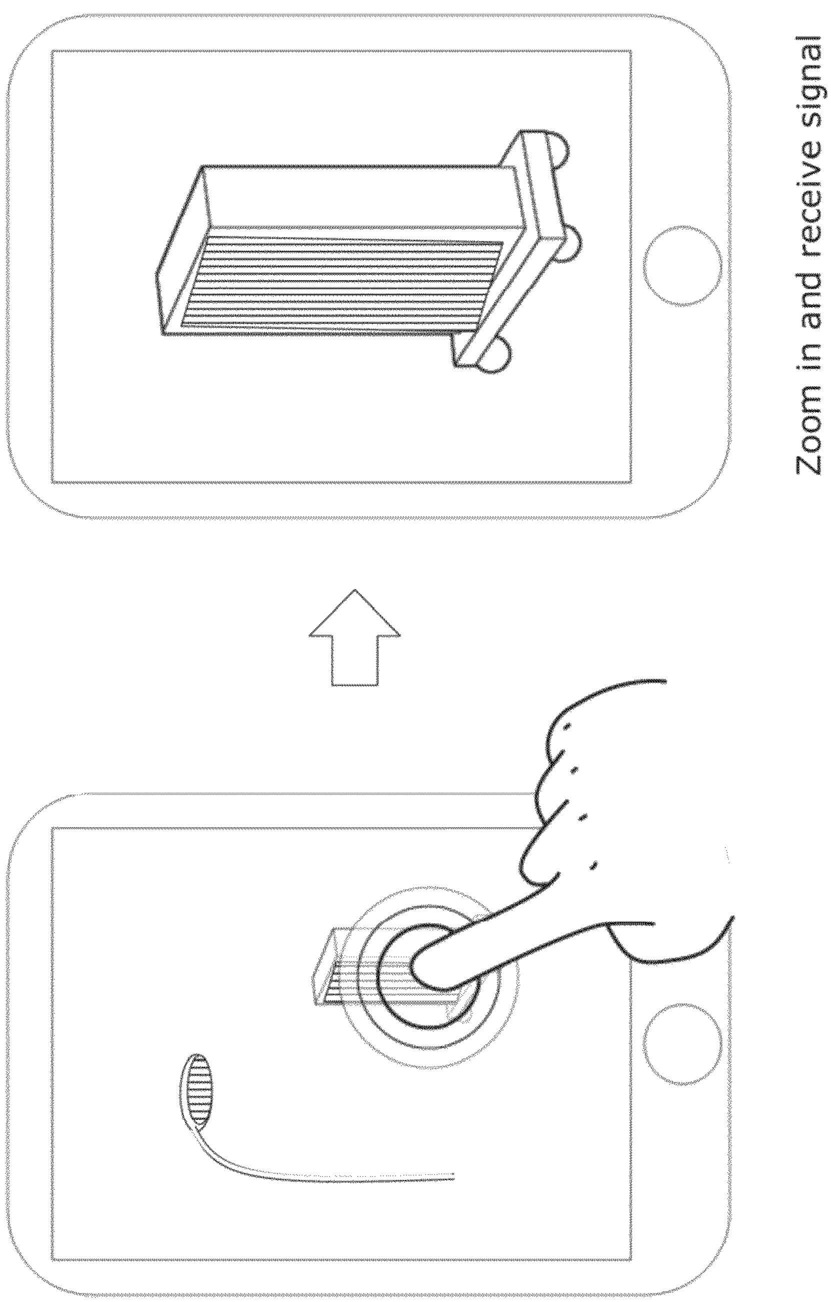

FIG. 381 is a diagram illustrating another example of operation of a receiver in Embodiment 14.

Figure 382:
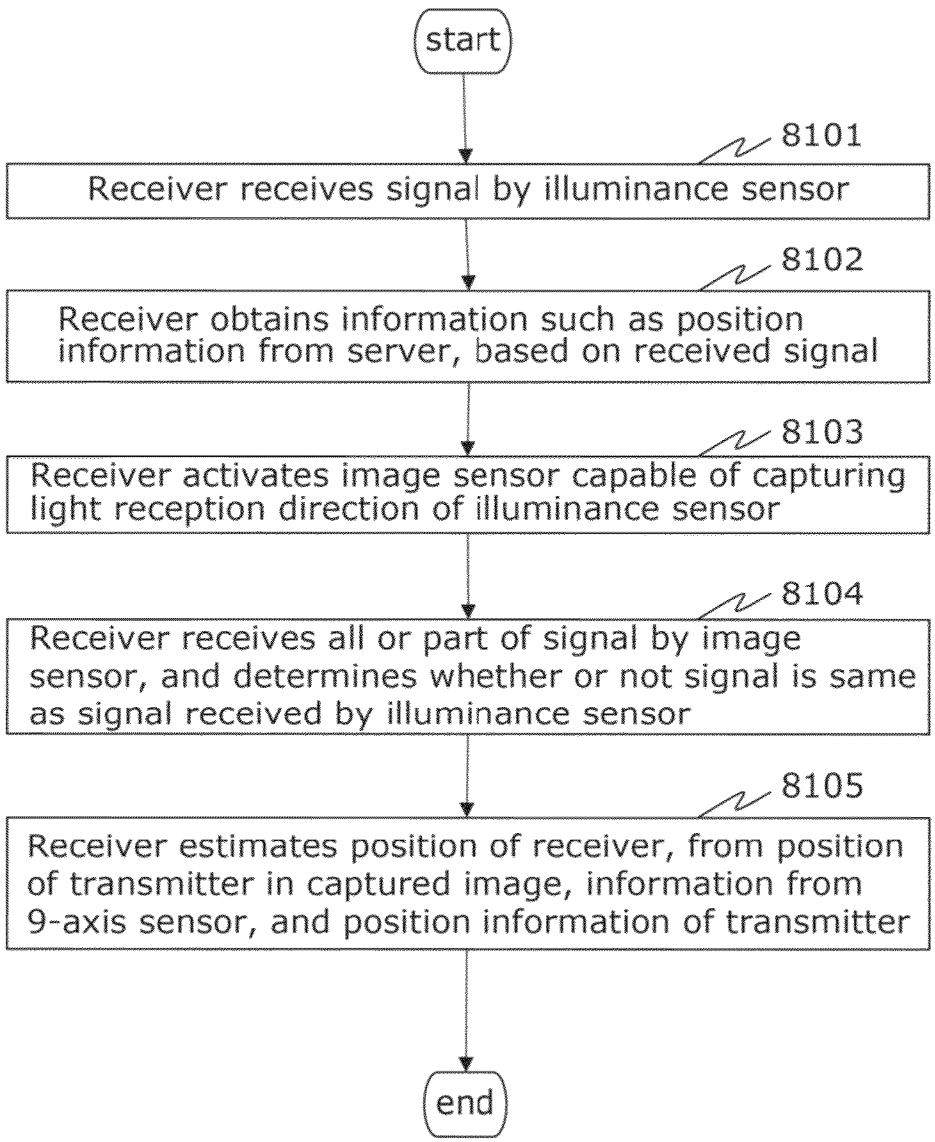

FIG. 382 is a flowchart illustrating an example of operation of a receiver in Embodiment 15.

Figure 383:
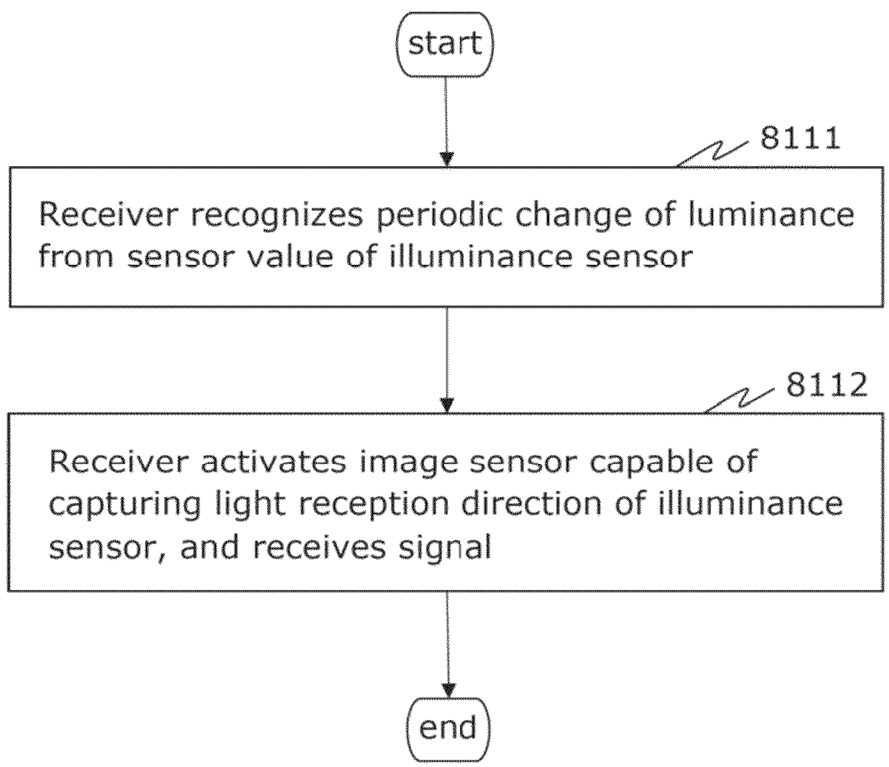

FIG. 383 is a flowchart illustrating another example of operation of a receiver in Embodiment 15.

Figure 384A:
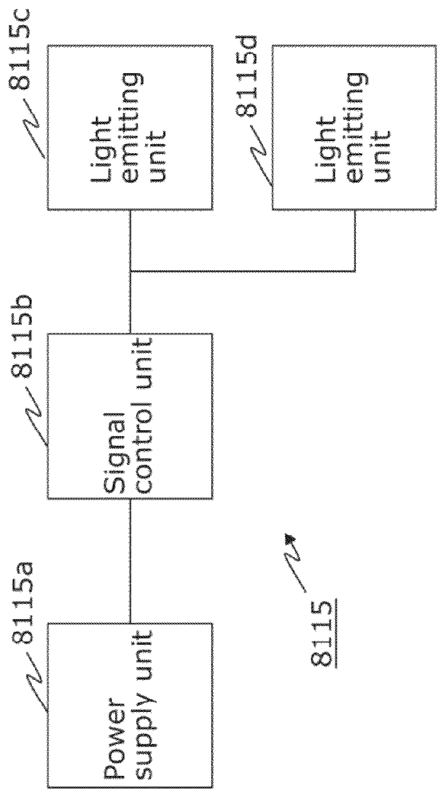

FIG. 384A is a block diagram illustrating an example of a transmitter in Embodiment 15.

Figure 384B:
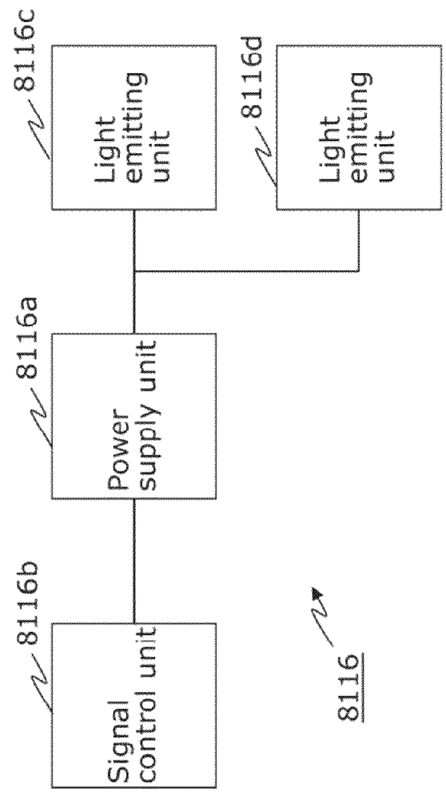

FIG. 384B is a block diagram illustrating another example of a transmitter in Embodiment 15.

Figure 385:
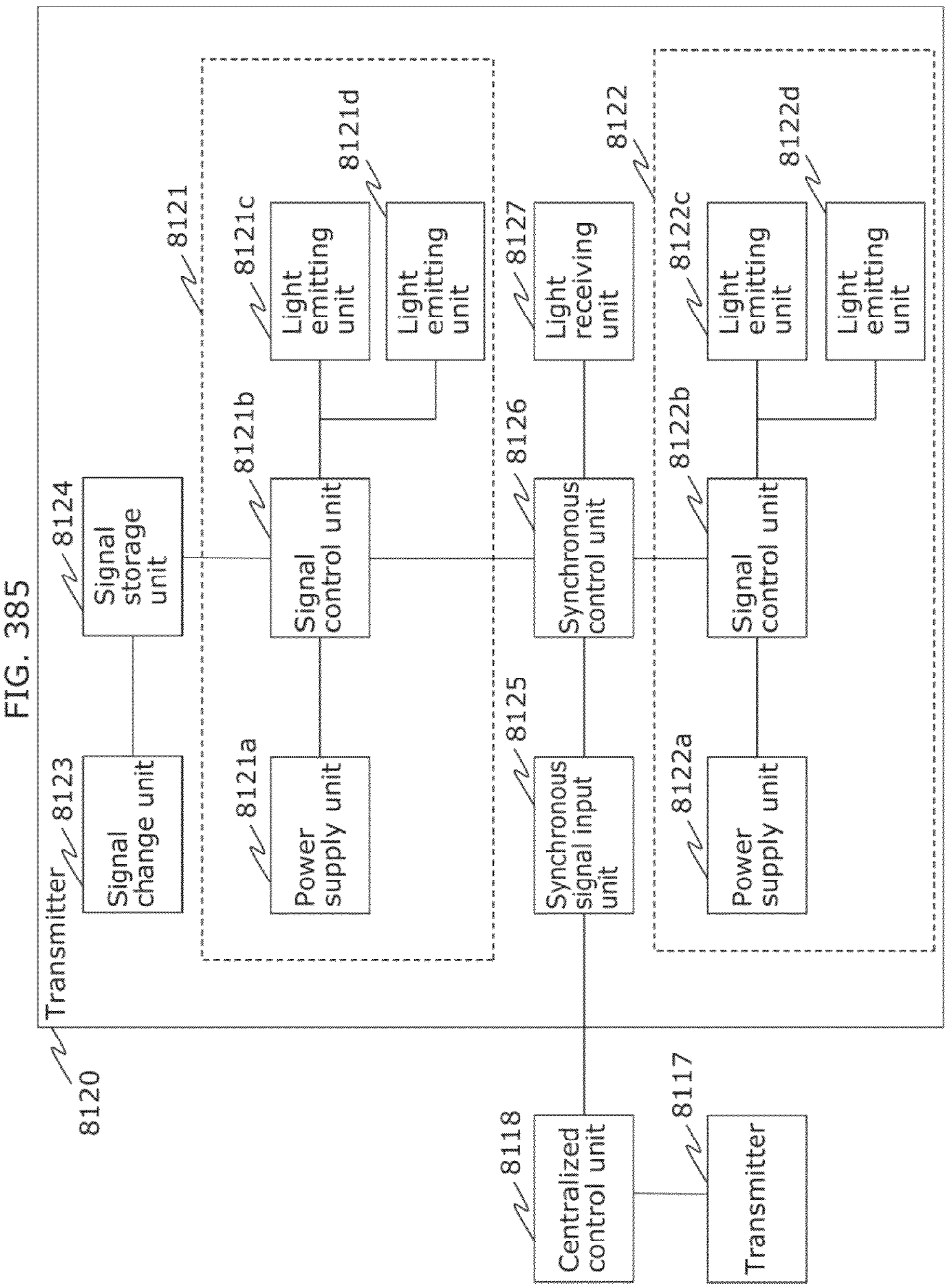

FIG. 385 is a diagram illustrating an example of a structure of a system including a plurality of transmitters in Embodiment 15.

Figure 386:
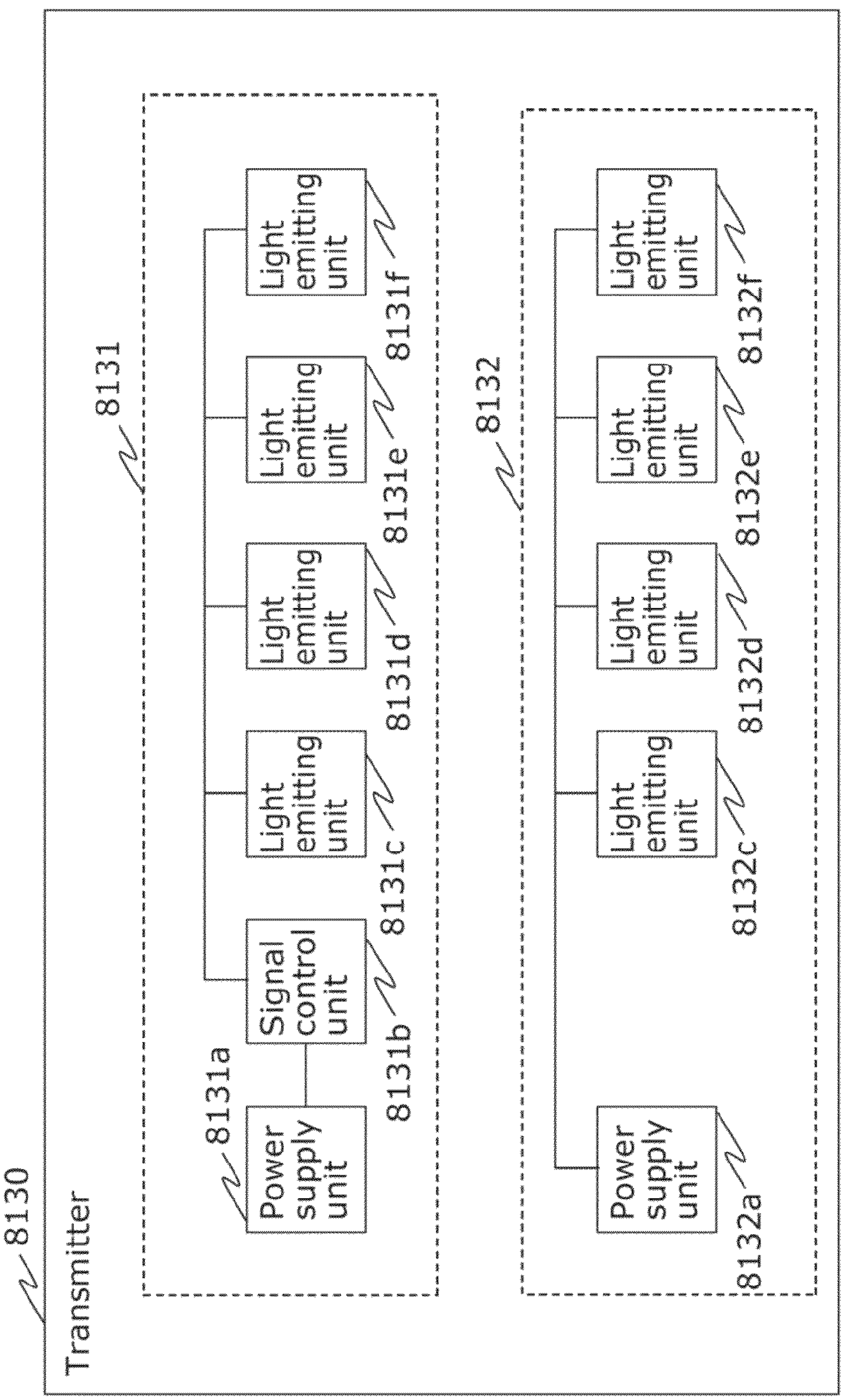

FIG. 386 is a block diagram illustrating another example of a transmitter in Embodiment 15.

Figure 387A:
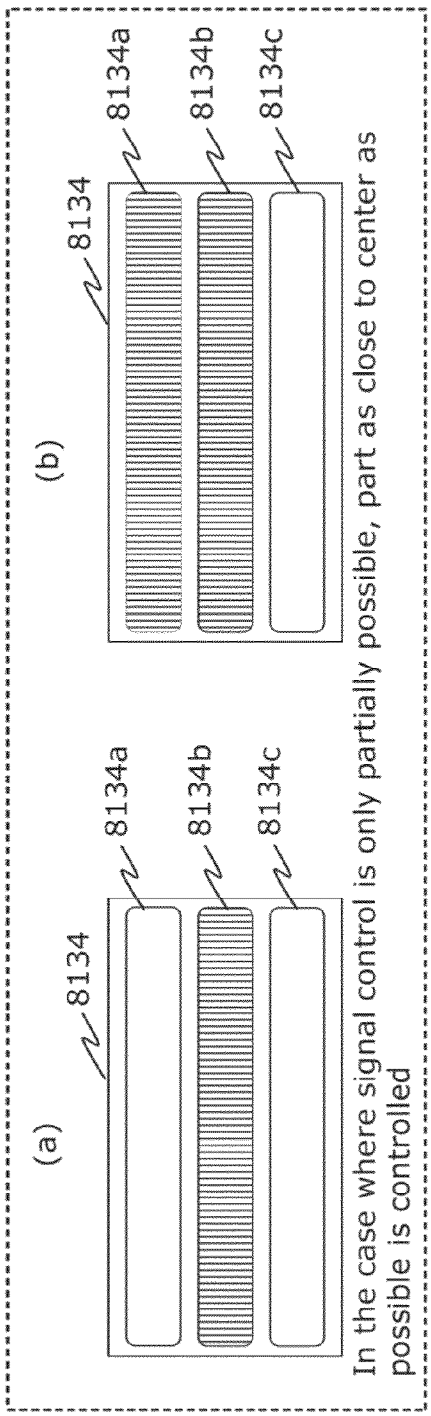

FIG. 387A is a diagram illustrating an example of a transmitter in Embodiment 15.

Figure 387B:
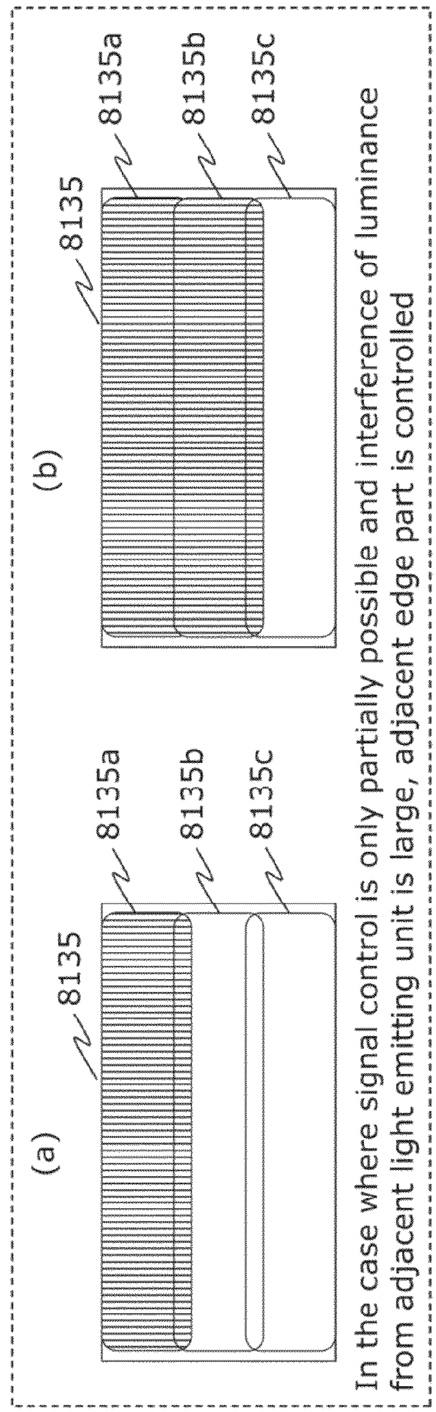

FIG. 387B is a diagram illustrating an example of a transmitter in Embodiment 15.

Figure 387C:
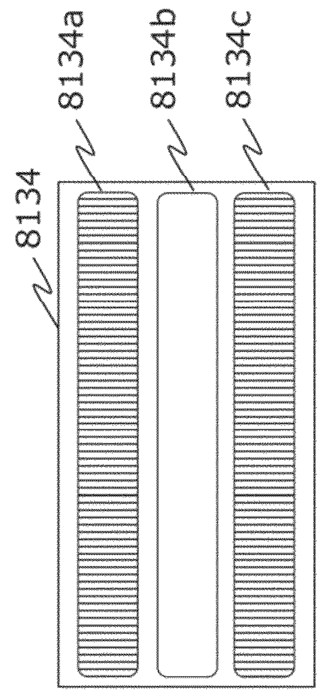

FIG. 387C is a diagram illustrating an example of a transmitter in Embodiment 15.

Figure 388A:
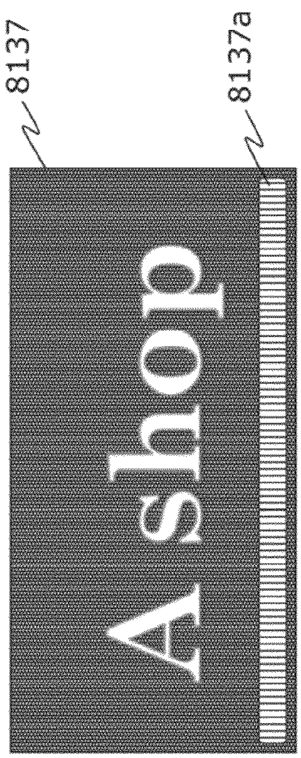

FIG. 388A is a diagram illustrating an example of a transmitter in Embodiment 15.

Figure 388B:
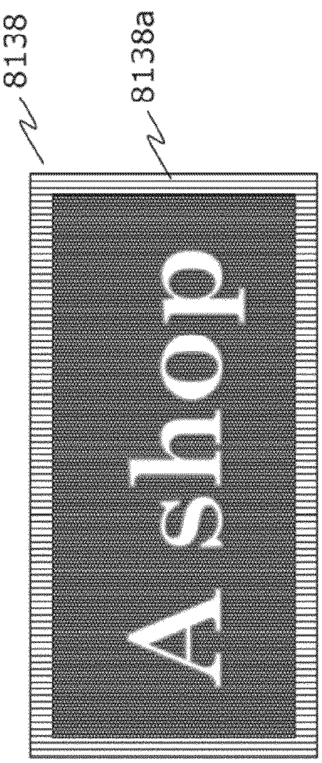

FIG. 388B is a diagram illustrating an example of a transmitter in Embodiment 15.

Figure 389:
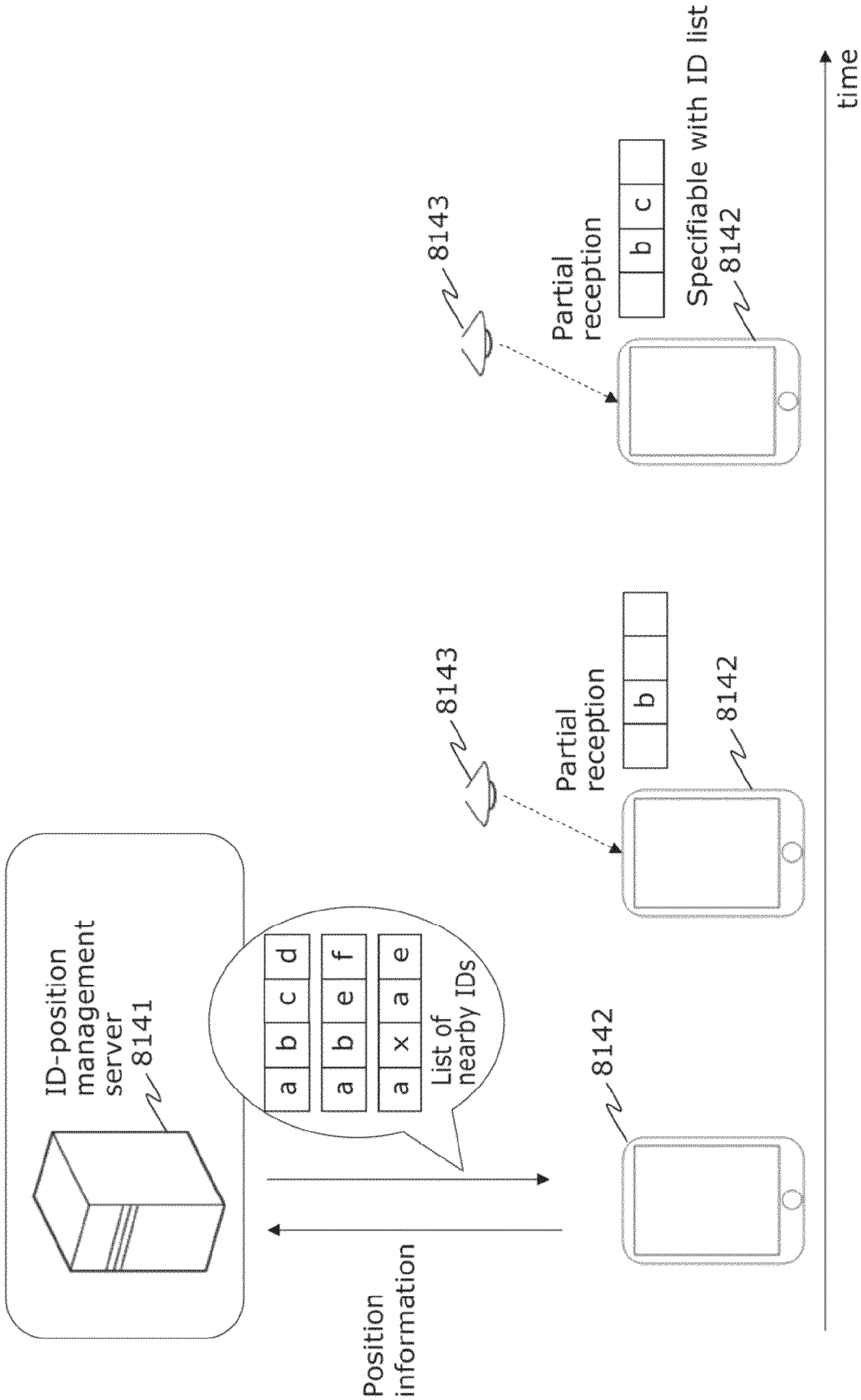

FIG. 389 is a diagram illustrating an example of processing operation of a receiver, a transmitter, and a server in Embodiment 15.

Figure 390:
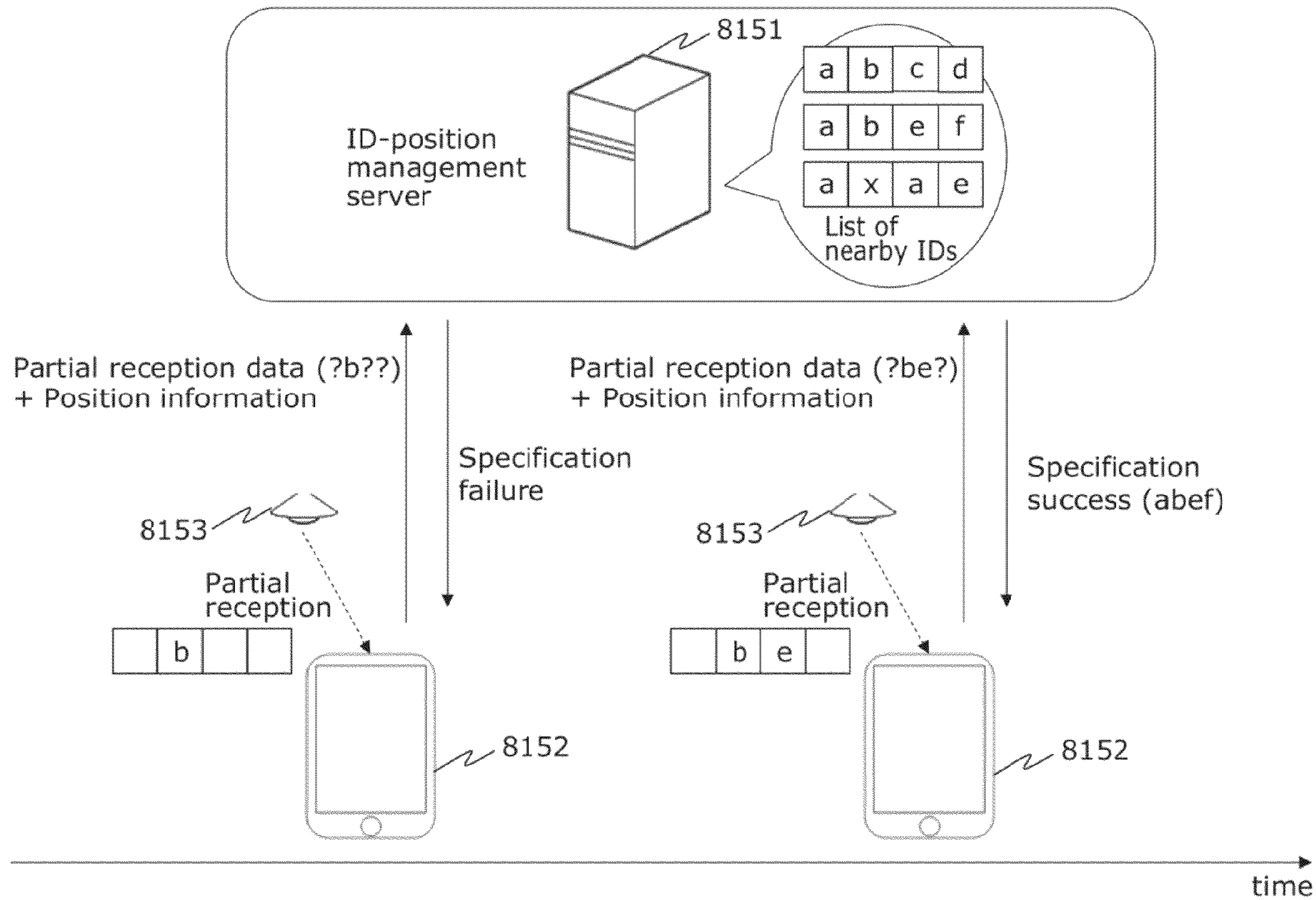

FIG. 390 is a diagram illustrating an example of processing operation of a receiver, a transmitter, and a server in Embodiment 15.

Figure 391:
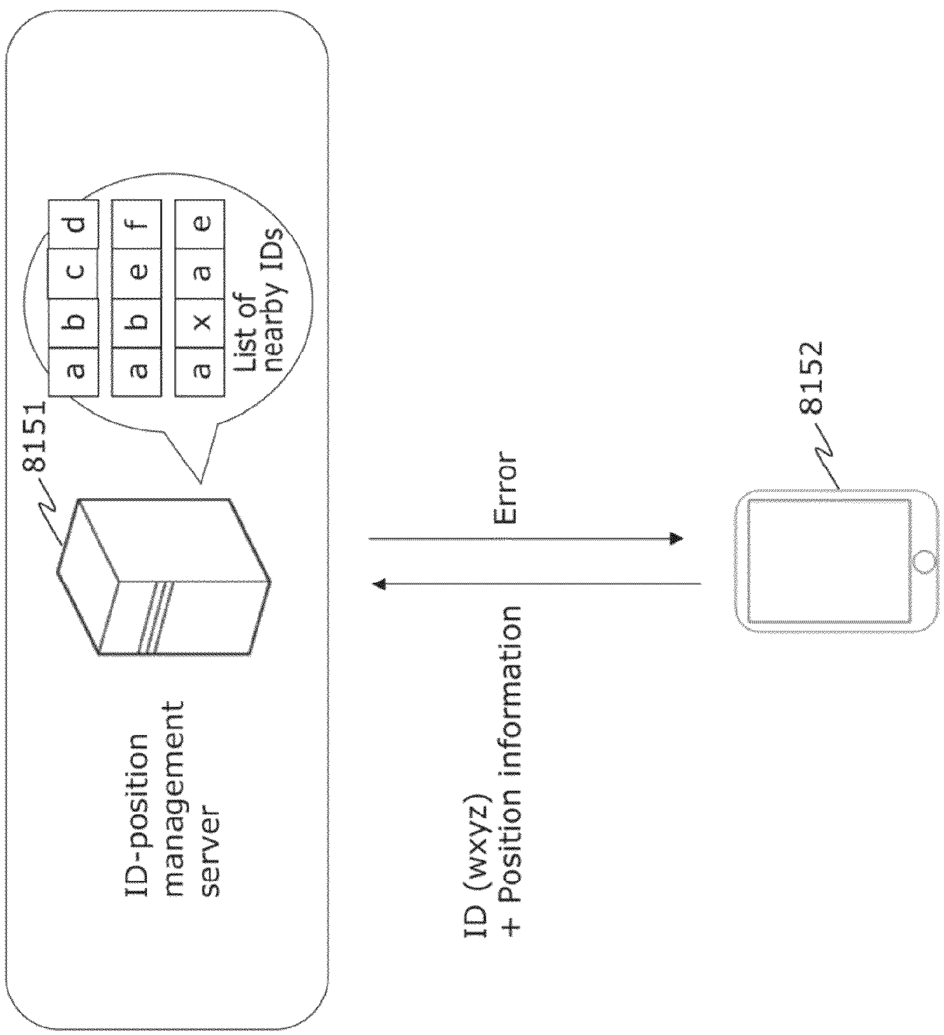

FIG. 391 is a diagram illustrating an example of processing operation of a receiver, a transmitter, and a server in Embodiment 15.

Figure 392B:
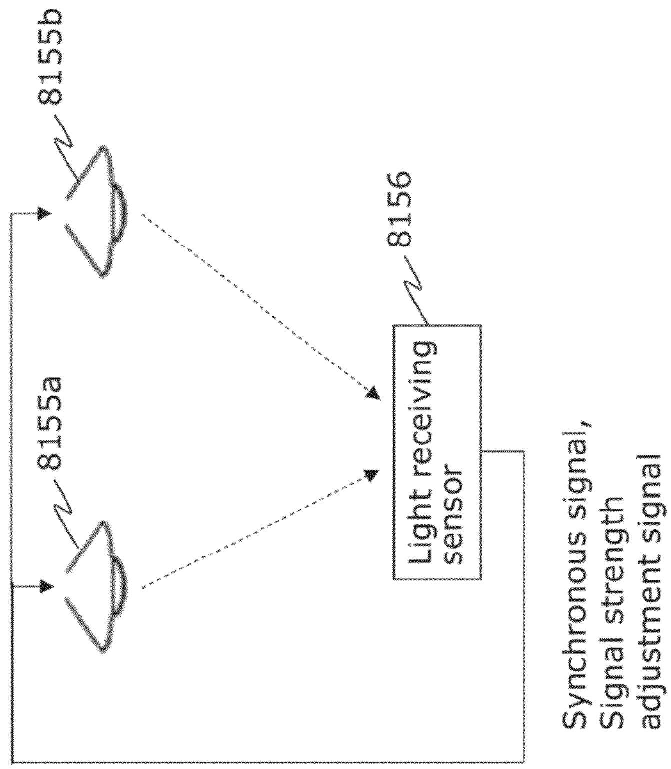
Figure 392A:
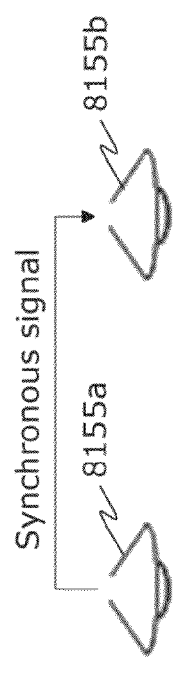

FIG. 392A is a diagram for describing synchronization between a plurality of transmitters in Embodiment 15.

FIG. 392B is a diagram for describing synchronization between a plurality of transmitters in Embodiment 15.

Figure 393:
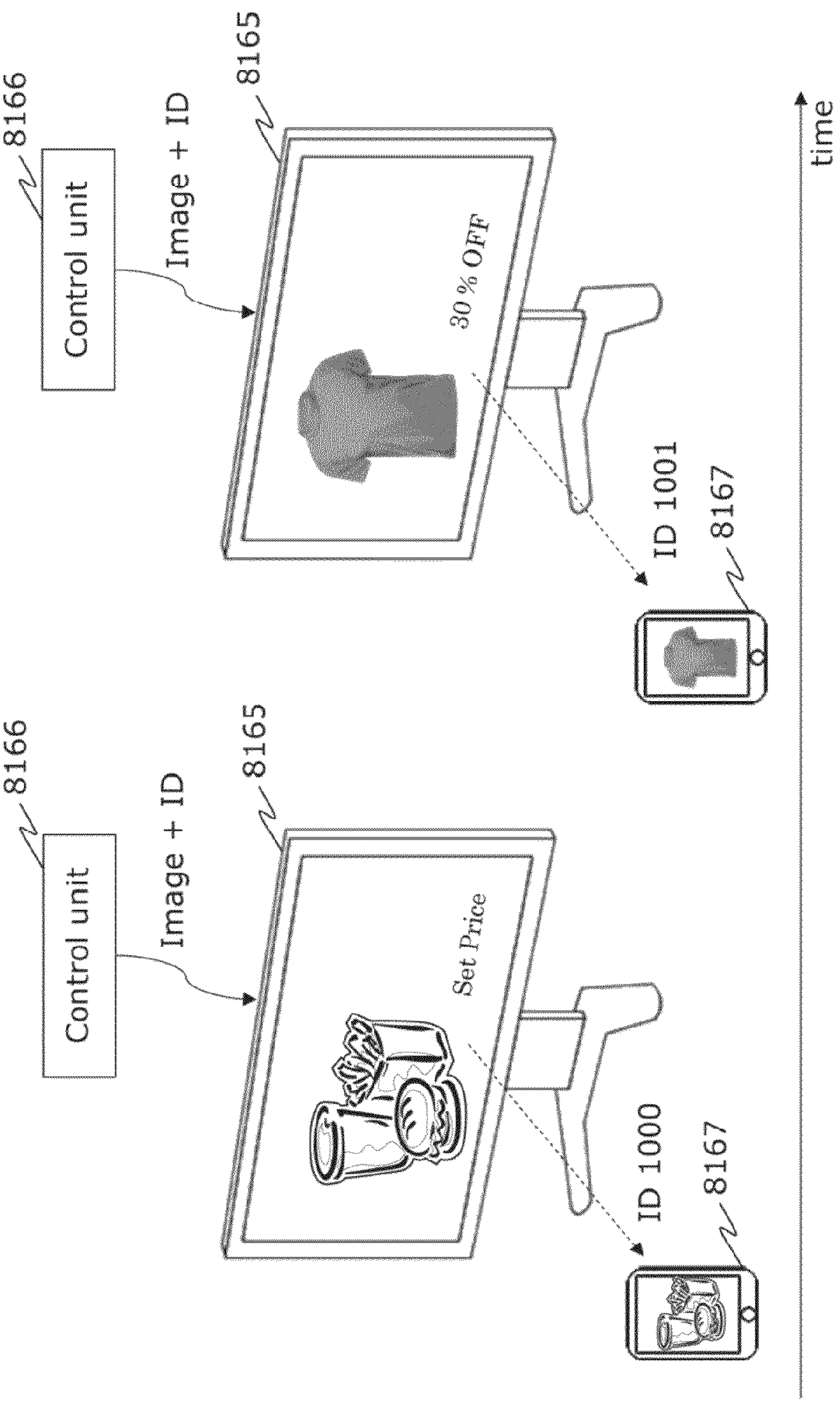

FIG. 393 is a diagram illustrating an example of operation of a transmitter and a receiver in Embodiment 15.

Figure 394:
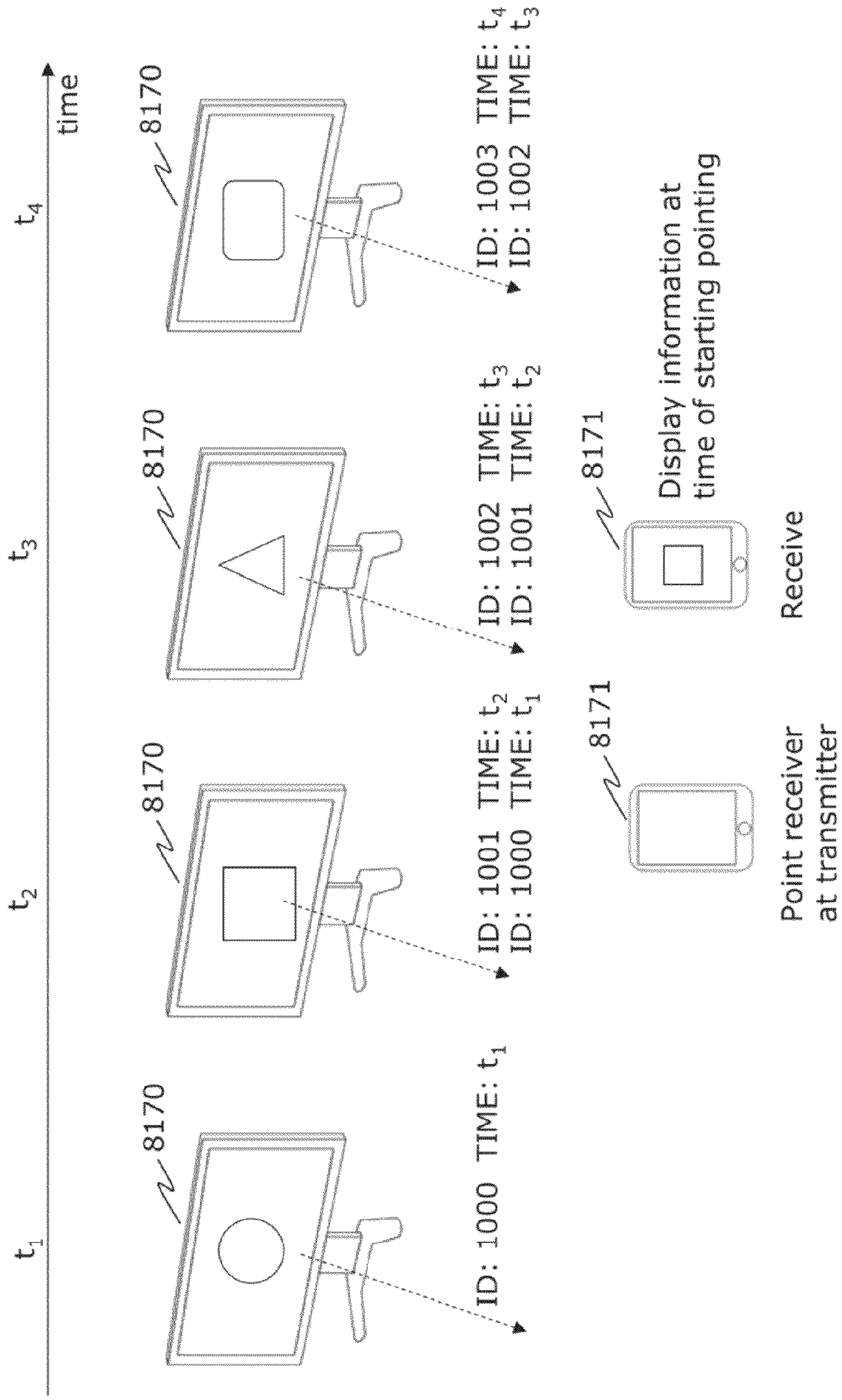

FIG. 394 is a diagram illustrating an example of operation of a transmitter and a receiver in Embodiment 15.

Figure 395:
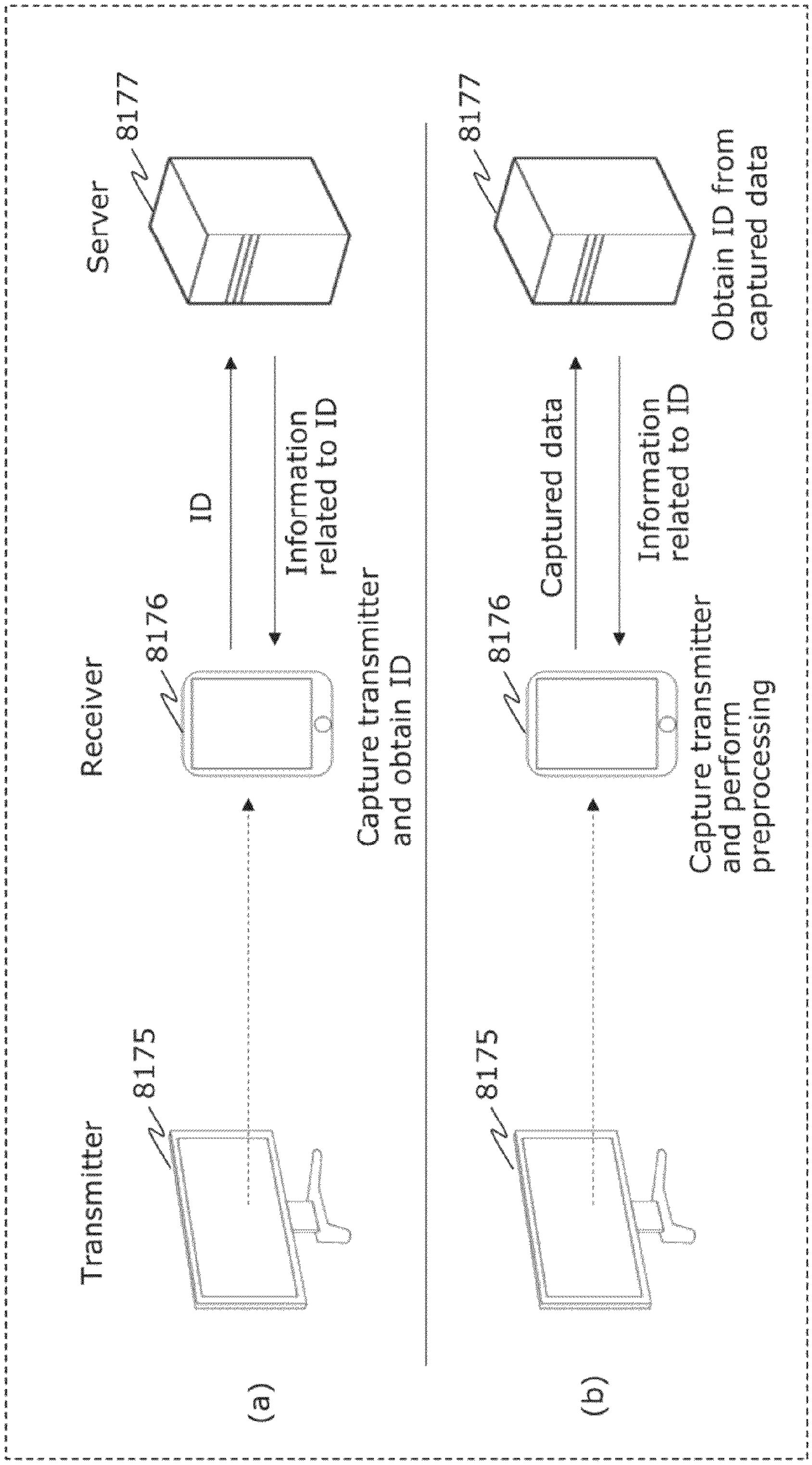

FIG. 395 is a diagram illustrating an example of operation of a transmitter, a receiver, and a server in Embodiment 15.

Figure 396:
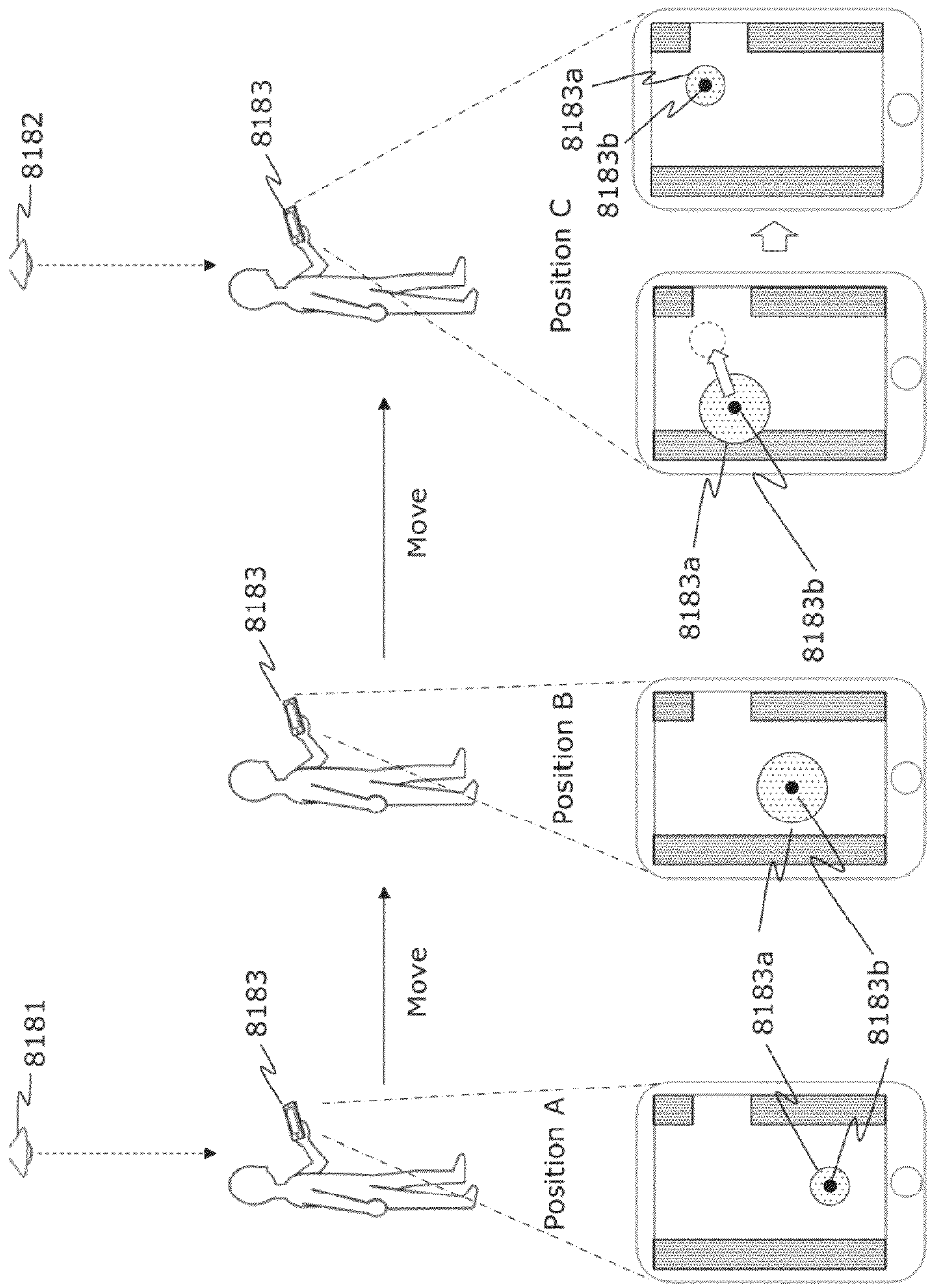

FIG. 396 is a diagram illustrating an example of operation of a transmitter and a receiver in Embodiment 15.

Figure 397:
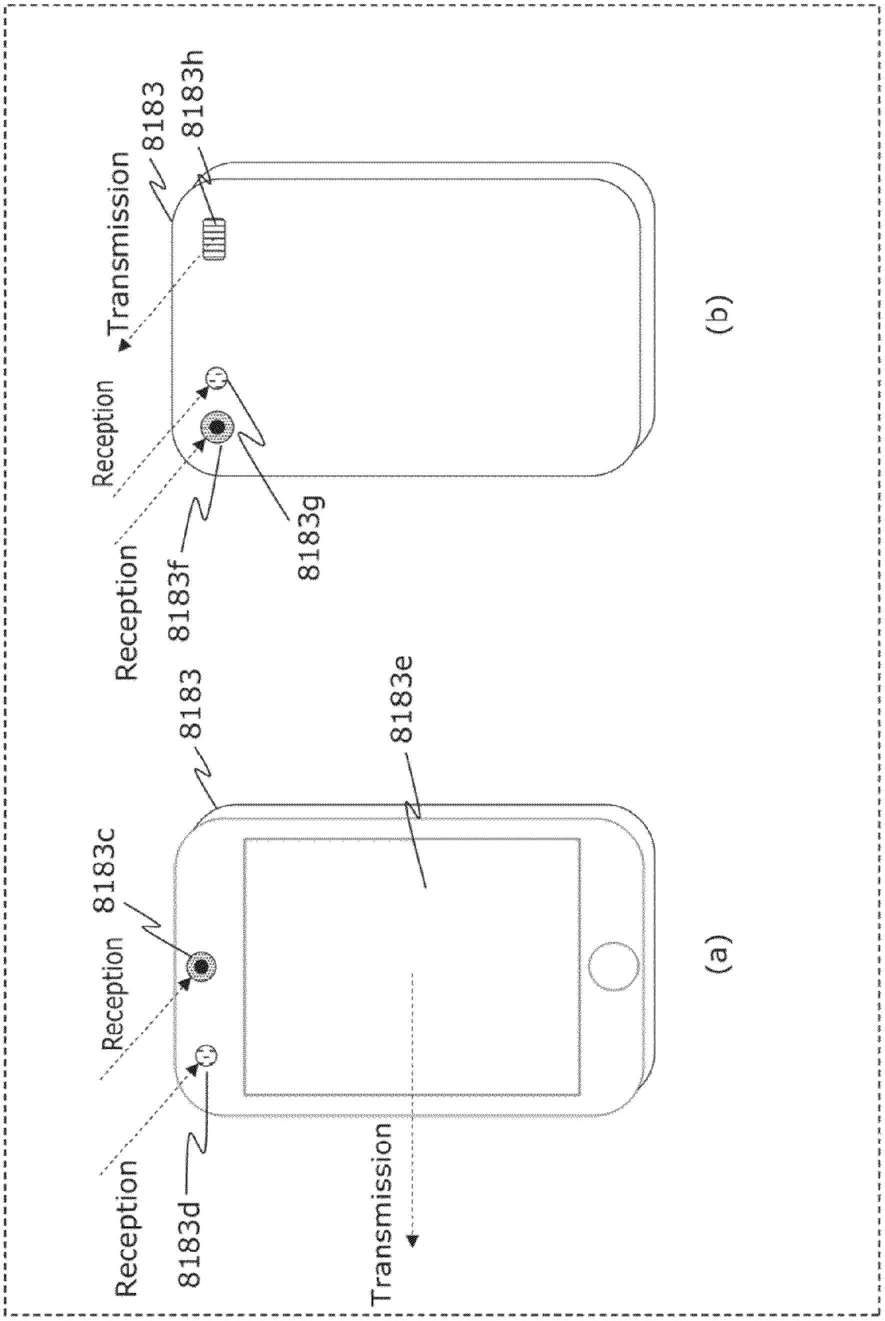

FIG. 397 is a diagram illustrating an example of an appearance of a receiver in Embodiment 15.

Figure 398:
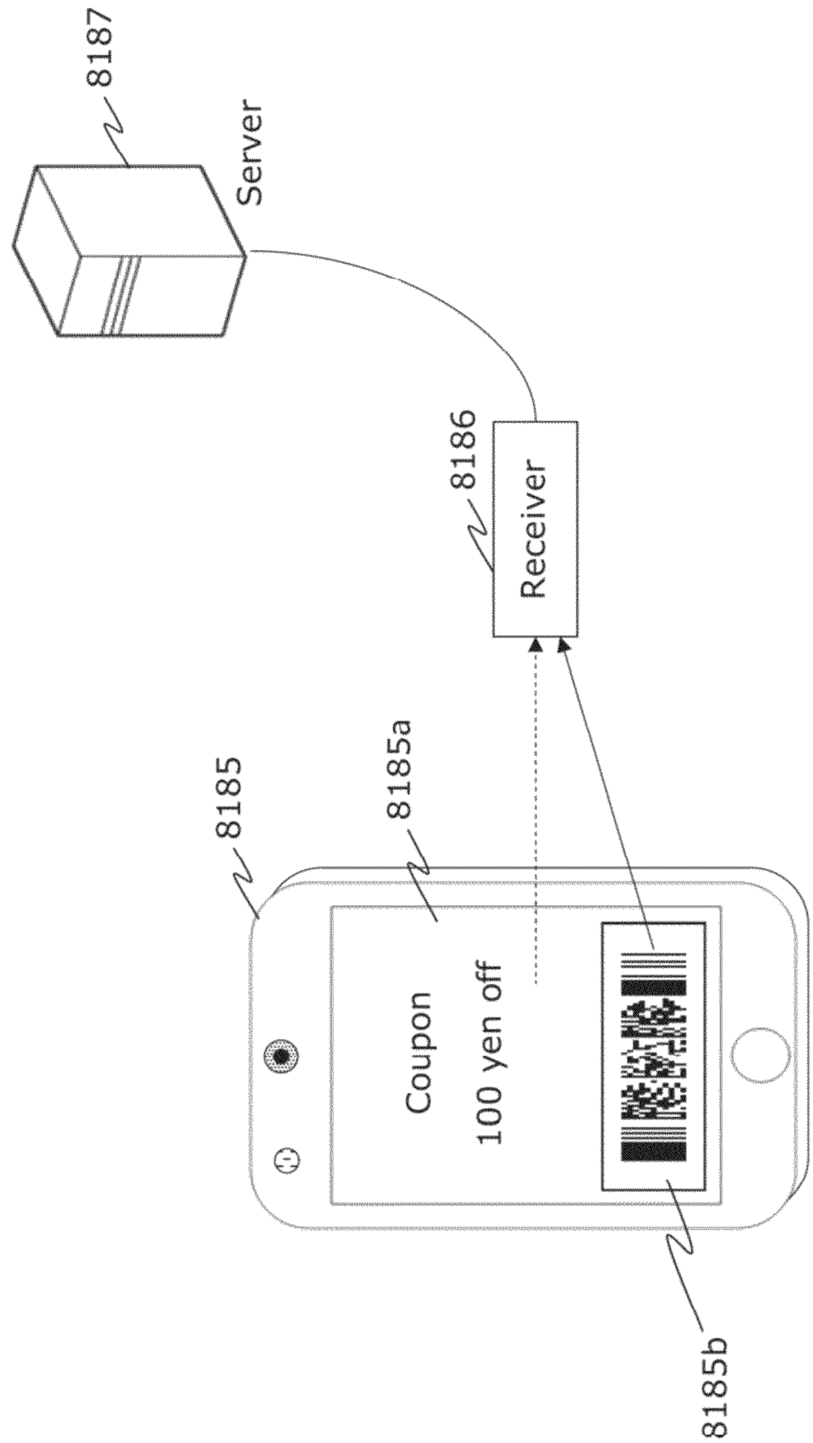

FIG. 398 is a diagram illustrating an example of operation of a transmitter, a receiver, and a server in Embodiment 15.

Figure 399:
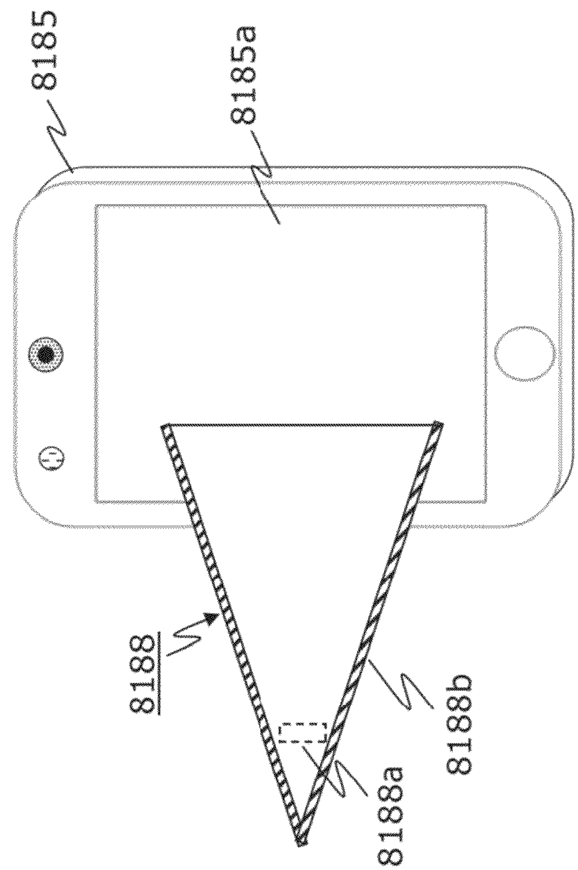

FIG. 399 is a diagram illustrating an example of operation of a transmitter and a receiver in Embodiment 15.

Figure 400:
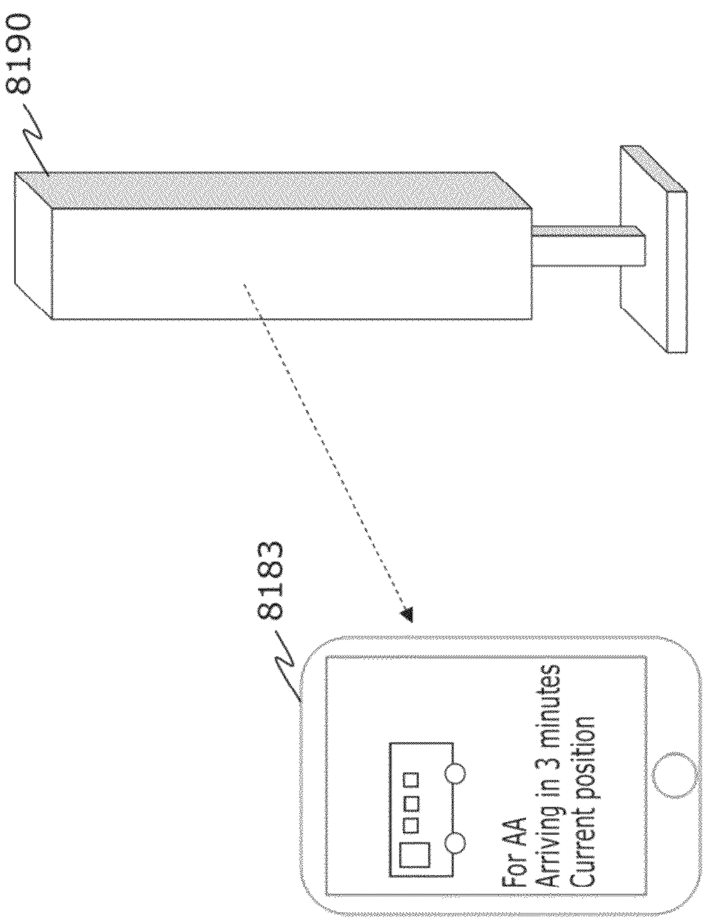

FIG. 400 is a diagram illustrating an example of operation of a transmitter and a receiver in Embodiment 15.

Figure 401:
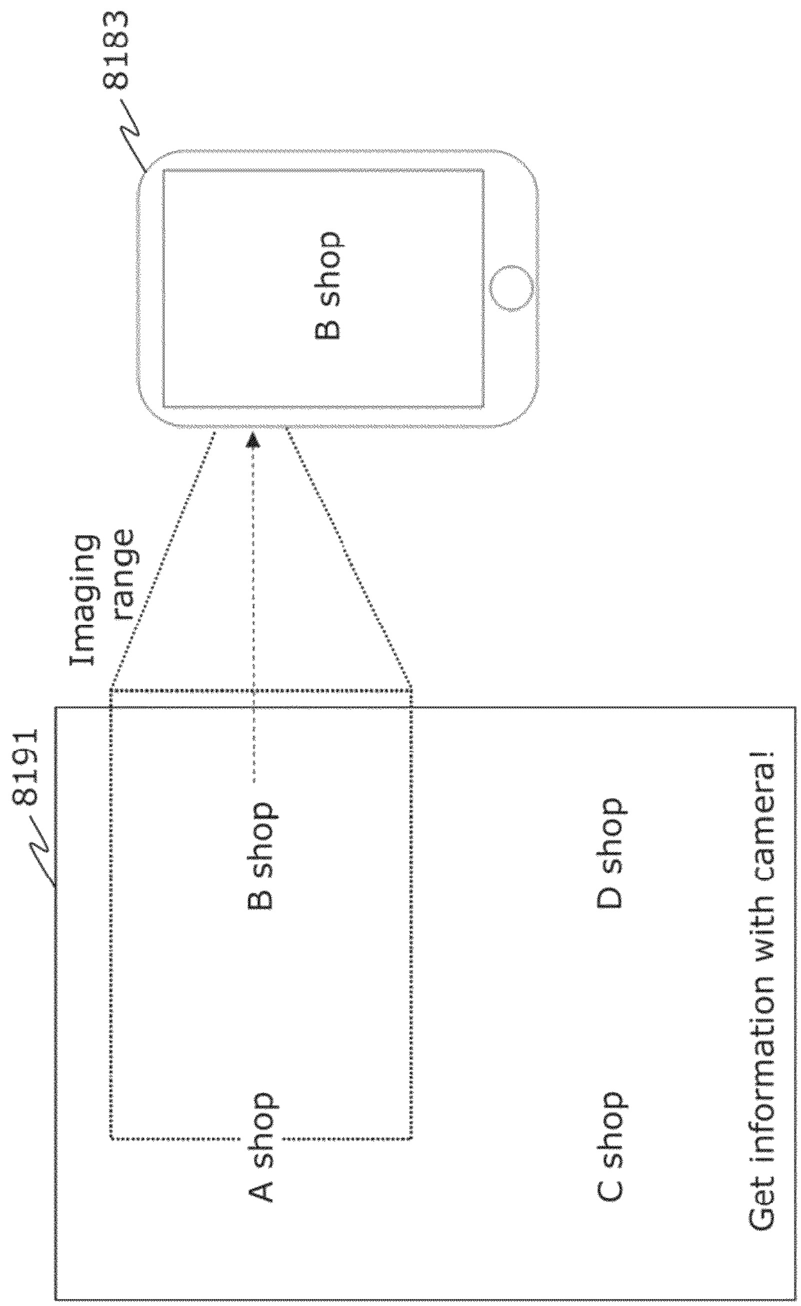

FIG. 401 is a diagram illustrating an example of operation of a transmitter and a receiver in Embodiment 15.

Figure 402:
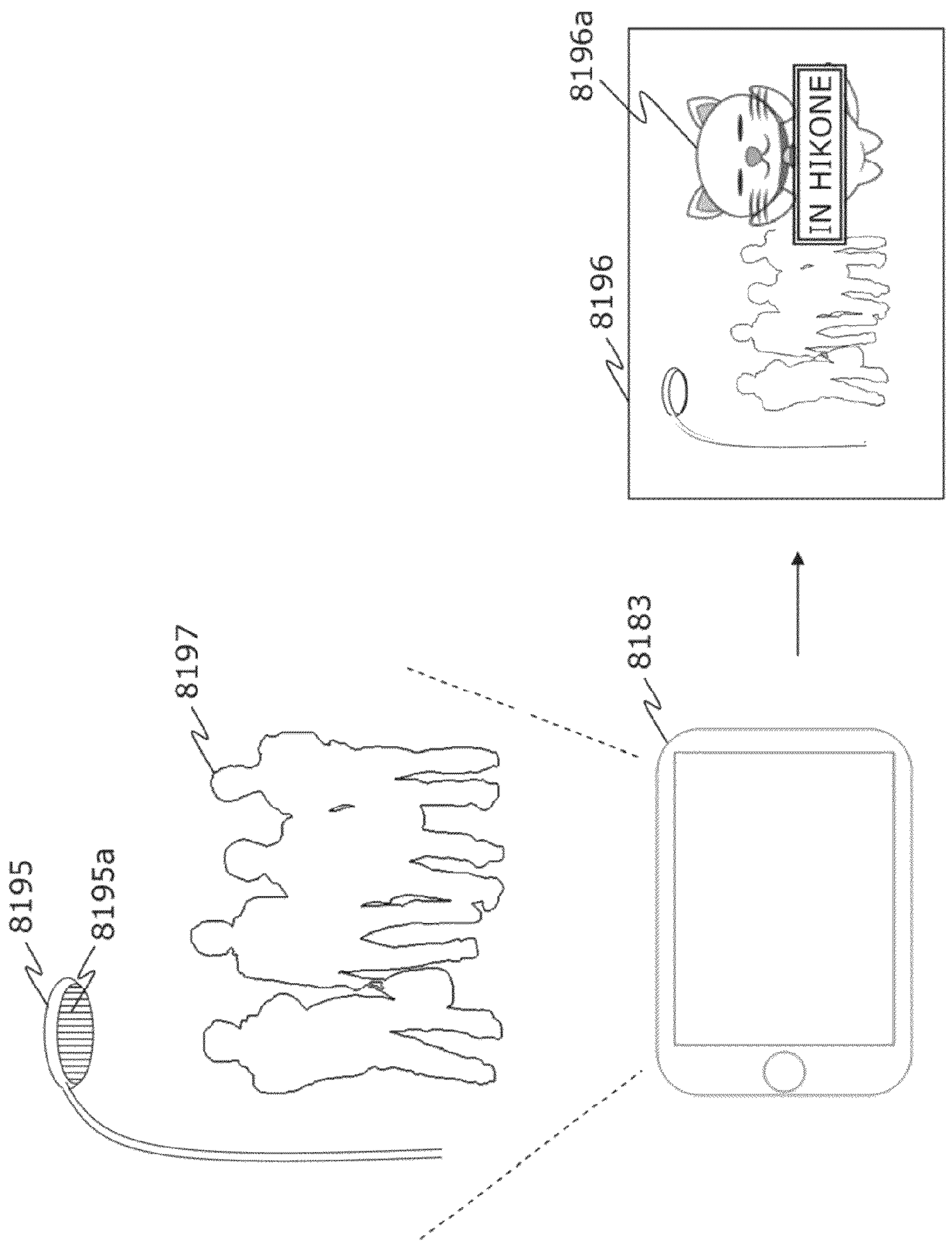

FIG. 402 is a diagram illustrating an example of operation of a transmitter and a receiver in Embodiment 15.

Figure 403A:
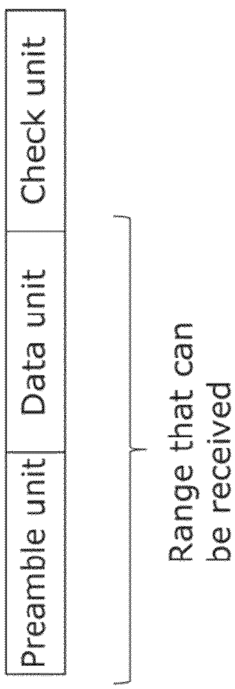

FIG. 403A is a diagram illustrating an example of a structure of information transmitted by a transmitter in Embodiment 15.

Figure 403B:
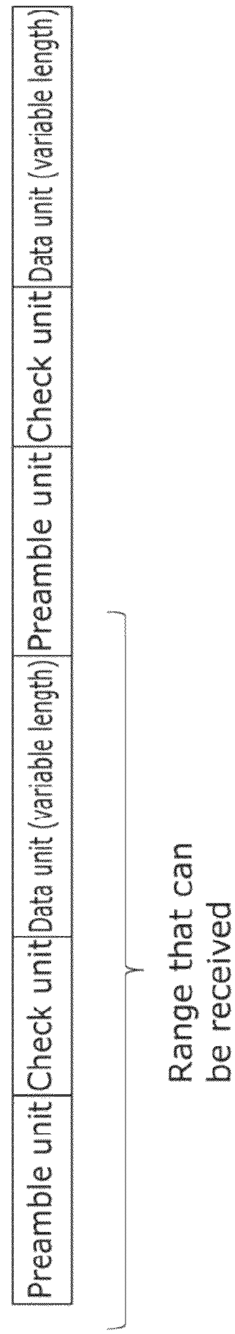

FIG. 403B is a diagram illustrating another example of a structure of information transmitted by a transmitter in Embodiment 15.

Figure 404:
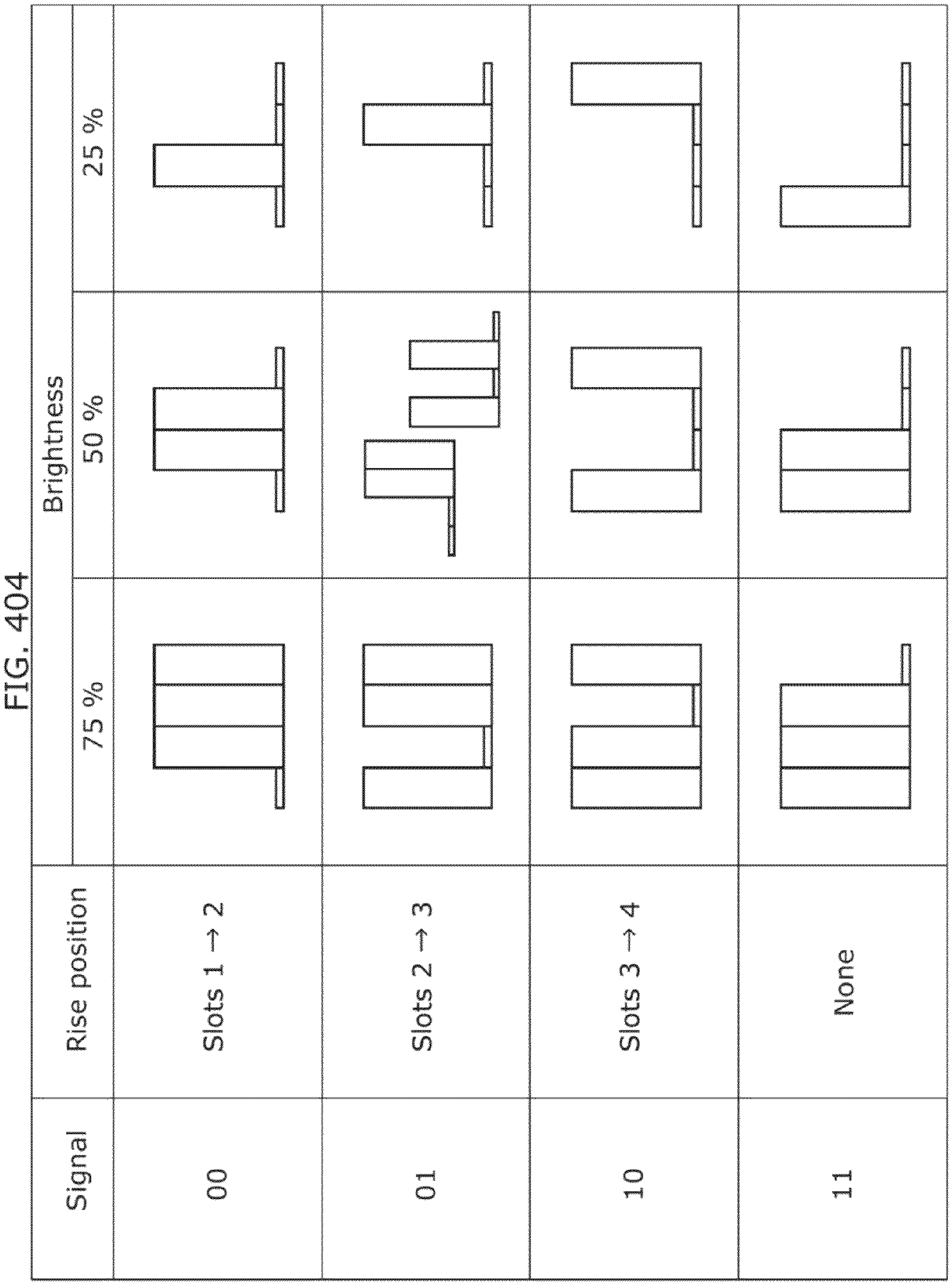

FIG. 404 is a diagram illustrating an example of a 4-value PPM modulation scheme by a transmitter in Embodiment 15.

FIG. 405 is a diagram illustrating an example of a PPM modulation scheme by a transmitter in Embodiment 15.

FIG. 406 is a diagram illustrating an example of a PPM modulation scheme by a transmitter in Embodiment 15.

Figure 407A:
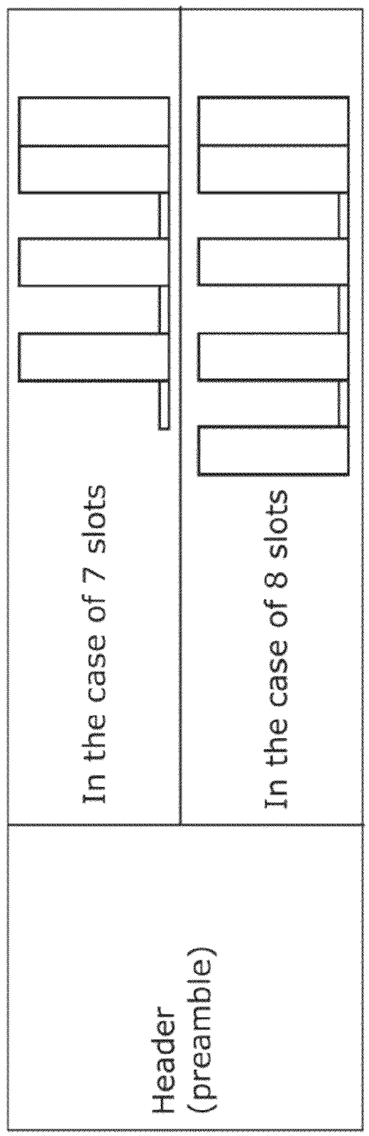

FIG. 407A is a diagram illustrating an example of a luminance change pattern corresponding to a header (preamble unit) in Embodiment 15.

Figure 407B:
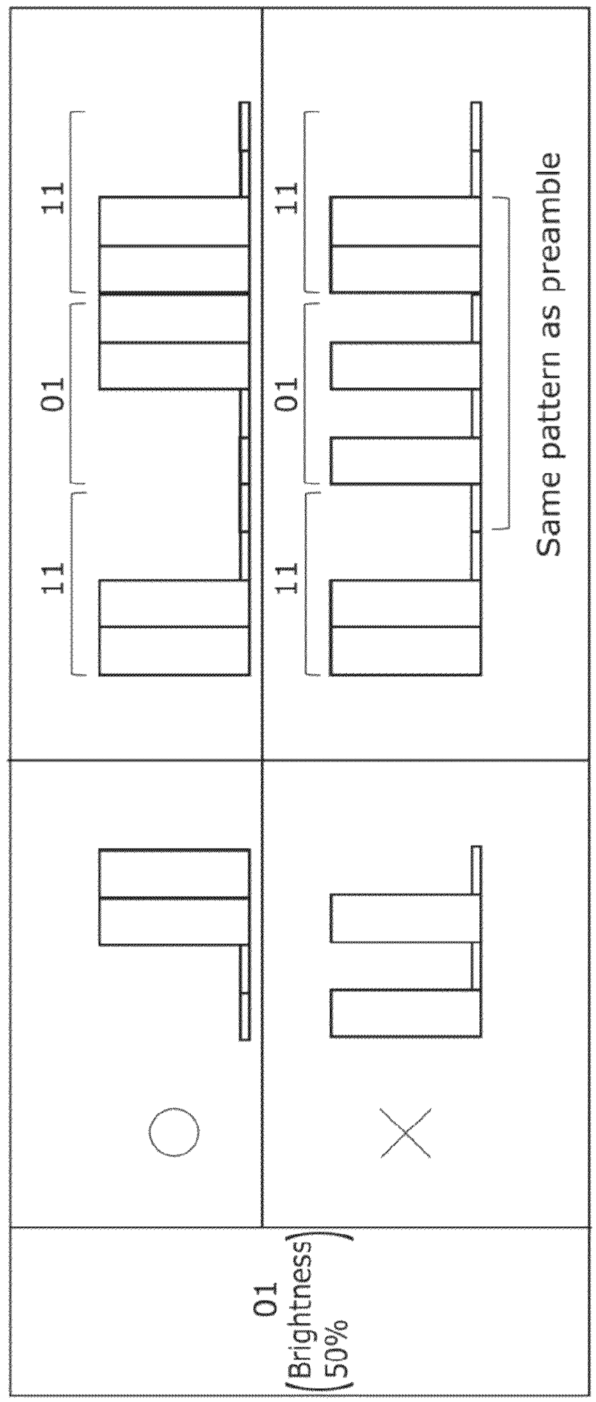

FIG. 407B is a diagram illustrating an example of a luminance change pattern in Embodiment 15.

Figure 408A:
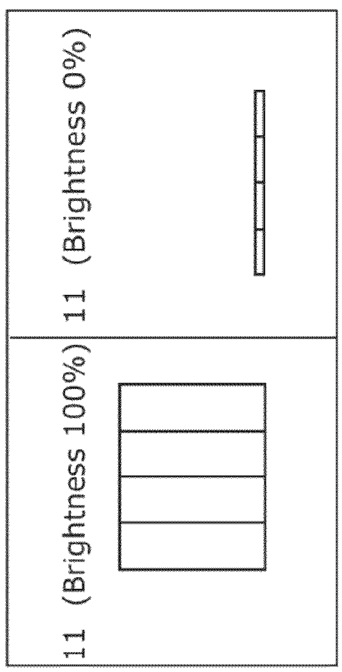

FIG. 408A is a diagram illustrating an example of a luminance change pattern in Embodiment 15.

Figure 408B:
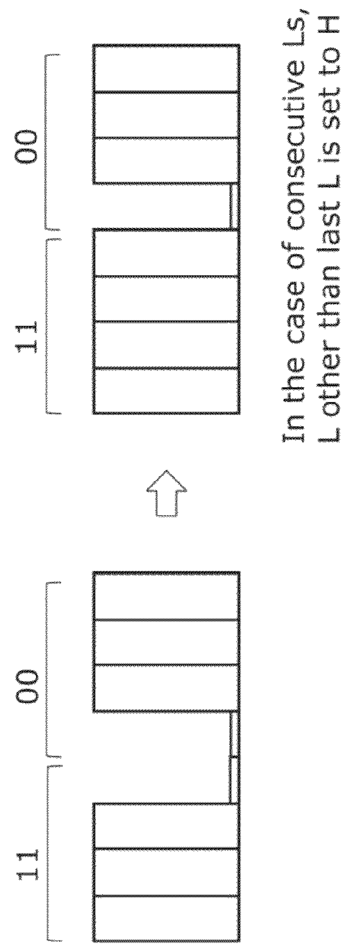

FIG. 408B is a diagram illustrating an example of a luminance change pattern in Embodiment 15.

Figure 409:
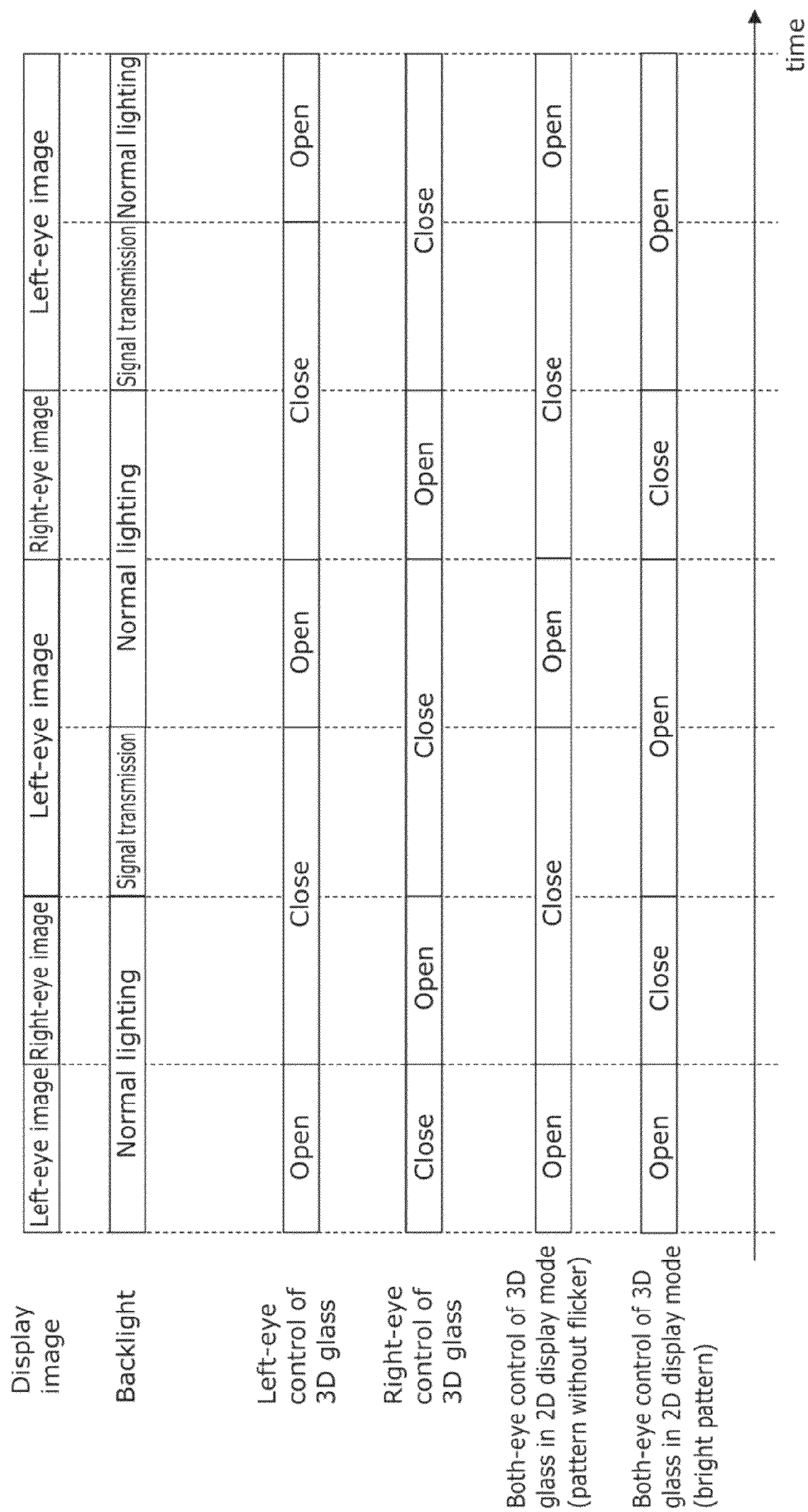

FIG. 409 is a diagram illustrating an example of operation of a transmitter as a television in Embodiment 16.

Figure 410:
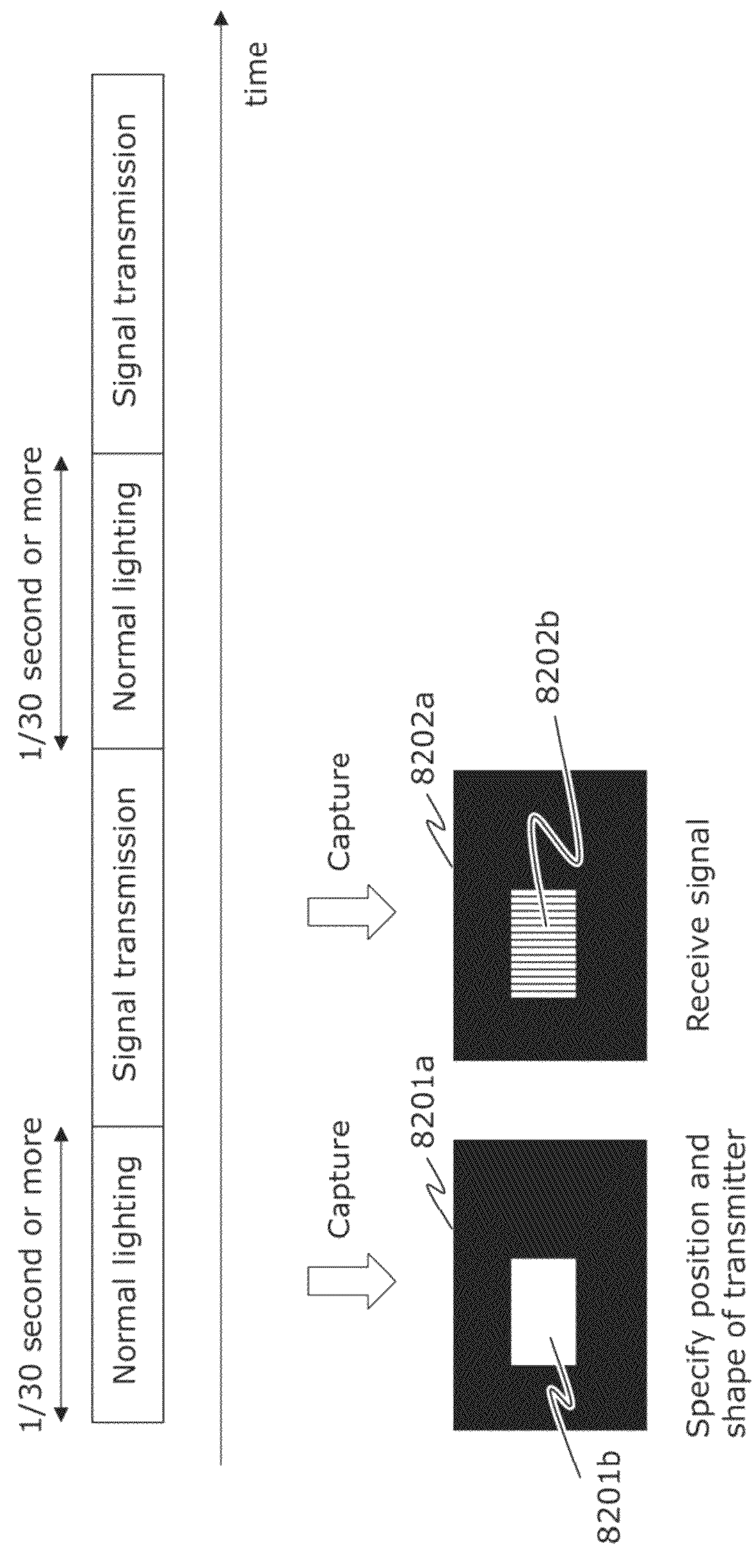

FIG. 410 is a diagram illustrating an example of operation of a transmitter and a receiver in Embodiment 16.

Figure 411:
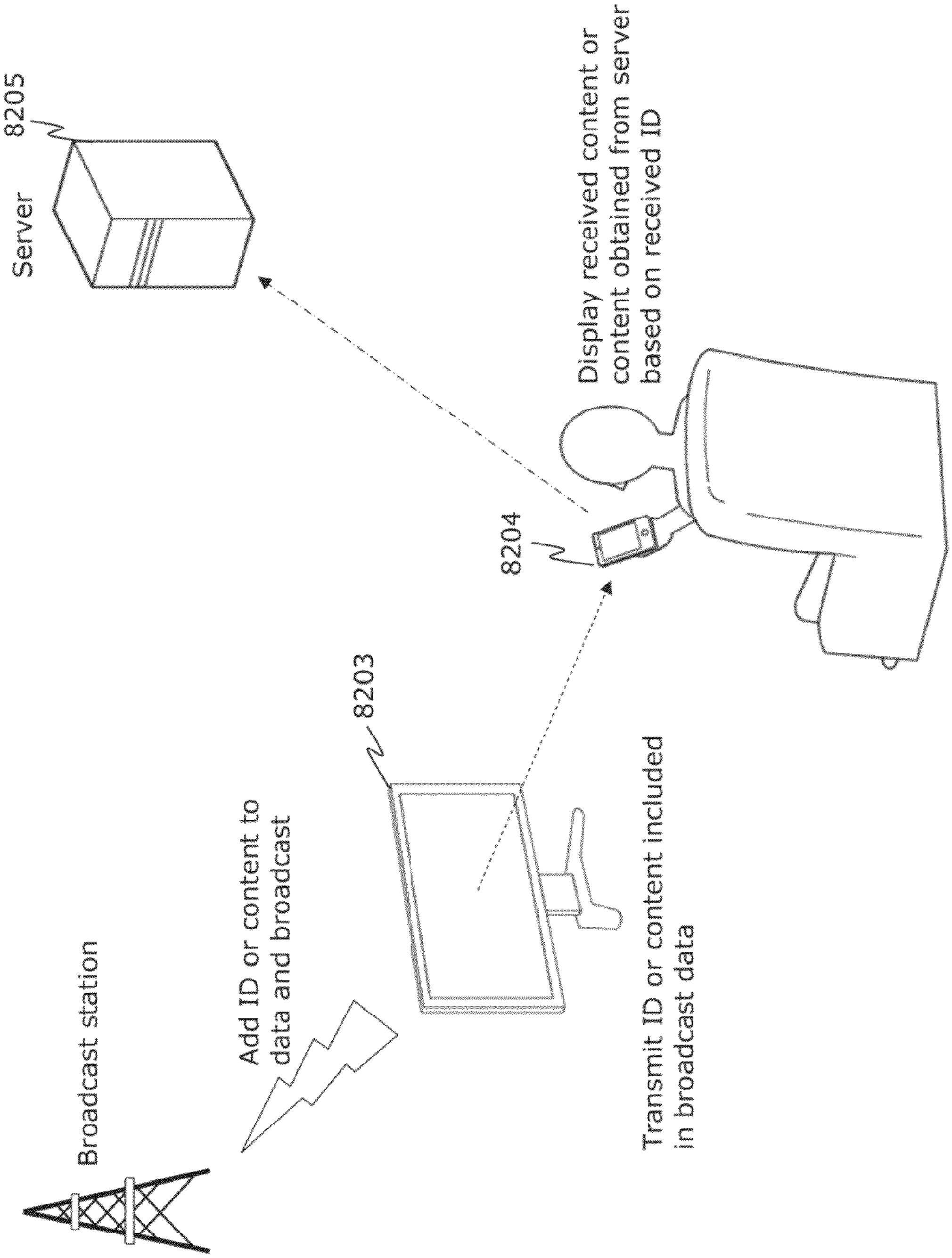

FIG. 411 is a diagram illustrating an example of operation of a transmitter, a receiver, and a server in Embodiment 16.

Figure 412:
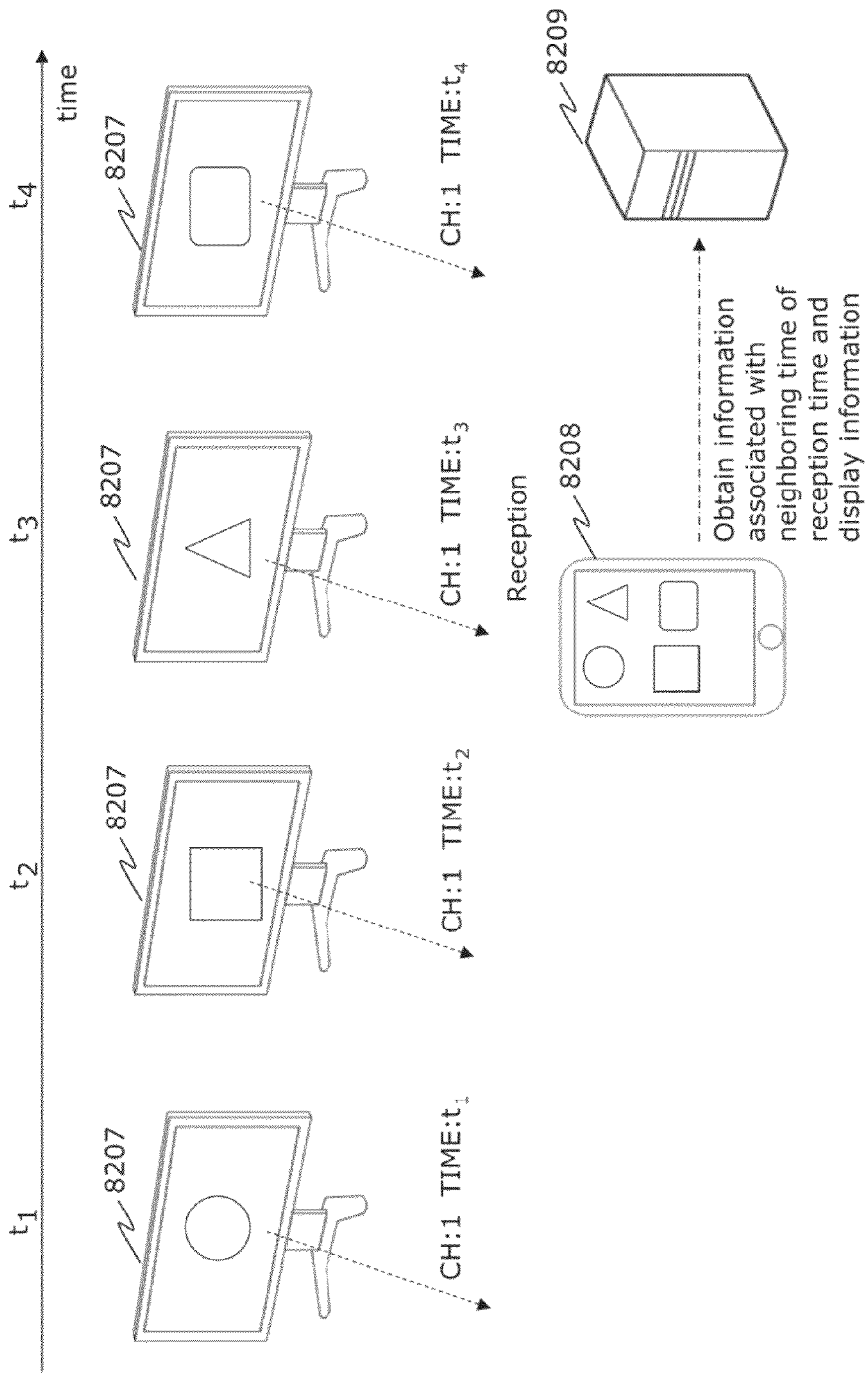

FIG. 412 is a diagram illustrating an example of operation of a transmitter and a receiver in Embodiment 16.

Figure 413:
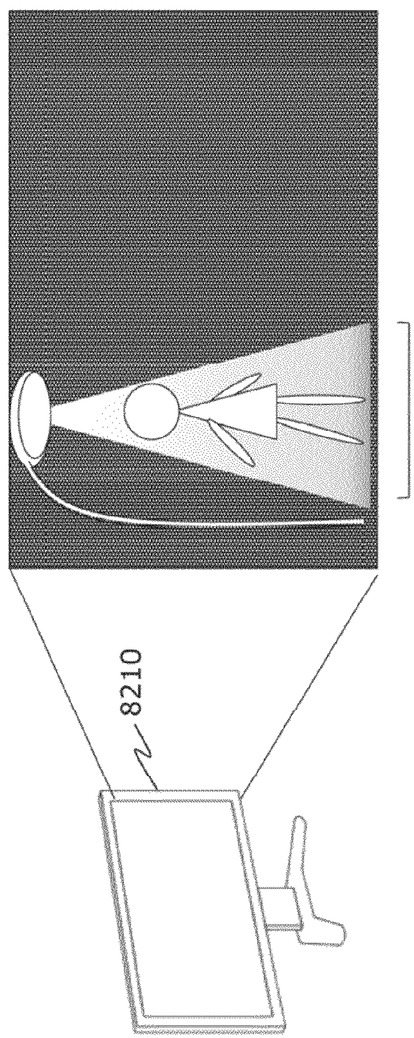

FIG. 413 is a diagram illustrating an example of operation of a transmitter in Embodiment 16.

Figure 414:
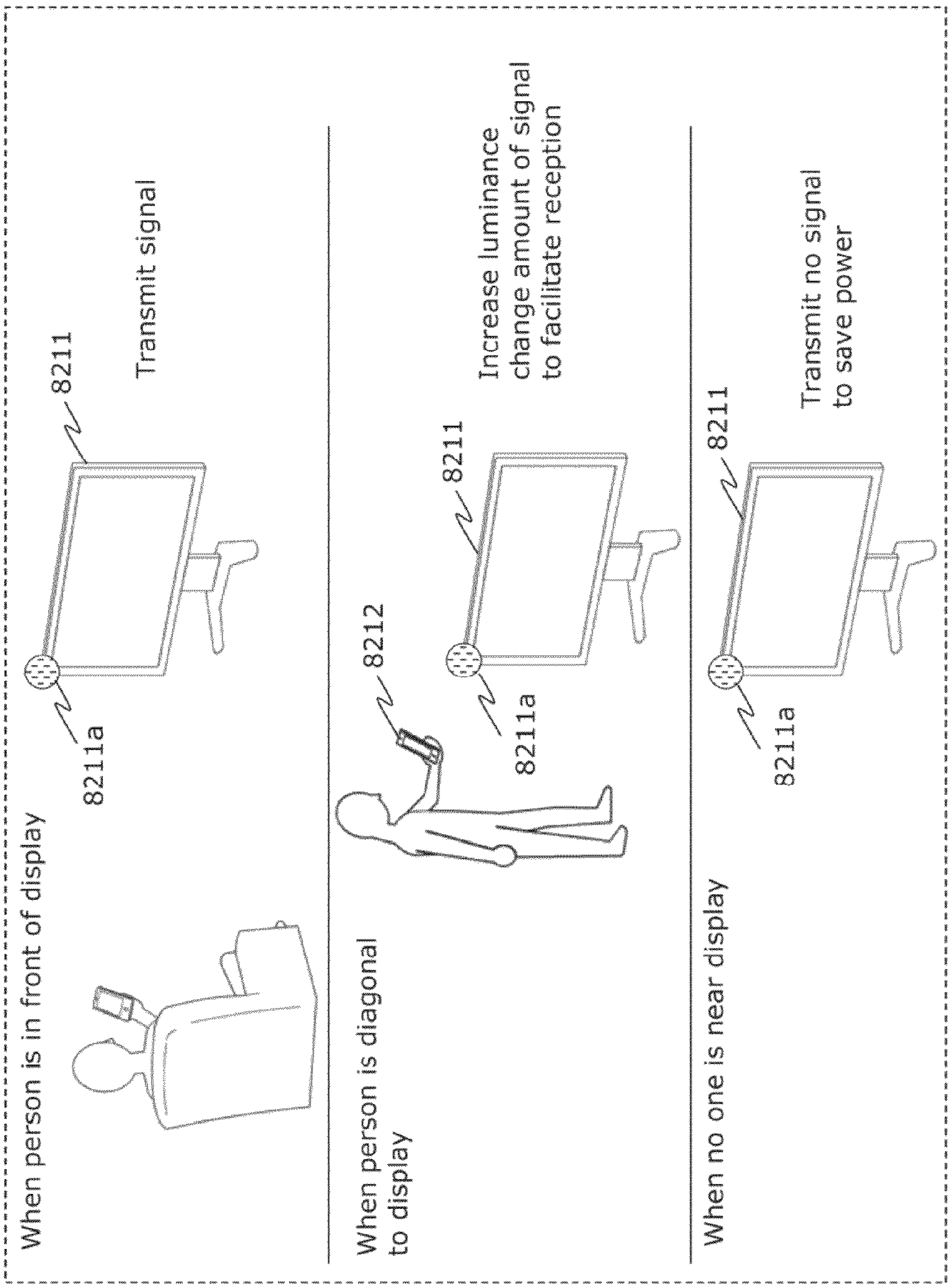

FIG. 414 is a diagram illustrating an example of operation of a transmitter in Embodiment 16.

Figure 415:
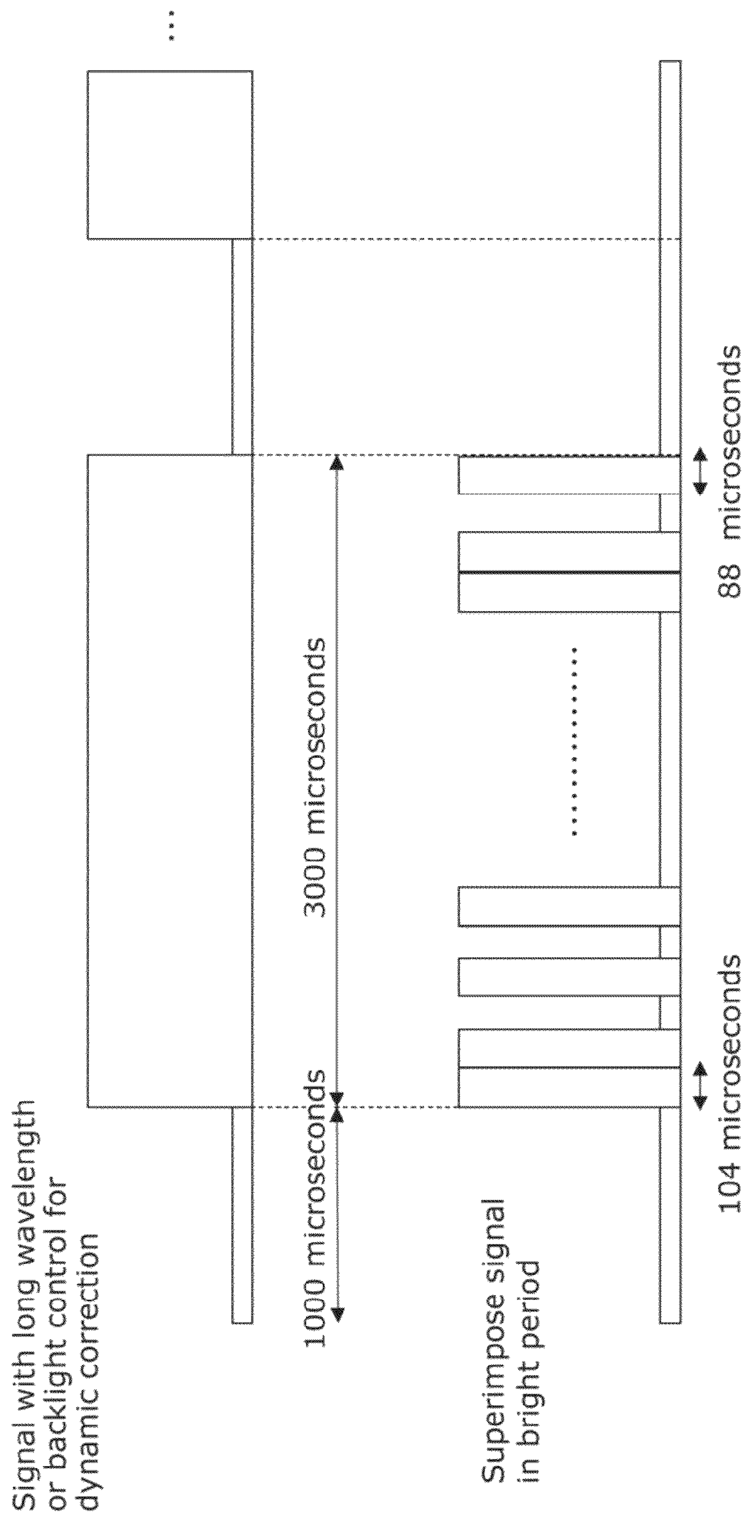

FIG. 415 is a diagram illustrating an example of operation of a transmitter in Embodiment 16.

Figure 416:
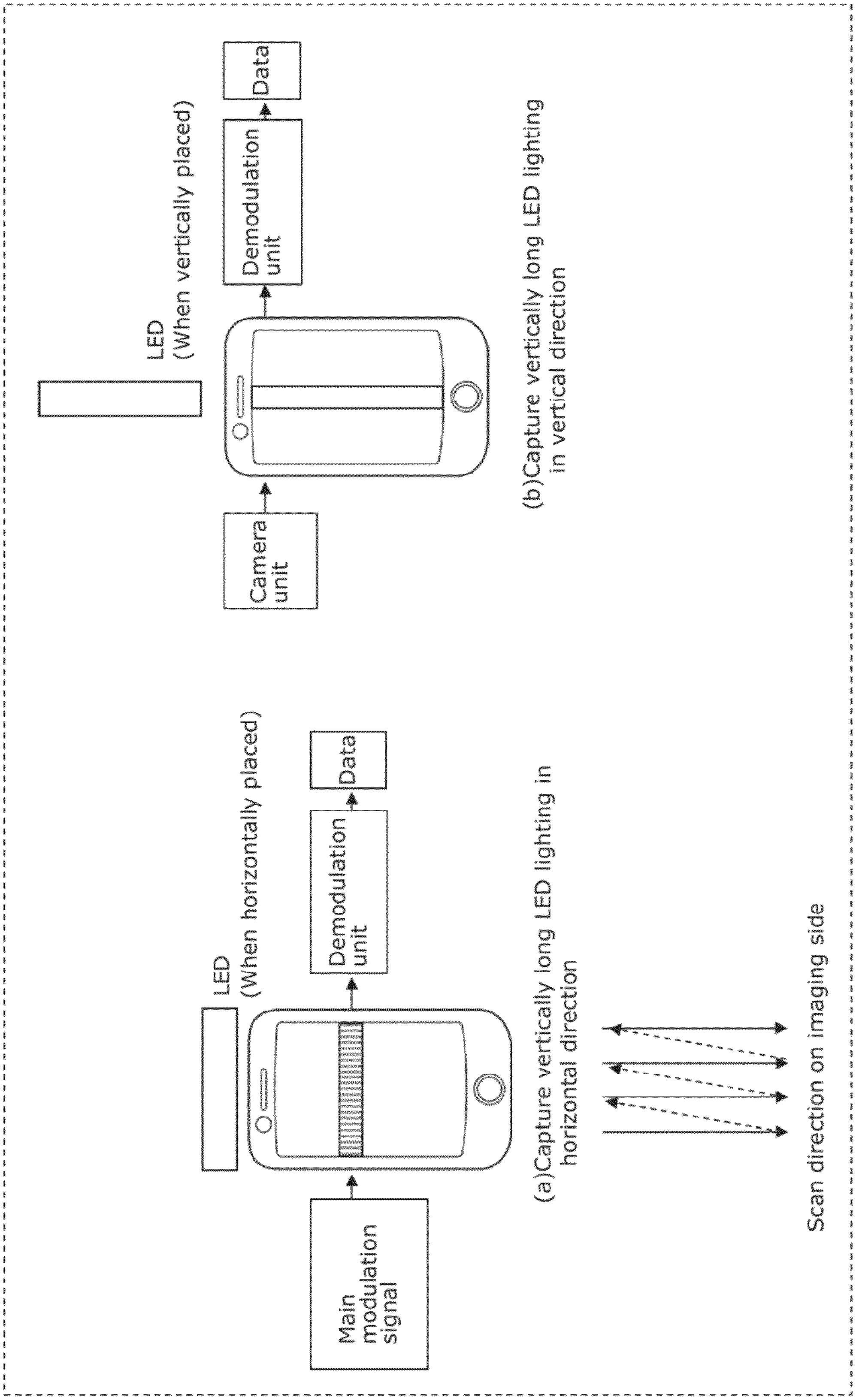

FIG. 416 is a diagram for describing imaging in Embodiment 16.

Figure 417:
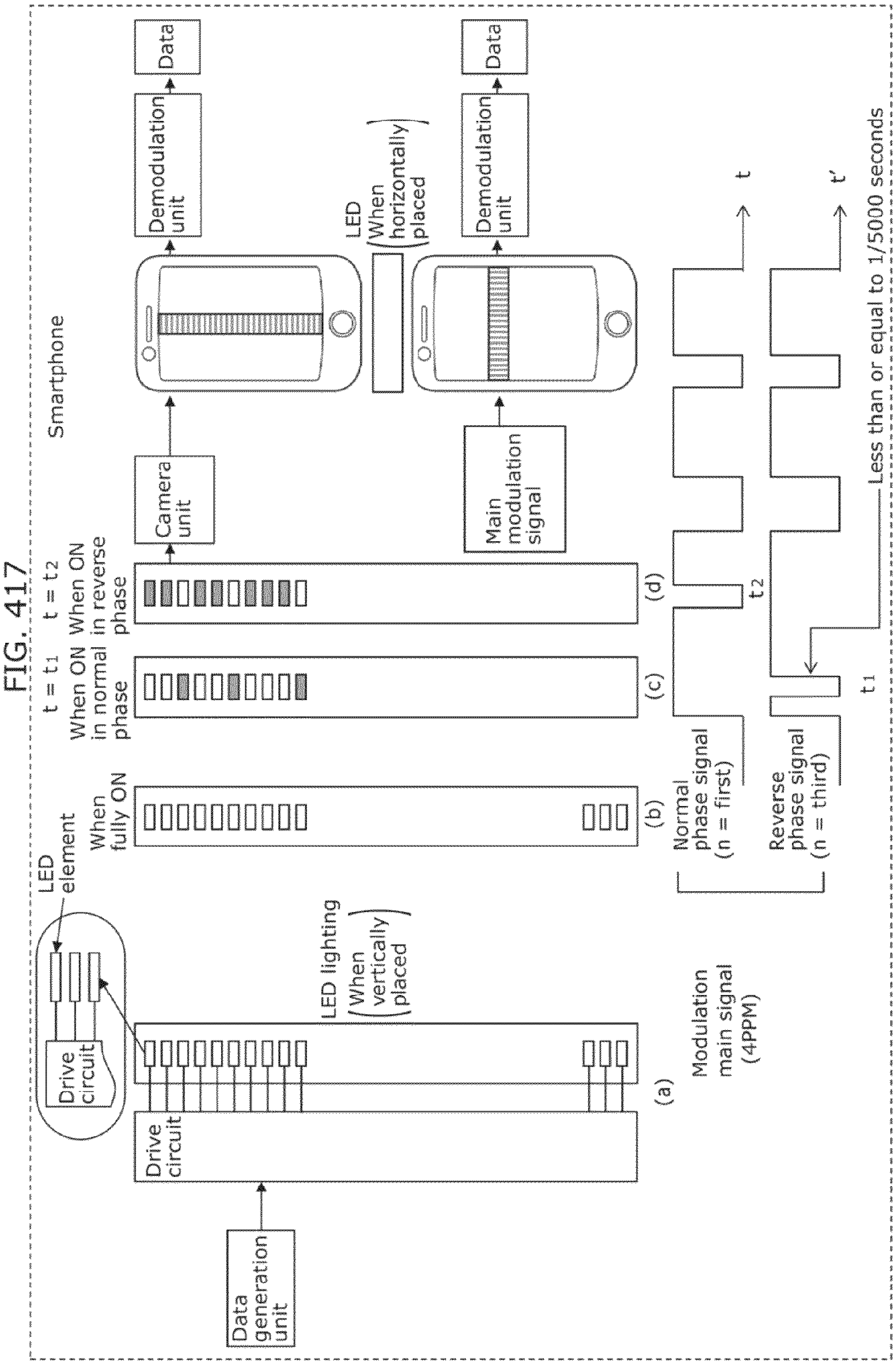

FIG. 417 is a diagram for describing transmission and imaging in Embodiment 16.

Figure 418:
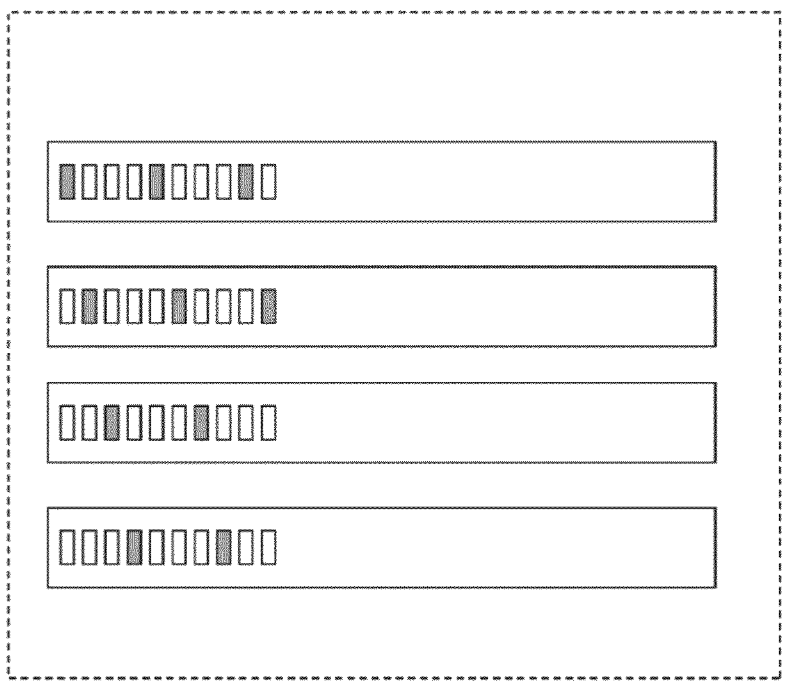

FIG. 418 is a diagram for describing transmission in Embodiment 16.

Figure 419:
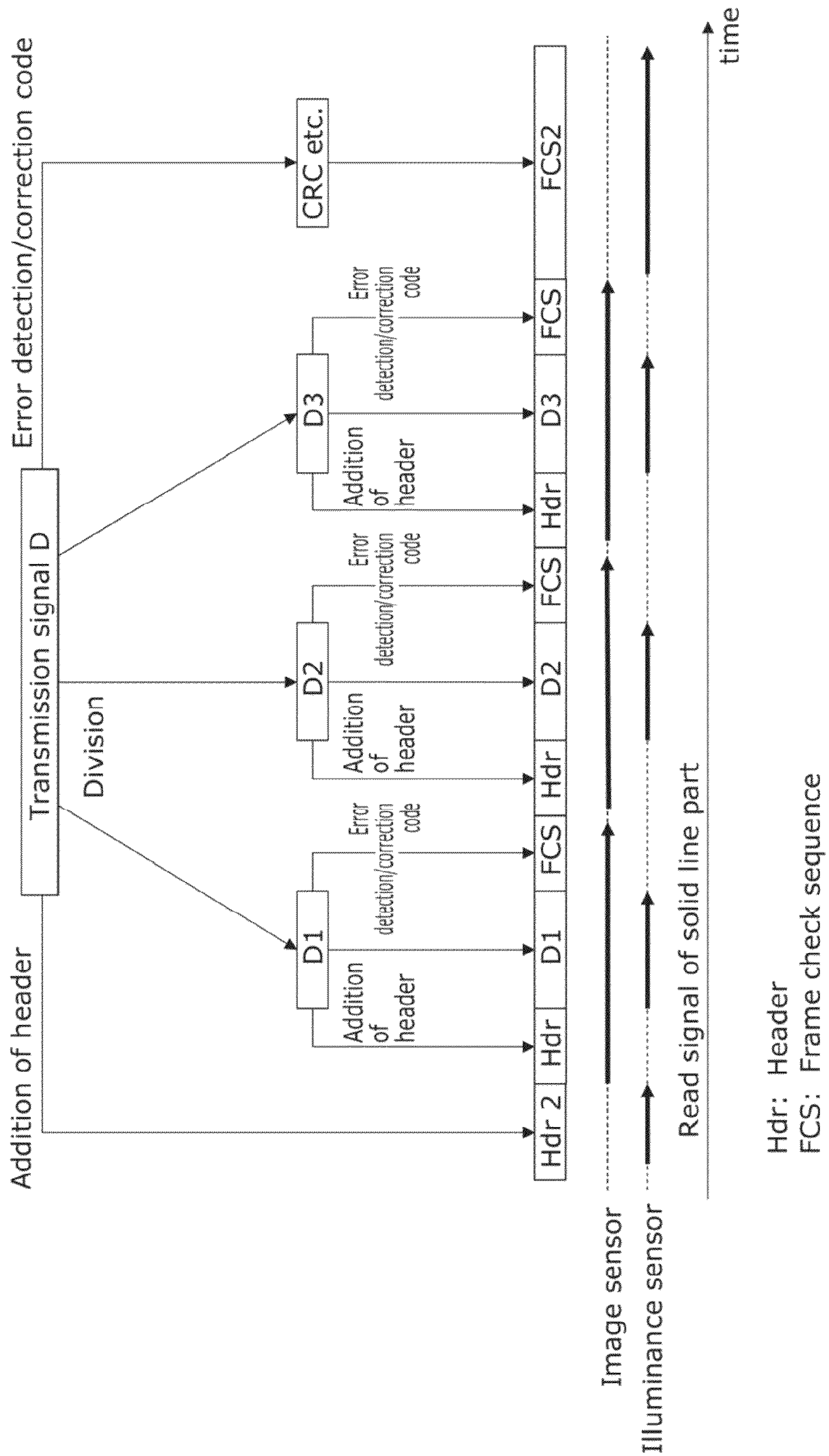

FIG. 419 is a diagram illustrating an example of a transmission signal in Embodiment 17.

Figure 420:
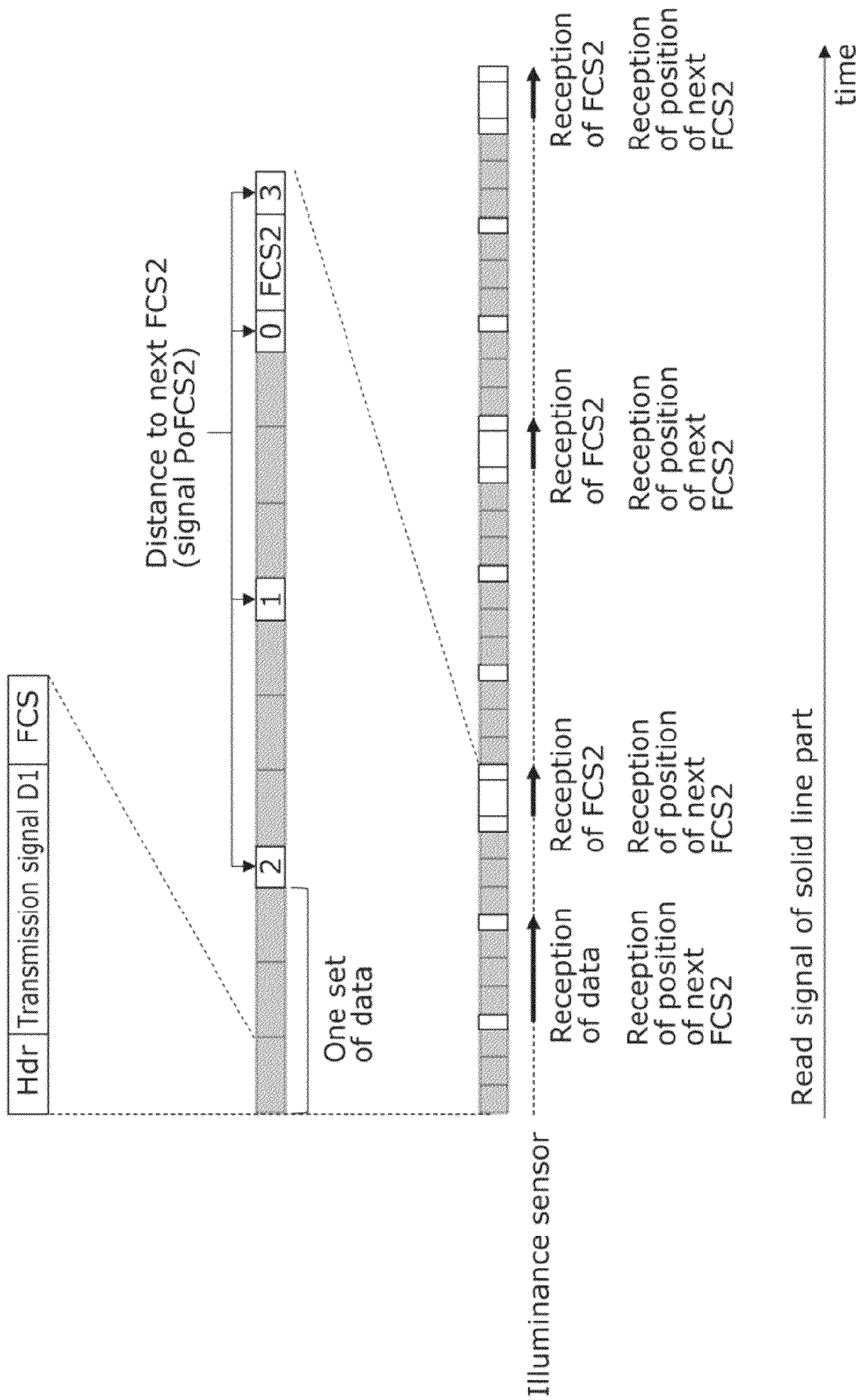

FIG. 420 is a diagram illustrating an example of a transmission signal in Embodiment 17.

Figure 421B:
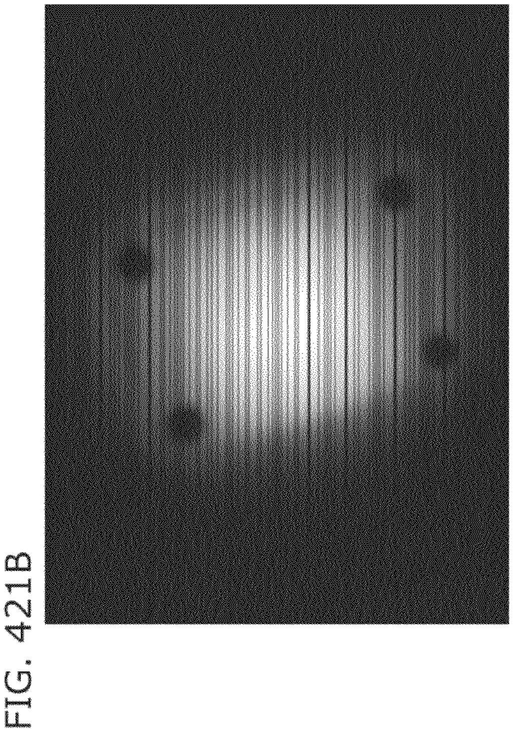
Figure 421A:
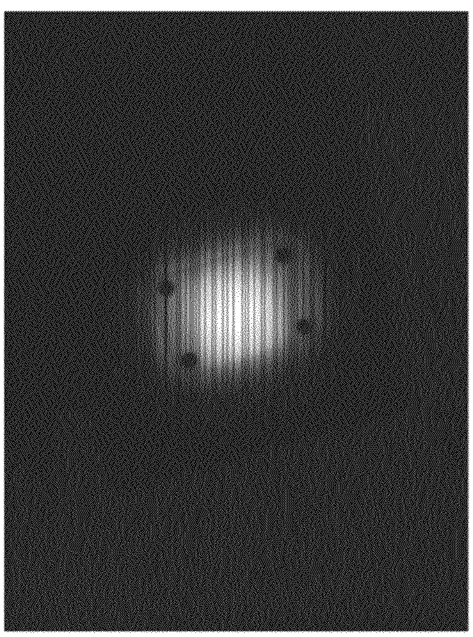

FIG. 421A is a diagram illustrating an example of an image (bright line image) captured by a receiver in Embodiment 17.

FIG. 421B is a diagram illustrating an example of an image (bright line image) captured by a receiver in Embodiment 17.

Figure 421C:
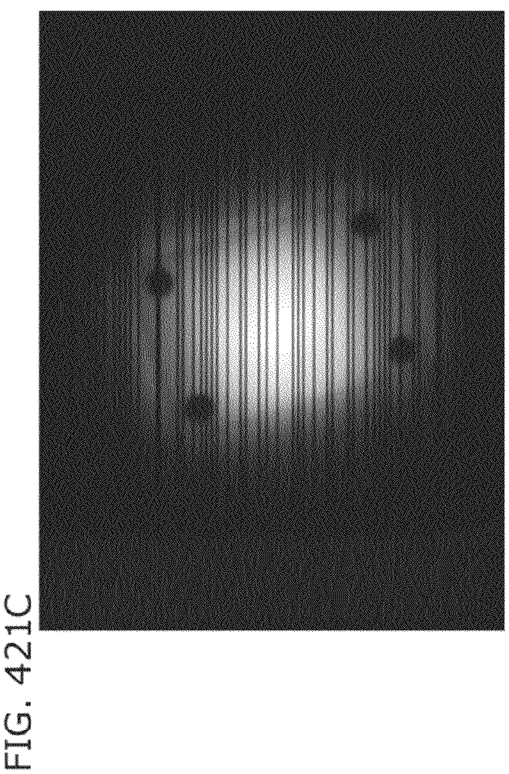

FIG. 421C is a diagram illustrating an example of an image (bright line image) captured by a receiver in Embodiment 17.

Figure 422B:
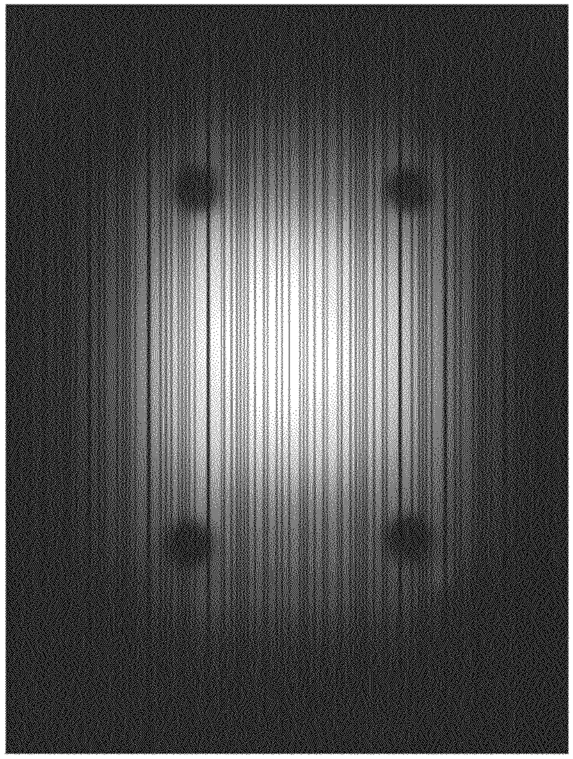
Figure 422A:
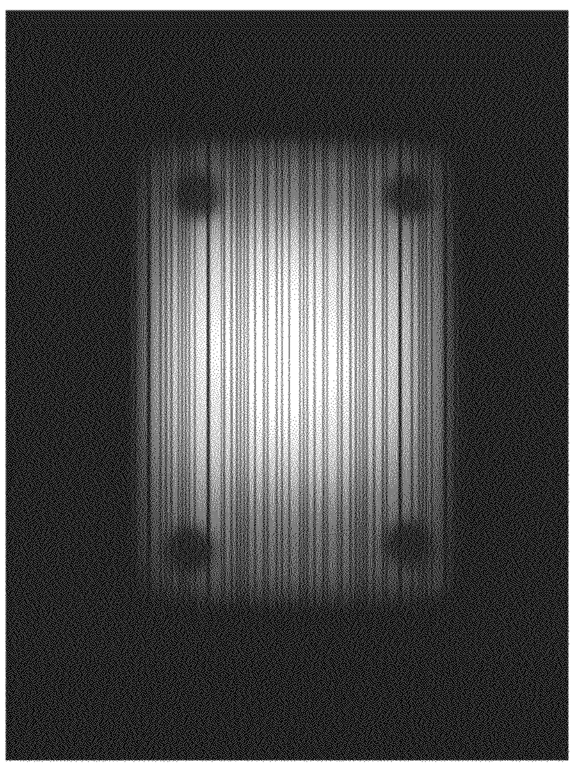

FIG. 422A is a diagram illustrating an example of an image (bright line image) captured by a receiver in Embodiment 17.

FIG. 422B is a diagram illustrating an example of an image (bright line image) captured by a receiver in Embodiment 17.

Figure 423C:
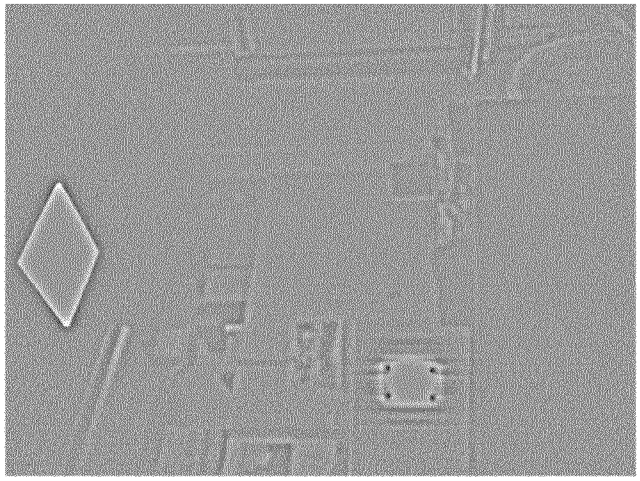
Figure 423B:
Figure 423A:

FIG. 423A is a diagram illustrating an example of an image (bright line image) captured by a receiver in Embodiment 17.

FIG. 423B is a diagram illustrating an example of an image (bright line image) captured by a receiver in Embodiment 17.

FIG. 423C is a diagram illustrating an example of an image (bright line image) captured by a receiver in Embodiment 17.

Figure 424:
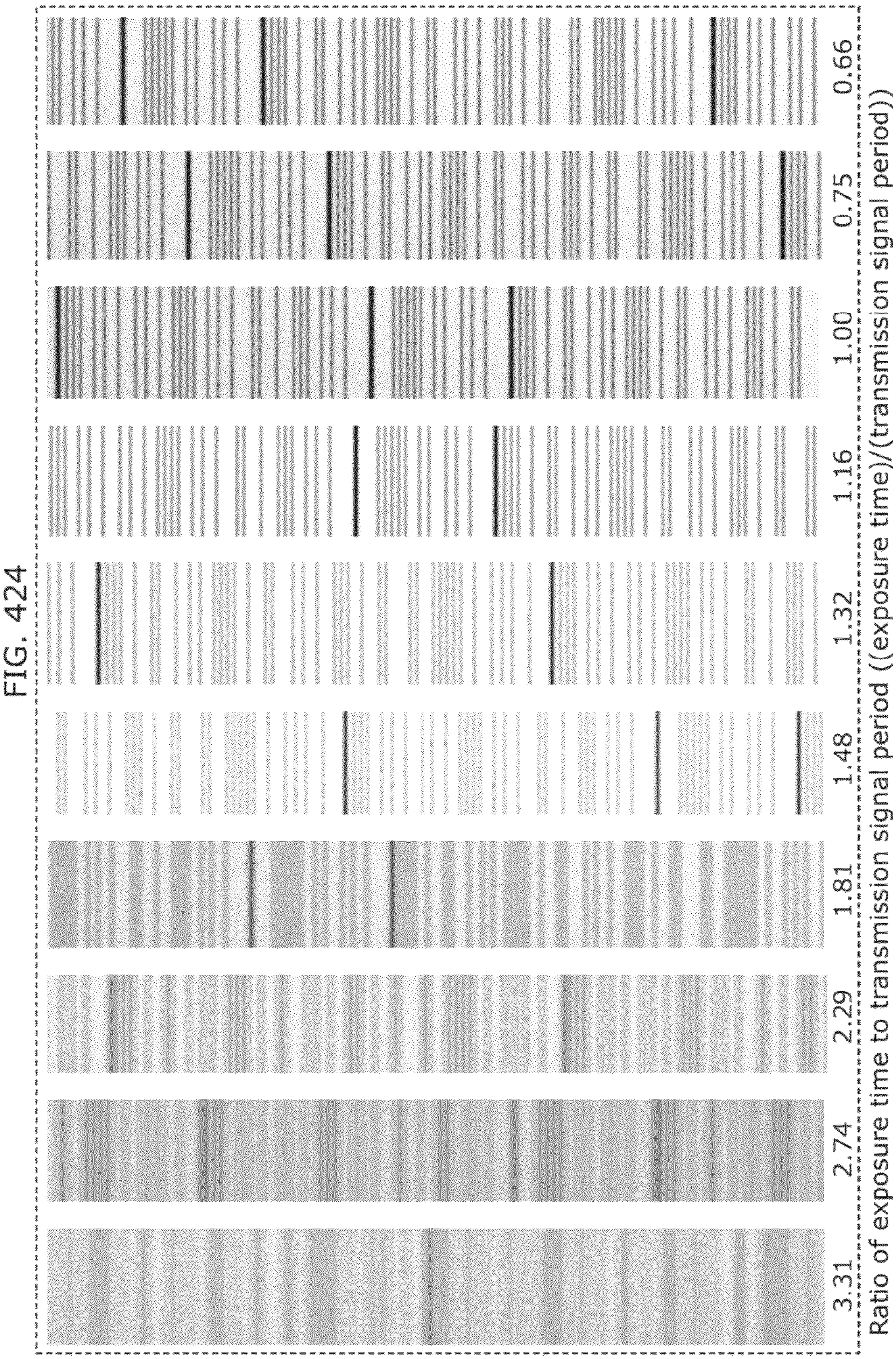

FIG. 424 is a diagram illustrating an example of an image (bright line image) captured by a receiver in Embodiment 17.

Figure 425:
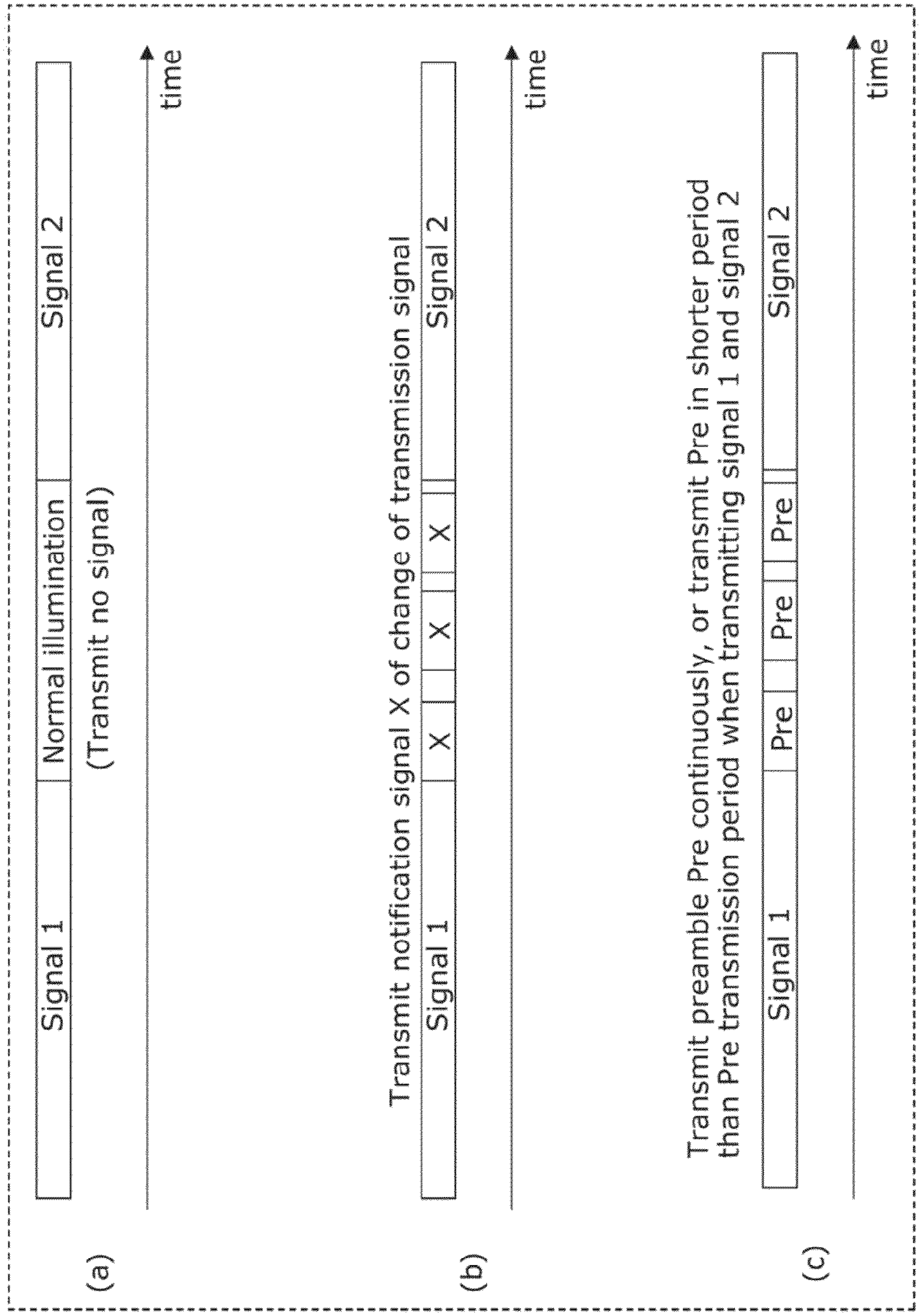

FIG. 425 is a diagram illustrating an example of a transmission signal in Embodiment 17.

Figure 426:
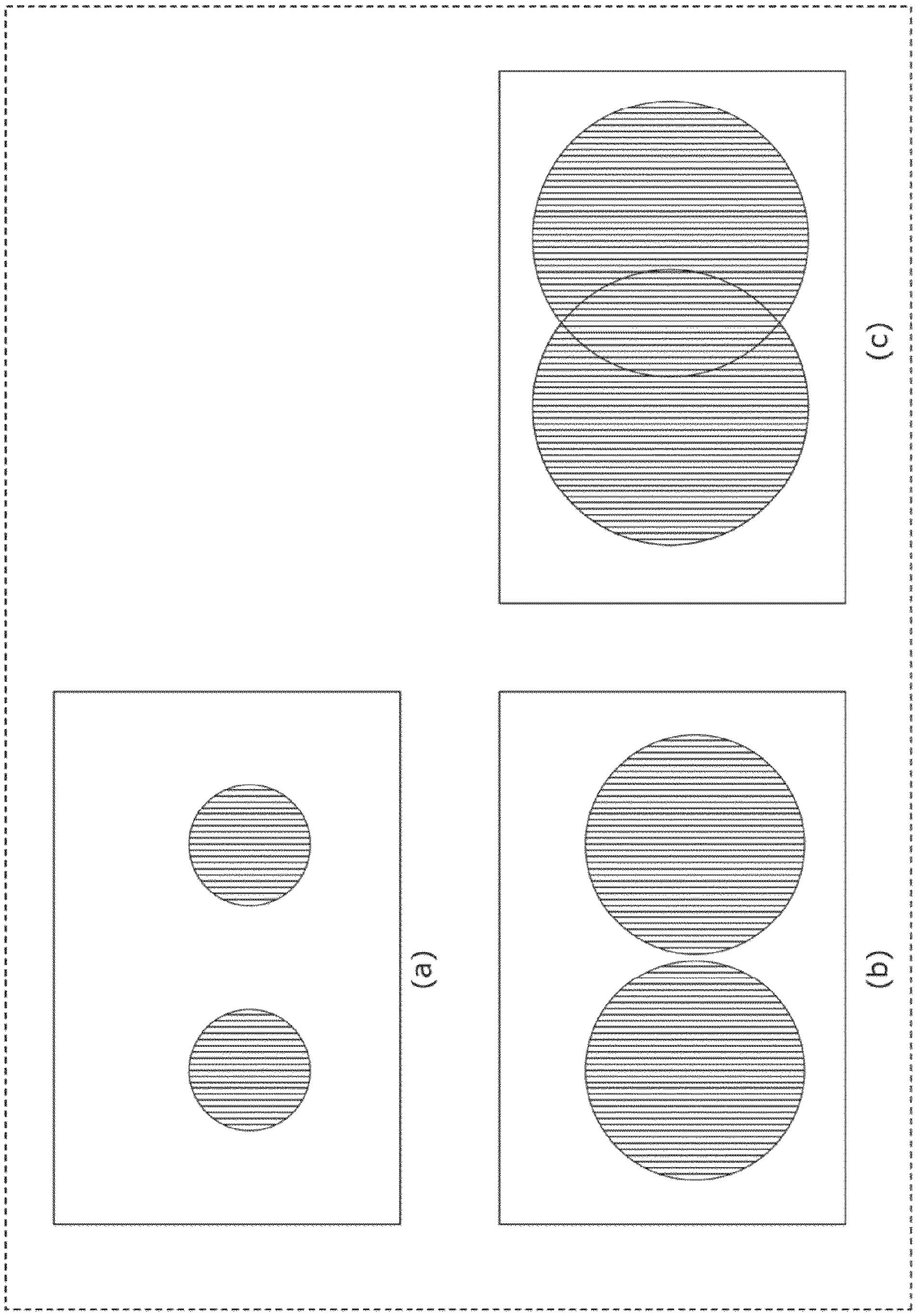

FIG. 426 is a diagram illustrating an example of operation of a receiver in Embodiment 17.

Figure 427:
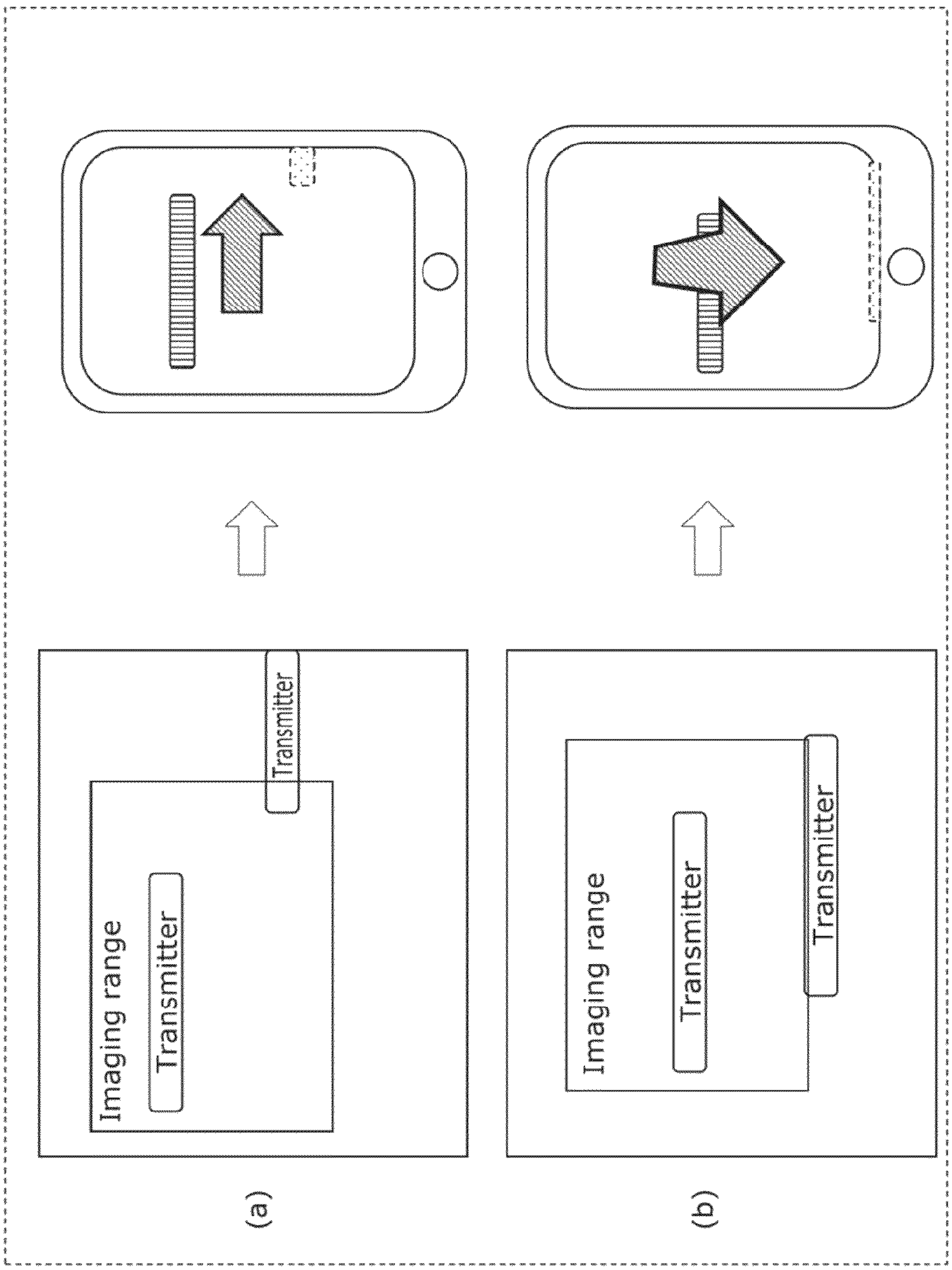

FIG. 427 is a diagram illustrating an example of an instruction to a user displayed on a screen of a receiver in Embodiment 17.

Figure 428:
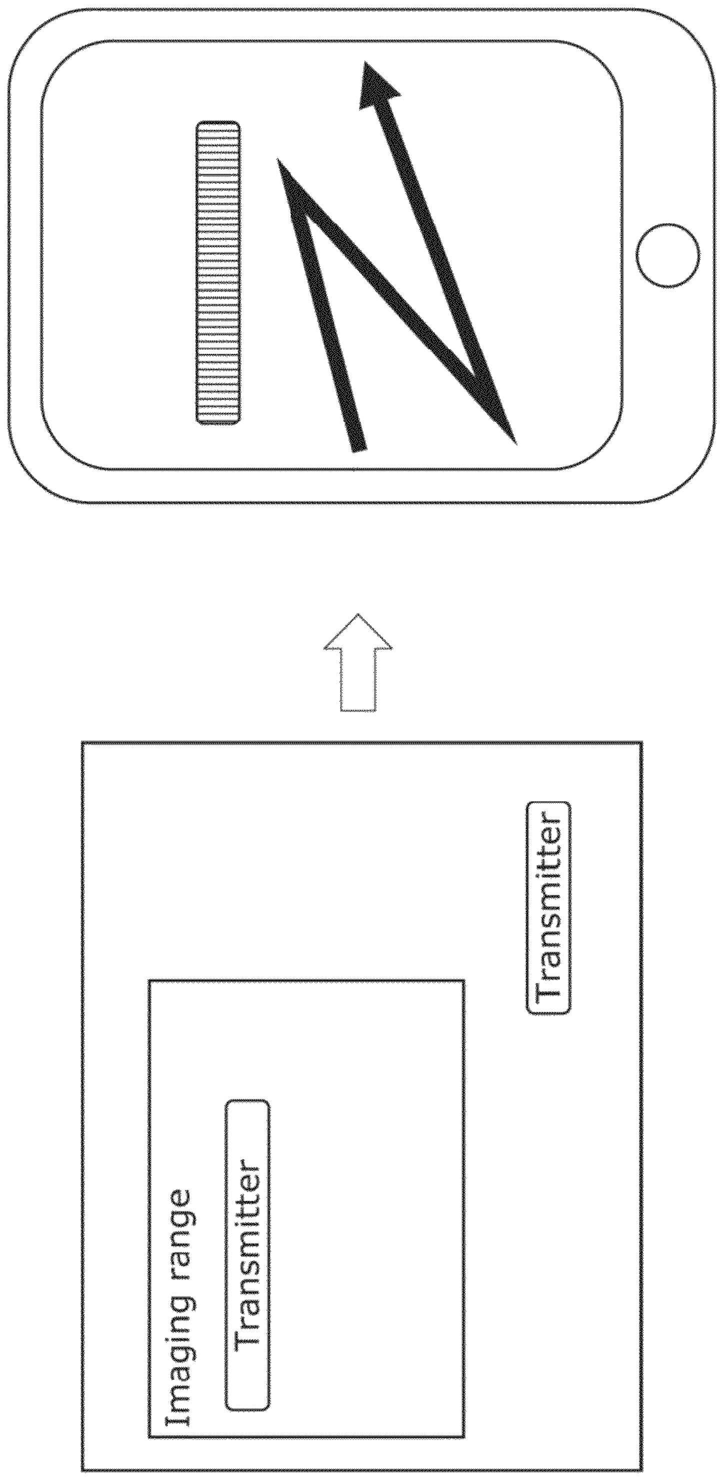

FIG. 428 is a diagram illustrating an example of an instruction to a user displayed on a screen of a receiver in Embodiment 17.

Figure 429:
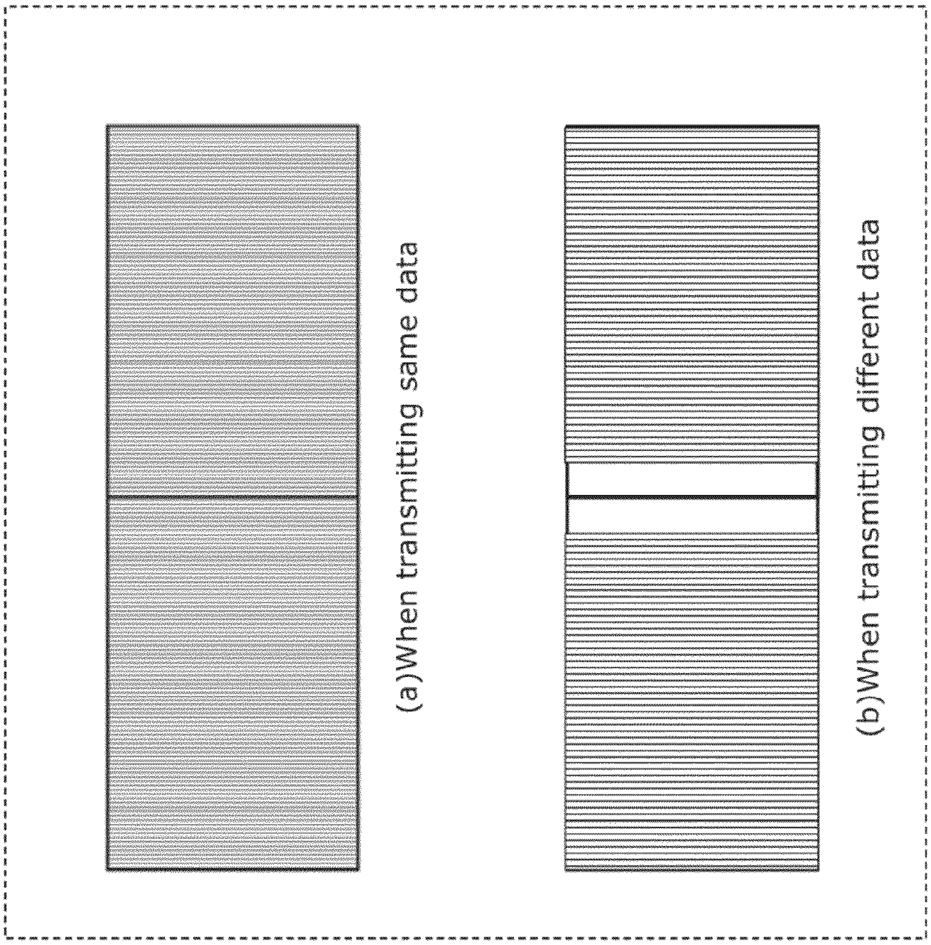

FIG. 429 is a diagram illustrating an example of a signal transmission method in Embodiment 17.

Figure 430:
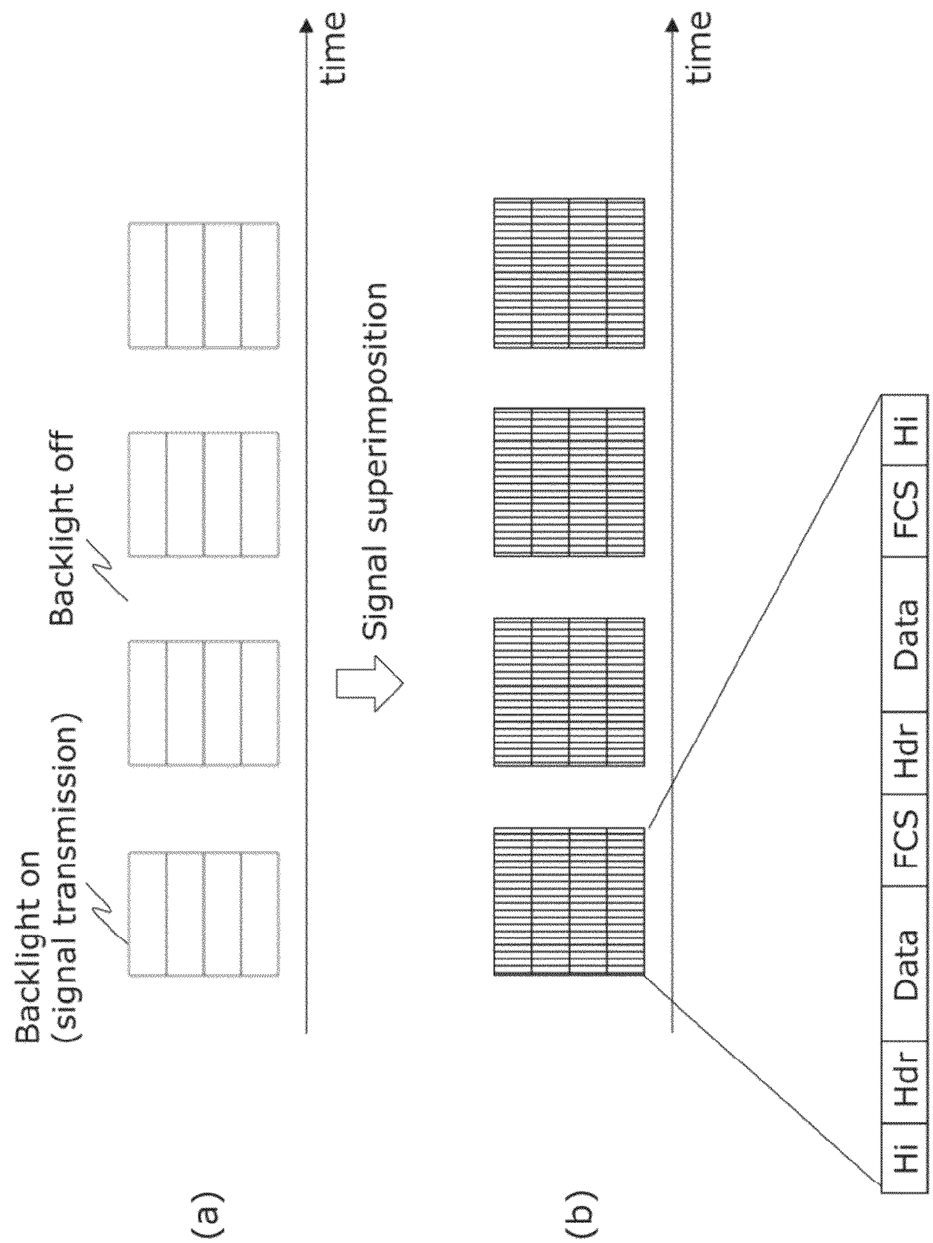

FIGS. 430 (*a*) and (*b*) is a diagram illustrating an example of a signal transmission method in Embodiment 17.

Figure 431:
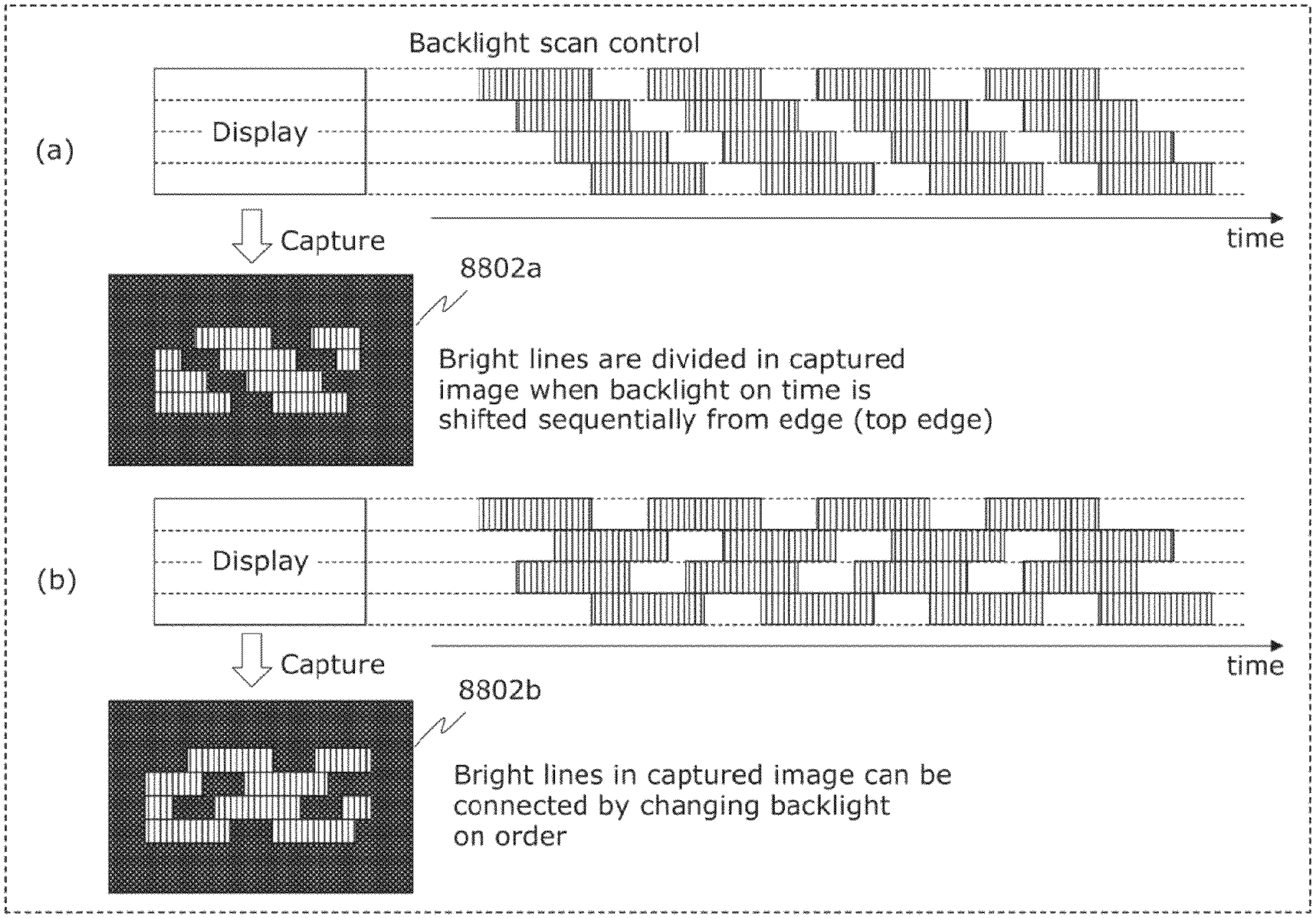

FIG. 431 is a diagram illustrating an example of a signal transmission method in Embodiment 17.

Figure 432:
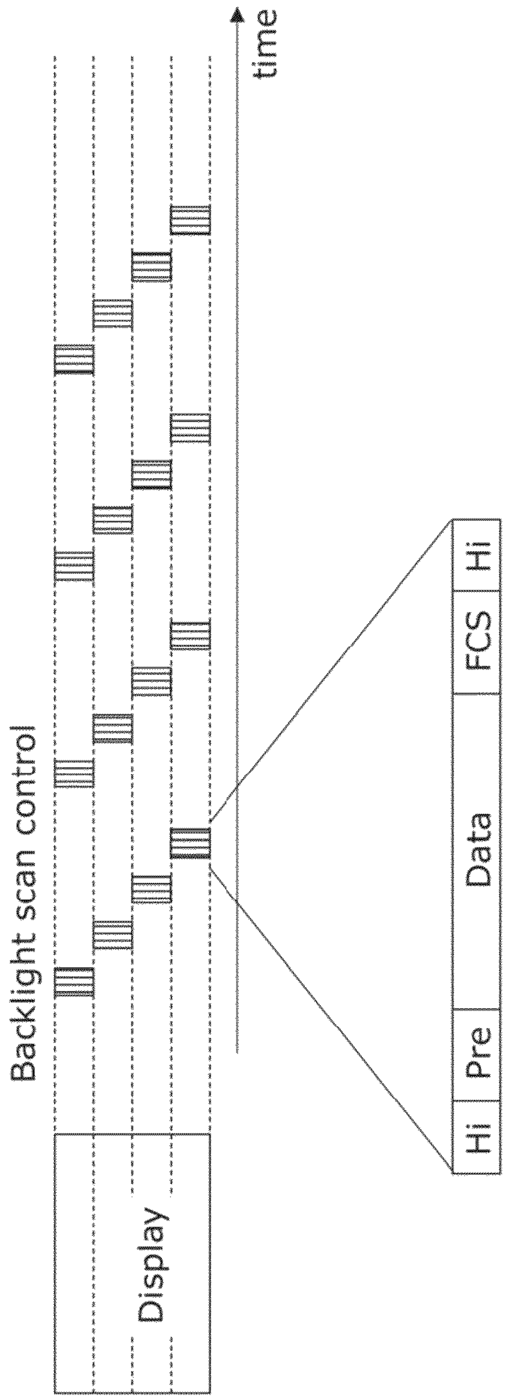

FIG. 432 is a diagram illustrating an example of a signal transmission method in Embodiment 17.

Figure 433:
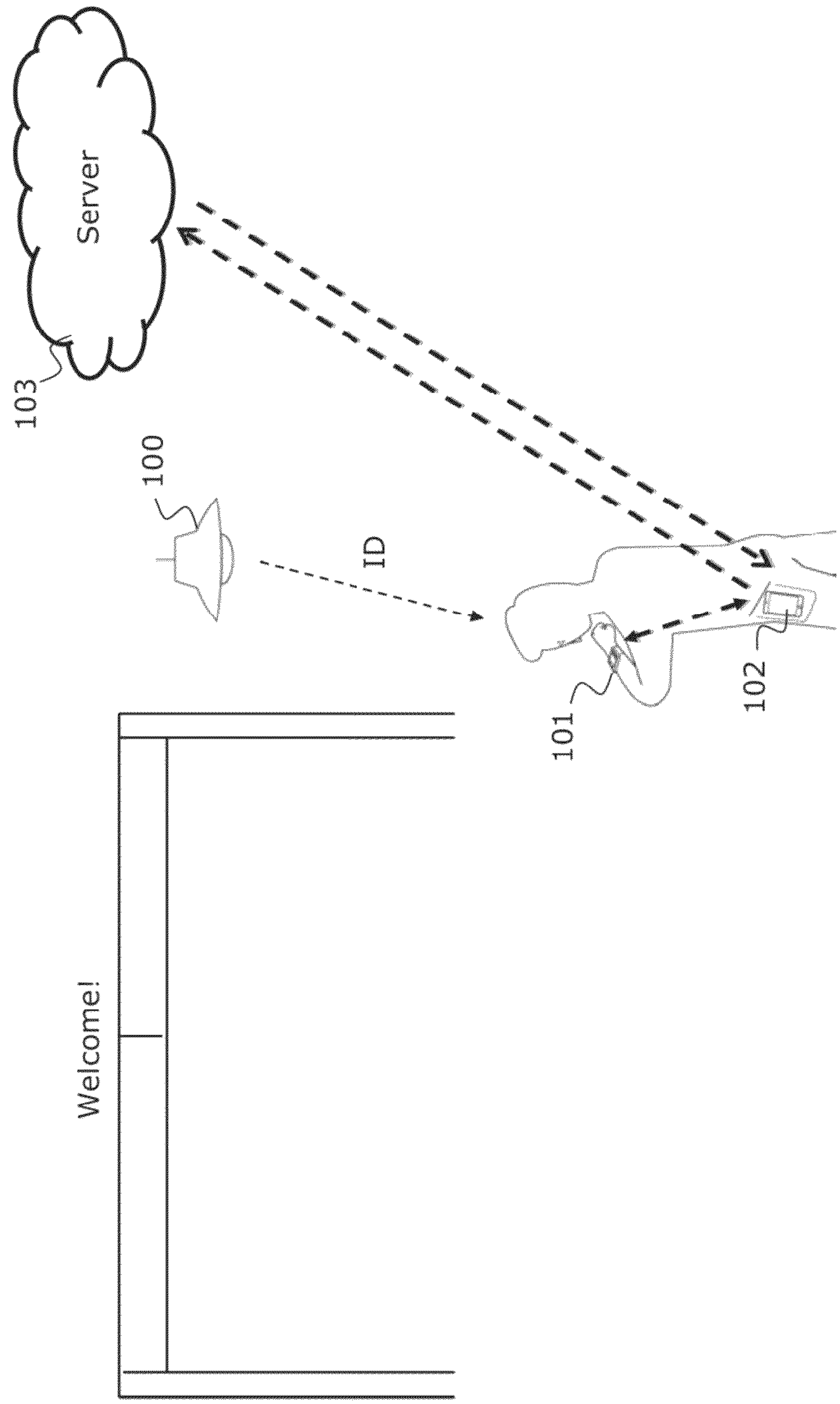

FIG. 433 is a diagram for describing a use case in Embodiment 17.

FIG. 434 is a diagram illustrating an information table transmitted from a smartphone to a server in Embodiment 17.

Figure 435:
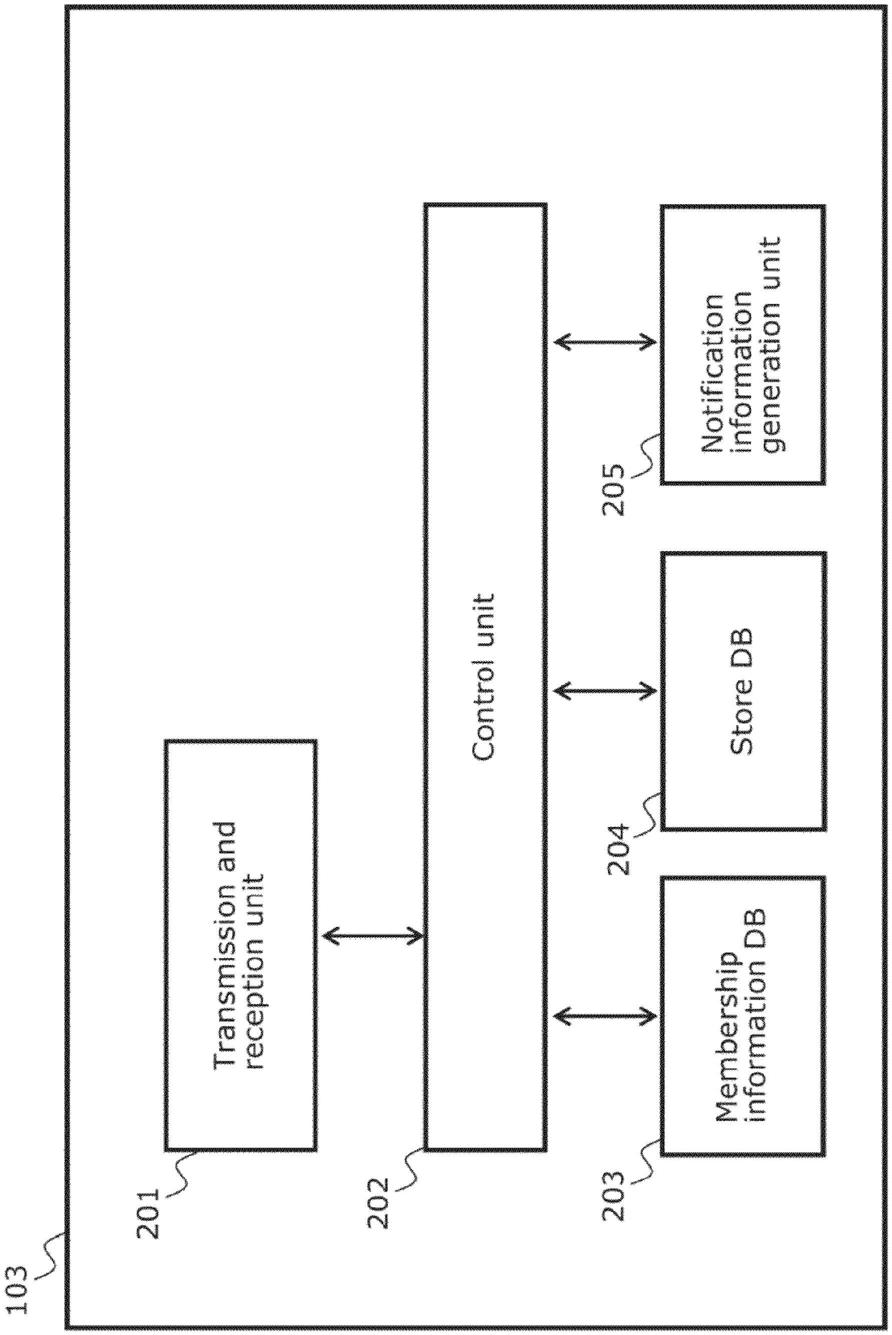

FIG. 435 is a block diagram of a server in Embodiment 17.

Figure 436:
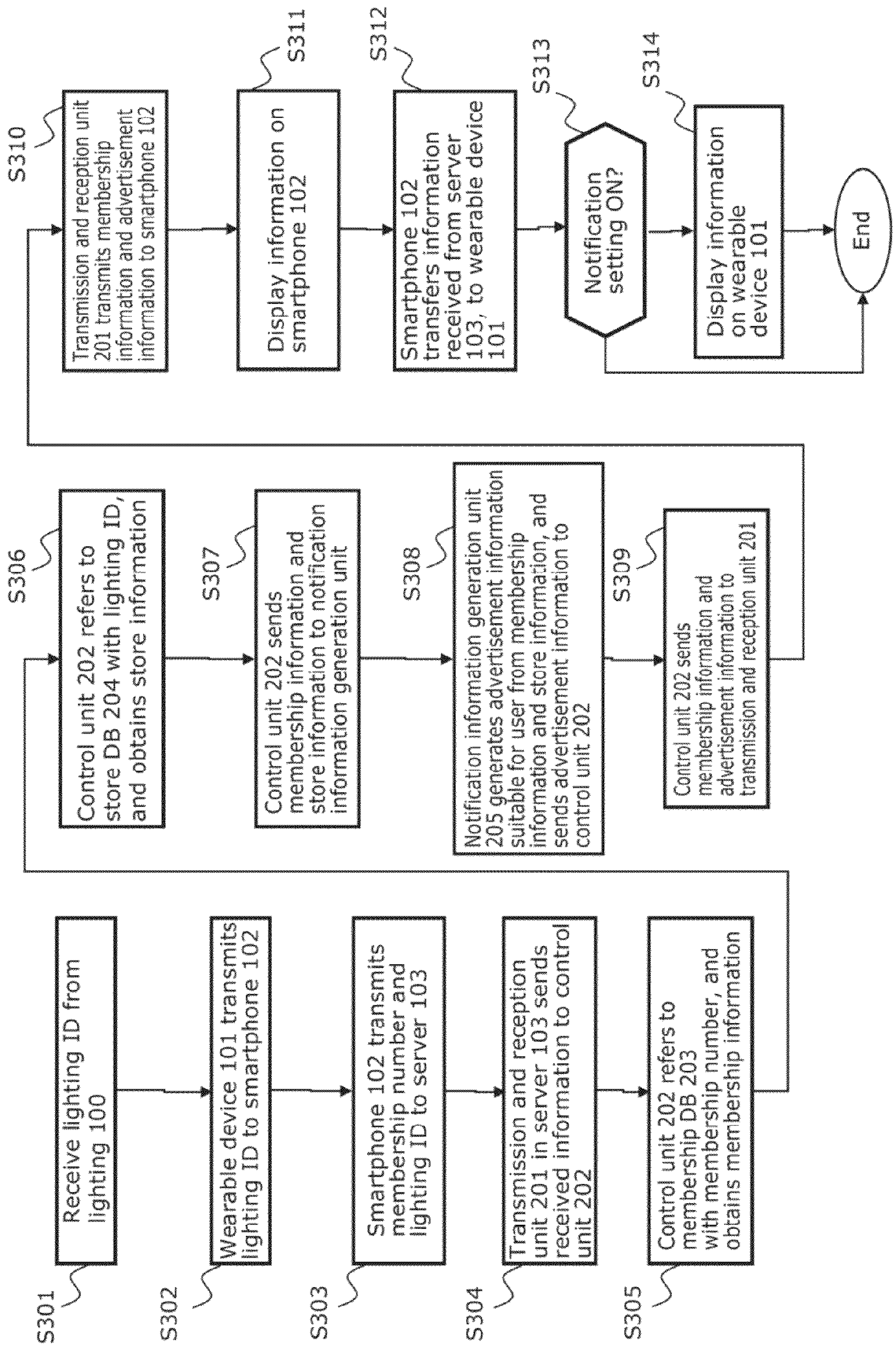

FIG. 436 is a flowchart illustrating an overall process of a system in Embodiment 17.

FIG. 437 is a diagram illustrating an information table transmitted from a server to a smartphone in Embodiment 17.

Figure 438:
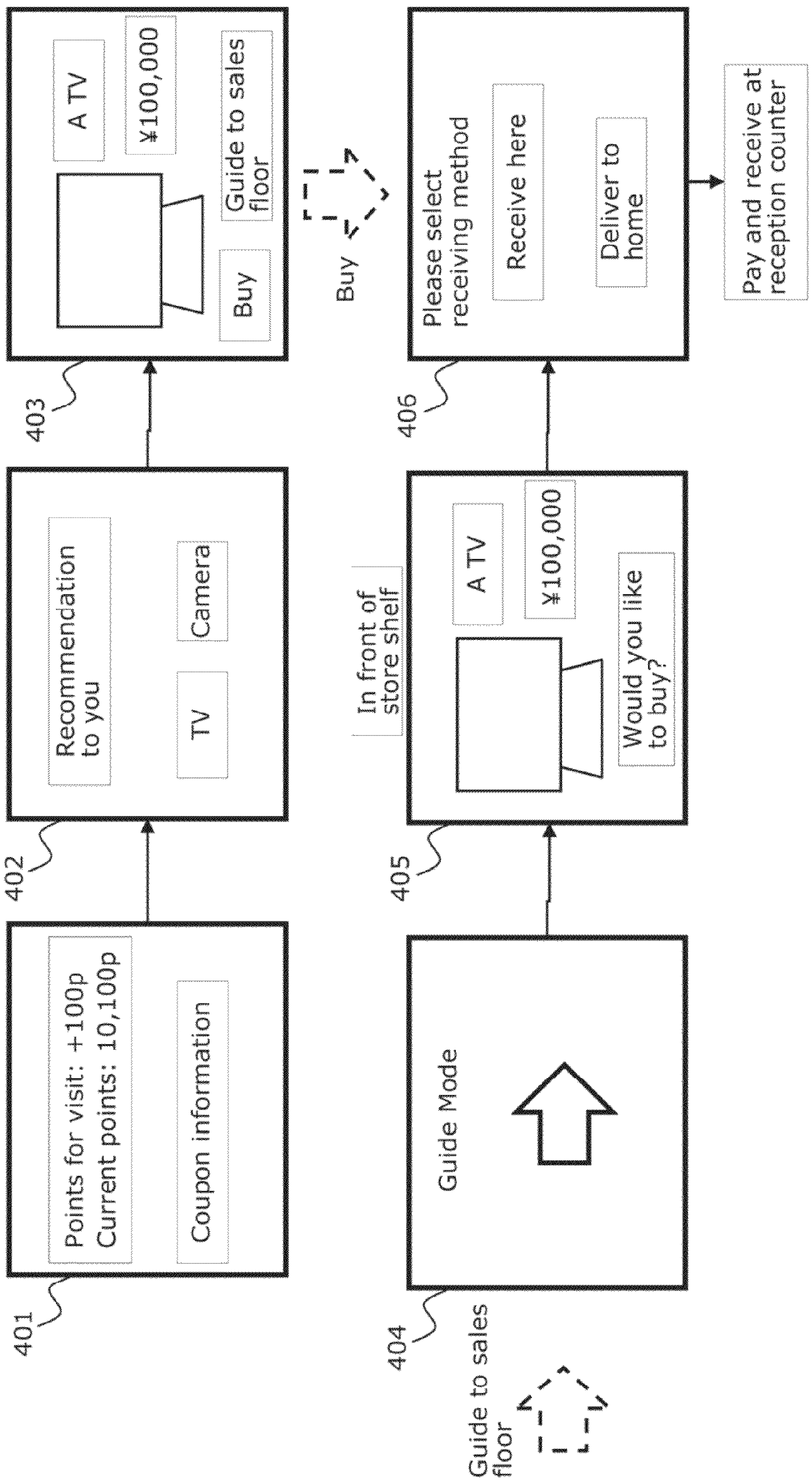

FIG. 438 is a diagram illustrating flow of screen displayed on a wearable device from when a user receives information from a server in front of a store to when the user actually buys a product in Embodiment 17.

Figure 439:
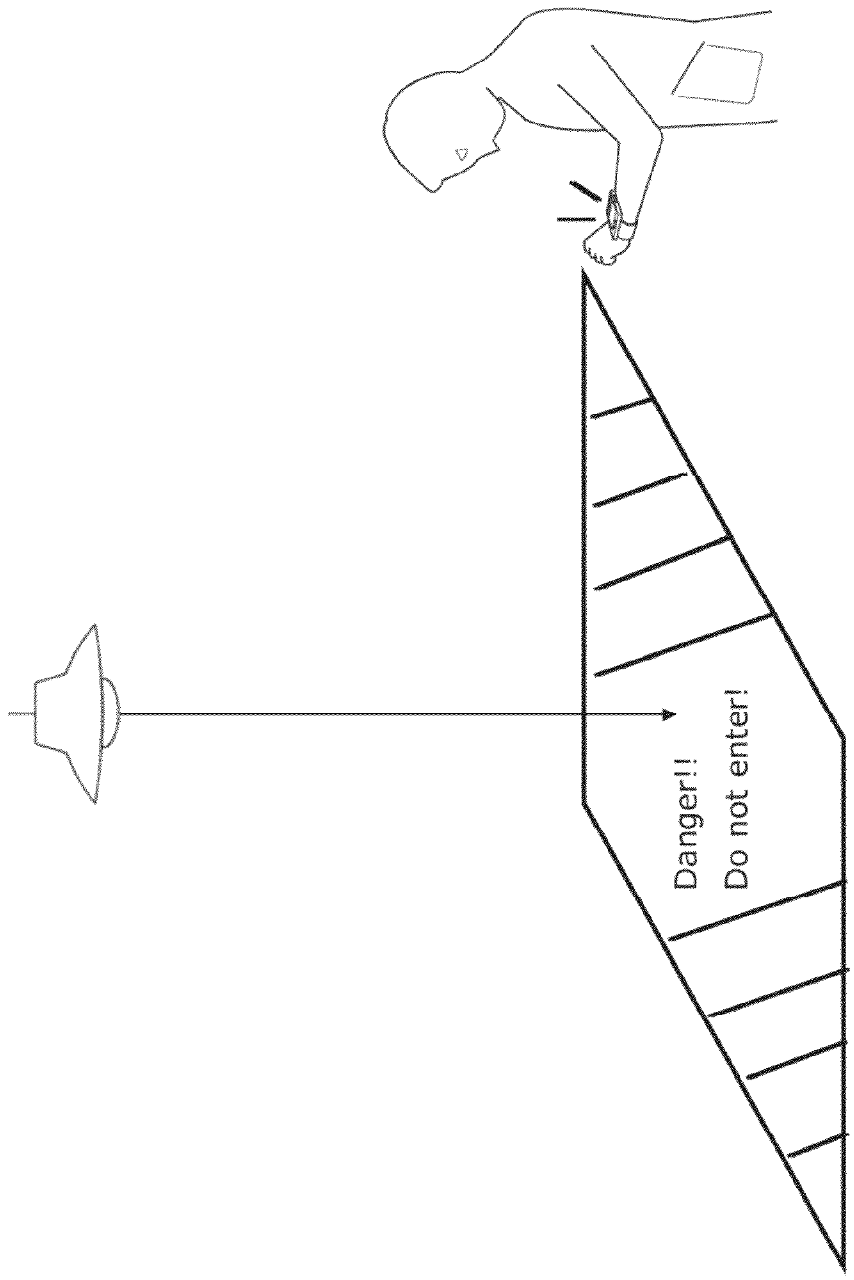

FIG. 439 is a diagram for describing another use case in Embodiment 17.

Figure 440:
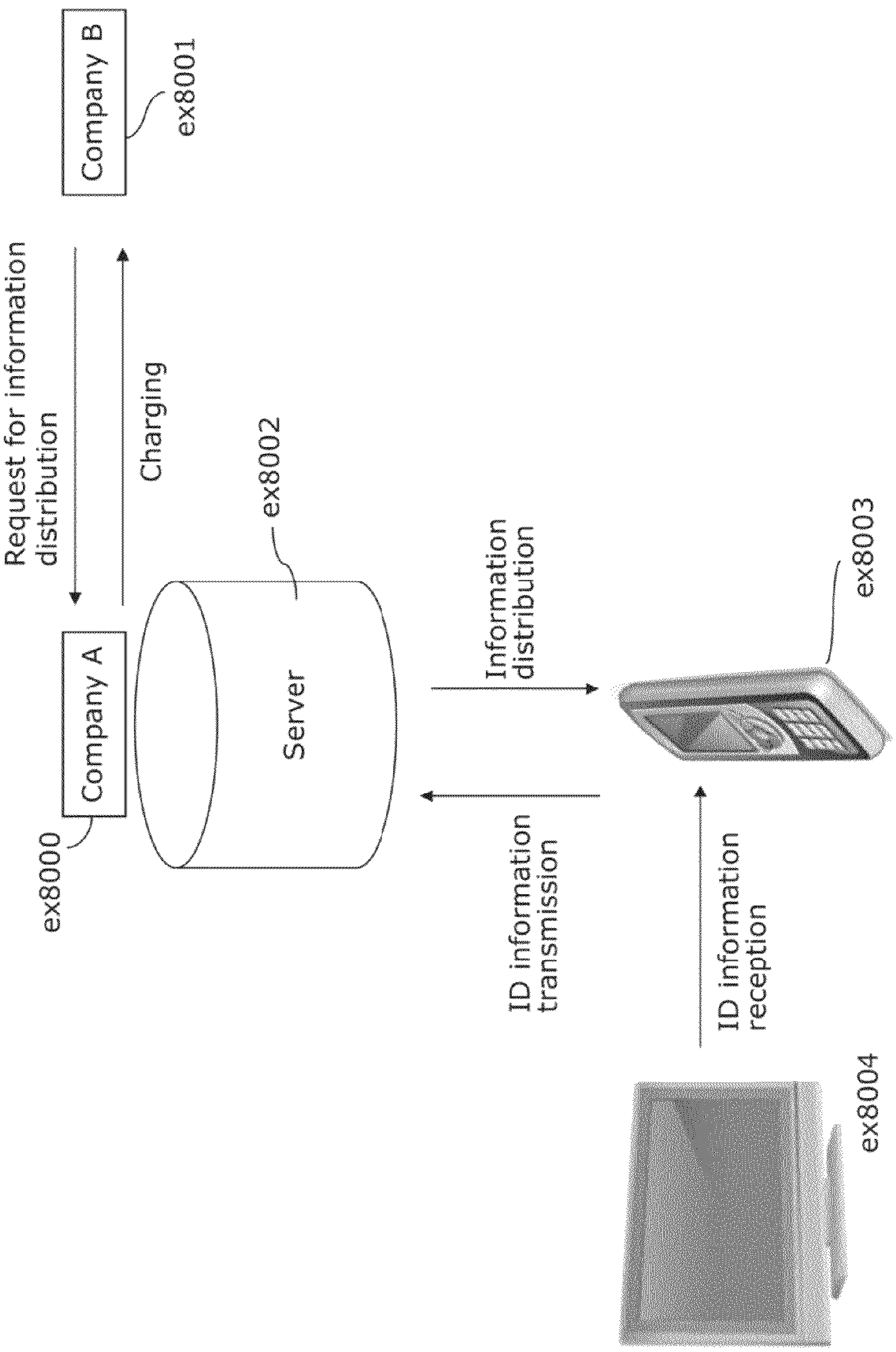

FIG. 440 is a diagram illustrating a service provision system using the reception method described in any of the foregoing embodiments.

Figure 441:
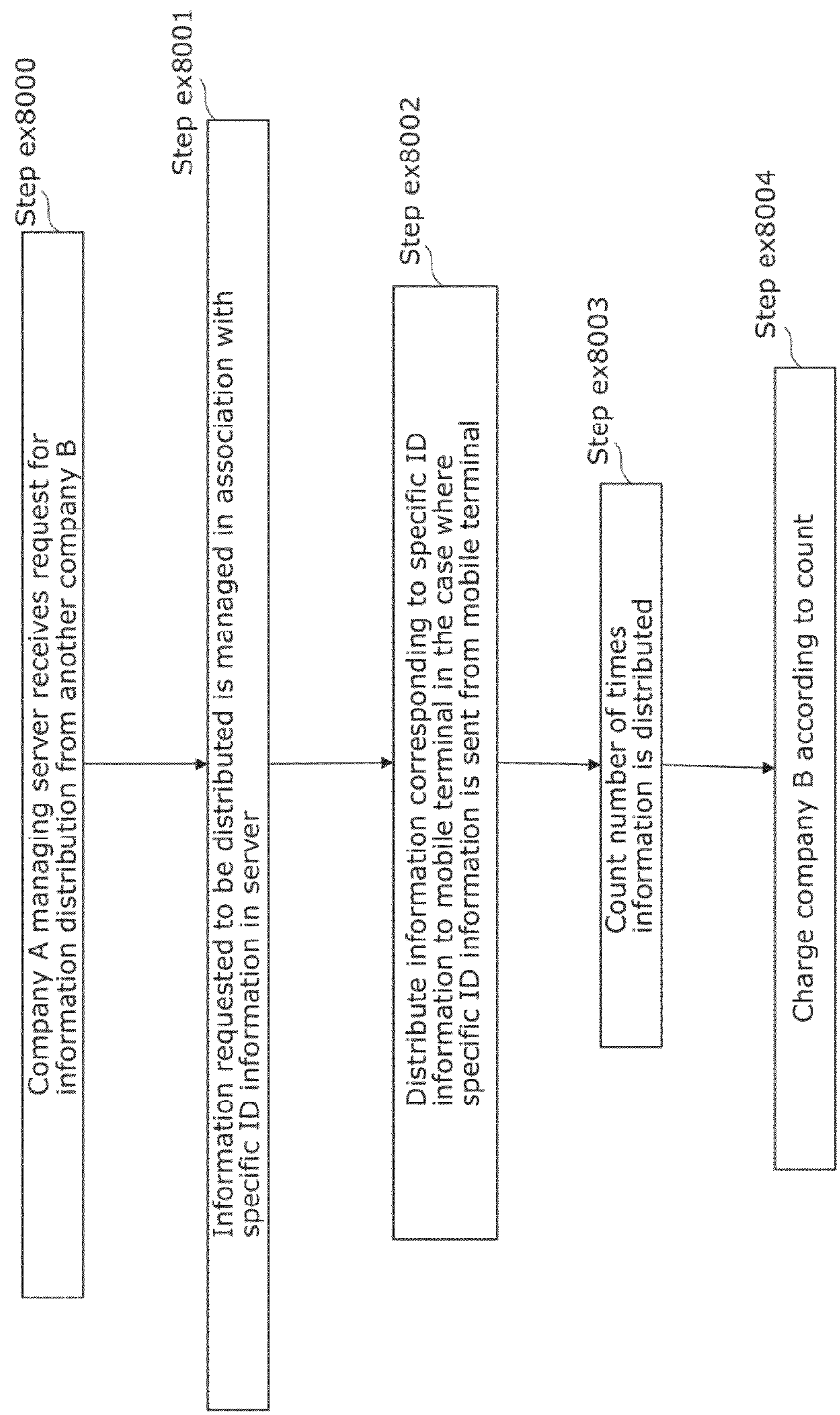

FIG. 441 is a flowchart illustrating flow of service provision.

Figure 442:
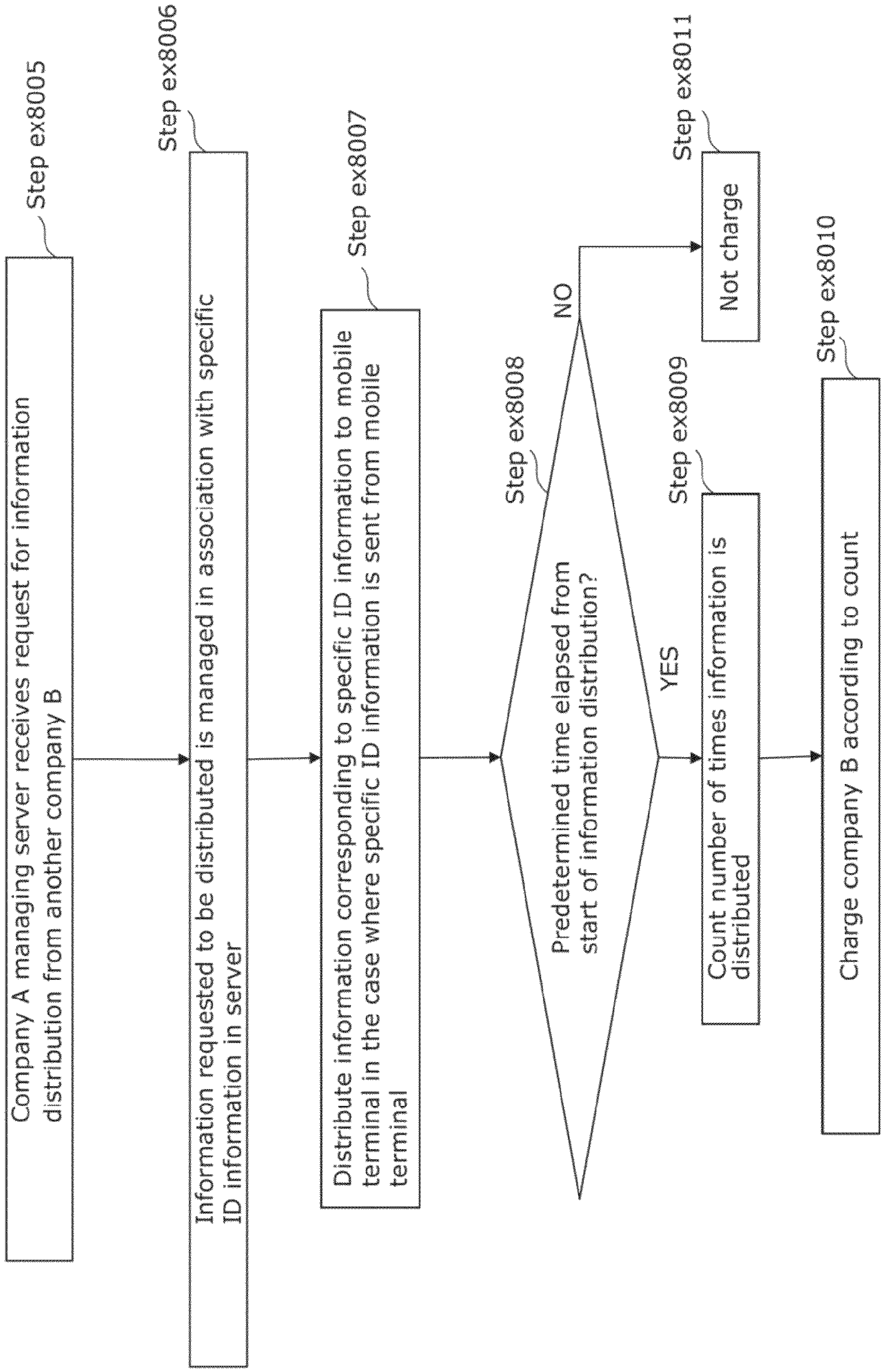

FIG. 442 is a flowchart illustrating service provision in another example.

Figure 443:
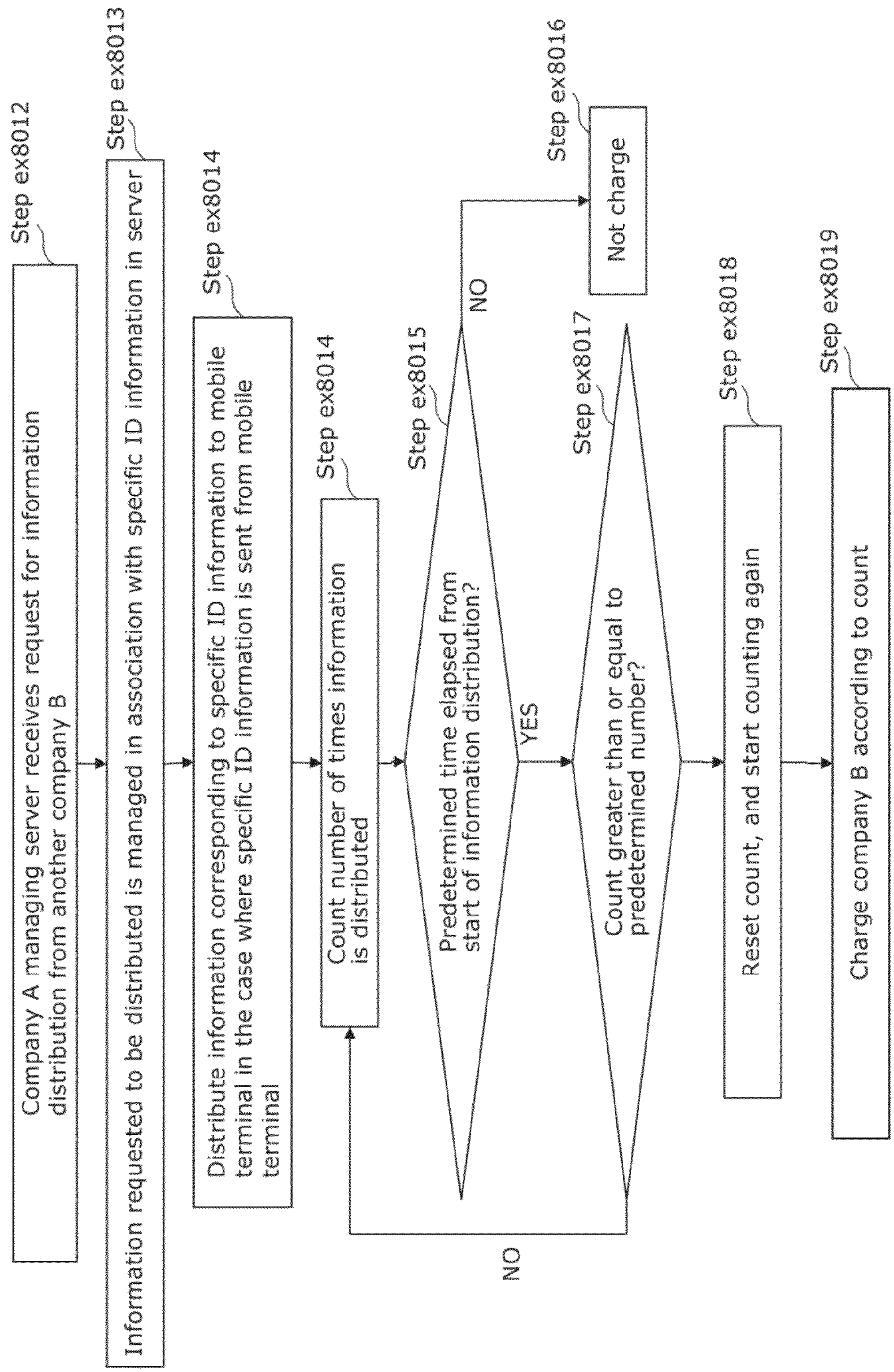

FIG. 443 is a flowchart illustrating service provision in another example.

Figure 444B:
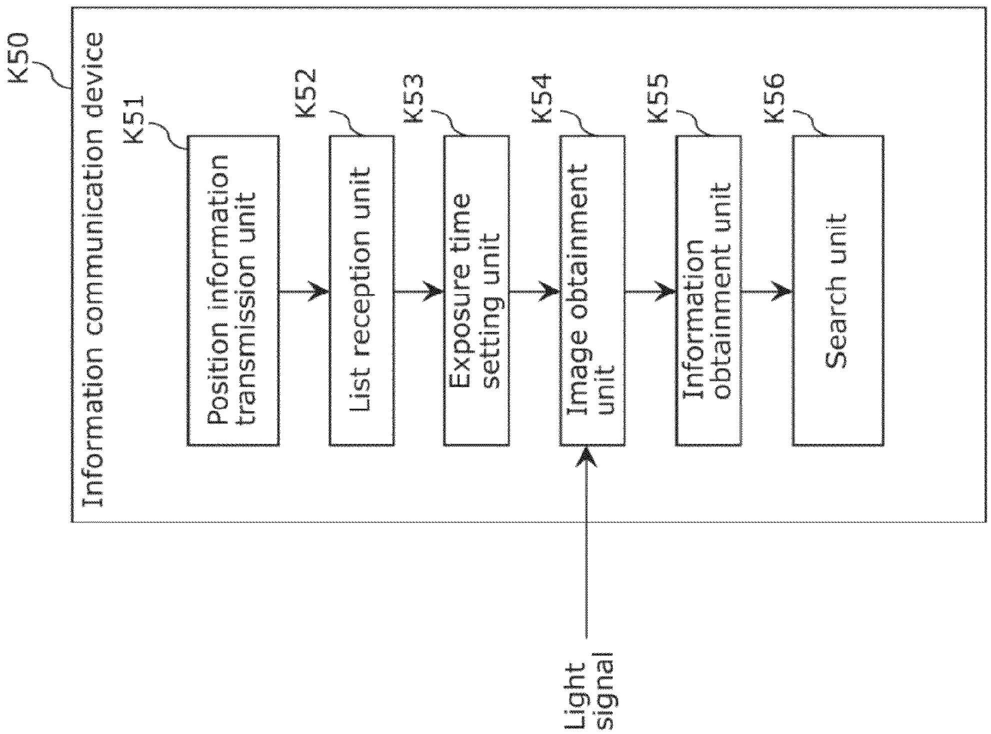
Figure 444A:
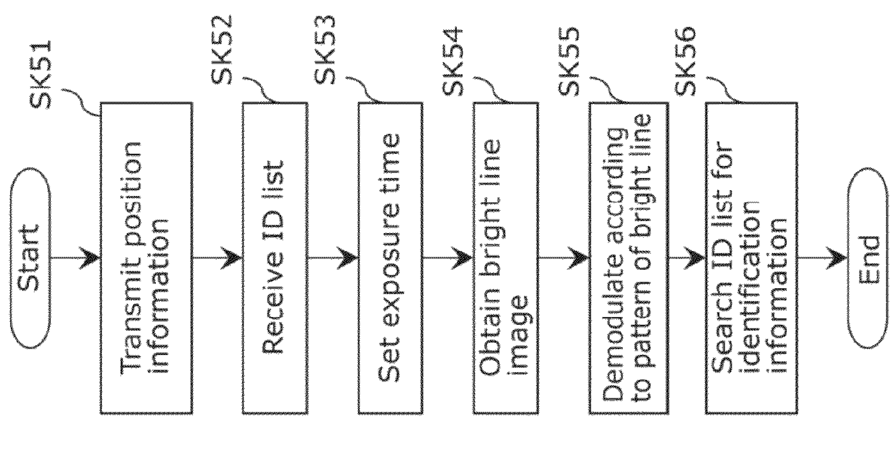

FIG. 444A is a flowchart of an information communication method according to an aspect of the present disclosure.

FIG. 444B is a block diagram of an information communication device according to an aspect of the present disclosure.

DESCRIPTION OF EMBODIMENTS

An information communication method according to an aspect of the present disclosure is an information communication method of obtaining information from a subject, the information communication method including: transmitting position information indicating a position of an image sensor used to capture the subject; receiving an ID list that is associated with the position indicated by the position information and includes a plurality of sets of identification information; setting an exposure time of the image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining the information by demodulating data specified by a pattern of the bright line included in the obtained bright line image; and searching the ID list for identification information that includes the obtained information.

In this way, the information transmitted using the change in luminance of the subject is obtained by the exposure of the exposure line in the image sensor. This enables communication between various devices with no need for, for example, a special communication device for wireless communication. Moreover, since the ID list is received beforehand, even when the obtained information "bc" is only a part of identification information, the appropriate identification information "abcd" can be specified based on the ID list, for instance as illustrated in FIG. 389 described later.

For example, in the case where the identification information that includes the obtained information is not uniquely specified in the searching, the obtaining of a bright line image and the obtaining of the information may be repeated to obtain new information, and the information communication method may further include searching the ID list for the identification information that includes the obtained information and the new information.

In this way, even in the case where the obtained information "b" is only a part of identification information and the identification information cannot be uniquely specified with this information alone, the new information "c" is obtained and so the appropriate identification information "abcd" can be specified based on the new information and the ID list, for instance as illustrated in FIG. 389 described later.

For example, the information communication method may further include: transmitting the obtained information; and receiving error notification information for notifying an error, in the case where the identification information that includes the obtained information is not included in the ID list associated with the position indicated by the position information.

In this way, the error notification information is received in the case where the obtained identification information is not included in the ID list, for instance as illustrated in FIG. 391 described later. Upon receiving the error notification information, the user of the receiver can easily recognize that information associated with the obtained identification information cannot be obtained.

For example, in the obtaining of a bright line image, the bright line image including a plurality of parts where the bright line appears may be obtained by capturing a plurality of subjects in a period during which the image sensor is being moved, in the obtaining of the information, a position of each of the plurality of subjects may be obtained by demodulating, for each of the plurality of parts, the data specified by the pattern of the bright line in the part, and the information communication method may further include estimating a position and an imaging direction of the image sensor, based on the obtained position of each of the plurality of subjects and a moving state of the image sensor.

In this way, the position and imaging direction of a receiver including the image sensor can be accurately estimated using the luminance changes of the plurality of subjects such as lightings, for instance as illustrated in FIG. 350 described later.

For example, in the obtaining of a bright line image, the bright line image may be obtained by capturing a plurality of subjects reflected on a reflection surface, and in the obtaining of the information, the information may be obtained by separating a bright line corresponding to each of the plurality of subjects from bright lines included in the bright line image according to a strength of the bright line and demodulating, for each of the plurality of subjects, the data specified by the pattern of the bright line corresponding to the subject.

In this way, even in the case where the plurality of subjects such as lightings each change in luminance, appropriate information can be obtained from each subject, for instance as illustrated in FIG. 370 described later.

For example, the information communication method may further include obtaining related information associated with the identification information from a server, by transmitting the identification information to the server, wherein in the obtaining of a bright line image, the subject displaying content that is broadcasted and received is captured, in the searching, the identification information that includes a channel and a reference time is searched for, the channel being used to broadcast the content displayed by the subject, and the reference time being a time at which the content is displayed, and in the obtaining of the related information, a plurality of sets of related information associated with the channel and each of the reference time and at least one neighboring time around the reference time are obtained from the server.

In this way, not only the related information associated with the information (channel and reference time) transmitted from a transmitter which is the subject changing in luminance but also the related information associated with the neighboring time is obtained, for instance as illustrated in FIG. 412 described later. Therefore, even in the case where information desired by the user cannot be obtained from the transmitter because the timing of capturing the transmitter is off, related information associated with the information can be obtained from the server.

For example, the information communication method may further include: obtaining a lighting image by capturing the subject that is lighting without making the change in luminance for signal transmission, the lighting image indicating a lighting range in which the subject is lighting; and specifying, in the bright line image, a range that is at a same position as the lighting range in the lighting image and has a same size and shape as the lighting range, as a signal transmission range, wherein in the obtaining of the information, the data specified by the pattern of the bright line included in the specified signal transmission range is demodulated.

In this way, the signal transmission range is specified from the bright line image based on the lighting range (normal lighting range), and so the range in which the signal is transmitted can be accurately specified in the bright line image, for instance as illustrated in FIG. 410 described later. As an example, in the case where there is a dark part at an edge in the signal transmission range, it can be appropriately recognized that a signal indicating that there is no bright line is transmitted from the part, without erroneously recognizing that no signal is transmitted from the part.

For example, the information communication method may further include: determining a pattern of the change in luminance, by modulating a signal to be transmitted; and transmitting the signal by a display changing in luminance according to the determined pattern while displaying an image, the display being the subject, wherein in the transmitting of the signal, only a part of the display that is emitting light with predetermined brightness or more to display the image changes in luminance according to the pattern.

In this way, a part of the display set to less than predetermined brightness in order to display an image, i.e. a dark part, does not change in luminance, for instance as illustrated in FIG. 413 described later. This stabilizes darkness, and enables a darker gray level to be expressed.

For example, the display may include a backlight, the information communication method may further include sequentially displaying, by the display, a left-eye image and a right-eye image lit with given brightness by the backlight, and the transmitting of the signal and the sequentially displaying are repeated alternately.

In this way, while the luminance change is performed, the field of vision of both eyes of the user is closed by 3D glasses. When the left-eye image and the right-eye image are sequentially displayed, only the field of vision of the user's eye corresponding to the image is opened by the 3D glasses, for instance as illustrated in FIG. 409 described later. As a result, the user can view a three-dimensional image without flicker caused by luminance change.

For example, the information communication method may further include detecting, by a sensor, a person within a viewing angle of the display or a person near the viewing angle, wherein in the transmitting of the signal, the signal is transmitted by changing in luminance by a larger change amount in the case where the person near the viewing angle is detected than in the case where the person within the viewing angle is detected, and the transmission of the signal using the change in luminance is stopped in the case where neither the person within the viewing angle nor the person near the viewing angle is detected.

In this way, in the case where a person near the viewing angle is detected, the display changes in luminance by a larger change amount than the normal change amount (the luminance change amount in the case where a person within the viewing angle is detected), for instance as illustrated in FIG. 414 described later. The receiver carried by the person can appropriately receive the signal by capturing the display that changes in luminance, even though it is situated outside the viewing angle.

For example, the information communication method may further include: receiving and recording a plurality of images included in broadcasted content and signals broadcasted respectively in association with the plurality of images, and obtaining related information associated with each of the signals from a server and storing the related information in a recording medium; determining a pattern of the change in luminance corresponding to each of the signals, by modulating the signal; transmitting, each time a display which is the subject displays an image included in the recorded content, a signal associated with the image by the display changing in luminance according to the pattern determined for the signal; and selecting, in the case where a signal associated with one of the plurality of images included in the content is searched for as the identification information in the searching, related information associated with the signal from a plurality of sets of related information stored in the recording medium, wherein for each of the plurality of images included in the content, a signal broadcasted in association with the image indicates a broadcast time at which the image is broadcasted and a channel used to broadcast the content.

In this way, when reproducing recorded content, the broadcast time and the channel associated with each of the plurality of images included in the content are transmitted using the change in luminance. Hence, related information associated with these images can be appropriately obtained.

For example, the information communication method may further include: receiving and recording a plurality of images included in broadcasted content and signals broadcasted respectively in association with the plurality of images, and obtaining related information associated with each of the signals from a server and storing the related information in a recording medium; determining a pattern of the change in luminance corresponding to each of the signals, by modulating the signal; transmitting, each time a display which is the subject displays an image included in the recorded content, a signal associated with the image by the display changing in luminance according to the pattern determined for the signal; and selecting, in the case where a signal associated with one of the plurality of images included in the content is searched for as the identification information in the searching, related information associated with the signal from a plurality of sets of related information stored in the recording medium, wherein for each of the plurality of images included in the content, a signal broadcasted in association with the image indicates image identification information for identifying the image in the content.

In this way, when reproducing recorded content, the image identification information associated with each of the plurality of images included in the content is transmitted using the change in luminance. Hence, related information associated with these images can be appropriately obtained.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present disclosure. Therefore, among the structural elements in the following embodiments, structural elements not recited in any one of the independent claims representing the broadest concepts are described as arbitrary structural elements.

Embodiment 1

The following describes Embodiment 1.

(Observation of Luminance of Light Emitting Unit)

Figure 1:
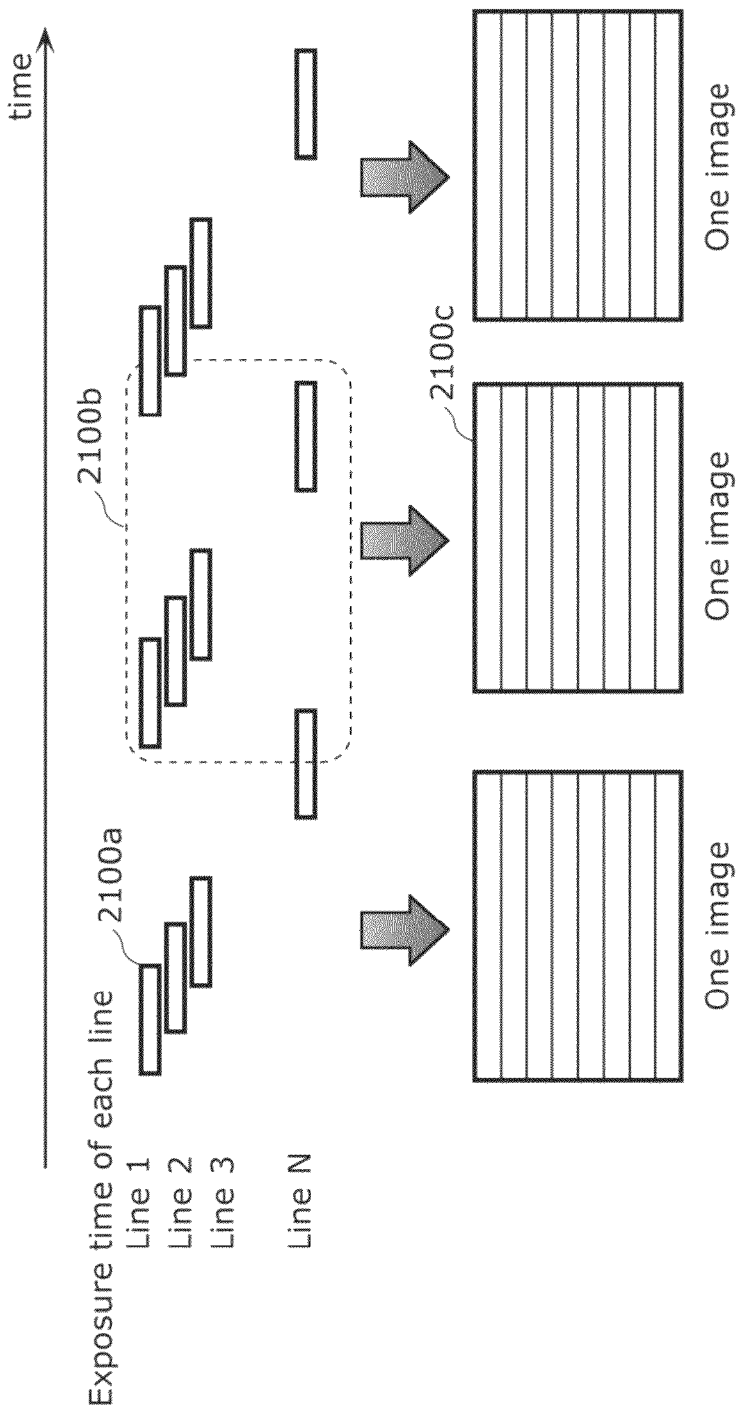
FIG. 1 is a diagram illustrating an example of an observation method of luminance of a light emitting unit in Embodiment 1.

The following proposes an imaging method in which, when capturing one image, all imaging elements are not exposed simultaneously but the times of starting and ending the exposure differ between the imaging elements. FIG. 1 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 2:
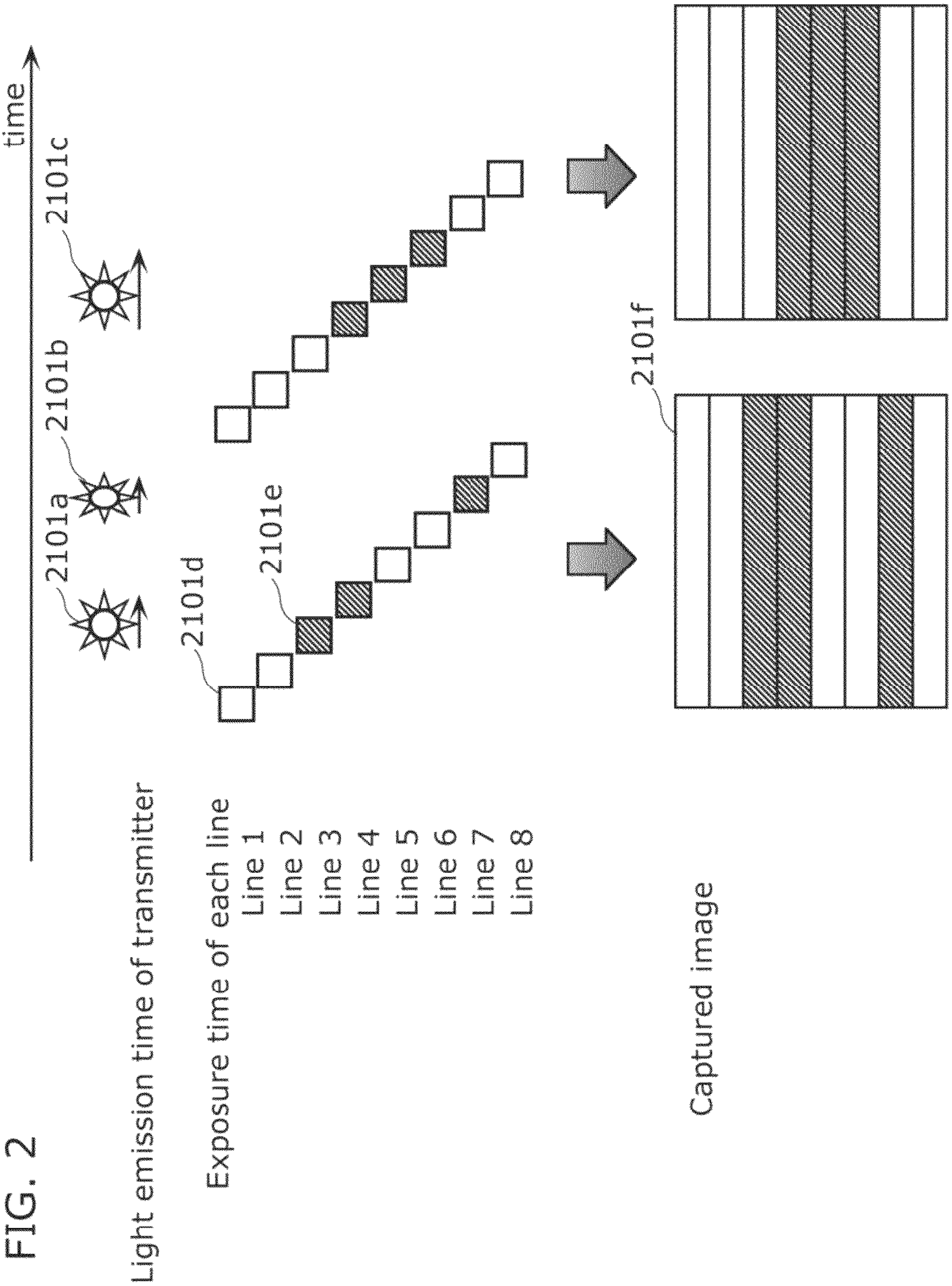
FIG. 2 is a diagram illustrating an example of an observation method of luminance of a light emitting unit in Embodiment 1.

In the case of capturing a blinking light source shown on the entire imaging elements using this imaging method, bright lines (lines of brightness in pixel value) along exposure lines appear in the captured image as illustrated in FIG. 2. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 2 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 3:
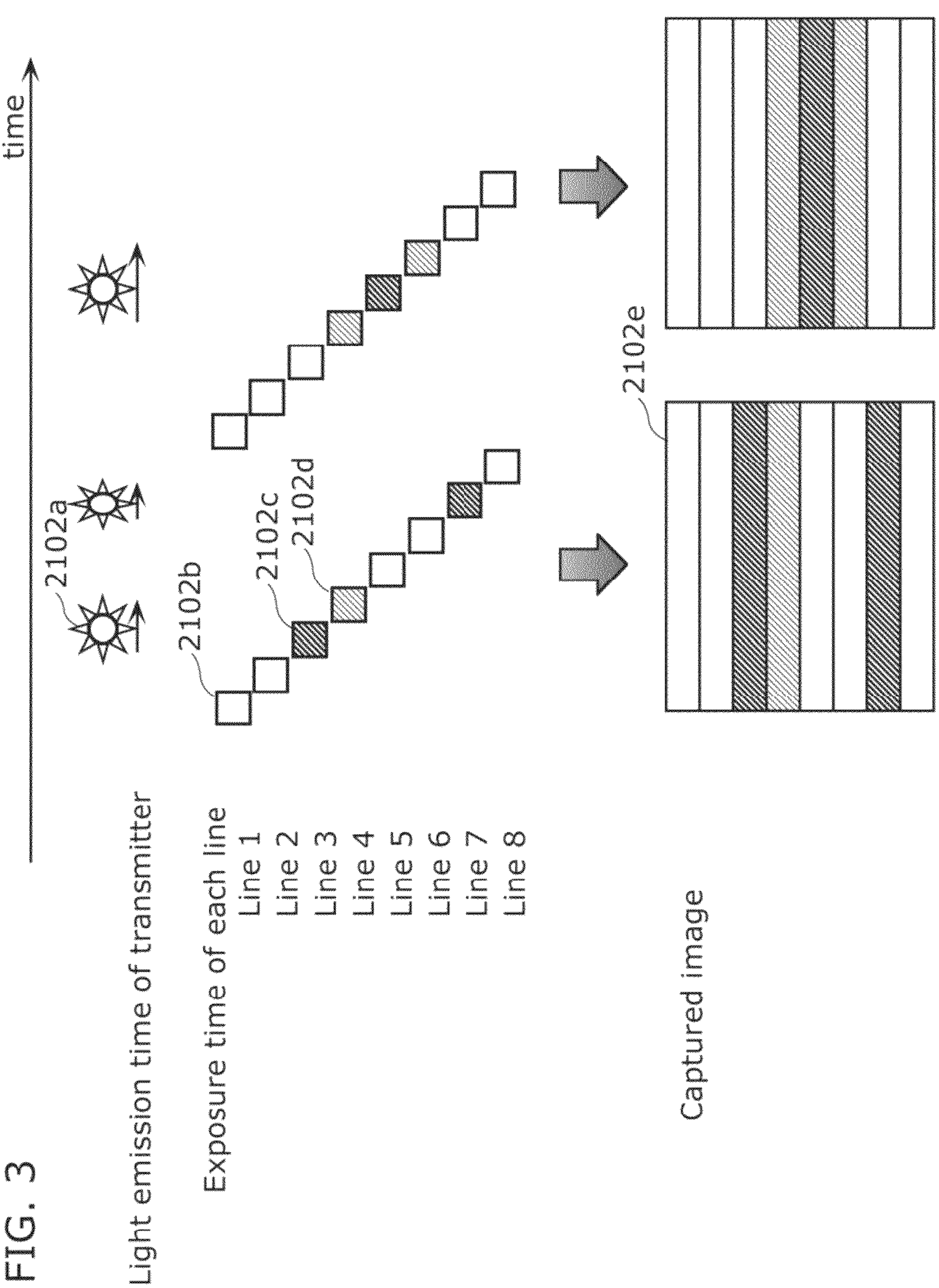
FIG. 3 is a diagram illustrating an example of an observation method of luminance of a light emitting unit in Embodiment 1.

If the exposure state of each exposure line caused by the light emission of the light emitting unit is recognizable in a plurality of levels as illustrated in FIG. 3, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 4A:
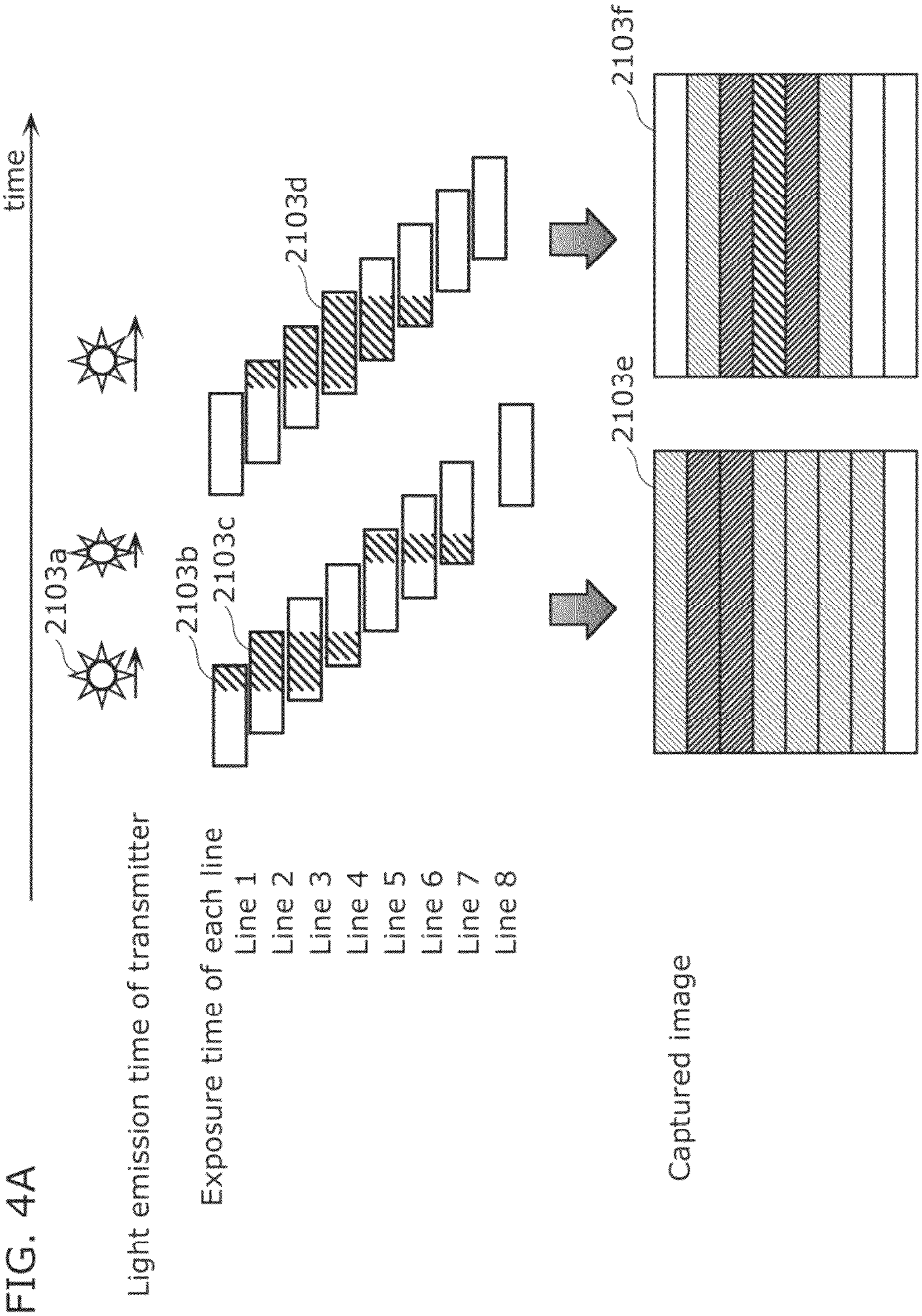
FIG. 4A is a diagram illustrating an example of an observation method of luminance of a light emitting unit in Embodiment 1.

FIG. 4A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 4B:
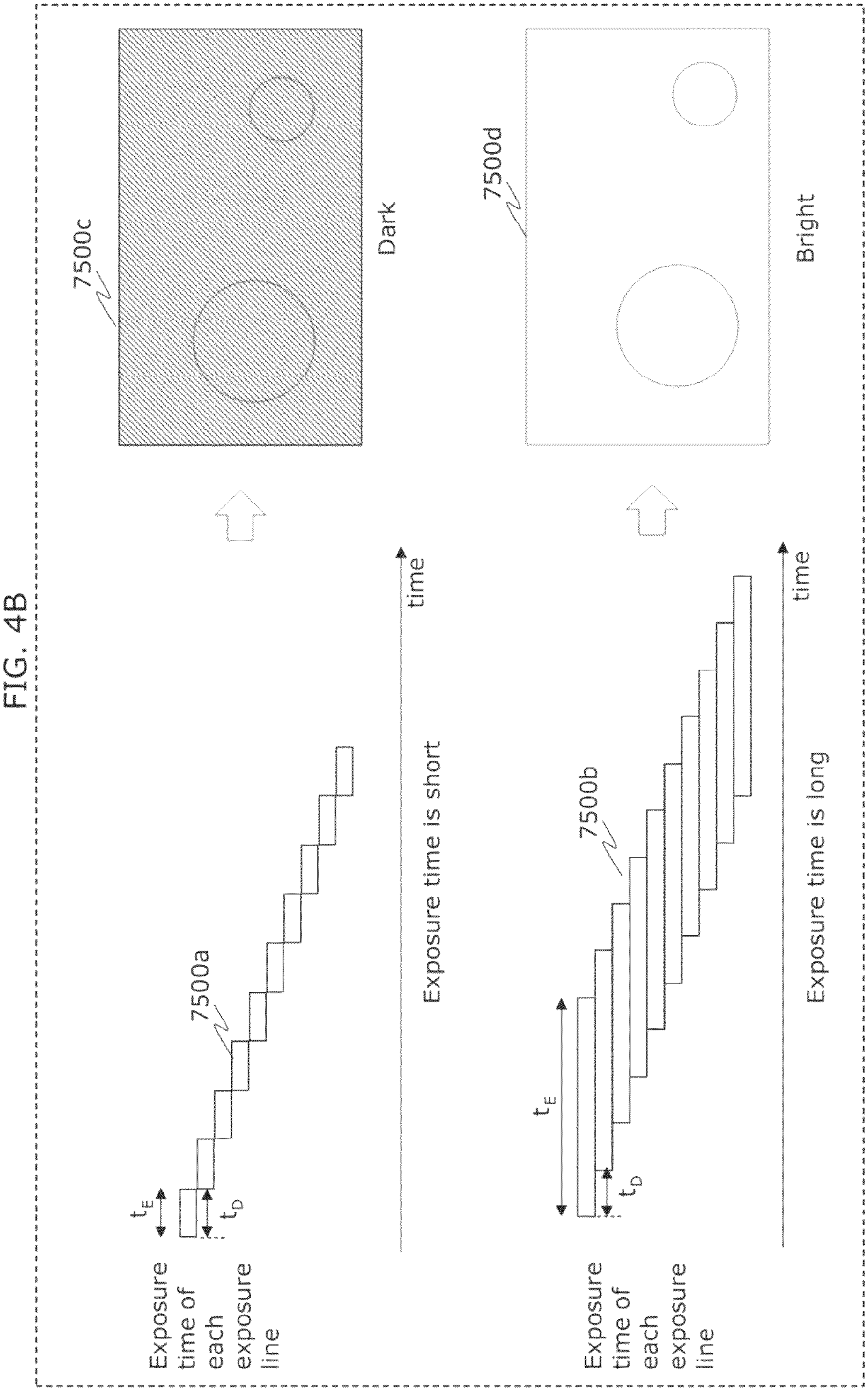
FIG. 4B is a diagram illustrating an example of an observation method of luminance of a light emitting unit in Embodiment 1.

FIG. 4B illustrates the influence of the difference in exposure time in the case where the exposure start time of each exposure line is the same. In 7500*a*, the exposure end time of one exposure line and the exposure start time of the next exposure line are the same. In 7500*b*, the exposure time is longer than that in 7500*a*. The structure in which the exposure times of adjacent exposure lines partially overlap each other as in 7500*b* allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 4C:
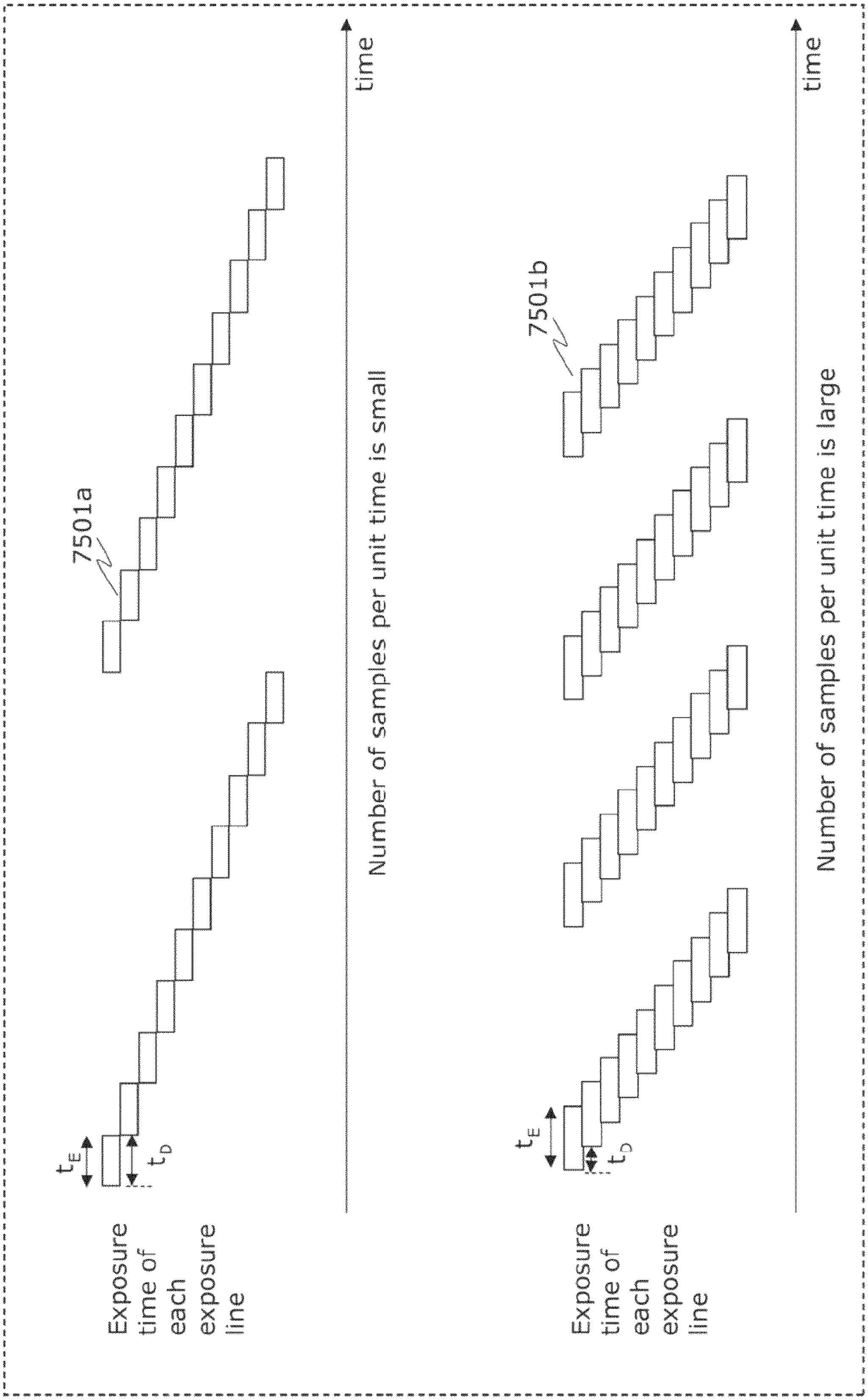
FIG. 4C is a diagram illustrating an example of an observation method of luminance of a light emitting unit in Embodiment 1.

FIG. 4C illustrates the influence of the difference in exposure start time of each exposure line in the case where the exposure time is the same. In 7501*a*, the exposure end time of one exposure line and the exposure start time of the next exposure line are the same. In 7501*b*, the exposure of one exposure line ends after the exposure of the next exposure line starts. The structure in which the exposure times of adjacent exposure lines partially overlap each other as in 7501*b* allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 4B and 4C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore ½f at the shortest. Besides, since 4-value information needs to be received within the time of ½f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 4D:
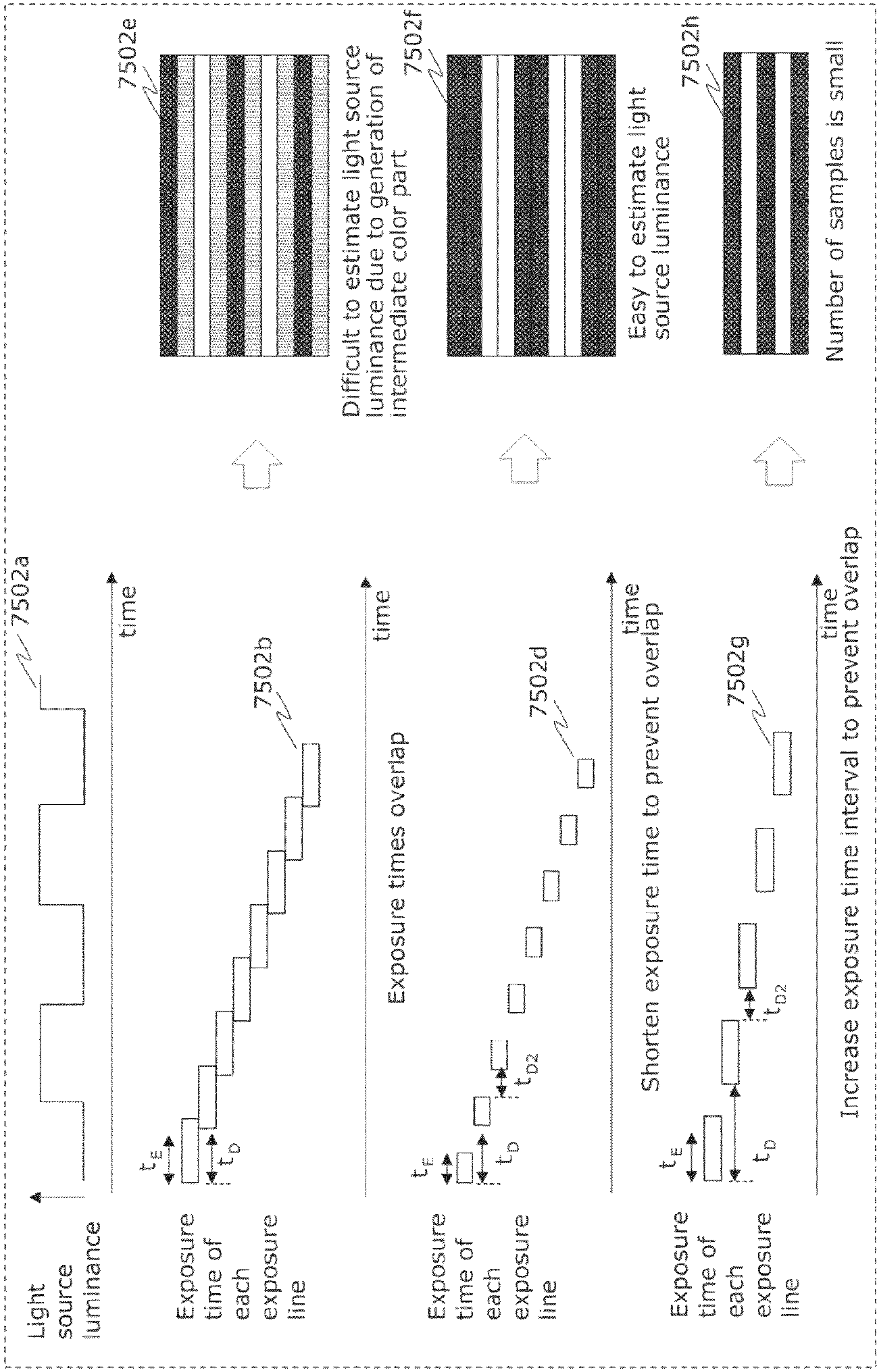
FIG. 4D is a diagram illustrating an example of an observation method of luminance of a light emitting unit in Embodiment 1.

FIG. 4D illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure vacant time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure vacant time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 4E:
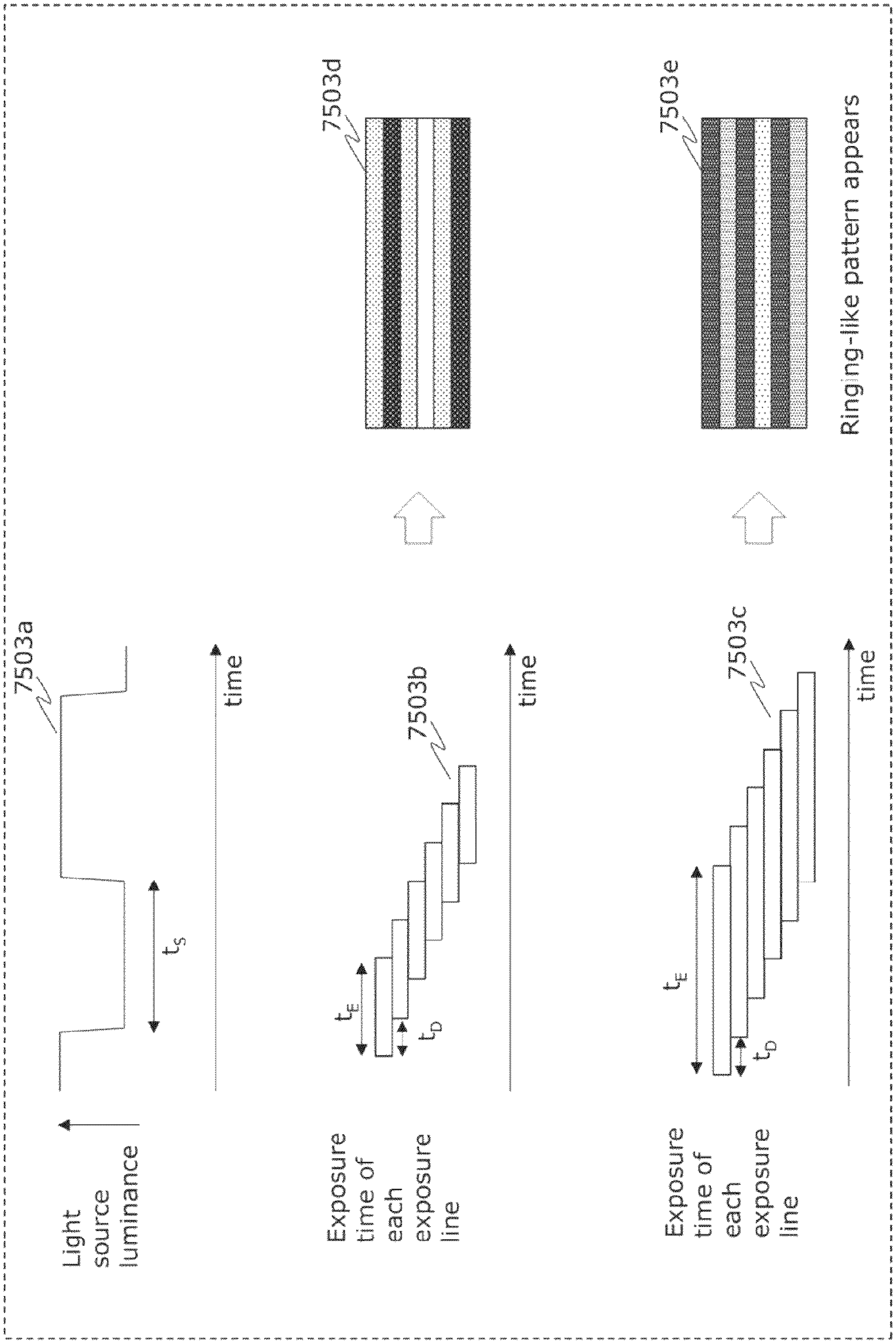
FIG. 4E is a diagram illustrating an example of an observation method of luminance of a light emitting unit in Embodiment 1.

FIG. 4E illustrates the relation between the minimum change time $t_5$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E>t_S$, a bright line pattern different from the luminance change of the light source might be obtained, making it difficult to recognize the luminance change of the light source from the captured image.

Figure 4F:
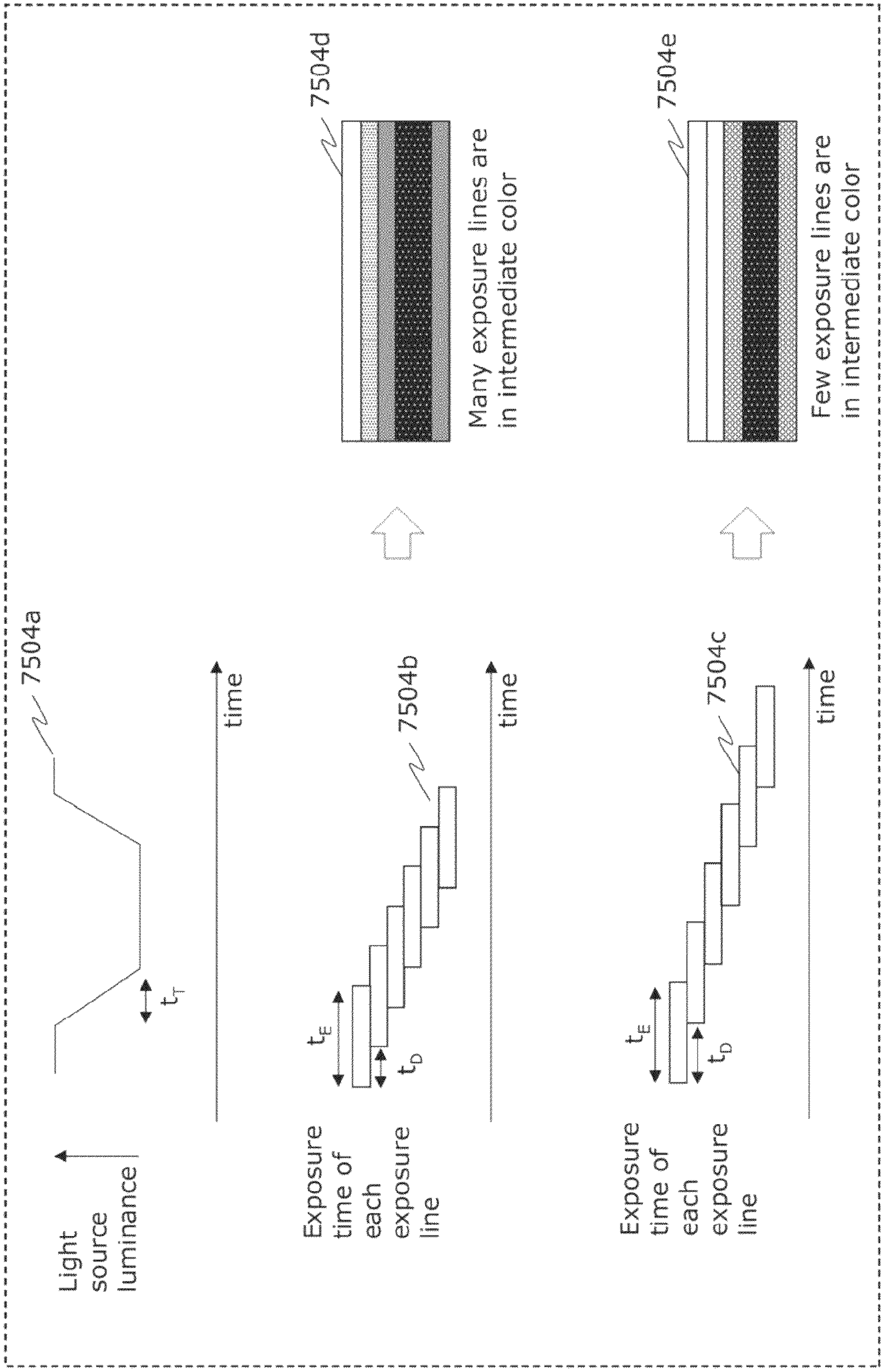
FIG. 4F is a diagram illustrating an example of an observation method of luminance of a light emitting unit in Embodiment 1.

FIG. 4F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 4G:
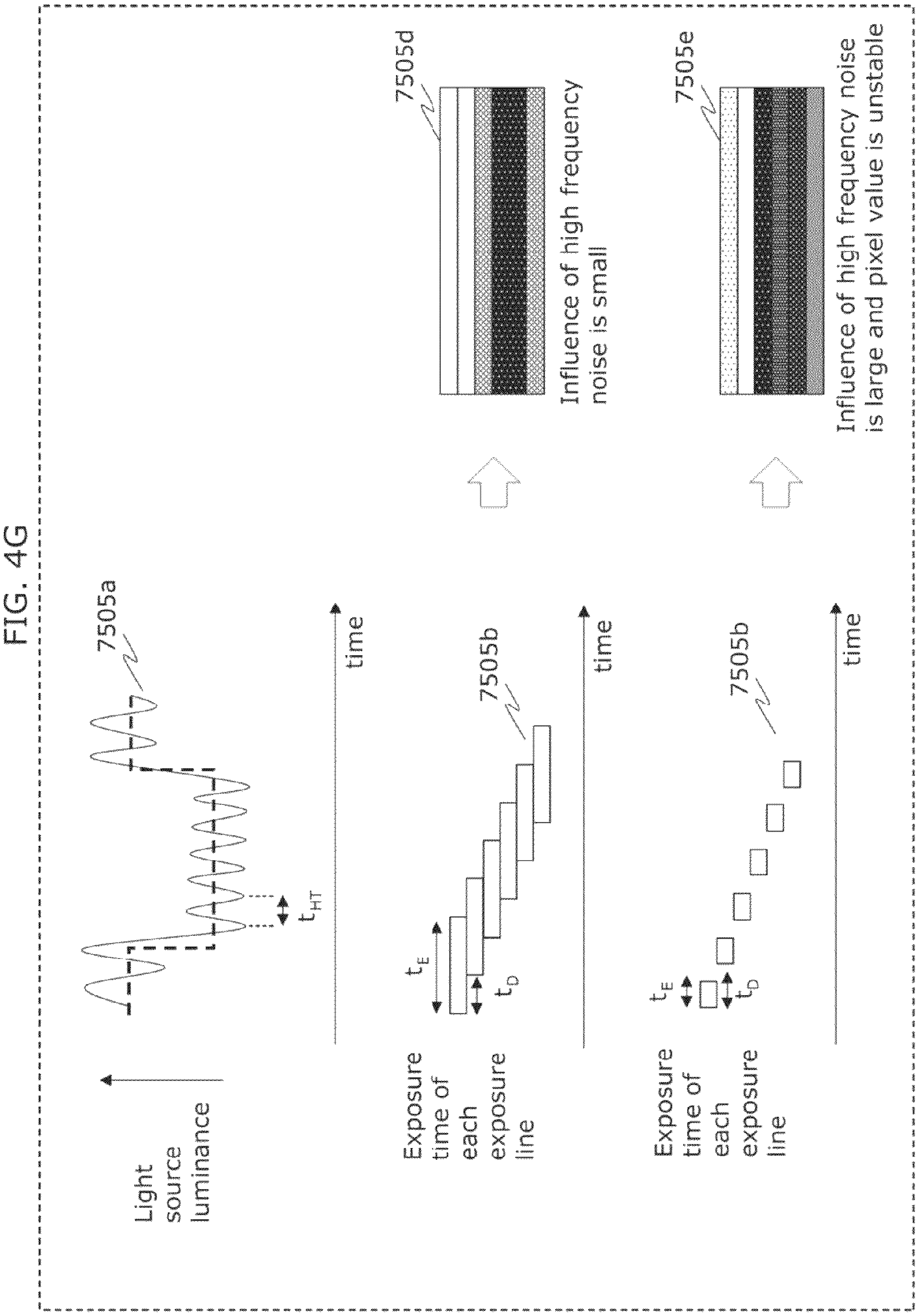
FIG. 4G is a diagram illustrating an example of an observation method of luminance of a light emitting unit in Embodiment 1.

FIG. 4G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 4H:
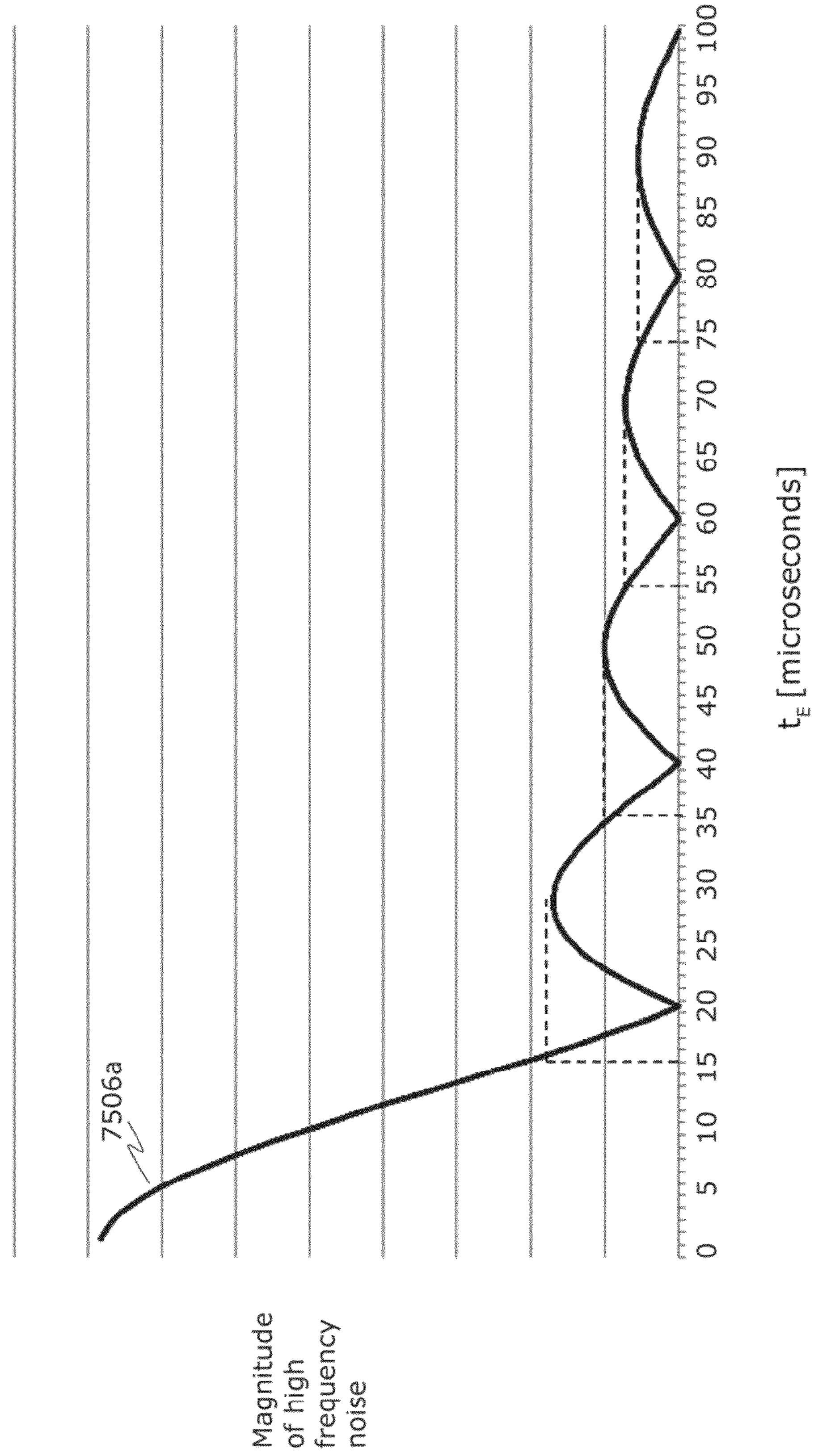
FIG. 4H is a diagram illustrating an example of an observation method of luminance of a light emitting unit in Embodiment 1.

FIG. 4H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35-microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 4I:
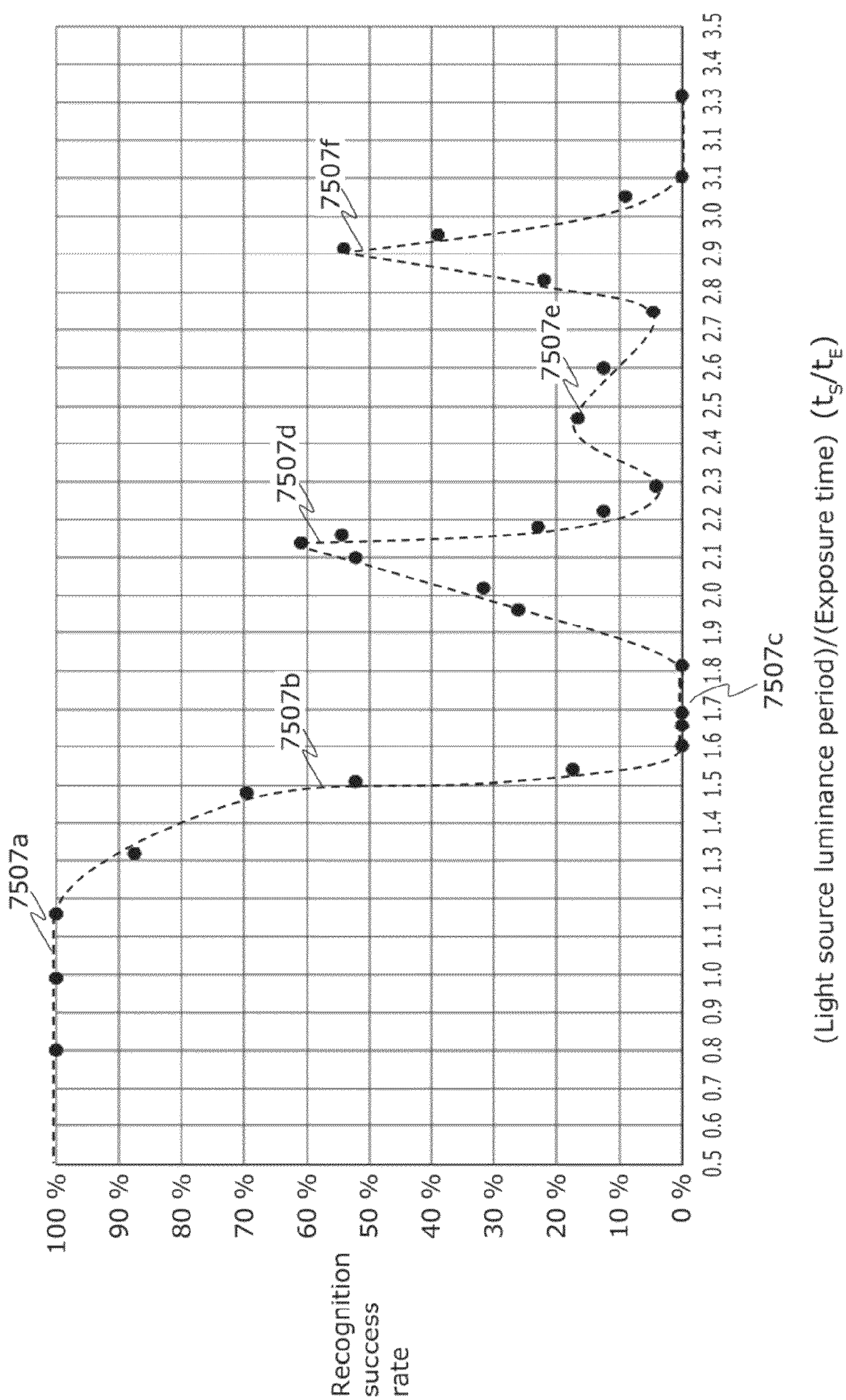
FIG. 4I is a diagram illustrating an example of an observation method of luminance of a light emitting unit in Embodiment 1.

FIG. 4I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period is by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 335.

Figure 5:
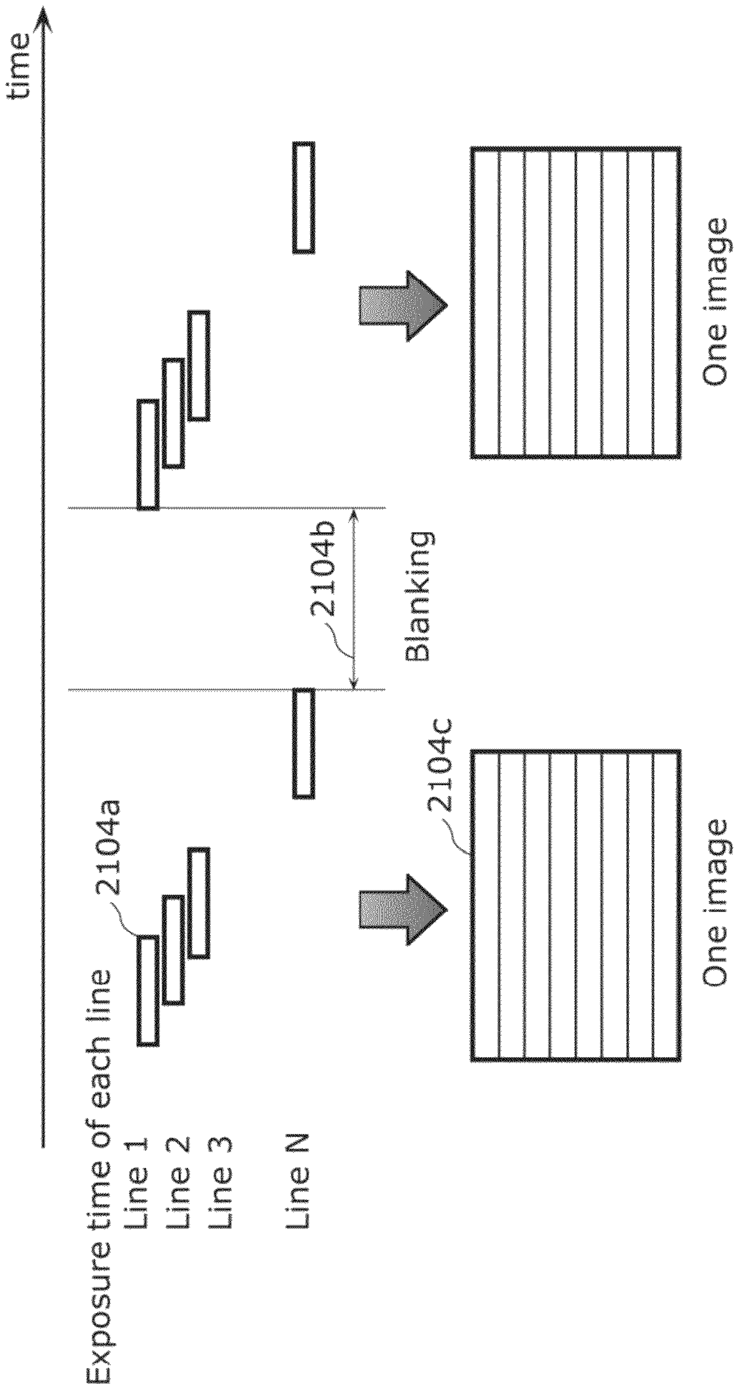
FIG. 5 is a diagram illustrating an example of an observation method of luminance of a light emitting unit in Embodiment 1.

Depending on imaging devices, there is a time (blanking) during which no exposure is performed, as illustrated in FIG. 5.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

(Signal Modulation Scheme)

Figure 6:
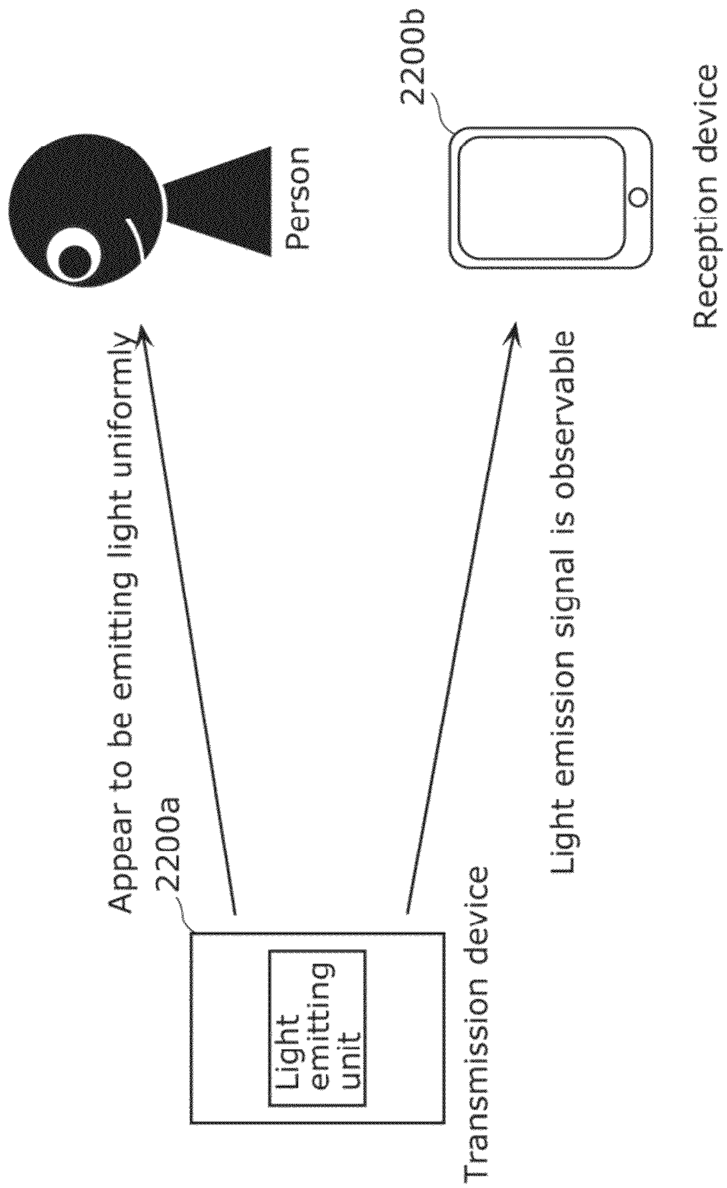
FIG. 6 is a diagram illustrating an example of a signal modulation scheme in Embodiment 1.

In the case of using visible light as a carrier, by causing the light emitting unit to emit light so as to keep a constant moving average of the luminance of the light emitting unit when the temporal resolution (about 5 milliseconds to 20 milliseconds) of human vision is set as a window width, the light emitting unit of the transmission device appears to be emitting light with uniform luminance to the person (human) while the luminance change of the light emitting unit is observable by the reception device, as illustrated in FIG. 6.

A modulation method illustrated in FIG. 7 is available as a modulation scheme for causing the light emitting unit to emit light so as to keep the constant moving average of the luminance of the light emitting unit when the temporal resolution of human vision is set as the window width. Suppose a modulated signal “0” indicates no light emission and a modulated signal “1” indicates light emission, and there is no bias in a transmission signal. Then, the average of the luminance of the light emitting unit is about 50% of the luminance at the time of light emission.

It is assumed here that the switching between light emission and no light emission is sufficiently fast as compared with the temporal resolution of human vision.

A modulation method illustrated in FIG. 8 is available as a modulation scheme for causing the light emitting unit to emit light so as to keep the constant moving average of the luminance of the light emitting unit when the temporal resolution of human vision is set as the window width. Suppose a modulated signal “0” indicates no light emission and a modulated signal “1” indicates light emission, and there is no bias in a transmission signal. Then, the average of the luminance of the light emitting unit is about 75% of the luminance at the time of light emission.

When compared with the modulation scheme in FIG. 7, the coding efficiency is equal at 0.5, but the average luminance can be increased.

A modulation method illustrated in FIG. 9 is available as a modulation scheme for causing the light emitting unit to emit light so as to keep the constant moving average of the luminance of the light emitting unit when the temporal resolution of human vision is set as the window width. Suppose a modulated signal “0” indicates no light emission and a modulated signal “1” indicates light emission, and there is no bias in a transmission signal. Then, the average of the luminance of the light emitting unit is about 87.5% of the luminance at the time of light emission.

When compared with the modulation schemes in FIGS. 7 and 8, the coding efficiency is lower at 0.375, but high average luminance can be maintained.

Likewise, such modulation that trades off the coding efficiency for increased average luminance is further available.

A modulation method illustrated in FIG. 10 is available as a modulation scheme for causing the light emitting unit to emit light so as to keep the constant moving average of the luminance of the light emitting unit when the temporal resolution of human vision is set as the window width.

Suppose a modulated signal “0” indicates no light emission and a modulated signal “1” indicates light emission, and there is no bias in a transmission signal. Then, the average of the luminance of the light emitting unit is about 25% of the luminance at the time of light emission.

By combining this with the modulation scheme in FIG. 8 or the like and periodically switching between the modulation schemes, it is possible to cause the light emitting unit to appear to be blinking to the person or the imaging device whose exposure time is long.

Likewise, by changing the modulation method, it is possible to cause the light emitting unit to appear to be emitting light with an arbitrary luminance change to the person or the imaging device whose exposure time is long.

Figure 11:
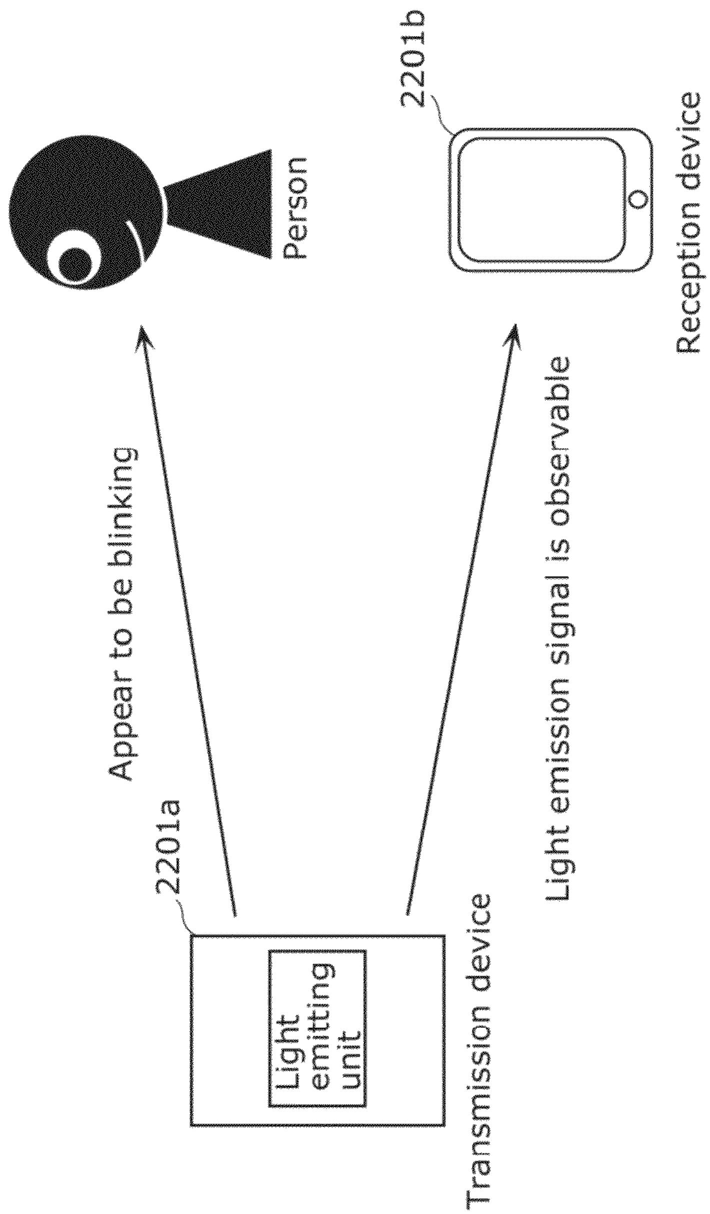
FIG. 11 is a diagram illustrating an example of a signal modulation scheme in Embodiment 1.

In the case of using visible light as a carrier, by causing the light emitting unit to emit light so as to periodically change the moving average of the luminance of the light emitting unit when the temporal resolution of human vision is set as the window width, the light emitting unit of the transmission device appears to be blinking or changing with an arbitrary rhythm to the person while the light emission signal is observable by the reception device, as illustrated in FIG. 11.

The same advantageous effect can be obtained even in the case where an LED unit of a liquid crystal television which uses an LED light source as a backlight is caused to emit light. In this case, at least by reducing the contrast of the screen portion of an optical communication unit to be closer to white, optical communication with a low error rate can be achieved. Making the entire surface or the screen portion used for communication white contributes to a higher communication speed.

Figure 12:
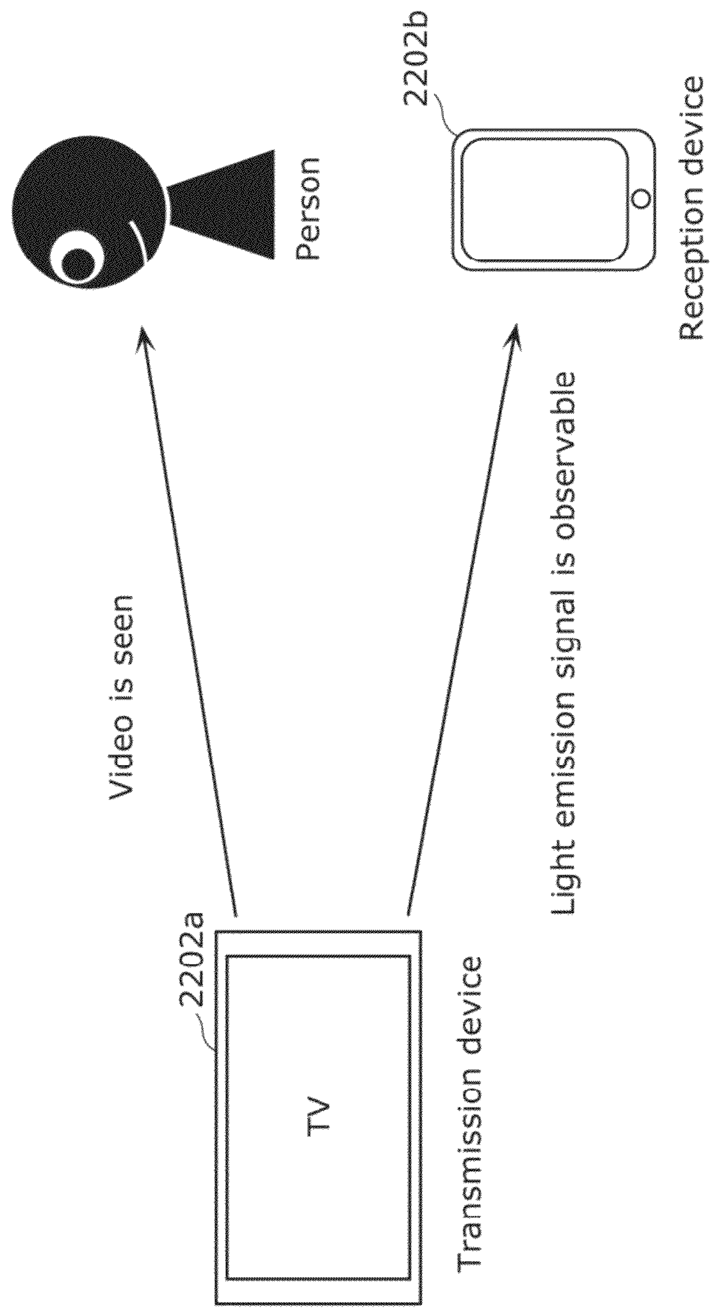
FIG. 12 is a diagram illustrating an example of a signal modulation scheme in Embodiment 1.

In the case of using a television display or the like as the light emitting unit, by adjusting, to the luminance of an image desired to be seen by the person, the moving average of the luminance of the light emitting unit when the temporal resolution of human vision is set as the window width, normal television video is seen by the person while the light emission signal is observable by the reception device, as illustrated in FIG. 12.

Figure 13:
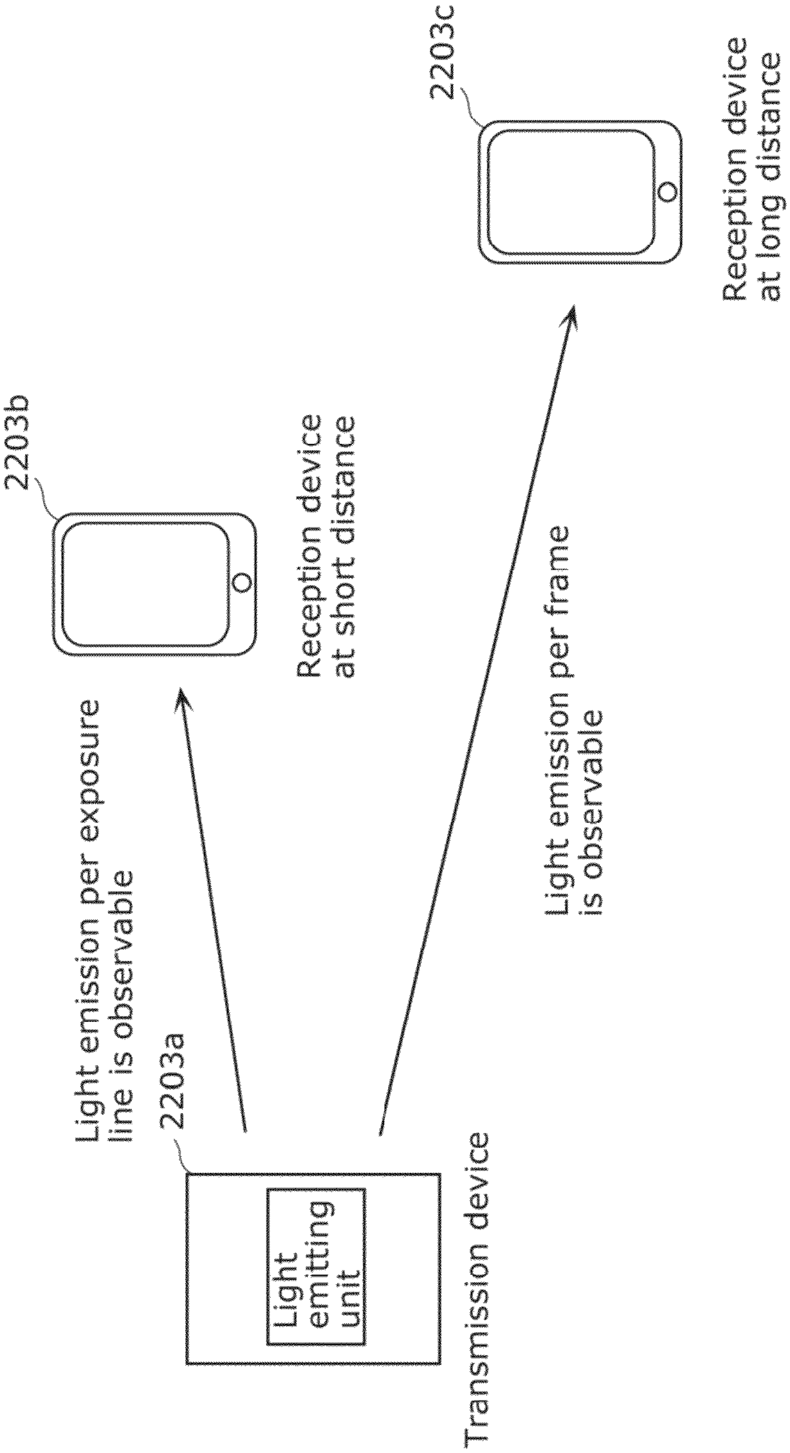
FIG. 13 is a diagram illustrating an example of a signal modulation scheme in Embodiment 1.

By adjusting, to a signal value in the case of performing signal transmission per frame, the moving average of the luminance of the light emitting unit when a substantial time per frame of the captured image is set as the window width, signal propagation can be carried out at two different speeds in such a manner that observes the light emission state of the transmission device per exposure line in the case of image capture at a short distance and observes the light emission state of the transmission device per frame in the case of image capture at a long distance, as illustrated in FIG. 13.

Note that, in the case of image capture at a short distance, the signal receivable in the case of image capture at a long distance can be received, too.

Figure 14:
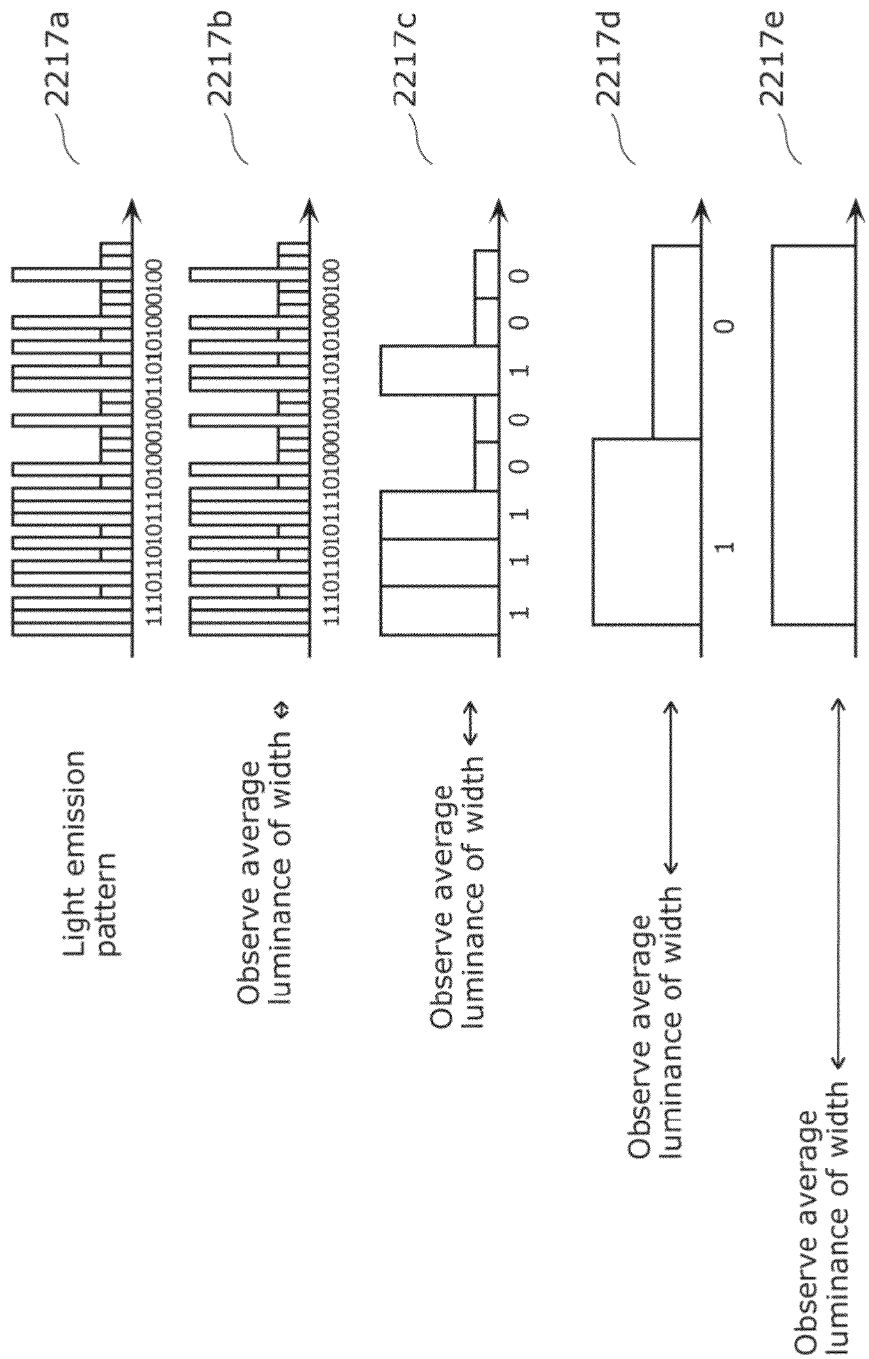
FIG. 14 is a diagram illustrating an example of a signal modulation scheme in Embodiment 1.

FIG. 14 is a diagram illustrating how light emission is observed for each exposure time.

The luminance of each capture pixel is proportional to the average luminance of the imaging object in the time during which the imaging element is exposed. Accordingly, if the exposure time is short, a light emission pattern 2217*a* itself is observed as illustrated in 2217*b*. If the exposure time is longer, the light emission pattern 2217*a* is observed as illustrated in 2217*c*, 2217*d*, or 2217*e*.

Note that 2217*a* corresponds to a modulation scheme that repeatedly uses the modulation scheme in FIG. 8 in a fractal manner.

The use of such a light emission pattern enables simultaneous transmission of more information to a reception device that includes an imaging device of a shorter exposure time and less information to a reception device that includes an imaging device of a longer exposure time.

The reception device recognizes that “1” is received if the luminance of pixels at the estimated position of the light emitting unit is greater than or equal to predetermined luminance and that “0” is received if the luminance of pixels at the estimated position of the light emitting unit is less than or equal to the predetermined luminance, for one exposure line or for a predetermined number of exposure lines.

In the case where “1” continues, it is indistinguishable from an ordinary light emitting unit (which constantly emits light without transmitting a signal). In the case where “0” continues, it is indistinguishable from the case where no light emitting unit is present.

Therefore, the transmission device may transmit a different numeric when the same numeric continues for a predetermined number of times.

Figure 15:
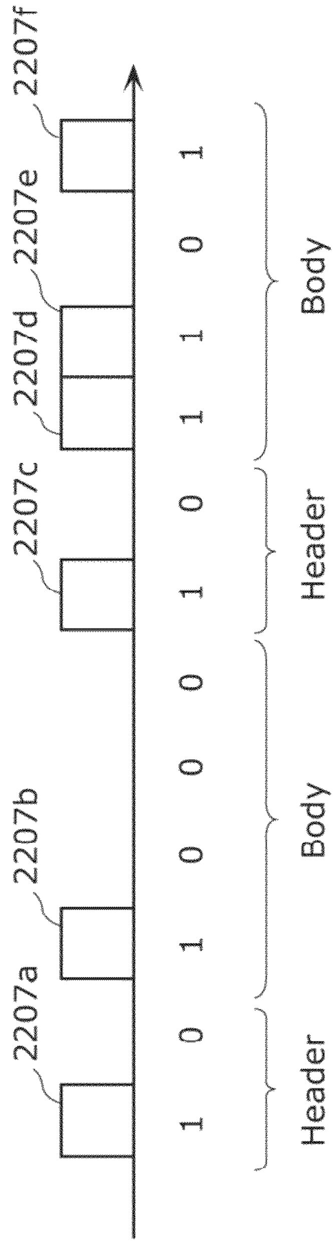
FIG. 15 is a diagram illustrating an example of a signal modulation scheme in Embodiment 1.

Alternatively, transmission may be performed separately for a header unit that always includes "1" and "0" and a body unit for transmitting a signal, as illustrated in FIG. 15. In this case, the same numeric never appears more than five successive times.

In the case where the light emitting unit is situated at a position not shown on part of exposure lines or there is blanking, it is impossible to capture the whole state of the light emitting unit by the imaging device of the reception device.

This makes it necessary to indicate which part of the whole signal the transmitted signal corresponds to.

Figure 16:
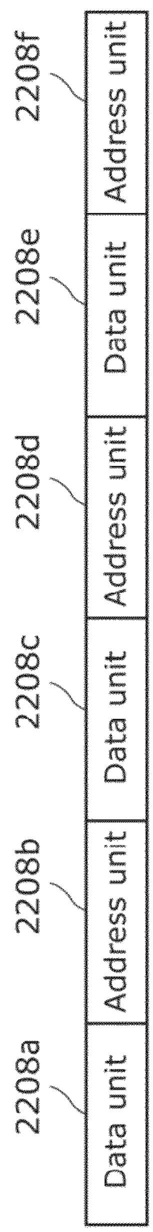
FIG. 16 is a diagram illustrating an example of a signal modulation scheme in Embodiment 1.

In view of this, there is a method whereby a data unit and an address unit indicating the position of the data are transmitted together, as illustrated in FIG. 16.

For easier signal reception at the reception device, it is desirable to set the length of the light emission pattern combining the data unit and the address unit to be sufficiently short so that the light emission pattern is captured within one image in the reception device.

Figure 17:
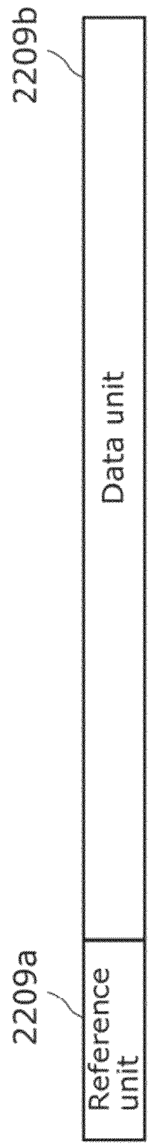
FIG. 17 is a diagram illustrating an example of a signal modulation scheme in Embodiment 1.

There is also a method whereby the transmission device transmits a reference unit and a data unit and the reception device recognizes the position of the data based on the difference from the time of receiving the reference unit, as illustrated in FIG. 17.

Figure 18:
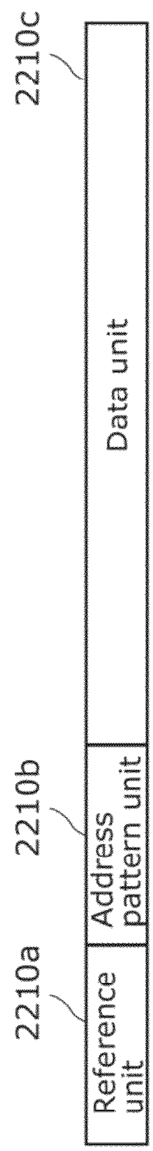
FIG. 18 is a diagram illustrating an example of a signal modulation scheme in Embodiment 1.

There is also a method whereby the transmission device transmits a reference unit, an address pattern unit, and a data unit and the reception device obtains each set of data of the data unit and the pattern of the position of each set of data from the address pattern unit following the reference unit, and recognizes the position of each set of data based on the obtained pattern and the difference between the time of receiving the reference unit and the time of receiving the data, as illustrated in FIG. 18.

When a plurality of types of address patterns are available, not only data can be transmitted uniformly, but also important data or data to be processed first can be transmitted earlier than other data or repeatedly transmitted a larger number of times than other data.

In the case where the light emitting unit is not shown on all exposure lines or there is blanking, it is impossible to capture the whole state of the light emitting unit by the imaging device of the reception device.

Figure 19:
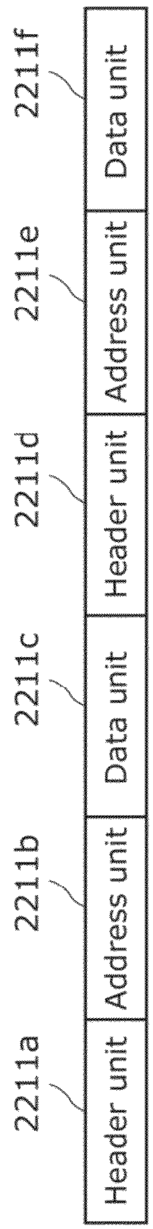
FIG. 19 is a diagram illustrating an example of a signal modulation scheme in Embodiment 1.

Adding a header unit allows a signal separation to be detected and an address unit and a data unit to be detected, as illustrated in FIG. 19.

Here, a pattern not appearing in the address unit or the data unit is used as the light emission pattern of the header unit.

For example, the light emission pattern of the header unit may be "0011" in the case of using the modulation scheme of table 2200.2*a*.

Moreover, when the header unit pattern is "11110011", the average luminance is equal to the other parts, with it being possible to suppress flicker when seen with the human eye. Since the header unit has a high redundancy, information can be superimposed on the header unit. As an example, it is possible to indicate, with the header unit pattern "11100111", that data for communication between transmission devices is transmitted.

For easier signal reception at the reception device, it is desirable to set the length of the light emission pattern combining the data unit, the address unit, and the header unit to be sufficiently short so that the light emission pattern is captured within one image in the reception device.

Figure 20:
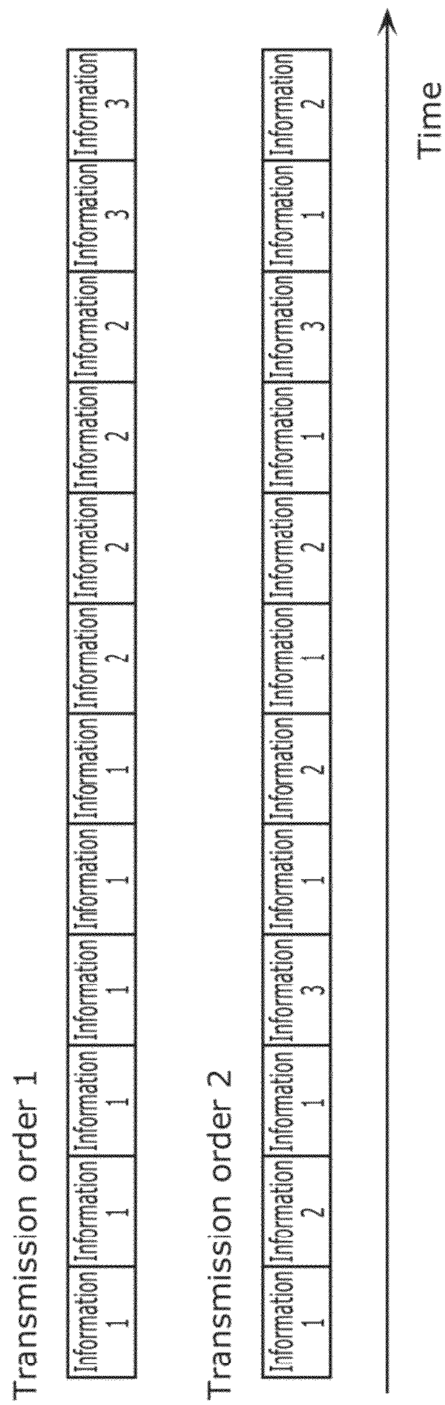
FIG. 20 is a diagram illustrating an example of a signal modulation scheme in Embodiment 1.

In FIG. 20, the transmission device determines the information transmission order according to priority.

For example, the number of transmissions is set in proportion to the priority.

In the case where the light emitting unit of the transmission device is not wholly shown on the imaging unit of the reception device or there is blanking, the reception device cannot receive signals continuously. Accordingly, information with higher transmission frequency is likely to be received earlier.

Figure 21:
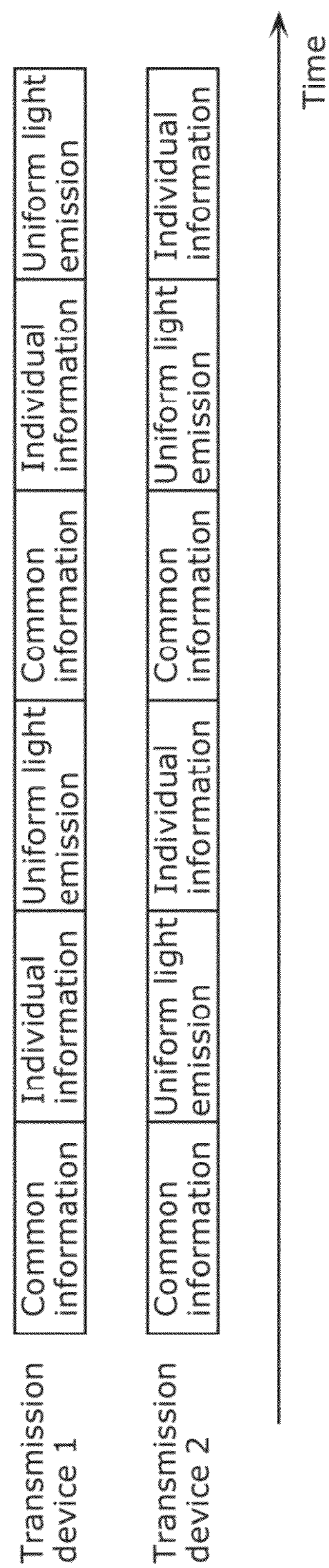
FIG. 21 is a diagram illustrating an example of a signal modulation scheme in Embodiment 1.

FIG. 21 illustrates a pattern in which a plurality of transmission devices located near each other transmit information synchronously.

When the plurality of transmission devices simultaneously transmit common information, the plurality of transmission devices can be regarded as one large transmission device. Such a transmission device can be captured in a large size by the imaging unit of the reception device, so that information can be received faster from a longer distance.

Each transmission device transmits individual information during a time slot when the light emitting unit of the nearby transmission device emits light uniformly (transmits no signal), to avoid confusion with the light emission pattern of the nearby transmission device.

Each transmission device may receive, at its light receiving unit, the light emission pattern of the nearby transmission signal to learn the light emission pattern of the nearby transmission device, and determine the light emission pattern of the transmission device itself. Moreover, each transmission device may receive, at its light receiving unit, the light emission pattern of the nearby transmission signal, and determine the light emission pattern of the transmission device itself according to an instruction from the other transmission device. Alternatively, each transmission device may determine the light emission pattern according to an instruction from a centralized control device.

(Light Emitting Unit Detection)

Figure 22:
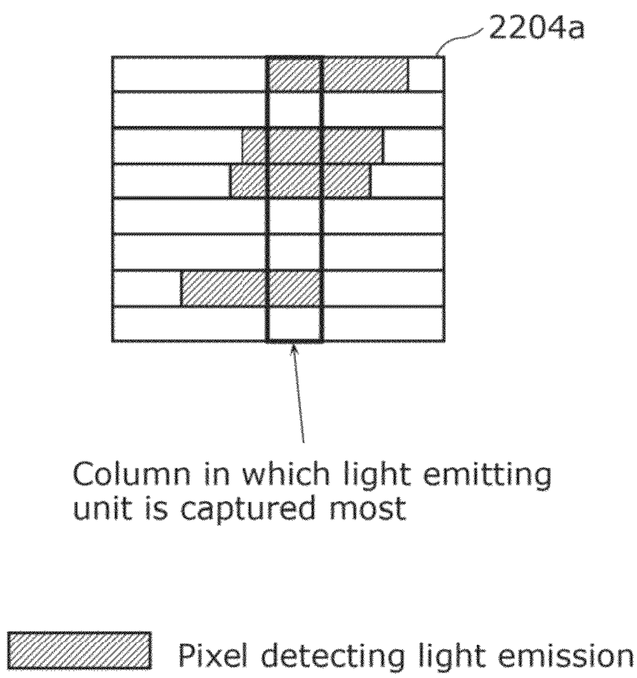
FIG. 22 is a diagram illustrating an example of a light emitting unit detection method in Embodiment 1.

As a method of determining in which part of the image the light emitting unit is captured, there is a method whereby the number of lines on which the light emitting unit is captured is counted in the direction perpendicular to the exposure lines and the column in which the light emitting unit is captured most is set as the column where the light emitting unit is present, as illustrated in FIG. 22.

The decree of light reception fluctuates in the parts near the edges of the light emitting unit, which tends to cause wrong determination of whether or not the light emitting unit is captured. Therefore, signals are extracted from the imaging results of the pixels in the center column of all columns in each of which the light emitting unit is captured most.

Figure 23:
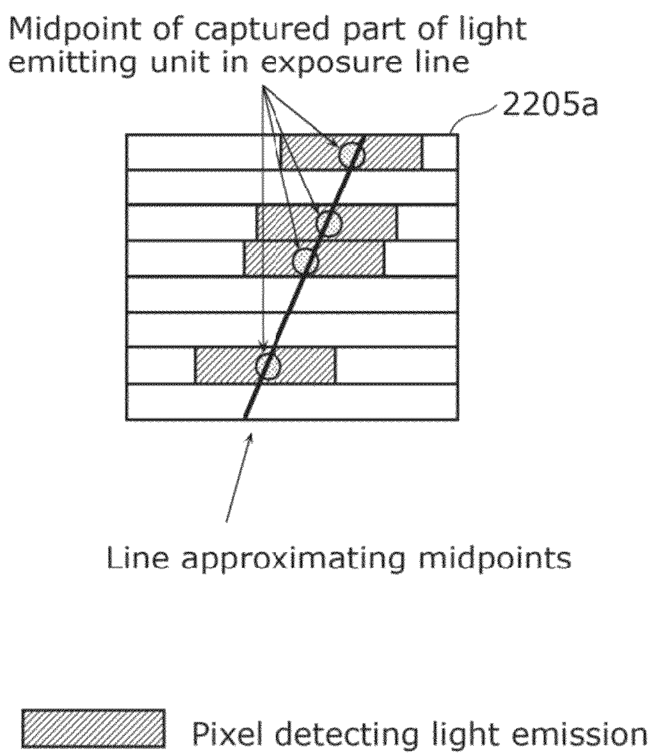
FIG. 23 is a diagram illustrating an example of a light emitting unit detection method in Embodiment 1.

As a method of determining in which part of the image the light emitting unit is captured, there is a method whereby the midpoint of the part in which the light emitting unit is captured is calculated for each exposure line and the light emitting unit is estimated to be present on an approximate line (straight line or quadratic curve) connecting the calculated points, as illustrated in FIG. 23.

Figure 24:
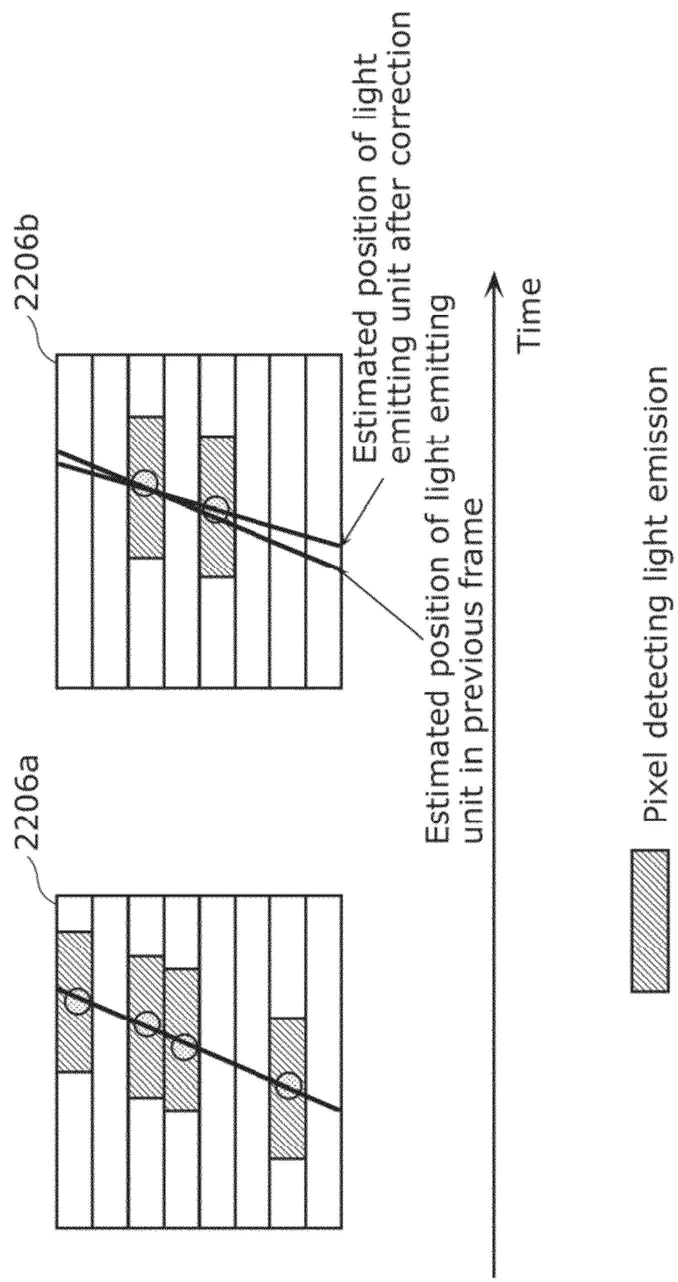
FIG. 24 is a diagram illustrating an example of a light emitting unit detection method in Embodiment 1.

Moreover, as illustrated in FIG. 24, the estimated position of the light emitting unit may be updated from the information of the current frame, by using the estimated position of the light emitting unit in the previous frame as a prior probability.

Here, the current estimated position of the light emitting unit may be updated based on values of a 9-axis sensor and a gyroscope during the time.

Figure 25:
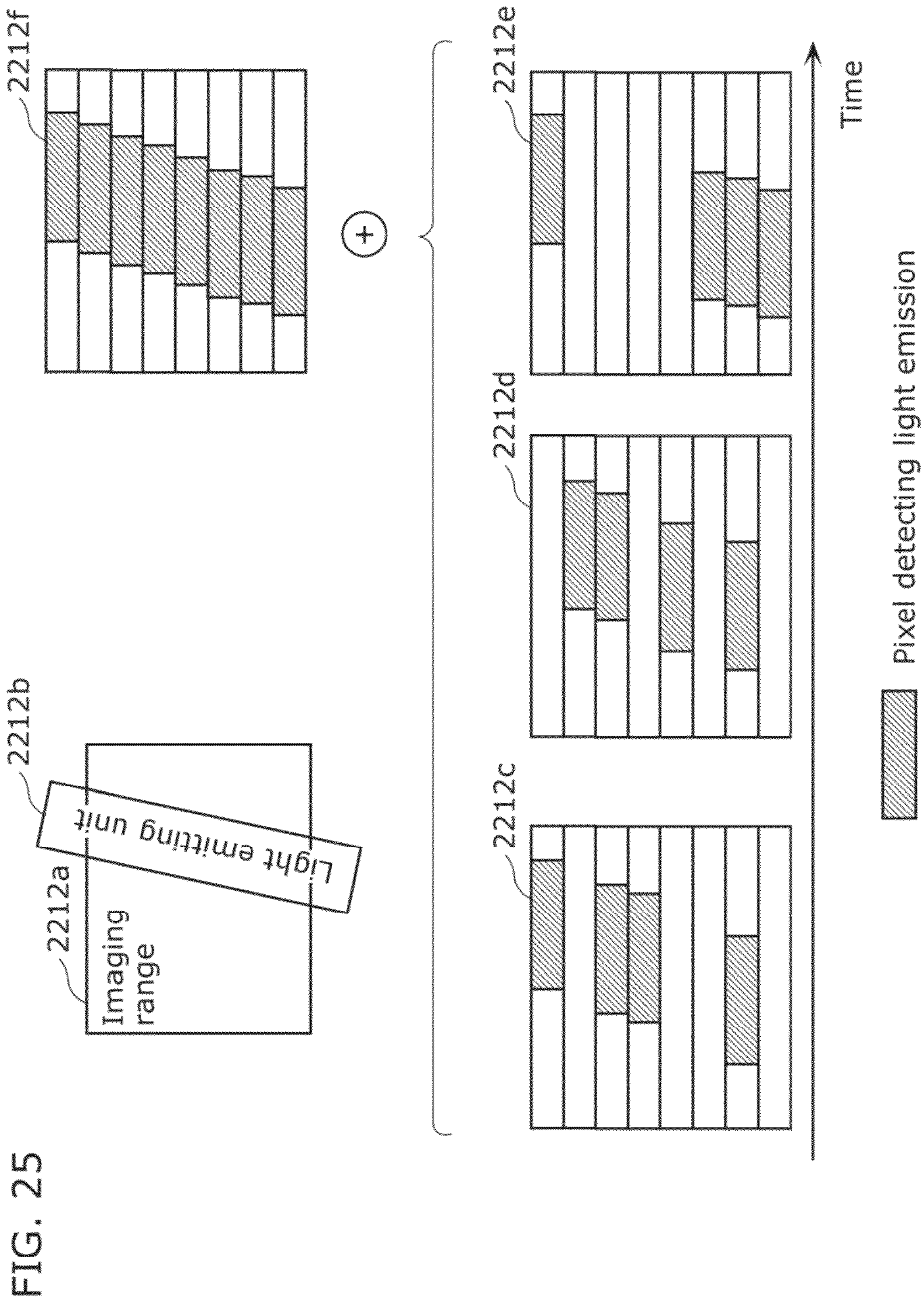
FIG. 25 is a diagram illustrating an example of a light emitting unit detection method in Embodiment 1.

In FIG. 25, when capturing a light emitting unit 2212*b* in an imaging range 2212*a*, images such as captured images 2212*c*, 2212*d*, and 2212*e* are obtained.

Summing the light emission parts of the captured images 2212*c*, 2212*d*, and 2212*e* yields a synthetic image 2212*f*. The position of the light emitting unit in the captured image can thus be specified.

The reception device detects ON/OFF of light emission of the light emitting unit, from the specified position of the light emitting unit.

In the case of using the modulation scheme in FIG. 8, the light emission probability is 0.75, so that the probability of the light emitting unit in the synthetic image 2212*f* appearing to emit light when summing n images is $1\text{-}0.25^n$. For example, when n=3, the probability is about 0.984.

Here, higher accuracy is attained when the orientation of the imaging unit is estimated from sensor values of a gyroscope and a 9-axis sensor and the imaging direction is compensated for before the image synthesis. In the case where the number of images to be synthesized is small, however, the imaging time is short, and so there is little adverse effect even when the imaging direction is not compensated for.

Figure 26:
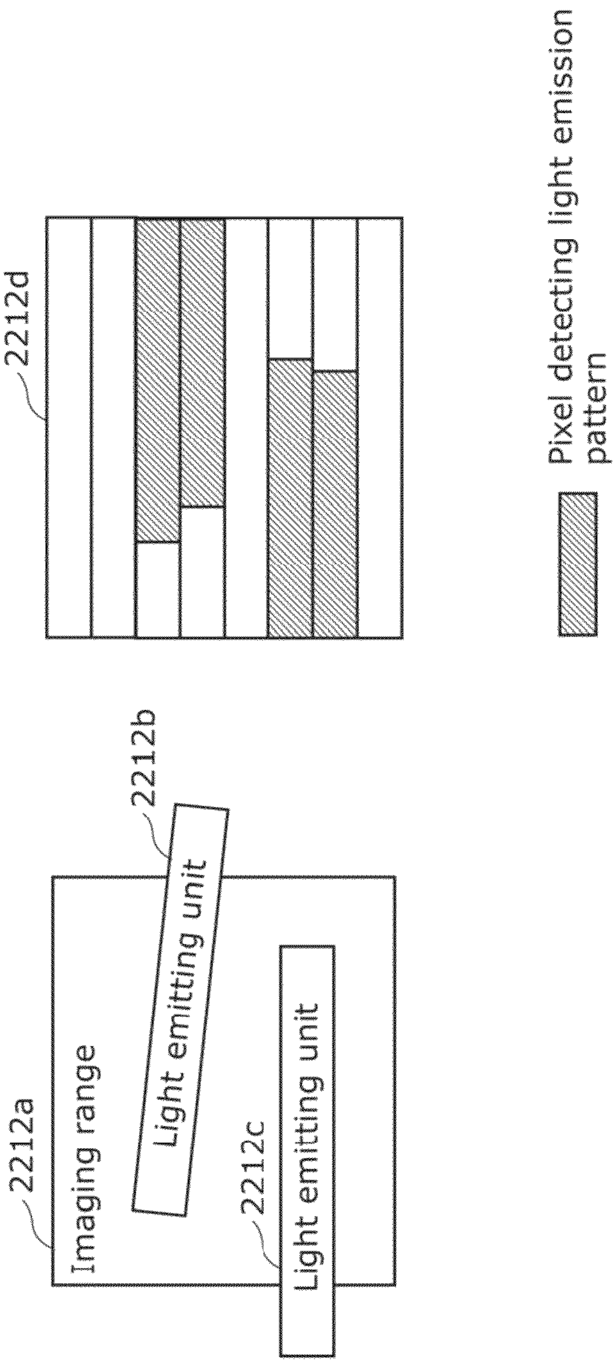
FIG. 26 is a diagram illustrating an example of a light emitting unit detection method in Embodiment 1.

FIG. 26 is a diagram illustrating a situation where the reception device captures a plurality of light emitting units.

In the case where the plurality of light emitting units transmit the same signal, the reception device obtains one transmission signal from both light emission patterns. In the case where the plurality of light emitting units transmit different signals, the reception device obtains different transmission signals from different light emission patterns.

The difference in data value at the same address between the transmission signals means different signals are transmitted.

Whether the signal same as or different from the nearby transmission device is transmitted may be determined based on the pattern of the header unit of the transmission signal.

It may be assumed that the same signal is transmitted in the case where the light emitting units are substantially adjacent to each other.

Figure 27:
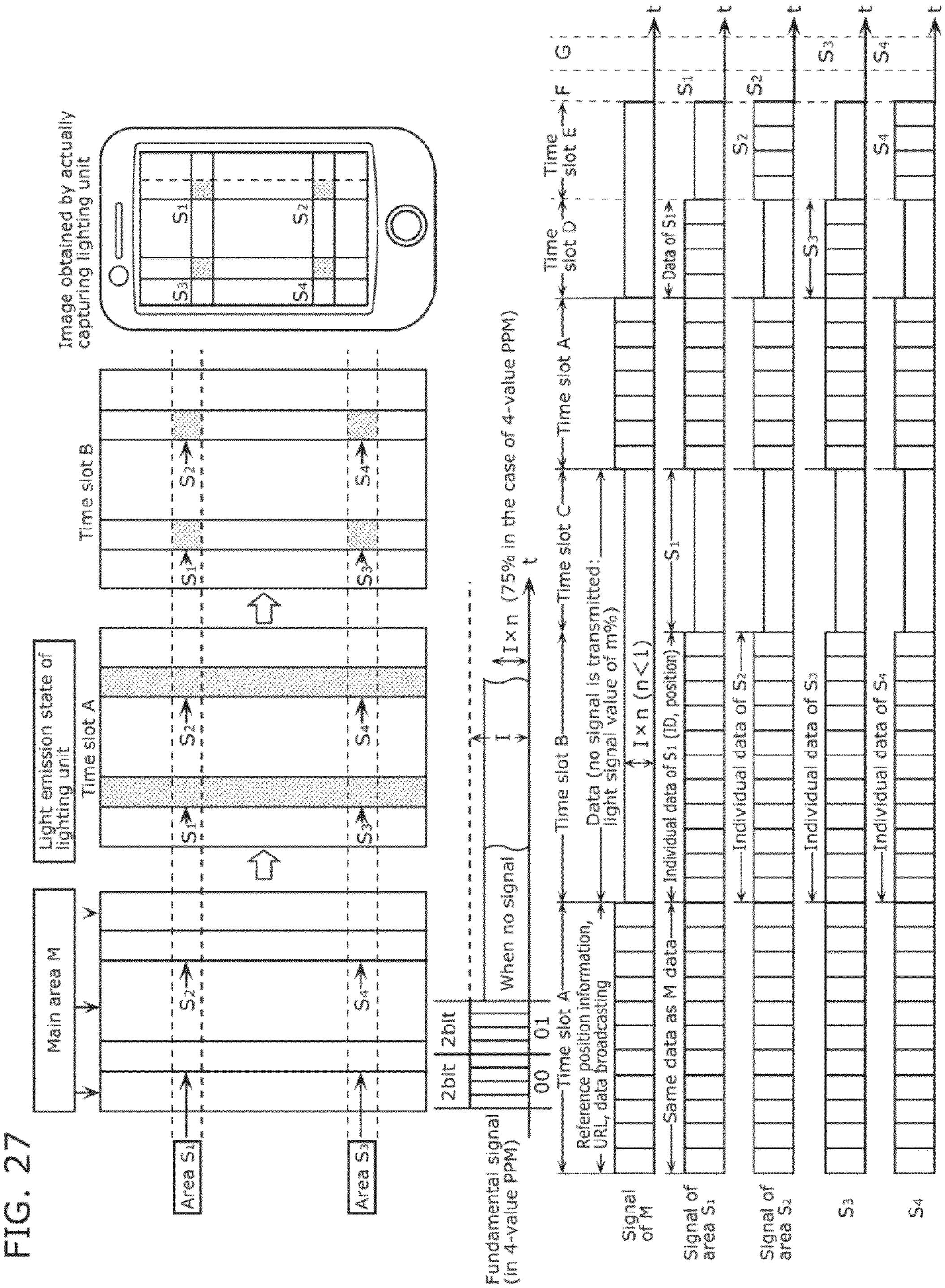
FIG. 27 is a diagram illustrating transmission signal timelines and an image obtained by capturing light emitting units in Embodiment 1.

FIG. 27 illustrates transmission signal timelines and an image obtained by capturing the light emitting units in this case.

(Signal Transmission Using Position Pattern)

Figure 28:
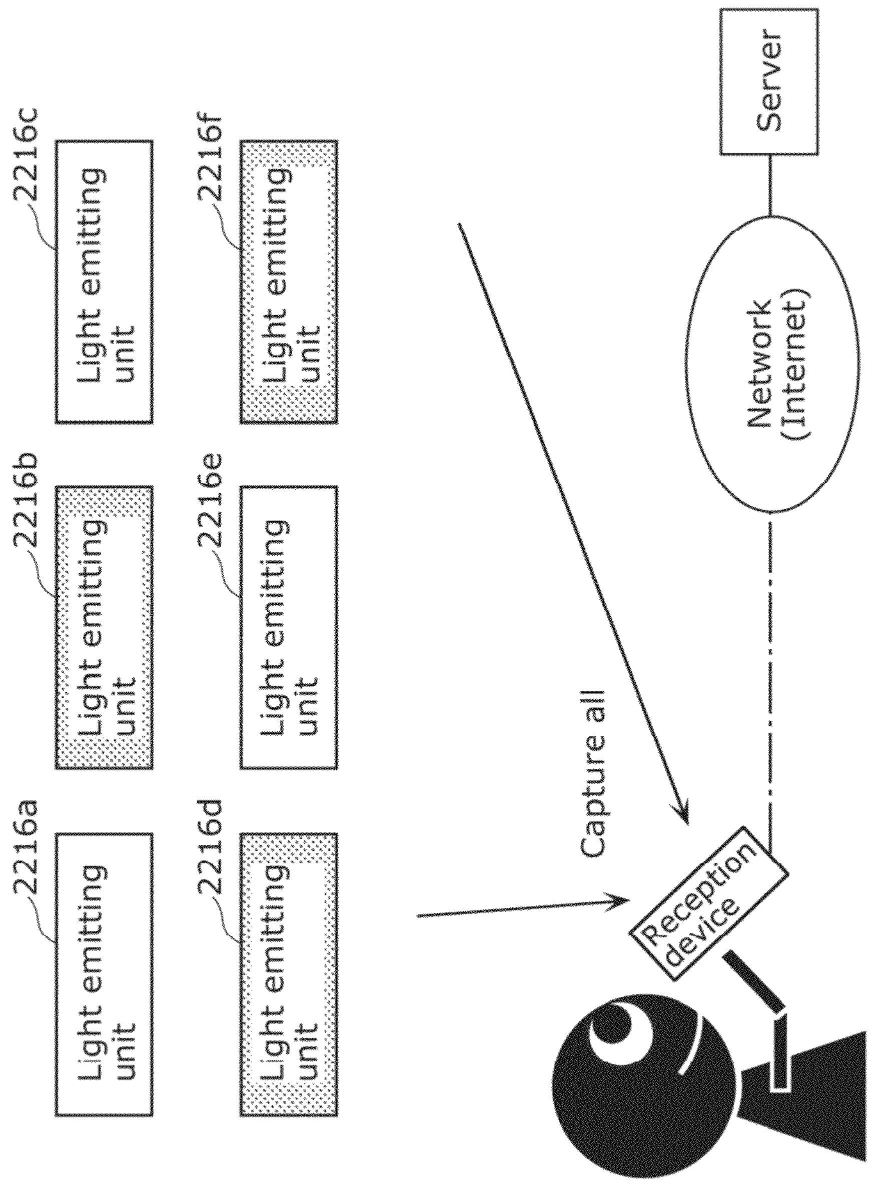
FIG. 28 is a diagram illustrating an example of signal transmission using a position pattern in Embodiment 1.

In FIG. 28, light emitting units 2216*a*, 2216*c*, and 2216*e* are emitting light uniformly, while light emitting units 2216*b*, 2216*d*, and 2216*f* are transmitting signals using light emission patterns.

Note that the light emitting units 2216*b*, 2216*d*, and 2216*f* may be simply emitting light so as to appear as stripes when captured by the reception device on an exposure line basis.

In FIG. 28, the light emitting units 2216*a* to 2216*f* may be light emitting units of the same transmission device or separate transmission devices.

The transmission device expresses the transmission signal by the pattern (position pattern) of the positions of the light emitting units engaged in signal transmission and the positions of the light emitting units not engaged in signal transmission.

In FIG. 28, there are six light emitting units, so that signals of $2^6=64$ values are transmittable. Though position patterns that appear to be the same when seen from different directions should not be used, such patterns can be discerned by specifying the imaging direction by the 9-axis sensor or the like in the reception device. Here, more signals may be transmitted by changing, according to time, which light emitting units are engaged in signal transmission.

The transmission device may perform signal transmission using the position pattern during one time slot and perform signal transmission using the light emission pattern during another time slot. For instance, all light emitting units may be synchronized during a time slot to transmit the ID or position information of the transmission device using the light emission pattern.

Since there are nearly an infinite number of light emitting unit arrangement patterns, it is difficult for the reception device to store all position patterns beforehand.

Hence, the reception device obtains a list of nearby position patterns from a server and analyzes the position pattern based on the list, using the ID or position information of the transmission device transmitted from the transmission device using the light emission pattern, the position of the reception device estimated by a wireless base station, and the position information of the reception device estimated by a GPS, a gyroscope, or a 9-axis sensor as a key.

According to this method, the signal expressed by the position pattern does not need to be unique in the whole world, as long as the same position pattern is not situated nearby (radius of about several meters to 300 meters). This solves the problem that a transmission device with a small number of light emitting units can express only a small number of position patterns.

The position of the reception device can be estimated from the size, shape, and position information of the light emitting units obtained from the server, the size and shape of the captured position pattern, and the lens characteristics of the imaging unit.

(Reception Device)

Figure 29:
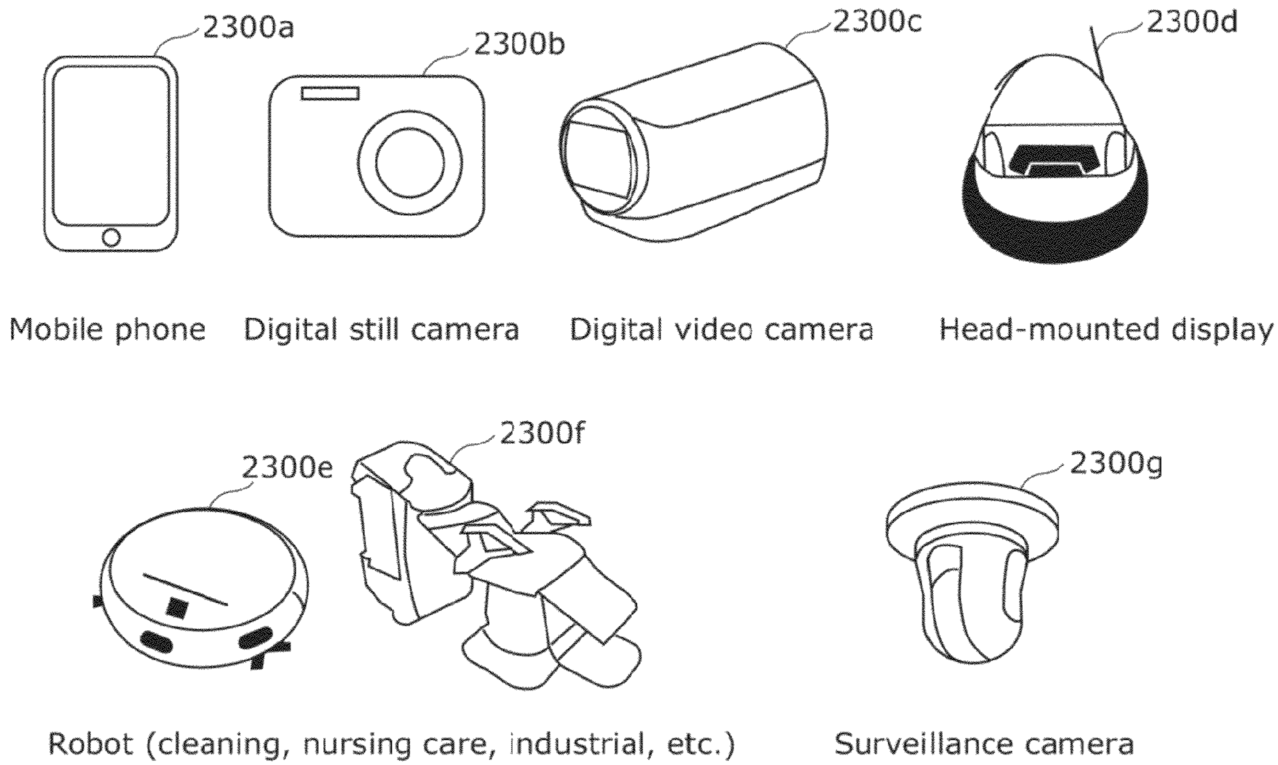
FIG. 29 is a diagram illustrating an example of a reception device in Embodiment 1.

Examples of a communication device that mainly performs reception include a mobile phone, a digital still camera, a digital video camera, a head-mounted display, a robot (cleaning, nursing care, industrial, etc.), and a surveillance camera as illustrated in FIG. 29, though the reception device is not limited to such.

Note that the reception device is a communication device that mainly receives signals, and may also transmit signals according to the method in this embodiment or other methods.

(Transmission Device)

Figure 30:
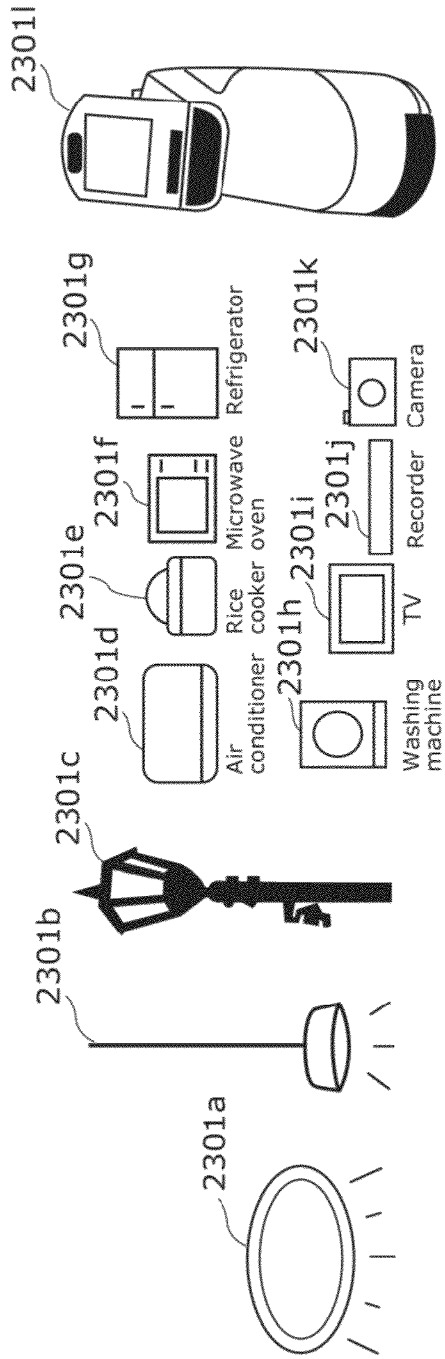
FIG. 30 is a diagram illustrating an example of a transmission device in Embodiment 1.

Examples of a communication device that mainly performs transmission include a lighting (household, store, office, underground city, street, etc.), a flashlight, a home appliance, a robot, and other electronic devices as illustrated in FIG. 30, though the transmission device is not limited to such.

Note that the transmission device is a communication device that mainly transmits signals, and may also receive signals according to the method in this embodiment or other methods.

Figure 31:
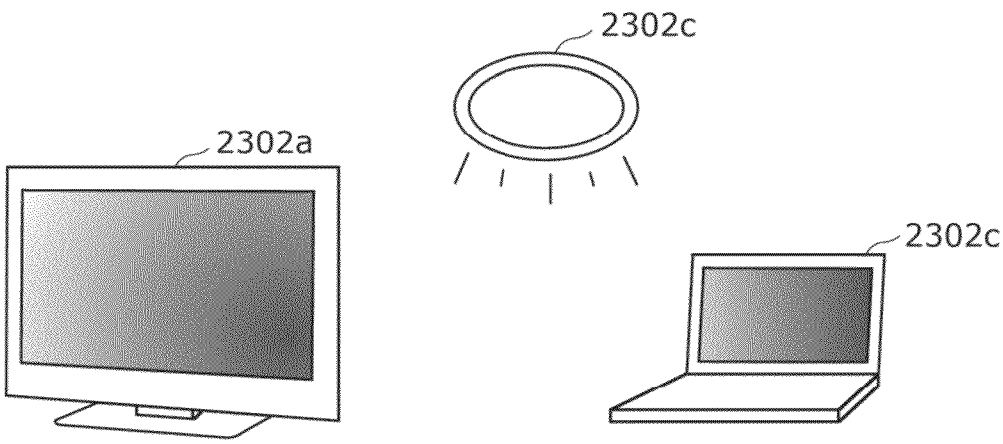
FIG. 31 is a diagram illustrating an example of a transmission device in Embodiment 1.

The light emitting unit is desirably a device that switches between light emission and no light emission at high speed such as an LED lighting or a liquid crystal display using an LED backlight as illustrated in FIG. 31, though the light emitting unit is not limited to such.

Other examples of the light emitting unit include lightings such as a fluorescent lamp, an incandescent lamp, a mercury vapor lamp, and an organic EL display.

Figure 32:
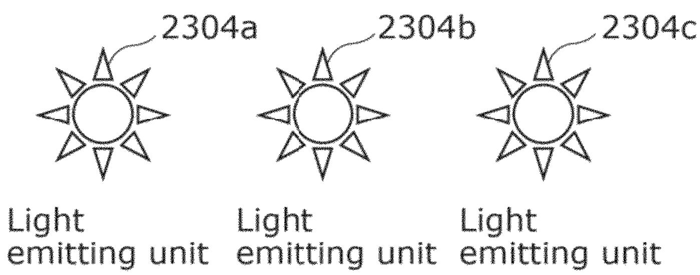
FIG. 32 is a diagram illustrating an example of a transmission device in Embodiment 1.
Figure 33:
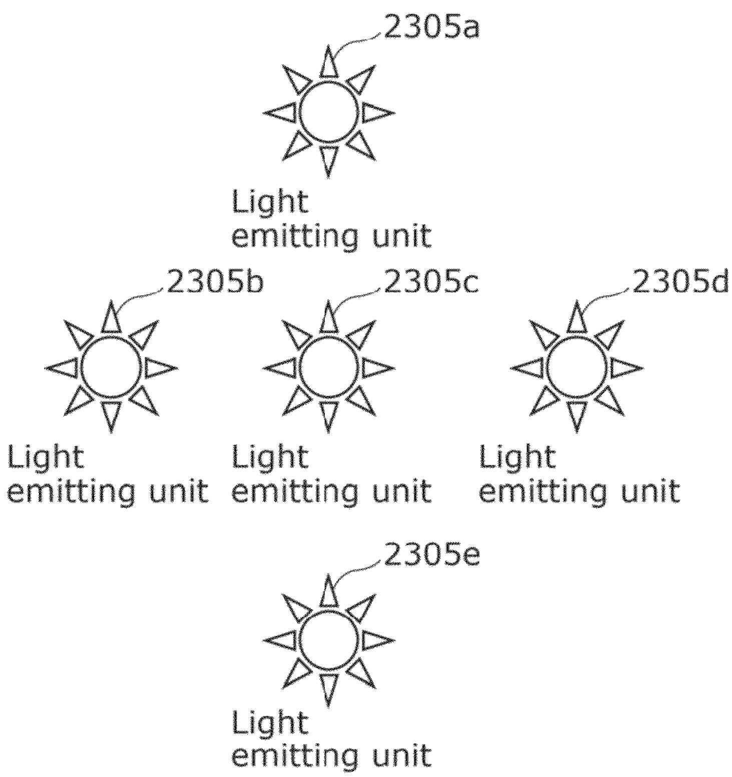
FIG. 33 is a diagram illustrating an example of a transmission device in Embodiment 1.
Figure 34:
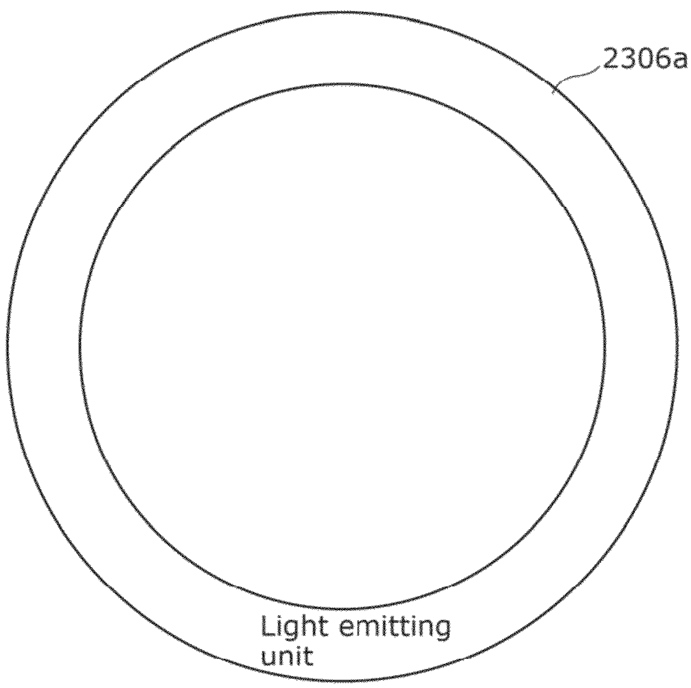
FIG. 34 is a diagram illustrating an example of a transmission device in Embodiment 1.
Figure 35:
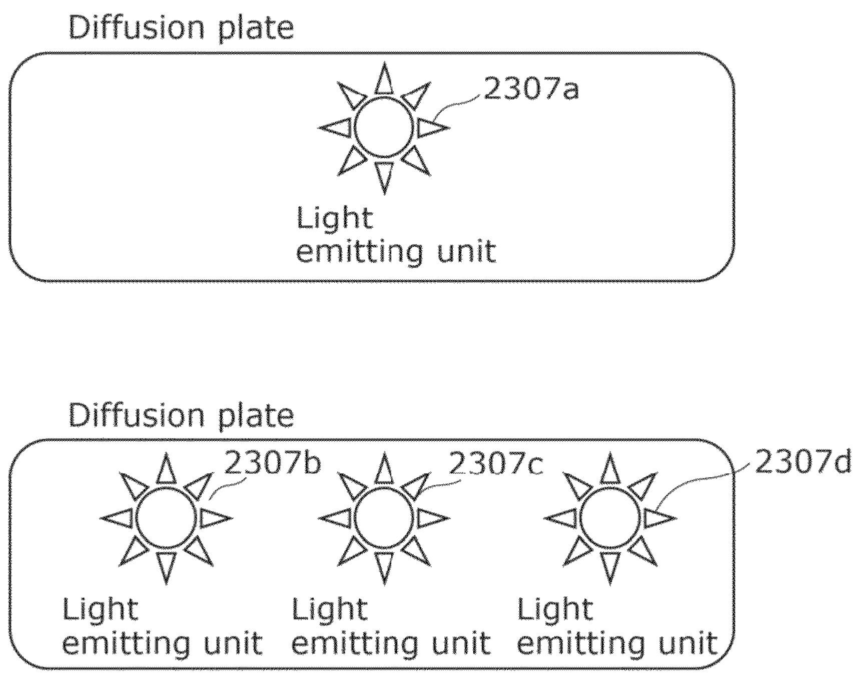
FIG. 35 is a diagram illustrating an example of a transmission device in Embodiment 1.

Since the transmission efficiency increases when the light emitting unit is captured in a larger size, the transmission device may include a plurality of light emitting units that emit light synchronously as illustrated in FIG. 32. Moreover, since the transmission efficiency increases when the light emitting unit is shown in a larger size in the direction perpendicular to the exposure lines of the imaging element, the light emitting units may be arranged in a line. The light emitting units may also be arranged so as to be perpendicular to the exposure lines when the reception device is held normally. In the case where the light emitting unit is expected to be captured in a plurality of directions, the light emitting units may be arranged in the shape of a cross as illustrated in FIG. 33. Alternatively, in the case where the light emitting unit is expected to be captured in a plurality of directions, a circular light emitting unit may be used or the light emitting units may be arranged in the shape of a circle as illustrated in FIG. 34. Since the transmission efficiency increases when the light emitting unit is captured in a larger size, the transmission device may cover the light emitting unit(s) with a diffusion plate as illustrated in FIG. 35.

Figure 36:
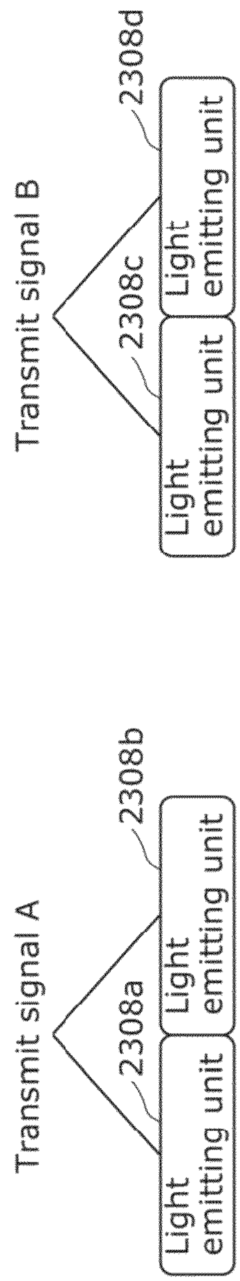
FIG. 36 is a diagram illustrating an example of a transmission device in Embodiment 1.
Figure 37:
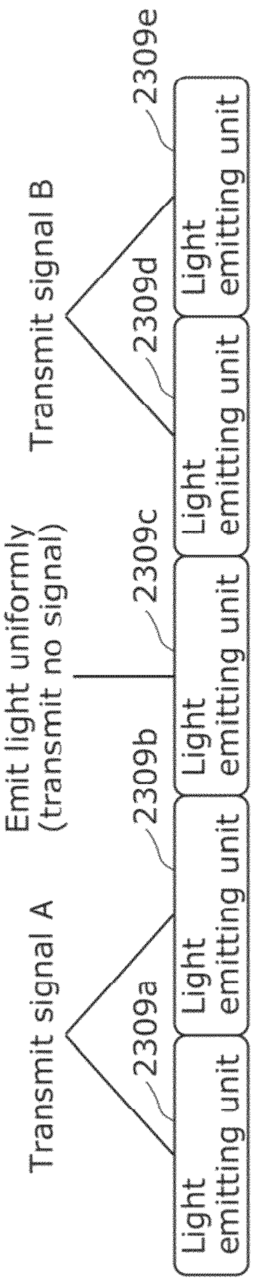
FIG. 37 is a diagram illustrating an example of a transmission device in Embodiment 1.

Light emitting units that transmit different signals are positioned away from each other so as not to be captured at the same time, as illustrated in FIG. 36. As an alternative, light emitting units that transmit different signals have a light emitting unit, which transmits no signal, placed therebetween so as not to be captured at the same time, as illustrated in FIG. 37.

(Structure of Light Emitting Unit)

Figure 38:
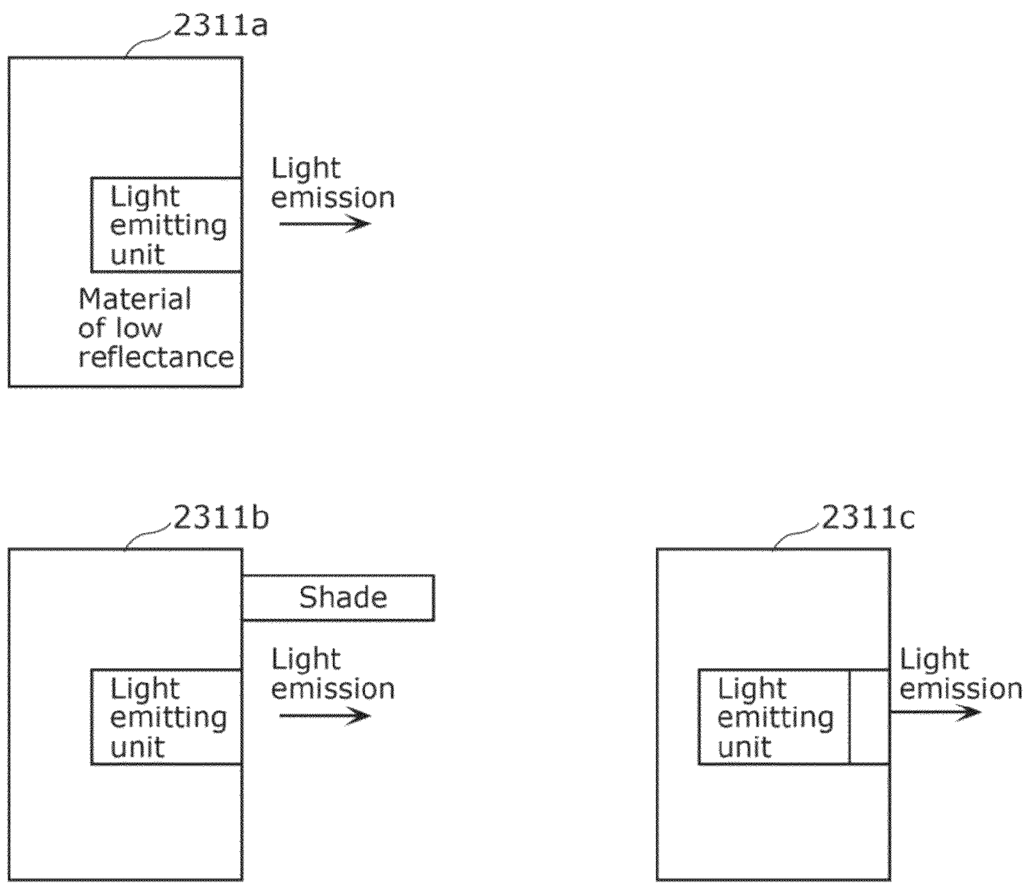
FIG. 38 is a diagram illustrating an example of a structure of a light emitting unit in Embodiment 1.

FIG. 38 is a diagram illustrating a desirable structure of the light emitting unit.

In 2311*a*, the light emitting unit and its surrounding material have low reflectance. This eases the recognition of the light emission state by the reception device even when light impinges on or around the light emitting unit. In 2311*b*, a shade for blocking external light is provided. This eases the recognition of the light emission state by the reception device because light is kept from impinging on or around the light emitting unit. In 2311*c*, the light emitting unit is provided in a more recessed part. This eases the recognition of the light emission state by the reception device because light is kept from impinging on or around the light emitting unit.

(Signal Carrier)

Figure 39:
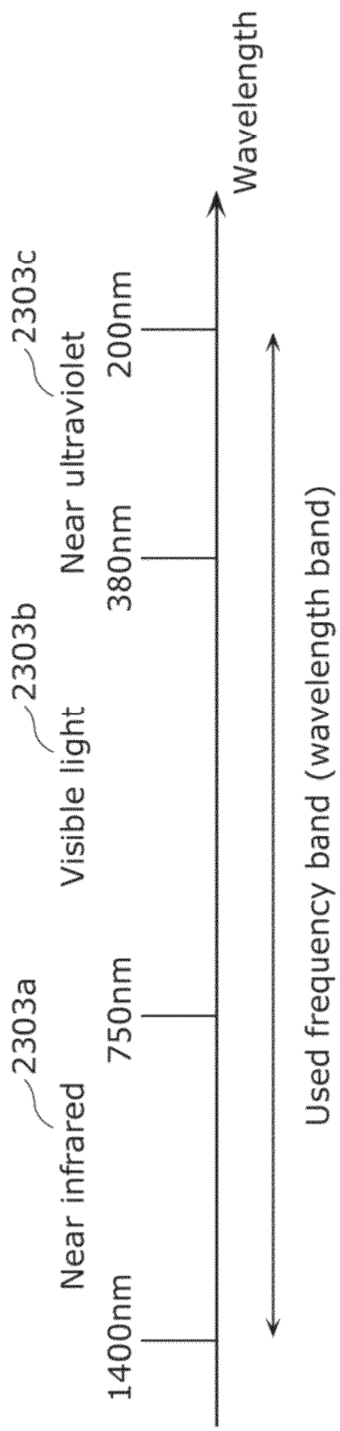
FIG. 39 is a diagram illustrating an example of a signal carrier in Embodiment 1.

Light (electromagnetic wave) in frequency bands from near infrared, visible light, to near ultraviolet illustrated in FIG. 39, which can be received by the reception device, is used as light (electromagnetic wave) for carrying signals.

(Imaging Unit)

Figure 40:
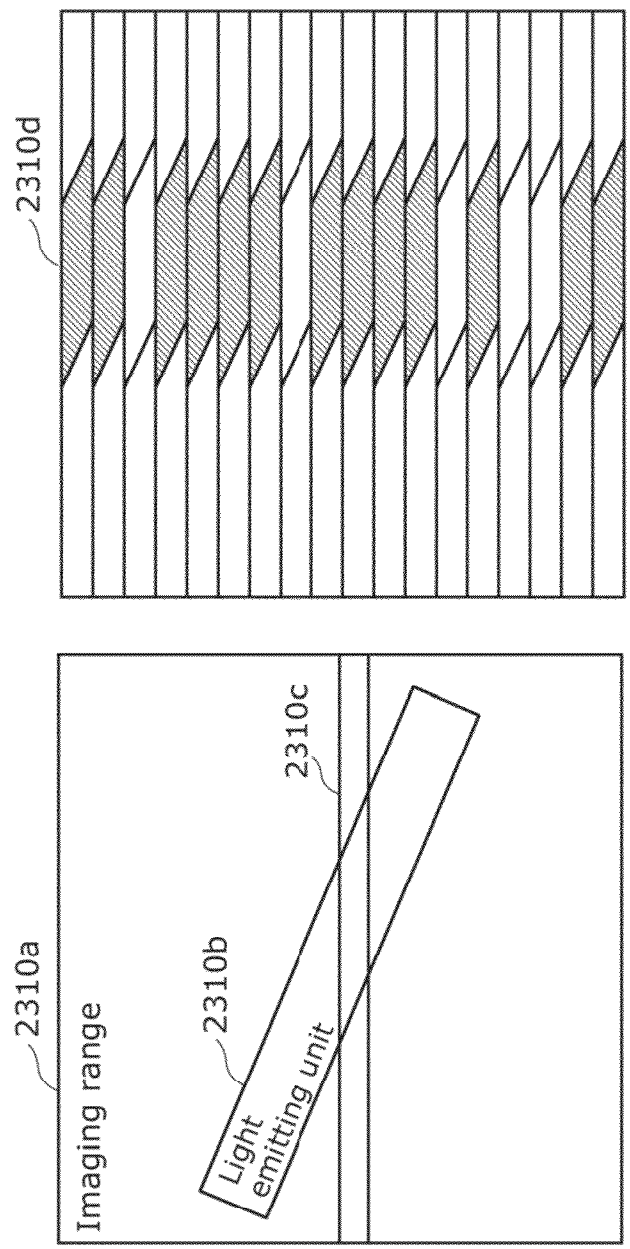
FIG. 40 is a diagram illustrating an example of an imaging unit in Embodiment 1.

In FIG. 40, an imaging unit in the reception device detects a light emitting unit 2310*b* emitting light in a pattern, in an imaging range 2310*a*.

An imaging control unit obtains a captured image 2310*d* by repeatedly using an exposure line 2310*c* at the center position of the light emitting unit, instead of using the other exposure lines.

The captured image 2310*d* is an image of the same area at different exposure times. The light emission pattern of the light emitting unit can be observed by scanning, in the direction perpendicular to the exposure lines, the pixels where the light emitting unit is shown in the captured image 2310*d*.

According to this method, even in the case where the light emitting unit is present only in one part of the captured image, the luminance change of the light emitting unit can be observed for a longer time. Hence, the signal can be read even when the light emitting unit is small or the light emitting unit is captured from a long distance.

In the case where there is no blanking, the method allows every luminance change of the light emitting unit to be observed so long as the light emitting unit is shown in at least one part of the imaging device.

In the case where the time for exposing one line is longer than the time from when the exposure of the line starts to when the exposure of the next line starts, the same advantageous effect can be achieved by capturing the image using a plurality of exposure lines at the center of the light emitting unit.

Note that, in the case where pixel-by-pixel control is possible, the image is captured using only a point closest to the center of the light emitting unit or only a plurality of points closest to the center of the light emitting unit. Here, by making the exposure start time of each pixel different, the light emission state of the light emitting unit can be detected in smaller periods.

When, while mainly using the exposure line 2310*c*, other exposure lines are occasionally used and the captured images are synthesized, the synthetic image (video) that is similar to the normally captured image though lower in resolution or frame rate can be obtained. The synthetic image is then displayed to the user, so that the user can operate the reception device or perform image stabilization using the synthetic image.

The image stabilization may be performed using sensor values of a gyroscope, a 9-axis sensor, and the like, or using an image captured by an imaging device other than the imaging device capturing the light emitting unit.

It is desirable to use exposure lines or exposure pixels in a part near the center of the light emitting unit rather than near the edges of the light emitting unit, because the light emitting unit is less likely to be displaced from such exposure lines or exposure pixels upon hand movement.

Since the periphery of the light emitting unit is low in luminance, it is desirable to use exposure lines or exposure pixels in a part that is as far from the periphery of the light emitting unit as possible and is high in luminance.

(Position Estimation of Reception Device)

Figure 41:
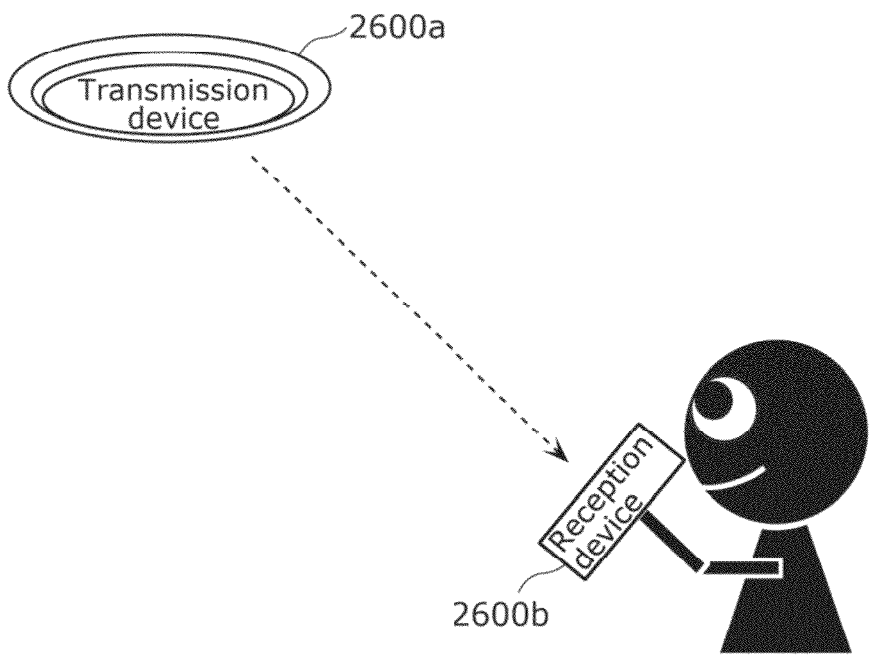
FIG. 41 is a diagram illustrating an example of position estimation of a reception device in Embodiment 1.

In FIG. 41, the transmission device transmits the position information of the transmission device, the size of the light emitting device, the shape of the light emitting device, and the ID of the transmission device. The position information includes the latitude, longitude, altitude, height from the floor surface, and the like of the center part of the light emitting device.

The reception device estimates the imaging direction based on information obtained from the 9-axis sensor and the gyroscope. The reception device estimates the distance from the reception device to the light emitting device, from the size and shape of the light emitting device transmitted from the transmission device, the size and shape of the light emitting device in the captured image, and information about the imaging device. The information about the imaging device includes the focal length of a lens, the distortion of the lens, the size of the imaging element, the distance between the lens and the imaging element, a comparative table of the size of an object of a reference size in the captured image and the distance from the imaging device to the imaging object, and so on.

The reception device also estimates the position information of the reception device, from the information transmitted from the transmission device, the imaging direction, and the distance from the reception device to the light emitting device.

Figure 42:
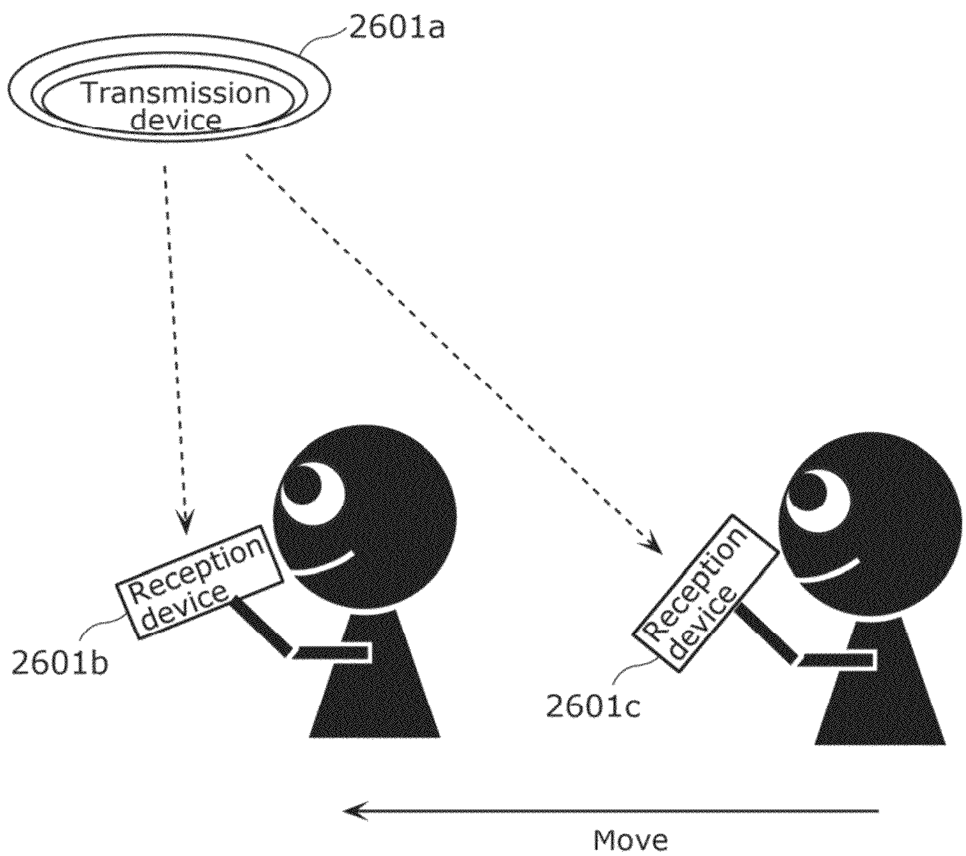
FIG. 42 is a diagram illustrating an example of position estimation of a reception device in Embodiment 1.

In FIG. 42, the transmission device transmits the position information of the transmission device, the size of the light emitting unit, the shape of the light emitting unit, and the ID of the transmission device. The position information includes the latitude, longitude, altitude, height from the floor surface, and the like of the center part of the light emitting unit.

The reception device estimates the imaging direction based on information obtained from the 9-axis sensor and the gyroscope. The reception device estimates the distance from the reception device to the light emitting unit, from the size and shape of the light emitting unit transmitted from the transmission device, the size and shape of the light emitting unit in the captured image, and information about the imaging device. The information about the imaging device includes the focal length of a lens, the distortion of the lens, the size of the imaging element, the distance between the lens and the imaging element, a comparative table of the size of an object of a reference size in the captured image and the distance from the imaging device to the imaging object, and so on.

The reception device also estimates the position information of the reception device, from the information transmitted from the transmission device, the imaging direction, and the distance from the reception device to the light emitting unit. The reception device estimates the moving direction and the moving distance, from the information obtained from the 9-axis sensor and the gyroscope. The reception device estimates the position information of the reception device, using position information estimated at a plurality of points and the position relation between the points estimated from the moving direction and the moving distance.

For example, suppose the random field of the position information of the reception device estimated at point [Math. 1] $x_1$ is [Math. 2] $P_{x1}$, and the random field of the moving direction and the moving distance estimated when moving from point [Math. 3] $x_1$ to point [Math. 4] $x_2$ is [Math. 5] $M_{x1x2}$. Then, the random field of the eventually estimated position information can be calculated at [Math. 6]

$$\Pi_k^{n-1}(P_{x_k} \times M_{x_k x_{k+1}}) \times P_{x_n}.$$

Moreover, in FIG. 42, the transmission device may transmit the position information of the transmission device and the ID of the transmission device. The position information includes the latitude, longitude, altitude, height from the floor surface, and the like of the center part of the light emitting device.

In this case, the reception device estimates the imaging direction based on information obtained from the 9-axis sensor and the gyroscope. The reception device estimates the position information of the reception device by trilateration.

Figure 43:
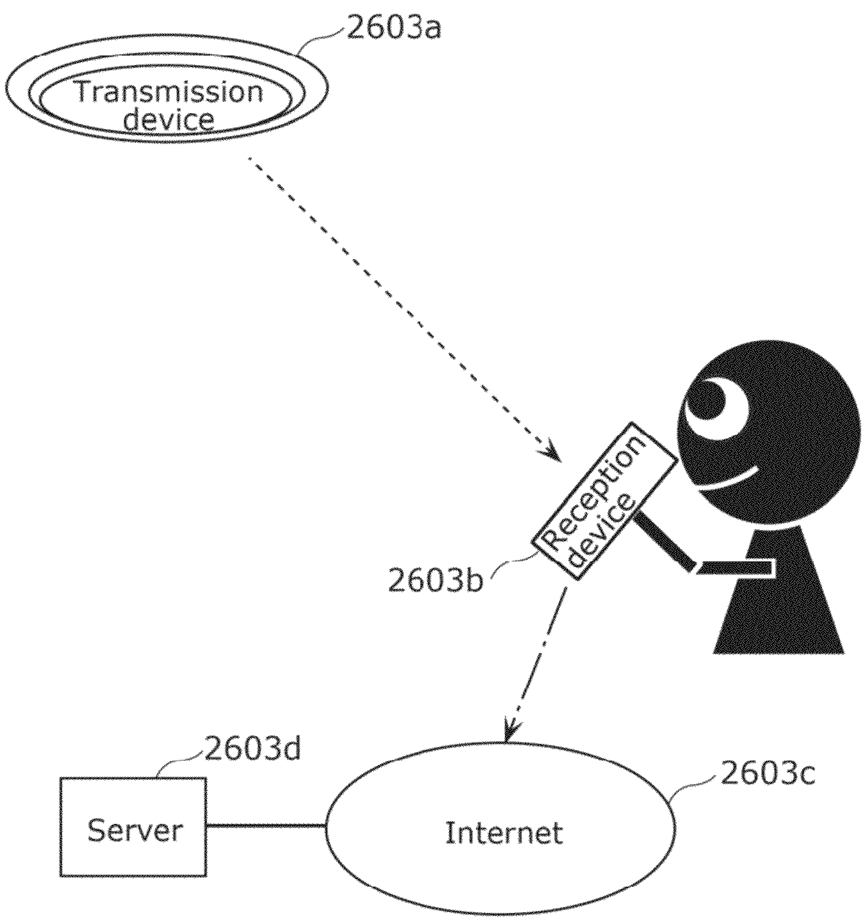
FIG. 43 is a diagram illustrating an example of position estimation of a reception device in Embodiment 1.

In FIG. 43, the transmission device transmits the ID of the transmission device.

The reception device receives the ID of the transmission device, and obtains the position information of the transmission device, the size of the light emitting device, the shape of the light emitting device, and the like from the Internet. The position information includes the latitude, longitude, altitude, height from the floor surface, and the like of the center part of the light emitting device.

The reception device estimates the imaging direction based on information obtained from the 9-axis sensor and the gyroscope. The reception device estimates the distance from the reception device to the light emitting device, from the size and shape of the light emitting device transmitted from the transmission device, the size and shape of the light emitting device in the captured image, and information about the imaging device. The information about the imaging device includes the focal length of a lens, the distortion of the lens, the size of the imaging element, the distance between the lens and the imaging element, a comparative table of the size of an object of a reference size in the captured image and the distance from the imaging device to the imaging object, and so on.

The reception device also estimates the position information of the reception device, from the information obtained from the Internet, the imaging direction, and the distance from the reception device to the light emitting device.

Figure 44:
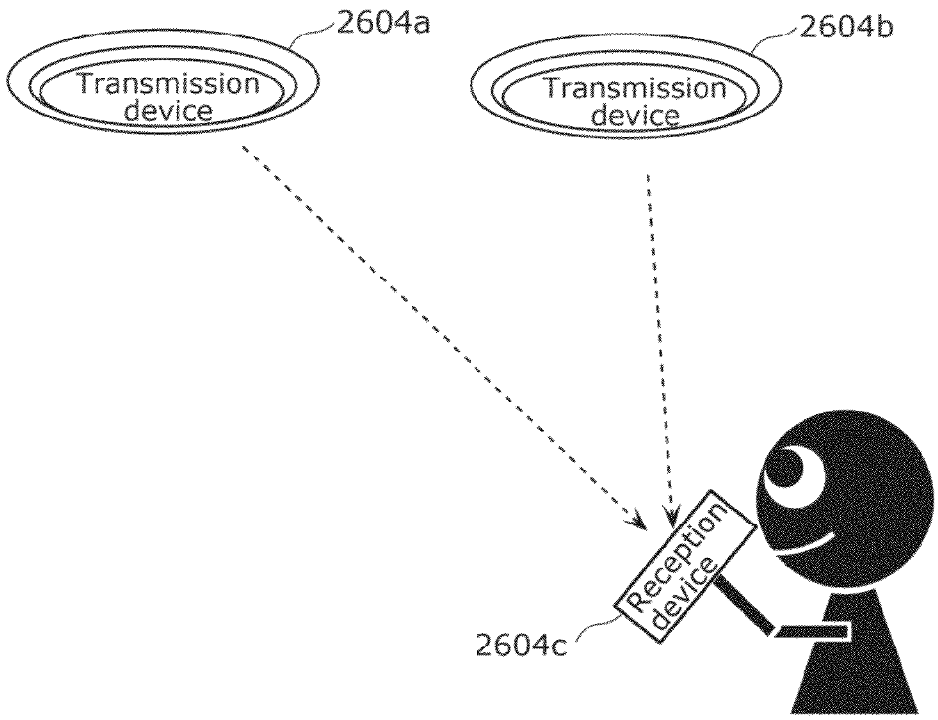
FIG. 44 is a diagram illustrating an example of position estimation of a reception device in Embodiment 1.

In FIG. 44, the transmission device transmits the position information of the transmission device and the ID of the transmission device. The position information includes the latitude, longitude, altitude, height from the floor surface, and the like of the center part of the light emitting device.

The reception device estimates the imaging direction based on information obtained from the 9-axis sensor and the gyroscope. The reception device estimates the position information of the reception device by triangulation.

Figure 45:
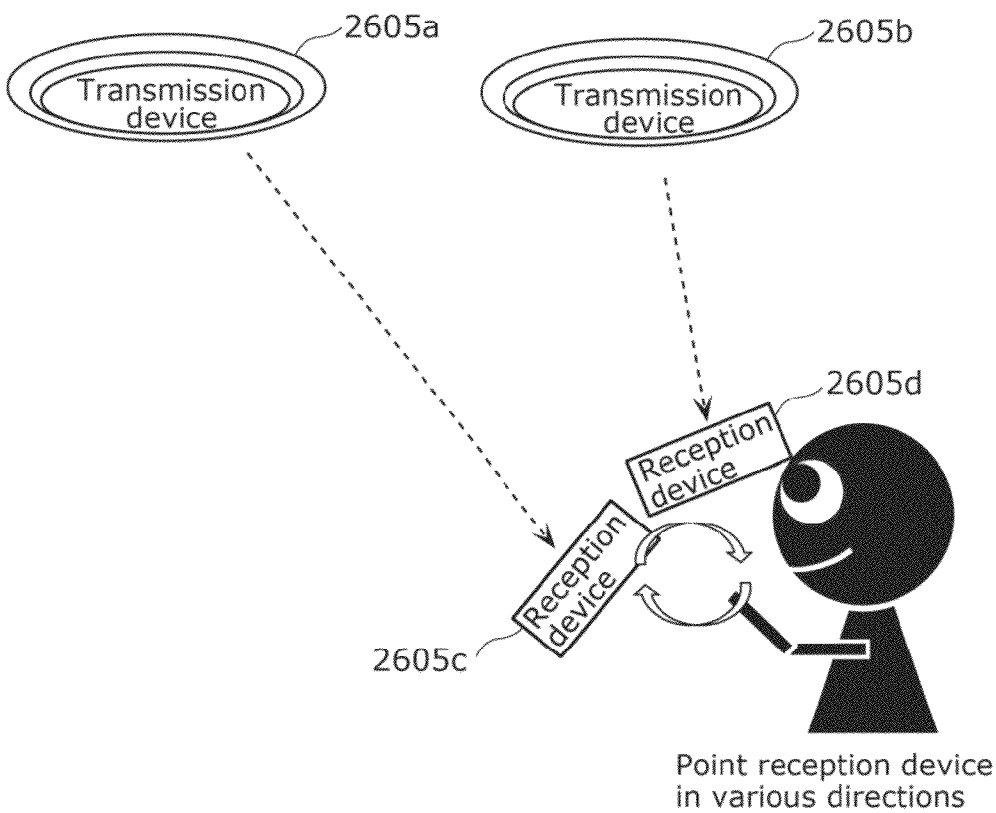
FIG. 45 is a diagram illustrating an example of position estimation of a reception device in Embodiment 1.

In FIG. 45, the transmission device transmits the position information of the transmission device and the ID of the transmission device. The position information includes the latitude, longitude, altitude, height from the floor surface, and the like of the center part of the light emitting device.

The reception device estimates the imaging direction based on information obtained from the 9-axis gyroscope. The reception device estimates the position information of the reception device by triangulation. The reception device also estimates the orientation change and movement of the reception device, from the gyroscope and the 9-axis sensor. The reception device may perform zero point adjustment or calibration of the 9-axis sensor simultaneously.

(Transmission Information Setting)

Figure 46:
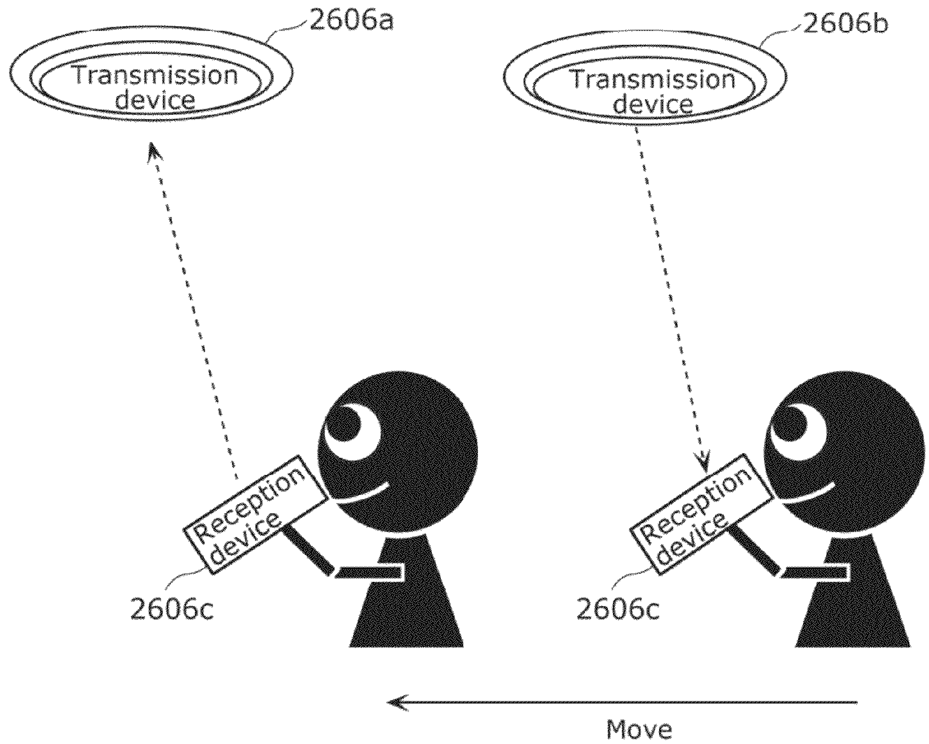
FIG. 46 is a diagram illustrating an example of transmission information setting in Embodiment 1.

In FIG. 46, a reception device 2606*c* obtains a transmitted signal by capturing a light emission pattern of a transmission device 2606*b*, and estimates the position of the reception device.

The reception device 2606*c* estimates the moving distance and direction from the change in captured image and the sensor values of the 9-axis sensor and the gyroscope, during movement.

The reception device captures a light receiving unit of a transmission device 2606*a*, estimates the center position of the light emitting unit, and transmits the position to the transmission device.

Since the size information of the light emitting device is necessary for estimating the position of the light emitting unit, the transmission device desirably transmits the size information of the light emitting unit even in the case where part of the transmission information is missing. In the case where the size of the light emitting unit is unknown, the reception device estimates the height of the ceiling from the distance between the transmission device 2606*b* and the reception device 2606*c* used in the position estimation and, through the use of this estimation result, estimates the distance between the transmission device 2606*a* and the reception device 2606*c*.

There are transmission methods such as transmission using a light emission pattern, transmission using a sound pattern, and transmission using a radio wave. The light emission pattern of the transmission device and the corresponding time may be stored and later transmitted to the transmission device or the centralized control device.

The transmission device or the centralized control device specifies, based on the light emission pattern and the time, the transmission device captured by the reception device, and stores the position information in the transmission device.

Figure 47:
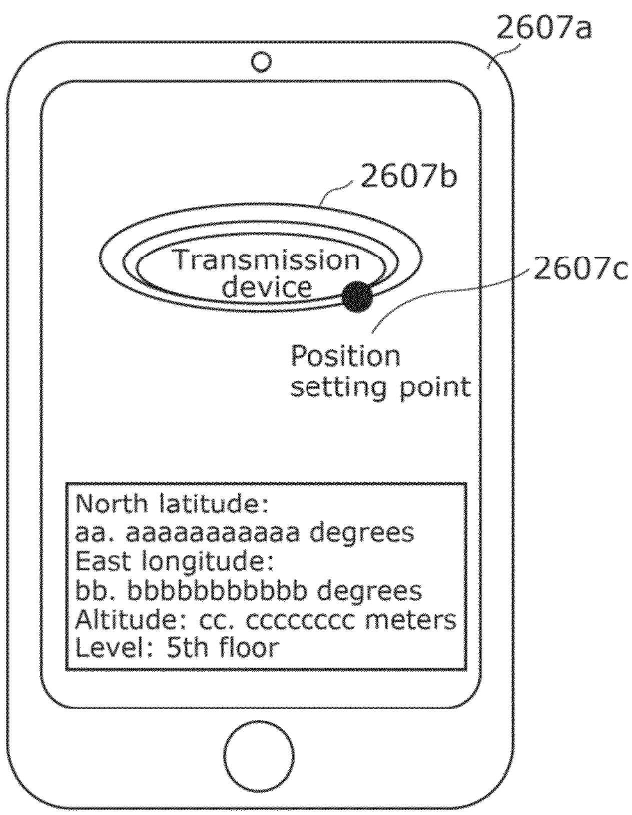
FIG. 47 is a diagram illustrating an example of transmission information setting in Embodiment 1.

In FIG. 47, a position setting point is designated by designating one point of the transmission device as a point in the image captured by the reception device.

The reception device calculates the position relation to the center of the light emitting unit of the transmission device from the position setting point, and transmits, to the transmission device, the position obtained by adding the position relation to the setting point.

Figure 48:
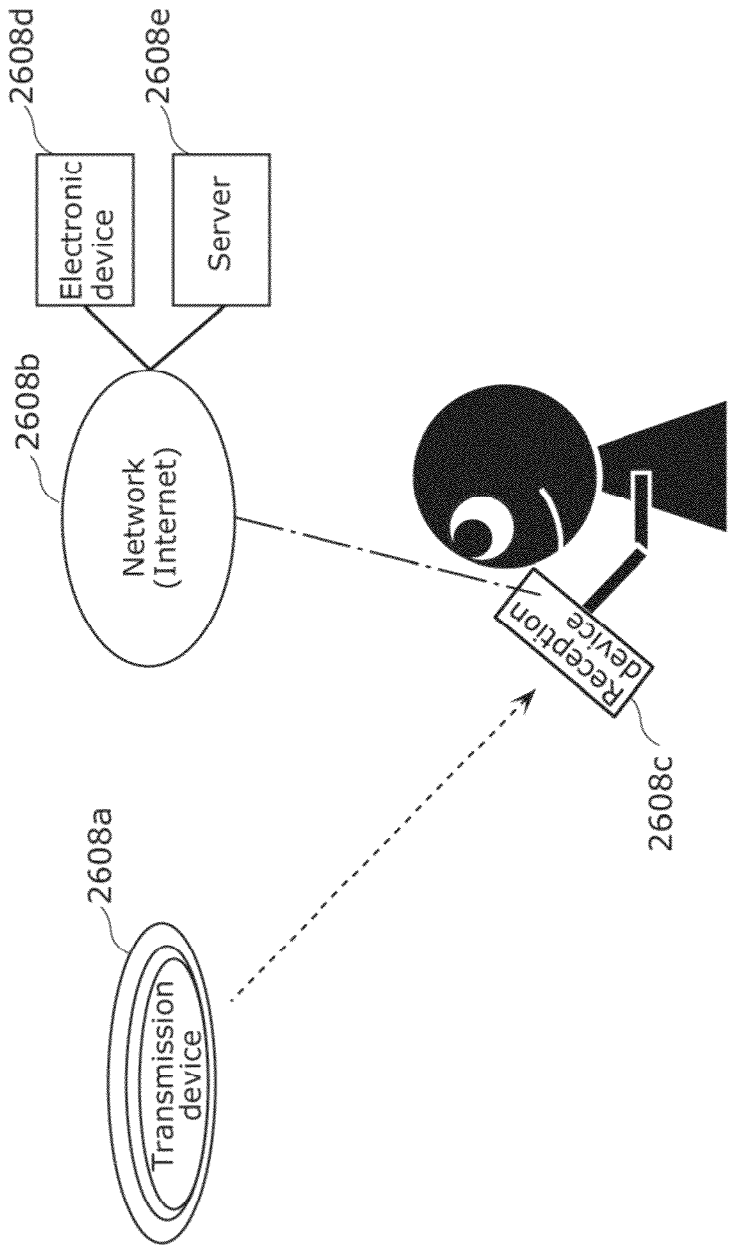
FIG. 48 is a diagram illustrating an example of transmission information setting in Embodiment 1.

In FIG. 48, the reception device receives the transmitted signal by capturing the image of the transmission device. The reception device communicates with a server or an electronic device based on the received signal.

As an example, the reception device obtains the information of the transmission device, the position and size of the transmission device, service information relating to the position, and the like from the server, using the ID of the transmission device included in the signal as a key.

As another example, the reception device estimates the position of the reception device from the position of the transmission device included in the signal, and obtains map information, service information relating to the position, and the like from the server.

As yet another example, the reception device obtains a modulation scheme of a nearby transmission device from the server, using the rough current position as a key.

As yet another example, the reception device registers, in the server, the position information of the reception device or the transmission device, neighborhood information, and information of any process performed by the reception device in the neighborhood, using the ID of the transmission device included in the signal as a key.

As yet another example, the reception device operates the electronic device, using the ID of the transmission device included in the signal as a key.

(Block Diagram of Reception Device)

Figure 49:
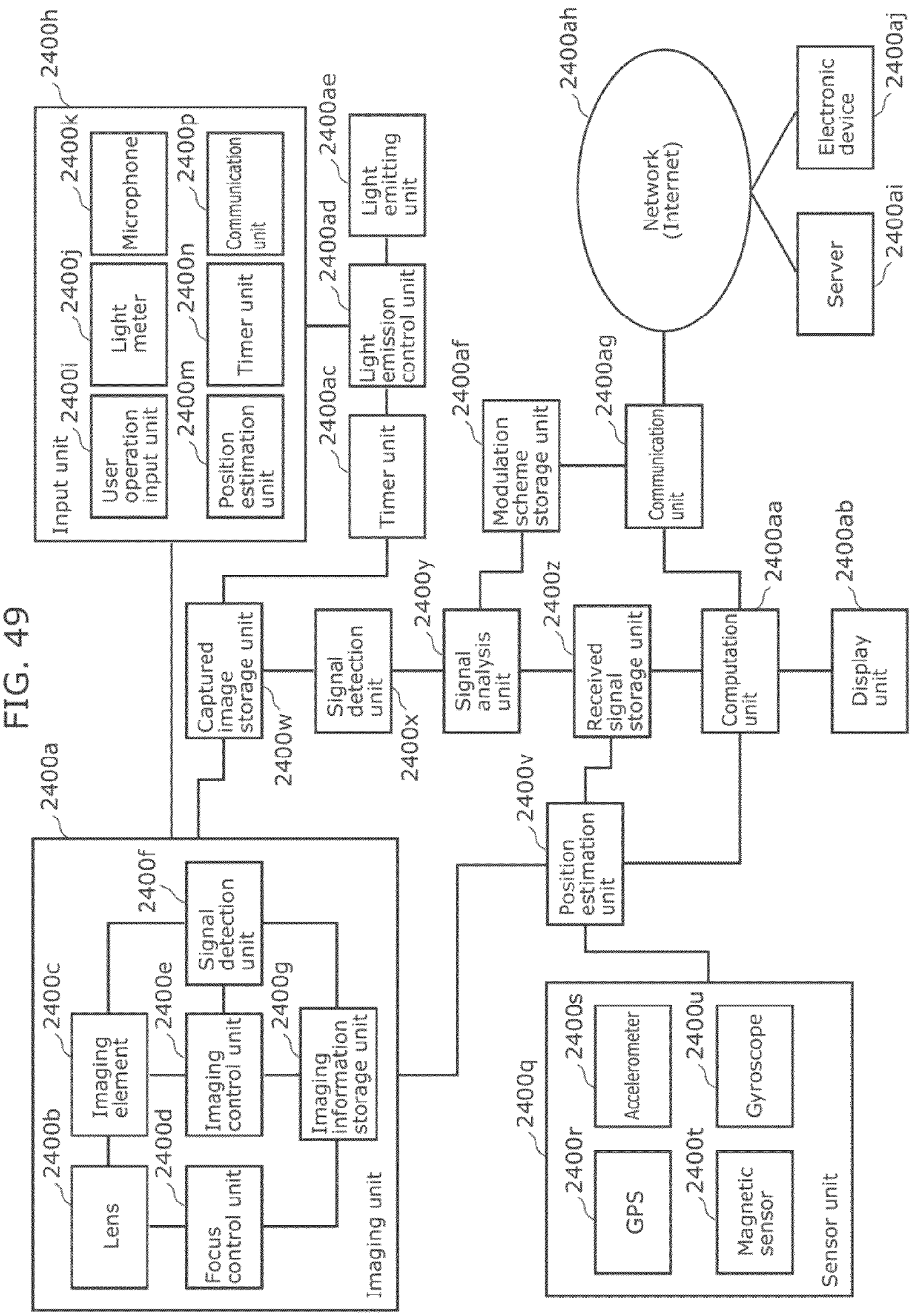
FIG. 49 is a block diagram illustrating an example of structural elements of a reception device in Embodiment 1.

FIG. 49 is a block diagram illustrating the reception device. The reception device includes all of the structure or part of the structure including an imaging unit and a signal analysis unit. In FIG. 49, blocks having the same name may be realized by the same structural element or different structural elements.

A reception device 2400*af* in a narrow sense is included in a smartphone, a digital camera, or the like. An input unit 2400*h* includes all or part of: a user operation input unit 2400*i*; a light meter 2400*j*; a microphone 2400*k*; a timer unit 2400*n*; a position estimation unit 2400*m*; and a communication unit 2400*p*.

An imaging unit 2400*a* includes all or part of: a lens 2400*b*; an imaging element 2400*c*; a focus control unit 2400*d*; an imaging control unit 2400*e*; a signal detection unit 2400*f*; and an imaging information storage unit 2400*g*. The imaging unit 2400*a* starts imaging according to a user operation, an illuminance change, or a sound or voice pattern, when a specific time is reached, when the reception device moves to a specific position, or when instructed by another device via a communication unit.

The focus control unit 2400*d* performs control such as adjusting the focus to a light emitting unit 2400*ae* of the transmission device or adjusting the focus so that the light emitting unit 2400*ae* of the transmission device is shown in a large size in a blurred state.

An exposure control unit 2400*ak* sets an exposure time and an exposure gain.

The imaging control unit 2400*e* limits the position to be captured, to specific pixels.

The signal detection unit 2400*f* detects pixels including the light emitting unit 2400*ae* of the transmission device or pixels including the signal transmitted using light emission, from the captured image.

The imaging information storage unit 2400*g* stores control information of the focus control unit 2400*d*, control information of the imaging control unit 2400*e*, and information detected by the signal detection unit 2400*f*. In the case where there are a plurality of imaging devices, imaging may be simultaneously performed by the plurality of imaging devices so that one of the captured images is put to use in estimating the position or orientation of the reception device.

A light emission control unit 2400*ad* transmits a signal by controlling the light emission pattern of the light emitting unit 2400*ae* according to the input from the input unit 2400*h*. The light emission control unit 2400*ad* obtains, from a timer unit 2400*ac*, the time at which the light emitting unit 2400*ae* emits light, and records the obtained time.

A captured image storage unit 2400*w* stores the image captured by the imaging unit 2400*a*.

A signal analysis unit 2400*y* obtains the transmitted signal from the captured light emission pattern of the light emitting unit 2400*ae* of the transmission device through the use of the difference between exposure times of lines in the imaging element, based on a modulation scheme stored in the modulation scheme storage unit 2400*af*.

A received signal storage unit 2400*z* stores the signal analyzed by the signal analysis unit 2400*y*.

A sensor unit 2400*q* includes all or part of: a GPS 2400*r*; a magnetic sensor 2400*t*; an accelerometer 2400*s*; and a gyroscope 2400*u*. The magnetic sensor 2400*t* and the accelerometer 2400*s* may each be a 9-axis sensor.

A position estimation unit estimates the position or orientation of the reception device, from the information from the sensor unit, the captured image, and the received signal.

A computation unit 2400*aa* causes a display unit 2400*ab* to display the received signal, the estimated position of the reception device, and information (e.g. information relating to a map or locations, information relating to the transmission device) obtained from a network 2400*ah* based on the received signal or the estimated position of the reception device.

The computation unit 2400*aa* controls the transmission device based on the information input to the input unit 2400*h* from the received signal or the estimated position of the reception device.

A communication unit 2400*ag* performs communication between terminals without via the network 2400*ah*, in the case of using a peer-to-peer connection scheme (e.g. Bluetooth).

An electronic device 2400*aj* is controlled by the reception device.

A server 2400*ai* stores the information of the transmission device, the position of the transmission device, and information relating to the position of the transmission device, in association with the ID of the transmission device.

The server 2400*ai* stores the modulation scheme of the transmission device in association with the position.

(Block Diagram of Transmission Device)

Figure 50:
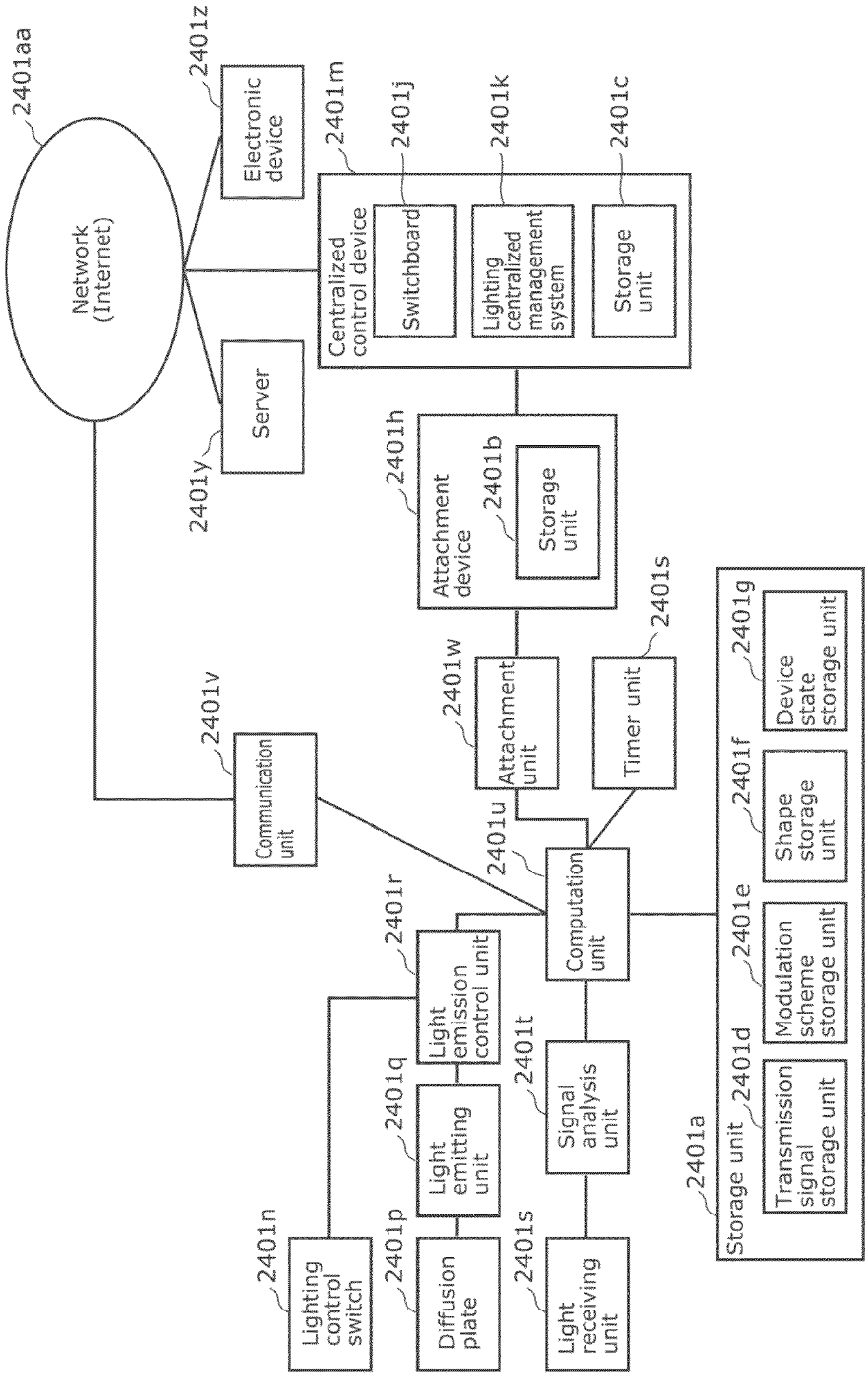
FIG. 50 is a block diagram illustrating an example of structural elements of a transmission device in Embodiment 1.

FIG. 50 is a block diagram illustrating the transmission device.

The transmission device includes all of the structure or part of the structure including a light emitting unit, a transmission signal storage unit, a modulation scheme storage unit, and a computation unit.

A transmission device 2401*ab* in a narrow sense is included in an electric light, an electronic device, or a robot.

A lighting control switch 2401*n* is a switch for switching the lighting ON and OFF.

A diffusion plate 2401*p* is a member attached near a light emitting unit 2401*q* in order to diffuse light of the light emitting unit 2401*q*.

The light emitting unit 2401*q* is turned ON and OFF at a speed that allows the light emission pattern to be detected on a line basis, through the use of the difference between exposure times of lines in the imaging element of the reception device in FIG. 49.

The light emitting unit 2401*q* is composed of a light source, such as an LED or a fluorescent lamp, capable of turning ON and OFF at high speed.

A light emission control unit 2401*r* controls ON and OFF of the light emitting unit 2401*q*.

A light receiving unit 2401*s* is composed of a light receiving element or an imaging element. The light receiving unit 2401*s* converts the intensity of received light to an electric signal. An imaging unit may be used instead of the light receiving unit 2401*s*.

A signal analysis unit 2401*t* obtains the signal from the pattern of the light received by the light receiving unit 2401*s*.

A computation unit 2401_u_ converts a transmission signal stored in a transmission signal storage unit 2401_d_ to a light emission pattern according to a modulation scheme stored in a modulation scheme storage unit 2401_e_. The computation unit 2401_u_ controls communication by editing information in the storage unit 2401_a_ or controlling the light emission control unit 2401_r_, based on the signal obtained from the signal analysis unit 2401_t_. The computation unit 2401_u_ controls communication by editing information in the storage unit 2401_a_ or controlling the light emission control unit 2401_r_, based on a signal from an attachment unit 2401_w_. The computation unit 2401_u_ edits information in the storage unit 2401_a_ or controls the light emission control unit 2401_r_, based on a signal from a communication unit 2401_v_.

The computation unit 2401_u_ also edits information in a storage unit 2401_b_ in an attachment device 2401_h_. The computation unit 2401_u_ copies the information in the storage unit 2401_b_ in the attachment device 2401_h_, to a storage unit 2401_a_.

The computation unit 2401_u_ controls the light emission control unit 2401_r_ at a specified time. The computation unit 2401_u_ controls an electronic device 2401_zz_ via a network 2401_aa_.

The storage unit 2401_a_ includes all or part of: the transmission signal storage unit 2401_d_; a shape storage unit 2401_f_; the modulation scheme storage unit 2401_e_; and a device state storage unit 2401_g_.

The transmission signal storage unit 2401_d_ stores the signal to be transmitted from the light emitting unit 2401_q_.

The modulation scheme storage unit 2401_e_ stores the modulation scheme for converting the transmission signal to the light emission pattern.

The shape storage unit 2401_f_ stores the shapes of the transmission device and light emitting unit 2401_q_.

The device state storage unit 2401_g_ stores the state of the transmission device.

The attachment unit 2401_w_ is composed of an attachment bracket or a power supply port.

The storage unit 2401_b_ in the attachment device 2401_h_ stores information stored in the storage unit 2401_a_. Here, the storage unit 2401_b_ in the attachment device 2401_h_ or a storage unit 2401_c_ in a centralized control device 2401_m_ may be used, while omitting the storage unit 2401_a_.

A communication unit 2401_v_ performs communication between terminals without via the network 2400_aa_, in the case of using a peer-to-peer connection scheme (e.g. Bluetooth).

A server 2401_y_ stores the information of the transmission device, the position of the transmission device, and information relating to the position of the transmission device, in association with the ID of the transmission device. The server 2401_y_ also stores the modulation scheme of the transmission device in association with the position.

(Reception Procedure)

Figure 51:
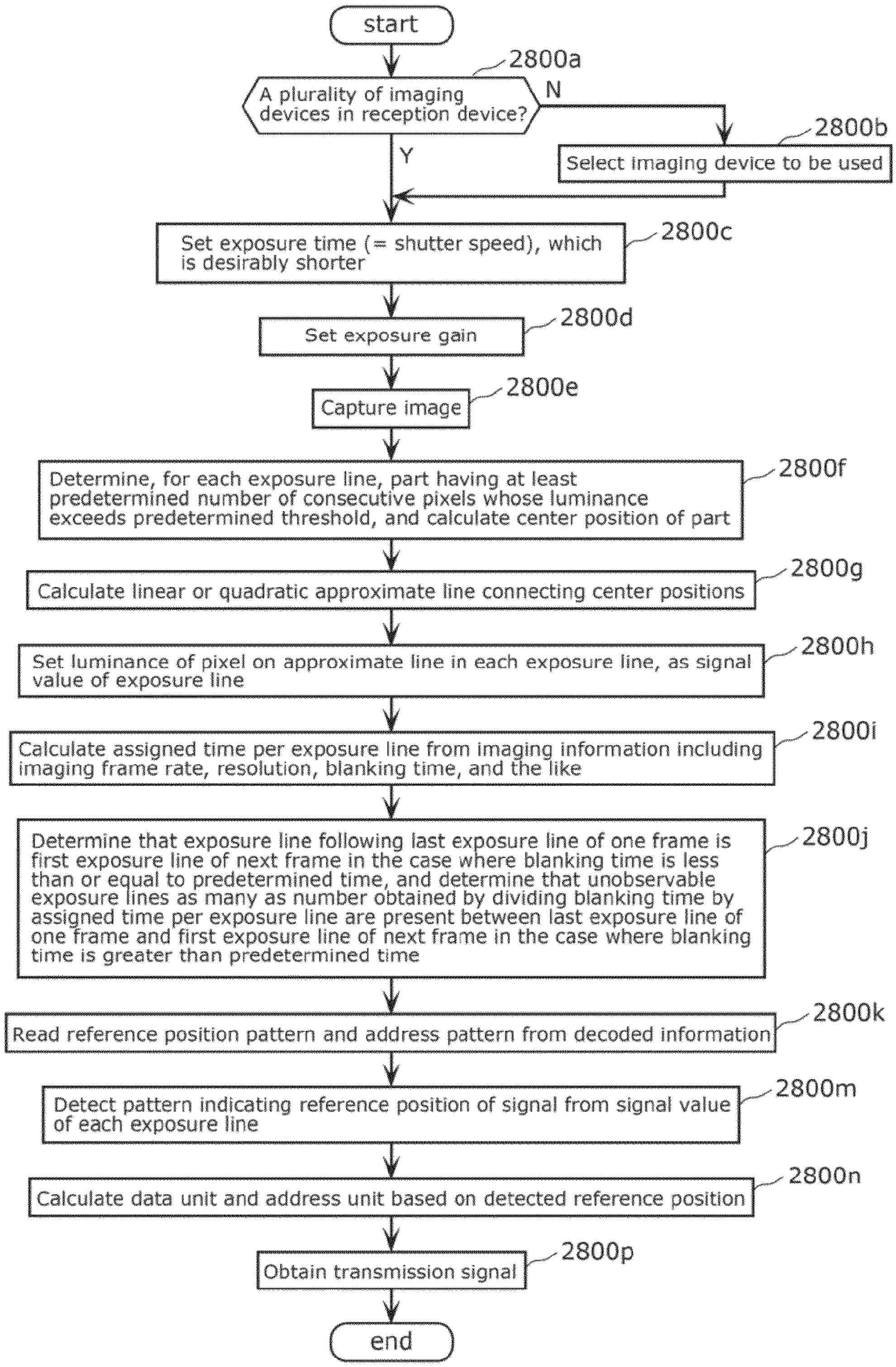
FIG. 51 is a diagram illustrating an example of a reception procedure in Embodiment 1.

FIG. 51 is explained below. In Step 2800_a_, whether or not there are a plurality of imaging devices in the reception device is determined. In the case of No, the procedure proceeds to Step 2800_b_ to select an imaging device to be used, and then proceeds to Step 2800_c_. In the case of Yes, on the other hand, the procedure proceeds to Step 2800_c_.

In Step 2800_c_, an exposure time (=shutter speed) is set (the exposure time is desirably shorter).

Next, in Step 2800_d_, an exposure gain is set.

Next, in Step 2800_e_, an image is captured.

Next, in Step 2800_f_, a part having at least a predetermined number of consecutive pixels whose luminance exceeds a predetermined threshold is determined for each exposure line, and the center position of the part is calculated.

Next, in Step 2800_g_, a linear or quadratic approximate line connecting the above center positions is calculated.

Next, in Step 2800_h_, the luminance of the pixel on the approximate line in each exposure line is set as the signal value of the exposure line.

Next, in Step 2800_i_, an assigned time per exposure line is calculated from imaging information including an imaging frame rate, a resolution, a blanking time, and the like.

Next, in Step 2800_j_, in the case where the blanking time is less than or equal to a predetermined time, it is determined that the exposure line following the last exposure line of one frame is the first exposure line of the next frame. In the case where the blanking time is greater than the predetermined time, it is determined that unobservable exposure lines as many as the number obtained by dividing the blanking time by the assigned time per exposure line are present between the last exposure line of one frame and the first exposure line of the next frame.

Next, in Step 2800_k_, a reference position pattern and an address pattern are read from decoded information.

Next, in Step 2800_m_, a pattern indicating a reference position of the signal is detected from the signal of each exposure line.

Next, in Step 2800_n_, a data unit and an address unit are calculated based on the detected reference position.

Next, in Step 2800_p_, a transmission signal is obtained.

(Self-Position Estimation Procedure)

Figure 52:
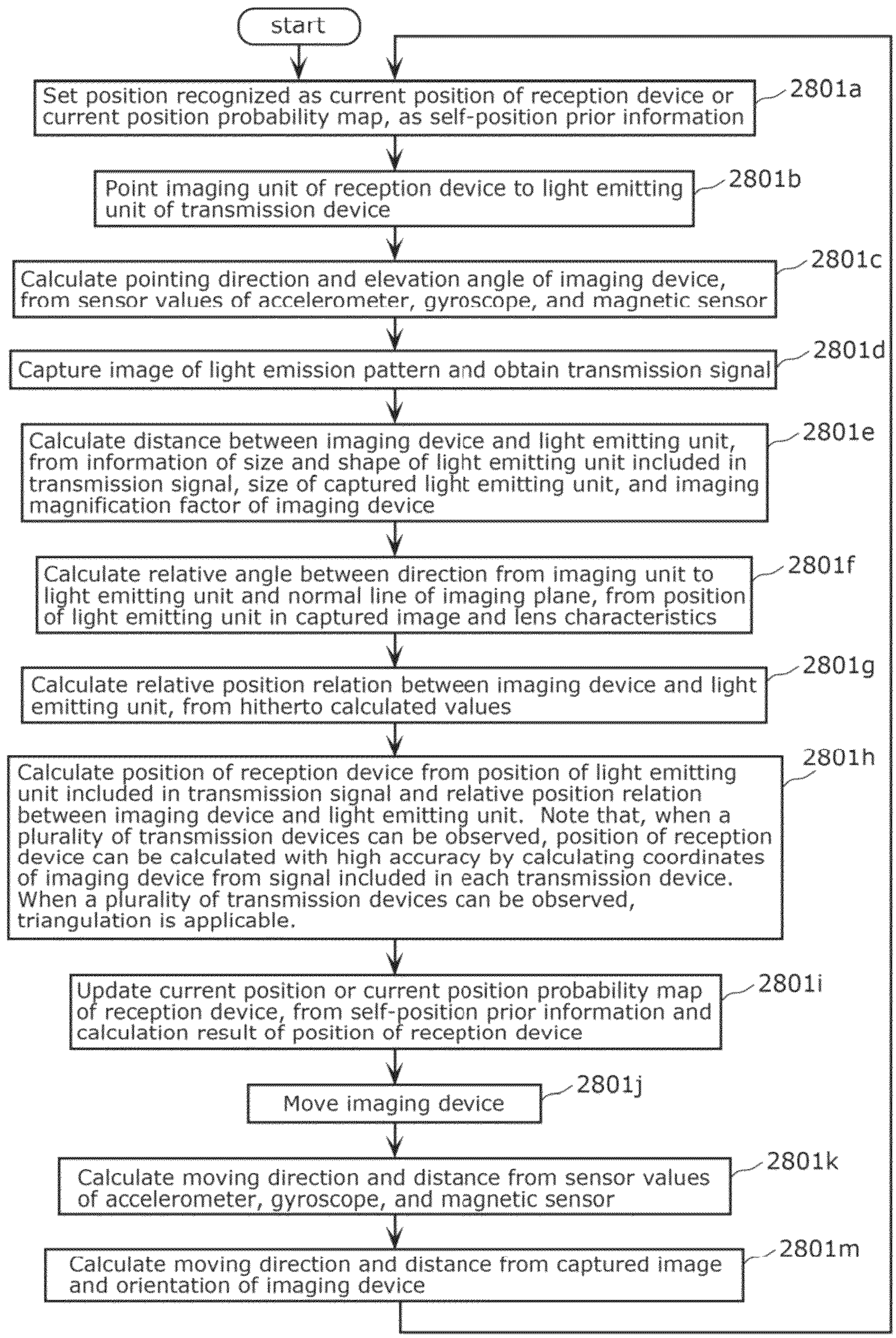
FIG. 52 is a diagram illustrating an example of a self-position estimation procedure in Embodiment 1.

FIG. 52 is explained below. First, in Step 2801_a_, a position recognized as the current position of the reception device or a current position probability map is set as self-position prior information.

Next, in Step 2801_b_, the imaging unit of the reception device is pointed to the light emitting unit of the transmission device.

Next, in Step 2801_c_, the pointing direction and elevation angle of the imaging device are calculated from the sensor values of the 9-axis sensor and the gyroscope.

Next, in Step 2801_d_, the light emission pattern is captured and the transmission signal is obtained.

Next, in Step 2801_e_, the distance between the imaging device and the light emitting unit is calculated from information of the size and shape of the light emitting unit included in the transmission signal, the size of the captured light emitting unit, and the imaging magnification factor of the imaging device.

Next, in Step 2801_f_, the relative angle between the direction from the imaging unit to the light emitting unit and the normal line of the imaging plane is calculated from the position of the light emitting unit in the captured image and the lens characteristics.

Next, in Step 2801_g_, the relative position relation between the imaging device and the light emitting unit is calculated from the hitherto calculated values.

Next, in Step 2801_h_, the position of the reception device is calculated from the position of the light emitting unit included in the transmission signal and the relative position relation between the imaging device and the light emitting unit. Note that, when a plurality of transmission devices can be observed, the position of the reception device can be calculated with high accuracy by calculating the coordinates of the imaging device from the signal included in each transmission device. When a plurality of transmission devices can be observed, triangulation is applicable.

Next, in Step 2801_i_, the current position or current position probability map of the reception device is updated from the self-position prior information and the calculation result of the position of the reception device.

Next, in Step 2801*j*, the imaging device is moved.

Next, in Step 2801*k*, the moving direction and distance are calculated from the sensor values of the 9-axis sensor and the gyroscope.

Next, in Step 2801*m*, the moving direction and distance are calculated from the captured image and the orientation of the imaging device. The procedure then returns to Step 2801*a*.

(Transmission Control Procedure 1)

Figure 53:
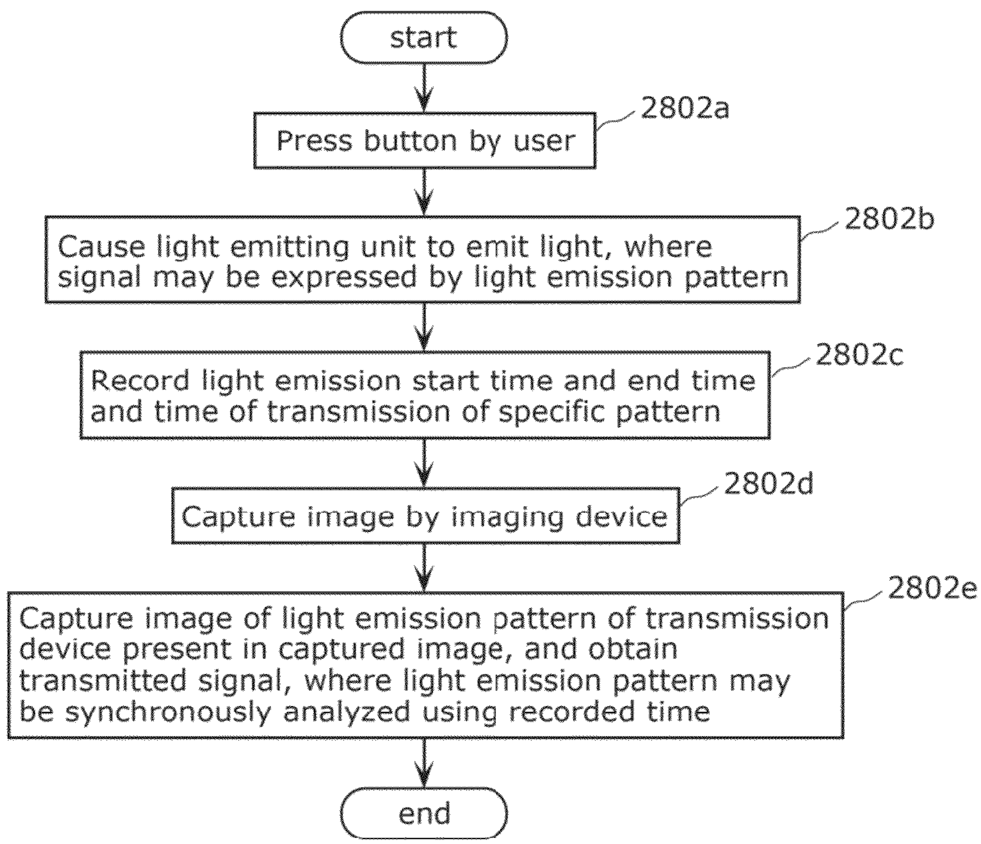
FIG. 53 is a diagram illustrating an example of a transmission control procedure in Embodiment 1.

FIG. 53 is explained below. First, in Step 2802*a*, the user presses a button.

Next, in Step 2802*b*, the light emitting unit is caused to emit light. Here, a signal may be expressed by the light emission pattern.

Next, in Step 2802*c*, the light emission start time and end time and the time of transmission of a specific pattern are recorded.

Next, in Step 2802*d*, the image is captured by the imaging device.

Next, in Step 2802*e*, the image of the light emission pattern of the transmission device present in the captured image is captured, and the transmitted signal is obtained. Here, the light emission pattern may be synchronously analyzed using the recorded time. The procedure then ends.

(Transmission Control Procedure 2)

Figure 54:
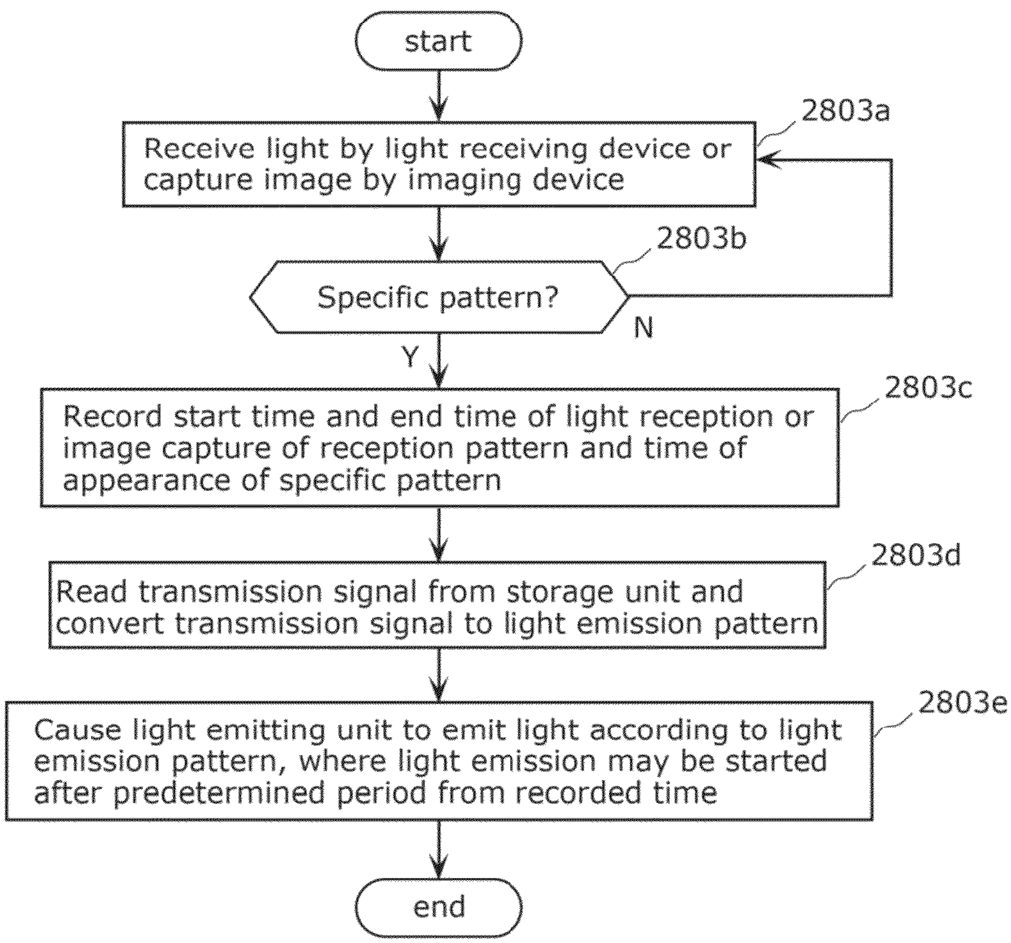
FIG. 54 is a diagram illustrating an example of a transmission control procedure in Embodiment 1.

FIG. 54 is explained below. First, in Step 2803*a*, light is received by the light receiving device or the image is captured by the imaging device.

Next, in Step 2803*b*, whether or not the pattern is a specific pattern is determined.

In the case of No, the procedure returns to Step 2803*a*. In the case of Yes, on the other hand, the procedure proceeds to Step 2803*c* to record the start time and end time of light reception or image capture of the reception pattern and the time of appearance of the specific pattern.

Next, in Step 2803*d*, the transmission signal is read from the storage unit and converted to the light emission pattern.

Next, in Step 2803*e*, the light emitting unit is caused to emit light according to the light emission pattern, and the procedure ends. Here, the light emission may be started after a predetermined time period from the recorded time, with the procedure ending thereafter.

(Transmission Control Procedure 3)

Figure 55:
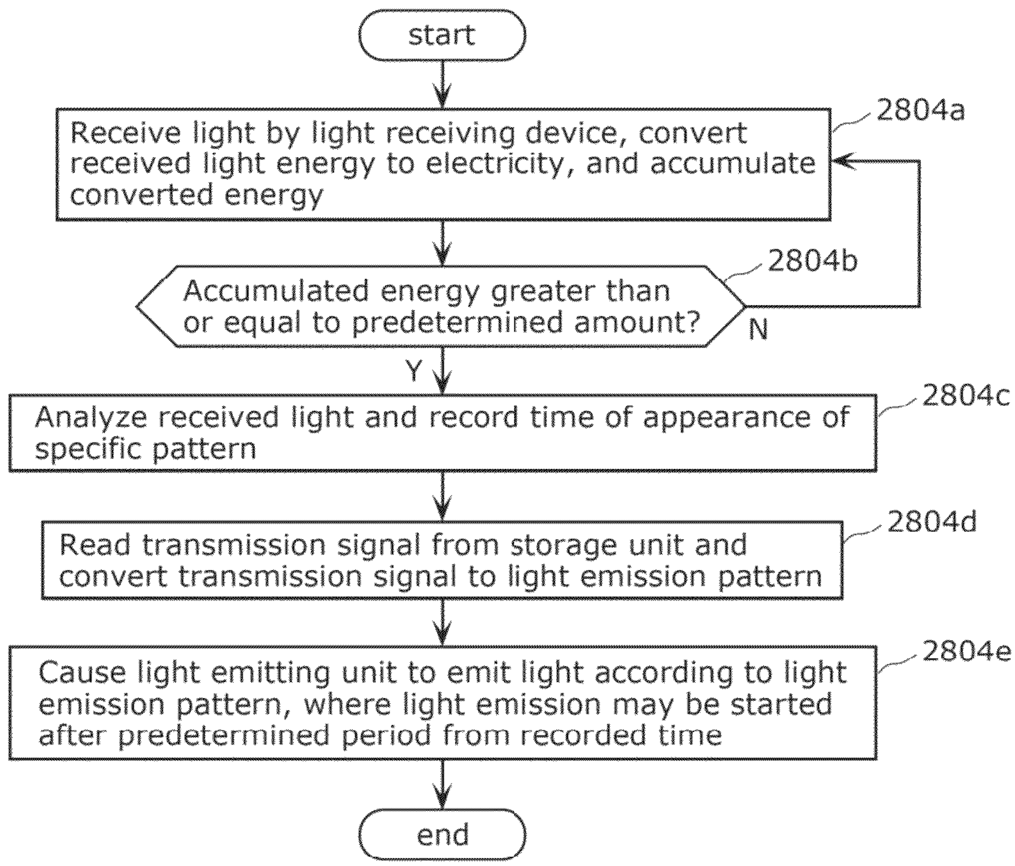
FIG. 55 is a diagram illustrating an example of a transmission control procedure in Embodiment 1.

FIG. 55 is explained below. First, in Step 2804*a*, light is received by the light receiving device, and the received light energy is converted to electricity and accumulated.

Next, in Step 2804*b*, whether or not the accumulated energy is greater than or equal to a predetermined amount is determined.

In the case of No, the procedure returns to Step 2804*a*. In the case of Yes, on the other hand, the procedure proceeds to Step 2804*c* to analyze the received light and record the time of appearance of the specific pattern.

Next, in Step 2804*d*, the transmission signal is read from the storage unit and converted to the light emission pattern.

Next, in Step 2804*e*, the light emitting unit is caused to emit light according to the light emission pattern, and the procedure ends. Here, the light emission may be started after a predetermined time period from the recorded time, with the procedure ending thereafter.

(Information Provision Inside Station)

Figure 56:
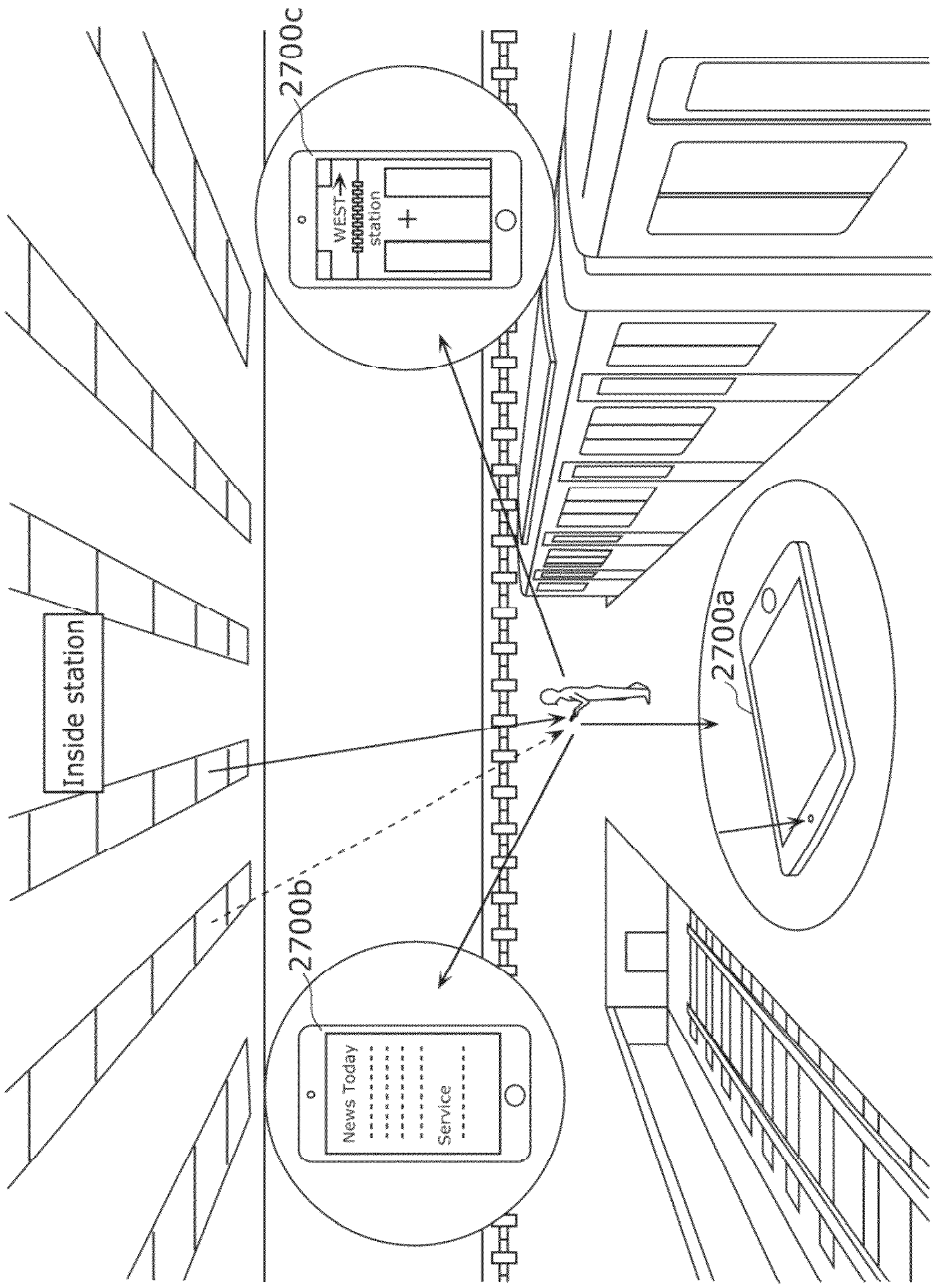
FIG. 56 is a diagram illustrating an example of information provision inside a station in Embodiment 1.

FIG. 56 is a diagram for describing a situation of receiving information provision inside a station.

A reception device 2700*a* captures an image of a lighting disposed in a station facility and reads a light emission pattern or a position pattern, to receive information transmitted from the lighting device.

The reception device 2700*a* obtains information of the lighting or the facility from a server based on the reception information, and further estimates the current position of the reception device 2700*a* from the size or shape of the captured lighting.

For example, the reception device 2700*a* displays information obtained based on a facility ID or position information (2700*b*). The reception device 2700*a* downloads a map of the facility based on the facility ID, and navigates to a boarding place using ticket information purchased by the user (2700*c*).

Though FIG. 56 illustrates the example inside the train station, the same applies to facilities such as an airport, a harbor, a bus stop, and so on.

(Passenger Service)

Figure 57:
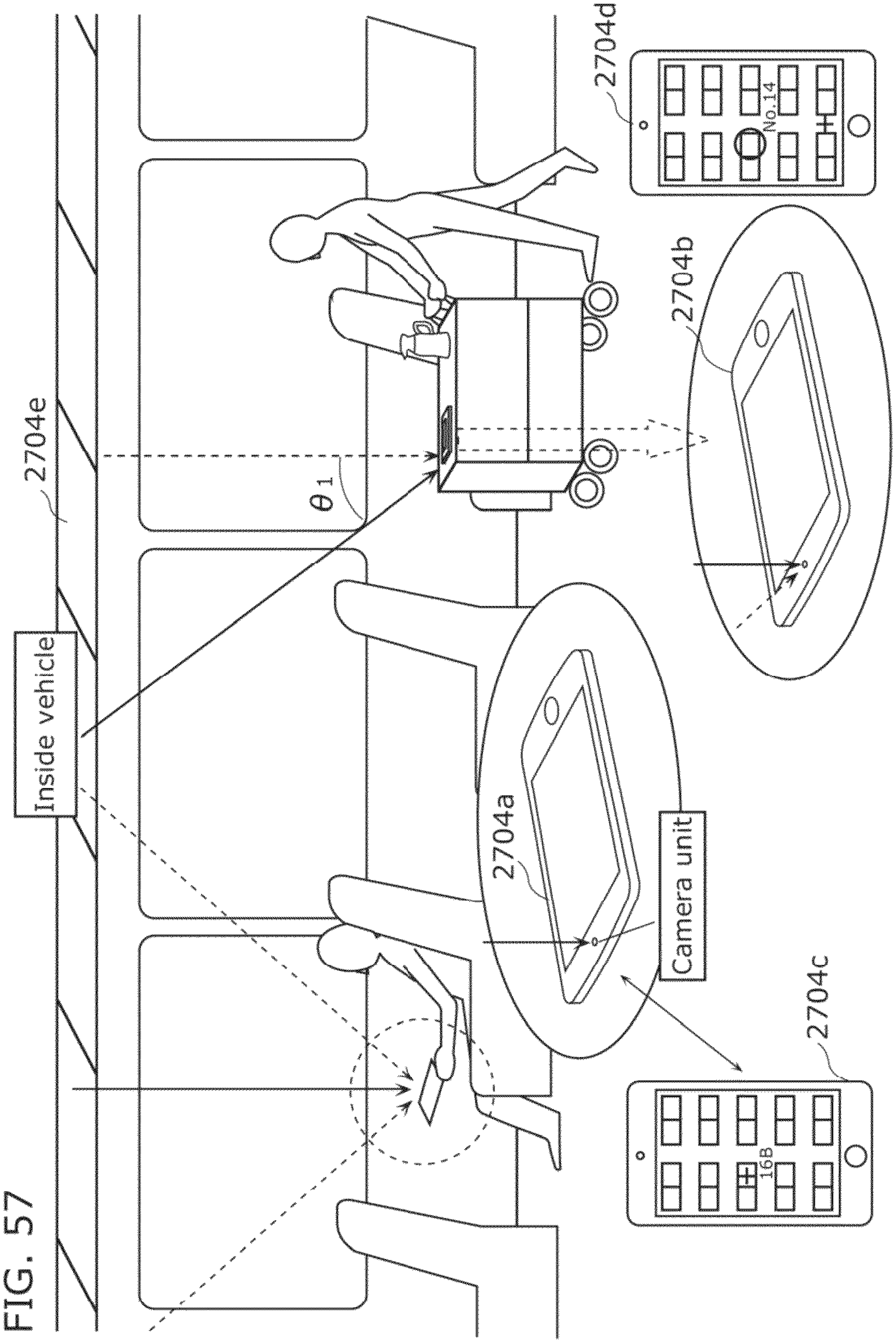
FIG. 57 is a diagram illustrating an example of a passenger service in Embodiment 1.

FIG. 57 is a diagram illustrating a situation of use inside a vehicle.

A reception device 2704*a* carried by a passenger and a reception device 2704*b* carried by a salesperson each receive a signal transmitted from a lighting 2704*e*, and estimates the current position of the reception device itself.

Note that each reception device may obtain necessary information for self-position estimation from the lighting 2704*e*, obtain the information from a server using the information transmitted from the lighting 2704*e* as a key, or obtain the information beforehand based on position information of a train station, a ticket gate, or the like.

The reception device 2704*a* may recognize that the current position is inside the vehicle from ride time information of a ticket purchased by the user (passenger) and the current time, and download information associated with the vehicle.

Each reception device notifies a server of the current position of the reception device. The reception device 2704*a* notifies the server of a user (passenger) ID, a reception device ID, and ticket information purchased by the user (passenger), as a result of which the server recognizes that the person in the seat is a person entitled to riding or reserved seating.

The reception device 2704*a* displays the current position of the salesperson, to enable the user (passenger) to decide the purchase timing for sales aboard the train.

When the passenger orders an item sold aboard the train through the reception device 2704*a*, the reception device 2704*a* notifies the reception device 2704*b* of the salesperson or the server of the position of the reception device 2704*a*, order details, and billing information. The reception device 2704*b* of the salesperson displays a map 2704*d* indicating the position of the customer.

The passenger may also purchase a seat reservation ticket or a transfer ticket through the reception device 2704*a*.

The reception device 2704*a* displays available seat information 2704*c*. The reception device 2704*a* notifies the server of reserved seat ticket or transfer ticket purchase information and billing information, based on travel section information of the ticket purchased by the user (passenger) and the current position of the reception device 2704*a*.

Though FIG. 57 illustrates the example inside the train, the same applies to vehicles such as an airplane, a ship, a bus, and so on.

(In-Store Service)

Figure 58:
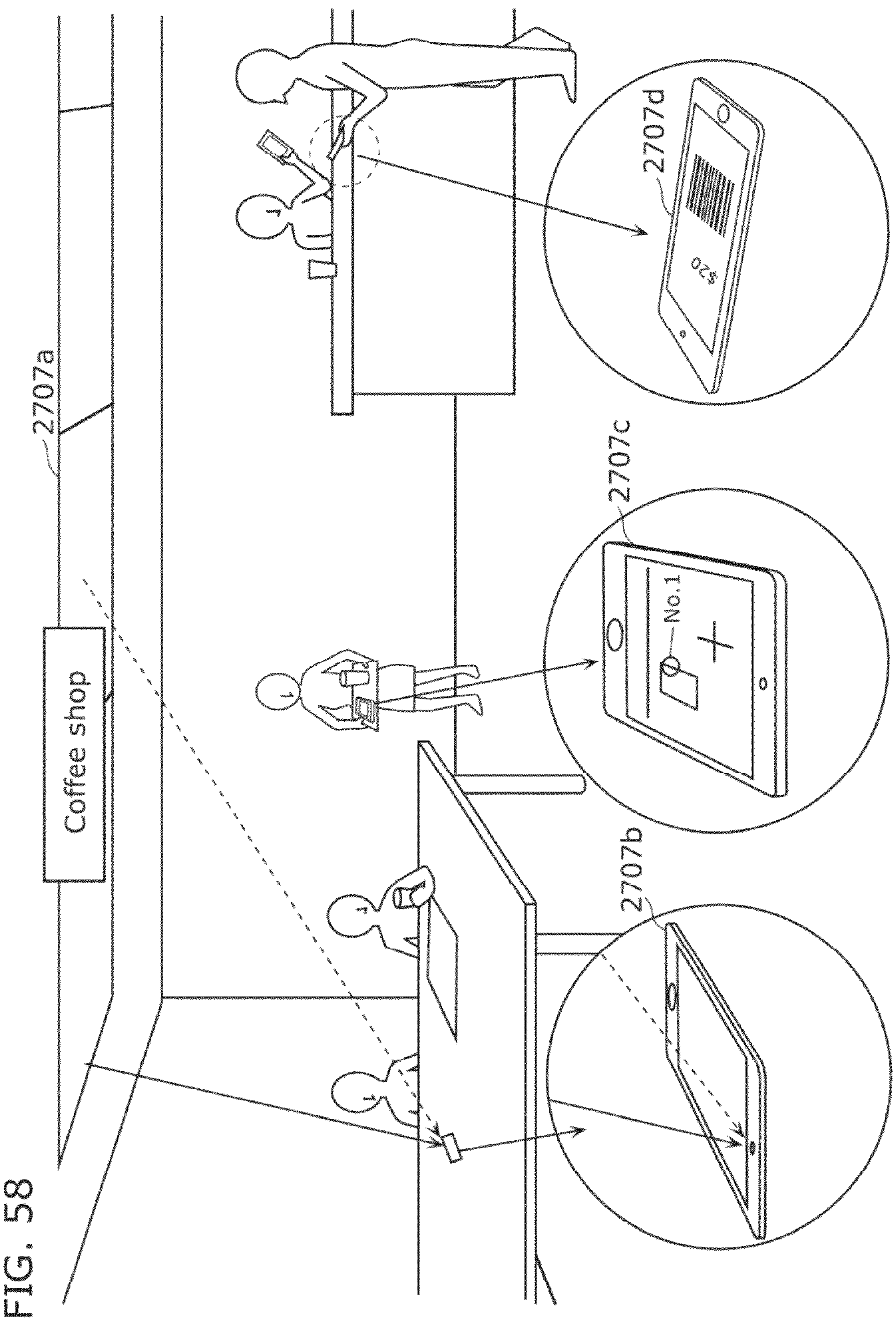
FIG. 58 is a diagram illustrating an example of an in-store service in Embodiment 1.

FIG. 58 is a diagram illustrating a situation of use inside a store or a shop.

Reception devices 2707*b*, 2707*c*, and 2707*d* each receive a signal transmitted from a lighting 2707*a*, estimate the current position of the reception device itself, and notify a server of the current position.

Note that each reception device may obtain necessary information for self-position estimation and a server address from the lighting 2707*a*, obtain the necessary information and the server address from another server using information transmitted from the lighting 2707*a* as a key, or obtain the necessary information and the server address from an accounting system.

The accounting system associates accounting information with the reception device 2707*d*, displays the current position of the reception device 2707*d* (2707*c*), and delivers the ordered item.

The reception device 2707*b* displays item information based on the information transmitted from the lighting 2707*a*. When the customer orders from the displayed item information, the reception device 2707*b* notifies the server of item information, billing information, and the current position.

Thus, the seller can deliver the ordered item based on the position information of the reception device 2707*b*, and the purchaser can purchase the item while remaining seated.

(Wireless Connection Establishment)

Figure 59:
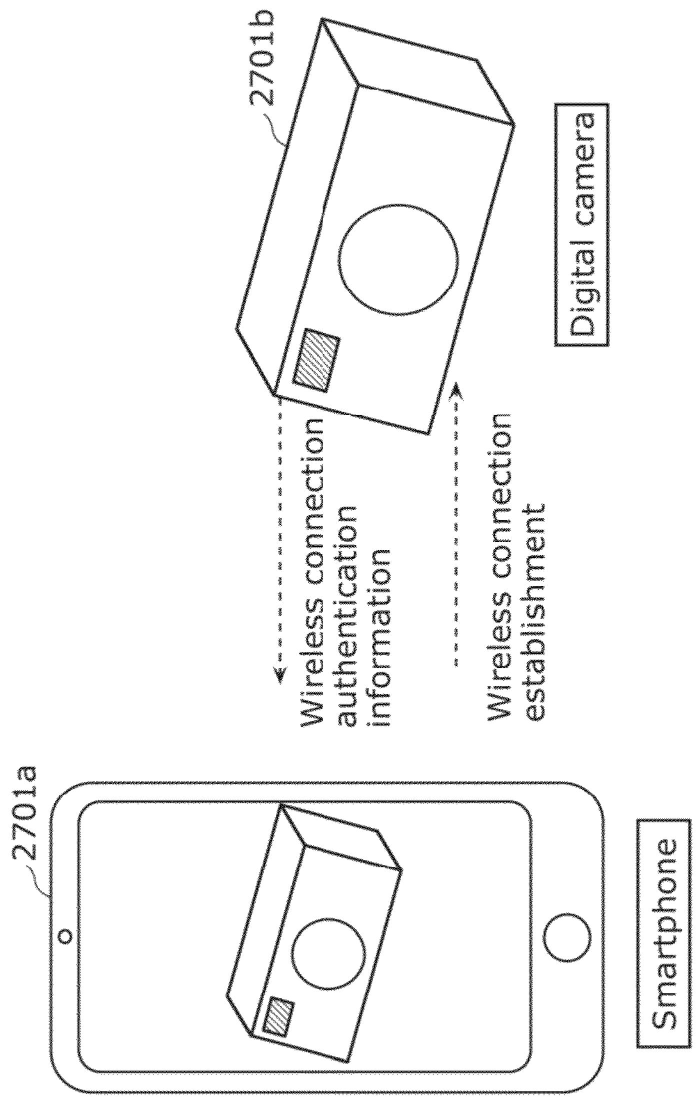
FIG. 59 is a diagram illustrating an example of wireless connection establishment in Embodiment 1.

FIG. 59 is a diagram illustrating a situation of communicating wireless connection authentication information to establish wireless connection.

An electronic device (digital camera) 2701*b* operates as a wireless connection access point and, as information necessary for the connection, transmits an ID or a password as a light emission pattern.

An electronic device (smartphone) 2701*a* obtains the transmission information from the light emission pattern, and establishes the wireless connection.

Though the wireless connection is mentioned here, the connection to be established may be a wired connection network.

The communication between the two electronic devices may be performed via a third electronic device.

(Communication Range Adjustment)

Figure 60:
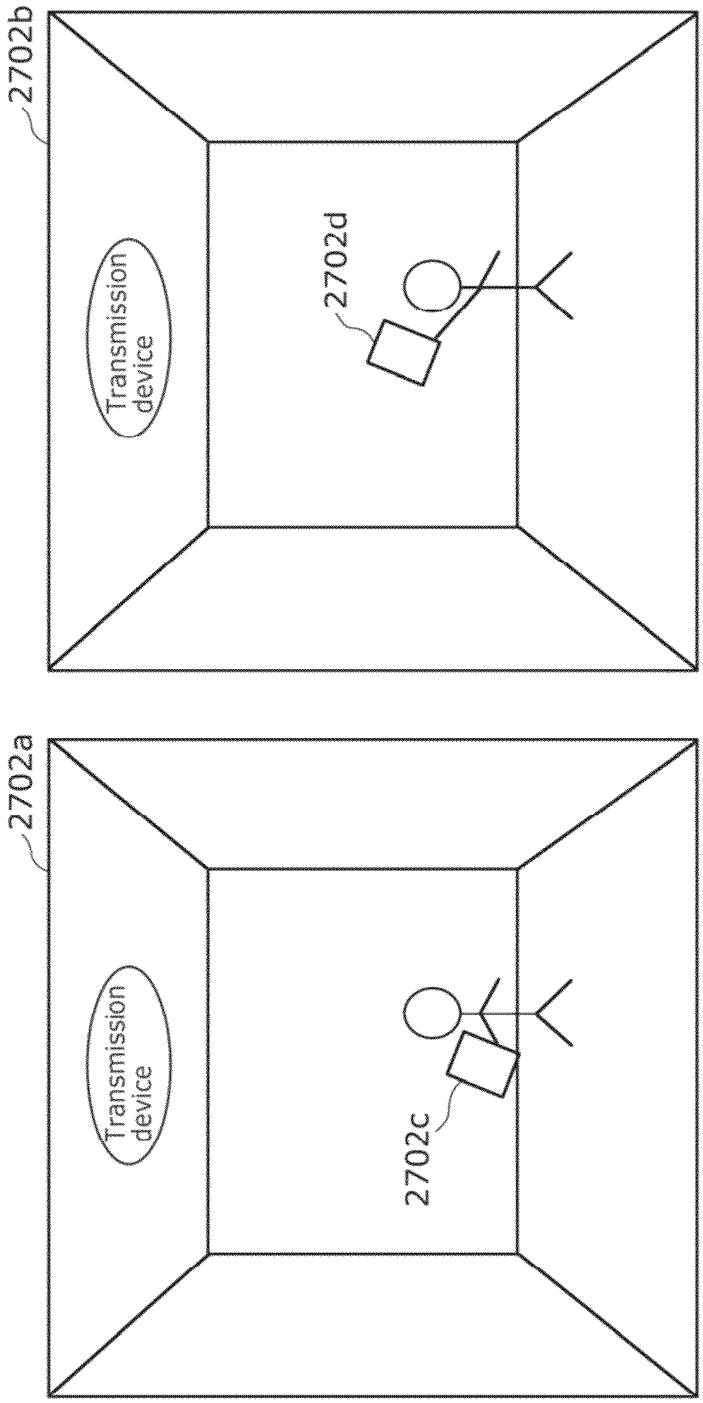
FIG. 60 is a diagram illustrating an example of communication range adjustment in Embodiment 1.

FIG. 60 is a diagram illustrating a range of communication using a light emission pattern or a position pattern.

In a communication scheme using a radio wave, it is difficult to limit the communication range because the radio wave also reaches an adjacent room separated by a wall.

In communication using a light emission pattern or a position pattern, on the other hand, the communication range can be easily limited using an obstacle because visible light and its surrounding area wavelengths are used. Moreover, the use of visible light has an advantage that the communication range is recognizable even by the human eye.

(Indoor Use)

Figure 61:
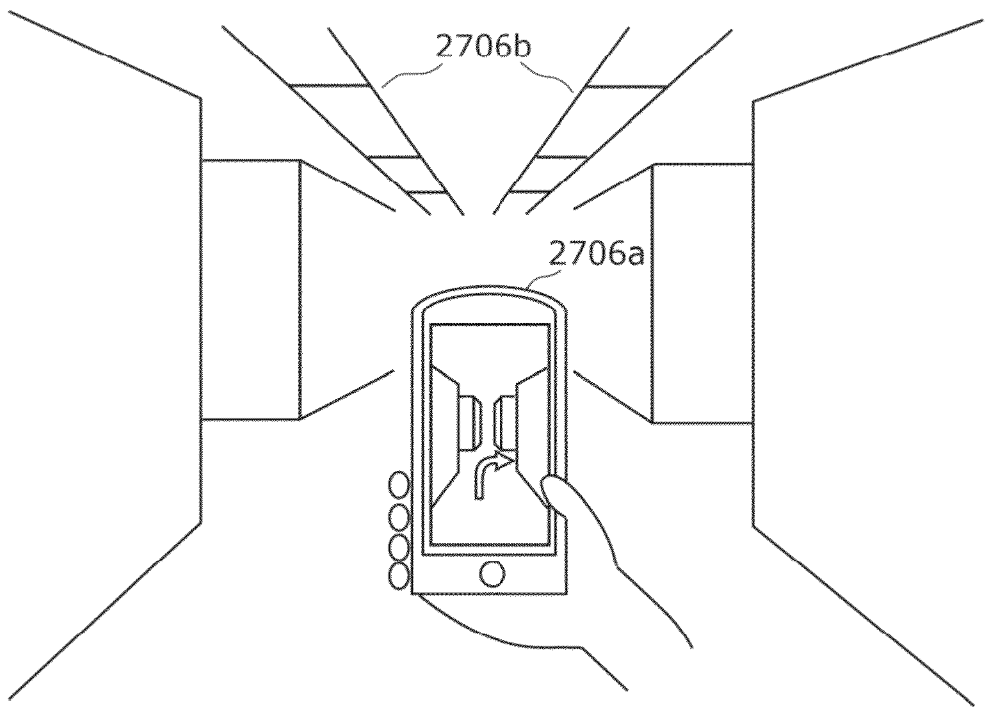
FIG. 61 is a diagram illustrating an example of indoor use in Embodiment 1.

FIG. 61 is a diagram illustrating a situation of indoor use such as an underground city.

A reception device 2706*a* receives a signal transmitted from a lighting 2706*b*, and estimates the current position of the reception device 2706*a*. The reception device 2706*a* also displays the current position on a map to provide directions, or displays nearby shop information.

By transmitting disaster information or evacuation information from the lighting 2706*b* in the event of an emergency, such information can be obtained even in the case of communication congestion, in the case of a failure of a communication base station, or in the case of being situated in a place where it is difficult for a radio wave from a communication base station to penetrate. This is beneficial to people who missed hearing emergency broadcasting or hearing-impaired people who cannot hear emergency broadcasting.

(Outdoor Use)

Figure 62:
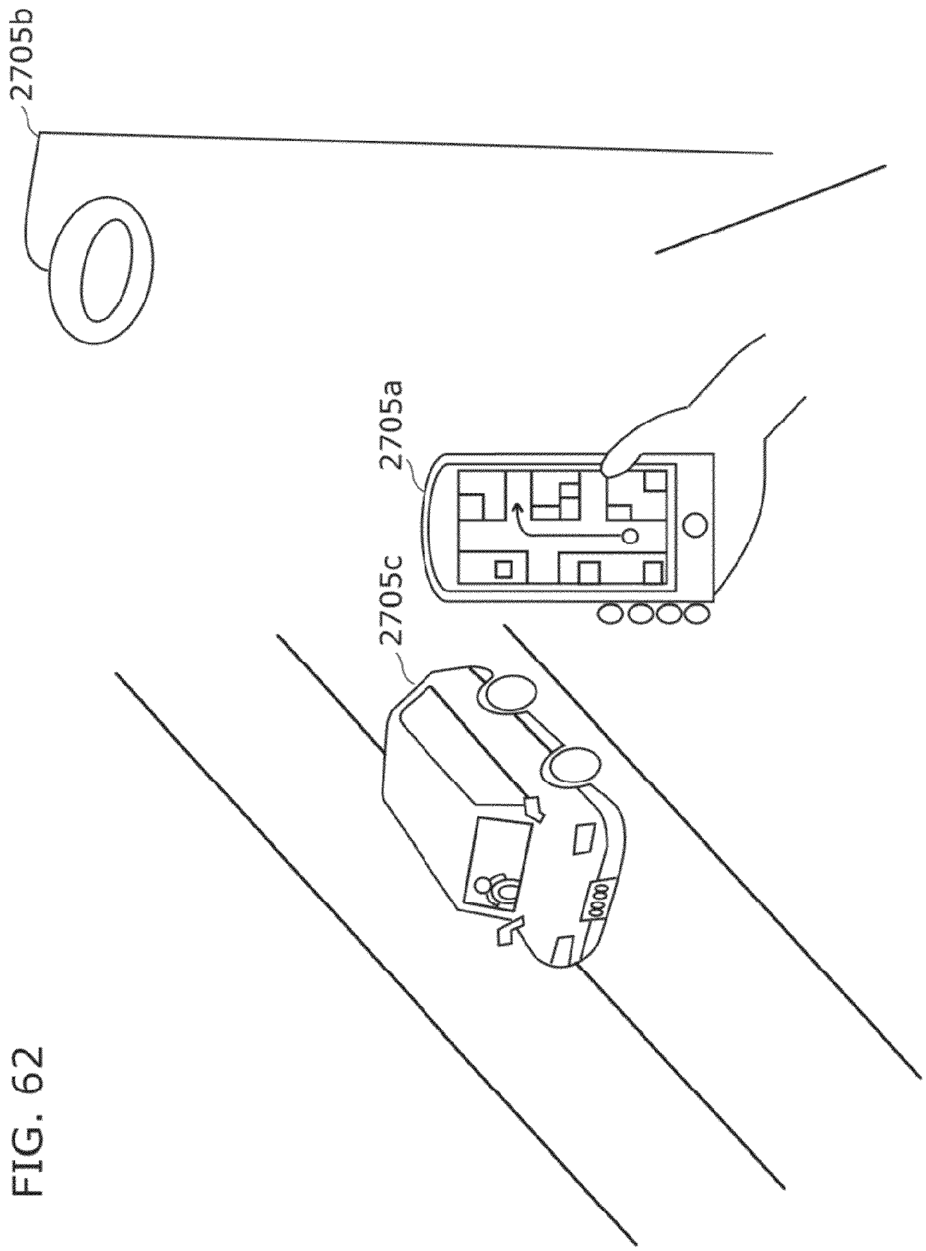
FIG. 62 is a diagram illustrating an example of outdoor use in Embodiment 1.

FIG. 62 is a diagram illustrating a situation of outdoor use such as a street.

A reception device 2705*a* receives a signal transmitted from a street lighting 2705*b*, and estimates the current position of the reception device 2705*a*. The reception device 2705*a* also displays the current position on a map to provide directions, or displays nearby shop information.

By transmitting disaster information or evacuation information from the lighting 2705*b* in the event of an emergency, such information can be obtained even in the case of communication congestion, in the case of a failure of a communication base station, or in the case of being situated in a place where it is difficult for a radio wave from a communication base station to penetrate.

Moreover, displaying the movements of other vehicles and pedestrians on the map and notifying the user of any approaching vehicles or pedestrians contributes to accident prevention.

(Route Indication)

Figure 63:
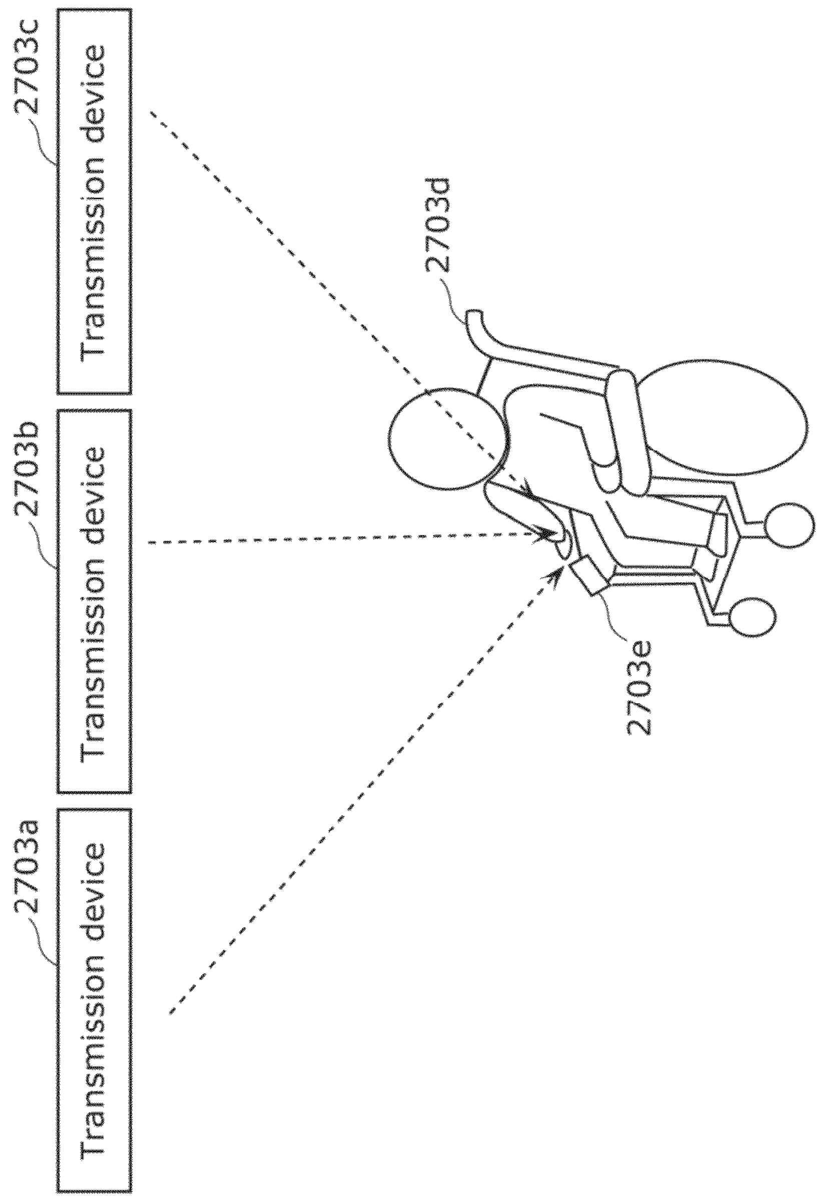
FIG. 63 is a diagram illustrating an example of route indication in Embodiment 1.

FIG. 63 is a diagram illustrating a situation of route indication.

A reception device 2703*e* can download a neighborhood map of estimate the position of the reception device 2703*a* with an accuracy error of 1 cm to tens of cm, through the use of information transmitted from transmission devices 2703*a*, 2703*b*, and 2703*c*.

When the accurate position of the reception device 2703*e* is known, it is possible to automatically drive a wheelchair 2703*d* or ensure safe passage of visually impaired people.

(Use of a Plurality of Imaging Devices)

Figure 64:
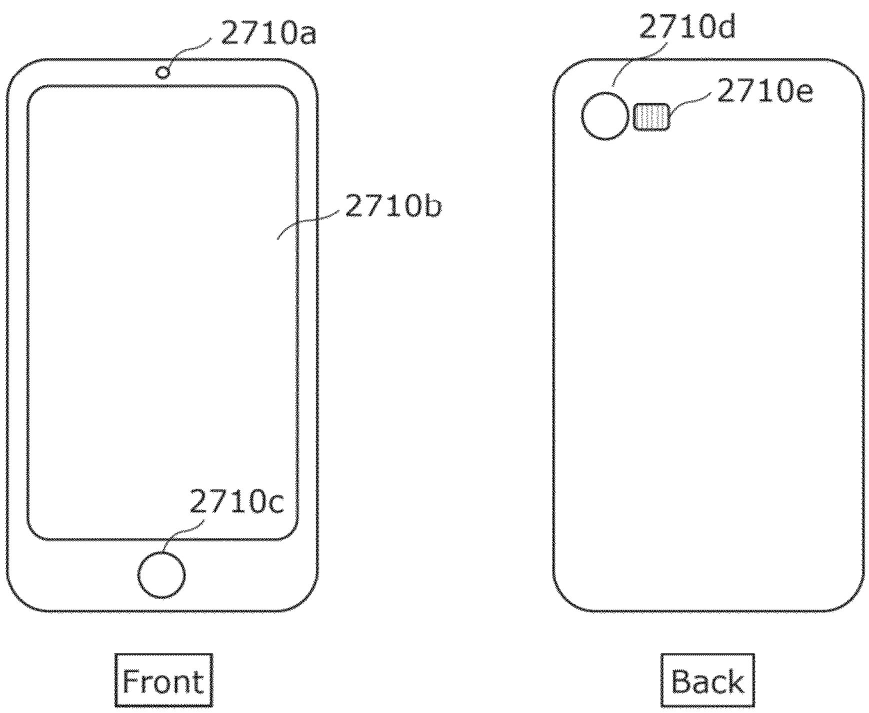
FIG. 64 is a diagram illustrating an example of use of a plurality of imaging devices in Embodiment 1.

A reception device in FIG. 64 includes an in camera 2710*a*, a touch panel 2710*b*, a button 2710*c*, an out camera 2710*d*, and a flash 2710*e*.

When capturing the transmission device by the out camera, image stabilization can be performed by estimating the movement or orientation of the reception device from an image captured by the in camera.

By receiving a signal from another transmission device using the in camera, it is possible to simultaneously receive the signals from the plurality of devices or enhance the self-position estimation accuracy of the reception device.

(Transmission Device Autonomous Control)

Figure 65:
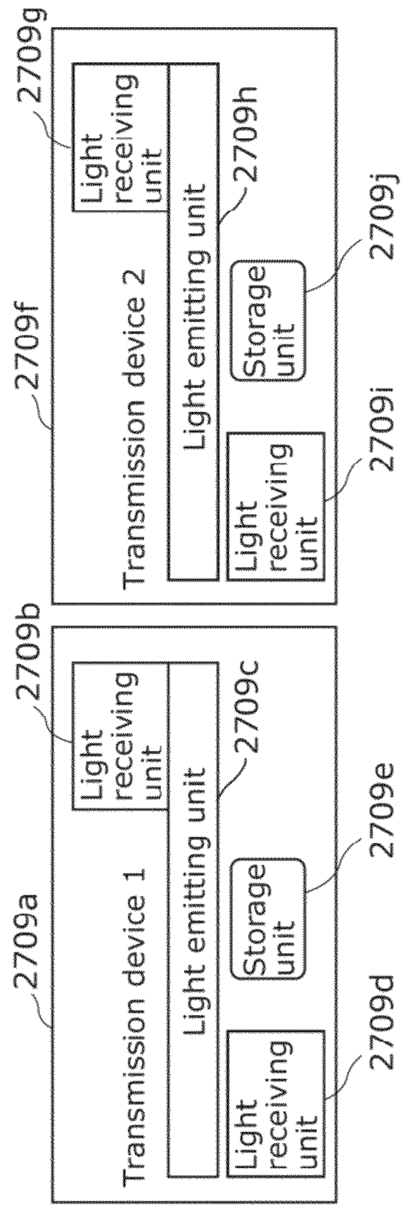
FIG. 65 is a diagram illustrating an example of transmission device autonomous control in Embodiment 1.

In FIG. 65, a transmission device 1 receives light of a light emitting unit of a transmission device 2 by a light receiving unit, to obtain a signal transmitted from the transmission device 2 and its transmission timing.

In the case where no transmission signal is stored in a storage unit of the transmission device 1, the transmission device 1 transmits a signal by emitting light in the same pattern synchronously with the light emission of the transmission device 2.

In the case where a transmission signal is stored in the storage unit of the transmission device 1, on the other hand, the transmission device 1 transmits a part common with the transmission signal of the transmission device 2 by emitting light in the same pattern synchronously with the light emission of the transmission device 2. The transmission device 1 also transmits a part not common with the transmission signal of the transmission device 2, during a time in which the transmission device 2 transmits no signal. In the case where there is no time in which the transmission device 2 transmits no signal, the transmission device 1 specifies a period appropriately and transmits the uncommon part according to the period. In this case, the transmission device 2 receives the light emitted from the transmission device 1 by a light receiving unit, detects that a different signal is transmitted at the same time, and transmits an uncommon part of signal during a time in which the transmission device 1 transmits no signal.

CSMA/CD (Carrier Sense Multiple Access with Collision Detection) is used for avoiding collisions in signal transmission using light emission.

The transmission device 1 causes the light emitting unit to emit light using its own information as a light emission pattern.

The transmission device 2 obtains the information of the transmission device 1 by the light receiving unit.

The transmission device generates a transmission device arrangement map by exchanging, between communicable transmission devices, their information. The transmission device also calculates an optimal light emission pattern as a whole so as to avoid collisions in signal transmission using light emission. Further, the transmission device obtains information obtained by the other transmission device(s), through communication between the transmission devices.

(Transmission Information Setting)

Figure 66:
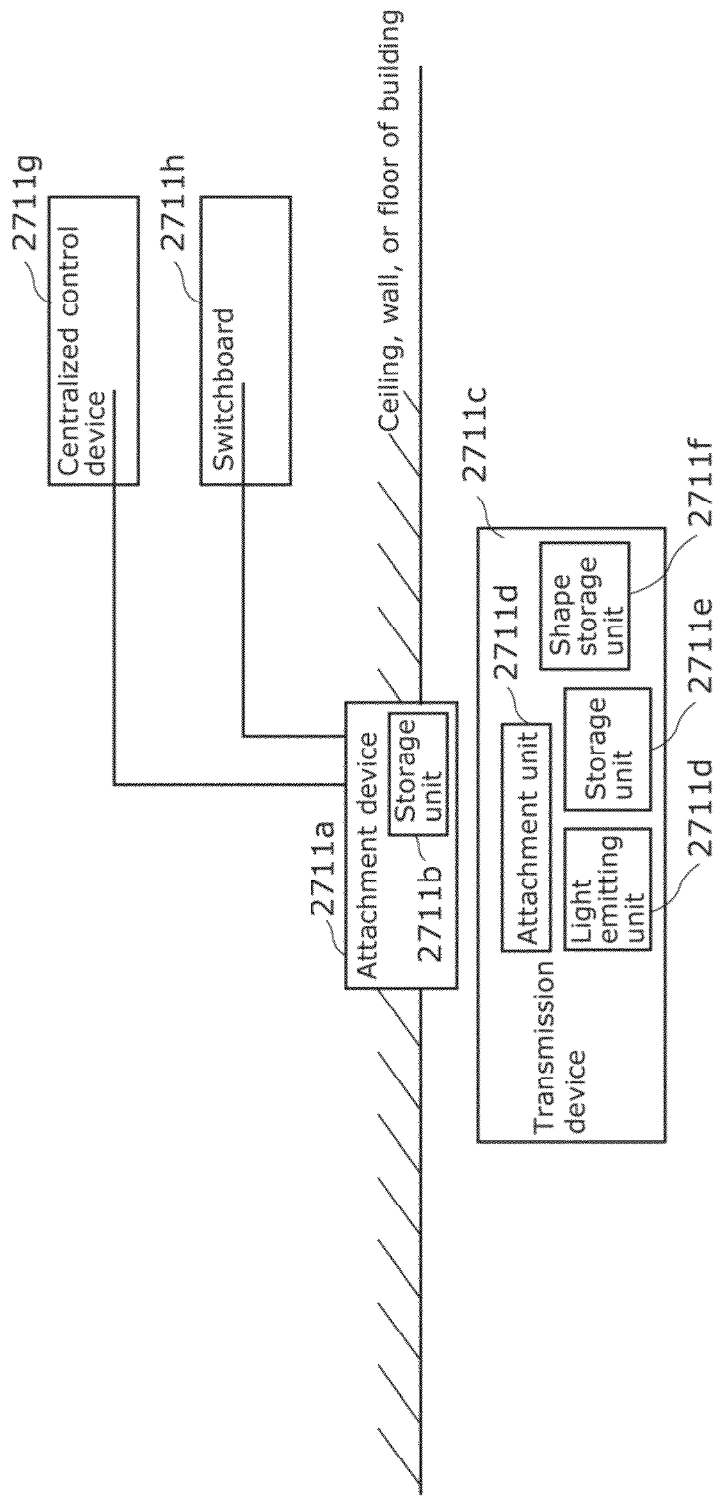
FIG. 66 is a diagram illustrating an example of transmission information setting in Embodiment 1.

In FIG. 66, a transmission device stores information stored in a storage unit of an attachment device into a storage unit of the transmission device, when the transmission device is attached to the attachment device or the information stored in the storage unit of the attachment device is changed. The information stored in the storage unit of the attachment device or the transmission device includes a transmission signal and its transmission timing.

In the case where the information stored in the storage unit is changed, the transmission device stores the information into the storage unit of the attachment device. The information in the storage unit of the attachment device or the storage unit of the transmission device is edited from a centralized control device or a switchboard. Power line communication is used when operating from the switchboard.

A shape storage unit in the transmission device stores a position relation between a center position of a light emitting unit and an attachment unit of the transmission device.

When transmitting position information, the transmission device transmits position information obtained by adding the position relation to position information stored in the storage unit.

Information is stored into the storage unit of the attachment device upon building construction or the like. In the case of storing position information, the accurate position is stored through the use of a design or CAD data of the building. Transmitting the position information from the transmission device upon building construction enables position identification, which may be utilized for construction automation, material use position identification, and the like.

The attachment device notifies the centralized control device of the information of the transmission device. The attachment device notifies the centralized control device that a device other than the transmission device is attached.

Figure 67:
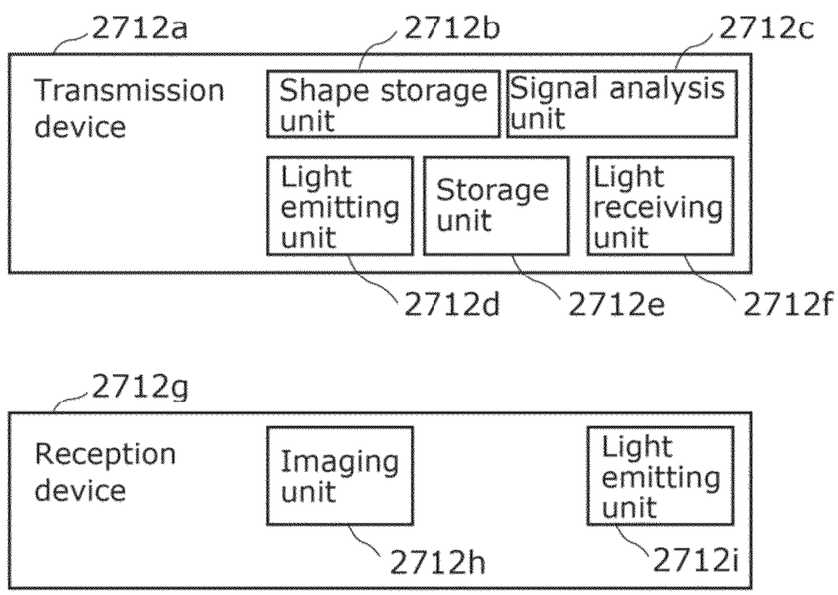
FIG. 67 is a diagram illustrating an example of transmission information setting in Embodiment 1.

In FIG. 67, a transmission device receives light by a light receiving unit, obtains information from the light pattern by a signal analysis unit, and stores the information into a storage unit. Upon light reception, the transmission device converts information stored in the storage unit to a light emission pattern and causes a light emitting unit to emit light.

Information about the shape of the transmission device is stored in a shape storage unit.

Figure 68:
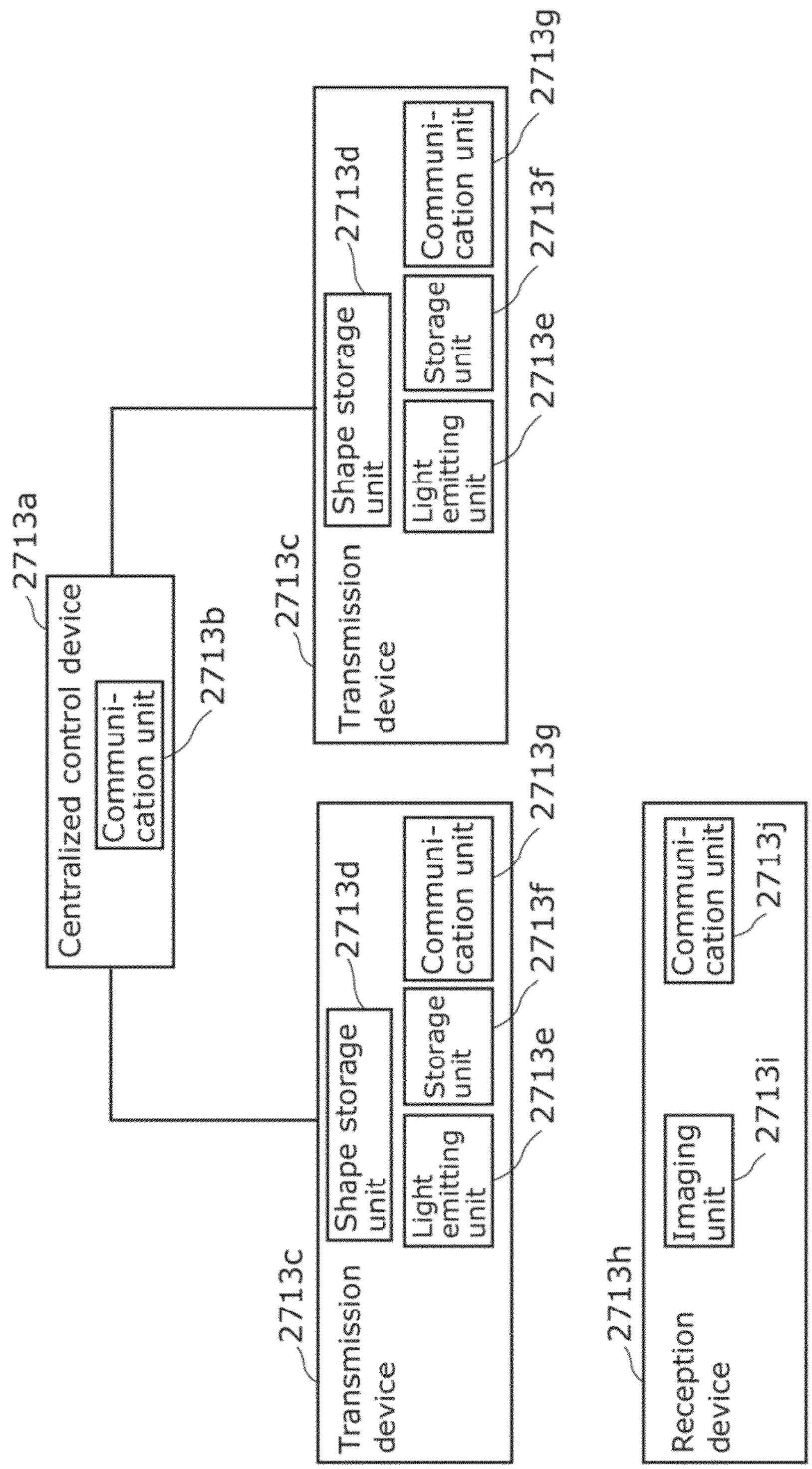
FIG. 68 is a diagram illustrating an example of transmission information setting in Embodiment 1.

In FIG. 68, a transmission device stores a signal received by a communication unit, into a storage unit. Upon reception, the transmission device converts information stored in the storage unit to a light emission pattern and causes a light emitting unit to emit light.

Information about the shape of the transmission device is stored in a shape storage unit.

In the case where no transmission signal is stored in the storage unit, the transmission device converts an appropriate signal to a light emission pattern and causes the light emitting unit to emit light.

A reception device obtains the signal transmitted from the transmission device by an imaging unit, and notifies a transmission device or a centralized control device of the signal and information to be stored in the transmission device, via a communication unit.

The transmission device or the centralized control device stores the transmitted information into the storage unit of the transmission device transmitting the same signal as the signal obtained by the imaging unit of the reception device.

Here, the reception device may transmit the signal transmitted from the transmission device according to the time of image capture so that the transmission device or the centralized control device specifies the transmission device captured by the reception device using the time.

Note that the information may be transmitted from the reception device to the transmission device using a light emission pattern, where the communication unit of the reception device is a light emitting unit and the communication unit of the transmission device is a light receiving unit or an imaging unit.

Alternatively, the information may be transmitted from the reception device to the transmission device using a sound pattern, where the communication unit of the reception device is a sound emitting unit and the communication unit of the transmission device is a sound receiving unit.

(Combination with 2D Barcode)

Figure 69:
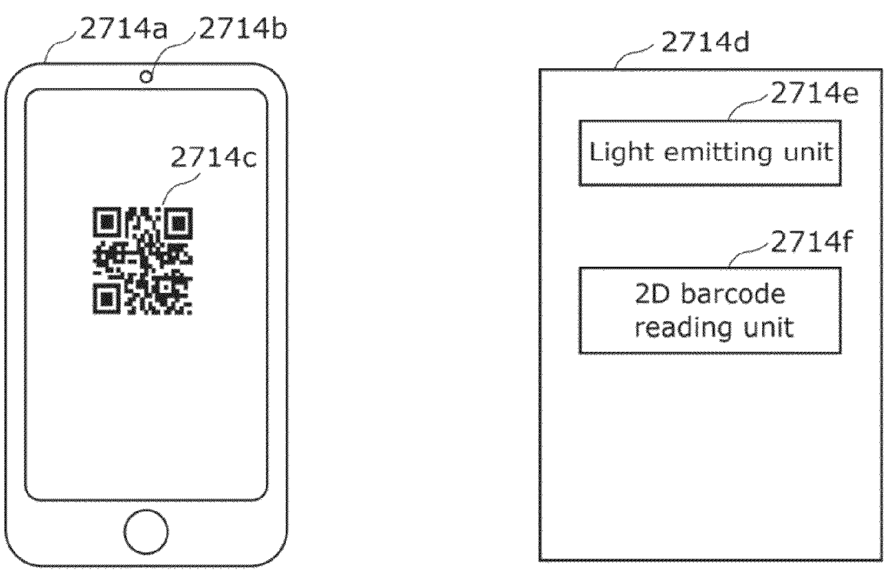
FIG. 69 is a diagram illustrating an example of combination with 2D barcode in Embodiment 1.

FIG. 69 is a diagram illustrating a situation of use in combination with 2D (two-dimensional) barcode.

The user sets a communication device 2714*a* and a communication device 2714*d* opposed to each other.

The communication device 2714*a* displays transmission information on a display as 2D barcode 2714*c*.

The communication device 2714*d* reads the 2D barcode 2714*c* by a 2D barcode reading unit 2714*f*. The communication device 2714*d* expresses transmission information as a light emission pattern of a light emitting unit 2714*e*.

The communication device 2714*a* captures the light emitting unit by an imaging unit 2714*b*, and reads the signal. According to this method, two-way direct communication is possible. In the case where the amount of data to be transmitted is small, faster communication can be performed than communication via a server.

(Map Generation and Use)

Figure 70:
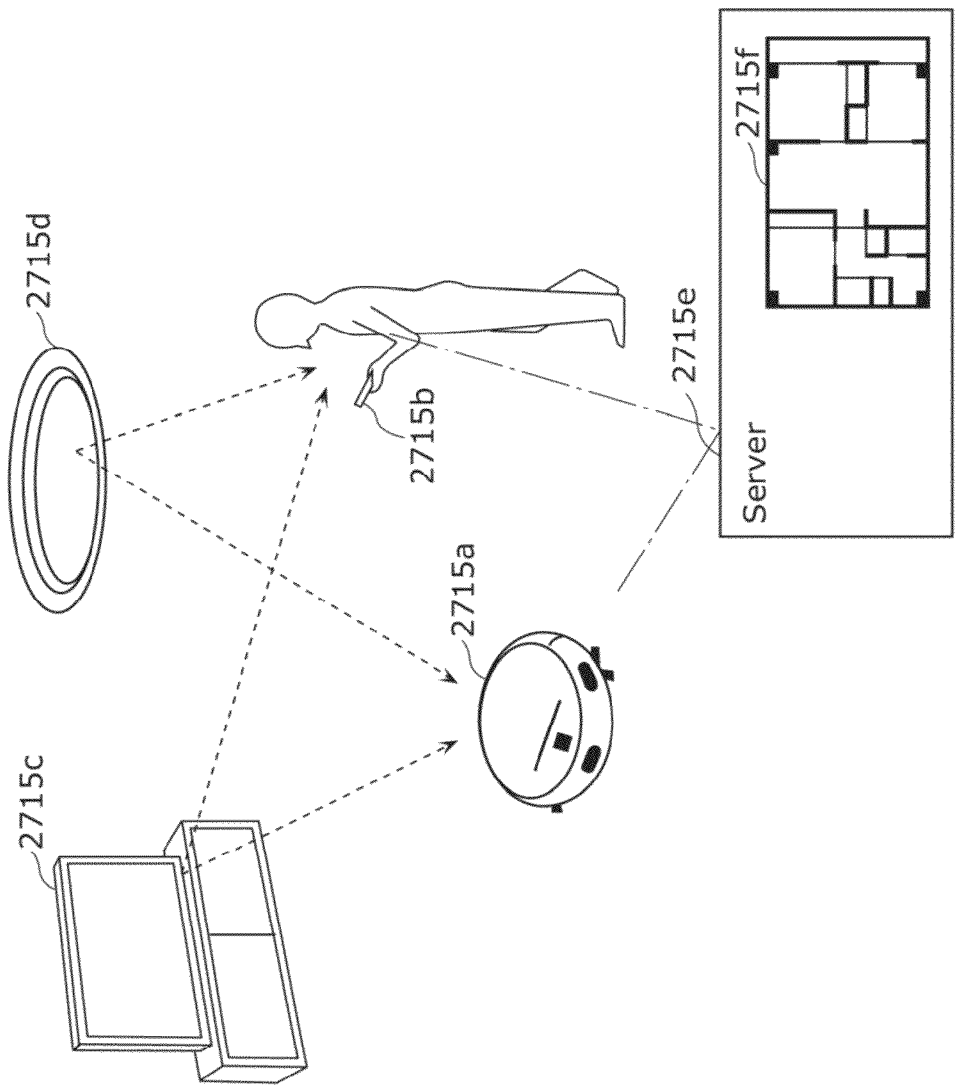
FIG. 70 is a diagram illustrating an example of map generation and use in Embodiment 1.

FIG. 70 is a diagram illustrating a situation of map generation and use.

A robot 2715*a* creates a room map 2715*f* by performing self-position estimation based on signals transmitted from a lighting 2715*d* and an electronic device 2715*c*, and stores the map information, the position information, and the IDs of the lighting 2715*d* and the electronic device 2715*c* into a server 2715*e*.

Likewise, a reception device 2715*b* creates the room map 2715*f* from the signals transmitted from the lighting 2715*d* and the electronic device 2715*c*, an image captured during movement, and sensor values of the gyroscope and the 9-axis sensor, and stores the map information, the position information, and the IDs of the lighting 2715*d* and the electronic device 2715*c* into the server 2715*e*.

The robot 2715*a* performs cleaning or serving efficiently, based on the map 2715*f* obtained from the server 2715*e*.

The reception device 2715*b* indicates the cleaning area or the moving destination to the robot 2715*a* or operates an electronic device in the pointing direction of the reception device, based on the map 2715*f* obtained from the server 2715*e*.

(Electronic Device State Obtainment and Operation)

Figure 71:
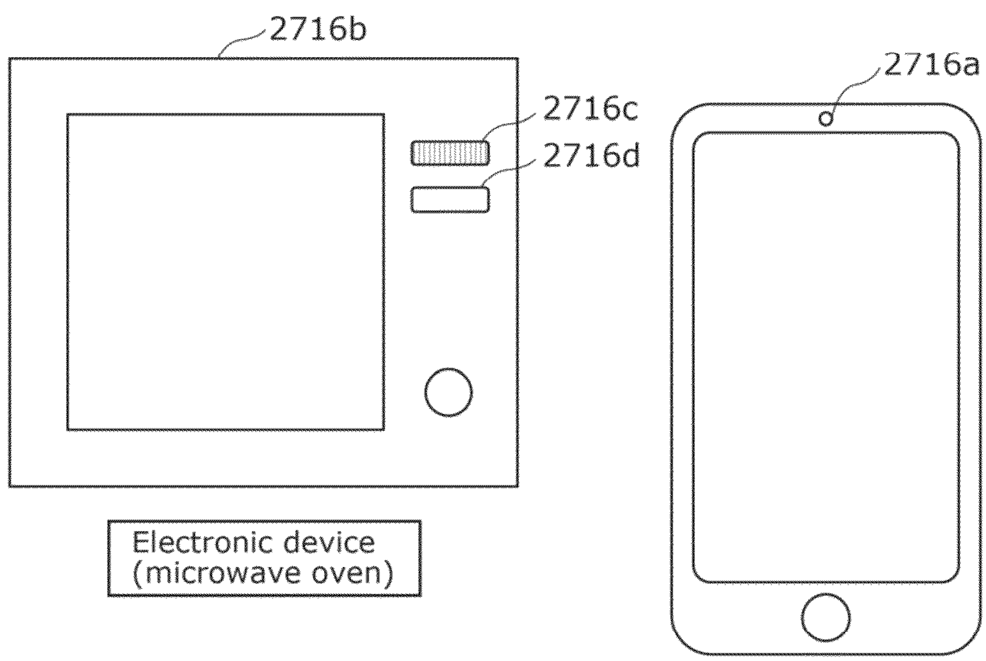
FIG. 71 is a diagram illustrating an example of electronic device state obtainment and operation in Embodiment 1.

FIG. 71 is a diagram illustrating a situation of electronic device state obtainment and operation.

A communication device 2716*a* converts control information to a light emission pattern, and causes a light emitting unit to emit light to a light receiving unit 2716*d* of an electronic device 2716*b*.

The electronic device 2716*b* reads the control information from the light emission pattern, and operates according to the control information. Upon light reception by the light receiving unit 2716*d*, the electronic device 2716*b* converts information indicating the state of the electronic device to a light emission pattern, and causes a light emitting unit 2716*c* to emit light. Moreover, in the case where there is information to be notified to the user such as when the operation ends or when an error occurs, the electronic device 2716*b* converts the information to a light emission pattern and causes the light emitting unit 2716*c* to emit light.

The communication device 2716*a* captures the image of the light emitting unit 2716*c*, and obtains the transmitted signal.

(Electronic Device Recognition)

Figure 72:
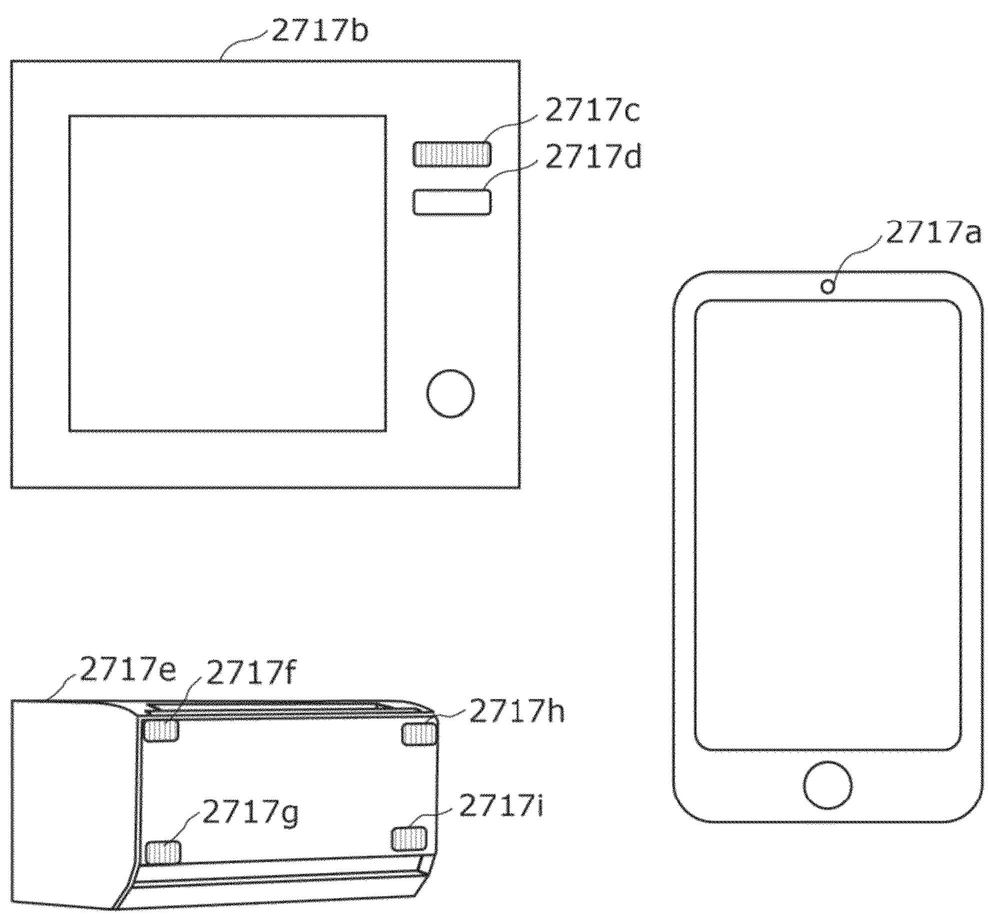
FIG. 72 is a diagram illustrating an example of electronic device recognition in Embodiment 1.

FIG. 72 is a diagram illustrating a situation of recognizing a captured electronic device.

A communication device 2717*a* has communication paths to an electronic device 2717*b* and an electronic device 2717*e*, and transmits an ID display instruction to each electronic device.

The electronic device 2717*b* receives the ID display instruction, and transmits an ID signal using a light emission pattern of a light emitting unit 2717*c*.

The electronic device 2717*e* receives the ID display instruction, and transmits an ID signal using a position pattern with light emitting units 2717*f*, 2717*g*, 2717*h*, and 2717*i*.

Here, the ID signal transmitted from each electronic device may be an ID held in the electronic device or the details of indication by the communication device 2717*a*.

The communication device 2717*a* recognizes the captured electronic device and the position relation between the electronic device and the reception device, from the light emission pattern or the position pattern of the light emitting unit(s) in the captured image.

Note that the electronic device desirably includes three or more light emitting units to enable the recognition of the position relation between the electronic device and the reception device.

(Augmented Reality Object Display)

Figure 73:
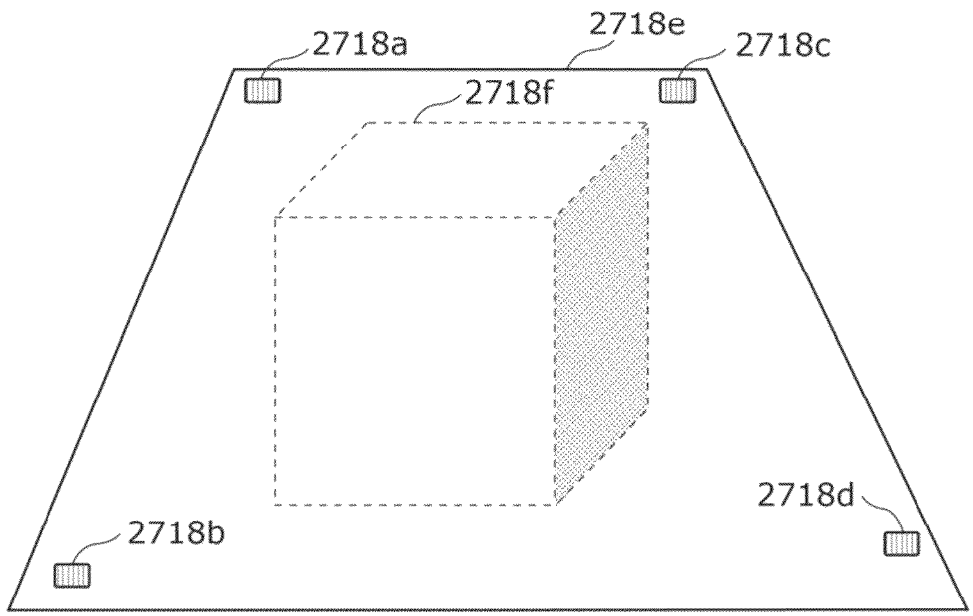
FIG. 73 is a diagram illustrating an example of augmented reality object display in Embodiment 1.

FIG. 73 is a diagram illustrating a situation of displaying an augmented reality (AR) object.

A stage 2718*e* for augmented reality display is a light emission pattern or a position pattern of light emitting units 2718*a*, 2718*b*, 2718*c*, and 2718*d*, to transmit information of the augmented reality object and a reference position for displaying the augmented reality object.

A reception device superimposes an augmented reality object 2718*f* on a captured image and displays it, based on the received information.

(User Interface)

Figure 74:
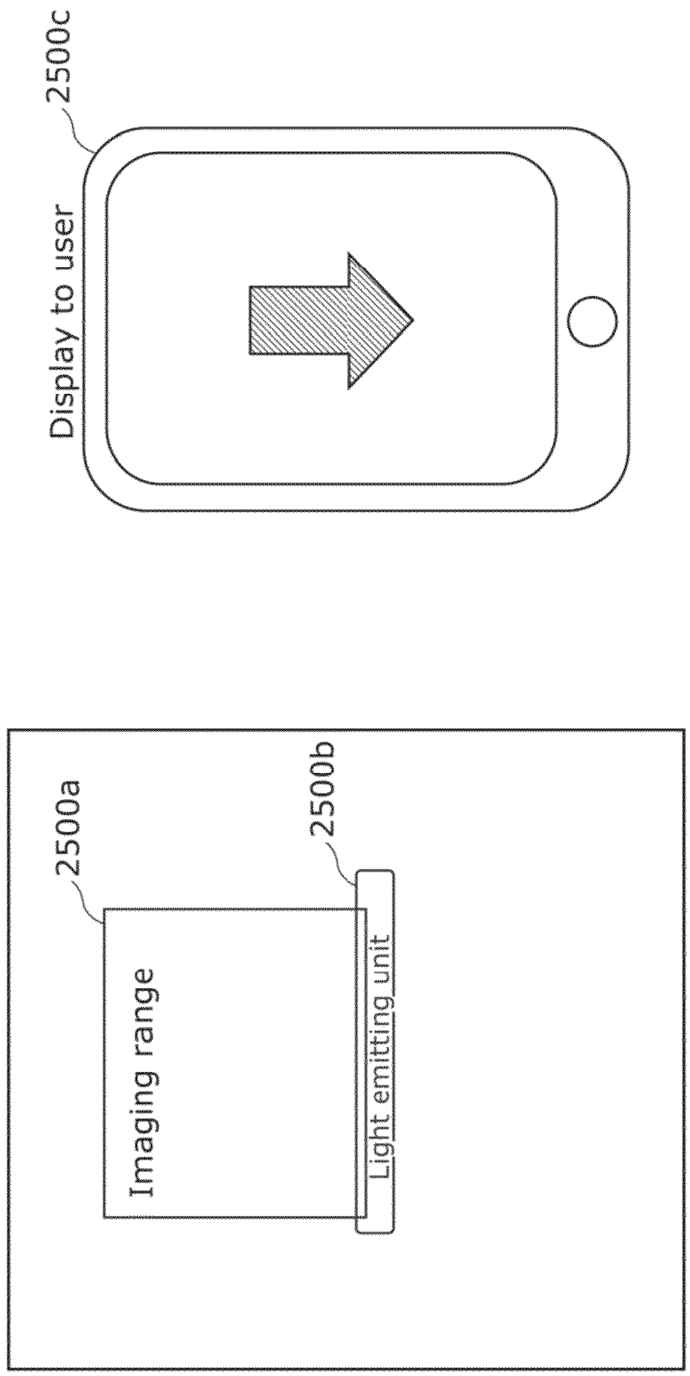
FIG. 74 is a diagram illustrating an example of a user interface in Embodiment 1.

In the case where the light emitting unit is not within the center area of the imaging range, such display that prompts the user to point the center of the imaging range to the light emitting unit is made in order to point the center of the imaging range to the light emitting unit, as illustrated in FIG. 74.

Figure 75:
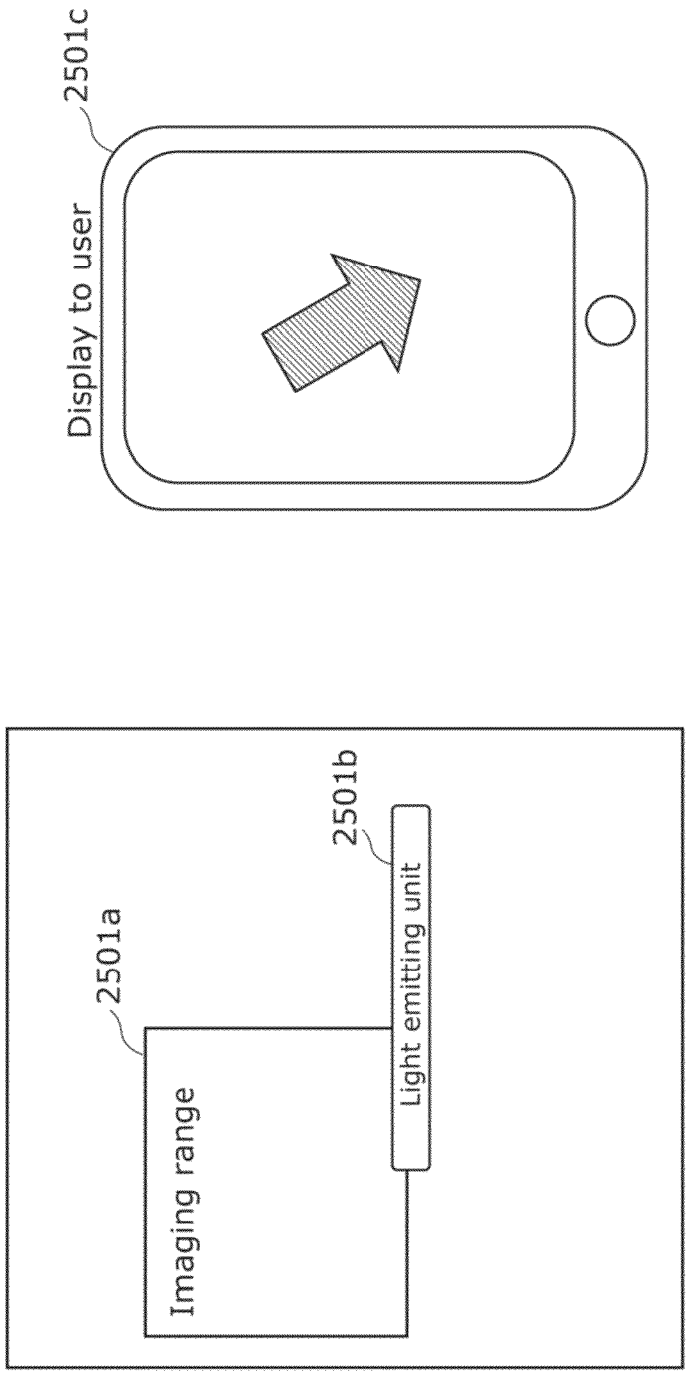
FIG. 75 is a diagram illustrating an example of a user interface in Embodiment 1.

In the case where the light emitting unit is not within the center area of the imaging range, such display that prompts the user to point the center of the imaging range to the light emitting unit is made in order to point the center of the imaging range to the light emitting unit, as illustrated in FIG. 75.

Figure 76:
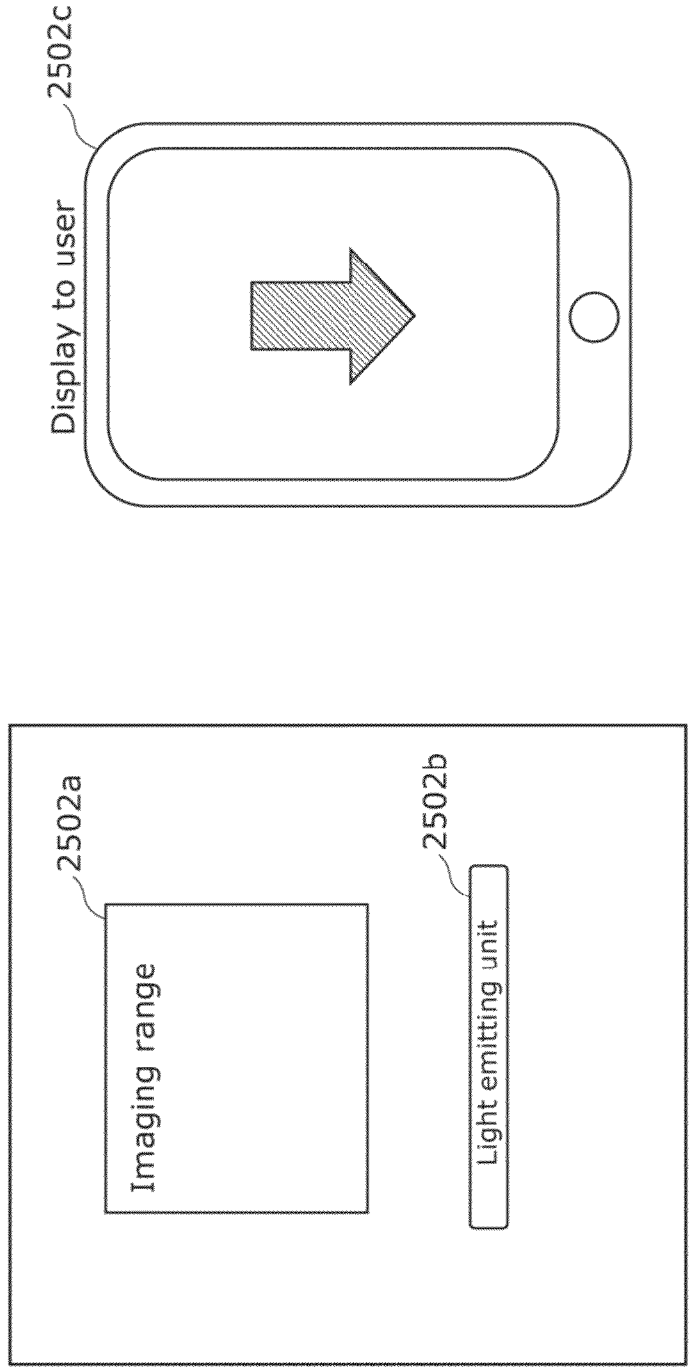
FIG. 76 is a diagram illustrating an example of a user interface in Embodiment 1.

Even when the light emitting unit is not recognized within the imaging range, if the position of the light emitting unit can be estimated from the previous imaging result or the information of the 9-axis sensor, gyroscope, microphone, position sensor, and the like equipped in the imaging terminal, such display that prompts the user to point the center of the imaging range to the light emitting unit is made as illustrated in FIG. 76.

Figure 77:
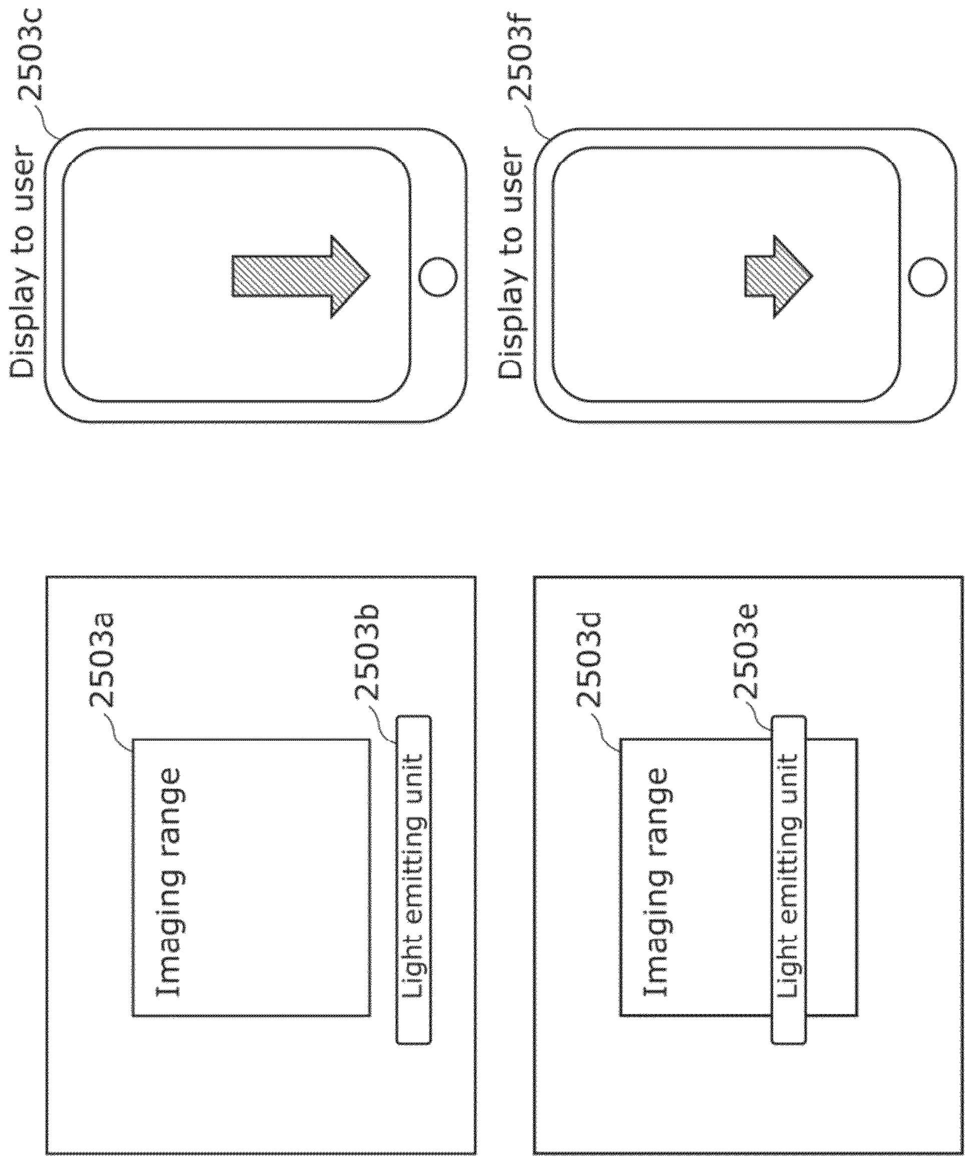
FIG. 77 is a diagram illustrating an example of a user interface in Embodiment 1.

To point the center of the imaging range to the light emitting unit, the size of a figure displayed according to the moving distance of the imaging range is adjusted as illustrated in FIG. 77.

Figure 78:
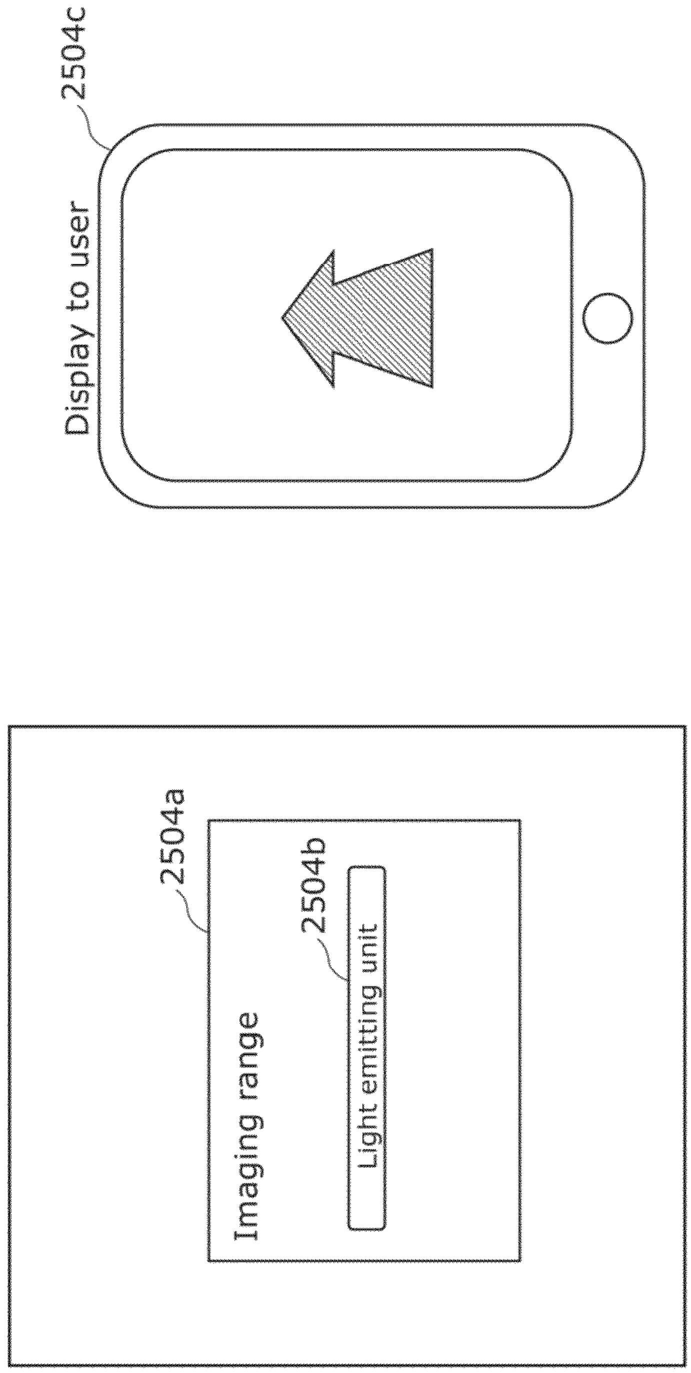
FIG. 78 is a diagram illustrating an example of a user interface in Embodiment 1.

In the case where the light emitting unit is captured small, such display that prompts the user to get closer to the light emitting unit to capture the image is made in order to capture the light emitting unit larger, as illustrated in FIG. 78.

Figure 79:
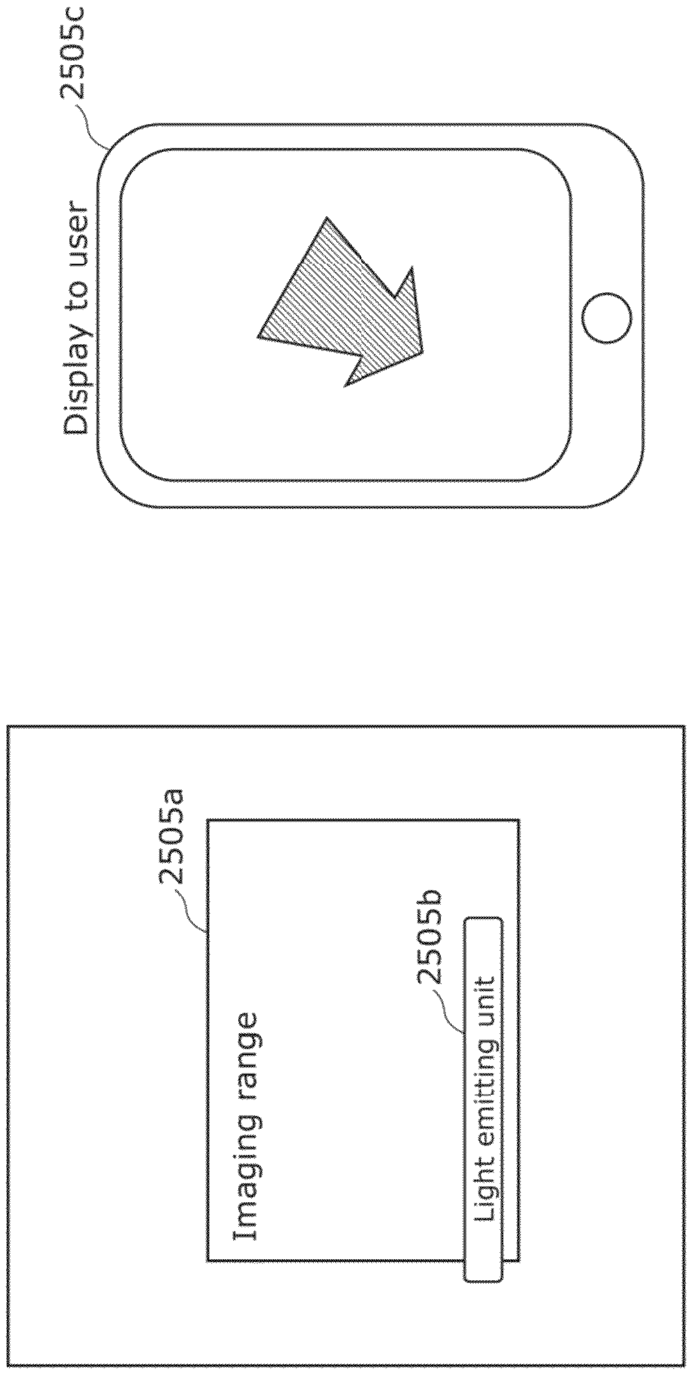
FIG. 79 is a diagram illustrating an example of a user interface in Embodiment 1.

In the case where the light emitting unit is not within the center of the imaging range and also the light emitting unit is not captured in a sufficiently large size, such display that prompts the user to point the center of the imaging range to the light emitting unit and also prompts the user to get closer to the light emitting unit to capture the image is made as illustrated in FIG. 79.

Figure 80:
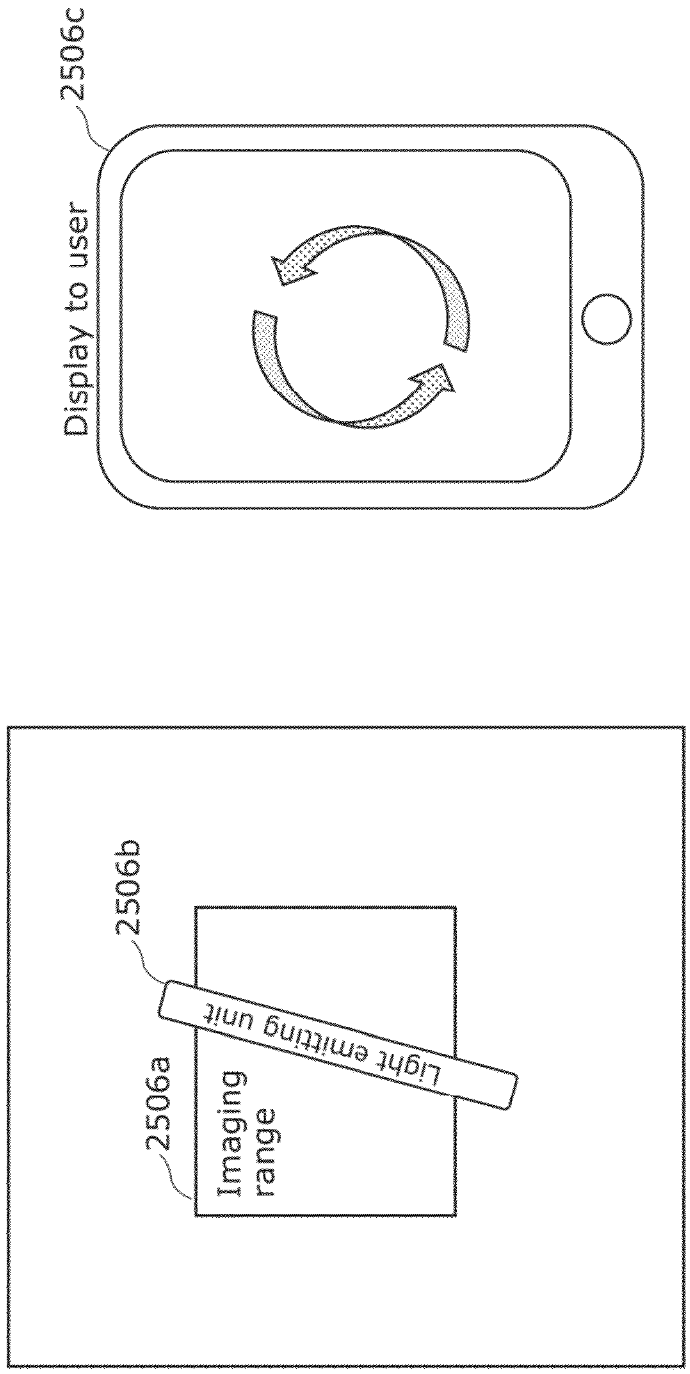
FIG. 80 is a diagram illustrating an example of a user interface in Embodiment 1.

In the case where the signal of the light emitting unit can be more easily received by changing the angle between the light emitting unit and the imaging range, such display that prompts the user to rotate the imaging range is made as illustrated in FIG. 80.

Figure 81:
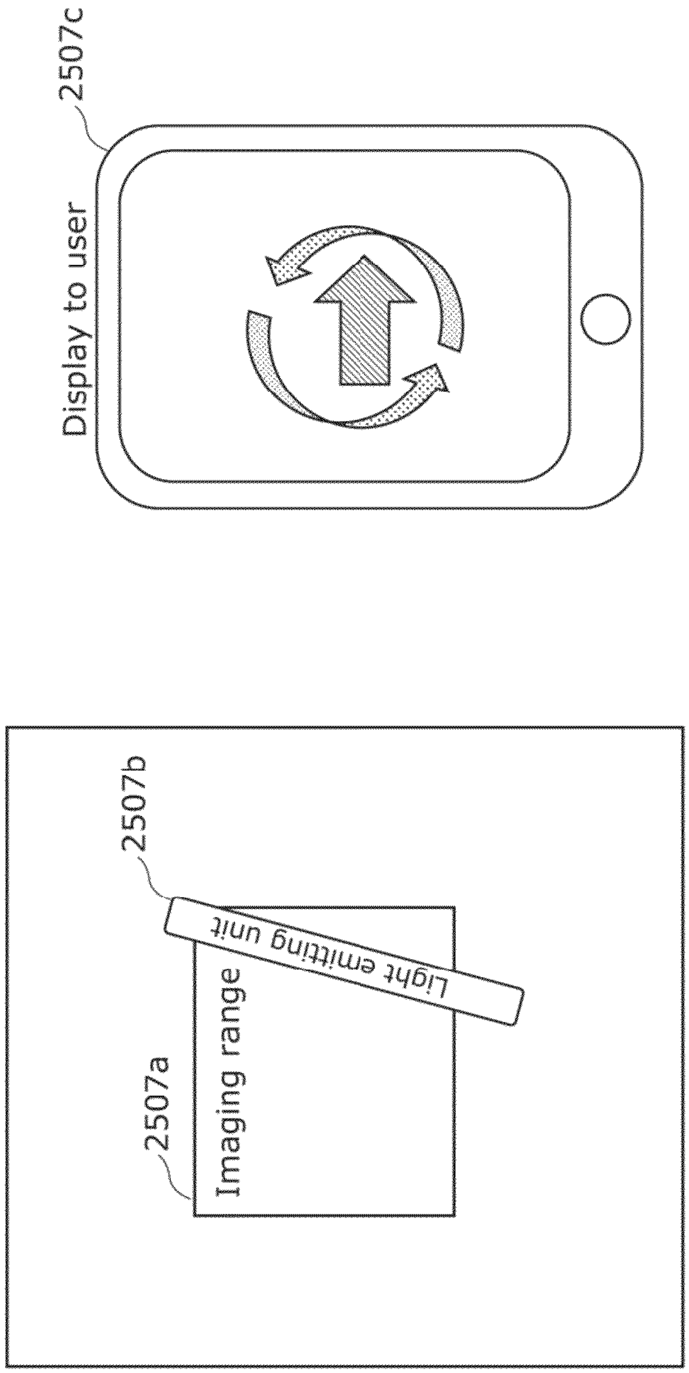
FIG. 81 is a diagram illustrating an example of a user interface in Embodiment 1.

In the case where the light emitting unit is not within the center of the imaging range and also the signal of the light emitting unit can be more easily received by changing the angle between the light emitting unit and the imaging range, such display that prompts the user to point the center of the imaging range to the light emitting unit and also prompts the user to rotate the imaging range is made as illustrated in FIG. 81.

Figure 82:
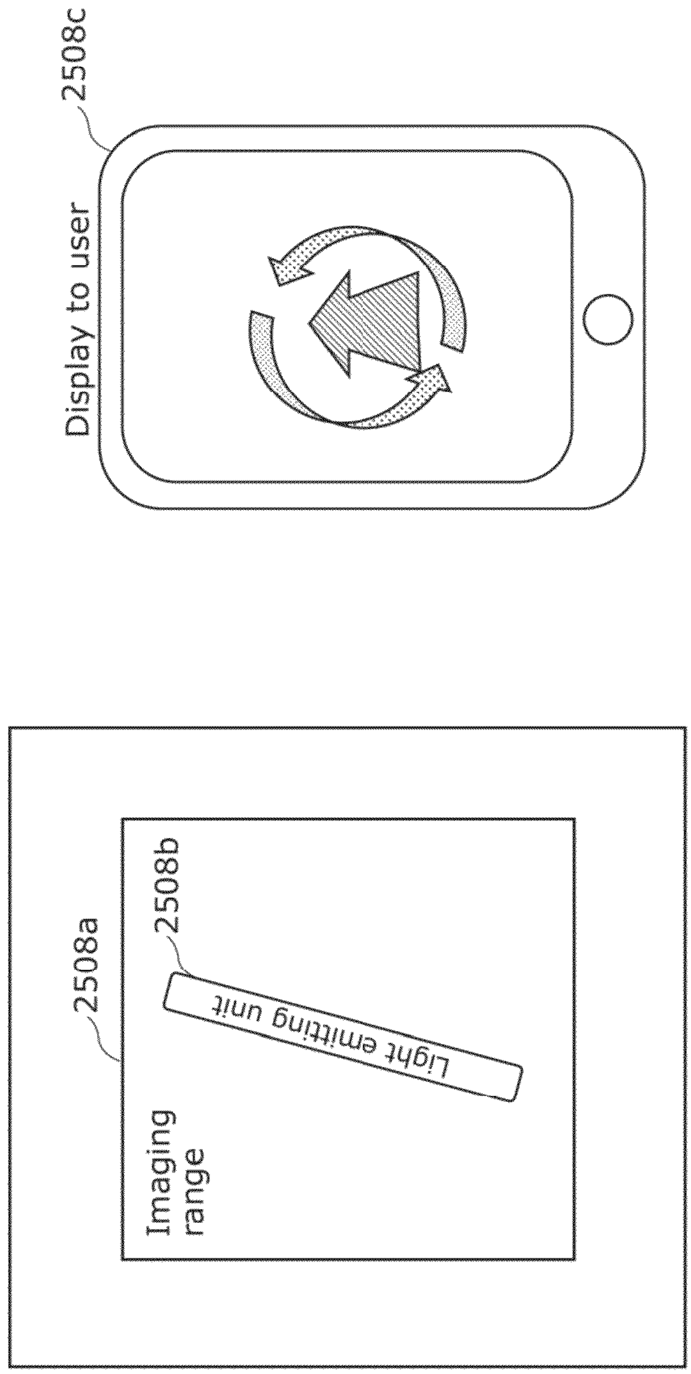
FIG. 82 is a diagram illustrating an example of a user interface in Embodiment 1.

In the case where the light emitting unit is not captured in a sufficiently large size and also the signal of the light emitting unit can be more easily received by changing the angle between the light emitting unit and the imaging range, such display that prompts the user to get closer to the light emitting unit to capture the image and also prompts the user to rotate the imaging range is made as illustrated in FIG. 82.

Figure 83:
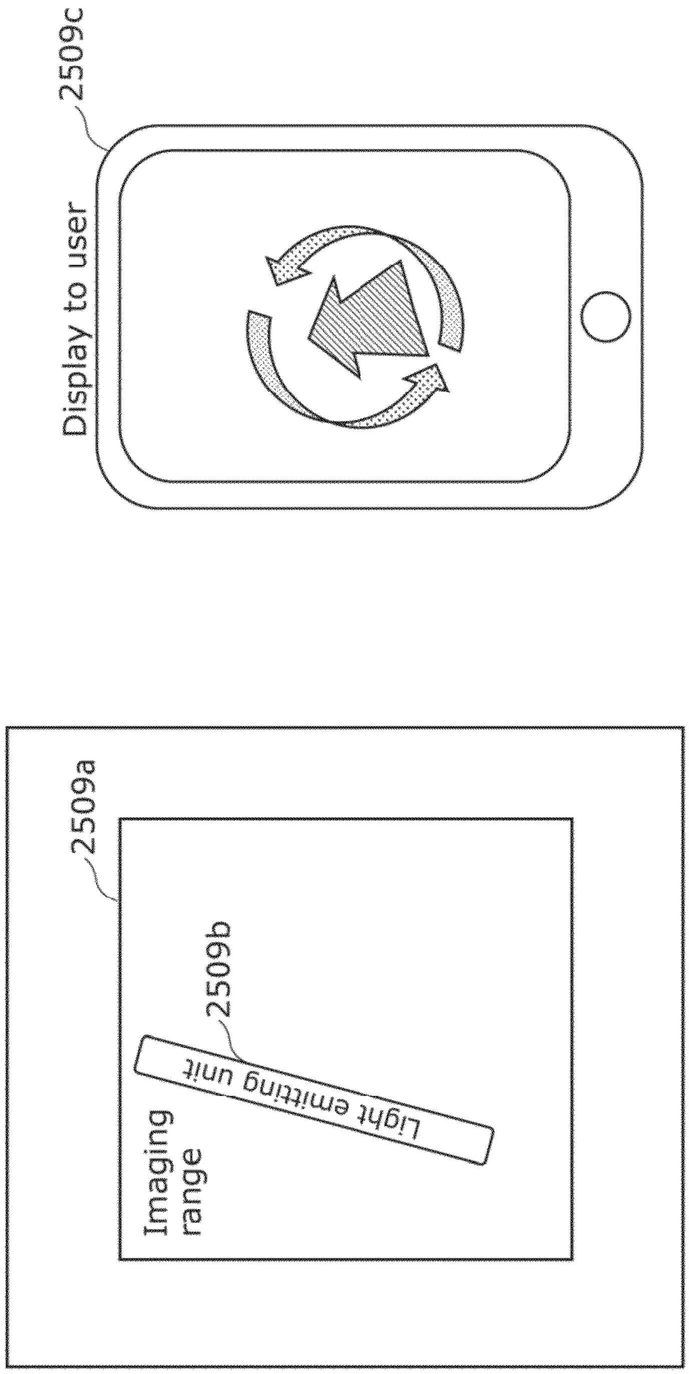
FIG. 83 is a diagram illustrating an example of a user interface in Embodiment 1.

In the case where the light emitting unit is not within the center of the imaging range, the light emitting unit is not captured in a sufficiently large size, and also the signal of the light emitting unit can be more easily received by changing the angle between the light emitting unit and the imaging range, such display that prompts the user to point the center of the imaging range to the light emitting unit, prompts the user to get closer to the light emitting unit to capture the image, and also prompts the user to rotate the imaging range is made as illustrated in FIG. 83.

Figure 84:
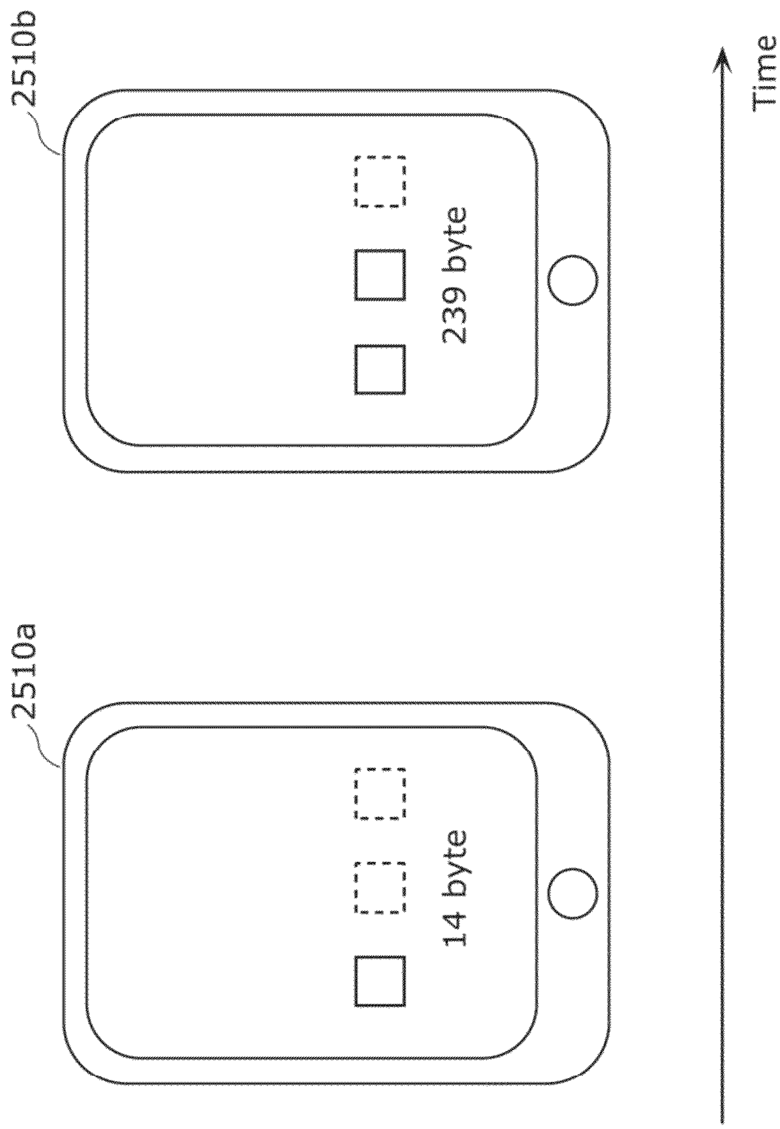
FIG. 84 is a diagram illustrating an example of a user interface in Embodiment 1.

During signal reception, information that the signal is being received and the information amount of the received signal are displayed as illustrated in FIG. 84.

Figure 85:
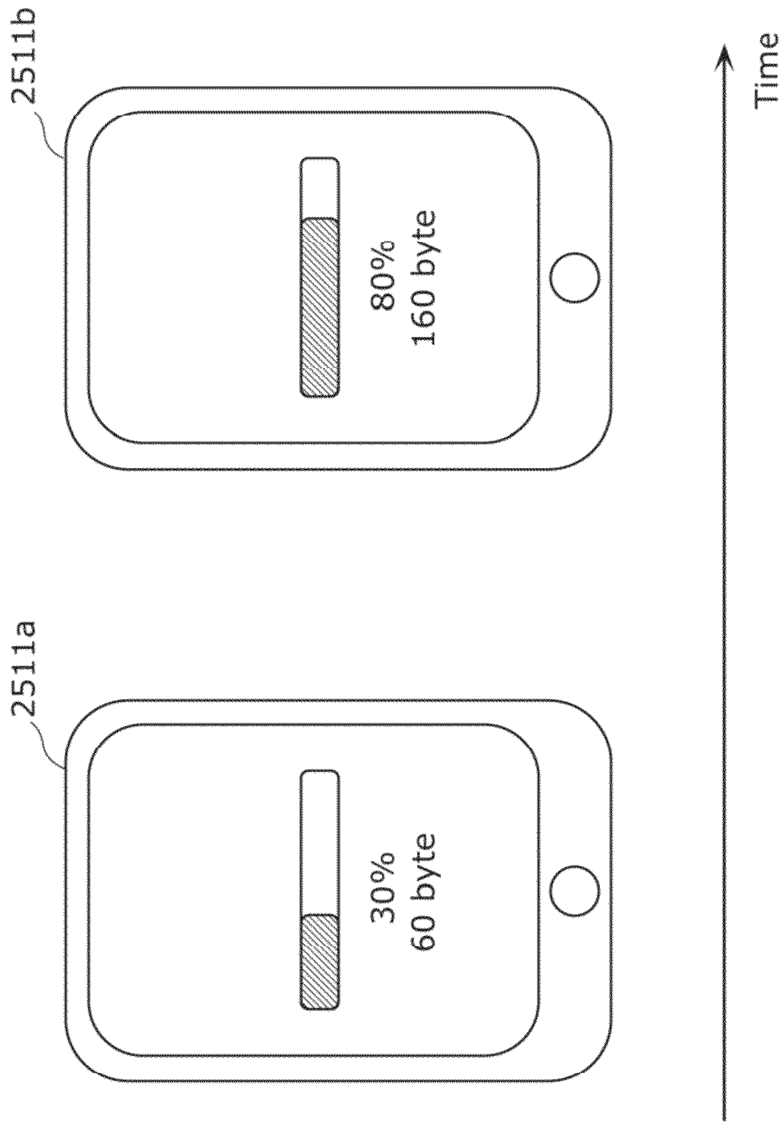
FIG. 85 is a diagram illustrating an example of a user interface in Embodiment 1.

In the case where the size of the signal to be received is known, during signal reception, the proportion of the signal the reception of which has been completed and the information amount are displayed with a progress bar, as illustrated in FIG. 85.

Figure 86:
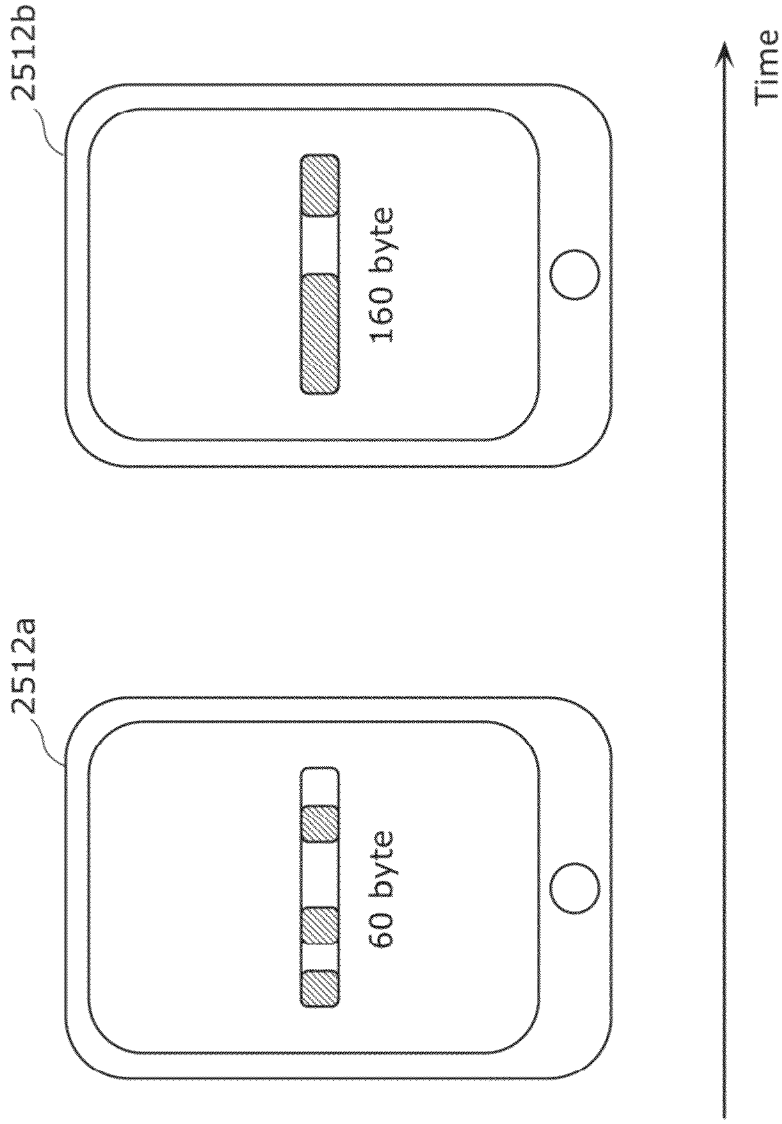
FIG. 86 is a diagram illustrating an example of a user interface in Embodiment 1.

During signal reception, the proportion of the signal the reception of which has been completed, the received parts, and the information amount of the received signal are displayed with a progress bar, as illustrated in FIG. 86.

Figure 87:
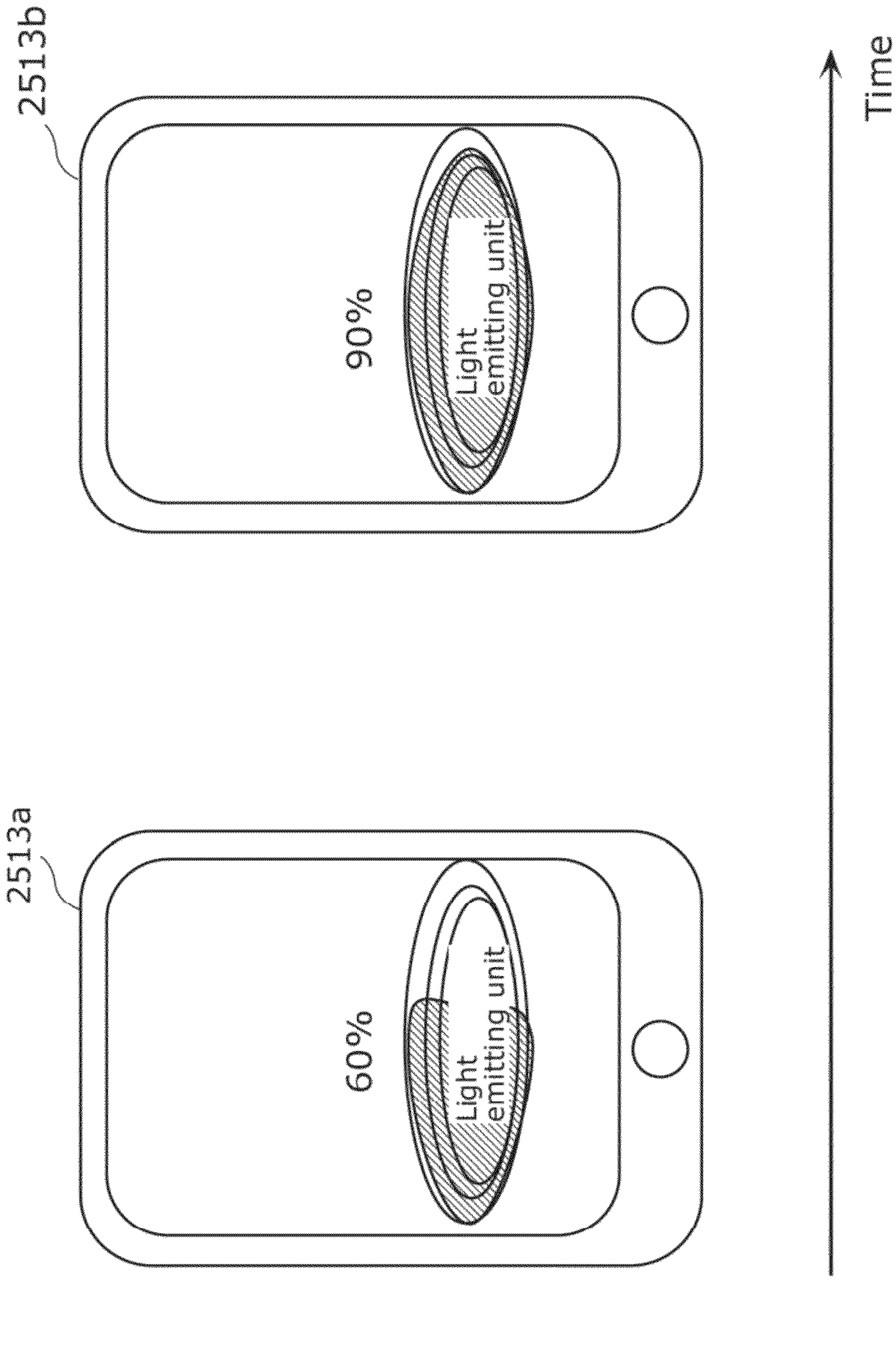
FIG. 87 is a diagram illustrating an example of a user interface in Embodiment 1.

During signal reception, the proportion of the signal the reception of which has been completed and the information amount are displayed so as to superimpose on a light emitting unit, as illustrated in FIG. 87.

Figure 88:
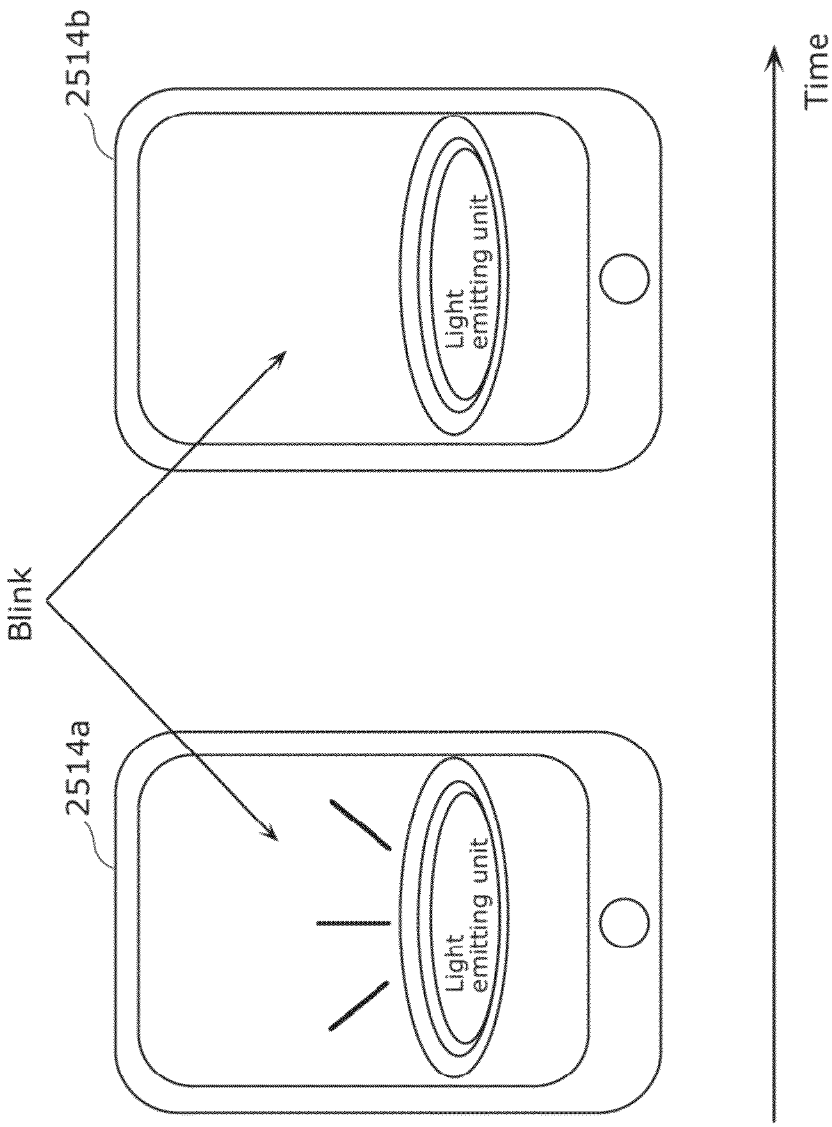
FIG. 88 is a diagram illustrating an example of a user interface in Embodiment 1.

In the case where a light emitting unit is detected, information that the object is a light emitting unit is displayed by, for example, displaying the light emitting unit as blinking, as illustrated in FIG. 88.

Figure 89:
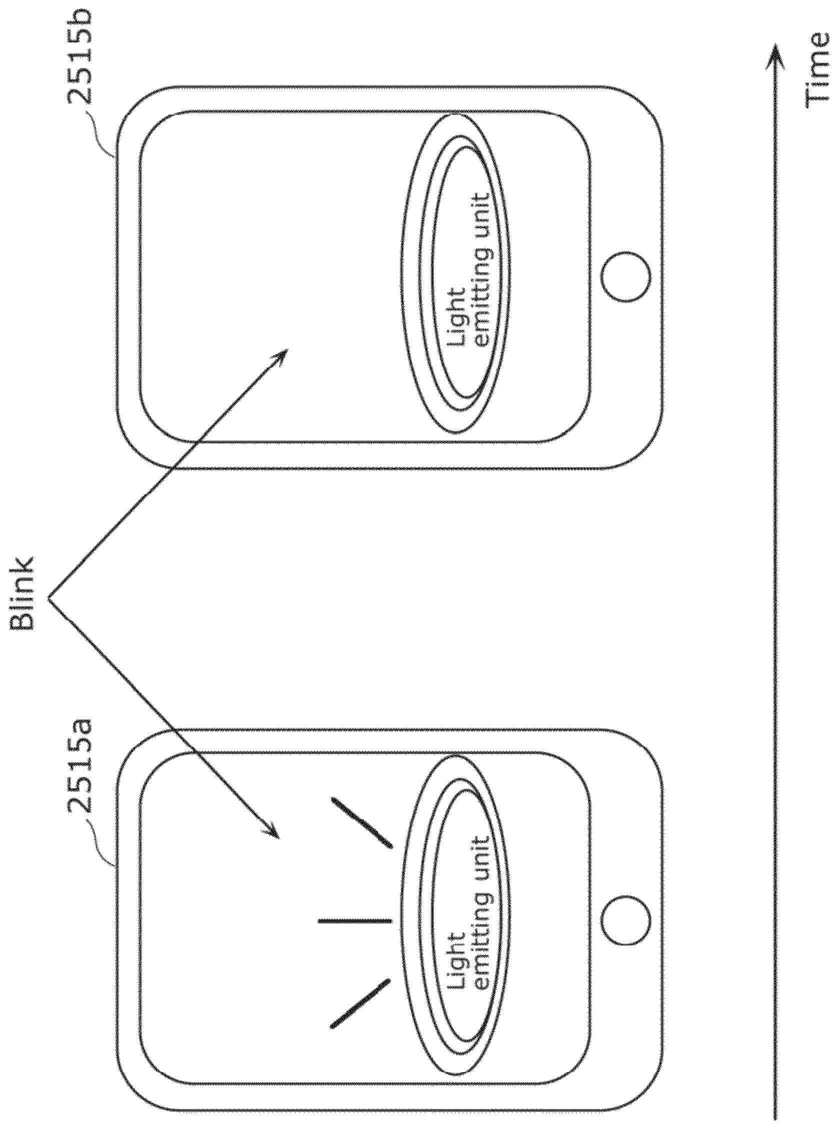
FIG. 89 is a diagram illustrating an example of a user interface in Embodiment 1.

While receiving a signal from a light emitting unit, information that the signal is being received from the light emitting unit is displayed by, for example, displaying the light emitting unit as blinking, as illustrated in FIG. 89.

Figure 90:
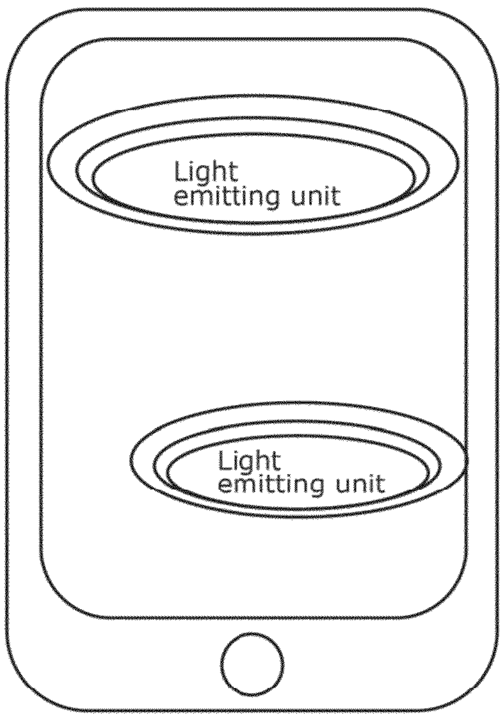
FIG. 90 is a diagram illustrating an example of a user interface in Embodiment 1.

In FIG. 90, in the case where a plurality of light emitting units are detected, the user is prompted to designate a transmission device from which a signal is to be received or which is to be operated, by tapping any of the plurality of light emitting units.

Embodiment 2

Application to ITS

The following describes ITS (Intelligent Transport Systems) as an example of application of the present disclosure. In this embodiment, high-speed communication of visible light communication is realized, which is adaptable to the field of ITS.

Figure 91:
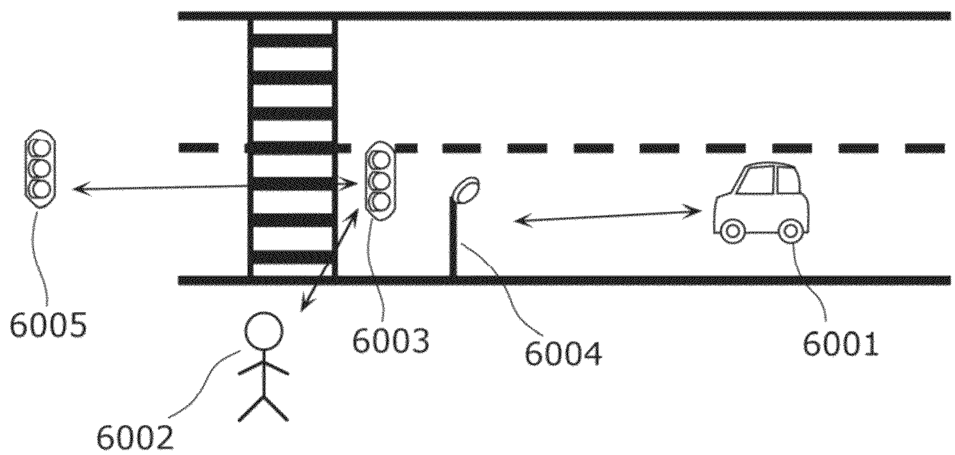
FIG. 91 is a diagram illustrating an example of application to ITS in Embodiment 2.

FIG. 91 is a diagram for describing communication between a transport system having the visible light communication function and a vehicle or a pedestrian. A traffic light 6003 has the visible light communication function according to this embodiment, and is capable of communicating with a vehicle 6001 and a pedestrian 6002.

Information transmission from the vehicle 6001 or the pedestrian 6002 to the traffic light 6003 is performed using, for example, a headlight or a flash light emitting unit of a mobile terminal carried by the pedestrian. Information transmission from the traffic light 6003 to the vehicle 6001 or the pedestrian 6002 is performed by signal illumination using a camera sensor of the traffic light 6003 or a camera sensor of the vehicle 6001.

The function of communication between a traffic assistance object disposed on the road, such as a road lighting or a road information board, and the vehicle 6001 or the pedestrian 6002 is also described below. Here, since the communication method is the same, the description of other objects is omitted.

As illustrated in FIG. 91, the traffic light 6003 provides road traffic information to the vehicle 6001. The road traffic information mentioned here is information for helping driving, such as congestion information, accident information, and nearby service area information.

The traffic light 6003 includes an LED lighting. Communication using this LED lighting enables information to be provided to the vehicle 6001 with no need for addition of a new device. Since the vehicle 6001 usually moves at high speed, only a small amount of data can be transmitted in conventional visible light communication techniques. However, the improvement in communication speed according to this embodiment produces an advantageous effect that a larger size of data can be transmitted to the vehicle.

Moreover, the traffic light 6003 or a lighting 6004 is capable of providing different information depending on signal or light. It is therefore possible to transmit information according to the vehicle position, such as transmitting information only to each vehicle running in a right turn lane.

Regarding the pedestrian 6002, too, it is possible to provide information only to each pedestrian 6002 at a specific spot. For example, only each pedestrian waiting at a crosswalk signal at a specific intersection may be provided with information that the intersection is accident-prone, city spot information, and the like.

The traffic light 6003 is also capable of communicating with another traffic light 6005. For example, in the case of changing information provided from the traffic light 6003, the information distributed from the traffic light can be changed through communication relay between traffic lights, with there being no need to newly connecting a signal line or a communication device to the traffic light. According to the method of this embodiment, the communication speed of visible light communication can be significantly improved, so that the distribution information can be changed in a shorter time. This allows the distribution information to be changed several times a day, as an example. Besides, snow information, rain information, and the like can be distributed immediately.

Furthermore, the lighting may distribute the current position information to provide the position information to the vehicle 6001 or the pedestrian 6002. In facilities with roofs such as a shopping arcade and a tunnel, it is often difficult to obtain position information using a GPS. However, the use of visible light communication has an advantageous effect that the position information can be obtained even in such a situation. In addition, since the communication speed can be increased according to this embodiment as compared with conventional techniques, for example it is possible to receive information while passing a specific spot such as a store or an intersection.

Note that this embodiment provides speedups in visible light communication, and so is equally applicable to all other ITS systems using visible light communication.

Figure 92:
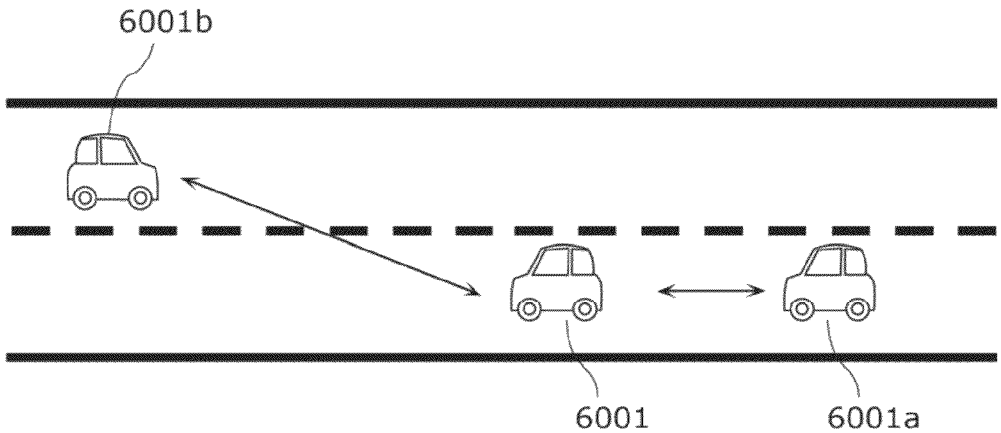
FIG. 92 is a diagram illustrating an example of application to ITS in Embodiment 2.

FIG. 92 is a schematic diagram of the case of applying the present disclosure to inter-vehicle communication where vehicles communicate with each other using visible light communication.

The vehicle 6001 transmits information to a vehicle 6001*a* behind, through a brake lamp or other LED light. The vehicle 6001 may also transmit data to an oncoming vehicle 6001*b*; through a headlight or other front light.

By communicating between vehicles using visible light in this way, the vehicles can share their information with each other. For instance, congestion information or warning information may be provided to the vehicle behind by relay transmission of information of an accident at an intersection ahead.

Likewise, information for helping driving may be provided to the oncoming vehicle by transmitting congestion information or sudden braking information obtained from sensor information of the brake.

Since the communication speed of visible light communication is improved according to the present disclosure, there is an advantageous effect that information can be transmitted while passing the oncoming vehicle. Regarding the vehicle behind, too, information can be transmitted to many vehicles in a shorter time because the information transmission interval is shorter. The increase in communication speed also enables transmission of sound or image information. Hence, richer information can be shared among vehicles.

(Position Information Reporting System and Facility System)

Figure 93:
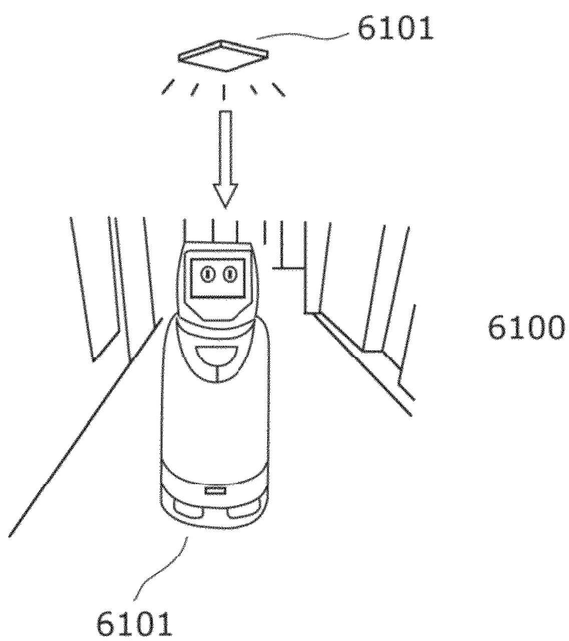
FIG. 93 is a diagram illustrating an example of application to a position information reporting system and a facility system in Embodiment 2.

FIG. 93 is a schematic diagram of a position information reporting system and a facility system using the visible light communication technique according to this embodiment. A system of delivering patient medical records, transported articles, drugs, and the like by a robot inside a hospital is described as a typical example.

A robot 6101 has the visible light communication function. A lighting distributes position information. The robot 6101 obtains the position information of the lighting, with it being possible to deliver drugs or other items to a specific hospital room. This alleviates burdens on doctors. Since the light never leaks to an adjacent room, there is also an advantageous effect that the robot 6101 is kept from going to the wrong room.

The system using visible light communication according to this embodiment is not limited to hospitals, and is adaptable to any system that distributes position information using lighting equipment. Examples of this include: a mechanism of transmitting position and guidance information from a lighting of an information board in an indoor shopping mall; and an application to cart movement in an airport.

Moreover, by providing a shop lighting with the visible light communication technique, it is possible to distribute coupon information or sale information. When the information is superimposed on visible light, the user intuitively understands that he or she is receiving the information from the light of the shop. This has an advantageous effect of enhancing user convenience.

In the case of transmitting information in or outside a room, if position information is distributed using a wireless LAN, radio waves leak to an adjacent room or corridor, so that a function of blocking radio waves by the outer wall to prevent radio waves from leaking out of the room is needed. Such blocking radio waves by the outer wall causes a problem that any device communicating with the outside, such as a mobile phone, is unusable.

When transmitting position information using visible light communication according to this embodiment, the communication can be confined within the reach of light. This has an advantageous effect that, for example, position information of a specific room can be easily transmitted to the user. There is also an advantageous effect that no special device is needed because normally light is blocked by the outer wall.

In addition, since the positions of lightings are usually unchanged in buildings, large-scale facilities, and ordinary houses, the position information transmitted by each lighting does not change frequently. The frequency of updating a database of the position information of each lighting is low. This has an advantageous effect that the maintenance cost in position information management is low.

(Supermarket System)

Figure 94:
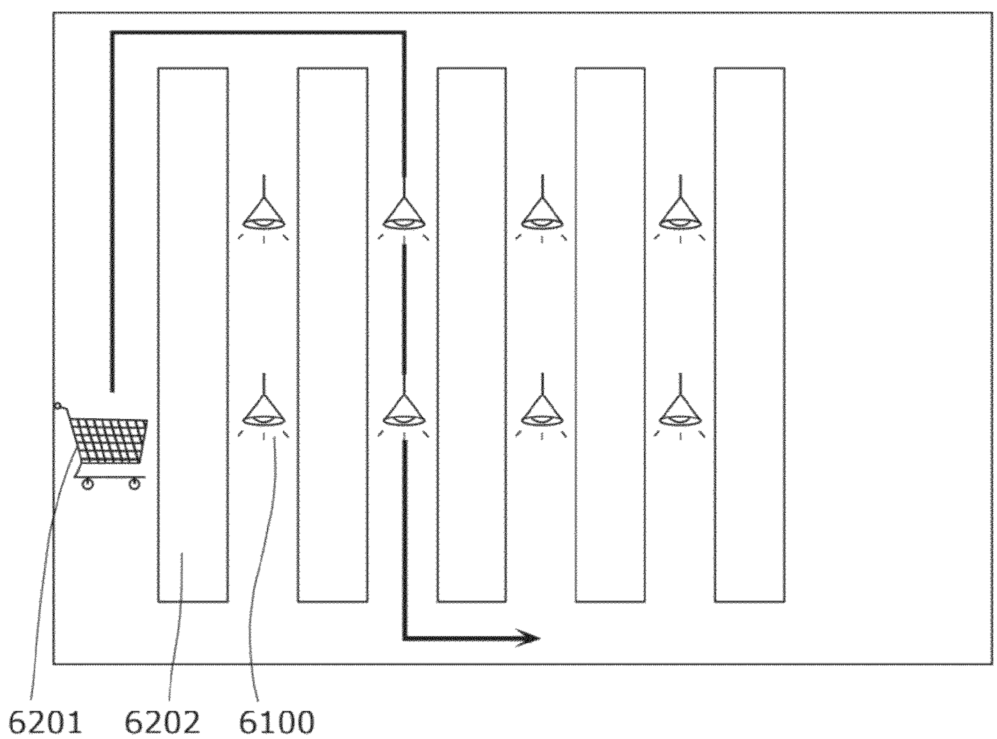
FIG. 94 is a diagram illustrating an example of application to a supermarket system in Embodiment 2.

FIG. 94 illustrates a supermarket system in which, in a store, a device capable of the communication method according to this embodiment is mounted on a shopping cart to obtain position information from a shelf lighting or an indoor lighting.

A cart 6201 carries a visible light communication device that uses the communication method according to this embodiment. A lighting 6100 distributes position information and shelf information by visible light communication. The cart can receive product information distributed from the lighting. The cart can also receive the position information to thereby recognize at which shelf the cart is situated. For example, by storing shelf position information in the cart, the direction can be displayed on the cart when the user designates, to the cart, to which shelf he or she wants to go or which product he or she wants to buy.

Visible light communication enables obtainment of such accurate position information that makes the shelf positions known, so that the movement information of the cart can be obtained and utilized. For example, a database of position information obtained by the cart from each lighting may be created.

The information from the lighting, together with cart information, is transmitted using visible light communication, or transmitted to a server using a wireless LAN or the like. Alternatively, a memory is equipped in the cart, and data is collected after the store is closed to compile, in the server, which path each cart has taken.

By collecting the cart movement information, it is possible to recognize which shelf is popular and which aisle is passed most. This has an advantageous effect of being applicable to marketing.

(Communication Between Mobile Phone Terminal and Camera)

Figure 95:
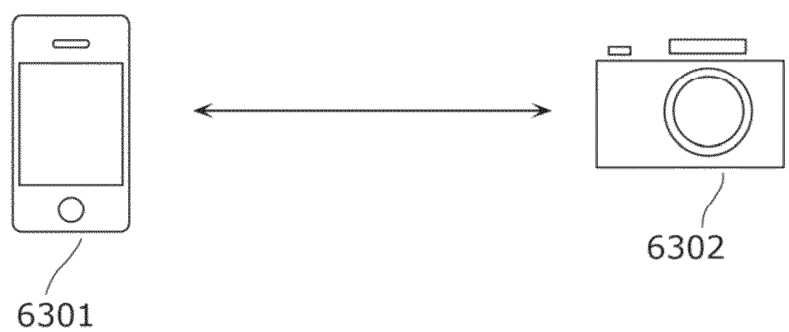
FIG. 95 is a diagram illustrating an example of application to communication between a mobile phone terminal and a camera in Embodiment 2.

FIG. 95 illustrates an example of application of using visible light communication according to this embodiment.

A mobile phone terminal 6301 transmits data to a camera 6302 using a flash. The camera 6302 receives the data transmitted from the mobile phone terminal 6301, from light information received by an imaging unit.

Camera imaging settings are stored in the mobile phone terminal 6301 beforehand, and setting information is transmitted to the camera 6302. Thus, the camera can be set using rich user interfaces of the mobile phone terminal.

Moreover, the use of the image sensor of the camera enables the setting information to be transmitted from the mobile phone terminal to the camera upon communication between the camera and the mobile phone terminal, with there being no need to provide a new communication device such as a wireless LAN.

(Underwater Communication)

Figure 96:
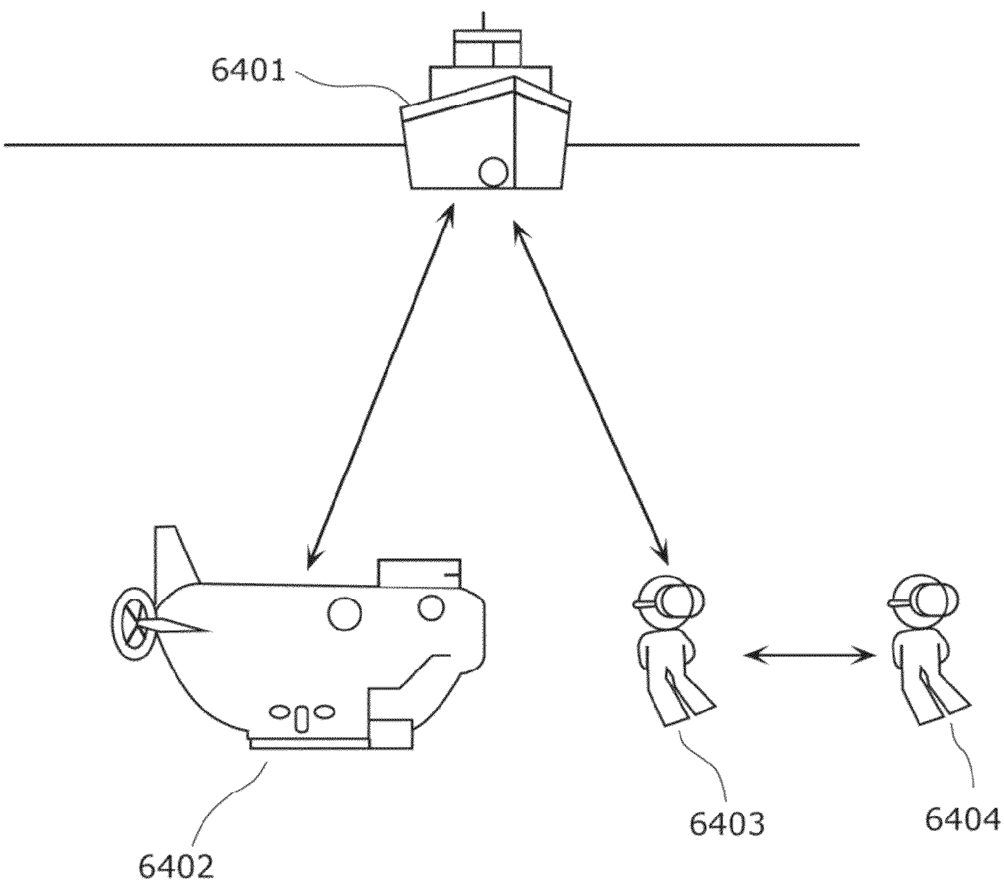
FIG. 96 is a diagram illustrating an example of application to underwater communication in Embodiment 2.

FIG. 96 is a schematic diagram of the case of adapting the communication method according to this embodiment to underwater communication. Since radio waves do not penetrate water, divers underwater or a ship on the sea and a ship in the sea cannot communicate with each other by radio. Visible light communication according to this embodiment, on the other hand, is available even underwater.

In the visible light communication method according to this embodiment, data can be transmitted from an object or building emitting light. By pointing a light receiving unit to a building, it is possible to obtain guidance information or detailed information of the building. This allows useful information to be provided to tourists.

The visible light communication method according to this embodiment is also applicable to communication from a lighthouse to a ship. More detailed information can be transferred because a larger amount of communication than in conventional techniques is possible.

Since light is used in visible light communication according to this embodiment, communication control on a room basis such as communicating only in a specific room can be carried out. As an example, the communication method according to this embodiment may be applied to the case of accessing information available only in a specific room in a library. As another example, the communication method according to this embodiment may be used for exchange of key information, while communication such as a wireless LAN is used for actual communication.

Note that the communication method according to this embodiment can be used for all imaging devices having MOS sensors and LED communication, and are applicable to digital cameras, smartphones, and so on.

Embodiment 3

Service Provision Example

Figure 97:
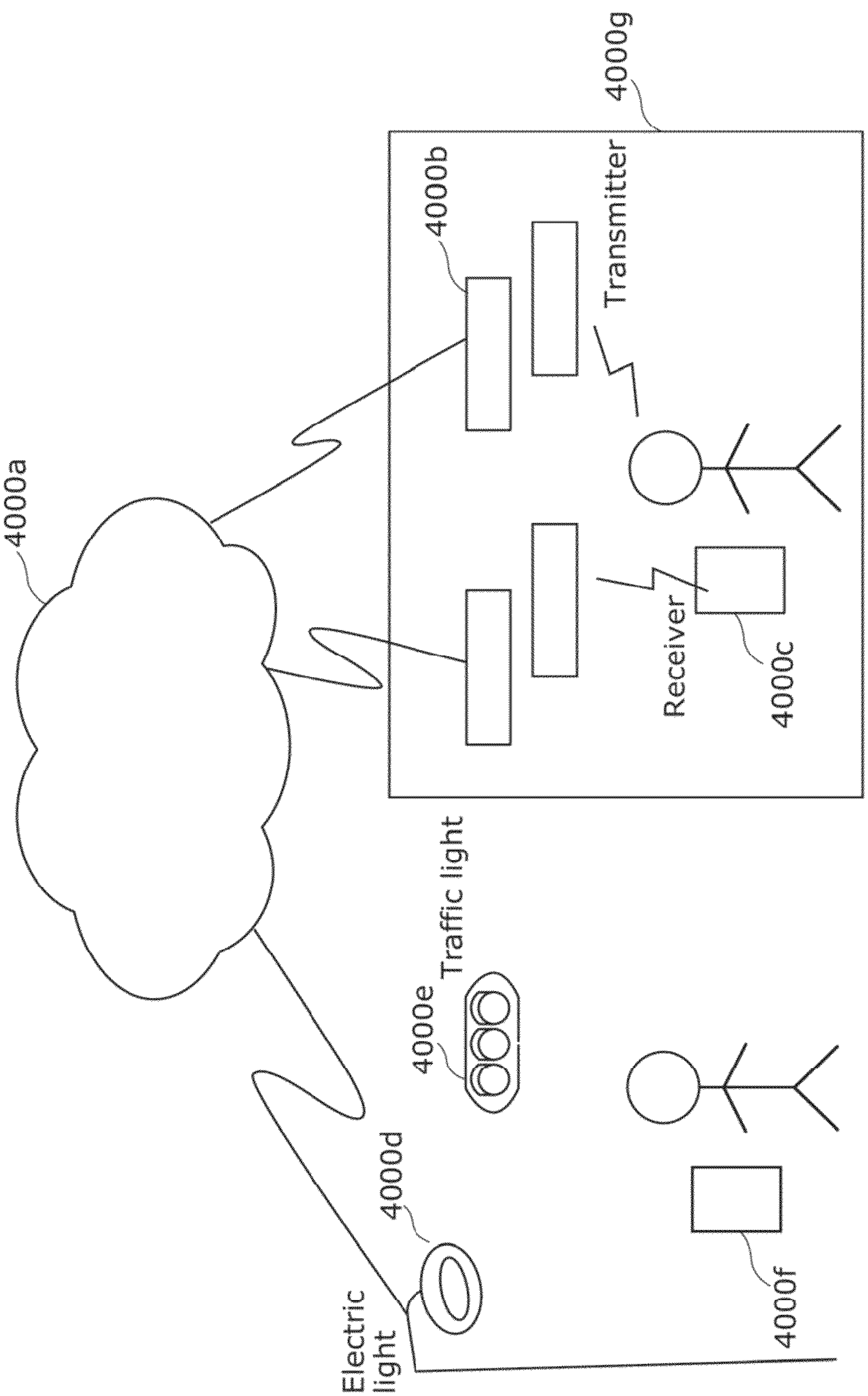
FIG. 97 is a diagram for describing an example of service provision to a user in Embodiment 3.

This embodiment describes an example of service provision to a user as an example of application of the present disclosure, with reference to FIG. 97. FIG. 97 is a diagram for describing an example of service provision to a user in Embodiment 3. A network server 4000*a*, transmitters 4000*b*, 4000*d*, and 4000*e*, receivers 4000*c* and 4000*f*, and a building 4000*g* are illustrated in FIG. 97.

The receivers 4000*c* and 4000*f* receive signals from the plurality of transmitters 4000*b*, 4000*d*, and 4000*e* in or outside the house and process the received signals, and can thereby provide services to the user. Here, the transmitters and the receivers may process the signals individually to provide the services to the user, or provide the services to the user while changing their behaviors or transmitted signals according to instructions from a network in cooperation with the network server 4000*a* forming the network.

Note that the transmitters and the receivers may be equipped in mobile objects such as vehicles or persons, equipped in stationary objects, or later equipped in existing objects.

Figure 98:
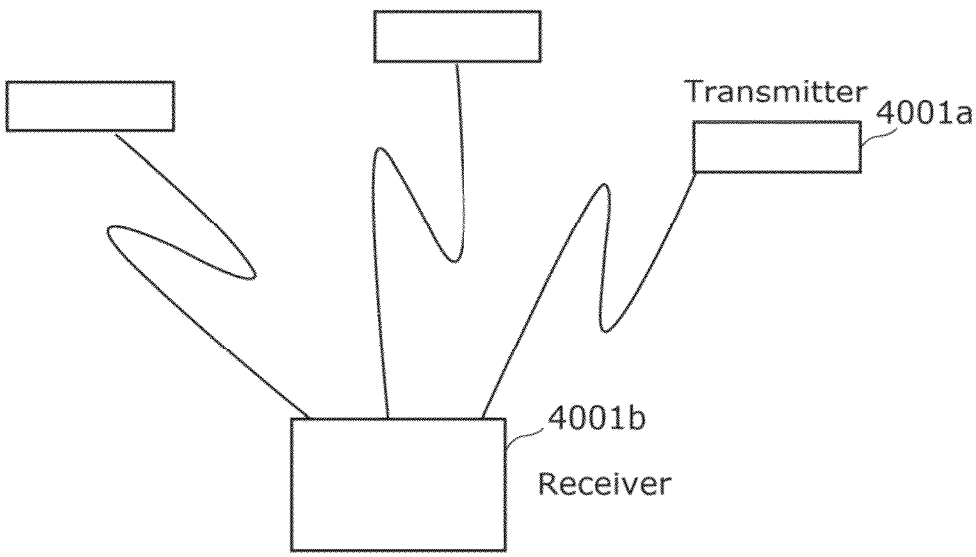
FIG. 98 is a diagram for describing an example of service provision to a user in Embodiment 3.

FIG. 98 is a diagram for describing an example of service provision to a user in Embodiment 3. Transmitters 4001*a* and a receiver 4001*b* are illustrated in FIG. 98.

As illustrated in FIG. 98, the receiver 4001*b* receives signals transmitted from the plurality of transmitters 4001*a* and processes information included in the signals, thereby providing services to the user. The information included in the signals are information relating to: devices IDs uniquely identifying devices; position information; maps; signs; tourist information; traffic information; regional services; coupons; advertisements; product description; characters; music; video; photos; sounds; menus; broadcasting; emergency guidance; time tables; guides; applications; news; bulletin boards; commands to devices; information identifying individuals; vouchers; credit cards; security; and URLs, for example.

The user may perform a registration process or the like for using the information included in the signals on a network server beforehand so that the user can be provided with services by receiving the signals by the receiver 4001*b* at the place where the transmitters 4001*a* transmit the signals. Alternatively, the user may be provided with services without via the network server.

Figure 99:
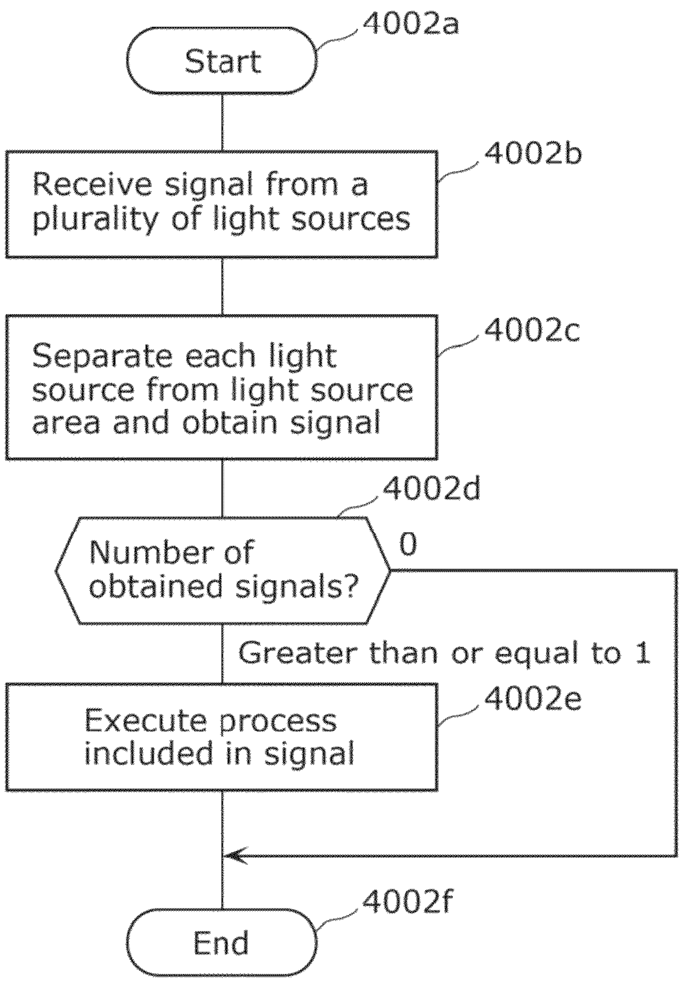
FIG. 99 is a flowchart illustrating the case where a receiver simultaneously processes a plurality of signals received from transmitters in Embodiment 3.

FIG. 99 is a flowchart illustrating the case where the receiver simultaneously processes the plurality of signals received from the transmitters in this embodiment.

First, the procedure starts in Step 4002*a*. Next, in Step 4002*b*, the receiver receives the signals from the plurality of light sources. Next, in Step 4002*c*, the receiver determines the area in which each light source is displayed from the reception result, and extracts the signal from each area.

In Step 4002*e*, the receiver repeatedly performs a process based on information included in the signal for the number of obtained signals until the number of signals to be processed reaches 0 in Step 4002*d*. When the number of signals to be processed reaches 0, the procedure ends in Step 4002*f*.

Figure 100:
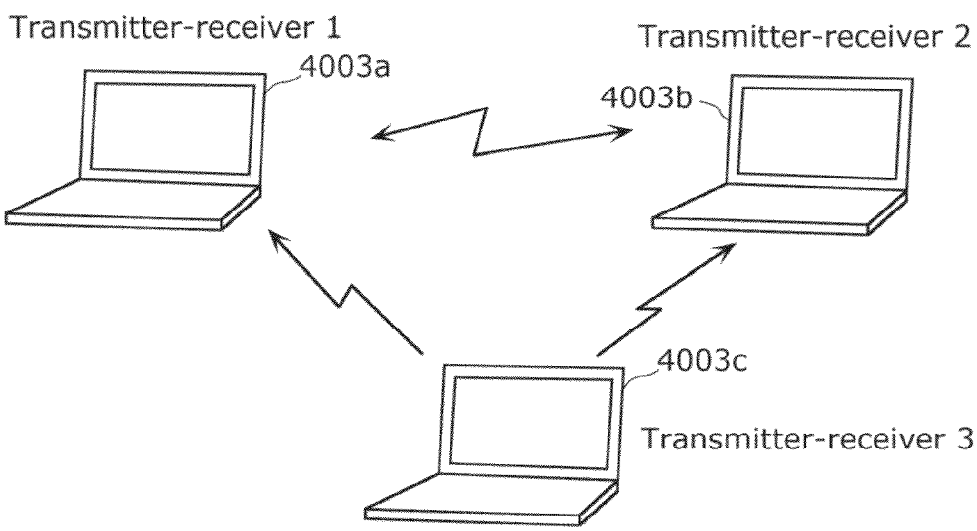
FIG. 100 is a diagram illustrating an example of the case of realizing inter-device communication by two-way communication in Embodiment 3.

FIG. 100 is a diagram illustrating an example of the case of realizing inter-device communication by two-way communication in Embodiment 3. An example of the case of realizing inter-device communication by two-way communication between a plurality of transmitter-receivers 4003*a*, 4003*b*, and 4003*c* each including a transmitter and a receiver is illustrated in FIG. 98. Note that the transmitter-receivers may be capable of communication between the same devices as in FIG. 98, or communication between different devices.

Moreover, in this embodiment, the user can be provided with services in such a manner that applications are distributed to a mobile phone, a smartphone, a personal computer, a game machine, or the like using the communication means in this embodiment or other networks or removable storages and already equipped devices (LED, photodiode, image sensor) are used from the applications. Here, the applications may be installed in the device beforehand.

(Example of Service Using Directivity)

A service using directivity characteristics in this embodiment is described below, as an example of application of the present disclosure. In detail, this is an example of the case of using the present disclosure in public facilities such as a movie theater, a concert hall, a museum, a hospital, a community center, a school, a company, a shopping arcade, a department store, a government office, and a food shop. The present disclosure achieves lowering of directivity of a signal transmitted from a transmitter to a receiver as compared with conventional visible light communication, so that information can be simultaneously transmitted to many receivers present in a public facility.

Figure 101:
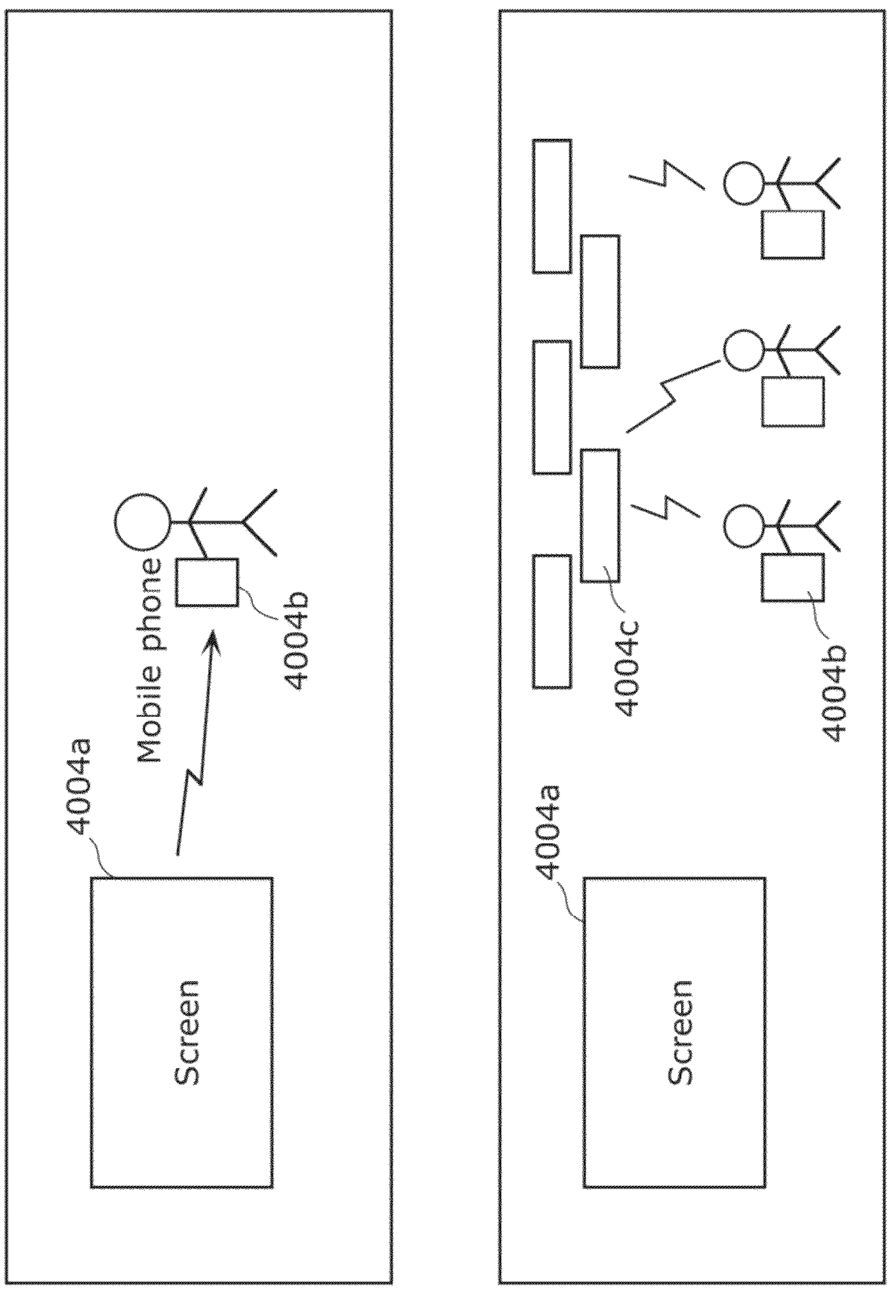
FIG. 101 is a diagram for describing a service using directivity characteristics in Embodiment 3.

FIG. 101 is a diagram for describing a service using directivity characteristics in Embodiment 3. A screen 4004*a*, a receiver 4004*b*, and a lighting 4004*c* are illustrated in FIG. 101.

As illustrated in FIG. 101, the application of this embodiment to the movie theater can suppress a situation where, during a movie, the user uses such a device (mobile phone, smartphone, personal computer, game machine, etc.) that interferes with the other users enjoying the movie. The transmitter uses, as a signal, video projected on the screen 4004*a* displaying the movie or light emitted from the lighting 4004*c* disposed in the facility, and includes a command for controlling the receiver 4004*b* in the signal. By the receiver 4004*b* receiving the command, it is possible to control the operation of the receiver 4004*b* to prevent any act that interferes with the other users watching the movie. The command for controlling the receiver 4004*b* relates to power or reception sound, communication function, LED display, vibration ON/OFF, level adjustment, and the like.

Moreover, the strength of directivity can be controlled by the receiver filtering the signal from the transmitter through the use of the intensity of the light source and the like. In this embodiment, the command or information can be simultaneously transmitted to the receivers present in the facility, by setting low directivity.

In the case of increasing the directivity, the constraint may be imposed by the transmitter limiting the amount of light source or the receiver reducing the sensitivity of receiving the light source or performing signal processing on the received light source amount.

In the case where this embodiment is applied to a store where the user's order is received and processed at the place, such as a food shop or a government office, a signal including the order transmitted from a transmitter held by the user is received by a receiver placed at such a position that can overlook the store, so that which menu is ordered by the user of which seat can be detected. The service provider processes the order on a time axis, with it being possible to provide the service of high fairness to the user.

Here, a secret key or a public key preset between the transmitter and the receiver may be used to encrypt/decrypt the information included in the signal, to thereby restrict transmitters capable of signal transmission and receivers capable of signal reception. Moreover, a protocol such as SSL used in the Internet by default may be employed for a transmission path between the transmitter and the receiver, to prevent signal interception by other devices.

(Service Example by Combination of Real World and Internet World)

The following describes a service provided to a user by superimposing of information of the real world captured by a camera and the Internet world, as an example of application of the present disclosure.

Figure 102:
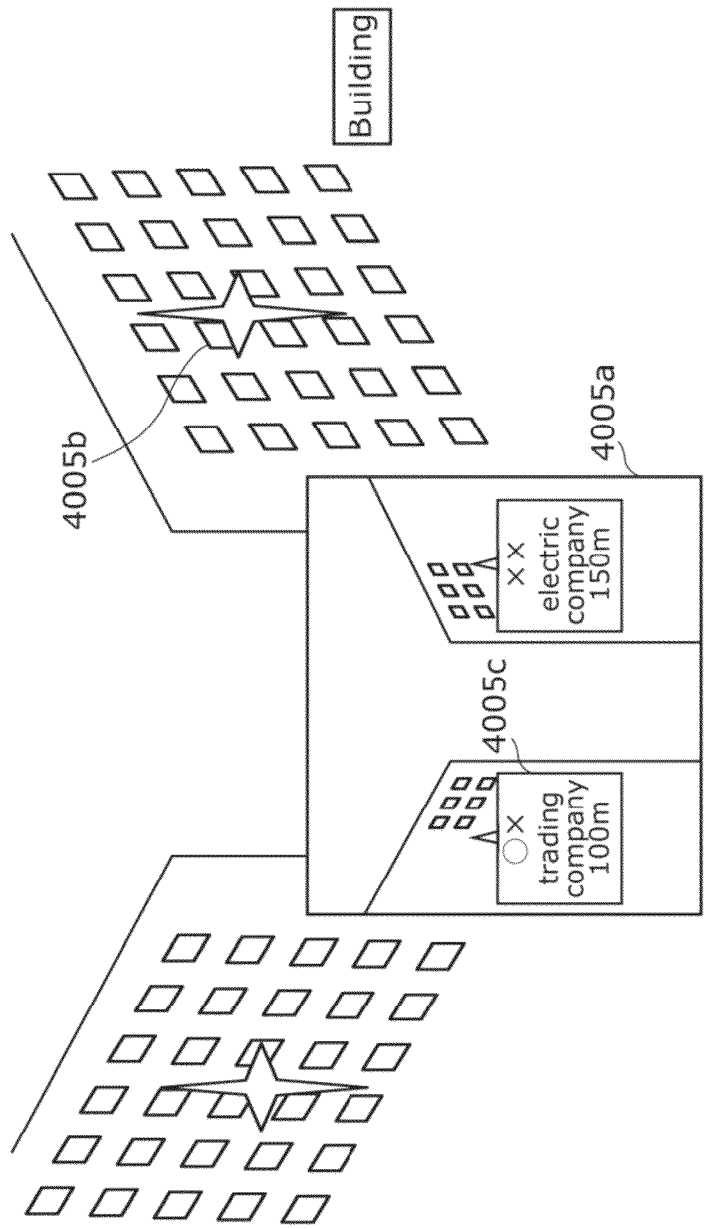
FIG. 102 is a diagram for describing another example of service provision to a user in Embodiment 3.

FIG. 102 is a diagram for describing another example of service provision to a user in Embodiment 3. In detail, FIG. 102 illustrates an example of a service in the case of applying this embodiment using a camera 4005*a* equipped in a receiver such as a mobile phone, a smartphone, or a game machine. The camera 4005*a*, light sources 4005*b*, and superimposition information 4005*c* are illustrated in FIG. 102.

Signals 4005*d* transmitted from the plurality of light sources 4005*b* are extracted from the imaging result of the camera 4005*a*, and information included in the signals 4005*d* is superimposed on the camera 4005*a* and displayed. Examples of the superimposition information 4005*c* to be superimposed on the camera 4005*a* include character strings, images, video, characters, applications, and URLs. Note that the information included in the signals may be processed not only by superimposition on the camera but also by use of sounds, vibrations, or the like.

Figure 103:
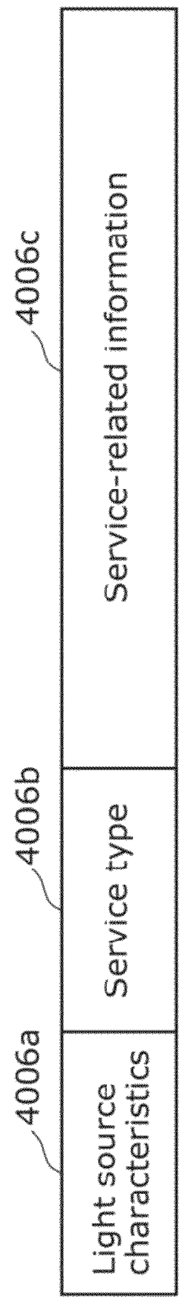
FIG. 103 is a diagram illustrating a format example of a signal included in a light source emitted from a transmitter in Embodiment 3.

FIG. 103 is a diagram illustrating a format example of a signal included in a light source emitted from a transmitter. Light source characteristics 4006*a*, a service type 4006*b*, and service-related information 4006*c* are illustrated in FIG. 103.

The information 4006*c* related to the service of superimposing the signal received by the receiver on the camera is the result of filtering the information obtainable from the signal according to the information such as the service type 4006*b* included in the signal transmitted from the transmitter and the distance from the camera to the light source. The information to be filtered by the receiver may be determined according to settings made in the receiver beforehand or user preference set in the receiver by the user.

The receiver can estimate the distance to the transmitter transmitting the signal, and display the distance to the light source. The receiver estimates the distance to the transmitter, by performing digital signal processing on the intensity of light emitted from the transmitter captured by the camera.

However, since the intensity of light of each transmitter captured by the camera of the receiver is different depending on the position or strength of the light source, significant deviation may be caused if the distance is estimated only by the intensity of light of the captured transmitter.

To solve this, the light source characteristics 4006*a* indicating the intensity, color, type, and the like of the light source are included in the signal transmitted from the transmitter. By performing digital signal processing while taking into account the light source characteristics included in the signal, the receiver can estimate the distance with high accuracy. In the case where a plurality of light sources are captured by the receiver, if all light sources have the same intensity, the distance is estimated using the intensity of light of the light source. If there is a transmitter of different intensity out of the light sources captured by the receiver, the distance from the transmitter to the receiver is estimated by not only using the light source amount but also using other distance measurement means in combination.

As the other distance measurement means, the distance may be estimated by using the parallax in image captured by a twin-lens camera, by using an infrared or millimeter wave radar, or by obtaining the moving amount of the receiver by a 9-axis sensor or an image sensor in the receiver and combining the moving distance with triangulation.

Note that the receiver may not only filter and display the signal using the strength or distance of the signal transmitted from the transmitter, but also adjust the directivity of the signal received from the transmitter.

Embodiment 4

Figure 104:
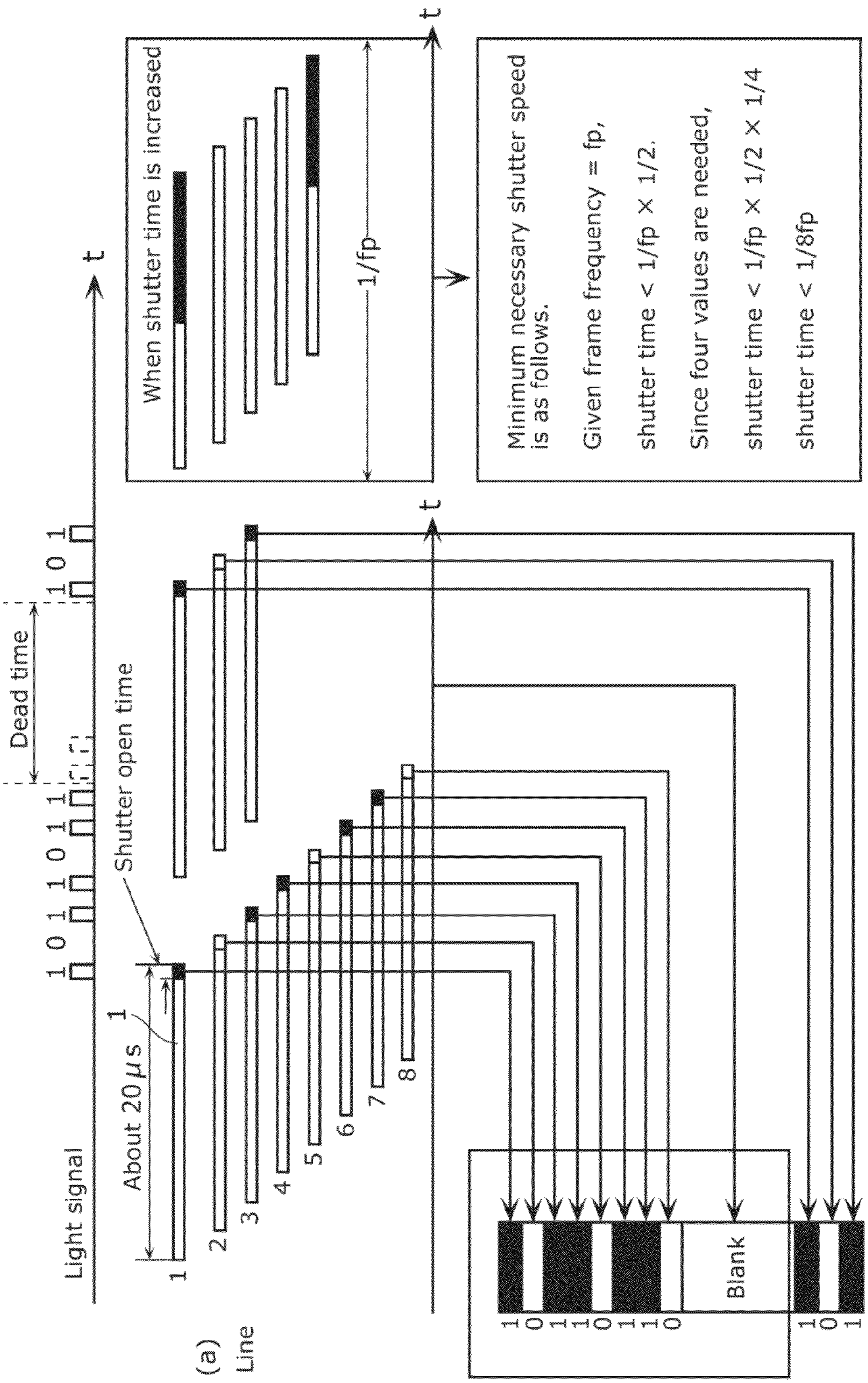
FIG. 104 is a diagram illustrating a principle in Embodiment 4.

FIG. 104 is a diagram illustrating a principle in Embodiment 4. FIGS. 105 to 117 are each a diagram illustrating an example of operation in Embodiment 4.

An image sensor illustrated in (a) in FIG. 104 has a delay in exposure time of each line 1. At a normal shutter speed, the lines have temporally overlapping parts, and so the light signal of the same time is mixed in each line and cannot be identified. When decreasing the shutter open time, no overlap occurs as in (a) in FIG. 104 if the exposure time is reduced to less than or equal to a predetermined shutter speed, as a result of which the light signal can be temporally separated and read on a line basis.

When the light signal "1011011" as in the upper part of (a) in FIG. 104 is given in this state, the first light signal "1" enters in the shutter open time of line 1 and so is photoelectrically converted in line 1, and output as "1" of an electrical signal 2a in (b) in FIG. 104. Likewise, the next light signal "0" is output as the electrical signal "0" in (b). Thus, the 7-bit light signal "1011011" is accurately converted to the electrical signal.

In actuality, there is a dead time due to a vertical blanking time as in (b) in FIG. 104, so that the light signal in some time slot cannot be extracted. In this embodiment, this blanking time problem is solved by changing, when switching from "normal imaging mode" to "light signal reading mode", the access address of the imaging device such as CMOS to read the first read line 1a following the last read line 1h at the bottom. Though this has a slight adverse effect on the image quality, an advantageous effect of capable of continuous (seamless) reading can be achieved, which contributes to significantly improved transmission efficiency.

In this embodiment, one symbol at the maximum can be assigned to one line. In the case of employing the below-mentioned synchronization method, transmission of 30 kbps at the maximum is theoretically possible when using an imaging element of 30 fps and 1000 lines.

Figure 105:
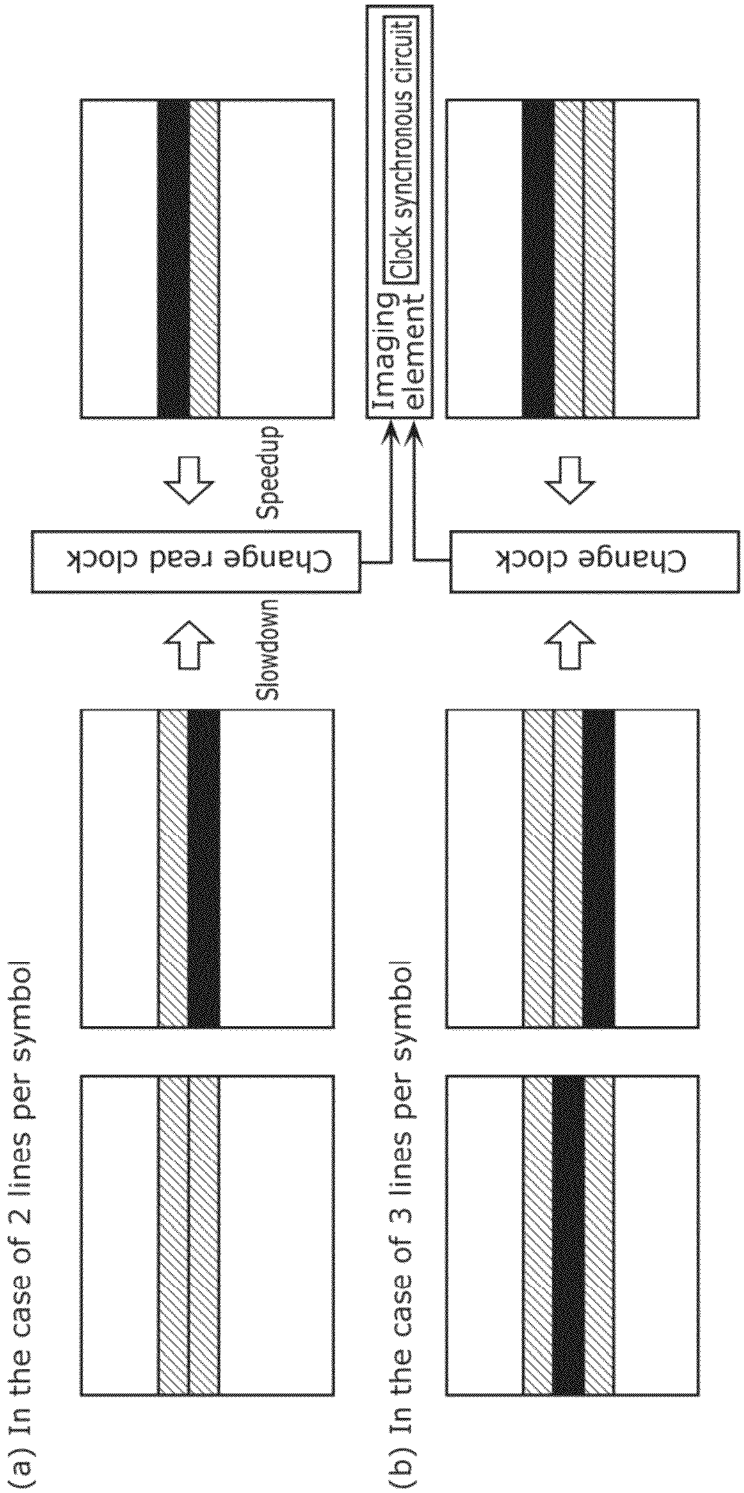
FIG. 105 is a diagram illustrating an example of operation in Embodiment 4.

Note that synchronization can be established by, with reference to the signal of the light receiving element of the camera as in FIG. 105, vertically changing the line access clock so as to attain the maximum contrast or reduce the data error rate. In the case where the line clock of the image sensor is faster than the light signal, synchronization can be established by receiving one symbol of the light signal in n lines which are 2 or 3 lines as in FIG. 105.

Figure 106:
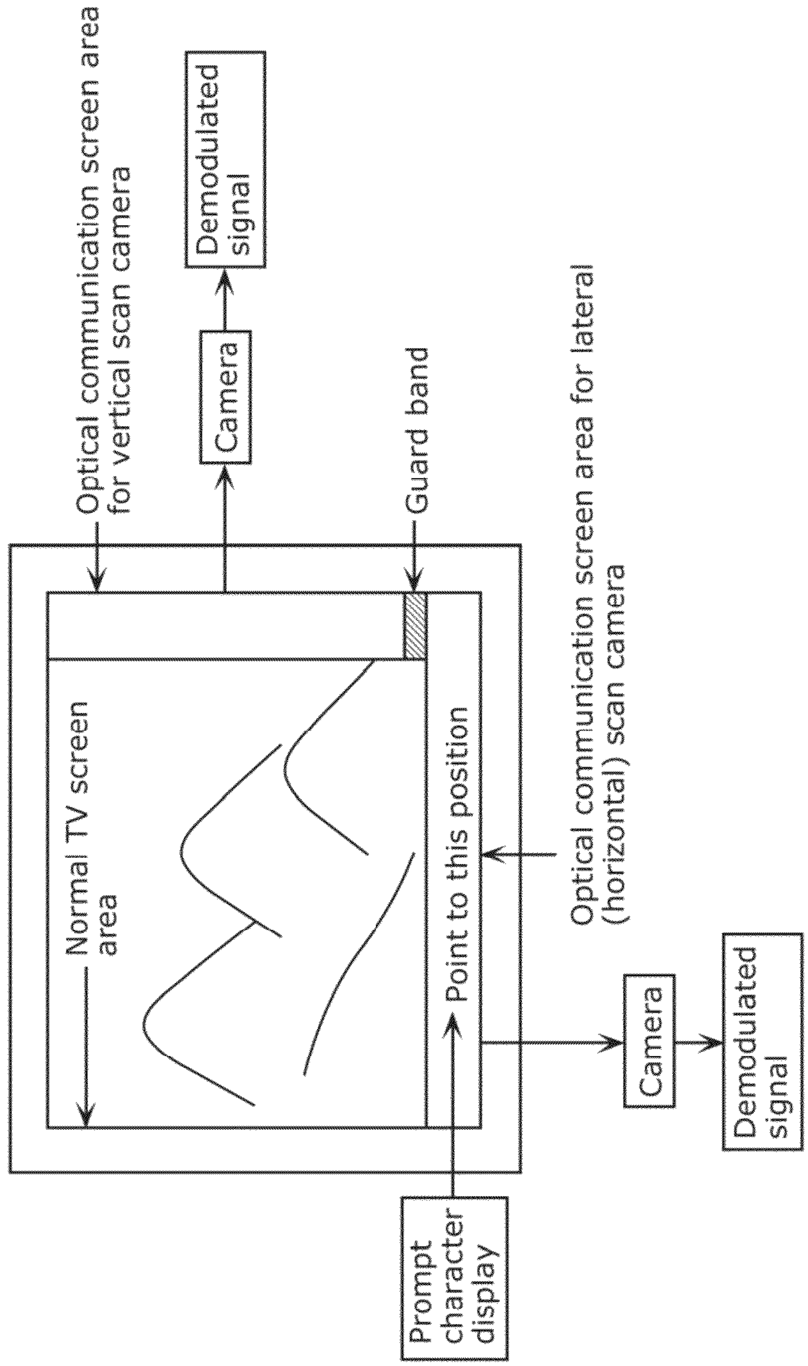
FIG. 106 is a diagram illustrating an example of operation in Embodiment 4.
Figure 107:
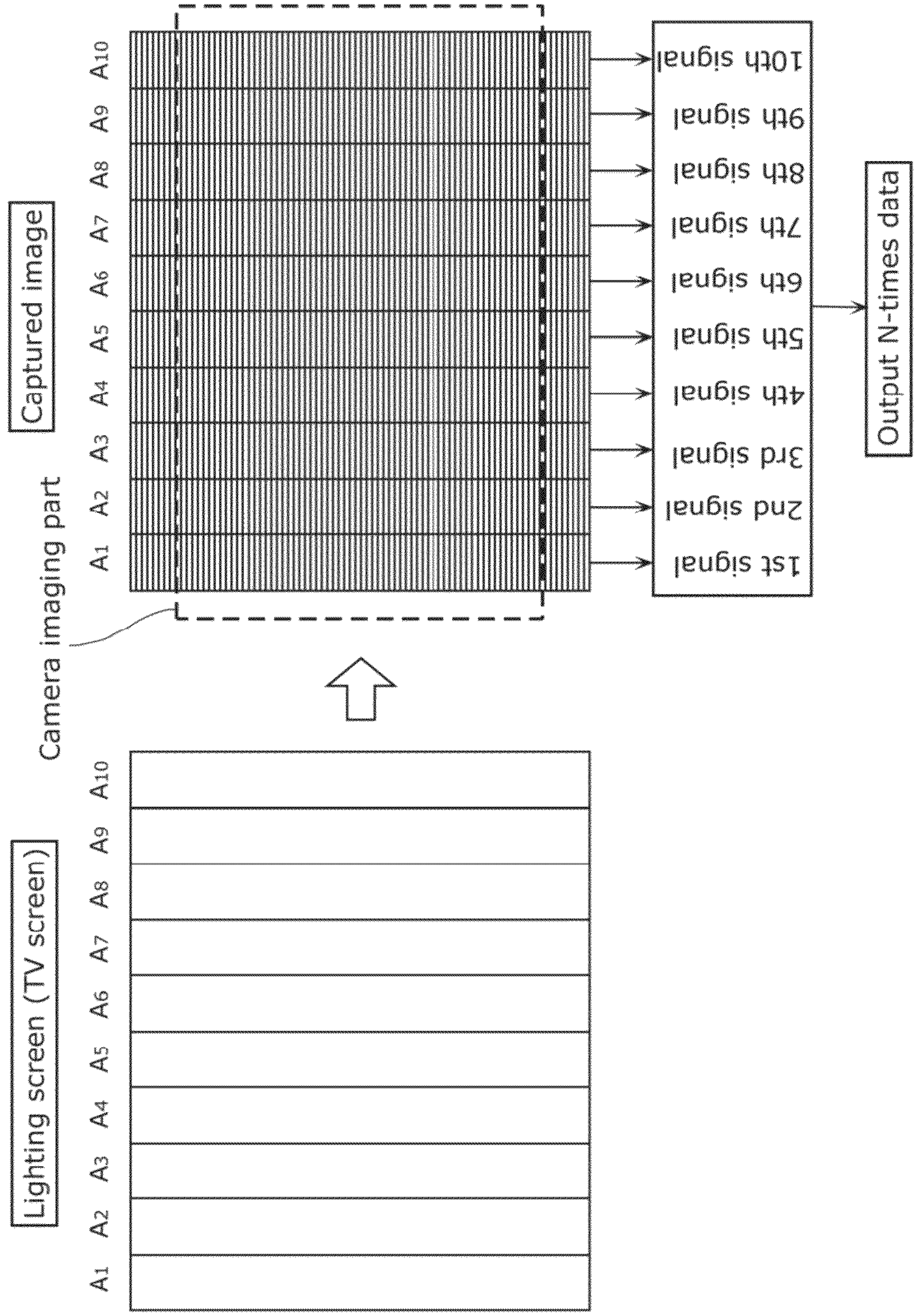
FIG. 107 is a diagram illustrating an example of operation in Embodiment 4.

Moreover, when a display of a TV in FIG. 106 or a TV in the left part of FIG. 107 or a light source vertically divided into n which is 10 as an example is captured by the camera of the mobile phone by switching to the detection mode of non-blanking, high-speed electronic shutter, and the like according to the present disclosure, ten stripe patterns specific to this embodiment can be detected independently of each other as in the right part of FIG. 107. Thus, a 10-times (n-times) transfer rate can be achieved.

For example, dividing an image sensor of 30 fps and 1000 lines into 10 results in 300 kbps. In HD video, there are 1980 pixels in the horizontal direction, so that the division into 50 is possible. This yields 1.5 Mbps, enabling reception of video data. If the number is 200, HD video can be transmitted.

To achieve the advantageous effects in this embodiment, it is necessary to decrease the shutter time to less than or equal to $T_0$ where $T_0$ is the detectable longest exposure time. As in the upper right part of FIG. 104, the shutter time needs to be less than or equal to half of 1/fp where fp is the frame frequency, for the following reason. Blanking during imaging is half of one frame at the maximum. That is, the blanking time is less than or equal to half of the imaging time. The actual imaging time is therefore ½fp at the shortest.

However, 4-value PPM or the like is necessary to suppress flicker, so that the shutter time is less than or equal to 1/1(fp×2×4), i.e. ⅛fp. Since the camera of the mobile phone typically has fp=30, 60, by setting the shutter speed less than or equal to 1/240, 1/480, i.e. the shutter speed less than or equal to 1/480, visible light communication according to this embodiment can be received using the camera of the mobile phone or the like while maintaining compatibility.

There are actually a large number of mobile phones that do not employ the synchronization method according to this embodiment, and so asynchronous communication is initially performed. In this case, by receiving one symbol using scan lines greater than or equal to 2 times the clock of the light signal, in more detail, 2 to 10 times the clock of the light signal, compatible communication can be realized though with a decrease in information rate.

In the case of a lighting device in which flicker needs to be suppressed, light emission is performed by turning OFF or reducing light during one time slot of 4-value PPM, i.e. one time slot of four bits. In this case, though the bitrate decreases by half, flicker is eliminated. Accordingly, the device can be used as a lighting device and transmit light and data.

Figure 108:
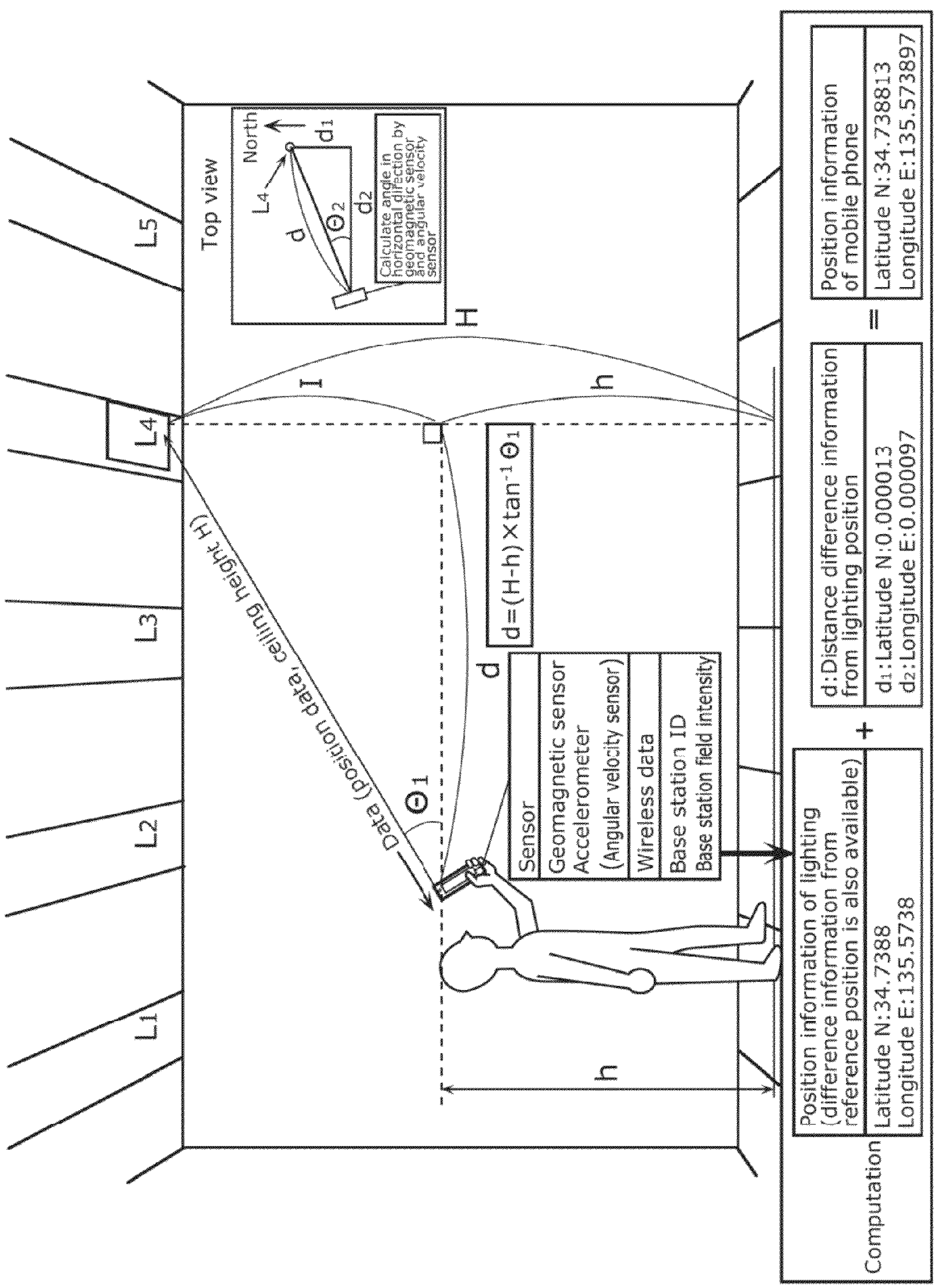
FIG. 108 is a diagram illustrating an example of operation in Embodiment 4.

FIG. 108 illustrates a situation of light signal reception in a state where all lightings indoors transmit a common signal during a common time slot and an individual lighting $L_4$ transmits individual sub-information during an individual time slot. $L_4$ has a small area, and so takes time to transmit a large amount of data. Hence, only an ID of several bits is transmitted during the individual time slot, while all of $L_1$, $L_2$, $L_3$, $L_4$, and $L_5$ transmit the same common information during the common time slot.

Figure 109A:
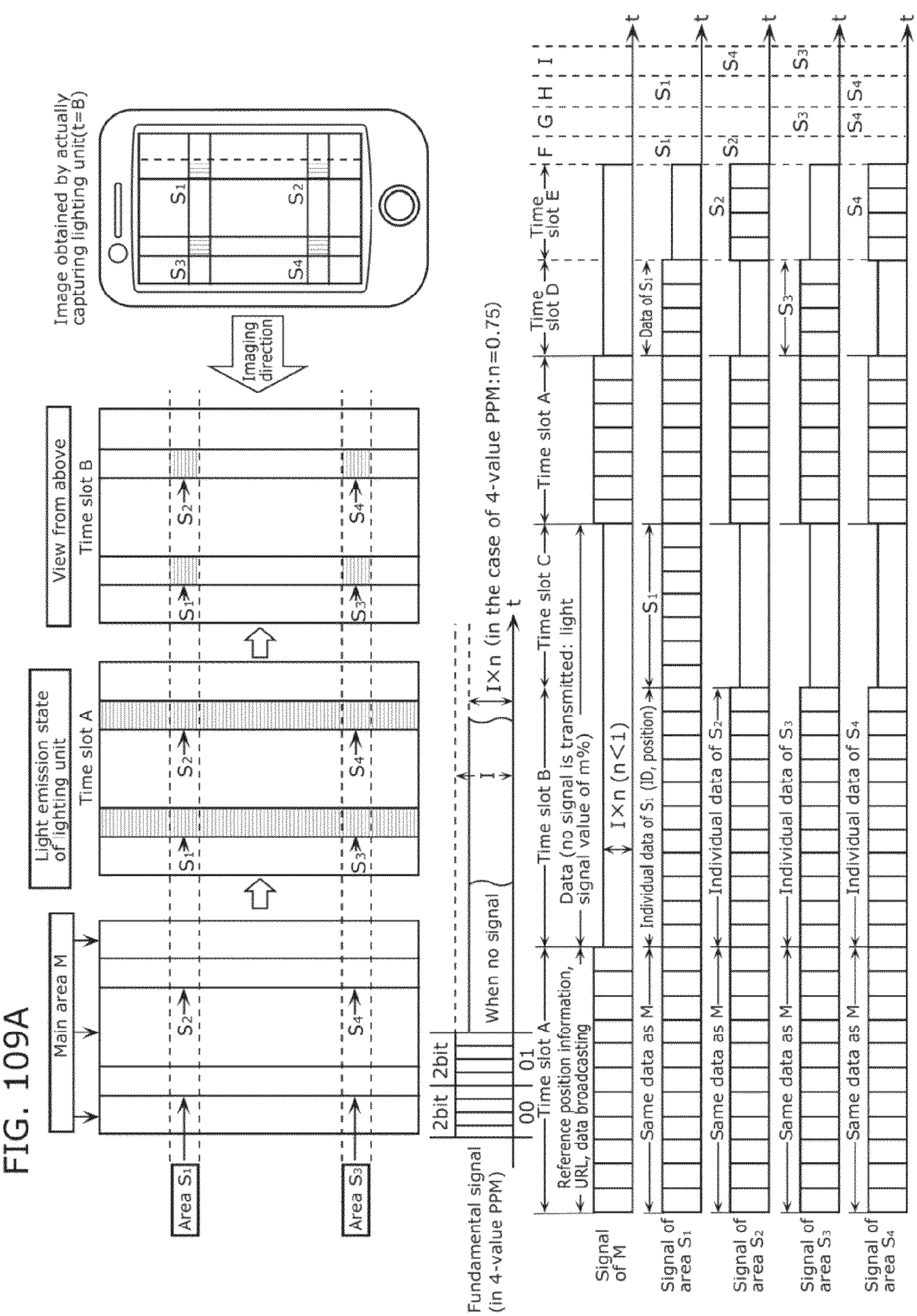
FIG. 109A is a diagram illustrating an example of operation in Embodiment 4.

This is described in detail, with reference to FIG. 109A. In time slot A in the lower part of FIG. 109A, two lightings in a main area M which are all lightings in a room and $S_1$, $S_2$, $S_3$, and $S_4$ at parts of the lightings transmit the same light signal simultaneously, to transmit common information "room reference position information, arrangement information of individual device of each ID (difference position information from reference position), server URL, data broadcasting, LAN transmission data". Since the whole room is illuminated with the same light signal, there is an advantageous effect that the camera unit of the mobile phone can reliably receive data during the common time slot.

In time slot B, on the other hand, the main area M does not blink but continuously emits light with 1/n of the normal light intensity, as illustrated in the upper right part of FIG. 109A. In the case of 4-value PPM, the average light intensity is unchanged when emitting light with ¾, i.e. 75%, of the normal light intensity, as a result of which flicker can be prevented. Blinking in the range where the average light intensity is unchanged causes no flicker, but is not preferable because noise occurs in the reception of the partial areas $S_1$, $S_2$, $S_3$, and $S_4$ in time slot B. In time slot B, $S_1$, $S_2$, $S_3$, and $S_4$ each transmit a light signal of different data. The main area M does not transmit a modulated signal, and so is separated in position as in the screen of the mobile phone in the upper right part of FIG. 109A. Therefore, for example in the case of extracting the image of the area $S_1$, stripes appearing in the area can be easily detected because there is little noise, with it being possible to obtain data stably.

Figure 109B:
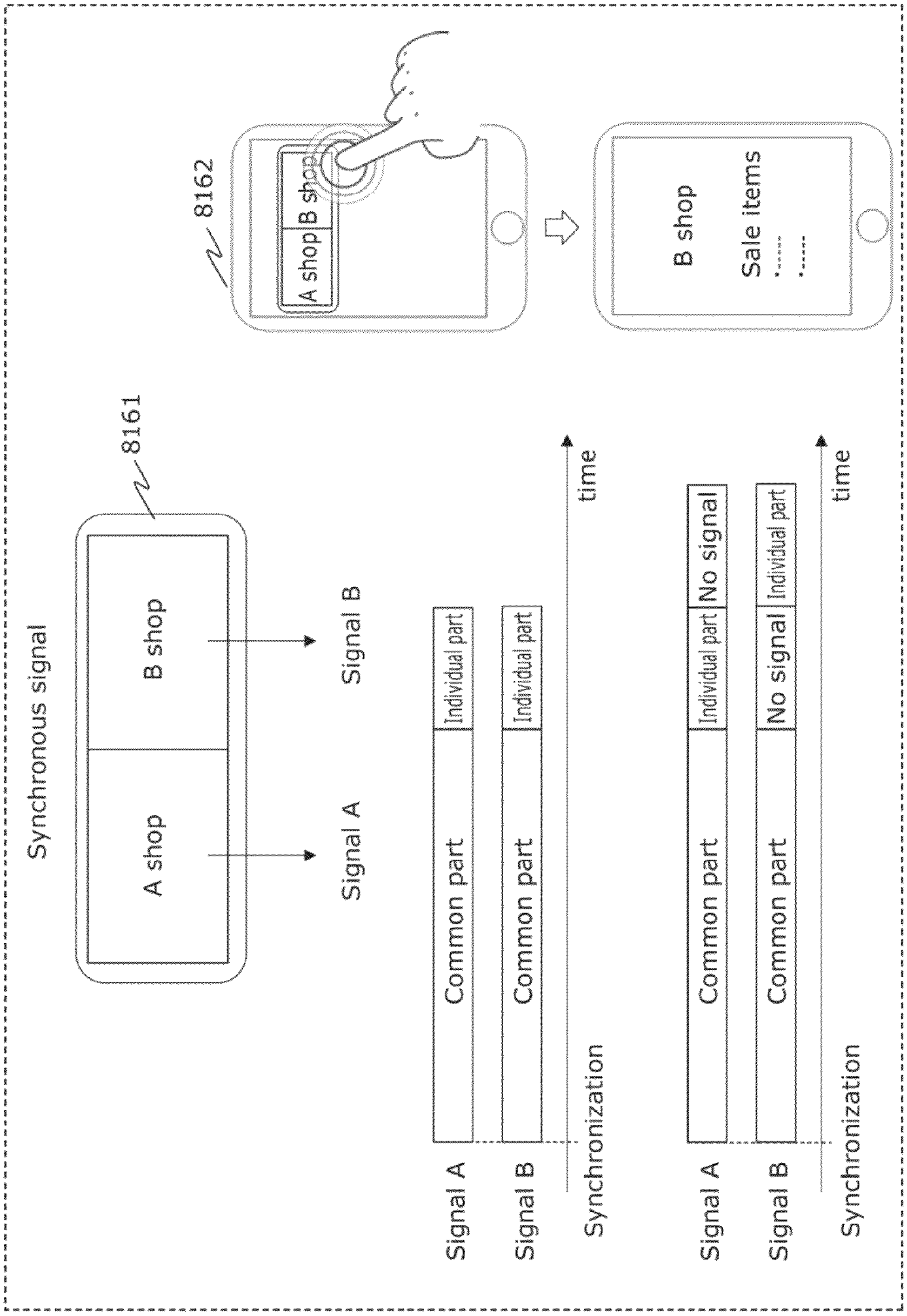
FIG. 109B is a diagram illustrating an example of operation in Embodiment 4.

FIG. 109B is a diagram for describing operation of a transmitter and a receiver in this embodiment.

A transmitter 8161 such as a signage changes luminance of an area A showing "A shop" and an area B showing "B shop". As a result, signals A and B are transmitted from the respective areas. For example, each of the signals A and B includes a common part indicating common information and an individual part indicating different information. The common parts of the signals A and B are transmitted simultaneously. Having received at least one of the common parts of the signals A and B, a receiver 8162 displays an image of the entire signage. The transmitter may transmit the individual parts of the signals A and B simultaneously or at different times. For example, having received the individual part of the signal B, the receiver 8162 displays detailed shop information or the like corresponding to the area B.

Figure 109C:
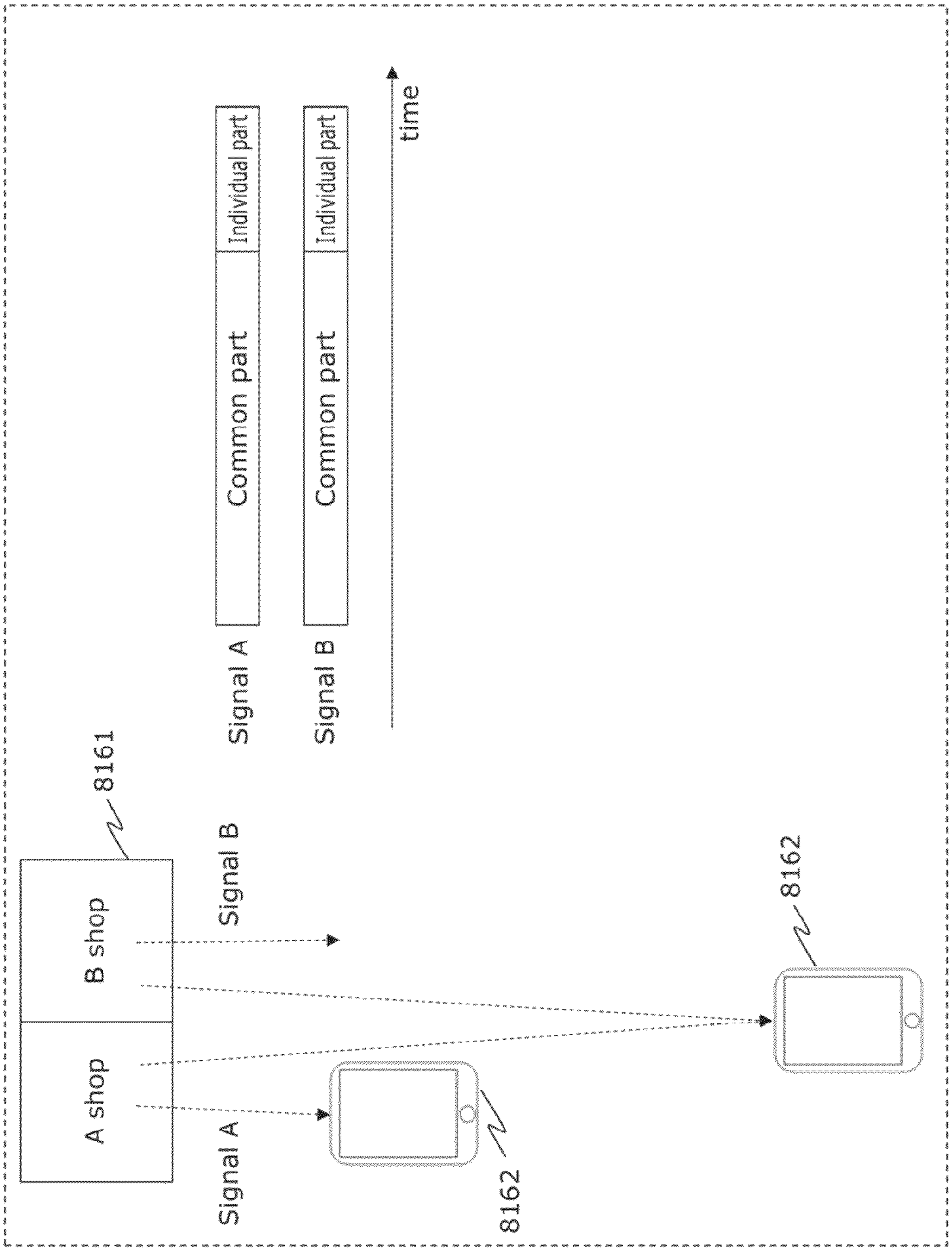

FIG. 109C is a diagram for describing operation of a transmitter and a receiver in this embodiment.

For example, the transmitter 8161 transmits the common parts of the signals A and B simultaneously as mentioned above, and then transmits the individual parts of the signals A and B indicating different information simultaneously. The receiver 8162 receives the signals from the transmitter 8161, by capturing the transmitter 8161.

When the transmitter 8161 is transmitting the common parts of the signals A and B, the transmitter 8161 can be captured as one large area without being divided into two areas. The receiver 8162 can accordingly receive the common part, even when situated far from the transmitter 8161. The receiver 8162 then obtains information associated with the common part from a server, and displays the information. For instance, the server transmits information of all shops shown on the signage which is the transmitter 8161, to the receiver 8162. Alternatively, the server selects information of an arbitrary shop from the shops, and transmits the selected information to the receiver 8162. The server transmits, for example, information of a shop that pays the largest registration fee of all shops, to the receiver 8162. As an alternative, the server transmits information of a shop corresponding to an area (area A or B) at the center of the range captured by the camera of the receiver 8162. As another alternative, the server randomly selects a shop, and transmits information of the shop to the receiver 8162.

In the case where the receiver 8162 is situated near the transmitter 8161, the receiver 8162 can receive the individual part of the signal A or B. The receiver 8162 then obtains information associated with the individual part, from the server.

Figure 110:
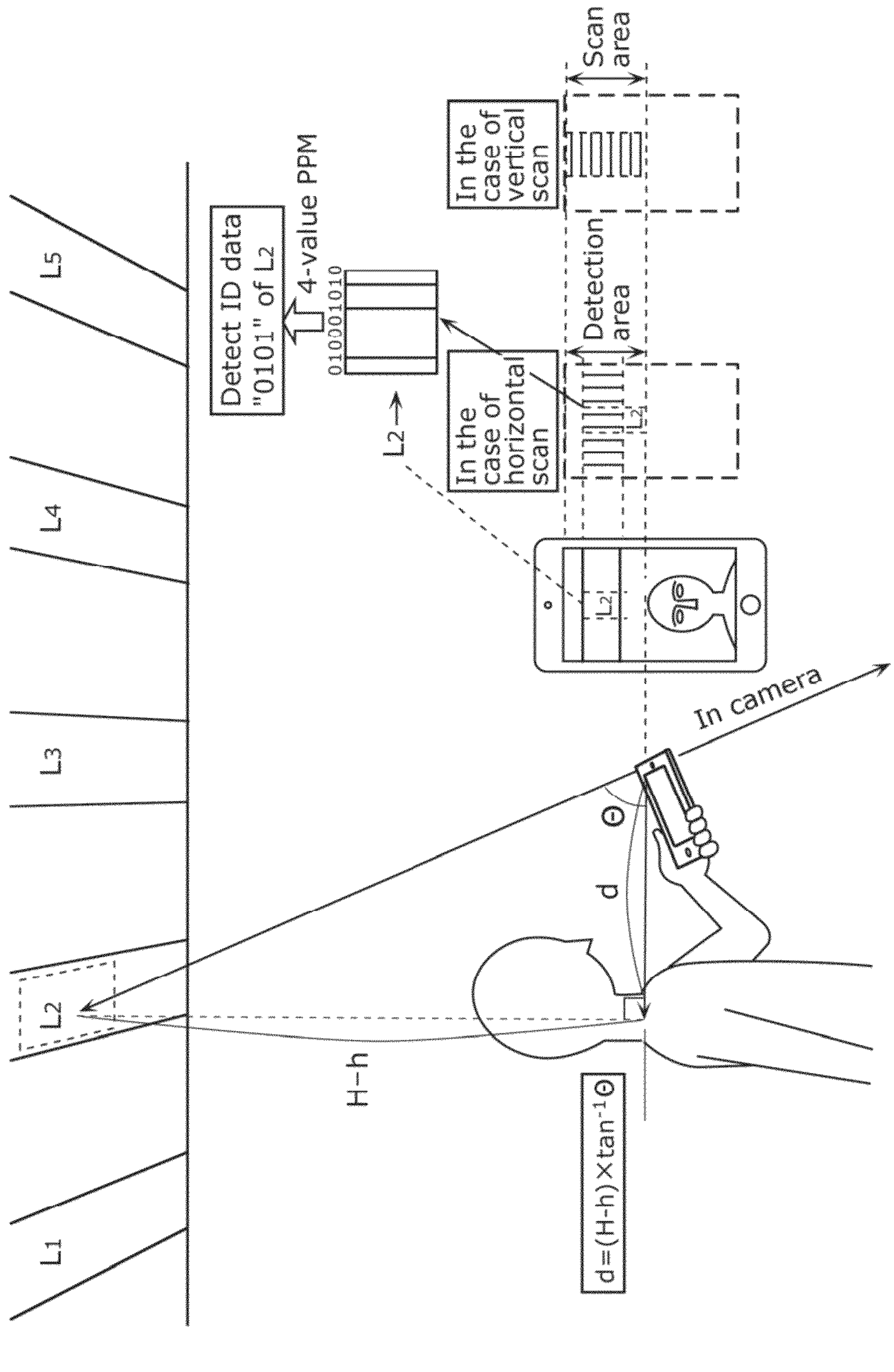

For instance, in the case of 4-value PPM, when the camera scans in the lateral direction (horizontal direction) as illustrated in FIG. 110, a lighting $L_2$ is captured by a face camera, and "0101", i.e. 4-bit data per frame, can be demodulated as a result of three stripes appearing as illustrated on the right side. ID data is included in this data. Accordingly, there is an advantageous effect that the position of the mobile terminal can be detected at high speed, i.e. in a short time, by computing the distance difference information between the reference position information of the common data and each ID of the individual data or the arrangement information of each ID of the individual data. Thus, for example, the data and positions of four light sources can be instantaneously recognized in one frame information, merely by transmitting 2-bit ID information.

An example of using low-bit ID information of individual light sources is described below, with reference to FIG. 111.

Figure 111:
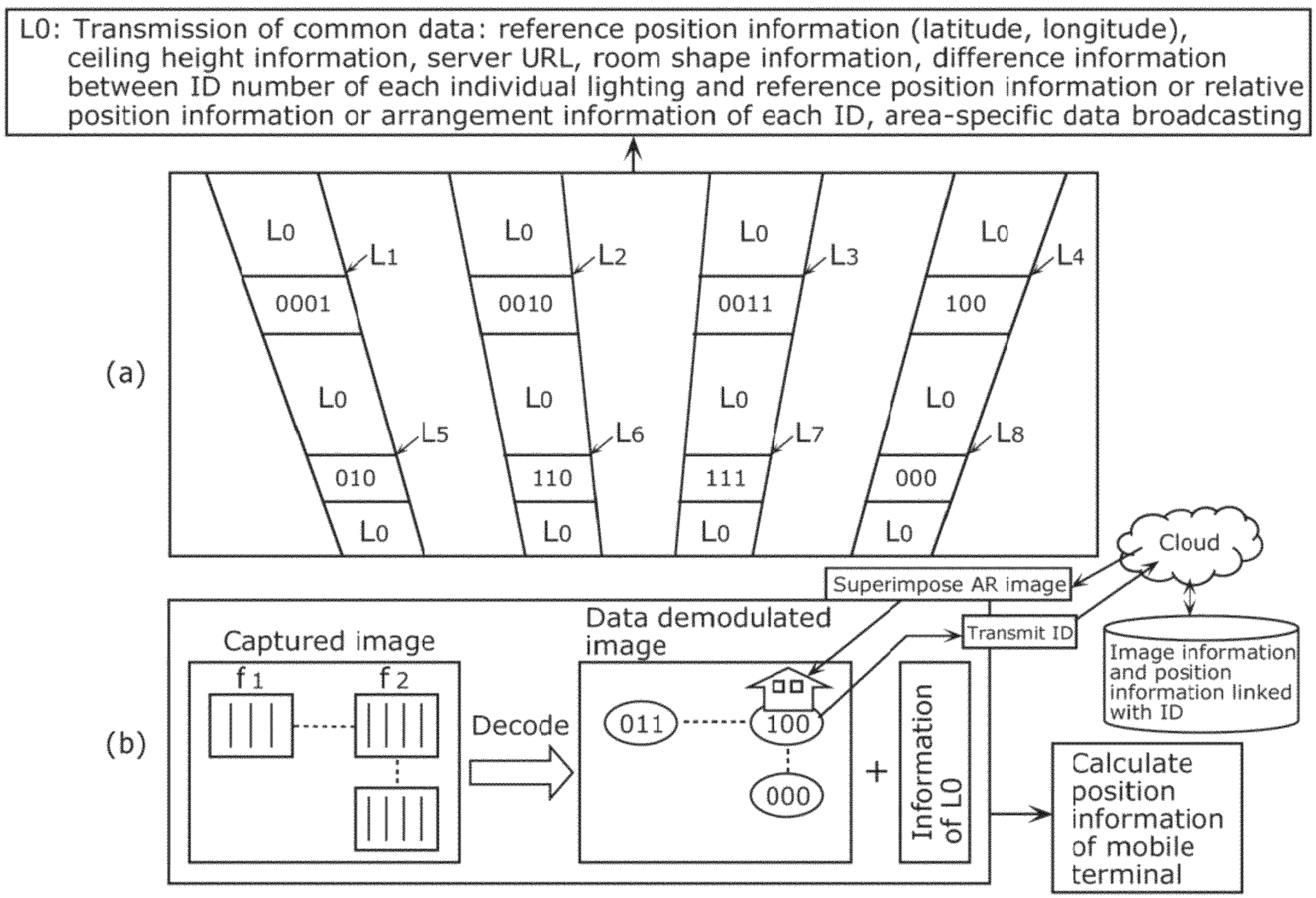

In this embodiment, in common data 101 in FIG. 111, a large amount of data including a reference position, a server URL, arrangement information of each ID, and area-specific data broadcasting are transmitted in a common time slot using all lightings as illustrated.

Individual IDs of $L_1$, $L_2$, $L_3$, and $L_4$ to $L_8$ in (a) in FIG. 111 can be 3-bit demodulated as mentioned earlier.

As illustrated in (b) in FIG. 111, by transmitting signals of a frequency f1 and a frequency f2, too, one or more stripes that are specific to the present disclosure are detected in each lighting unit and converted to ID data corresponding to the frequency or ID data corresponding to the modulated data. Computing this pattern using the arrangement information makes it possible to recognize from which position the image is captured. That is, the position of the terminal can be specified as the arrangement information of each ID and the reference position information can be obtained from $L_0$.

In (b) in FIG. 111, by assigning the frequencies f1 and f2 to IDs and setting, for example, f1=1000 Hz, f2=1100 Hz, . . . , f16=2500 Hz, a hexadecimal value, i.e. a 4-bit value, can be expressed by the frequency. Changing the transmission frequency at predetermined time intervals enables more signals to be transmitted. When changing the frequency or starting/ending the modulation, the average luminance is kept constant before and after the change. This has an advantageous effect of causing no flicker perceivable by the human eye.

Note that, since the receiver detects frequencies from signal periods, reception errors can be reduced by assigning signals so that the inverses or logarithms of frequencies are at regular intervals, rather than by assigning frequencies to signals at regular intervals.

For example, changing the signal per 1/15 second enables transmission of 60 bits per second. A typical imaging device captures 30 frames per second. Accordingly, by transmitting the signal at the same frequency for 1/15 second, the transmitter can be reliably captured even if the transmitter is shown only in one part of the captured image.

Moreover, by transmitting the signal at the same frequency for 1/15 second, the signal can be received even in the case where the receiver is under high load and unable to process some frame or in the case where the imaging device is capable of capturing only 15 frames per second.

When frequency analysis is conducted by, for example, Fourier transforming the luminance in the direction perpendicular to the exposure lines, the frequency of the transmission signal appears as a peak. In the case where a plurality of frequencies, as in a frequency change part, are captured in one frame, a plurality of peaks weaker than in the case of Fourier transforming the single frequency signal are obtained. The frequency change part may be provided with a protection part so as to prevent adjacent frequencies from being mixed with each other.

According to this method, the transmission frequency can be analyzed even in the case where light transmitted at a plurality of frequencies in sequence is captured in one frame, and the transmission signal can be received even when the frequency of the transmission signal is changed at time intervals shorter than 1/15 second or 1/30 second.

The transmission signal sequence can be recognized by performing Fourier transform in a range shorter than one frame. Alternatively, captured frames may be concatenated to perform Fourier transform in a range longer than one frame. In this case, the luminance in the blanking time in imaging is treated as unknown. The protection part is a signal of a specific frequency, or is unchanged in luminance (frequency of 0 Hz).

In (b) in FIG. 111, the FM modulated signal of the frequency f2 is transmitted and then the PPM modulated signal is transmitted. As a result of alternately transmitting the FM modulated signal and the PPM modulated signal in this way, even a receiver that supports only one of the methods can receive the information. Besides, more important information can be transmitted with higher priority, by assigning the more important information to the FM modulated signal which is relatively easy to receive.

In this embodiment, since the ID of each device and its position on the screen are simultaneously obtained, it is possible to download image information, position information, and an application program linked with each ID of the lighting in a database of a cloud server at an URL linked with the lighting, and superimpose and display an image of a related product or the like on the video of the device having the lighting of the ID according to AR. In such a case, switching the demodulation mode to the imaging mode in this embodiment produces an advantageous effect that an AR image superimposed on beautiful video can be attained.

As illustrated in FIG. 108, by transmitting distance difference d in east, west, south, and north between the light source of each ID and the reference position in time slot A, the accurate position of the lighting $L_4$ in cm is known. Next, height h is calculated from ceiling height H and the height of the user of the mobile phone, and the orientation information of the mobile phone is corrected using a 9-axis sensor, to obtain accurate camera direction angle θ2 and angle θ1 between the lighting and the mobile phone. d is calculated according to, for example, $d=(H-h)\times\arctan\cdot\theta 1$.

The position of the mobile phone can be calculated with high accuracy in this way. By transmitting the common light signal in time slot A and the individual light signal in time slot B, an advantageous effect of ensuring that the large amount of common information and the small amount of individual information such as IDs are substantially simultaneously transmitted can be achieved.

The individual light sources $S_1$ to $S_4$ are captured as in the mobile terminal in the upper light part of FIG. 109A. As illustrated in the time chart in the lower part of FIG. 109A, only $S_1$ transmits the light signal in time C. There is an advantageous effect that the detection can be made without influence of noise, because only one stripe appears as in t=C in FIG. 112.

Two pieces of individual data may be transmitted as in t=D, E. Transmitting most spatially separate individual data as in t=H, I has an advantageous effect of a reduction in error rate because they are easily separated on the screen.

Figure 112:
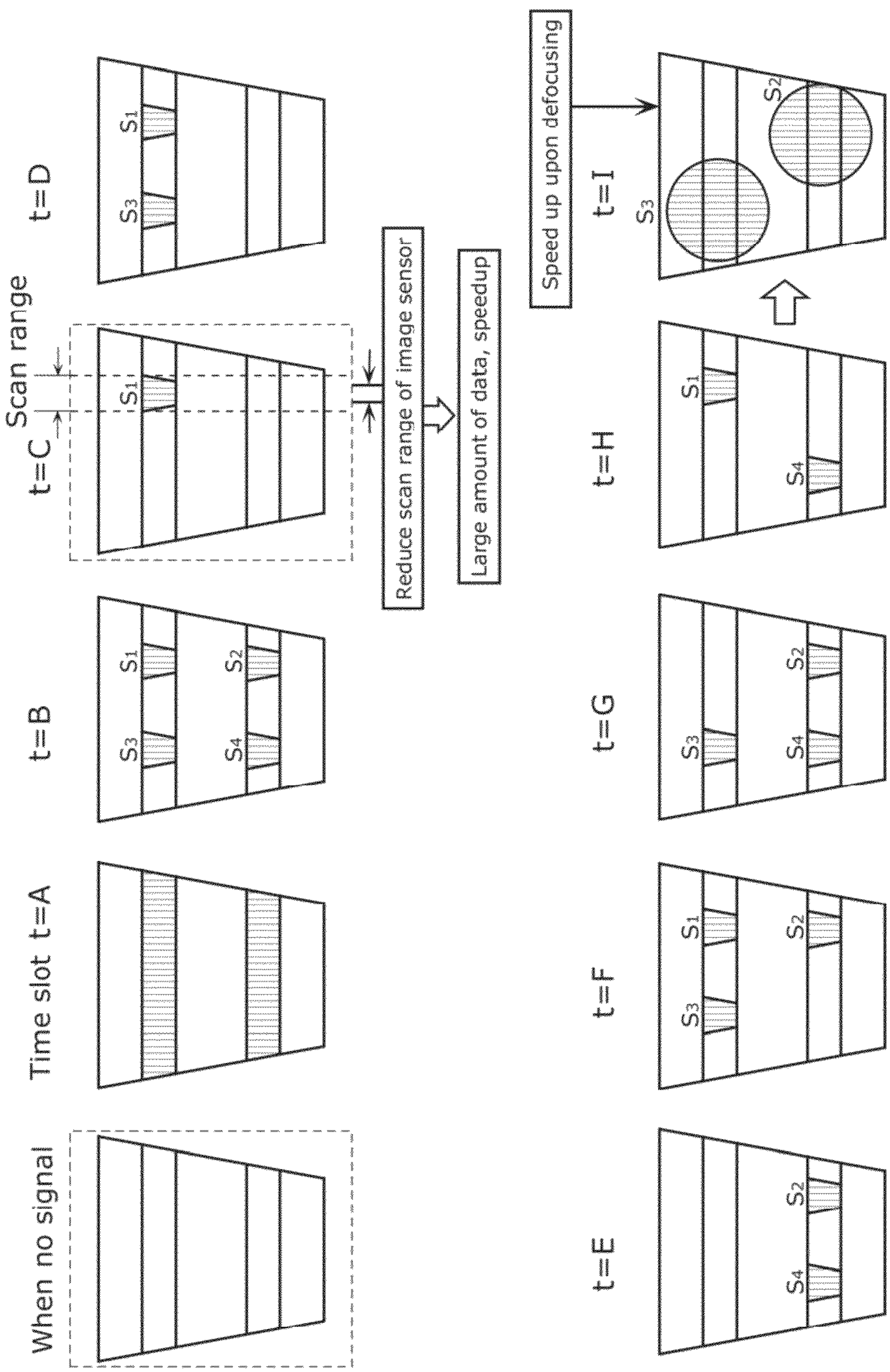

In t=C in FIG. 112, only $S_1$ needs to be demodulated, and accordingly the scan of the image sensor for the other areas is unnecessary. Hence, by reducing the number of scan lines so as to include the area of $S_1$ as in t=C, it is possible to scan only the area of $S_1$ and demodulate the data. This has an advantageous effect that not only a speedup can be achieved but also a large amount of data can be demodulated only in the narrow area of $S_1$.

In such a case, however, there is a possibility that the area $S_1$ deviates from the scan range of the image sensor due to hand movement.

Figure 113:
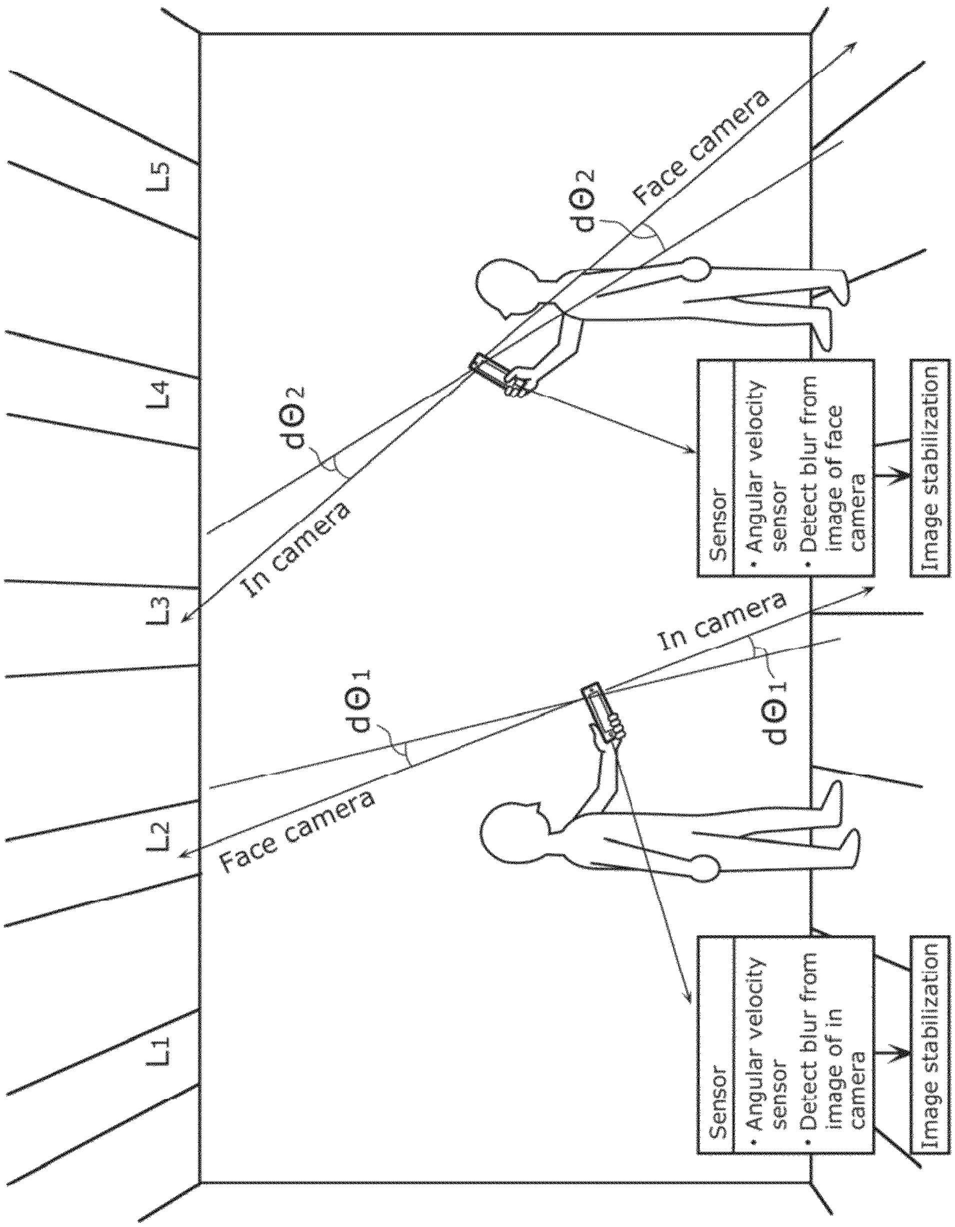

Hence, image stabilization as illustrated in FIG. 113 is important. The gyroscope included in the mobile phone is typically unable to detect fine rotation in a narrow range such as hand movement.

Accordingly, in the case of receiving the light signal of $L_2$ by the face camera as in the left part of FIG. 113, it is difficult to detect blur due to hand movement from the image captured by the face camera when, for example, the scan is limited. In view of this, the in camera is turned ON, and blur is detected from the image of the in camera to correct the scan range or the detection range. Thus, the effect of hand movement can be reduced. This is because the hand movement of the face camera and the hand movement of the in camera are the same.

When the shutter speed of the scan area other than the light signal pattern in the face camera is decreased and the normal image is obtained from this area, image stabilization can be performed using this image. In this case, blur detection and signal detection are possible with one camera. The same advantageous effect can be achieved in the case of using the in camera in the right part of FIG. 113.

Figure 114:
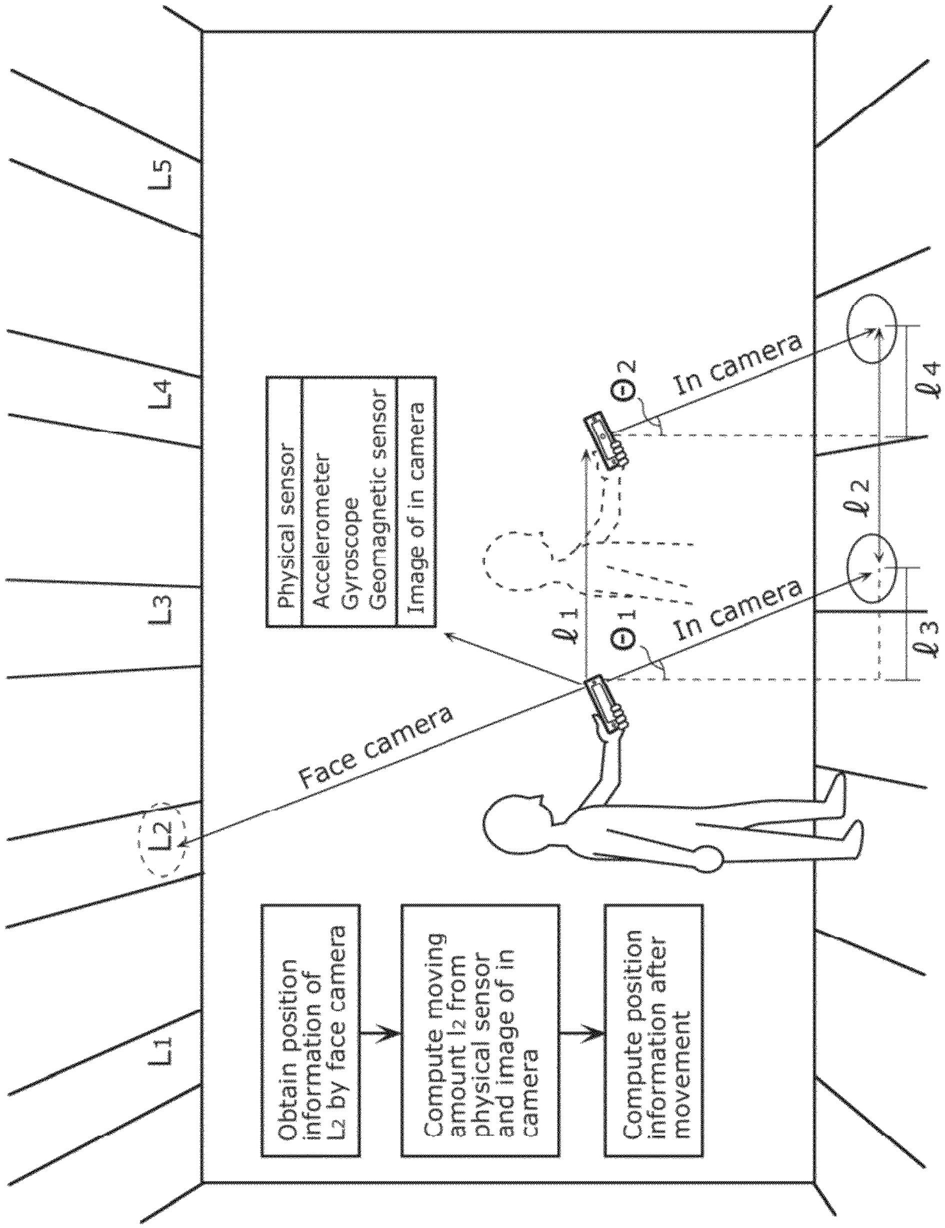

In FIG. 114, the light signal is detected by the face camera to first obtain the position information of the terminal.

In the case of calculating the moving distance $l_2$ from this point, the 9-axis sensor for the mobile phone is not useful because of poor accuracy. In such a case, the moving distance $l_2$ can be calculated from the orientation of the terminal and the change in the pattern of the floor surface using the in camera opposite to the face camera, as in FIG. 114. The pattern of the ceiling may be detected using the face camera.

Actual example of applications are described below.

Figure 115:
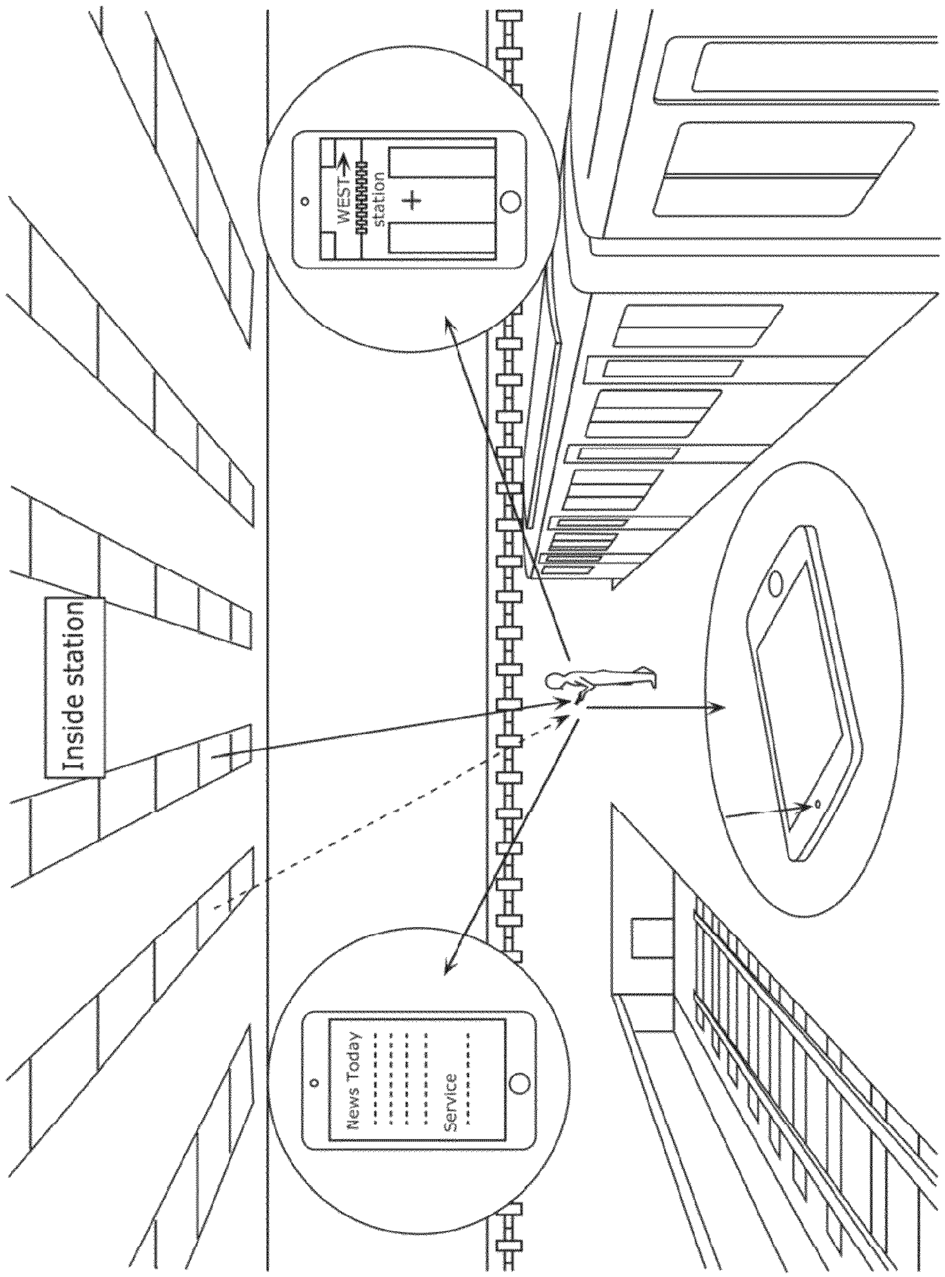

FIG. 115 is a diagram illustrating a situation of receiving data broadcasting which is common data from the ceiling lighting and obtaining the position of the user itself from individual data, inside a station.

Figure 116:
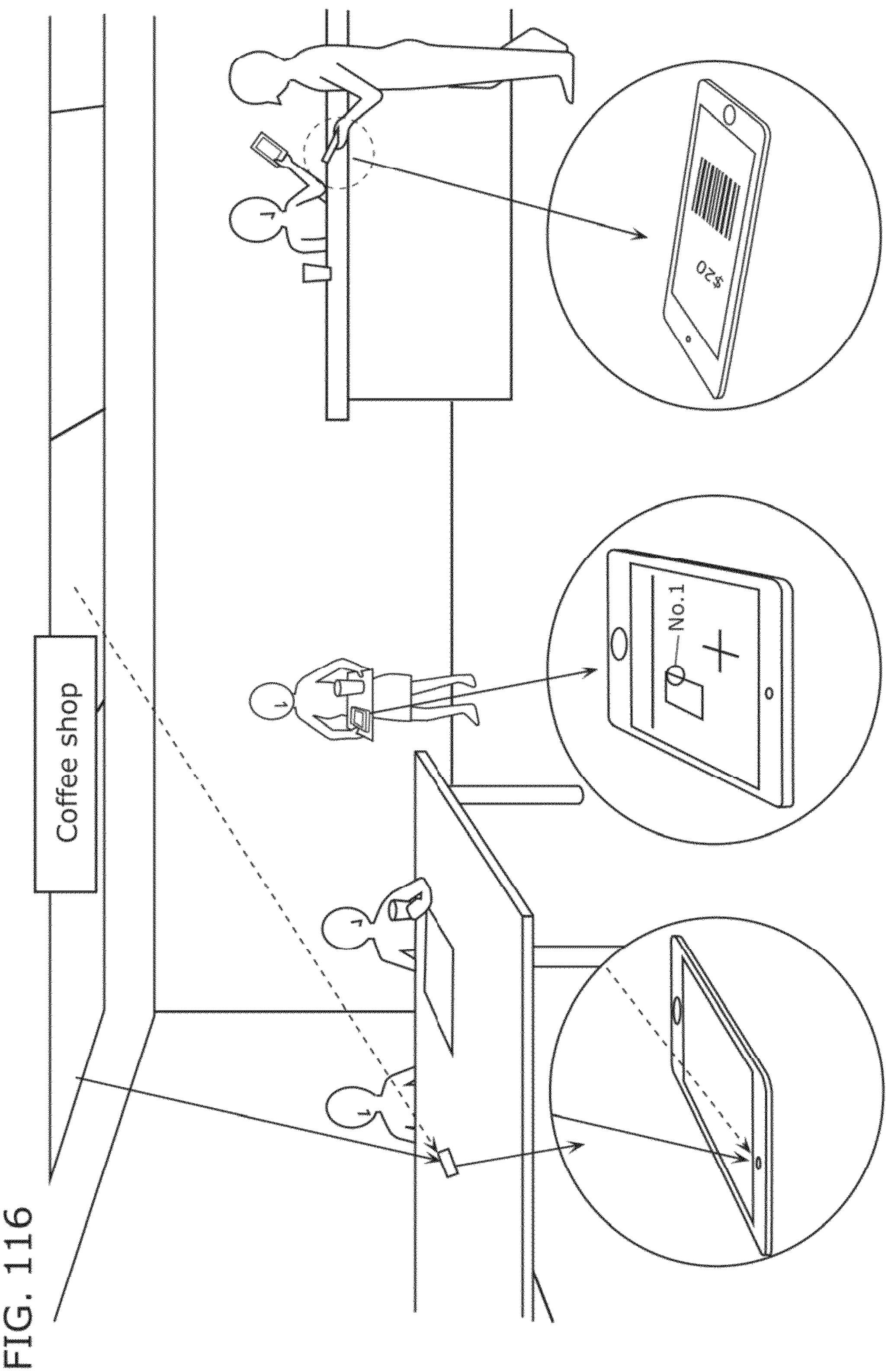

In FIG. 116, after a mobile terminal on which barcode is displayed displays authentication information and a terminal of a coffee shop reads the authentication information, a light emitting unit in the terminal of the shop emits light and the mobile terminal receives the light according to the present disclosure to perform mutual authentication. The security can be enhanced in this way. The authentication may be performed in reverse order.

The customer carrying the mobile terminal sits at a table and transmits obtained position information to the terminal of the shop via a wireless LAN or the like, as a result of which the position of the customer is displayed on the shop staff's terminal. This enables the shop staff to bring the ordered drink to the table of the position information of the customer ordering the drink.

Figure 117:
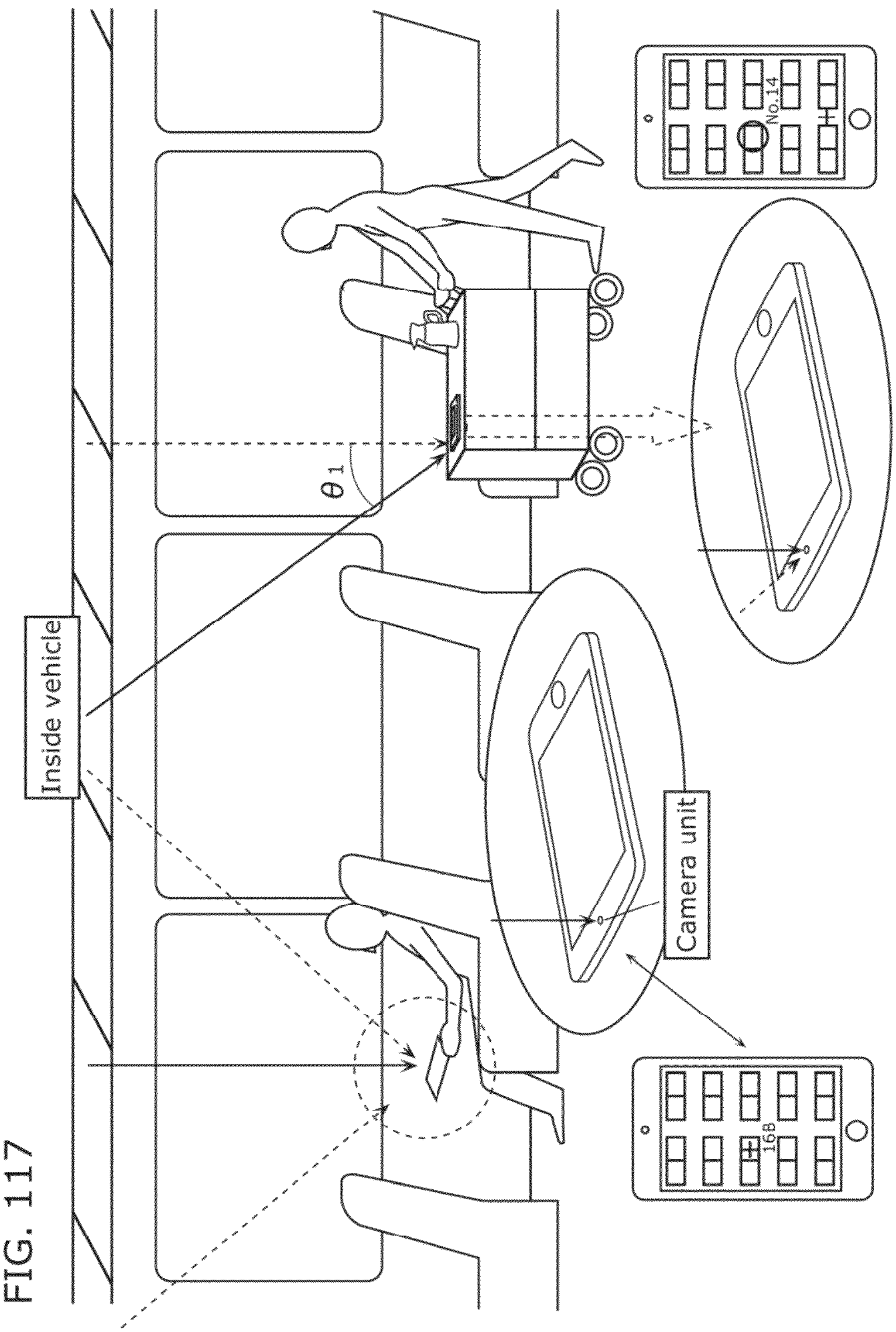

In FIG. 117, the passenger detects his or her position in a train or an airplane according to the method of this embodiment, and orders a product such as food through his/her terminal. The crew has a terminal according to the present disclosure on the cart and, since the ID number of the ordered product is displayed at the position of the customer on the screen, properly delivers the ordered product of the ID to the customer.

FIG. 107 is a diagram illustrating the case of using the method or device of this embodiment for a backlight of a display of a TV or the like. Since a fluorescent lamp, an LED, or an organic EL device is capable of low luminance modulation, transmission can be performed according to this embodiment. In terms of characteristics, however, the scan direction is important. In the case of portrait orientation as in a smartphone, the scan is horizontally performed. Hence, by providing a horizontally long light emitting area at the bottom of the screen and reducing the contrast of video of the TV or the like to be closer to white, there is an advantageous effect that the signal can be received easily.

In the case of scanning in the vertical direction as in a digital camera, a vertically long display is provided as in the right side of the screen in FIG. 106.

By providing these two areas in one screen and emitting the same light signal from both areas, the signal can be received by an image sensor of either scan direction.

In the case where a horizontal scan image sensor is receiving light of a vertical light emitting unit, a message such as "please rotate to horizontal" may be displayed on the terminal screen to prompt the user to receive the light more accurately and faster.

Note that the communication speed can be significantly increased by controlling the scan line read clock of the image sensor of the camera to synchronize with the light emission pattern of the light emitting unit as in FIG. 105.

In the case of detecting one symbol of the light emission pattern in 2 lines as in (a) in FIG. 105, synchronization is established in the pattern in the left part. In the pattern in the middle part, the image sensor reading is fast, so that the read clock of the imaging element is slowed down for synchronization. In the pattern in the right part, the read clock is speeded up for synchronization.

In the case of detecting one symbol in 3 lines as in (b) in FIG. 105, the read clock is slowed down in the pattern in the middle part, and speeded up in the pattern in the right part.

Thus, high speed optical communication can be realized.

In bidirectional communication, an infrared light receiving unit provided in the lighting device of the light emitting unit as a motion sensor may be used for reception, with it being possible to perform bidirectional reception in the lighting device with no additional component. The terminal may perform transmission using the electronic flash for the camera, or may be additionally provided with an inexpensive infrared light emitting unit. Thus, bidirectional communication is realized without significant component addition.

Embodiment 5

Signal Transmission by Phase Modulation

Figure 118:
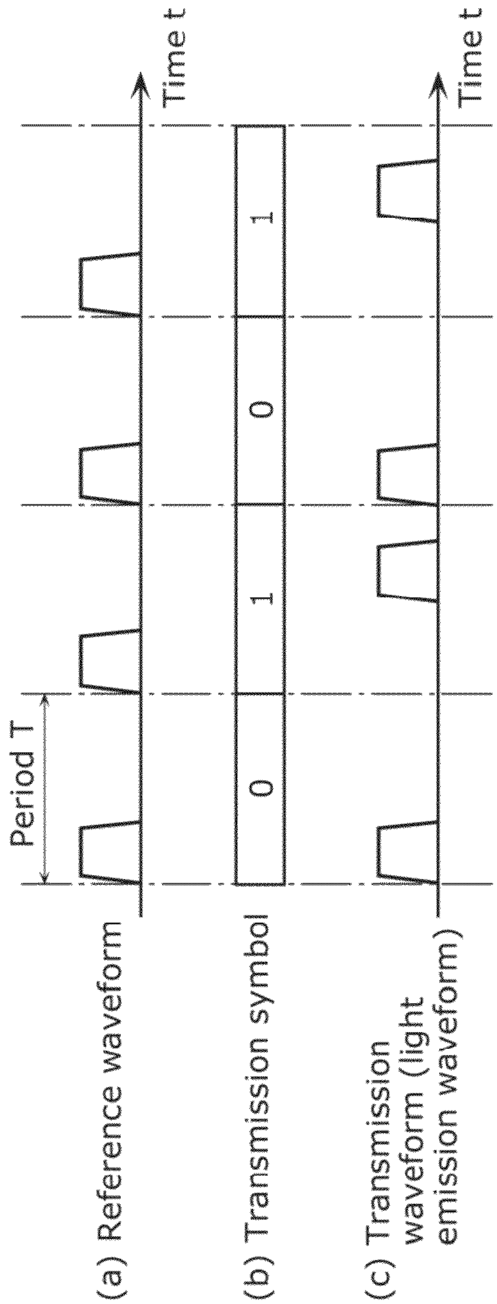

FIG. 118 is a timing diagram of a transmission signal in an information communication device in Embodiment 5.

In FIG. 118, a reference waveform (a) is a clock signal of period T, which serves as the reference for the timing of the transmission signal. A transmission symbol (b) represents a symbol string generated based on a data string to be transmitted. Here, the case of one bit per symbol is illustrated as an example, which is the same binary as the transmission data. A transmission waveform (c) is a transmission waveform phase-modulated according to the transmission symbol with respect to the reference waveform. The transmission light source is driven according to this waveform. The phase modulation is performed by phase-shifting the reference waveform in correspondence with the symbol. In this example, symbol 0 is assigned phase 0°, and symbol 1 is assigned phase 180°.

Figure 119:
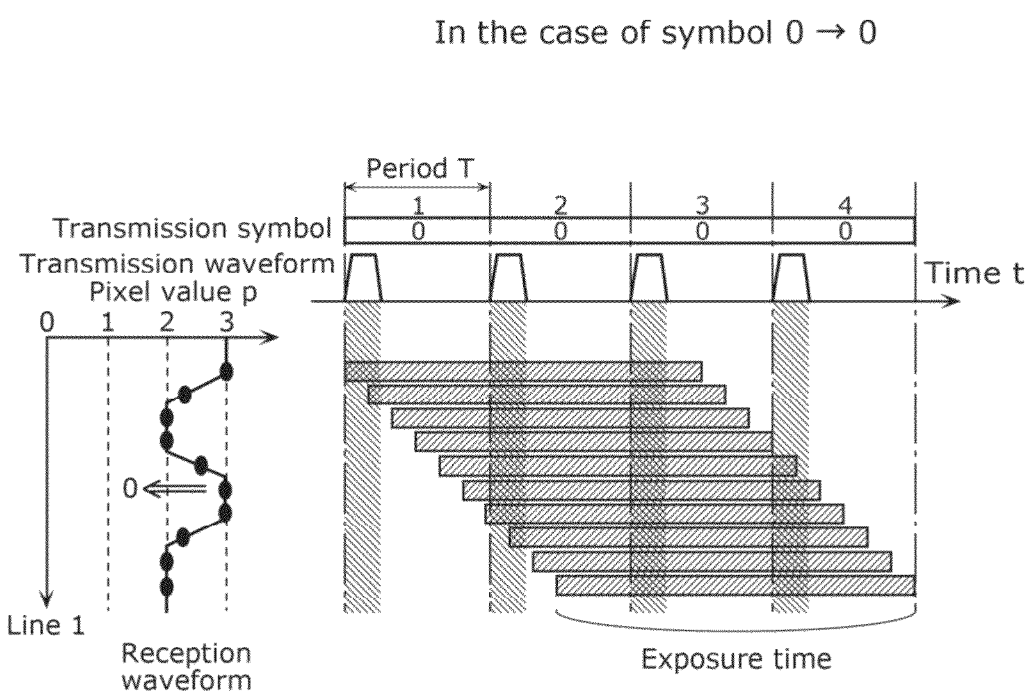

FIG. 119 is a diagram illustrating the relations between the transmission signal and the reception signal in Embodiment 5.

The transmission signal is the same as in FIG. 118. The light source emits light only when the transmission signal is 1, with the light emission time being indicated by the diagonally right down shaded area. The diagonally right up shaded band represents the time during which the pixels of the image sensor are exposed (exposure time tE). The signal charge of the pixels of the image sensor is generated in the area overlapping with the diagonally right down shaded area indicating the light emission time. A pixel value p is proportional to the overlapping area. Here, the relation of Expression 1 holds between the exposure time tE and the period T.

$$tE=T/2\times(2n+1) \text{ (where } n \text{ is a natural number)} \quad \text{(Expression 1).}$$

Note that FIGS. 119 to 123 illustrate the case where n=2, that is, tE=2.5 T.

The reception waveform indicates the pixel value p of each line. Here, the value of the pixel value axis is normalized with the intensity of received light per period being set as 1. As mentioned above, the exposure time tE has the section of $T(n+\frac{1}{2})$, so that the pixel value p is always in the range of $n \le p \le n+1$. In the example in FIG. 119, $2 \le p \le 3$.

Figure 120:
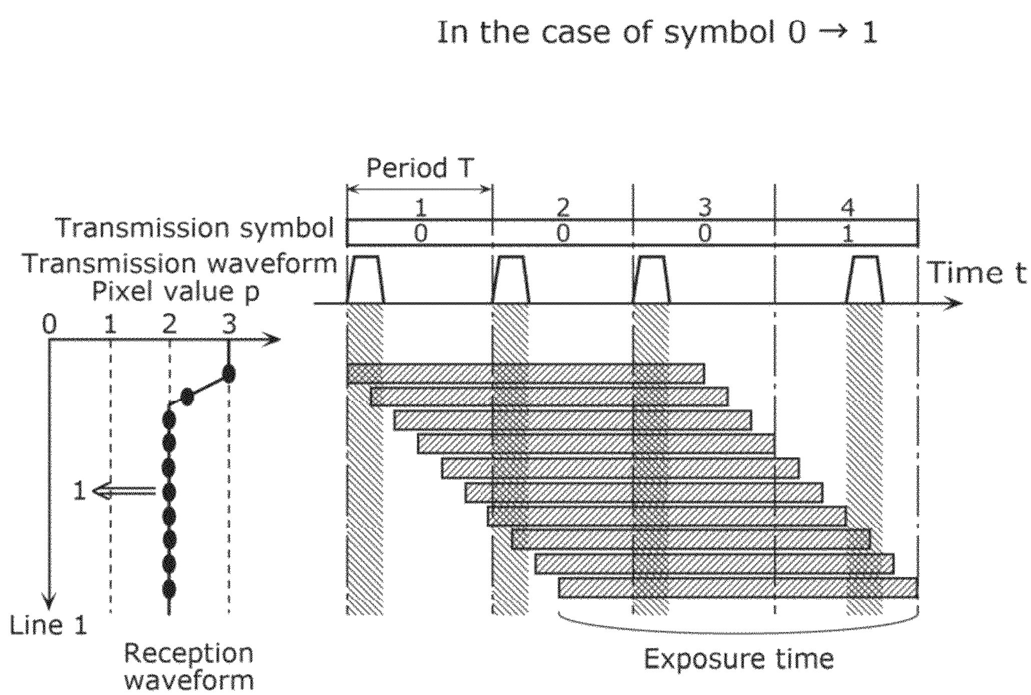

FIGS. 120 to 122 are each a diagram illustrating the relations between the transmission signal and the reception signal for a symbol string different from that in FIG. 119.

The transmission signal has a preamble including a consecutive same-symbol string (e.g. string of consecutive symbols 0) (not illustrated). The receiver generates the reference (fundamental) signal for reception from the consecutive symbol string in the preamble, and uses it as the timing signal for reading the symbol string from the reception waveform. In detail, for consecutive symbols 0, the reception waveform returns a fixed waveform repeating 2→3→2, and the clock signal is generated as the reference signal based on the output timing of the pixel value 3, as illustrated in FIG. 119.

Next, the symbol reading from the reception waveform can be performed in such a manner that the reception signal in one section of the reference signal is read where the pixel value 3 is read as symbol 0 and the pixel value 2 is read as symbol 1. FIGS. 120 to 122 illustrate the state of reading symbols in the fourth period.

FIG. 123 is a diagram summarizing FIGS. 119 to 122. Since the lines are closely aligned, the pixel boundary in the line direction is omitted so that the pixels are continuous in the drawing. The state of reading symbols in the fourth to eighth periods is illustrated here.

According to such a structure, in this embodiment, the average of the intensity of the light signal taken for a sufficiently longer time than the period of the reference wave is always constant. By setting the frequency of the reference wave appropriately high, it is possible to set the time to be shorter than the time in which humans perceive a change in light intensity. Hence, the transmission light emitting source observed by the human eye appears to be emitting light uniformly. Since no flicker of the light source is perceived, there is an advantageous effect of causing no annoyance on the user as in the previous embodiment.

In a situation where the exposure time of each line is long and the time overlapping with the exposure time of the adjacent line is long, the amplitude modulation (ON/OFF modulation) in the previous embodiment has the problem that the signal frequency (symbol rate) cannot be increased and so the sufficient signal transmission speed cannot be attained. In this embodiment, on the other hand, the signal leading and trailing edges are detectable even in such a situation, with it being possible to increase the signal frequency and attain the high signal transmission speed.

The term "phase modulation" used here means the phase modulation for the reference signal waveform. In the original sense, a carrier is light, which is amplitude-modulated (ON/OFF modulated) and transmitted. Therefore, the modulation scheme in this signal transmission is one type of amplitude modulation.

Note that the transmission signal mentioned above is merely an example, and the number of bits per symbol may be set to 2 or more. Besides, the correspondence between the symbol and the phase shift is not limited to 0° and 180°, and an offset may be provided.

Though not mentioned above, the structures and operations of the light signal generating means and light signal receiving means described in Embodiments 6 to 11 with reference to FIGS. 124 to 200 below may be replaced with the structures and operations of the high-speed light emitting means and light signal receiving means described in Embodiment 1 and its subsequent embodiments with reference to FIG. 1 onward, to achieve the same advantageous effects. Conversely, the high-speed light emitting means and receiving means in Embodiment 1 and its subsequent embodiments may equally be replaced with the low-speed light emitting means and receiving means.

For instance, in the above-mentioned example where the data such as position information in the light signal from the lighting is received using the face camera which is the display-side camera of the mobile phone in FIG. 114 or using the opposite in camera in FIG. 113, the up/down direction can be detected based on gravity through the use of the 9-axis sensor.

Consider the case of receiving the light signal by the mobile phone placed on the table in the restaurant, as illustrated in FIG. 116. The light signal may be received by operating the face camera when the front side of the mobile phone is facing upward, and operating the in camera when the front side is facing downward, according to the signal of the 9-axis sensor. This contributes to lower power consumption and faster light signal reception, as unnecessary camera operations can be stopped. The same operation may be performed by detecting the orientation of the camera on the table from the brightness of the camera. Moreover, when the camera switches from the imaging mode to the light signal reception mode, a shutter speed increase command and an imaging element sensitivity increase command may be issued to the imaging circuit unit. This has an advantageous effect of enhancing the sensitivity and making the image brighter. Though noise increases with the increase in sensitivity, such noise is white noise. Since the light signal is in a specific frequency band, the detection sensitivity can be enhanced by separation or removal using a frequency filter. This enables detection of a light signal from a dark lighting device.

In the present disclosure, a lighting device in a space which is mainly indoors is caused to emit a light signal, and a camera unit of a mobile terminal including a communication unit, a microphone, a speaker, a display unit, and the camera unit with the in camera and the face camera receives the light signal to obtain position information and the like. When the mobile terminal is moved from indoors to outdoors, the position information can be detected by GPS using satellite. Accordingly, by obtaining the position information of the boundary of the light signal area and automatically switching to the signal reception from GPS, an advantageous effect of seamless position detection can be achieved.

When moving from outdoors to indoors, the boundary is detected based on the position information of GPS or the like, to automatically switch to the position information of the light signal. In the case where barcode is displayed on the display unit of the mobile phone for authentication by a POS terminal at an airplane boarding gate or a store, the use of a server causes a long response time and is not practical, and therefore only one-way authentication is possible.

According to the present disclosure, on the other hand, mutual authentication can be carried out by transmitting the light signal from the light emitting unit of the reader of the POS terminal or the like to the face camera unit of the mobile phone. This contributes to enhanced security.

Embodiment 6

The following is a description of the flow of processing of communication performed using a camera of a smartphone by transmitting information using a blink pattern of an LED included in a device.

FIG. 124 is a diagram illustrating an example of the environment in a house in the present embodiment. In the environment illustrated in FIG. 124, there are a television 1101, a microwave 1106, and an air cleaner 1107, in addition to a smartphone 1105, for instance, around a user.

FIG. 125 is a diagram illustrating an example of communication between the smartphone and the home electric appliances according to the present embodiment. FIG. 125 illustrates an example of information communication, and is a diagram illustrating a configuration in which information output by devices such as the television 1101 and the microwave 1106 in FIG. 124 is obtained by a smartphone 1201 owned by a user, thereby obtaining information. As illustrated in FIG. 125, the devices transmit information using LED blink patterns, and the smartphone 1201 receives the information using an image pickup function of a camera, for instance.

FIG. 126 is a diagram illustrating an example of a configuration of a transmitter device 1301 according to the present embodiment.

The transmitter device 1301 transmits information using light blink patterns by pressing a button by a user, transmitting a transmission instruction using, for instance, near field communication (NFC), and detecting a change in a state such as failure inside the device. At this time, transmission is repeated for a certain period of time. A simplified identification (ID) may be used for transmitting information to a device which is registered previously. In addition, if a device has a wireless communication unit which uses a wireless LAN and specific power-saving wireless communication, authentication information necessary for connection thereof can also be transmitted using blink patterns.

In addition, a transmission speed determination unit 1309 ascertains the performance of a clock generation device inside a device, thereby performing processing of decreasing the transmission speed if the clock generation device is inexpensive and does not operate accurately and increasing the transmission speed if the clock generation device operates accurately. Alternatively, if a clock generation device exhibits poor performance, it is also possible to reduce an error due to the accumulation of differences of blink intervals because of a long-term communication, by dividing information to be transmitted itself into short pieces.

FIG. 127 illustrates an example of a configuration of a receiver device 1401 according to the present embodiment.

The receiver device 1401 determines an area where light blink is observed, from a frame image obtained by an image obtaining unit 1404. At this time, for the blink, it is also possible to take a method of tracking an area where an increase or a decrease in brightness by a certain amount is observed.

A blink information obtaining unit 1406 obtains transmitted information from a blink pattern, and if the information includes information related to a device such as a device ID, an inquiry is made as to information on a related server on a cloud computing system using the information, or interpolation is performed using information stored previously in a device in a wireless-communication area or information stored in the receiver apparatus. This achieves advantageous effect of reducing a time for correcting error due to noise when capturing a light emission pattern or for a user to hold up a smartphone to the light-emitting part of the transmitter device to obtain information already acquired.

The following is a description of FIG. 128.

FIG. 128 is a diagram illustrating a flow of processing of transmitting information to a receiver device such as a smartphone by blinking an LED of a transmitter device according to the present embodiment. Here, a state is assumed in which a transmitter device has a function of communicating with a smartphone by NFC, and information is transmitted with a light emission pattern of the LED embedded in part of a communication mark for NFC which the transmitter device has.

First, in step 1001*a*, a user purchases a home electric appliance, and connects the appliance to power supply for the first time, thereby causing the appliance to be in an energized state.

Next, in step 1001*b*, it is checked whether initial setting information has been written. In the case of Yes, the processing proceeds to C in FIG. 128. In the case of No, the processing proceeds to step 1001*c*, where the mark blinks at a blink speed (for example: 1 to ⅖) which the user can easily recognize.

Next, in step 1001*d*, the user checks whether device information of the home electric appliance is obtained by bringing the smartphone to touch the mark via NFC communication. Here, in the case of Yes, the processing proceeds to step 1001*e*, where the smartphone receives device information to a server of the cloud computing system, and registers the device information at the cloud computing system. Next, in step 1001*f*, a simplified ID associated with an account of the user of the smartphone is received from the cloud computing system and transmitted to the home electric appliance, and the processing proceeds to step 1001*g*. It should be noted that in the case of No in step 1001*d*, the processing proceeds to step 1001*g*.

Next, in step 1001*g*, it is checked whether there is registration via NFC. In the case of Yes, the processing proceeds to step 1001*j*, where two blue blinks are made, and thereafter the blinking stops in step 1001*k*.

In the case of No in step 1001*g*, the processing proceeds to step 1001*h*. Next, it is checked in step 1001*h* whether 30 seconds have elapsed. Here, in the case of Yes, the processing proceeds to step 1001*i*, where an LED portion outputs device information (a model number of the device, whether registration processing has been performed via NFC, an ID unique to the device) by blinking light, and the processing proceeds B in FIG. 129.

It should be noted that in the case of No in step 1001*h*, the processing returns to step 1001*d*.

Next, a description is given of; using FIGS. 129 to 132, a flow of processing of transmitting information to a receiver device by blinking an LED of a transmitter device according to the present embodiment. Here, FIGS. 129 to 132 are diagrams illustrating a flow of processing of transmitting information to a receiver device by blinking an LED of a transmitter apparatus.

The following is a description of FIG. 129.

First, the user activates an application for obtaining light blink information of the smartphone in step 1002*a*.

Next, the image obtaining portion obtains blinks of light in step 1002*b*. Then, a blinking area determination unit determines a blinking area from a time series change of an image.

Next, in step 1002*c*, a blink information obtaining unit determines a blink pattern of the blinking area, and waits for detection of a preamble.

Next, in step 1002*d*, if a preamble is successfully detected, information on the blinking area is obtained.

Next, in step 1002*e*, if information on a device ID is successfully obtained, also in a reception continuing state, information is transmitted to a server of the cloud computing system, an information interpolation unit performs interpolation while comparing information acquired from the cloud computing system to information obtained by the blink information obtaining unit.

Next, in step 1002*f*, when all the information including information as a result of the interpolation is obtained, the smartphone or the user is notified thereof. At this time, a GUI and a related site acquired from the cloud computing system are displayed, thereby allowing the notification to include more information and be readily understood, and the processing proceeds to D in FIG. 130

The following is a description of FIG. 130.

First, in step 1003*a*, an information transmission mode is started when a home electric appliance creates a message indicating failure, a usage count to be notified to the user, and a room temperature, for instance.

Next, the mark is caused to blink per 1 to 2 seconds in step 1003*b*. Simultaneously, the LED also starts transmitting information.

Next, in step 1003*c*, it is checked whether communication via NFC has been started. It should be noted that in the case of No, the processing proceeds to G in FIG. 132. In the case of Yes, the processing proceeds to step 1003*d*, where blinking the LED is stopped.

Next, the smartphone accesses the server of the cloud computing system and displays related information in step 1003*e*.

Next, in step 1003*f*, in the case of failure which needs to be handled at the actual location, a serviceman who gives support is looked for by the server. Information on the home electric appliance, a setting position, and the location are utilized.

Next, in step 1003*g*, the serviceman sets the mode of the device to a support mode by pressing buttons of the home electric appliance in the predetermined order.

Next, in step 1003*h*, if blinks of a marker for an LED of a home electric appliance other than the home electric appliance of interest can be seen from the smartphone, some of or all such LEDs observed simultaneously blink so as to interpolate information, and the processing proceeds to E in FIG. 131.

The following is a description of FIG. 131.

First, in step 1004*a*, the serviceman presses a setting button of his/her receiving terminal if the performance of the terminal allows detection of blinking at a high speed (for example, 1000 times/second).

Next, in step 1004*b*, the LED of the home electric appliance blinks in a high speed mode, and the processing proceeds to F.

The following is a description of FIG. 132.

First, the blinking is continued in step 1005*a*.

Next, in step 1005*b*, the user obtains, using the smartphone, blink information of the LED.

Next, the user activates an application for obtaining light blinking information of the smartphone in step 1005*c*.

Next, the image obtaining portion obtains the blinking of light in step 1005*d*. Then, the blinking area determination unit determines a blinking area, from a time series change in an image.

Next, in step 1005*e*, the blink information obtaining unit determines a blink pattern of the blinking area, and waits for detection of a preamble.

Next, in step 1005*f*, if a preamble is successfully detected, information on the blinking area is obtained.

Next, in step 1005*g*, if information on a device ID is successfully obtained, also in a reception continuing state, information is transmitted to the server of the cloud computing system, and the information interpolation unit performs interpolation while comparing information acquired from the cloud computing system with information obtained by the blink information obtaining unit.

Next, in step 1005*h*, if all the information pieces including information as a result of the interpolation are obtained, the smartphone or the user is notified thereof. At this time, a GUI and a related site acquired from the cloud computing system are displayed, thereby allowing the notification to be include more information and easier to understand.

Then, the processing proceeds to step 1003*f* in FIG. 130.

In this manner, a transmission device such as a home electric appliance can transmit information to a smartphone by blinking an LED. Even a device which does not have means of communication such as wireless communication function or NFC can transmit information, and provide a user with information having a lot of details which is in the server of the cloud computing system via a smartphone.

Moreover, as described in this embodiment, consider a situation where two devices including at least one mobile device are capable of transmitting and receiving data by both communication methods of bidirectional communication (e.g. communication by NFC) and unidirectional communication (e.g. communication by LED luminance change). In the case where data transmission and reception by bidirectional communication are established when data is being transmitted from one device to the other device by unidirectional communication, unidirectional communication can be stopped. This benefits efficiency because power consumption necessary for unidirectional communication is saved.

As described above, according to Embodiment 6, an information communication device can be achieved which allows communication between various devices including a device which exhibits low computational performance.

Specifically, an information communication device according to the present embodiment includes: an information management unit configured to manage device information which includes an ID unique to the information communication device and state information of a device; a light emitting element; and a light transmission unit configured to transmit information using a blink pattern of the light emitting element, wherein when an internal state of the device has changed, the light transmission unit is configured to convert the device information into the blink pattern of the light emitting element, and transmit the converted device information.

Here, for example, the device may further include an activation history management unit configured to store information sensed in the device including an activation state of the device and a user usage history, wherein the light transmission unit is configured to obtain previously registered performance information of a clock generation device to be utilized, and change a transmission speed.

In addition, for example, the light transmission unit may include a second light emitting element disposed in vicinity of a first light emitting element for transmitting information by blinking, and when information transmission is repeatedly performed a certain number of times by the first light emitting element blinking, the second light emitting element may emit light during an interval between an end of the information transmission and a start of the information transmission.

It should be noted that these general and specific embodiments may be implemented using a system, a method, an integrated circuit, a computer program, or a recording medium, or any combination of systems, methods, integrated circuits, computer programs, or recording media.

Embodiment 7

In the present embodiment, a description is given, using a cleaner as an example, of the procedure of communication between a device and a user using visible light communication, initial settings to a repair service at the time of failure using visible light communication, and service cooperation using the cleaner.

FIGS. 133 and 134 are diagrams for describing the procedure of performing communication between a user and a device using visible light according to the present embodiment.

The following is a description of FIG. 133.

First, the processing starts from A.

Next, the user turns on a device in step 2001*a*.

Next, in step 2001*b*, as start processing, it is checked whether initial settings such as installation setting and network (NW) setting have been made.

Here, if initial settings have been made, the processing proceeds to step 2001*f*, where normal operation starts, and the processing ends as illustrated by C.

If initial settings have not been made, the processing proceeds to step 2001*c*, where "LED normal light emission" and an "audible tone" notify the user that initial settings need to be made.

Next, in step 2001*d*, device information (product number and serial number) is collected, and visible light communication is prepared.

Next, in step 2001*e*, "LED communication light emission", "icon display on the display", "audible tone", and "light emission by plural LEDs" notify the user that device information (product number and serial number) can be transmitted by visible light communication.

Then, the processing ends as illustrated by B.

Next is a description of FIG. 134.

First, the processing starts as illustrated by B.

Next, in step 2002*a*, the approach of a visible light receiving terminal is perceived by a "proximity sensor", an "illuminance sensor", and a "human sensing sensor".

Next, in step 2002*b*, visible light communication is started by the perception thereof which is a trigger.

Next, in step 2002*c*, the user obtains device information using the visible light receiving terminal.

Next, the processing ends as illustrated by D. Alternatively, the processing proceeds to one of steps 2002*f* to 2002*i*.

If the processing proceeds to step 2002*f*, it is perceived, by a "sensitivity sensor" and "cooperation with a light control device," that the light of a room is switched off, and light emission for device information is stopped. The processing ends as illustrated by E. If the processing proceeds to step 2002*g*, the visible light receiving terminal notifies, by "NFC communication" and "NW communication", that device information has been perceived and obtained, and the processing ends. If the processing proceeds to step 2002*h*, it is perceived that the visible light receiving terminal has moved away, light emission for device information is stopped, and the processing ends. If the processing proceeds to step 2002*i*, after a certain time period elapses, light emission for device information is stopped, and the processing ends.

It should be noted that if the approach is not perceived in step 2002*a*, the processing proceeds to step 2002*d*, where after a certain period of time elapses, the level of notification indicating that visible light communication is possible is increased by "brightening", "increasing sound volume", and "moving an icon", for instance. Here, the processing returns to step 2002*d*. Alternatively, the processing proceeds to step 2002*e*, and proceeds to step 2.002*i* after another certain period of time elapses.

FIG. 135 is a diagram for describing a procedure from when the user purchases a device until when the user makes initial settings of the device according to the present embodiment.

In FIG. 135, first, the processing starts as illustrated by D.

Next, in step 2003*a*, position information of a smartphone which has received device information is obtained using the global positioning system (GPS).

Next, in step 2003*b*, if the smartphone has user information such as a user name, a telephone number, and an e-mail address, such user information is collected in the terminal. Alternatively, in step 2003*c*, if the smartphone does not have user information, user information is collected from a device in the vicinity via NW.

Next, in step 2003*d*, device information, user information, and position information are transmitted to the cloud server.

Next, in step 2003*e*, using the device information and the position information, information necessary for initial settings and activation information are collected.

Next, in step 2003*f*, cooperation information such as an Internet protocol (IP), an authentication method, and available service necessary for setting cooperation with a device whose user has been registered is collected. Alternatively, in step 2003*g*, device information and setting information are transmitted to a device whose user has been registered via NW to make cooperation setting with devices in the vicinity thereof.

Next, user setting is made in step 2003*h* using device information and user information.

Next, initial setting information, activity information, and cooperation setting information are transmitted to the smartphone in step 2003*i*.

Next, the initial setting information, the activation information, and the cooperation setting information are transmitted to home electric appliance by NFC in step 2003*j*.

Next, device setting is made using the initial setting information, the activation information, and the cooperation setting information in step 2003*k*.

Then, the processing ends as illustrated by F.

FIG. 136 is a diagram for describing service exclusively performed by a serviceman when a device fails according to the present embodiment.

In FIG. 136, first, the processing starts as illustrated by C.

Next, in step 2004*a*, history information such as operation log and user operation log generated during a normal operation of the device is stored into a local storage medium.

Next, in step 2004*b*, at the same time with the occurrence of a failure, error information such as an error code and details of the error is recorded, and LED abnormal light emission notifies that visible light communication is possible.

Next, in step 2004*c*, the mode is changed to a high-speed LED light emission mode by the serviceman executing a special command, thereby starting high-speed visible light communication.

Next, in step 2004*d*, it is identified whether a terminal which has approached is an ordinary smartphone or a receiving terminal exclusively used by the serviceman. Here, if the processing proceeds to step 2004*e*, error information is obtained in the case of a smartphone, and the processing ends.

On the other hand, if the processing proceeds to step 2004*f*, the receiving terminal for exclusive use obtains error information and history information in the case of a serviceman.

Next, in step 2004*g*, device information, error information, and history information are transmitted to the cloud computing system, and a repair method is obtained. Here, if the processing proceeds to step 2004*h*, the high-speed LED light emission mode is canceled by the serviceman executing a special command, and the processing ends.

On the other hand, if the processing proceeds to step 2004*i*, product information on products related and similar to the product in the device information, selling prices at nearby stores, and new product information are obtained from the cloud server.

Next, in step 2004*j*, user information is obtained via visible light communication between the user's smartphone and the terminal exclusively used by the serviceman, and an order for a product is made to a nearby store via the cloud server.

Then, the processing ends as illustrated by I.

FIG. 137 is a diagram for describing service for checking a cleaning state using a cleaner and visible light communication according to the present embodiment.

First, the processing starts as illustrated by C.

Next, cleaning information of a device performing normal operation is recorded in step 2005*a*.

Next, in step 2005*b*, dirt information is created in combination with room arrangement information, and encrypted and compressed.

Here, if the processing proceeds to step 2005*c*, the dirt information is stored in a local storage medium, which is triggered by compression of the dirt information. Alternatively, if the processing proceeds to step 2005*d*, dirt information is transmitted to a lighting device by visible light communication, which is triggered by a temporary stop of cleaning (stoppage of suction processing). Alternatively, if the processing proceeds to step 2005*e*, the dirt information is transmitted to a domestic local server and the cloud server via NW, which is triggered by recording dirt information.

Next, in step 2005*f*, device information, a storage location, and a decryption key are transmitted to the smartphone by visible light communication, which is triggered by the transmission and storage of the dirt information.

Next, in step 2005*g*, the dirt information is obtained via NW and NFC, and decoded.

Then, the processing ends as illustrated by J.

As described above, according to Embodiment 7, a visible light communication system can be achieved which includes an information communication device allowing communication between various devices including a device which exhibits low computational performance.

Specifically, the visible light communication system (FIG. 133) including the information communication device according to the present embodiment includes a visible light transmission permissibility determination unit for determining whether preparation for visible light transmission is completed, and a visible light transmission notification unit which notifies a user that visible light transmission is being performed, wherein when visible light communication is possible, the user is notified visually and auditorily. Accordingly, the user is notified of a state where visible light reception is possible by an LED light emission mode, such as "emitted light color", "sound", "icon display", or "light emission by a plurality of LEDs", thereby improving user's convenience.

Preferably, the visible light communication system may include, as described using FIG. 134, a terminal approach sensing unit which senses the approach of a visible light receiving terminal, and a visible light transmission determination unit which determines whether visible light transmission is started or stopped, based on the position of a visible light receiving terminal, and may start visible light transmission, which is triggered by the terminal approaching sensing unit sensing the approach of the visible light receiving terminal.

Here, as described using FIG. 134, for example, the visible light communication system may stop visible light transmission, which is triggered by the terminal approaching sensing unit sensing that the visible light receiving terminal has moved away. In addition, as described using FIG. 134, for example, the visible light communication system may include a surrounding illuminance sensing unit which senses that a light of a room is turned off, and may stop visible light transmission, which is triggered by the surrounding illuminance sensing unit sensing that the light of the room is turned off. By sensing that a visible light receiving terminal approaches and moves away and a light of a room is turned off, visible light communication is started only in a state in which visible light communication is possible. Thus, unnecessary visible light communication is not performed, thereby saving energy.

Furthermore, as described using FIG. 134, for example, the visible light communication system may include: a visible light communication time monitoring unit which measures a time period during which visible light transmission is performed; and a visible light transmission notification unit which notifies a user that visible light transmission is being performed, and may further increase the level of visual and auditory notification to a user, which is triggered by no visible light receiving terminal approaching even though visible light communication is performed more than a certain time period. In addition, as described using FIG. 134, for example, the visible light communication system may stop visible light transmission, which is triggered by no visible light receiving terminal approaching even though visible light communication is performed more than a certain time period after the visible light transmission notification unit increases the level of notification.

Accordingly, if reception by a user is not performed after a visible light transmission time elapses which is greater than or equal to a certain time period, a request to a user to perform visible light reception and to stop visible light transmission is made to avoid not performing visible light reception and not stopping visible light transmission, thereby improving a user's convenience.

The visible light communication system (FIG. 135) including the information communication device according to the present embodiment may include: a visible light reception determination unit which determines that visible light communication has been received; a receiving terminal position obtaining unit for obtaining a position of a terminal; and a device-setting-information collecting unit which obtains device information and position information to collect device setting information, and may obtain a position of a receiving terminal, which is triggered by the reception of visible light, and collect information necessary for device setting. Accordingly, position information and user information necessary for device setting and user registration are automatically collected and set, which is triggered by device information being obtained via visible light communication, thereby improving convenience by skipping the input and registration procedure by a user.

Here, as described using FIG. 137, the visible light communication system may further include: a device information management unit which manages device information; a device relationship management unit which manages the similarity between devices; a store information management unit which manages information on a store which sells a device; and a nearby store search unit which searches for a nearby store, based on position information, and may search for a nearby store which sells a similar device and obtain a price thereof, which is triggered by receiving device information and position information. This saves time and effort for collecting information on a selling state of a related device and stores selling such a device according to device information, and searching for a device, thereby improving user convenience.

In addition, the visible light communication system (FIG. 135) which includes the information communication device according to the present embodiment may include: a user information monitoring unit which monitors user information being stored in a terminal; a user information collecting unit which collects user information from devices in the vicinity through NW; and a user registration processing unit which obtains user information and device information to register a user, and may collect user information from accessible devices in the vicinity, which is triggered by no user information being obtained, and register a user together with device information. Accordingly, position information and user information necessary for device setting and user registration are automatically collected and set, which is triggered by device information being obtained by visible light communication, thereby improving convenience by skipping the input and a registration procedure by a user.

In addition, the visible light communication system (FIG. 136) including the information communication device according to the present embodiment may include: a command determination unit which accepts a special command; and a visible light communication speed adjustment unit which controls the frequency of visible light communication and cooperation of a plurality of LEDs, and may adjust the frequency of visible light communication and the number of transmission LEDs by accepting a special command, thereby accelerating visible light communication. Here, for example, as described using FIG. 137, the visible light communication system may include: a terminal type determination unit which identifies the type of an approaching terminal by NFC communication; and a transmission information type determination unit which distinguishes information to be transmitted according to a terminal type, and may change the amount of information to be transmitted and the visible light communication speed according to the terminal which approaches. Thus, according to a receiving terminal, the frequency of visible light communication and the number of transmission LEDs are adjusted to change the speed of the visible light communication and information to be transmitted, thereby allowing high speed communication and improving user's convenience.

In addition, the visible light communication system (FIG. 137) which includes the information communication device according to the present embodiment may include: a cleaning information recording unit which records cleaning information; a room arrangement information recording unit which records room arrangement information; an information combining unit which creates dirty portion information by superimposing the room arrangement information and the cleaning information; and an operation monitoring unit which monitors the stop of normal operation, and may transmit the dirty portion information, using visible light, which is triggered by the perception of the stop of a device.

It should be noted that these general and specific embodiments may be implemented using a system, a method, an integrated circuit, a computer program, or a recording medium, or any combination of systems, methods, integrated circuits, computer programs, or recording media.

Embodiment 8

In the present embodiment, cooperation of devices and Web information using optical communication are described, using a home delivery service as an example.

The outline of the present embodiment is illustrated in FIG. 138. Specifically, FIG. 138 is a schematic diagram of home delivery service support using optical communication according to the present embodiment.

Specifically, an orderer orders a product from a product purchase site using a mobile terminal 3001*a*. When the order is completed, an order number is issued from the product purchase site. The mobile terminal 3001*a* which has received the order number transmits the order number to an intercom indoor unit 3001*b*, using NFC communication.

The intercom indoor unit 3001*b*, for example, displays the order number received from the mobile terminal 3001*a* on the monitor of the unit itself, thereby showing to the user that the transmission has been completed.

The intercom indoor unit 3001*b* transmits, to an intercom outdoor unit 3001*c*, blink instructions and blink patterns for an LED included in the intercom outdoor unit 3001*c*. The blink patterns are created by the intercom indoor unit 3001*b* according to the order number received from the mobile terminal 3001*a*.

The intercom outdoor unit 3001*c* blinks the LED according to the blink patterns designated by the intercom indoor unit 3001*b*.

Instead of a mobile terminal, an environment may be used which is accessible to a product purchase site in WWW 3001*d*, such as a personal computer (PC).

A home network may be used as means for transmission from the mobile terminal 3001*a* to the intercom indoor unit 3001*b*, in addition to NFC communication.

The mobile terminal 3001*a* may transmit the order number to the intercom outdoor unit 3001*c* directly, not via the intercom indoor unit 3001*b*.

If there is an order from an orderer, an order number is transmitted from a delivery order receiving server 3001*e* to a deliverer mobile terminal 3001*f*. When the deliverer arrives at a delivery place, the deliverer mobile terminal 3001*f* and the intercom outdoor unit 3001*c* bidirectionally perform optical communication using the LED blink patterns created based on the order number.

Next, a description is given using FIGS. 139 to 144. FIGS. 139 to 144 are flowcharts for describing home delivery service support using optical communication according to Embodiment 3 of the present disclosure.

FIG. 139 illustrates a flow from when an orderer places an order until when an order number is issued. The following is a description of FIG. 139.

In step 3002*a*, the orderer mobile terminal 3001*a* reserves delivery using the web browser or an application of the smartphone. Then, the processing proceeds to A in FIG. 140.

In step 3002*b* subsequent to B in FIG. 140, the orderer mobile terminal 3001*a* waits for the order number to be transmitted. Next, in step 3002*c*, the orderer mobile terminal 3001*a* checks whether the terminal has been brought to touch an order number transmission destination device. In the case of Yes, the processing proceeds to step 3002*d*, where the order number is transmitted by touching the intercom indoor unit via NFC (if the intercom and the smartphone are in the same network, a method for transmitting the number via the network may also be used). On the other hand, in the case of No, the processing returns to step 3002*b*.

First, the intercom indoor unit 3001*b* waits for an LED blink request from another terminal in step 3002*e*. Next, the order number is received from the smartphone in step 3002*f*. Next, the intercom indoor unit 3001*b* gives an instruction to blink an LED of the intercom outdoor unit according to the received order number, in step 3002*g*. Then, the processing proceeds to C in FIG. 142.

First, the intercom outdoor unit 3001*c* waits for the LED blink instruction from the intercom indoor unit in step 3002*h*. Then, the processing proceeds to G in FIG. 142.

In step 3002*i*, the deliverer mobile terminal 3001*f* waits for an order notification. Next, the deliverer mobile terminal 3001*f* checks whether the order notification has been given from the delivery order server. Here, in the case of No, the processing returns to step 3002*i*. In the case of Yes, the processing proceeds to step 3002*k*, where the deliverer mobile terminal 3001*f* receives information on an order number, a delivery address, and the like. Next, in step 3002*n*, the deliverer mobile terminal 3001*f* waits until its camera is activated to recognize an LED light emission instruction for the order number received by the user and LED light emission from another device. Then, the processing proceeds to E in FIG. 141.

FIG. 140 illustrates the flow until an orderer makes a delivery order using the orderer mobile terminal 3001*a*. The following is a description of FIG. 140.

First, a delivery order server 3001*e* waits for an order number in step 3003*a*. Next, in step 3003*b*, the delivery order server 3001*e* checks whether a delivery order has been received. Here, in the case of No, the processing returns to step 3003*a*. In the case of Yes, the processing proceeds to step 3003*c*, where an order number is issued to the received delivery order. Next, in step 3003*d*, the delivery order server 3001*e* notifies a deliverer that the delivery order has been received, and the processing ends.

In step 3003*e* subsequent to A in FIG. 139, the orderer mobile terminal 3001*a* selects what to order from the menu presented by the delivery order server. Next, in step 3003*f*, the orderer mobile terminal 3001*a* sets the order, and transmits the order to the delivery server. Next, the orderer mobile terminal 3001*a* checks in step 3003*g* whether the order number has been received. Here, in the case of No, the processing returns to step 3003*f*. In the case of Yes, the processing proceeds to step 3003*h*, where the orderer mobile terminal 3001*a* displays the received order number, and prompts the user to touch the intercom indoor unit. Then, the processing proceeds to B in FIG. 139.

FIG. 141 illustrates the flow of the deliverer performing optical communication with the intercom outdoor unit 3001*c* at a delivery destination, using the deliverer mobile terminal 3001*f*. The following is a description of FIG. 141.

In step 3004*a* subsequent to E in FIG. 139, the deliverer mobile terminal 3001*f* checks whether to activate a camera in order to recognize an LED of the intercom outdoor unit 3001*c* at the delivery destination. Here, in the case of No, the processing returns E in FIG. 139.

On the other hand, in the case of Yes, the processing proceeds to step 3004*b*, where the blinks of the LED of the intercom outdoor unit at the delivery destination are identified using the camera of the deliverer mobile terminal.

Next, in step 3004*c*, the deliverer mobile terminal 3001*f* recognizes light emission of the LED of the intercom outdoor unit, and checks it against the order number.

Next, in step 3004*d*, the deliverer mobile terminal 3001*f* checks whether the blinks of the LED of the intercom outdoor unit correspond to the order number. Here, in the case of Yes, the processing proceeds to F in FIG. 143.

It should be noted that in the case of No, the deliverer mobile terminal 3001*f* checks whether the blinks of another LED can be identified using the camera. In the case of Yes, the processing returns to step 3004*c*, whereas the processing ends in the case of No.

FIG. 142 illustrates the flow of order number checking between the intercom indoor unit 3001*b* and the intercom outdoor unit 3001*c*. The following is a description of FIG. 142.

In step 3005*a* subsequent to G in FIG. 139, the intercom outdoor unit 3001*c* checks whether the intercom indoor unit has given an LED blink instruction. In the case of No, the processing returns to G in FIG. 139. In the case of Yes, the processing proceeds to step 3005*b*, where the intercom outdoor unit 3001 blinks the LED in accordance with the LED blink instruction from the intercom indoor unit. Then, the processing proceeds to H in FIG. 143.

In step 3005*c* subsequent to I in FIG. 143, the intercom outdoor unit 3001*c* notifies the intercom indoor unit of the blinks of the LED recognized using the camera of the intercom outdoor unit. Then, the processing proceeds to J in FIG. 144.

In step 3005*d* subsequent to C in FIG. 139, the intercom indoor unit 3001*c* gives an instruction to the intercom outdoor unit to blink the LED according to the order number. Next, in step 3005*e*, the intercom indoor unit 3001*b* waits until the camera of the intercom outdoor unit recognizes the blinks of the LED of the deliverer mobile terminal. Next, in step 3005*f*, the intercom indoor unit 3001*b* checks whether the intercom outdoor unit has notified that the blinks of the LED are recognized. Here, in the case of No, the processing returns to step 3005*e*. In the case of Yes, the intercom indoor unit 3001*b* checks the blinks of the LED of the intercom outdoor unit against the order number in step 3005*g*. Next, in step 3005*h*, the intercom indoor unit 3001*b* checks whether the blinks of the LED of the intercom outdoor unit correspond to the order number. In the case of Yes, the processing proceeds to K in FIG. 144. On the other hand, in the case of No, the intercom indoor unit 3001*b* gives an instruction to the intercom outdoor unit to stop blinking the LED in step 3005*i*, and the processing ends.

FIG. 143 illustrates the flow between the intercom outdoor unit 3001*c* and the deliverer mobile terminal 3001*f* after checking against the order number. The following is a description of FIG. 143.

In step 3006*a* subsequent to F in FIG. 141, the deliverer mobile terminal 3001*f* starts blinking the LED according to the order number held by the deliverer mobile terminal.

Next, in step 3006*b*, an LED blinking portion is put in the range from the intercom outdoor unit where the camera can capture an image.

Next, in step 3006*c*, the deliverer mobile terminal 3001*f* checks whether the blinks of the LED of the intercom outdoor unit indicate that the blinks of the LED of the deliverer mobile terminal shot by the camera of the intercom outdoor unit correspond to the order number held by the intercom indoor unit.

Here, in the case of No, the processing returns to step 3006*b*. On the other hand, the processing proceeds to step 3006*e* in the case of Yes, where the deliverer mobile terminal displays whether the blinks correspond to the order number, and the processing ends.

Furthermore, as illustrated in FIG. 143, the intercom outdoor unit 3001*c* checks whether the blinks of the LED of the deliverer mobile terminal have been recognized using the camera of the intercom outdoor unit, in step 3006*f* subsequent to H in FIG. 142. Here, in the case of Yes, the processing proceeds to I in FIG. 142. In the case of No, the processing returns to H in FIG. 142.

FIG. 144 illustrates the flow between the intercom outdoor unit 3001*c* and the deliverer mobile terminals 3001*f* after checking against the order number. The following is a description of FIG. 144.

In step 3007*a* subsequent to K in FIG. 142, the intercom outdoor unit 3001*c* checks whether a notification has been given regarding whether the blinks of the LED notified from the intercom indoor unit correspond to the order number. Here, in the case of No, the processing returns to K in FIG. 142. On the other hand, in the case of Yes, the processing proceeds to step 3007*b*, where the intercom outdoor unit blinks the LED to show whether the blinks correspond to the order number, and the processing ends.

Furthermore, as illustrated in FIG. 144, in step 3007*c* subsequent to J in FIG. 142, the intercom indoor unit 3001*b* notifies the orderer by the display of the intercom indoor unit showing that the deliverer has arrived, with ring tone output. Next, in step 3007*d*, the intercom indoor unit gives, to the intercom outdoor unit, an instruction to stop blinking the LED and an instruction to blink the LED to show that the blinks correspond to the order number. Then, the processing ends.

It should be noted that a delivery box for keeping a delivered product is often placed at the entrance, for instance, in the case where an orderer is not at home in an apartment, which is the delivery destination. A deliverer puts a delivery product in the delivery box if the orderer is not at home when the deliverer delivers the product. Using the LED of the deliverer mobile terminal 3001*f*, optical communication is performed with the camera of the intercom outdoor unit 3001*c* to transmit the size of the delivery product, whereby the intercom outdoor unit 3001*c* automatically allows only a delivery box to be used which has a size corresponding to the delivery product.

As described above, according to Embodiment 8, cooperation between a device and web information can be achieved using optical communication.

Embodiment 9

The following is a description of Embodiment 9.

(Registration of User and Mobile Phone in Use to Server)

FIG. 145 is a diagram for describing processing of registering a user and a mobile phone in use to a server according to the present embodiment. The following is a description of FIG. 145.

First, a user activates an application in step 4001*b*.

Next, in step 4001*c*, an inquiry as to information on this user and his/her mobile phone is made to a server.

Next, it is checked in step 4001*d* whether user information and information on a mobile phone in use are registered in a database (DB) of the server.

In the case of Yes, the processing proceeds to step 4001*f*, where the analysis of a user voice characteristic (processing a) is started as parallel processing, and the processing proceeds to B in FIG. 147.

On the other hand, in the case of No, the processing proceeds to step 4001*e*, where a mobile phone ID and a user ID are registered into a mobile phone table of the DB, and the processing proceeds to B in FIG. 147.

(Processing a: Analyzing User Voice Characteristics)

FIG. 146 is a diagram for describing processing of analyzing user voice characteristics according to the present embodiment. The following is a description of FIG. 146.

First, in step 4002*a*, sound is collected from a microphone.

Next, in step 4002*b*, it is checked whether the collected sound is estimated to be the user voice, as a result of sound recognition. Here, in the case of No, the processing returns to step 4002*a*.

In the case of Yes, the processing proceeds to step 4002*c*, where it is checked whether what is said is a keyword (such as "next" and "return") used for this application. In the case of Yes, the processing proceeds to step 4002*f*, where voice data is registered into a user keyword voice table of the server, and the processing proceeds to step 4002*d*. On the other hand, in the case of No, the processing proceeds to step 4002*d*.

Next, in step 4002*d*, voice characteristics (frequency, sound pressure, rate of speech) are analyzed.

Next, in step 4002*e*, the analysis result is registered into the mobile phone and a user voice characteristic table of the server.

(Preparation for Sound Recognition Processing)

FIG. 147 is a diagram for describing processing of preparing sound recognition processing according to the present embodiment. The following is a description of FIG. 147.

First, in step 4003*a* subsequent to B in the diagram, operation for displaying a cooking menu list is performed (user operation).

Next, in step 4003*b*, the cooking menu list is obtained from the server.

Next, in step 4003*c*, the cooking menu list is displayed on a screen of the mobile phone.

Next, in step 4004*d*, collecting sound is started using the microphone connected to the mobile phone.

Next, in step 4003*e*, collecting sound by a sound collecting device in the vicinity thereof is started (processing b) as parallel processing.

Next, in step 4003*f*, the analysis of environmental sound characteristics is started as parallel processing (processing c).

Next, in step 4003*g*, cancellation of the sound output from a sound output device which is present in the vicinity is started (processing d) as parallel processing.

Next, in step 4003*h*, user voice characteristics are obtained from the DB of the server.

Finally, in step 4003*i*, recognition of user voice is started, and the processing proceeds to C in FIG. 151.

(Processing b: Collecting Sound by Sound Collecting Device in Vicinity)

FIG. 148 is a diagram for describing processing of collecting sound by a sound collecting device in the vicinity according to the present embodiment. The following is a description of FIG. 148.

First, in step 4004*a*, a device which can communicate with a mobile phone and collect sound (a sound collecting device) is searched for.

Next, in step 4004*b*, it is checked whether a sound collecting device has been detected.

Here, in the case of No, the processing ends. In the case of Yes, the processing proceeds to step 4004*c*, where position information and microphone characteristic information of the sound collecting device are obtained from the server.

Next, in step 4004*d*, it is checked whether the server has such information.

In the case of Yes, the processing proceeds to step 4004*e*, where it is checked whether the location of the sound collecting device is sufficiently close to the position of the mobile phone, so that the user voice can be collected. It should be noted that in the case of No in step 4004*e*, the processing returns to step 4004*a*. On the other hand, in the case of Yes in step 4004*e*, the processing proceeds to step 4004*f*, where the sound collecting device is caused to start collecting sound.

Next, in step 4004$g$, the sound collected by the sound collecting device is transmitted to the mobile phone until an instruction to terminate sound collecting processing is given. It should be noted that rather than transmitting the collected sound to the mobile phone as it is, the result obtained by sound recognition may be transmitted to the mobile phone. Further, the sound transmitted to the mobile phone is processed similarly to the sound collected from the microphone connected to the mobile phone, and the processing returns to step 4004$a$.

It should be noted that in the case of No in step 4004$d$, the processing proceeds to step 4004$h$, where the sound collecting device is caused to start collecting sound. Next, in step 4004$i$, a tone is output from the mobile phone. Next, in step 4004$j$, the voice collected by the sound collecting device is transmitted to the mobile phone. Next, in step 4004$k$, it is checked whether a tone has been recognized based on the sound transmitted from the sound collecting device. Here, in the case of Yes, the processing proceeds to step 4004$g$, whereas the processing returns to step 4004$a$ in the case of No.

(Processing c: Analyzing Environmental Sound Characteristics)

FIG. 149 is a diagram for describing processing of analyzing environmental sound characteristics according to the present embodiment. The following is a description of FIG. 149.

First, in step 4005$f$, the list of devices is obtained which excludes any device whose position is sufficiently far from the position of a microwave, among the devices which this user owns. Data of sounds output by these devices is obtained from the DB.

Next, in step 4005$g$, the characteristics (frequency, sound pressure, and the like) of the obtained sound data are analyzed, and stored as environmental sound characteristics. It should be noted that particularly the sound output by, for instance, a rice cooker near the microwave tends to be incorrectly recognized, and thus characteristics thereof are stored with high importance being set Next, sound is collected by a microphone in step 4005$a$.

Next, it is checked in step 4005$b$ whether the collected sound is user voice, and in the case of Yes, the processing returns to step 4005$a$. In the case of No, the processing proceeds to step 4005$c$, where characteristics (frequency, sound pressure) of the collected sound are analyzed.

Next, in step 4005$d$, environmental sound characteristics are updated based on the analysis result.

Next, in step 4005$e$, it is checked whether an ending flag is on, and the processing ends in the case of Yes, whereas the processing returns to step 4005$a$ in the case of No.

(Processing d: Cancelling Sound from Sound Output Device Present in Vicinity)

FIG. 150 is a diagram for describing processing of canceling sound from a sound output device which is present in the vicinity according to the present embodiment. The following is a description of FIG. 150.

First, in step 4006$a$, a device which can communicate and output sound (sound output device) is searched for.

Next, in step 4006$b$, it is checked whether a sound output device has been detected, and the processing ends in the case of No. In the case of Yes, the processing proceeds to step 4006$c$, where the sound output device is caused to output tones including various frequencies.

Next, in step 4006$d$, the mobile phone and the sound collecting device in FIG. 148 (sound collecting devices) collect the sound, thereby collecting the tones output from the sound output device.

Next, it is checked in step 4006$e$ whether a tone has been collected and recognized. The processing ends in the case of No. In the case of Yes, the processing proceeds to step 4006$f$, where transmission characteristics from the sound output device to each sound collecting device are analyzed (a relationship for each frequency between the output sound volume and the volume of collected sound and the delay time between the output of a tone and collection of the sound).

Next, it is checked in step 4006$g$ whether sound data output from the sound output device is accessible from the mobile phone.

Here, in the case of Yes, the processing proceeds to step 4006$h$, where until an instruction is given to terminate cancellation processing, an output sound source, an output portion, and the volume are obtained from the sound output device, and the sound output by the sound output device is canceled from the sound collected by the sound collecting devices in consideration of the transmission characteristics. The processing returns to step 4006$a$. On the other hand, in the case of No, the processing proceeds to step 4006$i$, where until an instruction is given to terminate cancellation processing, the output sound from the sound output device is obtained, and the sound output by the sound output device is canceled from the sound collected by the sound collecting devices in consideration of the transmission characteristics. The processing returns to step 4006$a$.

(Selection of What to Cook, and Setting Detailed Operation in Microwave)

FIG. 151 is a diagram for describing processing of selecting what to cook and setting detailed operation of a microwave according to the present embodiment. The following is a description of FIG. 151.

First, in step 4007$a$ subsequent to C in the diagram, what to cook is selected (user operation).

Next, in step 4007$b$, recipe parameters (the quantity to cook, how strong the taste is to be, a baking degree, and the like) are set (user operation).

Next, in step 4007$c$, recipe data and a detailed microwave operation setting command are obtained from the server in accordance with the recipe parameters.

Next, in step 4007$d$, the user is prompted to bring the mobile phone to touch a noncontact integrated circuit (IC) tag embedded in the microwave.

Next, in step 4007$e$, it is checked whether the microwave being touched is detected.

Here, in the case of No, the processing returns to step 4007$e$. In the case of Yes, the processing proceeds to step 4007$f$, where the microwave setting command obtained from the server is transmitted to the microwave. Accordingly, all the settings for the microwave necessary for this recipe are made, and the user can cook by only pressing an operation start button of the microwave.

Next, in step 4007$g$, notification sound for the microwave is obtained from the DB of the server, for instance, and set in the microwave (processing e).

Next, in step 4007$h$, the notification sound of the microwave is adjusted (processing f), and the processing proceeds to D in FIG. 155.

(Processing e: Obtaining Notification Sound for Microwave from DB of Server, for Instance, and Set in Microwave)

FIG. 152 is a diagram for describing processing of obtaining notification sound for a microwave from a DB of a server, for instance, and setting the sound in the microwave according to the present embodiment. The following is a description of FIG. 152.

First, in step 4008*a*, the user brings the mobile phone close to (=to touch) the noncontact IC tag embedded in the microwave.

Next, in step 4008*b*, an inquiry is made as to whether notification sound data for the mobile phone (data of sound output when the microwave is operating and ends operation) is registered in the microwave.

Next, it is checked in step 4008*c* whether the notification sound data for the mobile phone is registered in the microwave.

Here, in the case of Yes, the processing ends. In the case of No, the processing proceeds to step 4008*d*, where it is checked whether the notification sound data for the mobile phone is registered in the mobile phone. In the case of Yes, the processing proceeds to step 4008*h*, where the notification sound data registered in the mobile phone is registered in the microwave, and the processing ends. In the case of No, the processing proceeds to step 4008*e*, where the DB of the server, the mobile phone, or the microwave is referred to.

Next, in step 4008*f*, if notification sound data for the mobile phone (data of notification sound which this mobile phone can easily recognize) is in the DB, that data is obtained from the DB, whereas if such data is not in the DB, notification sound data for typical mobile phones (data of typical notification sound which mobile phones can easily recognize) is obtained from the DB.

Next, in step 4008*g*, the obtained notification sound data is registered in the mobile phone.

Next, in step 4008*h*, the notification sound data registered in the mobile phone is registered in the microwave, and the processing ends.

(Processing f: Adjusting Notification Sound of Microwave)

FIG. 153 is a diagram for describing processing of adjusting notification sound of a microwave according to the present embodiment. The following is a description of FIG. 153.

First, in step 4009*a*, notification sound data of the microwave registered in the mobile phone is obtained.

Next, in step 4009*b*, it is checked whether a frequency of the notification sound for the terminal and a frequency of environmental sound overlap a certain amount or more.

Here, in the case of No, the processing ends.

However, in the case of Yes, the processing proceeds to step 4009*c*, where the volume of notification sound is set so as to be sufficiently larger than the environmental sound. Alternatively, the frequency of the notification sound is changed.

Here, as an example of a method for generating notification sound having a changed frequency, if the microwave can output the sound in (c) of FIG. 154, notification sound is generated in the pattern in (c), and the processing ends. If the microwave cannot output sound in (c), but can output the sound in (b), notification sound is generated in the pattern in (b), and the processing ends. If the microwave can output only the sound in (a), notification sound is generated in the pattern in (a), and the processing ends.

FIG. 154 is a diagram illustrating examples of waveforms of notification sounds set in a microwave according to the present embodiment.

The waveform illustrated in (a) of FIG. 154 includes simple square waves, and almost all sound output devices can output sound in the waveform. Since the sound in the waveform is easily mixed up with sound other than notification sound, the sound is output several times, and if the sound can be recognized some of the several times, it is to be determined that the output of the notification sound is recognized, which is an example of handling such case.

The waveform illustrated in (b) of FIG. 154 is a waveform obtained by sectioning the waveform in (a) finely at short square waves, and such sound in the waveform can be output if the operation clock frequency of a sound output device is high enough. Although people hear this sound as similar sound to the sound in (a), a feature of the sound is that the sound has a greater amount of information than (a), and tends not to be mixed up with sound other than notification sound in machine recognition.

The waveform illustrated in (c) of FIG. 154 is obtained by changing the temporal lengths of sound output portions, and is referred to as a pulse-width modulation (PWM) waveform. Although it is more difficult to output such sound in the PWM waveform than the sound in (b), the sound in the PWM waveform has a greater amount of information than the sound in (b), thus improving a recognition rate and also allowing information to be transmitted from the microwave to the mobile phone simultaneously.

It should be noted that although the sounds in the waveforms in (b) and (c) of FIG. 154 are less likely to be incorrectly recognized than the sound illustrated in (a) of FIG. 154, the recognition rate of the sounds can be further improved by repeating the sounds in the same waveform several times, as with the sound in (a) of FIG. 154.

(Display of Details of Cooking)

FIG. 155 is a diagram illustrating examples of waveforms of notification sounds set in a microwave according to the present embodiment. The following is a description of FIG. 155.

First, the details of cooking are displayed in step 4011*a* subsequent to D in the diagram.

Next, it is checked in step 4011*b* whether the cooking in detail is to be done by the operation of the microwave.

Here, in the case of Yes, the processing proceeds to step 4011*c*, where the user is notified that food is to be put in the microwave, and the operation start button is to be pressed. The processing proceeds to E in FIG. 156.

On the other hand, in the case of No, the processing proceeds to step 4011*d*, where the details of cooking are displayed, and the processing proceeds to F in the diagram or proceeds to step 4011*e*.

In step 4011*e*, it is checked whether the operation is performed by the user. If the application has ended, the processing ends.

On the other hand, in the case of operation of changing display content, manual input (pressing a button, for instance), or voice input (such as "next", "previous"), the processing proceeds to step 4011*f*, where it is checked whether cooking ends as a result of changing the display content. Here, in the case of Yes, the processing proceeds to step 4011*g*, where the user is notified of the end of cooking, and the processing ends. In the case of No, the processing proceeds to step 4011*a*.

(Recognition of Notification Sound of Microwave)

FIG. 156 is a diagram for describing processing of recognizing notification sound of a microwave according to the present embodiment. The following is a description of FIG. 156.

First, in step 4012*a* subsequent to E in the diagram, collecting sound by a sound collecting device in the vicinity and recognition of notification sound of the microwave are started (processing g) as parallel processing.

Next, in step 4012*f*, checking of the operation state of the mobile phone is started (processing i) as parallel processing.

Next, in step 4012*g*, tracking a user position is started (processing j) as parallel processing.

Next, the details of recognition are checked in step 4012*b*.

Here, if notification sound indicating a button being pressed has been recognized, the processing proceeds to step 4012*c*, where the change of the setting is registered, and the processing returns to step 4012*b*. If operation by the user is recognized, the processing proceeds to F in FIG. 155. If notification sound indicating the end of operation or the sound of opening the door of the microwave is recognized after an operation time elapses since the display is presented to prompt the user to put food into the microwave and press the operation start button, the user is notified of the end of operation of the microwave (processing h) in step 4012*e*, and the processing proceeds to G in FIG. 155. If the notification sound indicating the start of the operation is recognized, the processing proceeds to step 4012*d*, where the elapse of the operation time is waited for, and the processing proceeds to step 4012*e*, where the user is notified of the end of operation of the microwave (processing h). Then, the processing proceeds to G in FIG. 155.

(Processing g: Collecting Sound by Sound Collecting Device in Vicinity and Recognizing Notification Sound of Microwave)

FIG. 157 is a diagram for describing processing of collecting sound by a sound collecting device in the vicinity and recognizing notification sound of a microwave according to the present embodiment. The following is a description of FIG. 157.

First, in step 4013*a*, a device (sound collecting device) is searched for which can communicate with a mobile phone and collect sound.

Next, it is checked in step 4013*b* whether a sound collecting device has been detected.

Here, in the case of No, the processing ends. On the other hand, in the case of Yes, the processing proceeds to step 4013*c*, where the position information of the sound collecting device and microphone characteristics information are obtained from the server.

Next, in step 4013*d*, it is checked whether the server has that information.

In the case of Yes, the processing proceeds to step 4013*r*, where it is checked whether the location of the sound collecting device is close enough to the microwave so that notification sound can be collected.

Here, in the case of No in step 4013*r*, the processing returns to step 4013*a*. In the case of Yes, the processing proceeds to step 4013*s*, where it is checked whether an arithmetic unit of the sound collecting device can perform sound recognition. In the case of Yes in step 4013*s*, information for recognizing notification sound of the microwave is transmitted to the sound collecting device in step 4013*u*. Next, in step 4013*v*, the sound collecting device is caused to start collecting and recognizing sound, and transmit the recognition results to the mobile phone. Next, in step 4013*q*, processing of recognizing notification sound of the microwave is performed until the cooking procedure proceeds to the next cooking step, and the recognition results are transmitted to the mobile phone. On the other hand, in the case of No in step 4013*s*, the processing proceeds to step 4013*t*, where the sound collecting device is caused to start collecting sound, and transmit collected sound to the mobile phone. Next, in step 4013*j*, the sound collecting device is caused to transmit the collected sound to the mobile phone until the cooking procedure proceeds to the next cooking step, and the mobile phone identifies notification sound of the microwave.

It should be noted that in the case of No in step 4013*d*, the processing proceeds to step 4013*e*, where it is checked whether the arithmetic unit of the sound collecting device can perform sound recognition.

In the case of Yes, the processing proceeds to step 4013*k*, where information for recognizing notification sound of the microwave is transmitted to the sound collecting device. Next, in step 4013*m*, the sound collecting device is caused to start collecting sound and recognizing sound, and transmit the recognition results to the mobile phone. Next, in step 4013*n*, notification sound of the microwave is output. Next, in step 4013*p*, it is checked whether the sound collecting device has successfully recognized the notification sound. In the case of Yes in step 4013*p*, the processing proceeds to 4013*q*, where the sound collecting device is caused to perform processing of recognizing the notification sound of the microwave until the cooking procedure proceeds to the next cooking step, and transmit the recognition results to the mobile phone, and then the processing returns to step 4013*a*. In the case of No in step 4013*p*, the processing returns to step 4013*a*.

Further, in the case of No in step 4013*e*, the processing proceeds to step 4013*f*, where the sound collecting device is caused to start collecting sound, and transmit the collected sound to the mobile phone. Next, in step 4013*g*, the notification sound of the microwave is output. Next, in step 4013*h*, recognition processing is performed on the sound transmitted from the sound collecting device. Next, in step 4013*i*, it is checked whether the notification sound has been successfully recognized. Here, in the case of Yes, the processing proceeds to 4013*j*, where the sound collecting device is caused to transmit the collected sound to the mobile phone until the cooking procedure proceeds to the next cooking step, and the mobile phone recognizes the notification sound of the microwave, and then the processing returns to step 4013*a*. In the case of No, the processing returns to step 4013*a*.

(Processing h: Notifying User of End of Operation of Microwave)

FIG. 158 is a diagram for describing processing of notifying a user of the end of operation of the microwave according to the present embodiment. The following is a description of FIG. 158.

First, in step 4013*a*, it is checked whether it can be determined that the mobile phone is currently being used or carried using sensor data. It should be noted that in the case of Yes, the processing proceeds to step 4014*m*, where the user is notified of the end of operation of the microwave using screen display, sound, and vibration of the mobile phone, for instance, and the processing ends.

On the other hand, in the case of No in step 4013*a*, the processing proceeds to step 4014*b*, where a device which is being operated (a device under user operation) is searched for from among devices such as a personal computer (PC) which the user has logged in.

Next, it is checked in step 4014*c* whether the device under user operation has been detected. It should be noted that in the case of Yes, the user is notified of the end of operation of the microwave using, for instance, the screen display of the device under user operation, and the processing ends.

In the case of No in step 4014*c*, the processing proceeds to step 4014*e*, where a device (imaging device) is searched for which can communicate with the mobile phone and obtain images.

Next, it is checked in step 4014*f* whether an imaging device has been detected.

Here, in the case of Yes, the processing proceeds to step 4014*p*, where the imaging device is caused to capture an image, transmit data of a user face to the imaging device itself, and then recognize the user face. Alternatively, the imaging device is caused to transmit the captured image to the mobile phone or the server, and the user face is recognized at the destination to which the image is transmitted.

Next, it is checked in step 4014*q* whether the user face has been recognized. In the case of No, the processing returns to step 4014*e*. In the case of Yes, the processing proceeds to step 4014*r*, where it is checked whether a device (detection device) which has detected the user includes a display unit and a sound output unit. In the case of Yes in step 4014*r*, the processing proceeds to step 4014*s*, where the user is notified of the end of operation of the microwave using the unit included in the device, and the processing ends.

In the case of No in step 4014*f*, the processing proceeds to step 4014*g*, where a device (sound collecting device) is searched for which can communicate with the mobile phone and collect sound.

In the case of No in step 4014*h*, the processing proceeds to step 4014*i*, where another device is detected which can determine a position of the user by operation of the device, by means of walk vibration, and the like. Next, the processing proceeds to step 4014*m*, where the user is notified of the end of operation of the microwave using, for instance, screen display, sound, and vibration of the mobile phone, and the processing ends.

It should be noted that in the case of Yes in step 4014*i*, the processing proceeds to step 4014*r*, where it is checked whether a device (detection device) which has detected the user includes a display unit and a sound output unit. Here, in the case of No, the position information of a detection device is obtained from the server.

Next, in step 4014*u*, a device (notification device) which is near the detection device, and includes a display unit and a sound output unit is searched for. Next, in step 4014*v*, the user is notified of the end of operation of the microwave by a screen display or sound of sufficient volume in consideration of the distance from the notification device to the user, and the processing ends.

(Processing i: Checking Operation State of Mobile Phone)

FIG. 159 is a diagram for describing processing of checking an operation state of a mobile phone according to the present embodiment. The following is a description of FIG. 159.

First, it is checked in step 4015*a* whether the mobile phone is being operated, the mobile phone is being carried, an input/output device connected to the mobile phone has received input and output, video and music are being played back, a device located near the mobile phone is being operated, or the user is recognized by a camera or various sensors of a device located near the mobile phone.

Here, in the case of Yes, the processing proceeds to step 4015*b*, where it is acknowledged that there is a high probability that the position of the user is close to this mobile phone. Then, the processing returns to step 4015*a*.

On the other hand, in the case of No, the processing proceeds to step 4015*c*, where it is checked whether a device located far from the mobile phone is being operated, the user is recognized by a camera or various sensors of the device located far from the mobile phone, or the mobile phone is being charged.

In the case of Yes in step 4015*c*, the processing proceeds to step 4015*d*, where it is acknowledged that there is a high probability that the position of the user is far from this mobile phone, and the processing returns to step 4015*a*. In the case of No in step 4015*c*, the processing returns to step 4015*a*.

(Processing j: Tracking User Position)

FIG. 160 is a diagram for describing processing of tracking a user position according to the present embodiment. The following is a description of FIG. 160.

First, in step 4016*a*, it is checked whether or not the mobile phone is determined as being carried, using a bearing sensor, a position sensor, or a 9-axis sensor. The 9-axis sensor is a sensor including at least one of an accelerometer, an angular velocity sensor, and a geomagnetic sensor.

In the case of Yes in step 4016*a*, the processing proceeds to step 4016*b*, where the positions of the mobile phone and the user are registered into the DB, and the processing returns to step 4016*a*.

On the other hand, in the case of No in step 4016*a*, the processing proceeds to step 4016*c*, where a device (user detection device) is searched for which can communicate with the mobile phone, and detect a user position and the presence of the user, such as a camera, a microphone, or a human sensing sensor.

Next, it is checked in step 4016*d* whether a sound collecting device is detected. In the case of No in step 4016*d*, the processing returns to step 4016*a*.

In the case of Yes in step 4016*d*, the processing proceeds to step 4016*e*, where it is checked whether the user detection device detects the user. In the case of No in step 4016*e*, the processing returns to step 4016*a*.

In the case of Yes in step 4016*e*, the processing proceeds to step 4016*f*, where the detection of the user is transmitted to the mobile phone.

Next, in step 4016*g*, the user being present near the user detection device is registered into the DB.

Next, in step 4016*h*, if the DB has position information of the user detection device, the information is obtained, thereby determining the position of the user, and the processing returns to step 4016*a*.

FIG. 161 is a diagram illustrating that while canceling sound from a sound output device, notification sound of a home electric appliance is recognized, an electronic device which can communicate is caused to recognize a current position of a user (operator), and based on the recognition result of the user position, a device located near the user position is caused to give a notification to the user. Further, FIG. 162 is a diagram illustrating content of a database held in a server, a mobile phone, or a microwave according to the present embodiment.

As illustrated in FIG. 162, on a microwave table 4040*a*, the model of a microwave, data for identifying sound which can be output (speaker characteristics, a modulation method, and the like), for each of various mobile phone models, data of notification sound having characteristics easily recognized by the mobile phone, and data of notification sound easily recognized by a typical mobile phone on the average are held in association with one another.

A mobile phone table 4040*b* holds mobile phones, and for each of the mobile phones, the model of the mobile phone, a user who uses the mobile phone, and data indicating the position of the mobile phone in association with one another.

A mobile phone model table 4040*c* holds the model of a mobile phone, sound-collecting characteristics of a microphone which is an accessory of the mobile phone of the model in association with each other.

A user voice characteristic table 4040*d* holds a user and an acoustic feature of the user voice in association with each other.

A user keyword voice table 4040*e* holds a user and voice waveform data obtained when the user says keywords such as "next" and "return" to be recognized by a mobile phone in association with each other. It should be noted that this data may be obtained by analyzing and changing in the form with which the data is easily handled, rather than the voice waveform data as is.

A user owned device position table **4040*f*** holds a user, a device that the user owns, and position data of the device in association with one another.

A user owned device position table **4040*g*** holds a user, a device that the user owns, and data of sound such as notification sound and operation sound output by the device in association with one another.

A user position table **4040*h*** holds a user and data of a position of the user in association with each other.

FIG. 163 is a diagram illustrating that a user cooks based on cooking processes displayed on a mobile phone, and further operates the display content of the mobile phone by saying "next", "return", and others according to the present embodiment. FIG. 164 is a diagram illustrating that the user has moved to another place while he/she is waiting until the operation of a microwave ends after starting the operation or while he/she is stewing food according to the present embodiment. FIG. 165 is a diagram illustrating that a mobile phone transmits an instruction to detect the user to a device which is connected to the mobile phone via a network, and can recognize a position of the user and the presence of the user, such as a camera, a microphone, or a human sensing sensor. FIG. 166 illustrates that as an example of user detection, a user face is recognized using a camera included in a television, and further the movement and presence of the user are recognized using a human sensing sensor of an air-conditioner. It should be noted that a television and an air-conditioner may perform this recognition processing, or image data or the like may be transmitted to a mobile phone or a server, and recognition processing may be performed at the transmission destination. From a viewpoint of privacy protection, it is better not to transmit data of the user to an external server.

FIG. 167 illustrates that devices which have detected the user transmit to the mobile phone the detection of the user and a relative position of the user to the devices which have detected the user.

As described above, it is possible to determine a user position if the DB has position information of a device which has detected the user.

FIG. 168 is a diagram illustrating that the mobile phone recognizes microwave operation end sound according to the present embodiment. FIG. 169 illustrates that the mobile phone which has recognized the end of the operation of the microwave transmits an instruction to, among the devices which have detected the user, a device having a screen-display function or a sound output function (the television in front of the user in this drawing) to notify the user of the end of the microwave operation.

FIG. 170 illustrates that the device which has received the instruction notifies the user of the details of the notification (in the drawing, the television displays the end of operation of the microwave on the screen thereof). FIG. 171 is a diagram illustrating that a device which is present near the microwave is connected to the mobile phone via a network, and includes a microphone recognizes the microwave operation end sound. FIG. 172 is a diagram illustrating that the device which has recognized the end of operation of the microwave notifies the mobile phone thereof. FIG. 173 illustrates that if the mobile phone is near the user when the mobile phone receives the notification indicating the end of the operation of the microwave, the user is notified of the end of the operation of the microwave, using screen display, sound output, and the like by the mobile phone.

FIG. 174 is a diagram illustrating that the user is notified of the end of the operation of the microwave. Specifically, FIG. 174 illustrates that if the mobile phone is not near the user when the mobile phone receives the notification indicating the end of the operation of the microwave, an instruction is transmitted to, among the devices which have detected the user, a device having a screen display function or a sound output function (the television in front of the user in this drawing) to notify the user of the end of the operation of the microwave, and the device which has received the instruction notifies the user of the end of the operation of the microwave. This drawing illustrates that there are often cases where the mobile phone is not present near the microwave nor the user when the mobile phone is connected to a charger, and thus the illustrated situation tends to occur.

FIG. 175 is a diagram illustrating that the user who has received the notification indicating the end of the operation of the microwave moves to a kitchen. It should be noted that the mobile phone shows what to do next for the cooking at this time. Further, the mobile phone may recognize that the user has moved to the kitchen by sound, for instance, and start giving explanation of the next process of the cooking in a timely manner.

FIG. 176 illustrates that the microwave transmits information such as the end of operation to the mobile phone by wireless communication, the mobile phone gives a notification instruction to the television which the user is watching, and the user is notified by a screen display or sound of the television.

It should be noted that a home LAN, direct wireless communication, especially the wireless communication of 700 MHz to 900 MHz, for instance, can be utilized for communication between an information source device (the microwave in this drawing) and the mobile phone and communication between the mobile phone and a device which gives a notification to the user (the television in this drawing). Further, although the mobile phone is utilized as a hub here, another device having communication capability may be utilized instead of the mobile phone.

FIG. 177 illustrates that the microwave transmits information such as the end of operation to the television which the user is watching by wireless communication, and the user is notified thereof using the screen display or sound of the television. This illustrates the operation performed when communication is performed not via the mobile phone serving as a hub in FIG. 176.

FIG. 178 illustrates that if an air-conditioner on the first floor notifies the user of certain information, the air-conditioner on the first floor transmits information to an air-conditioner on the second floor, the air-conditioner on the second floor transmits the information to the mobile phone, the mobile phone gives a notification instruction to the television which the user is watching, and the user is notified thereof by the screen display or sound of the television. This shows that an information source device (the air-conditioner on the first floor in this drawing) cannot directly communicate with the mobile phone serving as a hub, the information source device transmits information to another device which can communicate therewith, and establishes communication with the mobile phone.

FIG. 179 is a diagram illustrating that a user who is at a remote place is notified of information. Specifically, FIG. 179 illustrates that the mobile phone which has received a notification from the microwave by sound, optically, or via wireless communication, for instance, notifies the user at a remote place of information via the Internet or carrier communication. FIG. 180 illustrates that if the microwave cannot directly communicate with the mobile phone serving as a hub, the microwave transmits information to the mobile phone via a personal computer, for instance. FIG. 181 illustrates that the mobile phone which has received communication in FIG. 180 transmits information such as an operation instruction to the microwave, following the information-and-communication path in an opposite direction.

It should be noted that the mobile phone may automatically transmit information in response to the information in FIG. 180, notify the user of the information, and transmit information on the operation performed by the user in response to the notification.

FIG. 182 illustrates that in the case where the air-conditioner which is an information source device cannot directly communicate with the mobile phone serving as a hub, the air-conditioner notifies the user of information. Specifically, FIG. 182 illustrates that in the case where the air-conditioner which is an information source device cannot directly communicate with the mobile phone serving as a hub, first, information is transmitted to a device such as a personal computer which establishes one step of communication with the mobile phone as shown by A, the information is transmitted to the mobile phone from the personal computer via the Internet or a carrier communication network as shown by B and C, and the mobile phone processes the information automatically, or the user operates the mobile phone, thereby transmitting the information to the personal computer via the Internet or the carrier communication network as shown by D and E, the personal computer transmits a notification instruction to a device (the television in this drawing) which can notify the user who the computer wants to notify the information as shown by F, and the user is notified of the information using the screen display or sound of the television as shown by G.

Such a situation tends to occur if the user to receive notification information from the air-conditioner is different from the user who is using the mobile phone.

It should be noted that although communication between the personal computer and the mobile phone is established via the Internet or the carrier communication network in this drawing, communication may be established via a home LAN, direct communication, or the like.

FIG. 183 is a diagram for describing a system utilizing a communication device which uses a 700 to 900 MHz radio wave. Specifically, with the configuration in FIG. 183, a system is described which utilizes a communication unit (referred to as a G unit in the following) which uses a 700 to 900 MHz radio wave (referred to as a G radio wave in the following). FIG. 183 illustrates that the microwave having a G unit transmits information, using a G radio wave, to a mobile phone on the third floor having a G unit, the mobile phone on the third floor having the G unit transmits, utilizing a home network, the information to a mobile phone on the second floor which does not have a G unit, and the user is notified of the information from the mobile phone on the second floor.

It should be noted that for registration and authentication of communication between devices each having a G unit, a method using the NFC function of both the devices can be considered. In addition, if one of the devices does not have the NFC function, the output of a G radio wave is lowered so that communication is possible only in a range of about 10 to 20 cm, and both the devices are brought close to each other. If communication is successfully established, communication between the G units is registered and authenticated, which is a conceivable method as a registration mode.

In addition, an information source device (the microwave in this drawing) may be a device other than a microwave, as long as the device has a G unit.

In addition, a device (the mobile phone on the third floor in this drawing) which relays communication between the information source device and the information notification device (the mobile phone on the second floor in this drawing) may be a device such as a personal computer, an air-conditioner, or a smart meter rather than a mobile phone, as long as the device can access a G radio wave and a home network.

In addition, an information notification device may be a device such as a personal computer or a television rather than a mobile phone, as long as the device can access a home network, and give a notification to a user by using screen display, audio output, or the like.

FIG. 184 is a diagram illustrating that a mobile phone at a remote place notifies a user of information. Specifically, FIG. 184 illustrates that an air-conditioner having a G unit transmits information to a mobile phone having a G unit in a house, the mobile phone in the house transmits the information to the mobile phone at the remote place via the Internet or a carrier communication network, and the mobile phone at the remote place notifies the user of the information.

It should be noted that the information source device (the air-conditioner in this drawing) may be a device other than a microwave, as long as the device has a G unit.

In addition, a device (the mobile phone in the house in this drawing) which relays communication between the information source device and the information notification device (the mobile phone at a remote place in this drawing) may be a device such as a personal computer, an air-conditioner, or a smart meter rather than a mobile phone, as long as the device can access a G radio wave, the Internet, or a carrier communication network.

It should be noted that the information notification device may be a device such as a personal computer or a television rather than a mobile phone, as long as the device can access the Internet or a carrier communication network, and give a notification to a user by using screen display, audio output, or the like.

FIG. 185 is a diagram illustrating that the mobile phone at a remote place notifies the user of information. Specifically, FIG. 185 illustrates that a television having a G unit recognizes notification sound of the microwave which does not have a G unit and transmits information to the mobile phone having a G unit in the house via a G radio wave, the mobile phone in the house transmits the information to the mobile phone at a remote place via the Internet or a carrier communication network, and the mobile phone at the remote place notifies the user of the information.

It should be noted that another device may perform a similar operation to that of an information source device (the microwave in this drawing), and a method for a notification recognition device (the television in this drawing) to recognize notification from the information source device may be performed using, for instance, a light emission state rather than sound, which also achieves similar effects.

In addition, another device having a G unit may perform a similar operation to that of the notification recognition device. Further, a device (the mobile phone in the house in this drawing) which relays communication between the notification recognition device and the information notification device (the mobile phone at a remote place in this drawing) may be a device such as a personal computer, an air-conditioner, or a smart meter rather than a mobile phone, as long as the device can access a G radio wave, the Internet, or a carrier communication network.

It should be noted that the information notification device may be a device such as a personal computer or a television rather than a mobile phone, as long as the device can access the Internet or a carrier communication network and give a notification to a user using screen display and audio output, for instance.

In addition, FIG. 186 is a diagram illustrating that in a similar case to that of FIG. 185, a television on the second floor serves as a relay device instead of a device (a mobile phone in the house in FIG. 185) which relays communication between a notification recognition device (the television on the second floor in this drawing) and an information notification device (the mobile phone at a remote place in this drawing).

As described above, the device according to the present embodiment achieves the following functions.

a function of learning user voice characteristics through the use of an application a function of detecting a sound collecting device which can collect sound output from a mobile phone, from among devices which can communicate with the mobile phone and have a sound-collecting function a function of detecting a sound collecting device which can collect sound output from an electronic device, from among devices which can communicate with a mobile phone and have a sound-collecting function a function of causing a sound collecting device to transmit to a mobile phone as-is sound collected by the sound collecting device or a sound recognition result a function of analyzing characteristics of environmental sound and improving accuracy of sound recognition a function of obtaining, from a DB, sound which may be output from a device that a user owns and improving accuracy of sound recognition a function of detecting a sound output device sound output from which can be collected by a mobile phone or a sound collecting device, from among devices which can communicate with the mobile phone and have a sound output function a function of cancelling unnecessary sound from collected sound by obtaining audio data output from a sound output device, and subtracting the data from collected sound in consideration of transmission characteristics a function of obtaining processes of cooking for giving instructions to a user, in response to the reception of input of parameters of a cooking recipe, and obtaining control data for controlling a cooking device from a server a function of making settings so that a mobile phone and a sound collecting device easily recognize notification sound output from a device, based on data of sound which can be output by the device a function of improving accuracy of recognizing user voice by adjusting a recognition function, based on user voice characteristics a function of recognizing user voice using plural sound collecting devices a function of recognizing notification sound of an electronic device using plural sound collecting devices a function of obtaining necessary information from an electronic device and making settings in a microwave via, for instance, a mobile phone and a noncontact IC card of an electronic device in order to perform a series of operations only by one operation a function of searching for a user using a device such as a camera, a microphone, or a human sensing sensor which can communicate with a mobile phone, and causing the device to transmit a current position of the user to the mobile phone or store the position into a DB a function of notifying a user from a device located near the user using a position of the user stored in a DB a function of estimating whether a user is present near a mobile phone, based on states (an operating condition, a sensor value, a charging state, a data link state, and the like) of the mobile phone It should be noted that in the processing in FIGS. 145 to 175, similar functionality can be achieved even by changing sound data to light emission data (frequency, brightness, and the like), sound output to light emission, and sound collection to light reception, respectively.

In addition, although a microwave is used as an example in the present embodiment, an electronic device which outputs notification sound to be recognized may not be a microwave, but changed to a washing machine, a rice cooker, a cleaner, a refrigerator, an air cleaner, an electric water boiler, an automatic dishwasher, an air-conditioner, a personal computer, a mobile phone, a television, a car, a telephone, a mail receiving device, or the like, which also achieves similar effects.

In addition, although a microwave, a mobile phone, and a device such as a television which gives notification to a user establish direct communication to one another in the present embodiment, the devices may communicate with one another indirectly via another device if there is a problem with direct communication.

In addition, although communication established mainly utilizing a home LAN is assumed in the present embodiment, even direct wireless communication between devices and communication via the Internet or a carrier communication network can achieve similar functionality.

The present embodiment achieves effects of preventing leakage of personal information since a mobile phone makes simultaneous inquiry about the position of a user, to cause a camera of a TV, for instance, to perform person identification, and a coded result is transmitted to the mobile phone of that user. Even if there are two or more people in a house, data obtained by a human sensing sensor of an air-conditioner, an air cleaner, and a refrigerator is transmitted to a position control database of a mobile phone or the like, whereby the movement of an operator recognized once is tracked by the sensor. This allows the position of the operator to be estimated.

It should be noted that if a user owns a mobile phone having a gyroscope or an azimuth meter, data of identified position may be registered into a user position database.

In addition, when an operator places a mobile phone, the operation of a physical sensor firstly stops for a certain period of time, and thus this can be detected. Next, button operation and human sensing sensors of a home electric appliance and a light, a camera of a TV or the like, a microphone of the mobile phone, and the like are used to detect that the operator has left there. Then, the position of the operator is registered into a mobile phone or the user position database of a server in the house.

As described above, according to Embodiment 9, an information communication device (recognition device) which enables communication between devices can be achieved.

Specifically, the information communication device according to the present embodiment may include a recognition device which searches for an electronic device (sound collecting device) having sound-collecting functionality from among electronic devices which can communicate with an operation terminal, and recognizes, utilizing the sound-collecting functionality of the sound collecting device, notification sound of another electronic device.

Here, this recognition device may be a recognition device utilizing the sound-collecting functionality of only a sound collecting device which can collect tones output from the operation terminal.

In addition, the information communication device according to the present embodiment may include a sound collecting device which searches for an electronic device (sound output device) having sound output functionality from among electronic devices which can communicate with the operation terminal, analyzes sound transmission characteristics between the sound output device and the sound collecting device, obtains output sound data from the sound output device, and cancels, from the collected sound, sound output from the sound output device, based on the sound transmission characteristics and the output sound data.

In addition, the information communication device according to the present embodiment may include a recognition device which adjusts notification sound of electronic device whose notification sound is to be recognized so that the sound is prevented from being lost in environmental sound.

In addition, the information communication device according to the present embodiment may include a recognition device which stores, in a database, an electronic device owned by a user (owned electronic device), data of sound output by the owned electronic device, and position data of the owned electronic device, and adjusts notification sound of the electronic device to be recognized so that the sound output by the owned electronic device and the notification sound of the electronic device to be recognized are easily distinguished.

Here, this recognition device may further adjust sound recognition processing so that it is easy to distinguish between the sound output by an owned electronic device and the notification sound of the electronic device to be recognized.

In addition, the information communication device according to the present embodiment may include a recognition device which recognizes whether the positions of the operation terminal and an operator are close to each other, utilizing an operating condition of an operation terminal, a sensor value of a physical sensor, a data link state, and a charging state.

Here, this recognition device may further recognize a position of the user, utilizing an operating state of an electronic device which can communicate with an operation terminal, a camera, a microphone, a human sensing sensor, and position data of the electronic device stored in the database.

In addition, this recognition device may further be included in an information notifying device which notifies a user of information using the notification device which can give notification to the user, utilizing a recognition result of the user position, and position data, stored in the database, of an electronic device (notification device) which has a function of giving notification to the user by means of screen display, voice output, and the like.

It should be noted that these general and specific embodiments may be implemented using a system, a method, an integrated circuit, a computer program, or a recording medium, or any combination of systems, methods, integrated circuits, computer programs, or recording media.

Embodiment 10

Currently, various simple authentication methods have been considered in wireless communication. For example, a push button method, a personal identification number (PIN) input method, an NFC method, and the like are specified in the Wi-Fi protected setup (WPS) of wireless LAN, which is set by the Wi-Fi alliance. With various simple authentication methods in wireless communication, whether a user using a device is to be authenticated is determined by limiting a time period or determining that the user is in a range where he/she can touch both devices, thereby authenticating the user.

However, it cannot be said that the method of limiting a time period is secured if a user with evil intention is at some short distance. In addition, there are cases where the user has difficulty or troublesome in directly touching an installed device such as a home electric appliance.

In view of this, in the present embodiment, a method of determining that a user who is to be authenticated is certainly in a room, and performing wireless authentication of a home electric appliance with ease and in a secured manner, by using communication using visible light for wireless authentication.

FIG. 187 is a diagram illustrating an example of an environment in a house in the present embodiment. FIG. 188 is a diagram illustrating an example of communication between a smartphone and home electric appliances according to the present embodiment. FIG. 189 is a diagram illustrating a configuration of a transmitter device according to the present embodiment. FIG. 190 is a diagram illustrating a configuration of a receiver device according to the present embodiment. FIGS. 187 to 190 are similar to FIGS. 124 to 127, and thus a detailed description thereof is omitted.

Home environment is assumed to be an environment where a tablet terminal which the user has in the kitchen and a TV placed in a living room are authenticated as illustrated in FIG. 187. Assume that both the devices are terminals which can be connected to a wireless LAN, and each include a WPS module.

FIG. 191 is a sequence diagram for when a transmitter terminal (TV) performs wireless LAN authentication with a receiver terminal (tablet terminal), using optical communication in FIG. 187. The following is a description of FIG. 191.

First, for example, a transmitter terminal as illustrated in FIG. 189 creates a random number (step 5001*a*). Next, the random number is registered in a registrar of WPS (step 5001*b*). Furthermore, a light emitting element is caused to emit light as indicated by a pattern of the random number registered in the registrar (step 5001*c*).

On the other hand, while the light emitting element of the transmitter device is emitting light, a receiver device as illustrated in, for example, FIG. 190 activates a camera thereof in an optical authentication mode. Here, the optical authentication mode is a mode in which it can be recognized that the light emitting element is emitting light for authentication, and is a video shooting mode which allows shooting in accordance with a cycle of light emissions.

Accordingly, a user shoots a light emitting element of the transmitter terminal, first (step 5001*d*). Next, the receiver terminal receives the random number by shooting (step 5001*e*). Next, the receiver terminal which has received the random number inputs the random number as a PIN of WPS (step 5001*f*).

Here, the transmitter and receiver terminals which share the PIN perform authentication processing according to the standard by WPS (step 5001*g*).

Next, when the authentication is completed, the transmitter terminal deletes the random number from the registrar; and avoids accepting authentication from a plurality of terminals (5001*h*).

It should be noted that this method is applicable not only to wireless LAN authentication, but also to all the wireless authentication methods which use a common key.

In addition, this method is not limited to a wireless authentication method. For example it is also applicable for authentication of an application loaded on both the TV and the tablet terminal.

FIG. 192 is a sequence diagram for when authentication is performed using an application according to the present embodiment. The following is a description of FIG. 192.

First, a transmitter terminal creates a transmitter ID according to the state of the terminal (step 5002*a*). Here, the transmitter ID may be a random number or a key for coding. In addition, a terminal ID (a MAC address, an IP address) of the transmitter terminal may be included. Next, the transmitter terminal emits light as indicated by the pattern of the transmitter ID (step 5002*b*).

On the other hand, a receiver device receives the transmitter ID in the same process as in the case of wireless authentication (step 5002*f*). Next, upon the reception of the transmitter ID, the receiver device creates a receiver ID which can show that the transmitter ID has been received (step 5002*g*). For example, the receiver ID may be a terminal ID of the receiver terminal coded in the transmitter ID. In addition, the receiver ID may also include a process ID and a password of an application which has been activated in the receiver terminal. Next, the receiver terminal broadcasts the receiver ID wirelessly (step 5002*h*). It should be noted that if a terminal ID of the transmitter terminal is included in the transmitter ID, the receiver terminal may unicast the receiver ID Next, the transmitter terminal which has received the receiver ID wirelessly (5002*c*) performs authentication with a terminal which has transmitted the received receiver ID, using the transmitter ID shared in both the terminals (step 5002*d*).

FIG. 193 is a flowchart illustrating operation of the transmitter terminal according to the present embodiment. The following is a description of FIG. 193.

First, the transmitter terminal emits light indicating an ID, according to the state of the terminal (step 5003*a*).

Next, light is emitted by the pattern according to the ID (step 5003*b*).

Next, it is checked whether there is a wireless response corresponding to the ID indicated by emitted light (step 5003*c*). If there is a response (Yes in step 5003*c*), processing of authenticating the terminal which has transmitted the response is performed (step 5003*d*). It should be noted that if there is no response in step 5003*c*, the transmitter terminal waits until a timeout time elapses (step 5003*i*), and ends the processing after displaying there being no response (step 5003*j*).

Next, it is checked whether authentication processing has succeeded in step 5003*e*, and when authentication processing has succeeded (Yes in step 5003*e*), if a command other than authentication is included in the ID indicated by light emission (Yes in step 5003*f*), processing in accordance with the command is performed (step 5003*g*).

It should be noted that if authentication fails in step 5003*e*, an authentication error is displayed (step 5003*h*), and the processing ends.

FIG. 194 is a flowchart illustrating operation of the receiver terminal according to the present embodiment. The following is a description of FIG. 194.

First, a receiver terminal activates a camera in an optical authentication mode (step 5004*a*).

Next, it is checked whether light has been received in a specific pattern (step 5004*b*), and if it is determined that such light has been received (Yes in step 5004*b*), a receiver ID is created which can show that a transmitter ID has been received (step 5004*c*). It should be noted that if it is not determined that such light has been received (No in step 5004*b*), the receiver terminal waits until a timeout time elapses (Yes in step 5004*i*), and displays timeout (step 5004*j*), and the processing ends.

Next, it is checked whether the transmitter terminal holds an ID of the transmitter terminal (step 5004*k*), and if the transmitter terminal holds the ID of the terminal (Yes in step 5004*k*), the transmitter terminal unicasts the receiver ID to the terminal (step 5004*d*). On the other hand, if the transmitter terminal does not hold the ID of the terminal (No in step 5004*k*), the transmitter terminal broadcasts the receiver ID (step 5004*l*).

Next, authentication processing is started by the transmission terminal (step 5004*e*), and if the authentication processing has succeeded (Yes in step 5004*e*), it is determined whether a command is included in the ID obtained by receiving light (step 5004*f*). If it is determined in step 5004*f* that a command is included (YES in step 5004*f*), processing according to the ID is performed (step 5004*g*).

It should be noted that if authentication fails in step 5004*e* (No in step 5004*e*), an authentication error is displayed (step 5004*h*), and the processing ends.

As described above, according to the present embodiment, the communication using visible light is used for wireless authentication, whereby it can be determined that a user to be authenticated is certainly in a room, and wireless authentication of a home electric appliance can be performed with ease and in a secured manner.

Embodiment 11

Although the flows for data exchange using NFC communication and high-speed wireless communication are described in the embodiments above, the present disclosure is not limited to those. An embodiment of the present disclosure can of course be achieved as the flows as illustrated in FIGS. 195 to 197, for example.

FIG. 195 is a sequence diagram in which a mobile AV terminal 1 transmits data to a mobile AV terminal 2 according to the present embodiment. Specifically, FIG. 195 is a sequence diagram of data transmission and reception performed using NFC and wireless LAN communication. The following is a description of FIG. 195.

First, the mobile AV terminal 1 displays, on a screen, data to be transmitted to the mobile AV terminal 2.

Here, if the mobile AV terminals 1 and 2 are brought into contact with each other to perform NFC communication, the mobile AV terminal 1 displays, on the screen, a confirmation screen for checking whether data transmission is to be performed. This confirmation screen may be a screen for requesting a user to select "Yes/No" together with the words "Transmit data?" or may be an interface for starting data transmission by the screen of the mobile AV terminal 1 being touched again.

In the case of "Yes" when it is checked whether data is intended to be transmitted, the mobile AV terminal 1 and the mobile AV terminal 2 exchange, by NFC communication, information on data to be transmitted and information for establishing high-speed wireless communication. The information on the data to be transmitted may be exchanged by wireless LAN communication. Information on establishment of wireless LAN communication may indicate a communication channel, or a service set identifier (SSID), and cryptographic key information, or may indicate a method of exchanging ID information created randomly and establishing a secure channel using this information If wireless LAN communication is established, the mobile AV terminals 1 and 2 perform data communication by wireless LAN communication, and the mobile AV terminal 1 transmits the transmission target data thereof to the mobile AV terminal 2.

Next, a description is given using FIGS. 196 and 197, focusing on changes of the screens of the mobile AV terminal 1 and the mobile AV terminal 2. FIG. 196 is a diagram illustrating a screen changed when the mobile AV terminal 1 transmits data to the mobile AV terminal 2 according to the present embodiment. FIG. 197 is a diagram illustrating a screen changed when the mobile AV terminal 1 transmits data to the mobile AV terminal 2 according to the present embodiment.

In FIGS. 196 and 197, a user activates an application for reproducing video and a still image in the mobile AV terminal 1, first. This application displays a still image and video data stored in the mobile AV terminal 1.

Here, NFC communication is performed by bringing the mobile AV terminals 1 and 2 to be almost in contact with each other. This NFC communication is processing for starting exchange of a still image and video data in the mobile AV terminal 1.

First, when the mobile AV terminals 1 and 2 recognize the start of data exchange by NFC communication, a confirmation screen for checking whether data is to be transmitted is displayed on the screen of the mobile AV terminal 1. It should be noted that this confirmation screen may be an interface for facilitating a user to touch the screen to start data transmission or an interface for facilitating a user to select whether to allow data transmission by Yes/No, as in FIG. 196. In the case of Yes in determination as to whether data transmission is to be started, or specifically, when the mobile AV terminal 1 is to transmit data to the mobile AV terminal 2, the mobile AV terminal 1 transmits, to the mobile AV terminal 2, information on data to be exchanged and information on the start of high-speed wireless communication via a wireless LAN. It should be noted that information on this data to be exchanged may be transmitted using high-speed wireless communication.

Next, upon receipt and transmission of the information on the start of high-speed wireless communication via the wireless LAN, the mobile AV terminals 1 and 2 perform processing for establishing connection by wireless LAN communication. This processing includes determining which channel is to be used for communication, and which of the terminals is a parent terminal and which is a child terminal on communication topology, and exchanging password information, SSIDs of the terminals, and terminal information, for instance.

Next, when the connection by wireless LAN communication is established, the mobile AV terminals 1 and 2 transmit data by wireless LAN communication. During data transmission, the mobile AV terminal 1 displays, on the screen, video being reproduced normally, whereas the mobile AV terminal 2 which receives data displays, on the screen, data being received. This is because if the mobile AV terminal 1 displays data being transmitted on the screen, the mobile AV terminal 1 cannot perform other processing, and thus data is transmitted in the background, thereby achieving an advantage of the improvement of a user's convenience. In addition, the mobile AV terminal 2 which is receiving data displays data being received on the screen so that the received data can be immediately displayed, thereby achieving an advantage of displaying data immediately after reception of the data is completed.

Finally, the mobile AV terminal 2 displays the received data after the data reception is completed.

FIGS. 198 to 200 are system outline diagrams when the mobile AV terminal 1 is a digital camera according to the present embodiment.

As illustrated in FIG. 198, it is needless to say that the mobile phone according to the present embodiment is even applicable to the case where the mobile AV terminal 1 is a digital camera.

In addition, if the mobile AV terminal 1 is a digital camera, the digital camera does not have a means of the Internet access by mobile-phone communication in many cases, although typical digital cameras have a means of the Internet access by wireless LAN.

Accordingly, it is preferable to adopt a configuration in which as illustrated in FIGS. 199 and 200, the digital camera (the mobile AV terminal 1) transmits captured image data by a wireless LAN to picture sharing service in an environment where wireless LAN communication can be performed, whereas in an environment where wireless LAN communication cannot be performed, the digital camera transmits data to the mobile AV terminal 2 using a wireless LAN first, and the mobile AV terminal 2 transmits the as-is received data to picture sharing service by mobile phone communication.

Since wireless LAN communication is performed at a higher speed than mobile phone communication, a picture can be transmitted to picture sharing service at high speed by performing wireless LAN communication if possible. In addition, the service area of a mobile phone communication network is generally larger than a wireless LAN communication network, and thus if wireless LAN environment is not available, a function of transmitting data to picture sharing service by mobile phone communication via the mobile AV terminal 2 is provided, thereby allowing a picture to be immediately transmitted to picture sharing service at various places.

As described above, according to the present embodiment, data can be exchanged using NFC communication and high-speed wireless communication.

The above is a description of, for instance, an information communication device according to one or more aspects of the present disclosure based on the embodiments. The present disclosure, however, is not limited to the embodiments. Various modifications to the embodiments that may be conceived by those skilled in the art and combinations of constituent elements in different embodiments may be included within the scope of one or more aspects of the present disclosure, without departing from the spirit of the present disclosure.

It should be noted that in the above embodiments, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory.

Embodiment 12

This embodiment describes each example of application using a receiver such as a smartphone and a transmitter for transmitting information as an LED blink pattern in Embodiments 1 to 11 described above.

FIG. 201 is a diagram illustrating an example of application of the receiver and the transmitter in Embodiment 12.

A transmitter 7001*a* such as a signage of a restaurant transmits identification information (ID) of the transmitter 7001*a* to a receiver 7001*b* such as a smartphone. The receiver 7001*b* obtains information associated with the ID from a server, and displays the information. Examples of the information include a route to the restaurant, availability, and a coupon.

FIG. 202 is a diagram illustrating an example of application of the receiver and the transmitter in Embodiment 12.

A transmitter 7042*b* such as a signage of a movie transmits identification information (ID) of the transmitter 7042*b* to a receiver 7042*a* such as a smartphone. The receiver 7042*a* obtains information associated with the ID from a server, and displays the information. Examples of the information include an image 7042*c* prompting to reserve a seat for the movie, an image 7042*d* showing scheduled times for the movie, an image 7042*e* showing availability, and an image 7042*f* notifying reservation completion.

FIG. 203 is a diagram illustrating an example of application of the receiver and the transmitter in Embodiment 12.

A transmitter 7043*b* such as a signage of a drama transmits identification information (ID) of the transmitter 7043*b* to a receiver 7043*a* such as a smartphone. Having received the ID, the receiver 7043*a* obtains information associated with the ID from a server, and displays the information. Examples of the information include an image 7043*c* prompting to timer record the drama, an image 7043*d* prompting to select a recorder for recording the drama, and an image 7043*e* notifying timer recording completion.

FIG. 204 is a diagram illustrating an example of application of the receiver and the transmitter in Embodiment 12.

A transmitter 7044*d* or 7044*c* such as a signage of a store, e.g. a roof sign or a sign placed on a street, transmits identification information (ID) of the transmitter 7044*d* or 7044*c* to a receiver 7044*a* such as a smartphone. The receiver 7044*a* obtains information associated with the ID from a server, and displays the information. Examples of the information include an image 7044*b* showing availability, a coupon, and the like of the store.

FIG. 205 is a flowchart illustrating an example of processing operation of the receiver and the transmitter in Embodiment 12. This flowchart corresponds to the examples of application illustrated in FIGS. 201 to 204.

First, the ID of the transmitter and the information to be provided to the receiver receiving the ID are stored in the server in association with each other (Step 7101*a*). The information to be provided to the receiver may include information such as a store name, a product name, map information to a store, availability information, coupon information, stock count of a product, show time of a movie or a play, reservation information, and a URL of a server for reservation or purchase.

Next, the transmitter transmits the ID (Step 7101*b*). The camera of the receiver is pointed to the transmitter, to receive the ID (Step 7101*c*).

The receiver transmits the received ID to the server, and stores the information associated with the ID in the receiver (Step 7101*d*).

The receiver also stores a terminal ID and a user ID in the server (Step 7101*e*). The receiver displays the information stored in the server as the information to be displayed on the receiver (Step 7101*f*).

The receiver adjusts the display, based on a user profile stored in the receiver or the server (Step 7101*g*). For example, the receiver performs control such as changing the font size, hiding age-restricted content, or preferentially displaying content assumed to be preferred from the user's past behavior.

The receiver displays the route from the current position to the store or the sales floor (Step 7101*h*). The receiver obtains information from the server according to need, and updates and displays availability information or reservation information (Step 7101*i*). The receiver displays a button for storing the obtained information and a button for cancelling the storage of the displayed information (Step 7101*j*).

The user taps the button for storing the information obtained by the receiver (Step 7101*k*). The receiver stores the obtained information so as to be redisplayable by a user operation (Step 7101*m*). A reader in the store reads information transmitted from the receiver (Step 7101*n*). Examples of the transmission method include visible light communication, communication via Wi-Fi or Bluetooth, and communication using 2D barcode. The transmission information may include the ID of the receiver or the user ID.

The reader in the store stores the read information and an ID of the store in the server (Step 7101*p*). The server stores the transmitter, the receiver, and the store in association with each other (Step 7101*q*). This enables analysis of the advertising effectiveness of the signage.

FIG. 206 is a diagram illustrating an example of application of the receiver and the transmitter in Embodiment 12.

A transmitter 7002*a* such as a signage of a plurality of stores transmits identification information (ID) of the transmitter 7002*a* to a receiver 7002*b* such as a smartphone. Having received the ID, the receiver 7002*b* obtains information associated with the ID from a server, and displays the same information as the signage. When the user selects a desired store by tapping or voice, the receiver 7002*b* displays the details of the store.

FIG. 207 is a flowchart illustrating an example of processing operation of the receiver 7002*b* and the transmitter 7002*a* in Embodiment 12.

The ID of the transmitter 7002*a* and the information to be provided to the receiver 7002*b* receiving the ID are stored in the server in association with each other (Step 7102*a*). The information to be provided to the receiver 7002*b* may include information such as a store name, a product name, map information to a store, availability information, coupon information, stock count of a product, show time of a movie or a play, reservation information, and a URL of a server for reservation or purchase. The position relation of information displayed on the transmitter 7002*a* is stored in the server.

The transmitter 7002*a* such as a signage transmits the ID (Step 7102*b*). The camera of the receiver 7002*b* is pointed to the transmitter 7002*a*, to receive the ID (Step 7102*c*). The receiver 7002*b* transmits the received ID to the server, and obtains the information associated with the ID (Step 7102*d*). The receiver 7002*b* displays the information stored in the server as the information to be displayed on the receiver 7002*b* (Step 7102*e*). An image which is the information may be displayed on the receiver 7002*b* while maintaining the position relation of the image displayed on the transmitter 7002*a*.

The user selects information displayed on the receiver 7002*b*, by designation by screen tapping or voice (Step 7102*f*). The receiver 7002*b* displays the details of the information designated by the user (Step 7102*g*).

FIG. 208 is a diagram illustrating an example of application of the receiver and the transmitter in Embodiment 12.

A transmitter 7003*a* such as a signage of a plurality of stores transmits identification information (ID) of the transmitter 7003*a* to a receiver 7003*b* such as a smartphone. Having received the ID, the receiver 7003*b* obtains information associated with the ID from a server, and displays information near (e.g. nearest) the center of the captured image of the camera of the receiver 7003*b* from among the information displayed on the signage.

FIG. 209 is a flowchart illustrating an example of processing operation of the receiver 7003*b* and the transmitter 7003*a* in Embodiment 12.

The ID of the transmitter 7003*a* and the information to be provided to the receiver 7003*b* receiving the ID are stored in the server in association with each other (Step 7103*a*). The information to be provided to the receiver 7003*b* may include information such as a store name, a product name, map information to a store, availability information, coupon information, stock count of a product, show time of a movie or a play, reservation information, and a URL of a server for reservation or purchase. The position relation of information displayed on the transmitter 7003*a* is stored in the server.

The transmitter 7003*a* such as a signage transmits the ID (Step 7103*b*). The camera of the receiver 7003*b* is pointed to the transmitter 7003*a*, to receive the ID (Step 7103*c*). The receiver 7003*b* transmits the received ID to the server, and obtains the information associated with the ID (Step 7103*d*). The receiver 7003*b* displays information nearest the center of the captured image or the designated part from among the information displayed on the signage (Step 7103*e*).

FIG. 210 is a diagram illustrating an example of application of the receiver and the transmitter in Embodiment 12.

A transmitter 7004*a* such as a signage of a plurality of stores transmits identification information (ID) of the transmitter 7004*a* to a receiver 7004*b* such as a smartphone. Having received the ID, the receiver 7004*b* obtains information associated with the ID from a server, and displays information (e.g. image showing the details of the store "B Cafe") near the center of the captured image of the camera of the receiver 7004*b* from among the information displayed on the signage. When the user flicks left the screen, the receiver 7004*b* displays an image showing the details of the store "C Bookstore" on the right side of the store "B Cafe" on the signage. Thus, the receiver 7004*b* displays the image in the same position relation as that in the transmitter signage.

FIG. 211 is a flowchart illustrating an example of processing operation of the receiver 7004*b* and the transmitter 7004*a* in Embodiment 12.

The ID of the transmitter 7004*a* and the information to be provided to the receiver 7004*b* receiving the ID are stored in the server in association with each other (Step 7104*a*). The information to be provided to the receiver 7004*b* may include information such as a store name, a product name, map information to a store, availability information, coupon information, stock count of a product, show time of a movie or a play, reservation information, and a URL of a server for reservation or purchase. The position relation of information displayed on the transmitter 7004*a* is stored in the server.

The transmitter 7004*a* such as a signage transmits the ID (Step 7104*b*). The camera of the receiver 7004*b* is pointed to the transmitter 7004*a*, to receive the ID (Step 7104*c*). The receiver 7004*b* transmits the received ID to the server, and obtains the information associated with the ID (Step 7104*d*). The receiver 7004*b* displays the information stored in the server as the information to be displayed on the receiver 7004*b* (Step 7104*e*).

The user performs a flick operation on the receiver 7004*b* (Step 7104*f*). The receiver 7004*b* changes the display in the same position relation as the information displayed on the transmitter 7004*a*, according to the user operation (Step 7104*g*). For example, in the case where the user flicks left the screen to display the information on the right side of the currently displayed information, the information displayed on the transmitter 7004*a* on the right side of the information currently displayed on the receiver 7004*b* is displayed on the receiver 7004*b*.

FIG. 212 is a diagram illustrating an example of application of the receiver and the transmitter in Embodiment 12.

A transmitter 7005*a* such as a signage of a plurality of stores transmits identification information (ID) of the transmitter 7005*a* to a receiver 7005*b* such as a smartphone. Having received the ID, the receiver 7005*b* obtains information associated with the ID from a server, and displays information (e.g. image showing the details of the store "B Cafe") near the center of the captured image of the camera of the receiver 7005*b* from among the information displayed on the signage. When the user taps the left of the screen (or a left arrow on the screen) of the receiver 7005*b*, the receiver 7005*b* displays an image showing the details of the store "A Restaurant" on the left side of the store "B Cafe" on the signage. When the user taps the bottom of the screen (or a down arrow on the screen) of the receiver 7005*b*, the receiver 7005*b* displays an image showing the details of the store "E Office" below the store "B Cafe" on the signage. When the user taps the right of the screen (or a right arrow on the screen) of the receiver 7005*b*, the receiver 7005*b* displays an image showing the details of the store "C Bookstore" on the left side of the store "B Cafe" on the signage. Thus, the receiver 7004*b* displays the image in the same position relation as that in the transmitter signage.

FIG. 213 is a flowchart illustrating an example of processing operation of the receiver 7005*b* and the transmitter 7005*a* in Embodiment 12.

The ID of the transmitter 7005*a* and the information to be provided to the receiver 7005*b* receiving the ID are stored in the server in association with each other (Step 7105*a*). The information to be provided to the receiver 7005*b* may include information such as a store name, a product name, map information to a store, availability information, coupon information, stock count of a product, show time of a movie or a play, reservation information, and a URL of a server for reservation or purchase. The position relation of information displayed on the transmitter 7005*a* is stored in the server.

The transmitter 7005*a* such as a signage transmits the ID (Step 7105*b*). The camera of the receiver 7005*b* is pointed to the transmitter 7005*a*, to receive the ID (Step 7105*c*). The receiver 7005*b* transmits the received ID to the server, and obtains the information associated with the ID (Step 7105*d*). The receiver 7005*b* displays the information stored in the server as the information to be displayed on the receiver 7005*b* (Step 7105*e*).

The user taps the edge of the screen displayed on the receiver 7005*b* or the up, down, left, or right direction indicator displayed on the receiver 7005*b* (Step 7105*f*). The receiver changes the display in the same position relation as the information displayed on the transmitter 7005*a*, according to the user operation. For example, in the case where the user taps the right of the screen or the right direction indicator on the screen, the information displayed on the transmitter 7005*a* on the right side of the information currently displayed on the receiver 7005*b* is displayed on the receiver 7005*b*.

FIG. 214 is a diagram illustrating an example of application of the receiver and the transmitter in Embodiment 12. A rear view of a vehicle is given in FIG. 214.

A transmitter (vehicle) 7006*a* having, for instance, two car taillights (light emitting units or lights) transmits identification information (ID) of the transmitter 7006*a* to a receiver such as a smartphone. Having received the ID, the receiver obtains information associated with the ID from a server. Examples of the information include the ID of the vehicle or the transmitter, the distance between the light emitting units, the size of the light emitting units, the size of the vehicle, the shape of the vehicle, the weight of the vehicle, the number of the vehicle, the traffic ahead, and information indicating the presence/absence of danger. The receiver may obtain these information directly from the transmitter 7006*a*.

FIG. 215 is a flowchart illustrating an example of processing operation of the receiver and the transmitter 7006*a* in Embodiment 12.

The ID of the transmitter 7006*a* and the information to be provided to the receiver receiving the ID are stored in the server in association with each other (Step 7106*a*). The information to be provided to the receiver may include information such as the size of the light emitting unit as the transmitter 7006*a*, the distance between the light emitting units, the shape and weight of the object including the transmitter 7006*a*, the identification number such as a vehicle identification number, the state of an area not easily observable from the receiver, and the presence/absence of danger.

The transmitter 7006*a* transmits the ID (Step 7106*b*). The transmission information may include the URL of the server and the information to be stored in the server.

The receiver receives the transmitted information such as the ID (Step 7106*c*). The receiver obtains the information associated with the received ID from the server (Step 7106*d*). The receiver displays the received information and the information obtained from the server (Step 7106*e*).

The receiver calculates the distance between the receiver and the light emitting unit by triangulation, from the information of the size of the light emitting unit and the apparent size of the captured light emitting unit or from the information of the distance between the light emitting units and the distance between the captured light emitting units (Step 7106*f*). The receiver issues a warning of danger or the like, based on the information such as the state of an area not easily observable from the receiver and the presence/absence of danger (Step 7106*g*).

FIG. 216 is a diagram illustrating an example of application of the receiver and the transmitter in Embodiment 12.

A transmitter (vehicle) 7007*b* having, for instance, two car taillights (light emitting units or lights) transmits information of the transmitter 7007*b* to a receiver 7007*a* such as a transmitter-receiver in a parking lot. The information of the transmitter 7007*b* indicates the identification information (ID) of the transmitter 7007*b*, the number of the vehicle, the size of the vehicle, the shape of the vehicle, or the weight of the vehicle. Having received the information, the receiver 7007*a* transmits information of whether or not parking is permitted, charging information, or a parking position. The receiver 7007*a* may receive the ID, and obtain information other than the ID from the server.

FIG. 217 is a flowchart illustrating an example of processing operation of the receiver 7007*a* and the transmitter 7007*b* in Embodiment 12. Since the transmitter 7007*b* performs not only transmission but also reception, the transmitter 7007*b* includes an in-vehicle transmitter and an in-vehicle receiver.

The ID of the transmitter 7007*b* and the information to be provided to the receiver 7007*a* receiving the ID are stored in the server (parking lot management server) in association with each other (Step 7107*a*). The information to be provided to the receiver 7007*a* may include information such as the shape and weight of the object including the transmitter 7007*b*, the identification number such as a vehicle identification number, the identification number of the user of the transmitter 7007*b*, and payment information.

The transmitter 7007*b* (in-vehicle transmitter) transmits the ID (Step 7107*b*). The transmission information may include the URL of the server and the information to be stored in the server. The receiver 7007*a* (transmitter-receiver) in the parking lot transmits the received information to the server for managing the parking lot (parking lot management server) (Step 7107*c*). The parking lot management server obtains the information associated with the ID of the transmitter 7007*b*, using the ID as a key (Step 7107*d*). The parking lot management server checks the availability of the parking lot (Step 7107*e*).

The receiver 7007*a* (transmitter-receiver) in the parking lot transmits information of whether or not parking is permitted, parking position information, or the address of the server holding these information (Step 7107*f*). Alternatively, the parking lot management server transmits these information to another server. The transmitter (in-vehicle receiver) 7007*b* receives the transmitted information (Step 7107*g*). Alternatively, the in-vehicle system obtains these information from another server.

The parking lot management server controls the parking lot to facilitate parking (Step 7107*h*). For example, the parking lot management server controls a multi-level parking lot. The transmitter-receiver in the parking lot transmits the ID (Step 7107*i*). The in-vehicle receiver (transmitter 7007*b*) inquires of the parking lot management server based on the user information of the in-vehicle receiver and the received ID (Step 7107*j*).

The parking lot management server charges for parking according to parking time and the like (Step 7107*k*). The parking lot management server controls the parking lot to facilitate access to the parked vehicle (Step 7107*m*). For example, the parking lot management server controls a multi-level parking lot. The in-vehicle receiver (transmitter 7007*b*) displays the map to the parking position, and navigates from the current position (Step 7107*n*).

FIG. 218 is a diagram illustrating an example of application of the receiver and the transmitter in Embodiment 12.

A transmitter 7008*a* or 7008*b* such as a signage of a store, e.g. a roof sign or a sign placed on a street, transmits identification information (ID) of the transmitter 7008*a* or 7008*b* to a receiver 7008*c* such as a smartphone. Having received the ID, the receiver 7008*c* obtains information associated with the ID from a server, and displays the information. Examples of the information include an image showing availability, a coupon, 2D barcode, and the like of the store.

FIG. 219 is a flowchart illustrating an example of processing operation of the receiver 7008*c* and the transmitter 7008*a* or 7008*b* in Embodiment 12. Though the following describes, of the transmitters 7008*a* and 7008*b*, the transmitter 7008*a* as an example, the processing operation of the transmitter 7008*b* is the same as that of the transmitter 7008*a*.

The ID of the transmitter 7008*a* and the information to be provided to the receiver 7008*c* receiving the ID are stored in the server in association with each other (Step 7108*a*). The information to be provided to the receiver 7008*c* may include information such as a store name, a product name, map information to a store, availability information, coupon information, stock count of a product, show time of a movie or a play, reservation information, and a URL of a server for reservation or purchase.

The transmitter 7008*a* such as a signage transmits the ID (Step 7108*b*). The camera of the receiver 7008*c* is pointed to the transmitter 7008*a*, to receive the ID (Step 7108*c*). The receiver 7008*c* transmits the received ID to the server, and stores the information associated with the ID in the receiver 7008*c* (Step 7108*d*). The receiver 7008*c* also stores a terminal ID and a user ID in the server (Step 7108*e*).

The receiver 7008*c* displays the information stored in the server as the information to be displayed on the receiver 7008*c* (Step 7108*f*). The receiver 7008*c* displays the route from the current position to the store or the sales floor (Step 7108*g*). The receiver 7008*c* obtains information from the server according to need, and updates and displays availability information or reservation information (Step 7108*h*).

The receiver 7008*c* displays a button for reserving or ordering a seat or a product (Step 7108*i*). The user taps the reserve button or the order button displayed on the receiver 7008*c*

(Step 7108*j*). The receiver 7008*c* transmits the information of reservation or order to the server for managing reservation or order (Step 7108*k*).

FIG. 220 is a diagram illustrating an example of application of the receiver and the transmitter in Embodiment 12.

A receiver (terminal) 7009*b* such as a smartphone is placed on a table in front of a seat in a store. A transmitter 7009*a* such as a lighting device transmits identification information (ID) of the transmitter 7009*a* to the receiver 7009*b*. Having received the ID, the receiver 7009*b* obtains information associated with the ID from a server, and performs a process such as reserving the seat, confirming the provisional reservation, or extending the reserved time.

FIG. 221 is a diagram illustrating an example of application of the receiver and the transmitter in Embodiment 12.

Having obtained the information from the server, the receiver 7009*b* displays, for example, the availability of the store and buttons for selecting "check", "extend", and "additional order".

FIG. 222 is a flowchart illustrating an example of processing operation of the receiver 7009*b* and the transmitter 7009*a* in Embodiment 12.

The ID of the transmitter 7009*a* and the information to be provided to the receiver 7009*b* receiving the ID are stored in the server in association with each other (Step 7109*a*). The information to be provided to the receiver 7009*b* may include information of the position and shape of the transmitter 7009*a*. The transmitter 7009*a* such as a ceiling lighting transmits the ID (Step 7109*b*).

The user places the receiver 7009*b* on the table or the like (Step 7109*c*). The receiver 7009*b* recognizes the placement of the receiver 7009*b* on the table or the like from the information of the gyroscope or the 9-axis sensor, and starts the reception process (Step 7109*d*). The receiver 7009*b* identifies an upward facing camera from the upward direction of the 9-axis sensor, and receives the ID using the camera.

The camera of the receiver 7009*b* is pointed to the transmitter 7009*a*, to receive the ID (Step 7109*e*). The receiver 7009*b* transmits the received ID to the server, and stores the information associated with the ID in the receiver 7009*b* (Step 7109*f*). The receiver 7009*b* estimates the position of the receiver 7009*b* (Step 7109*g*).

The receiver 7009*b* transmits the position of the receiver 7009*b* to the store management server (Step 7109*h*). The store management server specifies the seat of the table on which the receiver 7009*b* is placed (Step 7109*i*). The store management server transmits the seat number to the receiver 7009*b* (Step 7109*j*).

FIG. 223 is a diagram illustrating an example of application of the receiver and the transmitter in Embodiment 12.

A transmitter 7011*a* such as a ceiling lighting transmits identification information (ID) of the transmitter 7011*a* to a receiver 7011*b* such as a smartphone. Having received the ID, the receiver 7011*b* obtains information associated with the ID from a server, and estimates (determines) the self-position. When the receiver 7011*b* is placed at an electronic device 7011*c*, the receiver 7011*b* functions as an operation terminal of the electronic device 7011*c*. Thus, the electronic device 7011*c* can be operated by a rich interface such as a touch panel or voice output.

FIG. 224 is a flowchart illustrating an example of processing operation of the receiver 7011*b* and the transmitter 7011*a* in Embodiment 12.

The position of the electronic device is stored in the server (Step 7110*a*). The ID, model, function, and operation interface information (screen, input/output voice, interactive model) of the electronic device may be stored in association with the position information.

The ID of the transmitter 7011*a* and the information to be provided to the receiver 7011*b* receiving the ID are stored in the server in association with each other (Step 7110*b*). The information to be provided to the receiver 7011*b* may include information of the position and shape of the transmitter 7011*a*.

The transmitter 7011*a* such as a ceiling lighting transmits the ID (Step 7110*c*). The camera of the receiver 7011*b* is pointed to the transmitter 7011*a*, to receive the ID (Step 7110*d*). The receiver 7011*b* transmits the received ID to the server, and stores the information associated with the ID in the receiver 7011*b* (Step 7110*e*). The receiver 7011*b* estimates the position of the receiver 7011*b* (Step 7110*f*).

The user places the receiver 7011*b* at the electronic device (Step 7110*g*). The receiver 7011*b* recognizes that the receiver 7011*b* is stationary from the information of the gyroscope or the 9-axis sensor, and starts the following process (Step 7110*h*). The receiver 7011*b* estimates the self-position by the above-mentioned method, in the case where at least a predetermined time has elapsed from the last estimation of the position of the receiver 7011*b* (Step 7110*i*).

The receiver 7011*b* estimates the movement from the last self-position estimation from the information of the gyroscope or the 9-axis sensor, and estimates the current position (Step 7110*j*). The receiver 7011*b* obtains information of an electronic device nearest the current position, from the server (Step 7110*k*). The receiver 7011*b* obtains the information of the electronic device from the electronic device via Bluetooth or Wi-Fi (Step 7110*m*). Alternatively, the receiver 7011*b* obtains the information of the electronic device stored in the server.

The receiver 7011*b* displays the information of the electronic device (Step 7110*n*). The receiver 7011*b* receives input as the operation terminal of the electronic device (Step 7110*p*). The receiver 7011*b* transmits the operation information of the electronic device to the electronic device via Bluetooth or Wi-Fi (Step 7110*q*). Alternatively, the receiver 7011*b* transmits the operation information of the electronic device to the electronic device via the server.

FIG. 225 is a diagram illustrating an example of application of the receiver and the transmitter in Embodiment 12.

A camera of a receiver 7012*a* such as a smartphone is pointed to a transmitter 7012*b* as an electronic device such as a television receiver (TV). The receiver 7012*a* receives identification information (ID) of the transmitter 7043*b* transmitted from the transmitter 7043*b*. The receiver 7043*a* obtains information associated with the ID from a server. Thus, the receiver 7012*a* functions as an operation terminal of the electronic device in the direction pointed by the camera. That is, the receiver 7012*a* wirelessly connects to the transmitter 7012*b* via Bluetooth, Wi-Fi, or the like.

FIG. 226 is a flowchart illustrating an example of processing operation of the receiver 7012*a* and the transmitter 7012*b* in Embodiment 12.

The ID of the transmitter 7012*b* and the information to be provided to the receiver 7012*a* receiving the ID are stored in the server in association with each other (Step 7111*a*). The information to be provided to the receiver 7012*a* may include the ID, model, function, and operation interface information (screen, input/output voice, interactive model) of the electronic device.

The transmitter 7012*b* included in the electronic device or associated with the electronic device transmits the ID (Step 7111*b*). The camera of the receiver 7012*a* is pointed to the transmitter 7012*b*, to receive the ID (Step 7111*c*). The receiver 7012*a* transmits the received ID to the server, and stores the information associated with the ID in the receiver 7012*a* (Step 7111*d*). The receiver 7012*a* obtains the information of the electronic device from the server, using the received ID as a key (Step 7111*e*).

The receiver 7012*a* obtains the information of the electronic device from the electronic device via Bluetooth or Wi-Fi (Step 7111*f*). Alternatively, the receiver 7012*a* obtains the information of the electronic device stored in the server. The receiver 7012*a* displays the information of the electronic device (Step 7111*g*).

The receiver 7012*a* receives input as the operation terminal of the electronic device (Step 7111*h*). The receiver 7012*a* transmits the operation information of the electronic device to the electronic device via Bluetooth or Wi-Fi (Step 7111*i*). Alternatively, the receiver 7012*a* transmits the operation information of the electronic device to the electronic device via the server.

FIG. 227 is a diagram illustrating an example of application of the receiver and the transmitter in Embodiment 12.

A receiver 7013*b* such as a smartphone receives a destination input by the user. The camera of the receiver 7013*b* is then pointed to a transmitter 7013*a* such as a lighting device (light). The receiver 7013*b* receives identification information (ID) of the transmitter 7013*a* transmitted from the transmitter 7013*a*. The receiver 7013*b* obtains information associated with the ID from a server. The receiver 7013*b* estimates (determines) the self-position based on the obtained information. The receiver 7013*b* accordingly navigates the user to the destination by audio or the like. In the case where the user is visually impaired, the receiver 7013*b* reports any obstacle to the user in detail.

FIG. 228 is a flowchart illustrating an example of processing operation of the receiver 7013*b* and the transmitter 7013*a* in Embodiment 12.

The user inputs the destination to the receiver 7013*b* (Step 7112*a*). The user points the receiver 7013*b* to the light (transmitter 7013*a*) (Step 7112*b*). Even a visually impaired user can point the receiver 7013*b* to the light if he or she is capable of recognizing intense light.

The receiver 7013*b* receives a signal superimposed on the light (Step 7112*c*). The receiver 7013*b* obtains information from the server, using the received signal as a key (Step 7112*d*). The receiver 7013*b* obtains a map from the current position to the destination from the server (Step 7112*e*). The receiver 7013*b* displays the map, and navigates from the current position to the destination (Step 7112*f*).

FIG. 229 is a diagram illustrating a state of the receiver in Embodiment 12.

A receiver (terminal) 7014*a* such as a smartphone includes a face camera 7014*b*. When the imaging direction of the face camera 7014*b* is upward at a predetermined angle or more with the ground plane, the receiver 7014*a* performs a signal reception process (process of receiving a signal from a transmitter by imaging) by the face camera 7014*b*. In the case where the receiver 7014*a* also includes a camera other than the face camera 7014*b*, the receiver 7014*a* assigns higher priority to the face camera 7014*b* than the other camera.

FIG. 230 is a flowchart illustrating an example of processing operation of the receiver 7014*a* in Embodiment 12.

The receiver 7014*a* determines whether or not the imaging direction of the face camera 7014*b* is upward at a predetermined angle or more with the ground plane (Step 7113*a*). In the case where the determination result is true (Y), the receiver 7014*a* starts the reception by the face camera 7014*b* (Step 7113*b*). Alternatively, the receiver 7014*a* assigns higher priority to the reception process by the face camera 7014*b*. When a predetermined time has elapsed (Step 7113*c*), the receiver 7014*a* ends the reception by the face camera 7014*b* (Step 7113*d*). Alternatively, the receiver 7014*a* assigns lower priority to the reception process by the face camera 7014*b*.

FIG. 231 is a diagram illustrating a state of the receiver in Embodiment 12.

A receiver (terminal) 7015*a* such as a smartphone includes an out camera 7015*b*. When the imaging direction of the out camera 7015*b* is at a predetermined angle or less with the ground plane, the receiver 7014*a* performs a signal reception process (process of receiving a signal from a transmitter by imaging) by the out camera 7015*b*. In the case where the receiver 7015*a* also includes a camera other than the out camera 7015*b*, the receiver 7015*a* assigns higher priority to the out camera 7015*b* than the other camera.

Note that, when the imaging direction of the out camera 7015*b* is at a predetermined angle or less with the ground plane, the receiver 7015*a* is in portrait orientation, and the surface of the receiver 7015*a* on which the out camera 7015*b* is provided is at a predetermined angle or more with the ground plane.

FIG. 232 is a flowchart illustrating an example of processing operation of the receiver 7015*a* in Embodiment 12.

The receiver 7015*a* determines whether or not the imaging direction of the out camera 7015*b* is at a predetermined angle or less with the ground plane (Step 7114*a*). In the case where the determination result is true (Y), the receiver 7015*a* starts the reception by the out camera 7015*b* (Step 7114*b*). Alternatively, the receiver 7015*a* assigns higher priority to the reception process by the out camera 7015*b*. When a predetermined time has elapsed (Step 7114*c*), the receiver 7015*a* ends the reception by the out camera 7015*b* (Step 7114*d*). Alternatively, the receiver 7015*a* assigns lower priority to the reception process by the out camera 7015*b*.

FIG. 233 is a diagram illustrating a state of the receiver in Embodiment 12.

A receiver (terminal) 7016*a* such as a smartphone includes an out camera. When the receiver 7016*a* is moved (stuck out) in the imaging direction of the out camera, the receiver 7016*a* performs a signal reception process (process of receiving a signal from a transmitter by imaging) by the out camera. In the case where the receiver 7016*a* also includes a camera other than the out camera, the receiver 7016*a* assigns higher priority to the out camera than the other camera.

Note that, when the receiver 7016*a* is moved in the imaging direction of the out camera, the angle between the moving direction and the imaging direction (upon the end of the movement) is a predetermined angle or less.

FIG. 234 is a flowchart illustrating an example of processing operation of the receiver 7016*a* in Embodiment 12.

The receiver 7016*a* determines whether or not the receiver 7016*a* is moved and the angle between the moving direction and the imaging direction of the out camera upon the end of the movement is a predetermined angle or less (Step 7115*a*). In the case where the determination result is true (Y), the receiver 7016*a* starts the reception by the out camera (Step 7115*b*). Alternatively, the receiver 7016*a* assigns higher priority to the reception process by the out camera. When a predetermined time has elapsed (Step 7115*c*), the receiver 7016*a* ends the reception by the out camera (Step 7115*d*). Alternatively, the receiver 7016*a* assigns lower priority to the reception process by the out camera.

FIG. 235 is a diagram illustrating a state of the receiver in Embodiment 12.

A receiver (terminal) 7017*a* such as a smartphone includes a predetermined camera. When a display operation or specific button press corresponding to the predetermined camera is performed, the receiver 7017*a* performs a signal reception process (process of receiving a signal from a transmitter by imaging) by the predetermined camera. In the case where the receiver 7017*a* also includes a camera other than the predetermined camera, the receiver 7017*a* assigns higher priority to the predetermined camera than the other camera.

FIG. 236 is a flowchart illustrating an example of processing operation of the receiver 7017*a* in Embodiment 12.

The receiver 7017*a* determines whether or not a display operation or a specific button press is performed on the receiver 7017*a* (Step 7115*h*). In the case where the determination result is true (Y), the receiver 7017*a* starts the reception by the camera corresponding to the display operation or the specific button press (Step 7115*i*). Alternatively, the receiver 7017*a* assigns higher priority to the reception process by the camera. When a predetermined time has elapsed (Step 7115*j*), the receiver 7017*a* ends the reception by the camera corresponding to the display operation or the specific button press (Step 7115*k*). Alternatively, the receiver 7017*a* assigns lower priority to the reception process by the camera.

FIG. 237 is a diagram illustrating a state of the receiver in Embodiment 12.

A receiver (terminal) 7018*a* such as a smartphone includes a face camera 7018*b*. When the imaging direction of the face camera 7018*b* is upward at a predetermined angle or more with the ground plane and also the receiver 7014*a* is moving along a direction at a predetermined angle or less with the ground plane, the receiver 7018*a* performs a signal reception process (process of receiving a signal from a transmitter by imaging) by the face camera 7018*b*. In the case where the receiver 7018*a* also includes a camera other than the face camera 7018*b*, the receiver 7018*a* assigns higher priority to the face camera 7018*b* than the other camera.

FIG. 238 is a flowchart illustrating an example of processing operation of the receiver 7018*a* in Embodiment 12.

The receiver 7018*a* determines whether or not the imaging direction of the face camera 7018*b* is upward at a predetermined angle or more with the ground plane and the receiver 7018*a* is translated at a predetermined angle or less with the ground plane (Step 7116*a*). In the case where the determination result is true (Y), the receiver 7018*a* starts the reception by the face camera 7018*b* (Step 7116*b*). Alternatively, the receiver 7018*a* assigns higher priority to the reception process by the face camera 7018*b*. When a predetermined time has elapsed (Step 7116*c*), the receiver 7018*a* ends the reception by the face camera 7018*b* (Step 7116*d*). Alternatively, the receiver 7018*a* assigns lower priority to the reception process by the face camera 7018*b*.

FIG. 239 is a diagram illustrating an example of application of the receiver and the transmitter in Embodiment 12.

A camera of a receiver 7019*b* such as a smartphone is pointed to a transmitter 7019*a* as an electronic device such as a television receiver (TV). The receiver 7019*b* receives identification information (ID) of a currently viewed channel, which is transmitted from the transmitter 7019*a* (the display of the transmitter 7019*a*). The receiver 7019*b* obtains information associated with the ID from a server. Thus, the receiver 7019*b* displays a page for buying a related product of the TV program, or related information of the TV program. The receiver 7019*b* also participates in the TV program through voting or applying for presents. The transmitter (TV) 7019*a* may include an address storage unit storing the address of the user, and transmit information relating to the address stored in the address storage unit. The receiver 7019*b* transmits the received ID and the time of receiving the ID, to the server. By doing so, the receiver 7019*b* can obtain data from the server, without being affected by a delay from ID reception to server access. The transmitter 7019*a* may obtain, from a built-in clock or a broadcast wave, time information or an ID that changes with time, and transmit it. This enables the server to transmit data set by the broadcaster to the receiver, regardless of the time setting in the receiver.

FIG. 240 is a diagram illustrating an example of application of the receiver and the transmitter in Embodiment 12.

As illustrated in (a) in FIG. 240, the transmitter 7019*a* and the receiver 7019*b* may directly transmit and receive the information necessary for realizing the example of application illustrated in FIG. 239.

As illustrated in (b) in FIG. 240, the transmitter 7019*a* may transmit the ID of the currently viewed channel to the receiver 7019*b*. In this case, the receiver 7019*b* receives the information associated with the ID, i.e. the information necessary for realizing the example of application illustrated in FIG. 239, from the server.

As illustrated in (c) in FIG. 240, the transmitter 7019*a* may transmit the ID of the transmitter (TV) 7019*a* or information necessary for wireless connection to the receiver 7019*b*. In this case, the receiver 7019*b* receives the ID or the information, and inquires of the transmitter 7019*a* or a recorder for the currently viewed channel, based on the ID or the information. The receiver 7019*b* then obtains the information relating to the channel identified as a result of the inquiry, i.e. the information necessary for realizing the example of application illustrated in FIG. 239, from the server.

For example, the transmitter 7019*a* transmits an SSID (Service Set Identifier), a password, an IP address, a device ID, or the like, as the information necessary for wireless connection such as Wi-Fi or Bluetooth®. Having received such information, the receiver 7019*b* wirelessly connects to the transmitter 7019*a* based on the information. The receiver 7019*b* then obtains the information of the program viewed by the user from the transmitter 7019*a* via the wireless connection, and transmits the information of the program to the server. Having received the information of the program, the server transmits content held in association with the information of the program, to the receiver 7019*b*. The receiver 7019*b* obtains the content from the server, and displays the content.

FIG. 241 is a diagram illustrating an example of application of the receiver and the transmitter in Embodiment 12.

The transmitter 7019*a* may include a TV 2021*b* and a recorder 2021*a*. In the transmitter 7019*a*, the recorder 2021*a* stores the identification information (ID) and the recording time of the recorded channel, upon recording. Alternatively, the recorder 2021*a* obtains, from the server, information associated with the identification information (ID) and the recording time of the recorded channel, and stores the obtained information. Upon reproduction, the TV 2021*b* transmits part or all of the information stored in the recorder 2021*a*, to the receiver 7019*b*. Moreover, at least one of the TV 2021*b* and the recorder 2021*a* may act as the server. In the case where the recorder 2021*a* acts as the server, the recorder 2021*a* replaces the server address with the address of the recorder 2021*a*, and has the TV 202*b* transmit the address to the receiver 7019*b*.

FIG. 242 is a diagram illustrating an example of application of the receiver and the transmitter in Embodiment 12.

A camera of a receiver 7022*c* such as a smartphone is pointed to a transmitter 7022*b* as an electronic device such as a television receiver (TV). The receiver 7022*c* receives information transmitted from the transmitter 7022*b* (display of the transmitter 7022*b*). The receiver 7022*c* performs wireless communication with the transmitter 7022*b*, based on the information. When the transmitter 7022*b* obtains information including an image to be displayed on the receiver 7022*c* from a server 7022*a* and transmits the information to the receiver 7022*c*, the transmitter 7022*b* replaces the address of the server 7022*a* included in the information with the address of the transmitter 7022*b*.

FIG. 243 is a diagram illustrating an example of application of the receiver and the transmitter in Embodiment 12.

For instance, a recorder 7023*b* obtains all of the information necessary for realizing the example of application illustrated in FIG. 239 from a server 7023*a*, upon recording a TV program.

Upon reproducing the TV program, the recorder 7023*b* transmits the reproduction screen and the information necessary for realizing the example of application illustrated in FIG. 239, to a TV 7023*c* as a transmitter. The TV 7023*c* receives the reproduction screen and the information, displays the reproduction image, and also transmits the information from the display. A receiver 7023*d* such as a smartphone receives the information, and performs wireless communication with the TV 7023*c* based on the information.

As an alternative, upon reproducing the TV program, the recorder 7023*b* transmits the reproduction screen and the information necessary for wireless communication such as the address of the recorder 7023*b*, to the TV 7023*c* as a transmitter. The TV 7023*c* receives the reproduction screen and the information, displays the reproduction image, and also transmits the information from the display. The receiver 7023*d* such as a smartphone receives the information, and performs wireless communication with the recorder 7023*b* based on the information.

FIG. 244 is a diagram illustrating an example of application of the receiver and the transmitter in Embodiment 12.

A camera of a receiver 7045*a* such as a smartphone is pointed to a transmitter 7045*b* as an electronic device such as a television receiver (TV). The transmitter 7045*b* displays video of a TV program such as a music program, and transmits information from the display. The receiver 7045*a* receives the information transmitted from the transmitter 7045*b* (display of the transmitter 7045*b*). The receiver 7045*a* displays a screen 7045*c* prompting to buy a song in the music program, based on the information.

FIG. 245 is a flowchart illustrating an example of processing operation of the receiver and the transmitter in Embodiment 12. This flowchart corresponds to the examples of application illustrated in FIGS. 239 to 244.

The transmitter included in the TV or the recorder obtains, from the server, the information to be provided to the receiver as the information relating to the currently broadcasted program (Step 7117*a*). The transmitter transmits the signal by superimposing the signal on the backlight of the display (Step 7117*b*). The transmission signal may include a URL of the transmitter, an SSID of the transmitter, and a password for accessing the transmitter.

FIG. 246 is a flowchart illustrating an example of processing operation of the receiver and the transmitter in Embodiment 12. This flowchart corresponds to the examples of application illustrated in FIGS. 239 to 244.

The receiver receives the information from the display (Step 7118*a*). The receiver determines whether or not the currently viewed channel information is included in the received information (Step 7118*b*). In the case where the determination result is false (N), the receiver obtains the currently viewed channel information from the electronic device having the ID included in the received information (Step 7118*c*).

In the case where the determination result is true (Y), the receiver obtains the information related to the currently viewed screen from the server (Step 7118*d*). The TV or the recorder may act as the server. The receiver displays the information obtained from the server (Step 7118*e*). The receiver adjusts the display, based on a user profile stored in the receiver or the server (Step 7118*f*). For example, the receiver performs control such as changing the font size, hiding age-restricted content, or preferentially displaying content assumed to be preferred from the user's past behavior.

FIG. 247 is a flowchart illustrating an example of processing operation of the receiver and the transmitter in Embodiment 12. This flowchart corresponds to the examples of application illustrated in FIGS. 239 to 244.

The recorder obtains the information related to the program from the server and stores the information, when recording the program (Step 7119*a*). In the case where the related information changes with time, the recorder also stores the time.

The recorder transmits the stored information to the display, when reproducing the recorded image (Step 7119*b*). The access information (URL or password) of the server in the stored information may be replaced with the access information of the display.

The recorder transmits the stored information to the receiver, when reproducing the recorded image (Step 7119*c*). The access information (URL or password) of the server in the stored information may be replaced with the access information of the recorder.

FIG. 248 is a diagram illustrating a luminance change of the transmitter in Embodiment 12.

The transmitter codes the information transmitted to the receiver, by making the time length from a rapid rise in luminance to the next rapid rise in luminance different depending on code (0 or 1). In this way, the brightness perceived by humans can be adjusted by PWM (Pulse Width Modulation) control, without changing the transmission information. Here, the luminance waveform may not necessarily be a precise rectangular wave.

FIG. 249 is a flowchart illustrating an example of processing operation of the receiver in Embodiment 12. This flowchart illustrates the processing operation of the receiver that corresponds to the transmitter having the luminance change illustrated in FIG. 248.

The receiver observes the luminance of light emitted from the transmitter (Step 7120*a*). The receiver measures the time from a rapid rise in luminance to the next rapid rise in luminance (Step 7120*b*). Alternatively, the receiver measures the time from a rapid fall in luminance to the next rapid fall in luminance. The receiver recognizes the signal value according to the time (Step 7120*c*). For example, the receiver recognizes "0" in the case where the time is less than or equal to 300 microseconds, and "1" in the case where the time is greater than or equal to 300 microseconds.

FIG. 250 is a diagram illustrating a luminance change of the transmitter in Embodiment 12.

The transmitter expresses the starting point of the information transmitted to the receiver, by changing the wavelength indicating luminance rise/fall. Alternatively, the transmitter superimposes information on the other information, by changing the wavelength.

FIG. 251 is a flowchart illustrating an example of processing operation of the receiver in Embodiment 12. This flowchart illustrates the processing operation of the receiver that corresponds to the transmitter having the luminance change illustrated in FIG. 250.

The receiver observes the luminance of light emitted from the transmitter (Step 7121*a*). The receiver determines the minimum value of the time width of the rapid change in luminance (Step 7121*b*). The receiver searches for a luminance change width that is not an integral multiple of the minimum value (Step 7121*c*). The receiver analyzes the signal, with the luminance change width that is not the integral multiple as the starting point (Step 7121*d*). The receiver calculates the time width between the parts each having the luminance change width that is not the integral multiple (Step 7121*e*).

FIG. 252 is a diagram illustrating a luminance change of the transmitter in Embodiment 12.

The transmitter can adjust the brightness perceived by the human eye and also reset any luminance change accumulated over time, by changing the luminance at intervals shorter than the exposure time of the receiver.

FIG. 253 is a flowchart illustrating an example of processing operation of the transmitter in Embodiment 12. This flowchart illustrates the processing operation of the receiver that corresponds to the transmitter having the luminance change illustrated in FIG. 252.

The transmitter turns the current ON/OFF with a time width sufficiently shorter than the exposure time of the receiver, when the luminance or the current for controlling the luminance falls below a predetermined value (Step 7125*a*). This returns the current to its initial value, so that the luminance decrease of the light emitting unit can be prevented. The transmitter turns the current ON/OFF with a time width sufficiently shorter than the exposure time of the receiver, when the luminance or the current for controlling the luminance exceeds a predetermined value (Step 7125*b*). This returns the current to its initial value, so that the luminance increase of the light emitting unit can be prevented.

FIG. 254 is a diagram illustrating a luminance change of the transmitter in Embodiment 12.

The transmitter expresses different signals (information), by making the carrier frequency of the luminance different. The receiver is capable of recognizing the carrier frequency earlier than the contents of the signal. Hence, making the carrier frequency different is suitable for expressing information, such as the ID of the transmitter, which needs to be recognized with priority.

FIG. 255 is a flowchart illustrating an example of processing operation of the receiver in Embodiment 12. This flowchart illustrates the processing operation of the receiver that corresponds to the transmitter having the luminance change illustrated in FIG. 254.

The receiver observes the luminance of light emitted from the transmitter (Step 7122*a*). The receiver determines the minimum value of the time width of the rapid change in luminance (Step 7122*b*). The receiver recognizes the minimum value as the carrier frequency (Step 7122*c*). The receiver obtains information from the server, using the carrier frequency as a key (Step 7122*d*).

FIG. 256 is a flowchart illustrating an example of processing operation of the receiver in Embodiment 12. This flowchart illustrates the processing operation of the receiver that corresponds to the transmitter having the luminance change illustrated in FIG. 254.

The receiver observes the luminance of light emitted from the transmitter (Step 7123*a*). The receiver Fourier transforms the luminance change, and recognizes the maximum component as the carrier frequency (Step 7123*b*). The receiver obtains information from the server, using the carrier frequency as a key (Step 7123*c*).

FIG. 257 is a flowchart illustrating an example of processing operation of the transmitter in Embodiment 12. This flowchart illustrates the processing operation of the transmitter having the luminance change illustrated in FIG. 254.

The transmitter expresses the transmission signal as the luminance change (Step 7124*a*). The transmitter generates the luminance change so that the maximum component of the Fourier transformed luminance change is the carrier frequency (Step 7124*b*). The transmitter causes the light emitting unit to emit light according to the generated luminance change (Step 7124*c*).

FIG. 258 is a diagram illustrating an example of a structure of the transmitter in Embodiment 12.

A transmitter 7028*a* has a part 7028*b* transmitting a signal A, a part 7028*d* transmitting a signal B, and a part 7028*f* transmitting a signal C. When such parts transmitting different signals are provided in the transmitter along the direction in which the imaging unit (camera) of the receiver is exposed simultaneously, the receiver can receive a plurality of signals simultaneously. Here, a part transmitting no signal or a buffer part 7028*c* or 7028*e* transmitting a special signal may be provided between the parts 7028*b*, 7028*d*, and 7028*f*.

FIG. 259 is a diagram illustrating an example of a structure of the transmitter in Embodiment 12. The system of light emission by this structure of the transmitter extends the system of light emission by the structure illustrated in FIG. 258.

Parts 7029*a* transmitting the signals illustrated in FIG. 258 may be arranged in the transmitter as illustrated in FIG. 259. By doing so, even when the receiver is tilted, the imaging unit (camera) of the receiver can simultaneously receive (capture) many parts of the signals A, B, and C.

FIG. 260 is a diagram illustrating an example of a structure of the transmitter in Embodiment 12. The system of light emission by this structure of the transmitter extends the system of light emission by the structure illustrated in FIG. 258.

A circular light emitting unit of the transmitter has a plurality of annular parts 7030*a*, 7030*b*, and 7030*c* arranged concentrically and transmitting the respective signals. The part 7030*a* transmits the signal C, the part 7030*b* transmits the signal B, and the part 7030*c* transmits the signal A. In the case where the light emitting unit of the transmitter is circular as in this example, the above-mentioned arrangement of the parts transmitting the respective signals enables the receiver to simultaneously receive (capture) many parts of the signals A, B, and C transmitted from the corresponding parts.

FIG. 261 is a flowchart illustrating an example of processing operation of the receiver and the transmitter in Embodiment 12. This flowchart illustrates the processing operation of the receiver and the transmitter that includes the light emitting device illustrated in any of FIGS. 258 to 260.

The receiver measures the luminance of each position of the line that receives light simultaneously (Step 7126*a*). The receiver receives the signal at high speed, by receiving the separately transmitted signals in the direction perpendicular to the simultaneous light receiving line (Step 7126*b*).

FIG. 262 is a diagram illustrating an example of display and imaging by the receiver and the transmitter in Embodiment 12.

The transmitter displays a plurality of 1D barcodes each formed as an image uniform in the direction perpendicular to the direction in which the receiving unit (camera) of the receiver is exposed simultaneously, respectively as a frame 1 (7031*a*), a frame 2 (7031*b*), and a frame 3 (7031*c*) in sequence. A 1D barcode mentioned here is made of a line (bar) along the direction perpendicular to the above-mentioned simultaneous exposure direction. The receiver captures the image displayed on the transmitter as described in each of the above embodiments, and as a result obtains a frame 1 (7031*d*) and a frame 2 (7031*e*). The receiver can recognize the successively displayed 1D barcodes in sequence, by dividing the 1D barcodes at an interruption of the bar of each 1D barcode. In this case, the receiver can recognize all information displayed on the transmitter, with there being no need to synchronize the imaging by the receiver to the display by the transmitter. The display by the transmitter may be at a higher frame rate than the imaging by the receiver. The display time of one frame in the display by the transmitter, however, needs to be longer than the blanking time between the frames captured by the receiver.

FIG. 263 is a flowchart illustrating an example of processing operation of the transmitter in Embodiment 12. This flowchart illustrates the processing operation of the display device in the transmitter for performing the display illustrated in FIG. 262.

The display device displays a 1D barcode (Step 7127*a*). The display device changes the barcode display at intervals longer than the blanking time in the imaging by the receiver (Step 7127*b*).

FIG. 264 is a flowchart illustrating an example of processing operation of the receiver in Embodiment 12. This flowchart illustrates the processing operation of the receiver for performing the imaging illustrated in FIG. 262.

The receiver captures the 1D barcode displayed on the display device (Step 7128*a*). The receiver recognizes that the display device displays the next barcode, at an interruption of the barcode line (Step 7128*b*). According to this method, the receiver can receive all displayed information, without synchronizing the imaging to the display. Besides, the receiver can receive the signal displayed at a frame rate higher than the imaging frame rate of the receiver.

FIG. 265 is a diagram illustrating an example of application of the receiver and the transmitter in Embodiment 12.

A transmitter 7032*a* such as a lighting device transmits encrypted identification information (ID) of the transmitter 7032*a*. A receiver 7032*b* such as a smartphone receives the encrypted ID, and transmits the encrypted ID to a server 7032*c*. The server 7032*c* receives the encrypted ID, and decrypts the encrypted ID. Alternatively, the receiver 7032*b* receives the encrypted ID, decrypts the encrypted ID, and transmits the decrypted ID to the server 7032*c*.

FIG. 266 is a flowchart illustrating an example of processing operation of the receiver 7032*b* and the transmitter 7032*a* in Embodiment 12.

The transmitter 7032*a* holds partially or wholly encrypted information (Step 7129*a*). The receiver 7032*b* receives the information transmitted from the transmitter 7032*a*, and decrypts the received information (Step 7129*b*). Alternatively, the receiver 7032*b* transmits the encrypted information to the server 7032*c*. In the case where the encrypted information is transmitted, the server 7032*c* decrypts the encrypted information (Step 7129*c*).

FIG. 267 is a diagram illustrating a state of the receiver in Embodiment 12.

For a phone call, the user puts a receiver 7033*a* such as a smartphone to his or her ear. At this time, an illuminance sensor provided near the speaker of the receiver 7033*a* detects an illuminance value indicating low illuminance. The receiver 7033*a* accordingly estimates that the receiver 7033*a* is in a call state, and stops receiving information from the transmitter.

FIG. 268 is a flowchart illustrating an example of processing operation of the receiver 7033*a* in Embodiment 12.

The receiver 7033*a* determines whether or not the receiver 7033*a* is estimated to be in a call state from the sensor value of the illuminance sensor and the like (Step 7130*a*). In the case where the determination result is true (Y), the receiver 7033*a* ends the reception by the face camera (Step 7130*b*). Alternatively, the receiver 7033*a* assigns lower priority to the reception process by the face camera.

FIG. 269 is a diagram illustrating a state of the receiver in Embodiment 12.

A receiver 7034*a* such as a smartphone includes an illuminance sensor 7034*b* near a camera (e.g. face camera) which is an imaging device for receiving (capturing) information from a transmitter. When an illuminance value indicating low illuminance less than or equal to a predetermined value is detected by the illuminance sensor 7034*b*, the receiver 7034*a* stops receiving information from the transmitter. In the case where the receiver 7034*a* includes a camera other than the camera (e.g. face camera) near the illuminance sensor 7034*b*, the receiver 7034*a* assigns lower priority to the camera (e.g. face camera) near the illuminance sensor 7034*b* than the other camera.

FIG. 270 is a flowchart illustrating an example of processing operation of the receiver 7034*a* in Embodiment 12.

The receiver 7034*a* determines whether or not the sensor value of the illuminance sensor 7034*b* is less than or equal to a predetermined value (Step 7131*a*). In the case where the determination result is true (Y), the receiver 7034*a* ends the reception by the face camera (Step 7131*b*). Alternatively, the receiver 7034*a* assigns lower priority to the reception process by the face camera.

FIG. 271 is a flowchart illustrating an example of processing operation of the receiver in Embodiment 12.

The receiver measures the illuminance change from the sensor value of the illuminance sensor (Step 7132*a*). The receiver receives the signal from the illuminance change, as in the reception of the signal from the luminance change measured by the imaging device (camera) (Step 7132*b*). Since the illuminance sensor is less expensive than the imaging device, the receiver can be manufactured at low cost.

FIG. 272 is a diagram illustrating an example of a wavelength of the transmitter in Embodiment 12.

The transmitter expresses the information transmitted to the receiver, by outputting metameric light 7037*a* and 7037*b* as illustrated in (a) and (b) in FIG. 272.

FIG. 273 is a flowchart illustrating an example of processing operation of the receiver and the transmitter in Embodiment 12. This flowchart illustrates the processing operation of the receiver and the transmitter that outputs the light of the wavelengths illustrated in FIG. 272.

The transmitter expresses different signals by light (metameric light) perceived as isochromatic by humans but different in spectral distribution, and causes the light emitting unit to emit light (Step 7135*a*). The receiver measures the spectral distributions and receives the signals (Step 7135*b*). According to this method, the signal can be transmitted without concern for flicker.

FIG. 274 is a diagram illustrating an example of a structure of a system including the receiver and the transmitter in Embodiment 12.

The system includes an ID solution server 7038*a*, a relay server 7038*b*, a receiver 7038*c*, a transmitter 7038*d*, and a transmitter control device 7038*e*.

FIG. 275 is a flowchart illustrating an example of processing operation of the system in Embodiment 12.

The ID solution server 7038*a* stores the ID of the transmitter 7038*d* and the method of communication between the transmitter control device 7038*e* and the receiver 7038*c*, in association with each other (Step 7136*a*). The receiver 7038*c* receives the ID of the transmitter 7038*d*, and obtains the method of communication with the transmitter control device 7038*e* from the ID solution server 7038*a* (Step 7136*b*). The receiver 7038*c* determines whether or not the receiver 7038*c* and the transmitter control device 7038e are directly communicable (Step 7136c). In the case where the determination result is false (N), the receiver 7038c communicates with the transmitter control device 7038e via the relay server 7038b (Step 7136d). In the case where the determination result is true (Y), the receiver 7038c communicates directly with the transmitter control device 7038e (Step 7136e).

FIG. 276 is a diagram illustrating an example of a structure of the system including the receiver and the transmitter in Embodiment 12.

The system includes a server 7039g, a store device 7039a, and a mobile device 7039b. The store device 7039a includes a transmitter 7039c and an imaging unit 7039d. The mobile device 7039b includes a receiver 7039e and a display unit 7039f.

FIG. 277 is a flowchart illustrating an example of processing operation of the system in Embodiment 12.

The mobile device 7039b displays information on the display unit 7039f in 2D barcode or the like (Step 7137a). The store device 7039a captures the information displayed on the display unit 7039f by the imaging unit 7039d, to obtain the information (Step 7137b). The store device 7039a transmits some kind of information from the transmitter 7039c (Step 7137c).

The mobile device 7039b receives the transmitted information by the receiver 7039e (Step 7137d). The mobile device 7039b changes the display on the display unit 7039f, based on the received information (Step 7137e). The information displayed on the display unit 7039f may be determined by the mobile device 7039b, or determined by the server 7039g based on the received information.

The store device 7039a captures the information displayed on the display unit 7039f by the imaging unit 7039d, to obtain the information (Step 7137f). The store device 7039a determines the consistency between the obtained information and the transmitted information (Step 7137g). The determination may be made by the store device 7039a or by the server 7039g. In the case where the obtained information and the transmitted information are consistent, the transaction is completed successfully (Step 7137h).

According to this method, coupon information displayed on the display unit 7039f can be protected from unauthorized copy and use. It is also possible to exchange an encryption key by this method.

FIG. 278 is a flowchart illustrating an example of processing operation of the receiver in Embodiment 12.

The receiver starts the reception process (Step 7138a). The receiver sets the exposure time of the imaging device (Step 7138b). The receiver sets the gain of the imaging device (Step 7138c). The receiver receives information from the luminance of the captured image (Step 7138d).

FIG. 279 is a flowchart illustrating an example of processing operation of the receiver in Embodiment 12.

The receiver sets the exposure time (Step 7139a). The receiver determines whether or not there is an API (Application Program Interface) that changes the exposure time (Step 7139b). In the case where the determination result is false (N), the imaging device is pointed to a high-luminance object such as a light source (Step 7139c). The receiver performs automatic exposure setting (Step 7139d). The receiver fixes the automatic exposure set value once the change of the automatic exposure set value has become sufficiently small (Step 7139e).

In the case where the determination result is true (Y), the receiver starts setting the exposure time using the API (Step 7139f).

FIG. 280 is a diagram illustrating an example of a structure of the system including the receiver and the transmitter in Embodiment 12.

The system includes a server 7036a, a receiver 7036b, and one or more transmitters 7036c. The receiver 7036b obtains information relating to the one or more transmitters 7036c present near the receiver 7036b, from the server.

FIG. 281 is a flowchart illustrating an example of processing operation of the receiver in Embodiment 12.

The receiver 7036b performs self-position estimation from information of GPS, a base station, and the like (Step 7133a). The receiver 7036b transmits the estimated self-position and the estimation error range to the server 7036a (Step 7133b). The receiver 7036b obtains, from the server 7036a, IDs of transmitters 7036c present near the position of the receiver 7036b and information associated with the IDs, and stores the IDs and the information (Step 7133c). The receiver 7036b receives an ID from a transmitter 7036c (Step 7133d).

The receiver 7036b determines whether or not information associated with the received ID is stored in the receiver 7036b (Step 7133e). In the case where the determination result is false (N), the receiver 7036b obtains the information from the server 7036a, using the received ID as a key (Step 7133f). The receiver 7036b performs self-position estimation from the information received from the server 7036a and the position relation with the transmitter 7036bc, obtains IDs of other nearby transmitters 7036c and information associated with the IDs from the server 7036a, and stores the IDs and the information (Step 7133g).

In the case where the determination result is true (Y) in Step 7133e or after Step 7133g, the receiver 7036b displays the information associated with the received ID (Step 7133h).

FIG. 282 is a diagram illustrating an example of application of the receiver and the transmitter in Embodiment 12.

Transmitters 7040c and 7040d such as lighting devices are disposed in a building a (7040a), and transmitters 7040e and 7040f such as lighting devices are disposed in a building b (7040b). The transmitters 7040c and 7040e transmit a signal A, and the transmitters 7040d and 7040f transmit a signal B. A receiver (terminal) 7040g such as a smartphone receives a signal transmitted from any of the transmitters.

FIG. 283 is a flowchart illustrating an example of processing operation of the receiver in Embodiment 12.

The receiver 7040g detects the entry into a building (Step 7134a). The receiver 7040g transmits the estimated self-position, the estimation error range, and the name or the like of the building in which the receiver 7040g is estimated to be present, to the server (Step 7134b). The receiver 7040g obtains, from the server, IDs of transmitters present in the building in which the receiver 7040g is present and information associated with the IDs, and stores the IDs and the information (Step 7134c). The receiver 7040g receives an ID from a transmitter (Step 7134d).

The receiver 7040g determines whether or not information associated with the received ID is stored in the receiver 7040g (Step 7134e). In the case where the determination result is false (N), the receiver 7040g obtains the information from the server, using the received ID as a key (Step 7134f). The receiver 7040g obtains, from the server, IDs of other transmitters present in the same building as the transmitter from which the receiver 7040g receives the ID and information associated with the IDs, and stores the IDs and the information (Step 7134g).

In the case where the determination result is true (Y) in Step 7134e or after Step 7134g, the receiver 7040g displays the information associated with the received ID (Step 7134h).

FIG. 284 is a diagram illustrating an example of a structure of the system including the receiver and the transmitter in Embodiment 12.

Transmitters 7041*a*, 7041*b*, 7041*c*, and 7041*d* such as lighting devices transmit a signal A, a signal B, a signal C, and the signal B, respectively. A receiver (terminal) 7041*e* such as a smartphone receives a signal transmitted from any of the transmitters. Here, the transmitters 7041*a*, 7041*b*, and 7041*c* are included in the error range of the self-position of the receiver 7041*e* estimated based on information of GPS, a base station, and the like (other means).

FIG. 285 is a flowchart illustrating an example of processing operation of the system in Embodiment 12.

The receiver 7041*e* receives an ID from a transmitter (Step 7140*a*). The receiver 7041*e* performs self-position estimation (Step 7140*b*). The receiver 7041*e* determines whether or not the self-position estimation is successful (Step 7140*c*). In the case where the determination result is false (N), the receiver 7041*e* displays a map or an input form, and prompts the user to input the current position (Step 7140*d*).

The receiver 7041*e* transmits the received ID, the estimated self-position, and the self-position estimation error range to the server (Step 7140*e*).

The server determines whether or not only one transmitter transmitting the ID received by the receiver 7041*e* is present within the estimation error range (estimation error radius) from the estimated self-position of the receiver 7041*e* (Step 7140*f*). In the case where the determination result is false (N), the receiver 7041*e* repeats the process from Step 7140*d*. In the case where the determination result is true (Y), the server transmits information associated with the transmitter to the receiver 7041*e* (Step 7140*g*).

FIG. 286 is a flowchart illustrating an example of processing operation of the receiver in Embodiment 12.

The receiver detects a light emitting device (transmitter) emitting a signal (Step 7141*a*), and receives the signal (Step 7141*b*). The receiver displays the reception state, the received data amount, the transmission data amount, and the ratio of the received data amount to the transmission data amount (Step 7141*c*).

The receiver then determines whether or not the receiver has received all transmission data (Step 7141*d*). In the case of determining that the receiver has received all transmission data (Step 7141*d*: Y), the receiver stops the reception process (Step 7141*e*), and displays the reception completion (Step 7141*f*). The receiver also outputs notification sound (Step 7141*g*), and vibrates (7141*h*).

In the case of determining that the receiver has not received all transmission data in Step 7141*d* (Step 7141*d*: N), the receiver determines whether or not a predetermined time has elapsed from when the transmitter disappears from the frame of the imaging device (camera) of the receiver (Step 7141*i*). In the case of determining that the predetermined time has elapsed (Step 7141*i*: Y), the receiver abandons the received data and stops the reception process (Step 7141*m*). The receiver also outputs notification sound (Step 7141*n*), and vibrates (Step 7141*p*).

In the case of determining that the predetermined time has not elapsed in Step 7141*i* (Step 7141*i*: N), the receiver determines whether or not the sensor value of the 9-axis sensor of the receiver changes by a predetermined value or more, or whether or not the receiver is estimated to be pointed in another direction (Step 7141*j*). In the case of determining that the sensor value changes by the predetermined value or more or the receiver is estimated to be pointed in another direction (Step 7141*i*: Y), the receiver performs the process from Step 7141*m* mentioned above. In the case of determining that the sensor value does not change by the predetermined value or more or the receiver is not estimated to be pointed in another direction (Step 7141*i*: N), the receiver determines whether or not the sensor value of the 9-axis sensor of the receiver changes in a predetermined rhythm, or whether or not the receiver is estimated to be shaken (Step 7141*k*). In the case of determining that the sensor value changes in the predetermined rhythm or the receiver is estimated to be shaken, the receiver performs the process from Step 7141*m* mentioned above. In the case of determining that the sensor value does not change in the predetermined rhythm or the receiver is not estimated to be shaken (Step 7141*k*: N), the receiver repeats the process from Step 7141*b*.

FIG. 287A is a diagram illustrating an example of a structure of the transmitter in Embodiment 12.

A transmitter 7046*a* includes a light emitting unit 7046*b*, a 2D barcode 7046*c*, and an NFC chip 7046*d*. The light emitting unit 7046*b* transmits information common with at least one of the 2D barcode 7046*c* and the NFC chip 7046*d*, by the method according to any of the above embodiments. Alternatively, the light emitting unit 7046*b* may transmit information different from at least one of the 2D barcode 7046*c* and the NFC chip 7046*d*, by the method according to any of the above embodiments. In this case, the receiver may obtain the information common with at least one of the 2D barcode 7046*c* and the NFC chip 7046*d* from the server, using the information transmitted from the light emitting unit 7046*b* as a key. The receiver may perform a common process in the case of receiving information from the light emitting unit 7046*b* and in the case of receiving information from at least one of the 2D barcode 7046*c* and the NFC chip 7046*d*. In either case, the receiver accesses a common server and displays common information.

FIG. 287B is a diagram illustrating another example of a structure of the transmitter in Embodiment 12.

A transmitter 7046*e* includes a light emitting unit 7046*f*, and causes the light emitting unit 7046*f* to display a 2D barcode 7046*g*. That is, the light emitting unit 7046*f* has the functions of both the light emitting unit 7046*b* and the 2D barcode 7046*c* illustrated in FIG. 287A.

Here, the light emitting unit 7046*b* or 7046*f* may transmit information indicating the size of the light emitting unit 7046*b* or 7046*f*, to cause the receiver to estimate the distance from the receiver to the transmitter 7046*a* or 7046*e*. This enables the receiver to capture the 2D barcode 7046*c* or 7046*g* more easily or clearly.

FIG. 288 is a flowchart illustrating an example of processing operation of the receiver and the transmitter 7046*a* or 7046*e* in Embodiment 12. Though the following describes, of the transmitters 7046*a* and 7046*e*, the transmitter 7046*a* as an example, the processing operation of the transmitter 7046*e* is the same as that of the transmitter 7046*a*.

The transmitter 7046*a* transmits information indicating the size of the light emitting unit 7046*b* (Step 7142*a*). Here, the maximum distance between arbitrary two points in the light emitting unit 7046*b* is set as the size of the light emitting unit 7046*b*. Since speed is important in this series of processes, it is desirable that the transmitter 7046*a* directly transmits the information indicating the size of the light emitting unit 7046*b* of the transmitter 7046*a* and the receiver obtains the information indicating the size without server communication. It is also desirable that the transmission is performed by a method that facilitates fast reception, such as the frequency of the brightness change of the transmitter 7046*a*.

The receiver receives the signal which is the above-mentioned information, and obtains the size of the light emitting unit 7046*b* of the transmitter 7046*a* (Step 7142*b*). The receiver calculates the distance from the receiver to the light emitting unit 7046*b*, based on the size of the light emitting unit 7046*b*, the size of the captured image of the light emitting unit 7046*b*, and the characteristics of the imaging unit (camera) of the receiver (Step 7142*c*). The receiver adjusts the focal length of the imaging unit to the calculated distance, and captures the image (Step 7142*d*). The receiver obtains the 2D barcode in the case of capturing the 2D barcode (Step 7142*e*).

Embodiment 13

This embodiment describes each example of application using a receiver such as a smartphone and a transmitter for transmitting information as an LED or organic EL blink pattern in Embodiments 1 to 12 described above.

FIG. 289 is a flowchart illustrating an example of processing operation of the receiver and the transmitter in Embodiment 13.

In Step 7201*a*, the transmitter outputs a sound of a specific frequency or a sound that changes in a specific pattern (the sound desirably has a frequency that is difficult to be heard by humans and collectable by a typical sound collector, e.g. 2 kHz to 20 kHz. A typical sound collector has a sampling frequency of about 44.1 kHz, and is only capable of precisely recognizing up to half of the frequency due to the sampling theorem. If the transmission signal is known, however, whether or not the signal is collected can be estimated with high accuracy. Based on this property, a signal of a frequency greater than or equal to 20 kHz may be used).

In Step 7201*b*, the user presses a button on the receiver to switch from the power off state or the sleep state to the power on state. In Step 7201*c*, the receiver activates a sound collecting unit. In Step 7201*d*, the receiver collects the sound output from the transmitter. In Step 7201*e*, the receiver notifies the user that the transmitter is present nearby, by screen display, sound output, or vibration. In Step 7201*f*, the receiver starts reception, and then ends the process.

FIG. 290 is a flowchart illustrating an example of processing operation of the receiver and the transmitter in Embodiment 13.

In Step 7202*a*, the user presses a button on the receiver to switch from the power off state or the sleep state to the power on state. In Step 7202*b*, the receiver activates an illuminance sensor. In Step 7202*c*, the receiver recognizes a change of illuminance from the illuminance sensor. In Step 7202*d*, the receiver receives a transmission signal from the illuminance sensor. In Step 7202*e*, the receiver notifies the user that the transmitter is present nearby, by screen display, sound output, or vibration. In Step 7202*f*, the receiver starts reception, and then ends the process.

FIG. 291 is a flowchart illustrating an example of processing operation of the receiver and the transmitter in Embodiment 13.

In Step 7203*a*, the user operates the receiver to start reception, or the receiver automatically starts reception by a trigger. In Step 7203*b*, the reception is performed preferentially by an imaging unit whose average luminance of the entire screen is high or whose luminance at the maximum luminance point is high. The receiver then ends the process.

FIG. 292 is a flowchart illustrating an example of processing operation of the receiver and the transmitter in Embodiment 13.

In Step 7204*a*, the imaging unit captures, at high speed, the image of the simultaneous imaging lines or pixels in which the transmitter is shown, by not capturing the simultaneous imaging lines or pixels in which the transmitter is not shown. In Step 7204*b*, the receiver detects the movement of the receiver or the hand movement using a gyroscope or a 9-axis sensor, makes adjustment by electronic correction so that the transmitter is always shown, and ends the process.

FIG. 293 is a flowchart illustrating an example of processing operation of the receiver and the transmitter in Embodiment 13.

In Step 7205*a*, the receiver displays a 2D barcode A. In Step 7205*b*, the transmitter reads the 2D barcode A. In Step 7205*c*, the transmitter transmits a display change instruction. In Step 7205*d*, the receiver displays a 2D barcode B. In Step 7205*e*, the transmitter reads the 2D barcode B, and ends the process.

FIG. 294 is a diagram illustrating an example of application of the transmitter in Embodiment 13.

A transmitter 7211*a* has a mark 7211*b* indicating that the transmitter 7211*a* is a transmitter. Though humans cannot distinguish a transmission signal from ordinary light, they are able to recognize from the mark 7211*b* that the transmitter 7211*a* is a transmitter. Likewise, a transmitter 7211*c* has a mark 7211*d* indicating that the transmitter 7211*c* is a transmitter. A transmitter 7211*e* displays a mark 7211*f* indicating that the transmitter 7211*e* is a transmitter, only during signal transmission.

FIG. 295 is a diagram illustrating an example of application of the transmitter in Embodiment 13.

A transmitter 7212*a* such as a TV transmits a signal by changing the luminance of a backlight or a screen 7212*b*. A transmitter 7212*c* such as a TV transmits a signal by changing the luminance of a part other than the screen, such as a bezel 7212*d* or a logo mark.

FIG. 296 is a diagram illustrating an example of application of the transmitter in Embodiment 13.

A transmitter 7213*a* such as a TV transmits a signal, when displaying a display 7213*c* such as urgent news, subtitles, or an on-screen display on a screen 7213*b*. The display 7213*c* is displayed wide in the horizontal direction of the screen, with dark letters on a bright background. This eases the signal reception by the receiver.

FIG. 297 is a diagram illustrating an example of application of the transmitter and the receiver in Embodiment 13.

When the user operates a remote control 7214*a* of a receiver or a TV, the remote control 7214*a* transmits a start signal to a transmitter 7214*b*. The transmitter 7214*b* transmits a signal for a predetermined time after receiving the start signal. The transmitter 7214*b* displays a display 7214*c* indicating that the signal is being transmitted. This eases the signal reception by the receiver, even in the case where the display of the TV itself is dark. The receiver can receive the signal more easily when the display 7214*c* has more bright portions and is wide in the horizontal direction.

The transmitter 7214*b* may have the area 7214*c* for signal transmission, apart from the area for displaying TV images. The transmitter 7214*b* may recognize the movement of the user or the movement of the remote control 7214*a* by a camera 7214*d* or a microphone 7214*e*, and start signal transmission.

FIG. 298 is a diagram illustrating an example of application of the transmitter and the receiver in Embodiment 13.

Transmitters 7215*a* and 7215*b* each transmit the ID number of the transmitter. The ID of the transmitter may be an ID that is completely unique, or an ID that is unique within a region, a building, or a room. In the latter case, it is desirable that the same ID is not present within several tens of meters. A receiver 7215*c* transmits the received ID to a server 7215*d*. The receiver 7215*c* may also transmit the position information of the receiver 7215*c* recognized by a position sensor such as GPS, the terminal ID of the receiver 7215*c*, a user ID, a session ID, and the like to the server.

A database 7215*e* stores, in association with the ID transmitted from the transmitter, another ID, the position information (latitude, longitude, altitude, room number) of the transmitter, the model, shape, or size of the transmitter, content such as text, image, video, and music, an instruction or program executed by the receiver, a URL of another server, information of the owner of the transmitter, the registration date or expiration date of the ID, and so on.

The server 7215*d* reads the information associated with the received ID from the database, and transmits the information to the receiver 7215*c*. The receiver 7215*c* performs a process such as displaying the received information, accessing another server based on the received information, or executing the received instruction.

FIG. 299 is a diagram illustrating an example of application of the transmitter and the receiver in Embodiment 13.

As in the case of FIG. 298, transmitters 7216*a* and 7216*b* each transmit an ID 1 of the transmitter. A receiver 7216*c* transmits the received ID 1 to a server A 7216*d*. The server A transmits an ID 2 and information (URL, password, etc.) for accessing another server B, which are associated with the ID 1. The receiver 7216*c* transmits the ID 2 to the server B 7216*f*. The server B 7216*f* transmits information associated with the ID 2 to the receiver 7216*c*, and performs a process associated with the ID 2.

FIG. 300 is a diagram illustrating an example of application of the transmitter and the receiver in Embodiment 13.

As in the case of FIG. 298, transmitters 7217*a* and 7217*b* each transmit an ID 1 of the transmitter. A receiver 7217*c* transmits the received ID 1 to a server A 7217*d*. The server A transmits information associated with the ID 1 and randomly generated key information to a server B. The key information may be generated by the server B and transmitted to the server A. The server A transmits the key information and information (URL, password, etc.) for accessing the server B, to the receiver. The receiver 7217*c* transmits the key information to the server B 7217*f*. The server B 7217*f* transmits information associated with the ID 2 to the receiver 7217*c*, or performs a process associated with the ID 2.

FIG. 301A is a diagram illustrating an example of the transmission signal in Embodiment 13.

The signal is made up of a header unit 7218*a*, a data unit 7218*b*, a padding unit 7218*c*, and an End of Data unit 7218*e*. The signal repeatedly carries the same data for 1/15 second. Hence, even in the case where the receiver receives only part of the signal, the receiver can decode the signal. The receiver extracts the header unit from the received signal, and decodes the data by treating the part between two header units as the data unit. A shorter data unit per frame enables decoding even in the case where the transmitter is shown in a small size in the imaging unit of the receiver. A longer data unit per frame, on the other hand, contributes to faster communication. By repeating the same data for 1/15 second, a receiver that captures 30 frames per second can reliably capture the signal of the data unit even when there is blanking. In addition, the same signal is received in either one of adjacent frames, with it being possible to confirm the reception result. The signal can be received even in the case where nonconsecutive frames are not processed due to the operation of another application or the receiver is only capable of capturing 15 frames per second. Since data nearer the header unit can be received more easily, important data may be located near the header unit.

FIG. 301B is a diagram illustrating another example of the transmission signal in Embodiment 13.

As in the example in FIG. 301A, the signal is made up of the header unit 7218*a*, the data unit 7218*b*, the padding unit 7218*c*, and the End of Data unit 7218*e*. The signal repeatedly carries the same data for 1/30 second. Hence, even in the case where the receiver receives only part of the signal, the receiver can decode the signal. A shorter data unit enables decoding even in the case where the transmitter is shown in a small size in the imaging unit of the receiver. A longer data unit, on the other hand, contributes to faster communication. By repeating the same data for 1/30 second, a receiver that captures 30 frames per second can reliably capture the signal of the data unit even when there is blanking. In addition, the same signal is received in either one of adjacent frames, with it being possible to confirm the reception result. Since data nearer the header unit can be received more easily, important data may be located near the header unit.

FIG. 302 is a diagram illustrating an example of the transmission signal in Embodiment 13.

A modulation scheme 7219*a* for modulating a 2-bit signal to a 5-bit signal, though lower in modulation efficiency than a modulation scheme such as 2200.2*a* for modulating a 2-bit signal to a 4-bit signal, can express a header pattern in the same form as data, and therefore suppress flicker as compared with inserting a header pattern of a different form. End of Data may be expressed using a header in the data unit.

FIG. 303A is a diagram illustrating an example of the transmission signal in Embodiment 13.

The signal is made up of a data unit 7220*a*, a buffer unit 7220*b*, and an End of Data unit 7220*d*. The buffer unit may be omitted. The signal repeatedly carries the same data for 1/15 second. A header such as the header 7218*a* is unnecessary in the case of using, for example, FM modulation of transmitting a signal by a light emission frequency.

FIG. 303B is a diagram illustrating another example of the transmission signal in Embodiment 13.

As in the example in FIG. 303A, the signal is made up of the data unit 7220*a*, the buffer unit 7220*b*, and the End of Data unit 7220*d*. The buffer unit may be omitted. The signal repeatedly carries the same data for 1/30 second. A header such as the header 7218*a* is unnecessary in the case of using, for example, FM modulation of transmitting a signal by a light emission frequency.

FIG. 304 is a diagram illustrating an example of the transmission signal in Embodiment 13.

Signals are assigned according to frequency. Since the receiver detects frequencies from signal periods, reception errors can be reduced by assigning signals so that the inverses or logarithms of frequencies are at regular intervals, rather than by assigning frequencies to signals at regular intervals. In the case where the imaging unit of the receiver captures light for transmitting data 1 and data 2 within one frame, Fourier transforming the luminance in the direction perpendicular to the exposure lines results in the occurrence of weaker peaks in the frequencies of the data 1 and the data 2 than in the case where light for transmitting single data is captured.

According to this method, the transmission frequency can be analyzed even in the case where light transmitted at a plurality of frequencies in sequence is captured in one frame, and the transmission signal can be received even when the frequency of the transmission signal is changed at time intervals shorter than 1/15 second or 1/30 second.

The transmission signal sequence can be recognized by performing Fourier transform in a range shorter than one frame. Alternatively, captured frames may be concatenated to perform Fourier transform in a range longer than one frame. In this case, the luminance in the blanking time in imaging is treated as unknown.

FIGS. 305A and 305B are diagrams illustrating an example of the transmission signal in Embodiment 13.

In the case where the frequency of the transmission signal is less than or equal to 200 Hz, the light appears to blink to humans. In the case where the frequency exceeds 200 Hz, the light appears to be continuous to humans. A camera captures blinking light in frequencies up to about 500 Hz (1 kHz depending on conditions). It is therefore desirable that the signal frequency (carrier frequency) is greater than or equal to 1 kHz. The signal frequency may be greater than or equal to 200 Hz if there is little effect of the camera capturing flicker. Harmonic noise of a lighting device increases in frequencies greater than or equal to 20 kHz. This can be avoided by setting the signal frequency to less than or equal to 20 kHz. Besides, since sound due to coil oscillation occurs in a range from 500 Hz to 3 kHz, it is necessary to set the signal frequency to greater than or equal to 3 kHz or fix the coil. When the signal frequency is 1 kHz (period of 1 millisecond), the exposure time of the imaging device needs to be set to less than or equal to half, i.e. 0.5 millisecond (=1/2000 second), in order to recognize the signal asynchronously. In the case of employing frequency modulation in the signal modulation scheme, too, the exposure time of the imaging device needs to be set to less than or equal to half the signal period, due to the sampling theorem. In the case of the modulation scheme that expresses the value by the frequency itself as in FIG. 304, on the other hand, the exposure time of the imaging device can be set to less than or equal to about 4 times the signal period, because the frequency can be estimated from signal values at a plurality of points.

FIG. 306 is a diagram illustrating an example of application of the transmitter in Embodiment 13.

A transmitter 7223*a* such as a lighting transmits an ID. A receiver 7223*b* such as a personal computer receives the ID, and transmits the ID and a file 7223*e* to a server 7223*d*. The server 7223*d* stores the file 7223*e* and the ID in association with each other, and permits a personal computer transmitting the same ID to access the file. Here, a plurality of access controls, such as read-only permission and read and write permission, may be applied according to the ID. A receiver 7223*c* such as a personal computer receives the ID, transmits the ID to the server 7223*d*, and accesses the file 7223*e* on the server. The server 7223*d* deletes the file or initializes access control, in the case where a predetermined time has elapsed from when the file is accessed last time or in the case where the personal computer 7223*b* transmits a different ID. The personal computer 7223*b* or the personal computer 7223*c* may transmit an ID.

FIG. 307 is a diagram illustrating an example of application of the transmitter in Embodiment 13.

A transmitter 7224*b* registers its ID information in a server 7224*d*. A receiver 7224*a* displays a coupon, an admission ticket, member information, or prepaid information on the screen. The transmitter 7224*b* transmits the ID. The receiver 7224*a* receives the ID, and transmits the received ID, a user ID, a terminal ID, and the information displayed on the screen to the server 7224*d*. The server 7224*d* determines whether or not the information displayed on the receiver 7224*a* is valid, and transmits the result to a display device 7224*c*. The server 7224*d* may transmit key information that changes with time to the transmitter 7224*b*, which then transmits the key information. Here, the server 7224*d* may be implemented as the same device as the transmitter 7224*b* or the display device 7224*c*. In a system of displaying a coupon, an admission ticket, member information, or prepaid information on the screen of the receiver 7224*a* in 2D barcode or the like and reading the displayed information, the information can be easily falsified by displaying an image obtained by copying the screen. According to this method, however, it is possible to prevent the falsification of the screen by copying.

FIGS. 308 to 310 are diagrams for describing the imaging element in Embodiment 13.

FIG. 308 is a front view of an imaging element 800 according to the present disclosure. As described with the drawings in the foregoing embodiments, to improve the optical communication speed according to the present disclosure, only the data of scan lines, e.g. n=4 to 7, of an area 830*a* in a light signal generation unit 830 is obtained by repetitive scan by supplying a scan line selection signal to vertical access means 802, while tracking the light signal generation unit 830 as illustrated in FIG. 310. As a result, continuous light signals according to the present disclosure can be extracted as illustrated in the lower part of FIG. 310. In detail, continuous signals such as 4, 5, 6, 7 followed by the blanking time and 4, 5, 6, 7 followed by the blanking time can be obtained. The blanking can be limited to 2 μs or less in the current imaging element process. When the blanking is limited to 2 μs or less, the data can be demodulated substantially continuously because, in the case of 30 fps, one frame is 33 ms and, in the case of 1000 lines, one line is 33 μs.

In the present disclosure, in the imaging element (image sensor) in a rolling shutter mode, first the shutter speed is increased to display the lines according to the present disclosure, and then the signal is obtained. After this, the image 830 of the light source moves up, down, left, or right due to hand movement of the user of the camera. This causes the image 830 to be partially outside the lines n=4 to 7, as a result of which the signal is interrupted and an error occurs. In view of this, hand movement detection and correction means 832 is used for correction, to fix the image 830. Alternatively or in combination with this, means 834 of detecting the line number of the position of the image 830 is used to specify the line number n of the image 830, and a line selection unit 835 controls the vertical access means to change the line number to a desired line n (e.g. n=7 to 10). As a result, the image 830 is obtained and so the continuous signals are obtained. Thus, data with few errors can be received at high speed.

Referring back to FIG. 308, the imaging element 800 is further described below. There are horizontal pixels a to k, which are accessible by horizontal access means 801. Meanwhile, there are 12 vertical pixels where n=1 to 12. 803*a* to 803*n* are read for each column to a line memory 805 and output from an output unit 808.

As illustrated in FIG. 309, in the present disclosure, first the data is sequentially read in a normal imaging mode as in (a). A blanking time 821 is provided between normal frames, during which various adjustment operations for video signals, such as color, are conducted.

The signal cannot be obtained in a time period of 5% to 20%, though this differs depending on the imaging element. Since the reception pattern specific to the present disclosure is unable to be obtained, when the imaging device enters a data signal reception mode in Step 820*c*, first the shutter speed is increased to increase the gain, thus receiving the data. In the case of Yes, the blanking time 821 is reduced to a blanking time 821*a* by stopping part of the above-mentioned video imaging operations for color, brightness, sensitivity, and so on. As a result of such a reduction by omitting adjustment operations, the blanking time 821*a* can be limited to 2 has or less in the current process. This delivers a significant reduction in burst error of the input signal, and so enables much faster transmission.

In the case where only a partial image is captured as the image 830 as in FIG. 310, the information of the lines other than n=4 to 8 is not obtained. This causes a large burst error, leading to lower reception efficiency and a significant decrease in transmission amount.

The image position detection means 834 in FIG. 310 detects the position and size of the image 830. In the case where the image is small, the imaging element is switched to a high-speed read mode in Step 820*d*, and scans only the lines (n=4 to 7) in which the image 830 is captured. Line signals 803*d*, 803*e*, 803*f*, and 803*g* are repeatedly read as in (c), as a result of which the pattern specific to the present disclosure is read seamlessly. Continuous data reception with almost no burst error can thus be performed at a significantly improved data rate.

In detail, a transmission rate of about 2400 bps is achieved when the carrier is 4.8 kHz in the current imaging element. A transmission rate of several tens of kbps is expected with faster imaging elements in the future.

After the data read is completed in Step 820*e*, the shutter speed is decreased to increase the blanking time, and the imaging element returns to the normal imaging mode in (a).

The above-mentioned blanking time reduction and repetitive reading of specific lines ensures that synchronous signals or addresses are read, and enables much faster transmission in the pattern transmission method according to the present disclosure.

(Variations)

The following describes variations or supplements to each of the above embodiments.

FIG. 311A is a flowchart illustrating processing operation of the reception device (imaging device). FIG. 311A illustrates more detailed processing operation than that in FIG. 51.

Here, the imaging unit of the receiver employs not a mode (global shutter mode) of simultaneously exposing all light receiving elements but a mode (rolling shutter mode, focal plane shutter mode) of sequentially exposing the light receiving elements one by one with a time difference. The term "exposure" used in the description of the present disclosure includes an exposure mode of controlling the time during which an imaging element is exposed to light by a physical shutter, and an exposure mode of extracting only the output of an imaging element during a specific time by an electronic shutter.

First, in Step 7340*a*, in the case where the imaging mode is the global shutter mode, the receiver changes the imaging mode to the rolling shutter mode. Next, in Step 7340*b*, the receiver sets the shutter speed so that a bright line is captured when capturing a subject whose moving average luminance with a time width greater than or equal to 5 milliseconds is unchanged and that changes in luminance in a region less than or equal to 5 milliseconds.

In Step 7340*c*, the receiver sets the sensitivity of the light receiving element to increase the difference between the bright part and the dark part of the bright line. In Step 7340*d*, the receiver sets the imaging mode to a macro imaging mode, or sets a shorter focal length than focusing on the transmitter. Capturing the transmitter in a larger size in a blurred state enables an increase in the number of exposure lines in which the bright line is captured.

In Step 7340*e*, the receiver observes the change in luminance of the bright line in the direction perpendicular to the exposure line. In Step 7340*f*, the receiver calculates the interval between the parts of rapid rise in luminance or the interval between the parts of rapid fall in luminance and reads the transmission signal from the interval, or calculates the period of luminance change and reads the transmission signal from the period.

FIG. 311B is a diagram illustrating an image obtained in the normal imaging mode and an image obtained in the macro imaging mode in comparison. As illustrated in FIG. 311B, an image 7307*b* obtained by capturing the light emitting subject in the macro imaging mode includes a larger bright area than an image 7307*a* obtained by capturing the same subject in the normal imaging mode. Thus, the bright line can be generated in more exposure lines for the subject in the macro imaging mode.

FIG. 312 is a diagram illustrating a display device that displays video and the like.

A display device 7300*a* including a liquid display or the like displays video in a video area 7300*b*, and various information in an information display area 7300*c*. The display device 7300*a* is configured as a transmitter (transmission device), and transmits a signal by changing the luminance of the backlight.

FIG. 313 is a diagram illustrating an example of processing operation of the display device 7300*a*.

First, in Step 7350*a*, the display device 7300*a* enters the signal transmission mode. Next, in Step 7350*b*, the display device 7300*a* transmits the signal by changing the luminance of the backlight in the information display area 7300*c*.

FIG. 314 is a diagram illustrating an example of the signal transmission part in the display device 7300*a*.

The display device 7300*a* transmits the signal by changing the luminance of each part (7301*d*, 7301*f*, 7301*g*, 7301*i*) where the backlight is ON, and transmits no signal from the other parts (7301*c*, 7301*e*, 7301*h*, 7301*j*).

FIG. 315 is a diagram illustrating another example of processing operation of the display device 7300*a*.

First, in Step 7351*a*, the display device 7300*a* enters the signal transmission mode. Next, in Step 7351*b*, the display device 7300*a* transmits the signal only from the part where the backlight is ON, in the case where the backlight is turned OFF upon screen change for improved dynamic resolution. In Step 7351*c*, the display device 7300*a* transmits no signal when the backlight is OFF in the entire screen.

FIG. 316 is a diagram illustrating another example of the signal transmission part in the display device 7300*a*.

The display device 7300*a* turns OFF the backlight control for improved dynamic resolution in each part (7302*b*, 7302*e*, 7302*g*, 7302*j*), and transmits the signal from these parts. Meanwhile, the display device 7300*a* turns ON the backlight control for improved dynamic resolution in the other parts (7302*c*, 7302*d*, 7302*h*, 7301*i*).

FIG. 317 is a diagram illustrating yes another example of processing operation of the display device 7300*a*.

First, in Step 7352*a*, the display device 7300*a* enters the signal transmission mode. Next, in Step 7352*b*, the display device 7300*a* turns OFF the backlight control for improved dynamic resolution in the part (7302*b*, 7302*e*, 7302*g*, 7202*j*) of the screen, and transmits the signal from the part.

In Step 7352*c*, the display device 7300*a* adjusts the average luminance of the backlight so that the brightness of the part transmitting the signal is equal to the average luminance of the backlight in the part transmitting no signal. This adjustment may be made by adjusting the time ratio of blinking of the backlight during signal transmission or by adjusting the maximum luminance of the backlight.

FIG. 318 is a diagram illustrating a structure of a communication system including the transmitter and the receiver.

The communication system includes transmitters 7303_a_ and 7303_b_, a control device 7303_c_, a network 7303_d_, an ID management server 7303_e_, a wireless access point 7303_f_, and receivers 7303_g_ and 7303_h_.

FIG. 319 is a flowchart illustrating processing operation of the communication system in FIG. 318.

First, in Step 7353_a_, the ID of the transmitter, the information (SSID, password, ID of wireless access point, radio frequency, position information of access point, connectable position information, etc.) of the wireless access point 7303_f_, and the information (IP address, etc.) of the control device 7303_c_ are stored in the ID management server 7303_e_ in association with each other. Next, in Step 7353_b_, the transmitter 7303_a_ or 7303_b_ transmits the ID of the transmitter 7303_a_ or 7303_b_. The transmitter 7303_a_ or 7303_b_ may also transmit the information of the wireless access point 7303_f_ and the information of the control device 7303_c_. In Step 7353_c_, the receiver 7303_g_ or 7303_h_ receives the ID of the transmitter 7303_a_ or 7303_b_ and obtains the information of the wireless access point 7303_f_ and the information of the control device 7303_c_ from the ID management server 7303_e_, or receives the ID of the transmitter 7303_a_ or 7303_b_ and the information of the wireless access point 7303_f_.

In Step 7353_d_, the transmitter 7303_a_ or 7303_b_ connects to the wireless access point 7303_f_. In Step 7353_e_, the transmitter 7303_a_ or 7303_b_ transmits the address of the ID management server 7303_e_ on the network, an instruction to the ID management server 7303_e_, and the ID of the transmitter 7303_a_ or 7303_b_ to the control device 7303_c_.

In Step 7353_f_, the control device 7303_c_ transmits the received ID to the receiver 7303_g_ or 7303_h_. In Step 7353_g_, the control device 7303_c_ issues the instruction to the ID management server 7303_e_ on the network, and obtains a response. Here, the control device 7303_c_ operates as a proxy server.

In Step 7353_h_, the control device 7303_c_ transmits the response and the received ID, from the transmitter 7303_a_ or 7303_b_ indicated by the transmitter ID. The transmission may be repeatedly performed until the reception completion is notified from the receiver 7303_g_ or 7303_h_ or a predetermined time elapses.

In Step 7353_i_, the receiver 7303_g_ or 7303_h_ receives the response. In Step 7353_j_, the receiver 7303_g_ or 7303_h_ transmits the received ID to the control device 7303_c_, and notifies the reception completion.

In Step 7353_k_, in the case where the receiver 7303_g_ or 7303_h_ is at a position where the signal from the transmitter 7303_a_ or 7303_b_ cannot be received, the receiver 7303_g_ or 7303_h_ may notify the control device 7303_c_ to return the response via the wireless access point 7303_f_.

FIG. 320 is a diagram illustrating a variation of signal transmission in each of the above embodiments.

In the reception method according to the present disclosure, the signal transmission efficiency is higher when the light emitting unit of the transmitter is captured in a larger size in the imaging unit of the receiver. That is, the signal transmission efficiency is low in the case where a small electric bulb or a high ceiling lighting is used as the light emitting unit of the transmitter. The signal transmission efficiency can be enhanced by applying light of a transmitter 7313_a_ to a wall, a ceiling, a floor, a lamp shade, or the like and capturing reflected light 7313_b_ by a receiver 7313_c_.

FIG. 321 is a diagram illustrating a variation of signal transmission in each of the above embodiments.

Signal transmission is performed by a transmitter 7314_d_ projecting light including a transmission signal onto an exhibit 7314_a_ and a receiver 7314_c_ capturing reflected light 7314_b_.

FIG. 322 is a diagram illustrating a variation of signal transmission in each of the above embodiments.

A signal transmitted from a transmitter 7315_a_ is received by a receiver 7315_b_ including an illuminance sensor. The receiver 7315_b_ receives the signal not by an imaging element but by an illuminance sensor. Such a receiver is low in power consumption, suitable for constant signal reception, lightweight, and manufacturable at low cost.

The receiver 7315_b_ is formed as a part of glasses, an earring, a hair accessory, a wristwatch, a hearing aid, a necklace, a cane, a trolley, or a shopping cart. The receiver 7315_b_ performs video display, audio reproduction, or vibration, according to the received signal. The receiver 7315_b_ also transmits the received signal to a mobile information terminal 7315_c_ via a wireless or wired transmission path.

FIG. 323A is a diagram illustrating a variation of signal transmission in each of the above embodiments.

A projector 7316_a_ transmits a signal, using projection light as the transmission signal. A receiver 7316_c_ captures reflected light from a screen 7316_b_, to receive the signal. The receiver 7316_c_ displays content and its ancillary information projected by the projector 7316_a_, on a screen 7316_d_. The content displayed on the screen 7316_d_ may be transmitted as the transmission signal, or obtained from a server 7316_e_ based on an ID included in the transmission signal.

FIG. 323B is a diagram illustrating a variation of signal transmission in each of the above embodiments.

A receiver 7317_b_ receives a signal transmitted from a transmitter 7317_a_. The receiver 7317_b_ transmits audio to an earphone or hearing aid 7317_c_ registered in the receiver 7317_b_. In the case where visual impairment is included in a user profile registered in the receiver 7317_b_, the receiver 7317_b_ transmits audio commentary for the visually impaired to the earphone 7317_c_.

FIG. 323C is a diagram illustrating a variation of signal transmission in each of the above embodiments.

A receiver 7318_c_ receives a signal transmitted from a transmitter 7318_a_ or 7318_b_. The receiver 7318_c_ may receive the signal using an illuminance sensor. The inclusion of an illuminance sensor with high directivity enables the receiver 7318_c_ to accurately estimate the direction to the transmitter. Moreover, the inclusion of a plurality of illuminance sensors enables the receiver 7318_c_ to receive the transmission signal in a wider range. The receiver 7318_c_ transmits the received signal to an earphone 7318_d_ or a head-mounted display 7318_e_.

FIG. 323D is a flowchart illustrating processing operation of a communication system including the receiver and the display or the projector. This flowchart illustrates processing operation corresponding to any of the examples of signal transmission illustrated in FIGS. 323A to 323C.

First, in Step 7357_a_, the ID of the transmitter, the display content ID, and the content displayed on the display or the projector are stored in the ID management server in association with each other. Next, in Step 7357_b_, the transmitter displays the content on the display or the projector, and transmits the signal using the backlight of the display or the projection light of the projector. The transmission signal may include the ID of the transmitter, the display content ID, the URL in which the display content is stored, and the display content itself.

In Step 7357_c_, the receiver receives the transmission signal. In Step 7357_d_, the receiver obtains the content displayed on the display or the projector by the transmitter, based on the received signal.

In Step 7357_e_, in the case where a user profile is set in the receiver, the receiver obtains content suitable for the profile.

For example, the receiver obtains subtitle data or audio content for at hand reproduction in the case where a profile of hearing impairment is set, and obtains content for audio commentary in the case where a profile of visual impairment is set.

In Step 7357*f*, the receiver displays the obtained image content on the display of the receiver, and reproduces the obtained audio content from the speaker of the receiver, the earphone, or the hearing aid.

FIG. 324 is a diagram illustrating an example of the transmission signal in Embodiment 12. FIG. 324 illustrates the transmission signal in FIG. 250 in detail.

In the case of coding the transmission signal by the method in any of FIGS. 7 to 87, 302, and the like, the receiver can decode the transmission signal by detecting points 7308*c*, 7308*d*, and 7308*e* at which the luminance rises rapidly. In this case, transmission signals 7308*a* and 7308*b* are equivalent and represent the same signal.

Accordingly, the average luminance can be changed by adjusting the time of luminance fall, as in the transmission signals 7308*a* and 7308*b*. When there is a need to change the luminance of the transmitter, by adjusting the average luminance in this way, the luminance can be adjusted without changing the transmission signal itself.

FIG. 325 is a diagram illustrating an example of the transmission signal in Embodiment 1. FIG. 325 illustrates the transmission signal in FIG. 14 in detail.

Transmission signals 7309*a* and 7309*b* can be regarded as equivalent to a transmission signal 7309*c*, when taking the average luminance of a length such as 7309*d*. Another signal can be superimposed by changing the luminance with a time width unobservable by other receivers, as in the transmission signals 7309*a* and 7309*b*.

FIG. 326 is a diagram illustrating another example of the transmission signal in Embodiment 1. FIG. 326 illustrates the transmission signal in FIG. 14 in detail.

Another signal is superimposed by adding a luminance change with a time width unobservable by other receivers to a transmission signal 7310*a*, as in 7310*c*. In the case where the signal cannot be superimposed in a luminance fall section in the transmission signal 7310*a*, a high-speed modulation signal can be transmitted intermittently by adding a start signal and an end signal to a high-speed modulation part as in 7310*e*.

FIG. 327A is a diagram illustrating an example of the imaging element of the receiver in each of the above embodiments.

Many imaging elements have a layout 7311*a*, and so cannot capture the transmitter while capturing the optical black. A layout 7311*b*, on the other hand, enables the imaging element to capture the transmitter for a longer time.

FIG. 327B is a diagram illustrating an example of a structure of an internal circuit of the imaging device of the receiver in each of the above embodiments.

An imaging device 7319*a* includes a shutter mode change unit 7319*b* that switches between the global shutter mode and the rolling shutter mode. Upon reception start, the receiver changes the shutter mode to the rolling shutter mode. Upon reception end, the receiver changes the shutter mode to the global shutter mode, or returns the shutter mode to a mode before reception start.

FIG. 327C is a diagram illustrating an example of the transmission signal in each of the above embodiments.

In the case where the carrier is set to 1 kHz as a frequency at which no flicker is captured by a camera, one slot is 1 millisecond (7320*a*). In the modulation scheme (4-value PPM modulation) in FIG. 8, the average of one symbol (4 slots) is 75% (7320*b*), and the range of the moving average for 4 milliseconds is 75%±(modulation factor)/4. Flicker is smaller when the modulation factor is lower. Assuming one symbol as one period, the carrier is greater than or equal to 800 Hz in the case where the frequency at which no flicker is perceived by humans is greater than or equal to 200 Hz, and the carrier is greater than or equal to 4 kHz in the case where the frequency at which no flicker is captured by a camera is greater than or equal to 1 kHz.

Likewise, in the case where the carrier is set to 1 kHz, in the modulation scheme (5-value PPM modulation) in FIG. 302, the average of one symbol (5 slots) is 80% (7320*c*), and the range of the moving average for 5 milliseconds is 80%±(modulation factor)/5. Flicker is smaller when the modulation factor is lower. Assuming one symbol as one period, the carrier is greater than or equal to 1 kHz in the case where the frequency at which no flicker is perceived by humans is greater than or equal to 200 Hz, and the carrier is greater than or equal to 5 kHz in the case where the frequency at which no flicker is captured by a camera is greater than or equal to 1 kHz.

FIG. 327D is a diagram illustrating an example of the transmission signal in each of the above embodiments.

A header pattern is different from a pattern representing data, and also needs to be equal in average luminance to the pattern representing data, in order to eliminate flicker. Patterns such as 7321*b*, 7321*c*, 7321*d*, and 7321*e* are available as patterns equal in average luminance to the data pattern in the modulation scheme of 2200.2*a*. The pattern 7321*b* is desirable in the case where the luminance value can be controlled in levels. In the case where the luminance change is sufficiently faster than the exposure time of the imaging device in the receiver as in the pattern 7321*e*, the signal is observed as in 7321*b* by the receiver. The modulation scheme 7219*a* is defined in the form that includes the header pattern.

FIG. 328A is a diagram for describing an imaging mode of the receiver.

In the normal imaging mode, the receiver obtains an image 7304*a* by performing imaging using all exposure lines (imaging lines) included in the image sensor. As an example, the total number of exposure lines is 3000. Through such imaging, the receiver obtains one image from time t1 to time t4, and further obtains one image from time t5 to time t8.

In the case where the subject which is the transmitter is shown in only one part of the image, there is a possibility that the receiver cannot receive the signal from the subject. Suppose only the exposure lines 1001 to 2000 capture the subject and the other exposure lines do not capture the subject. When the exposure lines 1001 to 2000 are not exposed, that is, when the exposure lines 1 to 1000 are exposed (time t1 to time t2, time t5 to time t6) and when the exposure lines 2001 to 3000 are exposed (time t3 to time t4, time t7 to time t8), the receiver cannot receive the signal from the subject.

When the imaging mode is switched from the normal imaging mode to a special imaging mode A, the receiver uses, for imaging, only the exposure lines capturing the subject from among all exposure lines. That is, the receiver uses only the exposure lines 1001 to 2000 for imaging, from time t1 to time t4 and from time t5 to time t8. In the special imaging mode A, the exposure lines 1001 to 2000 are uniformly exposed in sequence only once throughout the imaging time of one frame, e.g. from time t1 to time t4 or from time t5 to time t8. The receiver can thus be prevented from missing the reception of the signal from the subject.

FIG. 328B is a flowchart illustrating processing operation of the receiver using the special imaging mode A.

First, in Step 7354*a*, the receiver detects the part in which the bright line is captured, from the captured image. Next, in Step 7354*b*, the receiver sets the hand movement correction function to ON.

In Step 7354*c*, the receiver switches to the special imaging mode A in which the imaging is performed using only the pixels of the exposure lines in which the bright line is captured. In the special imaging mode A, the exposure time of each exposure line is set so that the time from when the exposure of one exposure line starts to when the exposure of the next exposure line starts is uniform during the imaging time of one image (e.g. from time t1 to time t4). Here, one or more pixels in the direction perpendicular to the exposure lines may be omitted in the imaging.

Since the number of frames output from the imaging unit of the receiver is the same as that in the normal imaging mode, the special imaging mode A is suitable for a receiver that includes a low-performance processor or a receiver that includes a processor also engaged in other processes.

In Step 7354*d*, the receiver designates the area of imaging in the special imaging mode A. By designating a narrower area than the area in which the bright line is captured as the area of imaging, it is possible to keep capturing the bright line even when the imaging direction changes due to hand movement and the like.

In Step 7354*e*, the receiver detects the movement of the captured image. By moving the area of imaging in the moving direction, it is possible to keep capturing the bright line even when the position of the captured image changes. In Step 7354*f*, the receiver obtains the transmitted information from the pattern of the bright line.

FIG. 329A is a diagram for describing another imaging mode of the receiver.

When the imaging mode is switched from the normal imaging mode to a special imaging mode B, the receiver uses, for imaging, only the exposure lines capturing the subject from among all exposure lines. That is, the receiver uses only the exposure lines 1001 to 2000 for imaging, from time t1 to time t4 and from time t5 to time t8. In the special imaging mode B, the exposure lines 1001 to 2000 are exposed in sequence a plurality of times throughout the imaging time of one frame, e.g. from time t1 to time t4 or from time t5 to time t8. The receiver can thus be prevented from missing the reception of the signal from the subject.

FIG. 329B is a flowchart illustrating processing operation of the receiver using the special imaging mode B.

First, in Step 7355*a*, the receiver detects the part in which the bright line is captured, from the captured image. Next, in Step 7355*b*, the receiver sets the hand movement correction function to ON.

In Step 7355*c*, the receiver switches to the special imaging mode B in which the imaging is performed using only the pixels of the exposure lines in which the bright line is captured. In the special imaging mode B, the imaging is performed at high speed by subjecting only the area in which the bright line is captured to the imaging. Here, one or more pixels in the direction perpendicular to the exposure lines may be omitted in the imaging.

In Step 7355*d*, the receiver designates the area of imaging in the special imaging mode B. By designating a narrower area than the area in which the bright line is captured as the area of imaging, it is possible to keep capturing the bright line even when the imaging direction changes due to hand movement and the like.

In Step 7355*e*, the receiver detects the movement of the captured image. By moving the area of imaging in the moving direction, it is possible to keep capturing the bright line even when the position of the captured image changes. In Step 7355*f*, the receiver obtains the transmitted information from the pattern of the bright line.

FIG. 330A is a diagram for describing yet another imaging mode of the receiver.

When the imaging mode is switched from the normal imaging mode to a special imaging mode C, the receiver uses, for imaging, only the exposure lines capturing the subject from among all exposure lines. That is, the receiver uses only the exposure lines 1001 to 2000 for imaging, from time t1 to time t4 and from time t5 to time t8. In the special imaging mode C, the exposure lines 1001 to 2000 are exposed in sequence a plurality of times throughout the imaging time of one frame, e.g. from time t1 to time t4 or from time t5 to time t8. In addition, in the special imaging mode C, a plurality of images obtained by performing the exposure a plurality of times are not output individually, but one image (image of the same size as the image generated in the normal imaging mode) including the plurality of images is output. The receiver can thus be prevented from missing the reception of the signal from the subject.

FIG. 330B is a flowchart illustrating processing operation of the receiver using the special imaging mode C.

First, in Step 7356*a*, the receiver detects the part in which the bright line is captured, from the captured image. Next, in Step 7356*b*, the receiver sets the hand movement correction function to ON.

In Step 7356*c*, the receiver switches to the special imaging mode C in which the imaging is performed using only the pixels of the exposure lines in which the bright line is captured. In the special imaging mode C, the imaging is performed only in the area in which the bright line is captured, and the imaging results are arranged to form one image while ignoring the original pixel positions. Here, one or more pixels in the direction perpendicular to the exposure lines may be omitted in the imaging.

Since the number of frames output from the imaging unit of the receiver is the same as that in the normal imaging mode, the special imaging mode C is suitable for a receiver that includes a low-performance processor or a receiver that includes a processor also engaged in other processes.

In Step 7356*d*, the receiver designates the area of imaging in the special imaging mode C. By designating a narrower area than the area in which the bright line is captured as the area of imaging, it is possible to keep capturing the bright line even when the imaging direction changes due to hand movement and the like.

In Step 7356*e*, the receiver detects the movement of the captured image. By moving the area of imaging in the moving direction, it is possible to keep capturing the bright line even when the position of the captured image changes. In Step 7356*f*, the receiver obtains the transmitted information from the pattern of the bright line.

Though the information communication method according to one or more aspects has been described by way of the embodiments, the present disclosure is not limited to these embodiments. Other embodiments realized by application of modifications conceivable by those skilled in the art to the embodiments and any combination of the structural elements in the embodiments are also included in the scope of one or more aspects without departing from the subject matter of the present disclosure.

FIG. 331A is a flowchart of an information communication method according to an aspect of the present disclosure.

An information communication method according to an aspect of the present disclosure is an information communication method of obtaining information from a subject, and includes steps SA11, SA12, and SA13.

In detail, the information communication method includes: an exposure time setting step (SA11) of setting an exposure time of an image sensor so that, in an image obtained by capturing the subject by the image sensor, a bright line corresponding to an exposure line included in the image sensor appears according to a change in luminance of the subject; an imaging step (SA12) of capturing the subject that changes in luminance by the image sensor with the set exposure time, to obtain the image including the bright line; and an information obtainment step (SA13) of obtaining the information by demodulating data specified by a pattern of the bright line included in the obtained image.

FIG. 331B is a block diagram of an information communication device according to an aspect of the present disclosure.

An information communication device A10 according to an aspect of the present disclosure is an information communication device that obtains information from a subject, and includes structural elements A11, A12, and A13.

In detail, the information communication device A10 includes: an exposure time setting unit A11 that sets an exposure time of an image sensor so that, in an image obtained by capturing the subject by the image sensor, a bright line corresponding to an exposure line included in the image sensor appears according to a change in luminance of the subject; an imaging unit A12 which is the image sensor that captures the subject that changes in luminance by the image sensor with the set exposure time, to obtain the image including the bright line; and a demodulation unit A13 that obtains the information by demodulating data specified by a pattern of the bright line included in the obtained image.

FIG. 331C is a flowchart of an information communication method according to an aspect of the present disclosure.

An information communication method according to an aspect of the present disclosure is an information communication method of obtaining information from a subject, and includes steps SA21 to SA26.

In detail, the information communication method includes: a first imaging step (SA21) of obtaining a first image by capturing the subject using an image sensor that includes a plurality of exposure lines; a detection step (SA22) of detecting a range in which the subject is captured, from the first image; a determination step (SA23) of determining, from among the plurality of exposure lines, predetermined exposure lines for capturing the range in which the subject is captured; an exposure time setting step (SA24) of setting an exposure time of the image sensor so that, in a second image obtained using the predetermined exposure lines, a bright line corresponding to the predetermined exposure lines appears according to a change in luminance of the subject; a second imaging step (SA25) of obtaining the second image including the bright line, by capturing the subject that changes in luminance using the predetermined exposure lines with the set exposure time; and an information obtainment step (SA26) of obtaining the information by demodulating data specified by a pattern of the bright line included in the obtained second image.

FIG. 331D is a block diagram of an information communication device according to an aspect of the present disclosure.

An information communication device A20 according to an aspect of the present disclosure is an information communication device that obtains information from a subject, and includes structural elements A21 to A26.

In detail, the information communication device A20 includes: a first image obtainment unit A21 that obtains a first image by capturing the subject using an image sensor that includes a plurality of exposure lines; a imaging range detection unit A22 that detects a range in which the subject is captured, from the first image; an exposure line determination unit A23 that determines, from among the plurality of exposure lines, predetermined exposure lines for capturing the range in which the subject is captured; an exposure time setting unit A24 that sets an exposure time of the image sensor so that, in a second image obtained using the predetermined exposure lines, a bright line corresponding to the predetermined exposure lines appears according to a change in luminance of the subject; a second image obtainment unit A25 that obtains the second image including the bright line, by capturing the subject that changes in luminance using the predetermined exposure lines with the set exposure time; and a demodulation unit A26 that obtains the information by demodulating data specified by a pattern of the bright line included in the obtained second image.

Note that the pattern of the bright line mentioned above is synonymous with the difference of the interval of each bright line.

FIG. 332 is a diagram illustrating an image obtained by an information communication method according to an aspect of the present disclosure.

For example, the exposure time is set to less than 10 milliseconds for the subject that changes in luminance at a frequency greater than or equal to 200 Hz. A plurality of exposure lines included in the image sensor are exposed sequentially, each at a different time. In this case, several bright lines appear in an image obtained by the image sensor, as illustrated in FIG. 332. That is, the image includes the bright line parallel to the exposure line. In the information obtainment step (SA13 or SA26), data specified by a pattern in a direction perpendicular to the exposure line in the pattern of the bright line is demodulated.

In the information communication method illustrated in FIG. 331A and the information communication device A10 illustrated in FIG. 331B, the information transmitted using the change in luminance of the subject is obtained by the exposure of the exposure line in the image sensor. This enables communication between various devices, with no need for, for example, a special communication device for wireless communication. Furthermore, in the information communication method illustrated in FIG. 331C and the information communication device A20 illustrated in FIG. 331D, from among all exposure lines included in the image sensor, only the exposure lines in which the subject is captured are used for obtaining the second image including the bright line, so that the process for the exposure lines in which the subject is not captured can be omitted. This enhances the efficiency of information obtainment, and prevents missing the reception of the information from the subject.

FIG. 333A is a flowchart of an information communication method according to another aspect of the present disclosure.

An information communication method according to another aspect of the present disclosure is an information communication method of transmitting a signal using a change in luminance, and includes steps SB11, SB12, and SB13.

In detail, the information communication method includes: a determination step (SB11) of determining a pattern of the change in luminance by modulating the signal to be transmitted; a first transmission step (SB12) of transmitting the signal by a light emitter changing in luminance according to the determined pattern; and a second transmission step (SB13) of transmitting the same signal as the signal by the light emitter changing in luminance according to the same pattern as the determined pattern within 33 milliseconds from the transmission of the signal. In the determination step (SB11), the pattern is determined so that each average obtained by moving-averaging the changing luminance with a width greater than or equal to 5 milliseconds is within a predetermined range.

FIG. 333B is a block diagram of an information communication device according to another aspect of the present disclosure.

An information communication device B10 according to another aspect of the present disclosure is an information communication device that transmits a signal using a change in luminance, and includes structural elements B11 and B12.

In detail, the information communication device B10 includes: a luminance change pattern determination unit B11 that determines a pattern of the change in luminance by modulating the signal to be transmitted; and a light emitter B12 that transmits the signal by changing in luminance according to the determined pattern, and transmits the same signal as the signal by changing in luminance according to the same pattern as the determined pattern within 33 milliseconds from the transmission of the signal. The luminance change pattern determination unit B11 determines the pattern so that each average obtained by moving-averaging the changing luminance with a width greater than or equal to 5 milliseconds is within a predetermined range.

In the information communication method illustrated in FIG. 333A and the information communication device B10 illustrated in FIG. 333B, the pattern of the change in luminance is determined so that each average obtained by moving-averaging the changing luminance with a width greater than or equal to 5 milliseconds is within a predetermined range. As a result, the signal can be transmitted using the change in luminance without humans perceiving flicker. Moreover, the same signal is transmitted within 33 milliseconds, ensuring that, even when the receiver receiving the signal has blanking, the signal is transmitted to the receiver.

FIG. 334A is a flowchart of an information communication method according to yet another aspect of the present disclosure.

An information communication method according to yet another aspect of the present disclosure is an information communication method of transmitting a signal using a change in luminance, and includes steps SC11, SC12, SC13, and SC14.

In detail, the information communication method includes: a determination step (SC11) of determining a plurality of frequencies by modulating the signal to be transmitted; a transmission step (SC12) of transmitting the signal by a light emitter changing in luminance according to a constant frequency out of the determined plurality of frequencies; and a change step (SC14) of changing the frequency used for the change in luminance to an other one of the determined plurality of frequencies in sequence, in a period greater than or equal to 33 milliseconds. After the transmission step SC12, whether or not all of the determined frequencies have been used for the change in frequency may be determined (SC13), where the update step SC14 is performed in the case of determining that all of the frequencies have not been used (SC13: N). In the transmission step (SC12), the light emitter changes in luminance so that each average obtained by moving-averaging the changing luminance with a width greater than or equal to 5 milliseconds is within a predetermined range.

FIG. 334B is a block diagram of an information communication device according to yet another aspect of the present disclosure.

An information communication device C10 according to yet another aspect of the present disclosure is an information communication device that transmits a signal using a change in luminance, and includes structural elements C11, C12, and C13.

In detail, the information communication device C10 includes: a frequency determination unit C11 that determines a plurality of frequencies by modulating the signal to be transmitted; a light emitter C13 that transmits the signal by changing in luminance according to a constant frequency out of the determined plurality of frequencies; and a frequency change unit C12 that changes the frequency used for the change in luminance to an other one of the determined plurality of frequencies in sequence, in a period greater than or equal to 33 milliseconds. The light emitter C13 changes in luminance so that each average obtained by moving-averaging the changing luminance with a width greater than or equal to 5 milliseconds is within a predetermined range.

In the information communication method illustrated in FIG. 334A and the information communication device C10 illustrated in FIG. 334B, the pattern of the change in luminance is determined so that each average obtained by moving-averaging the changing luminance with a width greater than or equal to 5 milliseconds is within a predetermined range. As a result, the signal can be transmitted using the change in luminance without humans perceiving flicker. In addition, a lot of FM modulated signals can be transmitted.

Moreover, an information communication device may include: an information management unit that manages device information which includes an ID unique to the information communication device and state information of a device; a light emitting element; and a light transmission unit that transmits information using a blink pattern of the light emitting element, wherein when an internal state of the device has changed, the light transmission unit converts the device information into the blink pattern of the light emitting element, and transmits the converted device information.

The information communication device may further include an activation history management unit that stores information sensed in the device, the information indicating an activation state of the device or a user usage history, wherein the light transmission unit obtains previously registered performance information of a clock generation device to be utilized, and changes a transmission speed.

The light emitting element may include a first light emitting element and a second light emitting element, the second light emitting element being disposed in vicinity of the first light emitting element for transmitting information by blinking, wherein when information transmission is repeatedly performed a certain number of times by the first light emitting element blinking, the second light emitting element emits light during an interval between an end of the information transmission and a start of the information transmission.

The information communication device may include: an imaging unit that exposes imaging elements with a time difference; and a signal analysis unit that reads, from one captured image, a change in time-average luminance of an imaging object less than or equal to 1 millisecond, using a difference between exposure times of the imaging elements.

The time-average luminance may be time-average luminance greater than or equal to 1/30000 second.

The information communication device may further modulate transmission information to a light emission pattern, and transmit the information using the light emission pattern.

The information communication device may express a transmission signal by a change in time-average luminance less than or equal to 1 millisecond, and change a light emitting unit in luminance to ensure that time-average luminance greater than or equal to 60 milliseconds is uniform.

The information communication device may express the transmission signal by a change in time-average luminance greater than or equal to 1/30000 second.

A part common between the transmission signal and a signal expressed by time-average luminance in a same type of information communication device located nearby may be transmitted by causing the light emitting unit to emit light at a same timing as a light emitting unit of the same type of information communication device.

A part not common between the transmission signal and the signal expressed by time-average luminance in the same type of information communication device located nearby may be expressed by time-average luminance of the light emitting unit during a time slot in which the same type of information communication device does not express the signal by time-average luminance.

The information communication device may include: a first light emitting unit that expresses the transmission signal by a change in time-average luminance; and a second light emitting unit that expresses the transmission signal not by a change in time-average luminance, wherein the signal is transmitted using a position relation between the first light emitting unit and the second light emitting unit.

A centralized control device may include a control unit that performs centralized control on any of the information communication devices described above.

A building may include any of the information communication devices described above or the centralized control device described above.

A train may include any of the information communication devices described above or the centralized control device described above.

An imaging device may be an imaging device that captures a two-dimensional image, wherein the image is captured by exposing only an arbitrary imaging element, at a higher speed than in the case where the image is captured by exposing all imaging elements.

The arbitrary imaging element may be an imaging element that captures an image of a pixel having a maximum change in time-average luminance less than or equal to 1 millisecond, or a line of imaging elements including the imaging element.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. For example, the program causes a computer to execute the information communication method illustrated in any of the flowcharts in FIGS. 331A, 331C, 333A, and 334A.

Summary of Each of the Above Embodiments and Variations

An information communication method according to an aspect of the present disclosure is an information communication method of obtaining information from a subject, the information communication method including: a first imaging step of obtaining a first image by capturing the subject using an image sensor that includes a plurality of exposure lines; a detection step of detecting a range in which the subject is captured, from the first image; a determination step of determining, from among the plurality of exposure lines, predetermined exposure lines for capturing the range in which the subject is captured; an exposure time setting step of setting an exposure time of the image sensor so that, in a second image obtained using the predetermined exposure lines, a bright line corresponding to the predetermined exposure lines appears according to a change in luminance of the subject; a second imaging step of obtaining the second image including the bright line, by capturing the subject that changes in luminance using the predetermined exposure lines with the set exposure time; and an information obtainment step of obtaining the information by demodulating data specified by a pattern of the bright line included in the obtained second image.

In this way, the information transmitted using the change in luminance of the subject is obtained by the exposure of the exposure line in the image sensor. This enables communication between various devices, with no need for, for example, a special communication device for wireless communication. Besides, from among all exposure lines included in the image sensor, only the exposure lines in which the subject is captured are used for obtaining the second image including the bright line, so that the process for the exposure lines in which the subject is not captured can be omitted. This enhances the efficiency of information obtainment, and prevents missing the reception of the information from the subject. Note that the exposure line is a column or a row of a plurality of pixels that are simultaneously exposed in the image sensor, and the bright line is a line included in a captured image illustrated, for instance, in FIG. 2.

For example, the predetermined exposure lines may include only exposure lines for capturing the range in which the subject is captured and not include exposure lines for capturing a range in which the subject is not captured, from among the plurality of exposure lines.

In this way, it is possible to enhance the efficiency of information obtainment more reliably, and prevent missing the reception of the information from the subject.

For example, in the second imaging step, a first imaging time when obtaining the first image may be equally divided by the number of exposure lines included in the predetermined exposure lines to obtain a second imaging time, wherein the second imaging time is set as an imaging time of each exposure line included in the predetermine exposure lines.

In this way, the information can be appropriately obtained from the subject which is a transmitter, for instance as illustrated in FIGS. 328A and 328B.

For example, in the second imaging step, an imaging time of each exposure line in the image sensor in the first imaging step may be set as an imaging time of each exposure line included in the predetermined exposure lines.

In this way, the information can be appropriately obtained from the subject which is a transmitter, for instance as illustrated in FIGS. 329A and 329B.

For example, in the second imaging step, a plurality of second images obtained using the predetermined exposure lines may be combined to form a third image equal in image size to the first image, wherein in the information obtainment step, the information is obtained by demodulating the data specified by the pattern of the bright line included in the third image.

In this way, the information can be appropriately obtained from the subject which is a transmitter, for instance as illustrated in FIGS. 330A and 330B.

For example, in the determination step, exposure lines for capturing a narrower range than the range in which the subject is captured may be determined as the predetermined exposure lines, from among the plurality of exposure lines.

In this way, the information can be appropriately obtained from the subject which is a transmitter without being affected by hand movement and the like, for instance as illustrated in FIGS. 328B, 329B, and 330B.

For example, an imaging mode may be switchable between a first mode in which the subject is captured using all of the plurality of exposure lines in the image sensor and a second mode in which the subject is captured using the predetermined exposure lines from among the plurality of exposure lines in the image sensor.

In this way, the information can be appropriately obtained from the subject which is a transmitter, by switching the imaging mode.

An information communication method according to an aspect of the present disclosure is an information communication method of obtaining information from a subject, the information communication method including: an exposure time setting step of setting an exposure time of an image sensor so that, in an image obtained by capturing the subject by the image sensor, a bright line corresponding to an exposure line included in the image sensor appears according to a change in luminance of the subject; an imaging step of capturing the subject that changes in luminance by the image sensor with the set exposure time, to obtain the image including the bright line; and an information obtainment step of obtaining the information by demodulating data specified by a pattern of the bright line included in the obtained image.

In this way, the information transmitted using the change in luminance of the subject is obtained by the exposure of the exposure line in the image sensor. This enables communication between various devices, with no need for, for example, a special communication device for wireless communication. Note that the exposure line is a column or a row of a plurality of pixels that are simultaneously exposed in the image sensor, and the bright line is a line included in a captured image illustrated, for instance, in FIG. 2.

For example, in the imaging step, a plurality of exposure lines included in the image sensor may be exposed sequentially, each at a different time.

In this way, the bright line generated by capturing the subject in a rolling shutter mode is included in the position corresponding to each exposure line in the image, and therefore a lot of information can be obtained from the subject.

For example, in the information obtainment step, the data specified by a pattern in a direction perpendicular to the exposure line in the pattern of the bright line may be demodulated.

In this way, the information corresponding to the change in luminance can be appropriately obtained.

For example, in the exposure time setting step, the exposure time may be set to less than 10 milliseconds.

In this way, the bright line can be generated in the image more reliably.

For example, in the imaging step, the subject that changes in luminance at a frequency greater than or equal to 200 Hz may be captured.

In this way, a lot of information can be obtained from the subject without humans perceiving flicker, for instance as illustrated in FIGS. 305A and 305B.

For example, in the imaging step, the image including the bright line parallel to the exposure line may be obtained.

In this way, the information corresponding to the change in luminance can be appropriately obtained.

For example, in the information obtainment step, for each area in the obtained image corresponding to a different one of exposure lines included in the image sensor, the data indicating 0 or 1 specified according to whether or not the bright line is present in the area may be demodulated.

In this way, a lot of PPM modulated information can be obtained from the subject. For instance as illustrated in FIG. 2, in the case of obtaining information based on whether or not each exposure line receives at least a predetermined amount of light, information can be obtained at a speed of fl bits per second at the maximum where f is the number of images per second (frame rate) and l is the number of exposure lines constituting one image.

For example, in the information obtainment step, whether or not the bright line is present in the area may be determined according to whether or not a luminance value of the area is greater than or equal to a threshold.

In this way, information can be appropriately obtained from the subject.

For example, in the imaging step, for each predetermined period, the subject that changes in luminance at a constant frequency corresponding to the predetermined period may be captured, wherein in the information obtainment step, the data specified by the pattern of the bright line generated, for each predetermined period, according to the change in luminance at the constant frequency corresponding to the predetermined period is demodulated.

In this way, a lot of FM modulated information can be obtained from the subject. For instance as illustrated in FIG. 111, appropriate information can be obtained using a bright line pattern corresponding to a frequency f1 and a bright line pattern corresponding to a frequency f2.

For example, in the imaging step, the subject that changes in luminance to transmit a signal by adjusting a time from one change to a next change in luminance may be captured, the one change and the next change being the same one of a rise and a fall in luminance, wherein in the information obtainment step, the data specified by the pattern of the bright line is demodulated, the data being a code associated with the time.

In this way, the brightness of the subject (e.g. lighting device) perceived by humans can be adjusted by PWM control without changing the information transmitted from the subject, for instance as illustrated in FIG. 248.

For example, in the imaging step, the subject that changes in luminance so that each average obtained by moving-averaging the changing luminance with a width greater than or equal to 5 milliseconds is within a predetermined range may be captured.

In this way, a lot of information can be obtained from the subject without humans perceiving flicker. For instance as illustrated in FIG. 8, when a modulated signal "0" indicates no light emission and a modulated signal "1" indicates light emission and there is no bias in a transmission signal, each luminance average obtained by moving averaging is about 75% of the luminance at the time of light emission. This can prevent humans from perceiving flicker.

For example, the pattern of the bright line may differ according to the exposure time of the image sensor, wherein in the information obtainment step, the data specified by the pattern corresponding to the set exposure time is demodulated.

In this way, different information can be obtained from the subject according to the exposure time, for instance as illustrated in FIG. 14.

For example, the information communication method may further include detecting a state of an imaging device including the image sensor, wherein in the information obtainment step, the information indicating a position of the subject is obtained, and a position of the imaging device is calculated based on the obtained information and the detected state.

In this way, the position of the imaging device can be accurately specified even in the case where GPS or the like is unavailable or more accurately specified than in the case where GPS or the like is used, for instance as illustrated in FIG. 108.

For example, in the imaging step, the subject that includes a plurality of areas arranged along the exposure line and changes in luminance for each area may be captured.

In this way, a lot of information can be obtained from the subject, for instance as illustrated in FIG. 258.

For example, in the imaging step, the subject that emits a plurality of types of metameric light each at a different time may be captured.

In this way, a lot of information can be obtained from the subject without humans perceiving flicker, for instance as illustrated in FIG. 272.

For example, the information communication method may further include estimating a location where an imaging device including the image sensor is present, wherein in the information obtainment step, identification information of the subject is obtained as the information, and related information associated with the location and the identification information is obtained from a server.

In this way, even in the case where the same identification information is transmitted from a plurality of lighting devices using a luminance change, appropriate related information can be obtained according to the location (building) in which the imaging device is present, i.e. the location (building) in which the lighting device is present, for instance as illustrated in FIGS. 282 and 283.

An information communication method according to an aspect of the present disclosure is an information communication method of transmitting a signal using a change in luminance, the information communication method including: a determination step of determining a pattern of the change in luminance by modulating the signal to be transmitted; a first transmission step of transmitting the signal by a light emitter changing in luminance according to the determined pattern; and a second transmission step of transmitting the same signal as the signal by the light emitter changing in luminance according to the same pattern as the determined pattern within 33 milliseconds from the transmission of the signal, wherein in the determination step, the pattern is determined so that each average obtained by moving-averaging the changing luminance with a width greater than or equal to 5 milliseconds is within a predetermined range.

In this way, the pattern of the change in luminance is determined so that each average obtained by moving-averaging the changing luminance with a width greater than or equal to 5 milliseconds is within a predetermined range. As a result, the signal can be transmitted using the change in luminance without humans perceiving flicker. Moreover, for instance as illustrated in FIG. 301B, the same signal is transmitted within 33 milliseconds, ensuring that, even when the receiver receiving the signal has blanking, the signal is transmitted to the receiver.

For example, in the determination step, the signal may be modulated by a scheme of modulating a signal expressed by 2 bits to a signal expressed by 4 bits made up of 3 bits each indicating a same value and 1 bit indicating a value other than the same value.

In this way, for instance as illustrated in FIG. 8, when a modulated signal “0” indicates no light emission and a modulated signal “1” indicates light emission and there is no bias in a transmission signal, each luminance average obtained by moving averaging is about 75% of the luminance at the time of light emission. This can more reliably prevent humans from perceiving flicker.

For example, in the determination step, the pattern of the change in luminance may be determined by adjusting a time from one change to a next change in luminance according to the signal, the one change and the next change being the same one of a rise and a fall in luminance.

In this way, the brightness of the light emitter (e.g. lighting device) perceived by humans can be adjusted by PWM control without changing the transmission signal, for instance as illustrated in FIG. 248.

For example, in the first transmission step and the second transmission step, the light emitter may change in luminance so that a signal different according to an exposure time of an image sensor that captures the light emitter changing in luminance is obtained by an imaging device including the image sensor.

In this way, different signals can be transmitted to the imaging device according to the exposure time, for instance as illustrated in FIG. 14.

For example, in the first transmission step and the second transmission step, a plurality of light emitters may change in luminance synchronously to transmit common information, wherein after the transmission of the common information, each light emitter changes in luminance individually to transmit information different depending on the light emitter.

In this way, for instance as illustrated in FIG. 21, when the plurality of light emitters simultaneously transmit the common information, the plurality of light emitters can be regarded as one large light emitter. Such a light emitter is captured in a large size by the imaging device receiving the common information, so that information can be transmitted faster from a longer distance. Moreover, for instance as illustrated in FIG. 109A, by the plurality of light emitters transmitting the common information, it is possible to reduce the amount of individual information transmitted from each light emitter.

For example, the information communication method may further include an instruction reception step of receiving an instruction of whether or not to modulate the signal, wherein the determination step, the first transmission step, and the second transmission step are performed in the case where an instruction to modulate the signal is received, and the light emitter emits light or stops emitting light without the determination step, the first transmission step, and the second transmission step being performed in the case where an instruction not to modulate the signal is received.

In this way, whether or not to perform modulation is switched, with it being possible to reduce the noise effect on luminance changes of other light emitters, for instance as illustrated in FIG. 109A.

For example, the light emitter may include a plurality of areas arranged along an exposure line of an image sensor that captures the light emitter, wherein in the first transmission step and the second transmission step, the light emitter changes in luminance for each area.

In this way, a lot of information can be transmitted, for instance as illustrated in FIG. 258.

For example, in the first transmission step and the second transmission step, the light emitter may change in luminance by emitting a plurality of types of metameric light each at a different time.

In this way, a lot of information can be transmitted without humans perceiving flicker, for instance as illustrated in FIG. 272.

For example, in the first transmission step and the second transmission step, identification information of the light emitter may be transmitted as the signal or the same signal.

In this way, the identification information of the light emitter is transmitted, for instance as illustrated in FIG. 282. The imaging device receiving the identification information can obtain more information associated with the identification information from a server or the like via a communication line such as the Internet.

An information communication method according to an aspect of the present disclosure is an information communication method of transmitting a signal using a change in luminance, the information communication method including: a determination step of determining a plurality of frequencies by modulating the signal to be transmitted; a transmission step of transmitting the signal by a light emitter changing in luminance according to a constant frequency out of the determined plurality of frequencies; and a change step of changing the frequency used for the change in luminance to an other one of the determined plurality of frequencies in sequence, in a period greater than or equal to 33 milliseconds, wherein in the transmission step, the light emitter changes in luminance so that each average obtained by moving-averaging the changing luminance with a width greater than or equal to 5 milliseconds is within a predetermined range.

In this way, the pattern of the change in luminance is determined so that each average obtained by moving-averaging the changing luminance with a width greater than or equal to 5 milliseconds is within a predetermined range. As a result, the signal can be transmitted using the change in luminance without humans perceiving flicker. Moreover, a lot of FM modulated signals can be transmitted. For instance as illustrated in FIG. 111, appropriate information can be transmitted by changing the luminance change frequency (f1, f2, etc.) in a period greater than or equal to 33 milliseconds.

Embodiment 14

This embodiment describes each example of application using a receiver such as a smartphone and a transmitter for transmitting information as a blink pattern of an LED, an organic EL device, or the like in Embodiments 1 to 13 described above.

FIG. 335 is a diagram illustrating an example of each mode of a receiver in this embodiment.

In the normal imaging mode, a receiver 8000 performs imaging at a shutter speed of 1/100 second as an example to obtain a normal captured image, and displays the normal captured image on a display. For example, a subject such as a street lighting or a signage as a store sign and its surroundings are clearly shown in the normal captured image.

In the visible light communication mode, the receiver 8000 performs imaging at a shutter speed of 1/10000 second as an example, to obtain a visible light communication image. For example, in the case where the above-mentioned street lighting or signage is transmitting a signal by a luminance change as the transmitter described in any of Embodiments 1 to 13, one or more bright lines (hereafter referred to as "bright line pattern") are shown in the signal transmission part of the visible light communication image, while nothing is shown in the other part. That is, in the visible light communication image, only the bright line pattern is shown and the part of the subject not changing in luminance and the surroundings of the subject are not shown.

In the intermediate mode, the receiver 8000 performs imaging at a shutter speed of 1/3000 second as an example, to obtain an intermediate image. In the intermediate image, the bright line pattern is shown, and the part of the subject not changing in luminance and the surroundings of the subject are shown, too. By the receiver 8000 displaying the intermediate image on the display, the user can find out from where or from which position the signal is being transmitted. Note that the bright line pattern, the subject, and its surroundings shown in the intermediate image are not as clear as the bright line pattern in the visible light communication image and the subject and its surroundings in the normal captured image respectively, but have the level of clarity recognizable by the user.

In the following description, the normal imaging mode or imaging in the normal imaging mode is referred to as "normal imaging", and the visible light communication mode or imaging in the visible light communication mode is referred to as "visible light imaging" (visible light communication). Imaging in the intermediate mode may be used instead of normal imaging and visible light imaging, and the intermediate image may be used instead of the below-mentioned synthetic image.

FIG. 336 is a diagram illustrating an example of imaging operation of a receiver in this embodiment.

The receiver 8000 switches the imaging mode in such a manner as normal imaging, visible light communication, normal imaging, . . . . The receiver 8000 synthesizes the normal captured image and the visible light communication image to generate a synthetic image in which the bright line pattern, the subject, and its surroundings are clearly shown, and displays the synthetic image on the display. The synthetic image is an image generated by superimposing the bright line pattern of the visible light communication image on the signal transmission part of the normal captured image. The bright line pattern, the subject, and its surroundings shown in the synthetic image are clear, and have the level of clarity sufficiently recognizable by the user. Displaying such a synthetic image enables the user to more distinctly find out from which position the signal is being transmitted.

FIG. 337 is a diagram illustrating another example of imaging operation of a receiver in this embodiment.

The receiver 8000 includes a camera Ca1 and a camera Ca2. In the receiver 8000, the camera Ca1 performs normal imaging, and the camera Ca2 performs visible light imaging. Thus, the camera Ca1 obtains the above-mentioned normal captured image, and the camera Ca2 obtains the above-mentioned visible light communication image. The receiver 8000 synthesizes the normal captured image and the visible light communication image to generate the above-mentioned synthetic image, and displays the synthetic image on the display.

FIG. 338A is a diagram illustrating another example of imaging operation of a receiver in this embodiment.

In the receiver 8000 including two cameras, the camera Ca1 switches the imaging mode in such a manner as normal imaging, visible light communication, normal imaging, . . . . Meanwhile, the camera Ca2 continuously performs normal imaging. When normal imaging is being performed by the cameras Ca1 and Ca2 simultaneously, the receiver 8000 estimates the distance (hereafter referred to as "subject distance") from the receiver 8000 to the subject based on the normal captured images obtained by these cameras, through the use of stereoscopy (triangulation principle). By using such estimated subject distance, the receiver 8000 can superimpose the bright line pattern of the visible light communication image on the normal captured image at the appropriate position. The appropriate synthetic image can be generated in this way.

FIG. 338B is a diagram illustrating another example of imaging operation of a receiver in this embodiment.

The receiver 8000 includes three cameras (cameras Ca1, Ca2, and Ca3) as an example. In the receiver 8000, two cameras (cameras Ca2 and Ca3) continuously perform normal imaging, and the remaining camera (camera Ca1) continuously performs visible light communication. Hence, the subject distance can be estimated at any timing, based on the normal captured images obtained by two cameras engaged in normal imaging.

FIG. 338C is a diagram illustrating another example of imaging operation of a receiver in this embodiment.

The receiver 8000 includes three cameras (cameras Ca1, Ca2, and Ca3) as an example. In the receiver 8000, each camera switches the imaging mode in such a manner as normal imaging, visible light communication, normal imaging, . . . . The imaging mode of each camera is switched per period so that, in one period, two cameras perform normal imaging and the remaining camera performs visible light communication. That is, the combination of cameras engaged in normal imaging is changed periodically. Hence, the subject distance can be estimated in any period, based on the normal captured images obtained by two cameras engaged in normal imaging.

FIG. 339A is a diagram illustrating an example of camera arrangement of a receiver in this embodiment.

In the case where the receiver 8000 includes two cameras Ca1 and Ca2, the two cameras Ca1 and Ca2 are positioned away from each other as illustrated in FIG. 339A. The subject distance can be accurately estimated in this way. In other words, the subject distance can be estimated more accurately when the distance between two cameras is longer.

FIG. 339B is a diagram illustrating another example of camera arrangement of a receiver in this embodiment.

In the case where the receiver 8000 includes three cameras Ca1, Ca2, and Ca3, the two cameras Ca1 and Ca2 for normal imaging are positioned away from each other as illustrated in FIG. 339B, and the camera Ca3 for visible light communication is, for example, positioned between the cameras Ca1 and Ca2. The subject distance can be accurately estimated in this way. In other words, the subject distance can be accurately estimated by using two farthest cameras for normal imaging.

FIG. 340 is a diagram illustrating an example of display operation of a receiver in this embodiment.

The receiver 8000 switches the imaging mode in such a manner as visible light communication, normal imaging, visible light communication, . . . , as mentioned above. Upon performing visible light communication first, the receiver 8000 starts an application program. The receiver 8000 then estimates its position based on the signal received by visible light communication, as described in Embodiments 1 to 13. Next, when performing normal imaging, the receiver 8000 displays AR (Augmented Reality) information on the normal captured image obtained by normal imaging. The AR information is obtained based on, for example, the position estimated as mentioned above. The receiver 8000 also estimates the change in movement and direction of the receiver 8000 based on the detection result of the 9-axis sensor, the motion detection in the normal captured image, and the like, and moves the display position of the AR information according to the estimated change in movement and direction. This enables the AR information to follow the subject image in the normal captured image.

When switching the imaging mode from normal imaging to visible light communication, in visible light communication the receiver 8000 superimposes the AR information on the latest normal captured image obtained in immediately previous normal imaging. The receiver 8000 then displays the normal captured image on which the AR information is superimposed. The receiver 8000 also estimates the change in movement and direction of the receiver 8000 based on the detection result of the 9-axis sensor, and moves the AR information and the normal captured image according to the estimated change in movement and direction, in the same way as in normal imaging. This enables the AR information to follow the subject image in the normal captured image according to the movement of the receiver 8000 and the like in visible light communication, as in normal imaging. Moreover, the normal image can be enlarged or reduced according to the movement of the receiver 8000 and the like.

FIG. 341 is a diagram illustrating an example of display operation of a receiver in this embodiment.

For example, the receiver 8000 may display the synthetic image in which the bright line pattern is shown, as illustrated in (a) in FIG. 341. As an alternative, the receiver 8000 may superimpose, instead of the bright line pattern, a signal specification object which is an image having a predetermined color for notifying signal transmission on the normal captured image to generate the synthetic image, and display the synthetic image, as illustrated in (b) in FIG. 341.

As another alternative, the receiver 8000 may display, as the synthetic image, the normal captured image in which the signal transmission part is indicated by a dotted frame and an identifier (e.g. ID: 101, ID: 102, etc.), as illustrated in (c) in FIG. 341. As another alternative, the receiver 8000 may superimpose, instead of the bright line pattern, a signal identification object which is an image having a predetermined color for notifying transmission of a specific type of signal on the normal captured image to generate the synthetic image, and display the synthetic image, as illustrated in (d) in FIG. 341. In this case, the color of the signal identification object differs depending on the type of signal output from the transmitter. For example, a red signal identification object is superimposed in the case where the signal output from the transmitter is position information, and a green signal identification object is superimposed in the case where the signal output from the transmitter is a coupon.

FIG. 342 is a diagram illustrating an example of operation of a receiver in this embodiment.

For example, in the case of receiving the signal by visible light communication, the receiver 8000 may output a sound for notifying the user that the transmitter has been discovered, while displaying the normal captured image. In this case, the receiver 8000 may change the type of output sound, the number of outputs, or the output time depending on the number of discovered transmitters, the type of received signal, the type of information specified by the signal, or the like.

FIG. 343 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, a coupon or a location of a store. The bright line pattern may be the signal specification object, the signal identification object, or the dotted frame illustrated in FIG. 341. The same applies to the below-mentioned bright line pattern.

FIG. 344 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, the current position of the receiver 8000 by a map or the like.

FIG. 345 is a diagram illustrating another example of operation of a receiver in this embodiment.

For example, the receiver 8000 receives signals from two street lightings which are subjects as transmitters. The receiver 8000 estimates the current position of the receiver 8000 based on these signals, as in Embodiments 1 to 13. The receiver 8000 then displays the normal captured image, and also superimposes an information notification image (an image showing latitude, longitude, and the like) indicating the estimation result on the normal captured image. The receiver 8000 may also display an auxiliary information notification image on the normal captured image. For instance, the auxiliary information notification image prompts the user to perform an operation for calibrating the 9-axis sensor (particularly the geomagnetic sensor), i.e. an operation for drift cancellation. As a result of such an operation, the current position can be estimated with high accuracy.

When the user touches the displayed information notification image, the receiver 8000 may display the map showing the estimated position, instead of the normal captured image.

FIG. 346 is a diagram illustrating another example of operation of a receiver in this embodiment.

For example, when the user swipes on the receiver 8000 on which the synthetic image is displayed, the receiver 8000 displays the normal captured image including the dotted frame and the identifier like the normal captured image illustrated in (c) in FIG. 341, and also displays a list of information to follow the swipe operation. The list includes information specified by the signal transmitted from the part (transmitter) identified by each identifier. The swipe may be, for example, an operation of moving the user's finger from outside the display of the receiver 8000 on the right side into the display. The swipe may be an operation of moving the user's finger from the top, bottom, or left side of the display into the display.

When the user taps information included in the list, the receiver 8000 may display an information notification image (e.g. an image showing a coupon) indicating the information in more detail.

FIG. 347 is a diagram illustrating another example of operation of a receiver in this embodiment.

For example, when the user swipes on the receiver 8000 on which the synthetic image is displayed, the receiver 8000 superimposes an information notification image on the synthetic image, to follow the swipe operation. The information notification image indicates the subject distance with an arrow so as to be easily recognizable by the user. The swipe may be, for example, an operation of moving the user's finger from outside the display of the receiver 8000 on the bottom side into the display. The swipe may be an operation of moving the user's finger from the left, top, or right side of the display into the display.

FIG. 348 is a diagram illustrating another example of operation of a receiver in this embodiment.

For example, the receiver 8000 captures, as a subject, a transmitter which is a signage showing a plurality of stores, and displays the normal captured image obtained as a result. When the user taps a signage image of one store included in the subject shown in the normal captured image, the receiver 8000 generates an information notification image based on the signal transmitted from the signage of the store, and displays an information notification image 8001. The information notification image 8001 is, for example, an image showing the availability of the store and the like.

FIG. 349 is a diagram illustrating an example of operation of a receiver, a transmitter, and a server in this embodiment.

A transmitter 8012 as a television transmits a signal to a receiver 8011 by a luminance change. The signal includes information prompting the user to buy content relating to a program being viewed. Having received the signal by visible light communication, the receiver 8011 displays an information notification image prompting the user to buy content, based on the signal. When the user performs an operation for buying the content, the receiver 8011 transmits at least one of information included in a SIM (Subscriber Identity Module) card inserted in the receiver 8011, a user ID, a terminal ID, credit card information, charging information, a password, and a transmitter ID, to a server 8013. The server 8013 manages a user ID and payment information in association with each other, for each user. The server 8013 specifies a user ID based on the information transmitted from the receiver 8011, and checks payment information associated with the user ID. By this check, the server 8013 determines whether or not to permit the user to buy the content. In the case of determining to permit the user to buy the content, the server 8013 transmits permission information to the receiver 8011. Having received the permission information, the receiver 8011 transmits the permission information to the transmitter 8012. Having received the permission information, the transmitter 8012 obtains the content via a network as an example, and reproduces the content.

The transmitter 8012 may transmit information including the ID of the transmitter 8012 to the receiver 8011, by a luminance change. In this case, the receiver 8011 transmits the information to the server 8013. Having obtained the information, the server 8013 can determine that, for example, the television program is being viewed on the transmitter 8012, and conduct television program rating research.

The receiver 8011 may include information of an operation (e.g. voting) performed by the user in the above-mentioned information and transmit the information to the server 8013, to allow the server 8013 to reflect the information on the television program. An audience participation program can be realized in this way. Besides, in the case of receiving a post from the user, the receiver 8011 may include the post in the above-mentioned information and transmit the information to the server 8013, to allow the server 8013 to reflect the post on the television program, a network message board, or the like.

Furthermore, by the transmitter 8012 transmitting the above-mentioned information, the server 8013 can charge for television program viewing by paid broadcasting or on-demand TV. The server 8013 can also cause the receiver 8011 to display an advertisement, or the transmitter 8012 to display detailed information of the displayed television program or an URL of a site showing the detailed information. The server 8013 may also obtain the number of times the advertisement is displayed on the receiver 8011, the price of a product bought from the advertisement, or the like, and charge the advertiser according to the number of times or the price. Such price-based charging is possible even in the case where the user seeing the advertisement does not buy the product immediately. When the server 8013 obtains information indicating the manufacturer of the transmitter 8012 from the transmitter 8012 via the receiver 8011, the server 8013 may provide a service (e.g. payment for selling the product) to the manufacturer indicated by the information.

FIG. 350 is a diagram illustrating another example of operation of a receiver in this embodiment.

For example, the user points a camera of a receiver 8021 at a plurality of transmitters 8020*a* to 8020*d* as lightings. Here, the receiver 8021 is moved so that the transmitters 8020*a* to 8020*d* are sequentially captured as a subject. By performing visible light communication during the movement, the receiver 8021 receives a signal from each of the transmitters 8020*a* to 8020*d*. The signal includes information indicating the position of the transmitter. The receiver 8021 estimates the position of the receiver 8021 using the triangulation principle, based on the positions indicated by the signals received from the transmitters 8020*a* to 8020*d*, the detection result of the 9-axis sensor included in the receiver 8021, and the movement of the captured image. In this case, the drift of the 9-axis sensor (particularly the geomagnetic sensor) is canceled by moving the receiver 8021, so that the position can be estimated with higher accuracy.

FIG. 351 is a diagram illustrating another example of operation of a receiver in this embodiment.

For example, a receiver 8030 is a head-mounted display including a camera. When a start button is pressed, the receiver 8030 starts imaging in the visible light communication mode, i.e. visible light communication. In the case of receiving a signal by visible light communication, the receiver 8030 notifies the user of information corresponding to the received signal. The notification is made, for example, by outputting a sound from a speaker included in the receiver 8030, or by displaying an image. Visible light communication may be started not only when the start button is pressed, but also when the receiver 8030 receives a sound instructing the start or when the receiver 8030 receives a signal instructing the start by wireless communication. Visible light communication may also be started when the change width of the value obtained by a 9-axis sensor included in the receiver 8030 exceeds a predetermined range or when a bright line pattern, even if only slightly, appears in the normal captured image.

FIG. 352 is a diagram illustrating an example of initial setting of a receiver in this embodiment.

The receiver 8030 displays an alignment image 8031 upon initial setting. The alignment image 8031 is used to align the position pointed by the user in the image captured by the camera of the receiver 8030 and the image displayed on the receiver 8030. When the user places his or her fingertip at the position of a circle shown in the alignment image 8031, the receiver associates the position of the fingertip and the position of the circle, and performs alignment. That is, the position pointed by the user is calibrated.

FIG. 353 is a diagram illustrating another example of operation of a receiver in this embodiment.

The receiver 8030 specifies a signal transmission part by visible light communication, and displays a synthetic image 8034 in which a bright line pattern is shown in the part. The user performs an operation such as a tap or a double tap, on the bright line pattern. The receiver 8030 receives the operation, specifies the bright line pattern subjected to the operation, and displays an information notification image 8032 based on a signal transmitted from the part corresponding to the bright line pattern.

FIG. 354 is a diagram illustrating another example of operation of a receiver in this embodiment.

The receiver 8030 displays the synthetic image 8034 in the same way as above. The user performs an operation of moving his or her fingertip so as to encircle the bright line pattern in the synthetic image 8034. The receiver 8030 receives the operation, specifies the bright line pattern subjected to the operation, and displays the information notification image 8032 based on the signal transmitted from the part corresponding to the bright line pattern.

FIG. 355 is a diagram illustrating another example of operation of a receiver in this embodiment.

The receiver 8030 displays the synthetic image 8034 in the same way as above. The user performs an operation of placing his or her fingertip at the bright line pattern in the synthetic image 8034 for a predetermined time or more. The receiver 8030 receives the operation, specifies the bright line pattern subjected to the operation, and displays the information notification image 8032 based on the signal transmitted from the part corresponding to the bright line pattern.

FIG. 356 is a diagram illustrating another example of operation of a receiver in this embodiment.

The receiver 8030 displays the synthetic image 8034 in the same way as above. The user performs an operation of moving his or her fingertip toward the bright line pattern in the synthetic image 8034 by a swipe. The receiver 8030 receives the operation, specifies the bright line pattern subjected to the operation, and displays the information notification image 8032 based on the signal transmitted from the part corresponding to the bright line pattern.

FIG. 357 is a diagram illustrating another example of operation of a receiver in this embodiment.

The receiver 8030 displays the synthetic image 8034 in the same way as above. The user performs an operation of continuously directing his or her gaze to the bright line pattern in the synthetic image 8034 for a predetermined time or more. Alternatively, the user performs an operation of blinking a predetermined number of times while directing his or her gaze to the bright line pattern. The receiver 8030 receives the operation, specifies the bright line pattern subjected to the operation, and displays the information notification image 8032 based on the signal transmitted from the part corresponding to the bright line pattern.

FIG. 358 is a diagram illustrating another example of operation of a receiver in this embodiment.

The receiver 8030 displays the synthetic image 8034 in the same way as above, and also displays an arrow associated with each bright line pattern in the synthetic image 8034. The arrow of each bright line pattern differs in direction. The user performs an operation of moving his or her head along one of the arrows. The receiver 8030 receives the operation based on the detection result of the 9-axis sensor, and specifies the bright line pattern associated with the arrow corresponding to the operation, i.e. the arrow in the direction in which the head is moved. The receiver 8030 displays the information notification image 8032 based on the signal transmitted from the part corresponding to the bright line pattern.

FIG. 359A is a diagram illustrating a pen used to operate a receiver in this embodiment.

A pen 8033 includes a transmitter 8033*a* for transmitting a signal by a luminance change, and buttons 8033*b* and 8033*c*. When the button 8033*b* is pressed, the transmitter 8033*a* transmits a predetermined first signal. When the button 8033*c* is pressed, the transmitter 8033*a* transmits a predetermined second signal different from the first signal.

FIG. 359B is a diagram illustrating operation of a receiver using a pen in this embodiment.

The pen 8033 is used instead of the user's finger mentioned above, like a stylus pen. By selective use of the buttons 8033*b* and 8033*c*, the pen 8033 can be used like a normal pen or an eraser.

FIG. 360 is a diagram illustrating an example of appearance of a receiver in this embodiment.

The receiver 8030 includes a first touch sensor 8030*a* and a second touch sensor 8030*b*. These touch sensors are attached to the frame of the receiver 8030. For example, when the user places his or her fingertip on the first touch sensor 8030*a* and moves the fingertip, the receiver 8030 moves the pointer in the image displayed to the user, according to the movement of the fingertip. When the user touches the second touch sensor 8030*b*, the receiver 8030 selects the object pointed by the pointer in the image displayed to the user.

FIG. 361 is a diagram illustrating another example of appearance of a receiver in this embodiment.

The receiver 8030 includes a touch sensor 8030*c*. The touch sensor 8030*c* is attached to the frame of the receiver 8030. For example, when the user places his or her fingertip on the touch sensor 8030*c* and moves the fingertip, the receiver 8030 moves the pointer in the image displayed to the user, according to the movement of the fingertip. When the user presses the touch sensor 8030*c*, the receiver 8030 selects the object pointed by the pointer in the image displayed to the user. The touch sensor 8030*c* is thus realized as a clickable touch sensor.

FIG. 362 is a diagram illustrating another example of operation of a receiver in this embodiment.

The receiver 8030 displays the synthetic image 8034 in the same way as above, and also displays a pointer 8035 in the synthetic image 8034. In the case where the receiver 8030 includes the first touch sensor 8030*a* and the second touch sensor 8030*b*, the user places his or her fingertip on the first touch sensor 8030*a* and moves the fingertip, to move the pointer to the object as the bright line pattern. The user then touches the second touch sensor 8030*b*, to cause the receiver 8030 to select the bright line pattern. Having selected the bright line pattern, the receiver 8030 displays the information notification image 8032 based on the signal transmitted from the part corresponding to the bright line pattern.

In the case where the receiver 8030 includes the touch sensor 8030*c*, the user places his or her fingertip on the touch sensor 8030*c* and moves the fingertip, to move the pointer to the object as the bright line pattern. The user then presses the touch sensor 8030*c*, to cause the receiver 8030 to select the bright line pattern. Having selected the bright line pattern, the receiver 8030 displays the information notification image 8032 based on the signal transmitted from the part corresponding to the bright line pattern.

FIG. 363A is a diagram illustrating another example of operation of a receiver in this embodiment.

The receiver 8030 displays a gesture confirmation image 8036 based on a signal obtained by visible light communication. The gesture confirmation image 8036 prompts the user to make a predetermined gesture, to provide a service to the user as an example.

FIG. 363B is a diagram illustrating an example of application using a receiver in this embodiment.

A user 8038 carrying the receiver 8030 is in a shop or the like. Here, the receiver 8030 displays the above-mentioned gesture confirmation image 8036 to the user 8038. The user 8038 makes the predetermined gesture according to the gesture confirmation image 8036. A staff 8039 in the shop carries a receiver 8037. The receiver 8037 is a head-mounted display including a camera, and may have the same structure as the receiver 8030. The receiver 8037 displays the gesture confirmation image 8036 based on a signal obtained by visible light communication, too. The staff 8039 determines whether or not the predetermined gesture indicated by the displayed gesture confirmation image 8036 and the gesture made by the user 8038 match. In the case of determining that the predetermined gesture and the gesture made by the user 8038 match, the staff 8039 provides the service associated with the gesture confirmation image 8036, to the user 8038.

FIG. 364A is a diagram illustrating another example of operation of a receiver in this embodiment.

The receiver 8030 displays a gesture confirmation image 8040 based on a signal obtained by visible light communication. The gesture confirmation image 8040 prompts the user to make a predetermined gesture, to permit wireless communication as an example.

FIG. 364B is a diagram illustrating an example of application using a receiver in this embodiment.

The user 8038 carries the receiver 8030. Here, the receiver 8030 displays the above-mentioned gesture confirmation image 8040 to the user 8038. The user 8038 makes the predetermined gesture according to the gesture confirmation image 8040. A person around the user 8038 carries the receiver 8037. The receiver 8037 is a head-mounted display including a camera, and may have the same structure as the receiver 8030. The receiver 8037 captures the predetermined gesture made by the user 8038, to obtain authentication information such as a password included in the gesture. In the case where the receiver 8037 determines that the authentication information matches predetermined information, the receiver 8037 establishes wireless connection with the receiver 8030. Subsequently, the receivers 8030 and 8037 can wirelessly communicate with each other.

FIG. 365A is a diagram illustrating an example of operation of a transmitter in this embodiment.

The transmitter alternately transmits signals 1 and 2, for example in a predetermined period. The transmission of the signal 1 and the transmission of the signal 2 are each carried out by a luminance change such as blinking of visible light. A luminance change pattern for transmitting the signal 1 and a luminance change pattern for transmitting the signal 2 are different from each other.

FIG. 365B is a diagram illustrating another example of operation of a transmitter in this embodiment.

The transmitter may transmit the signals 1 and 2 intermittently with a buffer time, instead of continuously transmitting the signals 1 and 2 as mentioned above. In the buffer time, the transmitter does not change in luminance. Alternatively, in the buffer time, the transmitter may transmit a signal indicating that the transmitter is in the buffer time by a luminance change, or perform a luminance change different from the luminance change for transmitting the signal 1 or the luminance change for transmitting the signal 2. This enables the receiver to appropriately receive the signals 1 and 2 without interference.

FIG. 366 is a diagram illustrating another example of operation of a transmitter in this embodiment.

The transmitter repeatedly transmits a signal sequence made up of a preamble, a block 1, a block 2, a block 3, and a check signal, by a luminance change. The block 1 includes a preamble, an address 1, data 1, and a check signal. The blocks 2 and 3 each have the same structure as the block 1. Specific information is obtained by using data included in the blocks 1, 2, and 3.

In detail, in the above-mentioned signal sequence, one set of data or information is stored in a state of being divided into three blocks. Accordingly, even when a receiver that needs a blanking time for imaging as described in Embodiments 1 to 13 cannot receive all data of the blocks 1, 2, and 3 from one signal sequence, the receiver can receive the remaining data from another signal sequence. As a result, even a receiver that needs a blanking time can appropriately obtain the specific information from at least one signal sequence.

In the above-mentioned signal sequence, a preamble and a check signal are provided for a set of three blocks. Hence, a receiver capable of receiving light without needing a blanking time, such as a receiver including an illuminance sensor, can receive one signal sequence at one time through the use of the preamble and the check signal provided for the set, thus obtaining the specific information in a short time.

FIG. 367 is a diagram illustrating another example of operation of a transmitter in this embodiment.

When repeatedly transmitting the signal sequence including the blocks 1, 2, and 3 as described above, the transmitter may change, for each signal sequence, the order of the blocks included in the signal sequence. For example, the blocks 1, 2, and 3 are included in this order in the first signal sequence, and the blocks 3, 1, and 2 are included in this order in the next signal sequence. A receiver that requires a periodic blanking time can therefore avoid obtaining only the same block.

FIG. 368 is a diagram illustrating an example of communication form between a plurality of transmitters and a receiver in this embodiment.

A receiver 8050 may receive signals (visible light) transmitted from transmitters 8051*a* and 8051*b* as lightings and reflected by a reflection surface. The receiver 8050 can thus receive signals from many transmitters all together. In this case, the transmitters 8051*a* and 8051*b* transmit signals of different frequencies or protocols. As a result, the receiver 8050 can receive the signals from the transmitters without interference.

FIG. 369 is a diagram illustrating an example of operation of a plurality of transmitters in this embodiment.

One of the transmitters 8051*a* and 8051*b* may monitor the signal transmission state of the other transmitter, and transmit a signal to avoid interference with a signal of the other transmitter. For instance, one transmitter receives a signal transmitted from the other transmitter, and transmits a signal of a protocol different from the received signal. Alternatively, one transmitter detects a time period during which no signal is transmitted from the other transmitter, and transmits a signal during the time period.

FIG. 370 is a diagram illustrating another example of communication form between a plurality of transmitters and a receiver in this embodiment.

The transmitters 8051*a* and 8051*b* may transmit signals of the same frequency or protocol. In this case, the receiver 8050 specifies the strength of the signal transmitted from each of the transmitters, i.e. the edge strength of the bright line included in the captured image. The strength is lower when the distance between the receiver 8050 and the transmitter is longer. In the case where the distance between the receiver 8050 and the transmitter 8051*a* and the distance between the receiver 8050 and the transmitter 8051*b* are different from each other, the difference in distance can be exploited in this way. Thus, the receiver 8050 can separately receive the signals transmitted from the transmitters 8051*a* and 8051*b* appropriately, according to the specified strengths.

FIG. 371 is a diagram illustrating another example of operation of a receiver in this embodiment.

The receiver 8050 receives a signal transmitted from the transmitter 8051*a* and reflected by a reflection surface. Here, the receiver 8050 may estimate the position of the transmitter 8051*a*, based on the strength distribution of luminance (the difference in luminance between a plurality of positions) in the captured image.

FIG. 372 is a diagram illustrating an example of application of a receiver in this embodiment.

A receiver 7510*a* such as a smartphone captures a light source 7510*b* by a back camera (out camera) 7510*c* to receive a signal transmitted from the light source 7510*b*, and obtains the position and direction of the light source 7510*b* from the received signal. The receiver 7510*a* estimates the position and direction of the receiver 7510*a*, from the state of the light source 7510*b* in the captured image and the sensor value of the 9-axis sensor included in the receiver 7510*a*. The receiver 7510*a* captures a user 7510*e* by a front camera (face camera, in camera) 7510*f*, and estimates the position and direction of the head and the gaze direction (the position and direction of the eye) of the user 7510*e* by image processing. The receiver 7510*a* changes the behavior (display content or playback sound) according to the gaze direction of the user 7510*e*. the imaging by the back camera 7510*c* and the imaging by the front camera 7510*f* may be performed simultaneously or alternately.

FIG. 373 is a diagram illustrating an example of application of a receiver in this embodiment.

Receivers 7511*d* and 7511*i* such as smartphones respectively receive signals from light sources 7511*b* and 7511*g*, estimate the positions and directions of the receivers 7511*d* and 7511*i*, and estimate the gaze directions of users 7511*e* and 7511*i*, as in the above-mentioned way. The receivers 7511*d* and 7511*i* respectively obtain information of surrounding objects 7511*a* to 7511*c* and 7511*f* to 7511*h* from a server, based on the received data. The receivers 7511*d* and 7511*i* change their display contents as if the users can see the objects on the opposite side through the receivers 7511*d* and 7511*i*. The receivers 7511*d* and 7511*i* display an AR (Augmented Reality) object such as 7511*k*, according to the display contents. When the gaze of the user 7511*j* exceeds the imaging range of the camera, the receiver 7511*i* displays that the range is exceeded, as in 7511*l*. As an alternative, the receiver 7511*i* displays an AR object or other information in the area outside the range. As another alternative, the receiver 7511*i* displays a previously captured image in the area outside the range in a state of being connected to the current image.

FIG. 374 is a diagram illustrating an example of application of a receiver in this embodiment.

A receiver 7512*c* such as a smartphone receives a signal from a light source 7512*a*, estimates the position and direction of the receiver 7512*c*, and estimates the gaze direction of a user 7512*d*, as in the above-mentioned way. The receiver 7512*c* performs a process relating to an object 7512*b* in the gaze direction of the user 7512*d*. For example, the receiver 7512*c* displays information about the object 7512*b* on the screen. When the gaze direction of a user 7512*h* moves from an object 7512*f* to a receiver 7512*g*, the receiver 7512*g* determines that the user 7512*h* is interested in the object 7512*h*, and continues the process relating to the object 7512*h*. For example, the receiver 7512*g* keeps displaying the information of the object 7512*f* on the screen.

FIG. 375 is a diagram illustrating an example of application of a transmitter in this embodiment.

A transmitter 7513*a* such as a lighting is high in luminance. Regardless of whether the luminance is high or low as a transmission signal, the transmitter 7513*a* captured by a receiver exceeds an upper limit of brightness, and as a result no bright line appears as in 7513*b*. Accordingly, a transmitter 7513*c* includes a part 7513*d* such as a diffusion plate or a prism for diffusing or weakening light, to reduce the luminance. As a result, the receiver can capture bright lines as in 7513*e*.

FIG. 376 is a diagram illustrating an example of application of a transmitter in this embodiment.

A transmitter 7514*a* such as a lighting does not have a uniform light source, and so the luminance is not uniform in a captured image 7514*b*, causing a reception error. Accordingly, a transmitter 7514*c* includes a part 7514*d* such as a diffusion plate or a prism for diffusing light, to attain uniform luminance as in 7514*c*. A reception error can be prevented in this way.

FIG. 377 is a diagram illustrating an example of application of a reception method in this embodiment.

Transmitters 7515*a* and 7515*b* are each high in luminance in the center part, so that bright lines appear not in the center part but in the peripheral part in an image captured by a receiver. Since the bright lines are discontinuous, the receiver cannot receive a signal from a part 7515*d*, but can receive a signal from a part 7515*c*. By reading bright lines along a path 7515*e*, the receiver can receive a signal from more bright lines than in the part 7515*c*.

FIG. 378 is a diagram illustrating an example of application of a transmitter in this embodiment.

Transmitters 7516*a*, 7516*b*, 7516*c*, and 7516*d* such as lightings are high in luminance like 7513*a*, and bright lines tend not to appear when captured by a receiver. Accordingly, a diffusion plate/prism 7516*e*, a reflection plate 7516*f*, a reflection plate/half mirror 7516*g*, a reflection plate 7516*h*, or a diffusion plate/prism 7516*j* is included to diffuse light, with it being possible to widen the part where bright lines appear. These transmitters are each captured with bright lines appearing in the periphery, like 7515*a*. Since the receiver estimates the distance between the receiver and the transmitter using the size of the transmitter in the captured image, the part where light is diffused is set as the size of the light source and stored in a server or the like in association with the transmission ID, as a result of which the receiver can accurately estimate the distance to the transmitter.

FIG. 379 is a diagram illustrating an example of application of a transmitter in this embodiment.

A transmitter 7517*a* such as a lighting is high in luminance like 7513*a*, and bright lines tend not to appear when captured by a receiver. Accordingly, a reflection plate 7517*b* is included to diffuse light, with it being possible to widen the part where bright lines appear.

FIG. 380 is a diagram illustrating an example of application of a transmitter in this embodiment.

A transmitter 7518*a* reflects light from a light source by a reflection plate 7518*c*, as a result of which a receiver can capture bright lines in a wide range. A transmitter 7518*d* directs a light source toward a diffusion plate or prism 7518*e*, as a result of which a receiver can capture bright lines in a wide range.

FIG. 381 is a diagram illustrating another example of operation of a receiver in this embodiment.

A receiver displays a bright line pattern using the above-mentioned synthetic image, intermediate image, or the like. Here, the receiver may be incapable of receiving a signal from a transmitter corresponding to the bright line pattern. When the user performs an operation (e.g. a tap) on the bright line pattern to select the bright line pattern, the receiver displays the synthetic image or intermediate image in which the bright line pattern is enlarged by optical zoom. Through such optical zoom, the receiver can appropriately receive the signal from the transmitter corresponding to the bright line pattern. That is, even when the captured image is too small to obtain the signal, the signal can be appropriately received by performing optical zoom. In the case where the displayed image is large enough to obtain the signal, too, faster reception is possible by optical zoom.

Summary of this Embodiment

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; displaying, based on the bright line image, a display image in which the subject and surroundings of the subject are shown, in a form that enables identification of a spatial position of a part where the bright line appears; and obtaining transmission information by demodulating data specified by a pattern of the bright line included in the obtained bright line image.

In this way, a synthetic image or an intermediate image illustrated in, for instance, FIGS. 335 to 337 and 341 is displayed as the display image. In the display image in which the subject and the surroundings of the subject are shown, the spatial position of the part where the bright line appears is identified by a bright line pattern, a signal specification object, a signal identification object, a dotted frame, or the like. By looking at such a display image, the user can easily find the subject that is transmitting the signal through the change in luminance.

For example, the information communication method may further include: setting a longer exposure time than the exposure time; obtaining a normal captured image by capturing the subject and the surroundings of the subject by the image sensor with the longer exposure time; and generating a synthetic image by specifying, based on the bright line image, the part where the bright line appears in the normal captured image, and superimposing a signal object on the normal captured image, the signal object being an image indicating the part, wherein in the displaying, the synthetic image is displayed as the display image.

In this way, the signal object is, for example, a bright line pattern, a signal specification object, a signal identification object, a dotted frame, or the like, and the synthetic image is displayed as the display image as illustrated in FIGS. 336, 337, and 341. Hence, the user can more easily find the subject that is transmitting the signal through the change in luminance.

For example, in the setting of an exposure time, the exposure time may be set to 1/3000 second, in the obtaining of a bright line image, the bright line image in which the surroundings of the subject are shown may be obtained, and in the displaying, the bright line image may be displayed as the display image.

In this way, the bright line image is obtained and displayed as an intermediate image, for instance as illustrated in FIG. 335. This eliminates the need for a process of obtaining a normal captured image and a visible light communication image and synthesizing them, thus contributing to a simpler process.

For example, the image sensor may include a first image sensor and a second image sensor, in the obtaining of the normal captured image, the normal captured image may be obtained by image capture by the first image sensor, and in the obtaining of a bright line image, the bright line image may be obtained by image capture by the second image sensor simultaneously with the first image sensor.

In this way, the normal captured image and the visible light communication image which is the bright line image are obtained by the respective cameras, for instance as illustrated in FIG. 337. As compared with the case of obtaining the normal captured image and the visible light communication image by one camera, the images can be obtained promptly, contributing to a faster process.

For example, the information communication method may further include presenting, in the case where the part where the bright line appears is designated in the display image by an operation by a user, presentation information based on the transmission information obtained from the pattern of the bright line in the designated part. Examples of the operation by the user include: a tap; a swipe; an operation of continuously placing the user's fingertip on the part for a predetermined time or more; an operation of continuously directing the user's gaze to the part for a predetermined time or more; an operation of moving a part of the user's body according to an arrow displayed in association with the part; an operation of placing a pen tip that changes in luminance on the part; and an operation of pointing to the part with a pointer displayed in the display image by touching a touch sensor.

In this way, the presentation information is displayed as an information notification image, for instance as illustrated in FIGS. 343 to 348 and 353 to 362. Desired information can thus be presented to the user.

For example, the image sensor may be included in a head-mounted display, and in the displaying, the display image may be displayed by a projector included in the head-mounted display.

In this way, the information can be easily presented to the user, for instance as illustrated in FIGS. 351 to 358.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image including a plurality of parts where the bright line appears is obtained by capturing a plurality of subjects in a period during which the image sensor is being moved, and in the obtaining of the information, a position of each of the plurality of subjects is obtained by demodulating, for each of the plurality of parts, the data specified by the pattern of the bright line in the part, and the information communication method may further include estimating a position of the image sensor, based on the obtained position of each of the plurality of subjects and a moving state of the image sensor.

In this way, the position of the receiver including the image sensor can be accurately estimated based on the changes in luminance of the plurality of subjects such as lightings, for instance as illustrated in FIG. 350.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; obtaining the information by demodulating data specified by a pattern of the bright line included in the obtained bright line image; and presenting the obtained information, wherein in the presenting, an image prompting to make a predetermined gesture is presented to a user of the image sensor as the information.

In this way, user authentication and the like can be conducted according to whether or not the user makes the gesture as prompted, for instance as illustrated in FIGS. 363A to 364B. This enhances convenience.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing a plurality of subjects reflected on a reflection surface, and in the obtaining of the information, the information is obtained by separating a bright line corresponding to each of the plurality of subjects from bright lines included in the bright line image according to a strength of the bright line and demodulating, for each of the plurality of subjects, the data specified by the pattern of the bright line corresponding to the subject.

In this way, even in the case where the plurality of subjects such as lightings each change in luminance, appropriate information can be obtained from each subject, for instance as illustrated in FIG. 370.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing the subject reflected on a reflection surface, and the information communication method may further include estimating a position of the subject based on a luminance distribution in the bright line image.

In this way, the appropriate position of the subject can be estimated based on the luminance distribution, for instance as illustrated in FIG. 371.

For example, an information communication method of transmitting a signal using a change in luminance may include: determining a first pattern of the change in luminance, by modulating a first signal to be transmitted; determining a second pattern of the change in luminance, by modulating a second signal to be transmitted; and transmitting the first signal and the second signal by a light emitter alternately changing in luminance according to the determined first pattern and changing in luminance according to the determined second pattern.

In this way, the first signal and the second signal can each be transmitted without a delay, for instance as illustrated in FIG. 365A.

For example, in the transmitting, a buffer time may be provided when switching the change in luminance between the change in luminance according to the first pattern and the change in luminance according to the second pattern.

In this way, interference between the first signal and the second signal can be suppressed, for instance as illustrated in FIG. 365B.

For example, an information communication method of transmitting a signal using a change in luminance may include: determining a pattern of the change in luminance by modulating the signal to be transmitted; and transmitting the signal by a light emitter changing in luminance according to the determined pattern, wherein the signal is made up of a plurality of main blocks, each of the plurality of main blocks includes first data, a preamble for the first data, and a check signal for the first data, the first data is made up of a plurality of sub-blocks, and each of the plurality of sub-blocks includes second data, a preamble for the second data, and a check signal for the second data.

In this way, data can be appropriately obtained regardless of whether or not the receiver needs a blanking time, for instance as illustrated in FIG. 366.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, the signal of a different frequency or protocol is transmitted.

In this way, interference between signals from the plurality of transmitters can be suppressed, for instance as illustrated in FIG. 368.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, one of the plurality of transmitters receives a signal transmitted from an other one of the plurality of transmitters, and transmits an other signal in a form that does not interfere with the received signal.

In this way, interference between signals from the plurality of transmitters can be suppressed, for instance as illustrated in FIG. 369.

Embodiment 15

This embodiment describes each example of application using a receiver such as a smartphone and a transmitter for transmitting information as a blink pattern of an LED, an organic EL device, or the like in Embodiments 1 to 14 described above.

FIG. 382 is a flowchart illustrating an example of operation of a receiver in Embodiment 15.

First, a receiver receives a signal by an illuminance sensor (Step 8101). Next, the receiver obtains information such as position information from a server, based on the received signal (Step 8102). The receiver then activates an image sensor capable of capturing the light reception direction of the illuminance sensor (Step 8103). The receiver receives all or part of a signal by the image sensor, and determines whether or not all or part of the signal is the same as the signal received by the illuminance sensor (Step 8104). Following this, the receiver estimates the position of the receiver, from the position of the transmitter in the captured image, information from a 9-axis sensor included in the receiver, and the position information of the transmitter (Step 8105). Thus, the receiver activates the illuminance sensor of low power consumption and, in the case where the signal is received by the illuminance sensor, activates the image sensor. The receiver then performs position estimation using image capture by the image sensor. In this way, the position of the receiver can be accurately estimated while saving power.

FIG. 383 is a flowchart illustrating another example of operation of a receiver in Embodiment 15.

A receiver recognizes a periodic change of luminance from the sensor value of an illuminance sensor (Step 8111). The receiver then activates an image sensor capable of capturing the light reception direction of the illuminance sensor, and receives a signal (Step 8112). Thus, the receiver activates the illuminance sensor of low power consumption and, in the case where the periodic change of luminance is received by the illuminance sensor, activates the image sensor, in the same way as above. The receiver then receives the accurate signal using image capture by the image sensor. In this way, the accurate signal can be received while saving power.

FIG. 384A is a block diagram illustrating an example of a transmitter in Embodiment 15.

A transmitter 8115 includes a power supply unit 8115*a*, a signal control unit 8115*b*, a light emitting unit 8115*c*, and a light emitting unit 8115*d*. The power supply unit 8115*a* supplies power to the signal control unit 8115*b*. The signal control unit 8115*b* divides the power supplied from the power supply unit 8115*a* into the light emitting units 8115*c* and 8115*d*, and controls the luminance changes of the light emitting units 8115*c* and 8115*d*.

FIG. 384B is a block diagram illustrating another example of a transmitter in Embodiment 15.

A transmitter 8116 includes a power supply unit 8116*a*, a signal control unit 8116*b*, a light emitting unit 8116*c*, and a light emitting unit 8116*d*. The power supply unit 8116*a* supplies power to the light emitting units 8116*c* and 8116*d*. The signal control unit 8116*b* controls the power supplied from the power supply unit 8116*a*, thereby controlling the luminance changes of the light emitting units 8116*c* and 8116*d*. The power use efficiency can be enhanced by the signal control unit 8116*b* controlling the power supply unit 8116*a* that supplies power to each of the light emitting units 8116*c* and 8116*d*.

FIG. 385 is a diagram illustrating an example of a structure of a system including a plurality of transmitters in Embodiment 15.

The system includes a centralized control unit 8118, a transmitter 8117, and a transmitter 8120. The centralized control unit 8118 controls signal transmission by a change in luminance of each of the transmitters 8117 and 8120. For example, the centralized control unit 8118 causes the transmitters 8117 and 8120 to transmit the same signal at the same time, or causes one of the transmitters to transmit a signal unique to the transmitter.

The transmitter 8120 includes two transmission units 8121 and 8122, a signal change unit 8123, a signal storage unit 8124, a synchronous signal input unit 8125, a synchronous control unit 8126, and a light receiving unit 8127.

The two transmission units 8121 and 8122 each have the same structure as the transmitter 8115 illustrated in FIG. 384A, and transmits a signal by changing in luminance. In detail, the transmission unit 8121 includes a power supply unit 8121*a*, a signal control unit 8121*b*, a light emitting unit 8121*c*, and a light emitting unit 8121*d*. The transmission unit 8122 includes a power supply unit 8122*a*, a signal control unit 8122*b*, a light emitting unit 8122*c*, and a light emitting unit 8122*d*.

The signal change unit 8123 modulates a signal to be transmitted, to a signal indicating a luminance change pattern. The signal storage unit 8124 stores the signal indicating the luminance change pattern. The signal control unit 8121*b* in the transmission unit 121 reads the signal stored in the signal storage unit 8124, and causes the light emitting units 8121*c* and 8121*d* to change in luminance according to the signal.

The synchronous signal input unit 8125 obtains a synchronous signal according to control by the centralized control unit 8118. The synchronous control unit 8126 synchronizes the luminance changes of the transmission units 8121 and 8122, when the synchronous signal is obtained. That is, the synchronous control unit 8126 controls the signal control units 8121*b* and 8122*b*, to synchronize the luminance changes of the transmission units 8121 and 8122. Here, the light receiving unit 8127 detects light emission from the transmission units 8121 and 8122. The synchronous control unit 8126 feedback-controls the signal control units 8121*b* and 8122*b*, according to the light detected by the light receiving unit 8127.

FIG. 386 is a block diagram illustrating another example of a transmitter in Embodiment 15.

A transmitter 8130 includes a transmission unit 8131 that transmits a signal by changing in luminance, and a non-transmission unit 8132 that emits light without transmitting a signal.

The transmission unit 8131 has the same structure as the transmitter 8115 illustrated in FIG. 384A, and includes a power supply unit 8131*a*, a signal control unit 8131*b*, and light emitting units 8131*c* to 8131*f*. The non-transmission unit 8132 includes a power supply unit 8132*a* and light emitting units 8132*c* to 8132*f*, but does not include a signal control unit. In other words, in the case where there are a plurality of units each including a power supply and luminance change synchronous control cannot be performed between the plurality of units, a signal control unit is provided in only one of the plurality of units to cause the unit to change in luminance, as in the structure illustrated in FIG. 386.

In the transmitter 8130, the light emitting units 8131*c* to 8131*f* in the transmission unit 8131 are continuously arranged in a line. That is, none of the light emitting units 8132*c* to 8132*f* in the non-transmission unit 8132 is mixed in the set of the light emitting units 8131*c* to 8131*f*. This makes the light emitter that changes in luminance larger in size, so that the receiver can easily receive the signal transmitted using the change in luminance.

FIG. 387A is a diagram illustrating an example of a transmitter in Embodiment 15.

A transmitter 8134 such as a signage includes three light emitting units (light emitting areas) 8134*a* to 8134*c*. Light from these light emitting units 8134*a* to 8134*c* do not interfere with each other. In the case where only one of the light emitting units 8134*a* to 8134*c* can be changed in luminance to transmit a signal, it is desirable to change in luminance the light emitting unit 8134*b* at the center, as illustrated in (a) in FIG. 387A. In the case where two of the light emitting units 8134*a* to 8134*c* can be changed in luminance, it is desirable to change in luminance the light emitting unit 8134*b* at the center and the light emitting unit 8134*a* or 8134*c* at either edge, as illustrated in (b) in FIG. 387A. Changing in luminance the light emitting units at such positions enables the receiver to appropriately receive the signal transmitted using the change in luminance.

FIG. 387B is a diagram illustrating an example of a transmitter in Embodiment 15.

A transmitter 8135 such as a signage includes three light emitting units 8135*a* to 8135*c*. Light from adjacent light emitting units of these light emitting units 8135*a* to 8135*c* interferes with each other. In the case where only one of the light emitting units 8135*a* to 8135*c* can be changed in luminance to transmit a signal, it is desirable to change in luminance the light emitting unit 8135*a* or 8135*c* at either edge, as illustrated in (a) in FIG. 387B. This prevents light from another light emitting unit from interfering with the luminance change for signal transmission. In the case where two of the light emitting units 8135*a* to 8135*c* can be changed in luminance, it is desirable to change in luminance the light emitting unit 8135*b* at the center and the light emitting unit 8135*a* or 8135*c* at either edge, as illustrated in (b) in FIG. 387B. Changing in luminance the light emitting units at such positions contributes to a larger luminance change area, and so enables the receiver to appropriately receive the signal transmitted using the change in luminance.

FIG. 387C is a diagram illustrating an example of a transmitter in Embodiment 15.

In the case where two of the light emitting units 8134*a* to 8134*c* can be changed in luminance in the transmitter 8134, the light emitting units 8134*a* and 8134*c* at both edges may be changed in luminance, as illustrated in FIG. 378C. In this case, the imaging range in which the luminance change part is shown can be widened in the image capture by the receiver.

FIG. 388A is a diagram illustrating an example of a transmitter in Embodiment 15.

A transmitter 8137 such as a signage transmits a signal by a character part "A Shop" and a light emitting unit 8137*a* changing in luminance. For example, the light emitting unit 8137*a* is formed like a horizontally long rectangle, and uniformly changes in luminance. The uniform change in luminance of the light emitting unit 8137*a* enables the receiver to appropriately receive the signal transmitted using the change in luminance.

FIG. 388B is a diagram illustrating an example of a transmitter in Embodiment 15.

A transmitter 8138 such as a signage transmits a signal by a character part "A Shop" and a light emitting unit 8138*a* changing in luminance. For example, the light emitting unit 8138*a* is formed like a frame along the edges of the signage, and uniformly changes in luminance. That is, the light emitting unit 8138*a* is formed so that, when the light emitting unit is projected onto an arbitrary straight line, the length of the continuous projection part is at the maximum. The uniform change in luminance of the light emitting unit 8138*a* enables the receiver to more appropriately receive the signal transmitted using the change in luminance.

FIG. 389 is a diagram illustrating an example of processing operation of a receiver, a transmitter, and a server in Embodiment 15.

A receiver 8142 such as a smartphone obtains position information indicating the position of the receiver 8142, and transmits the position information to a server 8141. For example, the receiver 8142 obtains the position information when using a GPS or the like or receiving another signal. The server 8141 transmits an ID list associated with the position indicated by the position information, to the receiver 8142. The ID list includes each ID such as "abcd" and information associated with the ID.

The receiver 8142 receives a signal from a transmitter 8143 such as a lighting device. Here, the receiver 8142 may be able to receive only a part (e.g. "b") of an ID as the above-mentioned signal. In such a case, the receiver 8142 searches the ID list for the ID including the part. In the case where the unique ID is not found, the receiver 8142 further receives a signal including another part of the ID, from the transmitter 8143. The receiver 8142 thus obtains a larger part (e.g. "bc") of the ID. The receiver 8142 again searches the ID list for the ID including the part (e.g. "bc"). Through such search, the receiver 8142 can specify the whole ID even in the case where the ID can be obtained only partially. Note that, when receiving the signal from the transmitter 8143, the receiver 8142 receives not only the part of the ID but also a check portion such as a CRC (Cyclic Redundancy Check).

FIG. 390 is a diagram illustrating an example of processing operation of a receiver, a transmitter, and a server in Embodiment 15.

A receiver 8152 such as a smartphone obtains position information indicating the position of the receiver 8152. For example, the receiver 8152 obtains the position information when using a GPS or the like or receiving another signal. The receiver 8152 also receives a signal from a transmitter 8153 such as a lighting device. The signal includes only a part (e.g. "b") of an ID. The receiver 8152 transmits the position information and the part of the ID to a server 8151.

The server 8151 searches an ID list associated with the position indicated by the position information, for the ID including the part. In the case where the unique ID is not found, the server 8151 notifies the receiver 8152 that the specification of the ID has failed.

Following this, the receiver 8152 receives a signal including another part of the ID, from the transmitter 8153. The receiver 8152 thus obtains a large part (e.g. "be") of the ID. The receiver 8152 transmits the part (e.g. "be") of the ID and the position information to the server 8151.

The server 8151 searches the ID list associated with the position indicated by the position information, for the ID including the part. When the unique ID is found, the server 8151 notifies the receiver 8152 that the ID (e.g. "abef") has been specified, and transmits information associated with the ID to the receiver 8152.

FIG. 391 is a diagram illustrating an example of processing operation of a receiver, a transmitter, and a server in Embodiment 15.

The receiver 8152 may transmit not the part of the ID but the whole ID to the server 8151, together with the position information. In the case where the complete ID (e.g. "wxyz") is not included in the ID list, the server 8151 notifies the receiver 8152 of an error.

FIG. 392A is a diagram for describing synchronization between a plurality of transmitters in Embodiment 15.

Transmitters 8155*a* and 8155*b* transmit a signal by changing in luminance. Here, the transmitter 8155*a* transmits a synchronous signal to the transmitter 8155*b*, thereby changing in luminance synchronously with the transmitter 8155*b*. Further, the transmitters 8155*a* and 8155*b* each obtain a signal from a source, and change in luminance according to the signal. There is a possibility that the time (first delay time) taken for the signal transmission from the source to the transmitter 8155*a* and the time (second delay time) taken for the signal transmission from the source to the transmitter 8155*b* are different. In view of this, the signal round-trip time between each of the transmitters 8155*a* and 8155*b* and the source is measured, and ½ of the round-trip time is specified as the first or second delay time. The transmitter 8155*a* transmits the synchronous signal so as to cancel out the difference between the first and second delay times, thereby changing in luminance synchronously with the transmitter 8155*b*.

FIG. 392B is a diagram for describing synchronization between a plurality of transmitters in Embodiment 15.

A light receiving sensor 8156 detects light from the transmitters 8155*a* and 8155*b*, and outputs the result to the transmitters 8155*a* and 8155*b* as a detection signal. Having received the detection signal from the light receiving sensor 8156, the transmitters 8155*a* and 8155*b* change in luminance synchronously or adjust the signal strength based on the detection signal.

FIG. 393 is a diagram illustrating an example of operation of a transmitter and a receiver in Embodiment 15.

A transmitter 8165 such as a television obtains an image and an ID (ID 1000) associated with the image, from a control unit 8166. The transmitter 8165 displays the image, and also transmits the ID (ID 1000) to a receiver 8167 by changing in luminance. The receiver 8167 captures the transmitter 8165 to receive the ID (ID 1000), and displays information associated with the ID (ID 1000). The control unit 8166 then changes the image output to the transmitter 8165, to another image. The control unit 8166 also changes the ID output to the transmitter 8165. That is, the control unit 8166 outputs the other image and the other ID (ID 1001) associated with the other image, to the transmitter 8165. The transmitter 8165 displays the other image, and transmits the other ID (ID 1001) to the receiver 8167 by changing in luminance. The receiver 8167 captures the transmitter 8165 to receive the other ID (ID 1001), and displays information associated with the other ID (ID 1001).

FIG. 394 is a diagram illustrating an example of operation of a transmitter and a receiver in Embodiment 15.

A transmitter 8170 such as a signage displays images by switching between them. When displaying an image, the transmitter 8170 transmits, to a receiver 8171, ID time information indicating the ID corresponding to the displayed image and the time at which the image is displayed, by changing in luminance. For example, at time t1, the transmitter 8170 displays an image showing a circle, and transmits ID time information indicating the ID (ID: 1000) corresponding to the image and the time (TIME: t1) at which the image is displayed.

Here, the transmitter 8170 transmits not only the ID time information corresponding to the currently displayed image but also ID time information corresponding to at least one previously displayed image. For example, at time t2, the transmitter 8170 displays an image showing a square, and transmits ID time information indicating the ID (ID: 1001) corresponding to the image and the time (TIME: t2) at which the image is displayed. At this time, the transmitter 8170 also transmits the ID time information indicating the ID (ID: 1000) corresponding to the image showing the circle and the time (TIME: t1) at which the image is displayed. Likewise, at time t3, the transmitter 8170 displays an image showing a triangle, and transmits ID time information indicating the ID (ID: 1002) corresponding to the image and the time (TIME: t3) at which the image is displayed. At this time, the transmitter 8170 also transmits the ID time information indicating the ID (ID: 1001) corresponding to the image showing the square and the time (TIME: t2) at which the image is displayed. Thus, the transmitter 8170 transmits a plurality of sets of ID time information at the same time.

Suppose, to obtain information related to the image showing the square, the user points an image sensor of the receiver

8171 at the transmitter 8170 and starts image capture by the receiver 8171, at the time t2 at which the image showing the square is displayed.

Even when the receiver 8171 starts capturing at time t2, the receiver 8171 may not be able to obtain the ID time information corresponding to the image showing the square while the image is displayed on the transmitter 8170. Even in such a case, since the ID time information corresponding to the previously displayed image is also transmitted from the transmitter 8170 as mentioned above, at time t3 the receiver 8171 can obtain not only the ID time information (ID: 1002, TIME: t3) corresponding to the image showing the triangle but also the ID time information (ID: 1001, TIME: t2) corresponding to the image showing the square. The receiver 8171 selects, from these ID time information, the ID time information (ID: 1001, TIME: t2) indicating the time (t2) at which the receiver 8171 is pointed at the transmitter 8170, and specifies the ID (ID: 1001) indicated by the ID time information. As a result, at time t3, the receiver 8171 can obtain, from a server or the like, information related to the image showing the square based on the specified ID (ID: 1001).

The above-mentioned time is not limited to an absolute time, and may be a time (relative time) between the time at which the receiver 8171 is pointed at the transmitter 8170 and the time at which the receiver 8171 receives the ID time information. Moreover, though the transmitter 8170 transmits the ID time information corresponding to the previously displayed image together with the ID time information corresponding to the currently displayed image, the transmitter 8170 may transmit ID time information corresponding to an image to be displayed in the future. Furthermore, in a situation where the reception by the receiver 8171 is difficult, the transmitter 8170 may transmit more sets of previous or future ID time information.

In the case where the transmitter 8170 is not a signage but a television, the transmitter 8170 may transmit information indicating a channel corresponding to a displayed image, instead of ID time information. In detail, in the case where an image of a television program being broadcasted is displayed on the transmitter 8170 in real time, the display time of the image displayed on the transmitter 8170 can be uniquely specified for each channel. Accordingly, the receiver 8171 can specify the time at which the receiver 8171 is pointed at the transmitter 8170, i.e. the time at which the receiver 8171 starts capturing, based on the captured image and the channel. The receiver 8171 can then obtain, from a server or the like, information related to the captured image based on the channel and the time. Here, the transmitter 8170 may transmit information indicating the display time of the displayed image, instead of ID time information. In such a case, the receiver 8171 searches all television programs being broadcasted, for a television program including the captured image. The receiver 8171 can then obtain, from a server or the like, information related to the image based on the channel and display time of the television program.

FIG. 395 is a diagram illustrating an example of operation of a transmitter, a receiver, and a server in Embodiment 15.

As illustrated in (a) in FIG. 395, a receiver 8176 captures a transmitter 8175 to obtain an image including a bright line, and specifies (obtains) the ID of the transmitter 8175 from the image. The receiver 8176 transmits the ID to a server 8177, and obtains information associated with the ID from the server 8177.

FIG. 396 is a diagram illustrating an example of operation of a transmitter and a receiver in Embodiment 15.

When the user is located at position A, a receiver 8183 specifies the position of the receiver 8183, by obtaining a signal transmitted from a transmitter 8181 that changes in luminance. The receiver 8183 displays a point 8183*b* indicating the specified position, together with an error range 8183*a* of the position.

Next, when the user moves from position A to position B, the receiver 8183 cannot obtain a signal from the transmitter 8181. The receiver 8183 accordingly estimates the position of the receiver 8183, using a 9-axis sensor and the like included in the receiver 8183. The receiver 8183 displays the point 8183*b* indicating the estimated position, together with the error range 8183*a* of the position. Since this position is estimated by the 9-axis sensor, a larger error range 8183*a* is displayed.

Next, when the user moves from position B to position C, the receiver 8183 specifies the position of the receiver 8183, by obtaining a signal transmitted from another transmitter 8182 that changes in luminance. The receiver 8183 displays the point 8183*b* indicating the specified position, together with the error range 8183*a* of the position. Here, the receiver 8183 does not instantly switch the display from the point 8183*b* indicating the position estimated using the 9-axis sensor and its error range 8183*a* to the position specified as mentioned above and its error range, but smoothly switches the display with movement. The error range 8183*a* becomes smaller as a result.

FIG. 397 is a diagram illustrating an example of an appearance of a receiver in Embodiment 15.

The receiver 8183 such as a smartphone (advanced mobile phone) includes an image sensor 8183*c*, an illuminance sensor 8183*d*, and a display 8183*e* on its front surface, as illustrated in (a) in FIG. 397. The image sensor 8183*c* obtains an image including a bright line by capturing a subject that changes in luminance as mentioned above. The illuminance sensor 8183*d* detects the change in luminance of the subject. Hence, the illuminance sensor 8183*d* can be used in place of the image sensor 8183*c*, depending on the state or situation of the subject. The display 8183*e* displays an image and the like. The receiver 8183 may also have a function as a subject that changes in luminance. In this case, the receiver 8183 transmits a signal by causing the display 8183*e* to change in luminance.

The receiver 8183 also includes an image sensor 8183*f*, an illuminance sensor 8183*g*, and a flash light emitting unit 8183*h* on its back surface, as illustrated in (b) in FIG. 397. The image sensor 8183*f* is the same as the above-mentioned image sensor 8183*c*, and obtains an image including a bright line by capturing a subject that changes in luminance as mentioned above. The illuminance sensor 8183*g* is the same as the above-mentioned illuminance sensor 8183*d*, and detects the change in luminance of the subject. Hence, the illuminance sensor 8183*g* can be used in place of the image sensor 8183*f*, depending on the state or situation of the subject. The flash light emitting unit 8183*h* emits flash for imaging. The receiver 8183 may also have a function as a subject that changes in luminance. In this case, the receiver 8183 transmits a signal by causing the flash light emitting unit 8183*h* to change in luminance.

FIG. 398 is a diagram illustrating an example of operation of a transmitter, a receiver, and a server in Embodiment 15.

A transmitter 8185 such as a smartphone transmits information indicating "Coupon 100 yen off" as an example, by causing a part of a display 8185*a* except a barcode part 8185*b* to change in luminance, i.e. by visible light communication. The transmitter 8185 also causes the barcode part 8185*b* to display a barcode without changing in luminance. The barcode indicates the same information as the above-mentioned information transmitted by visible light communication. The transmitter 8185 further causes the part of the display 8185*a* except the barcode part 8185*b* to display the characters or pictures, e.g. the characters "Coupon 100 yen off", indicating the information transmitted by visible light communication. Displaying such characters or pictures allows the user of the transmitter 8185 to easily recognize what kind of information is being transmitted.

A receiver 8186 performs image capture to obtain the information transmitted by visible light communication and the information indicated by the barcode, and transmits these information to a server 8187. The server 8187 determines whether or not these information match or relate to each other. In the case of determining that these information match or relate to each other, the server 8187 executes a process according to these information. Alternatively, the server 8187 transmits the determination result to the receiver 8186 so that the receiver 8186 executes the process according to these information.

The transmitter 8185 may transmit a part of the information indicated by the barcode, by visible light communication. Moreover, the URL of the server 8187 may be indicated in the barcode. Furthermore, the transmitter 8185 may obtain an ID as a receiver, and transmit the ID to the server 8187 to thereby obtain information associated with the ID. The information associated with the ID is the same as the information transmitted by visible light communication or the information indicated by the barcode. The server 8187 may transmit an ID associated with information (visible light communication information or barcode information) transmitted from the transmitter 8185 via the receiver 8186, to the transmitter 8185.

FIG. 399 is a diagram illustrating an example of operation of a transmitter and a receiver in Embodiment 15.

The transmitter 8185 such as a smartphone transmits a signal by causing the display 8185*a* to change in luminance. A receiver 8188 includes a light-resistant cone-shaped container 8188*b* and an illuminance sensor 8188*a*. The illuminance sensor 8188*a* is contained in the container 8188*b*, and located near the tip of the container 8188*b*. When the signal is transmitted from the transmitter 8185 by visible light communication, the opening (bottom) of the container 8188*b* in the receiver 8188 is directed to the display 8185*a*. Since no light other than the light from the display 8185*a* enters the container 8188*b*, the illuminance sensor 8188*a* in the receiver 8188 can appropriately receive the light from the display 8185*a* without being affected by any light which is noise. As a result, the receiver 8188 can appropriately receive the signal from the transmitter 8185.

FIG. 400 is a diagram illustrating an example of operation of a transmitter and a receiver in Embodiment 15.

A transmitter 8190 such as a bus stop sign transmits operation information indicating a bus operation state and the like to the receiver 8183, by changing in luminance. For instance, the operation information indicating the destination of a bus, the arrival time of the bus at the bus stop, the current position of the bus, and the like is transmitted to the receiver 8183. Having received the operation information, the receiver 8183 displays the contents of the operation information on its display.

For example, suppose buses with different destinations stop at the bus stop. The transmitter 8190 transmits operation information about these buses with the different destinations. Having received these operation information, the receiver 8183 selects operation information of a bus with a destination that is frequently used by the user, and displays the contents of the selected operation information on the display. In detail, the receiver 8183 specifies the destination of each bus used by the user through a GPS or the like, and records a history of destinations. With reference to this history, the receiver 8183 selects operation information of a bus with a destination frequently used by the user. As an alternative, the receiver 8183 may display the contents of operation information selected by the user from these operation information, on the display. As another alternative, the receiver 8183 may display, with priority, operation information of a bus with a destination frequently selected by the user.

FIG. 401 is a diagram illustrating an example of operation of a transmitter and a receiver in Embodiment 15.

A transmitter 8191 such as a signage transmits information of a plurality of shops to the receiver 8183, by changing in luminance. This information summarizes information about the plurality of shops, and is not information unique to each shop. Accordingly, having received the information by image capture, the receiver 8183 can display information about not only one shop but the plurality of shops. The receiver 8183 selects information about a shop (e.g. "B shop") within the imaging range from the information about the plurality of shops, and displays the selected information. When displaying the information, the receiver 8183 translates the language for expressing the information to a language registered beforehand, and displays the information in the translated language. Moreover, a message prompting for image capture by an image sensor (camera) of the receiver 8183 may be displayed on the transmitter 8191 using characters or the like. In detail, a special application program is started to display, on the transmitter 8191, a message (e.g. "Get information with camera") informing that information can be provided if the transmitter 8191 is captured by camera.

FIG. 402 is a diagram illustrating an example of operation of a transmitter and a receiver in Embodiment 15.

For example, the receiver 8183 captures a subject including a plurality of persons 8197 and a street lighting 8195. The street lighting 8195 includes a transmitter 8195*a* that transmits information by changing in luminance. By capturing the subject, the receiver 8183 obtains an image in which the image of the transmitter 8195*a* appears as the above-mentioned bright line pattern. The receiver 8183 obtains an AR object 8196*a* associated with an ID indicated by the bright line pattern, from a server or the like. The receiver 8183 superimposes the AR object 8196*a* on a normal captured image 8196 obtained by normal imaging, and displays the normal captured image 8196 on which the AR object 8196*a* is superimposed.

FIG. 403A is a diagram illustrating an example of a structure of information transmitted by a transmitter in Embodiment 15.

For example, information transmitted by a transmitter is made up of a preamble unit, a data unit of fixed length, and a check unit. A receiver checks the data unit using the check unit, thus successfully receiving the information made up of these units. When the receiver receives the preamble unit and the data unit but cannot receive the check unit, the receiver omits the check using the check unit. Even in such a case where the check is omitted, the receiver can successfully receive the information made up of these units.

FIG. 403B is a diagram illustrating another example of a structure of information transmitted by a transmitter in Embodiment 15.

For example, information transmitted by a transmitter is made up of a preamble unit, a check unit, and a data unit of variable length. The next information transmitted by the transmitter is equally made up of the preamble unit, the check unit, and the data unit of variable length. When a receiver receives one preamble unit and the next preamble unit, the receiver recognizes information from the preamble unit to immediately before the next preamble unit, as one set of significant information. The receiver may also use the check unit, to specify the end of the data unit received following the check unit. In this case, even when the receiver cannot receive the above-mentioned next preamble unit (all or part of the preamble unit), the receiver can appropriately receive one set of significant information transmitted immediately before.

FIG. 404 is a diagram illustrating an example of a 4-value PPM modulation scheme by a transmitter in Embodiment 15.

A transmitter modulates a transmission signal (signal to be transmitted) to a luminance change pattern by a 4-value PPM modulation scheme. When doing so, the transmitter can maintain the brightness of light that changes in luminance constant, regardless of the transmission signal.

For instance, in the case of maintaining the brightness at 75%, the transmitter modulates each of the transmission signals "00", "01", "10", and "11" to a luminance change pattern in which luminance L (Low) is represented in one of four consecutive slots and luminance H (High) is represented in the other three slots. In detail, the transmitter modulates the transmission signal "00" to a luminance change pattern (L, H, H, H) in which luminance L is represented in the first slot and luminance H is represented in the second to fourth slots. In this luminance change, the luminance rises between the first and second slots. Likewise, the transmitter modulates the transmission signal "01" to a luminance change pattern (H, L, H, H) in which luminance L is represented in the second slot and luminance H is represented in the first, third, and fourth slots. In this luminance change, the luminance rises between the second and third slots.

In the case of maintaining the brightness at 50%, the transmitter modulates each of the transmission signals "00", "01", "10", and "11" to a luminance change pattern in which luminance L (Low) is represented in two of the four slots and luminance H (High) is represented in the other two slots. In detail, the transmitter modulates the transmission signal "00" to a luminance change pattern (L, H, H, L) in which luminance L is represented in the first and fourth slots and luminance H is represented in the second and third slots. In this luminance change, the luminance rises between the first and second slots. Likewise, the transmitter modulates the transmission signal "01" to a luminance change pattern (L, L, H, H) in which luminance L is represented in the first and second slots and luminance H is represented in the third and fourth slots. Alternatively, the transmitter modulates the transmission signal "01" to a luminance change pattern (H, L, H, L) in which luminance L is represented in the second and fourth slots and luminance H is represented in the first and third slots. In this luminance change, the luminance rises between the second and third slots.

In the case of maintaining the brightness at 25%, the transmitter modulates each of the transmission signals "00", "01", "10", and "11" to a luminance change pattern in which luminance L (Low) is represented in three of the four slots and luminance H (High) is represented in the other slot. In detail, the transmitter modulates the transmission signal "00" to a luminance change pattern (L, H, L, L) in which luminance L is represented in the first, third, and fourth slots and luminance H is represented in the second slot. In this luminance change, the luminance rises between the first and second slots. Likewise, the transmitter modulates the transmission signal "01" to a luminance change pattern (L, L, H, L) in which luminance L is represented in the first, second, and fourth slots and luminance H is represented in the third slot. In this luminance change, the luminance rises between the second and third slots.

By the above-mentioned 4-value PPM modulation scheme, the transmitter can suppress flicker, and also easily adjust the brightness in levels. Moreover, a receiver can appropriately demodulate the luminance change pattern by specifying the position at which the luminance rises. Here, the receiver does not use but ignores whether or not the luminance rises at the boundary between one slot group made up of four slots and the next slot group, when demodulating the luminance change pattern.

FIG. 405 is a diagram illustrating an example of a PPM modulation scheme by a transmitter in Embodiment 15.

A transmitter modulates a transmission signal to a luminance change pattern, as in the 4-value PPM modulation scheme illustrated in FIG. 404. Here, the transmitter may perform PPM modulation without switching the luminance between L and H per slot. In detail, the transmitter performs PPM modulation by switching the position at which the luminance rises in the duration (time width) (hereafter referred to as "unit duration") of four consecutive slots illustrated in FIG. 404, depending on the transmission signal. For example, the transmitter modulates the transmission signal "00" to a luminance change pattern in which the luminance rises at the position of 25% in the unit duration, as illustrated in FIG. 405. Likewise, the transmitter modulates the transmission signal "01" to a luminance change pattern in which the luminance rises at the position of 50% of the unit duration, as illustrated in FIG. 405.

In the case of maintaining the brightness at 75%, the transmitter modulates the transmission signal "00" to a luminance change pattern in which luminance L is represented in the position of 0 to 25% and luminance H is represented in the position of 25 to 100% in the unit duration. In the case of maintaining the brightness at 99%, the transmitter modulates the transmission signal "00" to a luminance change pattern in which luminance L is represented in the position of 24 to 25% and luminance H is represented in the position of 0 to 24% and the position of 25 to 100% in the unit duration. Likewise, in the case of maintaining the brightness at 1%, the transmitter modulates the transmission signal "00" to a luminance change pattern in which luminance L is represented in the position of 0 to 25% and the position of 26 to 100% and luminance H is represented in the position of 25 to 26% in the unit duration.

By such switching the luminance between L and H at an arbitrary position in the unit duration without switching the luminance between L and H per slot, it is possible to adjust the brightness continuously.

FIG. 406 is a diagram illustrating an example of a PPM modulation scheme by a transmitter in Embodiment 15.

A transmitter performs modulation in the same way as in the PPM modulation scheme illustrated in FIG. 405. Here, regardless of the transmission signal, the transmitter modulates the signal to a luminance change pattern in which luminance H is represented at the start of the unit duration and luminance L is represented at the end of the unit duration. Since the luminance rises at the boundary between one unit duration and the next unit duration, a receiver can appropriately specify the boundary. Therefore, the receiver and the transmitter can correct clock discrepancies.

FIG. 407A is a diagram illustrating an example of a luminance change pattern corresponding to a header (preamble unit) in Embodiment 15.

For example, in the case of transmitting the header (preamble unit) illustrated in FIGS. 403A and 403B, a transmitter changes in luminance according to a pattern illustrated in FIG. 407A. In detail, in the case where the header is made up of 7 slots, the transmitter changes in luminance according to the pattern "L, H, L, H, L, H, H". In the case where the header is made up of 8 slots, the transmitter changes in luminance according to the pattern "H, L, H, L, H, L, H, H". These patterns are distinguishable from the luminance change patterns illustrated in FIG. 404, with it being possible to clearly inform a receiver that the signal indicated by any of these patterns is the header.

FIG. 407B is a diagram illustrating an example of a luminance change pattern in Embodiment 15.

In the 4-value PPM modulation scheme, in the case of modulating the transmission signal "01" included in the data unit while maintaining the brightness at 50%, the transmitter modulates the signal to one of the two patterns, as illustrated in FIG. 404. In detail, the transmitter modulates the signal to the first pattern "L, L, H, H" or the second pattern "H, L, H, L".

Here, suppose the luminance change pattern corresponding to the header is such a pattern as illustrated in FIG. 407A. In this case, it is desirable that the transmitter modulates the transmission signal "01" to the first pattern "L, L, H, H". For instance, in the case of using the first pattern, the transmission signal "11, 01, 11" included in the data unit is modulated to the pattern "H, H, L, L, L, L, H, H, H, H, L, L". In the case of using the second pattern, on the other hand, the transmission signal "11, 01, 11" included in the data unit is modulated to the pattern "H, H, L, L, H, L, H, L, H, H, L, L". The pattern "H, H, L, L, H, L, H, L, H, H, L, L" includes the same pattern as the pattern of the header made up of 7 slots illustrated in FIG. 407A. For clear distinction between the header and the data unit, it is desirable to modulate the transmission signal "01" to the first pattern.

FIG. 408A is a diagram illustrating an example of a luminance change pattern in Embodiment 15.

In the 4-value PPM modulation scheme, in the case of modulating the transmission signal "11", the transmitter modulates the signal to the pattern "H, H, H, L", the pattern "H, H, L, L", or the pattern "H, L, L, L" so as not to cause a rise in luminance, as illustrated in FIG. 404. However, the transmitter may modulate the transmission signal "11" to the pattern "H, H, H, H" or the pattern "L, L, L, L" in order to adjust the brightness, as illustrated in FIG. 408A.

FIG. 408B is a diagram illustrating an example of a luminance change pattern in Embodiment 15.

In the 4-value PPM modulation scheme, in the case of modulating the transmission signal "11, 00" while maintaining the brightness at 75%, the transmitter modulates the signal to the pattern "H, H, H, L, L, H, H, H", as illustrated in FIG. 404. However, if luminance L is consecutive, each of the consecutive values of luminance L other than the last value may be changed to H so that luminance L is not consecutive. That is, the transmitter modulates the signal "11, 00" to the pattern "H, H, H, H, L, H, H, H".

Since luminance L is not consecutive, the load on the transmitter can be reduced. Moreover, the capacitance of the capacitor included in the transmitter can be reduced, enabling a reduction in control circuit capacity. Furthermore, a lighter load on the light source of the transmitter facilitates the production of the light source. The power efficiency of the transmitter can also be enhanced. Besides, since it is ensured that luminance L is not consecutive, the receiver can easily demodulate the luminance change pattern.

Summary of this Embodiment

An information communication method in this embodiment is an information communication method of transmitting a signal using a change in luminance, the information communication method including: determining a pattern of the change in luminance by modulating the signal to be transmitted; and transmitting the signal by a light emitter changing in luminance according to the determined pattern, wherein the pattern of the change in luminance is a pattern in which one of two different luminance values occurs in each arbitrary position in a predetermined duration, and in the determining, the pattern of the change in luminance is determined so that, for each of different signals to be transmitted, a luminance change position in the duration is different and an integral of luminance of the light emitter in the duration is a same value corresponding to preset brightness, the luminance change position being a position at which the luminance rises or a position at which the luminance falls.

In this way, the luminance change pattern is determined so that, for each of the different signals "00", "01", "10", and "11" to be transmitted, the position at which the luminance rises (luminance change position) is different and also the integral of luminance of the light emitter in the predetermined duration (unit duration) is the same value corresponding to the preset brightness (e.g. 99% or 1%), for instance as illustrated in FIG. 405. Thus, the brightness of the light emitter can be maintained constant for each signal to be transmitted, with it being possible to suppress flicker. In addition, a receiver that captures the light emitter can appropriately demodulate the luminance change pattern based on the luminance change position. Furthermore, since the luminance change pattern is a pattern in which one of two different luminance values (luminance H (High) or luminance L (Low)) occurs in each arbitrary position in the unit duration, the brightness of the light emitter can be changed continuously.

For example, the information communication method may include sequentially displaying a plurality of images by switching between the plurality of images, wherein in the determining, each time an image is displayed in the sequentially displaying, the pattern of the change in luminance for identification information corresponding to the displayed image is determined by modulating the identification information as the signal, and in the transmitting, each time the image is displayed in the sequentially displaying, the identification information corresponding to the displayed image is transmitted by the light emitter changing in luminance according to the pattern of the change in luminance determined for the identification information.

In this way, each time an image is displayed, the identification information corresponding to the displayed image is transmitted, for instance as illustrated in FIG. 393. Based on the displayed image, the user can easily select the identification information to be received by the receiver.

For example, in the transmitting, each time the image is displayed in the sequentially displaying, identification information corresponding to a previously displayed image may be further transmitted by the light emitter changing in luminance according to the pattern of the change in luminance determined for the identification information.

In this way, even in the case where, as a result of switching the displayed image, the receiver cannot receive the identification signal transmitted before the switching, the receiver can appropriately receive the identification information transmitted before the switching because the identification information corresponding to the previously displayed image is transmitted together with the identification information corresponding to the currently displayed image, for instance as illustrated in FIG. 394.

For example, in the determining, each time the image is displayed in the sequentially displaying, the pattern of the change in luminance for the identification information corresponding to the displayed image and a time at which the image is displayed may be determined by modulating the identification information and the time as the signal, and in the transmitting, each time the image is displayed in the sequentially displaying, the identification information and the time corresponding to the displayed image may be transmitted by the light emitter changing in luminance according to the pattern of the change in luminance determined for the identification information and the time, and the identification information and a time corresponding to the previously displayed image may be further transmitted by the light emitter changing in luminance according to the pattern of the change in luminance determined for the identification information and the time.

In this way, each time an image is displayed, a plurality of sets of ID time information (information made up of identification information and a time) are transmitted, for instance as illustrated in FIG. 394. The receiver can easily select, from the received plurality of sets of ID time information, a previously transmitted identification signal which the receiver cannot be received, based on the time included in each set of ID time information.

For example, the light emitter may have a plurality of areas each of which emits light, and in the transmitting, in the case where light from adjacent areas of the plurality of areas interferes with each other and only one of the plurality of areas changes in luminance according to the determined pattern of the change in luminance, only an area located at an edge from among the plurality of areas may change in luminance according to the determined pattern of the change in luminance.

In this way, only the area (light emitting unit) located at the edge changes in luminance, for instance as illustrated in (a) in FIG. 387B. The influence of light from another area on the luminance change can therefore be suppressed as compared with the case where only an area not located at the edge changes in luminance. As a result, the receiver can capture the luminance change pattern appropriately.

For example, in the transmitting, in the case where only two of the plurality of areas change in luminance according to the determined pattern of the change in luminance, the area located at the edge and an area adjacent to the area located at the edge from among the plurality of areas may change in luminance according to the determined pattern of the change in luminance.

In this way, the area (light emitting unit) located at the edge and the area (light emitting unit) adjacent to the area located at the edge change in luminance, for instance as illustrated in (b) in FIG. 387. The spatially continuous luminance change range has a wide area, as compared with the case where areas apart from each other change in luminance. As a result, the receiver can capture the luminance change pattern appropriately.

An information communication method in this embodiment is an information communication method of obtaining information from a subject, the information communication method including: transmitting position information indicating a position of an image sensor used to capture the subject; receiving an ID list that is associated with the position indicated by the position information and includes a plurality of sets of identification information; setting an exposure time of the image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining the information by demodulating data specified by a pattern of the bright line included in the obtained bright line image; and searching the ID list for identification information that includes the obtained information.

In this way, since the ID list is received beforehand, even when the obtained information "bc" is only a part of identification information, the appropriate identification information "abcd" can be specified based on the ID list, for instance as illustrated in FIG. 389.

For example, in the case where the identification information that includes the obtained information is not uniquely specified in the searching, the obtaining of a bright line image and the obtaining of the information may be repeated to obtain new information, and the information communication method may further include searching the ID list for the identification information that includes the obtained information and the new information.

In this way, even in the case where the obtained information "b" is only a part of identification information and the identification information cannot be uniquely specified with this information alone, the new information "c" is obtained and so the appropriate identification information "abcd" can be specified based on the new information and the ID list, for instance as illustrated in FIG. 389.

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining identification information by demodulating data specified by a pattern of the bright line included in the obtained bright line image; transmitting the obtained identification information and position information indicating a position of the image sensor; and receiving error notification information for notifying an error, in the case where the obtained identification information is not included in an ID list that is associated with the position indicated by the position information and includes a plurality of sets of identification information.

In this way, the error notification information is received in the case where the obtained identification information is not included in the ID list, for instance as illustrated in FIG. 391. Upon receiving the error notification information, the user of the receiver can easily recognize that information associated with the obtained identification information cannot be obtained.

Embodiment 16

This embodiment describes each example of application using a receiver such as a smartphone and a transmitter for transmitting information as a blink pattern of an LED, an organic EL device, or the like in Embodiments 1 to 15 described above.

FIG. 409 is a diagram illustrating an example of operation of a transmitter as a television in this embodiment.

The transmitter as the television alternately displays an image for the left eye (left-eye image) and an image for the right eye (right-eye image), as a display image. The user of the television (transmitter) wears 3D glasses, to view the left-eye image only by the left eye and the right-eye image only by the right eye. As a result, the user can view a three-dimensional (3D) image having a depth according to the parallax between the left-eye image and the right-eye image.

A backlight of the television is placed on the back of the panel on which the display image is displayed, and alternates between normal lighting and signal transmission. In normal lighting, the display image is brightly lit constantly. In signal transmission, the luminance is changed to transmit a signal corresponding to the pattern of the luminance change to outside the television via the panel, while the display image is lit by the light that changes in luminance.

During normal lighting, the left-eye image and the right-eye image are each displayed. During signal transmission, the left-eye image is displayed.

The 3D glasses open and close the field of vision of each of the user's left eye and right eye. In detail, when the 3D glasses are set to a 3D display mode, the 3D glasses close the field of vision of each of the left eye and the right eye, in a period during which the backlight is transmitting a signal. In the period during which the backlight is normally lighting, the 3D glasses open the field of vision of the left eye and close the field of vision of the right eye when the left-eye image is displayed, and close the field of vision of the left eye and open the field of vision of the right eye when the right-eye image is displayed. In so doing, the user wearing the 3D glasses set to the 3D display mode views the left-eye image only by the left eye and the right-eye image only by the right eye while the backlight is normal lighting, and so can view a three-dimensional (3D) image. In the period during which the backlight is transmitting a signal, the field of vision of both eyes of the user is closed, with it being possible to keep the user from perceiving flicker caused by luminance change.

When the 3D glasses are set to a flickerless pattern in a 2D display mode, in the signal transmission period of the backlight, the 3D glasses close the field of vision of each of the right eye and the left eye. In the normal lighting period of the backlight, the 3D glasses open the field of vision of each of the left eye and the right eye when the left-eye image is displayed, and close the field of vision of each of the left eye and the right eye when the right-eye image is displayed. Thus, in the signal transmission period, the field of vision of both eyes of the user is closed. In the normal lighting period, only the left-eye image is shown to both eyes of the user. Accordingly, the user can view a two-dimensional (2D) image without flicker caused by luminance change.

When the 3D glasses are set to a bright pattern in the 2D display mode, in the signal transmission period of the backlight, the 3D glasses open the field of vision of each of the left eye and the right eye. As a result, the left-eye image that changes in luminance is shown to both eyes of the user. In the normal lighting period of the backlight, the 3D glasses open the field of vision of each of the left eye and the right eye when the left-eye image is displayed, and close the field of vision of each of the left eye and the right eye when the right-eye image is displayed. Thus, even in the signal transmission period, the field of vision of both eyes is opened, so that the user can view a bright two-dimensional (2D) image as compared with the above-mentioned case of the flickerless pattern. Since the time during which the field of vision of both eyes is opened by the 3D glasses is longer, the backlight can be made darker and the power consumption of the television can be saved.

FIG. 410 is a diagram illustrating an example of operation of a transmitter and a receiver in this embodiment.

A transmitter such as a television repeatedly performs normal lighting and signal transmission, as mentioned above. Here, normal lighting is continuously performed for 1/30 second or more.

A receiver captures the transmitter in the normal lighting period. At this time, the receiver performs the above-mentioned visible light imaging. As a result, the receiver obtains a lighting image 8201*a* in which a range (normal lighting range) 8201*b* in which normal lighting is performed by the television is shown. Next, in the signal transmission period, the receiver captures the transmitter. At this time, too, the receiver performs the above-mentioned visible light imaging. As a result, the receiver obtains a bright line image 8202*a* in which the above-mentioned bright line pattern is shown.

The receiver specifies, in the bright line image 8202*a*, a range that is at the same position as the normal lighting range 8201*b* in the lighting image 8201*a* and has the same size and shape as the normal lighting range 8201*b*, as a signal transmission range 8202*b*. The receiver determines that the bright line pattern is included in the signal transmission range 8202*b* in the bright line image 8202*a*, and demodulates data specified by the bright line pattern in the signal transmission range 8202*b*. Thus, the signal transmission range 8202*b* is specified from the bright line image 8202*a* based on the normal lighting range 8201*b*, so that the receiver can accurately specify the range (area) from which the signal is transmitted. As an example, in the case where there is a dark part at an edge in the signal transmission range 8202*b*, the receiver can appropriately recognize that a signal indicating that there is no bright line is transmitted from the part, without erroneously recognizing that no signal is transmitted from the part.

Moreover, the receiver can measure the size of the normal lighting range 8201*b*, and calculate the accurate distance to the television based on the measured size.

FIG. 411 is a diagram illustrating an example of operation of a transmitter, a receiver, and a server in this embodiment.

A transmitter 8203 as a television obtains broadcast data broadcasted from a broadcast station. The broadcast data includes additional information together with data of a broadcast program and the like. For example, the additional information is an ID for identifying the broadcast program or a scene in the broadcast program, or content relating to the broadcast program or the scene. Having obtained the broadcast data, the transmitter 8203 outputs the data of the broadcast program and the like included in the broadcast data as an image and a sound, and also transmits the ID or the content included in the broadcast data by changing in luminance.

A receiver 8204 receives the ID or the content, by capturing the transmitter 8203 (visible light imaging). The receiver 8204 transmits the ID to a server 8205.

Upon receiving the ID from the receiver 8204, the server 8205 transmits information associated with the ID to the receiver 8204. Upon receiving the related information from the server 8205, the receiver 8204 displays information indicated by the related information. In the case where the receiver 8204 receives the content from the transmitter 8203, the receiver 8204 may display the content without transmitting the ID to the server 8205. The transmitter 8203 and the server 8205 may be combined in one unit.

FIG. 412 is a diagram illustrating an example of operation of a transmitter and a receiver in this embodiment.

A transmitter 8207 as a television, while displaying an image of broadcast content (e.g. broadcast program), transmits information relating to the image by changing in luminance. The transmitted information includes the channel of the displayed broadcast content and the time at which the image of the broadcast content is displayed. For instance, at time t1, the transmitter 8207 displays an image showing a circle included in the broadcast content, and transmits information including the channel (CH: 1) of the broadcast content and the time t1 at which the image showing the circle is displayed. At time t2, the transmitter 8207 displays an image showing a square included in the broadcast content, and transmits information including the channel (CH: 1) of the broadcast content and the time t2 at which the image showing the square is displayed. Likewise, at time t3, the transmitter 8207 displays an image showing a triangle included in the broadcast content, and transmits information including the channel (CH: 1) of the broadcast content and the time t3 at which the image showing the triangle is displayed.

A receiver 8208 captures the transmitter 8207 to obtain the above-mentioned information, and transmits the information to a server 8209. The time included in this information is hereafter referred to as "reference time". Upon receiving the information, the server 8209 determines at least one time around the reference time included in the information, as a neighboring time. For example, the server 8209 determines a time earlier or later than the reference time by a predetermined period, as the neighboring time. In the example illustrated in FIG. 412, in the case where the reference time is t3, the server 8209 determines neighboring times t1, t2, and t4.

The server 8209 selects related information associated with the channel included in the received information and each of the reference time included in the information and its neighboring times, and transmits these related information to the receiver 8208. For instance, the server 8209 transmits related information associated with the channel "CH: 1" and the reference time t3, related information associated with the channel "CH: 1" and the neighboring time t1, related information associated with the channel "CH: 1" and the neighboring time t2, and related information associated with the channel "CH: 1" and the neighboring time t4, to the receiver 8208.

Upon receiving the plurality of sets of related information from the server 8209, the receiver 8208 selects related information from these related information and displays the related information. For example, the receiver 8208 selects the related information corresponding to the reference time, from these related information. Moreover, when the user designates related information, the receiver 8208 selects the designated related information and displays it. Alternatively, the receiver 8208 may display each of the received plurality of sets of related information.

Thus, not only the related information associated with the information (channel and reference time) transmitted from the transmitter 8207 but also the related information associated with the neighboring time is transmitted from the server 8209. Therefore, even in the case where information desired by the user cannot be obtained from the transmitter 8207 because the timing of capturing the transmitter 8207 is off, related information associated with the information can be received from the server 8209.

Instead of transmitting the time included in the received information to the server 8209 as the reference time, the receiver 8208 may transmit the time at which an image sensor of the receiver 8208 is pointed at the transmitter 8207 to receive the information, to the server 8209 as the reference time. In the case where the image sensor is kept pointed at the transmitter 8207, the time at which the image sensor is pointed is the time at which this pointing state starts.

For example, the receiver 8208 specifies the time that is N seconds (e.g. 5 seconds) earlier than the time included in the received information, as the time at which the image sensor is pointed. The receiver 8208 treats the specified time as the reference time, and transmits the reference time and the channel included in the received information to the server 8209. Alternatively, the receiver 8208 may transmit the most recent time at which the detection value indicating the movement of the receiver 8208, which is output from the internal 9-axis sensor, becomes small, to the server 8209 as the reference time.

FIG. 413 is a diagram illustrating an example of operation of a transmitter in this embodiment.

A transmitter 8210 as a television, when displaying an image on a display, transmits a signal by causing the display to change in luminance. The display on which the image is displayed has a bright part and a dark part. The transmitter 8210 causes only the part (bright part) of the display that is emitting light with predetermined brightness or more in order to display an image, to change in luminance. The transmitter 8210 thus outputs the signal only from this part. Since the dark part does not change in luminance, darkness can be stabilized and a darker gray level can be expressed.

FIG. 414 is a diagram illustrating an example of operation of a transmitter in this embodiment.

A transmitter 8211 as a television includes a motion sensor **8211*a*. The motion sensor 8211*a* detects a person in the range of the viewing angle of the transmitter 8211** (display), or a person near the viewing angle. The area near the viewing angle is, for example, an area out of the viewing angle by X % of the viewing angle (where X is a predetermined real number greater than 0).

In the case where a person is in front of the display, the person is within the viewing angle of the display, and so is detected by the motion sensor **8211*a*. In this case, the transmitter 8211** causes the display to change in luminance by a normal change amount, to transmit a signal.

In the case where a person is diagonally in front of the display, the person is near the viewing angle of the display, and so is detected by the motion sensor **8211*a*. In this case, the transmitter 8211 causes the display to change in luminance by a larger change amount than the normal change amount, to transmit a signal. For example, when the user of the transmitter 8211 is within the viewing angle, he or she can view the image displayed on the display brightly and clearly. In the case where the user is near (i.e. around) the viewing angle, it is difficult to view the image brightly and clearly. That is, the light from the display is less likely to reach outside the viewing angle. Accordingly, in the case where the person near the viewing angle is detected as mentioned above, the display changes in luminance by a larger change amount than the normal change amount. As a result, a receiver 8212 carried by the person can appropriately obtain the signal by capturing the display that changes in luminance, even when the receiver 8212** is situated outside the viewing angle.

In the case where no one is detected by the motion sensor **8211*a*, the transmitter 8211 stops signal transmission without causing the display to change in luminance. This saves the power consumption of the transmitter 8211**.

The viewing angle may be a predetermined angle according to the specifications of the display, or an arbitrarily set angle. For instance, the viewing angle may be a range in which the intensity of light from the display is a predetermined intensity or more, or a range in which the reception sensitivity (the sensitivity in receiving a signal transmitted using a change in luminance) of the receiver 8212 is a predetermined sensitivity or more.

FIG. 415 is a diagram illustrating an example of operation of a transmitter in this embodiment.

A transmitter as a television repeatedly becomes darker in a period of 1000 μs and becomes brighter in a period of 3000 μs, for black insertion. In the period of 3000 μs in which the transmitter becomes brighter, the transmitter changes in luminance to transmit (superimpose) a signal. The luminance change is expressed in such a manner that, for each period of 104 μs as an example, light of high luminance (High) or light of low luminance (Low) is output in the period. However, given that dividing 3000 μs by 104 μs yields the remainder of 88 μs, in the period of 3000 μs there is a period in which light of high luminance or low luminance cannot be output continuously for 104 μs. In view of this, the transmitter in this embodiment also transmits a signal in a period (88 μs) shorter than 104 μs. For example, the transmitter outputs light of high luminance or low luminance to express a signal in this short period, too. Alternatively, the transmitter may transmit no signal in the short period. Hence, in the short period, no signal is superimposed on the original light, i.e. no luminance change is performed, so that the original bright light is emitted. This contributes to a brighter television image.

(Supplementary Note)

In the case where the scan direction on the imaging side is the vertical direction (up-down direction) of a mobile terminal, when an LED lighting device is captured with a shorter exposure time, bright lines of a black and white pattern can be captured in the same direction as the scan direction for ON/OFF of the entire LED lighting device, as illustrated in (a) in FIG. 416. In (a) in FIG. 416, a vertically long LED lighting device is captured so that its longitudinal direction is perpendicular to the scan direction on the imaging side (the left-right direction of the mobile terminal), and therefore many bright lines of the black and white pattern can be captured in the same direction as the scan direction. In other words, a larger amount of information can be transmitted and received. On the other hand, in the case where the vertically long LED lighting device is captured so as to be parallel to the scan direction on the imaging side (the up-down direction of the mobile terminal) as illustrated in (b) in FIG. 416, the number of bright lines of the black and white pattern that can be captured decreases. In other words, the amount of information that can be transmitted decreases.

Thus, depending on the direction of the LED lighting device with respect to the scan direction on the imaging side, many bright lines of the black and white pattern can be captured (in the case where the vertically long LED lighting device is captured so that its longitudinal direction is perpendicular to the scan direction on the imaging side) or only a few bright lines of the black and white pattern can be captured (in the case where the vertically long LED lighting device is captured so that its longitudinal direction is parallel to the scan direction on the imaging side).

This embodiment describes a lighting device control method capable of capturing many bright lines even in the case where only a few bright lines of the black and white pattern can be captured.

FIG. 417 illustrates an example of a lighting device having a plurality of LEDs in the vertical direction, and a drive signal for the lighting device. (a) in FIG. 417 illustrates the lighting device having the plurality of LEDs in the vertical direction. Suppose each LED element corresponds to a smallest unit of horizontal stripes obtained by coding a visible light communication signal, and corresponds to a coded ON/OFF signal. By generating the black and white pattern and turning each LED element ON or OFF for lighting in this way, the black and white pattern on an LED element basis can be captured even when the scan direction on the imaging side and the longitudinal direction of the vertically long LED lighting device are parallel to each other.

(c) and (d) in FIG. 417 illustrate an example of generating the black and white pattern and turning each LED element ON or OFF for lighting. When the lighting device lights as the black and white pattern, the light may become not uniform even in a short time. In view of this, an example of generating a reverse phase pattern and performing lighting alternately between the two patterns is illustrated in (c) and (d) in FIG. 417. Each element that is ON in (c) in FIG. 417 is OFF in (d) in FIG. 417, whereas each element that is OFF in (c) in FIG. 417 is ON in (d) in FIG. 417. By lighting in the black and white pattern alternately between the normal phase pattern and the reverse phase pattern in this way, a lot of information can be transmitted and received in visible light communication, without causing the light to become not uniform and without being affected by the relation between the scan direction on the imaging side and the direction of the lighting device. The present disclosure is not limited to the case of alternately generating two types of patterns, i.e. the normal phase pattern and the reverse phase pattern, for lighting, as three or more types of patterns may be generated for lighting. FIG. 418 illustrates an example of lighting in four types of patterns in sequence.

A structure in which usually the entire LED lighting blinks ((b) in FIG. 417) and, only for a predetermined time, the black and white pattern is generated to perform lighting on an LED element basis is also available. As an example, the entire LED lighting blinks for a transmission and reception time of a predetermined data unit, and subsequently lighting is performed in the black and white pattern on an LED element basis for a short time. The predetermined data unit is, for instance, a data unit from the first header to the next header. In this case, when the LED lighting is captured in the direction in (a) in FIG. 416, a signal is received from bright lines obtained by capturing the blink of the entire LED lighting. When the LED lighting is captured in the direction in (b) in FIG. 416, a signal is received from a light emission pattern on an LED element basis.

This embodiment is not limited to an LED lighting device, and is applicable to any device whose ON/OFF can be controlled in units of small elements like LED elements. Moreover, this embodiment is not limited to a lighting device, and is applicable to other devices such as a television, a projector, and a signage.

Though an example of lighting in the black and white pattern is described in this embodiment, colors may be used instead of the black and white pattern. As an example, in RGB, blink may be performed using only B, while R and G are constantly ON. The use of only B rather than R or G prevents recognition by humans, and therefore suppresses flicker. As another example, additive complementary colors (e.g. a red and cyan pattern, a green and magenta pattern, a yellow and blue pattern) may be used to display ON/OFF, instead of the white and black pattern. The use of additive complementary colors suppresses flicker.

Though an example of one-dimensionally arranging LED elements is described in this embodiment, LED elements may be arranged not one-dimensionally but two-dimensionally so as to be displayed like a 2D barcode.

Conclusion of this Embodiment

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining the information by demodulating data specified by a pattern of the bright line included in the obtained bright line image; and transmitting the information to a server, and obtaining related information associated with the information from the server, wherein in the obtaining of a bright line image, the subject displaying content that is broadcasted and received is captured, in the obtaining of the information, information including a channel used to broadcast the content displayed by the subject and a reference time which is a time at which the content is displayed is obtained, and in the obtaining of related information, a plurality of sets of related information associated with the channel and each of the reference time and at least one neighboring time around the reference time are obtained from the server.

In this way, not only the related information associated with the information (channel and reference time) transmitted from a transmitter which is the subject changing in luminance but also the related information associated with the neighboring time is obtained, for instance as illustrated in FIG. 412. Therefore, even in the case where information desired by the user cannot be obtained from the transmitter because the timing of capturing the transmitter is off, related information associated with the information can be obtained from the server.

For example, the information communication method may further include: obtaining a lighting image by capturing the subject that is lighting without making the change in luminance for signal transmission, the lighting image indicating a lighting range in which the subject is lighting; and specifying, in the bright line image, a range that is at a same position as the lighting range in the lighting image and has a same size and shape as the lighting range, as a signal transmission range, wherein in the obtaining of the information, the data specified by the pattern of the bright line included in the specified signal transmission range is demodulated.

In this way, the signal transmission range is specified from the bright line image based on the lighting range (normal lighting range), and so the range in which the signal is transmitted can be accurately specified in the bright line image, for instance as illustrated in FIG. 410. As an example, in the case where there is a dark part at an edge in the signal transmission range, it can be appropriately recognized that a signal indicating that there is no bright line is transmitted from the part, without erroneously recognizing that no signal is transmitted from the part.

An information communication method in this embodiment is an information communication method of transmitting a signal using a change in luminance, the information communication method including: determining a pattern of the change in luminance, by modulating a signal to be transmitted; and transmitting the signal by a display changing in luminance according to the determined pattern while displaying an image, the display being the subject, wherein in the transmitting of the signal, only a part of the display that is emitting light with predetermined brightness or more to display the image changes in luminance according to the pattern.

In this way, a part of the display set to less than predetermined brightness in order to display an image, i.e. a dark part, does not change in luminance, for instance as illustrated in FIG. 413. This stabilizes darkness, and enables a darker gray level to be expressed.

For example, the display may include a backlight, the information communication method may further include sequentially displaying, by the display, a left-eye image and a right-eye image lit with given brightness by the backlight, and the transmitting of the signal and the sequentially displaying may be repeated alternately.

In this way, while the luminance change is performed, the field of vision of both eyes of the user is closed by 3D glasses. When the left-eye image and the right-eye image are sequentially displayed, only the field of vision of the user's eye corresponding to the image is opened by the 3D glasses, for instance as illustrated in FIG. 409. As a result, the user can view a three-dimensional image without flicker caused by luminance change.

The information communication method may further include detecting, by a sensor, a person within a viewing angle of the display or a person near the viewing angle, wherein in the transmitting of the signal, the signal is transmitted by changing in luminance by a larger change amount in the case where the person near the viewing angle is detected than in the case where the person within the viewing angle is detected, and the transmission of the signal using the change in luminance is stopped in the case where neither the person within the viewing angle nor the person near the viewing angle is detected.

In this way, in the case where a person near the viewing angle is detected, the display changes in luminance by a larger change amount than the normal change amount (the luminance change amount in the case where a person within the viewing angle is detected), for instance as illustrated in FIG. 414. The receiver carried by the person can appropriately receive the signal by capturing the display that changes in luminance, even though it is situated outside the viewing angle.

Embodiment 17

This embodiment describes each example of application using a receiver such as a smartphone and a transmitter for transmitting information as an LED blink pattern in Embodiments 1 to 17 described above.

FIG. 419 is a diagram illustrating an example of a transmission signal in Embodiment 17.

A transmission signal D is divided into data segments Dx (e.g. Dx=D1, D2, D3) of a predetermined size, and a header Hdr and an error detection/correction frame check sequence FCS calculated from each data segment are added to the data segment. A header Hdr2 and an error detection/correction frame check sequence FCS2 calculated from the original data are added, too. Data made up of Hdr, Dx, and FCS is a structure for reception by an image sensor. Since the image sensor is suitable for reception of continuous data in a short time, Hdr, Dx, and FCS are transmitted continuously. Data made up of Hdr2, Dx, and FCS2 is a structure for reception by an illuminance sensor. While Hdr and FCS received by the image sensor are desirably short, Hdr2 and FCS2 received by the illuminance sensor may each be a longer signal sequence. The use of a longer signal sequence for Hdr2 enhances the header detection accuracy. When FCS2 is longer, a code capable of detecting and correcting many bit errors can be employed, which leads to improved error detection/correction performance. Note that, instead of transmitting Hdr2 and FCS2, Hdr and FCS may be received by the illuminance sensor. The illuminance sensor may receive both Hdr and Hdr2 or both FCS and FCS2.

FIG. 420 is a diagram illustrating an example of a transmission signal in Embodiment 17.

FCS2 is a long signal. Frequently inserting such FCS2 causes a decrease in reception efficiency of the image sensor. In view of this, the insertion frequency of FCS2 is reduced, and a signal PoFCS2 indicating the location of FCS2 is inserted instead. For example, in the case of using 4-value PPM having 2-bit information per unit time for signal representation, 16 transmission time units are necessary when CRC32 is used for FCS2, whereas PoFCS2 with a range of 0 to 3 can be transmitted in one time unit. Since the transmission time is shortened as compared with the case of inserting only FCS2, the reception efficiency of the image sensor can be improved. The illuminance sensor receives PoFCS2 following the transmission signal D, specifies the transmission time of FCS2 from PoFCS2, and receives FCS2. The illuminance sensor further receives PoFCS2 following FCS2, specifies the transmission time of the next FCS2, and receives the next FCS2. If FCS2 received first and FCS2 received next are the same, the receiver estimates that the same signal is being received.

FIGS. 421A to 421C are each a diagram illustrating an example of an image (bright line image) captured by a receiver in Embodiment 17.

In the captured image illustrated in FIG. 421A, a transmitter is shown small and so the number of bright lines is small. Only a small amount of data can be received at one time from this captured image. The captured image illustrated in FIG. 421B is an image captured using zoom, where the transmitter is shown large and so the number of bright lines is large. Thus, a large amount of data can be received at one time by using zoom. In addition, data can be received from far away, and a signal of a small transmitter can be received. Optical zoom or Ex zoom is employed as the zoom method. Optical zoom is realized by increasing the focal length of a lens. Ex zoom is a zoom method in which, in the case of performing imaging with a lower resolution than the imaging element capacity, not all but only a part of the imaging elements is used to thereby enlarge a part of the captured image. The captured image illustrated in FIG. 421C is an image captured using electronic zoom (image enlargement). Though the transmitter is shown large, bright lines are thicker in the enlargement by electronic zoom, and the number of bright lines is unchanged from pre-zoom. Hence, the reception characteristics are unchanged from pre-zoom.

FIGS. 422A and 422B are each a diagram illustrating an example of an image (bright line image) captured by a receiver in Embodiment 17.

The captured image illustrated in FIG. 422A is an image captured with focus on a subject. The captured image illustrated in FIG. 422B is an image captured out of focus. In the captured image illustrated in FIG. 422B, bright lines can be observed even in the surroundings of the actual transmitter because the image is captured out of focus, so that more bright lines can be observed. Thus, more data can be received at one time and also data can be received farther away, by out-of-focus imaging. Imaging in macro mode can produce the same image as the captured image illustrated in FIG. 422B.

FIGS. 423A to 423C are each a diagram illustrating an example of an image (bright line image) captured by a receiver in Embodiment 17.

The image illustrated in FIG. 423A is obtained by setting the exposure time to be longer than that in the visible light communication mode and shorter than that in the normal imaging mode. The imaging mode for obtaining such an image is referred to as "bright line detection mode" (intermediate mode). In the image illustrated in FIG. 423A, bright lines of a transmitter are observed at the center left, while a darker normal captured image appears in the other part. When this image is displayed on the receiver, the user can easily point the receiver at the intended transmitter and capture the transmitter. In the bright line detection mode, an image is captured darker than in the normal imaging mode. Accordingly, imaging is performed in a high sensitivity mode to capture an image having brightness easily visible by humans, i.e. an image similar to that in the normal imaging mode. Since excessively high sensitivity causes the darker parts of the bright lines to become brighter, the sensitivity is set to such a level that allows the bright lines to be observed. The receiver switches to the visible light communication mode, and receives the transmission signal of the transmitter captured in the part designated by, for example, the user touching the image. The receiver may automatically switch to the visible light communication mode and receive the signal in the case where any bright line (transmission signal) is found in the captured image.

The receiver detects the transmission signal from the bright lines in the captured image, and highlights the detected part as illustrated in FIG. 423B. The receiver can thus present the signal transmission part clearly to the user. The bright lines may be observed with regard to not only the transmission signal but also the pattern of the subject. Therefore, instead of determining whether or not there is the transmission signal from the bright lines in one image, it may be determined that there is the transmission signal in the case where the positions of the bright lines change in a plurality of images.

The image captured in the bright line detection mode is darker than the image captured in the normal imaging mode, and is not easily visible. Hence, the image with visibility increased by image processing may be displayed. The image illustrated in FIG. 423C is an example of an image in which the edges are extracted and the boundary of the imaging object is enhanced.

FIG. 424 is a diagram illustrating an example of an image (bright line image) captured by a receiver in Embodiment 17. In detail, FIG. 424 illustrates an image obtained by capturing a transmitter whose signal transmission period is 1/9600 second, with the ratio of exposure time indicated in the lower part of the drawing. When the exposure time is shorter than the transmission period of 1/9600 second, the captured image is roughly the same, and clear bright lines can be captured. When the exposure time is longer, the bright line contours are blurred. In this signal representation example, however, the bright line pattern is observable and the signal can be received as long as the exposure time is up to about 1.5 times the transmission period. Moreover, in this signal representation example, the bright lines are observable as long as the exposure time is up to about 20 times the transmission period. The exposure time of this range is available as the exposure time in the bright line detection mode.

The upper limit of the exposure time that enables signal reception differs depending on the method of signal representation. The use of such a signal representation rule in which the number of bright lines is smaller and the interval between the bright lines is longer enables signal reception with a longer exposure time and also enables observation of bright lines with a longer exposure time, though the transmission efficiency is lower.

FIG. 425 is a diagram illustrating an example of a transmission signal in Embodiment 17.

A receiver receives a series of signals by combining a plurality of received data segments. Therefore, if a transmission signal is abruptly changed, data segments before and after the change are mixed with each other, making it impossible to accurately combine the signals. In view of this, upon changing the transmission signal, a transmitter performs normal illumination for a predetermined time as a buffer zone while transmitting no signal, as in (a) in FIG. 425. In the case where no signal can be received for a predetermined time T2 shorter than the above-mentioned predetermined time T1, the receiver abandons previously received data segments, thus avoiding mixture of data segments before and after the change. As an alternative, upon changing the transmission signal, the transmitter repeatedly transmits a signal X for notifying the change of the transmission signal, as in (b) in FIG. 425. Such repeated transmission prevents a failure to receive the transmission signal change notification X. As another alternative, upon changing the transmission signal, the transmitter repeatedly transmits a preamble, as in (c) in FIG. 425. In the case of receiving the preamble in a shorter period than the period in which the preamble appears in the normal signal, the receiver abandons previously received data segments.

FIG. 426 is a diagram illustrating an example of operation of a receiver in Embodiment 17.

An image illustrated in (a) in FIG. 426 is an image obtained by capturing a transmitter in just focus. By out-of-focus imaging, a receiver can capture an image illustrated in (b) in FIG. 426. Further out of focus leads to a captured image illustrated in (c) in FIG. 426. In (c) in FIG. 426, bright lines of a plurality of transmitters overlap each other, and the receiver cannot perform signal reception. Hence, the receiver adjusts the focus so that the bright lines of the plurality of transmitters do not overlap each other. In the case where only one transmitter is present in the imaging range, the receiver adjusts the focus so that the size of the transmitter is maximum in the captured image.

The receiver may compress the captured image in the direction parallel to the bright lines, but do not perform image compression in the direction perpendicular to the bright lines. Alternatively, the receiver reduces the degree of compression in the perpendicular direction. This prevents a reception error caused by the bright lines being blurred by compression.

FIGS. 495 and 496 are each a diagram illustrating an example of an instruction to a user displayed on a screen of a receiver in Embodiment 17.

By capturing a plurality of transmitters, a receiver can estimate the position of the receiver using triangulation from position information of each transmitter and the position, size, and angle of each transmitter in the captured image. Accordingly, in the case where only one transmitter is captured in a receivable state, the receiver instructs the imaging direction or the moving direction by displaying an image including an arrow or the like, to cause the user to change the direction of the receiver or move backward so as to capture a plurality of transmitters. (a) in FIG. 427 illustrates a display example of an instruction to turn the receiver to the right to capture a transmitter on the right side. (b) in FIG. 427 illustrates a display example of an instruction to move backward to capture a transmitter in front. FIG. 428 illustrates a display example of an instruction to shake the receiver or the like to capture another transmitter, because the position of another transmitter is unknown to the receiver. Though it is desirable to capture a plurality of transmitters in one image, the position relation between transmitters in a plurality of images may be estimated using image processing or the sensor value of the 9-axis sensor. The receiver may inquire of a server about position information of nearby transmitters using an ID received from one transmitter, and instruct the user to capture a transmitter that is easiest to capture.

The receiver detects that the user is moving the receiver from the sensor value of the 9-axis sensor and, after a predetermined time from the end of the movement, displays a screen based on the last received signal. This prevents a situation where, when the user points the receiver to the intended transmitter, a signal of another transmitter is received during the movement of the receiver and as a result a process based on the transmission signal of the unintended transmitter is accidentally performed.

The receiver may continue the reception process during the movement, and perform a process based on the received signal, e.g. information obtainment from the server using the received signal as a key. In this case, after the process the receiver still continues the reception process, and performs a process based on the last received signal as a final process.

The receiver may process a signal received a predetermined number of times, or notify the signal received the predetermined number of times to the user. The receiver may process a signal received a largest number of times during the movement. The receiver may include notification means for notifying the user when signal reception is successful or when a signal is detected in a captured image. The notification means performs notification by sound, vibration, display update (e.g. popup display), or the like. This enables the user to recognize the presence of a transmitter.

FIG. 429 is a diagram illustrating an example of a signal transmission method in Embodiment 17.

A plurality of transmitters such as displays are arranged adjacent to each other. In the case of transmitting the same signal, the plurality of transmitters synchronize the signal transmission timing, and transmit the signal from the entire surface as in (a) in FIG. 429. This allows a receiver to observe the plurality of displays as one large transmitter, so that the receiver can receive the signal faster or from a longer distance. In the case where the plurality of transmitters transmit different signals, the plurality of transmitters transmit the signals while providing a buffer zone (non-transmission area) where no signal is transmitted, as in (b) in FIG. 429. This allows the receiver to recognize the plurality of transmitters as separate transmitters with the buffer zone in between, so that the receiver can receive the signals separately.

FIG. 430 is a diagram illustrating an example of a signal transmission method in Embodiment 17.

As illustrated in (a) in FIG. 430, a liquid crystal display provides a backlight off period, and changes the liquid crystal state during backlight off to make the image in the state change invisible, thus enhancing dynamic resolution. On the liquid crystal display performing such backlight control, a signal is superimposed according to the backlight on period as illustrated in (b) in FIG. 430. Continuously transmitting the set of data (Hdr, Data, FCS) contributes to higher reception efficiency. The light emitting unit is in a bright state (Hi) in the first and last parts of the backlight on period. This is because, if the dark state (Lo) of the light emitting unit is continuous with the backlight off period, the receiver cannot determine whether Lo is transmitted as a signal or the light emitting unit is in a dark state due to the backlight off period.

A signal decreased in average luminance may be superimposed in the backlight off period.

Signal superimposition causes the average luminance to change as compared with the case where no signal is superimposed. Hence, adjustment such as increasing/decreasing the backlight off period or increasing/decreasing the luminance during backlight on is performed so that the average luminance is equal.

FIG. 431 is a diagram illustrating an example of a signal transmission method in Embodiment 17.

A liquid crystal display can reduce the luminance change of the entire screen, by performing backlight control at a different timing depending on position. This is called backlight scan. Backlight scan is typically performed so that the backlight is turned on sequentially from the end, as in (a) in FIG. 431. A captured image **8802*a* is obtained as a result. In the captured image 8802*a***, however, the part including the bright lines is divided, and there is a possibility that the entire screen of the display cannot be estimated as one transmitter.

The backlight scan order is accordingly set so that all light emitting parts (signal superimposition parts) are connected when the vertical axis is the spatial axis in the backlight scan division direction and the horizontal axis is the time axis, as in (b) in FIG. 431. A captured image 8802*b* is obtained as a result. In the captured image 8802*b*, all bright line parts are connected, facilitating estimation that this is a transmission signal from one transmitter. Besides, since the number of continuously receivable bright lines increases, faster or longer-distance signal reception is possible. Moreover, the size of the transmitter is easily estimated, and therefore the position of the receiver can be accurately estimated from the position, size, and angle of the transmitter in the captured image.

FIG. 432 is a diagram illustrating an example of a signal transmission method in Embodiment 17.

In time-division backlight scan, in the case where the backlight on period is short and the light emitting parts (signal superimposition parts) cannot be connected on the graph in which the vertical axis is the spatial axis in the backlight scan division direction and the horizontal axis is the time axis, signal superimposition is performed in each light emitting part according to the backlight illumination timing, in the same way as in FIG. 430. Here, by controlling the backlight so that the distance from another backlight on part on the graph is maximum, it is possible to prevent mixture of bright lines in adjacent parts.

FIG. 433 is a diagram for describing a use case in Embodiment 17. A system in this embodiment includes a lighting fixture 100 that performs visible light communication, a wearable device 101 having a visible light communication function, a smartphone 102, and a server 103.

This embodiment is intended to save, through the use of visible light communication, the user's trouble when shopping in a store, thereby reducing the time for shopping. Conventionally, when the user buys a product in a store, the user needs to search for the site of the store and obtain coupon information beforehand. There is also a problem that it takes time to search the store for the product for which the coupon is available.

As illustrated in FIG. 433, the lighting fixture 100 periodically transmits lighting ID information of the lighting fixture 100 using visible light communication, in front of the store (an electronics retail store is assumed as an example). The wearable device 101 of the user receives the lighting ID information, and transmits the lighting ID information to the smartphone 102 using near field communication. The smartphone 102 transmits information of the user and the lighting ID information to the server 103 using a mobile line or the like. The smartphone 102 receives point information, coupon information, and the like of the store in front of the user, from the server 103. The user views the information received from the server 103, on the wearable device 101 or the smartphone 102. Thus, the user can buy displayed product information of the store on the spot, or be guided to an exhibit in the store. This is described in detail below, with reference to drawings.

FIG. 434 is a diagram illustrating an information table transmitted from the smartphone 102 to the server 103. The smartphone 102 transmits not only the membership number, the store ID information, the transmission time, and the position information of the store held in the smartphone 102, but also the user preference information, biological information, search history, and behavior history information held in the smartphone 102.

FIG. 435 is a block diagram of the server 103. A transmission and reception unit 201 receives the information from the smartphone 102. A control unit 202 performs overall control. A membership information DB 203 holds each membership number and the name, date of birth, point information, purchase history, and the like of the user of the membership number. A store DB 204 holds each store ID and in-store information such as product information sold in the store, display information of the store, and map information of the store. A notification information generation unit 205 generates coupon information or recommended product information according to user preference.

FIG. 436 is a flowchart illustrating an overall process of the system. The wearable device 102 receives the lighting ID from the lighting 100 (Step S301). The wearable device 101 then transmits the lighting ID to the smartphone 102, for example using proximity wireless communication such as Bluetooth® (Step S302). The smartphone 102 transmits the user history information and the membership number held in the smartphone 102 illustrated in FIG. 434 and the lighting ID, to the server 103 (Step S303). When the server 103 receives the data, the data is first sent to the control unit 202 (Step S304). The control unit 202 refers to the membership DB 203 with the membership number, and obtains membership information (Step S305). The control unit 202 also refers to the store DB 204 with the lighting ID, and obtains store information (Step S306). The store information includes product information in stock in the store, product information which the store wants to promote, coupon information, in-store map information, and the like. The control unit 202 sends the membership information and the store information to the notification information generation unit (Step S307). The notification information generation unit 205 generates advertisement information suitable for the user from the membership information and the store information, and sends the advertisement information to the control unit 202 (Step S308). The control unit 202 sends the membership information and the advertisement information to the transmission and reception unit 201 (Step S309). The membership information includes point information, expiration date information, and the like of the user. The transmission and reception unit 201 transmits the membership information and the advertisement information to the smartphone 102 (Step S310). The smartphone 102 displays the received information on the display screen (Step S311).

The smartphone 102 further transfers the information received from the server 103, to the wearable device 101 (Step S312). If the notification setting of the wearable device 101 is ON, the wearable device 101 displays the information (Step S314). When the wearable device displays the information, it is desirable to alert the user by vibration or the like, for the following reason. Since the user does not always enter the store, even when the coupon information or the like is transmitted, the user might be unaware of it.

FIG. 437 is a diagram illustrating an information table transmitted from the server 103 to the smartphone 102. A store map DB is in-store guide information indicating which product is displayed in which position in the store. Store product information is product information in stock in the store, product price information, and the like. User membership information is point information, membership card expiration date information, and the like of the user.

FIG. 438 is a diagram illustrating flow of screen displayed on the wearable device 101 from when the user receives the information from the server 103 in front of the store to when the user actually buys a product. In front of the store, the points provided when the user visits the store and the coupon information are displayed. When the user taps the coupon information, the information according to the user preference transmitted from the server 103 is displayed. For example when the user taps "TV", recommended TV information is displayed. When the user presses the buy button, a receiving method selection screen is displayed to enable the user to select the delivery to the home or the reception in the store. In this embodiment, in which store the user is present is known, and so there is an advantage that the user can receive the product in the store. When the user selects "guide to sales floor" in flow 403, the wearable device 101 switches to a guide mode. This is a mode of guiding the user to a specific location using an arrow and the like, and the user can be guided to the location where the selected product is actually on display. After the user is guided to the store shelf, the wearable device 101 switches to a screen inquiring whether or not to buy the product. The user can determine whether or not to buy the product, after checking the size, the color, the usability and the like with the actual product.

Visible light communication in the present disclosure allows the position of the user to be specified accurately. Therefore, for example in the case where the user is likely to enter a dangerous area in a factory as in FIG. 439, a warning can be issued to the user. Whether or not to issue a warning may be determined by the wearable device. It is thus possible to create such a warning system with a high degree of freedom that warns children of a specific age or below.

Embodiment 18

FIG. 440 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

FIG. 441 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

FIG. 442 is a flowchart illustrating service provision in another example. The description of the same steps as those in FIG. 441 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

FIG. 443 is a flowchart illustrating service provision in another example. The description of the same steps as those in FIG. 442 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

Though the information communication method according to one or more aspects has been described by way of the embodiments above, the present disclosure is not limited to these embodiments. Modifications obtained by applying various changes conceivable by those skilled in the art to the embodiments and any combinations of structural elements in different embodiments are also included in the scope of one or more aspects without departing from the scope of the present disclosure.

FIG. 444A is a flowchart of an information communication method according to an aspect of the present disclosure.

An information communication method according to an aspect of the present disclosure is an information communication method of obtaining information from a subject, and includes steps SK51 to SK56.

In detail, the information communication method includes: a position information transmission step SK51 of transmitting position information indicating a position of an image sensor used to capture the subject; a list reception step SK52 of receiving an ID list that is associated with the position indicated by the position information and includes a plurality of sets of identification information; an exposure time setting step SK53 of setting an exposure time of the image sensor so that, in an image obtained by capturing the subject by the image sensor, a bright line corresponding to an exposure line included in the image sensor appears according to a change in luminance of the subject; an image obtainment step SK54 of obtaining a bright line image including the bright line, by capturing the subject that changes in luminance by the image sensor with the set exposure time; an information obtainment step SK55 of obtaining the information by demodulating data specified by a pattern of the bright line included in the obtained bright line image; and a search step SK56 of searching the ID list for identification information that includes the obtained information.

FIG. 444B is a block diagram of an information communication device according to an aspect of the present disclosure.

An information communication device K50 according to an aspect of the present disclosure is an information communication device that obtains information from a subject, and includes structural elements K51 to K56.

In detail, the information communication device K50 includes: a position information transmission unit K51 that transmits position information indicating a position of an image sensor used to capture the subject; a list reception unit K52 that receives an ID list that is associated with the position indicated by the position information and includes a plurality of sets of identification information; an exposure time setting unit K53 that sets an exposure time of the image sensor so that, in an image obtained by capturing the subject by the image sensor, a bright line corresponding to an exposure line included in the image sensor appears according to a change in luminance of the subject; an image obtainment unit K54 that includes the image sensor and obtains a bright line image including the bright line, by capturing the subject that changes in luminance with the set exposure time; an information obtainment unit K55 that obtains the information by demodulating data specified by a pattern of the bright line included in the obtained bright line image; and a search unit K56 that searches the ID list for identification information that includes the obtained information.

In the information communication method and the information communication device K50 illustrated in FIGS. 444A and 444B, the information transmitted using the change in luminance of the subject is obtained by the exposure of the exposure line in the image sensor. This enables communication between various devices with no need for, for example, a special communication device for wireless communication. Moreover, since the ID list is received beforehand, even when the obtained information "bc" is only a part of identification information, the appropriate identification information "abcd" can be specified based on the ID list, for instance as illustrated in FIG. 389.

It should be noted that in the above embodiments, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. For example, the program causes a computer to execute the information communication method illustrated in the flowchart of FIG. 444A.

INDUSTRIAL APPLICABILITY

The present disclosure is applicable to an information communication device and the like, and in particular to an information communication device and the like used for a method of communication between a mobile terminal such as a smartphone, a tablet terminal, a mobile phone, a smartwatch, or a head-mounted display and a home electric appliance such as an air conditioner, a lighting device, a rice cooker, a television, a recorder, or a projector.

We claim:

1. An information communication method of transmitting a signal using a change in luminance, the information communication method comprising:

determining a pattern of the change in luminance by modulating the signal to be transmitted;

transmitting the signal by a display, which is a light emitter, changing in luminance according to the determined pattern; and detecting, by a sensor, a person within a viewing angle of the display or a person near the viewing angle, in the transmitting of the signal, the signal is transmitted by changing in luminance by a larger change amount in the case where the person near the viewing angle is detected than in the case where the person within the viewing angle is detected.

2. The information communication method according to claim 1, wherein in the transmitting of the signal, the transmission of the signal by changing in luminance is stopped in the case where neither the person within the viewing angle nor the person near the viewing angle is detected.

3. An information communication device that transmits a signal using a change in luminance, the information communication device comprising:

a determination unit configured to determine a pattern of the change in luminance by modulating the signal to be transmitted;

a transmission unit configured to transmit the signal by causing a display, which is a light emitter, to change in luminance according to the determined pattern; and a detection unit configured to detect, by a sensor, a person within a viewing angle of the display or a person near the viewing angle, wherein the transmission unit is configured to transmit the signal by causing the display to change in luminance by a larger change amount in the case where the person near the viewing angle is detected than in the case where the person within the viewing angle is detected.

4. A non-transitory recording medium storing a computer-readable program for controlling an information communication device that transmits a signal using a change in luminance, the program being for causing the information communication device to execute:

determining a pattern of the change in luminance by modulating the signal to be transmitted;

transmitting the signal by a display, which is a light emitter, changing in luminance according to the determined pattern; and detecting, by a sensor, a person within a viewing angle of the display or a person near the viewing angle, in the transmitting of the signal, the signal is transmitted by changing in luminance by a larger change amount in the case where the person near the viewing angle is detected than in the case where the person within the viewing angle is detected.

* * * * *